US012227625B2

(12) United States Patent
Pedersen et al.

(10) Patent No.: US 12,227,625 B2
(45) Date of Patent: Feb. 18, 2025

(54) COMPOSITE MATERIALS COMPRISING MECHANICAL LIGANDS

(71) Applicant: NANOCORE APS, København K (DK)

(72) Inventors: Henrik Pedersen, Bagsværd (DK); Mikkel Dybro Lundorf, Roskilde (DK); Tore Dehli, Odense N (DK); Christian Benedikt Nielsen, Dragør (DK)

(73) Assignee: NANOCORE APS, København K (DK)

( * ) Notice: Subject to any disclaimer, the term of this patent is extended or adjusted under 35 U.S.C. 154(b) by 1108 days.

(21) Appl. No.: 16/961,519

(22) PCT Filed: Jan. 11, 2019

(86) PCT No.: PCT/EP2019/050697

§ 371 (c)(1),
(2) Date: Jul. 10, 2020

(87) PCT Pub. No.: WO2019/138077

PCT Pub. Date: Jul. 18, 2019

(65) Prior Publication Data

US 2020/0354220 A1 Nov. 12, 2020

(30) Foreign Application Priority Data

Jan. 11, 2018 (DK) .......................... PA 2018 00018
Dec. 11, 2018 (DK) .......................... PA 2018 70805

(51) Int. Cl.

| | |
|---|---|
| ***C04B 35/10*** | (2006.01) |
| ***C01B 32/174*** | (2017.01) |
| ***C04B 35/48*** | (2006.01) |
| ***C04B 35/491*** | (2006.01) |
| ***C04B 35/56*** | (2006.01) |
| ***C04B 35/565*** | (2006.01) |
| ***C04B 35/584*** | (2006.01) |
| ***C04B 35/80*** | (2006.01) |
| ***C08J 5/00*** | (2006.01) |
| ***C08K 3/04*** | (2006.01) |
| ***C08K 9/04*** | (2006.01) |
| *B82Y 30/00* | (2011.01) |
| *B82Y 40/00* | (2011.01) |

(52) U.S. Cl.

CPC ............ *C08J 5/005* (2013.01); *C01B 32/174* (2017.08); *C04B 35/10* (2013.01); *C04B 35/48* (2013.01); *C04B 35/491* (2013.01); *C04B 35/5626* (2013.01); *C04B 35/565* (2013.01); *C04B 35/584* (2013.01); *C04B 35/80* (2013.01); *C08K 3/041* (2017.05); *C08K 9/04* (2013.01); *B82Y 30/00* (2013.01); *B82Y 40/00* (2013.01)

(58) Field of Classification Search

CPC .... C08J 5/055; C08J 2369/00; C08J 2375/04; C08J 2367/00; C08J 2323/06; C08J 2363/00; C01B 32/174; C01B 32/152; C01B 32/194; C04B 35/10; C04B 35/48; C04B 35/5626; C04B 35/491; C04B 35/584; C04B 35/80; C04B 2235/524; C04B 2235/5284; C04B 2235/5288; C04B 2235/80; C04B 2235/96; C04B 28/02; C04B 35/62844; C08K 3/041; C08K 9/04; C08K 3/042; C08K 9/08; Y02W 30/91

USPC ........................................................ 523/205

See application file for complete search history.

(56) References Cited

U.S. PATENT DOCUMENTS

2004/0034177 A1 2/2004 Chen
2010/0080978 A1* 4/2010 Jerome .................. C08J 9/0066 252/511
2016/0121591 A1* 5/2016 MacAdams ........... B29C 66/721 156/307.3
2018/0298154 A1* 10/2018 Lundorf ................. C04B 35/48

FOREIGN PATENT DOCUMENTS

| | | | |
|---|---|---|---|
| JP | 2004002850 | A | 1/2004 |
| JP | 2005-162790 | A | 6/2005 |
| JP | 2010-515779 | A | 5/2010 |
| JP | 2012523359 | A | 10/2012 |
| JP | 2014-510187 | A | 4/2014 |
| JP | 2016-18140 | | 2/2016 |
| WO | WO 2008/045010 | A2 | 4/2008 |
| WO | WO 2010/115528 | A1 | 10/2010 |
| WO | WO 2011/027342 | A2 | 3/2011 |
| WO | WO 2012/138632 | A2 | 10/2012 |
| WO | WO 2016/078664 | A1 | 5/2016 |
| WO | 2017033683 | A1 | 3/2017 |

OTHER PUBLICATIONS

Juan, A., et al., "Optimization and Insights into the Mechanism of Formation of Mechanically Interlocked Derivatives of Single-Walled Carbon Nanotubes," *ChemPlusChem*, 2015, vol. 80, pp. 1153-1157.

(Continued)

*Primary Examiner* — Hannah J Pak
(74) *Attorney, Agent, or Firm* — WOMBLE BOND DICKINSON (US) LLP

(57) ABSTRACT

Composite material units (CMU) of the structure (SE1-ML-LinkerL-Ligand2-SE2), are provided, wherein ML is a Mechanical Ligand, LinkerL is a chemical bond or entity that covalently links ML and Ligand2, Ligand2 is a chemical entity that is covalently linked to the structural entity SE2, or forms a mechanical bond with the structural entity SE2, and SE1 and SE2 are structural entities.

17 Claims, 80 Drawing Sheets

Specification includes a Sequence Listing.

(56) References Cited

OTHER PUBLICATIONS

Bhattacharyya, S., et al., "Protein-functionalized carbon nanotube-polymer composites," *Applied Physics Letters*, 2005, vol. 86(11), pp. 113104-1-113104-3.
Yang, Q., et al., "Functionalization of Multiwalled Carbon Nanotubes by Pyrene-Labeled Hydroxypropyl Cellulose," *J. Phys. Chem. B.*, 2008, vol. 112(41), pp. 12934-12939.

* cited by examiner (10)

(11)

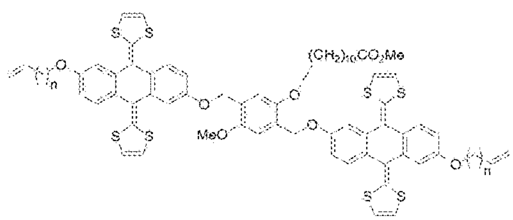
(B) : n=5
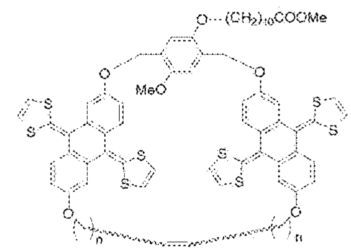
(C) : n=5
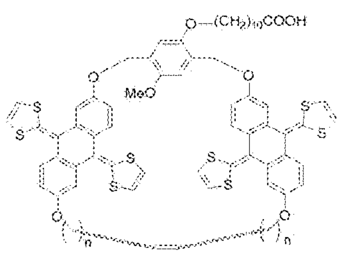
(D)
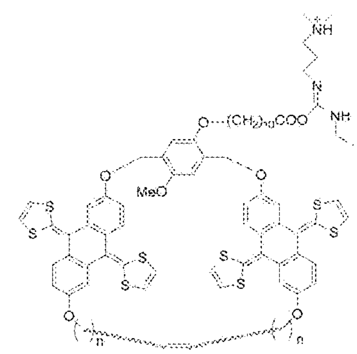
(E)
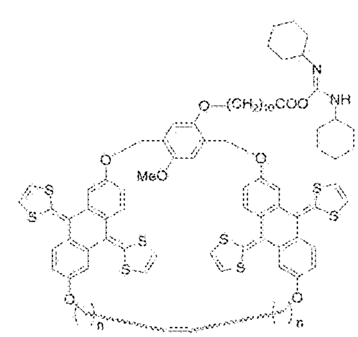
(F)
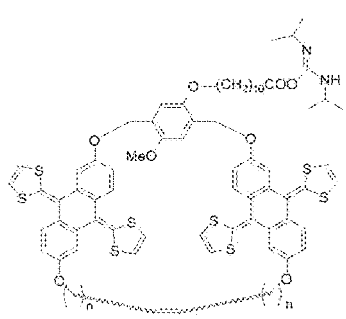
(G)
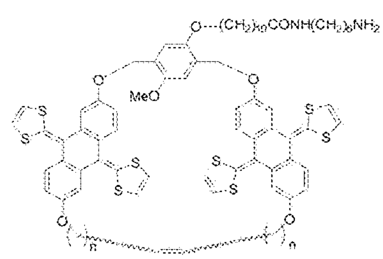
(H)
FIG. 11

(20)

Scheme 1

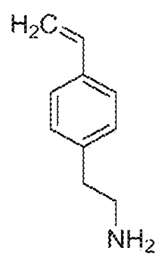
4-aminoethylstyrene
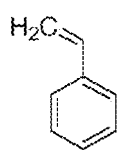
styrene
FIG. 14

(101)

(101-A)

(102)

(102-A)

(103)

(103-A)

(104)

(104-A)

(105)

(105-A)

(106)

(106-A)

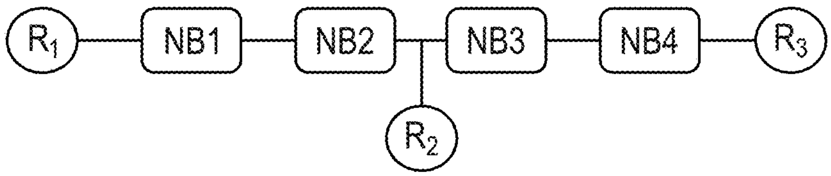
(107)
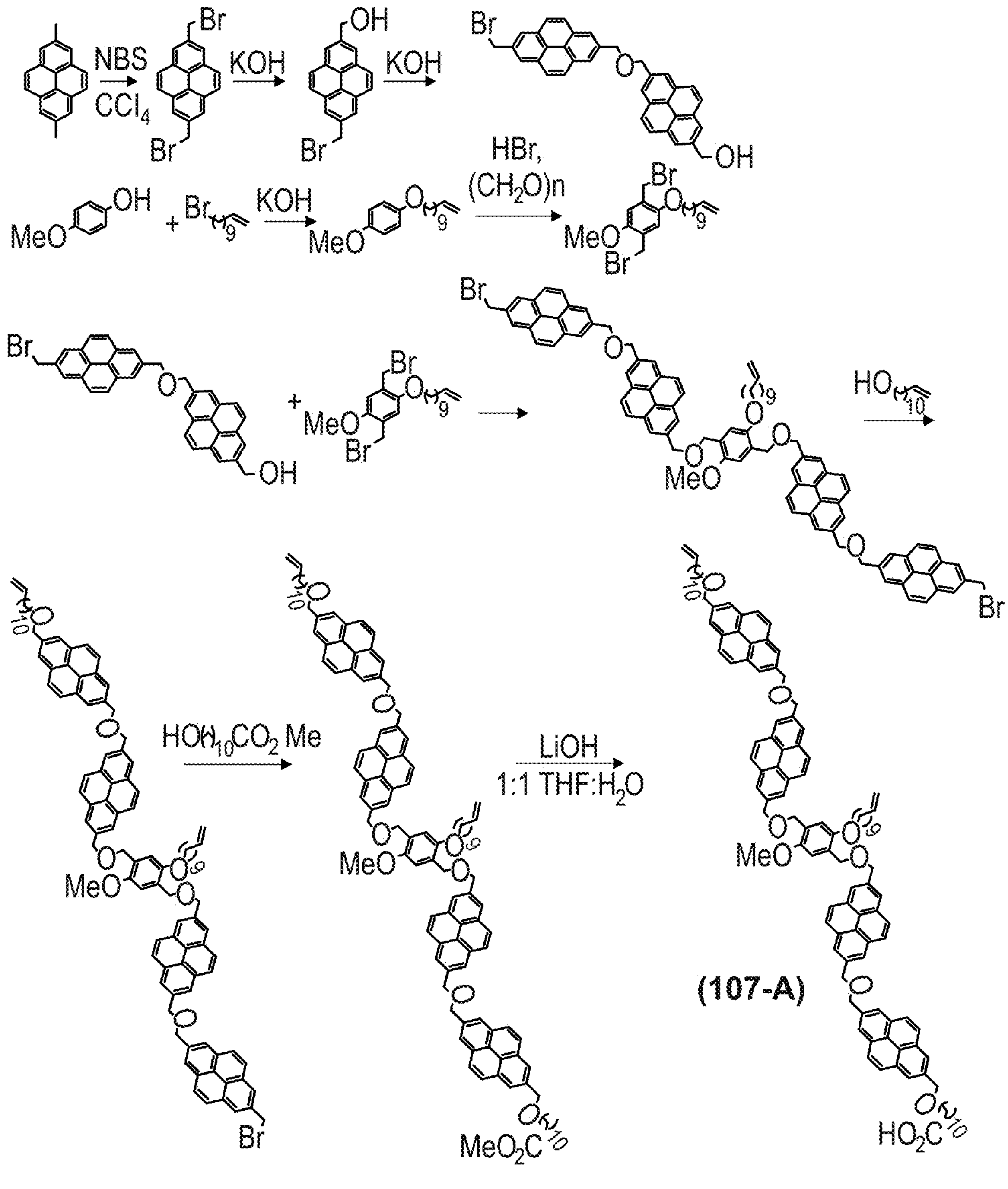
(107-A)
FIG. 28

HS-CGSKGS<u>IFRLSWGTYFS</u>GSKGSC-SH (with $NH_2$ groups on the two K residues)
(108)
CNT-binding motif is underlined
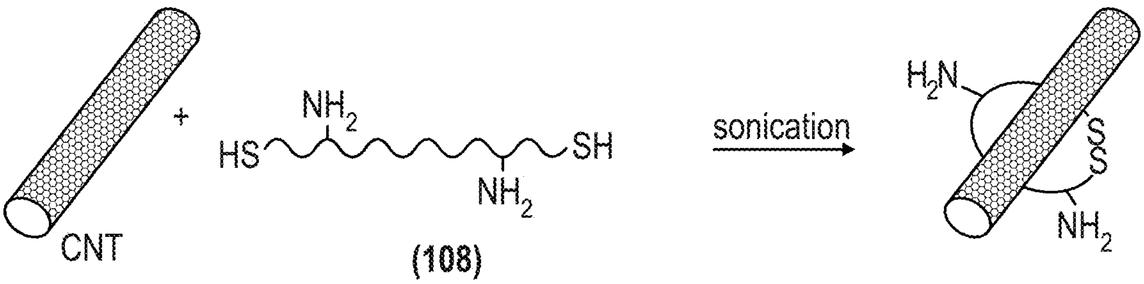
Peptide RC5: $R_1$ - Y ($^{D}$AK)$_4$ $^{D}$AQ - NH - $R_2$ (109)
Peptide RC5: $R_1$ - Y ($^{D}$AK)$_6$ $^{D}$AQ - NH - $R_2$ (110)
Where
$R_1$: 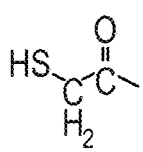
$R_2$: 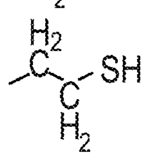
FIG. 29

(111-A)

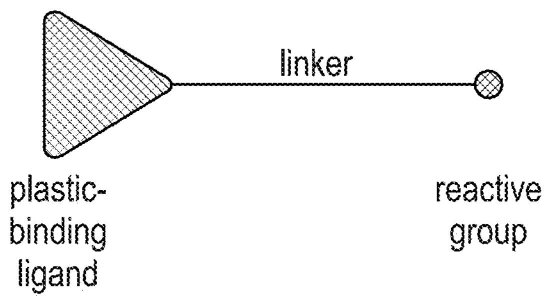
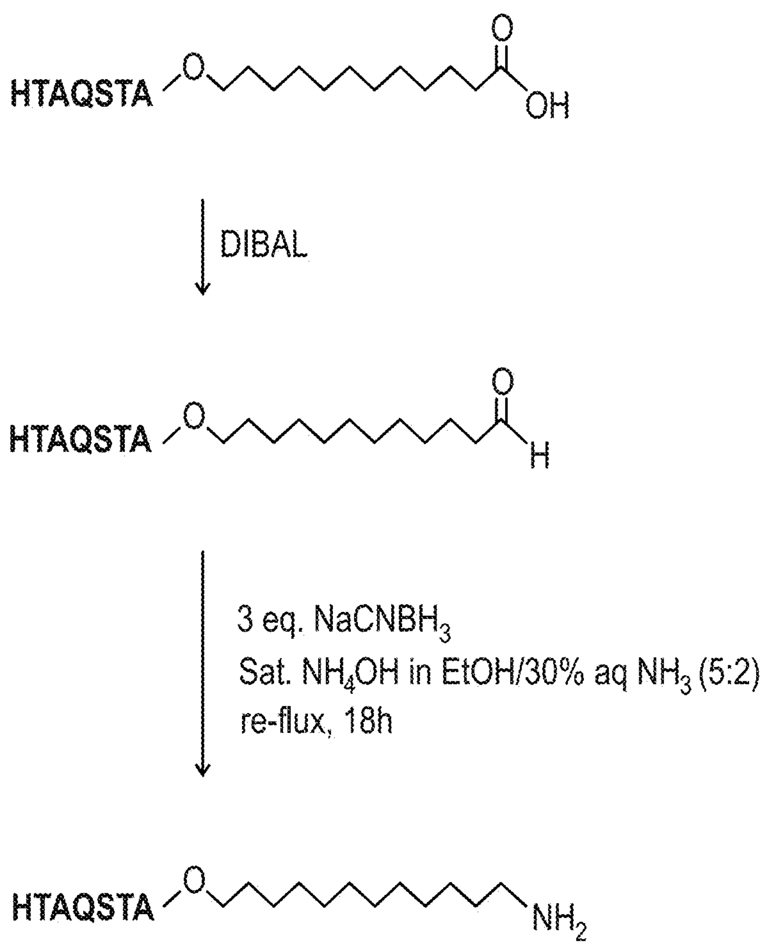
(201)
FIG. 33

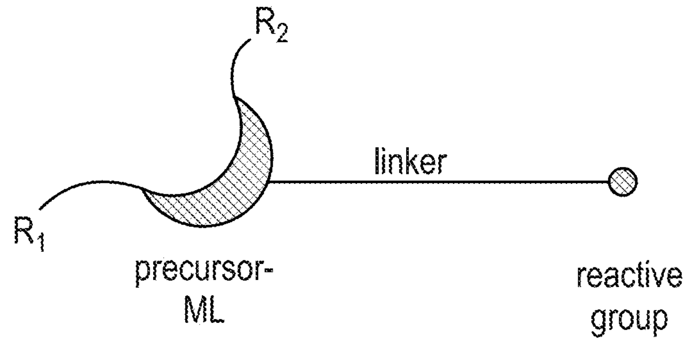
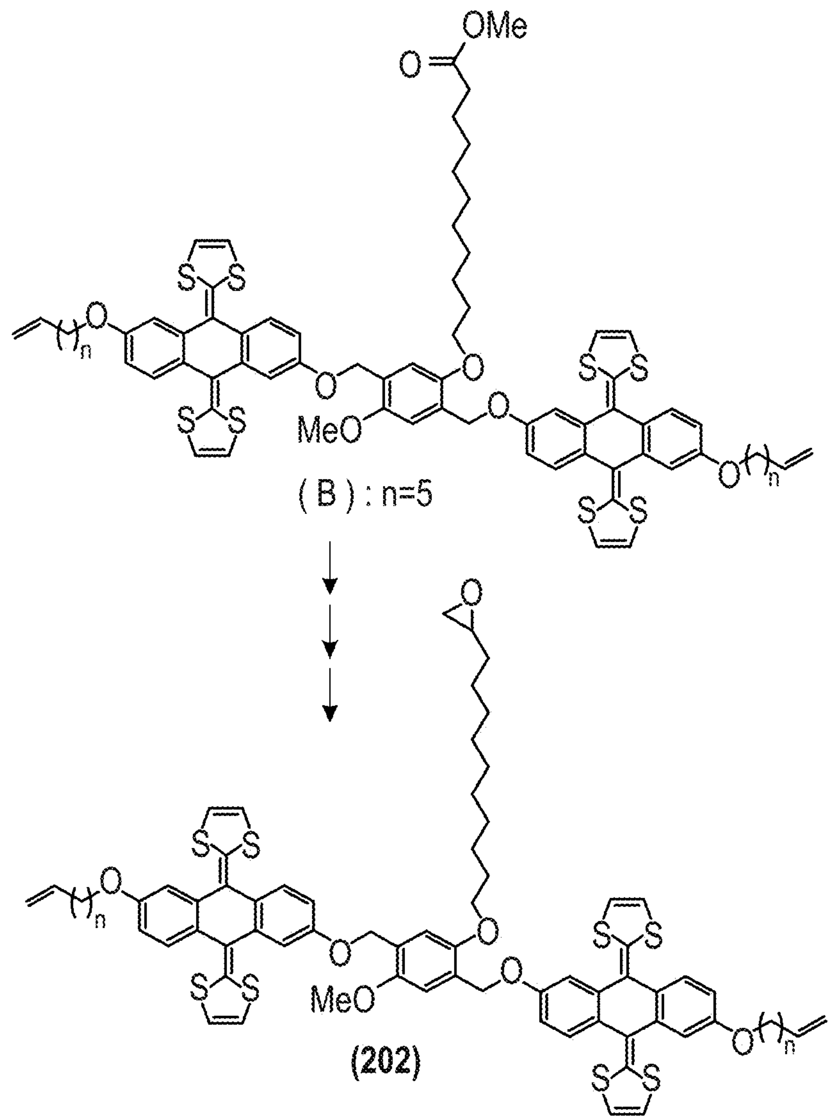
FIG. 34

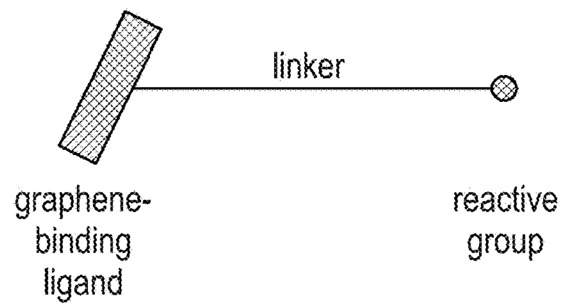
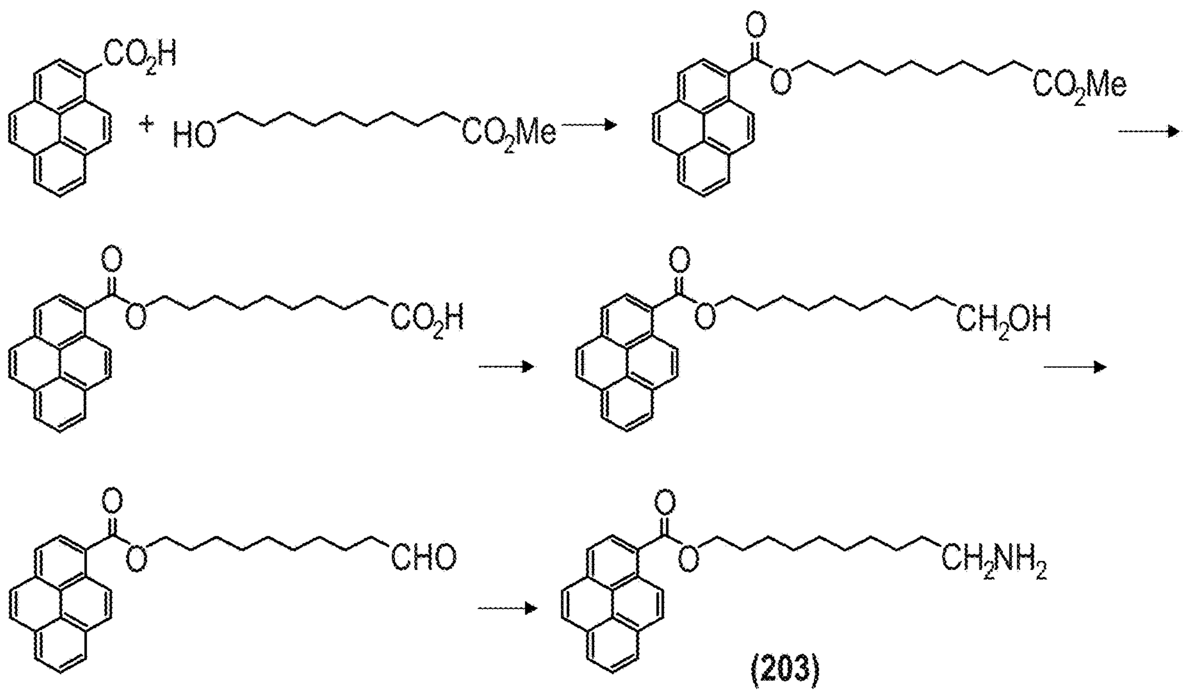
(203)
FIG. 35

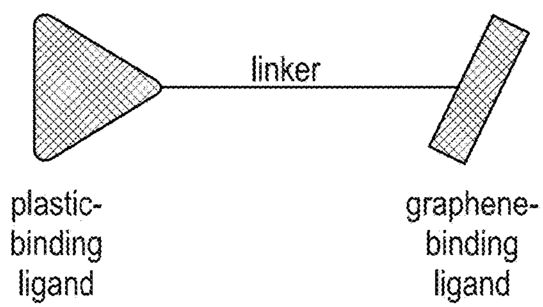
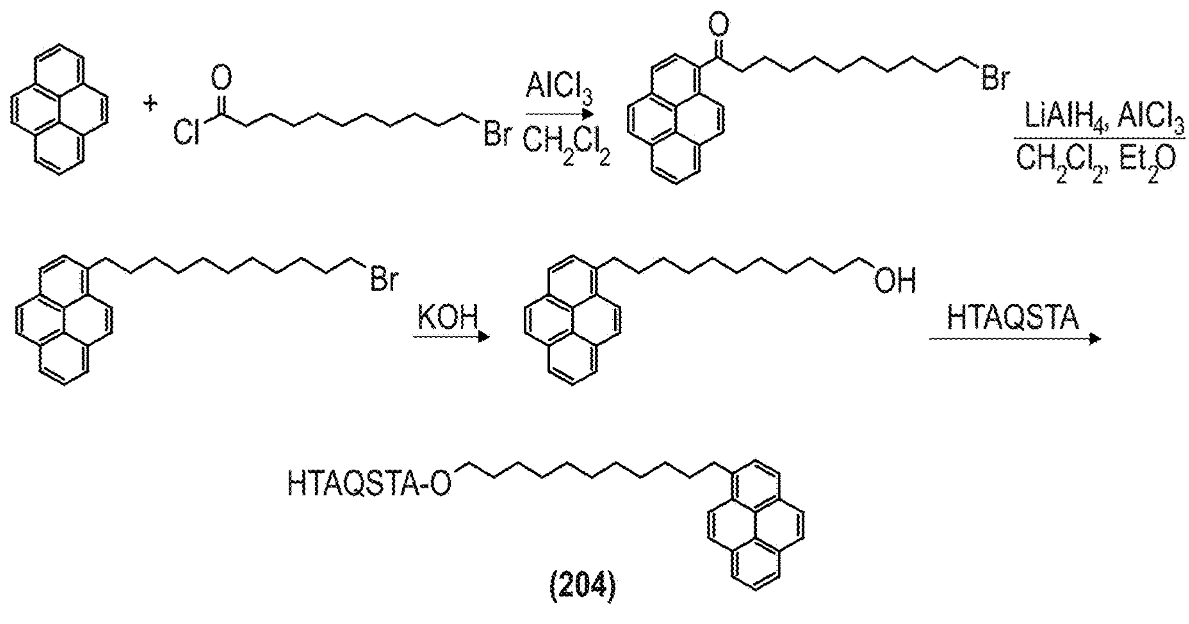
(204)
FIG. 36

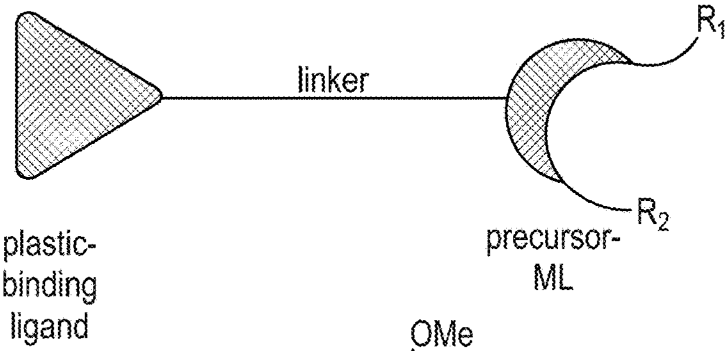
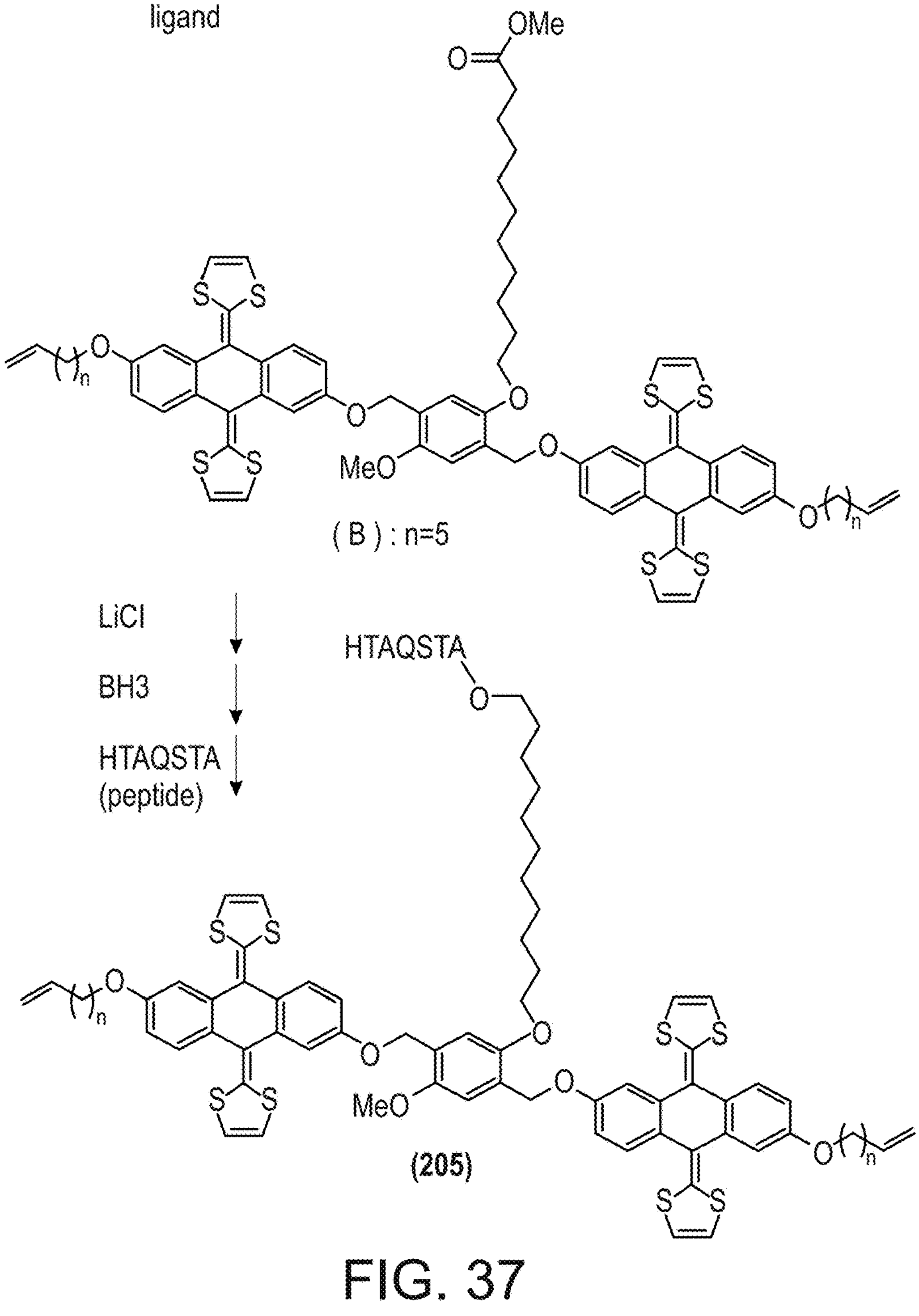
(205)
FIG. 37

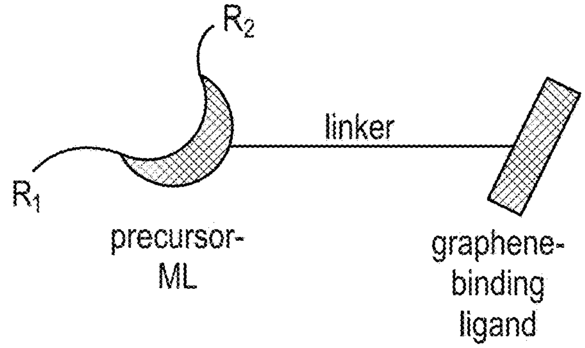
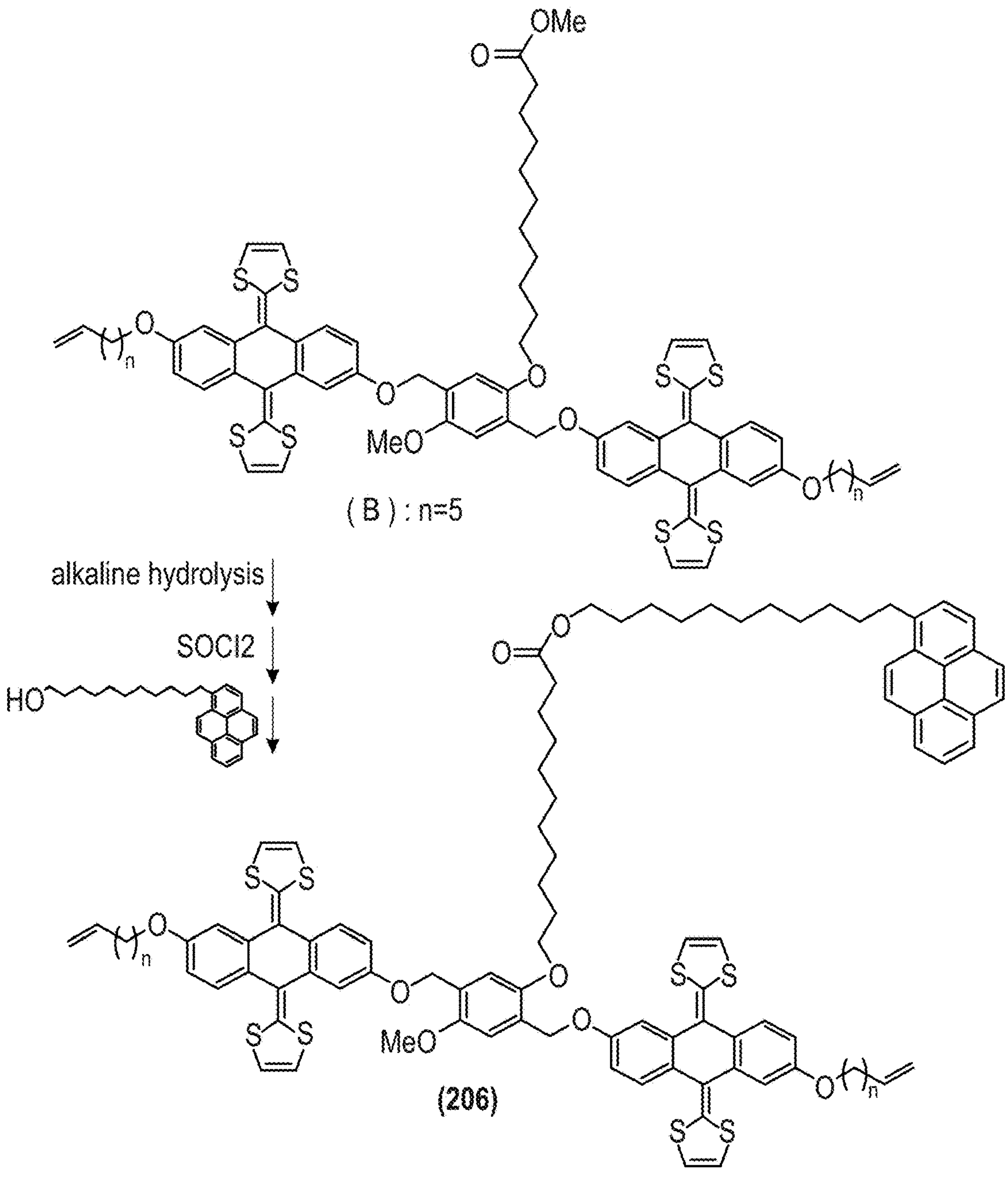
(206)
FIG. 38

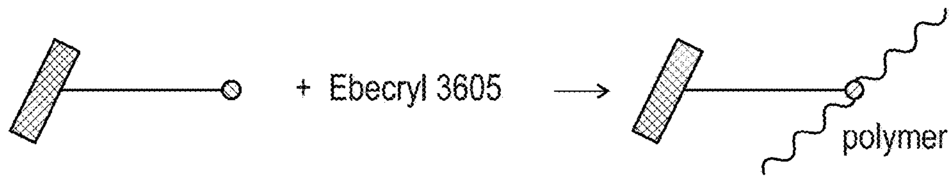
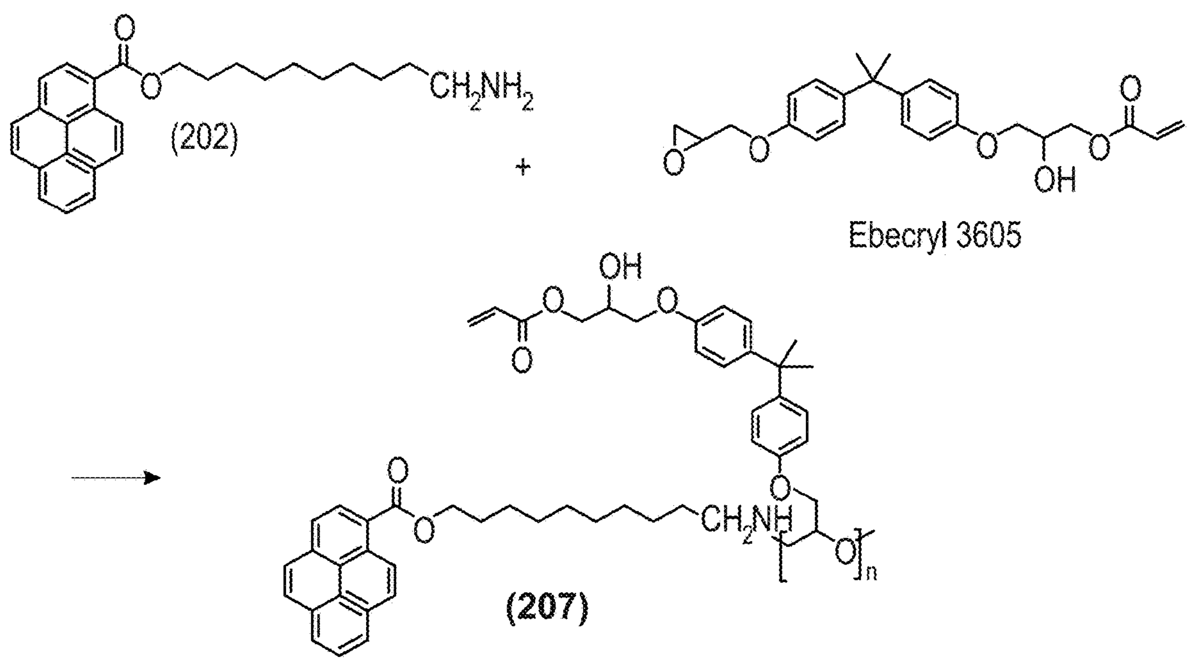
FIG. 39

(221)

( 261 )

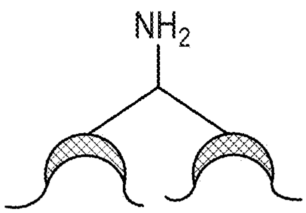
(271)
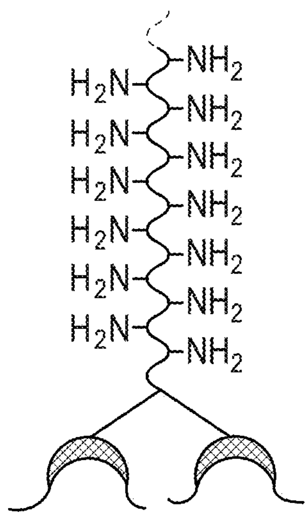
(272)
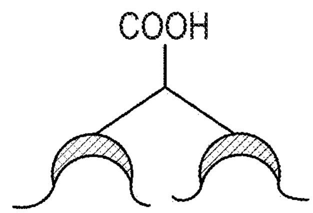
(273)
FIG. 50C

Amine-modified CNT veil:

Carboxylic acid chloride-modified veil:

Gluing $NH_2$-modified veils together with COCl-modified veils:

Certificate of Analysis

Compound Name : Methyl 11-(2,5-bis(((9,10-di(1,3-dithiol-2-ylidene)-6-(hept-6-en-1-yloxy)-9,10-dihydroanthracen-2-yl)oxy)methyl)-4-methoxyphenoxy)undecanoate Syncom Number : 29652

Chemical Structure :

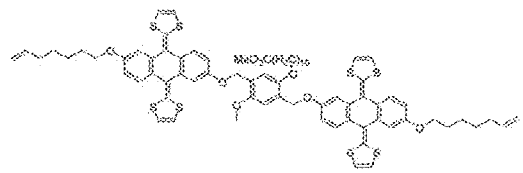

Molecular Formula : $C_{78}H_{78}O_6S_8$

Molecular Weight : 1363.92 g/mol

Quantity Shipped : 300 mg

Last Solvent(s) : Heptane, Ethyl acetate

Appearance : Orange solid

NMR : Enclosed
($^1H$, 300 MHz, $CDCl_3$) in accordance with chemical structure
($^{13}C$, 75 MHz, $CDCl_3$) in accordance with chemical structure UPC-MS : Enclosed + Mass Only
Purity: 92.0% (at 215 nm) and 92.2% (at 238 nm)
MS ($ES^+$): m/z: 681.38 [M/2], 1363 [M+1]

Batch # : MPZ264526-A

Storage Conditions : Room temperature

Retest Date : February 19, 2019

Sample Sent to : NanoCore ApS
Att: Tore Dehli
Universitetsparken 5, CS08 DK-2100 Copenhagen Issued By : M. Poizat (PhD) Approved By : T. Visser (PhD)

Date : February 19, 2018 Date : February 19, 2018

FIG. 53

MPZ-264526-T1

| | | | |
|---|---|---|---|
| Sample Name: MPZ-264526-T1 | Pulse sequence: PROTON | Temperature: 26 | Number of scans: 8 |
| Date collected: 2018-02-05 | Solvent: cdcl3 | Spectrometer: VNMRS-vnmrs300 | Line broadening: 0.5 |

MPZ-264526-T1

SAMPLE

| | |
|---|---|
| date | Feb 5 2018 |
| solvent | cdcl3 |
| file | /home/data/20180205_ MPZ-264526-T1_Submitq_01/P ROTON_01 |

ACQUISITION

| | |
|---|---|
| sw | 4807.7 |
| at | 1.704 |
| np | 16384 |
| fb | 4000 |
| bs | 32 |
| d1 | 1.000 |
| nt | 8 |
| ct | 8 |

TRANSMITTER

| | |
|---|---|
| tn | H1 |
| sfrq | 299.497 |
| tof | 293.5 |
| tpwr | 59 |
| pw | 3.550 |

DECOUPLER

| | |
|---|---|
| dn | C13 |
| dof | 0 |
| dm | nnn |
| decwave | W40_ID |
| dpwr | 37 |
| dmf | 28318 |

PRESATURATION

| | |
|---|---|
| satmode | n |

| | |
|---|---|
| wet | n |

SPECIAL

| | |
|---|---|
| temp | 26.0 |
| gain | 50 |
| spin | 20 |
| hst | 0.008 |
| pw90 | 7.100 |
| alfa | 10.000 |

FLAGS

| | |
|---|---|
| il | n |
| in | n |
| dp | y |
| hs | nn |

PROCESSING

| | |
|---|---|
| lb | 0.50 |
| fn | not used |

DISPLAY

| | |
|---|---|
| sp | -0.5 |
| wp | 3006.6 |
| rfl | 606.8 |
| rfp | 0 |
| rp | 153.8 |
| lp | 0 |

PLOT

| | |
|---|---|
| wc | 252 |
| sc | 8 |
| vs | 759 |
| th | 11 |

ai cdc ph

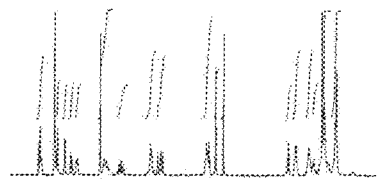

INTEGRAL VALUES

| integral | start(ppm) | end | value |
|---|---|---|---|
| 1 | 7.65019 | 7.47018 | 3.884 |
| 2 | 7.22095 | 7.13787 | 2.302 |
| 3 | 7.08248 | 6.97171 | 2.054 |
| 4 | 6.97171 | 6.84017 | 2.104 |
| 5 | 6.84017 | 6.67401 | 2.145 |
| 6 | 6.34661 | 6.01629 | 7.600 |
| 7 | 5.95398 | 5.6906 | 2.048 |
| 8 | 5.32396 | 5.08857 | 4.091 |
| 9 | 5.08857 | 4.88097 | 3.807 |
| 10 | 4.09854 | 3.89054 | 6.058 |
| 11 | 3.8493 | 3.74545 | 3.000 |
| 12 | 3.72488 | 3.61381 | 2.752 |
| 13 | 2.31233 | 2.19463 | 2.023 |
| 14 | 2.19463 | 1.98693 | 4.115 |
| 15 | 1.89683 | 1.75154 | 4.203 |
| 16 | 1.75154 | 1.62692 | 2.250 |
| 17 | 1.53 | 1.35691 | 12.135 |
| 18 | 1.34993 | 1.14229 | 11.708 |

PEAK FREQUENCIES

| index | freq(ppm) | intensity |
|---|---|---|
| 1 | 7.66733 | 30.1994 |
| 2 | 7.55794 | 43.1663 |
| 3 | 7.53834 | 15.809 |
| 4 | 7.26009 | 685.014 |
| 5 | 7.19542 | 40.6079 |
| 6 | 7.04845 | 33.2207 |
| 7 | 7.03278 | 32.1544 |
| 8 | 6.91129 | 20.4019 |
| 9 | 6.88189 | 16.8901 |
| 10 | 6.86873 | 17.263 |
| 11 | 6.79175 | 14.2237 |
| 12 | 6.76824 | 14.7195 |
| 13 | 6.27443 | 128.9 |
| 14 | 6.16621 | 14.3411 |
| 15 | 6.14706 | 13.8744 |
| 16 | 5.83941 | 13.4873 |
| 17 | 5.8159 | 13.5969 |
| 18 | 5.19665 | 28.1104 |
| 19 | 5.17912 | 23.7525 |
| 20 | 5.04187 | 19.4794 |
| 21 | 5.04776 | 20.2123 |
| 22 | 4.98697 | 18.1927 |
| 23 | 4.97133 | 22.5926 |
| 24 | 4.93802 | 20.558 |
| 25 | 4.01115 | 30.5765 |
| 26 | 3.97784 | 23.1254 |
| 27 | 3.95628 | 30.1075 |
| 28 | 3.93473 | 14.9327 |
| 29 | 3.81323 | 96.2388 |

PEAK FREQUENCIES(CONTINUED)

| index | freq(ppm) | intensity |
|---|---|---|
| 30 | 3.84663 | 126.297 |
| 31 | 2.28478 | 16.7696 |
| 32 | 2.25931 | 30.5393 |
| 33 | 2.23384 | 18.9412 |
| 34 | 2.10451 | 27.5098 |
| 35 | 2.08491 | 27.5343 |
| 36 | 1.81449 | 25.6489 |
| 37 | 1.79098 | 19.808 |
| 38 | 1.74003 | 10.8578 |
| 39 | 1.71651 | 13.9089 |
| 40 | 1.69104 | 12.1793 |
| 41 | 1.53624 | 856.216 |
| 42 | 1.50488 | 84.4909 |
| 43 | 1.49508 | 56.7513 |
| 44 | 1.48333 | 69.5375 |
| 45 | 1.47157 | 54.2899 |
| 46 | 1.40691 | 13.8584 |
| 47 | 1.25692 | 50.5561 |
| 48 | 1.22863 | 95.563 |

FIG. 55

MPZ-264526-CARBON

| | | | | | | | |
|---|---|---|---|---|---|---|---|
| Sample Name | MPZ-264526-CARBON | Pulse sequence | CARBON | Temperature | 28 | Number of scans | 32000 |
| Date collected | 2018-02-07 | Solvent | cdcl3 | Spectrometer | MERCURY-mercury300 | Line broadening | 0.5 |

MPZ-264526-CARBON

SAMPLE

| | |
|---|---|
| date | Feb 7 2018 |
| solvent | cdcl3 |
| file | /home/data/20180207_MPZ-264526-CARBON_Submitq_02/CARBON_01 |

ACQUISITION

| | |
|---|---|
| sw | 18867.9 |
| at | 0.868 |
| np | 32768 |
| fb | 10400 |
| bs | 64 |
| d1 | 1.000 |
| nt | 22000 |
| ct | 22000 |

TRANSMITTER

| | |
|---|---|
| tn | C13 |
| sfrq | 75.480 |
| tof | 1156.3 |
| tpwr | 58 |
| pw | 7.350 |

DECOUPLER

| | |
|---|---|
| dn | H1 |
| dof | 0 |
| dm | yyy |
| decwave | w |
| dpwr | 39 |
| dmf | 5400 |

PRESATURATION

| | |
|---|---|
| satmode | n |
| wet | n |

SPECIAL

| | |
|---|---|
| temp | 28.0 |
| gain | 30 |
| spin | 20 |
| hst | 0.008 |
| pw90 | 14.700 |
| alfa | 10.000 |

FLAGS

| | |
|---|---|
| il | n |
| in | n |
| dp | y |
| hs | nn |

PROCESSING

| | |
|---|---|
| lb | 0.50 |
| fn | not used |

DISPLAY

| | |
|---|---|
| sp | 10.3 |
| wp | 14990.5 |
| rfl | 1132.1 |
| rfp | 0 |
| rp | -149.1 |
| lp | -328.6 |

PLOT

| | |
|---|---|
| wc | 252 |
| sc | 8 |
| vs | 3459 |
| th | 6 |
| ai cdc ph | |

Data file /home/data/20180207_MPZ-264526-CARBON_Submitq_02/CARBON_01

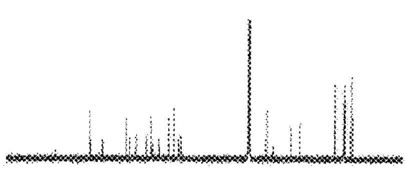

INTEGRAL VALUES

| integral | start(ppm) | end | value |
|---|---|---|---|
| 1 | 198.76 | 0.136608 | 100.000 |

PEAK FREQUENCIES

| index | freq(ppm) | intensity |
|---|---|---|
| 1 | 174.362 | 7.88104 |
| 2 | 163.101 | -8.46855 |
| 3 | 157.043 | 50.1275 |
| 4 | 156.892 | 19.0469 |
| 5 | 156.585 | 16.1447 |
| 6 | 150.787 | 19.5639 |
| 7 | 150.329 | 20.0432 |
| 8 | 138.87 | 42.8311 |
| 9 | 137.008 | 18.8647 |
| 10 | 136.916 | 21.5075 |
| 11 | 134.002 | 10.1384 |
| 12 | 133.56 | 25.0597 |
| 13 | 128.524 | 18.4166 |
| 14 | 128.28 | 23.2342 |
| 15 | 126.052 | 43.1977 |
| 16 | 125.991 | 43.4087 |
| 17 | 125.964 | 10.5894 |
| 18 | 125.243 | 17.2761 |
| 19 | 122.146 | 20.6171 |
| 20 | 121.795 | 11.8535 |
| 21 | 117.263 | 26.5789 |
| 22 | 117.141 | 43.0866 |
| 23 | 116.897 | 16.132 |
| 24 | 114.44 | 55.6421 |
| 25 | 112.441 | 19.8534 |
| 26 | 111.959 | 17.5087 |
| 27 | 111.175 | 24.8507 |
| 28 | 111.236 | 24.7634 |
| 29 | 110.885 | 20.5115 |
| 30 | 77.4377 | 713.122 |
| 31 | 77.2088 | 29.4098 |
| 32 | 77.0104 | 796.385 |
| 33 | 76.5833 | 735.479 |
| 34 | 70.2508 | -7.88868 |
| 35 | 68.9385 | 19.7486 |
| 36 | 68.0983 | 52.4336 |
| 37 | 64.9255 | 13.2802 |
| 38 | 56.1211 | 34.8072 |
| 39 | 51.4367 | 37.3928 |
| 40 | 34.1027 | 41.7301 |
| 41 | 33.786 | 78.3333 |
| 42 | 29.5556 | 33.994 |
| 43 | 29.4335 | 59.21 |
| 44 | 29.3419 | 23.1045 |
| 45 | 29.2897 | 42.3501 |
| 46 | 29.1438 | 77.7897 |
| 47 | 28.6706 | 63.7283 |
| 48 | 26.1681 | 28.2476 |
| 49 | 25.573 | 87.7055 |
| 50 | 24.9474 | 42.787 |

FIG. 57

Processed Channel: PDA
Ch1 215nm@4.8nm
-Compens.

| | Retention Time (min) | Area | % Area | Height |
|---|---|---|---|---|
| 1 | 4.660 | 5316 | 0.42 | 2148 |
| 2 | 5.798 | 5435 | 0.43 | 1955 |
| 3 | 6.697 | 11746 | 0.93 | 4385 |
| 4 | 6.816 | 1161699 | 92.04 | 465067 |
| 5 | 6.893 | 37934 | 3.01 | 15114 |
| 6 | 7.020 | 31043 | 2.46 | 5726 |
| 7 | 7.227 | 4922 | 0.39 | 2132 |
| 8 | 7.314 | 4021 | 0.32 | 1431 |

Processed Channel: PDA
Ch2 238nm@4.8nm
-Compens.

| | Retention Time (min) | Area | % Area | Height |
|---|---|---|---|---|
| 1 | 4.661 | 2378 | 0.20 | 823 |
| 2 | 5.799 | 1845 | 0.16 | 759 |
| 3 | 5.881 | 805 | 0.07 | 369 |
| 4 | 6.698 | 10972 | 0.93 | 3565 |
| 5 | 6.816 | 1090664 | 92.19 | 425112 |
| 6 | 6.896 | 45247 | 3.82 | 14480 |
| 7 | 7.022 | 24490 | 2.07 | 5616 |
| 8 | 7.227 | 5012 | 0.42 | 1980 |
| 9 | 7.320 | 1605 | 0.14 | 674 |

PHYSICAL PROPERTIES OF NATURAL LATEX WITH 0.03 wt.% TUBALL™

(282)

COMPOSITE MATERIALS COMPRISING MECHANICAL LIGANDS

CROSS-REFERENCE TO RELATED APPLICATIONS

This application is a national stage filing under 35 U.S.C. 371 of PCT/EP2019/050697 filed Jan. 11, 2019, which International Application was published by the International Bureau in English on Jul. 18, 2019, and application claims priority from Denmark Application Nos. PA 2018 00018, filed Apr. 11, 2018, and PA 2018 70805, filed Dec. 11, 2018, which applications are hereby incorporated in their entirety by reference in this application.

TECHNICAL FIELD

Composite materials, in particular materials where the strength of the material is of importance.

BACKGROUND

Composite materials typically consist of a polymer part and one or more additives. The polymers and additives have typically been mixed during preparation of the composite material. In the resulting composite material there are often only weak interactions between the polymer and additive components; however, the interaction can also be strong, and sometimes the polymer and additive is even held together by a covalent bond. Characteristics of the composite material such as e.g. strength is often compromised as a result of this weak interaction between the different components of the composite material.

It has been difficult to make carbon nanotube composites of high strength, although carbon nanotubes are very strong themselves. This is in part because the carbon nanotubes are difficult to anchor efficiently in the composite material. It is not ideal to link the carbon nanotubes and the matrix, e.g. the polymer, by covalent bonds, as covalent bonds tend to negatively affect the structure and other characteristics of the carbon nanotube. Thus, covalent functionalization of the carbon nanotube surface typically lowers the strength of the carbon nanotubes.

It is therefore of great interest to identify approaches that can anchor the carbon nanotubes efficiently in the composite material without compromising their intrinsic characteristics such as strength.

SUMMARY OF THE INVENTION

What is provided is a Mechanical Ligand (ML), i.e. a ligand capable of forming a mechanical bond with one or more structural entities. The ligand optionally changes the characteristics of the structural entity upon binding to it. Examples of mechanical ligands are shown and described in (FIG. 1A to FIG. 1F).

What is further provided is the preparation, structure, and use of a complex comprising a structural entity (SE) and a Mechanical Ligand (ML), where the characteristics of the structural entity when bound by the ML is different from the characteristics of the structural entity when not bound by the ML, or alternatively, the characteristics of said complex is different from the characteristics of the structural entity (SE) and the ML.

The ML-structural entity complex may comprise one or more ligands and one or more structural entities, and thus can be described by the formula $$SE_o\text{-}ML_p$$

where SE is a structural entity, and

ML is a chemical moiety capable of forming a mechanical bond to the SE, and o and p are integers larger than zero.

(FIG. 1A to FIG. 1F) shows examples of $SE_o$-$ML_p$ complexes.

What is further provided in this invention is a structure of, and a process for preparing, a Linker Unit (LU) of the following composition:

ML-LinkerL-Ligand2 where

ML is a chemical entity that is capable of forming a mechanical bond with a structural entity, LinkerL is a chemical bond or entity that links ML and Ligand2, Ligand2 is a chemical entity that is capable of forming a covalent or non-covalent bond to a structural entity, or alternatively, is capable of forming a mechanical bond with a structural entity, and optionally, where a structural entity, SE1, is bound to ML, and a structural entity, SE2, is bound to Ligand2, thereby forming a composite material unit (CMU) of the following composition:

SE1-ML-LinkerL-Ligand2-SE2 where

SE1 is a Structural Entity,

ML is a chemical entity that is attached to SE1 though a mechanical bond,

LinkerL is a chemical bond or entity that links ML and Ligand2,

Ligand2 is a chemical entity that is covalently or non-covalently attached to SE2, or alternatively, is attached to SE2 through a mechanical bond.

SE2 is a Structural Entity.

See (FIG. 2A to FIG. 2E) for example structures of CMUs.

The linker unit (LU) thus may be used to link two structural entities. The LU as described in the present invention is capable of efficiently linking two or more structural entities, but at least one of the ligands is a mechanical ligand.

What is also provided is a LU comprising several MLs, Ligands and/or Linkers, of the following compositions:

$$(ML)_m\text{-}(Linker)_n\text{-}(Ligand2)_o$$

where m, n, and o are any integers, at least one of the ligands is a mechanical ligand, and the MLs, Ligands and Linkers can be linked in any order and sequence.

What is also provided is a CMU comprising several SEs and LUs, of the following compositions:

$$((SE)_l)\text{-}((Ligand)_m)\text{-}((Linker)_n)$$

or $$(SE\text{-}Ligand\text{-}Linker)_n$$

where l, m, and n are any integers, at least one of the ligands is a mechanical ligand, and the SEs, Ligands and Linkers can be linked in any order and sequence.

The composite material unit (CMU) may be used in the preparation of composite materials with improved or novel characteristics. The CMU as described in the present invention in an appropriate manner links different parts of the composite material. Depending on the desired characteristics these links may be covalent or non-covalent; weak or strong; or may be e.g. temperature sensitive or conducting.

What is further provided is a composition, and the process of preparing a composition, comprising two or more CMUs. The two or more CMUs may be identical, essentially identical or different.

What is further provided is a polymeric structure of CMUs, consisting of a number of repeats of the palindromic structure SE1-ML-Linker-Ligand2-SE2-Ligand2-Linker-ML-SE1. Thus, the overall structure of said polymeric structure of CMUs is (SE1-ML-Linker-Ligand2-SE2-Ligand2-Linker-ML-)$_n$SE1, where n is an integer larger than zero.

For n=1, the polymeric structure of CMUs is thus described by the structure SE1-ML-Linker-Ligand2-SE2-Ligand2-Linker-ML-SE1.

For n=2, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1.

For n=3, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1.

For n=5, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1.

Preferred polymeric structures of CMUs are the polymeric structures where SE1 is a carbon nanotube, and n=1, 2, 3, 4, 5, 6, 7, 8, 9, 10-20, 20-100, or 100-1000, or higher.

Other preferred polymeric structures of CMUs are the polymeric structures where SE1 is a nanotube, and n=1, 2, 3, 4, 5, 6, 7, 8, 9, 10-20, 20-100, or 100-1000, or higher.

Yet other preferred polymeric structures of CMUs are the polymeric structures where SE1 is a nanotube or graphene, SE2 is a nanotube or graphene, and n=1, 2, 3, 4, 5, 6, 7, 8, 9, 10-20, 20-100, or 100-1000, or higher.

Yet other preferred polymeric structures of CMUs are the polymeric structures where SE1 is a nanotube, SE2 is a plastic polymer, and n=1, 2, 3, 4, 5, 6, 7, 8, 9, 10-20, 20-100, or 100-1000, or higher.

Yet other preferred polymeric structures of CMU are the polymeric structures where SE1 is a carbon nanotube, SE2 is not a carbon nanotube, and the number of repeats is two or higher.

The present invention describes a new approach to the anchoring of additives in a composite material, e.g. by the use of a mechanical bond between the additive (e.g. carbon nanotube) and the matrix (e.g. polypropylene polymer). The anchoring can be achieved without covalent modification to the surface of the additive. This is particularly attractive for additives such as carbon nanotubes that are particularly vulnerable to covalent modification.

FIGURES

FIG. 11 shows the structure of a precursor-ML with a Linker moiety attached (Compound B), as well as structures of MLs with various linker moieties attached (Compounds C, D, E and F)

FIG. 14 shows the structures of 4-aminoethyl styrene and styrene

FIGs. 15 to FIG. 30 shows a general structure of a precursor-ML and the specific structure of certain precursor-MLs (compounds 101, 102, 103, 104, 105, 106, 107, 108, 109, 110, 111), as well as the synthesis and structure of certain other precursor-MLs (compounds 101-A, 102-A, 103-A, 104-A, 105-A, 106-A, 107-A, 111-A).

FIGs. 33 to FIG. 40 shows the synthesis and use of various mechanical ligands, nanotubes and graphene, for the preparation of an ink with superior characteristics.

Figure 41A:
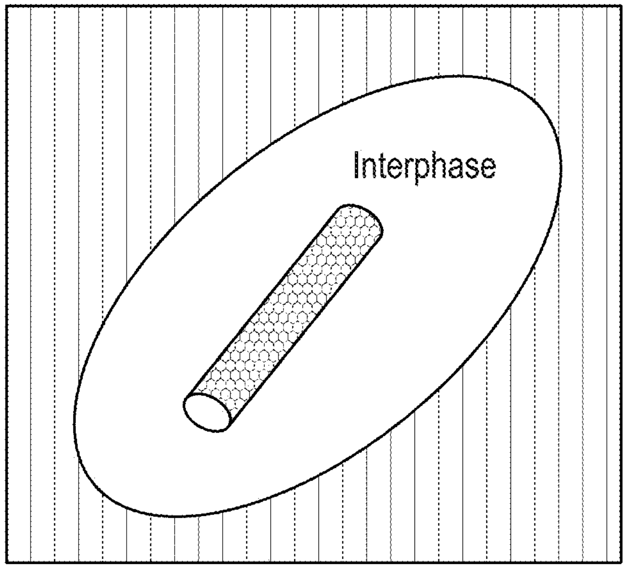
Figure 41B:
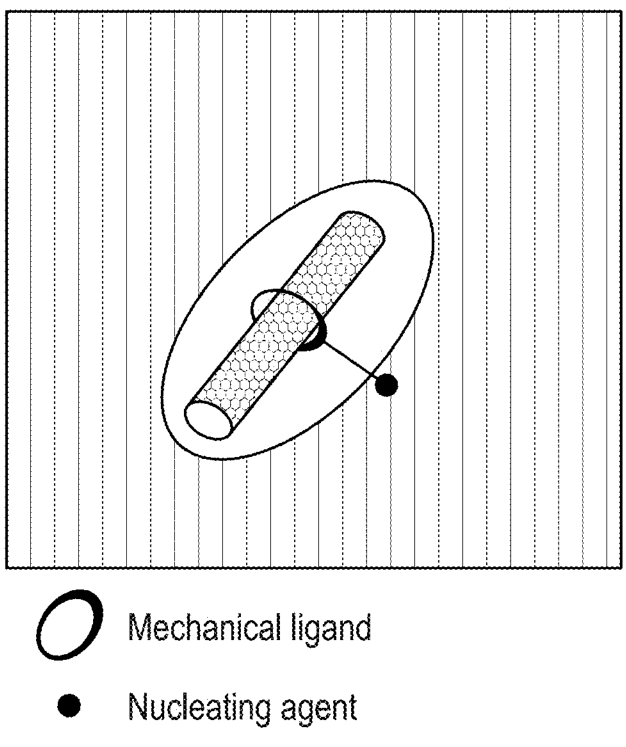
Figure 42:
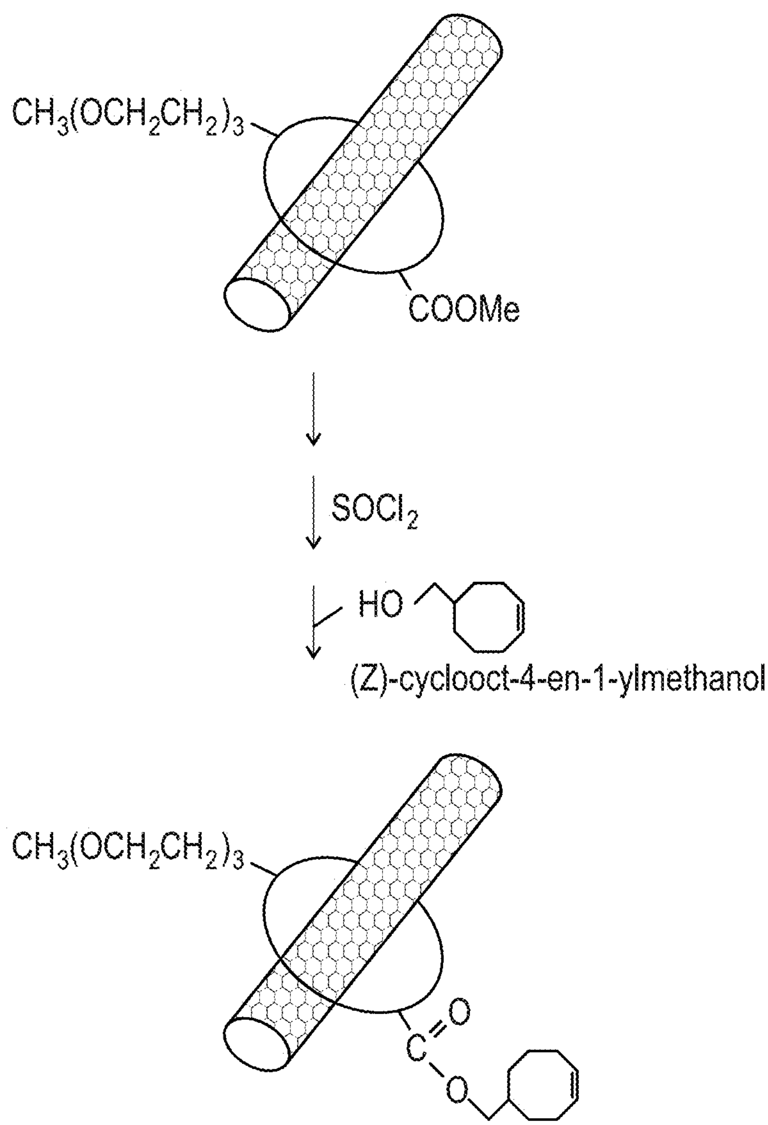
Figure 43:
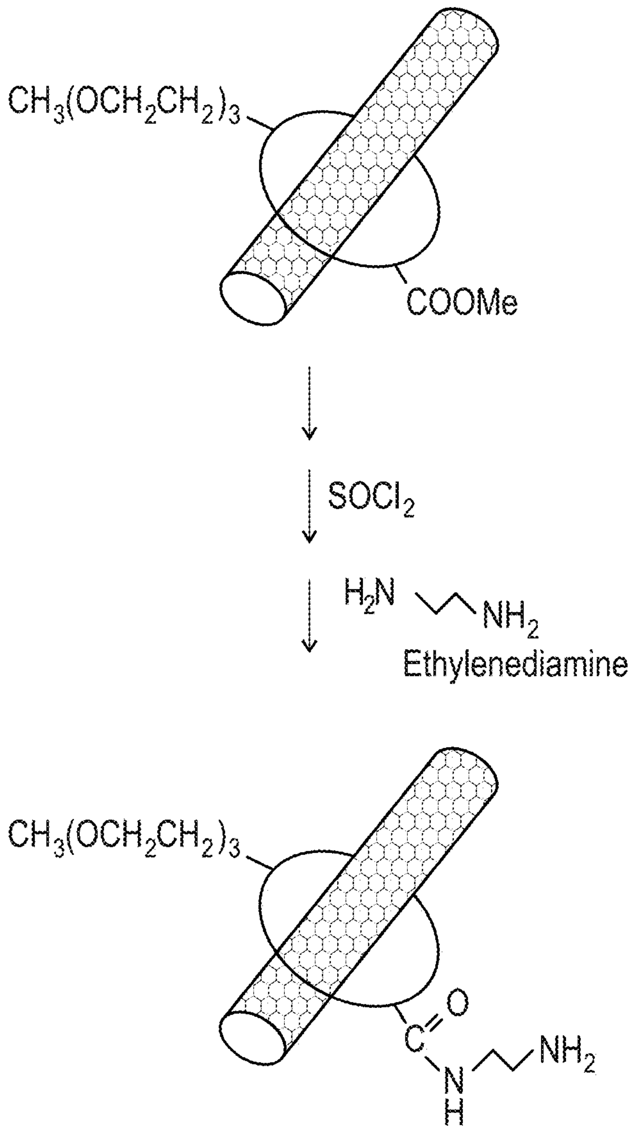
Figure 44:
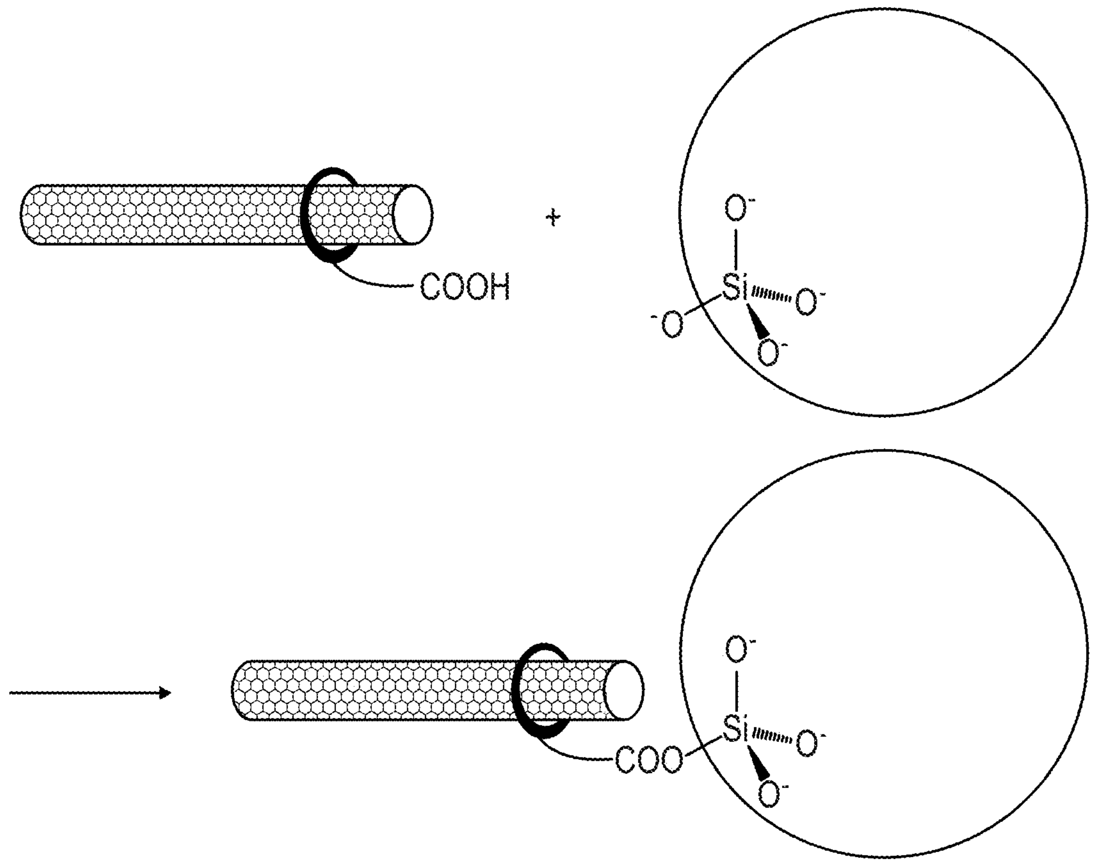
Figure 45:
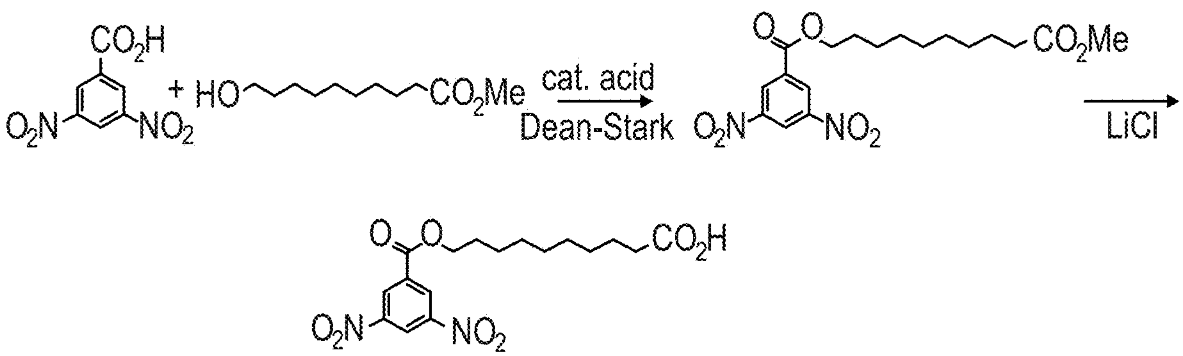
Figure 46:
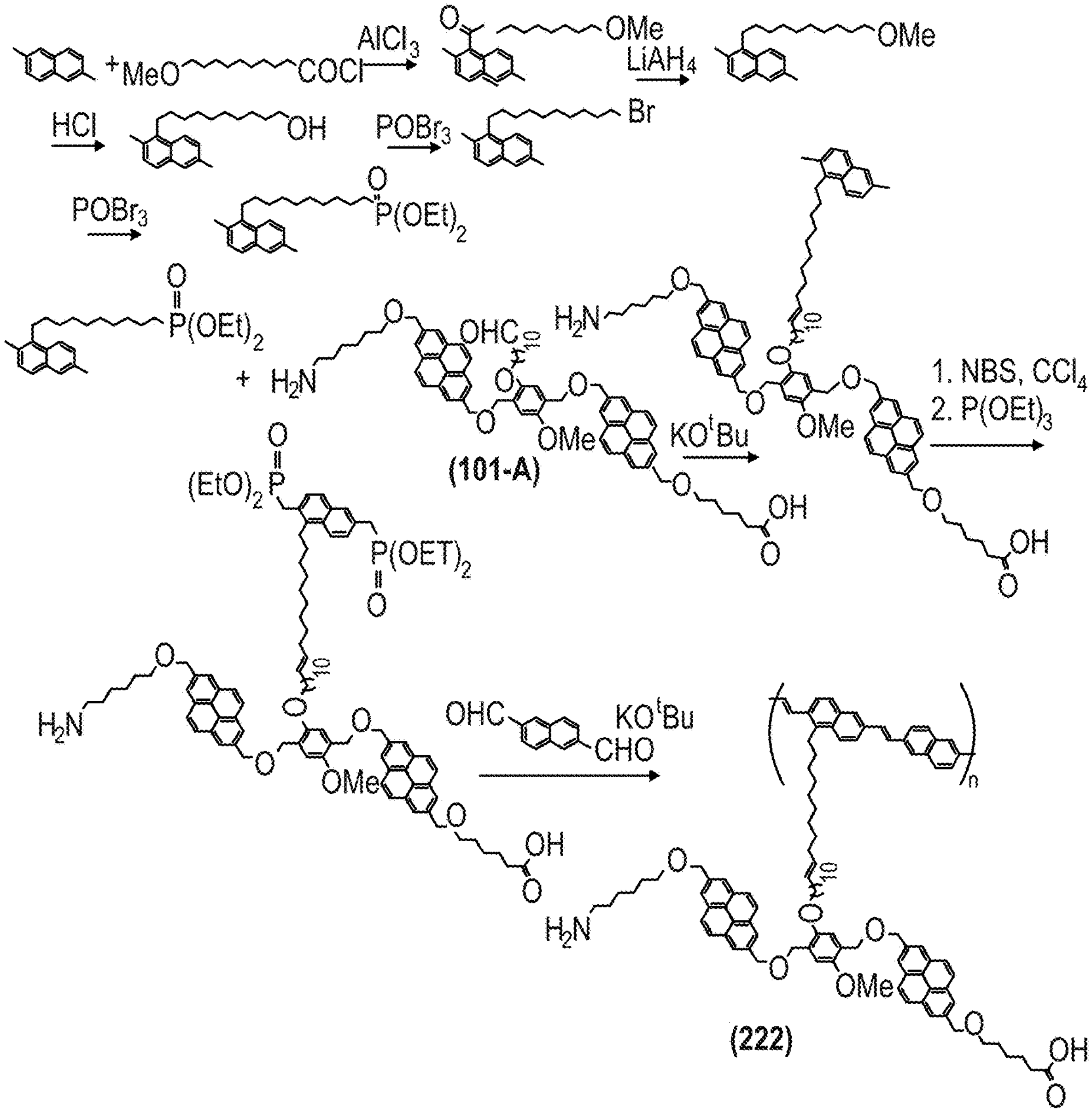

FIG. 41 to FIG. 43 describes the benefits of coupling nucleating agents to mechanical ligands, and shows examples of such mechanical ligand-nucleating agent structures FIGS. 44 to FIG. 46 describes the use of mechanical ligands and nanotubes in the preparation of ceramics e.g. cement and depicts the synthesis and structure of compounds (221) and (222).

Figure 47:
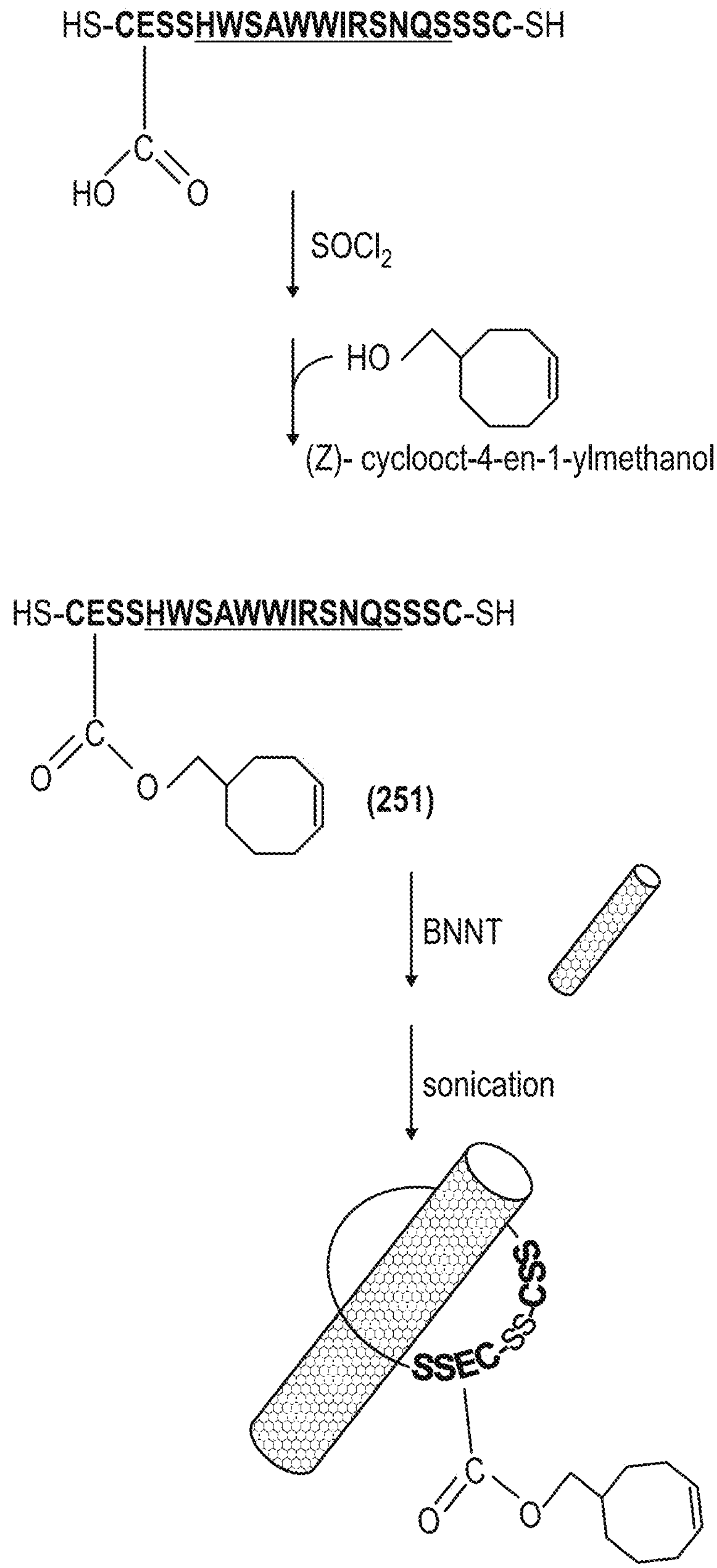
Figure 48:
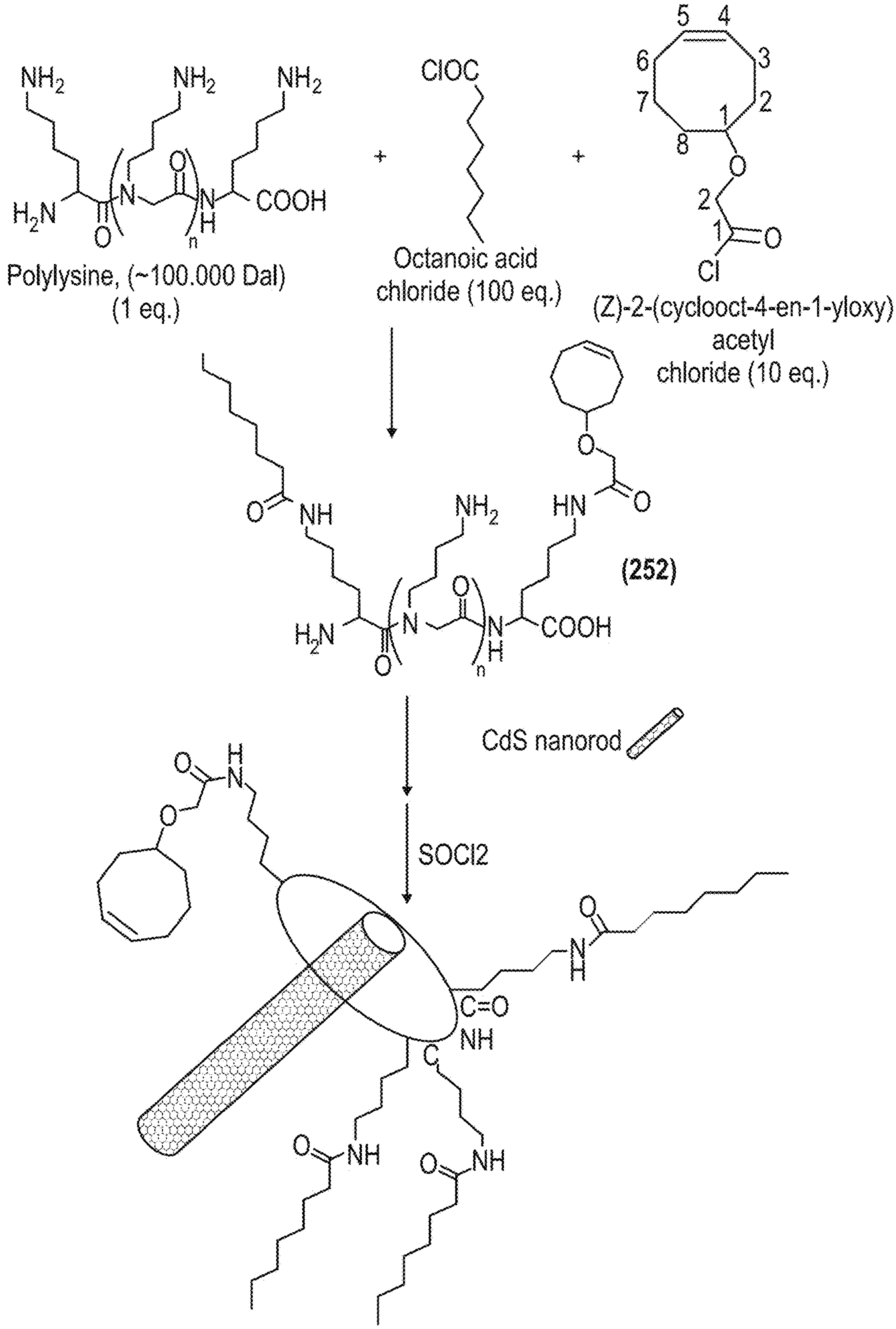

FIG. 47 and FIG. 48 describes the synthesis of compound (251), which is a precursor-ML, and its cyclization around a boron nitride nanotube to form a mechanical ligand around the boron nitride nanotube. Also described is compound (252), which is a precursor-ML, and its cyclization around a CdS nanorod, to form a ML wrapped around the CdS nanorod.

Figure 49:
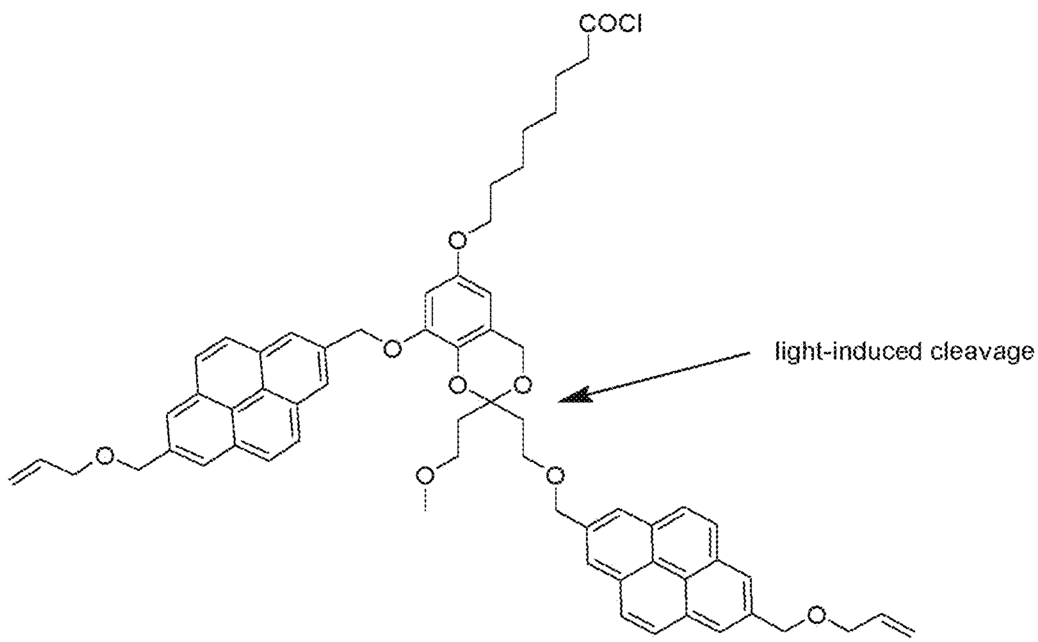
Figure 50A:
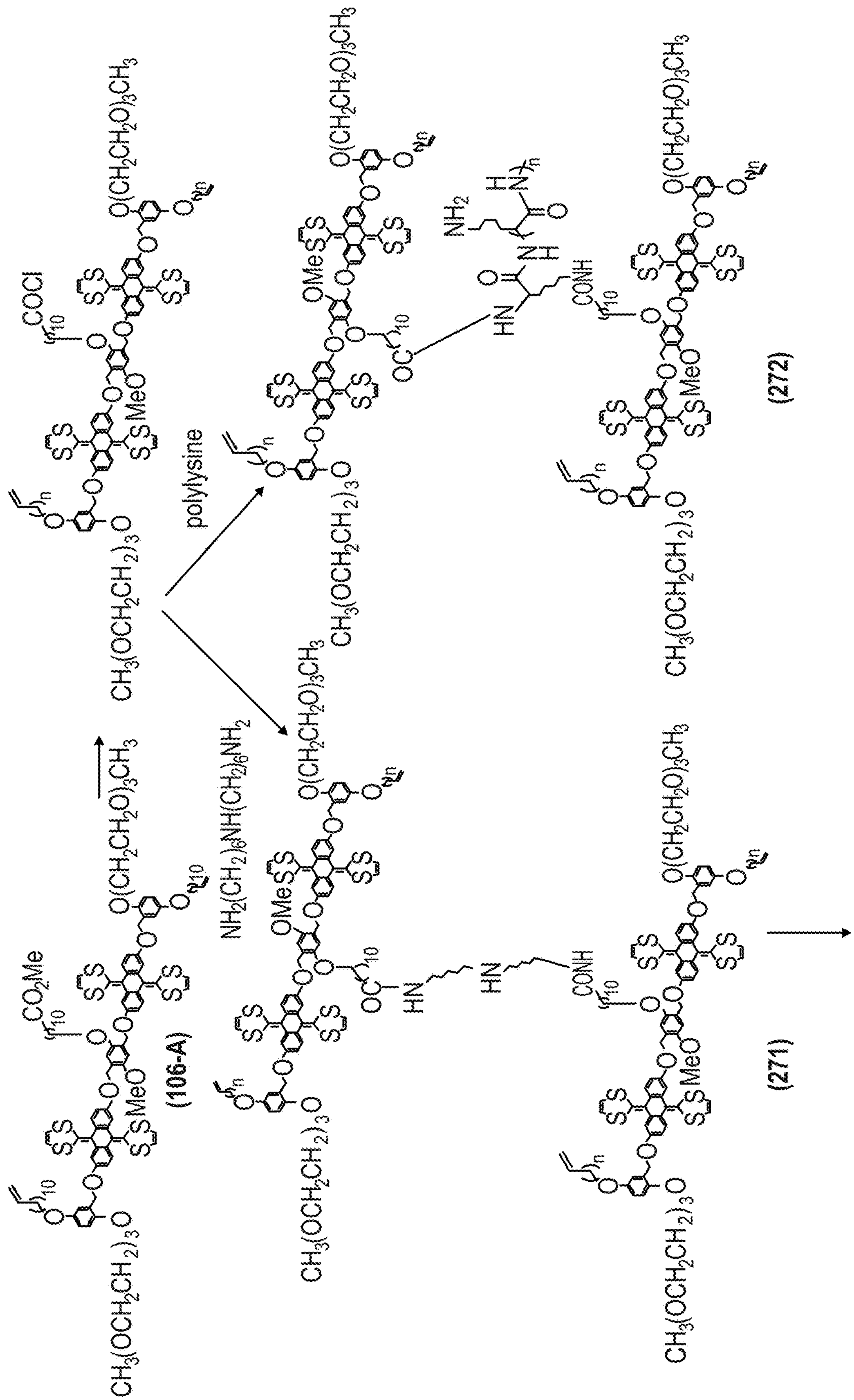
Figure 50B:
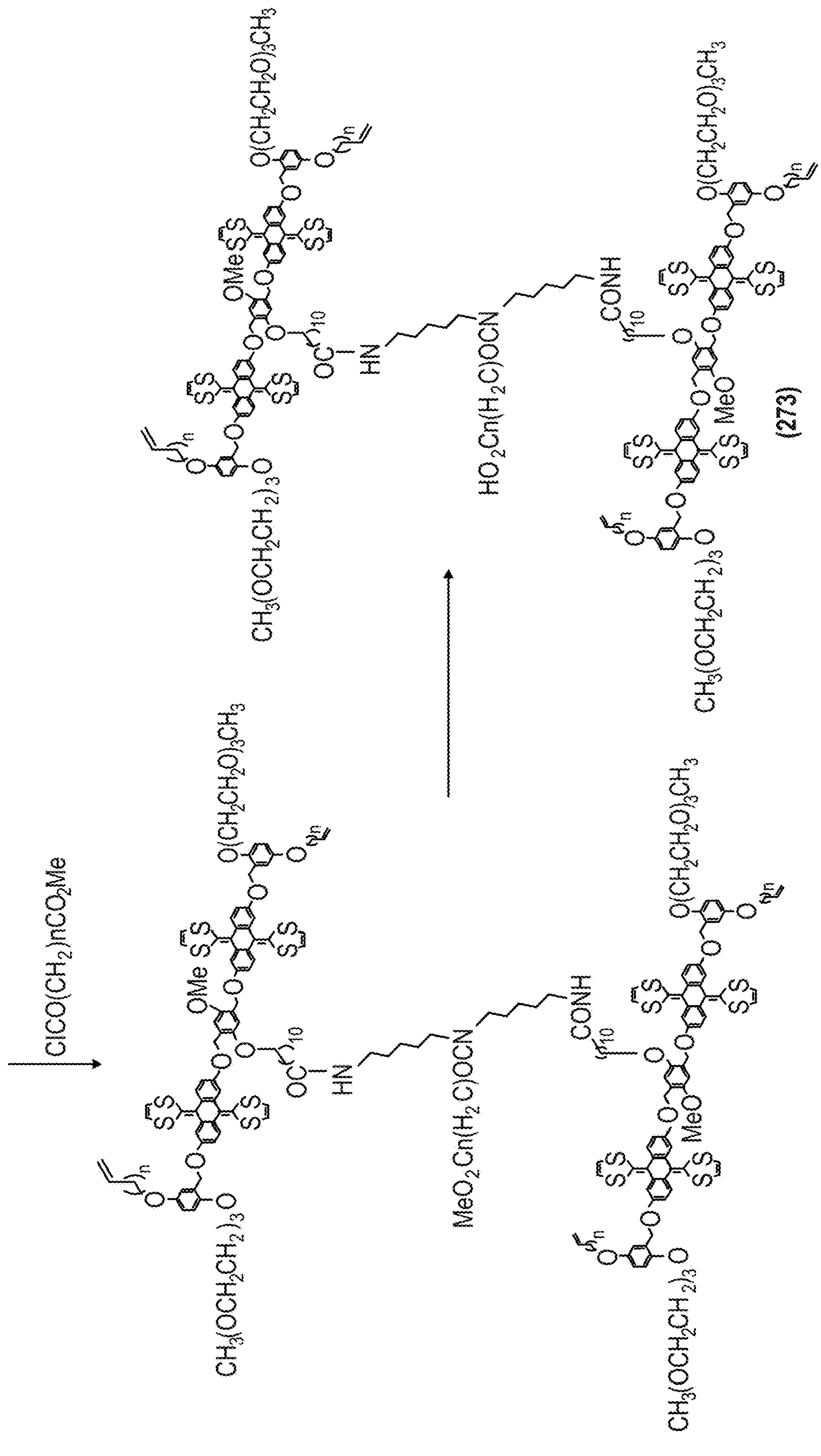
Figure 50D:
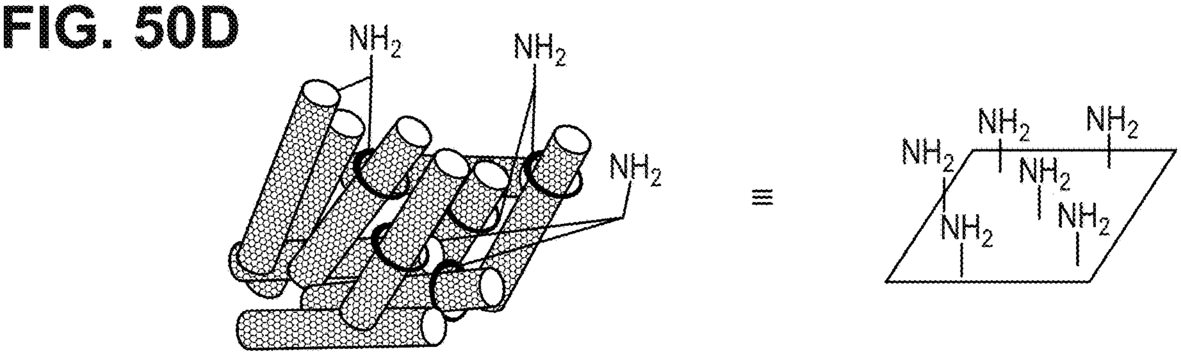
Figure 50E:
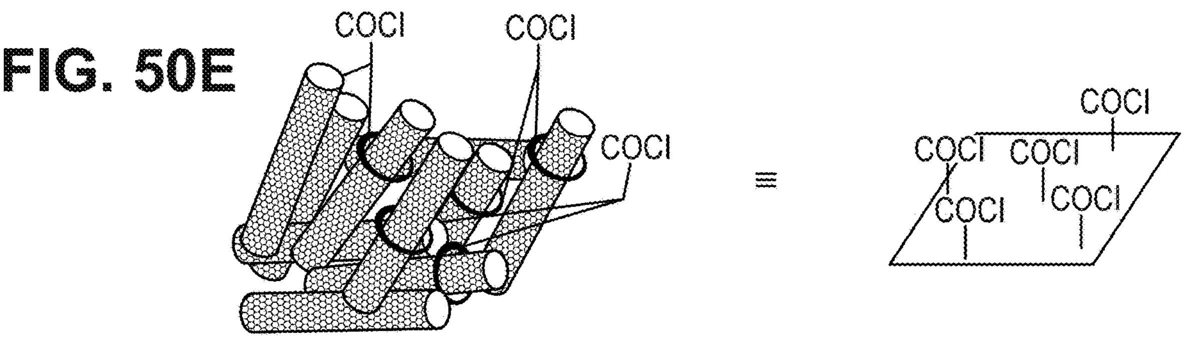
Figure 50F:
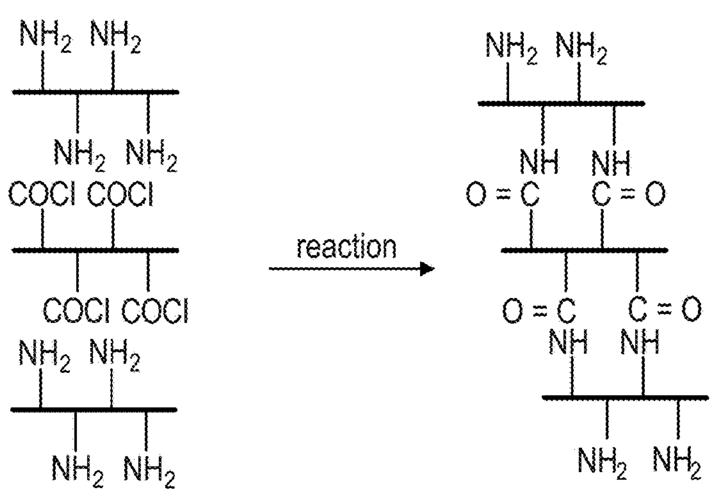

FIG. 49 shows the structure of compound (261) which is a light-cleavable precursor-ML.

FIG. 50A to FIG. 50F shows the synthesis of compounds (271, 272, 273), which are all precursor-MLs capable of forming two mechanical ligands with a nanotube, but which vary in the type of reactive group they are carrying for reaction with eg. SE2. It is also shown how these precursor-MLs can be used to efficiently glue together several layers of CNT veil.

FIG. 51A to FIG. 52B shows how compounds (271) and (273) can be used to make a macroscopic nanosensor.

Figure 52A:
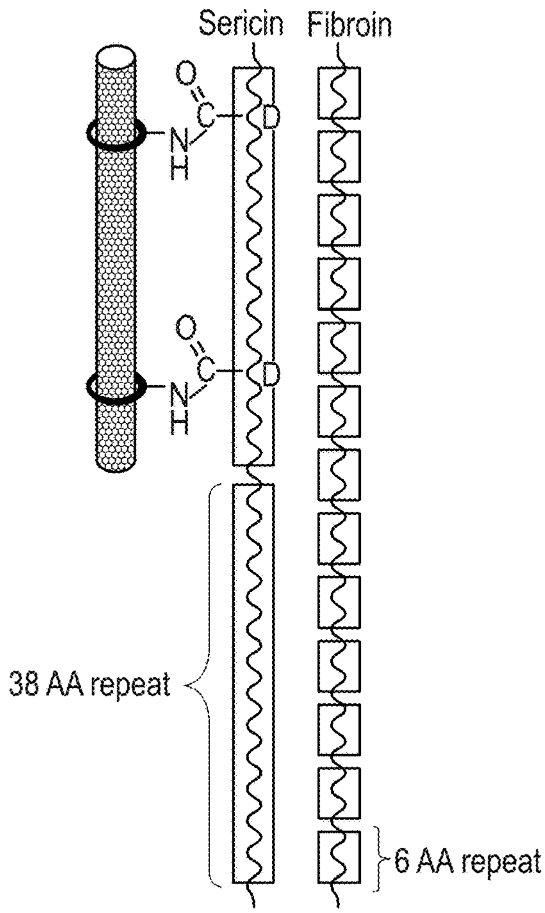
Figure 52B:
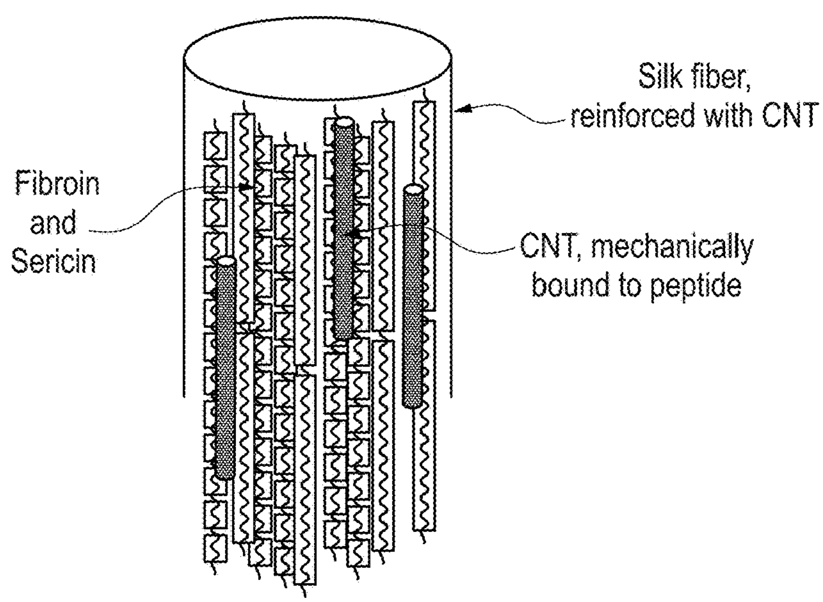
Figure 54:
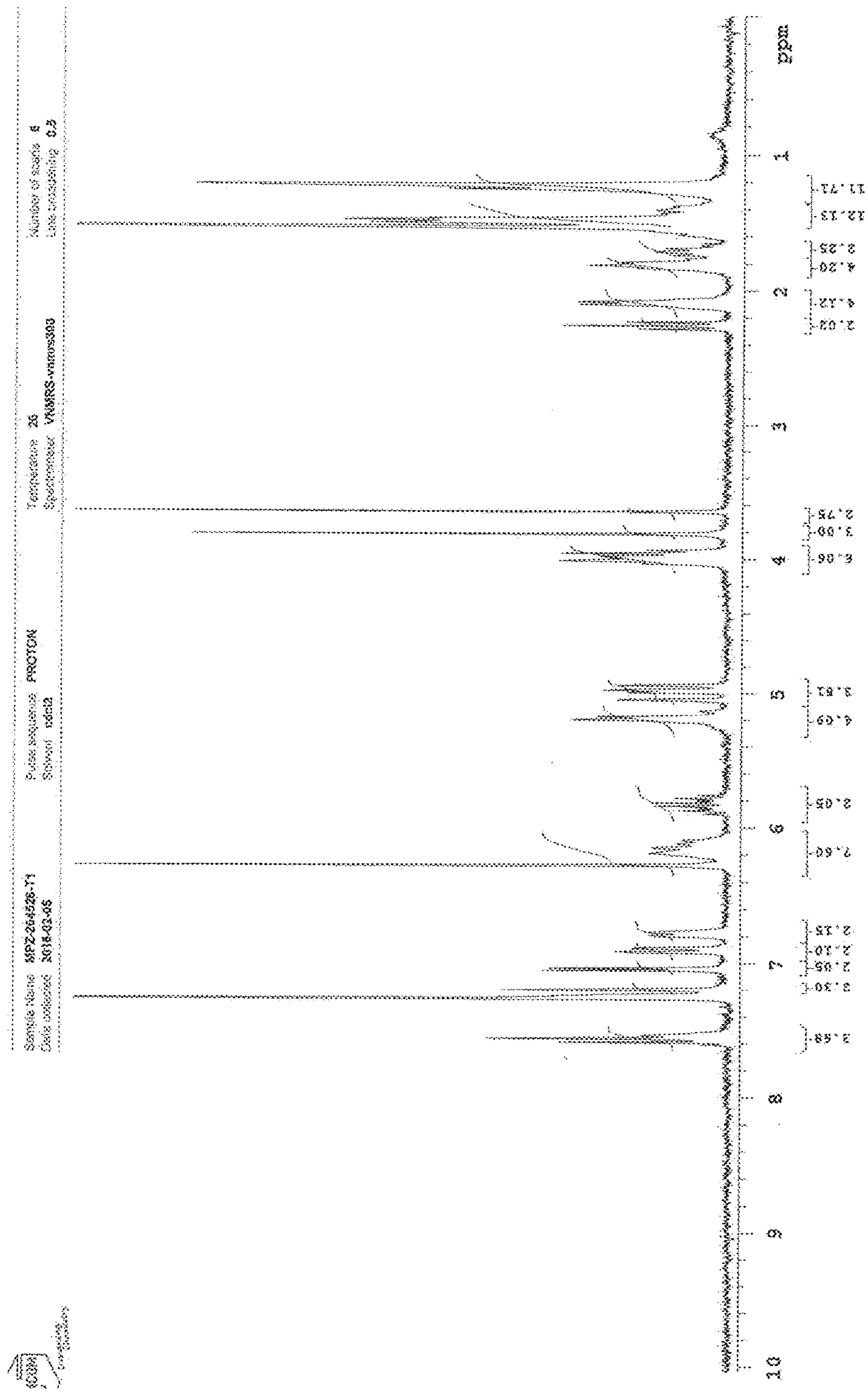
Figure 56:
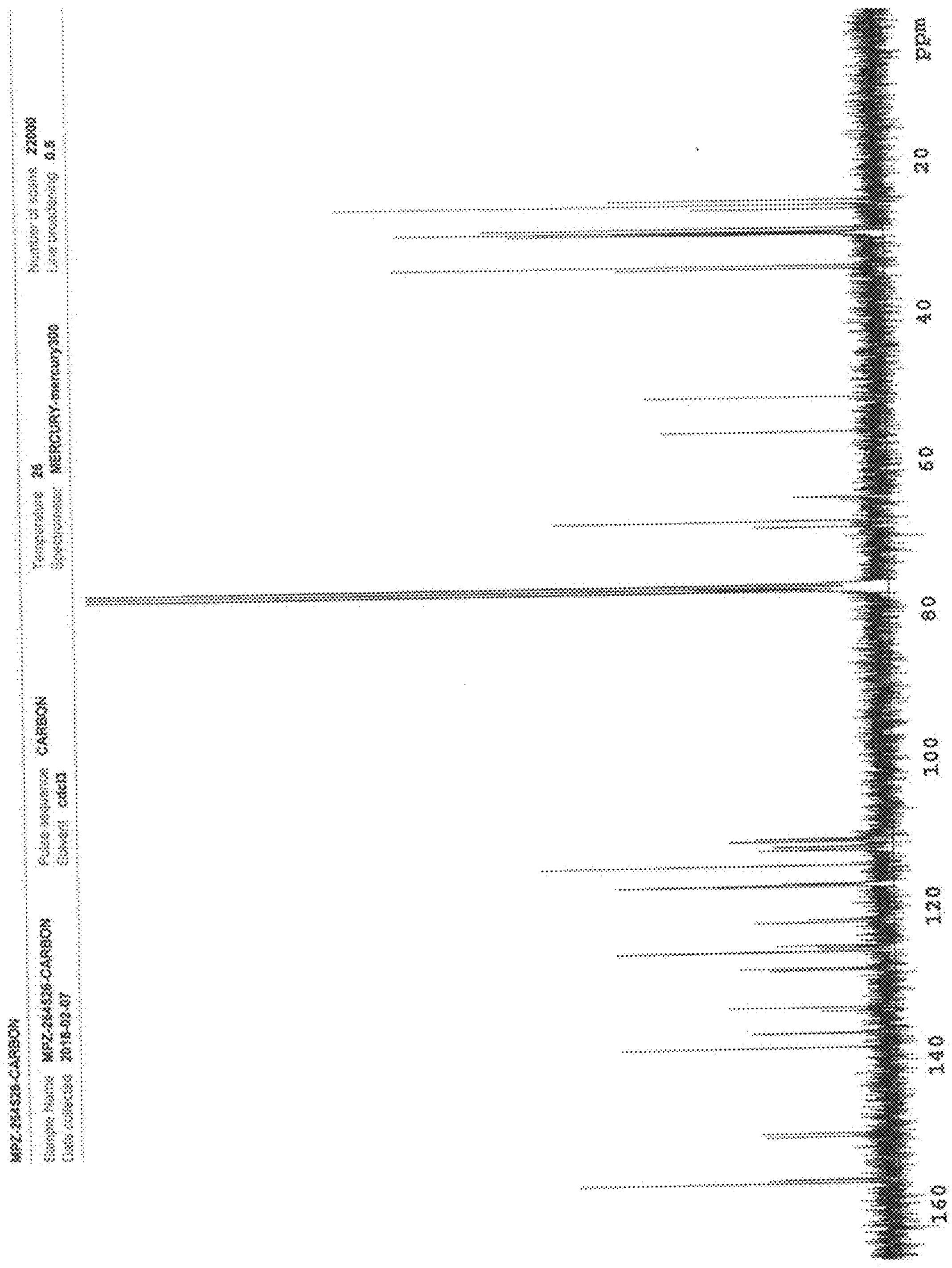
Figure 58:
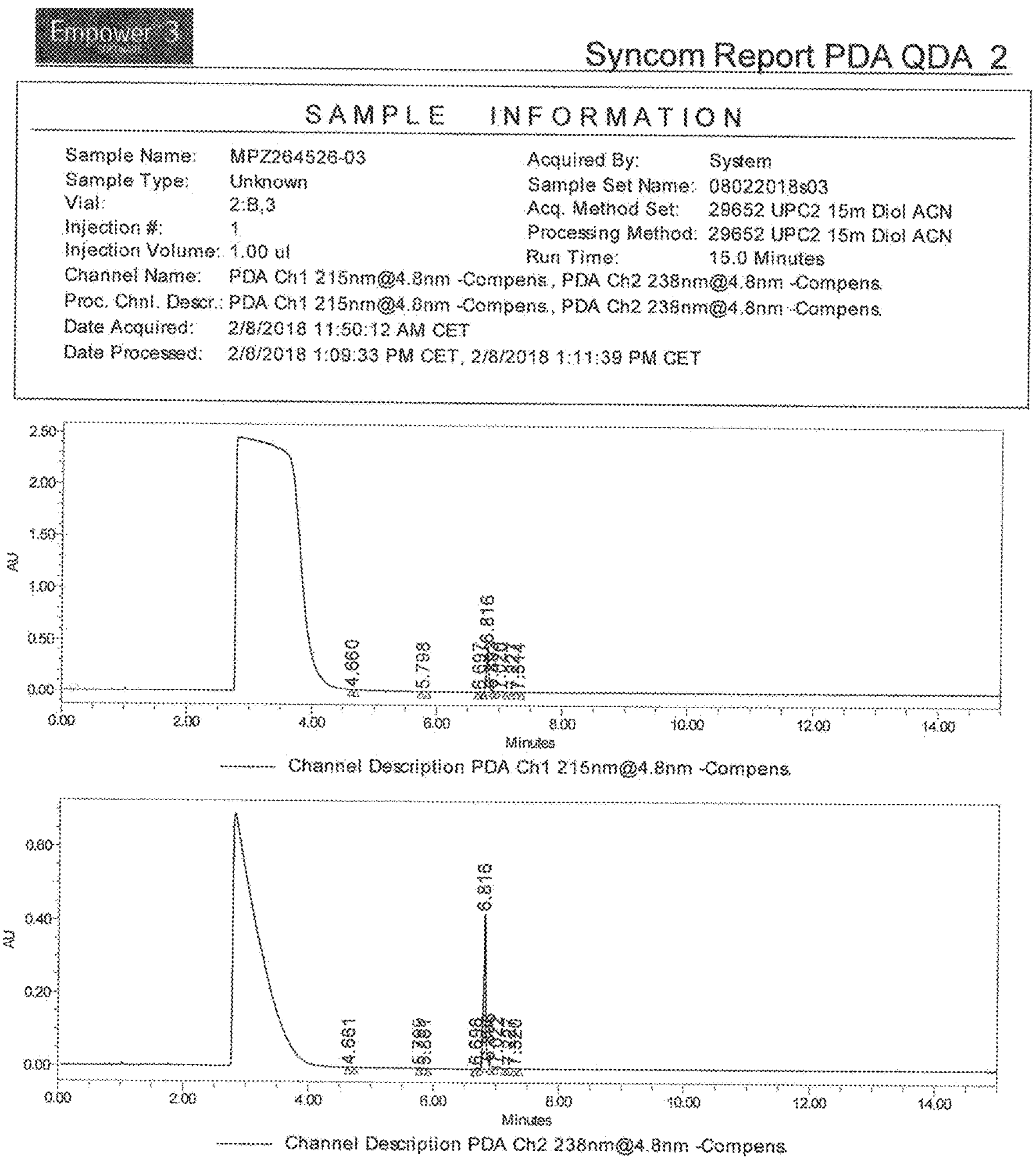
Figure 59:
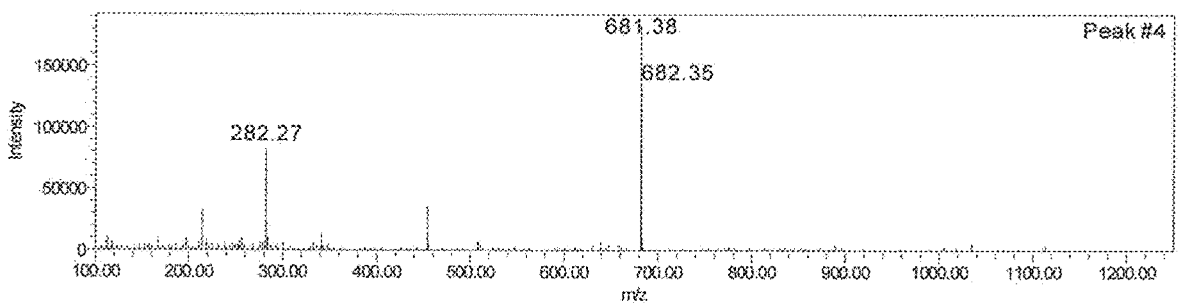
Figure 60:
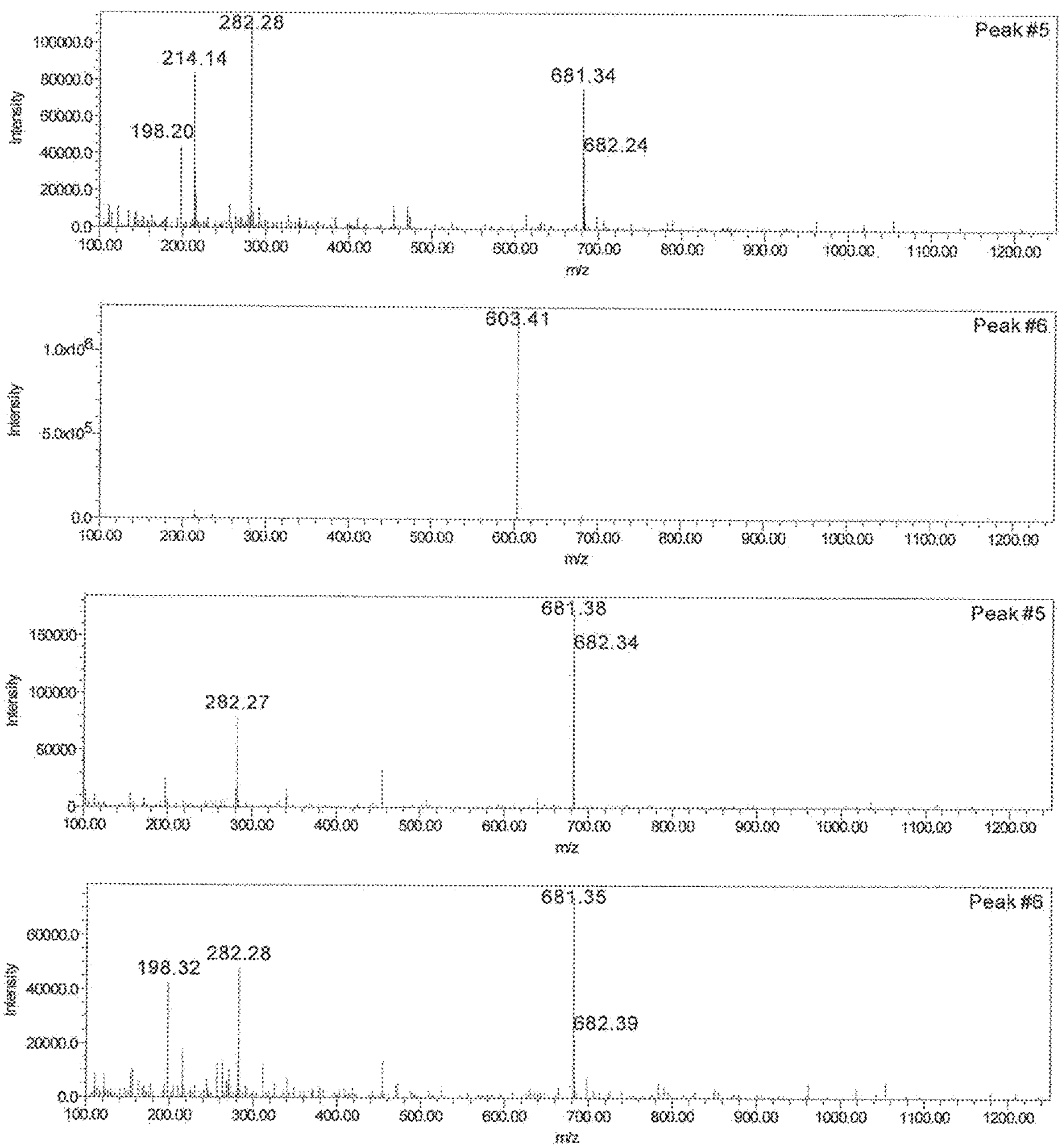
Figure 61:
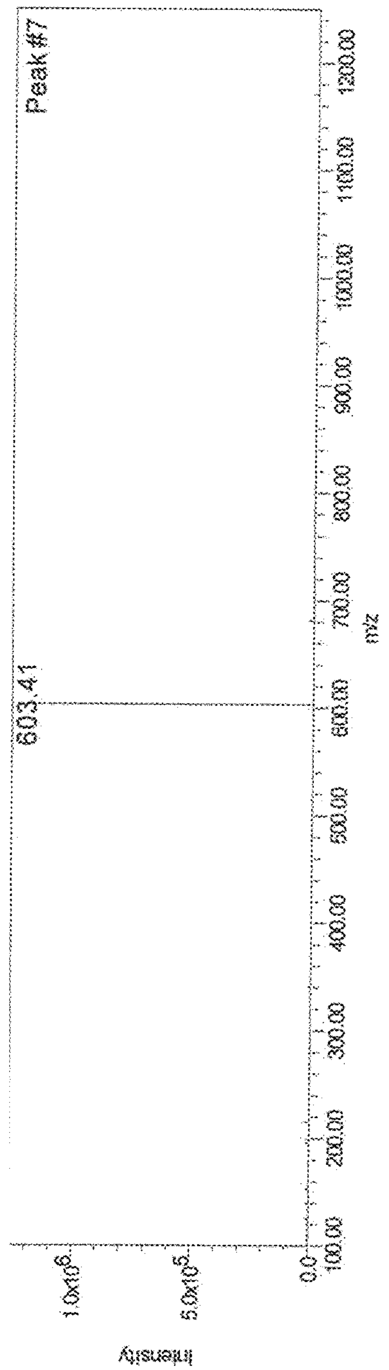

FIG. 52A to FIG. 52B shows how mechanical ligands can be used to produce carbon nanotube-reinforced silk.

FIG. 53 to FIG. 61 provides analytical data on the synthesis of compound (B), which is used as a precursor molecule in several of the synthetic schemes used in the present invention.

Figure 62:
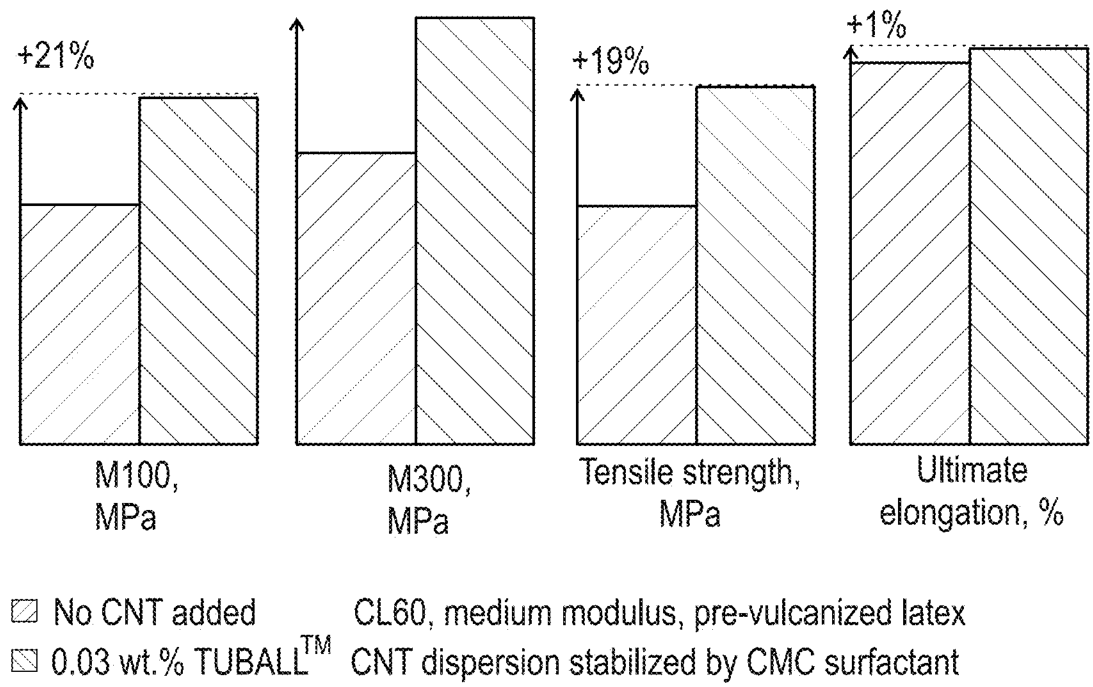

FIG. 62 shows how the physical properties of natural latex with 0.03 wt. % carbon nanotubes can be stabilized with carboxymethyl cellulose as surfactant.

Figure 63:
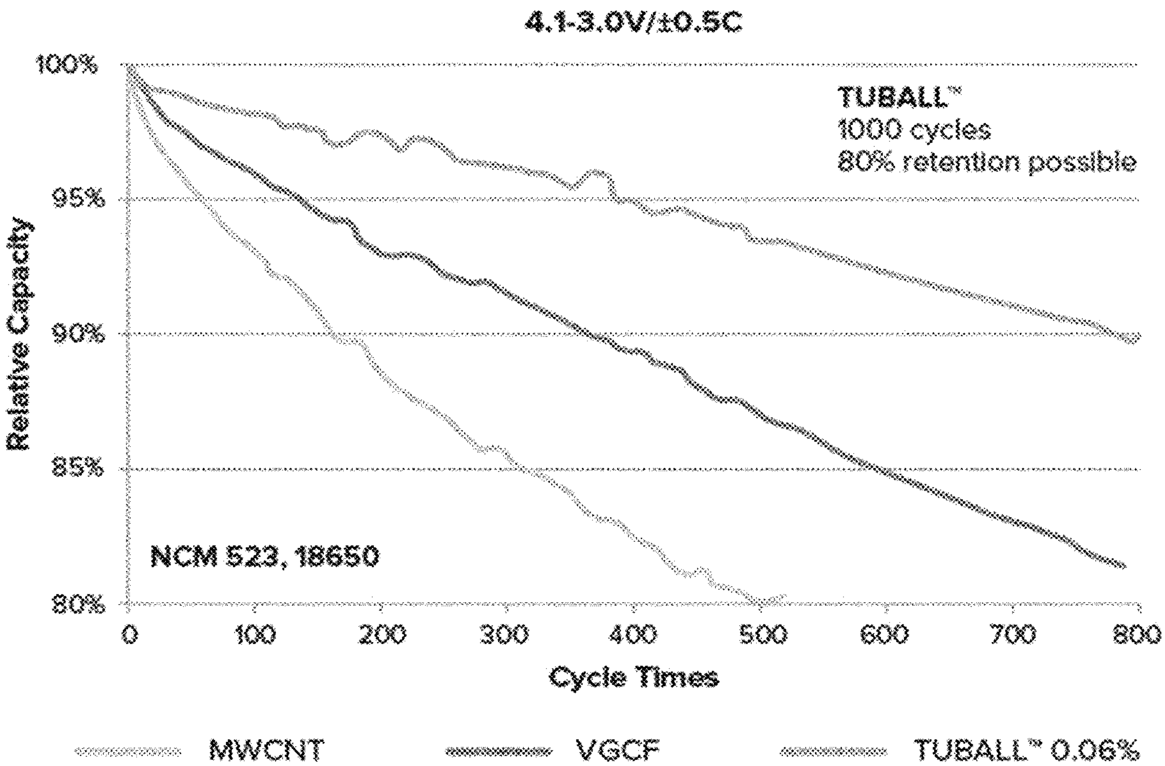

FIG. 63 shows the capacity of batteries comprising carbon nanotubes.

Figure 64:
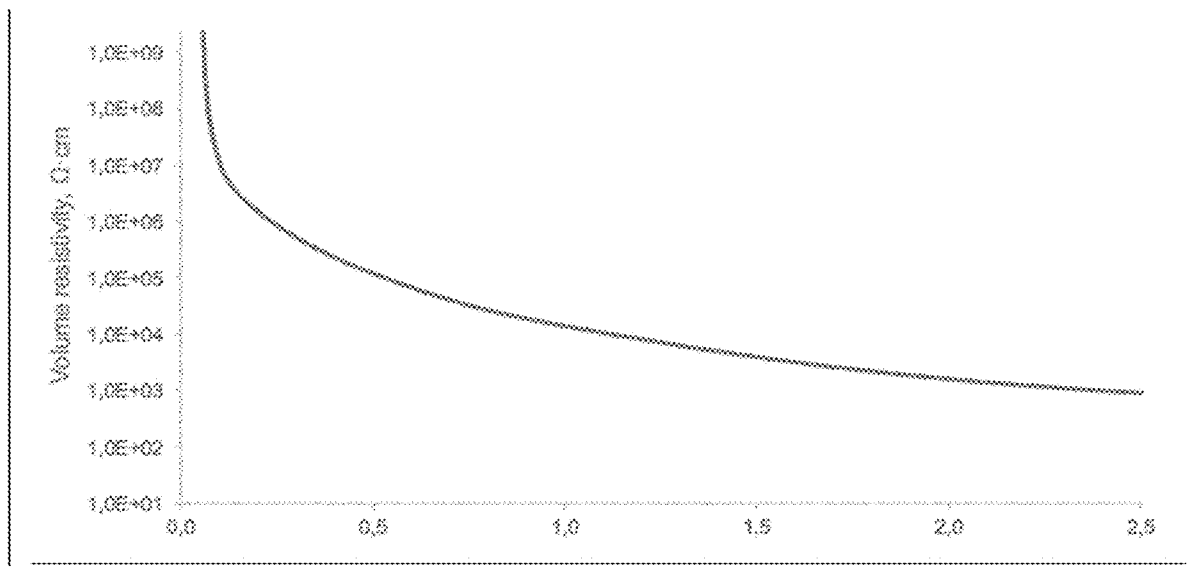

FIG. 64 shows a percolation curve with Matrix 203.

Figure 65:
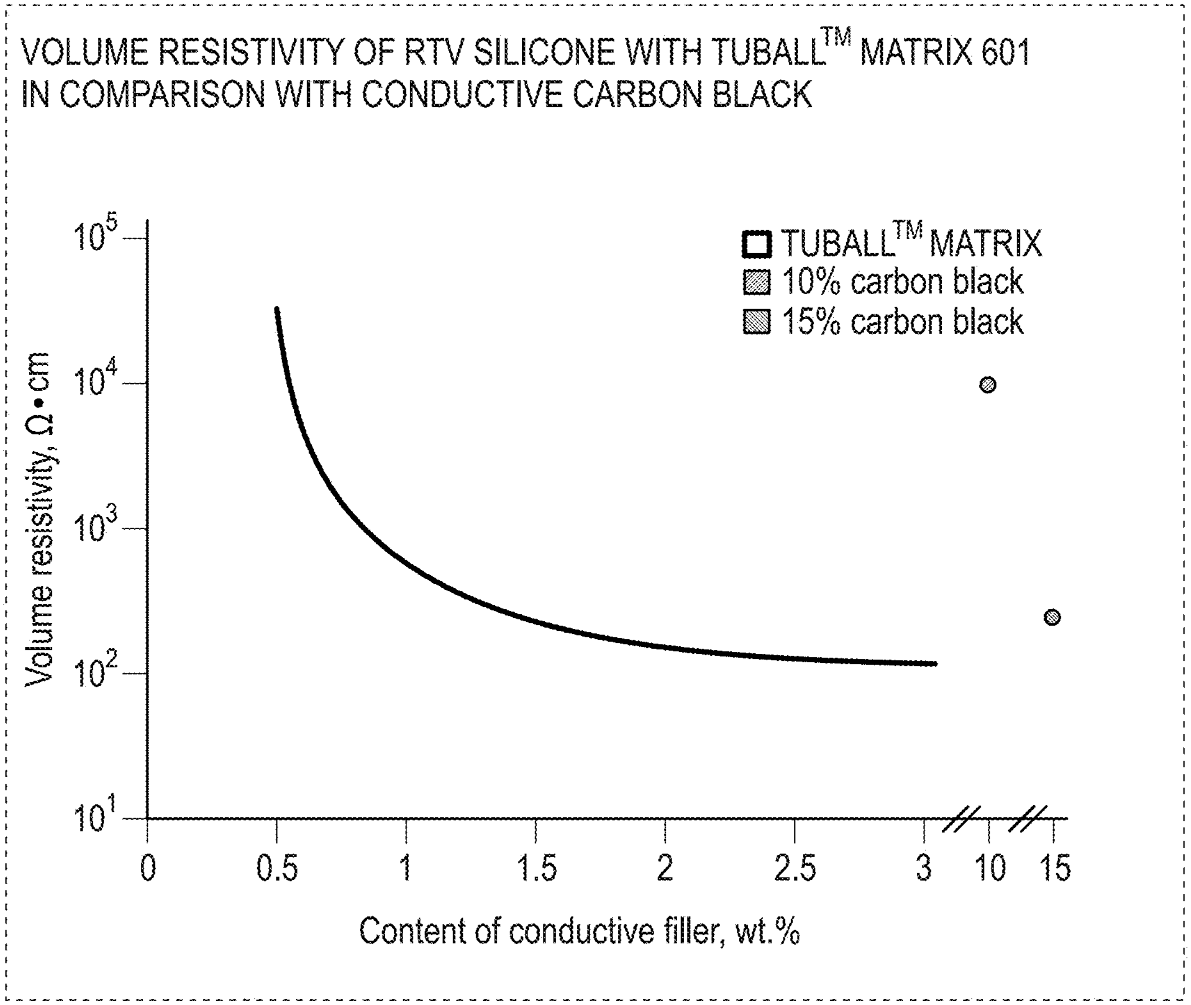

FIG. 65 shows the volume resistivity of RTV silicone with CNT and with conductive carbon black.

Figure 66:
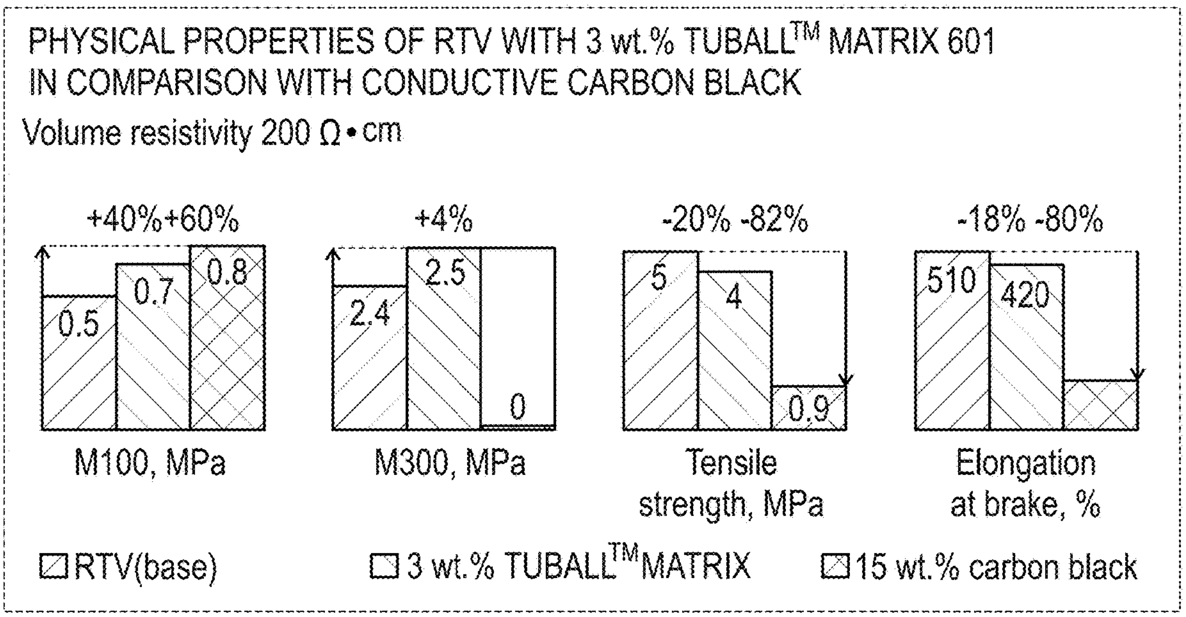

FIG. 66 shows the physical properties of RTV silicone with CNT and with conductive carbon black.

Figure 67:
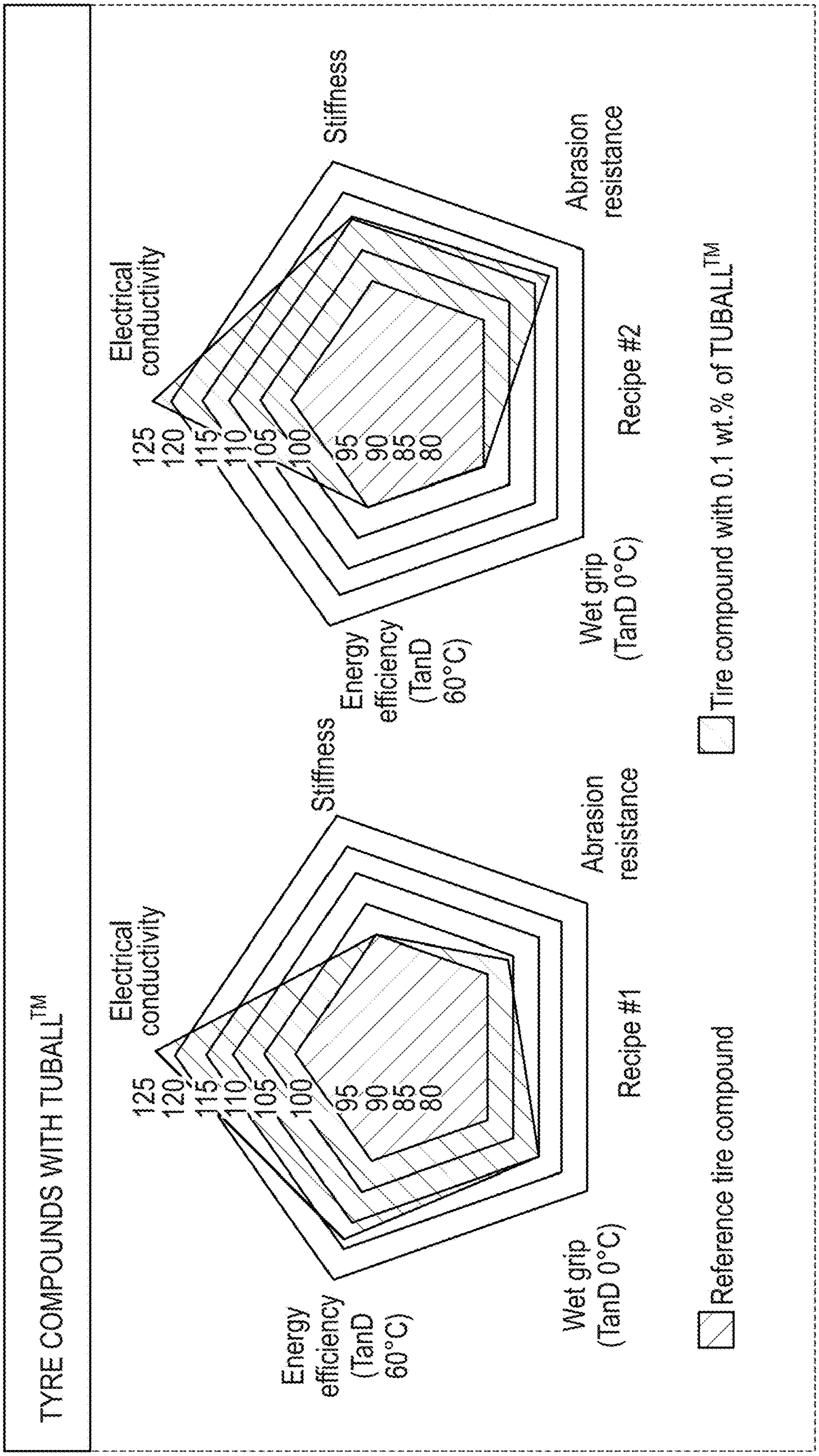

FIG. 67 shows the properties of tyre compounds with carbon nanotubes.

Figure 68A:
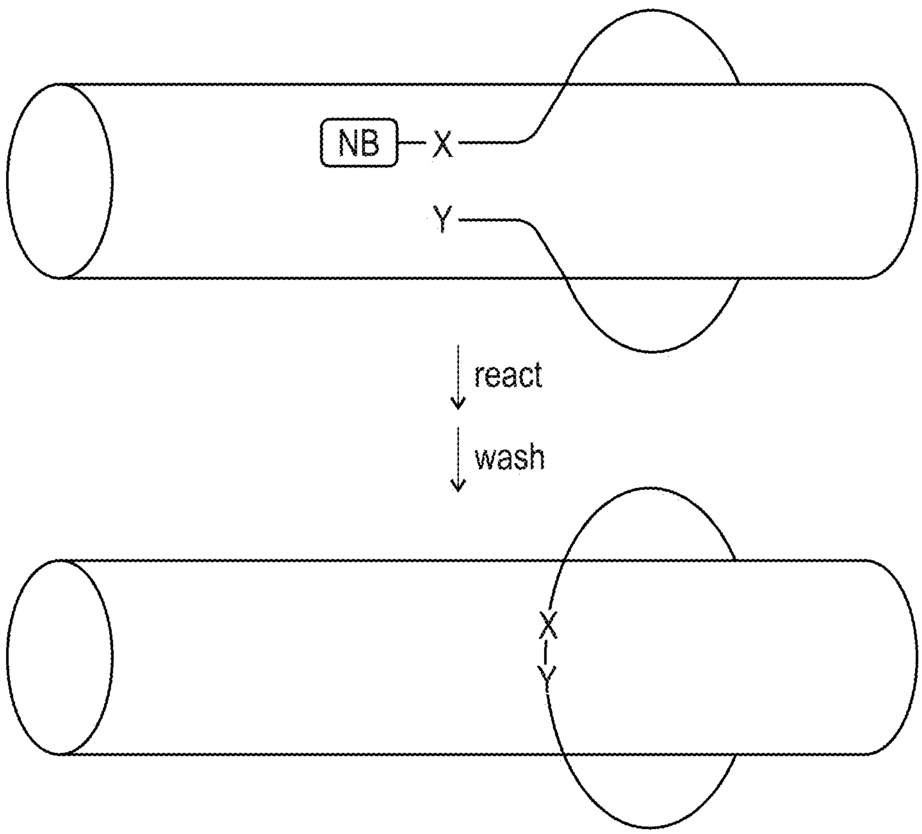
Figure 68B:
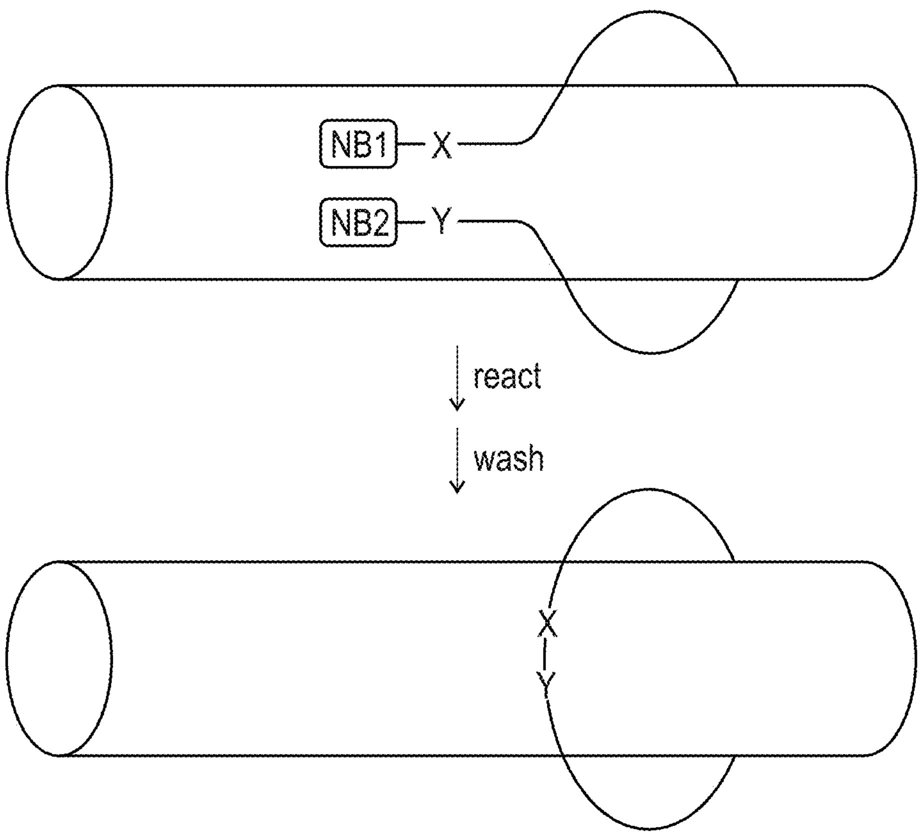
Figure 68C:
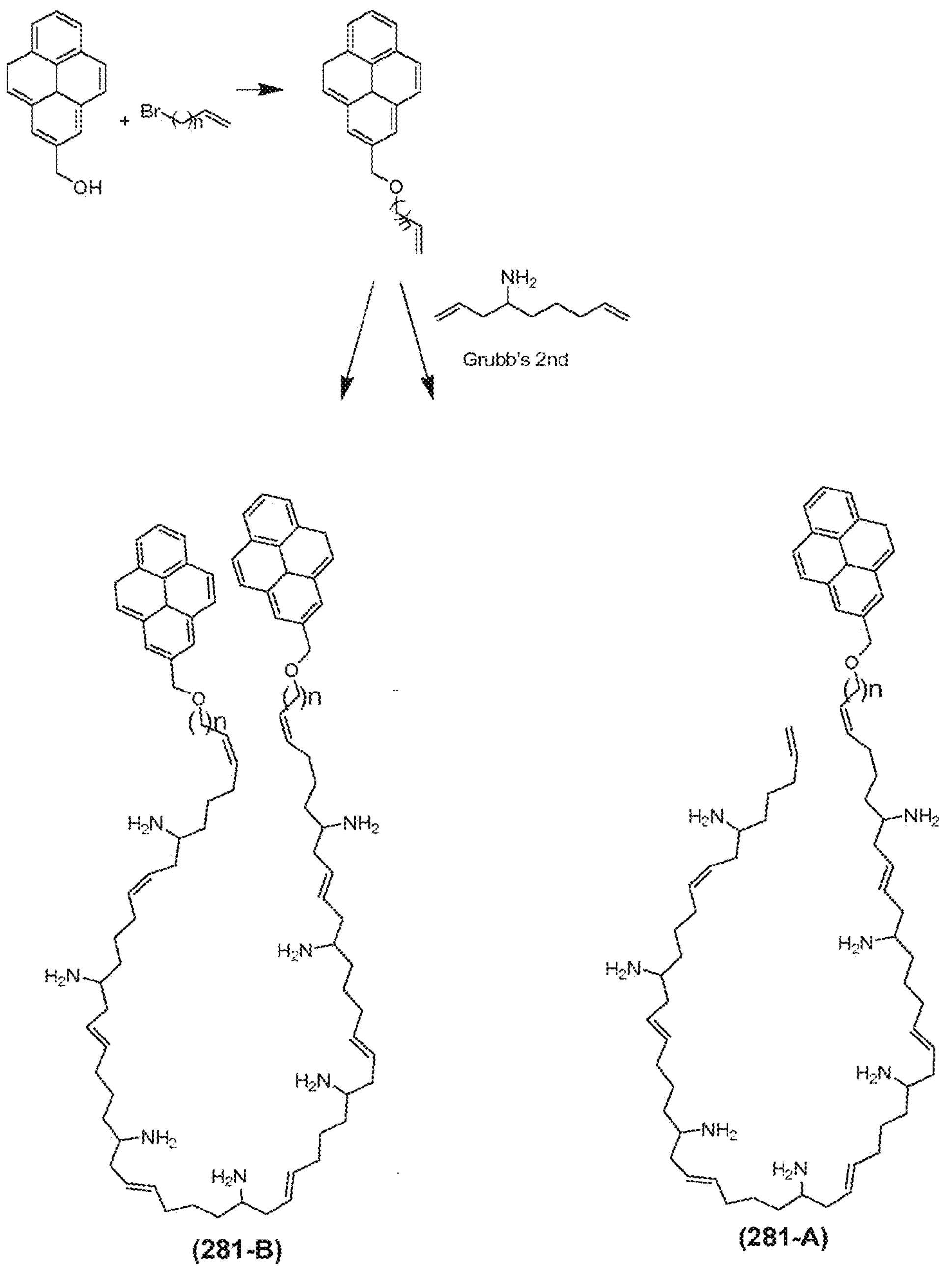
Figure 68D:
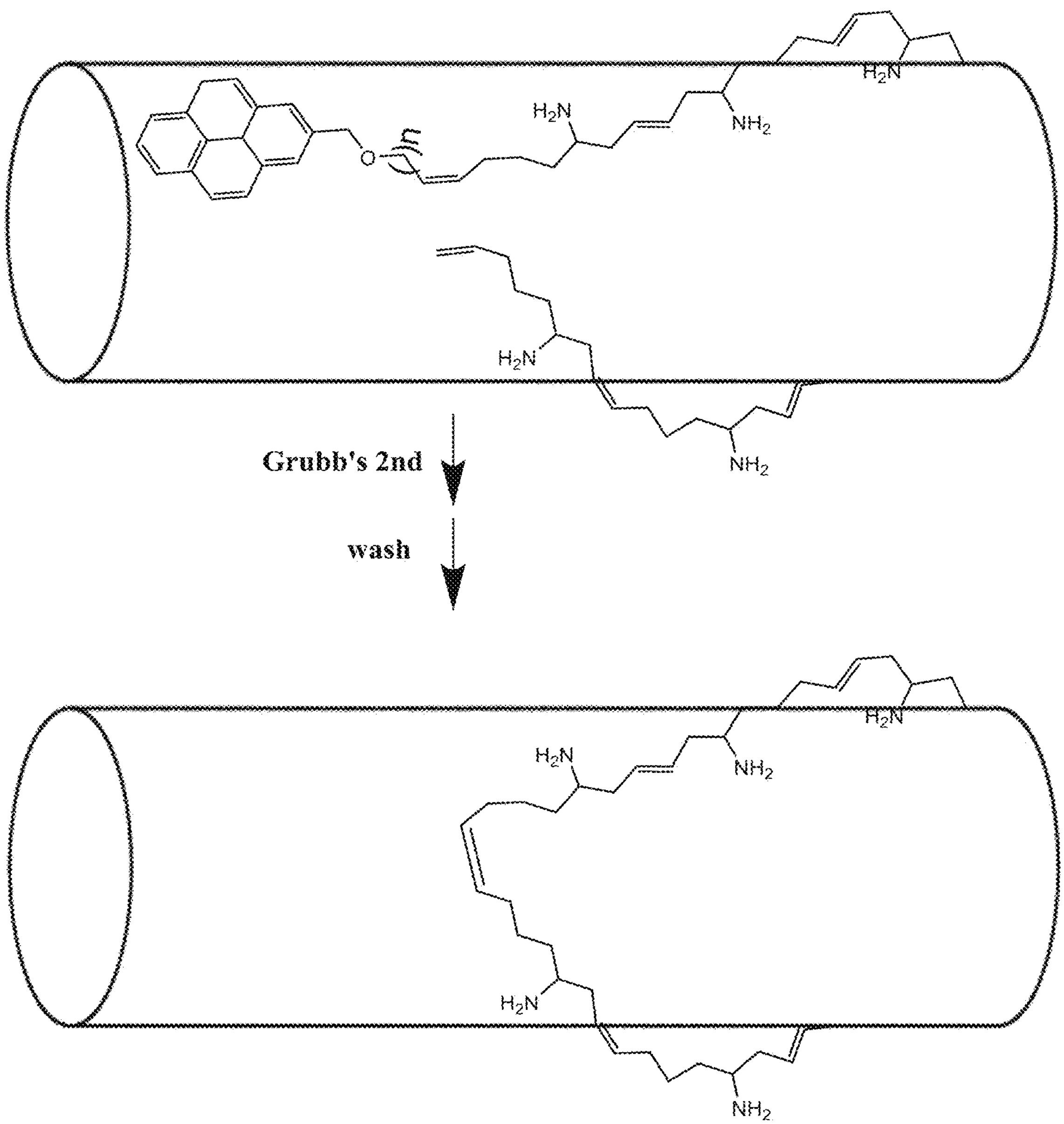
Figure 68E:
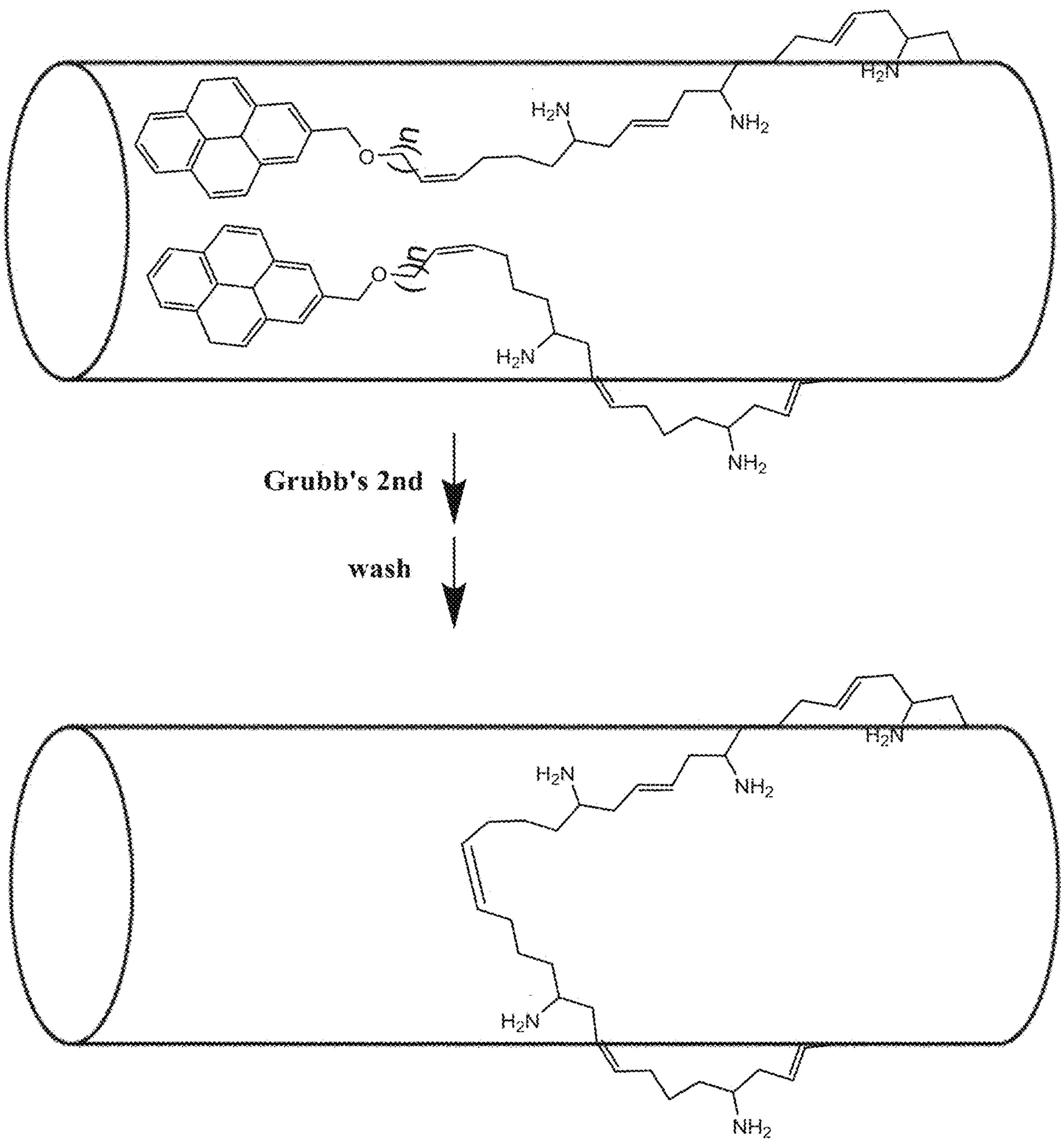
Figure 68F:
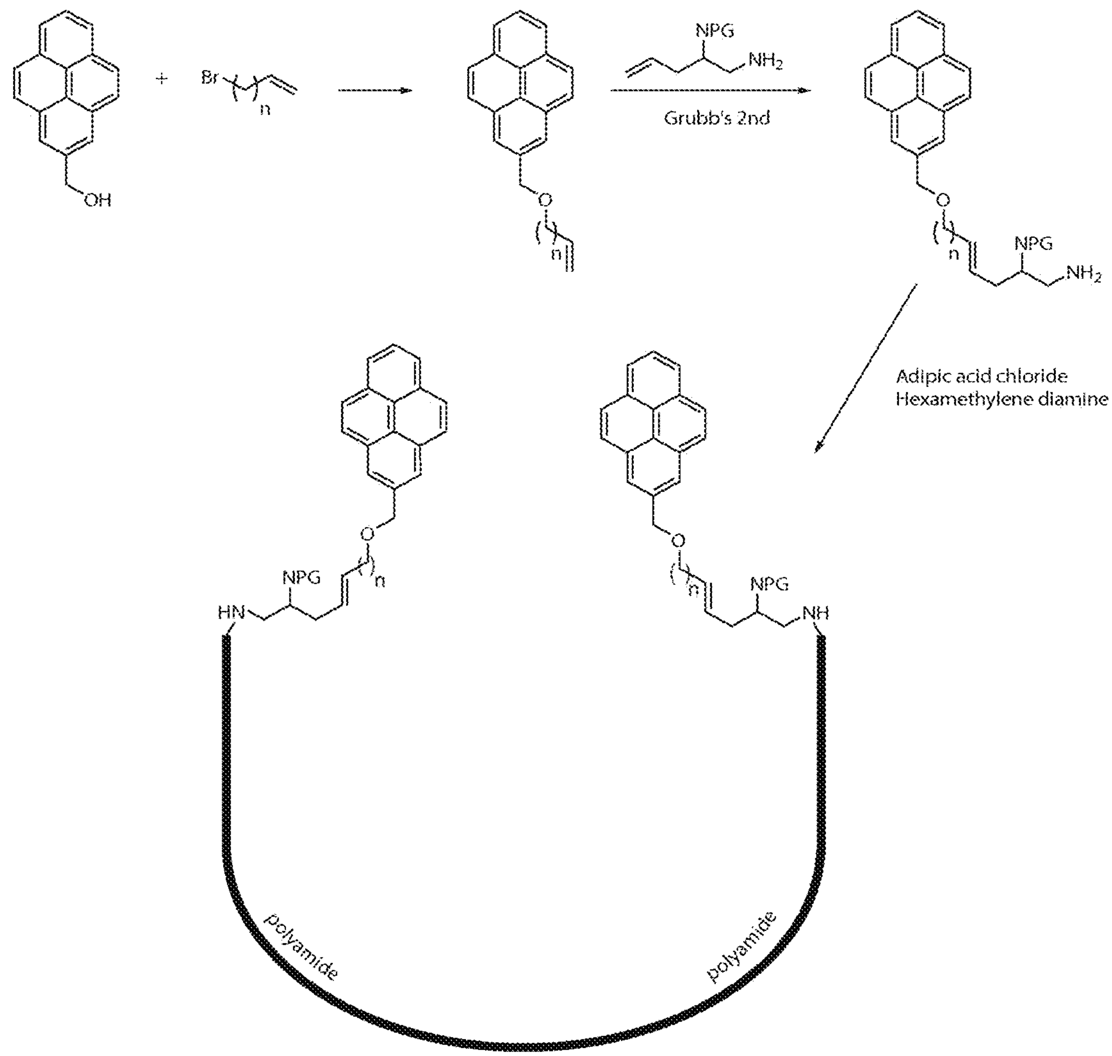
Figure 68G:
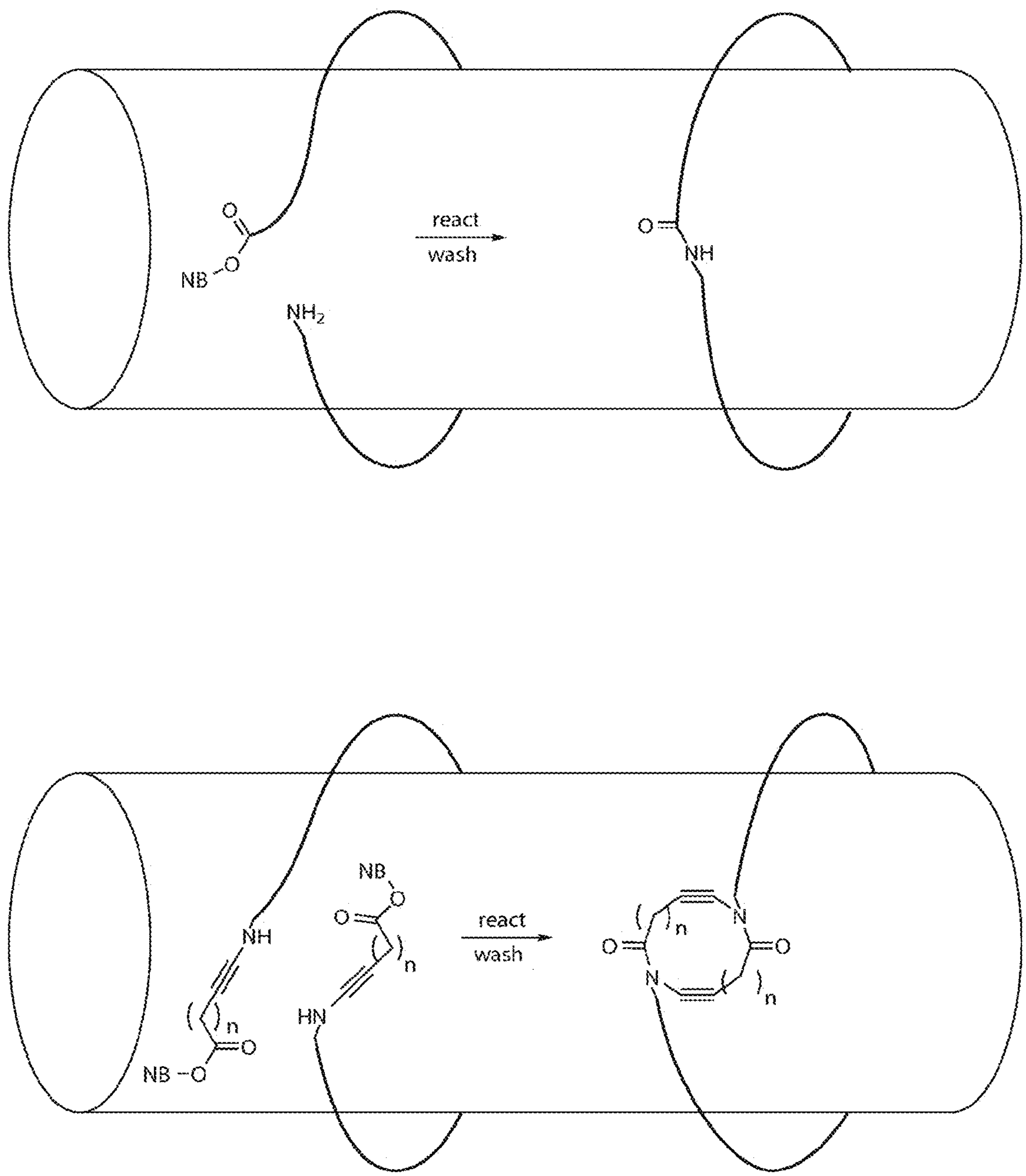

FIG. 68A and 68G shows how appropriate design of precursor-ML can lead to ML-nanotube complexes that do not comprise nanotube-binding domains.

DETAILED DESCRIPTION OF THE INVENTION

General Components and Processes.

What is provided is a Mechanical Ligand (ML) capable of forming a mechanical bond with a structural entity. The ligand optionally changes the characteristics of the structural entity upon binding to it.

A mechanical bond is a bond between a mechanical ligand (ML) and a structural entity (SE) where at least one intramolecular covalent bond in either the SE or one intramolecular covalent bond in the ML must be broken in order to bring the structural entity and the mechanical ligand apart.

However, for a complex of an SE and an ML where the SE and/or ML has an aspect ratio of more than 100 (one hundred), a Mechanical Bond shall mean a bond between said ML and said SE where at least one intramolecular covalent bond in the SE or in the ML must be broken in order to bring the SE and the ML apart in a direction other than the direction of the largest dimension of said SE and/or said ML that has an aspect ratio of more than 100. An intramolecular covalent bond shall mean a covalent bond between atoms within a given molecule (i.e. within the SE or within the ML, but not between the SE and ML).

The following is an example of such a mechanical bond between MLs and SEs that keep the SE and the ML interlocked as a consequence of their topology: The ML is e.g. a closed ring such as a peptide, wrapped around a nanotube that has an aspect ratio larger than 100. The ends of the peptide have been covalently linked so that the peptide forms a continuous string of covalently linked atoms around the nanotube. The nanotube is a cylindrical structure with an aspect ratio of more than 100, which means that its length (along the cylindrical axis) is more than 100 times larger than its diameter (the diameter of the cylindrical structure). Theoretically, the ML (the closed ring peptide) and the SE (the nanotube) could be brought apart by moving the ML up or down the length of the nanotube (i.e. in the direction of the largest dimension of the nanotube), without breaking an intramolecular covalent bond of the closed ring peptide (the ML) or of the nanotube (the SE). However, it is impossible to bring the closed ring peptide and the nanotube apart in a direction other than the direction of the largest dimension of the nanotube (which has an aspect ratio of more than 100) without breaking an intramolecular covalent bond in the closed ring peptide or the nanotube, and therefore the closed ring peptide and the nanotube forms a mechanical bond between them.

MLs of the present invention may be used to increase the solubility or dispersion of structural entities, and are particularly useful when the structural entity has low solubility or dispersion in a given solvent or composite material. Addition of the ML, and the formation of a mechanical bond between the ligand and the structural entity may then increase solubility, particularly if the ML carries chemical moieties that increase solubility or dispersion of the SE to which it is bound, in the solvent or matrix that surrounds it.

MLs of the present invention may also be used to preferentially disperse subgroups of structural entities. As an example, if a mechanical ligand is more likely to become attached to a nanotube of a certain chirality, relative to another nanotube of a different chirality, it will preferentially disperse this nanotube, provided that the ML carries chemical moieties that increase the solubility or dispersion of the nanotube that it binds.

ML-promoted solubilization or dispersion thus provides a means to obtain a better dispersion of e.g additives in composite materials. Thus, addition of a ML that binds the structural entity, to the additive stock solution, or to the polymerization reaction that generates the composite material, or at any other step of composite material production, can improve solubilization or dispersion of the additive during the process and/or in the final composite material.

CNTs may be difficult to disperse in solvents used in composite material production processes. Addition of CNT-binding MLs during production of e.g. CNT-reinforced polymers may often improve dispersion and/or solubilization, leading to a better distribution of the CNT in the final composite.

What is further provided is the preparation, structure and use of a complex comprising a structural entity (SE) and a ML, where the characteristics of the structural entity when bound by the ML is different from the characteristics of the structural entity when not bound by the ML, or alternatively, the characteristics of said complex is different from the characteristics of the structural entity (SE) and the ML.

The ML-structural entity complex may comprise one or more ligands and one or more structural entities, and thus can be described by the formula $$SE_o\text{-}ML_p$$

where SE is a structural entity, and

ML is a chemical moiety capable of mechanically binding to the SE, and and p are integers larger than zero.

Characteristics of the structural entity that may be perturbed, modified, increased or decreased, include any one or more of the following characteristics: Size of SE, Conductivity of SE, Density of SE, Specific density of SE, Strength of SE (e.g. Young's Modulus, tensile strength, other types of strength), Melting point of SE, Elongation at break of SE. For any of these characteristics of an SE, and in each characteristic's entire range, further characteristics of the SE that may be modified upon mechanical binding of the ML include any one or more of the following: stiffness, electrical conductivity, thermal conductivity, color, fluorescence, luminescence, UV protective capability, abrasion resistance, ductility, elasticity, flexibility, energy storage capability (including energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g.

Depending on the application, an SE with a low, medium, or high degree of each of these characteristics is preferable in the present invention.

In a preferred embodiment, the characteristic of the SE that is modified by the binding of the ML is the strength (e.g. tensile strength, Young's modulus, elongation at break). Particularly preferred embodiments involve SE-ligand complexes where the strength of the SE is increased upon attachment to the ML. The term "reinforced structural entity" will be used in the present invention to describe a complex of a structural entity and a ML in which the strength of the SE is increased compared to the strength of the SE when not bound by the ML.

In a preferred embodiment the reinforced structural entity is a component of a composite material unit (CMU) where said CMU may further be a component of a composite material. The reinforced structural entity, as well as the structural entity itself, in this case may be termed a filler or additive.

In another preferred embodiment the characteristic of the SE that is modified by the binding of the ML is the conductivity. Particularly preferred embodiments involve SE-ML complexes where the conductivity of the SE is increased upon binding of the ML. Such ML-structural entity complexes where the conductivity of the structural entity has been perturbed by the binding of a ML may be useful as sensor molecules in various electronic circuits. In some cases, it is preferred that the conductivity of the SE is decreased upon binding of the ML. This is commonly the case when the SE-ML complex is part of a sensor molecule or sensor apparatus.

In a preferred embodiment, the ML-SE complex consists of a structural entity (SE) to which is attached a number of MLs. The characteristics of the SE-ML complex changes as more MLs are bound. In some applications, a high number of MLs is desired. This may for example be the case where the SE-ML complex is used in a nanosensor context, where the ML is further attached to e.g. a receptor molecule that binds to the analyte in question, leading to a change in conductivity of the SE, which can be followed as a change in read-out of the sensor. The more MLs that are bound to the SE, the more receptor molecules can be immobilized on the SE-ML complex, and the more the read-out will change as the analyte or more analytes bind to the nanosensor.

Thus, depending on the context, the number of MLs bound per structural entity is preferably greater than 1, such as greater than 2, such as greater than 5, such as greater than 10, such as greater than 20, such as greater than 50, such as greater than 100, such as greater than 200, such as greater than 500, such as greater than 1000, such as greater than $10^4$, such as greater than $10^5$, such as greater than $10^6$, such as greater than $10^7$, such as greater than $10^8$, such as greater than $10^9$.

In other cases, a smaller number of MLs bound to the SE is preferred. As an example, if the SE-ML complex is part of a composition of CMUs, such as part of a composite material, the ML may interfere with the polymerization- or processing process that generates the composite material, wherefore it may be preferable to use a smaller number of MLs bound to an SE. Thus, depending on the context, the number of MLs attached to a structural entity is preferably less than $10^9$, such as less than $10^8$, such as less than $10^7$, such as less than $10^6$, such as less than $10^5$, such as less than $10^4$, such as less than $10^3$, such as less than $10^2$, such as less than 10, such as less than 2.

Thus, the preferred number of MLs per structural entity is often a compromise and depends on the context, and may be in the range of 1 to 2, or 2 to 10, or 10 to 100, or 100 to 1000, or $10^3$ to $10^4$, or $10^4$ to $10^5$, or $10^5$ to $10^6$, or $10^6$ to $10^7$, or $10^7$ to $10^8$, or $10^8$ to $10^9$.

As described above and below, the optimal number of MLs bound to a structural entity varies depending on the context of its use and the process of its generation.

In a preferred embodiment of said preferred embodiment, the SE is a nanotube, eg. a carbon nanotube, or a graphene molecule, bound by more than 1 ML, more preferably by more than 10 MLs, more preferably by more than 100 MLs, more preferably by more than 1000 MLs, more preferably by more than 10 000 MLs, more preferably by more than 100 000 MLs, even more preferably by more than 1 000 000 MLs. In a preferred embodiment of said preferred embodiment, the SE is a carbon nanotube, other nanotube or graphene molecule, bound by less than $10^9$ MLs, such as less than $10^8$ MLs, less than $10^7$ MLs, less than $10^6$ MLs, less than $10^5$ MLs, less than $10^4$ MLs, less than $10^3$ MLs, less than $10^2$ MLs, less than 10 MLs, less than 2 MLs.

Figure 1A:
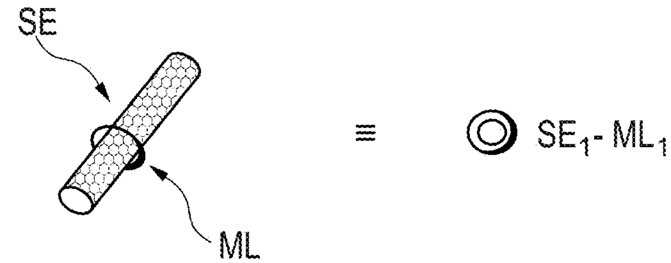
FIG. 1A to FIG. 1F shows example Mechanical Ligands (MLs) and the complexes $SE_o$-$ML_p$ formed between structural entities (SEs) and Mechanical Ligands (MLs)
Figure 1B:
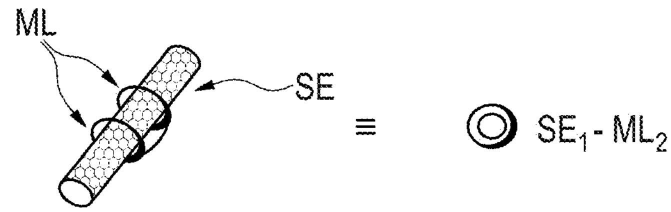
Figure 1C:
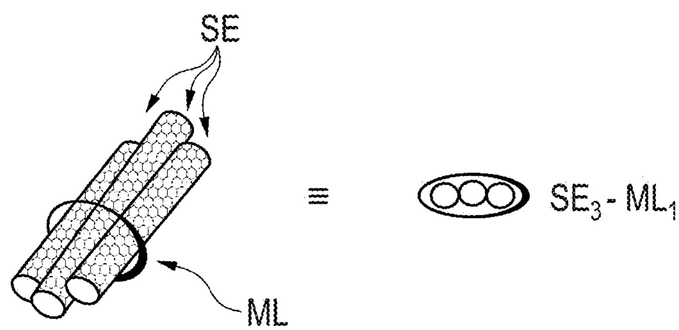
Figure 1D:
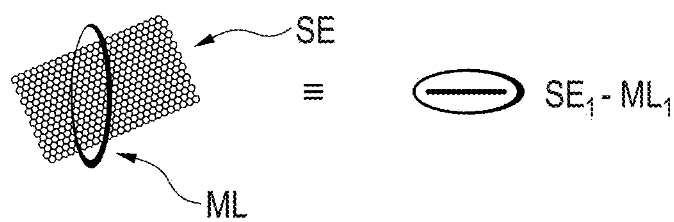
Figure 1E:
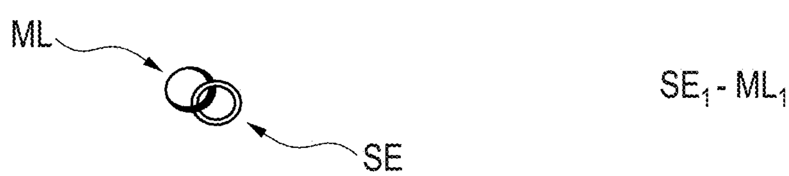
Figure 1F:
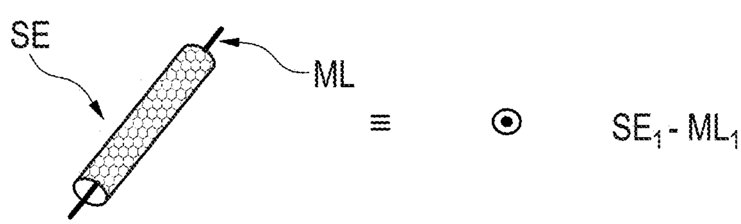
Figure 2A:
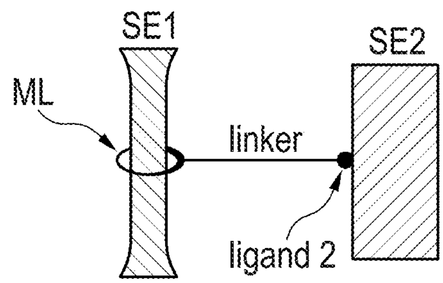
FIG. 2A to FIG. 2E shows example Composite Material Units (CMUs)
Figure 2B:
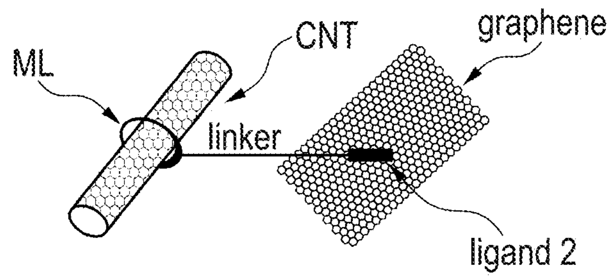
Figure 2C:
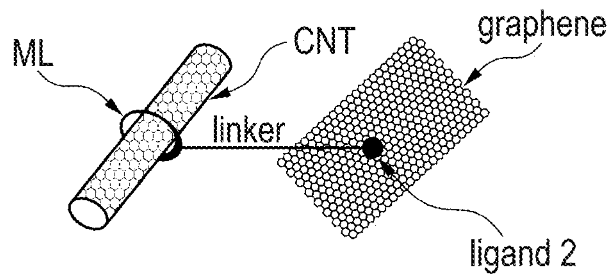
Figure 2D:
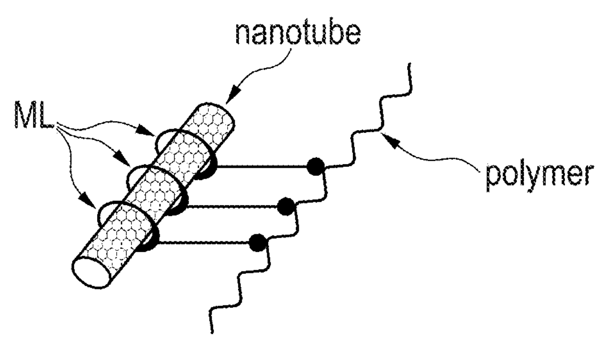
Figure 2E:
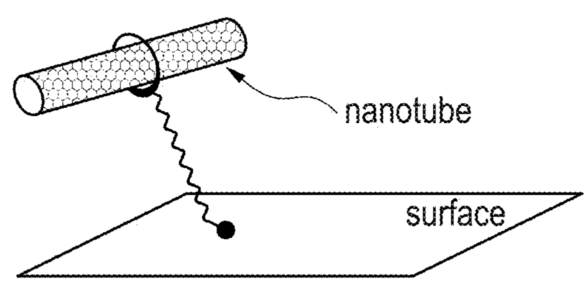
Figure 3A:
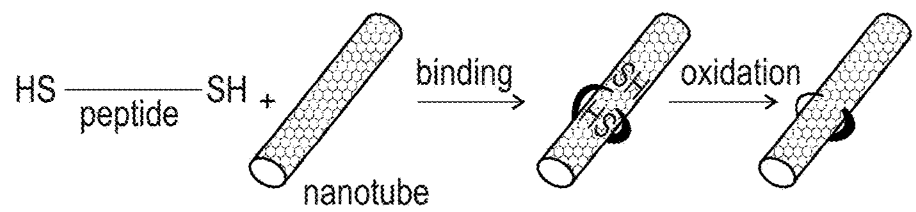
FIG. 3A to FIG. 3E shows examples of Mechanical Ligands (MLs) that are generated during or upon association of the precursor-ML with a structural entity (SE)
Figure 3B:
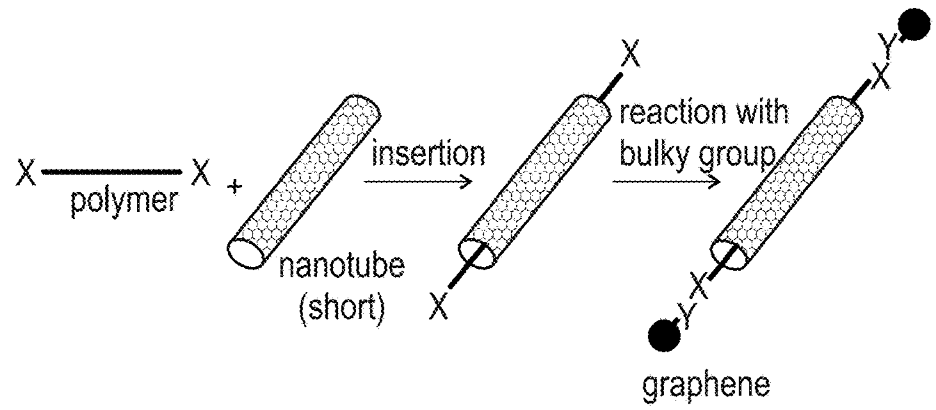
Figure 3C:
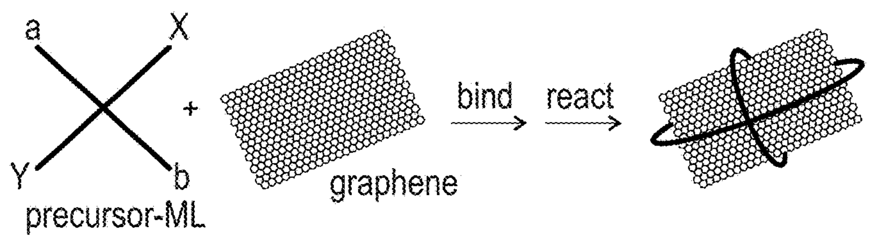
Figure 3D:
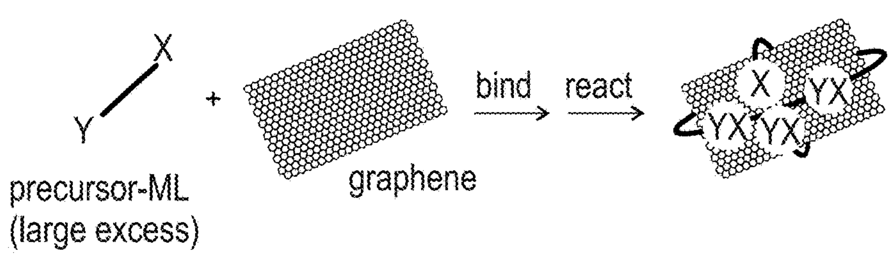
Figure 3E:
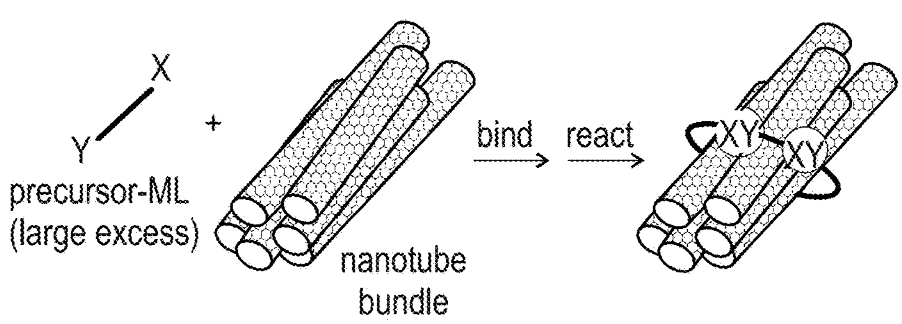

The final chemical structure of the ML may be generated prior to association with the SE, or may be generated during or upon association with the SE. See (FIG. 3A to FIF. 3E) for examples of MLs that are generated during or upon association with an SE.

For MLs whose final structure is generated during or upon association with the SE, the affinity of the precursor-ML (ie. the chemical entity that binds to the SE, but is not yet capable of forming a mechanical bond—such as eg. a linear peptide binding to a carbon nanotube) for the SE, is an important characteristic of a ML. Thus, with a higher affinity of the precursor-ML for SE, a certain number of MLs, bound to SE, may be achieved with a lower amount of precursor-MLs added. Thus, in a preferred embodiment, the precursor-MLs have a dissociation constant for the SE, such as the carbon nanotube, other nanotube, or the graphene, respectively, of less than $10^{-2}$ M, more preferably less than $10^{-3}$ M, more preferably less than $10^{-4}$ M, more preferably less than $10^{-5}$ M, more preferably less than $10^{-6}$ M, more preferably less than $10^{-7}$ M, more preferably less than $10^{-8}$ M, more preferably less than $10^{-9}$ M, more preferably less than $10^{-10}$ M, more preferably less than $10^{-12}$ M, more preferably less than $10^{-14}$ M, more preferably less than $10^{-16}$ M, more preferably less than $10^{-18}$ M, more preferably less than $10^{-20}$ M, more preferably less than $10^{-25}$ M, more preferably less than $10^{-30}$ M, more preferably less than $10^{-35}$ M, more preferably less than $10^{-40}$ M, more preferably less than $10^{-50}$ M.

In other contexts, it is preferable that the affinity of the precursor-ML is low. For example, if the relevant characteristics of the SE (such as conductivity of a carbon nanotube) is negatively affected by strong binding of a ML, it is preferable that the ML (and precursor-ML) binds with low affinity to the SE. Thus, in a preferred embodiment, the precursor-MLs have a dissociation constant for the SE, such as the carbon nanotube, other nanotube, or the graphene, respectively, of more than $10^{-50}$ M, more preferably more than $10^{-40}$ M, more preferably more than $10^{-35}$ M, more preferably more than $10^{-30}$ M, more preferably more than $10^{-25}$ M, more preferably more than $10^{-20}$ M, more preferably more than $10^{-18}$ M, more preferably more than $10^{-16}$ M, more preferably more than $10^{-14}$ M, more preferably more than $10^{-12}$ M, more preferably more than $10^{-10}$ M, more preferably more than $10^{-9}$ M, more preferably more than $10^{-8}$ M, more preferably more than $10^{-7}$ M, more preferably more than $10^{-6}$ M, more preferably more than $10^{-5}$ M, more preferably more than $10^{-4}$ M, more preferably more than $10^{-3}$ M, more preferably more than $10^{-2}$ M.

In a preferred embodiment of said preferred embodiment, the SE is a carbon nanotube or graphene molecule, bound by more than 1 ML, more preferably by more than 10 MLs, more preferably by more than 100 MLs, more preferably by more than 1000 MLs, more preferably by more than 10 000 MLs, more preferably by more than 100 000 MLs, even more preferably by more than 1 000 000 MLs, where the individual precursor MLs, corresponding to said MLs have a dissociation constant for the carbon nanotube or the graphene, respectively, of more than $10^{-50}$ M, more preferably more than $10^{-40}$ M, more preferably more than $10^{-35}$ M, more preferably more than $10^{-30}$ M, more preferably more than $10^{-25}$ M, more preferably more than $10^{-20}$ M, more preferably more than $10^{-18}$M, more preferably more than $10^{-16}$M, more preferably more than $10^{-14}$ M, more preferably more than $10^{-12}$ M, more preferably more than $10^{-10}$ M, more preferably more than $10^{-9}$ M, more preferably more than $10^{-8}$ M, more preferably more than $10^{-7}$ M, more preferably more than $10^{-6}$M, more preferably more than $10^{-5}$ M, more preferably more than $10^{-4}$ M, more preferably more than $10^{-3}$ M, more preferably more than $10^{-2}$ M.

In a preferred embodiment of said preferred embodiment, the SE is a carbon nanotube or graphene molecule, bound by less than $10^9$ MLs, such as less than $10^8$ MLs, less than $10^7$ MLs, less than $10^6$ MLs, less than $10^5$ MLs, less than $10^4$ MLs, less than $10^3$ MLs, less than $10^2$ MLs, less than 10 MLs, less than 2 MLs, where the individual pre-cursor MLs, corresponding to said MLs have a dissociation constant for the carbon nanotube or the graphene, respectively, of more than $10^{-50}$ M, more preferably more than $10^{-40}$ M, more preferably more than $10^{-35}$ M, more preferably more than $10^{-30}$ M, more preferably more than $10^{-25}$ M, more preferably more than $10^{-20}$ M, more preferably more than $10^{-18}$M, more preferably more than $10^{-16}$M, more preferably more than $10^{-14}$ M, more preferably more than $10^{-12}$ M, more preferably more than $10^{-10}$ M, more preferably more than $10^{-9}$ M, more preferably more than $10^{-8}$M, more preferably more than $10^{-7}$ M, more preferably more than $10^{-6}$M, more preferably more than $10^{-5}$ M, more preferably more than $10^{-4}$ M, more preferably more than $10^{-3}$ M, more preferably more than $10^{-2}$ M.

In a preferred embodiment of said preferred embodiment, the SE is a carbon nanotube, other nanotube, or graphene molecule, bound by 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$ MLs, where the individual precursor MLs, corresponding to said MLs, have a dissociation constant for the carbon nanotube or the graphene, respectively, of $10^{-50}$ to $10^{-30}$ M, or $10^{-30}$ to $10^{-20}$ M, or $10^{-20}$ to $10^{-10}$ M, or $10^{-10}$ to $10^{-9}$ M, or $10^{-9}$ to $10^{-8}$ M, or $10^{-8}$ to $10^{-7}$ M, or $10^{-7}$ to $10^{-6}$M, or $10^{-6}$ to $10^{-5}$ M, or $10^{-5}$ to $10^{-4}$ M, or $10^{-4}$ to $10^{-3}$ M, or $10^{-3}$ to $10^{-2}$ M.

What is further provided in this invention is a structure of, and a process for preparing, a Linker Unit (LU) of the following composition:

ML-LinkerL-Ligand2 where

ML is chemical entity that is capable of forming a mechanical bond with a structural entity, LinkerL is a chemical bond or entity that links ML and Ligand2, Ligand2 is a chemical entity that is capable of binding covalently or non-covalently to a structural entity, or alternatively, is capable of forming a mechanical bond with a structural entity, and optionally, where a structural entity, SE1, is bound to ML, and a structural entity, SE2, is bound to Ligand2, thereby forming a composite material unit (CMU) of the following composition:

SE1-ML-LinkerL-Ligand2-SE2 where

SE1 is a Structural Entity,

ML is chemical entity that is mechanically bound to SE1,

LinkerL is a chemical bond or entity that links ML and Ligand2,

Ligand2 is a chemical entity that is attached to SE2,

SE2 is a Structural Entity,

The LU thus may be used to link two structural entities. The LU as described in the present invention is capable of efficiently linking two or more structural entities.

A structural entity SE is a chemical or physical entity. A structural entity may be an atom (e.g. an ion), a molecule (e.g. a nylon polymer or a CNT), or part of a surface/material (e.g. metal).

SE1 can be identical to SE2; SE1 can be of the same type as SE2, e.g. can both be nanotubes; SE1 can be of a different type than SE2, e.g. SE1 may be a nanotube and SE2 may be a plastic polymer. SE1 binds an ML; SE2 may also bind an ML or may not bind an ML.

The CMU may be used in the preparation of composite materials with improved or novel characteristics. The CMU as described in the present invention links different parts of the composite material in an efficient manner. The link may either be covalent or non-covalent.

What is further claimed is a composition, and the process of preparing a composition, comprising two or more CMUs. The two or more CMUs may be identical, essentially identical or different.

CMUs can be the sole constituents of composite materials, or further components may be added to form composite materials with unique characteristics.

Preferred embodiments include compositions comprising CMUs and a matrix such as a metal, a ceramic or a polymer.

The various components of the Composite Material Unit (CMU) are described below.

Guidelines for Using the Present Invention.

When using the present invention to make composite materials, the characteristics sought for the composite material must first be defined. Then an appropriate matrix material and additive can be chosen, e.g. from Group 1: Polymers, or Group 2: Polymers and plastics, or Group 3: Additives. As an example, if light-weight material with high strength is sought, one may choose a light-weight polymer material (e.g. polypropylene) as one of the structural entities (SE1), and an additive with high strength (e.g. a carbon nanotube) as the other structural entity (SE2).

Then it must be decided which ligands should be used. For good anchoring of the additive in the matrix one may choose to use a covalent bond as ligand between the polymer (SE2) and the linker. An appropriate covalent bond can be chosen from Group 6: Reactive groups and covalent bonds formed upon reactions, or Group 7: Covalent bond-forming chemical reactions, or Group 8: Covalent bonds. Thus, reactive groups on the polymer units must be present or introduced, for reaction with the linker unit. Alternatively, some or all of the polymer units must be covalently linked to the linker prior to the polymerization of the polymer matrix. In the example in which a CNT is chosen as additive, it would be appropriate to use a mechanical ligand, and thereby obtain a mechanical bond between the CNT (SE1) and the linker. In the design of a mechanical ligand, a SE1-binding moiety can be chosen from Group 4: Chemical motifs and the SEs they bind, or Group 5: Chemical motifs and the SEs they bind, or Group 10; CNT-binding moieties. The linker may be chosen from Group 9. Linkers. If a low degradability of the composite material is desired, ligands (ML and Ligand2) should be chosen to not comprise easily cleavable bonds such as amide bonds, and also, the ligands preferably should not comprise natural amino acids.

Once the principal components (structural entities, ligands, and linkers) of the composite material have been defined, the formation of the CMU and composite material in general can be performed, by adding the appropriate catalysts, reagents and components in appropriate amount and order.

In the above example a composite material consisting of polypropylene (matrix material) and carbon nanotube (additive, providing strength), held together by a linker comprising a covalent ligand (covalent bond between linker and polypropylene) and a mechanical ligand (bound to carbon nanotube), will have been produced.

Further considerations may have to be taken into account when designing the process for producing the composite material:

Solubility of the SEs is also an important parameter to consider. If the SE, that here functions as the additive, is soluble in both the solvent employed during the polymerization reaction and in the polymer itself, the SE will become evenly distributed in the composite material. However, sometimes a less soluble SE may be an advantage, as a decreased solubility might mediate interaction between SEs of the same kind, which may sometimes be an advantage, e.g. for efficient load transfer where efficient interaction is mediated by direct interactions between SEs of the same kind.

When making composites comprising tube-like structures such as nanotubes with mechanical ligands in the form of rings around them, it is often desirable that the nature of the ring, i.e. its charge, polarity, content of various elements, etc., is similar to the nature of the structural entities that are in the composite. As an example, if one wishes to make a CNT-polyamide composite, it is desirable that the mechanical ligand has polyamide-like features. Thus, it is desirable that the mechanical ligand is itself a polyamide, and that the ring does not carry too many undesired chemical moieties. One such undesired chemical moiety could be a nanotube binding domain of the precursor-ML. Thus, it is desirable if means are applied that leads to a minimization or elimination of the content of such undesired chemical moieties in the final composites. Example 38 describes such methodologies, that remove the nanotube-binding moieties during formation of the mechanical ligand, and thus ensures that the content of nanotube-binding moieties in the final composite is minimal.

Structural Entity (SE).

A structural entity SE is a chemical or physical entity. A structural entity is typically used to anchor the CMU in place in the larger structure of the composite material, or alternatively, is used to modify the characteristics of the composite material, e.g. by modifying the strength or flexibility of the composite material. A structural entity may also provide alternative characteristics such as conductivity, heat absorption, energy storage, etc. Finally, an SE can be a CMU.

When an SE is added to a composite material, e.g. to increase the strength of the composite material, it is in most cases an additive that makes it more expensive to produce the composite material and therefore makes the final composite material more expensive. Thus, depending on the context, the amount of SE added per composite material product is preferably less than $10^9$ kg, such as less than $10^8$ kg, such as less than $10^7$ kg, such as less than $10^6$ kg, such as less than $10^5$ kg, such as less than $10^4$ kg, such as less than $10^3$ kg, such as less than 100 kg, such as less than 10 kg, such as less than 1 kg, such as less than 0.1 kg, such as less than 0.01 kg, such as less than $10^{-3}$ kg, such as less than $10^{-4}$ kg, such as less than $10^{-5}$ kg, such as less than $10^{-6}$ kg, such as less than $10^{-7}$ kg, such as less than $10^{-8}$ kg, such as less than $10^{-9}$ kg, such as less than $10^{-10}$ kg, such as less than $10^{-11}$ kg, such as less than $10^{-12}$ kg.

In other cases, the SE added to the composite material is an additive that makes it cheaper to produce the composite material and therefore makes the final composite material less expensive. Thus, depending on the context, the amount of SE added is preferably greater than $10^{-12}$ kg, such as greater than $10^{-11}$ kg, such as greater than $10^{-10}$ kg, such as greater than $10^{-9}$ kg, such as greater than $10^{-8}$ kg, such as greater than $10^{-7}$ kg, such as greater than $10^{-6}$ kg, such as greater than $10^{-5}$ kg, such as greater than $10^{-4}$ kg, such as greater than $10^{-3}$ kg, such as greater than 0.01 kg, such as greater than 0.1 kg, such as greater than 1 kg, such as greater than 10 kg, such as greater than 100 kg, such as greater than $10^3$ kg, such as greater than $10^4$ kg, such as greater than $10^5$ kg, such as greater than $10^6$ kg, such as greater than $10^7$ kg, such as greater than $10^8$ kg, such as greater than $10^9$ kg.

Thus, the preferred compromise between addition of a large amount of SE and a low amount of SE depends on the context, and may be smaller than $10^{-12}$ kg, but may also be in the range of $10^{-12}$-$10^{-11}$ kg, $10^{-11}$-$10^{-10}$ kg, $10^{-10}$-$10^{-9}$ kg, $10^{-9}$-$10^{-8}$ kg, $10^{-8}$-$10^{-7}$ kg, $10^{-7}$-$10^{-6}$ kg, $10^{-6}$-$10^{-5}$ kg, $10^{-5}$-$10^{-4}$ kg, $10^{-4}$-$10^{-3}$ kg, 0.001-0.01 kg, 0.01-0.1 kg, 0.1-1 kg, 1-10 kg, 10-100 kg, 100-1,000 kg, $10^3$-$10^4$ kg, $10^4$-$10^5$ kg, $10^5$-$10^6$ kg, $10^6$-$10^7$ kg, $10^7$-$10^8$ kg, $10^8$-$10^9$ kg, or above $10^9$ kg.

In most cases, it is not the absolute amount of SE that matters most, but rather the relative amount of SE versus total amount of material. Thus, depending on the context, the total weight of the SEs of a composite material relative to the weight of the composite material is preferentially greater than 0,00001%, more preferably greater than 0,0001%, more preferably greater than 0.001%, more preferably greater than 0.01%, more preferably greater than 0.1%, more preferably greater than 0.1%, more preferably greater than 1%, more preferably greater than 5%, more preferably greater than 10%, more preferably greater than 20%, more preferably greater than 30%, more preferably greater than 40%, more preferably greater than 50%, more preferably greater than 60%, more preferably greater than 70%, more preferably greater than 80%, more preferably greater than 90%, and even more preferably greater than 95%.

When producing an SE, the MW of the SE is an important parameter. In many cases, a low MW is preferred as smaller molecule are often less expensive to produce compared to larger molecules. Thus, depending on the context, the SE MW is preferably less than $10^9$ Dal, such as less than $10^8$ Dal, such as less than $10^7$ Dal, such as less than $10^6$ Dal, such as less than $10^5$ Dal, such as less than $10^4$ Dal, such as less than $10^3$ Dal, such as less than $10^2$ Dal, such as less than 10 Dal, such as less than 3 Dal.

In other cases, a high MW is preferred as larger molecules are often less expensive to purify. Thus, depending on the context, the molecular weight is preferably greater than 3 Dal, such as greater than 10 Dal, such as greater than $10^2$ Dal, such as greater than $10^3$ Dal, such as greater than $10^4$ Dal, such as greater than $10^5$ Dal, such as greater than $10^6$ Dal, such as greater than $10^7$ Dal, such as greater than $10^8$ Dal, such as greater than $10^9$ Dal.

Therefore, depending on the context, preferred molecular weight of structural entities include molecular weights ranging from 3 Dalton to more than $10^9$ Dalton, such as from 3-10 Dal (e.g. Li+ or Na+), 10-100 Dal (e.g. benzene), 100-1000 Dal, 1000-10,000 Dal (e.g. a 20 amino acid natural polypeptide) 10,000-20,000 Dal (e.g a polymer chain such as nylon), 20,000-30,000 Dal, 30,000-40,000 Dal, 40,000-50,000 Dal, 50,000-70,000 Dal, 70,000-100,000 Dal, 100,000-200,000 Dal, 200,000-500,000 Dal, 500,000-1,000,000 Dal (e.g. carbon nanotube), 1,000,000-2,000,000 Dal, 2,000,000-4,000,000 Dal, 4,000,000-10,000,000 Dal, 10,000,000-100,000,000 Dal, 100,000,000-1,000,000,000 Dal, or particles with molecular weight larger than $10^9$ Dal (e.g. gold particles).

Another important characteristic is the number of functional groups an SE comprises, as an SE with many functional groups will often be more expensive to synthesize. Thus, depending on the context, the number of functional groups on an SE is preferably less than $10^9$, such as less than $10^8$, such as less than $10^7$, such as less than $10^6$, such as less than $10^5$, such as less than $10^4$, such as less than $10^3$, such as less than 100, such as less than 90, such as less than 80, such as less than 70, such as less than 60, such as less than 50, such as less than 40, such as less than 30, such as less than 25, such as less than 20, such as less than 15, such as less than 10, such as less than 9, such as less than 8, such as less than 7, such as less than 6, such as less than 5, such as less than 4, such as less than 3, such as less than 2.

In other cases a high number of functional groups is desired, as the functional groups can be used to link an SE to a ML or Ligand2 or another SE, or to increase the dispersibility of the SE. Thus, depending on the context, the number of functional groups on an SE is preferably greater than 1, such as greater than 2, such as greater than 3, such as greater than 4, such as greater than 5, such as greater than 6, such as greater than 7, such as greater than 8, such as greater than 9, such as greater than 10, such as greater than 15, such as greater than 20, such as greater than 25, such as greater than 30, such as greater than 40, such as greater than 50, such as greater than 60, such as greater than 70, such as greater than 90, such as greater than 100, such as greater than $10^3$, such as greater than $10^4$, such as greater than $10^5$, such as greater than $10^6$, such as greater than $10^7$, such as greater than $10^8$, such as greater than $10^9$.

Thus, the preferred compromise between having an SE with many functional groups and an SE with few functional groups depends on the context, and may be in the range of 1-2, 2-3, 3-4, 4-5, 5-6, 6-7, 7-8, 8-9, 9-10, 10-15, 15-20, 20-25, 25-30, 30-40, 40-50, 50-60, 60-70, 70-80, 80-90, 90-100, 100-1,000, $10^3$-$10^4$, $10^4$-$10^5$, $10^5$-$10^6$, $10^6$-$10^7$, $10^7$-$10^8$, $10^8$-$10^9$, or above $10^9$.

Particularly preferred structural entities include nanotubes such as carbon nanotubes, fullerenes, other carbon-based molecular structures, or any other kind of molecular-, supramolecular-, or macroscopic structures.

The SEs suitable for the present invention may have a number of characteristics.

SEs may be organic or inorganic.

In a preferred embodiment of the invention, the structural entity SE1 is a tube-like structure, such as a nanotube, nanowire, nanofiber, nanorod or other tube-like structure, preferably with a high aspect ratio, such as an aspect ratio of at least 10, such as at least 100, such as at least 1000, such as at least 10000, or such as at least 100000, and a covalently closed ring that is wrapped around the tube-like structure constitutes the mechanical ligand.

For any characteristics of an SE mentioned above, and in each characteristic's entire range, a further characteristic of importance is the molecular weight of the SE.

Molecular Weight of SEs.

The molecular weight is an important determinant for the characteristics of SEs, and for the characteristics of the CMUs they are part of. For example, larger polymers typically form stronger, less flexible materials, whereas smaller polymers typically are more flexible, but have lesser strength. Therefore, depending on the context, preferred molecular weight of structural entities include molecular weights ranging from 3 Dalton to more than $10^9$ Dalton, such as from 3-10 Dal (e.g. Li+ or Na+), 10-100 Dal (e.g. benzene), 100-1000 Dal, 1000-10,000 Dal (e.g. a 20 amino acid natural polypeptide) 10,000-20,000 Dal (e.g a polymer chain such as nylon), 20,000-30,000 Dal, 30,000-40,000 Dal, 40,000-50,000 Dal, 50,000-70,000 Dal, 70,000-100,000 Dal, 100,000-200,000 Dal, 200,000-500,000 Dal, 500,000-1,000,000 Dal (e.g. carbon nanotube), 1,000,000-2,000,000 Dal, 2,000,000-4,000,000 Dal, 4,000,000-10,000,000 Dal, 10,000,000-100,000,000 Dal, 100,000,000-1,000,000,000 Dal, or particles with molecular weight larger than $10^9$ Dal (e.g. gold particles).

In cases where the strength is of highest importance, typically a high molecular weight is preferred. Thus, depending on the context, the molecular weight is preferably greater than 3 Dal, such as greater than 10 Dal, such as greater than $10^2$ Dal, such as greater than $10^3$ Dal, such as greater than $10^4$ Dal, such as greater than $10^5$ Dal, such as greater than $10^6$ Dal, such as greater than $10^7$ Dal, such as greater than $10^8$ Dal, such as greater than $10^9$ Dal.

In cases where the flexibility is of highest importance, a low molecular weight is typically preferred. Thus, depending on the context, the molecular weight is preferably less than $10^9$ Dal, such as less than $10^8$ Dal, such as less than $10^7$ Dal, such as less than $10^6$ Dal, such as less than $10^5$ Dal, such as less than $10^4$ Dal, such as less than $10^3$ Dal, such as less than $10^2$ Dal, such as less than 10 Dal, such as less than 3 Dal.

For any characteristics of an SE mentioned above, and in each characteristic's entire range, a further characteristic of importance is the melting point of the SE.

Melting Point of SE.

The melting point of the SE is often an important parameter, since the melting point of the composite often is strongly dependent on the melting point of the SE. Some applications including CMUs of the present invention involve elevated temperatures, wherefore it is important that the CMU maintains its integrity and structure at such elevated temperatures. This is for example the case when said CMU is part of a composite material, used in an application that involves high temperatures. In these cases a high melting point is preferred.

Thus, depending on the context, the melting point of the SE is preferably greater than −20° C., such as greater than 0° C., such as greater than 50° C., such as greater than 100° C., such as greater than 200° C., such as greater than 400° C., such as greater than 600° C., such as greater than 800° C., such as greater than 1000° C., such as greater than 1500° C., such as greater than 2000° C., such as greater than 3000° C., such as greater than 4000° C., such as greater than 6000° C., such as greater than 8000° C.

In other cases, a composite material's flexibility at low temperatures is important, wherefore a low melting point may be advantageous. Thus, depending on the context, the melting point of the SE is preferably less than 8000° C., such as less than 6000° C., such as less than 4000° C., such as less than 3000° C., such as less than 2000° C., such as less than 1500° C., such as less than 1000° C., such as less than 800° C., such as less than 600° C., such as less than 400° C., such as less than 200° C., such as less than 100° C., such as less than 50° C., such as less than 0° C., such as less than −20° C.

Depending on the context, preferred melting points of SEs thus are below 0° C., such as between −20° C. and 0° C.; or may be higher, such as between 0° C. and 50° C., or between 50° C. and 100° C., or between 100° C. and 200° C., or between 200° C. and 300° C., or between 300° C. and 400° C., or between 400° C. and 500° C., or between 500° C. and 600° C., or between 600° C. and 700° C., or between 700° C. and 800° C., or between 800° C. and 900° C., or between 900° C. and 1,000° C., or between 1,000° C. and 1,100° C., or between 1,000° C. and 1,200° C., or between 1,200° C. and 1,400° C., or between 1,400° C. and 1,600° C., or between 1,600° C. and 1,800° C., or between 1,800° C. and 2,000° C., or between 2,000° C. and 2,200° C., or between 2,200° C. and 2,400° C., or between 2,400° C. and 2,600° C., or between 2,600° C. and 2,800° C., or between 2,800° C. and 3,000° C., or between 3,000° C. and 3,200° C., or between 3,200° C. and 3,400° C., or between 3,400° C. and 3,600° C., or between 3,600° C. and 3,800° C., or between 3,800° C. and 4,000° C., or between 4,000° C. and 4,200° C., or between 4,200° C. and 4,400° C., or between 4,400° C. and 4,600° C., or between 4,600° C. and 4,800° C., or between 4,800° C. and 5,000° C., or between 5,000° C. and 5,200° C., or between 5,200° C. and 5,400° C., or between 5,400° C. and 5,600° C., or between 5,600° C. and 5,800° C., or between 5,800° C. and 6,000° C., or between 6,000° C. and 6,200° C., or between 6,200° C. and 6,400° C., or between 6,400° C. and 6,600° C., or between 6,600° C. and 6,800° C., or between 6,800° C. and 7,000° C., or between 7,000° C. and 7,200° C., or between 7,200° C. and 7,400° C., or between 7,400° C. and 7,600° C., or between 7,600° C. and 7,800° C., or between 7,800° C. and 8,000° C., or between 8,000° C. and 8,200° C., or between 8,400° C. and 8,600° C., or between 8,600° C. and 8,800° C., or between 8,800° C. and 9,000° C., or between 9,000° C. and 9,200° C., or between 9,200° C. and 9,400° C., or between 9,400° C. and 9,600° C., or between 9,600° C. and 9,800° C., or between 9,800° C. and 10,000° C., or between 10,000° C. and 11,000° C., or between 11,000° C. and 12,000° C., or between 12,000° C. and 13,000° C., or between 13,000° C. and 14,000° C., or between 14,000° C. and 15,000° C., or between 15,000° C. and 16,000° C., or between 16,000° C. and 17,000° C., or between 17,000° C. and 18,000° C., or between 18,000° C. and 19,000° C., or between 19,000° C. and 20,000° C., or above 20,000° C. The matrix of a composite to a high degree determines the melting point of the composite; in particular, ceramics and metals have high melting points.

For any characteristics of an SE mentioned above, and in each characteristic's entire range, a further characteristic of importance is the conductivity of the SE.

Conductivity of SE.

In certain applications, e.g. use of a composite material in wind turbine blades, it may be important that the propellers are non-conductive, in order to not attract lightning. In other cases it may be desirable to prepare composite materials of modest or high conductivity, in order to be able to detect cracks in the material by analytical measurement of the conductance of the material. Likewise, for SEs used in e.g. nanosensor technology it may be important that the SE is conductive, in order to be able to detect changes in conductivity induced by the association of an analyte with the SE. In some sensor applications it may be desirable to have high conductivity (if the analyte has a strong reducing effect on the conductance of the SE), or it may be desirable to use an SE with an intermediate conductivity in order to detect small changes in conductivity. In other applications, the composite material is used as an insulator, wherefore it is important that the SE has very low conductivity. Thus, depending on the application it may be desirable that the SE has low, intermediate or high conductivity. Structural entities may have conductivities ranging from below $10^{-30}$ S/m to at least $10^{11}$ S/m and higher, such as from below $10^{-30}$ S/m to $10^{-25}$ S/m (e.g. Teflon), such as from $10^{-25}$ S/m to $10^{-20}$ S/m (e.g. PET), such as from $10^{-20}$ S/m to $10^{-15}$ S/m (e.g. Quarts (fused) and Paraffin), such as from $10^{-15}$ S/m to $10^{-10}$ S/m (e.g. Hard Rubber, Diamond, Glass), such as from $10^{-10}$ S/m to $10^{-5}$ S/m (e.g. GaAs, Silicon), such as from $10^{-5}$ S/m to 1 S/m, such as from 1 S/m to 10 S/m (e.g. Germanium), such as from 10 S/m to $10^2$ S/m, such as from $10^2$ S/m to $10^4$ S/m (e.g. graphite), such as from $10^4$ S/m to $10^6$ S/m (e.g. Nichrome, Mercury), such as from $10^6$ S/m to $10^8$ S/m (e.g. Stainless steel, Titanium, Platinum, Iron, Lithium, Aluminum, Gold, Cupper, Silver), such as from $10^8$ S/m to $10^9$ S/m, such as from $10^9$ S/m to $10^{10}$ S/m, such as from $10^{10}$ S/m to $10^{11}$ S/m (e.g. Carbon nanotubes), such as from $10^{11}$ S/m to $10^{12}$ S/m (e.g. Carbon nanotubes), such as from $10^{12}$ S/m to $10^{14}$ S/m, and above $10^{14}$ S/m (e.g. superconducting material).

Thus, depending on the context, the conductivity of an SE is preferably greater than $10^{-30}$ S/m, such as greater than $10^{-25}$ S/m, such as greater than $10^{-20}$ S/m, such as greater than $10^{-15}$ S/m, such as greater than $10^{-10}$ S/m, such as greater than $10^{-5}$ S/m, such as greater than 1 S/m, such as greater than 10 S/m, such as greater than $10^2$ S/m, such as greater than $10^4$ S/m, such as greater than $10^6$ S/m, such as greater than $10^8$ S/m, such as greater than $10^9$ S/m, such as greater than $10^{10}$ S/m, such as greater than $10^{11}$ S/m, such as greater than $10^{12}$ S/m, such as greater than $10^{13}$ S/m, such as greater than $10^{14}$ S/m.

In other applications, and depending on the context, the conductivity is preferably less than $10^{14}$ S/m, such as less than $10^{13}$ S/m, such as less than $10^{12}$ S/m, such as less than $10^{11}$ S/m, such as less than $10^{10}$ S/m, such as less than $10^9$ S/m, such as less than $10^8$ S/m, such as less than $10^6$ S/m, such as less than $10^4$ S/m, such as less than $10^2$ S/m, such as less than 10 S/m, such as less than 1 S/m, such as less than $10^{-5}$ S/m, such as less than $10^{-10}$ S/m, such as less than $10^{-15}$ S/m, such as less than $10^{-20}$ S/m, such as less than $10^{-25}$ S/m, such as less than $10^{-30}$ S/m.

For any characteristics of an SE mentioned above, and in each characteristic's entire range, a further characteristic of importance is the density and strength of the SE, as well as the ratio between the density and the various types of strength.

Density and Strength of the SE.

For certain applications, for example in the airplane or automotive industry, the strength and density of the composite material is of prime importance. Sometimes, one of the two features is by far the most important. For example, if a structure such as a bridge must be built and the structure must carry a lot of weight, where this weight is much larger than the weight of the structure itself, the weight of the composite material from which the structure is built, has little importance. Only strength is important. In cases where no significant force is applied to the material other than gravity, the weight of the structure becomes important, but the strength is not important. This is for example the case where the composite material is used to make a sculpture that rests on some other structure.

Often, both low density and high strength is desired. However, as these two parameters often are opposing factors, a compromise will have to be made. Therefore, sometimes a high density is acceptable to gain strength, such as high tensile strength or large Young's Modulus. In other cases, low density is necessary, even if lower strength results. Thus, in preferred embodiments the SE may have relatively low Young's modulus or low tensile strength, and in other preferred embodiments the SE has large Young's modulus or large tensile strength; and likewise, in preferred embodiments the density can vary from very small to very large.

Preferred specific densities of SEs suitable for the present invention are lower than 0.01 kg/L, but may also include specific densities in the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L.

In some cases high specific densities are preferred. This may be the case when an anchor is made of a composite material comprising SEs, as the anchor should rest heavily on the bottom of the ocean. Thus, depending on the context, the specific density is preferably greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L.

In many cases low specific density is preferred. This is for example the case if the SE is part of a composite material, used to make ships that must float on the water, wherefore the weight must be minimized. Thus, depending on the context, the specific density is preferably less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

The Young's Modulus of SEs.

In the majority of applications of composite materials, a high Young's modulus is preferred, as this will allow the material to recover its original shape after force has been applied to the material. Thus, depending on the context, the Young's modulus is preferably greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa.

However, in a few applications, a low Young's modulus is desirable. This is for example the case when the degree of deformation of a composite material is being used as a measure of how much force was applied to the material. Thus, depending on the context, the Young's modulus is preferably less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa.

The Young's modulus of SEs suitable for the present invention can thus be lower than 0.001 TPa, but may also include SEs with Young's Modulus in the following ranges: 0.001-0 0.01 TPa; 0.01-0.03 TPa; 0.03-0.05 TPa; 0.05-0.07 TPa; 0.07-0.09 TPa; 0.09-0.1 TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa (e.g. stainless steel); 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa (e.g. single-walled carbon nanotubes); 2-3 TPa; 3-4 TPa; 4-5 TPa; 5-7 TPa; 7-10 TPa; or above 10 TPA.

Preferred tensile strength of SEs is in most cases high, as this will enable the generation of composite materials of high tensile strength, suitable for a large number of applications, e.g. stronger fishing lines and stronger cables. Thus, depending on the context, the tensile strength of SEs is preferably greater than 0.01 GPa, such as greater than 0.05 GPa, such as greater than 0.1 GPa, such as greater than 0.5 GPa, such as greater than 1 GPa, such as greater than 2 GPa, such as greater than 3 GPa, such as greater than 5 GPa, such as greater than 10 GPa, such as greater than 20 GPa, such as greater than 30 GPa, such as greater than 40 GPa, such as greater than 60 GPa, such as greater than 80 GPa, such as greater than 100 GPa, such as greater than 200 GPa.

However, in some cases a low tensile strength is advantageous, for example in cables or lines that must break for safety reasons, in order to avoid damage to individuals. Thus, depending on the context, the tensile strength of SEs is preferably less than 200 GPa, such as less than 100 GPa, such as less than 80 GPa, such as less than 60 GPa, such as less than 40 GPa, such as less than 30 GPa, such as less than 20 GPa, such as less than 10 GPa, such as less than 5 GPa, such as less than 3 GPa, such as less than 2 GPa, such as less than 1 GPa, such as less than 0.5 GPa, such as less than 0.1 GPa, such as less than 0.05 GPa, such as less than 0.01 GPa.

The tensile strength for SEs suitable for the present invention can thus be lower than 0.01 GPa, but may also include SEs with tensile strengths in the following ranges: 0.01-0.03 GPa; 0.03-0.05 GPa; 0.05-0.07 GPa; 0.07-0.09 GPa; 0.09-0.1 GPa; 0.1-0.11 GPa; 0.11-0.12 GPa; 0.12-0.13 GPa; 0.13-0.14 GPa; 0.14-0.15 GPa; 0.15-0.16 GPa; 0.16-0.17 GPa; 0.17-0.18 GPa; 0.18-0.19 GPa; 0.19-0.20 GPa; 0.20-0.22 GPa; 0.22-0.25 GPa; 0.25-0.30 GPa; 0.30-0.35 GPa; 0.35-0.40 GPa; 0.40-0.45 GPa; 0.45-0.50 GPa; 0.50-0.60 GPa; 0.60-0.80 GPa; 0.80-1.0 GPa; 1-2 GPa (e.g. stainless steel); 2-3 GPa; 3-4 GPa; 4-5 GPa; 5-7 GPa; 7-10 GPa; 10-15 GPa; 15-20 GPa; 20-25 GPa; 25-30 GPa; 30-35 GPa; 35-40 GPa; 40-45 GPa; 45-50 GPa (e.g. single-walled carbon nanotubes); 50-55 GPa; 55-60 GPa; 60-65 GPa; 65-70 GPa; 70-75 GPa; 75-80 GPa; 80-85 GPa; 85-90 GPa; 90-100 GPa; 100-200 GPa, or above 200 GPa.

Ratio of strength to specific density is often important. The strength/specific density ratio for the structural entity that is preferred under the present invention is represented by all the ratios that can be obtained, by dividing the abovementioned strengths with the abovementioned specific densities. Thus, preferred embodiments have structural entities with strength/specific densities in the range 0.00003-1000 TPa L/Kg (where strength is represented by Young's modulus). More specifically, the strength/specific density (Young's Modulus) of the SE is preferably in the range 0.00003-1,000 TPa L/Kg, more preferably 0.001-1,000 TPA L/Kg, more preferably 0.01-1,000 TPA L/Kg, more preferably 0.1-1,000 TPA L/Kg, more preferably 1-1,000 TPA L/Kg, more preferably 10-1,000 TPA L/Kg, more preferably 100-1,000 TPA L/Kg, and more preferably 500-1,000 TPA L/Kg, or higher.

In cases where e.g. the Young's modulus should be low (see above), the Young's modulus/specific density ratio is preferably less than 1,000 TPA L/kg, such as less than 500 TPA L/kg, such as less than 100 TPa L/kg, such as less than 10 TPa L/kg, such as less than 1 TPa L/kg, such as less than 0.1 TPa L/kg, such as less than 0.01 TPa L/kg, such as less than 0.001 TPa L/kg, such as less than 0.00003 TPa L/kg.

In cases where e.g. Young's modulus is preferably high, the Young's modulus/specific density ratio is preferably greater than 0.00003 TPa L/kg, such as greater than 0.001 TPa L/kg, such as greater than 0.01 TPa L/kg, such as greater than 0.1 TPa L/kg, such as greater than 1 TPa L/kg, such as greater than 10 TPa L/kg, such as greater than 100 TPa L/kg, such as greater than 500 TPa L/kg, such as greater than 1,000 TPA L/kg.

Where strength is measured as tensile strength, the preferred embodiments have structural entities with strength/specific density in the range 0.0003-20,000 GPa L/Kg. More specifically, the tensile strength/specific density of the SE is preferably in the range 0.0003-20,000 GPa L/Kg, more preferably 0.01-20,000 GPa L/Kg, more preferably 0.1-20,000 GPa L/Kg, more preferably 1-20,000 GPa L/Kg, more preferably 10-20,000 GPa L/Kg, more preferably 100-20,000 GPa L/Kg, more preferably 1,000-20,000 GPa L/Kg, more preferably 5,000-20,000 GPa L/Kg, and more preferably 10,000-20,000 GPa L/Kg, or higher.

In cases where e.g. the tensile strength is preferably low (see above), the tensile strength/specific density ratio is preferably less than 20,000 GPa L/kg, such as less than 10,000 GPa L/kg, such as less than 5,000 GPa L/kg, such as less than 1,000 GPa L/kg, such as less than 100 GPa L/kg, such as less than 10 GPa L/kg, such as less than 1 GPa L/kg, such as less than 0.1 GPa L/kg, such as less than 0.0003 GPa L/kg.

In cases where e.g. tensile strength is preferably high, the tensile strength/specific density ratio is preferably greater than 0.0003 GPa L/kg, such as greater than 0.1 GPa L/kg, such as greater than 1 GPa L/kg, such as greater than 10 GPa L/kg, such as greater than 100 GPa L/kg, such as greater than 1,000 GPa L/kg, such as greater than 5,000 GPa L/kg, such as greater than 10,000 GPa L/kg, such as greater than 20,000 GPA L/kg.

Preferred fracture toughness of SEs is in most cases high, as this will enable the generation of composite materials with a low risk of cracks propagating through the composite, ultimately leading to fracture. Examples of composite materials where a high fracture toughness is desirable includes, but are not limited to, wind turbine blades and airplane wings. Thus, depending on the context, the fracture toughness is preferably greater than 0.01 $MPa\cdot m^{1/2}$, such as greater than 0.1 $MPa\cdot m^{1/2}$, such as greater than 1 $MPa\cdot m^{1/2}$, such as greater than 2 $MPa\cdot m^{1/2}$, such as greater than 5 $MPa\cdot m^{1/2}$, such as greater than 10 $MPa\cdot m^{1/2}$, such as greater than 15 $MPa\cdot m^{1/2}$, such as greater than 20 $MPa\cdot m^{1/2}$, such as greater than 25 $MPa\cdot m^{1/2}$, such as greater than 30 $MPa\cdot m^{1/2}$, such as greater than 40 $MPa\cdot m^{1/2}$, such as greater than 50 $MPa\cdot m^{1/2}$, such as greater than 75 $MPa\cdot m^{1/2}$, such as greater than 100 $MPa\cdot m^{1/2}$, However, in some applications, a low fracture toughness is desirable. As an example, the fracture toughness of the windows in a train needs to be sufficiently low that a person can break the window using an appropriate tool in an emergency situation. Thus, depending on the context, the fracture toughness is preferably less than 100 $MPa\cdot m^{1/2}$, such as less than 75 $MPa\cdot m^{1/2}$, such as less than 50 $MPa\cdot m^{1/2}$, such as less than 40 $MPa\cdot m^{1/2}$, such as less than 30 $MPa\cdot m^{1/2}$, such as less than 25 $MPa\cdot m^{1/2}$, such as less than 20 $MPa\cdot m^{1/2}$, such as less than 15 $MPa\cdot m^{1/2}$, such as less than 10 $MPa\cdot m^{1/2}$, such as less than 5 $MPa\cdot m^{1/2}$, such as less than 2 $MPa\cdot m^{1/2}$, such as less than 1 $MPa\cdot m^{1/2}$, such as less than 0.1 $MPa\cdot m^{1/2}$, such as less than 0.01 $MPa\cdot m^{1/2}$.

The fracture toughness for SEs suitable for the present invention can thus be lower than 0.01 $MPa\cdot m^{1/2}$, but may also include SEs with fracture toughness in the following ranges: 0.01-0.1 $MPa\cdot m^{1/2}$, 0.1-1 $MPa\cdot m^{1/2}$, 1-2 $MPa\cdot m^{1/2}$, 2-5 $MPa\cdot m^{1/2}$, 5-10 $MPa\cdot m^{1/2}$, 10-15 $MPa\cdot m^{1/2}$, 15-20 $MPa\cdot m^{1/2}$, 20- 25 $MPa\cdot m^{1/2}$, 25-30 $MPa\cdot m^{1/2}$, 30-40 $MPa\cdot m^{1/2}$, 40-50 $MPa\cdot m^{1/2}$, 50-75 $MPa\cdot m^{1/2}$, 75-100 $MPa\cdot m^{1/2}$, or above 100 $MPa\cdot m^{1/2}$.

Bulk Modulus of SEs.

In the majority of applications of composite materials, a high bulk modulus is preferred, as this will allow the composite material to withstand a high compression, which is important in structural elements of buildings, bridges, etc. Thus, depending on the context, the bulk modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200

GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa. However, in a few applications, a low bulk modulus is desirable. This is for example the case in some foam products, where it should be easy to compress the foam, e.g. using a person's body weight. Thus, depending on the context, the bulk modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The bulk modulus for SEs suitable for the present invention can thus be lower than 0.001 GPa, but may also include SEs with bulk modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Shear Modulus of SEs.

In the majority of applications of composite materials, a high shear modulus is preferred, as this will allow the composite material to withstand large forces imposed on the composite material in opposite directions, e.g. brakes on bicycles, cars, wind turbines, etc. Thus, depending on the context, the shear modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa.

However, in some applications, a low shear modulus is desirable. This is for example the case in plastic composite materials used for buttons, e.g. to turn on or off electronic equipment. Such buttons must have a low shear modulus so pressing them is sufficiently easy. Thus, depending on the context, the shear modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The shear modulus for SEs suitable for the present invention can thus be lower than 0.001 GPa, but may also include SEs with shear modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Other kinds of strength, such as torsional strength and impact strength, are also of importance. Thus, SEs with low, medium or high torsional strength, and SEs with low, medium or high impact strength are suitable for the present invention, and represent preferred embodiments.

For any characteristics of an SE mentioned above, and in each characteristic's entire range, a further characteristic of importance is the degree to which the SE can be elongated (stretched) without breaking.

Elongation at Break.

In many applications, a high elongation at break is preferred. This is for example important in components that absorb energy by deforming plastically such as crash barriers and car bumpers. Thus, depending on the context, the elongation at break is preferably greater than 0.1%, such as greater than 1%, such as greater than 5%, such as greater than 10%, such as greater than 20%, such as greater than 30%, such as greater than 40%, such as greater than 50%, such as greater than 60%, such as greater than 70%, such as greater than 80%, such as greater than 90%, such as greater than 100%, such as greater than 150%, such as greater than 200%, such as greater than 300%, such as greater than 400%, such as greater than 500%, such as greater than 800%, such as greater than 1,500%.

In other applications, a low elongation at break is preferred. This is important in composite materials that must not deform even under harsh conditions such as high pressure and elevated temperature; one such example is ceramic brakes on automobiles, aircrafts and trains. Thus, depending on the context, the elongation at break is preferably less than 1,500%, such as less than 800%, such as less than 500%, such as less than 400%, such as less than 300%, such as less than 200%, such as less than 150%, such as less than 100%, such as less than 90%, such as less than 80%, such as less than 70%, such as less than 60%, such as less than 50%, such as less than 40%, such as less than 30%, such as less than 20%, such as less than 10%, such as less than 5%, such as less than 1%, such as less than 0.1%.

SEs suitable for the present invention can thus have an elongation at break of less than 0.1%, or have elongation at break including the following ranges: 0.1-1%, 1-5%, 5-10%, 10-20%, 20-30%, 30-40%, 40-50%, 50-60%, 60-70%, 70-80%, 80-90%, 90-100%, 100-150%, 150-200%, 200-300%, 300-400%, 400-500%, 500-800%, 800-1,500%, or have elongation at break above 1,500%.

For any characteristics of an SE mentioned above, and in each characteristic's entire range, further characteristics of importance are size and shape of the SE.

Size of SE.

The size and shape of the structural entity are important parameters. Thus, although depending on the characteristics of the structural entity, composite materials may benefit from SEs with extended shapes, preferably large in size, if the primary purpose is to increase the Young's modulus of the composite material, by including the SE. Thus, depending on the context, the size of the SE is preferably greater than 0.1 Å, such as greater than 2 Å, such as greater than 1 nm, such as greater than 10 nm, such as greater than 100 nm, such as greater than 1 μm, such as greater than 10 μm, such as greater than 100 μm, such as greater than 1 mm, such as greater than 10 mm.

For other applications, it may be an advantage to include SEs of smaller size, e.g. in order to increase molecular homogeneity of the composite material. In other cases, a primary characteristic of the composite material is even distribution of SEs and it may be generally desired that as little SE as possible should be used in the composite material, e.g. for economic reasons. In such cases, it may be desirable to include SEs of small size. Thus, depending on the context, the size of the SE is preferably less than 10 mm, such as less than 1 mm, such as less than 100 μm, such as less than 10 μm, such as less than 1 μm, such as less than 100 nm, such as less than 10 nm, such as less than 1 nm, such as less than 2 Å, such as less than 0.1 Å.

Often, the choice of size and shape will be a compromise between opposing interests. Thus, in preferred embodiments the SE may be very small to very large, depending on the application. For example, when making composite materials using thermoset polymers and glass fibers, typically long glass fibers in the size range 0.01-1 m are used, whereas when using thermoplastics shorter fibers of typically 1-10 mm are used.

Structural entities may vary in size from less than 1 Ångstrøm dimensions to the mm dimensions, such as from 0.1-2 Å (e.g. $K^+$), 2-10 Å (e.g. benzene), 1-10 nm (e.g a short polypeptide), 10-100 nm (e.g. a carbon nanotube, a protein), 100-1,000 nm (e.g a carbon fiber, PVC polymer molecule, a carbon nanotube), 1-10 μm (e.g. a gold particle), 10-100 μm (e.g. a nylon fiber), 100-1,000 μm (e.g an alumina fiber), 1-10 μm (e.g. a plant cell), 10-100 μm (e.g. a bamboo fiber), 100-1,000 μm (e.g. a silver particle), 1-10 mm (e.g. a carbon fiber), or particles larger than 10 mm in at least one dimension.

Further Characteristics of SE.

For any characteristics of an SE mentioned above, and in each characteristic's entire range, further characteristics of the SE that are of importance in the present invention are the stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g. Depending on the application, an SE with a low, medium, or high degree of each of these characteristics is preferable in the present invention.

Further, SEs, in particular SE2, may be polymers or may be non-polymeric in structure.

The polymers can be divided into biological polymers and non-biological polymers.

Non-biological polymers include polymers that are not RNA, DNA or natural polypeptides, yet include PVC, epoxy, unnatural polypeptides (i.e. not solely comprising alpha-amino acids) and unnatural nucleic acids (e.g. PNA, LNA and other unnatural nucleic acids).

The following polymers represent preferred structural entities, suitable for the present invention:

Polymers. The following is a non-comprehensive list of preferred structural entities, in the form of polymers often categorized as the matrix material of a composite.

Group 1: Polymers.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(111) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, Na and/or Ilia of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C^5$-C8) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic. Stereoblock polymers are also included.

5. Polystyrene, poly(α-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacryloni-triles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or po-ly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetra-methylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadi-pate, polyhexamethyleneadipate, polyethyleneoxalate, polypropyleneoxalate, polybutylene-oxalate, polyhexamethyleneoxalate, polyethylenesebacate, polypropylenesebacate and polybutylenesebacate, as well as corresponding polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The polymers can be further divided into thermosets such as polyester resin, epoxy resin, and polyurethanes, and thermoplastics such as nylon, polycarbonate and polyethylene.

The polymers can be further divided into linear and branched polymers. The branched polymers may be further divided into short-chain branched polymers, long-chain branched polymers, star-branched polymers, ladder polymers and network polymers.

Polymers and plastics. In preferred embodiments, a suitable SE is chosen from the list comprising polymers & plastics.

Group 2: Polymers and Plastics.

- polyimide, PTFE, PMMA, Kapton, Vespel, Cirlex, ABS
- polyimides (kapton, upilex, etc)
- polyamides
- polycarbonates (PC/lexan)
- polyesters (PET/mylar, melinex, dacron, PEN/teonex)
- polyethylenes (LDPE, HDPE)
- polypropylenes (PP)
- styrenics (polystyrenes/PS, acrylonitriles/ABS)
- vinyls (PVC, nylon)
- acrylics (PMMA/perspex, plexiglas)
- fluoroplastics (PTFE/teflon, FEP, PFA, PVDF)
- polysulphones (PES)
- ketones (PEEK)
- polyurethanes
- barrier resins (PVA/polyvinyl alcohol)
- epoxy resins (FR4)
- silicone resins
- elastomes (PDMS)
- biopolymers (wood, cellulose, starch based)
- conductive polymers (Pedot:PSS/baytron, orgacon, TIPS pentacene)
- light emitting polymers (white LEP, etc)
- copolymers
- metalised polymers
- Co-polymers
- Block co-polymers
- Rubber
- Latex Polyacetylene, Polydiacetylenes, Polyethylene—very low density (VLDPE), Polyethylene—low density (LDPE), Polyethylene—linear low density (LLDPE), Polyethylene—medium density (MDPE), Polyethylene—high density (HDPE), Polyethylene—ultrahigh molecular weight (UHMWPE), Polyethylene—cross-linked polyethylene, Polyisoprene, Polybutadiene, Polypropylene, Polypropylene, Polypropylene, Poly-1-butene, Poly-1-hexene, Polymethylpentene, polyisobutylene, poly(ethylene propylene), Poly-1-octene, Ethylene-propylene-diene rubbers, Ethylene-propylene bases thermoplastic elastomers, Polyhexene, Polyheptene, Polyoctene, Polystyrene-butadiene, Parylene, Polystyrene, Polymers of styrene in primary forms, Expansible polystyrene in primary forms, Expanded polystyrene (EPS), Poly(p-phenylene), High-impact polystyrene (HIPS), Poly(p-phenylene-vinylene), Poly(2,5-dioctyl-1,4-phenylenevinylene), Poly(2,6-naphthalenevinylene), Polyanthracene, Poly(anthracene-vinylene), Polyvinylchloride, Polychloroprene, Non plasticised PVC mixed with any other substance in primary forms, Plasticised PVC mixed with any other substance in primary forms, Polyvinylidene chloride (PVDC), Polytetrafluorethylene (PTFE), Polyvinylidene fluoride (PVDF), ethylene tetrafluoro-ethylene copolymer (Tefzel), Polyvinylfluoride, Polyperfluoropropylene, Polyoxymethylene, Polyethyleneoxide, Polypropyleneoxide, Poly(ethylene-propylene oxide), polybutyleneoxide, Polyphenylene ether (PPE), polyacrylate, polyacrylic acid, Polymethylmethacrylate, Polymethylacrylate, Poly(ethyl acrylate), Polyhydroxyethylmethacrylate, Polybutylacrylate, Polybutylmethacrylate, Ethylene vinyl acetate (EVA) and ethylene vinyl alcohol (EVOH), Poly vinyl acetate in primary forms, Poly vinyl acetate in aqueous dispersion in primary forms, Polyvinylacetate, Polyvinylalcohol, Polycarbonate, Polyetherketon, Polyetheretherketon, Polyethyleneterephthalate, Polybutyleneterephthalate, polylactic acid, Polybutylene terephtalate (PBT), Other PET, Polycaprolactone (PCL), Polyglycolide (PG), Liqid crystalline polymers (aromatic) containing esters, Polyethylene adipate (PEA), Polytrimethylene terephthalate (PTT), Polyethylene naphthalate (PEN), Vectran, Alkyd resins, Polymers of vinyl esters or other vinyl polymers in primary forms, Polyacetals in primary forms, Bekalite, Phenol formaldehyde resins (PF), Diglycidyl Ether of Bisphenol-A (DGEBA), Phenolic (Novolac) Epoxy Resins, Poly-o-vinylbenzylalcohol, Poly-p-vinylbenzylalcohol, Polyvinyl formal, Polyvinyl acetal, Polyvinyl isobutyral, Polyvinyl butyral, Polyvinyl-n-butyl ether, Polytetramethylene sebacate, Polybutylene oxide, polypropylene oxide, Polyethylene adipate, Polyacrylonitrile (PAN) and copolymers, Acrylonitrile-butadiene-styrene (ABS) terpolymer, Styrene-acrylonitrile (SAN) copolymer, Polyaniline, Polypyrrole, Polymethacrylonitrile, Polysulphones, Polysulphides, ethylene chlorotrifluoro ethylene copolymer (ECTFE), fluorinated ethylene-propylene copolymer (Teflon FEP), polychlorotrifluoro-ethylene, Nylon PA1,1, Nylon PA1,2, Nylon PA1,3, Nylon PA1,4, Nylon PA1,5, Nylon PA1,6, Nylon PA2,1, Nylon PA6,6, Nylon PA6,10, Polyurethane based on, polyimide, polycaprolactam, aramid, Polyphenylene benzobisoxazole, Poly(m-phenyleneisophtalamide) (MPD-I) (Nomex®), Poly(p-phenyleneterephtalamide) (PPD-T) (Kevlar® and Twaron®), Polyisocyanurates, Polyimides, Bismaleimides (BMI), Polyacenaphthylene, Polyvinyl pyrrolidone, Vinyl chloride-vinyl acetate copolymers and other vinyl chloride copolymers in primary forms, perfluoroalkoxy Teflon PFA, Polydimethysiloxanes (PDMS), Organomodified siloxanes (OMS), Polymethylhydrosiloxane (PMHS), Silicones in primary forms, PolyAPTAC, (poly (acrylamido-N-propyltrimethylammonium chloride) and PolyMAPTAC (poly[(3-(methacryloylamino)-propyl]trimethylammonium chloride) are all suitable polymers for the structural entities SE.

Organic SEs include natural and unnatural polypeptides, lipids, polysaccharides, wood flour, etc.

The following additives represent preferred structural entities, suitable for the present invention: a carbon fibre, a carbon nanofibre, a carbon nanothread, a ceramic material, a composite material, a fullerene, a MWCNT, a SWCNT, graphane, graphene oxide, graphite, graphite, graphyne, a COOH-functionalized carbon nanotube, a OH-functionalized carbon nanotube, an NH2-functionalized carbon nanotube, an SH-functionalized CNT, COOH-functionalized graphene, multi-layer graphene, NH2-functionalized graphene, OH-functionalized graphene, reduced graphene oxide, thiol-functionalized graphene, a glass fibre, aramid, E-glass, iron, polyester, polyethylene, S-glass, steel, a battery, a borosilicate, a buckyball, a buckytube, a capacitator, a carbon dome, a carbon material, a carbon megatube, a carbon nanofoam, a carbon polymer, a catalyst, a cathode, a coated carbon nanotube, a conductor, a covalent crystal, a crystal, a crystalline material, a defect-free graphene sheet, a defect-free MWCNT, a defect-free SWCNT, a dielectric material, a diode, a dodecahedrane, a doped glass, a fibre, a fullerite, a fused silica, a glue, a green ceramic, a lanthanides, a machinable ceramic, a metal alloy, a metal-functionalized carbon nanotube, a metalised dielectric, a metallised ceramic, a metalloid, a mineral, a non-covalent crystal, a piezoelectric material, a platinum group metal, a post-transition metal, a rare earth element, a sapphire, a semiconductor, a sensor, a silicon nitride, a single crystal fiber, a sol-gel, a synthetic diamond, a transition metal, a triple-wall carbon nanotube, a tungsten carbide, alumina, alumina trihydrate, aluminium, aluminum boride, aluminum oxide, aluminum trihydroxide, amorphous carbon, an actinides, an amalgam, an anode, an elastomers, an electrode, an endohedral fullerene, an insulator, an intermetallic, an ionic crystal, an organic material, anode, anthracite, asbestos, barium, bone, boron, brass, buckypaper, calcium carbonite, calcium metasilicate, calcium sulfate, calcium sulphate, carbon black, carbon nanofoam, cathode, chromium, clay, coal, copper, diamond, diamond-like carbon, double-layer graphene, exfoliated graphite, exfoliated silicate, flourinated graphene, fused silica, gallium arsenide, gallium nitride, germanium, glass, glass microsphere, glass ribbons, glassy carbon, gold, hardened steel, hydrous magnesium silicate, hyperdiamond, iron oxides, lead zirconium titanate, lignite, lithium niobate, lonsdaleite, magnesium dihydroxide, magnesium oxide, manganese, metal, metal oxide, mica, molybdenum, nickel, nylon, palladium, pencil lead, platinum, prismane, pyrolytic graphite, rubber, silica, silica gel, silicon, silicon carbide, silicon dioxide, silicon nitride, silver, soot, stainless steel, tantalum, titanium, titanium oxide, tooth cementum, tooth dentine, tooth enamel, tungsten, tungsten carbide, wood, zinc oxide, zirconia.

The SEs can be further divided into SEs comprising solely aliphatic moieties, comprising solely aromatic moieties, or comprising both aliphatic and aromatic moieties.

The SEs can be further divided into SEs comprising solely single bonds, solely double bonds, solely triple bonds, or a combination of single-, double- and triple bonds.

Biological polymers are here defined as the polymers involved in the transcriptional and translational process, i.e. natural nucleic acids (RNA or DNA), and natural polypeptides. Natural polypeptides can be further divided into peptides, proteins and antibodies.

In preferred embodiments, a suitable organic SE is chosen from the list comprising biologicals, such as hair, nail, horn, ligaments, bone, cornea, teeth, fibrous cartilage, vitreous cells, intervertebral disc, womb, skin, intestines, heart membranes, membranes, stomach membrane, cartilage, chronodrocites, intervertebral cartilage, bone enamel, ligaments, tendons and tooth enamel, organs, lung, heart, brain, skin, kidney, tooth material, bone material, tendon material, skin, hair, nails, a biological surface, such as a vein, a biological macromolecule, such as a protein, such as a naturally occurring protein, such as a consensus sequence protein, a modified protein, such as a mutant protein where one or more amino acids have been changed relative to the consensus sequence.

Preferred embodiments of SEs include gold particles, carbon nanotubes, carbon fibers, aluminum fibers, nanotubes, graphene, metal ions, metal, ceramic, polyester, concrete, polystyrene, BN (boron nitride aka "white graphene"), BNNT (boron nitride nanotubes), nanotubes and nanowires and nanocrystals and nanospheres and nanochains e.g. comprising any one or more of the following elements: C, Si, Se, Cu, S, Co, Zn, Al, Au, Ag, N, B and Cd.

Particularly preferred embodiments of SEs include carbon nanotubes, multi-walled carbon nanotubes, single-walled carbon nanotubes, functionalized carbon nanotubes, carbon nanofibres, carbon nanothreads, fullerenes, aluminum nitride nanotubes (AlNNTs), boron carbon nanotubes (BCNNT), DNA nanotube, RNA nanotube, protein nanotube, silicon nanotube, titanium oxide nanotubes, tungsten sulfide nanotubes, gallium nitride nanotubes (GaNNTs), aluminum phosphide nanotube (AlPNT), gallium phosphide nanotube (GaPNT), carbon/diamond nanothread, copper nanotubes, gold nanotubes, silver nanotube, platinum nanotube, zinc oxide nanotube, zinc ferrite nanotube, aluminium nanotube,
sulphide nanotubes such as $WS_2$ and $MoS_2$, selenide nanotubes such as Cadmium Selenide Nanotube CdSe, cobalt Selenide Nanotube, bismuth selenide nanotube, niobium selenide nanotubes, halide nanotubes, such as nickel chloride nanotubes, nanotubes of transition metal oxides such as $SiO_2$, $TiO_2$, $MoO_3$, $V_2O_5$ and
graphene, functionalized graphene, graphene oxide, graphyne, reduced graphyne,
graphane, graphdiyne, graphone, fluorographene, chlorographene In preferred embodiments, a suitable SE is chosen from the list comprising

- Concrete admixtures
- Chemical admixtures
- Mineral admixtures.
- Air entrainers
- Water reducers
- Set retarders
- Set accelerators
- Superplasticizers
- Corrosion inhibitors
- Shrinkage control admixtures
- Alkali-silica reactivity inhibitors
- Coloring admixtures.
- Plasticizers
- Water reducers
- Superplasticizer
- High range water reducers
- Organic polymers
- Lignin
- Naphthalene
- Melamine sulfonate superplasticisers
- Pozzolans and other cementitious materials
- Natural pozzolans (such as the volcanic ash used in Roman concrete)
- Fly ash
- Silica fume.
- Dispersants.
- Polycarboxylate ether superplasticizer (PCE)
- Polycarboxylate (PC)
- Coal
- Soot
- Carbon black
- Anthracite
- Lignite
- Kevlar
- Carbon fiber
- Carbon nanofiber
- Carbon allotropes
  - Activated carbon
    - Powdered activated carbon
    - Granular activated carbon
    - Extruded activated carbon
  - Fullerenes
    - Buckyball
    - Buckypaper
    - Buckytube
    - Dodecahedrane
    - Endohedral fullerenes
    - Gedodesic carbon domes
    - Prismane
    - Carbon nanotube
      - Single-wall carbon nanotubes
      - Double-wall carbon nanotubes
      - Triple-wall carbon nanotube
      - Multi-wall carbon nanotubes
      - Pristine carbon nanotubes
      - Coated carbon nanotubes
      - Perfect carbon nanotubes
      - Imperfect carbon nanotubes
      - Functionalized carbon nanotubes
        - Thiol-functionalized
        - Hydroxyl-functionalized
        - Carboxylic acid-functionalized
        - Amine-functionalized
      - Carbon nanotubes that contain gadolinium
      - Buckypaper
    - Fullerite
      - Ultrahard fullerite
    - Buckminsterfullerene
    - Graphene
      - Single-layer graphene
      - Double-layer graphene
      - Triple-layer graphene
      - Multi-layer graphene
      - Pristine graphene
      - Coated graphene
      - Perfect graphene
      - Imperfect graphene
      - Functionalized graphene
        - Graphane
        - Flourinated graphene
        - Graphene oxide
        - Reduced graphene oxide
    - Buckyball clusters
    - Carbon megatub es
    - Carbon polymers
    - Carbon nano-onions
    - Carbon nanobuds
    - Fullerene rings
  - Glassy carbon
  - Diamond
    - Hyperdiamonds
    - Aggregated diamonds
  - Graphite
    - Pyrolytic graphite
  - Pencil lead
  - Lonsdaleite
  - Amorphous carbon
  - Carbon nanofoam
- Metals
  - Transition metals, Lanthanides, Actinides, Rare earth elements, Platinum group metals (PGMs), Post-transition metals
  - (Al) aluminium
  - (Fe) steel and stainless steel
  - (Mo) molybdenum
  - (Cu) copper
  - (Ti) titanium
  - (Pt) platinum
  - (Au) gold
  - (Ni) nickel
  - (Pa) palladium
  - (Mn) manganese
  - (Ta) tantalum
  - (Cr) chromium
  - (Ag) silver
  - (Wo) Tungsten Metalloids
Alloys
- Stainless steel
- Steel fibers
- Hardened steel
- Brass
- Brass fibers Amalgams
Intermetallics
Glasses
- Glass fibre
- Glass spheres Crystal
- Ionic crystals, Covalent crystals, Non-covalent crystals
- Non-covalent crystal Crystalline materials
- BK7, sapphire, fused silica Glue
Ceramic
- alumina, zirconia, machinable ceramic, green ceramic, PZT, silicon nitride, tungsten carbide
- alumina ($Al_2O_3$)
- silicon nitrides (bulk and thin film)
- silicon carbides
- lithium niobates
- zirconia
- metallised ceramic Elastomers
Fibres
Composite materials
- Wood
- Cellulose fibers
- lignin
- Bone
- Tooth enamel
- Tooth cementum
- Tooth dentine Sol-gel
Mineral
Montmorrilonite nanoclays
Cellulose nanowhiskers
Talc
Cellulose nanofibers (e.g. Curran)
Organic-Inorganic
- Organic-Inorganic hybrids
- Polymer hybrids of poly (vinyl alcohol) and silica gel Boron nitride nanotube
- Single-wall boron nitride nanotubes
- Double-wall boron nitride nanotubes
- Triple-wall boron nitride nanotube
- Multi-wall boron nitride nanotubes
- Pristine boron nitride nanotubes
- Coated boron nitride nanotubes
- Perfect boron nitride nanotubes
- Imperfect boron nitride nanotubes
- Functionalized boron nitride nanotubes
  - Thiol-functionalized boron nitride nanotubes
  - Hydroxyl-functionalized boron nitride nanotubes
  - Carboxylic acid-functionalized boron nitride nanotubes
  - Amine-functionalized boron nitride nanotubes
- Boron nitride nanotubes that contain gadolinium
- Bucky paper Boron nitride
- Single-layer boron nitride
- Double-layer boron nitride
- Triple-layer boron nitride
- Multi-layer boron nitride
- Pristine boron nitride
- Coated boron nitride
- Perfect boron nitride
- Imperfect boron nitride
- Functionalized boron nitride
  - Flourinated boron nitride
  - Boron nitride oxide
  - Reduced boron nitride oxide For any characteristics of an SE mentioned above or below, and in each characteristic's entire range, a further characteristic of importance is the content of elements in the SE. The kinds of elements in an SE will be reflected in the characteristics of the SE, but can in some cases also affect other parts of a CMU. As an example, the elements of SE1 may interfere with the integrity of SE2, or alternatively, if SE2 is made in situ, i.e. after the mixing of SE1 and the precursors from which SE2 will be made, SE1 may interfere with the formation of SE2 and/or its final form, through interaction of its elements with the reactive monomers that react to form SE2.

Identities and Number of Elements of a Structural Entity.

The structural entity may be composed of only one type of element, two types of elements, three types of elements, four types of elements, or more than four types of elements.

SEs Consisting of One Element or One Type of Element.

Preferred embodiments of SEs comprising only one element are often ions, and often serve an essential structural role in the CMU. The following ions are particularly preferred structural entities: K+, Cl−, Ca++, Mg++, Gd+++, Cu+, Cu2+, Fe2+, Fe3+, Hg2+, $Hg_2$2+, Pb2+, Pb4+, Sn2+, Sn4+, Cr2+, Cr3+, Mn2+, Mn3+, Co2+, Co3+. If comprising only one element, the element may be any one of the following: Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

SEs comprising only one type of element have no polarity, and are therefore attractive in cases where no polarity is desired. This may e.g. be the case where the polymer (e.g. SE1) of a composite has no polarity, and where it therefore may be beneficial to add an additive (SE2) with no polarity as well.

The following structural entities comprising only one element or one type of element, are particularly preferred structural entities:

Comprising carbon atoms only: Buckyball, Buckypaper, Buckytube, Dodecahedrane, Endohedral fullerenes, Geodesic carbon domes, Prismane, Pristine carbon nanotubes, Coated carbon nanotubes, Perfect carbon nanotubes, Imperfect carbon nanotubes, Fullerite, Ultrahard fullerite, Buckminsterfullerene, Graphene, Single-layer graphene, Double-layer graphene, Triple-layer graphene, Multi-layer graphene, Pristine graphene, Perfect graphene, Imperfect graphene, Buckyball clusters, Carbon megatubes, Carbon polymers, Carbon nano-onions, Carbon nanobuds, Fullerene rings, diamond, fullerenes in general, and specifically Carbon nanotubes, Single-wall carbon nanotubes, Double-wall carbon nanotubes, Triple-wall carbon nanotube, Multi-wall carbon nanotubes including single-walled carbon nanotubes and multiwalled nanotubes, and including Carbon nanotubes with the following chiral vectors (n, m); (0,0); (1,0); (2,0); (3,0); (4,0); (5,0); (6,0); (7,0); (8,0); (9,0); (10,0); (11,0); (12,0); (13,0); (14,0); (15,0); (16,0); (17,0); (18,0); (19,0); (20,0); (0,1); (1,1); (2,1); (3,1); (4,1); (5,1); (6,1); (7,1); (8,1); (9,1); (10,1); (11,1); (12,1); (13,1); (14,1); (15,1); (16,1); (17,1); (18,1); (19,1); (20,1); (0,2); (1,2); (2,2); (3,2); (4,2); (5,2); (6,2); (7,2); (8,2); (9,2); (10,2); (11,2); (12,2); (13,2); (14,2); (15,2); (16,2); (17,2); (18,2); (19,2); (20,2); (0,3); (1,3); (2,3); (3,3); (4,3); (5,3); (6,3); (7,3); (8,3); (9,3); (10,3); (11,3); (12,3); (13,3); (14,3); (15,3); (16,3); (17,3); (18,3); (19,3); (20,3); (0,4); (1,4); (2,4); (3,4); (4,4); (5,4); (6,4); (7,4); (8,4); (9,4); (10,4); (11,4); (12,4); (13,4); (14,4); (15,4); (16,4); (17,4); (18,4); (19,4); (20,4); (0,5); (1,5); (2,5); (3,5); (4,5); (5,5); (6,5); (7,5); (8,5); (9,5); (10,5); (11,5); (12,5); (13,5); (14,5); (15,5); (16,5); (17,5); (18,5); (19,5); (20,5); (0,6); (1,6); (2,6); (3,6); (4,6); (5,6); (6,6); (7,6); (8,6); (9,6); (10,6); (11,6); (12,6); (13,6); (14,6); (15,6); (16,6); (17,6); (18,6); (19,6); (20,6); (0,7); (1,7); (2,7); (3,7); (4,7); (5,7); (6,7); (7,7); (8,7); (9,7); (10,7); (11,7); (12,7); (13,7); (14,7); (15,7); (16,7); (17,7); (18,7); (19,7); (20,7); (0,8); (1,8); (2,8); (3,8); (4,8); (5,8); (6,8); (7,8); (8,8); (9,8); (10,8); (11,8); (12,8); (13,8); (14,8); (15,8); (16,8); (17,8); (18,8); (19,8); (20,8); (0,9); (1,9); (2,9); (3,9); (4,9); (5,9); (6,9); (7,9); (8,9); (9,9); (10,9); (11,9); (12,9); (13,9); (14,9); (15,9); (16,9); (17,9); (18,9); (19,9); (20,9); (0,10); (1,10); (2,10); (3,10); (4,10); (5,10); (6,10); (7,10); (8,10); (9,10); (10,10); (11,10); (12,10); (13, 10); (14,10); (15,10); (16,10); (17,10); (18,10); (19,10); (20,10); (0,11); (1,11); (2,11); (3,11); (4,11); (5,11); (6,11); (7,11); (8,11); (9,11); (10,11); (11,11); (12,11); (13,11); (14,11); (15,11); (16,11); (17,11); (18,11); (19,11); (20,11); (0,12); (1,12); (2,12); (3,12); (4,12); (5,12); (6,12); (7,12); (8,12); (9,12); (10,12); (11,12); (12,12); (13,12); (14,12); (15,12); (16,12); (17,12); (18,12); (19,12); (20,12); (0,13); (1,13); (2,13); (3,13); (4,13); (5,13); (6,13); (7,13); (8,13); (9,13); (10,13); (11,13); (12,13); (13,13); (14,13); (15,13); (16,13); (17,13); (18,13); (19,13); (20,13); (0,14); (1,14); (2,14); (3,14); (4,14); (5,14); (6,14); (7,14); (8,14); (9,14); (10,14); (11,14); (12,14); (13,14); (14,14); (15,14); (16,14); (17,14); (18,14); (19,14); (20,14); (0,15); (1,15); (2,15); (3,15); (4,15); (5,15); (6,15); (7,15); (8,15); (9,15); (10,15); (11,15); (12,15); (13,15); (14,15); (15,15); (16,15); (17,15); (18,15); (19,15); (20,15); (0,16); (1,16); (2,16); (3,16); (4,16); (5,16); (6,16); (7,16); (8,16); (9,16); (10,16); (11,16); (12,16); (13,16); (14,16); (15,16); (16,16); (17,16); (18,16); (19,16); (20,16); (0,17); (1,17); (2,17); (3,17); (4,17); (5,17); (6,17); (7,17); (8,17); (9,17); (10,17); (11,17); (12,17); (13, 17); (14,17); (15,17); (16,17); (17,17); (18,17); (19,17); (20,17); (0,18); (1,18); (2,18); (3,18); (4,18); (5,18); (6,18); (7,18); (8,18); (9,18); (10,18); (11,18); (12,18); (13,18); (14,18); (15,18); (16,18); (17,18); (18,18); (19,18); (20,18); (0,19); (1,19); (2,19); (3,19); (4,19); (5,19); (6,19); (7,19); (8,19); (9,19); (10,19); (11,19); (12,19); (13,19); (14,19); (15,19); (16,19); (17,19); (18,19); (19,19); (20,19); (0,20); (1,20); (2,20); (3,20); (4,20); (5,20); (6,20); (7,20); (8,20); (9,20); (10,20); (11,20); (12,20); (13,20); (14,20); (15,20); (16,20); (17,20); (18,20); (19,20); (20,20)

In a preferred embodiment the structural entity is a CNT with the following chiral vectors (n, m):

- n is between 0 and 20, such as between 0 and 10, such as between 0 and 5, such as between 0 and 2.
- n is between 0 and 20, such as between 10 and 20, such as between 15 and 20, such as between 17 and 20.
- p is between 0 and 20, such as between 0 and 10, such as between 0 and 5, such as between 0 and 2.
- p is between 0 and 20, such as between 10 and 20, such as between 15 and 20, such as between 17 and 20.

Examples of structural entities consisting of only gold (Au) include gold nanotubes and gold nanowires.

Examples of structural entities consisting of only titanium include titanium rods and titanium plates.

Examples of structural entities consisting of only silver include silver fibres and silver cones.

Examples of structural entities consisting of only zinc include zinc nanotubes and zinc particles.

Examples of structural entities consisting of only copper include copper spheres and copper wires.

SEs Consisting of Two Elements, or Two Types of Elements.

Examples of SEs comprising zinc and oxygen, or boron and nitride are ZnO nanorods, ZnO nanowires, ZnO nanotubes, ZnO Nanohelixes/nanosprings, seamless nanorings, nanopropellers, nanowires, such as single-crystal nanowires, ZnO nanobelts, polyhedral cages, single-wall boron nitride nanotubes, double-wall boron nitride nanotubes, triple-wall boron nitride nanotube, multi-wall boron nitride nanotubes, pristine boron nitride nanotubes, coated boron nitride nanotubes, perfect boron nitride nanotubes, imperfect boron nitride nanotubes, bucky paper, single-layer boron nitride, double-layer boron nitride, triple-layer boron nitride, multilayer boron nitride, pristine boron nitride, coated boron nitride, perfect boron nitride and imperfect boron nitride.

If comprising only two elements, the elements may include any of the following: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of only zinc (Zn) and oxygen (O) include ZnO nanotubes.

Examples of structural entities consisting of only carbon (C) and hydrogen (H) include polyethylene, polypropylene, polystyrene, graphane.

Examples of structural entities consisting of only boron (B) and nitrogen (N) include boron nitride and boron nitride nanotubes Examples of structural entities consisting of two elements include polytetrafluoroethylene (comprising C, F).

Comprising C and O: Graphene oxide

Comprising C and F: Fluorinated graphene

SEs Consisting of Three Elements, or Three Types of Elements.

If comprising only three elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of three elements include the following:

Comprising C, H, Cl: polyvinylchloride

Comprising C, H, O: poly(vinylalcohol)

Comprising C, H, N: polyacrylonitrile

Comprising C, H, Si: Poly[(dimethylsilylene)methylene]

Comprising C, H, S: Poly(thiophene)

Comprising C, S, H: thiol-functionalized graphene

Comprising C, O, H: hydroxide-functionalized graphene

Comprising C, S, H: thiol-functionalized carbon nanotubes

Comprising C, O, H: hydroxide-functionalized carbon nanotubes

Comprising B, N, O: boron nitride oxide

Comprising B, N, F: fluorinated boron nitride

SEs Consisting of Four Elements, or Four Kinds of Elements.

If comprising only four elements, the elements may include any of the following: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of four elements include the following:

Comprising C, H, Cl, O: Poly(vinyl chloroacetate)

Comprising C, H, O, N: Proteins, peptides.

SEs Consisting of More than Four Elements.

If comprising more than four elements, the elements may include any of the following kinds: Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of structural entities consisting of more than four elements include the following:

Comprising C, H, N, O, P: Nucleic acids

A structural entity may consist of just one atom (in its non-charged form or as an ion, e.g. Gd or Gd+++), or may consist of several atoms, held together in an organized structure.

Comprising zinc only: Zinc nanotubes.

Example SEs

The following is a non-exhaustive list of structural entities: polymer, plastic, metal, additive, filler, inorganic polymer, organic polymer, supramolecular structure, fibers or filaments of human, animal or plant origin, macromolecular structure, polyethylene (PE), polypropylene (PP), polyvinylchloride (PVC), polystyrene (PS), poly(vinylalcohol) (PVAL), polyvinaylacetate (PVAC), poly(4-methyl-1-pentene), poly(1,4-butadiene), polyisoprene, polyacrylonitrile (PAN), polymethylmethacrylate (PMMA), poly(n-alkylmethacrylate), poly(n-alkylacrylate), poly(ethylene terephtalate) (PETP), poly(butylenes terephtalate) (PBTP), polytetrafluoroethylene (PTFE), polyamide 6 (PA 6), polyamide n (PAn), polyamide 6,10 (PA 6,10), polyoxymethylene (POM), polyethyleneoxide (PEO), poly(vinylidene dichloride) (PVDC), poly(vinylidine difluoride) (PVDF), epoxy, boron nitride, boron nitride nanotubes, carbon nanotube, zinc nanotube, graphene, myosin, actin, metal, steel, Kevlar filament, metal-oxide, alloy, silk, cotton, wool, latex, rubber, aluminum, copper, polymers, ceramic, metals, cement, and concrete.

Example SEs also include naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

Additives. The following is a non-comprehensive list of preferred structural entities, often categorized as the additives of a composite material.

Group 3: Additives.

Calcium carbonate, silicates, glass fibres, glass bulbs, asbestos, talc, kaolin, mica, barium sulfate, metal oxides and hydroxides, wood fiber, carbon fiber, bamboo fiber, UV absorbers, colourants, plasticisers, aluminum fiber, carbon black, graphite, wood flour and flours or fibers of other natural products, synthetic fibers; nano-materials, very finely dispersed or exfoliated layer structures are particularly useful, as for example montmorillonite, bentonite and the like, as well as natural or synthetic nano-tube fillers like halloysites, zeolites or carbon-based nano-tubes or layer materials of the graphene or boron nitride type.

In a preferred embodiment, the structural entity is a nucleating agent. Nucleating agents minimize the size of the interphase around fillers. By incorporating the nucleating agent into the CMU of the present invention, it is possible to control the crystalizing tendency of the interphase, and in this way improve the quality of a composite material. See also Example 13 and FIGS. 41 to 43.

Nucleating agents suitable for the present invention includes, but are not limited to: aromatic carboxylic acid salts; sodium benzoate; talc; pigment colorants; phosphate ester salts; calcium carbonate; glass; chalk; clay; kaolin; silicates; pigments; cadmium red; cobalt yellow; chromium oxide; titanium dioxide; magnesium oxide; carbonates; sulfates; carbon black; salts of carboxylic acids; benzophenone; polymers; organic liquids; polyamide-66; molybdenum disulfide; iron sulfide; titanium dioxide; sodium phenylphosphinate; potassium stearate; organic pigments; sodium benzoate; kaolin; triphenodithiazine; pimelic acid with calcium stearate; calcium stearate; pimelic acid; quinacridone permanent red dye; N,N-dicyclohexylnaphthalene-2,6-dicarboxamide; 1,2,3,4-bis-dibenzylidene sorbitol (DBS); 1,2,3,4-bis-(p-methoxybenzylidene sorbitol) (DOS); 1,2,3,4-bis-(3,4-dimethylbenzylidene sorbitol) (MBDS); 1,3:2,4-di(3,4-dimethylbenzylidene) sorbitol (DMDBS); metal salts of substituted aromatic heterocyclic phosphate; sodium 2,2'-methylene-bis-(4,6-di-t-butylphenylene)phosphate (NA-11); salts of 2,2'-methylene-bis-(4,6-di-t-butylphenylene) phosphate; lithium 2,2'-methylene-bis-(4,6-di-t-butylphenylene)phosphate; potassium 2,2'-methylene-bis-(4,6-di-t-butylphenylene)phosphate; linear trans quinacridone (LTQ); γ-modification of LTO; calcium carboxylates, calcium salts of suberic acid (Ca-sub), calcium salts of pimelic acid (Ca-pim); N,N'-dicyclohexyl-2,6-naphtalene dicarboxamide (NJS); bicyclo[2.2.1]heptane dicarboxylate salt (HPN-68); Hyperform HPN-20E; ionomers; metal oxides; metal hybrids; organic compounds; residual catalysts; polymers; fibers; hydroxyl group-containing triglyceride oils; organic acid metal salts.

As can be seen, the structural entities SE1 and SE2 may e.g. both be a polymer, both may be an additive, both may be a filler, or one may be an additive and the other a polymer, or some other structural entity.

SE1 or SE2 may be the most abundant part of a matrix material. For example, in a composite material of PVC and carbon nanotubes, where a linker carrying two MLs or Ligand2s, one of which is attached to a PVC polymer molecule and the other is attached to a carbon nanotube, and where the PVC polymers constitute ~99% of the composite material and the carbon nanotubes constitute ~1% of the composite material, the PVC is considered the matrix material of the composite.

SE1 and SE2 may be the same or different. Example pairs of SE1 and SE2 are shown below:

| SE1 | SE2 |
|---|---|
| Carbon nanotube | Epoxy |
| Carbon nanotube | Polyvinyl |
| Carbon nanotube | Polystyrene |
| Graphene | Epoxy |
| Kevlar | Polypropylene |
| Silk | Metal (e.g. iron, zinc, copper) |
| Metal alloy | Collagen |
| Collagen | Carbon nanotube |
| Myosin | Steel |
| Actin | Carbon nanotube |
| Cement (C-S-H) | Nanotube |
| Carbon nanotube | Carbon nanotube |
| Graphene | Graphene |
| Carbon nanotube | Carbon nanotube |
| Polyvinyl | Polyvinyl |
| BN | BNNT |

The abovementioned structural entities (SEs) may be modified. Thus, a structural entity may be modified by the addition of one or more functional groups. Examples of simple functional groups are OH, NH2, CO, COOH, SH. More complex functional groups are biotin, antibody, and metal chelate.

In a preferred embodiment this modification introduces a charged or polar group. The polar or charged group may be advantageous in order to make the SE soluble, or in order to allow strong ionic bond interactions with another SE or with a linker moiety. As an example, CNTs may be modified with charged or polar groups in order to make the CNTs soluble in polar solvents. In another preferred embodiment the modification of the SE introduces a reactive yet non-polar, non-charged group. Such groups may be preferable in cases where for example the polymerization reaction forming a composite material is inhibited by polar or charged groups. An example functionalisation is the introduction of a polyvinyl group on the surface of a CNT. Alternatively, the functionalization may be mediated by the binding of mechanical ligands that either themselves modify the characteristics of the CNT in a desired way, or mechanical ligands that carry functional groups that mediate the desired change in characteristics of the CNT.

Mechanical Ligand (ML) and Ligand2.

A precursor-ML, ML or Ligand2 suitable for the present invention may have a number of characteristics. One important characteristic is the affinity (or dissociation constant) of the interaction between the SE and either of the precursor-ML, ML, or Ligand2. A high affinity of the precursor-ML for the SE will increase the number of precursor-MLs that are bound at a given time, and therefore may increase the number of precursor-MLs that are turned into a ML. However, if certain binding modes of the precursor-ML are incompatible with the formation of the ML, a lower affinity may be preferred, as a lower affinity is typically associated with faster off-rates and therefore faster kinetics of association/dissociation, which will allow the precursor-ML to be involved in a larger number of binding events, potentially increasing the likelihood of the correct binding mode to take place, and thereby promoting ML formation. Once the ML has been formed, a high affinity may serve to lock the ML at the position where it was formed, which can be advantageous in some cases. In other cases, an even distribution of the MLs on the SE may be promoted by MLs with lower affinity for the SE. For Ligand2 it may be attractive in some cases that the Ligand2 is tightly associated with the SE, as this may increase eg. the strength of a composite material. If on the other hand flexibility of a composite material is desired, it may be advantageous that the Ligand2 binds the SE with lower affinity, allowing the Ligand2 to dissociate more easily from the SE.

For any characteristics of a precursor-ML, ML or Ligand2 mentioned above, and in each characteristic's entire range, a further characteristic of importance is the molecular weight (MW) of the precursor-ML, ML or Ligand2.

MW of Precursor-ML, ML or Ligand2.

The molecular weight of the precursor-ML, ML or Ligand2 may be of high economic importance (smaller compounds typically cost less to produce), and also, a smaller molecular weight is often indicative of a smaller surface of interaction with the SE, wherefore typically a higher number of precursor-ML, ML or Ligand2s can bind simultaneously to the SE if their MWs are low. Thus, depending on the context, the MW is preferably less than 100,000,000 Dal, such as less than 10,000,000 Dal, such as less than 5,000,000 Dal, such as less than 2,000,000 Dal, such as less than 1,000,000 Dal, such as less than 500,000 Dal, such as less than 200,000 Dal, such as less than 100,000 Dal, such as less than 40,000 Dal, such as less than 20,000 Dal, such as less than 10,000 Dal, such as less than 7,000 Dal, such as less than 5,000 Dal, such as less than 3,000 Dal, such as less than 2,000 Dal, such as less than 1,700 Dal, such as less than 1,400 Dal, such as less than 1,200 Dal, such as less than 1,000 Dal, such as less than 900 Dal, such as less than 800 Dal, such as less than 700 Dal, such as less than 600 Dal, such as less than 500 Dal, such as less than 400 Dal, such as less than 300 Dal, such as less than 200 Dal, such as less than 100 Dal, such as less than 1 Dal.

However, it is typically easier to prepare a precursor-ML, ML or Ligand2 of high affinity if its molecular weight is higher. Thus, depending on the context, the MW is preferably greater than 1 Dal, such as greater than 100 Dal, such as greater than 200 Dal, such as greater than 300 Dal, such as greater than 400 Dal, such as greater than 500 Dal, such as greater than 600 Dal, such as greater than 700 Dal, such as greater than 800 Dal, such as greater than 900 Dal, such as greater than 1,000 Dal, such as greater than 1,200 Dal, such as greater than 1,400 Dal, such as greater than 1,700 Dal, such as greater than 2,000 Dal, such as greater than 3,000 Dal, such as greater than 5,000 Dal, such as greater than 7,000 Dal, such as greater than 10,000 Dal, such as greater than 20,000 Dal, such as greater than 40,000 Dal, such as greater than 100,000 Dal, such as greater than 200,000 Dal, such as greater than 500,000 Dal, such as greater than 1,000,000 Dal, such as greater than 2,000,000 Dal, such as greater than 5,000,000 Dal, such as greater than 10,000,000 Dal, such as greater than 100,000,000 Dal.

Therefore, depending on the application and context, the molecular weight of a precursor-ML, ML or Ligand2 may preferably be low, medium or high. Preferred embodiments of the present invention therefore include precursor-ML, ML or Ligand2s with molecular weight of 1-100 Dal; 100-200 Dal, 200-300 Dal, 300-400 Dal, 400-500 Dal, 500-600 Dal, 600-700 Dal, 700-800 Dal, 800-900 Dal, 900-1000 Dal, 1,000-1200 Dal, 1,200-1,400 Dal, 1,400-1,700 Dal, 1,700-2,000 Dal, 2,000-3,000 Dal, 3,000-5,000 Dal, 5,000-7,000 Dal, 7,000-10,000 Dal, 10,000-20,000 Dal, 20,000-40,000 Dal, 40,000-100,000 Dal, 100,000-200,000 Dal, 200,000-500,000 Dal, 500,000-1,000,000 Dal, 1,000,000-2,000,000 Dal, 2,000,000-5,000,000 Dal, 5,000,000-10,000,000 Dal, 10,000,000-100,000,000 Dal, or larger than 100,000,000 Dal.

Chemical Moieties.

The precursor-ML's, ML's or Ligand2's content of chemical moieties is important, either because the chemical moiety is important for the interaction with the SE, or because the chemical moiety is important for reactivity or non-reactivity of the precursor-ML, ML or Ligand2 with e.g. the polymerization reaction. Generally preferred chemical moieties include —NH2, —COOH, —CONH2, —SH, phenyl, benzene, and. The following chemical motifs are preferred chemical motifs comprised within fullerene-binding precursor-MLs, MLs or Ligand2s, and are particularly preferred chemical motifs of CNT- and graphene-binding precursor-MLs, MLs, or Ligand2s, suitable for use in the present invention:

- Aromatic systems, including benzene, nitrobenzene, toluene, 1,2,3-trichlorbenzene, 1,2,4-trichlorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants;
- Halogens, nitro group, amine, thiol, alcohol, ester, amide, carboxylic acid, phenol, indole, imidazole, sulfonate and phophate;
- Alkane, including hexane and heptane;
- Soap-type molecules, including chemical motifs comprising a long alkane (including C4, C5, C6, C7, C8, C9, C10, C11, C12, C13, C14, C15, C16, C17, C18, C19, C20, C21, C22, C23, C24, C25) and a polar end group such as sulfonate, for example SDBS, Sodium dodecylbenzenesulfonate;
- Lactames, such as N-methyl-pyrrolidone and lactones;
- Peptides, in particular peptides with hydrophilic amino acids at the ends of the peptide and hydrophobic amino acids in the middle.
- Peptides such as QLMHDYR, CPTSTGQAC, CTLHVSSYC, RLNPPSQMDPPF, QTWPPPLWFSTS, HTDWRLGTWHHS, ELWSIDTSAHRK, IFRLSWGTYFS, HWKHPWGAWDTL, ELWR, ELWRPTR, KPRSVSG-dansyl, TGTG-F-GTCT, TGTG-V-GTCT, TGTG-W-GTCT, TGTG-T-GTCT, TGTG-G-GTCT, TGTG-N-GTCT, TGTG-K-GTCT, TGTG-D-GTCT, MHGKTQATSGTIQS, DAEFRHDSGYEVHHQKLVFFAEDVGSNKGAIIGLMVGGVVIA, DAEFRHDSGYEVHHQKLVFFAEDVGSNKGAIIGLMVGGVV, CHKKPSKSC, RKLPDAPGMHTW, SCSDCLKSVDFIPSSLASS, YLTMPTP, FSWEAFA, HLESTPG, GETRAPL, RHEPPLA, GETQCAA, FPGRPSP, HTAQSTA, HKPDANR, FPGHSGP, THLPWQT, GETQCAA, FPGRPSP, HTAQSTA, VKTQATSREEPPRLPSKHRPG
- Amino acids such as phenylalanine, tyrosine, tryptophan, histidine;
- Heteroaromatic systems, including pyrole, thiophene, furane, pyrazole, imidazole, isoxazole, oxazole, isothiazole, thiazole, pyridine and perylene bisimides
- Fused ring systems, composed of either aromatic, non-aromatic or anti-aromatic rings or combinations thereof.

Affinity of Non-Covalent Ligand2.

For non-covalent interactions, a low affinity (i.e. a high dissociation constant) may sometimes be preferred. For example, if flexibility of a composite material is desired, it may be preferred that the Ligand2-SE interaction is weak, allowing easy dissociation. Thus, depending on the context, the dissociation constant is preferably greater than $10^{-30}$ M, such as greater than $10^{-25}$ M, such as greater than $10^{-20}$ M, such as greater than $10^{-18}$M, such as greater than 10-16 M, such as greater than $10^{-15}$ M, such as greater than $10^{-14}$ M, such as greater than $10^{-13}$ M, such as greater than $10^{-12}$ M, such as greater than $10^{-11}$ M, such as greater than $10^{-10}$ M, such as greater than $10^{-9}$ M, such as greater than $10^{-8}$M, such as greater than $10^{-7}$ M, such as greater than $10^{-6}$M, such as greater than $10^{-5}$ M, such as greater than $10^{-4}$ M, such as greater than $10^{-3}$ M, such as greater than $10^{-2}$ M, such as greater than $10^{-1}$ M.

Alternatively, if high strength and low flexibility of a composite material is required, it may be desired to have a very tight binding of a non-covalent Ligand2 to the SE. Thus, depending on the context, the dissociation constant is preferably less than $10^{-1}$ M, such as less than $10^{-2}$ M, such as less than $10^{-3}$ M, such as less than $10^{-4}$ M, such as less than $10^{-5}$ M, such as less than $10^{-6}$M, such as less than $10^{-7}$ M, such as less than $10^{-8}$M, such as less than $10^{-9}$ M, such as less than $10^{-10}$ M, such as less than $10^{-11}$ M, such as less than $10^{-12}$ M, such as less than $10^{-13}$ M, such as less than $10^{-14}$ M, such as less than $10^{-15}$ M, such as less than $10^{-16}$M, such as less than $10^{-18}$M, such as less than $10^{-20}$ M, such as less than $10^{-25}$ M, such as less than $10^{-30}$ M.

Also, if a Ligand2's binding strength is strongly dependent on temperature, systems can be designed that are flexible at high temperatures and rigid at lower temperatures, effectuated by the Ligand2's affinity for the SE. Thus, preferred embodiments of non-covalently interacting Ligand2s of the present invention include Ligand2s whose dissociation constant for the interaction with SE is smaller than $10^{-30}$ M, and include Ligand2s whose dissociation constant is in one of the following ranges: $10^{-30}$-$10^{-25}$ M, $10^{-25}$-$10^{-20}$ M, $10^{-20}$-$10^{-18}$ M, $10^{-18}$-$10^{-16}$M, $10^{-16}$-$10^{-15}$ M, $10^{-15}$-$10^{-14}$ M, $10^{-14}$-$10^{-13}$ M, $10^{-13}$-$10^{-12}$ M, $10^{-12}$-$10^{-11}$ M, $10^{-11}$-$10^{-10}$ M, $10^{-10}$-$10^{-9}$M, $10^{-9}$-$10^{-8}$M, $10^{-8}$-$10^{-7}$M, $10^{-7}$-$10^{-6}$M, $10^{-6}$-$10^{-5}$ M, $10^{-5}$-$10^{-4}$ M, $10^{-4}$-$10^{-3}$ M, $10^{-3}$-$10^{-2}$ M, $10^{-2}$-$10^{-1}$ M, or larger than $10^{-1}$ M.

As described above and below, the precursor-ML, ML and/or Ligand2 will often contain chemical motifs that interact with the SE. Below is a list of such preferred chemical motifs, appropriate for making CMUs by combination with the indicated SEs, and their binding strength for different SEs (e.g. in the form of a dissociation constant).

Group 4: Chemical motifs and the structural entities with which they react.

| Chemical Motif[a] | MW [g/mol] | $K_d$[b] [M] | $K_d$/MW [M/Dal] | SE[c] | Affinity parameter value[d] | Ref.[e] |
|---|---|---|---|---|---|---|
| Nitrobenzene | 123.1 | | | MWNT | 1,380 L/kg | Kragulj et al. 2013 |
| Hexane | 86.2 | | | MWNT | 2,291 L/kg | Kragulj et al. 2013 |
| Benzene | 78.1 | | | MWNT | 126 L/kg | Kragulj et al. 2013 |
| Toluene | 92.1 | | | MWNT | 331 L/kg | Kragulj et al. 2013 |
| 1,2,3-Trichloro-benzene | 181.5 | | | MWNT | 12,882 L/kg | Kragulj et al. 2013 |
| 1,2,4-Trichloro-benzene | 181.5 | | | MWNT | 5,370 L/kg | Kragulj et al. 2013 |
| Naphtalene | 128.2 | | | MWNT | 2,951 L/kg | Kragulj et al. 2013 |
| Phenanthrene | 178.2 | | | MWNT | 87,096 L/kg | Kragulj et al. 2013 |
| Pyrene | 202.3 | | | MWNT | 229,087 L/kg | Kragulj et al. 2013 |
| Fluoranthene | 202.3 | | | MWNT | 204,174 L/kg | Kragulj et al. 2013 |
| Nitrobenzene | 123.1 | | | MWNT (acid treated, 3 hours) | 575 L/kg | Kragulj et al. 2013 |
| Hexane | 86.2 | | | MWNT (acid treated, 3 hours) | 813 L/kg | Kragulj et al. 2013 |
| Benzene | 78.1 | | | MWNT (acid treated, 3 hours) | 302 L/kg | Kragulj et al. 2013 |
| Toluene | 92.1 | | | MWNT (acid treated, 3 hours) | 269 L/kg | Kragulj et al. 2013 |
| 1,2,3 -Trichloro-benzene | 181.5 | | | MWNT (acid treated, 3 hours) | 7,586 L/kg | Kragulj et al. 2013 |
| 1,2,4-Trichloro-benzene | 181.5 | | | MWNT (acid treated, 3 hours) | 2,754 L/kg | Kragulj et al. 2013 |
| Naphtalene | 128.2 | | | MWNT (acid treated, 3 hours) | 4,786 L/kg | Kragulj et al. 2013 |
| Phenanthrene | 178.2 | | | MWNT (acid treated, 3 hours) | 199,526 L/kg | Kragulj et al. 2013 |
| Pyrene | 202.3 | | | MWNT (acid treated, 3 hours) | 457,088 L/kg | Kragulj et al. 2013 |

-continued

Group 4: Chemical motifs and the structural entities with which they react.

| Chemical Motif[a] | MW [g/mol] | $K_d$[b] [M] | $K_d$/MW [M/Dal] | SE[c] | Affinity parameter value[d] | Ref.[e] |
| --- | --- | --- | --- | --- | --- | --- |
| Fluoranthene | 202.3 | | | MWNT (acid treated, 3 hours) | 371,535 L/kg | Kragulj et al. 2013 |
| Nitrobenzene | 123.1 | | | MWNT (acid treated, 6 hours) | 182 L/kg | Kragulj et al. 2013 |
| Hexane | 86.2 | | | MWNT (acid treated, 6 hours) | 562 L/kg | Kragulj et al. 2013 |
| Benzene | 78.1 | | | MWNT (acid treated, 6 hours) | 20 L/kg | Kragulj et al. 2013 |
| Toluene | 92.1 | | | MWNT (acid treated, 6 hours) | 32 L/kg | Kragulj et al. 2013 |
| 1,2,3-Trichloro-benzene | 181.5 | | | MWNT (acid treated, 6 hours) | 8,511 L/kg | Kragulj et al. 2013 |
| 1,2,4-Trichloro-benzene | 181.5 | | | MWNT (acid treated, 6 hours) | 9,772 L/kg | Kragulj et al. 2013 |
| Naphtalene | 128.2 | | | MWNT (acid treated, 6 hours) | 6,918 L/kg | Kragulj et al. 2013 |
| Phenanthrene | 178.2 | | | MWNT (acid treated, 6 hours) | 301,995 L/kg | Kragulj et al. 2013 |
| Pyrene | 202.3 | | | MWNT (acid treated, 6 hours) | 3,548,134 L/kg | Kragulj et al. 2013 |
| Fluoranthene | 202.3 | | | MWNT (acid treated, 6 hours) | 3,715,352 L/kg | Kragulj et al. 2013 |
| Naphtalene | 128.2 | | | SWNT | 10,000 L/kg | Ji et al. 2008 |
| Naphtalene | 128.2 | | | MWNT | 1,000 L/kg | Ji et al. 2008 |
| Naphtalene | 128.2 | | | Activated carbon | 1,000,000 L/kg | Ji et al. 2008 |
| Naphtalene | 128.2 | | | Graphite | 1,000 L/kg | Ji et al. 2008 |
| Tetracycline | 444.4 | | | SWNT | 100,000 L/kg | Ji et al. 2008 |
| Tetracycline | 444.4 | | | MWNT | 10,000 L/kg | Ji et al. 2008 |
| Tetracycline | 444.4 | | | Activated carbon | 10,000 L/kg | Ji et al. 2008 |
| Tetracycline | 444.4 | | | Graphite | 10,000 L/kg | Ji et al. 2008 |
| QLMHDYR | 962.1 | 1.6E-05 | 1.7E-08 | PLLA (melt crystallization) | 6.1E+04 $M^{-1}$ | Matsuno et al. 2008 |

-continued

| Group 4: Chemical motifs and the structural entities with which they react. | | | | | | |
|---|---|---|---|---|---|---|
| Chemical Motif[a] | MW [g/mol] | $K_d$[b] [M] | $K_d$/MW [M/Dal] | SE[c] | Affinity parameter value[d] | Ref.[e] |
| QLMHDYR | 962.1 | 1.8E-04 | 1.8E-07 | PMMA (atactic) | 5.7E+03 $M^{-1}$ | Matsuno et al. 2008 |
| QLMHDYR | 962.1 | 1.5E-04 | 1.5E-07 | PLLA (amorphous) | 6.8E+03 $M^{-1}$ | Matsuno et al. 2008 |
| QLMHDYR | 962.1 | 6.7E-05 | 6.9E-08 | PLLA (layer by layer) | 1.5E+04 $M^{-1}$ | Matsuno et al. 2008 |
| QLMHDYR | 962.1 | 2.1E-05 | 2.2E-08 | PDLA | 4.8E+04 $M^{-1}$ | Matsuno et al. 2008 |
| CPTSTGQAC | 867 | 2.8E-07 | 3.2E-10 | Platinum | 3.6E+06 $M^{-1}$ | Seker et al. 2011 |
| CTLHVSSYC | 1,012 | 1.1E-06 | 1.1E-09 | Platinum | 9.0E+05 $M^{-1}$ | Seker et al. 2011 |
| RLNPPSQMD-PPF | 1,399 | 8.3E-06 | 6.0E-09 | Silica | 1.2E+05 $M^{-1}$ | Seker et al. 2011 |
| QTWPPPLWF-STS | 1,447 | 8.1E-07 | 5.6E-10 | Silica | 1.2E+06 $M^{-1}$ | Seker et al. 2011 |
| HTDWRLGT-WHHS | 1,533 | 1.3E-06 | 8.5E-10 | PPV (hyper-branched) | 7.7E+05 $M^{-1}$ | Eijima et al. 2010 |
| HTDWRLGT-WHHS | 1,533 | 1.9E-05 | 1.3E-08 | PPV (linear) | 5.2E+04 $M^{-1}$ | Eijima et al. 2010 |
| ELWSIDTSA-HRK | 1,443 | 2.7E-05 | 1.9E-08 | PPV (hyper-branched) | 3.7E+04 $M^{-1}$ | Eijima et al. 2010 |
| ELWSIDTSA-HRK | 1,443 | 1.3E-05 | 9.0E-09 | PPV (linear) | 7.7E+04 $M^{-1}$ | Eijima et al. 2010 |
| Sodium dodecyl-benzenesulfonate | 288.4 | 8.9E-04 | 3.1E-06 | SWNT (8,6) | 1.1E+03 $M^{-1}$ | Sim et al. 2013 |
| Sodium dodecyl-benzenesulfonate | 288.4 | 7.1E-04 | 2.5E-06 | SWNT (6,5) | 1.4E+03 $M^{-1}$ | Sim et al. 2013 |
| Sodium dodecyl-benzenesulfonate | 288.4 | 6.4E-04 | 2.2E-06 | SWNT (10,2) | 1.6E+03 $M^{-1}$ | Sim et al. 2013 |
| IFRLSWGTYFS | 1,377 | 2.0E-05 | 1.5E-08 | SWNT (HiPco, raw) | 5.0E+04 $M^{-1}$ | iL et al. 2013 |
| HWKHPWGA-WDTL | 1,534 | 5.0E-05 | 3.3E-08 | MWNT (array) | 2.0E+04 $M^{-1}$ | Wang et al. 2003 |
| ELWR | 602.7 | 6.3E-04 | 1.0E-06 | PMMA (isotactic) | 1.6E+03 $M^{-1}$ | Serizawa et al. 2007 |
| ELWRPTR | 957.1 | 3.6E-06 | 3.7E-09 | PMMA (isotactic) | 2.8E+05 $M^{-1}$ | Serizawa et al. 2007 |
| ELWRPTR | 957.1 | 1.5E-04 | 1.5E-07 | PMMA (syndio-tactic) | 6.8E+03 $M^{-1}$ | Serizawa et al. 2007 |
| KPRSVSG | 965 | 5.4E-06 | 5.6E-09 | Ceramic fluorapatite | 1.9E+05 $M^{-1}$ | Islam et al. 2012 |
| KPRSVSG | 965 | 7.2E-06 | 7.5E-09 | Ceramic hydroxyl-apatite | 1.4E+05 $M^{-1}$ | Islam et al. 2012 |

-continued

| Chemical Motif[a] | MW [g/mol] | $K_d$[b] [M] | $K_d$/MW [M/Dal] | SE[c] | Affinity parameter value[d] | Ref.[e] |
|---|---|---|---|---|---|---|
| Group 4: Chemical motifs and the structural entities with which they react. | | | | | | |
| Pyrene | 202.3 | 6.1E−02 | 3.0E−04 | SWNT (plasma purified) | 1.6E+01 $M^{-1}$ | Juan et al. 2015 |
| Pyrene | 202.3 | 4.2E−02 | 2.1E−04 | SWNT (plasma purified) | 2.4E+01 $M^{-1}$ | Juan et al. 2015 |
| Pyrene | 202.3 | 4.8E−02 | 2.4E−04 | SWNT (plasma purified) | 2.1E+01 $M^{-1}$ | Juan et al. 2015 |
| Pyrene | 202.3 | 1.1E−01 | 5.5E−04 | SWNT (plasma purified) | 9.0E+00 $M^{-1}$ | Juan et al. 2015 |
| Pyrene | 202.3 | 2.2E−01 | 1.1E−03 | SWNT (plasma purified) | 4.5E+00 $M^{-1}$ | Juan et al. 2015 |
| Pyrene | 202.3 | 3.8E−04 | 1.9E−06 | SWNT (plasma purified) | 2.6E+03 $M^{-1}$ | Juan et al. 2015 |
| Pyrene | 202.3 | 2.4E−02 | 1.2E−04 | SWNT (6,5) | 4.1E+01 $M^{-1}$ | Juan et al. 2015 |
| Pyrene | 202.3 | 6.3E−01 | 3.1E−03 | SWNT (6,5) | 1.6E+00 $M^{-1}$ | Juan et al. 2015 |
| Pyrene | 202.3 | 6.3E−01 | 3.1E−03 | SWNT (6,5) | 1.6E+00 $M^{-1}$ | Juan et al. 2015 |
| Pyrene | 202.3 | 1.0E−03 | 4.9E−06 | SWNT (6,5) | 1.0E+03 $M^{-1}$ | Juan et al. 2015 |
| Pyrene diamine | 230 | 4.5E−03 | 2.0E−05 | SWNT (plasma purified) | 2.2E+02 $M^{-1}$ | Juan et al. 2015 |
| Pyrene diamine | 230 | 3.4E−02 | 1.5E−04 | SWNT (6,5) | 2.9E+01$M^{-1}$ | Juan et al. 2015 |
| Pyrene phenyl ester | 240 | 1.1E−02 | 4.6E−05 | SWNT (plasma purified) | 9.0E+01 $M^{-1}$ | Juan et al. 2015 |
| Pyrene phenyl ester | 240 | 5.0E−02 | 2.1E−04 | SWNT (plasma purified) | 2.0E+01 $M^{-1}$ | Juan et al. 2015 |
| Dipyrene phenyl ester | 440 | 1.5E−04 | 3.5E−07 | SWNT (plasma purified) | 6.5E+03 $M^{-1}$ | Juan et al. 2015 |
| Dipyrene phenyl ester | 440 | 2.5E−04 | 5.7E−07 | SWNT (plasma purified) | 4.0E+03 $M^{-1}$ | Juan et al. 2015 |
| Bis-pyrene U-shape molecule | 640 | 1.4E−04 | 2.2E−07 | SWNT (plasma purified) | 7.0E+03 $M^{-1}$ | Juan et al. 2015 |
| TGTGFGTCT | 844 | | | Quartz | −0.8 kcal/mol | Aby et al. 2012 |
| TGTGVGTCT | 796 | | | Quartz | 0.0 kcal/mol | Aby et al. 2012 |
| TGTGWGTCT | 883 | | | Quartz | 0.0 kcal/mol | Aby et al. 2012 |

-continued

| Group 4: Chemical motifs and the structural entities with which they react. | | | | | | |
|---|---|---|---|---|---|---|
| Chemical Motif[a] | MW [g/mol] | $K_d$[b] [M] | $K_d$/MW [M/Dal] | SE[c] | Affinity parameter value[d] | Ref.[e] |
| TGTGTGTCT | 798 | | | Quartz | 0.0 kcal/mol | Aby et al. 2012 |
| TGTGGGTCT | 754 | | | Quartz | -0.9 kcal/mol | Aby et al. 2012 |
| TGTGNGTCT | 811 | | | Quartz | -1.2 kcal/mol | Aby et al. 2012 |
| TGTGKGTCT | 825 | | | Quartz | -0.2 kcal/mol | Aby et al. 2012 |
| TGTGDGTCT | 812 | | | Quartz | -0.1 kcal/mol | Aby et al. 2012 |
| TGTGFGTCT | 844 | | | Glass | -2.2 kcal/mol | Aby et al. 2012 |
| TGTGVGTCT | 796 | | | Glass | -0.9 kcal/mol | Aby et al. 2012 |
| TGTGWGTCT | 883 | | | Glass | -0.3 kcal/mol | Aby et al. 2012 |
| TGTGTGTCT | 798 | | | Glass | -1.0 kcal/mol | Aby et al. 2012 |
| TGTGGGTCT | 754 | | | Glass | -1.9 kcal/mol | Aby et al. 2012 |
| TGTGNGTCT | 811 | | | Glass | -2.2 kcal/mol | Aby et al. 2012 |
| TGTGKGTCT | 825 | | | Glass | -0.9 kcal/mol | Aby et al. 2012 |
| TGTGDGTCT | 812 | | | Glass | -0.2 kcal/mol | Aby et al. 2012 |
| TGTGFGTCT | 844 | | | PMMA | -2.2 kcal/mol | Aby et al. 2012 |
| TGTGVGTCT | 796 | | | PMMA | -2.0 kcal/mol | Aby et al. 2012 |
| TGTGWGTCT | 883 | | | PMMA | -0.9 kcal/mol | Aby et al. 2012 |
| TGTGTGTCT | 798 | | | PMMA | -0.3 kcal/mol | Aby et al. 2012 |
| TGTGGGTCT | 754 | | | PMMA | -2.1 kcal/mol | Aby et al. 2012 |
| TGTGNGTCT | 811 | | | PMMA | -2.8 kcal/mol | Aby et al. 2012 |
| TGTGKGTCT | 825 | | | PMMA | -1.2 kcal/mol | Aby et al. 2012 |
| TGTGDGTCT | 812 | | | PMMA | -2.5 kcal/mol | Aby et al. 2012 |
| TGTGFGTCT | 844 | | | HDPE | -3.9 kcal/mol | Aby et al. 2012 |
| TGTGVGTCT | 796 | | | HDPE | -4.0 kcal/mol | Aby et al. 2012 |
| TGTGWGTCT | 883 | | | HDPE | -2.1 kcal/mol | Aby et al. 2012 |

-continued

Group 4: Chemical motifs and the structural entities with which they react.

| Chemical Motif[a] | MW [g/mol] | $K_d$[b] [M] | $K_d$/MW [M/Dal] | SE[c] | Affinity parameter value[d] | Ref.[e] |
|---|---|---|---|---|---|---|
| TGTGTGTCT | 798 | | | HDPE | −1.8 kcal/mol | Aby et al. 2012 |
| TGTGGGTCT | 754 | | | HDPE | −3.6 kcal/mol | Aby et al. 2012 |
| TGTGNGTCT | 811 | | | HDPE | −3.5 kcal/mol | Aby et al. 2012 |
| TGTGKGTCT | 825 | | | HDPE | −3.9 kcal/mol | Aby et al. 2012 |
| TGTGDGTCT | 812 | | | HDPE | −2.8 kcal/mol | Aby et al. 2012 |
| m-Dinitrobenzene | 168.11 | | | Graphene | 0.0569 L/mg | Chen et al. 2015 |
| m-Dinitrobenzene | 168.11 | | | Graphene oxide | 0.00299 L/mg | Chen et al. 2015 |
| m-Dinitrobenzene | 168.11 | | | Graphene oxide (reduced) | 0.162 L/mg | Chen et al. 2015 |
| Nitrobenzene | 123.06 | | | Graphene | 0.0118 L/mg | Chen et al. 2015 |
| Nitrobenzene | 123.06 | | | Graphene oxide | 0.00105 L/mg | Chen et al. 2015 |
| Nitrobenzene | 123.06 | | | Graphene oxide (reduced) | 0.0330 L/mg | Chen et al. 2015 |
| p-Nitrotoluene | 137.14 | | | Graphene | 0.0939 L/mg | Chen et al. 2015 |
| p-Nitrotoluene | 137.14 | | | Graphene oxide | 0.00395 L/mg | Chen et al. 2015 |
| p-Nitrotoluene | 137.14 | | | Graphene oxide (reduced) | 0.121 L/mg | Chen et al. 2015 |
| MHGKTQATS-GTIQS$_7$ | 10,018 | 1.5E−10 | 1.5E−14 | Gold | 6.7E+09 $M^{-1}$ | Brown 1997 |
| DAEFRHDSGY-EVHHQKLVFF-AEDVGSNKGA-IIGLMVGGVVIA | 4,514 | 6.3E−18 | 1.4E−21 | Copper | 1.6E+17 $M^{-1}$ | Atwood et al. 2000 |
| DAEFRHDSGY-EVHHQKLVFF-AEDVGSNKGA-IIGLMVGGVV | 4,330 | 5.0E−11 | 1.2E−14 | Copper | 2.0E+10 $M^{-1}$ | Atwood et al. 2000 |
| CHKKPSKSC | 1,015 | 4.1E−09 | 4.0E−12 | Silica | 2.5E+08 $M^{-1}$ | Chen et al. 2006 |
| RKLPDAPGM-HTW | 1,408 | 1.3E−05 | 9.4E−09 | Titanium | 7.6E+04 $M^{-1}$ | Sano et al. 2005 |
| SCSDCLKSVD-FIPSSLASS | 1,946 | 2.5E−07 | 1.3E−10 | Titanium | 4.0E+06 $M^{-1}$ | Meyers et al. 2007 |
| YLTMPTP | 822 | 5.0E−12 | 6.1E−15 | Polystyrene (syndiotactic) | 2.0E+11 $M^{-1}$ | Serizawa et al. 2007 |
| FSWEAFA | 857 | 8.5E−11 | 9.9E−14 | Polystyrene (atactic) | 1.2E+10 $M^{-1}$ | Serizawa et al. 2007 |

-continued

| Group 4: Chemical motifs and the structural entities with which they react. | | | | | | |
|---|---|---|---|---|---|---|
| Chemical Motif[a] | MW [g/mol] | $K_d$[b] [M] | $K_d$/MW [M/Dal] | SE[c] | Affinity parameter value[d] | Ref.[e] |
| FSWEAFA | 857 | 3.4E-11 | 4.0E-14 | Polystyrene (isotactic) | 2.9E+10 $M^{-1}$ | Serizawa et al. 2007 |
| FSWEAFA | 857 | 6.1E-12 | 7.1E-15 | Polystyrene (syndiotactic) | 1.6E+11 $M^{-1}$ | Serizawa et al. 2007 |
| HLESTPG | 740 | 1.0E-10 | 1.4E-13 | Polystyrene (atactic) | 9.8E+09 $M^{-1}$ | Serizawa et al. 2007 |
| HLESTPG | 740 | 6.5E-11 | 8.8E-14 | Polystyrene (isotactic) | 1.5E+10 $M^{-1}$ | Serizawa et al. 2007 |
| HLESTPG | 740 | 7.9E-12 | 1.1E-14 | Polystyrene (syndiotactic) | 1.3E+11 $M^{-1}$ | Serizawa et al. 2007 |
| GETRAPL | 743 | 6.7E-11 | 9.0E-14 | Polystyrene (atactic) | 1.5E+10 $M^{-1}$ | Serizawa et al. 2007 |
| GETRAPL | 743 | 3.6E-11 | 4.9E-14 | Polystyrene (isotactic) | 2.8E+10 $M^{-1}$ | Serizawa et al. 2007 |
| GETRAPL | 743 | 6.7E-12 | 9.0E-15 | Polystyrene (syndiotactic) | 1.5E+11 $M^{-1}$ | Serizawa et al. 2007 |
| RHEPPLA | 819 | 5.6E-11 | 6.8E-14 | Polystyrene (atactic) | 1.8E+10 $M^{-1}$ | Serizawa et al. 2007 |
| RHEPPLA | 819 | 2.1E-11 | 2.6E-14 | Polystyrene (isotactic) | 4.7E+10 $M^{-1}$ | Serizawa et al. 2007 |
| RHEPPLA | 819 | 1.1E-11 | 1.3E-14 | Polystyrene (syndiotactic) | 9.4E+10 $M^{-1}$ | Serizawa et al. 2007 |
| GETQCAA | 679 | 3.4E-11 | 5.0E-14 | Polystyrene (atactic) | 3.0E+10 $M^{-1}$ | Serizawa et al. 2007 |
| YLTMPTP | 822 | 2.2E-11 | 2.6E-14 | Polystyrene (atactic) | 4.6E+10 $M^{-1}$ | Serizawa et al. 2007 |
| FPGRPSP | 757 | 3.1E-11 | 4.1E-14 | Polystyrene (atactic) | 3.2E+10 $M^{-1}$ | Serizawa et al. 2007 |
| HTAQSTA | 715 | 1.4E-11 | 2.0E-14 | Polystyrene (atactic) | 7.0E+10 $M^{-1}$ | Serizawa et al. 2007 |
| HKPDANR | 837 | 2.5E-11 | 3.0E-14 | PMMA (conditioned syndiotactic film) | 4.0E+10 $M^{-1}$ | Serizawa et al. 2007 |
| FPGHSGP | 698 | 1.0E-10 | 1.4E-13 | PMMA (non-conditioned syndiotactic film) | 1.0E+10 $M^{-1}$ | Serizawa et al. 2007 |
| THLPWQT | 882 | 6.7E-11 | 7.6E-14 | PMMA (non-conditioned syndiotactic film) | 1.5E+10 $M^{-1}$ | Serizawa et al. 2007 |
| GETQCAA | 679 | 7.4E-12 | 1.1E-14 | Polystyrene (syndiotactic) | 1.4E+11 $M^{-1}$ | Serizawa et al. 2007 |
| FPGRPSP | 757 | 8.5E-12 | 1.1E-14 | Polystyrene (syndiotactic) | 1.2E+11 $M^{-1}$ | Serizawa et al. 2007 |
| HTAQSTA | 715 | 1.0E-11 | 1.4E-14 | Polystyrene (syndiotactic) | 9.7E+10 $M^{-1}$ | Serizawa et al. 2007 |

-continued

Group 4: Chemical motifs and the structural entities with which they react.

| Chemical Motif[a] | MW [g/mol] | $K_d$[b] [M] | $K_d$/MW [M/Dal] | SE[c] | Affinity parameter value[d] | Ref.[e] |
|---|---|---|---|---|---|---|
| VKTQATSREE-PPRLPSKHRPG$_4$ | 9,433 | 1.0E−10 | 1.1E−14 | Zeolite | 1.0E+10 $M^{-1}$ | Nygaard et al. 2002 |
| PQAQDVELPQ-ELQDQHREVEV$_5$ | 12,366 | 4.0E−11 | 3.2E−15 | SWNT (HiPco, purified) | 2.5E+10 $M^{-1}$ | Brown et al. 2008 |

[a]All chemical motifs denoted by capital letters are peptide sequences; for polypeptides, the subscripts denote how many times the peptide sequence is repeated. [b]$K_d$ is the dissociation constant. [c]MWNT is multi walled carbon nanotube; SWNT is single walled carbon nanotube; PLLA is polylactic acid; PMMA is poly(methyl methacrylate); PDLA is poly-D-lactide; PPV is poly(p-phenylene vinylene); HDPE is high-density polyethylene; numbers in brackets after SWNTs denote chirality, e.g. (6,5). [d]Affinity parameter values with the unit L/kg are affinities expressed as the adsorption distribution coefficient; affinity parameter values with the unit $M^{-1}$ are affinities expressed as the affinity constant $K_a$, which is equal to $1/K_d$; affinity parameter values with the unit kcal/mol are affinities expressed as the standard-state adsorption free energy values ($\Delta G^o_{ads}$); affinity parameter values with the unit L/mg are affinities expressed as Langmuir affinity constant ($K_L$).

For any characteristics of a precursor-ML, ML or Ligand2 mentioned above, and in each characteristic's entire range, a further characteristic of importance is the Affinity-to-MW ratio of the precursor-ML, ML or Ligand2, respectively.

Binding constant-to-MW ratio of precursor-ML, ML or Ligand2, In some cases, it is not the absolute affinity of a precursor-ML, ML or Ligand2 for an SE that is important, but rather the affinity-to-MW ($K_B$/MW) ratio that is important. As an example, if the economical cost of preparing two small Ligand2s with a combined binding constant for an SE of $K_B$=1010 $M^{-1}$ is smaller than the cost of preparing one larger Ligand2 with the same binding constant, it may be desirable to use the smaller Ligand2s. Thus, depending on the context, the $K_B$/MW ratio is preferably greater than 1 $M^{-1}$/Dal, such as greater than $10^6$ $M^{-1}$/Dal, such as greater than $10^{10}$ $M^{-1}$/Dal, such as greater than $10^{13}$ $M^{-1}$/Dal, such as greater than $10^{16}$ $M^{-1}$/Dal, such as greater than $10^{18}$ $M^{-1}$/Dal, such as greater than $10^{20}$ $M^{-1}$/Dal.

However, if the processing of the composite material is performed more easily using fewer precursor-MLs, MLs, or Ligand2s, it may be desirable to use larger precursor-MLs, MLs, or Ligand2s, respectively. Thus, depending on the context, the $K_B$/MW ratio is preferably less than $10^{20}$ $M^{-1}$/Dal, such as less than $10^{18}$ $M^{-1}$/Dal, such as less than $10^{16}$ $M^{-1}$/Dal, such as less than $10^{13}$ $M^{-1}$/Dal, such as less than $10^{10}$ $M^{-1}$/Dal, such as less than $10^6$ $M^{-1}$/Dal, such as less than 1 $M^{-1}$/Dal.

Thus, the preferred compromise between many small precursor-MLs, MLs, or Ligand2s with relatively high $K_B$/MW ratios and fewer large precursor-MLs, MLs, or Ligand2s, respectively, with relatively low $K_B$/MW ratios depends on the context. Preferred embodiments include precursor-MLs, MLs, or Ligand2s with $K_B$/MW ratios of from 1 $M^{-1}$/Dal to $10^{20}M^{-1}$/Dal, more preferably precursor-MLs, MLs, or Ligand2s with $K_B$/MW ratios of from $10^3$ $M^{-1}$/Dal to $10^{20}M^{-1}$/Dal, more preferably precursor-MLs, MLs, or Ligand2s with $K_B$/MW ratios of from $10^6$ $M^{-1}$/Dal to $10^{20}M^{-1}$/Dal, more preferably precursor-MLs, MLs, or Ligand2s with $K_B$/MW ratios of from $10^{10}$ $M^{-1}$/Dal to $10^{20}M^{-1}$/Dal, more preferably precursor-MLs, MLs, or Ligand2s with $K_B$/MW ratios of from $10^{13}$ $M^{-1}$/Dal to $10^{20}M^{-1}$/Dal, more preferably precursor-MLs, MLs, or Ligand2s with $K_B$/MW ratios of from $10^{16}$ $M^{-1}$/Dal to $10^{20}M^{-1}$/Dal, more preferably precursor-MLs, MLs, or Ligand2s with $K_B$/MW ratios of from $10^{18}$ $M^{-1}$/Dal to $10^{20}M^{-1}$/Dal, and more preferably precursor-MLs, MLs, or Ligand2s with $K_B$/MW ratios larger than $10^{20}M^{-1}$/Dal.

For any characteristics of a precursor-ML or Ligand2 mentioned above, and in each characteristic's entire range, a further characteristic of importance is the half-life of the precursor-ML-SE complex or the Ligand2-SE complex, respectively.

Half-Life of Precursor-ML or Ligand2.

In many cases, precursor-MLs or Ligand2s with large half-lifes are preferred. This is for example the case for Ligand2s in composite materials where the characteristics of the composite material should change as little over time as possible, e.g. in structural elements of buildings, bridges, etc. Thus, depending on the context, the half-life is preferably greater than 0.01 second, such as greater than 0.1 second, such as greater than 1 second, such as greater than 10 seconds, such as greater than 1 minute, such as greater than 10 minutes, such as greater than 1 hour, such as greater than 5 hours, such as greater than 10 hours, such as greater than 24 hours, such as greater than 2 days, such as greater than 10 days, such as greater than 50 days, such as greater than 100 days, such as greater than 1 year, such as greater than 10 years.

In other cases, precursor-MLs or Ligand2s with short half-lifes are preferred. This may be the case if it is desirable that a material gives in after some prespecified time. Thus, depending on the context, the half-life is preferably less than 10 years, such as less than 1 year, such as less than 100 days, such as less than 50 days, such as less than 10 days, such as less than 2 days, such as less than 24 hours, such as less than 10 hours, such as less than 5 hours, such as less than 1 hour, such as less than 10 minutes, such as less than 1 minute, such as less than 10 seconds, such as less than 1 second, such as less than 0.1 second, such as less than 0.01 second.

Thus, the preferred compromise between long half-lifes and short half-lifes depends on the context and half-lifes suitable for the present invention can be shorter than 0.01 second, but may also include half-lifes in the following ranges: 0.01-0.1 seconds, 0.1-1 seconds, 1-10 seconds, 10-60 seconds, 1-10 minutes, 10-60 minutes, 1-5 hours, 5-10 hours, 10-24 hours, 1-2 days, 2-10 days, 10-50 days, 50-100 days, 100-365 days, 1-10 years, or more than 10 years. Eg. when the Ligand2-SE interaction is characterized by an appropriately long half-life, the SE and Ligand2 will remain associated for a long time, and the composite material comprising such CMUs will retain its characteristics for a longer period of time.

Half-life-to-MW ratio of precursor-ML or Ligand2. In some cases, it is not the half-life (T½) of a precursor-ML or Ligand2 for an SE that is important, but rather the half-life-to-MW (T½/MW) ratio that is important. As an example, if the economical cost of preparing two small precursor-MLs with a combined half life for an SE of T½=5 days is smaller than the cost of preparing one larger precursor-ML with the same binding constant, it may be desirable to use the smaller precursor-MLs. Thus, depending on the context, the T½/MW ratio is preferably greater than $10^{-8}$ days/Dal, such as greater than $10^{-6}$ days/Dal, such as greater than $10^{-4}$ days/Dal, such as greater than 0.01 days/Dal, such as greater than 1 days/Dal, such as greater than 100 days/Dal, such as greater than 10,000 days/Dal.

However, if the processing of the composite material is performed more easily using fewer precursor-MLs or Ligand2s, it may be desirable to use larger precursor-MLs or Ligand2s. Thus, depending on the context, the T½/MW ratio is preferably less than 10,000 days/Dal, such as less than 100 days/Dal, such as less than 1 days/Dal, such as less than 0.01 days/Dal, such as less than $10^{-4}$ days/Dal, such as less than $10^{-6}$ days/Dal, such as less than $10^{-8}$ days/Dal.

Thus, the preferred compromise between a high and low T½/MW ratio depends on the context, and may be lower than $10^{-8}$ days/Dal, but may also be in the range of $10^{-8}$-$10^{-6}$ days/Dal, $10^{-6}$-$10^{-4}$ days/Dal, $10^{-4}$-0.01 days/Dal, 0.01-1 days/Dal, 1-100 days/Dal, 100-10,000 days/Dal, or above 10,000 days/Dal.

For any characteristics of a precursor-ML, ML or Ligand2 mentioned above, and in each characteristic's entire range, a further characteristic of importance is the charge of the precursor-ML, ML or Ligand2.

Charge of Precursor-ML, ML or Ligand2.

The charge of the precursor-ML, ML or Ligand2 can be important. As an example, if the precursor-ML, ML or Ligand2 is used as a means to prepare a nanosensor, where a conducting nanotube is used to sense the binding of certain analytes to another SE, linked to the nanotube by way of the precursor-ML, ML or Ligand2, then the charge of the precursor-ML, ML or Ligand2, respectively, is likely to have an effect on the conductivity of the nanotube (and hence, an effect on the read-out), which may not always be desirable. A precursor-ML, ML or Ligand2 carrying a charge may also be a disadvantage during the preparation of a composite material comprising CMUs, because the charge may interfere with e.g. polymerization of the matrix material. Alternatively, a ligand carrying a charge can help disperse an SE in certain solvents, in which case it will be an advantage to have a charged precursor-ML, ML or Ligand2. Thus, depending on the context, the net charge at pH 7 is preferably greater than −10, such as greater than −9, such as greater than −8, such as greater than −7, such as greater than −6, such as greater than −5, such as greater than −4, such as greater than −3, such as greater than −2, such as greater than −1, such as greater than 0, such as greater than 1, such as greater than 2, such as greater than 3, such as greater than 4, such as greater than 5, such as greater than 6, such as greater than 7, such as greater than 8, such as greater than 9, such as greater than 10, such as greater than 11, such as greater than 12, such as greater than 13. Preferred embodiments of the present invention include precursor-MLs, MLs or Ligand2s with a net charge at pH 7 of less than −10, or a net charge of −10, or −9, −8, −7, −6, −5, −4, −3, −2, −1, 0 (e.g. the amino acid alanine), +b 1, +2, +3, +4, +5, +6, +7, +8, +9, +10, +11, +12, +13, or more than a net charge of +13.

Likewise, preferred embodiments of the present invention include precursor-MLs, MLs or Ligand2s with a total number of charges (positive or negative charges) of 0, 1, 2 (e.g. the amino acid alanine at pH 7), 3, 4, 5, 6, 7, 8, 9, 10, 11, 12, 13-15, 15-20, 20-30, 30-50, 50-100, or more than 100.

For any characteristics of a precursor-ML, ML or Ligand2 mentioned above, and in each characteristic's entire range, a further characteristic of importance is the surface area of interaction of the precursor-ML, ML or Ligand2 with the SE.

Surface Area of the Interaction of the Precursor-ML, ML or Ligand2 with the SE.

The surface area of interaction between the precursor-ML, ML or Ligand2 and SE determines how many precursor-MLs, MLs, or Ligand2s can bind to a given SE. Therefore, the surface area of interaction can be an important parameter and in some cases, a large surface area of interaction is desirable, as it may allow the precursor-ML to bind with a higher affinity to the SE. Thus, depending on the context, the surface area of interaction is preferably greater than 20 Å$^2$, such as greater than 100 Å$^2$, such as greater than 200 Å$^2$, such as greater than 300 Å$^2$, such as greater than 500 Å$^2$, such as greater than 700 Å$^2$, such as greater than 1,000 Å$^2$, such as greater than 2,000 Å$^2$, such as greater than 4,000 Å$^2$, such as greater than 8,000 Å$^2$, such as greater than 15,000 Å$^2$, such as greater than 30,000 Å$^2$, such as greater than 100,000 Å$^2$.

In other cases, a small surface area of interaction is desirable, e.g if a higher number of precursor-ML, ML or Ligand2 must be bound to the SE, and thus, depending on the context, the surface area of interaction is preferably less than 100,000 Å$^2$, such as less than 30,000 Å$^2$, such as less than 15,000 Å$^2$, such as less than 8,000 Å$^2$, such as less than 4,000 Å$^2$, such as less than 2,000 Å$^2$, such as less than 1,000 Å$^2$, such as less than 700 Å$^2$, such as less than 500 Å$^2$, such as less than 300 Å$^2$, such as less than 200 Å$^2$, such as less than 100 Å$^2$, such as less than 20 Å$^2$.

Preferred embodiments of the present invention include precursor-MLs, MLs, or Ligand2s that contact the SE over a surface area of less than 20 Å$^2$, or contact the SE over a surface area of 20-100 Å$^2$, 100-200 Å$^2$, 200-300 Å$^2$, 300-500 Å$^2$, 500-700 Å$^2$, 700-1,000 Å$^2$, 1,000-2,000 Å$^2$, 2,000-4,000 Å$^2$, 4,000-8,000 Å$^2$, 8,000-15,000 Å$^2$, 15,000-30,000 Å$^2$, 30,000-100,000 Å$^2$, or more than 100,000 Å$^2$.

For any characteristics of a precursor-ML, ML or Ligand2 mentioned above, and in each characteristic's entire range, further characteristics of importance are the Affinity-to-charge ratio of the precursor-ML, ML or Ligand2, respectively, the Affinity to area-of-interaction ratio of the precursor-ML, ML or Ligand2, respectively, the degradability and biodegradability of the precursor-ML, ML or Ligand2, respectively, and the intrinsic stability of the precursor-ML, ML or Ligand2, respectively.

Particularly the biodegradability is of importance. Degradation by enzymes such as peptidases, nucleases and other enzymes commonly found in nature can decrease the lifetime of a composite material, wherefore it is often advantageous to avoid the use of natural and unnatural oligonucleotides, natural and unnatural polypeptides (comprising natural and unnatural amino acids), and in general avoid the use of polyamides or amide bonds in general, or any other kind of chemical entity or bond that is commonly found in nature.

In short, when trying to avoid biodegradation, it is often advantageous to use components for the making of composite materials that do not resemble too strongly the chemical entities found in nature. Thus, use of precursor-MLs, MLs, or Ligand2s (and structural entities and linkers) that do not contain peptides or nucleotides is often preferable.

Chemical stability is also of importance. It is generally advantageous to use precursor-MLs, MLs, or Ligand2s that are chemically stable (e.g. stable towards high temperature, low or high pH, high pressure, etc), in order to ensure that the precursor-ML's, ML's or Ligand2's characteristics, especially the affinity for the structural entity, remain relatively constant under varying conditions.

In another preferred embodiment it is advantageous to use biodegradable components, to avoid e.g. long term pollution of the environment.

Precursor-MLs, MLs, or Ligand2s may be organic or inorganic.

Further, precursor-MLs, MLs, or Ligand2s may be polymers or may be non-polymeric in structure. Preferred polymeric precursor-MLs, MLs, or Ligand2s include the polymers listed above and below.

The polymeric precursor-MLs, MLs, or Ligand2s can be divided into biological polymers and non-biological polymers.

Biological polymers shall here be defined as the polymers involved in the transcriptional and translational process, i.e. natural nucleic acids (RNA or DNA), or natural polypeptides. Natural polypeptides can be further divided into peptides, proteins and antibodies.

Peptide-based precursor-MLs, MLs, or Ligand2s. The number of amino acids (AA) of the precursor-ML, ML or Ligand2 may be of high economic importance (smaller peptides typically cost less to produce), and also, a smaller peptide is often indicative of a smaller surface of interaction with the SE, wherefore typically a higher number of precursor-MLs, MLs, or Ligand2s can bind simultaneously to the SE if each precursor-ML, ML or Ligand2 comprise fewer amino acids. Thus, depending on the context, the peptide-based precursor-ML, ML or Ligand2 is preferably comprised of fewer than 100 AA, such as fewer than 90 AA, such as fewer than 80 AA, such as fewer than 70 AA, such as fewer than 60 AA, such as fewer than 50 AA, such as fewer than 40 AA, such as fewer than 30 AA, such as fewer than 25 AA, such as fewer than 20 AA, such as fewer than 15 AA, such as fewer than 10 AA, such as fewer than 9 AA, such as fewer than 8 AA, such as fewer than 7 AA, such as fewer than 6 AA, such as fewer than 5 AA, such as fewer than 4 AA, such as fewer than 3 AA, such as fewer than 2 AA.

However, it is typically easier to prepare a peptide-based precursor-ML, ML or Ligand2 of high affinity if it comprises more amino acids. Thus, depending on the context, the peptide-based precursor-ML, ML or Ligand2 is preferably comprised of more than 1 AA, such as more than 2 AA, such as more than 3 AA, such as more than 4 AA, such as more than 5 AA, such as more than 6 AA, such as more than 7 AA, such as more than 8 AA, such as more than 9 AA, such as more than 10 AA, such as more than 15 AA, such as more than 20 AA, such as more than 25 AA, such as more than 30 AA, such as more than 40 AA, such as more than 50 AA, such as more than 60 AA, such as more than 70 AA, such as more than 80 AA, such as more than 90 AA, such as more than 100 AA.

Thus, the preferred compromise between peptide-based precursor-MLs, MLs, or Ligand2s comprising few or many amino acids depends on the context, and may be lower than 2 AA, but may also be in the range: 2-3 AA, 3-4 AA, 4-5 AA, 5-6 AA, 6-7 AA, 7-8 AA, 8-9 AA, 9-10 AA, 10-15 AA, 15-20 AA, 20-25 AA, 25-30 AA, 30-40 AA, 40-50 AA, 50-60 AA, 60-70 AA, 70-80 AA, 80-90 AA, 90-100 AA, or more than 100 AA.

Preferred peptide-based precursor-MLs, MLs, or Ligand2s include the following peptides, as well as all shorter peptide sequences that may be derived from these peptide sequences:

```
PQAQDVELPQELQDQHREVEV5 =
PQAQDVELPQELQDQHREVEVPQAQDVELPQELQDQHREVEVPQAQDVEL
PQELQDQHREVEVPQAQDVELPQELQDQHREVEVPQAQDVELPQELQDQH
REVEV)
```

Non-biological polymers include polymers that are not RNA, DNA or natural polypeptides, e.g. including PVC, epoxy, unnatural polypeptides (i.e. not solely comprising alpha-amino acids) and unnatural nucleic acids (e.g. PNA, LNA and other unnatural nucleic acids).

The polymeric precursor-MLs, MLs, or Ligand2s can be further divided into linear and branched polymers. The branched polymers may be further divided into short-chain branched polymers, long-chain branched polymers, star-branched polymers, ladder polymers and network polymers.

The precursor-MLs, MLs, or Ligand2s can be further divided into precursor-MLs, MLs, or Ligand2s comprising solely aliphatic moieties, comprising solely aromatic moieties, or comprising both aliphatic and aromatic moieties.

The precursor-MLs, MLs, or Ligand2s can be further divided into precursor-MLs, MLs, or Ligand2s comprising solely single bonds, solely double bonds, solely triple bonds, solely aromatic bonds, or a combination of single-, double-, triple and aromatic bonds.

Organic precursor-MLs, MLs, or Ligand2s include natural and unnatural polypeptides, lipids, polysaccharides, wood, flour, Inorganic precursor-MLs, MLs, or Ligand2s include metal ions, Cu+, Cu2+, Fe2+, Fe3+, Hg2+, $Hg_2$2+, Pb2+, Pb4+, Sn2+, Sn4+, Cr2+, Cr3+, Mn2+, Mn3+, Co2+, Co3+.

Identities and Number of Different Elements of a Precursor-ML, ML or Ligand2.

The Precursor-ML, ML or Ligand2 may be composed of only one element, two elements, three elements, four elements, or more than four elements.

Precursor-MLs, MLs, or Ligand2s consisting of one element. The precursor-ML, ML or Ligand2 may consist of just one atom (in its non-charged form or as an ion, e.g. Gd or Gd+++), or may consist of several atoms, held together in an organized structure.

The following ions are particularly preferred precursor-MLs, MLs, or Ligand2s: K+, Cl−, Ca++, Mg++, Gd+++, Cu+, Cu2+, Fe2+, Fe3+, Hg2+, $Hg_2$2+, Pb2+, Pb4+, Sn2+, Sn4+, Cr2+, Cr3+, Mn2+, Mn3+, Co2+, Co3+.

If comprising only one element, or one type of element, the element may be any one of the following elements: Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of precursor-MLs, MLs, or Ligand2s consisting of only carbon (C) include the following: Fullerenes including graphene and carbon nanotubes, carbon fiber, and pyrene.

Precursor-MLs, MLs, or Ligand2s consisting of two elements. If comprising only two elements, or two types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of precursor-MLs, MLs, or Ligand2s consisting of only carbon (C) and hydrogen (H) include the following: polyethylene, polypropylene, polystyrene, phenylacetylene, naphthalene, ethylbenzene, phenanthrene, pyrene, decane, benzo(a)pyrene, trans-cyclooctene, anhydrous 1-octyne, meso-1,2-diphenylethylene, 1,2,3,4-tetrahydro-naphthalene, benzo[a]phenanthrene, 1,1-di(phenyl)ethylene, 1,2-benzacenaphthene, 1,2-dihydroacenaphthylene, 1,2-benzanthracene, perylene, 1-iso-propyl-4-methylbenzene, N-dodecane, tert-butyl benzene, 1-methyl-naphthalene, α-n-hexadecene, 1-n-decene, phenylenemethyl-ethylene, trans-2-methylstyrene, ethylmethylbenzene, 2-methyl-naphthalene, 4-methylstyrene, triphenylemethane, 1-phenyl-1-propyne, 2,2,4-trimethylpentane, 4-methyl phenyl acetylene, hexamethylbenzene, [3.3.1]nonane, p-mentha-1,8-diene, acetnaphthylene, 1,2,4,5-tetramethyl benzene, 2,6,6-trimethylbicyclo[3.1.1]hept-2-ene, 1,2,4-trimethyl benzene, tricyclo[3.3.1.1 {3,7}]decane, butylbenzene, 2,3-benzanthracene, 4-methyl-biphenyl, β-carotene, and derivatives thereof.

Comprising Al and Cl: Aluminium trichloride

Comprising Al and O: Aluminum oxide

Comprising Nb and O: Niobium oxide

Comprising C and F: Polytetrafluoroethylene, pentafluoropropylene, 1,1,4,4,4-pentafluoro-2-butyne, pentafluoroethane.

Comprising C and Cl: 1,1,2,2-tetrachloroethylene, hexachloro-benzene.

Precursor-MLs, MLs, or Ligand2s consisting of three elements. If comprising only three elements, or three types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Examples of precursor-MLs, MLs, or Ligand2s consisting of three elements include:

Comprising C, H, Cl: Polyvinylchloride

Comprising C, H, O: Poly(vinylalcohol)

Comprising Ag, C, O: Silver carbonate, silver(I) oxalate

Comprising C, H, Cl: 3,3',4,4',5,5'-hexachlorobiphenyl; 1,2,4,5-TeCB; 2,4'-DDT; pentachloroethane; pentachlorobenzene Precursor-MLs, MLs, or Ligand2s consisting of four elements. If comprising only four elements, or three types of elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Precursor-MLs, MLs, or Ligand2s consisting of four elements include:

Comprising C, H, Cl, O: 1,2,3,6,7,8-hexachlorooxanthrene; 4,4'-dichloro-benzophenone; Dieldrite; α,α-diphenylacetyl chloride; 1,2,3,4,6,7,8-H7CDF; 1,2,3,4,7,8-hexachlorooxanthrene; 2,3-dichloro-1,4-dihydro-1,4-dioxonaphthalene; 1,2,3,7,8,9-hexachlorooxanthrene.

Precursor-MLs, MLs, or Ligand2s consisting of more than four elements. If comprising more than four elements, the elements may include any of the following:

Hydrogen (H), Lithium (Li), Beryllium (Be), Boron (B), Carbon (C), Nitrogen (N), Oxygen (O), Fluorine (F), Sodium (Na), Magnesium (Mg), Aluminium (Al), Silicon (Si), Phosphorus (P), Sulfur (S), Chlorine (Cl), Potassium (K), Calcium (Ca), Scandium (Sc), Titanium (Ti), Vanadium (V), Chromium (Cr), Manganese (Mn), Iron (Fe), Cobalt (Co), Nickel (Ni), Copper (Cu), Zinc (Zn), Gallium (Ga), Germanium (Ge), Arsenic (As), Selenium (Se), Bromine (Br), Rubidium (Rb), Strontium (Sr), Yttrium (Y), Zirconium (Zr), Niobium (Nb), Molybdenum (Mo), Technetium (Tc), Ruthenium (Ru), Rhodium (Rh), Palladium (Pd), Silver (Ag), Cadmium (Cd), Indium (In), Tin (Sn), Antimony (Sb), Tellurium (Te), Iodine (I), Caesium (Cs), Barium (Ba), Platinum (Pt), Gold (Au), Mercury (Hg), Thallium (Tl), Lead (Pb), Bismuth (Bi).

Precursor-MLs, MLs, or Ligand2s consisting of more than four elements include:

Comprising N, H, Br, 0, C: 1-amino-4-bromo-2-nitrobenzene, 5,7-dibromo-8-hydroxy quinolone; 4-Bromophenyl isothiocyanate; 2-(bromoacetyl)-thiophene A precursor-ML, ML or Ligand2 may contain chemical motifs that bind SE, as described above. The following is a non-comprehensive list of such chemical motifs that bind SE, where the SE that the chemical motif binds to, or may bind to, follows in parenthesis. Some of these chemical motifs bind only weakly to the SEs.

Group 5: Chemical Motifs and the SEs they Bind.

- Polystyrene (carbon nanotube)
- Riboflavin (carbon nanotube)
- DNA (carbon nanotube)
- Porphyrine (carbon nanotube)
- Pyrenyl (carbon nanotube)
- SDBS (carbon nanotube)
- Polypeptide with sequence SVSVGMKPSPRPGGGK (hydroxyapatite)
- Polypeptide with sequence THRTSTLDYFVI (chlorine-doped polypyrrole)
- Benzene (carbon nanotubes)
- Naphthalene (carbon nanotubes)
- Biphenyl (carbon nanotubes)
- Fluorene (carbon nanotubes)
- Phenanthrene (carbon nanotubes)
- Anthracene (carbon nanotubes)
- Pyrene (carbon nanotubes; graphene)
- Triphenylene (carbon nanotubes)
- P-terphenyl (carbon nanotubes)
- Tetraphene (carbon nanotubes)
- Pyrenecarboxylic acid (carbon nanotubes)
- SDS (carbon nanotubes)
- SDSA (carbon nanotubes)
- DTAB (carbon nanotubes)
- NaDDBS (carbon nanotubes)
- Tween-60 (carbon nanotubes)
- Tween-80 (carbon nanotubes)
- Monostearate (carbon nanotubes)
- Monooleate (carbon nanotubes)
- PSPEO (carbon nanotubes)
- PVP (carbon nanotubes)
- Sulfonate (carbon nanotubes)

Subligands.

Ligand2 may comprise one or more subligands held together by one or more sub-linkers. As an example, Ligand2 may comprise two subligands, each of which is capable of binding SE1, and which are linked by a sub-linker. The subligands of Ligand2 may be linked in series or in parallel.

The subligands may be of varying affinities. In a preferred embodiment, the subligands of Ligand2 are arranged in series, and the SubLigand closest to LinkerL is of weak affinity, and therefore easy to dissociate from SE1, and the SubLigand farthest away from LinkerL is of high affinity and therefore difficult to dissociate from SE1. In composite materials where SE1 is a structural entity of high strength (e.g. a carbon nanotube) and SE2 is a polymer such as epoxy or poplypropylene, the composite material made up of CMUs comprising subligands as described immediately above will be very flexible, but will also be of high strength. By using SubLigands of varying affinities, as well as using linkers of varying lengths, the flexibility and strength of the composite material can be varied. Moreover, CMUs comprising Ligands with more than one SubLigand will add self-healing properties to a composite material in which they are used. Thus, if during applied stress to the composite material one of the SubLigand-SE interactions is interrupted, the other SubLigand may stay associated with the SE, and upon removal of the applied stress, the interrupted SubLigand-SE interaction may re-form, thereby re-establishing the shape of the composite material.

The subligands may also be arranged in parallel, in which case the corresponding composite material will be less flexible but often have higher strength.

A similar principle is applied in Example 9, D. Here, the linker connecting the ML (here attached to a nanotube) and SE2 (here a polymer molecule) comprises two ligands with affinity for the nanotube. As described in example 9, D this functions as a molecular shock absorber.

Covalent Bonds.

Mechanical ligands as well as Ligand2s typically comprise one or more covalent bonds. Ligand2s capable of covalently linking SEs with the linker may comprise functional groups such as OH, COOH, NH2, SH and CO, but can be any atom or molecule capable of forming a chemical bond with another atom or molecule. Below is shown a number of reactive/functional groups, and the covalent bond that each pair of functional groups may form. These functional groups as well as the covalent bond that they form, may be contained in SEs, Linkers, precursor-MLs, MLs and Ligand2s of the present invention:

Group 6: Reactive Groups, and Covalent Bond Formed Upon Reaction.

| Functional group 1 | Functional group 2 | Covalent bond formed |
|---|---|---|
| NH2 | COOH | CONH (amide bond) |
| SH | SH | SS (disulfide bond) |
| CO (aldehyde) | NH2 | CNH (secondary amine bond) |

Covalent bond-forming chemical reactions suitable for forming the covalent bond of or between SEs, Linkers, precursor-MLs, MLs and/or Ligand2s, including the ring-forming reactions of precursor-MLs to produce MLs, include any one or more of the reactions in the list below.

Group 7: Covalent Bond-Forming Chemical Reactions.

- Chemical reactions for synthesizing polymers, small molecules, or other chemical compounds such as those listed in March's Advanced Organic Chemistry, Organic Reactions, Organic Syntheses, organic text books, journals such as Journal of the American Chemical Society, Journal of Organic Chemistry, Tetrahedron, etc., and Carruther's Some Modern Methods of Organic Chemistry can be used. For example, substitution reactions, carbon-carbon bond forming reactions, elimination reactions, acylation reactions, and addition reactions. An illustrative but not exhaustive list of aliphatic nucleophilic substitution reactions useful in the present invention includes, for example, SN2 reactions, SNI reactions, SNi reactions, allylic rearrangements, nucleophilic substitution at an aliphatic trigonal carbon, and nucleophilic substitution at a vinylic carbon.
- Specific aliphatic nucleophilic substitution reactions with oxygen nucleophiles include, for example, hydrolysis of alkyl halides, hydrolysis of gen-dihalides, hydrolysis of 1,1,1-trihalides, hydrolysis of alkyl esters or inorganic acids, hydrolysis of diazo ketones, hydrolysis of acetal and enol ethers, hydrolysis of epoxides, hydrolysis of acyl halides, hydrolysis of anhydrides, hydrolysis of carboxylic esters, hydrolysis of amides, alkylation with alkyl halides (Williamson Reaction), epoxide formation, alkylation with inorganic esters, alkylation with diazo compounds, dehydration of alcohols, transetherification, alcoholysis of epoxides, alkylation with onium salts, hydroxylation of silanes, alcoholysis of acyl halides, alcoholysis of anhydrides, esterfication of carboxylic acids, alcoholysis of carboxylic esters (transesterfication), alcoholysis of amides, alkylation of carboxylic acid salts, cleavage of ether with acetic anhydride, alkylation of carboxylic acids with diazo compounds, acylation of carboxylic acids with acyl halides; acylation of carlpoxylic acids with carboxylic acids, formation of oxonium salts, preparation of peroxides arid hydroperoxides, preparation of inorganic esters (e.g., nitrites, nitrates, sulfonates), preparation of alcohols from amines, arid preparation of mixed organic-inorganic anhydrides.

Specific aliphatic nucleophilic substitution reactions with sulfur nucleophiles, which tend to be better nucleophiles than their oxygen analogs, include, for example, attack by SH at an alkyl carbon to form thiols, attack by S at an alkyl carbon to form thioethers, attack by SH or SR at an acyl carbon, formation of disulfides, formation of Bunte salts, alkylation of sulfuric acid salts, and formation of alkyl thiocyanates.

Aliphatic nucleophilic substitution reactions with nitrogen nucleophiles include, for example, alkylation of amines, N-arylation of amines, replacement of a hydroxy by an amino group, transamination, transamidation, alkylation of amines with diazo compounds, animation of epoxides, amination of oxetanes, amination of aziridines, amination of alkanes, formation of isocyanides, acylation of amines by acyl halides, acylation of amines by anhydrides, acylation of amines by carboxylic acids, acylation of amines by carboxylic esters, acylation of amines by amides, acylation of amines by other acid derivatives, N-alkylation or N-arylation of amides and imides, N-acylation of amides and imides, formation of aziridines from epoxides, formation of nitro compounds, formation of azides, formation of isocyanates and isothiocyanates, and formation of azoxy compounds. Aliphatic nucleophilic substitution reactions with halogen nucleophiles include, for example, attack at an alkyl carbon, halide exchange, formation of alkyl halides from esters of sulfuric and sulfonic acids, formation of alkyl halides from alcohols, formation of alkyl halides from ethers, formation of halohydrins from epoxides, cleavage of carboxylic esters with lithium iodide, conversion of diazo ketones to alpha-halo ketones, conversion of amines to halides, conversion of tertiary amines to cyanamides (the von Braun reaction), formation of acyl halides from carboxylic acids, and formation of acyl halides from acid derivatives.

Aliphatic nucleophilic substitution reactions using hydrogen as a nucleophile include, for example, reduction of alkyl halides, reduction of tosylates, other sulfonates, and similar compounds, hydrogenolysis of alcohols, hydrogenolysis of esters (Barton-McCombie reaction), hydrogenolysis of nitriles, replacement of alkoxyl by hydrogen, reduction of epoxides, reductive cleavage of carboxylic esters, reduction of a C—N bond, desulfurization, reduction of acyl halides, reduction of carboxylic acids, esters, and anhydrides to aldehydes, and reduction of amides to aldehydes.

Aliphatic nucleophilic substitution reactions using carbon nucleophiles include, for example, coupling with silanes, coupling of alkyl halides (the Wurtz reaction), the reaction of alkyl halides and sulfonate esters with Group I (I A), and II (II A) organometallic reagents, reaction of alkyl halides and sulfonate esters with organocuprates, reaction of alkyl halides and sulfonate esters with other organometallic reagents; allylic and propargylic coupling with a halide substrate, coupling of organometallic reagents with esters of sulfuric and sulfonic acids, sulfoxides, and sulfones, coupling involving alcohols, coupling of organometallic reagents with carboxylic esters, coupling of organometallic reagents with compounds containing an esther linkage, reaction of organometallic reagents with epoxides, reaction of organometallics with aziridine, alkylation at a carbon bearing an active hydrogen, alkylation of ketones, nitriles, and carboxylic esters, alkylation of carboxylic acid salts, alkylation at a position alpha to a heteroatom (alkylation of 1,3-dithianes), alkylation of dihydro-1,3-oxazine (the Meyers synthesis of aldehydes, ketones, and carboxylic acids), alkylation with trialkylboranes, alkylation at an alkynyl carbon, preparation of nitriles, direct conversion of alkyl halides to aldehydes and ketones, conversion of alkyl halides, alcohols, or alkanes to carboxylic acids and their derivatives, the conversion of acyl halides to ketones with organometallic compounds, the conversion of anhydrides, carboxylic esters, or amides to ketones with organometallic compounds, the coupling of acyl halides, acylation at a carbon bearing an active hydrogen, acylation of carboxylic esters by carboxylic esters (the Claisen and Dieckmann condensation), acylation of ketones and nitriles with carboxylic esters, acylation of carboxylic acid salts, preparation of acyl cyanides, and preparation of diazo ketones, ketonic decarboxylation.

Reactions which involve nucleophilic attack at a sulfonyl sulfur atom may also be used in the present invention and include, for example, hydrolysis of sulfonic acid derivatives (attack by OH), formation of sulfonic esters (attack by OR), formation of sulfonamides (attack by nitrogen), formation of sulfonyl halides (attack by halides), reduction of sulfonyl chlorides (attack by hydrogen), and preparation of sulfones (attack by carbon).

Aromatic electrophilic substitution reactions may also be used. Hydrogen exchange reactions are examples of aromatic electrophilic substitution reactions that use hydrogen as the electrophile. Aromatic electrophilic substitution, reactions which use nitrogen electrophiles include, for example, nitration and nitro-dehydrogenation, nitrosation of nitroso-de-hydrogenation, diazonium coupling, direct introduction of the diazonium group, and amination or amino-dehydrogenation. Reactions of this type with sulfur electrophiles include, for example, sulfonation, sulfo-dehydrogenation, halosulfonation, halosulfo-dehydrogenation, sulfurization, and sulfonylation. Reactions using halogen electrophiles include, for example, halogenation, and halodehydrogenation. Aromatic electrophilic substitution reactions with carbon electrophiles include, for example, Friedel-Crafts alkylation, alkylation, alkyldehydrogenation, Friedel-Crafts arylation (the Scholl reaction), Friedel-Crafts acylation, formylation with disubstituted formamides, formylation with zinc cyanide and HCl (the Gatterman reaction), formylation with chloroform (the Reimer-Tiemami reaction), other formylations, formyl-dehydrogenation, carboxylation with carbonyl halides, carboxylation with carbon dioxide (the Kolbe-Schmitt reaction), amidation with isocyanates, N-alkylcarbamoyl-dehydrogenation, hydroxyalkylation, hydroxyalkyl-dehydrogenation, cyclodehydration of aldehydes and ketones, haloalkylation, halo-dehydrogenation, aminoalkylation, amidoalkylation, dialkylaminoalkylation, dialkylamino-dehydrogenation, thioalkylation, acylation with nitriles (the Hoesch reaction), cyanation, and cyano-de hydrogenation. Reactions using oxygen electrophiles include, for example, hydroxylation and hydroxy-dehydrogenation.

Rearrangement reactions include, for example, the Fries rearrangement, migration of a nitro group, migration of a nitroso group (the Fischer-Hepp Rearrangement), migration of an arylazo group, migration of a halogen (the Orton rearrangement), migration of an alkyl group, etc. Other reaction on an aromatic ring include the reversal of a Friedel-Crafts alkylation, decarboxylation of aromatic aldehydes, decarboxylation of aromatic acids, the Jacobsen reaction, deoxygenation, desulfonation, hydro-desulfonation, dehalogenation, hydro-dehalogenation, and hydrolysis of organometallic compounds.

Aliphatic electrophilic substitution reactions are also useful. Reactions using the SEI, SE2 (front), SE2 (back), SEi, addition-elimination, and cyclic mechanisms can be used in the present invention. Reactions of this type with hydrogen as the leaving group include, for example, hydrogen exchange (deuterio-de-hydrogenation, deuteriation), migration of a double bond, and keto-enol tautomerization. Reactions with halogen electrophiles include, for example, halogenation of aldehydes and ketones, halogenation of carboxylic acids and acyl halides, and halogenation of sulfoxides and sulfones. Reactions with nitrogen electrophiles include, for example, aliphatic diazonium coupling, nitrosation at a carbon bearing an active hydrogen, direct formation of diazo compounds, conversion of amides to alpha-azido amides, direct amination at an activated position, and insertion by nitrenes. Reactions with sulfur or selenium electrophiles include, for example, sulfenylation, sulfonation, and selenylation of ketones and carboxylic esters. Reactions with carbon electrophiles include, for example, acylation at an aliphatic carbon, conversion of aldehydes to beta-keto esters or ketones, cyanation, cyano-de-hydrogenation, alkylation of alkanes, the Stork enamine reaction, and insertion by carbenes. Reactions with metal electrophiles include, for example, metalation with organometallic compounds, metalation with metals and strong bases, and conversion of enolates to silyl enol ethers. Aliphatic electrophilic substitution reactions with metals as leaving groups include, for example, replacement of metals by hydrogen, reactions between organometallic reagents and oxygen, reactions between organometallic reagents and peroxides, oxidation of trialkylboranes to borates, conversion of Grignard reagents to sulfur compounds, halo-demetalation, the conversion of organometallic compounds to amines, the conversion of organometallic compounds to ketones, aldehydes, carboxylic esters and amides, cyano-de-metalation, transmetalation with a metal, transmetalation with a metal halide, transmetalation with an organometallic compound, reduction of alkyl halides, metallo-de-halogenation, replacement of a halogen by a metal from an organometallic compound, decarboxylation of aliphatic acids, cleavage of alkoxides, replacement of a carboxyl group by an acyl group, basic cleavage of beta-keto esters and beta-diketones, haloform reaction, cleavage of non-enolizable ketones, the Haller-Bauer reaction, cleavage of alkanes, decyanation, and hydro-de-cyanation. Electrophilic substitution reactions at nitrogen include, for example, diazotization, conversion of hydrazines to azides, N-nitrosation, N-nitroso-de-hydrogenation, conversion of amines to azo compounds, N-halogenation, N-halo-de-hydrogenation, reactions of amines with carbon monoxide, and reactions of amines with carbon dioxide.

Aromatic nucleophilic substitution reactions may also be used in the present invention. Reactions proceeding via the SNAr mechanism, the SNI mechanism, the benzyne mechanism, the SRN1 mechanism, or other mechanism, for example, can be used. Aromatic nucleophilic substitution reactions with oxygen nucleophiles include, for example, hydroxy-de-halogenation, alkali fusion of sulfonate salts, and replacement of OR or OAr. Reactions with sulfur nucleophiles include, for example, replacement by SH or SR. Reactions using nitrogen nucleophiles include, for example, replacement by NH2, NHR, or NR2, and replacement of a hydroxy group by an amino group: Reactions with halogen nucleophiles include, for example, the introduction halogens. Aromatic nucleophilic substitution reactions with hydrogen as the nucleophile include, for example, reduction of phenols and phenolic esters and ethers, and reduction of halides and nitro compounds. Reactions with carbon nucleophiles include, for example, the Rosenmund-von Braun reaction, coupling of organometallic compounds with aryl halides, ethers, and carboxylic esters, arylation at a carbon containing an active hydrogen, conversions of aryl substrates to carboxylic acids, their derivatives, aldehydes, and ketones, and the Ullmann reaction. Reactions with hydrogen as the leaving group include, for example, alkylation, arylation, and amination of nitrogen heterocycles. Reactions with N2+ as the leaving group include, for example, hydroxy-de-diazoniation, replacement by sulfur-containing groups, iodo-de-diazoniation, and the Schiemann reaction. Rearrangement reactions include, for example, the von Richter rearrangement, the Sommelet-Hauser rearrangement, rearrangement of aryl hydroxylamines, and the Smiles rearrangement. Reactions involving free radicals can also be used, although the free radical reactions used in nucleotide-templated chemistry should be carefully chosen to avoid modification or cleavage of the nucleotide template. With that limitation, free radical substitution reactions can be used in the present invention. Particular free radical substitution reactions include, for example, substitution by halogen, halogenation at an alkyl carbon, allylic halogenation, benzylic halogenation, halogenation of aldehydes, hydroxylation at an aliphatic carbon, hydroxylation at an aromatic carbon, oxidation of aldehydes to carboxylic acids, formation of cyclic ethers, formation of hydroperoxides, formation of peroxides, acyloxylation, acyloxy-de-hydrogenation, chlorosulfonation, nitration of alkanes, direct conversion of aldehydes to amides, amidation and amination at an alkyl carbon, simple coupling at a susceptible position, coupling of alkynes, arylation of aromatic compounds by diazonium salts, arylation of activated alkenes by diazonium salts (the Meerwein arylation), arylation and alkylation of alkenes by organopalladium compounds (the Heck reaction), arylation and alkylation of alkenes by vinyltin compounds (the StHIe reaction), alkylation and arylation of aromatic compounds by peroxides, photochemical arylation of aromatic compounds, alkylation, acylation, and carbalkoxylation of nitrogen heterocydes. Particular reactions in which N2+ is the leaving group include, for example, replacement of the diazonium group by hydrogen, replacement of the diazonium group by chlorine or bromine, nitro-de-diazoniation, replacement of the diazonium group by sulfur-containing groups, aryl dimerization with diazonium salts, methylation of diazonium salts, vinylation of diazonium salts, arylation of diazonium salts, and conversion of diazonium salts to aldehydes, ketones, or carboxylic acids. Free radical substitution reactions with metals as leaving groups include, for example, coupling of Grignard reagents, coupling of boranes, and coupling of other organometallic reagents. Reaction with halogen as the leaving group are included. Other free radical substitution reactions with various leaving groups include, for example, desulfurization with Raney Nickel, conversion of sulfides to organolithium compounds, decarboxylase dimerization (the Kolbe reaction), the Hunsdiecker reaction, decarboxylative allylation, and decarbonylation of aldehydes and acyl halides.

Reactions involving additions to carbon-carbon multiple bonds are also used. Any mechanism may be used in the addition reaction including, for example, electrophilic addition, nucleophilic addition, free radical addition, and cyclic mechanisms. Reactions involving additions to conjugated systems can also be used. Addition to cyclopropane rings can also be utilized. Particular reactions include, for example, isomerization, addition of hydrogen halides, hydration of double bonds, hydration of triple bonds, addition of alcohols, addition of carboxylic acids, addition of H2S and thiols, addition of ammonia and amines, addition of amides, addition of hydrazoic acid, hydrogenation of double and triple bonds, other reduction of double and triple bonds, reduction of the double and triple bonds of conjugated systems, hydrogenation of aromatic rings, reductive cleavage of cyclopropanes, hydroboration, other hydrometalations, addition of alkanes, addition of alkenes and/or alkynes to alkenes and/or alkynes (e.g., pi-cation cyclization reactions, hydro-alkenyl-addition), ene reactions, the Michael reaction, addition of organometallics to double and triple bonds not conjugated to carbonyls, the addition of two alkyl groups to an alkyne, 1,4-addition of organometallic compounds to activated double bonds, addition of boranes to activated double bonds, addition of tin and mercury hydrides to activated double bonds, acylation of activated double bonds and of triple bonds, addition of alcohols, amines, carboxylic esters, aldehydes, etc., carbonylation of double and triple bonds, hydrocarboxylation, hydroformylation, addition of aldehydes, addition of HCN, addition of silanes, radical addition, radical cydization, halogenation of double and triple bonds (addition of halogen, halogen), halolactonization, halolactamization, addition of hypohalous acids and hypohalites (addition of halogen, oxygen), addition of sulfur compounds (addition of halogen, sulfur), addition of halogen and an amino group (addition of halogen, nitrogen), addition of NOX and NO2X (addition of halogen, nitrogen), addition of XN3 (addition of halogen, nitrogen), addition of alkyl halides (addition of halogen, carbon), addition of acyl halides (addition of halogen, carbon), hydroxylation (addition of oxygen, oxygen) (e.g., asymmetric dihydroxylation reaction with OSO4), dihydroxylation of aromatic rings, epoxidation (addition of oxygen, oxygen) (e.g., Sharpless asymmetric epoxidation), photooxidation of dienes (addition of oxygen, oxygen), hydroxysulfenylation (addition of oxygen, sulfur), oxyamination (addition of oxygen, nitrogen), diamination (addition of nitrogen, nitrogen), formation of aziridines (addition of nitrogen), aminosulferiylation (addition of nitrogen, sulfur), acylacyloxylation and acylamidation (addition of oxygen, carbon or nitrogen, carbon), 1,3-dipolar addition; (addition of oxygen, nitrogen, carbon), Diels-Alder reaction, heteroatom Diels-Alder reaction, all carbon 3+2 cycloadditions, dimerization of alkenes, the addition of carbenes and carbenoids to double and triple bonds, trimerization and tetramerization of alkynes, and other cycloaddition reactions.

In addition to reactions involving additions to carbon-carbon multiple bonds, addition reactions to carbon-hetero multiple bonds can be used in nucleotide-templated chemistry. Exemplary reactions include, for example, the addition of water to aldehydes and ketones (formation of hydrates), hydrolysis of carbon-nitrogen double bond, hydrolysis of aliphatic nitro compounds, hydrolysis of nitriles, addition of alcohols and thiols to aldehydes and ketones, reductive alkylation of alcohols, addition of alcohols to isocyanates, alcoholysis of nitriles, formation of xanthates, addition of H2S and thiols to carbonyl compounds, formation of bisulfite addition products, addition of amines to aldehydes and ketones, addition of amides to aldehydes, reductive alkylation of ammonia or amines, the Mannich reaction, the addition of amines to isocyanates, addition of ammonia or amines to nitriles, addition of amines to carbon disulfide and carbon dioxide, addition of hydrazine derivative to carbonyl compounds, formation of oximes, conversion of aldehydes to nitriles, formation of gem-dihalides from aldehydes and ketones, reduction of aldehydes and ketones to alcohols, reduction of the carbon-nitrogen double bond, reduction of nitriles to amines, reduction of nitriles to aldehydes, addition of Grignard reagents and organolithium reagents to aldehydes and ketones, addition of other organometallics to aldehydes and ketones, addition of trialkylallylsilanes to aldehydes and ketones, addition of conjugated alkenes to aldehydes (the Baylis-Billmah reaction), the Reformatsky reaction, the conversion of carboxylic acid salts to ketones with organometallic compounds, the addition of Grignard reagents to acid derivatives, the addition of Organometallic compounds to CO2 and CS2, addition of organometallic compounds to C=IM compounds, addition of carbenes and diazoalkanbs to C═N compounds, addition of Grignard reagents to nitriles and isocyanates, the Aldol reaction, Mukaiyama Aldol and related reactions, Aldol-type reactions between carboxylic esters or amides and aldehydes or ketones, the Knoevenagel reaction (e.g., the Nef reaction, the Favorskii reaction), the Peterson alkenylation reaction, the addition of active hydrogen compounds to CO2 and CS2, the Perkin reaction, Darzens glycidic ester condensation, the Tollens reaction, the Wittig reaction, the Tebbe alkenylation, the Petasis alkenylation, alternative alkenylations, the Thorpe reaction, the Thorpe-Ziegler reaction, addition of silanes, formation of cyanohydrins, addition of HCN to C═N and C—N bonds, the Prins reaction, the benzoin condensation, addition of radicals to C═O, C═S, C═N compounds, the Ritter reaction, acylation of aldehydes and ketones, addition of aldehydes to aldehydes, the addition of isocyanates to isocyanates (formation of carbodiimides), the conversion of carboxylic acid salts to nitriles, the formation of epoxides from aldehydes and ketones, the formation of episulfides and episulfones, the formation of beta-lactones and oxetanes (e.g., the Paterno-Buchi reaction), the formation of beta-lactams, etc. Reactions involving addition to isocyanides include the addition of water to isocyanides, the Passerini reaction, the Ug reaction, and the formation of metalated aldimines Elimination reactions, including alpha, beta, and gamma eliminations, as well as extrusion reactions, can be performed using nucleotide-templated chemistry, although the strength of the reagents and conditions employed should be considered. Preferred elimination reactions include reactions that go by E1, E2, EIcB, or E2C mechanisms. Exemplary reactions include, for example, reactions in which hydrogen is removed from one side (e.g., dehydration of alcohols, cleavage of ethers to alkenes, the Chugaev reaction, ester decomposition, cleavage of quarternary ammonium hydroxides, cleavage of quaternary ammonium salts with strong bases, cleavage of amine oxides, pyrolysis of keto-ylids, decomposition of toluene-p-sulfonylhydrazones, cleavage of sulfoxides, cleavage of selenoxides, cleavage of sulfornes, dehydrogalogenation of alkyl halides, dehydrohalogenation of acyl halides, dehydrohalogenation of sulfonyl halides, elimination of boranes, conversion of alkenes to alkynes, decarbonylation of acyl halides), reactions in which neither leaving atom is hydrogen (e.g., deoxygenation of vicinal diols, cleavage of cyclic thionocarbonates, conversion of epoxides to episulfides and alkenes, the Ramberg-Backlund reaction, conversion of aziridines to alkenes, dehalogenation of vicinal dihalides, dehalogenation of alpha-halo acyl halides, and elimination of a halogen and a hetero group), fragmentation reactions (i.e., reactions in which carbon is the positive leaving group or the electrofuge, such as, for example, fragmentation of gamma-amino and gamma-hydroxy halides, fragmentation of 1,3-diols, decarboxylation of beta-hydroxy carboxylic acids, decarboxylation of (3-lactones, fragmentation of alpha-beta-epoxy hydrazones, elimination of CO from bridged bicyclic compounds, and elimination Of CO2 from bridged bicyclic compounds), reactions in which C═N or C═N bonds are formed (e.g., dehydration of aldoximes or similar compounds, conversion of ketoximes to nitriles, dehydration of unsubstituted amides, and conversion of I\l-alkylformamides to isocyanides), reactions in which C═O bonds are formed (e.g., pyrolysis of beta-hydroxy alkenes), and reactions in which N═N bonds are formed (e.g., eliminations to give diazoalkenes). Extrusion reactions include, for example, extrusion of N2 from pyrazolines, extrusion of N2 from pyrazoles, extrusion of N2 from triazolines, extrusion of CO, extrusion Of CO2, extrusion Of SO2, the Story synthesis, and alkene synthesis by twofold extrusion.

Rearrangements, including, for example, nucleophilic rearrangements, electrophilic rearrangements, prototropic rearrangements, and free-radical rearrangements, can also be performed. Both 1,2 rearrangements and non-1,2 rearrangements can be performed. Exemplary reactions include, for example, carbon-to-carbon migrations of R, H, and Ar (e.g., Wagner-Meerwein and related reactions, the Pinacol rearrangement, ring expansion reactions, ring contraction reactions, acid-catalyzed rearrangements of aldehydes and ketones, the dienone-phenol rearrangement, the Favorskii rearrangement, the Arndt-Eistert synthesis, homologation of aldehydes, and homologation of ketones), carbon-to-carbon migrations of other groups (e.g., migrations of halogen, hydroxyl, amino, etc.; migration of boron; and the Neber rearrangement), carbon-to-nitrogen migrations of R and Ar (e.g., the Hofmann rearrangement, the Curtius rearrangement, the Lossen rearrangement, the Schmidt reaction, the Beckman rearrangement, the Stieglits rearrangement, and related rearrangements), carbon-to-oxygen migrations of R and Ar (e.g., the Baeyer-Villiger rearrangement and rearrangment of hydroperoxides), nitrogen-to-carbon, oxygen-to-carbon, and sulfur-to-carbon migration (e.g., the Stevens rearrangement, and the Wittig rearrangement), boron-to-carbon migrations (e.g., conversion of boranes to alcohols (primary or otherwise), conversion of boranes to aldehydes, conversion of boranes to carboxylic acids, conversion of vinylic boranes to alkenes, formation of alkynes from boranes and acetylides, formation of alkenes from boranes and acetylides, and formation of ketones from boranes and acetylides), electrocyclic rearrangements (e.g., of cydobutenes and 1,3-cyclohexadienes, or conversion of stilbenes to phenanthrenes), sigmatropic rearrangements (e.g., (1,j) sigmatropic migrations of hydrogen, (Ij) sigmatropic migrations of carbon, conversion of vinylcydopropanes to cyclopentenes, the Cope rearrangement, the Claisen rearrangement, the Fischer indole synthesis, (2,3) sigmatropic rearrangements, and the benzidine rearrangement), other cyclic rearrangements (e.g., metathesis of alkenes, the di-n-methane and related rearrangements, and the Hofmann-Loffler and related reactions), and non-cyclic rearrangements (e.g., hydride shifts, the Chapman rearrangement, the Wallach rearrangement, and cyclotropic rearrangements).

Oxidative and reductive reactions may also be performed. Exemplary reactions may involve, for example, direct electron transfer, hydride transfer, hydrogen-atom transfer, formation of ester intermediates, displacement mechanisms, or addition-elimination mechanisms. Exemplary oxidations include, for example, eliminations of hydrogen (e.g., aromatization of six-membered rings, dehydrogenations yielding carbon-carbon double bonds, oxidation or dehydrogenation of alcohols to aldehydes and ketones, oxidation of phenols and aromatic amines to quinones, oxidative cleavage of ketones, oxidative cleavage of aldehydes, oxidative cleavage of alcohols, ozonolysis, oxidative cleavage of double bonds and aromatic rings, oxidation of aromatic side chains, oxidative decarboxylation, and bisdecarboxylation), reactions involving replacement of hydrogen by oxygen (e.g., oxidation of methylene to carbonyl, oxidation of methylene to OH, CO2R, or OR, oxidation of arylmethanes, oxidation of ethers to carboxylic esters and related reactions, oxidation of aromatic hydrocarbons to quinones, oxidation of amines or nitro compounds to aldehydes, ketones, or dihalides, oxidation of primary alcohols to carboxylic acids or carboxylic esters, oxidation of alkenes to aldehydes or ketones, oxidation of amines to nitroso compounds and hydroxylamines, oxidation of primary amines, oximes, azides, isocyanates, or nitroso compounds, to nitro compounds, oxidation of thiols and other sulfur compounds to sulfonic acids), reactions in which oxygen is added to the subtrate (e.g., oxidation of alkynes to alpha-diketones, oxidation of tertiary amines to amine oxides, oxidation of thioesters to sulfoxides and sulfones, and oxidation of carboxylic acids to peroxy acids, and oxidative coupling reactions (e.g., coupling involving carbanoins, dimerization of silyl enol ethers or of lithium enolates, and oxidation of thiols to disulfides). Exemplary reductive reactions include, for example, reactions involving replacement of oxygen by hydrogen {e.g., reduction of carbonyl to methylene in aldehydes and ketones, reduction of carboxylic acids to alcohols, reduction of amides to amines, reduction of carboxylic esters to ethers, reduction of cyclic anhydrides to lactones and acid derivatives to alcohols, reduction of carboxylic esters to alcohols, reduction of carboxylic acids and esters to alkanes, complete reduction of epoxides, reduction of nitro compounds to amines, reduction of nitro compounds to hydroxylamines, reduction of nitroso compounds and hydroxylamines to amines, reduction of oximes to primary amines or aziridines, reduction of azides to primary amines, reduction of nitrogen compounds, and reduction of sulfonyl halides and sulfonic acids to thiols), removal of oxygen from the substrate {e.g., reduction of amine oxides and azoxy compounds, reduction of sulfoxides and sulfones, reduction of hydroperoxides and peroxides, and reduction of aliphatic nitro compounds to oximes or nitrites), reductions that include cleavage {e.g., de-alkylation of amines and amides, reduction of azo, azoxy, and hydrazo compounds to amines, and reduction of disulfides to thiols), reductive coupling reactions {e.g., bimolecular reduction of aldehydes and ketones to 1,2-diols, bimolecular reduction of aldehydes or ketones to alkenes, acyloin ester condensation, reduction of nitro to azoxy compounds, and reduction of nitro to azo compounds), and. reductions in which an organic substrate is both oxidized and reduced {e.g., the Cannizzaro reaction, the Tishchenko reaction, the Pummerer rearrangement, and the Willgerodt reaction).

Covalent bonds relevant for the present invention, including those formed above, are listed in the following.

Group 8: Covalent Bonds.

A single bond, such as a single carbon-carbon bond, a carbon-heteroatom single bond, a heteroatom-heteroatom single bond, a double bond, such as a carbon-carbon double bond or a carbon-heteroatom double bond, a heteroatom-heteroatom double, bond, triple bond, such as a carbon-carbon triple bond or a carbon-heteroatom triple bond, a heteroatom-heteroatom triple bond, —CH2—, —C(O)—, —NH—, —O—, —S—, —SO2—, —CH2CH2—, —C(O)CH2—, —CH2C(O)—, —NHCH2—, —CH2NH—, —OCH2—, —CH2O—, —SCH2—, —CH2S—, —SO2CH2—, —CH2SO2—, —NHC(O)—, —C(O)NH—, —NHSO2—, —SO2NH—, —CH2CH2CH2—, —CH2CH2C(O)—, —CH2CH2NH—, —CH2CH2O—, —CH2$CH_2$S—, —CH2CH2SO2—, —CH2C(O)CH2—, —CH2NHCH2—, —CH2OCH2—, —CH2SCH2—, —CH2SO2CH2—, —C(O)CH2CH2—, —NHCH2CH2—, —OCH2CH2—, —SCH2CH2—, —SO2CH2CH2—, —CH2C(O)NH—, —CH2SO2NH—, —CH2NHC(O)—, —CH2NHSO2—, —C(O)NHCH2—, —SO2NHCH2—, —NHC(O)CH2—, —NHSO2CH2—, and —NHC(O)NH—

Linkers.

A linker may consist of just one bond, or a number of covalent and/or non-covalent bonds. A linker may have any length. A longer and more flexible linker will more easily allow the precursor-MLs, MLs and Ligand2s and SEs to interact independently of the linker; however, a short linker connecting two precursor-MLs, MLs or Ligand2s bound to the same SE may result in high synergy in the binding of the two precursor-MLs, MLs or Ligand2s to the same SE—but may also interfere with efficient binding of the two precursor-MLs, MLs and Ligand2s because of linker constraints and/or inappropriate orientation of the interacting molecules. Thus, in some cases a short linker is preferable; in other cases a long linker is preferable. The linker may thus have a length of 0.1-100,000 nm, such as in the ranges of 0.1-0.4 nm, 0.4-1 nm, 1-2 nm, 2-4 nm, 4-8 nm, 8-15 nm, 15-25 nm, 25-40 nm, 40-100 nm, 100-200 nm, 200-500 nm, 500-1,000 nm, 1,000-10,000 nm, or 10,000-100,000 nm, or larger.

In a preferred embodiment the linker has a length of less than 1 μm, such as less than 100 nm, such as less than 50 nm, such as less than 40 nm, such as less than 30, such as less than 25 nm, such as less than 20 nm, such as less than 15 nm, such as less than 10 nm, such as less than 5 nm, such as less than 2 nm, such as less than 1 nm, such as less than 0.7 nm, such as less than 0.5 nm, such as less than 0.2 nm. Shorter linker lengths will often result in composite materials with higher tensile strength, wherefore it may be desirable to use shorter linkers to obtain higher strength of the composite material. In another preferred embodiment the linker has a length of more than 0.1 nm, such as more than 0.2 nm, such as more than 0.3 nm, such as more than 0.6 nm, such as more than 0.8 nm, such as more than 1 nm, such as more than 2 nm, such as more than 4 nm, such as more than 6 nm, such as more than 8 nm, such as more than 12 nm, such as more than 15 nm, such as more than 20 nm, such as more than 25 nm, such as more than 50 nm, such as more than 80 nm, such as more than 100 nm, such as more than 200 nm, such as more than 500 nm, such as more than 1 μm, such as more than 5 μm. Longer linkers will often lead to composite materials with higher flexibility, wherefore it may be desirable to increase the length of the linker if a higher flexibility is desired.

Shorter linker lengths may result in composite materials with higher tensile strength, and longer linkers may result in increased flexibility of the composite material. Therefore, the appropriate compromise between strength and flexibility of a composite material may be obtained by appropriate choice of linker length. In a preferred embodiment the linker length is between 1 and 10 nm, less preferably between 0.5 nm and 25 nm, as this linker length often is a good compromise between flexibility and strength of the composite material.

A linker may connect two, three, four or more precursor-MLs, MLs or Ligand2s. Thus, the linker may be linear (connecting two precursor-MLs, MLs or Ligand2s) or may be branched (connecting three or more precursor-MLs, MLs and Ligand2s).

Example linkers are organic molecules such as consisting of alkanes or alkenes, or polyvinyl, polypropylene, ethylene glycol, and the linkers may consist of just one element (e.g. carbon) or several elements (e.g. C, O, N).

A linker may comprise or consist of any polymer mentioned above or below, or may comprise or consist of any part of any polymer mentioned above or below, such as any number of repeating units of any polymer mentioned above or below, such as e.g. one, two, three, four or more repeating units of any polymer mentioned above or below.

Group 9: Linkers.

The following is a non-comprehensive list of linkers: alkanes, alkenes, alkynes or combinations thereof (C1, C2, C3, C4, C5, C6, C7, C8, C9, C10, C12, C13, C14, C15, C16, C17, C18, C19, C20) and any other alkane, alkene, alkyne or combinations thereof comprising between 20 and 30 carbon atoms, or between 30 and 40 carbon atoms, or between 40 and 50 carbon atoms, or more than 50 carbon atoms; polyethylene glycol.

Any of the structural entities listed above or below may also be used as a linker.

The linkers may be modified. The modifications may be added to the linker before, after or during synthesis of the composite material unit or composite material. The modification may involve covalent attachment of aromatic or aliphatic rings, charged or polar groups such as NH2, CO, COOH, and COSH.

Ideally, the chemical and physical characteristics of the linker should be similar to at least some of the characteristics of the structural entities of the CMU, in order to prepare composite materials where the characteristics of the matrix material and the additive are not significantly perturbed by the presence of the linker. However, under certain circumstances, such as for example when using carbon nanotubes as the additive, using processes and conditions under which e.g. solubility of the carbon nanotubes in the solution or matrix material is low, the linker may due to its solubility characteristics help make the carbon nanotube more soluble, because the linker becomes bound to the carbon nanotube by way of the precursor-ML, ML and/or Ligand2s.

CMUs—Combination of SE1, ML, Linker, Ligand2, and SE2.

A composite material unit (CMU) comprises a first structural entity (SE1), a mechanical ligand (ML), a Linker, a Ligand (Ligand2), and a second structural entity (SE2). Preferred CMUs of the present invention include anyone of the following CMUs, here identified as any specific combination of said first structural entity (SE1), ML, Linker, Ligand2, and second structural entity (SE2):

SE1-ML-Linker-Ligand2-SE2 (a CMU)

- where SE1 is any specific Structural Entity, or any specific type of Structural Entity, listed above or below;
- where ML is any specific mechanical ligand, or any specific type of mechanical ligand, listed above or below;
- where Linker is any specific Linker, or any specific type of Linker, listed above or below;
- where Ligand2 is any specific Ligand2, or any specific type of Ligand2, listed above or below;
- and where SE2 is any specific Structural Entity, or any specific type of Structural Entity, listed above or below.

What is further provided is a polymeric structure of CMUs, consisting of a number of repeats of the structure SE1-ML-Linker-Ligand2-SE2-Ligand2-Linker-ML-SE1. Thus, the overall structure of said polymeric structure of CMUs is (SE1-ML-Linker-Ligand2-SE2-Ligand2-Linker-ML-)$_n$SE1, where n is an integer larger than zero.

For n=1, the polymeric structure of CMUs is thus described by the structure -SE1-ML-Linker-Ligand2-SE2-Ligand2-Linker-ML-SE1.

For n=2, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1.

For n=3, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1.

For n=5, the polymeric structure of CMUs is thus described by the structure SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1-ML-Linker-Ligand2-SE2-Ligand2-Linker-ML-SE1.

Preferred polymeric structures of CMUs are the polymeric structures where SE1 is a carbon nanotube, and n=1, 2, 3, 4,5, 6, 7, 8, 9, 10-20, 20-100, or 100-1000, or higher.

Other preferred polymeric structures of CMUs are the polymeric structures where SE1 is a nanotube, and n=1, 2, 3, 4,5, 6, 7, 8, 9, 10-20, 20-100, or 100-1000, or higher.

Other preferred polymeric structures of CMUs are the polymeric structures where SE1 is a nanotube or graphene, SE2 is a nanotube or graphene, and n=1, 2, 3, 4,5, 6, 7, 8, 9, 10-20, 20-100, or 100-1000, or higher.

Other preferred polymeric structures of CMUs are the polymeric structures where SE1 is a nanotube, SE2 is a plast polymer, and n=1, 2, 3, 4,5, 6, 7, 8, 9, 10-20, 20-100, or 100-1000, or higher.

Other preferred polymeric structures of CMU are the polymeric structures where SE1 is a carbon nanotube, SE2 is not a carbon nanotube, and the number of repeats is two or higher.

Methods of Preparing Composite Material Units and Composite Materials.

The individual components of the composite material units (CMU), i.e. the structural entities (SEs), the MLs, Ligand2s, and the linker(s), may be synthesized before, during or after linking the SE, ML, Ligand2, and linker(s).

The following three processes for the synthesis of reinforced polymers (composite materials comprising a polymer component and an additive) are examples of processes where the individual components of the CMU are prepared before, during or after linking its SEs, linker(s), Ligand2 and ML:

Solution Mixing:

The additive (e.g. a nanotube dispersion) is mixed with a solution of preformed polymer (e.g. polyvinyl alcohol, polystyrene, polycarbonate, or poly(methyl methacrylate)) and precursor-MLs, MLs and/or Ligand2s and linker(s). CMUs will now form in the solution, whereafter the solvents are evaporated, leaving the reinforced polymer as a solid material. In this approach, the linker, precursor-ML or ML, Ligand2, polymer, and structural entities (polymer and additive) may associate during incubation in solvent, or may be partly associated prior to their mixing with the other components.

Melt Processing:

This process employs thermoplastic polymers (e.g. high-impact polystyrene, acrylonitrile-butadiene-styrene, polypropylene) that soften and melt when heated. The preformed, thermoplastic polymers are melted and then mixed with precursor-MLs, MLs and/or Ligand2s linkers and additive(s). Upon lowering of the temperature, and optionally fibre-spinning, melt-spinning, extrusion or other relevant process, reinforced polymers of desired characteristics are formed. As for solution mixing, the linker, precursor-ML, ML, Ligand2, polymer, and structural entities (polymer and additive) may associate during incubation, or may be partly associated prior to their mixing with the other components.

In Situ Polymerization:

In this process, the monomer(s) rather than the polymer(s) are used as starting material, whereafter the polymerization is carried out in situ. Thus, the additive is mixed with the monomer (e.g. epoxy resin), linkers and precursor-MLs, MLs and/or Ligand2s. As for the two processes described immediately above, the linker and precursor-MLs, MLs and/or Ligand2s may be preformed as one moiety which is then added to the polymerization mixture. In the example of a reinforced epoxy, one would therefore use an excess of the non-modified epoxy resin, plus a modified epoxy resin which had been coupled to a precursor-ML, ML and/or Ligand2s capable of binding the additive in question.

Precursor-MLs, MLs and Ligand2s, linkers and SEs suitable for the present invention include small compact molecules, linear structures, polymers, polypeptides, poly-ureas, polycarbamates, scaffold structures, cyclic structures, natural compound derivatives, alpha-, beta-, gamma-, and omega-peptides, mono-, di- and tri-substituted peptides, L- and D-form peptides, cyclohexane- and cydopentane-backbone modified beta-peptides, vinylogous polypeptides, glycopolypeptides, polyamides, vinylogous sulfonamide peptide, Polysulfonamide conjugated peptide (i.e., having prosthetic groups), Polyesters, Polysaccharides, polycarbamates, polycarbonates, polyureas, poly-peptidylphosphonates, Azatïdes, peptoids (oligo N-substituted glycines), Polyethers, ethoxyformacetal oligomers, poly-thioethers, polyethylene, glycols (PEG), polyethylenes, polydisulfides, polyarylene sulfides, Polynucleotides, PNAs, LNAs, Morpholinos, oligo pyrrolinone, polyoximes, Polyimines, Polyethyleneimine, Polyacetates, Polystyrenes, Polyacetylene, Polyvinyl, Lipids, Phospholipids, Glycolipids, poiycycles, (aliphatic), polycycles (aromatic), polyheterocydes, Proteoglycan, Polysiloxanes, Polyisocyanides, Polyisocyanates, polymethacryiates, Monofunctional, Difunctional, Trifunctional and Oligofunctional open-chain hydrocarbons.

Monofunctional, Difunctional, Trifunctional and Oligofunctional Nonaromatic Carbocycles, Monocyclic, Bicyclic, Tricyclic and Polycyclic Hydrocarbons, Bridged Polycyclic Hydrocarbones, Monofunctional, Difunctional, Trifunctional and Oligofunctional Nonaromatic, Heterocycles, Monocyclic, Bicyclic, Tricyclic and Polycyclic Heterocycles, bridged Polycyclic Heterocycles, Monofunctional, Difunctional, Trifunctional and Oligofunctional Aromatic Carbocycles. Monocyclic, Bicyclic, Tricyclic and Polycyclic Aromatic Carbocycles.

Monofunctional, Difunctional, Trifunctional and Oligofunctional Aromatic Heterocycles. Monocyclic, Bicyclic, Tricyclic and Polycyclic Heterocycles. Chelates, fullerenes, and any combination of the above.

In preferred embodiments, the structural entity, the precursor-ML, ML or Ligand2, the linker or the composite material comprises one or more entities chosen from the list comprising:

Aluminium antimonide—AlSb, Aluminium arsenide—AlAs, Aluminium chloride—AlCl3, Aluminium fluoride—AlF3, Aluminium hydroxide—Al(OH)3, Aluminium nitrate—Al(NO3)3, Aluminium nitride—AlN, Aluminium oxide—Al2O3, Aluminium phosphide—AlP, Aluminium sulfate—Al2(SO4)3, Ammonia—NH3, Ammonium bicarbonate—NH4HCO3, Ammonium cerium(IV) nitrate—(NH4)2Ce(NO3)6, Ammonium chloride—NH4Cl, Ammonium hydroxide—NH4OH, Ammonium nitrate—NH4NO3, Ammonium sulfate—(NH4)2SO4, Ammonium tetrathiocyanatodiamminechromate(III)—NH4[Cr(SCN)4(NH3)2], Antimony hydride—SbH3, Antimony pentachloride—SbCl5, Antimony pentafluoride—SbF5, Antimony trioxide—Sb2O3, Arsenic trioxide (Arsenic(III) oxide)—As2O3, Arsenous acid—As(OH)3, Arsine—AsH3, Baking soda—NaHCO3, Barium chloride—BaCl2, Barium chromate—BaCrO4, Barium hydroxide—Ba(OH)2, Barium iodide—BaI2, Barium nitrate—Ba(NO3)2, Barium sulfate—BaSO4, Barium titanate—BaTiO3, Beryllium borohydride—Be (BH4)2, Beryllium bromide—BeBr2, Beryllium carbonate—BeCO3, Beryllium chloride—BeC12, Beryllium fluoride—BeF2, Beryllium hydride—BeH2, Beryllium hydroxide—Be(OH)2, Beryllium iodide—BeI2, Beryllium nitrate—Be(NO3)2, Beryllium nitride—Be3N2, Beryllium oxide—BeO, Beryllium sulfate—BeSO4, Beryllium sulfite—BeSO3, Beryllium telluride—BeTe, Bismuth(III) oxide—Bi2O3, Bismuth(III) telluride—Bi2Te3, Borane—Diborane: B2H6, Pentaborane: B5H9 Decaborane: B10H14, Borax—Na2B4O7.10H2O, Boric acid—H3BO3, Boron carbide—B4C, Boron nitride—BN, Boron oxide—B2O3, Boron suboxide—B6O, Boron trichloride—BCl3, Boron trifluoride—BF3, Bromine pentafluoride—BrF5, Bromine trifluoride—BrF3, Cacodylic acid—(CH3)2AsO2H, Cadmium arsenide—Cd3As2, Cadmium bromide—CdBr2, Cadmium chloride—CdC12, Cadmium fluoride—CdF2, Cadmium iodide—CdI2, Cadmium nitrate—Cd(NO3)2, Cadmium selenide—CdSe (of quantum dot fame), Cadmium sulfate—CdSO4, Cadmium telluride—CdTe, Caesium bicarbonate—CsHCO3, Caesium carbonate—Cs2CO3, Caesium chloride—CsCl, Caesium chromate—Cs2CrO4, Caesium fluoride—CsF, Caesium hydride—CsH, Calcium carbide—CaC2, Calcium chlorate—Ca(ClO3)2, Calcium chloride—CaCl2, Calcium chromate—CaCrO4, Calcium cyanamide—CaCN2, Calcium fluoride—CaF2, Calcium hydride—CaH2, Calcium hydroxide—Ca(OH)2, Calcium sulfate (Gypsum)—CaSO4, Carbon dioxide—CO2, Carbon disulfide—CS2, Carbon monoxide—CO, Carbon tetrabromide—CBr4, Carbon tetrachloride—CCl4, Carbon tetraiodide—CI4, Carbonic acid—H2CO3, Carbonyl fluoride—COF2, Carbonyl sulfide—COS, Carboplatin—C6H12N2O4Pt, carborundum SiC, Cerium aluminium—CeAl, Cerium cadmium—CeCd, Cerium magnesium—CeMg, Cerium mercury—CeHg, Cerium silver—CeAg, Cerium thallium—CeTl, Cerium zinc—CeZn, Cerium(III) bromide—CeBr3, Cerium(III) chloride—CeCl3, Cerium (IV) sulfate—Ce(SO4)2, Chrome-alum; K2SO4Cr2(SO4) 3.24H2O, Chromic acid—CrO3, Chromium trioxide (Chromic acid)—CrO3, Chromium(II) chloride—CrCl2 (also chromous chloride), Chromium(II) sulfate—CrSO4, Chromium(III) chloride—CrCl3, Chromium(III) oxide—Cr2O3, Chromium(IV) oxide—CrO2, Chromyl chloride—CrO2Cl2, Cisplatin (cis-platinum(II) chloride diammine)-PtCl2(NH3)2, Cobalt(II) bromide—CoBr2, Cobalt(II) carbonate—CoCO3, Cobalt(II) chloride—CoCl2, Cobalt(II) sulfate—CoSO4, Columbite—Fe2+Nb2O6, Copper(I) chloride—CuCl, Copper(I) oxide—Cu2O, Copper(I) sulfide—Cu2S, Copper(II) carbonate—CuCO3, Copper(II) chloride—CuCl2, Copper(II) hydroxide—Cu(OH)2, Copper(II) nitrate—Cu(NO3)2, Copper(II) oxide—CuO, Copper(II) sulfate—CuSO4, Copper(II) sulfide—CuS, Cyanogen—(CN)2, Cyanogen chloride—CNCl, Cyanuric chloride—C3Cl3N3, Decaborane (Diborane)—B10H14, Diammonium phosphate—(NH4)2HPO4, Diborane—B2H6, Dichlorosilane—SiH2Cl2, Digallane—Ga2H6, Dinitrogen pentoxide (nitronium nitrate)—N2O5, Disilane—Si2H6, Disulfur dichloride S2Cl2, Dysprosium(III) chloride—DyCl3, Erbium(III) chloride—ErCl3, Erbium-copper—ErCu, Erbium-gold—ErAu, Erbium-Iridium—ErIr, Erbium-silver—ErAg, Europium(III) chloride—EuCl3, Fluorosulfuric acid—FSO2(OH), Gadolinium(III) chloride—GdCl3, Gadolinium(III) oxide—Gd2O3, Gallium antimonide—GaSb, Gallium arsenide—GaAs, Gallium nitride—GaN, Gallium phosphide—GaP, Gallium trichloride—GaCl3, Germanium (IV) nitride—Ge3N4, Germanium telluride—GeTe, Germanium(II) bromide—GeBr2, Germanium(II) chloride—GeCl2, Germanium(II) fluoride—GeF2, Germanium(II) iodide—GeI2, Germanium(II) oxide—GeO, Germanium(II) selenide—GeSe, Germanium (II) sulfide—GeS, Germanium(III) hydride—Ge2H6, Germanium(IV) bromide—GeBr4, Germanium(IV) chloride—GeCl4, Germanium(IV) fluoride—GeF4, Germanium(IV) hydride (Germane)—GeH4, Germanium(IV) iodide—GeI4, Germanium(IV) oxide—GeO2, Germanium(IV) selenide—GeSe2, Germanium(IV) sulfide—GeS2, Gold ditelluride—AuTe2, Gold(I) bromide—AuBr, Gold(I) chloride—AuCI, Gold(I) iodide—AuI, Gold(I) sulfide—Au2S, Gold(I,III) chloride—Au4Cl8, Gold(III) bromide—(AuBr3)2, Gold (III) chloride—(AuCl3)2, Gold(III) chloride—AuCl3, Gold (III) fluoride—AuF3, Gold(III) iodide—AuI3, Gold(III) oxide—Au203, Gold(III) selenide—Au2Se3, Gold(III) selenide—AuSe, Gold(III) sulfide—Au2S3, Gold(V) fluoride—AuF5, Hafnium fluoride, Hafnium tetrachloride—HfCl4, Hexadecacarbonylhexarhodium—Rh6CO16, Hydrazine—N2H4, Hydrazoic acid—HN3, Hydrobromic acid—HBr, Hydrochloric acid—HCl, Hydrogen bromide—HBr, Hydrogen chloride—HCl, Hydrogen fluoride—HF, Hydrogen peroxide—H2O2, Hydrogen selenide—H2Se, Hydrogen sulfide—H2S, Hydrogen telluride—H2Te, Hydroiodic acid—HI, Hydroxylamine—$NH_2OH$, Hypochlorous acid—HClO, Hypophosphorous acid—H3PO2, Indium antimonide—InSb, Indium arsenide—InAs, Indium nitride—InN, Indium phosphide—InP, Indium(I) chloride, Iodic acid—HIO3, Iodine heptafluoride—IF7, Iodine monochloride—ICl, Iodine pentafluoride—IF5, Iridium(IV) chloride, Iron(II) chloride—FeC12 including hydrate, Iron(II) oxide—FeO, Iron(II,III) oxide—Fe3O4, Iron(III) chloride—FeC13, Iron (III) nitrate—Fe(NO3)3(H2O)9, Iron(III) oxide—Fe2O3, Iron(III) thiocyanate, Iron-sulfur cluster, Krypton difluoride—KrF2, Lanthanum aluminium—LaAl, Lanthanum cadmium—LaCd, Lanthanum carbonate—La2(CO3)3, Lanthanum magnesium—LaMg, Lanthanum mercury—LaHg, Lanthanum silver—LaAg, Lanthanum tallium—LaT1, Lanthanum zinc—LaZn, Lead zirconate titanate—Pb[TixZrl-x] O3 (e.g., x=0.52 is Lead zirconium titanate), Lead(II) carbonate—Pb(CO3), Lead(II) chloride—PbCl2, Lead(II) iodide—PbI2, Lead(II) nitrate—Pb(NO3)2, Lead(II) oxide—PbO, Lead(II) phosphate—Pb3(PO4)2, Lead(II) selenide—PbSe, Lead(II) sulfate—Pb(SO4), Lead(II) sulfide—PbS, Lead(II) telluride—PbTe, Lead(IV) oxide—PbO2, Lithium aluminium hydride—LiAlH4, Lithium bromide—LiBr, Lithium carbonate (Lithium salt)—Li2CO3, Lithium chloride—LiCl, Lithium hydride—LiH, Lithium hydroxide—LiOH, Lithium iodide—LiI, Lithium nitrate—LiNO3, Lithium sulfate—Li2SO4, Magnesium antimonide—MgSb, Magnesium carbonate—MgCO3, Magnesium chloride—MgCl2, Magnesium oxide—MgO, Magnesium phosphate—Mg3(PO4)2, Magnesium sulfate—MgSO4, Manganese(II) chloride—MnCl2, Manganese(II) phosphate—Mn3(PO4)2, Manganese(II) sulfate monohydrate—MnSO4.H2O, Manganese(III) chloride—MnCl3, Manganese(IV) fluoride—MnF4, Manganese(IV) oxide (manganese dioxide)—MnO2, Mercury fulminate—Hg (ONC)2, Mercury(I) chloride—Hg2C12, Mercury(I) sulfate—Hg2SO4, Mercury(II) chloride—HgCl2, Mercury(II) selenide—HgSe, Mercury(II) sulfate—HgSO4, Mercury(II) sulfide—HgS, Mercury(II) telluride—HgTe, Metaphosphoric acid—HPO3, Molybdate orange, Molybdenum disulfide—MoS2, Molybdenum hexacarbonyl—C6O6Mo, Molybdenum trioxide—MoO3, Molybdic acid—H2MoO4, Neodymium(III) chloride—NdCl3, Nessler's reagent—K2 [HgI4], Nickel(II) carbonate—NiCO3, Nickel(II) chloride—NiCl2 and hexahydrate, Nickel(II) hydroxide—Ni (OH)2, Nickel(II) nitrate—Ni(NO3)2, Nickel(II) oxide—NiO, Niobium oxychloride—NbOCl3, Niobium pentachloride—NbCl5, Nitric acid—HNO3, Nitrogen dioxide—NO2, Nitrogen monoxide—NO, Nitrosylsulfuric acid—NOHSO4, Osmium tetroxide (osmium(VIII) oxide)—OsO4, Osmium trioxide (osmium(VI) oxide)—OsO3, Oxybis(tributyltin)—C24H54OSn2, Oxygen difluoride—OF2, Ozone—O3, Palladium(II) chloride—PdCl2, Palladium(II) nitrate—Pd(NO3)2, Pentaborane—B5H9, Pentasulfide antimony—Sb2S5, Perchloric acid—HC104, Perchloryl fluoride—ClFO3, Persulfuric acid (Caro's acid)—H2SO5, Perxenic acid—H4XeO6, Phenylarsine oxide—(C6H5)AsO, Phenylphosphine—C6H7P, Phosgene—COCl2, Phosphine—PH3, Phosphite—HPO32—, Phosphomolybdic acid—HMoNiO6P-4, Phosphoric acid—H3PO4, Phosphorous acid (Phosphoric(III) acid)—H3PO3, Phosphorus pentabromide—PBr5, Phosphorus pentafluoride—PFS, Phosphorus pentasulfide—P4S10, Phosphorus pentoxide—P2O5, Phosphorus sesquisulfide—P4S3, Phosphorus tribromide—PBr3, Phosphorus trichloride—PCl3, Phosphorus trifluoride—PF3, Phosphorus triiodide—PI3, Phosphotungstic acid—H3PW12040, Platinum(II) chloride—PtCl2, Platinum(IV) chloride—PtCl4, Plutonium dioxide (Plutonium(IV) oxide)—PuO2, Plutonium(III) chloride—PuCl3, Potash Alum-K2SO4·Al2(SO4)3·24H2O, Potassium aluminium fluoride—KAlF4, Potassium borate—K2B4O7·4H2O, Potassium bromide—KBr, Potassium calcium chloride—KCaCl3, Potassium carbonate—K2CO3, Potassium chlorate—KClO3, Potassium chloride—KCl, Potassium ferrioxalate—K3 [Fe(C204)3], Potassium hydrogen fluoride—HF2K, Potassium hydrogencarbonate—KHCO3, Potassium hydroxide—KOH, Potassium iodide—KI, Potassium monopersulfate—K2SO4·KHSO4·2KHSO5, Potassium nitrate—KNO3, Potassium perbromate—KBrO4, Potassium perchlorate—KClO4, Potassium permanganate—KMnO4, Potassium sulfate—K2SO4, Potassium sulfide—K2S, Potassium titanyl phosphate—KTiOPO4, Potassium vanadate—KVO3, Praseodymium (III) chloride—PrCl3, Protonated molecular hydrogen—H3+, Prussian blue (Iron(III) hexacyanoferrate(II))—Fe4[Fe (CN)6]3, Pyrosulfuric acid—H2S207, Radium chloride—RaCl2, Radon difluoride—RnF2, Rhodium(III) chloride—RhCl3, Rubidium bromide—RbBr, Rubidium chloride—RbCl, Rubidium fluoride—RbF, Rubidium hydroxide—RbOH, Rubidium iodide—RbI, Rubidium nitrate—RbNO3, Rubidium oxide—Rb2O, Rubidium telluride—Rb2Te, Ruthenium(VIII) oxide—RuO4, Samarium(II) iodide—SmI2, Samarium(III) chloride—SmCl3, Scandium(III) chloride—ScCl3 and hydrate, Scandium(III) fluoride—ScF3, Scandium(III) nitrate—Sc(NO3)3, Scandium(III) oxide—Sc203, Scandium(III) triflate—Sc(OSO2CF3)3, Selenic acid—H2Se04, Selenious acid—H2SeO3, Selenium dioxide—SeO2, Selenium trioxide—SeO3, Silane—SiH4, Silica gel—SiO2·nH2O, Silicic acid—[SiOx(OH)4-2x]n, Silicochloroform—Cl3HSi, Silicofluoric acid—H2SiF6, Silicon dioxide—SiO2, Silver chloride—AgCl, Silver iodide—AgI, Silver nitrate—AgNO3, Silver sulfide—Ag2S, Silver(I) fluoride—AgF, Silver(II) fluoride—AgF2, Soda lime —, Sodamide—NaNH2, Sodium borohydride—NaBH4, Sodium bromate—NaBrO3, Sodium bromide—NaBr, Sodium carbonate—Na2CO3, Sodium chlorate—NaClO3, Sodium chloride—NaCl, Sodium cyanide—NaCN, Sodium ferrocyanide—Na4Fe(CN)6, Sodium hydride—NaH, Sodium hydrogen carbonate (Sodium bicarbonate)—$NaHCO_3$, Sodium hydrosulfide—NaSH, Sodium hydroxide—NaOH, Sodium iodide—NaI, Sodium monofluorophosphate (MFP)—Na2PFO3, Sodium nitrate—NaNO3, Sodium nitrite—NaNO2, Sodium percarbonate—2Na2CO3.3H2O2, Sodium persulfate—Na2S208, Sodium phosphate; see Trisodium phosphate—Na3PO4, Sodium silicate—Na2SiO3, Sodium sulfate—Na2SO4, Sodium sulfide—Na2S, Sodium sulfite—Na2SO3, Sodium tellurite—Na2TeO3, Stannous chloride (tin(II) chloride)—SnCl2, Stibine—SbH3, Strontium chloride—SrCl2, Strontium nitrate—Sr(NO3)2, Strontium titanate—SrTiO3, Sulfamic acid—H3NO3S, Sulfane—H2S, Sulfur dioxide—SO2, Sulfuric acid—H2SO4, Sulfurous acid—H2SO3, Sulfuryl chloride—SO2C12, Tantalum carbide—TaC, Tantalum(V) oxide—Ta2O5, Telluric acid—H6TeO6, Tellurium dioxide—TeO2, Tellurium tetrachloride—TeCl4, Tellurous acid—H2TeO3, Terbium(III) chloride—TbCl3, Tetraborane (10)—B4H10, Tetrachloroauric acid—AuCl3, Tetrafluorohydrazine—N2F4, Tetramminecopper(II) sulfate—[Cu (NH3)4]SO4, Tetrasulfur tetranitride—S4N4, Thallium(I) carbonate—Tl2CO3, Thallium(I) fluoride—TlF, Thallium (III) oxide Tl2O3, Thallium(III) sulfate, Thionyl chloride—SOCl2, Thiophosgene—CSCl2, Thiophosphoryl chloride—Cl3PS, Thorium dioxide—ThO2, Thortveitite—(Sc,Y) 2Si2O7, Thulium(III) chloride—TmCl3, Tin(II) chloride—SnCl2, Tin(II) fluoride—SnF2, Tin(IV) chloride—SnCl4, Titanium boride—TiB2, Titanium carbide—TiC, Titanium dioxide (B) (titanium(IV) oxide)—TiO2, Titanium dioxide (titanium(IV) oxide)—TiO2, Titanium nitride—TiN, Titanium(II) chloride—TiCl2, Titanium(III) chloride—TiCl3, Titanium(IV) bromide (titanium tetrabromide)—TiBr4, Titanium(IV) chloride (titanium tetrachloride)—TiCl4, Titanium(IV) iodide (titanium tetraiodide)—TiI4, Trifluoromethanesulfonic acid—CF3SO3H, Trifluoromethylisocyanide—C2NF3, Trimethylphosphine—C3H9P, Trioxidane—H2O3, Tripotassium phosphate—K3PO4, Trisodium phosphate—Na3PO4, Triuranium octaoxide (pitchblende or yellowcake)—U308, Tungsten carbide—WC, Tungsten hexacarbonyl—W(CO)6, Tungsten(VI) chloride—WCl6, Tungsten(VI) Fluoride—WF6, Tungstic acid—H2WO4, Uranium hexafluoride—UF6, Uranium pentafluoride—UFS, Uranium tetrachloride—UCl4, Uranium tetrafluoride—UF4, Uranyl carbonate—UO2CO3, Uranyl chloride—UO2C12, Uranyl fluoride—UO2F2, Uranyl hydroxide—(UO2)2(OH)4, Uranyl hydroxide—UO2 (OH)2, Uranyl nitrate—UO2(NO3)2, Uranyl sulfate—UO2SO4, Vanadium carbide—VC, Vanadium oxytrichloride (Vanadium(V) oxide trichloride)—VOC13, Vanadium(II) chloride—VCl2, Vanadium(II) oxide—VO, Vanadium(III) bromide—VBr3, Vanadium(III) chloride—VCl3, Vanadium(III) fluoride—VF3, Vanadium(III) nitride—VN, Vanadium(III) oxide—V2O3, Vanadium(IV) chloride—VCl4, Vanadium(IV) fluoride—VF4, Vanadium (IV) oxide—VO2, Vanadium(IV) sulfate—VOSO4, Vanadium(V) oxide—V205, Water—H2O, Xenic acid—H2XeO4, Xenon difluoride—XeF2, Xenon hexafluoroplatinate—Xe[PtF6], Xenon tetrafluoride—XeF4, Xenon tetroxide—XeO4, Ytterbium(III) chloride—YbCl3, Ytterbium(III) oxide—Yb2O3, Yttrium aluminium garnet—Y3Al5O12, Yttrium barium copper oxide—YBa2Cu3O7, Yttrium cadmium—YCd, Yttrium copper—YCu, Yttrium gold—YAu, Yttrium iridium—YIr, Yttrium iron garnet—Y3Fe5O12, Yttrium magnesium—YMg, Yttrium rhodium—YRh, Yttrium silver—YAg, Yttrium zinc—YZn, Yttrium(III) antimonide—YSb, Yttrium(III) arsenide—YAs, Yttrium(III) bromide—YBr3, Yttrium(III) fluoride—YF3, Yttrium(III) oxide—Y2O3, Yttrium(III) sulfide—Y2S3, Zinc bromide—ZnBr2, Zinc carbonate—ZnCO3, Zinc chloride—ZnCl2, Zinc cyanide—Zn(CN)2, Zinc fluoride—ZnF2, Zinc iodide—ZnI2, Zinc oxide—ZnO, Zinc selenide—ZnSe, Zinc sulfate—ZnSO4, Zinc sulfide—ZnS, Zinc telluride—ZnTe, Zirconia hydrate—ZrO2·nH2O, Zirconium carbide—ZrC, Zirconium hydroxide—Zr(OH)4, Zirconium nitride—ZrN, Zirconium orthosilicate—ZrSiO4, Zirconium tetrahydroxide—H4O4Zr, or Zirconium tungstate—ZrW2O8, Zirconium(IV) chloride—ZrCl4, Zirconium(IV) oxide—ZrO2.

Combinations of SEs, Precursor-MLs, MLs and Ligand2s and Linkers, and Composite Materials.

Preferred embodiments include i) Embodiments in which ML and Ligand2 are both capable of mechanically binding, or are both mechanically bound, to SE1 and SE2, respectively, ii) Embodiments in which ML and Ligand2 are both capable of non-covalent binding, or are both non-covalently bound, to SE1 and SE2, respectively, iii) Embodiments in which Ligand2 is covalently bound to SE2, and where for each of i), ii) and iii), SE1 and SE2 are defined as follows:

- SE1 is a metal; more preferably SE1 is a metal and SE2 is a ceramic; more preferably SE1 is a metal and SE2 is a polymer; yet more preferably SE1 is metal and SE2 is a metal, or
- SE1 is a polymer; more preferably SE1 is a polymer and SE2 is a ceramic; more preferably SE1 is a polymer and SE2 is a polymer; yet more preferably SE1 is polymer and SE2 is a metal, or
- SE1 is a ceramic; more preferably SE1 is a ceramic and SE2 is a ceramic; more preferably SE1 is a ceramic and SE2 is a polymer; yet more preferably SE1 is ceramic and SE2 is a metal, or
- SE1 is a fullerene; more preferably SE1 is a fullerene and SE2 is a ceramic; more preferably SE1 is a fullerene and SE2 is a polymer; yet more preferably SE1 is fullerene and SE2 is a metal, or
- SE1 is a carbon nanotube; more preferably SE1 is a carbon nanotube and SE2 is a ceramic; more preferably SE1 is a carbon nanotube and SE2 is a polymer; yet more preferably SE1 is carbon nanotube and SE2 is a metal, or
- SE1 is a graphene; more preferably SE1 is a graphene and SE2 is a ceramic; more preferably SE1 is a graphene and SE2 is a polymer; yet more preferably SE1 is graphene and SE2 is a metal, or
- SE1 is a diamond or diamond film; more preferably SE1 is a diamond or diamond film and SE2 is a ceramic; more preferably SE1 is a diamond or diamond film and SE2 is a polymer; yet more preferably SE1 is diamond or diamond film and SE2 is a metal, or
- SE1 is a nanotube; more preferably SE1 is a nanotube and SE2 is a ceramic; more preferably SE1 is a nanotube and SE2 is a polymer; yet more preferably SE1 is nanotube and SE2 is a metal, or
- SE1 is an epoxy polymer; more preferably SE1 is an epoxy polymer and SE2 is a ceramic; more preferably SE1 is an epoxy polymer and SE2 is a polymer; yet more preferably SE1 is an epoxy polymer and SE2 is a metal, or
- SE1 is a quartz; more preferably SE1 is a quartz and SE2 is a ceramic; more preferably SE1 is a quartz and SE2 is a polymer; yet more preferably SE1 is quartz and SE2 is a metal, or
- SE1 is a carbon nanofiber; more preferably SE1 is a carbon nanofiber and SE2 is a ceramic; more preferably SE1 is a carbon nanofiber and SE2 is a polymer; yet more preferably SE1 is carbon nanofiber and SE2 is a metal, or
- SE1 is a linear polymer; more preferably SE1 is a linear polymer and SE2 is a ceramic; more preferably SE1 is a linear polymer and SE2 is a polymer; yet more preferably SE1 is linear polymer and SE2 is a metal, or

- SE1 is a short-chain branched polymer; more preferably SE1 is a short-chain branched polymer and SE2 is a ceramic; more preferably SE1 is a short-chain branched polymer and SE2 is a polymer; yet more preferably SE1 is short-chain branched polymer and SE2 is a metal, or
- SE1 is a long-chain branched polymer; more preferably SE1 is a long-chain branched polymer and SE2 is a ceramic; more preferably SE1 is a long-chain branched polymer and SE2 is a polymer; yet more preferably SE1 is long-chain branched polymer and SE2 is a metal, or
- SE1 is a ladder-type polymer; more preferably SE1 is a ladder-type polymer and SE2 is a ceramic; more preferably SE1 is a ladder-type polymer and SE2 is a polymer; yet more preferably SE1 is ladder-type polymer and SE2 is a metal, or
- SE1 is a star-branched polymer; more preferably SE1 is a star-branched polymer and SE2 is a ceramic; more preferably SE1 is a star-branched polymer and SE2 is a polymer; yet more preferably SE1 is star-branched polymer and SE2 is a metal, or
- SE1 is a network polymer; more preferably SE1 is a network polymer and SE2 is a ceramic; more preferably SE1 is a network polymer and SE2 is a polymer; yet more preferably SE1 is network polymer and SE2 is a metal.

In any of the above examples, SE1 and SE2 may be components of a CMU. Said CMU may be part of a composite material, or the CMU may be a sensor or some other partly isolated entity.

- Particularly preferred LUs include LUs that comprise a ML that binds CNT
- Particularly preferred LUs include LUs that consist of two MLs that bind CNT
- Particularly preferred LUs include LUs that comprise two MLs that bind graphene
- Particularly preferred LUs include LUs that consist of two MLs that bind graphene
- Particularly preferred LUs include LUs that comprise two MLs that bind bornitride
- Particularly preferred LUs include LUs that consist of two MLs that bind bornitride
- Particularly preferred LUs include LUs that comprise two MLs that bind bornitride nanotube
- Particularly preferred LUs include LUs that consist of two MLs that bind bornitride nanotube
- Particularly preferred LUs include LUs that comprise two MLs where one binds CNT and the other binds graphene
- Particularly preferred LUs include LUs that consist of two MLs where one binds CNT and the other binds bornitride
- Particularly preferred LUs include LUs that comprise two MLs where one binds CNT and the other binds bornitride nanotube
- Particularly preferred LUs include LUs that consist a ML and a Ligand2 where one binds graphene and the other binds bornitride nanotube Preferably, SE1 is a ceramic material, a COOH-functionalized CNT, a OH-functionalized carbon nanotube, an NH2-functionalized carbon nanotube, an SH-functionalized CNT, COOH-functionalized graphene, multi-layer graphene, NH2-functionalized graphene, OH-functionalized graphene, a glass fibre, aramid, E-glass, iron, polyester, polyethylene, S-glass, steel, a battery, a borosilicate, a buckyball, a buckytube, a capacitator, a carbon dome, a carbon material, a carbon megatube, a carbon nanofoam, a carbon polymer, a catalyst, a cathode, a coated carbon nanotube, a conductor, a covalent crystal, a crystal, a crystalline material, a defect-free graphene sheet, a defect-free MWCNT, a defect-free SWCNT, a dielectric material, a diode, a dodecahedrane, a doped glass, a fibre, a fullerite, a fused silica, a glue, a green ceramic, a lanthanides, a machinable ceramic, a metal alloy, a metal-functionalized carbon nanotube, a metalised dielectric, a metallised ceramic, a metalloid, a mineral, a non-covalent crystal, a piezoelectric material, a platinum group metal, a post-transition metal, a rare earth element, a sapphire, a semiconductor, a sensor, a silicon nitride, a single crystal fiber, a sol-gel, a synthetic diamond, a transition metal, a triple-wall carbon nanotube, a tungsten carbide, alumina, alumina trihydrate, aluminium, aluminum boride, aluminum oxide, aluminum trihydroxide, amorphous carbon, an actinides, an amalgam, an anode, an elastomers, an electrode, an endohedral fullerene, an insulator, an intermetallic, an ionic crystal, an organic material, anode, anthracite, asbestos, barium, bone, boron, brass, buckypaper, calcium carbonite, calcium metasilicate, calcium sulfate, calcium sulphate, carbon black, carbon nanofoam, cathode, chromium, clay, coal, copper, diamond, diamond-like carbon, double-layer graphene, exfoliated graphite, exfoliated silicate, flourinated graphene, fused silica, gallium arsenide, gallium nitride, germanium, glass, glass microsphere, glass ribbons, glassy carbon, gold, hardened steel, hydrous magnesium silicate, hyperdiamond, iron oxides, lead zirconium titanate, lignite, lithium niobate, lonsdaleite, magnesium dihydroxide, magnesium oxide, manganese, metal oxide, mica, molybdenum, nickel, nylon, palladium, pencil lead, platinum, prismane, pyrolytic graphite, rubber, silica, silica gel, silicon, silicon carbide, silicon dioxide, silicon nitride, silver, soot, stainless steel, tantalum, titanium, titanium oxide, tooth cementum, tooth dentine, tooth enamel, tungsten, tungsten carbide, wood, zinc oxide, zirconia, a nanofibre, a plastic, a fibre, a nanomaterial, graphite, a cellulose nanofibre, a ceramic, curran, a nanothread, a functionalized nanotube, a plastic material, a metal material, a polymer material, or a thio-functionalized graphene molecule More preferably, SE1 is a graphane molecule, a graphene oxide molecule, a graphyne molecule, a reduced graphene oxide molecule, or a metal Most preferably, SE1 is a carbon fibre, a carbon nanofibre, a carbon nanothread, a composite material, a fullerene, a MWCNT, a SWCNT, a graphene molecule, a nanotube, a boron nitride sheet, a one-layer molecule, a one-atom layer molecule, a boron nitride nanotube, a functionalized CNT, a functionalized graphene, a functionalized boron nitride nanotube or sheet, a multi-walled nanotube, or a single-walled nanotube Preferably, SE2 is a biopolymer, a block copolymer, a conductive polymer, a cross-linked polyethylene, a flouroplastic, a high density polypropylene, a low density polypropylene, a medium density polyethylene, a medium density polypropylene, a polyacrylonitrile, a polycaprolactone molecule, a polychloroprene, a polychlorotrifluoroethylene, a polyester molecule, a polyimide, a polylactic acid, a polyphenol, a polysulphone, a polytetrafluoroethylene, a polyurea, a polyurethane, a polyvinyl, a silicone, an elastomer, an inorganic polymer, an ultra-high-molecular-weight polyethylene, a melamin resin, a neoprene, a superlinear polyethylene, a poly(ethylene-vinyl acetate) (PEVA), a polyamide, a polyoxymethylene (POM), polyethylene, polyurethaner, epoxy-based polymer, poly ethylvinyl acetate, polystyrene, polypropylene, polyether, polyethylene oxide, polypropylene oxide, polyacrylates, a polymer, a non-biologic polymer, a biologic polymer, polyaromatic polymer, polyaliphatic polymer, a polymer consisting of C, a polymer consisting of C and H, a polymer consisting of C and H and O, a polymer comprising C, a polymer comprising C and H, a polymer comprising C and H and O, polytetrafluoroethylene (PTFE), a polymer comprising C, a polymer comprising O, a polymer comprising N, a polymer comprising Cl, a polymer comprising H, a polymer comprising a carbonyl, a polymer comprising an OH, a polymer comprising an amide bond, a polymer comprising F, a polymer comprising S, a polymer comprising Si, a polymer consisting of C and H and O and N, a polymer comprising C and H and O and N, a polymer consisting of C and H and Cl, a polymer comprising C and H and Cl, a polymer consisting of C and H and F, a polymer comprising C and H and F, a shape memory polymer, a polymer consisting of 4-(ethoxycarbonyl)benzoic ester, a polymer consisting of butyl, a polymer consisting of chloro-ethyl, a polymer consisting of ethyl, a polymer consisting of ethyl-acetate, a polymer consisting of ethylnitril, a polymer consisting of ethylbenzene, a polymer consisting of isobutyl, a polymer consisting of isopentyl, a polymer consisting of isopropyl, a polymer consisting of methyl, a polymer consisting of methyl 2-methyl-propionate, a polymer consisting of neopentyl, a polymer consisting of pentyl, a polymer consisting of phenyl-sulfide, a polymer consisting of propanoic acid, a polymer consisting of propanoic acid methyl ester, a polymer consisting of propyl, a polymer consisting of sec-butyl, a polymer consisting of sec-pentyl, a polymer consisting of tert-butyl, a polymer consisting of tert-pentyl, a polymer consisting of tetra-flouro-ethyl, a polymer comprising 2-methyl-propanoic acid methyl ester, a polymer comprising 4-(2-phenylpropan-2-yl)phenyl hydrogen carbonate, a polymer comprising 4-(4-phenoxybenzoyl)benzaketone, a polymer comprising 4-(ethoxycarbonyl)benzoic ester, a polymer comprising butyl, a polymer comprising chloro-ethyl, a polymer comprising ethyl, a polymer comprising ethyl-acetate, a polymer comprising ethyl-nitril, a polymer comprising ethylbenzene, a polymer comprising isobutyl, a polymer comprising isopentyl, a polymer comprising isopropyl, a polymer comprising methyl, a polymer comprising methyl 2-methyl-propionate, a polymer comprising neopentyl, a polymer comprising pentyl, a polymer comprising phenyl-sulfide, a polymer comprising propanoic acid, a polymer comprising propanoic acid methyl ester, a polymer comprising propyl, a polymer comprising sec-butyl, a polymer comprising sec-pentyl, a polymer comprising tert-butyl, a polymer comprising tert-pentyl, or a polymer comprising tetra-flour-ethyl More preferably, SE2 is a polyacrylate, a polyolefine, an acrylonitrile butadiene styrene polymer (ABS), an organic polymer, a styrene acrylonitrile copolymer, a styrene butadiene latex, an unsaturated polyester (UPR), a bis-maleimide (BMI), a polymeric cyanate ester, A6 nylon, a polyaryletheretherketone (PEEK), a polyethylenimine (PEI), a poly-etherketone-ketone (PEKK), a poly(methyl methacrylate) (PMMA), a polyphenylene sulfide (PPS), poly(ethylvinyl alcohol) (EVA), a carbon fibre, a carbon nanofibre, a carbon nanothread, a composite material, a fullerene, a graphane molecule, a graphene oxide molecule, a graphyne molecule, a reduced graphene oxide molecule, a metal, a boron nitride sheet, a one-layer molecule, a one-atom layer molecule, a functionalized CNT, a functionalized graphene, a functionalized boron nitride, a multi-walled nanotube, or a single-walled nanotube.

Most preferably, SE2 is a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), a polyvinylchloride (PVC), a MWCNT, a SWCNT, a graphene molecule, a nanotube, or a boron nitride nanotube.

Preferably, the ML or Ligand2 comprises any of the following molecule structures: compound 1 from de Juan et al., 2015, doi: 10.1039/c5sc02916c, compound 2 from de Juan et al., 2015, doi: 10.1039/c5sc02916c, compound 3 from de Juan et al., 2015, doi: 10.1039/c5sc02916c, compound 4 from de Juan et al., 2015, doi: 10.1039/c5sc02916c, compound 5 from de Juan et al., 2015, doi: 10.1039/c5sc02916c, 1,2,3-Trichlorobenzene, 1,2,4-Trichlorobenzene, 9,10-dihydroanthracene, covalent bond, non-covalent bond, peptide composed of 5 amino acids, peptide composed of 6 amino acids, pyrene phenyl ester, small molecule with a molecular weight of 12 to 1200 dalton, benzene, biphenyl, peptide with the sequence CPTSTGQAC, peptide with the sequence CTLHVSSYC, dodecyl-trimethylammonium bromide (DTAB), peptide with the sequence ELWR, peptide with the seqeunce ELWRPTR, with the sequence ELWSIDTSAHRK, fluoranthene, hexane, peptide with the sequence HTDWRLGTWHHS, peptide with the sequence KPRSVSG-dansyl, m-dinitrobenzene, monooleate, monostearate, nitrobenzene, p-nitrotoluene, p-terphenyl, polycyclic carbonhydrides, polystyrene-polyethylene oxide copoymer, polyvinylpyrrolidone, porphyrine, pyrenecarboxylicacid, pyrenyl, peptide with the sequence QLMHDYR, peptide with the sequence QTWPPPLWFSTS, riboflavin, peptide with the sequence RLNPPSQMDPPF, sodium Dodecyl Benzene Sulphonate (SDBS), sodium dodecyl sulfate (SDS), tetraphene, peptide with the sequence IFRLSWGTYFS, peptide with the sequence KTQATSESGSAGRQMFVADMG, peptide with the sequence KTQATSRGTRGMRTSGGFPVG, peptide with the sequence KTQATSVPRKAARRWEQVDSV, peptide with the sequence MHGKTQATSGTIQS, peptide with the sequence PQAQDVELPQELQDQHREVEV, peptide with the sequence SKTSGRDQSKRVPRYWNVHRD, peptide with the sequence SKTSRESSAVQMGKARFLCT, toluene, trans-1,2-diaminocyclohexane-N,N,N9,N9-tetraacetic acid (CDTA), triphenylene, tween-60, tween-80, aromatic molecule, aromatic amino acid, aromatic ring, heteoaromatic ring, non-aromatic molecule, triple bond, Annulene, Aceanthrylene, Acenaphthylene, Acephenanthrylene, Anthracene, as-Indacene, Azulene, Benzene, Biphenylene, Chrysene, Coronene, Decacene, Decahelicene, Decaphene, Fluoranthene, Fluorene, Heptacene, Heptahelicene, Heptaphene, Heptaphenylene, Hexacene, Hexahelicene, Hexaphene, Hexaphenylene, Indene, Naphthalene, Nonacene, Nonahelicene, Nonaphene, Nonaphenylene, Octacene, Octahelicene, Octaphene, Octaphenylene, Ovalene, Pentacene, Pentalene, Pentaphene, Pentaphenylene, Perylene, Phenalene, Phenanthrene, Picene, Pleiadene, Polyacene, Polyalene, Polyaphene, Polyhelicene, Polynaphthylene, Polyphenylene, Pyranthrene, Rubicene, s-Indacene, Tetracene, Tetranaphthylene, Tetraphene, Tetraphenylene, Trinaphthylene, Triphenylene, 1,10-Phenanthroline, 1,5-Naphthyridine, 1,6-Naphthyridine, 1,7-Naphthyridine, 1,7-Phenanthroline, 1,8-Naphthyridine, 1,8-Phenanthroline, 1,9-Phenanthroline, 2,6-Naphthyridine, 2,7-Naphthyridine, 2,7-Phenanthroline, 2,8-Phenanthroline, 2,9-Phenanthroline, 3,7-Phenanthroline, 3,8-Phenanthroline, 4,7-Phenanthroline, Acridarsine, Acridine, Acridophosphine, Arsanthrene, Arsanthridine, Arsindole, Arsindolizine, Arsinoline, Arsinolizine, Boranthrene, Carbazole, Chromene, Cinnoline, Furan, Imidazole, Indazole, Indole, Indolizine, Isoarsindole, Isoarsinoline, Isochromene, Isoindole, Isophosphindole, Isophosphinoline, Isoquinoline, Isoselenochromene, Isotellurochromene, Isothiochromene, Mercuranthrene, Oxanthrene, Perimidine, Phenanthridine, Phenarsazinine, Phenazine, Phenomercurazine, Phenophosphazinine, Phenoselenazine, Phenotellurazine, Phenothiarsinine, Phenothiazine, Phenoxaphosphinine, Phenoxarsinine, Phenoxaselenine, Phenoxastibinine, Phenoxatellurine, Phenoxathiine, Phenoxazine, Phosphanthrene, Phosphanthridine, Phosphindole, Phosphindolizine, Phosphinoline, Phosphinolizine, Phthalazine, Pteridine, Purine, Pyran, Pyrazine, Pyrazole, Pyridazine, Pyridine, Pyrimidine, Pyrrole, Pyrrolizine, Quinazoline, Quinoline, Quinolizine, Quinoxaline, Selenanthrene, Selenochromene, Selenoxanthene, Silanthrene, Telluranthrene, Tellurochromene, Telluroxanthene, Thianthrene, Thiochromene, Thioxanthene, or Xanthene More preferably, ML and/or Ligand2 comprises a diamino pyrene, covalent ligand, anthracene, peptide with the sequence IFRLSWGTYFS, naphtalene, phenanthrene, aminogroup-containing carbonhydride, peptide with the sequence HWKHPWGAWDTL, bis-pyrene, dipyrene (phenyl ester), tetracycline, peptide with the sequence DAEFRHDSGYEVHHQKLVFFAEDVGSNKGAIIGLMVGGVV, or peptide with the sequence DAEFRHDSGYEVHHQKLVFFAEDVGSNKGAIIGLMVGGVVIA.

Most preferably, ML and/or Ligand2 comprises a pyrene, aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, a halogen, nitro group, amine, thiol, alcohol, ester, amide, carboxylic acid, phenol, indole, imidazole, sulfonate or phophate, C1-C10 alkane, such as hexane and heptane, detergent including chemical motifs comprising a C4-C25 alkane and a polar end group such as sulfonate, for example SDBS, Sodium dodecylbenzenesulfonate, lactam, such as N-methyl-pyrrolidone and lactone, amino acid residue such as phenylalanine, tyrosine, tryptophan, histidine, heteroaromatic system, including pyrole, thiophene, furane, pyrazole, imidazole, isoxazole, oxazole, isothiazole, thiazole, pyridine and perylene bisimides, fused ring system, composed of either aromatic, non-aromatic or anti-aromatic rings or combinations thereof.

Preferably, Ligand2 is a non-covalent bond, a single bond, a double bond, a triple bond, peptide with the sequence DAEFRHDSGYEVHHQKLVFFAEDVGSNKGAIIGLMVGGVV, peptide with the sequence DAEFRHDSGYEVHHQKLVFFAEDVGSNKGAIIGLMVGGVVIA or covalent ligand.

More preferably, Ligand2 is an aminogroup-containing carbonhydride, peptide with the sequence HWKHPWGAWDTL, bis-pyrene, dipyrene (phenyl ester), or tetracycline.

Preferably, ML and/or Ligand2 comprises a peptide, anthracene, peptide with the sequence IFRLSWGTYFS, pyrene, diamino pyrene, naphtalene, phenanthrene, aromatic system, such as benzene, nitrobenzene, toluene, 1,2,3-trichlorbenzene, 1,2,4-trichorobenzene, m-dinitrobenzene, p-nitrobenzene, naphthalene, anthracene, fluoranthene, phenanthrene, pyrene, pyrene-diamine, pyrene-phenyl ester, dipyrene (phenyl ester), tetracycline, as well as their substituted variants, a halogen, nitro group, amine, thiol, alcohol, ester, amide, carboxylic acid, phenol, indole, imidazole, sulfonate or phophate, C1-C10 alkane, such as hexane and heptane, detergent including chemical motifs comprising a long alkane (including C4, C5, C6, C7, C8, C9, C10, C11, C12, C13, C14, C15, C16, C17, C18, C19, C20, C21, C22, C23, C24, C25) and a polar end group such as sulfonate, for example SDBS, Sodium dodecylbenzenesulfonate, lactam, such as N-methyl-pyrrolidone and lactone, amino acid residue such as phenylalanine, tyrosine, tryptophan, histidine, a heteroaromatic system, including pyrole, thiophene, furane, pyrazole, imidazole, isoxazole, oxazole, isothiazole, thiazole, pyridine and perylene bisimides, fused ring system, composed of either aromatic, non-aromatic or anti-aromatic rings or combinations thereof, or an amide bond, made up of two amide bonds arranged in parallel Preferably, the Linker is a covalent bond, a nylon polymer molecule, an alkyl chain, a branched alkyl, an aromatic molecule, a heteroaromatic molecule, a dendrimer, a polyeethylene glycol, or a C1-C50 hydrocarbon chain, with 0-20 double bonds and 0-20 triple bonds.

More preferably, the Linker is a polymer, a polyolefine, a polypropylene (PP), a polystyrene (PS), an acrylonitrile butadiene styrene polymer (ABS), an epoxy-based polymer, an organic polymer, a polyethylene terephtalate (PET), a polyvinylchloride (PVC), a styrene acrylonitrile copolymer, a styrene butadiene latex, an unsaturated polyester (UPR), a bis-maleimide (BMI), a polymeric cyanate ester, a polyarylether-etherketone (PEEK), a polyethylenimine (PEI), a poly-ether-ketone-ketone (PEKK), a poly(methyl methacrylate) (PMMA), a polyphenylene sulfide (PPS) or poly(ethylvinyl alcohol) (EVA).

Most preferably, Linker is a linear molecule, a branched molecule, a rigid molecule, a flexible molecule, a polymer, a linear polymer, a branched polymer, a copolymer, a nylon, a polyacrylate, a polyamide (PA), a polycarbonate (PC), a polyethylene (PE), a high density polyethylene (HDPE), a linear low density polyethylene (LLDPE), or a low density polyethylene (LDPE)

Preferred matrices are inorganic matter, biologic matter, non-biologic matter, polymers.

Most preferred matrices are a metal, a ceramic, organic matter, a plastic, a resin, a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), or a polyvinylchloride (PVC)

Preferred polymerisation methods are a polycondensation, a uv-induced polymerisation, a step-growth polymerisation, a chain-growth polymerisation, an emulsion polymerisation, a solution polymerisation, a suspension polymerisation, and a precipitation polymerization.

Preferred processing methods are injection molding, compression molding, transfer molding, blow molding, extrusion, injection molding, liquid casting, DMC, SMC, RIM, RRIM, GRP (hand-layup), GRP (spray and match die), filament winding, pultrusion, rotational molding, thermoforming, screw extrusion, calendering, powder injection molding, thixomolding, coating, cold pressure molding, encapsulation, filament winding, laminating, contact molding and slush molding, Preferred embodiments are a CMU; or a composite material comprising a CMU;

or a composite material comprising a CMU and a matrix chosen from; a metal, a ceramic, organic matter, a plastic, a resin, a copolymer, a high density polyethylene (HDPE), a linear low density polyethylene (LLDPE), a low density polyethylene (LDPE), a nylon, a polyamide (PA), a polycarbonate (PC), a polyethylene (PE), a polymer, a polypropylene (PP), a polystyrene (PS), an epoxy-based polymer, a polyethylene terephtalate (PET), a polyvinylchloride (PVC); wherein the CMU is chosen from the following;

C1.1.1: a CMU, where SE1 is a carbon fibre.

C1.1.2: a CMU, where SE1 is a carbon fibre and SE2 is copolymer.

C1.1.3: a CMU, where SE1 is a carbon fibre, and SE2 is a high density polyethylene.

C1.1.4: a CMU, where SE1 is a carbon fibre, and SE2 is a linear low density polyethylene.

C1.1.5: a CMU, where SE1 is a carbon fibre, and SE2 is a low density polyethylene.

C1.1.6: a CMU, where SE1 is a carbon fibre, and SE2 is a nylon.

C1.1.7: a CMU, where SE1 is a carbon fibre, and SE2 is a polyamide.

C1.1.8: a CMU, where SE1 is a carbon fibre, and SE2 is a polycarbonate.

C1.1.9: a CMU, where SE1 is a carbon fibre, and SE2 is a polyethylene.

C1.1.10: a CMU, where SE1 is a carbon fibre, and SE2 is a polymer.

C1.1.11: a CMU, where SE1 is a carbon fibre, and SE2 is a polypropylene.

C1.1.12: a CMU, where SE1 is a carbon fibre, and SE2 is a polystyrene.

C1.1.13: a CMU, where SE1 is a carbon fibre, and SE2 is an epoxy-based polymer.

C1.1.14: a CMU, where SE1 is a carbon fibre, and SE2 is a polyethylene terephtalate.

C1.1.15: a CMU, where SE1 is a carbon fibre, and SE2 is a polyvinylchloride.

C1.1.16: a CMU, where SE1 is a carbon fibre, and SE2 is a MWCNT.

C1.1.17: a CMU, where SE1 is a carbon fibre, and SE2 is a SWCNT.

C1.1.18: a CMU, where SE1 is a carbon fibre, and SE2 is a GS.

C1.1.19: a CMU, where SE1 is a carbon fibre, and SE2 is a nanotube.

C1.1.20: a CMU, where SE1 is a carbon fibre, and SE2 is a BNNT.

C1.1.21: a CMU, where SE1 is a carbon fibre, and SE2 is a polyacrylate.

C1.1.22: a CMU, where SE1 is a carbon fibre, and SE2 is a polyolefine.

ophan, or histidine, and SE2 is an epoxy-based polymer.

Desired Characteristics of Composite Materials Described Herein.

For any characteristics of composite material mentioned above and below, and in each characteristic's entire range, further characteristics of the composite material that are of importance in the present invention are the crystallinity of the matrix material, stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g.

Depending on the application, composite material with a low, medium, or high degree of each of these characteristics is preferable in the present invention.

Composite Material.

The composite materials of the present invention may have a number of characteristics. One such characteristic is the number of different CMUs in the composite. Several different CMUs may be preferred in cases where a number of different characteristics of the composite is sought, and wherefore several different CMUs may be used, each representing one or more sought characteristic.

Number of Different CMUs in the Composite.

The composite may comprise 2 or more different CMUs, preferably 3 or more, such as 4 or more, 5 or more, 6 or more, 7 or more, 8 or more, 9 or more, 10 or more, 15 or more, 20 or more, 30 or more or 50 or more different CMUs.

For any characteristics of a composite material mentioned above, and in each characteristic's entire range, a further characteristic of importance is the number of CMUs per area or volume in the composite.

Number of CMUs Per Area or Volume in the Composite.

Often it is not the absolute number of CMUs in a composite material, but rather the number of CMUs per area or volume that is most important for obtaining the desired properties of the composite material. If the CMUs are solely providing attractive characteristics at a small cost, it will in most cases be preferable to have as many CMUs as practically possible per square millimeter or per cubic millimeter. However, if the CMU provides advantageous characteristics (e.g. high strength) as well as disadvantageous characteristics (e.g. high conductivity), a compromise must be sought where the desired characteristic (e.g. a certain strength) is obtained, and where the disadvantageous characteristics (e.g. conductivity) is kept appropriately low.

Thus, depending on the context, the total number of of CMUs per square millimeter of the composite material is preferably less than $10^{12}$, such as less than $10^{10}$, such as less than $10^{9}$, such as less than $10^{8}$, such as less than $10^{7}$, such as less than $10^{6}$, such as less than $10^{5}$, such as less than $10^{4}$, such as less than $10^{3}$, such as less than 100, such as less than 10.

As described above, sometimes the highest possible number of CMUs per square millimeter is sought. Thus, depending on the context, the total number of of CMUs per square millimeter of the composite material is preferably more than 10, such as more than 100, such as more than $10^3$, such as more than $10^4$, such as more than $10^5$, such as more than $10^6$, such as more than $10^7$, such as more than $10^8$, such as more than $10^9$, such as more than $10^{10}$, such as more than $10^{12}$.

Composite materials may thus preferably comprise only a few CMUs per square millimeter, such as less than 10 CMUs per square millimeter, or may comprise more, such as 10-100 CMUs per square millimeter, such as 100-1000 CMUs per square millimeter, such as $10^3$-$10^4$ CMUs per square millimeter, such as $10^4$-$10^5$ CMUs per square millimeter, such as $10^5$-$10^6$ CMUs per square millimeter, such as $10^6$-$10^7$ CMUs per square millimeter, such as $10^7$-$10^8$ CMUs per square millimeter, such as $10^8$-$10^9$ CMUs per square millimeter, such as $10^9$-$10^{10}$ CMUs per square millimeter, such as $10^{10}$-$10^{11}$ CMUs per square millimeter, such as $10^{11}$-$10^{12}$ CMUs per square millimeter, or more than $10^{12}$ per square millimeter.

Thus, depending on the context, the total number of of CMUs per cubic millimeter of the composite material is preferably less than $10^{18}$, such as less than $10^{16}$, such as less than $10^{14}$, such as less than $10^{12}$, such as less than $10^{10}$, such as less than $10^8$, such as less than $10^7$, such as less than $10^6$, such as less than $10^4$, such as less than 1000, such as less than 100.

As described above, sometimes the highest possible number of CMUs per cubic millimeter is sought. Thus, depending on the context, the total number of of CMUs per cubic millimeter of the composite material is preferably more than 100, such as more than 1000, such as more than $10^4$, such as more than $10^6$, such as more than $10^8$, such as more than $10^{10}$, such as more than $10^{12}$, such as more than $10^{14}$, such as more than $10^{16}$, such as more than $10^{18}$, such as more than $10^{20}$.

Composite materials may thus preferably comprise only a few CMUs per cubic millimeter, such as less than 100 CMUs per cubic millimeter, or may comprise more, such as 100-1000 CMUs per cubic millimeter, such as $10^3$-$10^5$ CMUs per cubic millimeter, such as $10^5$-$10^8$ CMUs per cubic millimeter, such as $10^8$-$10^{11}$ CMUs per cubic millimeter, such as $10^{11}$-$10^{14}$ CMUs per cubic millimeter, such as $10^{14}$-$10^{16}$ CMUs per cubic millimeter, such as $10^{16}$-$10^{18}$ CMUs per cubic millimeter, such as 1018-1020 CMUs per cubic millimeter, or more than $10^{20}$ per cubic millimeter.

For any characteristics of a composite material mentioned above, and in each characteristic's entire range, a further characteristic of importance is the number of different SEs in the composite.

Number of Different SEs in the Composite.

The composite may comprise 2 or more different SE, preferably 3 or more, such as 4 or more, 5 or more, 6 or more, 7 or more, 8 or more, 9 or more, 10 or more, 15 or more, 20 or more, 30 or more or 50 or more different SEs.

For any characteristics of a composite material mentioned above, and in each characteristic's entire range, a further characteristic of importance is the melting point of the composite material.

Melting Point of Composite Material.

The melting point of the composite material is an important parameter and in some cases, such as ceramic brakes for automobiles, aircrafts and trains, a high melting point is desired. Thus, depending on the context, the melting point of the composite material is preferably greater than −20° C., such as greater than 0° C., such as greater than 50° C., such as greater than 100° C., such as greater than 200° C., such as greater than 400° C., such as greater than 600° C., such as greater than 800° C., such as greater than 1,000° C., such as greater than 1,500° C., such as greater than 2,000° C., such as greater than 3,000° C., such as greater than 4,000° C., such as greater than 6,000° C., such as greater than 8,000° C.

In other cases, a composite material's flexibility at low temperatures is important, wherefore a low melting point may be advantageous. Thus, depending on the context, the melting point of the composite material is preferably less than 8,000° C., such as less than 6,000° C., such as less than 4,000° C., such as less than 3,000° C., such as less than 2,000° C., such as less than 1,500° C., such as less than 1,000° C., such as less than 800° C., such as less than 600° C., such as less than 400° C., such as less than 200° C., such as less than 100° C., such as less than 50° C., such as less than 0° C., such as less than −20° C.

Composite materials may have melting points below 0° C., such as between −20° C. and 0° C.; or may be higher, such as between 0° C. and 50° C., or between 50° C. and 100° C., or between 100° C. and 200° C., or between 200° C. and 300° C., or between 300° C. and 400° C., or between 400° C. and 500° C., or between 500° C. and 600° C., or between 600° C. and 700° C., or between 700° C. and 800° C., or between 800° C. and 900° C., or between 900° C. and 1,000° C., or between 1,000° C. and 1,100° C., or between 1,000° C. and 1,200° C., or between 1,200° C. and 1,400° C., or between 1,400° C. and 1,600° C., or between 1,600° C. and 1,800° C., or between 1,800° C. and 2,000° C., or between 2,000° C. and 2,200° C., or between 2,200° C. and 2,400° C., or between 2,400° C. and 2,600° C., or between 2,600° C. and 2,800° C., or between 2,800° C. and 3,000° C., or between 3,000° C. and 3,200° C., or between 3,200° C. and 3,400° C., or between 3,400° C. and 3,600° C., or between 3,600° C. and 3,800° C., or between 3,800° C. and 4,000° C., or between 4,000° C. and 4,200° C., or between 4,200° C. and 4,400° C., or between 4,400° C. and 4,600° C., or between 4,600° C. and 4,800° C., or between 4,800° C. and 5,000° C., or between 5,000° C. and 5,200° C., or between 5,200° C. and 5,400° C., or between 5,400° C. and 5,600° C., or between 5,600° C. and 5,800° C., or between 5,800° C. and 6,000° C., or between 6,000° C. and 6,200° C., or between 6,200° C. and 6,400° C., or between 6,400° C. and 6,600° C., or between 6,600° C. and 6,800° C., or between 6,800° C. and 7,000° C., or between 7,000° C. and 7,200° C., or between 7,200° C. and 7,400° C., or between 7,400° C. and 7,600° C., or between 7,600° C. and 7,800° C., or between 7,800° C. and 8,000° C., or between 8,000° C. and 8,200° C., or between 8,400° C. and 8,600° C., or between 8,600° C. and 8,800° C., or between 8,800° C. and 9,000° C., or between 9,000° C. and 9,200° C., or between 9,200° C. and 9,400° C., or between 9,400° C. and 9,600° C., or between 9,600° C. and 9,800° C., or between 9,800° C. and 10,000° C., or between 10,000° C. and 11,000° C., or between 11,000° C. and 12,000° C., or between 12,000° C. and 13,000° C., or between 13,000° C. and 14,000° C., or between 14,000° C. and 15,000° C., or between 15,000° C. and 16,000° C., or between 16,000° C. and 17,000° C., or between 17,000° C. and 18,000° C., or between 18,000° C. and 19,000° C., or between 19,000° C. and 20,000° C., or above 20,000° C.

For any characteristics of a composite material mentioned above, and in each characteristic's entire range, a further characteristic of importance is the density and strength of the composite material.

Density and Strength of the Composite Material.

For certain applications, for example in the airplane or automotive industry, the strength and density of the composite material is of prime importance. Often, both low density and high strength is desired. However, as these two parameters often are opposing factors, a compromise will have to be made. Therefore, sometimes a high density is acceptable to gain strength, such as high tensile strength or large Young's Modulus. In other cases, low density is necessary, even if lower strength results. Thus, in preferred embodiments the composite material may have relatively low Young's modulus or low tensile strength, and in other preferred embodiments the composite material has large Young's modulus or large tensile strength; and likewise, in preferred embodiments the density can vary from very small to very large.

The specific density of composite materials of the present invention may be lower than 0.01 kg/L, but may also include specific densities in the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L.

In some cases high specific densities are preferred. This may be the case when the composite material is e.g. an anchor, as an anchor should rest heavily on the bottom. Thus, depending on the context, the specific density is preferably greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L.

In many cases low specific density is preferred. This is for example the case if the composite material is used to make ships that must float on the water, wherefore the weight must be minimized. Thus, depending on the context, the specific density is preferably less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

The Young's Modulus of Composite Materials.

In the majority of applications of composite materials, a high Young's modulus is preferred, as this will allow the material to recover its original shape after force has been applied to the material. Thus, depending on the context, the Young's modulus is preferably greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa.

However, in a few applications, a low Young's modulus is desirable. This is for example the case when the degree of deformation of a composite material is being used as a measure of how much force was applied to the material. Thus, depending on the context, the Young's modulus is preferably less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa.

The Young's modulus of composite materials suitable for the present invention can thus be lower than 0.001 TPa, but may also include SEs with Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa (e.g. stainless steel); 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa (e.g. single-walled carbon nanotubes); 2-3 TPa; 3-4 TPa; 4-5 TPa; 5-7 TPa; 7-10 TPa; or above 10 TPA.

Preferred tensile strength of composite materials is in most cases high, as this is suitable for a large number of applications, e.g. stronger fishing lines and stronger cables. Thus, depending on the context, the tensile strength of the composite material is preferably greater than 0.01 GPa, such as greater than 0.05 GPa, such as greater than 0.1 GPa, such as greater than 0.5 GPa, such as greater than 1 GPa, such as greater than 2 GPa, such as greater than 3 GPa, such as greater than 5 GPa, such as greater than 10 GPa, such as greater than 20 GPa, such as greater than 30 GPa, such as greater than 40 GPa, such as greater than 60 GPa, such as greater than 80 GPa, such as greater than 100 GPa, such as greater than 200 GPa.

However, in some cases a low tensile strength is advantageous, for example in cables or lines that must break for safety reasons, in order to avoid damage to individuals. Thus, depending on the context, the tensile strength of the composite material is preferably less than 200 GPa, such as less than 100 GPa, such as less than 80 GPa, such as less than 60 GPa, such as less than 40 GPa, such as less than 30 GPa, such as less than 20 GPa, such as less than 10 GPa, such as less than 5 GPa, such as less than 3 GPa, such as less than 2 GPa, such as less than 1 GPa, such as less than 0.5 GPa, such as less than 0.1 GPa, such as less than 0.05 GPa, such as less than 0.01 GPa.

The tensile strength for composite materials suitable for the present invention can thus be lower than 0.01 GPa, but may also include composite materials with tensile strengths in the following ranges: 0.01-0.03 GPa; 0.03-0.05 GPa; 0.05-0.07 GPa; 0.07-0.09 GPa; 0.09-0.1 GPa; 0.1-0.11 GPa; 0.11-0.12 GPa; 0.12-0.13 GPa; 0.13-0.14 GPa; 0.14-0.15 GPa; 0.15-0.16 GPa; 0.16-0.17 GPa; 0.17-0.18 GPa; 0.18-0.19 GPa; 0.19-0.20 GPa; 0.20-0.22 GPa; 0.22-0.25 GPa; 0.25-0.30 GPa; 0.30-0.35 GPa; 0.35-0.40 GPa; 0.40-0.45 GPa; 0.45-0.50 GPa; 0.50-0.60 GPa; 0.60-0.80 GPa; 0.80-1.0 GPa; 1-2 GPa (e.g. stainless steel); 2-3 GPa; 3-4 GPa; 4-5 GPa; 5-7 GPa; 7-10 GPa; 10-15 GPa; 15-20 GPa; 20-25 GPa; 25-30 GPa; 30-35 GPa; 35-40 GPa; 40-45 GPa; 45-50 GPa (e.g. single-walled carbon nanotubes); 50-55 GPa; 55-60 GPa; 60-65 GPa; 65-70 GPa; 70-75 GPa; 75-80 GPa; 80-85 GPa; 85-90 GPa; 90-100 GPa; 100-200 GPa, or above 200 GPa.

Often, it is the ratio of strength to density that is most important. The strength/specific density ratio for the composite material that is preferred under the present invention is represented by all the ratios that can be obtained, by dividing the abovementioned strengths with the abovementioned specific densities. Thus, preferred embodiments have composite materials with strength/specific densities in the range 0.00003-1000 TPa L/Kg (where strength is represented by Young's modulus). More specifically, the strength/specific density (Young's Modulus) of the composite material is preferably in the range 0.00003-1000 TPa L/Kg, more preferably 0.001-1000 TPA L/Kg, more preferably 0.01-1000 TPA L/Kg, more preferably 0, 1-1000 TPA L/Kg, more preferably 1-1000 TPA L/Kg, more preferably 10-1000 TPA L/Kg, more preferably 100-1000 TPA L/Kg, and more preferably 500-1000 TPA L/Kg, or higher. Where strength is measured as Tensile strength, the preferred embodiments have composite materials with strength/specific density in the range 0.0003-20000 GPa L/Kg. More specifically, the tensile strength/specific density of the composite material is preferably in the range 0.0003-20000 TPa L/Kg, more preferably 0.01-20000 TPA L/Kg, more preferably 0, 1-20000 TPA L/Kg, more preferably 1-20000 TPA L/Kg, more preferably 10-20000 TPA L/Kg, more preferably 100-20000 TPA L/Kg, more preferably 1000-20000 TPA L/Kg, more preferably 5000-20000 TPA L/Kg, and more preferably 10000-20000 TPA L/Kg, or higher.

Ratio of strength to specific density is often important. The strength/specific density ratio for the composite material that is preferred under the present invention is represented by all the ratios that can be obtained, by dividing the abovementioned strengths with the abovementioned specific densities. Thus, preferred embodiments have composite material with strength/specific densities in the range 0.00003-1,000 TPa L/Kg (where strength is represented by Young's modulus). More specifically, the strength/specific density (Young's Modulus) of the composite material is preferably in the range 0.00003-1,000 TPa L/Kg, more preferably 0.001-1,000 TPA L/Kg, more preferably 0.01-1,000 TPA L/Kg, more preferably 0.1-1,000 TPA L/Kg, more preferably 1-1,000 TPA L/Kg, more preferably 10-1,000 TPA L/Kg, more preferably 100-1,000 TPA L/Kg, and more preferably 500-1,000 TPA L/Kg, or higher.

In cases where e.g. the Young's modulus should be low (see above), the Young's modulus/specific density ratio is preferably less than 1,000 TPA L/kg, such as less than 500 TPA L/kg, such as less than 100 TPa L/kg, such as less than 10 TPa L/kg, such as less than 1 TPa L/kg, such as less than 0.1 TPa L/kg, such as less than 0.01 TPa L/kg, such as less than 0.001 TPa L/kg, such as less than 0.00003 TPa L/kg.

In cases where e.g. Young's modulus is preferably high, the Young's modulus/specific density ratio is preferably greater than 0.00003 TPa L/kg, such as greater than 0.001 TPa L/kg, such as greater than 0.01 TPa L/kg, such as greater than 0.1 TPa L/kg, such as greater than 1 TPa L/kg, such as greater than 10 TPa L/kg, such as greater than 100 TPa L/kg, such as greater than 500 TPa L/kg, such as greater than 1,000 TPA L/kg.

Where strength is measured as tensile strength, the preferred embodiments have composite materials with strength/specific density in the range 0.0003-20,000 GPa L/Kg. More specifically, the tensile strength/specific density of the composite material is preferably in the range 0.0003-20,000 GPa L/Kg, more preferably 0.01-20,000 GPa L/Kg, more preferably 0.1-20,000 GPa L/Kg, more preferably 1-20,000 GPa L/Kg, more preferably 10-20,000 GPa L/Kg, more preferably 100-20,000 GPa L/Kg, more preferably 1,000-20,000 GPa L/Kg, more preferably 5,000-20,000 GPa L/Kg, and more preferably 10,000-20,000 GPa L/Kg, or higher.

In cases where e.g. the tensile strength is preferably low (see above), the tensile strength/specific density ratio is preferably less than 20,000 GPa L/kg, such as less than 10,000 GPa L/kg, such as less than 5,000 GPa L/kg, such as less than 1,000 GPa L/kg, such as less than 100 GPa L/kg, such as less than 10 GPa L/kg, such as less than 1 GPa L/kg, such as less than 0.1 GPa L/kg, such as less than 0.0003 GPa L/kg.

In cases where e.g. tensile strength is preferably high, the tensile strength/specific density ratio is preferably greater than 0.0003 GPa L/kg, such as greater than 0.1 GPa L/kg, such as greater than 1 GPa L/kg, such as greater than 10 GPa L/kg, such as greater than 100 GPa L/kg, such as greater than 1,000 GPa L/kg, such as greater than 5,000 GPa L/kg, such as greater than 10,000 GPa L/kg, such as greater than 20,000 GPA L/kg.

Preferred fracture toughness of composite materials is in most cases high, as this results in a low risk of cracks propagating through the composite, ultimately leading to fracture. Examples of composite materials where a high fracture toughness is desirable includes, but are not limited to, wind turbine blades and airplane wings. Thus, depending on the context, the fracture toughness is preferably greater than 0.01 MPa·m$^{1/2}$, such as greater than 0.1 MPa·m$^{1/2}$, such as greater than 1 MPa·m$^{1/2}$, such as greater than 2 MPa·m$^{1/2}$, such as greater than 5 MPa·m$^{1/2}$, such as greater than 10 MPa·m$^{1/2}$, such as greater than 15 MPa·m$^{1/2}$, such as greater than 20 MPa·m$^{1/2}$, such as greater than 25 MPa·m$^{1/2}$, such as greater than 30 MPa·m$^{1/2}$, such as greater than 40 MPa·m$^{1/2}$, such as greater than 50 MPa·m$^{1/2}$, such as greater than 75 MPa·m$^{1/2}$, such as greater than 100 MPa·m$^{1/2}$, However, in some applications, a low fracture toughness is desirable. As an example, the fracture toughness of the windows in a train needs to be sufficiently low that a person can break the window using an appropriate tool in an emergency situation. Thus, depending on the context, the fracture toughness is preferably less than 100 MPa·m$^{1/2}$, such as less than 75 MPa·m$^{1/2}$, such as less than 50 MPa·m$^{1/2}$, such as less than 40 MPa·m$^{1/2}$, such as less than 30 MPa·m$^{1/2}$, such as less than 25 MPa·m$^{1/2}$, such as less than 20 MPa·m$^{1/2}$, such as less than 15 MPa·m$^{1/2}$, such as less than 10 MPa·m$^{1/2}$, such as less than 5 MPa·m$^{1/2}$, such as less than 2 MPa·m$^{1/2}$, such as less than 1 MPa·m$^{1/2}$, such as less than 0.1 MPa·m$^{1/2}$, such as less than 0.01 MPa·m$^{1/2}$.

The fracture toughness for composite materials suitable for the present invention can thus be lower than 0.01 MPa·m$^{1/2}$, but may also include composite materials with fracture toughness in the following ranges: 0.01-0.1 MPa·m$^{1/2}$, 0.1-1 MPa·m$^{1/2}$, 1-2 MPa·m$^{1/2}$, 2-5 MPa·m$^{1/2}$, 5-10 MPa·m$^{1/2}$, 10-15 MPa·m$^{1/2}$, 15-20 MPa·m$^{1/2}$, 20-25 MPa·m$^{1/2}$, 25-30 MPa·m$^{1/2}$, 30-40 MPa·m$^{1/2}$, 40-50 MPa·m$^{1/2}$, 50-75 MPa·m$^{1/2}$, 75-100 MPa·m$^{1/2}$, or above 100 MPa·m$^{1/2}$.

Bulk modulus of composite materials. In the majority of applications of composite materials, a high bulk modulus is preferred, as this will allow the composite material to withstand a high compression, which is important in structural elements of buildings, bridges, etc. Thus, depending on the context, the bulk modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa.

However, in a few applications, a low bulk modulus is desirable. This is for example the case in some foam products, where it should be easy to compress the foam, e.g. using a person's body weight. One such example may be skiing boots where the foam must be able to deform, in order to take up the shape of the skier's foot. Thus, depending on the context, the bulk modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The bulk modulus for composite materials suitable for the present invention can thus be lower than 0.001 GPa, but may also include composite materials with bulk modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Shear modulus of composite materials. In the majority of applications of composite materials, a high shear modulus is preferred, as this will allow the composite material to withstand large forces imposed on the composite material in parallel, but opposite directions, e.g. brakes on bicycles, cars, wind turbines, etc. Thus, depending on the context, the shear modulus is preferably greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa.

However, in some applications, a low shear modulus is desirable. This is for example the case in plastic composite materials used for buttons, e.g. to turn on or off electronic equipment. Such buttons must have a low shear modulus so pressing them is sufficiently easy. Thus, depending on the context, the shear modulus is preferably less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa.

The shear modulus for composite materials suitable for the present invention can thus be lower than 0.001 GPa, but may also include composite materials with shear modules in the following ranges: 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Other kinds of strength, such as torsional strength and impact strength, are also of importance. Thus, composite materials with low, medium or high torsional strength, and composite materials with low, medium or high impact strength are suitable for the present invention, and thus represent preferred embodiments.

For any characteristics of a composite material mentioned above, and in each characteristic's entire range, a further characteristic of importance is the conductivity of the composite material.

Conductivity of Composite Material.

In certain applications, e.g. use of a composite material in wind turbine blades, it may be important that the propellers are non-conductive, in order to not attract lightning. In other cases, it may be desirable to prepare composite materials of modest or high conductivity, in order to be able to detect cracks in the material by analytical measurement of the conductance of the material. Likewise, for composite materials used in e.g. nanosensor technology it may be important that the composite material is conductive, in order to be able to detect changes in conductivity induced by the association of an analyte with the composite material. In some sensor applications it may be desirable to have high conductivity (if the analyte has a strong reducing effect on the conductance of the composite material), or it may be desirable to use a composite material with an intermediate conductivity in order to detect small changes in conductivity. Thus, depending on the application it may be desirable that the composite material has low, intermediate or high conductivity. Composite materials may have conductivities ranging from below $10^{-30}$ S/m to at least $10^{11}$ S/m and higher, such as from below $10^{-30}$ S/m to $10^{-25}$ S/m (e.g. Teflon), such as from $10^{-25}$ S/m to $10^{-20}$ S/m (e.g. PET), such as from $10^{-20}$ S/m to $10^{-15}$ S/m (e.g. Quarts (fused) and Paraffin), such as from $10^{-15}$ S/m to $10^{-10}$ S/m (e.g. Hard Rubber, Diamond, Glass), such as from $10^{-10}$ S/m to $10^{-5}$ S/m (e.g. GaAs, Silicon), such as from $10^{-5}$ S/m to 1 S/m, such as from 1 S/m to 10 S/m (e.g. Germanium), such as from 10 S/m to $10^{2}$ S/m, such as from $10^{2}$ S/m to $10^{4}$ S/m (e.g. graphite), such as from $10^{4}$ S/m to $10^{6}$ S/m (e.g. Nichrome, Mercury,), such as from $10^{6}$ S/m to $10^{8}$ S/m (e.g. Stainless steel, Titanium, Platinum, Iron, Lithium, Aluminum, Gold, Copper, Silver), such as from $10^{8}$ S/m to $10^{9}$ S/m, such as from $10^{9}$ S/m to $10^{10}$ S/m, such as from $10^{10}$ S/m to $10^{11}$ S/m (e.g. Carbon nanotubes), such as from $10^{11}$ S/m to $10^{12}$ S/m (e.g. Carbon nanotubes), such as from $10^{12}$ S/m to $10^{14}$ S/m, and above $10^{14}$ S/m (e.g. superconducting material).

Thus, depending on the context, the conductivity of a composite material is preferably greater than $10^{-30}$ S/m, such as greater than $10^{-25}$ S/m, such as greater than $10^{-20}$ S/m, such as greater than $10^{-15}$ S/m, such as greater than $10^{-10}$ S/m, such as greater than $10^{-5}$ S/m, such as greater than 1 S/m, such as greater than 10 S/m, such as greater than $10^{2}$ S/m, such as greater than $10^{4}$ S/m, such as greater than $10^{6}$ S/m, such as greater than $10^{8}$ S/m, such as greater than $10^{9}$ S/m, such as greater than $10^{10}$ S/m, such as greater than $10^{11}$ S/m, such as greater than $10^{12}$ S/m, such as greater than $10^{13}$ S/m, such as greater than $10^{14}$ S/m.

In other applications, and depending on the context, the conductivity is preferably less than $10^{14}$ S/m, such as less than $10^{13}$ S/m, such as less than $10^{12}$ S/m, such as less than $10^{11}$ S/m, such as less than $10^{10}$ S/m, such as less than $10^{9}$ S/m, such as less than $10^{8}$ S/m, such as less than $10^{6}$ S/m, such as less than $10^{4}$ S/m, such as less than $10^{2}$ S/m, such as less than 10 S/m, such as less than 1 S/m, such as less than $10^{-5}$ S/m, such as less than $10^{-10}$ S/m, such as less than $10^{-15}$ S/m, such as less than $10^{-20}$ S/m, such as less than $10^{-25}$ S/m, such as less than $10^{-30}$ S/m.

For any characteristics of a composite material mentioned above, and in each characteristic's entire range, a further characteristic of importance is the degree to which the composite material can be elongated (stretched) without breaking.

Elongation at Break.

In many applications, a high elongation at break is preferred. This is for example important in composite materials that absorb energy by deforming plastically such as crash barriers and car bumpers. Thus, depending on the context, the elongation at break of a composite material is preferably greater than 0.1%, such as greater than 1%, such as greater than 5%, such as greater than 10%, such as greater than 20%, such as greater than 30%, such as greater than 40%, such as greater than 50%, such as greater than 60%, such as greater than 70%, such as greater than 80%, such as greater than 90%, such as greater than 100%, such as greater than 150%, such as greater than 200%, such as greater than 300%, such as greater than 400%, such as greater than 500%, such as greater than 800%, such as greater than 1,500%.

In other applications, a low elongation at break is preferred. This is important in composite materials that must not deform even under harsh conditions such as high pressure and elevated temperature; one such example is ceramic brakes on automobiles, aircrafts and trains. Thus, depending on the context, the elongation at break of a composite material is preferably less than 1,500%, such as less than 800%, such as less than 500%, such as less than 400%, such as less than 300%, such as less than 200%, such as less than 150%, such as less than 100%, such as less than 90%, such as less than 80%, such as less than 70%, such as less than 60%, such as less than 50%, such as less than 40%, such as less than 30%, such as less than 20%, such as less than 10%, such as less than 5%, such as less than 1%, such as less than 0.1%.

Composite materials suitable for the present invention can thus have an elongation at break of less than 0.1%, or have elongation at break including the following ranges: 0.1-1%, 1-5%, 5-10%, 10-20%, 20-30%, 30-40%, 40-50%, 50-60%, 60-70%, 70-80%, 80-90%, 90-100%, 100-150%, 150-200%, 200-300%, 300-400%, 400-500%, 500-800%, 800-1,500%, or have elongation at break above 1,500%.

For any characteristics of a composite material mentioned above, and in each characteristic's entire range, a further characteristic of importance is the size of the composite material.

Size of Composite Material.

The size and shape of the composite material are important parameters. Thus, although depending on the characteristics of the composite material, composite materials may benefit from being large in size, as measured by the total weight of a piece of the composite material, the largest single dimension of a piece of composite material, or the total volume of a piece of composite material. Thus, depending on the context, the total weight of the composite material is preferably greater than $10^{-12}$ kg, such as greater than $10^{-11}$ kg, such as greater than $10^{-10}$ kg, such as greater than $10^{-9}$ kg, such as greater than $10^{-8}$ kg, such as greater than $10^{-7}$ kg, such as greater than $10^{-6}$ kg, such as greater than $10^{-5}$ kg, such as greater than $10^{-4}$ kg, such as greater than $10^{-3}$ kg, such as greater than 0.01 kg, such as greater than 0.1 kg, such as greater than 1 kg, such as greater than 10 kg, such as greater than 100 kg, such as greater than $10^3$ kg, such as greater than $10^4$ kg, such as greater than $10^5$ kg, such as greater than $10^6$ kg, such as greater than $10^7$ kg, such as greater than $10^8$ kg, such as greater than $10^9$ kg.

And the largest dimension of a composite material is preferably, depending on the context, greater than 0.1 Å, such as greater than 2 Å, such as greater than 1 nm, such as greater than 10 nm, such as greater than 100 nm, such as greater than 1 μm, such as greater than 10 μm, such as greater than 100 μm, such as greater than 1 mm, such as greater than 10 mm, such as greater than 100 mm, such as greater than 1 m, such as greater than 10 m, such as greater than 100 m, such as greater than 1,000 m.

And the total volume of a composite material is preferably, depending on the context, greater than 1 $nm^3$, such as greater than 1,000 $nm^3$, such as greater than 1,000,000 $nm^3$, such as greater than 1 $μm^3$, such as greater than 1,000 $μm^3$, such as greater than 1,000,000 $μm^3$, such as greater than 1 $mm^3$, such as greater than 1,000 $mm^3$, such as greater than 1,000,000 $mm^3$, such as greater than 1 $m^3$, such as greater than 10 $m^3$, such as greater than 100 $m^3$, such as greater than 1,000 $m^3$.

On the other hand, a composite material, depending on other characteristics of the composite material, may benefit from being small in size, as measured by the total weight of a piece of the composite material, the largest single dimension of a piece of composite material, or the total volume of a piece of composite material. Thus, depending on the context, the total weight of the composite material is preferably less than $10^9$ kg, such as less than $10^8$ kg, such as less than $10^7$ kg, such as less than $10^6$ kg, such as less than $10^5$ kg, such as less than $10^4$ kg, such as less than $10^3$ kg, such as less than 100 kg, such as less than 10 kg, such as less than 1 kg, such as less than 0.1 kg, such as less than 0.01 kg, such as less than $10^{-3}$ kg, such as less than $10^{-4}$ kg, such as less than $10^{-5}$ kg, such as less than $10^{-6}$ kg, such as less than $10^{-7}$ kg, such as less than $10^{-8}$ kg, such as less than $10^{-9}$ kg, such as less than $10^{-10}$ kg, such as less than $10^{-11}$ kg, such as less than $10^{-12}$ kg.

And the largest dimension of a composite material is preferably, depending on the context, less than 1,000 m, such as less than 100 m, such as less than 10 m, such as less than 1 m, such as less than 100 mm, such as less than 10 mm, such as less than 1 mm, such as less than 100 μm, such as less than 10 μm, such as less than 1 μm, such as less than 100 nm, such as less than 10 nm, such as less than 1 nm, such as less than 2 Å, such as less than 0.1 Å.

And the total volume of a composite material is preferably, depending on the context, less than 1,000 $m^3$, such as less than 100 $m^3$, such as less than 10 $m^3$, such as less than 1 $m^3$, such as less than 1,000,000 $mm^3$, such as less than 1,000 $mm^3$, such as less than 1 $mm^3$, such as less than 1,000,000 $μm^3$, such as less than 1,000 $μm^3$, such as less than 1 $μm^3$, such as less than 1,000,000 $nm^3$, such as less than 1,000 $nm^3$, such as less than 1 $nm^3$.

Often, the choice of size and shape will be a compromise between opposing interests. Thus, in preferred embodiments the composite material may be very small to very large, depending on the application.

Therefore, the preferred compromise between high and low weight of the composite material depends on the context, and may be smaller than $10^{-12}$ kg, but may also be in the range of $10^{-12}$-$10^{-11}$ kg, $10^{-11}$-$10^{-10}$ kg, $10^{-10}$-$10^{-9}$ kg, $10^{-9}$-$10^{-8}$ kg, $10^{-8}$-$10^{-7}$ kg, $10^{-7}$-$10^{-6}$ kg, $10^{-6}$-$10^{-5}$ kg, $10^{-5}$-$10^{-4}$ kg, $10^{-4}$-$10^{-3}$ kg, 0.001-0.01 kg, 0.01-0.1 kg, 0.1-1 kg, 1-10 kg, 10-100 kg, 100-1,000 kg, $10^3$-$10^4$ kg, $10^4$-$10^5$ kg, $10^5$-$10^6$ kg, $10^6$-$10^7$ kg, $10^7$-$10^8$ kg, $10^8$-$10^9$ kg, or above $10^9$ kg.

Therefore, the preferred compromise between large and small dimensions of the composite material depends on the context, and may be smaller than 0.01 Å, but may also be in the range of 0.1-2 Å, 0.2-1 nm, 1-10 nm, 10-100 nm, 0.1-1 μm, 1-10 μm, 10-100 μm, 0.1-1 mm, 1-10 mm, 10-100 mm, 0.1-1 m, 1-10 m, 10-100 m, 100-1,000 m, or above 1,000 m.

Therefore, the preferred compromise between a large and a low volume of the composite material depends on the context, and may be smaller than 1 $nm^3$, but may also be in the range of 1-1,000 $nm^3$, 1,000-1,000,000 $nm^3$, 0.001-1 $μm^3$, 1-1,000 $μm^3$, 1,000-1,000,000 $μm^3$, 0.001-1 $mm^3$, 1-1,000 $mm^3$, 1,000-1,000,000 $mm^3$, 0.001-1 $m^3$, 1-10 $m^3$, 10-100 $m^3$, 100-1,000 $m^3$, or above 1,000 $m^3$.

For any characteristics of a composite material mentioned above, and in each characteristic's entire range, a further characteristic of importance is the number of SEs in the composite material.

In many applications, a high number of SEs in a composite material is preferred, as the characteristics of the SE (e.g. high tensional strength) become more pronounced in the composite material. Thus, depending on the context, the total number of SEs in a composite material is preferably greater than 1E+00, such as greater than 1E+01, such as greater than 1E+02, such as greater than 1E+03, such as greater than 1E+04, such as greater than 1E+05, such as greater than 1E+06, such as greater than 1E+07, such as greater than 1E+08, such as greater than 1E+09, such as greater than 1E+10, such as greater than 1E+11, such as greater than 1E+12, such as greater than 1E+13, such as greater than 1E+14, such as greater than 1E+15, such as greater than 1E+16, such as greater than 1E+17, such as greater than 1E+18, such as greater than 1E+19, such as greater than 1E+20.

In other applications, a low number of SEs in a composite material is preferred, as it makes processing of the composite material easier and/or reduces the cost of the final composite material. Thus, depending on the context, the total number of SEs in a composite material is preferably less than 1E+20, such as less than 1E+19, such as less than 1E+18, such as less than 1E+17, such as less than 1E+16, such as less than 1E+15, such as less than 1E+14, such as less than 1E+13, such as less than 1E+12, such as less than 1E+11, such as less than 1E+10, such as less than 1E+09, such as less than 1E+08, such as less than 1E+07, such as less than 1E+06, such as less than 1E+05, such as less than 1E+04, such as less than 1E+03, such as less than 1E+02, such as less than 1E+01, such as less than 2E+00.

Thus, the preferred compromise between a high and a low number of SEs in a composite material depends on the context, and may be smaller than 2, but may also be in the range of 1E+00-1E+01, 1E+01-1E+02, 1E+02-1E+03, 1E+03-1E+04, 1E+04-1E+05, 1E+05-1E+06, 1E+06-1E+07, 1E+07-1E+08, 1E+08-1E+09, 1E+09-1E+10, 1E+10-1E+11, 1E+11-1E+12, 1E+12-1E+13, 1E+13-1E+14, 1E+14-1E+15, 1E+15-1E+16, 1E+16-1E+17, 1E+17-1E+18, 1E+18-1E+19, 1E+19-1E+20, or above 1E+20.

For any characteristics of a composite material mentioned above, and in each characteristic's entire range, a further characteristic of importance is the total weight of the SEs in the composite material.

In many applications, a high total weight of an SE in a composite material is preferred, as the preferred characteristics of the SE (e.g. a high Young's modulus) then become more pronounced in the composite material. Thus, depending on the context, the total weight of SEs in a composite material is preferably greater than 1E−15 kg, such as greater than 1E−14 kg, such as greater than 1E−13 kg, such as greater than 1E−12 kg, such as greater than 1E−11 kg, such as greater than 1E−10 kg, such as greater than 1E−09 kg, such as greater than 1E−08 kg, such as greater than 1E−07 kg, such as greater than 1E−06 kg, such as greater than 1E−05 kg, such as greater than 1E−04 kg, such as greater than 1E−03 kg, such as greater than 1E−02 kg, such as greater than 1E−01 kg, such as greater than 1E+00 kg, such as greater than 1E+01 kg, such as greater than 1E+02 kg, such as greater than 1E+03 kg, such as greater than 1E+04 kg, such as greater than 1E+05 kg, such as greater than 1E+06 kg, such as greater than 1E+07 kg, such as greater than 1E+08 kg, such as greater than 1E+09 kg.

In other applications, a low total weight of an SE in a composite material is preferred, as it reduces the total weight of the composite material. Thus, depending on the context, the total number of SEs in a composite material is preferably less than 1E+09 kg, such as less than 1E+08 kg, such as less than 1E+07 kg, such as less than 1E+06 kg, such as less than 1E+05 kg, such as less than 1E+04 kg, such as less than 1E+03 kg, such as less than 1E+02 kg, such as less than 1E+01 kg, such as less than 1E+00 kg, such as less than 1E−01 kg, such as less than 1E−02 kg, such as less than 1E−03 kg, such as less than 1E−04 kg, such as less than 1E−05 kg, such as less than 1E−06 kg, such as less than 1E−07 kg, such as less than 1E−08 kg, such as less than 1E−09 kg, such as less than 1E−10 kg, such as less than 1E−11 kg, such as less than 1E−12 kg, such as less than 1E−13 kg, such as less than 1E−14 kg, such as less than 1E−15 kg.

Thus, the preferred compromise between a high and a low total weight of an SE in a composite material depends on the context, and may be smaller than 1E−15 kg, but may also be in the range of 1E−15-1E−14 kg, 1E−14-1E−13 kg, 1E−13-1E−12 kg, 1E−12-1E−11 kg, 1E−11-1E−10 kg, 1E−10-1E−09 kg, 1E−09-1E−08 kg, 1E−08-1E−07 kg, 1E−07-1E−06 kg, 1E−06-1E−05 kg, 1E−05-1E−04 kg, 1E−04-1E−03 kg, 1E−03-1E−02 kg, 1E−02-1E−01 kg, 1E−01-1E+00 kg, 1E+00-1E+01 kg, 1E+01-1E+02 kg, 1E+02-1E+03 kg, 1E+03-1E+04 kg, 1E+04-1E+05 kg, 1E+05-1E+06 kg, 1E+06-1E+07 kg, 1E+07-1E+08 kg, 1E+08-1E+09 kg, or above 1E+09 kg.

For any characteristics of a composite material mentioned above, and in each characteristic's entire range, a further characteristic of importance is the total number of CMUs in the composite material.

In many applications, a high number of CMUs in a composite material is preferred, as the characteristics of the CMUs (e.g. high tensional strength) then become more pronounced in the composite material. Thus, depending on the context, the total number of CMUs in a composite material is preferably greater than 1E+00, such as greater than 1E+01, such as greater than 1E+02, such as greater than 1E+03, such as greater than 1E+04, such as greater than 1E+05, such as greater than 1E+06, such as greater than 1E+07, such as greater than 1E+08, such as greater than 1E+09, such as greater than 1E+10, such as greater than 1E+11, such as greater than 1E+12, such as greater than 1E+13, such as greater than 1E+14, such as greater than 1E+15, such as greater than 1E+16, such as greater than 1E+17, such as greater than 1E+18, such as greater than 1E+19, such as greater than 1E+20.

In other applications, a low number of CMUs in a composite material is preferred, as it makes processing of the composite material easier and reduces the cost of the final composite material. Thus, depending on the context, the total number of CMUs in a composite material is preferably less than 1E+20, such as less than 1E+19, such as less than 1E+18, such as less than 1E+17, such as less than 1E+16, such as less than 1E+15, such as less than 1E+14, such as less than 1E+13, such as less than 1E+12, such as less than 1E+11, such as less than 1E+10, such as less than 1E+09, such as less than 1E+08, such as less than 1E+07, such as less than 1E+06, such as less than 1E+05, such as less than 1E+04, such as less than 1E+03, such as less than 1E+02, such as less than 1E+01, such as less than 2E+00.

Thus, the preferred compromise between a high and a low number of CMUs in a composite material depends on the context, and may be smaller than 2, but may also be in the range of 1E+00-1E+01, 1E+01-1E+02, 1E+02-1E+03, 1E+03-1E+04, 1E+04-1E+05, 1E+05-1E+06, 1E+06-1E+07, 1E+07-1E+08, 1E+08-1E+09, 1E+09-1E+10, 1E+10-1E+11, 1E+11-1E+12, 1E+12-1E+13, 1E+13-1E+14, 1E+14-1E+15, 1E+15-1E+16, 1E+16-1E+17, 1E+17-1E+18, 1E+18-1E+19, 1E+19-1E+20, or 1E+20-1E+30.

For any characteristics of a composite material mentioned above, and in each characteristic's entire range, a further characteristic of importance is homogeneity of the composite material.

A material can be homogeneous on a number of levels. Here, homogeneity is defined at the following levels: macroscopic homogeneity (objects ≥0.01 m), milliscopic homogeneity (objects 1-10 mm), microscopic homogeneity (objects 1-1,000 μm), nanoscopic homogeneity (objects 1-1,000 nm), and picoscopic homogeneity (objects 1-1,000 μm). For composite materials, homogeneity is here defined as the additive being uniformly dispersed in the composite material as evaluated by the naked eye or microscopy. Composite materials can be homogeneous on the macroscopic, milliscopic, microscopic and nanoscopic level, but not on the picoscopic level, as individual atoms can be visualized at the picoscopic level.

In many applications, the homogeneity of the composite material is an important characteristic, as a homogeneous dispersion of SEs in the composite material results in a better transfer of the properties of the SE (e.g. tensile strength) to the composite material. Thus, depending on the context, the composite material is preferably homogenous on a level less than the macroscopic level, such as a level less than the milliscopic level, such as a level less than the microscopic level.

In other applications, the homogeneity of the composite material is a less important characteristic, and processing costs can be reduced and a less expensive material produced, if the composite material is less homogeneous. Thus, depending on the context, the composite material is preferably homogenous on a level greater than the nanoscopic level, such as greater than than the microscopic level, such as greater than the milliscopic level, such as greater than the macroscopic level.

Thus, the preferred compromise between a high and a low homogeneity depends on the context, and may be less than on the nanoscopic level, but may also be in the range of the nanoscopic-microscopic level, the microscopic-milliscopic level, the milliscopic-macroscopic level, or above the macroscopic level.

Further Characteristics of Composite Material.

For any characteristics of an composite material mentioned above, and in each characteristic's entire range, further characteristics of the composite material that are of importance in the present invention are the stiffness, electrical conductivity, thermal conductivity, color, fluorescence, luminescence, UV protective capability, abrasion resistance, ductility, elasticity, flexibility, energy storage capability (energy storage as heat or kinetic energy), information storage capability, hydrophilicity, hydrophobicity, polarity, aproticity, and charge, as well as the following characteristics where the unit of measure is indicated after each characteristic: Arc Resistance, sec; Impact Strength, Charpy, J/cm; Impact Strength, Izod Notched, J/cm; Impact Strength, Izod Unnotched, J/cm; Impact Strength, Charpy Notched Low Temp, J/cm; Impact Strength, Izod Notched Low Temp, J/cm; Impact Strength, Charpy Unnotched Low Temp, J/cm; Impact Strength, Charpy Unnotched, J/cm; Linear Mold Shrinkage, cm/cm; Maximum Service Temperature, Air; Melt Flow, g/10 min; Melting Point; Modulus of Elasticity, GPa; Moisture Absorption at Equilibrium, %; Oxygen Transmission, cc-mm/m; Poisson's Ratio; Processing Temperature; Surface Resistance, ohm; Tensile Strength, Ultimate, MPa; Tensile Strength, Yield, MPa; Thermal Conductivity, W/m-K; UL RTI, Electrical; UL RTI, Mechanical with Impact; UL RTI, Mechanical without Impact; Vicat Softening Point; Water Absorption, %; Coefficient of Friction; Comparative Tracking Index, V; Compressive Yield Strength, MPa; CTE, linear 20; Deflection Temperature at 0.46 MPa; Deflection Temperature at 1.8 MPa; Density, g/cc; Dielectric Constant; Dielectric Constant, Low Frequency; Dielectric Strength, kV/mm; Dissipation Factor; Dissipation Factor, Low Frequency; Electrical Resistivity, ohm-cm; Elongation @ break, %; Flammability, UL94; Flexural Modulus, GPa; Flexural Yield Strength, MPa; Glass Temperature; Hardness, Barcol; Hardness, Rockwell E; Hardness, Rockwell M; Hardness, Rockwell R; Hardness, Shore A; Hardness, Shore D; Heat Capacity, J/g.

Depending on the application, a composite material with a low, medium, or high degree of each of these characteristics is preferable in the present invention.

Example Composite Materials.

The CMUs described herein may be used to form composite materials comprising a large number of CMUs.

Structural Entities and Preferred Embodiments

Polymer and Additive.

In a preferred embodiment the matrix of a composite material is non-polar. As a result, non-polar additives (e.g. CNT, graphene) will typically integrate more efficiently in the polymer, making the composite material more homogeneous, which is often an advantage, as described above. Polar additives, on the other hand, may in some cases have a strong effect on the electronic and thermal characteristics of the composite material compared to the matrix material without the additive, because of the non-polarity of the matrix and the polarity of the additive. This can be advantageous in certain cases, e.g. when used in sensor applications. A preferred embodiment thus is a composite material where the matrix (SE2) is non-polar and the additive (SE1) is polar. Another preferred embodiment is a composite material where SE1 is non-polar, and the other structural entity of the same CMU is polar (i.e. SE2 is polar).

Nanosensor.

The remarkable sensitivity of carbon nanotube or graphene properties (e.g. carbon nanotube conductivity) to the surface adsorbates permits the use of carbon nanotubes and grapheme as highly sensitive sensors.

In a preferred embodiment, one of the structural entities of a CMU comprises an entity chosen from the list of nucleic acid, single-stranded DNA, double-stranded DNA, protein, antibody, enzyme, receptor, where each entity may be attached to another entity chosen from the list comprising carbon nanotube, single-walled carbon nanotube, multi-walled carbon nanotube, graphene, single layer graphene, multi-layer graphene, or graphene oxide. If a CMU comprises e.g. a structural entity SE1 (e.g. an antibody) that binds to a molecule X, and if the other structural entity SE2 is e.g. a conducting CNT, the CMU may be used as a nanosensor for the detection of molecule X.

CNT-Reinforced Polymer.

In a preferred embodiment, one of the structural entities of a CMU is a polymer and the other structural entity of the same CMU is an additive providing increased strength to the composite material made of the CMUs, compared to the material that does not contain the additive. In a preferred embodiment of said embodiment the precursor-ML, ML, or Ligand2 attaching the additive to the linker is capable of non-covalently binding said additive. In a preferred embodiment of said embodiment the additive is a carbon nanotube.

Mixed Polymer Composite Material.

In some circumstances it may be desirable to mix two or more polymers. In one preferred embodiment, SE1 represents a molecule of one kind of polymer and SE2 represents a molecule of another kind of polymer. As an example, SE1 may be PVC and SE2 may be polycarbamate. In another preferred embodiment, SE1 represents a polymer molecule and SE2 is an additive, and the composite material additionally comprises one or more polymer types different from SE1.

In a preferred embodiment, the CMU comprises two structural entities SE1 and SE2, where SE1 is an additive of high strength, and SE2 is a polymer and part of the matrix material in a composite material. Ligand2 comprises a large number of SubLigands, such as 4, 5, 6 or more Subligands, where the dissociation constant of the individual SubLigands is relatively high, such as in the range between $10^{-10}$-$10^{-2}$M. Such relatively weak interactions of the individual SubLigand with SE2, e.g. in a setting where a large number of serially connected SubLigands can interact with SE2, will provide a very high degree of flexibility and self-healing to a composite material made of such CMUs.

In another preferred embodiment, the CMU comprises two structural entities SE1 and SE2, where SE1 is an additive of high strength, and SE2 is a polymer and part of the matrix material in a composite material. The Ligand2-SE2 interaction is covalent.

In a preferred embodiment, SE1 and SE2 are both a carbon nanotube, and the linker connecting SE1 and SE2 is of a length between 0.1 nm and 10 nm. In a preferred embodiment, the composite material is a material made up of a large number of CMUs, each of which comprise two structural entities SE, both of which are carbon nanotubes, and Ligand2 is either mechanically bound to a carbon nanotube or is non-covalently bound to a carbon nanotube. The linker is relatively short, such as e.g. between 1 and 10 nm. The material is essentially a tight aggregate of carbon nanotubes. As a result, the material is of high strength.

In another preferred embodiment, SE1 and SE2 are both graphene, and the linker connecting SE1 and SE2 is of a length between 0.1 nm and 10 nm. The resulting CMU will have higher strength than each of the two individual graphenes.

In a preferred embodiment, a composite material comprises more than one kind of CMUs. For example, if the composite material is intended to function as a glue between two surfaces, it may be desirable to have one kind of CMU (e.g. made up of a polymer (SE1) and a strengthening additive such as graphene (SE2) that is the core of a reinforced polymer that does not easily break apart, and another kind of CMU (e.g. comprising the same polymer (SE1) but a third structural entity (SE3) that is part of the two surfaces that must be glued together.

Carbon Nanotube-Reinforced Ceramics

Ceramics cover a wide range of materials, including structural materials and technical ceramics. Concrete and piezoelectric materials are prototypical ceramics. Ceramics are usually defined as solids with a mixture of metallic or semi-metallic and non-metallic elements (often, although not always, oxygen), and they are often quite hard, non-conducting and corrosion-resistant.

Concrete is the most widely used construction material, which among other things comprises silicates. Concrete is produced by mixing cement with sand and water and adding aggregates. Other ingredients in the concrete are termed admixtures, for example air and water reducers such as superplasticizers. An example of a superplasticizer is Mapai, Dynamon SP1. Retarders and accelerators are other useful admixtures. Another ingredient in many concrete mixtures is supplementary cementitious materials also called pozzolans. These materials include fly ash, slag cement (sometimes called ground granulated blast furnace slag or slag cement), silica fume, and metakaolin. Supplementary cementitious materials are used as replacement for cement and since they have a very small particle size they reduce the permeability of concrete.

The relative amount of the water and cement is one of the key parameters that determines the strength of concrete—a lower water-to-cement ratio gives higher strength but at the expense of a higher viscosity.

Addition of fillers such as fullerenes, e.g. CNTs, to concrete in the form of linker units (LUs) or composite material units (CMUs) according to the present invention may help disperse the CNTs more efficiently, and increase the strength of the concrete.

In a preferred embodiment, SE1 or SE2 is a silicate, superplastiziser (e.g. Mapai, Dynamon SP1), a retarder, an accelerator, a pozzolan, or metakaolin, and optionally, SE1 is a carbon nanotube or graphene. In said preferred embodiment, the water-to-cement ratio is preferably lower than 0,01; more preferably between 0,01 and 0,1; more preferably between 0,1 and 0,2; more preferably between 0,2 and 0,3; more preferably between 0,3 and 0,5; more preferably between 0,5 and 1; more preferably between 1 and 2; more preferably between 2 and 5; or even more preferably between 5 and 10.

Items

The following items are particularly preferred embodiments of the present invention.

Item A1. A composite material comprising a nanotube

Item A2. The composite material of item A1 where the nanotube is a carbon nanotube Item A3. The composite material of item A1 or A2 that comprises a second structural entity that is not a nanotube Item A4. The composite material of item A3 where the second structural entity is a polymer Item A5. The composite material of item A3 where the second structural entity comprises less than 10 identical chemical moieties and less than 10 repeats and less than 10 monomer units.

Item A6. The composite material of any of items A1-A5 that has a volume of 1 $mm^3$ and comprises at least $10^6$ covalently closed rings, such as at least $10^7$ covalently closed rings, such as at least $10^8$ covalently closed rings, such as at least $10^9$ covalently closed rings, such as at least $10^{10}$ covalently closed rings, such as at least $10^{11}$ covalently closed rings, such as at least $10^{12}$ covalently closed rings, such as at least $10^{-3}$ covalently closed rings, such as at least $10^{-4}$ covalently closed rings, such as at least $10^{15}$ covalently closed rings, such as at least $10^{16}$ covalently closed rings, such as at least $10^{-7}$ covalently closed rings, such as at least $10^{18}$ covalently closed rings, such as at least $10^{-9}$ covalently closed rings, such as at least $10^{20}$ covalently closed rings, such as at least $10^{21}$ covalently closed rings, such as at least $10^{22}$ covalently closed rings, and where the covalently closed ring is not a nanotube or part of a nanotube.

Item A7. The composite material of any one of items A1-A6 where at least one nanotube is complexed to a covalently closed ring that wraps around the nanotube, where there are no covalent bonds between the nanotube and the covalently closed ring, and where the covalently closed ring is not a nanotube or part of a nanotube.

Item A8. The composite material of item A7 that has a volume of 1 $mm^3$, and that comprises at least one nanotube, such as at least 10 nanotubes, such as at least $10^2$ nanotubes, such as at least $10^3$ nanotubes, such as at least $10^4$ nanotubes, such as at least $10^6$ nanotubes, such as at least $10^6$ nanotubes, such as at least $10^7$ nanotubes, such as at least $10^8$ nanotubes, such as at least $10^9$ nanotubes, such as at least $10^{10}$ nanotubes, such as at least $10^{11}$ nanotubes, such as at least $10^{12}$ nanotubes, such as at least $10^{-3}$ nanotubes, such as at least $10^{-4}$ nanotubes, where each nanotube is complexed to a covalently closed ring that wraps around the nanotube, where there are no covalent bonds between the nanotube and the covalently closed ring, and where the covalently closed ring is not a nanotube or part of a nanotube.

Item A9. The composite material of item A8 where each of the nanotubes are complexed to at least 1 covalently closed ring, such as to at least 5 covalently closed rings, such as to at least 10 covalently closed rings, such as to at least 30 covalently closed rings, such as to at least 100 covalently closed rings, such as to at least 300 covalently closed rings, such as to at least 1000 covalently closed rings.

Item A10. The composite material of any one of items A6-A9 where the covalently closed ring corresponds to the ring of a compound of formula ML-1 as described in the following;

A compound of formula ML-1 comprising a ring forming an unbroken circular chain of n atoms (X) around a hole where a molecule with a smallest diameter of more than 2 Ångstrom can reside in or pass through, and wherein said ring corresponds to an unbroken circular chain of atoms which has the lowest total molecular weight of any such possible unbroken circular chain of atoms in the compound, and wherein n=8 to 10000.

(ML-1)

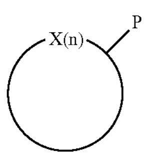

Item A11. The composite material of any one of items A6-A9 where the covalently closed ring corresponds to the ring of a compound of formula ML-2 as described in the following;

A compound of formula ML-2 comprising a ring forming an unbroken circular chain of n atoms (X) around a nanotube, wherein there is no covalent bonds between said compound and said nanotube, and wherein said ring corresponds to an unbroken circular chain of atoms which has the lowest total molecular weight of any such possible unbroken circular chain of atoms around a nanotube in the compound, and wherein n=8 to 10000.

(ML-2)

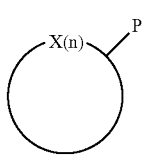

The number of atoms (n) of ML-1 and ML-2 is preferably more than 10, such as more than 20, such as more than 30, such as more than 40, such as more than 50, such as more than 60, such as more than 70, such as more than 80, such as more than 90, such as more than 100, such as more than 200, such as more than 300, such as more than 400, such as more than 500, such as more than 600, such as more than 700, such as more than 800, such as more than 900, such as more than 1000, such as more than 1500, such as more than 2000, such as more than 2500, such as more than 3000, such as more than 3500, such as more than 4000, such as more than 4500, such as more than 5000, such as more than 6000, such as more than 7000, such as more than 8000, such as more than 9000, or less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1500, such as less than 1000, such as less than 900, such as less than 800, such as less than 700, such as less than 600, such as less than 500, such as less than 400, such as less than 300, such as less than 200, such as less than 100, such as less than 90, such as less than 80, such as less than 70, such as less than 60, such as less than 50, such as less than 40, such as less than 30, such as less than 20, or 10 to 20, 20 to 30, 30 to 40, 40 to 50, 50 to 60, 60 to 70, 70 to 80, 80 to 90, 90 to 100, 100 to 200, 200 to 300, 300 to 400, 400 to 500, 500 to 600, 600 to 700, 700 to 800, 800 to 900, 900 to 1000, 1000 to 1500, 1500 to 2000, 2000 to 2500, 2500 to 3000, 3000 to 3500, 3500 to 4000, 4000 to 4500, 4500 to 5000, 5000 to 6000, 6000 to 7000, 7000 to 8000, 8000 to 9000, or 9000 to 10000.

Item A12. The composite material of any one of items A6-A11 where the covalently closed ring comprises a chemical moiety chosen from the following list of chemical moieties: ((2s, 2's)-2,2'-(1,3,6,8-tetraoxobenzo[lmn][3,8]phenanthroline-2,7(1h, 3h, 6h, 8h)-diyl)bis(3-(4-iodophenyl)propanoic acid)), 1-methylpyrene, 1,2,3-trichlorobenzene, 1,2,4-trichlorobenzene, 2-methylpyrene, 2,6,6-trimethylbicyclo[3.1.1]hept-2-ene, 4-methylpyrene, benzo[a]pyrene, benzo[e]pyrene, compound 1 in romero-nieto et al. 2012 (doi:10.1021/ja211362z), compound 1 in de juan et al. 2015 (doi:10.1039/c5sc02916c), compound 2 in de juan et al. 2015 (doi:10.1039/c5sc02916c), compound 3 in de juan et al. 2015 (doi:10.1039/c5sc02916c), compound 4 in de juan et al. 2015 (doi:10.1039/c5sc02916c), compound 5 in de juan et al. 2015 (doi:10.1039/c5sc02916c), cyclopenta[cd]pyrene, dibenzo[a, l]pyrene, dibenzo[a,e]pyrene, dibenzo[a,h]pyrene, dibenzo[a,i]pyrene, dibenzo[a,l]pyrene, dibenzo[e,l]pyrene, dipyrene phenylester, hexane, indeno[1,2,3-cd]pyrene, naphtalene, naphthalene diimide, naphtho[2,1-a]pyrene, naphtho[2,3-e]pyrene, nitrobenzene, porphyrine, pyrene, pyrene diamine, pyrene phenyl ester, sodium dodecyl benzenesulfonate, tetracycline, the polypeptide CPTSTGQAC, the polypeptide CTLHVSSYC, the polypeptide ELWR, the polypeptide ELWRPTR, the polypeptide ELWSIDTSAHRK, the polypeptide HTDWRLGTWHHS, the polypeptide HWKHPWGAWDTL, the polypeptide IFRLSWGTYFS, the polypeptide KPRSVSG, the polypeptide QLMHDYR, the polypeptide QTWPPPLWFSTS, the polypeptide RLNPPSQMDPPF, the polypeptide KPRSVSG-dansyl, the polypeptide KTQATSESGSAGRQMFVADMG, the polypeptide KTQATSRGTRGMRTSGGFPVG, the polypeptide KTQATSVPRKAARRWEQVDSV, the polypeptide MHGKTQATSGTIQS, the polypeptide PQAQDVELPQELQDQHREVEV, the polypeptide SKTSGRDQSKRVPRYWNVHRD, the polypeptide SKTSRESSAVQMGKARFLCT, toluene.

Item A13. The composite material of any one of items A6-A11 where the covalently closed ring does not comprise a chemical moiety chosen from the following list of chemical moieties: ((25,2's)-2,2'-(1,3,6,8-tetraoxobenzo[lmn][3, 8]phenanthroline-2,7(1h, 3h, 6h, 8h)-diyl)bis(3-(4-iodophe-nyppropanoic acid)), 1-methylpyrene, 1,2,3-trichlorobenzene, 1,2,4-trichlorobenzene, 2-methylpyrene, 2,6,6-trimethylbicyclo[3.1.1]hept-2-ene, 4-methylpyrene, benzo[a]pyrene, benzo[e]pyrene, compound 1 in romero-nieto et al. 2012 (doi:10.1021/ja211362z), compound 1 in de juan et al. 2015 (doi:10.1039/c5sc02916c), compound 2 in de juan et al. 2015 (doi:10.1039/c5sc02916c), compound 3 in de juan et al. 2015 (doi:10.1039/c5sc02916c), compound 4 in de juan et al. 2015 (doi:10.1039/c5sc02916c), compound 5 in de juan et al. 2015 (doi:10.1039/c5sc02916c), cyclopenta[cd]pyrene, dibenzo[a, 1]pyrene, dibenzo[a,e] pyrene, dibenzo[a,h]pyrene, dibenzo[a,i]pyrene, dibenzo[a, l]pyrene, dibenzo[e,l]pyrene, dipyrene phenylester, hexane, indeno[1,2,3-cd]pyrene, naphtalene, naphthalene diimide, naphtho[2,1-a]pyrene, naphtho[2,3-e]pyrene, nitrobenzene, porphyrine, pyrene, pyrene diamine, pyrene phenyl ester, sodium dodecyl benzenesulfonate, tetracycline, the polypeptide CPTSTGQAC, the polypeptide CTLHVSSYC, the polypeptide ELWR, the polypeptide ELWRPTR, the polypeptide ELWSIDTSAHRK, the polypeptide HTDWRLGT-WHHS, the polypeptide HWKHPWGAWDTL, the polypeptide IFRLSWGTYFS, the polypeptide KPRSVSG, the polypeptide QLMHDYR, the polypeptide QTWPPPLWF-STS, the polypeptide RLNPPSQMDPPF, the polypeptide KPRSVSG-dansyl, the polypeptide KTQATS-ESGSAGRQMFVADMG, the polypeptide KTQATSRGTRGMRTSGGFPVG, the polypeptide KTQATSVPRKAARRWEQVDSV, the polypeptide MHGKTQATSGTIQS, the polypeptide PQAQD-VELPQELQDQHREVEV, the polypeptide SKTS-GRDQSKRVPRYWNVHRD, the polypeptide SKTSRES-SAVQMGKARFLCT, toluene.

Item A14. The composite material of any one of items A6-A13 where the covalently closed ring comprises a chemical moiety of at least 50 Dal, such as of at least 100 Dal, such as of at least 200 Dal, such as of at least 300 Dal, such as of at least 400 Dal, such as of at least 500 Dal, such as of at least 600 Dal, such as of at least 800 Dal, such as of at least 1000 Dal, such as of at least 1500 Dal, such as of at least 2000 Dal, such as of at least 4000 Dal, where said chemical moiety is identical to a part of the second structural entity where said second structural entity is not a nanotube.

Item A15. The composite material of any one of items A6-A13 where the covalently closed ring is a closed ring around the nanotube and has a molecular weight (MW) of 100-200 Dal, or 200-300 Dal, or 300-500 Dal, or 500-800 Dal, or 800-1200 Dal, or 1200-2000 Dal, or 2000-4000 Dal, or 4000-10000 Dal, where said molecular weight is the combined molecular weight of the atoms constituting the shortest string of covalently linked atoms that form a ring around the nanotube.

Item A16. The composite material of any one of items A6-A13 where the covalently closed ring does not comprise a chemical moiety of at least 50 Dal, such as of at least 100 Dal, such as of at least 200 Dal, such as of at least 300 Dal, such as of at least 400 Dal, such as of at least 500 Dal, such as of at least 600 Dal, such as of at least 800 Dal, such as of at least 1000 Dal, such as of at least 1500 Dal, such as of at least 2000 Dal, such as of at least 4000 Dal, where said chemical moiety is identical to a part of the second structural entity where said second structural entity is not a nanotube.

Item A17. The composite material of any one of items A6-A13 where the covalently closed ring is a closed ring around the nanotube, where at least one of the atoms constituting the shortest string of covalently linked atoms that form a ring around the nanotube are chosen from the following list: carbon atom, nitrogen atom, oxygen atom.

Item A18. The composite material of any one of items A6-A17 where the covalently closed ring is covalently linked to the second structural entity where said second structural entity is not a nanotube.

Item A19. The composite material of any one of items A6-A17 where the covalently closed ring is a closed ring around the nanotube, where none of the atoms constituting the shortest string of covalently linked atoms that form a ring around the nanotube is a carbon atom.

Item A20. The composite material of any one of items A1-A19 where two covalently closed rings are covalently linked together, and where the two covalently closed rings are each complexed with a separate nanotube, where the covalently closed ring is not a nanotube or part of a nanotube.

Item B1. A composite material comprising a nanotube and a mechanical ligand.

Item B2. A composite material of item B1 which additionally comprises a second structural entity.

Item B3. A composite material of items B1 or B2 where the second structural entity is a polymer Item B4. A composite material of any one of items B1-B3 where a nanotube is bound to a mechanical ligand via a mechanical bond.

Item B5. A composite material of any one of items B1-B4 where a mechanical ligand is linked to a second structural entity via a mechanical bond or a covalent bond.

Item B6. A composite material of any one of items B1-B5 where the mechanical ligand is a compound of formula ML-1

Item B7. A composite material of any one of items B1-B6 where the mechanical ligand is a compound of formula ML-2

Item B8. A composite material of any one of items B1-B7 where n is more than 10, such as more than 20, such as more than 30, such as more than 40, such as more than 50, such as more than 60, such as more than 70, such as more than 80, such as more than 90, such as more than 100, such as more than 200, such as more than 300, such as more than 400, such as more than 500, such as more than 600, such as more than 700, such as more than 800, such as more than 900, such as more than 1000, such as more than 1500, such as more than 2000, such as more than 2500, such as more than 3000, such as more than 3500, such as more than 4000, such as more than 4500, such as more than 5000, such as more than 6000, such as more than 7000, such as more than 8000, such as more than 9000.

Item B9. A composite material of any one of items B1-B7 where n is less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1500, such as less than 1000, such as less than 900, such as less than 800, such as less than 700, such as less than 600, such as less than 500, such as less than 400, such as less than 300, such as less than 200, such as less than 100, such as less than 90, such as less than 80, such as less than 70, such as less than 60, such as less than 50, such as less than 40, such as less than 30, such as less than 20.

Item B10. A composite material of any one of items B1-B7 where n is 10 to 20, 20 to 30, 30 to 40, 40 to 50, 50 to 60, 60 to 70, 70 to 80, 80 to 90, 90 to 100, 100 to 200, 200 to 300, 300 to 400, 400 to 500, 500 to 600, 600 to 700, 700 to 800, 800 to 900, 900 to 1000, 1000 to 1500, 1500 to 2000, 2000 to 2500, 2500 to 3000, 3000 to 3500, 3500 to 4000, 4000 to 4500, 4500 to 5000, 5000 to 6000, 6000 to 7000, 7000 to 8000, 8000 to 9000, or 9000 to 10000.

Item B11. A composite material of any one of items B1-B10 where the mechanical ligand comprises ((25,2's)-2,2'-(1,3,6,8-tetraoxobenzo[lmn][3,8]phenanthroline-2,7 (1h, 3h,6h,8h)-diyl)bis(3-(4-iodophenyppropanoic acid)), 1-methylpyrene, 1,2,3-trichlorobenzene, 1,2,4-trichlorobenzene, 2-methylpyrene, 2,6,6-trimethylbicyclo[3.1.1]hept-2-ene, 4-methylpyrene, benzo[a]pyrene, benzo[e]pyrene, compound 1 in romero-nieto et al. 2012 (doi:10.1021/ja211362z), compound 1 in de juan et al. 2015 (doi:10.1039/c5sc02916c), compound 2 in de juan et al. 2015 (doi:10.1039/c5sc02916c), compound 3 in de juan et al. 2015 (doi:10.1039/c5sc02916c), compound 4 in de juan et al. 2015 (doi:10.1039/c5sc02916c), compound 5 in de juan et al. 2015 (doi:10.1039/c5sc02916c), cyclopenta[cd]pyrene, dibenzo[a,1]pyrene, dibenzo[a,e]pyrene, dibenzo[a,h]pyrene, dibenzo[a,i]pyrene, dibenzo[a,l]pyrene, dibenzo[e,l]pyrene, dipyrene phenylester, hexane, indeno[1,2,3-cd]pyrene, naphtalene, naphthalene diimide, naphtho[2,1-a]pyrene, naphtho[2,3-e]pyrene, nitrobenzene, porphyrine, pyrene, pyrene diamine, pyrene phenyl ester, sodium dodecyl benzenesulfonate, tetracycline, the polypeptide CPTSTGQAC, the polypeptide CTLHVSSYC, the polypeptide ELWR, the polypeptide ELWRPTR, the polypeptide ELWSIDTSAHRK, the polypeptide HTDWRLGTWHHS, the polypeptide HWKHPWGAWDTL, the polypeptide IFRLSWGTYFS, the polypeptide KPRSVSG, the polypeptide QLMHDYR, the polypeptide QTWPPPLWFSTS, the polypeptide RLNPPSQMDPPF, the polypeptide KPRSVSG-dansyl, the polypeptide KTQATS-ESGSAGRQMFVADMG, the polypeptide KTQATSRGTRGMRTSGGFPVG, the polypeptide KTQATSVPRKAARRWEQVDSV, the polypeptide MHGKTQATSGTIQS, the polypeptide PQAQD-VELPQELQDQHREVEV, the polypeptide SKTS-GRDQSKRVPRYWNVHRD, the polypeptide SKTSRES-SAVQMGKARFLCT, toluene.

Item B12. A composite material of any one of items B1-B11 where the mechanical ligand comprises one or more entities chosen from the list consisting of; [3.3.1]nonane, [1-d]thiophene, 1-iso-propyl-4-methylbenzene, 1-methylnaphthalene, 1-methylfluoranthene, 1-methylphenanthrene, 1-n-decene, 1-phenyl-1-propyne, 1,1-di(phenyl)ethylene, 1,10-phenanthroline, 1,2-benzacenaphthene, 1,2-benzanthracene, 1,2-dihydroacenaphthylene, 1,2,3,4-tetrahydronaphthalene, 1,2,4-trimethyl benzene, 1,2,4,5-tetramethyl benzene, 1,5-naphthyridine, 1,6-naphthyridine, 1,7-dimethylphenanthrene, 1,7-naphthyridine, 1,7-phenanthroline, 1,8-naphthyridine, 1,8-phenanthroline, 1,9-phenanthroline, 11h-benzo[a]fluorene, 13h-dibenzo[a,i]carbazole, 1h-indole, 1h-phenalene, 2-methyl-naphthalene, 2-methylchrysene, 2-methylnaphthalene, 2-methylphenanthrene, 2,2,4-trimethylpentane, 2,3-benzanthracene, 2,6-naphthyridine, 2,7-naphthyridine, 2,7-phenanthroline, 2,8-phenanthroline, 2,9-phenanthroline, 3-methylchrysene, 3-methylfluoranthene, 3-methylphenanthrene, 3,7-phenanthroline, 3,8-phenanthroline, 4-methyl phenyl acetylene, 4-methyl-biphenyl, 4-methyl-styrene, 4,7-phenanthroline, 4h-cyclopenta[def]phenanthrene, 7h-benz[de]anthracen-7-one, 7h-benzo[c]fluorene, 7h-dibenzo[a,g]carbazole, 8-methylfluoranthene, 9,10-anthracenedione, 9,10-dihydroanthracene, 9,10-phenanthrenedione, 9(10h)-anthracenone, 9h-carbazole, 9h-fluoren-9-one, 9h-fluorene, 9h-xanthene, aceanthrylene, acenaphthene, acenaphthylene, acephenanthrylene, acetnaphthylene, acridarsine, acridine, acridophosphine, anhydrous 1-octyne, annulene, anthanthrene, anthracene, anthraquinone, anthrone, arsanthrene, arsanthridine, arsinane, arsindole, arsindolizine, arsinine, arsinoline, arsinolizine, arsolane, arsole, as-indacene, azepane, azepine, azete, azetidine, azirine, azocine, azulene, azulene, benz[a]anthracene, benz[c]acridine, benz[e]acephenanthrylene, benzanthrone, benzene, benzo[a]dibenzothiophene, benzo[a]fluoranthene, benzo[a]pentacene, benzo[a]phenanthrene, benzo[b]chrysene, benzo[b]fluoranthene, benzo[b]naphtho[2, benzo[b]triphenylene, benzo[c]chrysene, benzo[c]cinnoline, benzo[c]pentaphene, benzo[c]phenanthrene, benzo[f]quinoline, benzo[f]tetraphene, benzo[g]chrysene, benzo[ghi]fluoranthene, benzo[ghi]perylene, benzo[h]naphtho[1,2-f]quinolene, benzo[h]quinoline, benzo[j]fluoranthene, benzo[k]tetraphene, benzo[pqr]tetraphene, benzo[rst]pentaphene, biphenyl, biphenylene, bismolane, bismole, boranthrene, borinane, borinine, borolane, borole, butylbenzene, carbazole, chromene, chrysene, cinnoline, corannulene, coronene, decacene, decahelicene, decane, decaphene, diazepine, diazetidine, diazine, diazirine, dibenz[a,c]anthracene, dibenz[a,h]acridine, dibenz[a,h]anthracene, dibenz[a,j]acridine, dibenz[a,j]anthracene, dibenz[c,h]acridine, dibenzo[a,j]anthracene, dibenzo[a,k]fluoranthene, dibenzo[b,def]chrysene, dibenzo[b,e]fluoranthene, dibenzo[b,h]phenanthrene, dibenzo[b,k]fluoranthene, dibenzo[c,g]phenanthrene, dibenzo[c,pqr]tetraphene, dibenzo[def,mno]chrysene, dibenzo[def,p]chrysene, dibenzo[f,k]tetraphene, dibenzo[f,pqr]tetraphene, dibenzo[fg,op]tetracene, dibenzo[h,rst]pentaphene, dibenzo[j,l]fluoranthene, dibenzothiophene, dioxane, dioxetane, dioxete, dioxine, dioxirane, dioxolane, dithiane, dithiazole, dithietane, dithiete, dithiine, dodecyl-trimethylammonium bromide (dtab), episulfides, epoxide, ethyl benzene, ethylmethylbenzene, fluoranthene, fluorene, free-base tetraphenyl-porphyrin, furan, furane, furazan, germinane, germine, heptacene, heptacene, heptahelicene, heptalene, heptaphene, heptaphenylene, hexacene, hexacene, hexahelicene, hexamethyl-benzene, hexaphene, hexaphenylene, homopiperazine, imidazole, imidazolidine, imidazoline, indazole, indene, indole, indolizine, isoarsindole, isoarsinoline, isochromene, isoindole, isophosphindole, isophosphinoline, isoquinoline, isoselenochromene, isotellurochromene, isothiazole, isothiazolidine, isothiochromene, isoxazole, isoxazolidine, m-dinitrobenzene, mercuranthrene, meso-1,2-diphenylethylene, monooleate, monostearate, morpholine, n-dodecane, naphthacene, naphthalene, naphtho[1,2-b]fluoranthene, naphtho[1,2,3,4-def]chrysene, naphtho[1,2,3,4-pqr]tetraphene, naphtho[2,1,8-qra]tetracene, naphtho[2,3-b]fluoranthene, naphtho[2,3-f]quinoline, naphtho[7,8,1,2,3-nopqr]tetraphene, nonacene, nonahelicene, nonaphene, nonaphenylene, octacene, octahelicene, octaphene, octaphenylene, ovalene, oxadiazole, oxane, oxanthrene, oxazine, oxaziridine, oxazole, oxazolidine, oxazoline, oxecane, oxepane, oxepine, oxetane, oxete, oxirane, oxirene, oxolane, ozocane, p-mentha-1,8-diene, p-nitrotoluene, p-terphenyl, pentacene, pentalene, pentaphene, pentaphenylene, perimidine, perylene, phenalene, phenanthraquinone, phenanthrene, phenanthrene, phenanthridine, phenanthro[4,5-bcd]thiophene, phenarsazinine, phenazine, phenazone, phenomercurazine, phenophosphazinine, phenoselenazine, phenotellurazine, phenothiarsinine, phenothiazine, phenoxaphosphinine, phenoxarsinine, phenoxaselenine, phenoxastibinine, phenoxatellurine, phenoxathiine, phenoxazine, phenylenemethyl-ethylene, phosphanthrene, phosphanthridine, phosphinane, phosphindole, phosphindolizine, phosphinine, phosphinoline, phosphinolizine, phospholane, phosphole, phthalazine, picene, piperazine, piperidine, pleiadene, pleiadene, polyacene, polyalene, polyaphene, polycyclic carbonhydrides, polyhelicene, polynaphthylene, polyphenylene, polystyrene-polyethylene oxide copoymer, polyvinylpyrrolidone, pteridine, purine, pyran, pyranthrene, pyrazine, pyrazole, pyrazolidine, pyrazoline, pyrenecarboxylicacid, pyrenyl, pyridazine, pyridine, pyrimidine, pyrrole, pyrrolidine, pyrrolizine, quinazoline, quinoline, quinolizine, quinoxaline, retene, riboflavin, rubicene, s-indacene, salinane, saline, sdbs, selenanthrene, selenochromene, selenoxanthene, silanthrene, silolane, silole, sodium dodecyl benzene sulphonate (SDBS), sodium dodecyl sulfate (SDS), stanninane, stannine, stannolane, stannole, stibolane, stibole, telluranthrene, tellurochromene, telluroxanthene, tert-butyl benzene, tetracene, tetranaphthylene, tetraphene, tetraphenylene, tetraphenylene, tetrazine, tetrazole, thiadiazole, thiane, thianthrene, thiazepine, thiazine, thiazole, thiazolidine, thiazoline, thiepane, thiepine, thietane, thiete, thiirane, thiirene, thiocane, thiochromene, thiolane, thiomorpholine, thiophene, thiopyran, thioxanthene, thithiolane, trans-1,2-diaminocyclohexane-N, N, N9,N9-tetraacetic acid (CDTA), trans-2-methylstyrene, trans-cyclooctene, triazine, triazole, tribenzo[c,f,pqr]tetraphene, tricyclo[3.3.1.1{3,7}]decane, trinaphthylene, trinaphthylene, trioxane, triphenylemethane, triphenylene, tween-60, tween-80, xanthene, ziridine, α-n-hexadecene, β-carotene.

Item B13. The composite material of any of items B1-B12 that has a volume of 1 $mm^3$ and comprises at least $10^6$ mechanical ligands, such as at least $10^7$ mechanical ligands, such as at least $10^8$ mechanical ligands, such as at least $10^9$ mechanical ligands, such as at least $10^{10}$ mechanical ligands, such as at least $10^{11}$ mechanical ligands, such as at least $10^{12}$ mechanical ligands, such as at least $10^{18}$ mechanical ligands, such as at least $10^{14}$ mechanical ligands, such as at least $10^{16}$ mechanical ligands, such as at least $10^{16}$ mechanical ligands, such as at least $10^{17}$ mechanical ligands, such as at least $10^{18}$ mechanical ligands, such as at least $10^{19}$ mechanical ligands, such as at least $10^{20}$ mechanical ligands, such as at least $10^{21}$ mechanical ligands, such as at least $10^{22}$ mechanical ligands Item B14. The composite material of any of items B1-B13 that has a volume of 1 $mm^3$, and that comprises at least one nanotube, such as at least 10 nanotubes, such as at least $10^2$ nanotubes, such as at least $10^3$ nanotubes, such as at least $10^4$ nanotubes, such as at least $10^5$ nanotubes, such as at least $10^6$ nanotubes, such as at least $10^7$ nanotubes, such as at least $10^8$ nanotubes, such as at least $10^9$ nanotubes, such as at least $10^{10}$ nanotubes, such as at least $10^{11}$ nanotubes, such as at least $10^{12}$ nanotubes, such as at least $10^{13}$ nanotubes, such as at least $10^{14}$ nanotubes Item B15. The composite material of any one of items B1-B14 where two mechanical ligands are covalently linked together, and where the two mechanical ligands are each bound by a mechanical bond to separate nanotubes.

The following items below relate to nanotubes.

Item A21. The composite material of any one of items A1-A20 or B1-B15 where the nanotube is a carbon nanotube.

Item A22. The composite material of any one of items A1-A20 or B1-B15 where the nanotube is a single wall carbon nanotube.

Item A23. The composite material of any one of items A1-A20 or B1-B15 where the nanotube is a multi wall carbon nanotube.

Item A24. The composite material of any one of items A1-A20 or B1-B15 where the nanotube is a metallic carbon nanotube.

Item A25. The composite material of any one of items A1-A20 or B1-B15 where the nanotube is a semiconductive carbon nanotube.

Item A26. The composite material of any one of items A1-A20 or B1-B15 where the nanotube is a aluminium nanotube.

Item A27. The composite material of any one of items A1-A20 or B1-B15 where the nanotube is a aluminum nitride nanotube (AlNNT).

Item A28. The composite material of any one of items A1-A20 or B1-B15 where the nanotube is a aluminum phosphide nanotube (AlPNT).

Item A29. The composite material of any one of items A1-A20 or B1-B15 where the nanotube is a bismuth nanotube.

Item A30. The composite material of any one of items A1-A20 or B1-B15 where the nanotube is a bismuth selenide nanotube.

Item A31. The composite material of any one of items A1-A20 or B1-B15 where the nanotube is a boron carbon nanotubes (BCNNT).

Item A32. The composite material of any one of items A1-A20 or B1-B15 where the nanotube is a boron nitride nanotube.

Item A33. The composite material of any one of items A1-A20 or B1-B15 where the nanotube is a cadmium selenide nanotube.

Item A34. The composite material of any one of items A1-A20 or B1-B15 where the nanotube is a cobalt selenide nanotube.

Item A35. The composite material of any one of items A1-A20 or B1-B15 where the nanotube is a copper nanotube.

Item A36. The composite material of any one of items A1-A20 or B1-B15 where the nanotube is a DNA nanotube.

Item A37. The composite material of any one of items A1-A20 or B1-B15 where the nanotube is a gallium nitride nanotube (GaNNT).

Item A38. The composite material of any one of items A1-A20 or B1-B15 where the nanotube is a gallium phosphide nanotube (GaPNT).

Item A39. The composite material of any one of items A1-A20 or B1-B15 where the nanotube is a gold nanotube.

Item A40. The composite material of any one of items A1-A20 or B1-B15 where the nanotube is a halide nanotube.

Item A41. The composite material of any one of items A1-A20 or B1-B15 where the nanotube is a iobium selenide nanotube.

Item A42. The composite material of any one of items A1-A20 or B1-B15 where the nanotube is a molybdenum disulfide nanotube.

Item A43. The composite material of any one of items A1-A20 or B1-B15 where the nanotube is a nanotube of transition metal oxides.

Item A44. The composite material of any one of items A1-A20 or B1-B15 where the nanotube is a nickel chloride nanotube.

Item A45. The composite material of any one of items A1-A20 or B1-B15 where the nanotube is a platinum nanotube.

Item A46. The composite material of any one of items A1-A20 or B1-B15 where the nanotube is a protein nanotube.

Item A47. The composite material of any one of items A1-A20 or B1-B15 where the nanotube is a RNA nanotube.

Item A48. The composite material of any one of items A1-A20 or B1-B15 where the nanotube is a selenide nanotube.

Item A49. The composite material of any one of items A1-A20 or B1-B15 where the nanotube is a silicon nanotube.

Item A50. The composite material of any one of items A1-A20 or B1-B15 where the nanotube is a silver nanotube.

Item A51. The composite material of any one of items A1-A20 or B1-B15 where the nanotube is a sulphide nanotube.

Item A52. The composite material of any one of items A1-A20 or B1-B15 where the nanotube is a tin disulfide nanotube.

Item A53. The composite material of any one of items A1-A20 or B1-B15 where the nanotube is a titanium dioxide nanotube.

Item A54. The composite material of any one of items A1-A20 or B1-B15 where the nanotube is a titanium oxide nanotube.

Item A55. The composite material of any one of items A1-A20 or B1-B15 where the nanotube is a tungsten disulfide nanotube.

Item A56. The composite material of any one of items A1-A20 or B1-B15 where the nanotube is a tungsten sulfide nanotube.

Item A57. The composite material of any one of items A1-A20 or B1-B15 where the nanotube is a wolfram disulphide nanotube.

Item A58. The composite material of any one of items A1-A20 or B1-B15 where the nanotube is a zinc ferrite nanotube.

Item A59. The composite material of any one of items A1-A20 or B1-B15 where the nanotube is a zinc oxide nanotube.

Item A60. The composite material of any one of items A1-A20 or B1-B15 where the nanotube is a zirconia dioxide nanotube.

Item A61. The composite material of any one of items A1-A20 or B1-B15 where the nanotube is a nanofiber.

Item A62. The composite material of any one of items A1-A20 or B1-B15 where the nanotube is a nanothread.

Item A63. The composite material of any one of items A1-A20 or B1-B15 where the nanotube is a nanorod.

Item A64. The composite material of any one of items A1-A20 or B1-B15 where the nanotube is a nanoball.

Item A65. The composite material of any one of items A1-A20 or B1-B15 where the nanotube is a nanobud.

Item A66. The composite material of any one of items A1-A20 or B1-B15 where the nanotube is a buckyball.

Item A67. The composite material of any one of items A1-A20 or B1-B15 where the nanotube is a multi wall nanotube.

Item A68. The composite material of any one of items A1-A20 or B1-B15 where the nanotube is a single wall nanotube.

Item A69. The composite material of any one of items A1-A20 or B1-B15 where the nanotube has the chirality (n,0) where n=0 to 20.

Item A70. The composite material of any one of items A1-A20 or B1-B15 where the nanotube has the chirality (n,1) where n=0 to 20.

Item A71. The composite material of any one of items A1-A20 or B1-B15 where the nanotube has the chirality (n,2) where n=0 to 20.

Item A72. The composite material of any one of items A1-A20 or B1-B15 where the nanotube has the chirality (n,3) where n=0 to 20.

Item A73. The composite material of any one of items A1-A20 or B1-B15 where the nanotube has the chirality (n,4) where n=0 to 20.

Item A74. The composite material of any one of items A1-A20 or B1-B15 where the nanotube has the chirality (n,5) where n=0 to 20.

Item A75. The composite material of any one of items A1-A20 or B1-B15 where the nanotube has the chirality (n,6) where n=0 to 20.

Item A76. The composite material of any one of items A1-A20 or B1-B15 where the nanotube has the chirality (n,7) where n=0 to 20.

Item A77. The composite material of any one of items A1-A20 or B1-B15 where the nanotube has the chirality (n,8) where n=0 to 20.

Item A78. The composite material of any one of items A1-A20 or B1-B15 where the nanotube has the chirality (n,9) where n=0 to 20.

Item A79. The composite material of any one of items A1-A20 or B1-B15 where the nanotube has the chirality (n,10) where n=0 to 20.

Item A80. The composite material of any one of items A1-A20 or B1-B15 where the nanotube has the chirality (n,11) where n=0 to 20.

Item A81. The composite material of any one of items A1-A20 or B1-B15 where the nanotube has the chirality (n,12) where n=0 to 20.

Item A82. The composite material of any one of items A1-A20 or B1-B15 where the nanotube has the chirality (n,13) where n=0 to 20.

Item A83. The composite material of any one of items A1-A20 or B1-B15 where the nanotube has the chirality (n,14) where n=0 to 20.

Item A84. The composite material of any one of items A1-A20 or B1-B15 where the nanotube has the chirality (n,15) where n=0 to 20.

Item A85. The composite material of any one of items A1-A20 or B1-B15 where the nanotube has the chirality (n,16) where n=0 to 20.

Item A86. The composite material of any one of items A1-A20 or B1-B15 where the nanotube has the chirality (n,17) where n=0 to 20.

Item A87. The composite material of any one of items A1-A20 or B1-B15 where the nanotube has the chirality (n,18) where n=0 to 20.

Item A88. The composite material of any one of items A1-A20 or B1-B15 where the nanotube has the chirality (n,19) where n=0 to 20.

Item A89. The composite material of any one of items A1-A20 or B1-B15 where the nanotube has the chirality (n,20) where n=0 to 20.

Item A90. The composite material of any one of items A1-A20 or B1-B15 where the nanotube has the chirality (0,n) where n=0 to 20.

Item A91. The composite material of any one of items A1-A20 or B1-B15 where the nanotube has the chirality (1,n) where n=0 to 20.

Item A92. The composite material of any one of items A1-A20 or B1-B15 where the nanotube has the chirality (2,n) where n=0 to 20.

Item A93. The composite material of any one of items A1-A20 or B1-B15 where the nanotube has the chirality (3,n) where n=0 to 20.

Item A94. The composite material of any one of items A1-A20 or B1-B15 where the nanotube has the chirality (4,n) where n=0 to 20.

Item A95. The composite material of any one of items A1-A20 or B1-B15 where the nanotube has the chirality (5,n) where n=0 to 20.

Item A96. The composite material of any one of items A1-A20 or B1-B15 where the nanotube has the chirality (6,n) where n=0 to 20.

Item A97. The composite material of any one of items A1-A20 or B1-B15 where the nanotube has the chirality (7,n) where n=0 to 20.

Item A98. The composite material of any one of items A1-A20 or B1-B15 where the nanotube has the chirality (8,n) where n=0 to 20.

Item A99. The composite material of any one of items A1-A20 or B1-B15 where the nanotube has the chirality (9,n) where n=0 to 20.

Item A100. The composite material of any one of items A1-A20 or B1-B15 where the nanotube has the chirality (10,n) where n=0 to 20.

Item A101. The composite material of any one of items A1-A20 or B1-B15 where the nanotube has the chirality (11,n) where n=0 to 20.

Item A102. The composite material of any one of items A1-A20 or B1-B15 where the nanotube has the chirality (12,n) where n=0 to 20.

Item A103. The composite material of any one of items A1-A20 or B1-B15 where the nanotube has the chirality (13,n) where n=0 to 20.

Item A104. The composite material of any one of items A1-A20 or B1-B15 where the nanotube has the chirality (14,n) where n=0 to 20.

Item A105. The composite material of any one of items A1-A20 or B1-B15 where the nanotube has the chirality (15,n) where n=0 to 20.

Item A106. The composite material of any one of items A1-A20 or B1-B15 where the nanotube has the chirality (16,n) where n=0 to 20.

Item A107. The composite material of any one of items A1-A20 or B1-B15 where the nanotube has the chirality (17,n) where n=0 to 20.

Item A108. The composite material of any one of items A1-A20 or B1-B15 where the nanotube has the chirality (18,n) where n=0 to 20.

Item A109. The composite material of any one of items A1-A20 or B1-B15 where the nanotube has the chirality (19,n) where n=0 to 20.

Item A110. The composite material of any one of items A1-A20 or B1-B15 where the nanotube has the chirality (20,n) where n=0 to 20.

Item A111. The composite material of any one of items A1-A20 or B1-B15 where the nanotube has a percentage of sp2 bonds of more than 90%, such as more than 95%, such as more than 96%, such as more than 97%, such as more than 98%, such as more than 99%, such as more than 99%.

Item A112. The composite material of any one of items A1-A20 or B1-B15 where the nanotube has a percentage of sp2 bonds of less than 100%, such as less than 99%, such as less than 98%, such as less than 97%, such as less than 96%, such as less than 95%.

Item A113. The composite material of any one of items A1-A20 or B1-B15 where the nanotube has a percentage of sp2 bonds of from 95%-96%, from 96% to 97%, from 97% to 98%, from 98% to 99%, from 99% to 100%.

Item A114. The composite material of any one of items A1-A20 or B1-B15 where the nanotube has a percentage of carbon atoms of more than 90%, such as more than 95%, such as more than 96%, such as more than 97%, such as more than 98%, such as more than 99%, such as more than 99%.

Item A115. The composite material of any one of items A1-A20 or B1-B15 where the nanotube has a percentage of carbon atoms of less than 100%, such as less than 99%, such as less than 98%, such as less than 97%, such as less than 96%, such as less than 95%.

Item A116. The composite material of any one of items A1-A20 or B1-B15 where the nanotube has a percentage of carbon atoms of from 95%-96%, from 96% to 97%, from 97% to 98%, from 98% to 99%, from 99% to 100%.

Item A117. The composite material of any one of items A1-A20 or B1-B15 where the nanotube has a percentage of functionalization of less than 10%, such as less than 5%, such as less than 4%, such as less than 3%, such as less than 2%, such as less than 1%

Item A118. The composite material of any one of items A1-A20 or B1-B15 where the nanotube has a percentage of functionalization of more than 0%, such as more than 1%, such as more than 2%, such as more than 3%, such as more than 4%, such as more than 5%, such as more than 10%.

Item A119. The composite material of any one of items A1-A20 or B1-B15 where the nanotube has a percentage of functionalization of from 0% to 1%, from 1% to 2%, from 2% to 3%, from 3% to 4%, from 4% to 5%, from 5% to 10%.

Item A120. The composite material of any one of items A1-A20 or B1-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A121. The composite material of any one of items A1-A20 or B1-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A122. The composite material of any one of items A1-A20 or B1-B15 where the nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A123. The composite material of any one of items A1-A20 or B1-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A124. The composite material of any one of items A1-A20 or B1-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A125. The composite material of any one of items A1-A20 or B1-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

The following items relate to second structural entities.

Item A126. The composite material of any one of items A3-A125 or B2-B15 where the second structural entity is (Ag) silver.

Item A127. The composite material of any one of items A3-A125 or B2-B15 where the second structural entity is (Al) aluminium.

Item A128. The composite material of any one of items A3-A125 or B2-B15 where the second structural entity is (Au) gold.

Item A129. The composite material of any one of items A3-A125 or B2-B15 where the second structural entity is (Cr) chromium.

Item A130. The composite material of any one of items A3-A125 or B2-B15 where the second structural entity is (Cu) copper.

Item A131. The composite material of any one of items A3-A125 or B2-B15 where the second structural entity is (Fe) steel and stainless steel.

Item A132. The composite material of any one of items A3-A125 or B2-B15 where the second structural entity is (Mn) manganese.

Item A133. The composite material of any one of items A3-A125 or B2-B15 where the second structural entity is (Mo) molybdenum.

Item A134. The composite material of any one of items A3-A125 or B2-B15 where the second structural entity is (Ni) nickel.

Item A135. The composite material of any one of items A3-A125 or B2-B15 where the second structural entity is (Pa) palladium.

Item A136. The composite material of any one of items A3-A125 or B2-B15 where the second structural entity is (Pt) platinum.

Item A137. The composite material of any one of items A3-A125 or B2-B15 where the second structural entity is (Ta) tantalum.

Item A138. The composite material of any one of items A3-A125 or B2-B15 where the second structural entity is (Ti) titanium.

Item A139. The composite material of any one of items A3-A125 or B2-B15 where the second structural entity is (Wo) Tungsten.

Item A140. The composite material of any one of items A3-A125 or B2-B15 where the second structural entity is a battery.

Item A141. The composite material of any one of items A3-A125 or B2-B15 where the second structural entity is a borosilicate.

Item A142. The composite material of any one of items A3-A125 or B2-B15 where the second structural entity is a buckyball.

Item A143. The composite material of any one of items A3-A125 or B2-B15 where the second structural entity is a buckytube.

Item A144. The composite material of any one of items A3-A125 or B2-B15 where the second structural entity is a capacitator.

Item A145. The composite material of any one of items A3-A125 or B2-B15 where the second structural entity is a carbon dome.

Item A146. The composite material of any one of items A3-A125 or B2-B15 where the second structural entity is a carbon fibre.

Item A147. The composite material of any one of items A3-A125 or B2-B15 where the second structural entity is a carbon megatube.

Item A148. The composite material of any one of items A3-A125 or B2-B15 where the second structural entity is a carbon nanofibre.

Item A149. The composite material of any one of items A3-A125 or B2-B15 where the second structural entity is a carbon nanofoam.

Item A150. The composite material of any one of items A3-A125 or B2-B15 where the second structural entity is a carbon nanothread.

Item A151. The composite material of any one of items A3-A125 or B2-B15 where the second structural entity is a carbon polymer.

Item A152. The composite material of any one of items A3-A125 or B2-B15 where the second structural entity is a catalyst.

Item A153. The composite material of any one of items A3-A125 or B2-B15 where the second structural entity is a cathode.

Item A154. The composite material of any one of items A3-A125 or B2-B15 where the second structural entity is a ceramic material.

Item A155. The composite material of any one of items A3-A125 or B2-B15 where the second structural entity is a composite material.

Item A156. The composite material of any one of items A3-A125 or B2-B15 where the second structural entity is a conductor.

Item A157. The composite material of any one of items A3-A125 or B2-B15 where the second structural entity is a covalent crystal.

Item A158. The composite material of any one of items A3-A125 or B2-B15 where the second structural entity is a crystal.

Item A159. The composite material of any one of items A3-A125 or B2-B15 where the second structural entity is a crystalline material.

Item A160. The composite material of any one of items A3-A125 or B2-B15 where the second structural entity is a defect-free graphene sheet.

Item A161. The composite material of any one of items A3-A125 or B2-B15 where the second structural entity is a dielectric material.

Item A162. The composite material of any one of items A3-A125 or B2-B15 where the second structural entity is a diode.

Item A163. The composite material of any one of items A3-A125 or B2-B15 where the second structural entity is a dodecahedrane.

Item A164. The composite material of any one of items A3-A125 or B2-B15 where the second structural entity is a doped glass.

Item A165. The composite material of any one of items A3-A125 or B2-B15 where the second structural entity is a fibre.

Item A166. The composite material of any one of items A3-A125 or B2-B15 where the second structural entity is a fullerite.

Item A167. The composite material of any one of items A3-A125 or B2-B15 where the second structural entity is a fused silica.

Item A168. The composite material of any one of items A3-A125 or B2-B15 where the second structural entity is a glass fibre.

Item A169. The composite material of any one of items A3-A125 or B2-B15 where the second structural entity is a glue.

Item A170. The composite material of any one of items A3-A125 or B2-B15 where the second structural entity is a green ceramic.

Item A171. The composite material of any one of items A3-A125 or B2-B15 where the second structural entity is a lanthanides.

Item A172. The composite material of any one of items A3-A125 or B2-B15 where the second structural entity is a machinable ceramic.

Item A173. The composite material of any one of items A3-A125 or B2-B15 where the second structural entity is a metal alloy.

Item A174. The composite material of any one of items A3-A125 or B2-B15 where the second structural entity is a metalised dielectric.

Item A175. The composite material of any one of items A3-A125 or B2-B15 where the second structural entity is a metallised ceramic.

Item A176. The composite material of any one of items A3-A125 or B2-B15 where the second structural entity is a metalloid.

Item A177. The composite material of any one of items A3-A125 or B2-B15 where the second structural entity is a mineral.

Item A178. The composite material of any one of items A3-A125 or B2-B15 where the second structural entity is a non-covalent crystal.

Item A179. The composite material of any one of items A3-A125 or B2-B15 where the second structural entity is a nucleic acid.

Item A180. The composite material of any one of items A3-A125 or B2-B15 where the second structural entity is a peptide.

Item A181. The composite material of any one of items A3-A125 or B2-B15 where the second structural entity is a piezoelectric material.

Item A182. The composite material of any one of items A3-A125 or B2-B15 where the second structural entity is a platinum group metal.

Item A183. The composite material of any one of items A3-A125 or B2-B15 where the second structural entity is a polypeptide.

Item A184. The composite material of any one of items A3-A125 or B2-B15 where the second structural entity is a post-transition metal.

Item A185. The composite material of any one of items A3-A125 or B2-B15 where the second structural entity is a protein.

Item A186. The composite material of any one of items A3-A125 or B2-B15 where the second structural entity is a rare earth element.

Item A187. The composite material of any one of items A3-A125 or B2-B15 where the second structural entity is a sapphire.

Item A188. The composite material of any one of items A3-A125 or B2-B15 where the second structural entity is a semiconductor.

Item A189. The composite material of any one of items A3-A125 or B2-B15 where the second structural entity is a sensor.

Item A190. The composite material of any one of items A3-A125 or B2-B15 where the second structural entity is a silicon nitride.

Item A191. The composite material of any one of items A3-A125 or B2-B15 where the second structural entity is a single crystal fiber.

Item A192. The composite material of any one of items A3-A125 or B2-B15 where the second structural entity is a sol-gel.

Item A193. The composite material of any one of items A3-A125 or B2-B15 where the second structural entity is a synthetic diamond.

Item A194. The composite material of any one of items A3-A125 or B2-B15 where the second structural entity is a transition metal.

Item A195. The composite material of any one of items A3-A125 or B2-B15 where the second structural entity is a tungsten carbide.

Item A196. The composite material of any one of items A3-A125 or B2-B15 where the second structural entity is actinides.

Item A197. The composite material of any one of items A3-A125 or B2-B15 where the second structural entity is activated carbon.

Item A198. The composite material of any one of items A3-A125 or B2-B15 where the second structural entity is aggregated diamonds.

Item A199. The composite material of any one of items A3-A125 or B2-B15 where the second structural entity is air entrainers.

Item A200. The composite material of any one of items A3-A125 or B2-B15 where the second structural entity is alkali-silica reactivity inhibitors.

Item A201. The composite material of any one of items A3-A125 or B2-B15 where the second structural entity is alloys.

Item A202. The composite material of any one of items A3-A125 or B2-B15 where the second structural entity is alumina.

Item A203. The composite material of any one of items A3-A125 or B2-B15 where the second structural entity is alumina (al203).

Item A204. The composite material of any one of items A3-A125 or B2-B15 where the second structural entity is alumina trihydrate.

Item A205. The composite material of any one of items A3-A125 or B2-B15 where the second structural entity is alumina, zirconia, machinable ceramic, green ceramic, pzt, silicon nitride, tungsten carbide.

Item A206. The composite material of any one of items A3-A125 or B2-B15 where the second structural entity is aluminium.

Item A207. The composite material of any one of items A3-A125 or B2-B15 where the second structural entity is aluminum boride.

Item A208. The composite material of any one of items A3-A125 or B2-B15 where the second structural entity is aluminum fibers.

Item A209. The composite material of any one of items A3-A125 or B2-B15 where the second structural entity is aluminum oxide.

Item A210. The composite material of any one of items A3-A125 or B2-B15 where the second structural entity is aluminum trihydroxide.

Item A211. The composite material of any one of items A3-A125 or B2-B15 where the second structural entity is amalgams.

Item A212. The composite material of any one of items A3-A125 or B2-B15 where the second structural entity is amorphous carbon.

Item A213. The composite material of any one of items A3-A125 or B2-B15 where the second structural entity is actinides.

Item A214. The composite material of any one of items A3-A125 or B2-B15 where the second structural entity is an amalgam.

Item A215. The composite material of any one of items A3-A125 or B2-B15 where the second structural entity is an anode.

Item A216. The composite material of any one of items A3-A125 or B2-B15 where the second structural entity is an antibody.

Item A217. The composite material of any one of items A3-A125 or B2-B15 where the second structural entity is electrode.

Item A218. The composite material of any one of items A3-A125 or B2-B15 where the second structural entity is an endohedral fullerene.

Item A219. The composite material of any one of items A3-A125 or B2-B15 where the second structural entity is an insulator.

Item A220. The composite material of any one of items A3-A125 or B2-B15 where the second structural entity is an intermetallic.

Item A221. The composite material of any one of items A3-A125 or B2-B15 where the second structural entity is an ionic crystal.

Item A222. The composite material of any one of items A3-A125 or B2-B15 where the second structural entity is an organic material.

Item A223. The composite material of any one of items A3-A125 or B2-B15 where the second structural entity is anode.

Item A224. The composite material of any one of items A3-A125 or B2-B15 where the second structural entity is anthracite.

Item A225. The composite material of any one of items A3-A125 or B2-B15 where the second structural entity is aramid.

Item A226. The composite material of any one of items A3-A125 or B2-B15 where the second structural entity is asbestos.

Item A227. The composite material of any one of items A3-A125 or B2-B15 where the second structural entity is barium.

Item A228. The composite material of any one of items A3-A125 or B2-B15 where the second structural entity is bn (boron nitride aka “white graphene”).

Item A229. The composite material of any one of items A3-A125 or B2-B15 where the second structural entity is bone.

Item A230. The composite material of any one of items A3-A125 or B2-B15 where the second structural entity is boron.

Item A231. The composite material of any one of items A3-A125 or B2-B15 where the second structural entity is boron nitride.

Item A232. The composite material of any one of items A3-A125 or B2-B15 where the second structural entity is boron nitride nanoscroll.

Item A233. The composite material of any one of items A3-A125 or B2-B15 where the second structural entity is boron nitride oxide.

Item A234. The composite material of any one of items A3-A125 or B2-B15 where the second structural entity is brass.

Item A235. The composite material of any one of items A3-A125 or B2-B15 where the second structural entity is brass fibers.

Item A236. The composite material of any one of items A3-A125 or B2-B15 where the second structural entity is buckminsterfullerene.

Item A237. The composite material of any one of items A3-A125 or B2-B15 where the second structural entity is bucky paper.

Item A238. The composite material of any one of items A3-A125 or B2-B15 where the second structural entity is buckyball.

Item A239. The composite material of any one of items A3-A125 or B2-B15 where the second structural entity is buckyball clusters.

Item A240. The composite material of any one of items A3-A125 or B2-B15 where the second structural entity is buckypaper.

Item A241. The composite material of any one of items A3-A125 or B2-B15 where the second structural entity is buckytube.

Item A242. The composite material of any one of items A3-A125 or B2-B15 where the second structural entity is calcium carbonite.

Item A243. The composite material of any one of items A3-A125 or B2-B15 where the second structural entity is calcium metasilicate.

Item A244. The composite material of any one of items A3-A125 or B2-B15 where the second structural entity is calcium sulfate.

Item A245. The composite material of any one of items A3-A125 or B2-B15 where the second structural entity is calcium sulphate.

Item A246. The composite material of any one of items A3-A125 or B2-B15 where the second structural entity is carbon black.

Item A247. The composite material of any one of items A3-A125 or B2-B15 where the second structural entity is carbon fiber.

Item A248. The composite material of any one of items A3-A125 or B2-B15 where the second structural entity is carbon fibers.

Item A249. The composite material of any one of items A3-A125 or B2-B15 where the second structural entity is carbon megatubes.

Item A250. The composite material of any one of items A3-A125 or B2-B15 where the second structural entity is carbon nano-onions.

Item A251. The composite material of any one of items A3-A125 or B2-B15 where the second structural entity is carbon nanobuds.

Item A252. The composite material of any one of items A3-A125 or B2-B15 where the second structural entity is carbon nanofiber.

Item A253. The composite material of any one of items A3-A125 or B2-B15 where the second structural entity is carbon nanofibres.

Item A254. The composite material of any one of items A3-A125 or B2-B15 where the second structural entity is carbon nanofoam.

Item A255. The composite material of any one of items A3-A125 or B2-B15 where the second structural entity is carbon nanothread.

Item A256. The composite material of any one of items A3-A125 or B2-B15 where the second structural entity is carbon polymers.

Item A257. The composite material of any one of items A3-A125 or B2-B15 where the second structural entity is carbon/diamond nanothread.

Item A258. The composite material of any one of items A3-A125 or B2-B15 where the second structural entity is cathode.

Item A259. The composite material of any one of items A3-A125 or B2-B15 where the second structural entity is cellulose fibers.

Item A260. The composite material of any one of items A3-A125 or B2-B15 where the second structural entity is cellulose nanofibers (e.g. curran).

Item A261. The composite material of any one of items A3-A125 or B2-B15 where the second structural entity is cellulose nanowhiskers.

Item A262. The composite material of any one of items A3-A125 or B2-B15 where the second structural entity is ceramic.

Item A263. The composite material of any one of items A3-A125 or B2-B15 where the second structural entity is chemical admixtures.

Item A264. The composite material of any one of items A3-A125 or B2-B15 where the second structural entity is chlorographene.

Item A265. The composite material of any one of items A3-A125 or B2-B15 where the second structural entity is chromium.

Item A266. The composite material of any one of items A3-A125 or B2-B15 where the second structural entity is clay.

Item A267. The composite material of any one of items A3-A125 or B2-B15 where the second structural entity is coal.

Item A268. The composite material of any one of items A3-A125 or B2-B15 where the second structural entity is coated boron nitride.

Item A269. The composite material of any one of items A3-A125 or B2-B15 where the second structural entity is coated graphene.

Item A270. The composite material of any one of items A3-A125 or B2-B15 where the second structural entity is coloring admixtures.

Item A271. The composite material of any one of items A3-A125 or B2-B15 where the second structural entity is composite materials.

Item A272. The composite material of any one of items A3-A125 or B2-B15 where the second structural entity is concrete.

Item A273. The composite material of any one of items A3-A125 or B2-B15 where the second structural entity is concrete admixtures.

Item A274. The composite material of any one of items A3-A125 or B2-B15 where the second structural entity is COOH-functionalized graphene.

Item A275. The composite material of any one of items A3-A125 or B2-B15 where the second structural entity is copper.

Item A276. The composite material of any one of items A3-A125 or B2-B15 where the second structural entity is corrosion inhibitors.

Item A277. The composite material of any one of items A3-A125 or B2-B15 where the second structural entity is covalent crystals.

Item A278. The composite material of any one of items A3-A125 or B2-B15 where the second structural entity is crystal.

Item A279. The composite material of any one of items A3-A125 or B2-B15 where the second structural entity is crystalline materials.

Item A280. The composite material of any one of items A3-A125 or B2-B15 where the second structural entity is diamond.

Item A281. The composite material of any one of items A3-A125 or B2-B15 where the second structural entity is diamond-like carbon.

Item A282. The composite material of any one of items A3-A125 or B2-B15 where the second structural entity is dispersants.

Item A283. The composite material of any one of items A3-A125 or B2-B15 where the second structural entity is dodecahedrane.

Item A284. The composite material of any one of items A3-A125 or B2-B15 where the second structural entity is double-layer boron nitride.

Item A285. The composite material of any one of items A3-A125 or B2-B15 where the second structural entity is double-layer graphene.

Item A286. The composite material of any one of items A3-A125 or B2-B15 where the second structural entity is e-glass.

Item A287. The composite material of any one of items A3-A125 or B2-B15 where the second structural entity is elastomers.

Item A288. The composite material of any one of items A3-A125 or B2-B15 where the second structural entity is endohedral fullerenes.

Item A289. The composite material of any one of items A3-A125 or B2-B15 where the second structural entity is exfoliated graphite.

Item A290. The composite material of any one of items A3-A125 or B2-B15 where the second structural entity is exfoliated silicate.

Item A291. The composite material of any one of items A3-A125 or B2-B15 where the second structural entity is extruded activated carbon.

Item A292. The composite material of any one of items A3-A125 or B2-B15 where the second structural entity is fibres.

Item A293. The composite material of any one of items A3-A125 or B2-B15 where the second structural entity is flourinated boron nitride.

Item A294. The composite material of any one of items A3-A125 or B2-B15 where the second structural entity is flourinated graphene.

Item A295. The composite material of any one of items A3-A125 or B2-B15 where the second structural entity is fluorographene.

Item A296. The composite material of any one of items A3-A125 or B2-B15 where the second structural entity is fly ash.

Item A297. The composite material of any one of items A3-A125 or B2-B15 where the second structural entity is fullerene rings.

Item A298. The composite material of any one of items A3-A125 or B2-B15 where the second structural entity is fullerenes.

Item A299. The composite material of any one of items A3-A125 or B2-B15 where the second structural entity is fullerite.

Item A300. The composite material of any one of items A3-A125 or B2-B15 where the second structural entity is functionalized boron nitride.

Item A301. The composite material of any one of items A3-A125 or B2-B15 where the second structural entity is functionalized graphene.

Item A302. The composite material of any one of items A3-A125 or B2-B15 where the second structural entity is fused silica.

Item A303. The composite material of any one of items A3-A125 or B2-B15 where the second structural entity is fused silica.

Item A304. The composite material of any one of items A3-A125 or B2-B15 where the second structural entity is gallium arsenide.

Item A305. The composite material of any one of items A3-A125 or B2-B15 where the second structural entity is gallium nitride.

Item A306. The composite material of any one of items A3-A125 or B2-B15 where the second structural entity is gedodesic carbon domes.

Item A307. The composite material of any one of items A3-A125 or B2-B15 where the second structural entity is germanium.

Item A308. The composite material of any one of items A3-A125 or B2-B15 where the second structural entity is glass.

Item A309. The composite material of any one of items A3-A125 or B2-B15 where the second structural entity is glass fibre.

Item A310. The composite material of any one of items A3-A125 or B2-B15 where the second structural entity is glass microsphere.

Item A311. The composite material of any one of items A3-A125 or B2-B15 where the second structural entity is glass ribbons.

Item A312. The composite material of any one of items A3-A125 or B2-B15 where the second structural entity is glass spheres.

Item A313. The composite material of any one of items A3-A125 or B2-B15 where the second structural entity is glasses.

Item A314. The composite material of any one of items A3-A125 or B2-B15 where the second structural entity is glassy carbon.

Item A315. The composite material of any one of items A3-A125 or B2-B15 where the second structural entity is glue.

Item A316. The composite material of any one of items A3-A125 or B2-B15 where the second structural entity is gold.

Item A317. The composite material of any one of items A3-A125 or B2-B15 where the second structural entity is gold particles.

Item A318. The composite material of any one of items A3-A125 or B2-B15 where the second structural entity is granular activated carbon.

Item A319. The composite material of any one of items A3-A125 or B2-B15 where the second structural entity is graphane.

Item A320. The composite material of any one of items A3-A125 or B2-B15 where the second structural entity is graphdiyne.

Item A321. The composite material of any one of items A3-A125 or B2-B15 where the second structural entity is graphene.

Item A322. The composite material of any one of items A3-A125 or B2-B15 where the second structural entity is graphene oxide.

Item A323. The composite material of any one of items A3-A125 or B2-B15 where the second structural entity is graphene.

Item A324. The composite material of any one of items A3-A125 or B2-B15 where the second structural entity is graphite.

Item A325. The composite material of any one of items A3-A125 or B2-B15 where the second structural entity is graphone.

Item A326. The composite material of any one of items A3-A125 or B2-B15 where the second structural entity is graphyne.

Item A327. The composite material of any one of items A3-A125 or B2-B15 where the second structural entity is hardened steel.

Item A328. The composite material of any one of items A3-A125 or B2-B15 where the second structural entity is high range water reducers.

Item A329. The composite material of any one of items A3-A125 or B2-B15 where the second structural entity is hydrous magnesium silicate.

Item A330. The composite material of any one of items A3-A125 or B2-B15 where the second structural entity is hyperdiamond.

Item A331. The composite material of any one of items A3-A125 or B2-B15 where the second structural entity is hyperdiamonds.

Item A332. The composite material of any one of items A3-A125 or B2-B15 where the second structural entity is imperfect boron nitride.

Item A333. The composite material of any one of items A3-A125 or B2-B15 where the second structural entity is imperfect graphene.

Item A334. The composite material of any one of items A3-A125 or B2-B15 where the second structural entity is intermetallics.

Item A335. The composite material of any one of items A3-A125 or B2-B15 where the second structural entity is ionic crystals.

Item A336. The composite material of any one of items A3-A125 or B2-B15 where the second structural entity is iron.

Item A337. The composite material of any one of items A3-A125 or B2-B15 where the second structural entity is iron oxides.

Item A338. The composite material of any one of items A3-A125 or B2-B15 where the second structural entity is kevlar.

Item A339. The composite material of any one of items A3-A125 or B2-B15 where the second structural entity is lanthanides.

Item A340. The composite material of any one of items A3-A125 or B2-B15 where the second structural entity is lead zirconium titanate.

Item A341. The composite material of any one of items A3-A125 or B2-B15 where the second structural entity is lignin.

Item A342. The composite material of any one of items A3-A125 or B2-B15 where the second structural entity is ligning.

Item A343. The composite material of any one of items A3-A125 or B2-B15 where the second structural entity is lignite.

Item A344. The composite material of any one of items A3-A125 or B2-B15 where the second structural entity is lithium niobate.

Item A345. The composite material of any one of items A3-A125 or B2-B15 where the second structural entity is lithium niobates.

Item A346. The composite material of any one of items A3-A125 or B2-B15 where the second structural entity is lonsdaleite.

Item A347. The composite material of any one of items A3-A125 or B2-B15 where the second structural entity is magnesium dihydroxide.

Item A348. The composite material of any one of items A3-A125 or B2-B15 where the second structural entity is magnesium oxide.

Item A349. The composite material of any one of items A3-A125 or B2-B15 where the second structural entity is manganese.

Item A350. The composite material of any one of items A3-A125 or B2-B15 where the second structural entity is melamine sulfonate superplasticisers.

Item A351. The composite material of any one of items A3-A125 or B2-B15 where the second structural entity is metal.

Item A352. The composite material of any one of items A3-A125 or B2-B15 where the second structural entity is metal ions.

Item A353. The composite material of any one of items A3-A125 or B2-B15 where the second structural entity is metal oxide.

Item A354. The composite material of any one of items A3-A125 or B2-B15 where the second structural entity is metallised ceramic.

Item A355. The composite material of any one of items A3-A125 or B2-B15 where the second structural entity is metalloids.

Item A356. The composite material of any one of items A3-A125 or B2-B15 where the second structural entity is metals.

Item A357. The composite material of any one of items A3-A125 or B2-B15 where the second structural entity is mica.

Item A358. The composite material of any one of items A3-A125 or B2-B15 where the second structural entity is mineral.

Item A359. The composite material of any one of items A3-A125 or B2-B15 where the second structural entity is mineral admixtures.

Item A360. The composite material of any one of items A3-A125 or B2-B15 where the second structural entity is molybdenum.

Item A361. The composite material of any one of items A3-A125 or B2-B15 where the second structural entity is montmorrilonite nanoclays.

Item A362. The composite material of any one of items A3-A125 or B2-B15 where the second structural entity is multi-layer boron nitride.

Item A363. The composite material of any one of items A3-A125 or B2-B15 where the second structural entity is multi-layer graphene.

Item A364. The composite material of any one of items A3-A125 or B2-B15 where the second structural entity is nanochain.

Item A365. The composite material of any one of items A3-A125 or B2-B15 where the second structural entity is nanocrystal.

Item A366. The composite material of any one of items A3-A125 or B2-B15 where the second structural entity is nanowire.

Item A367. The composite material of any one of items A3-A125 or B2-B15 where the second structural entity is naphthalene.

Item A368. The composite material of any one of items A3-A125 or B2-B15 where the second structural entity is Natural pozzolans (such as the volcanic ash used in Roman concrete).

Item A369. The composite material of any one of items A3-A125 or B2-B15 where the second structural entity is NH2-functionalized graphene.

Item A370. The composite material of any one of items A3-A125 or B2-B15 where the second structural entity is nickel.

Item A371. The composite material of any one of items A3-A125 or B2-B15 where the second structural entity is non-covalent crystal.

Item A372. The composite material of any one of items A3-A125 or B2-B15 where the second structural entity is non-covalent crystals.

Item A373. The composite material of any one of items A3-A125 or B2-B15 where the second structural entity is nylon.

Item A374. The composite material of any one of items A3-A125 or B2-B15 where the second structural entity is OH-functionalized graphene.

Item A375. The composite material of any one of items A3-A125 or B2-B15 where the second structural entity is palladium.

Item A376. The composite material of any one of items A3-A125 or B2-B15 where the second structural entity is pencil lead.

Item A377. The composite material of any one of items A3-A125 or B2-B15 where the second structural entity is perfect boron nitride.

Item A378. The composite material of any one of items A3-A125 or B2-B15 where the second structural entity is perfect graphene.

Item A379. The composite material of any one of items A3-A125 or B2-B15 where the second structural entity is plasticizers.

Item A380. The composite material of any one of items A3-A125 or B2-B15 where the second structural entity is platinum.

Item A381. The composite material of any one of items A3-A125 or B2-B15 where the second structural entity is platinum group metals.

Item A382. The composite material of any one of items A3-A125 or B2-B15 where the second structural entity is post-transition metals.

Item A383. The composite material of any one of items A3-A125 or B2-B15 where the second structural entity is powdered activated carbon.

Item A384. The composite material of any one of items A3-A125 or B2-B15 where the second structural entity is pozzolans and other cementitious materials.

Item A385. The composite material of any one of items A3-A125 or B2-B15 where the second structural entity is prismane.

Item A386. The composite material of any one of items A3-A125 or B2-B15 where the second structural entity is pristine boron nitride.

Item A387. The composite material of any one of items A3-A125 or B2-B15 where the second structural entity is pristine graphene.

Item A388. The composite material of any one of items A3-A125 or B2-B15 where the second structural entity is pyrolytic graphite.

Item A389. The composite material of any one of items A3-A125 or B2-B15 where the second structural entity is quantum dots.

Item A390. The composite material of any one of items A3-A125 or B2-B15 where the second structural entity is rare earth elements.

Item A391. The composite material of any one of items A3-A125 or B2-B15 where the second structural entity is reduced boron nitride oxide.

Item A392. The composite material of any one of items A3-A125 or B2-B15 where the second structural entity is reduced graphene oxide.

Item A393. The composite material of any one of items A3-A125 or B2-B15 where the second structural entity is reduced graphyne.

Item A394. The composite material of any one of items A3-A125 or B2-B15 where the second structural entity is rubber.

Item A395. The composite material of any one of items A3-A125 or B2-B15 where the second structural entity is s-glass.

Item A396. The composite material of any one of items A3-A125 or B2-B15 where the second structural entity is sapphire.

Item A397. The composite material of any one of items A3-A125 or B2-B15 where the second structural entity is set accelerators.

Item A398. The composite material of any one of items A3-A125 or B2-B15 where the second structural entity is set retarders.

Item A399. The composite material of any one of items A3-A125 or B2-B15 where the second structural entity is shrinkage control admixtures.

Item A400. The composite material of any one of items A3-A125 or B2-B15 where the second structural entity is silica.

Item A401. The composite material of any one of items A3-A125 or B2-B15 where the second structural entity is silica fume.

Item A402. The composite material of any one of items A3-A125 or B2-B15 where the second structural entity is silica gel.

Item A403. The composite material of any one of items A3-A125 or B2-B15 where the second structural entity is silicon.

Item A404. The composite material of any one of items A3-A125 or B2-B15 where the second structural entity is silicon carbide.

Item A405. The composite material of any one of items A3-A125 or B2-B15 where the second structural entity is silicon carbides.

Item A406. The composite material of any one of items A3-A125 or B2-B15 where the second structural entity is silicon dioxide.

Item A407. The composite material of any one of items A3-A125 or B2-B15 where the second structural entity is silicon nitride.

Item A408. The composite material of any one of items A3-A125 or B2-B15 where the second structural entity is silicon nitrides (bulk and thin film).

Item A409. The composite material of any one of items A3-A125 or B2-B15 where the second structural entity is silver.

Item A410. The composite material of any one of items A3-A125 or B2-B15 where the second structural entity is single-layer boron nitride.

Item A411. The composite material of any one of items A3-A125 or B2-B15 where the second structural entity is single-layer graphene.

Item A412. The composite material of any one of items A3-A125 or B2-B15 where the second structural entity is sol-gel.

Item A413. The composite material of any one of items A3-A125 or B2-B15 where the second structural entity is soot.

Item A414. The composite material of any one of items A3-A125 or B2-B15 where the second structural entity is stainless steel.

Item A415. The composite material of any one of items A3-A125 or B2-B15 where the second structural entity is steel.

Item A416. The composite material of any one of items A3-A125 or B2-B15 where the second structural entity is steel fibers.

Item A417. The composite material of any one of items A3-A125 or B2-B15 where the second structural entity is superplasticizer.

Item A418. The composite material of any one of items A3-A125 or B2-B15 where the second structural entity is superplasticizers.

Item A419. The composite material of any one of items A3-A125 or B2-B15 where the second structural entity is talc.

Item A420. The composite material of any one of items A3-A125 or B2-B15 where the second structural entity is tantalum.

Item A421. The composite material of any one of items A3-A125 or B2-B15 where the second structural entity is thiol-functionalized graphene.

Item A422. The composite material of any one of items A3-A125 or B2-B15 where the second structural entity is titanium.

Item A423. The composite material of any one of items A3-A125 or B2-B15 where the second structural entity is titanium oxide.

Item A424. The composite material of any one of items A3-A125 or B2-B15 where the second structural entity is tooth cementum.

Item A425. The composite material of any one of items A3-A125 or B2-B15 where the second structural entity is tooth dentine.

Item A426. The composite material of any one of items A3-A125 or B2-B15 where the second structural entity is tooth enamel.

Item A427. The composite material of any one of items A3-A125 or B2-B15 where the second structural entity is transition metals.

Item A428. The composite material of any one of items A3-A125 or B2-B15 where the second structural entity is triple-layer boron nitride.

Item A429. The composite material of any one of items A3-A125 or B2-B15 where the second structural entity is triple-layer graphene.

Item A430. The composite material of any one of items A3-A125 or B2-B15 where the second structural entity is tungsten.

Item A431. The composite material of any one of items A3-A125 or B2-B15 where the second structural entity is tungsten carbide.

Item A432. The composite material of any one of items A3-A125 or B2-B15 where the second structural entity is ultrahard fullerite.

Item A433. The composite material of any one of items A3-A125 or B2-B15 where the second structural entity is water reducers.

Item A434. The composite material of any one of items A3-A125 or B2-B15 where the second structural entity is wood.

Item A435. The composite material of any one of items A3-A125 or B2-B15 where the second structural entity is zinc oxide.

Item A436. The composite material of any one of items A3-A125 or B2-B15 where the second structural entity is zirconia.

The following items relate to polymers.

Item A437. The composite material of any one of items A4-A436 or B3-B15 where the polymer is epoxy.

Item A438. The composite material of any one of items A4-A436 or B3-B15 where the polymer is polybenzimidazole.

Item A439. The composite material of any one of items A4-A436 or B3-B15 where the polymer is polyethylene.

Item A440. The composite material of any one of items A4-A436 or B3-B15 where the polymer is polycarbonate.

Item A441. The composite material of any one of items A4-A436 or B3-B15 where the polymer is polyethylene terephtalate.

Item A442. The composite material of any one of items A4-A436 or B3-B15 where the polymer is polypropylene.

Item A443. The composite material of any one of items A4-A436 or B3-B15 where the polymer is polyester.

Item A444. The composite material of any one of items A4-A436 or B3-B15 where the polymer is polystyrene.

Item A445. The composite material of any one of items A4-A436 or B3-B15 where the polymer is polyolefin.

Item A446. The composite material of any one of items A4-A436 or B3-B15 where the polymer is polyvinylchloride.

Item A447. The composite material of any one of items A4-A436 or B3-B15 where the polymer is vinyl ester.

Item A448. The composite material of any one of items A4-A436 or B3-B15 where the polymer is polyamide.

Item A449. The composite material of any one of items A4-A436 or B3-B15 where the polymer is polyetherketoneketone.

Item A450. The composite material of any one of items A4-A436 or B3-B15 where the polymer is poly(methyl methacrylate).

Item A451. The composite material of any one of items A4-A436 or B3-B15 where the polymer is polyamide imide.

Item A452. The composite material of any one of items A4-A436 or B3-B15 where the polymer is polyaryletheretherketone.

Item A453. The composite material of any one of items A4-A436 or B3-B15 where the polymer is polyether imide.

Item A454. The composite material of any one of items A4-A436 or B3-B15 where the polymer is polyimide.

Item A455. The composite material of any one of items A4-A436 or B3-B15 where the polymer is polyoxymethylene.

Item A456. The composite material of any one of items A4-A436 or B3-B15 where the polymer is polyphenylene sulfide.

Item A457. The composite material of any one of items A4-A436 or B3-B15 where the polymer is polytetrafluoroethylene.

Item A458. The composite material of any one of items A4-A436 or B3-B15 where the polymer is thermoplastic elastomer.

Item A459. The composite material of any one of items A4-A436 or B3-B15 where the polymer is ultra-high-molecular-weight polyethylene.

Item A460. The composite material of any one of items A4-A436 or B3-B15 where the polymer is acrylonitrile butadiene styrene.

Item A461. The composite material of any one of items A4-A436 or B3-B15 where the polymer is A6 nylon.

Item A462. The composite material of any one of items A4-A436 or B3-B15 where the polymer is acrylics (PMMA/perspex, plexiglas).

Item A463. The composite material of any one of items A4-A436 or B3-B15 where the polymer is acrylonitrile styrene acrylate.

Item A464. The composite material of any one of items A4-A436 or B3-B15 where the polymer is acrylonitrile-butadiene-styrene (ABS) terpolymer.

Item A465. The composite material of any one of items A4-A436 or B3-B15 where the polymer is alkyd resins.

Item A466. The composite material of any one of items A4-A436 or B3-B15 where the polymer is amino resin.

Item A467. The composite material of any one of items A4-A436 or B3-B15 where the polymer is an elastomer.

Item A468. The composite material of any one of items A4-A436 or B3-B15 where the polymer is an epoxy-based polymer.

Item A469. The composite material of any one of items A4-A436 or B3-B15 where the polymer is an inorganic polymer.

Item A470. The composite material of any one of items A4-A436 or B3-B15 where the polymer is an ultra-high-molecular-weight polyethylene.

Item A471. The composite material of any one of items A4-A436 or B3-B15 where the polymer is aramid.

Item A472. The composite material of any one of items A4-A436 or B3-B15 where the polymer is barrier resins (PVA/polyvinyl alcohol).

Item A473. The composite material of any one of items A4-A436 or B3-B15 where the polymer is bakelite.

Item A474. The composite material of any one of items A4-A436 or B3-B15 where the polymer is biaxially oriented polypropylene.

Item A475. The composite material of any one of items A4-A436 or B3-B15 where the polymer is biologic polymer.

Item A476. The composite material of any one of items A4-A436 or B3-B15 where the polymer is biopolymer.

Item A477. The composite material of any one of items A4-A436 or B3-B15 where the polymer is biopolymers (wood, cellulose, starch based).

Item A478. The composite material of any one of items A4-A436 or B3-B15 where the polymer is bis-maleimide.

Item A479. The composite material of any one of items A4-A436 or B3-B15 where the polymer is block copolymer.

Item A480. The composite material of any one of items A4-A436 or B3-B15 where the polymer is bulk moulding compound.

Item A481. The composite material of any one of items A4-A436 or B3-B15 where the polymer is butadiene rubber.

Item A482. The composite material of any one of items A4-A436 or B3-B15 where the polymer is butadiene-styrene block copolymer.

Item A483. The composite material of any one of items A4-A436 or B3-B15 where the polymer is carboxymethyl celluse.

Item A484. The composite material of any one of items A4-A436 or B3-B15 where the polymer is cellulose.

Item A485. The composite material of any one of items A4-A436 or B3-B15 where the polymer is cellulose acetate.

Item A486. The composite material of any one of items A4-A436 or B3-B15 where the polymer is cellulose acetate-butyrate.

Item A487. The composite material of any one of items A4-A436 or B3-B15 where the polymer is cellulose nitrate.

Item A488. The composite material of any one of items A4-A436 or B3-B15 where the polymer is cellulose propionate.

Item A489. The composite material of any one of items A4-A436 or B3-B15 where the polymer is celluse acetate propionate.

Item A490. The composite material of any one of items A4-A436 or B3-B15 where the polymer is chlorinated polyvinyl chloride.

Item A491. The composite material of any one of items A4-A436 or B3-B15 where the polymer is chopped strand mat (or) chlorosulphonated polyethylene (rubber).

Item A492. The composite material of any one of items A4-A436 or B3-B15 where the polymer is conductive polymer.

Item A493. The composite material of any one of items A4-A436 or B3-B15 where the polymer is copolymer.

Item A494. The composite material of any one of items A4-A436 or B3-B15 where the polymer is cross-linked polyethylene.

Item A495. The composite material of any one of items A4-A436 or B3-B15 where the polymer is diglycidyl Ether of Bisphenol-A (DGEBA).

Item A496. The composite material of any one of items A4-A436 or B3-B15 where the polymer is DNA.

Item A497. The composite material of any one of items A4-A436 or B3-B15 where the polymer is dough moulding compound.

Item A498. The composite material of any one of items A4-A436 or B3-B15 where the polymer is elastomes (PDMS).

Item A499. The composite material of any one of items A4-A436 or B3-B15 where the polymer is epoxy-based polymer.

Item A500. The composite material of any one of items A4-A436 or B3-B15 where the polymer is ethylene chlorotrifluoro ethylene copolymer (ECTFE).

Item A501. The composite material of any one of items A4-A436 or B3-B15 where the polymer is ethylene propylene diene monomer (M-class) rubber.

Item A502. The composite material of any one of items A4-A436 or B3-B15 where the polymer is ethylene propylene rubber.

Item A503. The composite material of any one of items A4-A436 or B3-B15 where the polymer is ethylene tetrafluoro-ethylene copolymer (Tefzel).

Item A504. The composite material of any one of items A4-A436 or B3-B15 where the polymer is ethylene vinyl acetate.

Item A505. The composite material of any one of items A4-A436 or B3-B15 where the polymer is ethylene vinyl acetate (EVA).

Item A506. The composite material of any one of items A4-A436 or B3-B15 where the polymer is ethylene vinyle alcohol.

Item A507. The composite material of any one of items A4-A436 or B3-B15 where the polymer is ethylene-propylene rubber.

Item A508. The composite material of any one of items A4-A436 or B3-B15 where the polymer is ethylene-propylene-diene monomer (elastomer).

Item A509. The composite material of any one of items A4-A436 or B3-B15 where the polymer is expanded polystyrene.

Item A510. The composite material of any one of items A4-A436 or B3-B15 where the polymer is expansible polystyrene in primary forms.

Item A511. The composite material of any one of items A4-A436 or B3-B15 where the polymer is flouroplastic.

Item A512. The composite material of any one of items A4-A436 or B3-B15 where the polymer is fluorinated ethylene-propylene.

Item A513. The composite material of any one of items A4-A436 or B3-B15 where the polymer is fluoroplastics (PTFE/teflon, FEP, PFA, PVDF).

Item A514. The composite material of any one of items A4-A436 or B3-B15 where the polymer is general purpose polystyrene.

Item A515. The composite material of any one of items A4-A436 or B3-B15 where the polymer is glass mat thermoplastic.

Item A516. The composite material of any one of items A4-A436 or B3-B15 where the polymer is high density polyethylene.

Item A517. The composite material of any one of items A4-A436 or B3-B15 where the polymer is high density polypropylene.

Item A518. The composite material of any one of items A4-A436 or B3-B15 where the polymer is high impact polystyrene.

Item A519. The composite material of any one of items A4-A436 or B3-B15 where the polymer is hydroxyethyl methacrylate polymer.

Item A520. The composite material of any one of items A4-A436 or B3-B15 where the polymer is inorganic polymer.

Item A521. The composite material of any one of items A4-A436 or B3-B15 where the polymer is ketones (PEEK).

Item A522. The composite material of any one of items A4-A436 or B3-B15 where the polymer is latex.

Item A523. The composite material of any one of items A4-A436 or B3-B15 where the polymer is light emitting polymers (white LEP, etc).

Item A524. The composite material of any one of items A4-A436 or B3-B15 where the polymer is linear low density polyethylene.

Item A525. The composite material of any one of items A4-A436 or B3-B15 where the polymer is lipids.

Item A526. The composite material of any one of items A4-A436 or B3-B15 where the polymer is liqid crystalline polymers (aromatic) containing esters.

Item A527. The composite material of any one of items A4-A436 or B3-B15 where the polymer is liquid crystal polymer.

Item A528. The composite material of any one of items A4-A436 or B3-B15 where the polymer is low density polyethylene.

Item A529. The composite material of any one of items A4-A436 or B3-B15 where the polymer is low density polypropylene.

Item A530. The composite material of any one of items A4-A436 or B3-B15 where the polymer is medium density polyethylene.

Item A531. The composite material of any one of items A4-A436 or B3-B15 where the polymer is medium density polypropylene.

Item A532. The composite material of any one of items A4-A436 or B3-B15 where the polymer is melamin resin.

Item A533. The composite material of any one of items A4-A436 or B3-B15 where the polymer is melamine formaldehyde.

Item A534. The composite material of any one of items A4-A436 or B3-B15 where the polymer is metalised polymers.

Item A535. The composite material of any one of items A4-A436 or B3-B15 where the polymer is methacrylate-butadiene-styrene terpolymer.

Item A536. The composite material of any one of items A4-A436 or B3-B15 where the polymer is natural and unnatural polypeptides.

Item A537. The composite material of any one of items A4-A436 or B3-B15 where the polymer is natural polypeptides.

Item A538. The composite material of any one of items A4-A436 or B3-B15 where the polymer is natural rubber.

Item A539. The composite material of any one of items A4-A436 or B3-B15 where the polymer is neoprene.

Item A540. The composite material of any one of items A4-A436 or B3-B15 where the polymer is nitrile rubber (acrylonitrile butadiene rubber).

Item A541. The composite material of any one of items A4-A436 or B3-B15 where the polymer is non plasticised PVC mixed with any other substance in primary forms.

Item A542. The composite material of any one of items A4-A436 or B3-B15 where the polymer is non-biologic polymer.

Item A543. The composite material of any one of items A4-A436 or B3-B15 where the polymer is nylon.

Item A544. The composite material of any one of items A4-A436 or B3-B15 where the polymer is nylon 11.

Item A545. The composite material of any one of items A4-A436 or B3-B15 where the polymer is nylon 12.

Item A546. The composite material of any one of items A4-A436 or B3-B15 where the polymer is nylon 46.

Item A547. The composite material of any one of items A4-A436 or B3-B15 where the polymer is nylon 6.

Item A548. The composite material of any one of items A4-A436 or B3-B15 where the polymer is nylon 610.

Item A549. The composite material of any one of items A4-A436 or B3-B15 where the polymer is nylon 66.

Item A550. The composite material of any one of items A4-A436 or B3-B15 where the polymer is nylon 66/610 copolymer.

Item A551. The composite material of any one of items A4-A436 or B3-B15 where the polymer is nylon PA1,1.

Item A552. The composite material of any one of items A4-A436 or B3-B15 where the polymer is nylon PA1,2.

Item A553. The composite material of any one of items A4-A436 or B3-B15 where the polymer is nylon PA1,3.

Item A554. The composite material of any one of items A4-A436 or B3-B15 where the polymer is nylon PA1,4.

Item A555. The composite material of any one of items A4-A436 or B3-B15 where the polymer is nylon PA1,5.

Item A556. The composite material of any one of items A4-A436 or B3-B15 where the polymer is nylon PA1,6.

Item A557. The composite material of any one of items A4-A436 or B3-B15 where the polymer is nylon PA2,1.

Item A558. The composite material of any one of items A4-A436 or B3-B15 where the polymer is nylon PA6,10.

Item A559. The composite material of any one of items A4-A436 or B3-B15 where the polymer is nylon PA6,6.

Item A560. The composite material of any one of items A4-A436 or B3-B15 where the polymer is organic polymer.

Item A561. The composite material of any one of items A4-A436 or B3-B15 where the polymer is organomodified siloxanes (OMS).

Item A562. The composite material of any one of items A4-A436 or B3-B15 where the polymer is oriented polypropylene.

Item A563. The composite material of any one of items A4-A436 or B3-B15 where the polymer is other PET.

Item A564. The composite material of any one of items A4-A436 or B3-B15 where the polymer is parylene.

Item A565. The composite material of any one of items A4-A436 or B3-B15 where the polymer is perfluoro alkoxyl alkane.

Item A566. The composite material of any one of items A4-A436 or B3-B15 where the polymer is perfluoroalkoxy Teflon PFA.

Item A567. The composite material of any one of items A4-A436 or B3-B15 where the polymer is PET copolymer.

Item A568. The composite material of any one of items A4-A436 or B3-B15 where the polymer is phenol formaldehyde.

Item A569. The composite material of any one of items A4-A436 or B3-B15 where the polymer is phenol formaldehyde resins (PF).

Item A570. The composite material of any one of items A4-A436 or B3-B15 where the polymer is phenolic (Novolac) Epoxy Resins.

Item A571. The composite material of any one of items A4-A436 or B3-B15 where the polymer is phenolic resin.

Item A572. The composite material of any one of items A4-A436 or B3-B15 where the polymer is plasticised PVC mixed with any other substance in primary forms.

Item A573. The composite material of any one of items A4-A436 or B3-B15 where the polymer is polaryl amide.

Item A574. The composite material of any one of items A4-A436 or B3-B15 where the polymer is poly ethylvinyl acetate.

Item A575. The composite material of any one of items A4-A436 or B3-B15 where the polymer is poly vinyl acetate in aqueous dispersion in primary forms.

Item A576. The composite material of any one of items A4-A436 or B3-B15 where the polymer is poly vinyl acetate in primary forms.

Item A577. The composite material of any one of items A4-A436 or B3-B15 where the polymer is poly-1-butene.

Item A578. The composite material of any one of items A4-A436 or B3-B15 where the polymer is poly-1-hexene.

Item A579. The composite material of any one of items A4-A436 or B3-B15 where the polymer is poly-1-octene.

Item A580. The composite material of any one of items A4-A436 or B3-B15 where the polymer is poly-o-vinylbenzylalcohol.

Item A581. The composite material of any one of items A4-A436 or B3-B15 where the polymer is poly-p-vinylbenzylalcohol.

Item A582. The composite material of any one of items A4-A436 or B3-B15 where the polymer is poly(2,5-dioctyl-1,4-phenylenevinylene).

Item A583. The composite material of any one of items A4-A436 or B3-B15 where the polymer is poly(2,6-naphthalenevinylene).

Item A584. The composite material of any one of items A4-A436 or B3-B15 where the polymer is poly(acrylamido-N-propyltrimethylammonium chloride).

Item A585. The composite material of any one of items A4-A436 or B3-B15 where the polymer is Poly(anthracene-vinylene).

Item A586. The composite material of any one of items A4-A436 or B3-B15 where the polymer is poly(ethyl acrylate).

Item A587. The composite material of any one of items A4-A436 or B3-B15 where the polymer is poly(ethylene propylenqwe).

Item A588. The composite material of any one of items A4-A436 or B3-B15 where the polymer is poly(ethylene-propylene oxide).

Item A589. The composite material of any one of items A4-A436 or B3-B15 where the polymer is poly(ethylene-vinyl acetate).

Item A590. The composite material of any one of items A4-A436 or B3-B15 where the polymer is poly(ethylvinyl alcohol).

Item A591. The composite material of any one of items A4-A436 or B3-B15 where the polymer is poly(m-phenyleneisophtalamide) (MPD-I))(Nomex®).

Item A592. The composite material of any one of items A4-A436 or B3-B15 where the polymer is poly(p-phenylene-vinylene).

Item A593. The composite material of any one of items A4-A436 or B3-B15 where the polymer is poly(p-phenylene).

Item A594. The composite material of any one of items A4-A436 or B3-B15 where the polymer is poly(p-phenyleneterephtalamide) (PPD-T) (Kevlar® and Twaron®).

Item A595. The composite material of any one of items A4-A436 or B3-B15 where the polymer is polyacenaphthylene.

Item A596. The composite material of any one of items A4-A436 or B3-B15 where the polymer is polyacetals in primary forms.

Item A597. The composite material of any one of items A4-A436 or B3-B15 where the polymer is polyacetylene.

Item A598. The composite material of any one of items A4-A436 or B3-B15 where the polymer is polyacrylate.

Item A599. The composite material of any one of items A4-A436 or B3-B15 where the polymer is polyacrylic acid.

Item A600. The composite material of any one of items A4-A436 or B3-B15 where the polymer is polyacrylonitrile.

Item A601. The composite material of any one of items A4-A436 or B3-B15 where the polymer is polyacrylonitrile (PAN) and copolymers.

Item A602. The composite material of any one of items A4-A436 or B3-B15 where the polymer is polyaliphatic polymer.

Item A603. The composite material of any one of items A4-A436 or B3-B15 where the polymer is polyaniline.

Item A604. The composite material of any one of items A4-A436 or B3-B15 where the polymer is polyanthracene.

Item A605. The composite material of any one of items A4-A436 or B3-B15 where the polymer is polyAPTAC.

Item A606. The composite material of any one of items A4-A436 or B3-B15 where the polymer is polyaromatic polymer.

Item A607. The composite material of any one of items A4-A436 or B3-B15 where the polymer is polybutadiene.

Item A608. The composite material of any one of items A4-A436 or B3-B15 where the polymer is polybutylacrylate.

Item A609. The composite material of any one of items A4-A436 or B3-B15 where the polymer is Polybutylene adipate terephthalate.

Item A610. The composite material of any one of items A4-A436 or B3-B15 where the polymer is polybutylene oxide.

Item A611. The composite material of any one of items A4-A436 or B3-B15 where the polymer is Polybutylene succinate.

Item A612. The composite material of any one of items A4-A436 or B3-B15 where the polymer is polybutylene terephthalate.

Item A613. The composite material of any one of items A4-A436 or B3-B15 where the polymer is polybutylene, such as polybutylene-1.

Item A614. The composite material of any one of items A4-A436 or B3-B15 where the polymer is polybutyleneoxide.

Item A615. The composite material of any one of items A4-A436 or B3-B15 where the polymer is polybutyleneterephthalate.

Item A616. The composite material of any one of items A4-A436 or B3-B15 where the polymer is polybutylmethacrylate.

Item A617. The composite material of any one of items A4-A436 or B3-B15 where the polymer is Polybutyrate.

Item A618. The composite material of any one of items A4-A436 or B3-B15 where the polymer is polybutyrate adipate terephthalate.

Item A619. The composite material of any one of items A4-A436 or B3-B15 where the polymer is polycaprolactam.

Item A620. The composite material of any one of items A4-A436 or B3-B15 where the polymer is polycaprolactone (PCL).

Item A621. The composite material of any one of items A4-A436 or B3-B15 where the polymer is polycarbonates (PC/lexan).

Item A622. The composite material of any one of items A4-A436 or B3-B15 where the polymer is polychloroprene.

Item A623. The composite material of any one of items A4-A436 or B3-B15 where the polymer is polychlorotrifluoroethylene.

Item A624. The composite material of any one of items A4-A436 or B3-B15 where the polymer is polydiacetylenes.

Item A625. The composite material of any one of items A4-A436 or B3-B15 where the polymer is polydimethysiloxanes (PDMS).

Item A626. The composite material of any one of items A4-A436 or B3-B15 where the polymer is polyester elastomer.

Item A627. The composite material of any one of items A4-A436 or B3-B15 where the polymer is polyester imide.

Item A628. The composite material of any one of items A4-A436 or B3-B15 where the polymer is polyester molecule.

Item A629. The composite material of any one of items A4-A436 or B3-B15 where the polymer is polyesters (PET/mylar, melinex, dacron, PEN/teonex).

Item A630. The composite material of any one of items A4-A436 or B3-B15 where the polymer is polyether.

Item A631. The composite material of any one of items A4-A436 or B3-B15 where the polymer is polyether block amide.

Item A632. The composite material of any one of items A4-A436 or B3-B15 where the polymer is polyether sulphone.

Item A633. The composite material of any one of items A4-A436 or B3-B15 where the polymer is polyetheretherketon.

Item A634. The composite material of any one of items A4-A436 or B3-B15 where the polymer is polyetherketone.

Item A635. The composite material of any one of items A4-A436 or B3-B15 where the polymer is polyethylene—cross-linked polyethylene.

Item A636. The composite material of any one of items A4-A436 or B3-B15 where the polymer is polyethylene—high density (HDPE).

Item A637. The composite material of any one of items A4-A436 or B3-B15 where the polymer is polyethylene—linear low density (LLDPE).

Item A638. The composite material of any one of items A4-A436 or B3-B15 where the polymer is polyethylene—low density (LDPE).

Item A639. The composite material of any one of items A4-A436 or B3-B15 where the polymer is polyethylene—medium density (MDPE).

Item A640. The composite material of any one of items A4-A436 or B3-B15 where the polymer is polyethylene—ultrahigh molecular weight (UHMWPE).

Item A641. The composite material of any one of items A4-A436 or B3-B15 where the polymer is polyethylene—very low density (VLDPE).

Item A642. The composite material of any one of items A4-A436 or B3-B15 where the polymer is polyethylene (PE).

Item A643. The composite material of any one of items A4-A436 or B3-B15 where the polymer is polyethylene adipate.

Item A644. The composite material of any one of items A4-A436 or B3-B15 where the polymer is polyethylene furanoate.

Item A645. The composite material of any one of items A4-A436 or B3-B15 where the polymer is polyethylene naphthalate (PEN).

Item A646. The composite material of any one of items A4-A436 or B3-B15 where the polymer is polyethylene oxide.

Item A647. The composite material of any one of items A4-A436 or B3-B15 where the polymer is polyethyleneoxide.

Item A648. The composite material of any one of items A4-A436 or B3-B15 where the polymer is polyethylenes (LDPE, HDPE).

Item A649. The composite material of any one of items A4-A436 or B3-B15 where the polymer is polyethyleneterephthalate.

Item A650. The composite material of any one of items A4-A436 or B3-B15 where the polymer is polyethylenimine.

Item A651. The composite material of any one of items A4-A436 or B3-B15 where the polymer is polyglycolide (PG).

Item A652. The composite material of any one of items A4-A436 or B3-B15 where the polymer is polyheptene.

Item A653. The composite material of any one of items A4-A436 or B3-B15 where the polymer is polyhexene.

Item A654. The composite material of any one of items A4-A436 or B3-B15 where the polymer is polyhydroxyalkanoate.

Item A655. The composite material of any one of items A4-A436 or B3-B15 where the polymer is polyhydroxybutyrate.

Item A656. The composite material of any one of items A4-A436 or B3-B15 where the polymer is polyhydroxyethylmethacrylate.

Item A657. The composite material of any one of items A4-A436 or B3-B15 where the polymer is polyimide, PTFE, PMMA, Kapton, Vespel, Cirlex, ABS.

Item A658. The composite material of any one of items A4-A436 or B3-B15 where the polymer is polyimides (kapton, upilex, etc).

Item A659. The composite material of any one of items A4-A436 or B3-B15 where the polymer is polyisobutylene.

Item A660. The composite material of any one of items A4-A436 or B3-B15 where the polymer is polyisocyanurate rigid.

Item A661. The composite material of any one of items A4-A436 or B3-B15 where the polymer is polyisocyanurates.

Item A662. The composite material of any one of items A4-A436 or B3-B15 where the polymer is polyisoprene.

Item A663. The composite material of any one of items A4-A436 or B3-B15 where the polymer is polylactic acid.

Item A664. The composite material of any one of items A4-A436 or B3-B15 where the polymer is polyMAPTAC (poly[(3-(methacryloylamino)-propyl]trimethylammonium chloride).

Item A665. The composite material of any one of items A4-A436 or B3-B15 where the polymer is polymer comprising 2-methyl-propanoic acid methyl ester.

Item A666. The composite material of any one of items A4-A436 or B3-B15 where the polymer is polymer comprising 4-(2-phenylpropan-2-yl)phenyl hydrogen carbonate.

Item A667. The composite material of any one of items A4-A436 or B3-B15 where the polymer is polymer comprising 4-(4-phenoxybenzoyl)benzaketone.

Item A668. The composite material of any one of items A4-A436 or B3-B15 where the polymer is polymer comprising 4-(ethoxycarbonyl)benzoic ester.

Item A669. The composite material of any one of items A4-A436 or B3-B15 where the polymer is polymer comprising a carbonyl.

Item A670. The composite material of any one of items A4-A436 or B3-B15 where the polymer is polymer comprising an amide bond.

Item A671. The composite material of any one of items A4-A436 or B3-B15 where the polymer is polymer comprising an OH.

Item A672. The composite material of any one of items A4-A436 or B3-B15 where the polymer is polymer comprising butyl.

Item A673. The composite material of any one of items A4-A436 or B3-B15 where the polymer is polymer comprising carbonyl.

Item A674. The composite material of any one of items A4-A436 or B3-B15 where the polymer is polymer comprising chloro-ethyl.

Item A675. The composite material of any one of items A4-A436 or B3-B15 where the polymer is polymer comprising Cl.

Item A676. The composite material of any one of items A4-A436 or B3-B15 where the polymer is polymer comprising ethyl.

Item A677. The composite material of any one of items A4-A436 or B3-B15 where the polymer is polymer comprising ethyl-acetate.

Item A678. The composite material of any one of items A4-A436 or B3-B15 where the polymer is polymer comprising ethyl-nitril.

Item A679. The composite material of any one of items A4-A436 or B3-B15 where the polymer is polymer comprising ethyl benzene.

Item A680. The composite material of any one of items A4-A436 or B3-B15 where the polymer is polymer comprising F.

Item A681. The composite material of any one of items A4-A436 or B3-B15 where the polymer is polymer comprising H.

Item A682. The composite material of any one of items A4-A436 or B3-B15 where the polymer is polymer comprising isobutyl.

Item A683. The composite material of any one of items A4-A436 or B3-B15 where the polymer is polymer comprising isopentyl.

Item A684. The composite material of any one of items A4-A436 or B3-B15 where the polymer is polymer comprising isopropyl.

Item A685. The composite material of any one of items A4-A436 or B3-B15 where the polymer is polymer comprising methyl.

Item A686. The composite material of any one of items A4-A436 or B3-B15 where the polymer is polymer comprising methyl 2-methyl-propionate.

Item A687. The composite material of any one of items A4-A436 or B3-B15 where the polymer is polymer comprising N.

Item A688. The composite material of any one of items A4-A436 or B3-B15 where the polymer is polymer comprising neopentyl.

Item A689. The composite material of any one of items A4-A436 or B3-B15 where the polymer is polymer comprising 0.

Item A690. The composite material of any one of items A4-A436 or B3-B15 where the polymer is polymer comprising pentyl.

Item A691. The composite material of any one of items A4-A436 or B3-B15 where the polymer is polymer comprising phenyl-sulfide.

Item A692. The composite material of any one of items A4-A436 or B3-B15 where the polymer is polymer comprising propanoic acid.

Item A693. The composite material of any one of items A4-A436 or B3-B15 where the polymer is polymer comprising propanoic acid methyl ester.

Item A694. The composite material of any one of items A4-A436 or B3-B15 where the polymer is polymer comprising propyl.

Item A695. The composite material of any one of items A4-A436 or B3-B15 where the polymer is polymer comprising S.

Item A696. The composite material of any one of items A4-A436 or B3-B15 where the polymer is polymer comprising sec-butyl.

Item A697. The composite material of any one of items A4-A436 or B3-B15 where the polymer is polymer comprising sec-pentyl.

Item A698. The composite material of any one of items A4-A436 or B3-B15 where the polymer is polymer comprising Si.

Item A699. The composite material of any one of items A4-A436 or B3-B15 where the polymer is polymer comprising tert-butyl.

Item A700. The composite material of any one of items A4-A436 or B3-B15 where the polymer is polymer comprising tert-pentyl.

Item A701. The composite material of any one of items A4-A436 or B3-B15 where the polymer is polymer comprising tetra-flour-ethyl.

Item A702. The composite material of any one of items A4-A436 or B3-B15 where the polymer is polymer consisting of C.

Item A703. The composite material of any one of items A4-A436 or B3-B15 where the polymer is polymer consisting of C and H.

Item A704. The composite material of any one of items A4-A436 or B3-B15 where the polymer is polymer consisting of C and H and Cl.

Item A705. The composite material of any one of items A4-A436 or B3-B15 where the polymer is polymer consisting of C and H and F.

Item A706. The composite material of any one of items A4-A436 or B3-B15 where the polymer is polymer consisting of C and H and O.

Item A707. The composite material of any one of items A4-A436 or B3-B15 where the polymer is polymer consisting of C and H and O and N.

Item A708. The composite material of any one of items A4-A436 or B3-B15 where the polymer is polymer consisting of 4-(ethoxycarbonyl)benzoic ester.

Item A709. The composite material of any one of items A4-A436 or B3-B15 where the polymer is polymer consisting of butyl.

Item A710. The composite material of any one of items A4-A436 or B3-B15 where the polymer is polymer consisting of chloro-ethyl.

Item A711. The composite material of any one of items A4-A436 or B3-B15 where the polymer is polymer consisting of ethyl.

Item A712. The composite material of any one of items A4-A436 or B3-B15 where the polymer is polymer consisting of ethyl-acetate.

Item A713. The composite material of any one of items A4-A436 or B3-B15 where the polymer is polymer consisting of ethyl-nitril.

Item A714. The composite material of any one of items A4-A436 or B3-B15 where the polymer is polymer consisting of ethylbenzene.

Item A715. The composite material of any one of items A4-A436 or B3-B15 where the polymer is polymer consisting of isobutyl.

Item A716. The composite material of any one of items A4-A436 or B3-B15 where the polymer is polymer consisting of isopentyl.

Item A717. The composite material of any one of items A4-A436 or B3-B15 where the polymer is polymer consisting of isopropyl.

Item A718. The composite material of any one of items A4-A436 or B3-B15 where the polymer is polymer consisting of methyl.

Item A719. The composite material of any one of items A4-A436 or B3-B15 where the polymer is polymer consisting of methyl 2-methyl-propionate.

Item A720. The composite material of any one of items A4-A436 or B3-B15 where the polymer is polymer consisting of neopentyl.

Item A721. The composite material of any one of items A4-A436 or B3-B15 where the polymer is polymer consisting of pentyl.

Item A722. The composite material of any one of items A4-A436 or B3-B15 where the polymer is polymer consisting of phenyl-sulfide.

Item A723. The composite material of any one of items A4-A436 or B3-B15 where the polymer is polymer consisting of propanoic acid.

Item A724. The composite material of any one of items A4-A436 or B3-B15 where the polymer is polymer consisting of propanoic acid methyl ester.

Item A725. The composite material of any one of items A4-A436 or B3-B15 where the polymer is polymer consisting of propyl.

Item A726. The composite material of any one of items A4-A436 or B3-B15 where the polymer is polymer consisting of sec-butyl.

Item A727. The composite material of any one of items A4-A436 or B3-B15 where the polymer is polymer consisting of sec-pentyl.

Item A728. The composite material of any one of items A4-A436 or B3-B15 where the polymer is polymer consisting of tert-butyl.

Item A729. The composite material of any one of items A4-A436 or B3-B15 where the polymer is polymer consisting of tert-pentyl.

Item A730. The composite material of any one of items A4-A436 or B3-B15 where the polymer is polymer consisting of tetra-flour-ethyl.

Item A731. The composite material of any one of items A4-A436 or B3-B15 where the polymer is polymeric cyanate ester.

Item A732. The composite material of any one of items A4-A436 or B3-B15 where the polymer is polymers of styrene in primary forms.

Item A733. The composite material of any one of items A4-A436 or B3-B15 where the polymer is polymers of vinyl esters or other vinyl polymers in primary forms.

Item A734. The composite material of any one of items A4-A436 or B3-B15 where the polymer is polymethacrylonitrile.

Item A735. The composite material of any one of items A4-A436 or B3-B15 where the polymer is polymethyl pentene.

Item A736. The composite material of any one of items A4-A436 or B3-B15 where the polymer is polymethyl pentene copolymer.

Item A737. The composite material of any one of items A4-A436 or B3-B15 where the polymer is polymethylacrylate.

Item A738. The composite material of any one of items A4-A436 or B3-B15 where the polymer is polymethylhydrosiloxane (PMHS).

Item A739. The composite material of any one of items A4-A436 or B3-B15 where the polymer is polymethylmethacrylate.

Item A740. The composite material of any one of items A4-A436 or B3-B15 where the polymer is polymethylpentene.

Item A741. The composite material of any one of items A4-A436 or B3-B15 where the polymer is polyoctene.

Item A742. The composite material of any one of items A4-A436 or B3-B15 where the polymer is Polyolefin elastomers.

Item A743. The composite material of any one of items A4-A436 or B3-B15 where the polymer is polyperfluoropropylene.

Item A744. The composite material of any one of items A4-A436 or B3-B15 where the polymer is polyphenol.

Item A745. The composite material of any one of items A4-A436 or B3-B15 where the polymer is polyphenylene benzobisoxazole.

Item A746. The composite material of any one of items A4-A436 or B3-B15 where the polymer is polyphenylene ether.

Item A747. The composite material of any one of items A4-A436 or B3-B15 where the polymer is polyphenylene oxide.

Item A748. The composite material of any one of items A4-A436 or B3-B15 where the polymer is polyphenylene sulphide sulphone.

Item A749. The composite material of any one of items A4-A436 or B3-B15 where the polymer is polypropylene.

Item A750. The composite material of any one of items A4-A436 or B3-B15 where the polymer is polypropylene oxide.

Item A751. The composite material of any one of items A4-A436 or B3-B15 where the polymer is polypyrrole.

Item A752. The composite material of any one of items A4-A436 or B3-B15 where the polymer is polysaccharides.

Item A753. The composite material of any one of items A4-A436 or B3-B15 where the polymer is polystyrene.

Item A754. The composite material of any one of items A4-A436 or B3-B15 where the polymer is polystyrene-butadiene.

Item A755. The composite material of any one of items A4-A436 or B3-B15 where the polymer is polysulphides.

Item A756. The composite material of any one of items A4-A436 or B3-B15 where the polymer is polysulphone.

Item A757. The composite material of any one of items A4-A436 or B3-B15 where the polymer is polysulphones (PES).

Item A758. The composite material of any one of items A4-A436 or B3-B15 where the polymer is polytetramethylene sebacate.

Item A759. The composite material of any one of items A4-A436 or B3-B15 where the polymer is polytetramethylene terephthalate.

Item A760. The composite material of any one of items A4-A436 or B3-B15 where the polymer is Polytrimethylene terephthalate.

Item A761. The composite material of any one of items A4-A436 or B3-B15 where the polymer is polyurea.

Item A762. The composite material of any one of items A4-A436 or B3-B15 where the polymer is polyurethane.

Item A763. The composite material of any one of items A4-A436 or B3-B15 where the polymer is polyvinyl.

Item A764. The composite material of any one of items A4-A436 or B3-B15 where the polymer is polyvinyl acetal.

Item A765. The composite material of any one of items A4-A436 or B3-B15 where the polymer is polyvinyl acetate.

Item A766. The composite material of any one of items A4-A436 or B3-B15 where the polymer is polyvinyl alcohol.

Item A767. The composite material of any one of items A4-A436 or B3-B15 where the polymer is polyvinyl butyral.

Item A768. The composite material of any one of items A4-A436 or B3-B15 where the polymer is polyvinyl butyral.

Item A769. The composite material of any one of items A4-A436 or B3-B15 where the polymer is polyvinyl chloride plasticised.

Item A770. The composite material of any one of items A4-A436 or B3-B15 where the polymer is polyvinyl chloride unplasticised.

Item A771. The composite material of any one of items A4-A436 or B3-B15 where the polymer is polyvinyl formal.

Item A772. The composite material of any one of items A4-A436 or B3-B15 where the polymer is polyvinyl isobutyral.

Item A773. The composite material of any one of items A4-A436 or B3-B15 where the polymer is polyvinyl pyrrolidone.

Item A774. The composite material of any one of items A4-A436 or B3-B15 where the polymer is polyvinyl-n-butyl ether.

Item A775. The composite material of any one of items A4-A436 or B3-B15 where the polymer is polyvinylacetate.

Item A776. The composite material of any one of items A4-A436 or B3-B15 where the polymer is polyvinylalcohol.

Item A777. The composite material of any one of items A4-A436 or B3-B15 where the polymer is polyvinylflouride.

Item A778. The composite material of any one of items A4-A436 or B3-B15 where the polymer is polyvinylidene chloride.

Item A779. The composite material of any one of items A4-A436 or B3-B15 where the polymer is polyvinylidene flouride.

Item A780. The composite material of any one of items A4-A436 or B3-B15 where the polymer is polyvinylidene fluoride (PVDF).

Item A781. The composite material of any one of items A4-A436 or B3-B15 where the polymer is reduced graphene oxide molecule.

Item A782. The composite material of any one of items A4-A436 or B3-B15 where the polymer is
RNA.

Item A783. The composite material of any one of items A4-A436 or B3-B15 where the polymer is rubber.

Item A784. The composite material of any one of items A4-A436 or B3-B15 where the polymer is self reinforcing polymer.

Item A785. The composite material of any one of items A4-A436 or B3-B15 where the polymer is shape memory polymer.

Item A786. The composite material of any one of items A4-A436 or B3-B15 where the polymer is sheet moulding compound.

Item A787. The composite material of any one of items A4-A436 or B3-B15 where the polymer is silicone.

Item A788. The composite material of any one of items A4-A436 or B3-B15 where the polymer is silicone resins.

Item A789. The composite material of any one of items A4-A436 or B3-B15 where the polymer is silicones in primary forms.

Item A790. The composite material of any one of items A4-A436 or B3-B15 where the polymer is starch.

Item A791. The composite material of any one of items A4-A436 or B3-B15 where the polymer is styrene acrylonitrile.

Item A792. The composite material of any one of items A4-A436 or B3-B15 where the polymer is styrene acrylonitrile copolymer.

Item A793. The composite material of any one of items A4-A436 or B3-B15 where the polymer is styrene butadiene.

Item A794. The composite material of any one of items A4-A436 or B3-B15 where the polymer is styrene butadiene latex.

Item A795. The composite material of any one of items A4-A436 or B3-B15 where the polymer is styrene maleic anhydride.

Item A796. The composite material of any one of items A4-A436 or B3-B15 where the polymer is styrene-acrylonitrile (SAN) copolymer.

Item A797. The composite material of any one of items A4-A436 or B3-B15 where the polymer is styrene-ethylene-butadiene-styrene.

Item A798. The composite material of any one of items A4-A436 or B3-B15 where the polymer is styrene-isoprene-styrene.

Item A799. The composite material of any one of items A4-A436 or B3-B15 where the polymer is styrenics.

Item A800. The composite material of any one of items A4-A436 or B3-B15 where the polymer is superlinear polyethylene.

Item A801. The composite material of any one of items A4-A436 or B3-B15 where the polymer is thermoplastic olefin.

Item A802. The composite material of any one of items A4-A436 or B3-B15 where the polymer is thermoplastic polyurethane rubber.

Item A803. The composite material of any one of items A4-A436 or B3-B15 where the polymer is thermoplatic rubber.

Item A804. The composite material of any one of items A4-A436 or B3-B15 where the polymer is toughened polystyrene.

Item A805. The composite material of any one of items A4-A436 or B3-B15 where the polymer is unnatural nucleic acids (e.g. PNA, LNA and other unnatural nucleic acids).

Item A806. The composite material of any one of items A4-A436 or B3-B15 where the polymer is unnatural polypeptides (i.e. polypeptides not solely comprising alpha-amino acids).

Item A807. The composite material of any one of items A4-A436 or B3-B15 where the polymer is unsaturated polyester resin.

Item A808. The composite material of any one of items A4-A436 or B3-B15 where the polymer is urea formaldehyde.

Item A809. The composite material of any one of items A4-A436 or B3-B15 where the polymer is urea resin.

Item A810. The composite material of any one of items A4-A436 or B3-B15 where the polymer is
Vectran.

Item A811. The composite material of any one of items A4-A436 or B3-B15 where the polymer is vinyl chloride.

Item A812. The composite material of any one of items A4-A436 or B3-B15 where the polymer is vinyl chloride copolymers.

Item A813. The composite material of any one of items A4-A436 or B3-B15 where the polymer is vinyl chloride monomer.

Item A814. The composite material of any one of items A4-A436 or B3-B15 where the polymer is vinyl chloride-vinyl acetate copolymers.

Item A815. The composite material of any one of items A4-A436 or B3-B15 where the polymer is vinyls (PVC, nylon).

Item A816. The composite material of any one of items A4-A436 or B3-B15 where the polymer is wood flour.

Item A817. The composite material of any one of items A4-A436 or B3-B15 where the polymer comprises C and H.

Item A818. The composite material of any one of items A4-A436 or B3-B15 where the polymer comprises C and H and O.

Item A819. The composite material of any one of items A4-A436 or B3-B15 where the polymer comprises C and H and O and N.

Item A820. The composite material of any one of items A4-A436 or B3-B15 where the polymer comprises C and H and Cl.

Item A821. The composite material of any one of items A4-A436 or B3-B15 where the polymer comprises C and H and F.

Item A822. The composite material of any one of items A4-A436 or B3-B15 where the polymer comprises —CH2—.

Item A823. The composite material of any one of items A4-A436 or B3-B15 where the polymer comprises —CH(CH3)—.

Item A824. The composite material of any one of items A4-A436 or B3-B15 where the polymer comprises —C(CH3)2—.

Item A825. The composite material of any one of items A4-A436 or B3-B15 where the polymer comprises —CF2—.

Item A826. The composite material of any one of items A4-A436 or B3-B15 where the polymer comprises —CH(C6H6)—.

Item A827. The composite material of any one of items A4-A436 or B3-B15 where the polymer is an inorganic polymer.

Item A828. The composite material of any one of items A4-A436 or B3-B15 where the polymer is an organic polymer.

Item A829. The composite material of any one of items A4-A436 or B3-B15 where the polymer is a thermoplastic polymer.

Item A830. The composite material of any one of items A4-A436 or B3-B15 where the polymer is a thermoset polymer.

Item A831. The composite material of any one of items A4-A436 or B3-B15 where the polymer is a copolymer.

Item A832. The composite material of any one of items A4-A436 or B3-B15 where the polymer is a homopolymer.

Item A833. The composite material of any one of items A4-A436 or B3-B15 where the polymer is a block copolymer.

Item A834. The composite material of any one of items A4-A436 or B3-B15 where the polymer is a random copolymer.

Item A835. The composite material of any one of items A4-A436 or B3-B15 where the polymer is a cyclic polymer.

Item A836. The composite material of any one of items A4-A436 or B3-B15 where the polymer is a non-cyclic polymer.

Item A837. The composite material of any one of items A4-A436 or B3-B15 where the polymer is a branched polymer.

Item A838. The composite material of any one of items A4-A436 or B3-B15 where the polymer is a non-branched polymer.

Item A839. The composite material of any one of items A4-A436 or B3-B15 where the polymer is a polymer with a ratio of repeating units to branching units of more than 1, such as more than 2, such as more than 3, such as more than 4, such as more than 5, such as more than 6, such as more than 7, such as more than 8, such as more than 9, such as more than 10, such as more than 15, such as more than 20, such as more than 30, such as more than 40, such as more than 50, such as more than 100, such as more than 200, such as more than 300, such as more than 400, such as more than 500.

Item A840. The composite material of any one of items A4-A436 or B3-B15 where the polymer is a polymer with a ratio of repeating units to branching units of less than 500, such as less than 300, such as less than 200, such as less than 100, such as less than 50, such as less than 40, such as less than 30, such as less than 20, such as less than 15, such as less than 10, such as less than 9, such as less than 8, such as less than 7, such as less than 6, such as less than 5, such as less than 4, such as less than 3, such as less than 2, such as less than 1.

Item A841. The composite material of any one of items A4-A436 or B3-B15 where the polymer is a polymer with a ratio of repeating units to branching units of from 1 to 2, or from 2 to 3, or from 3 to 4, or from 4 to 5, or from 5 to 6, or from 6 to 7, or from 7 to 8, or from 8 to 9, or from 9 to 10, or from 10 to 15, or from 15 to 20, or from 20 to 30, or from 30 to 40, or from 40 to 50, or from 50 to 100, or from 100 to 200, or from 200 to 300, or from 300 to 500.

Item A842. The composite material of any one of items A4-A436 or B3-B15 where the polymer is a polymer in which all bonds are single bonds.

Item A843. The composite material of any one of items A4-A436 or B3-B15 where the polymer is a polymer in which all bonds are single bonds or double bonds.

Item A844. The composite material of any one of items A4-A436 or B3-B15 where the polymer is a polymer in which all bonds are single bonds or triple bonds.

Item A845. The composite material of any one of items A4-A436 or B3-B15 where the polymer is a polymer in which all bonds are single bonds or double bonds or triple bonds.

Item A846. The composite material of any one of items A4-A436 or B3-B15 where the polymer is a polymer consisting of C and H.

Item A847. The composite material of any one of items A4-A436 or B3-B15 where the polymer is a polymer consisting of C and H and O.

Item A848. The composite material of any one of items A4-A436 or B3-B15 where the polymer is a polymer consisting of C and H and O and N.

Item A849. The composite material of any one of items A4-A436 or B3-B15 where the polymer is a polymer consisting of C and H and Cl.

Item A850. The composite material of any one of items A4-A436 or B3-B15 where the polymer is a polymer consisting of C and H and F.

Item A851. The composite material of any one of items A4-A436 or B3-B15 where the polymer is a polymer consisting of —CH2—.

Item A852. The composite material of any one of items A4-A436 or B3-B15 where the polymer is a polymer consisting of —CH(CH3)—.

Item A853. The composite material of any one of items A4-A436 or B3-B15 where the polymer is a polymer consisting of —C(CH3)2—.

Item A854. The composite material of any one of items A4-A436 or B3-B15 where the polymer is a polymer consisting of —CF2—.

Item A855. The composite material of any one of items A4-A436 or B3-B15 where the polymer is a polymer consisting of —CH(C6H6)—.

Item A856. The composite material of any one of items A4-A436 or B3-B15 where the polymer has a molecular weight in Dalton chosen from more than 10, such as more than $10^2$, such as more than $10^3$, such as more than $10^4$, such as more than $10^5$, such as more than $10^6$, such as more than $10^7$, such as more than $10^8$, such as more than $10^9$, such as more than $10^{10}$, such as more than $10^{11}$, such as more than $10^{12}$, such as more than $10^{13}$, such as more than $10^{14}$, such as more than $10^{15}$, such as more than $10^{16}$, such as more than $10^{17}$, such as more than $10^{18}$, such as more than $10^{19}$, such as more than $10^{20}$, such as more than $10^{21}$, such as more than $10^{22}$, such as more than $10^{23}$, such as more than $10^{24}$, such as more than $10^{25}$, such as more than $10^{26}$, such as more than $10^{27}$, such as more than $10^{28}$, such as more than $10^{29}$, such as more than $10^{30}$, such as more than $10^{31}$, such as more than $10^{32}$, such as more than $10^{33}$, such as more than $10^{34}$, such as more than $10^{35}$.

Item A857. The composite material of any one of items A4-A436 or B3-B15 where the polymer has molecular weight in Dalton chosen from less than $10^{35}$, such as less than $10^{34}$, such as less than $10^{33}$, such as less than $10^{32}$, such as less than $10^{31}$, such as less than $10^{30}$, such as less than $10^{29}$, such as less than $10^{28}$, such as less than $10^{27}$, such as less than $10^{26}$, such as less than $10^{25}$, such as less than $10^{24}$, such as less than $10^{23}$, such as less than $10^{22}$, such as less than $10^{21}$, such as less than $10^{20}$, such as less than $10^{19}$, such as less than $10^{18}$, such as less than $10^{17}$, such as less than $10^{16}$, such as less than $10^{13}$, such as less than $10^{14}$, such as less than $10^{13}$, such as less than $10^{12}$, such as less than $10^{11}$, such as less than $10^{10}$, such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A858. The composite material of any one of items A4-A436 or B3-B15 where the polymer has a molecular weight in Dalton chosen from 10 to $10^2$, or from $10^2$ to $10^3$, or from $10^3$ to $10^4$, or from $10^4$ to $10^5$, or from $10^5$ to $10^6$, or from $10^6$ to $10^7$, or from $10^7$ to $10^8$, or from $10^8$ to $10^9$, or from $10^9$ to $10^{10}$ or from $10^{10}$ to $10^{11}$, or from $10^{11}$ to $10^{12}$, or from $10^{12}$ to $10^{13}$, or from $10^{13}$ to $10^{14}$, or from $10^{14}$ to $10^{15}$, or from $10^{15}$ to $10^{16}$, or from $10^{16}$ to $10^{17}$, or from $10^{17}$ to $10^{18}$, or from $10^{18}$ to $10^{19}$, or from $10^{19}$ to $10^{20}$, or from $10^{20}$ to $10^{21}$, or from $10^{21}$ to $10^{22}$, or from $10^{22}$ to $10^{23}$, or from $10^{23}$ to $10^{24}$, or from $10^{24}$ to $10^{25}$, or from $10^{25}$ to $10^{26}$, or from $10^{26}$ to $10^{27}$, or from $10^{27}$ to $10^{28}$, or from $10^{28}$ to $10^{29}$, or from $10^{29}$ to $10^{30}$, or from $10^{30}$ to $10^{31}$, or from $10^{31}$ to $10^{32}$, or from $10^{32}$ to $10^{33}$ or from $10^{33}$ to $10^{34}$, or from $10^{34}$ to $10^{35}$.

Item A859. The composite material of any one of items A4-A436 or B3-B15 where the polymer is an aliphatic polymer.

Item A860. The composite material of any one of items A4-A436 or B3-B15 where the polymer is an aromatic polymer.

Item A861. The composite material of any one of items A4-A436 or B3-B15 where the polymer is a mixed aliphatic-aromatic polymer with a percentage of aromaticity chosen from more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%.

Item A862. The composite material of any one of items A4-A436 or B3-B15 where the polymer is a mixed aliphatic-aromatic polymer with a percentage of aromaticity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%.

Item A863. The composite material of any one of items A4-A436 or B3-B15 where the polymer is a mixed aliphatic-aromatic polymer with a percentage of aromaticity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

The following items relate to nanotubes and second structural entities.

Item A864. The composite material of any one of items A3-A863 or B2-B15 where the nanotube is a carbon nanotube and the second structural entity is a carbon fibre.

Item A865. The composite material of any one of items A3-A863 or B2-B15 where the nanotube is a carbon nanotube and the second structural entity is boron nitride.

Item A866. The composite material of any one of items A3-A863 or B2-B15 where the nanotube is a carbon nanotube and the second structural entity is a ceramic.

Item A867. The composite material of any one of items A3-A863 or B2-B15 where the nanotube is a carbon nanotube and the second structural entity is graphene.

Item A868. The composite material of any one of items A3-A863 or B2-B15 where the nanotube is a carbon nanotube and the second structural entity is a metal.

Item A869. The composite material of any one of items A3-A863 or B2-B15 where the nanotube is a carbon nanotube and the second structural entity is a nucleic acid.

Item A870. The composite material of any one of items A3-A863 or B2-B15 where the nanotube is a carbon nanotube and the second structural entity is a polypeptide.

Item A871. The composite material of any one of items A3-A863 or B2-B15 where the nanotube is a carbon nanotube and the second structural entity is a cathode.

Item A872. The composite material of any one of items A3-A863 or B2-B15 where the nanotube is a carbon nanotube and the second structural entity is a metalised dielectric.

Item A873. The composite material of any one of items A3-A863 or B2-B15 where the nanotube is a carbon nanotube and the second structural entity is a peptide.

Item A874. The composite material of any one of items A3-A863 or B2-B15 where the nanotube is a carbon nanotube and the second structural entity is a protein.

Item A875. The composite material of any one of items A3-A863 or B2-B15 where the nanotube is a carbon nanotube and the second structural entity is a semiconductor.

Item A876. The composite material of any one of items A3-A863 or B2-B15 where the nanotube is a carbon nanotube and the second structural entity is a sensor.

Item A877. The composite material of any one of items A3-A863 or B2-B15 where the nanotube is a carbon nanotube and the second structural entity is aluminium.

Item A878. The composite material of any one of items A3-A863 or B2-B15 where the nanotube is a carbon nanotube and the second structural entity is an anode.

Item A879. The composite material of any one of items A3-A863 or B2-B15 where the nanotube is a carbon nanotube and the second structural entity is an antibody.

Item A880. The composite material of any one of items A3-A863 or B2-B15 where the nanotube is a carbon nanotube and the second structural entity is electrode.

Item A881. The composite material of any one of items A3-A863 or B2-B15 where the nanotube is a carbon nanotube and the second structural entity is boron nitride.

Item A882. The composite material of any one of items A3-A863 or B2-B15 where the nanotube is a carbon nanotube and the second structural entity is buckyball.

Item A883. The composite material of any one of items A3-A863 or B2-B15 where the nanotube is a carbon nanotube and the second structural entity is carbon nanofibres.

Item A884. The composite material of any one of items A3-A863 or B2-B15 where the nanotube is a carbon nanotube and the second structural entity is concrete.

Item A885. The composite material of any one of items A3-A863 or B2-B15 where the nanotube is a carbon nanotube and the second structural entity is glass fibre.

Item A886. The composite material of any one of items A3-A863 or B2-B15 where the nanotube is a carbon nanotube and the second structural entity is graphene oxide.

Item A887. The composite material of any one of items A3-A863 or B2-B15 where the nanotube is a carbon nanotube and the second structural entity is graphyne.

Item A888. The composite material of any one of items A3-A863 or B2-B15 where the nanotube is a carbon nanotube and the second structural entity is stainless steel.

Item A889. The composite material of any one of items A3-A863 or B2-B15 where the nanotube is a carbon nanotube and the second structural entity is a cathode.

Item A890. The composite material of any one of items A3-A863 or B2-B15 where the nanotube is a carbon nanotube and the second structural entity is a carbon polymer.

Item A891. The composite material of any one of items A3-A863 or B2-B15 where the nanotube is a carbon nanotube and the second structural entity is (Ag) silver.

Item A892. The composite material of any one of items A3-A863 or B2-B15 where the nanotube is a carbon nanotube and the second structural entity is (Al) aluminium.

Item A893. The composite material of any one of items A3-A863 or B2-B15 where the nanotube is a carbon nanotube and the second structural entity is (Au) gold.

Item A894. The composite material of any one of items A3-A863 or B2-B15 where the nanotube is a carbon nanotube and the second structural entity is (Cr) chromium.

Item A895. The composite material of any one of items A3-A863 or B2-B15 where the nanotube is a carbon nanotube and the second structural entity is (Cu) copper.

Item A896. The composite material of any one of items A3-A863 or B2-B15 where the nanotube is a carbon nanotube and the second structural entity is (Fe) steel and stainless steel.

Item A897. The composite material of any one of items A3-A863 or B2-B15 where the nanotube is a carbon nanotube and the second structural entity is (Mn) manganese.

Item A898. The composite material of any one of items A3-A863 or B2-B15 where the nanotube is a carbon nanotube and the second structural entity is (Mo) molybdenum.

Item A899. The composite material of any one of items A3-A863 or B2-B15 where the nanotube is a carbon nanotube and the second structural entity is (Ni) nickel.

Item A900. The composite material of any one of items A3-A863 or B2-B15 where the nanotube is a carbon nanotube and the second structural entity is (Pa) palladium.

Item A901. The composite material of any one of items A3-A863 or B2-B15 where the nanotube is a carbon nanotube and the second structural entity is (Pt) platinum.

Item A902. The composite material of any one of items A3-A863 or B2-B15 where the nanotube is a carbon nanotube and the second structural entity is (Ta) tantalum.

Item A903. The composite material of any one of items A3-A863 or B2-B15 where the nanotube is a carbon nanotube and the second structural entity is (Ti) titanium.

Item A904. The composite material of any one of items A3-A863 or B2-B15 where the nanotube is a carbon nanotube and the second structural entity is (Wo) Tungsten.

Item A905. The composite material of any one of items A3-A863 or B2-B15 where the nanotube is a carbon nanotube and the second structural entity is a battery.

Item A906. The composite material of any one of items A3-A863 or B2-B15 where the nanotube is a carbon nanotube and the second structural entity is a borosilicate.

Item A907. The composite material of any one of items A3-A863 or B2-B15 where the nanotube is a carbon nanotube and the second structural entity is a buckyball.

Item A908. The composite material of any one of items A3-A863 or B2-B15 where the nanotube is a carbon nanotube and the second structural entity is a buckytube.

Item A909. The composite material of any one of items A3-A863 or B2-B15 where the nanotube is a carbon nanotube and the second structural entity is a capacitator.

Item A910. The composite material of any one of items A3-A863 or B2-B15 where the nanotube is a carbon nanotube and the second structural entity is a carbon dome.

Item A911. The composite material of any one of items A3-A863 or B2-B15 where the nanotube is a carbon nanotube and the second structural entity is a carbon megatube.

Item A912. The composite material of any one of items A3-A863 or B2-B15 where the nanotube is a carbon nanotube and the second structural entity is a carbon nanofibre.

Item A913. The composite material of any one of items A3-A863 or B2-B15 where the nanotube is a carbon nanotube and the second structural entity is a carbon nanofoam.

Item A914. The composite material of any one of items A3-A863 or B2-B15 where the nanotube is a carbon nanotube and the second structural entity is a carbon nanothread.

Item A915. The composite material of any one of items A3-A863 or B2-B15 where the nanotube is a carbon nanotube and the second structural entity is a catalyst.

Item A916. The composite material of any one of items A3-A863 or B2-B15 where the nanotube is a carbon nanotube and the second structural entity is a ceramic material.

Item A917. The composite material of any one of items A3-A863 or B2-B15 where the nanotube is a carbon nanotube and the second structural entity is a composite material.

Item A918. The composite material of any one of items A3-A863 or B2-B15 where the nanotube is a carbon nanotube and the second structural entity is a conductor.

Item A919. The composite material of any one of items A3-A863 or B2-B15 where the nanotube is a carbon nanotube and the second structural entity is a covalent crystal.

Item A920. The composite material of any one of items A3-A863 or B2-B15 where the nanotube is a carbon nanotube and the second structural entity is a crystal.

Item A921. The composite material of any one of items A3-A863 or B2-B15 where the nanotube is a carbon nanotube and the second structural entity is a crystalline material.

Item A922. The composite material of any one of items A3-A863 or B2-B15 where the nanotube is a carbon nanotube and the second structural entity is a defect-free graphene sheet.

Item A923. The composite material of any one of items A3-A863 or B2-B15 where the nanotube is a carbon nanotube and the second structural entity is a dielectric material.

Item A924. The composite material of any one of items A3-A863 or B2-B15 where the nanotube is a carbon nanotube and the second structural entity is a diode.

Item A925. The composite material of any one of items A3-A863 or B2-B15 where the nanotube is a carbon nanotube and the second structural entity is a dodecahedrane.

Item A926. The composite material of any one of items A3-A863 or B2-B15 where the nanotube is a carbon nanotube and the second structural entity is a doped glass.

Item A927. The composite material of any one of items A3-A863 or B2-B15 where the nanotube is a carbon nanotube and the second structural entity is a fibre.

Item A928. The composite material of any one of items A3-A863 or B2-B15 where the nanotube is a carbon nanotube and the second structural entity is a fullerite.

Item A929. The composite material of any one of items A3-A863 or B2-B15 where the nanotube is a carbon nanotube and the second structural entity is a fused silica.

Item A930. The composite material of any one of items A3-A863 or B2-B15 where the nanotube is a carbon nanotube and the second structural entity is a glass fibre.

Item A931. The composite material of any one of items A3-A863 or B2-B15 where the nanotube is a carbon nanotube and the second structural entity is a glue.

Item A932. The composite material of any one of items A3-A863 or B2-B15 where the nanotube is a carbon nanotube and the second structural entity is a green ceramic.

Item A933. The composite material of any one of items A3-A863 or B2-B15 where the nanotube is a carbon nanotube and the second structural entity is a lanthanides.

Item A934. The composite material of any one of items A3-A863 or B2-B15 where the nanotube is a carbon nanotube and the second structural entity is a machinable ceramic.

Item A935. The composite material of any one of items A3-A863 or B2-B15 where the nanotube is a carbon nanotube and the second structural entity is a metal alloy.

Item A936. The composite material of any one of items A3-A863 or B2-B15 where the nanotube is a carbon nanotube and the second structural entity is a metallised ceramic.

Item A937. The composite material of any one of items A3-A863 or B2-B15 where the nanotube is a carbon nanotube and the second structural entity is a metalloid.

Item A938. The composite material of any one of items A3-A863 or B2-B15 where the nanotube is a carbon nanotube and the second structural entity is a mineral.

Item A939. The composite material of any one of items A3-A863 or B2-B15 where the nanotube is a carbon nanotube and the second structural entity is a non-covalent crystal.

Item A940. The composite material of any one of items A3-A863 or B2-B15 where the nanotube is a carbon nanotube and the second structural entity is a piezoelectric material.

Item A941. The composite material of any one of items A3-A863 or B2-B15 where the nanotube is a carbon nanotube and the second structural entity is a platinum group metal.

Item A942. The composite material of any one of items A3-A863 or B2-B15 where the nanotube is a carbon nanotube and the second structural entity is a post-transition metal.

Item A943. The composite material of any one of items A3-A863 or B2-B15 where the nanotube is a carbon nanotube and the second structural entity is a rare earth element.

Item A944. The composite material of any one of items A3-A863 or B2-B15 where the nanotube is a carbon nanotube and the second structural entity is a sapphire.

Item A945. The composite material of any one of items A3-A863 or B2-B15 where the nanotube is a carbon nanotube and the second structural entity is a silicon nitride.

Item A946. The composite material of any one of items A3-A863 or B2-B15 where the nanotube is a carbon nanotube and the second structural entity is a single crystal fiber.

Item A947. The composite material of any one of items A3-A863 or B2-B15 where the nanotube is a carbon nanotube and the second structural entity is a sol-gel.

Item A948. The composite material of any one of items A3-A863 or B2-B15 where the nanotube is a carbon nanotube and the second structural entity is a synthetic diamond.

Item A949. The composite material of any one of items A3-A863 or B2-B15 where the nanotube is a carbon nanotube and the second structural entity is a transition metal.

Item A950. The composite material of any one of items A3-A863 or B2-B15 where the nanotube is a carbon nanotube and the second structural entity is a tungsten carbide.

Item A951. The composite material of any one of items A3-A863 or B2-B15 where the nanotube is a carbon nanotube and the second structural entity is actinides.

Item A952. The composite material of any one of items A3-A863 or B2-B15 where the nanotube is a carbon nanotube and the second structural entity is activated carbon.

Item A953. The composite material of any one of items A3-A863 or B2-B15 where the nanotube is a carbon nanotube and the second structural entity is aggregated diamonds.

Item A954. The composite material of any one of items A3-A863 or B2-B15 where the nanotube is a carbon nanotube and the second structural entity is air entrainers.

Item A955. The composite material of any one of items A3-A863 or B2-B15 where the nanotube is a carbon nanotube and the second structural entity is alkali-silica reactivity inhibitors.

Item A956. The composite material of any one of items A3-A863 or B2-B15 where the nanotube is a carbon nanotube and the second structural entity is alloys.

Item A957. The composite material of any one of items A3-A863 or B2-B15 where the nanotube is a carbon nanotube and the second structural entity is alumina.

Item A958. The composite material of any one of items A3-A863 or B2-B15 where the nanotube is a carbon nanotube and the second structural entity is alumina trihydrate.

Item A959. The composite material of any one of items A3-A863 or B2-B15 where the nanotube is a carbon nanotube and the second structural entity is aluminum boride.

Item A960. The composite material of any one of items A3-A863 or B2-B15 where the nanotube is a carbon nanotube and the second structural entity is aluminum fibers.

Item A961. The composite material of any one of items A3-A863 or B2-B15 where the nanotube is a carbon nanotube and the second structural entity is aluminum oxide.

Item A962. The composite material of any one of items A3-A863 or B2-B15 where the nanotube is a carbon nanotube and the second structural entity is aluminum trihydroxide.

Item A963. The composite material of any one of items A3-A863 or B2-B15 where the nanotube is a carbon nanotube and the second structural entity is amalgams.

Item A964. The composite material of any one of items A3-A863 or B2-B15 where the nanotube is a carbon nanotube and the second structural entity is amorphous carbon.

Item A965. The composite material of any one of items A3-A863 or B2-B15 where the nanotube is a carbon nanotube and the second structural entity is actinides.

Item A966. The composite material of any one of items A3-A863 or B2-B15 where the nanotube is a carbon nanotube and the second structural entity is an amalgam.

Item A967. The composite material of any one of items A3-A863 or B2-B15 where the nanotube is a carbon nanotube and the second structural entity is an endohedral fullerene.

Item A968. The composite material of any one of items A3-A863 or B2-B15 where the nanotube is a carbon nanotube and the second structural entity is an insulator.

Item A969. The composite material of any one of items A3-A863 or B2-B15 where the nanotube is a carbon nanotube and the second structural entity is an intermetallic.

Item A970. The composite material of any one of items A3-A863 or B2-B15 where the nanotube is a carbon nanotube and the second structural entity is an ionic crystal.

Item A971. The composite material of any one of items A3-A863 or B2-B15 where the nanotube is a carbon nanotube and the second structural entity is an organic material.

Item A972. The composite material of any one of items A3-A863 or B2-B15 where the nanotube is a carbon nanotube and the second structural entity is anthracite.

Item A973. The composite material of any one of items A3-A863 or B2-B15 where the nanotube is a carbon nanotube and the second structural entity is aramid.

Item A974. The composite material of any one of items A3-A863 or B2-B15 where the nanotube is a carbon nanotube and the second structural entity is asbestos.

Item A975. The composite material of any one of items A3-A863 or B2-B15 where the nanotube is a carbon nanotube and the second structural entity is barium.

Item A976. The composite material of any one of items A3-A863 or B2-B15 where the nanotube is a carbon nanotube and the second structural entity is bone.

Item A977. The composite material of any one of items A3-A863 or B2-B15 where the nanotube is a carbon nanotube and the second structural entity is boron.

Item A978. The composite material of any one of items A3-A863 or B2-B15 where the nanotube is a carbon nanotube and the second structural entity is boron nitride nanoscroll.

Item A979. The composite material of any one of items A3-A863 or B2-B15 where the nanotube is a carbon nanotube and the second structural entity is boron nitride oxide.

Item A980. The composite material of any one of items A3-A863 or B2-B15 where the nanotube is a carbon nanotube and the second structural entity is brass.

Item A981. The composite material of any one of items A3-A863 or B2-B15 where the nanotube is a carbon nanotube and the second structural entity is brass fibers.

Item A982. The composite material of any one of items A3-A863 or B2-B15 where the nanotube is a carbon nanotube and the second structural entity is buckminsterfullerene.

Item A983. The composite material of any one of items A3-A863 or B2-B15 where the nanotube is a carbon nanotube and the second structural entity is bucky paper.

Item A984. The composite material of any one of items A3-A863 or B2-B15 where the nanotube is a carbon nanotube and the second structural entity is buckyball clusters.

Item A985. The composite material of any one of items A3-A863 or B2-B15 where the nanotube is a carbon nanotube and the second structural entity is buckypaper.

Item A986. The composite material of any one of items A3-A863 or B2-B15 where the nanotube is a carbon nanotube and the second structural entity is buckytube.

Item A987. The composite material of any one of items A3-A863 or B2-B15 where the nanotube is a carbon nanotube and the second structural entity is calcium carbonite.

Item A988. The composite material of any one of items A3-A863 or B2-B15 where the nanotube is a carbon nanotube and the second structural entity is calcium metasilicate.

Item A989. The composite material of any one of items A3-A863 or B2-B15 where the nanotube is a carbon nanotube and the second structural entity is calcium sulfate.

Item A990. The composite material of any one of items A3-A863 or B2-B15 where the nanotube is a carbon nanotube and the second structural entity is calcium sulphate.

Item A991. The composite material of any one of items A3-A863 or B2-B15 where the nanotube is a carbon nanotube and the second structural entity is carbon black.

Item A992. The composite material of any one of items A3-A863 or B2-B15 where the nanotube is a carbon nanotube and the second structural entity is carbon fiber.

Item A993. The composite material of any one of items A3-A863 or B2-B15 where the nanotube is a carbon nanotube and the second structural entity is carbon fibers.

Item A994. The composite material of any one of items A3-A863 or B2-B15 where the nanotube is a carbon nanotube and the second structural entity is carbon megatubes.

Item A995. The composite material of any one of items A3-A863 or B2-B15 where the nanotube is a carbon nanotube and the second structural entity is carbon nano-onions.

Item A996. The composite material of any one of items A3-A863 or B2-B15 where the nanotube is a carbon nanotube and the second structural entity is carbon nanobuds.

Item A997. The composite material of any one of items A3-A863 or B2-B15 where the nanotube is a carbon nanotube and the second structural entity is carbon nanofiber.

Item A998. The composite material of any one of items A3-A863 or B2-B15 where the nanotube is a carbon nanotube and the second structural entity is carbon nanofoam.

Item A999. The composite material of any one of items A3-A863 or B2-B15 where the nanotube is a carbon nanotube and the second structural entity is carbon nanothread.

Item A1000. The composite material of any one of items A3-A863 or B2-B15 where the nanotube is a carbon nanotube and the second structural entity is carbon/diamond nanothread.

Item A1001. The composite material of any one of items A3-A863 or B2-B15 where the nanotube is a carbon nanotube and the second structural entity is cellulose fibers.

Item A1002. The composite material of any one of items A3-A863 or B2-B15 where the nanotube is a carbon nanotube and the second structural entity is cellulose nanofibers (e.g. curran).

Item A1003. The composite material of any one of items A3-A863 or B2-B15 where the nanotube is a carbon nanotube and the second structural entity is cellulose nanowhiskers.

Item A1004. The composite material of any one of items A3-A863 or B2-B15 where the nanotube is a carbon nanotube and the second structural entity is chemical admixtures.

Item A1005. The composite material of any one of items A3-A863 or B2-B15 where the nanotube is a carbon nanotube and the second structural entity is chlorographene.

Item A1006. The composite material of any one of items A3-A863 or B2-B15 where the nanotube is a carbon nanotube and the second structural entity is chromium.

Item A1007. The composite material of any one of items A3-A863 or B2-B15 where the nanotube is a carbon nanotube and the second structural entity is clay.

Item A1008. The composite material of any one of items A3-A863 or B2-B15 where the nanotube is a carbon nanotube and the second structural entity is coal.

Item A1009. The composite material of any one of items A3-A863 or B2-B15 where the nanotube is a carbon nanotube and the second structural entity is coated boron nitride.

Item A1010. The composite material of any one of items A3-A863 or B2-B15 where the nanotube is a carbon nanotube and the second structural entity is coated graphene.

Item A1011. The composite material of any one of items A3-A863 or B2-B15 where the nanotube is a carbon nanotube and the second structural entity is coloring admixtures.

Item A1012. The composite material of any one of items A3-A863 or B2-B15 where the nanotube is a carbon nanotube and the second structural entity is composite materials.

Item A1013. The composite material of any one of items A3-A863 or B2-B15 where the nanotube is a carbon nanotube and the second structural entity is concrete admixtures.

Item A1014. The composite material of any one of items A3-A863 or B2-B15 where the nanotube is a carbon nanotube and the second structural entity is COOH-functionalized graphene.

Item A1015. The composite material of any one of items A3-A863 or B2-B15 where the nanotube is a carbon nanotube and the second structural entity is copper.

Item A1016. The composite material of any one of items A3-A863 or B2-B15 where the nanotube is a carbon nanotube and the second structural entity is corrosion inhibitors.

Item A1017. The composite material of any one of items A3-A863 or B2-B15 where the nanotube is a carbon nanotube and the second structural entity is covalent crystals.

Item A1018. The composite material of any one of items A3-A863 or B2-B15 where the nanotube is a carbon nanotube and the second structural entity is crystal.

Item A1019. The composite material of any one of items A3-A863 or B2-B15 where the nanotube is a carbon nanotube and the second structural entity is crystalline materials.

Item A1020. The composite material of any one of items A3-A863 or B2-B15 where the nanotube is a carbon nanotube and the second structural entity is diamond.

Item A1021. The composite material of any one of items A3-A863 or B2-B15 where the nanotube is a carbon nanotube and the second structural entity is diamond-like carbon.

Item A1022. The composite material of any one of items A3-A863 or B2-B15 where the nanotube is a carbon nanotube and the second structural entity is dispersants.

Item A1023. The composite material of any one of items A3-A863 or B2-B15 where the nanotube is a carbon nanotube and the second structural entity is dodecahedrane.

Item A1024. The composite material of any one of items A3-A863 or B2-B15 where the nanotube is a carbon nanotube and the second structural entity is double-layer boron nitride.

Item A1025. The composite material of any one of items A3-A863 or B2-B15 where the nanotube is a carbon nanotube and the second structural entity is double-layer graphene.

Item A1026. The composite material of any one of items A3-A863 or B2-B15 where the nanotube is a carbon nanotube and the second structural entity is e-glass.

Item A1027. The composite material of any one of items A3-A863 or B2-B15 where the nanotube is a carbon nanotube and the second structural entity is elastomers.

Item A1028. The composite material of any one of items A3-A863 or B2-B15 where the nanotube is a carbon nanotube and the second structural entity is endohedral fullerenes.

Item A1029. The composite material of any one of items A3-A863 or B2-B15 where the nanotube is a carbon nanotube and the second structural entity is exfoliated graphite.

Item A1030. The composite material of any one of items A3-A863 or B2-B15 where the nanotube is a carbon nanotube and the second structural entity is exfoliated silicate.

Item A1031. The composite material of any one of items A3-A863 or B2-B15 where the nanotube is a carbon nanotube and the second structural entity is extruded activated carbon.

Item A1032. The composite material of any one of items A3-A863 or B2-B15 where the nanotube is a carbon nanotube and the second structural entity is fibres.

Item A1033. The composite material of any one of items A3-A863 or B2-B15 where the nanotube is a carbon nanotube and the second structural entity is flourinated boron nitride.

Item A1034. The composite material of any one of items A3-A863 or B2-B15 where the nanotube is a carbon nanotube and the second structural entity is flourinated graphene.

Item A1035. The composite material of any one of items A3-A863 or B2-B15 where the nanotube is a carbon nanotube and the second structural entity is fluorographene.

Item A1036. The composite material of any one of items A3-A863 or B2-B15 where the nanotube is a carbon nanotube and the second structural entity is fly ash.

Item A1037. The composite material of any one of items A3-A863 or B2-B15 where the nanotube is a carbon nanotube and the second structural entity is fullerene rings.

Item A1038. The composite material of any one of items A3-A863 or B2-B15 where the nanotube is a carbon nanotube and the second structural entity is fullerenes.

Item A1039. The composite material of any one of items A3-A863 or B2-B15 where the nanotube is a carbon nanotube and the second structural entity is fullerite.

Item A1040. The composite material of any one of items A3-A863 or B2-B15 where the nanotube is a carbon nanotube and the second structural entity is functionalized boron nitride.

Item A1041. The composite material of any one of items A3-A863 or B2-B15 where the nanotube is a carbon nanotube and the second structural entity is functionalized graphene.

Item A1042. The composite material of any one of items A3-A863 or B2-B15 where the nanotube is a carbon nanotube and the second structural entity is fused silica.

Item A1043. The composite material of any one of items A3-A863 or B2-B15 where the nanotube is a carbon nanotube and the second structural entity is gallium arsenide.

Item A1044. The composite material of any one of items A3-A863 or B2-B15 where the nanotube is a carbon nanotube and the second structural entity is gallium nitride.

Item A1045. The composite material of any one of items A3-A863 or B2-B15 where the nanotube is a carbon nanotube and the second structural entity is gedodesic carbon domes.

Item A1046. The composite material of any one of items A3-A863 or B2-B15 where the nanotube is a carbon nanotube and the second structural entity is germanium.

Item A1047. The composite material of any one of items A3-A863 or B2-B15 where the nanotube is a carbon nanotube and the second structural entity is glass.

Item A1048. The composite material of any one of items A3-A863 or B2-B15 where the nanotube is a carbon nanotube and the second structural entity is glass microsphere.

Item A1049. The composite material of any one of items A3-A863 or B2-B15 where the nanotube is a carbon nanotube and the second structural entity is glass ribbons.

Item A1050. The composite material of any one of items A3-A863 or B2-B15 where the nanotube is a carbon nanotube and the second structural entity is glass spheres.

Item A1051. The composite material of any one of items A3-A863 or B2-B15 where the nanotube is a carbon nanotube and the second structural entity is glasses.

Item A1052. The composite material of any one of items A3-A863 or B2-B15 where the nanotube is a carbon nanotube and the second structural entity is glassy carbon.

Item A1053. The composite material of any one of items A3-A863 or B2-B15 where the nanotube is a carbon nanotube and the second structural entity is glue.

Item A1054. The composite material of any one of items A3-A863 or B2-B15 where the nanotube is a carbon nanotube and the second structural entity is gold.

Item A1055. The composite material of any one of items A3-A863 or B2-B15 where the nanotube is a carbon nanotube and the second structural entity is gold particles.

Item A1056. The composite material of any one of items A3-A863 or B2-B15 where the nanotube is a carbon nanotube and the second structural entity is granular activated carbon.

Item A1057. The composite material of any one of items A3-A863 or B2-B15 where the nanotube is a carbon nanotube and the second structural entity is graphane.

Item A1058. The composite material of any one of items A3-A863 or B2-B15 where the nanotube is a carbon nanotube and the second structural entity is graphdiyne.

Item A1059. The composite material of any one of items A3-A863 or B2-B15 where the nanotube is a carbon nanotube and the second structural entity is graphene.

Item A1060. The composite material of any one of items A3-A863 or B2-B15 where the nanotube is a carbon nanotube and the second structural entity is graphite.

Item A1061. The composite material of any one of items A3-A863 or B2-B15 where the nanotube is a carbon nanotube and the second structural entity is graphone.

Item A1062. The composite material of any one of items A3-A863 or B2-B15 where the nanotube is a carbon nanotube and the second structural entity is hardened steel.

Item A1063. The composite material of any one of items A3-A863 or B2-B15 where the nanotube is a carbon nanotube and the second structural entity is high range water reducers.

Item A1064. The composite material of any one of items A3-A863 or B2-B15 where the nanotube is a carbon nanotube and the second structural entity is hydrous magnesium silicate.

Item A1065. The composite material of any one of items A3-A863 or B2-B15 where the nanotube is a carbon nanotube and the second structural entity is hyperdiamond.

Item A1066. The composite material of any one of items A3-A863 or B2-B15 where the nanotube is a carbon nanotube and the second structural entity is hyperdiamonds.

Item A1067. The composite material of any one of items A3-A863 or B2-B15 where the nanotube is a carbon nanotube and the second structural entity is imperfect boron nitride.

Item A1068. The composite material of any one of items A3-A863 or B2-B15 where the nanotube is a carbon nanotube and the second structural entity is imperfect graphene.

Item A1069. The composite material of any one of items A3-A863 or B2-B15 where the nanotube is a carbon nanotube and the second structural entity is intermetallics.

Item A1070. The composite material of any one of items A3-A863 or B2-B15 where the nanotube is a carbon nanotube and the second structural entity is ionic crystals.

Item A1071. The composite material of any one of items A3-A863 or B2-B15 where the nanotube is a carbon nanotube and the second structural entity is iron.

Item A1072. The composite material of any one of items A3-A863 or B2-B15 where the nanotube is a carbon nanotube and the second structural entity is iron oxides.

Item A1073. The composite material of any one of items A3-A863 or B2-B15 where the nanotube is a carbon nanotube and the second structural entity is kevlar.

Item A1074. The composite material of any one of items A3-A863 or B2-B15 where the nanotube is a carbon nanotube and the second structural entity is lanthanides.

Item A1075. The composite material of any one of items A3-A863 or B2-B15 where the nanotube is a carbon nanotube and the second structural entity is lead zirconium titanate.

Item A1076. The composite material of any one of items A3-A863 or B2-B15 where the nanotube is a carbon nanotube and the second structural entity is lignin.

Item A1077. The composite material of any one of items A3-A863 or B2-B15 where the nanotube is a carbon nanotube and the second structural entity is lignite.

Item A1078. The composite material of any one of items A3-A863 or B2-B15 where the nanotube is a carbon nanotube and the second structural entity is lithium niobate.

Item A1079. The composite material of any one of items A3-A863 or B2-B15 where the nanotube is a carbon nanotube and the second structural entity is lithium niobates.

Item A1080. The composite material of any one of items A3-A863 or B2-B15 where the nanotube is a carbon nanotube and the second structural entity is lonsdaleite.

Item A1081. The composite material of any one of items A3-A863 or B2-B15 where the nanotube is a carbon nanotube and the second structural entity is magnesium dihydroxide.

Item A1082. The composite material of any one of items A3-A863 or B2-B15 where the nanotube is a carbon nanotube and the second structural entity is magnesium oxide.

Item A1083. The composite material of any one of items A3-A863 or B2-B15 where the nanotube is a carbon nanotube and the second structural entity is manganese.

Item A1084. The composite material of any one of items A3-A863 or B2-B15 where the nanotube is a carbon nanotube and the second structural entity is melamine sulfonate superplasticisers.

Item A1085. The composite material of any one of items A3-A863 or B2-B15 where the nanotube is a carbon nanotube and the second structural entity is metal ions.

Item A1086. The composite material of any one of items A3-A863 or B2-B15 where the nanotube is a carbon nanotube and the second structural entity is metal oxide.

Item A1087. The composite material of any one of items A3-A863 or B2-B15 where the nanotube is a carbon nanotube and the second structural entity is metallised ceramic.

Item A1088. The composite material of any one of items A3-A863 or B2-B15 where the nanotube is a carbon nanotube and the second structural entity is metalloids.

Item A1089. The composite material of any one of items A3-A863 or B2-B15 where the nanotube is a carbon nanotube and the second structural entity is metals.

Item A1090. The composite material of any one of items A3-A863 or B2-B15 where the nanotube is a carbon nanotube and the second structural entity is mica.

Item A1091. The composite material of any one of items A3-A863 or B2-B15 where the nanotube is a carbon nanotube and the second structural entity is mineral.

Item A1092. The composite material of any one of items A3-A863 or B2-B15 where the nanotube is a carbon nanotube and the second structural entity is mineral admixtures.

Item A1093. The composite material of any one of items A3-A863 or B2-B15 where the nanotube is a carbon nanotube and the second structural entity is molybdenum.

Item A1094. The composite material of any one of items A3-A863 or B2-B15 where the nanotube is a carbon nanotube and the second structural entity is montmorrilonite nanoclays.

Item A1095. The composite material of any one of items A3-A863 or B2-B15 where the nanotube is a carbon nanotube and the second structural entity is multi-layer boron nitride.

Item A1096. The composite material of any one of items A3-A863 or B2-B15 where the nanotube is a carbon nanotube and the second structural entity is multi-layer graphene.

Item A1097. The composite material of any one of items A3-A863 or B2-B15 where the nanotube is a carbon nanotube and the second structural entity is nanochain.

Item A1098. The composite material of any one of items A3-A863 or B2-B15 where the nanotube is a carbon nanotube and the second structural entity is nanocrystal.

Item A1099. The composite material of any one of items A3-A863 or B2-B15 where the nanotube is a carbon nanotube and the second structural entity is nanowire.

Item A1100. The composite material of any one of items A3-A863 or B2-B15 where the nanotube is a carbon nanotube and the second structural entity is naphthalene.

Item A1101. The composite material of any one of items A3-A863 or B2-B15 where the nanotube is a carbon nanotube and the second structural entity is Natural pozzolans (such as the volcanic ash used in Roman concrete).

Item A1102. The composite material of any one of items A3-A863 or B2-B15 where the nanotube is a carbon nanotube and the second structural entity is NH2-functionalized graphene.

Item A1103. The composite material of any one of items A3-A863 or B2-B15 where the nanotube is a carbon nanotube and the second structural entity is nickel.

Item A1104. The composite material of any one of items A3-A863 or B2-B15 where the nanotube is a carbon nanotube and the second structural entity is non-covalent crystal.

Item A1105. The composite material of any one of items A3-A863 or B2-B15 where the nanotube is a carbon nanotube and the second structural entity is nylon.

Item A1106. The composite material of any one of items A3-A863 or B2-B15 where the nanotube is a carbon nanotube and the second structural entity is OH-functionalized graphene.

Item A1107. The composite material of any one of items A3-A863 or B2-B15 where the nanotube is a carbon nanotube and the second structural entity is palladium.

Item A1108. The composite material of any one of items A3-A863 or B2-B15 where the nanotube is a carbon nanotube and the second structural entity is pencil lead.

Item A1109. The composite material of any one of items A3-A863 or B2-B15 where the nanotube is a carbon nanotube and the second structural entity is perfect boron nitride.

Item A1110. The composite material of any one of items A3-A863 or B2-B15 where the nanotube is a carbon nanotube and the second structural entity is perfect graphene.

Item A1111. The composite material of any one of items A3-A863 or B2-B15 where the nanotube is a carbon nanotube and the second structural entity is plasticizers.

Item A1112. The composite material of any one of items A3-A863 or B2-B15 where the nanotube is a carbon nanotube and the second structural entity is platinum.

Item A1113. The composite material of any one of items A3-A863 or B2-B15 where the nanotube is a carbon nanotube and the second structural entity is platinum group metals.

Item A1114. The composite material of any one of items A3-A863 or B2-B15 where the nanotube is a carbon nanotube and the second structural entity is post-transition metals.

Item A1115. The composite material of any one of items A3-A863 or B2-B15 where the nanotube is a carbon nanotube and the second structural entity is powdered activated carbon.

Item A1116. The composite material of any one of items A3-A863 or B2-B15 where the nanotube is a carbon nanotube and the second structural entity is pozzolans and other cementitious materials.

Item A1117. The composite material of any one of items A3-A863 or B2-B15 where the nanotube is a carbon nanotube and the second structural entity is prismane.

Item A1118. The composite material of any one of items A3-A863 or B2-B15 where the nanotube is a carbon nanotube and the second structural entity is pristine boron nitride.

Item A1119. The composite material of any one of items A3-A863 or B2-B15 where the nanotube is a carbon nanotube and the second structural entity is pristine graphene.

Item A1120. The composite material of any one of items A3-A863 or B2-B15 where the nanotube is a carbon nanotube and the second structural entity is pyrolytic graphite.

Item A1121. The composite material of any one of items A3-A863 or B2-B15 where the nanotube is a carbon nanotube and the second structural entity is quantum dots.

Item A1122. The composite material of any one of items A3-A863 or B2-B15 where the nanotube is a carbon nanotube and the second structural entity is rare earth elements.

Item A1123. The composite material of any one of items A3-A863 or B2-B15 where the nanotube is a carbon nanotube and the second structural entity is reduced boron nitride oxide.

Item A1124. The composite material of any one of items A3-A863 or B2-B15 where the nanotube is a carbon nanotube and the second structural entity is reduced graphene oxide.

Item A1125. The composite material of any one of items A3-A863 or B2-B15 where the nanotube is a carbon nanotube and the second structural entity is reduced graphyne.

Item A1126. The composite material of any one of items A3-A863 or B2-B15 where the nanotube is a carbon nanotube and the second structural entity is rubber.

Item A1127. The composite material of any one of items A3-A863 or B2-B15 where the nanotube is a carbon nanotube and the second structural entity is s-glass.

Item A1128. The composite material of any one of items A3-A863 or B2-B15 where the nanotube is a carbon nanotube and the second structural entity is sapphire.

Item A1129. The composite material of any one of items A3-A863 or B2-B15 where the nanotube is a carbon nanotube and the second structural entity is set accelerators.

Item A1130. The composite material of any one of items A3-A863 or B2-B15 where the nanotube is a carbon nanotube and the second structural entity is set retarders.

Item A1131. The composite material of any one of items A3-A863 or B2-B15 where the nanotube is a carbon nanotube and the second structural entity is shrinkage control admixtures.

Item A1132. The composite material of any one of items A3-A863 or B2-B15 where the nanotube is a carbon nanotube and the second structural entity is silica.

Item A1133. The composite material of any one of items A3-A863 or B2-B15 where the nanotube is a carbon nanotube and the second structural entity is silica fume.

Item A1134. The composite material of any one of items A3-A863 or B2-B15 where the nanotube is a carbon nanotube and the second structural entity is silica gel.

Item A1135. The composite material of any one of items A3-A863 or B2-B15 where the nanotube is a carbon nanotube and the second structural entity is silicon.

Item A1136. The composite material of any one of items A3-A863 or B2-B15 where the nanotube is a carbon nanotube and the second structural entity is silicon carbide.

Item A1137. The composite material of any one of items A3-A863 or B2-B15 where the nanotube is a carbon nanotube and the second structural entity is silicon dioxide.

Item A1138. The composite material of any one of items A3-A863 or B2-B15 where the nanotube is a carbon nanotube and the second structural entity is silicon nitride.

Item A1139. The composite material of any one of items A3-A863 or B2-B15 where the nanotube is a carbon nanotube and the second structural entity is silicon nitrides (bulk and thin film).

Item A1140. The composite material of any one of items A3-A863 or B2-B15 where the nanotube is a carbon nanotube and the second structural entity is silver.

Item A1141. The composite material of any one of items A3-A863 or B2-B15 where the nanotube is a carbon nanotube and the second structural entity is single-layer boron nitride.

Item A1142. The composite material of any one of items A3-A863 or B2-B15 where the nanotube is a carbon nanotube and the second structural entity is single-layer graphene.

Item A1143. The composite material of any one of items A3-A863 or B2-B15 where the nanotube is a carbon nanotube and the second structural entity is sol-gel.

Item A1144. The composite material of any one of items A3-A863 or B2-B15 where the nanotube is a carbon nanotube and the second structural entity is soot.

Item A1145. The composite material of any one of items A3-A863 or B2-B15 where the nanotube is a carbon nanotube and the second structural entity is steel.

Item A1146. The composite material of any one of items A3-A863 or B2-B15 where the nanotube is a carbon nanotube and the second structural entity is steel fibers.

Item A1147. The composite material of any one of items A3-A863 or B2-B15 where the nanotube is a carbon nanotube and the second structural entity is superplasticizer.

Item A1148. The composite material of any one of items A3-A863 or B2-B15 where the nanotube is a carbon nanotube and the second structural entity is superplasticizers.

Item A1149. The composite material of any one of items A3-A863 or B2-B15 where the nanotube is a carbon nanotube and the second structural entity is talc.

Item A1150. The composite material of any one of items A3-A863 or B2-B15 where the nanotube is a carbon nanotube and the second structural entity is tantalum.

Item A1151. The composite material of any one of items A3-A863 or B2-B15 where the nanotube is a carbon nanotube and the second structural entity is thiol-functionalized graphene.

Item A1152. The composite material of any one of items A3-A863 or B2-B15 where the nanotube is a carbon nanotube and the second structural entity is titanium.

Item A1153. The composite material of any one of items A3-A863 or B2-B15 where the nanotube is a carbon nanotube and the second structural entity is titanium oxide.

Item A1154. The composite material of any one of items A3-A863 or B2-B15 where the nanotube is a carbon nanotube and the second structural entity is tooth cementum.

Item A1155. The composite material of any one of items A3-A863 or B2-B15 where the nanotube is a carbon nanotube and the second structural entity is tooth dentine.

Item A1156. The composite material of any one of items A3-A863 or B2-B15 where the nanotube is a carbon nanotube and the second structural entity is tooth enamel.

Item A1157. The composite material of any one of items A3-A863 or B2-B15 where the nanotube is a carbon nanotube and the second structural entity is transition metals.

Item A1158. The composite material of any one of items A3-A863 or B2-B15 where the nanotube is a carbon nanotube and the second structural entity is triple-layer boron nitride.

Item A1159. The composite material of any one of items A3-A863 or B2-B15 where the nanotube is a carbon nanotube and the second structural entity is triple-layer graphene.

Item A1160. The composite material of any one of items A3-A863 or B2-B15 where the nanotube is a carbon nanotube and the second structural entity is tungsten.

Item A1161. The composite material of any one of items A3-A863 or B2-B15 where the nanotube is a carbon nanotube and the second structural entity is tungsten carbide.

Item A1162. The composite material of any one of items A3-A863 or B2-B15 where the nanotube is a carbon nanotube and the second structural entity is ultrahard fullerite.

Item A1163. The composite material of any one of items A3-A863 or B2-B15 where the nanotube is a carbon nanotube and the second structural entity is water reducers.

Item A1164. The composite material of any one of items A3-A863 or B2-B15 where the nanotube is a carbon nanotube and the second structural entity is wood.

Item A1165. The composite material of any one of items A3-A863 or B2-B15 where the nanotube is a carbon nanotube and the second structural entity is zinc oxide.

Item A1166. The composite material of any one of items A3-A863 or B2-B15 where the nanotube is a carbon nanotube and the second structural entity is zirconia.

Item A1167. The composite material of any one of items A3-A863 or B2-B15 where the nanotube is a single wall carbon nanotube and the second structural entity is a carbon fibre.

Item A1168. The composite material of any one of items A3-A863 or B2-B15 where the nanotube is a single wall carbon nanotube and the second structural entity is boron nitride.

Item A1169. The composite material of any one of items A3-A863 or B2-B15 where the nanotube is a single wall carbon nanotube and the second structural entity is a ceramic.

Item A1170. The composite material of any one of items A3-A863 or B2-B15 where the nanotube is a single wall carbon nanotube and the second structural entity is graphene.

Item A1171. The composite material of any one of items A3-A863 or B2-B15 where the nanotube is a single wall carbon nanotube and the second structural entity is a metal.

Item A1172. The composite material of any one of items A3-A863 or B2-B15 where the nanotube is a single wall carbon nanotube and the second structural entity is a nucleic acid.

Item A1173. The composite material of any one of items A3-A863 or B2-B15 where the nanotube is a single wall carbon nanotube and the second structural entity is a polypeptide.

Item A1174. The composite material of any one of items A3-A863 or B2-B15 where the nanotube is a single wall carbon nanotube and the second structural entity is a cathode.

Item A1175. The composite material of any one of items A3-A863 or B2-B15 where the nanotube is a single wall carbon nanotube and the second structural entity is a metalised dielectric.

Item A1176. The composite material of any one of items A3-A863 or B2-B15 where the nanotube is a single wall carbon nanotube and the second structural entity is a peptide.

Item A1177. The composite material of any one of items A3-A863 or B2-B15 where the nanotube is a single wall carbon nanotube and the second structural entity is a protein.

Item A1178. The composite material of any one of items A3-A863 or B2-B15 where the nanotube is a single wall carbon nanotube and the second structural entity is a semiconductor.

Item A1179. The composite material of any one of items A3-A863 or B2-B15 where the nanotube is a single wall carbon nanotube and the second structural entity is a sensor.

Item A1180. The composite material of any one of items A3-A863 or B2-B15 where the nanotube is a single wall carbon nanotube and the second structural entity is aluminium.

Item A1181. The composite material of any one of items A3-A863 or B2-B15 where the nanotube is a single wall carbon nanotube and the second structural entity is an anode.

Item A1182. The composite material of any one of items A3-A863 or B2-B15 where the nanotube is a single wall carbon nanotube and the second structural entity is an antibody.

Item A1183. The composite material of any one of items A3-A863 or B2-B15 where the nanotube is a single wall carbon nanotube and the second structural entity is electrode.

Item A1184. The composite material of any one of items A3-A863 or B2-B15 where the nanotube is a single wall carbon nanotube and the second structural entity is boron nitride.

Item A1185. The composite material of any one of items A3-A863 or B2-B15 where the nanotube is a single wall carbon nanotube and the second structural entity is buckyball.

Item A1186. The composite material of any one of items A3-A863 or B2-B15 where the nanotube is a single wall carbon nanotube and the second structural entity is carbon nanofibres.

Item A1187. The composite material of any one of items A3-A863 or B2-B15 where the nanotube is a single wall carbon nanotube and the second structural entity is concrete.

Item A1188. The composite material of any one of items A3-A863 or B2-B15 where the nanotube is a single wall carbon nanotube and the second structural entity is glass fibre.

Item A1189. The composite material of any one of items A3-A863 or B2-B15 where the nanotube is a single wall carbon nanotube and the second structural entity is graphene oxide.

Item A1190. The composite material of any one of items A3-A863 or B2-B15 where the nanotube is a single wall carbon nanotube and the second structural entity is graphyne.

Item A1191. The composite material of any one of items A3-A863 or B2-B15 where the nanotube is a single wall carbon nanotube and the second structural entity is stainless steel.

Item A1192. The composite material of any one of items A3-A863 or B2-B15 where the nanotube is a single wall carbon nanotube and the second structural entity is a cathode.

Item A1193. The composite material of any one of items A3-A863 or B2-B15 where the nanotube is a single wall carbon nanotube and the second structural entity is a carbon polymer.

Item A1194. The composite material of any one of items A3-A863 or B2-B15 where the nanotube is a single wall carbon nanotube and the second structural entity is (Ag) silver.

Item A1195. The composite material of any one of items A3-A863 or B2-B15 where the nanotube is a single wall carbon nanotube and the second structural entity is (Al) aluminium.

Item A1196. The composite material of any one of items A3-A863 or B2-B15 where the nanotube is a single wall carbon nanotube and the second structural entity is (Au) gold.

Item A1197. The composite material of any one of items A3-A863 or B2-B15 where the nanotube is a single wall carbon nanotube and the second structural entity is (Cr) chromium.

Item A1198. The composite material of any one of items A3-A863 or B2-B15 where the nanotube is a single wall carbon nanotube and the second structural entity is (Cu) copper.

Item A1199. The composite material of any one of items A3-A863 or B2-B15 where the nanotube is a single wall carbon nanotube and the second structural entity is (Fe) steel and stainless steel.

Item A1200. The composite material of any one of items A3-A863 or B2-B15 where the nanotube is a single wall carbon nanotube and the second structural entity is (Mn) manganese.

Item A1201. The composite material of any one of items A3-A863 or B2-B15 where the nanotube is a single wall carbon nanotube and the second structural entity is (Mo) molybdenum.

Item A1202. The composite material of any one of items A3-A863 or B2-B15 where the nanotube is a single wall carbon nanotube and the second structural entity is (Ni) nickel.

Item $Al_2O_3$. The composite material of any one of items A3-A863 or B2-B15 where the nanotube is a single wall carbon nanotube and the second structural entity is (Pa) palladium.

Item A1204. The composite material of any one of items A3-A863 or B2-B15 where the nanotube is a single wall carbon nanotube and the second structural entity is (Pt) platinum.

Item A1205. The composite material of any one of items A3-A863 or B2-B15 where the nanotube is a single wall carbon nanotube and the second structural entity is (Ta) tantalum.

Item A1206. The composite material of any one of items A3-A863 or B2-B15 where the nanotube is a single wall carbon nanotube and the second structural entity is (Ti) titanium.

Item A1207. The composite material of any one of items A3-A863 or B2-B15 where the nanotube is a single wall carbon nanotube and the second structural entity is (Wo) Tungsten.

Item A1208. The composite material of any one of items A3-A863 or B2-B15 where the nanotube is a single wall carbon nanotube and the second structural entity is a battery.

Item A1209. The composite material of any one of items A3-A863 or B2-B15 where the nanotube is a single wall carbon nanotube and the second structural entity is a borosilicate.

Item A1210. The composite material of any one of items A3-A863 or B2-B15 where the nanotube is a single wall carbon nanotube and the second structural entity is a buckyball.

Item A1211. The composite material of any one of items A3-A863 or B2-B15 where the nanotube is a single wall carbon nanotube and the second structural entity is a buckytube.

Item A1212. The composite material of any one of items A3-A863 or B2-B15 where the nanotube is a single wall carbon nanotube and the second structural entity is a capacitator.

Item A1213. The composite material of any one of items A3-A863 or B2-B15 where the nanotube is a single wall carbon nanotube and the second structural entity is a carbon dome.

Item A1214. The composite material of any one of items A3-A863 or B2-B15 where the nanotube is a single wall carbon nanotube and the second structural entity is a carbon megatube.

Item A1215. The composite material of any one of items A3-A863 or B2-B15 where the nanotube is a single wall carbon nanotube and the second structural entity is a carbon nanofibre.

Item A1216. The composite material of any one of items A3-A863 or B2-B15 where the nanotube is a single wall carbon nanotube and the second structural entity is a carbon nanofoam.

Item A1217. The composite material of any one of items A3-A863 or B2-B15 where the nanotube is a single wall carbon nanotube and the second structural entity is a carbon nanothread.

Item A1218. The composite material of any one of items A3-A863 or B2-B15 where the nanotube is a single wall carbon nanotube and the second structural entity is a catalyst.

Item A1219. The composite material of any one of items A3-A863 or B2-B15 where the nanotube is a single wall carbon nanotube and the second structural entity is a ceramic material.

Item A1220. The composite material of any one of items A3-A863 or B2-B15 where the nanotube is a single wall carbon nanotube and the second structural entity is a composite material.

Item A1221. The composite material of any one of items A3-A863 or B2-B15 where the nanotube is a single wall carbon nanotube and the second structural entity is a conductor.

Item A1222. The composite material of any one of items A3-A863 or B2-B15 where the nanotube is a single wall carbon nanotube and the second structural entity is a covalent crystal.

Item A1223. The composite material of any one of items A3-A863 or B2-B15 where the nanotube is a single wall carbon nanotube and the second structural entity is a crystal.

Item A1224. The composite material of any one of items A3-A863 or B2-B15 where the nanotube is a single wall carbon nanotube and the second structural entity is a crystalline material.

Item A1225. The composite material of any one of items A3-A863 or B2-B15 where the nanotube is a single wall carbon nanotube and the second structural entity is a defect-free graphene sheet.

Item A1226. The composite material of any one of items A3-A863 or B2-B15 where the nanotube is a single wall carbon nanotube and the second structural entity is a dielectric material.

Item A1227. The composite material of any one of items A3-A863 or B2-B15 where the nanotube is a single wall carbon nanotube and the second structural entity is a diode.

Item A1228. The composite material of any one of items A3-A863 or B2-B15 where the nanotube is a single wall carbon nanotube and the second structural entity is a dodecahedrane.

Item A1229. The composite material of any one of items A3-A863 or B2-B15 where the nanotube is a single wall carbon nanotube and the second structural entity is a doped glass.

Item A1230. The composite material of any one of items A3-A863 or B2-B15 where the nanotube is a single wall carbon nanotube and the second structural entity is a fibre.

Item A1231. The composite material of any one of items A3-A863 or B2-B15 where the nanotube is a single wall carbon nanotube and the second structural entity is a fullerite.

Item A1232. The composite material of any one of items A3-A863 or B2-B15 where the nanotube is a single wall carbon nanotube and the second structural entity is a fused silica.

Item A1233. The composite material of any one of items A3-A863 or B2-B15 where the nanotube is a single wall carbon nanotube and the second structural entity is a glass fibre.

Item A1234. The composite material of any one of items A3-A863 or B2-B15 where the nanotube is a single wall carbon nanotube and the second structural entity is a glue.

Item A1235. The composite material of any one of items A3-A863 or B2-B15 where the nanotube is a single wall carbon nanotube and the second structural entity is a green ceramic.

Item A1236. The composite material of any one of items A3-A863 or B2-B15 where the nanotube is a single wall carbon nanotube and the second structural entity is a lanthanides.

Item A1237. The composite material of any one of items A3-A863 or B2-B15 where the nanotube is a single wall carbon nanotube and the second structural entity is a machinable ceramic.

Item A1238. The composite material of any one of items A3-A863 or B2-B15 where the nanotube is a single wall carbon nanotube and the second structural entity is a metal alloy.

Item A1239. The composite material of any one of items A3-A863 or B2-B15 where the nanotube is a single wall carbon nanotube and the second structural entity is a metallised ceramic.

Item A1240. The composite material of any one of items A3-A863 or B2-B15 where the nanotube is a single wall carbon nanotube and the second structural entity is a metalloid.

Item A1241. The composite material of any one of items A3-A863 or B2-B15 where the nanotube is a single wall carbon nanotube and the second structural entity is a mineral.

Item A1242. The composite material of any one of items A3-A863 or B2-B15 where the nanotube is a single wall carbon nanotube and the second structural entity is a non-covalent crystal.

Item A1243. The composite material of any one of items A3-A863 or B2-B15 where the nanotube is a single wall carbon nanotube and the second structural entity is a piezoelectric material.

Item A1244. The composite material of any one of items A3-A863 or B2-B15 where the nanotube is a single wall carbon nanotube and the second structural entity is a platinum group metal.

Item A1245. The composite material of any one of items A3-A863 or B2-B15 where the nanotube is a single wall carbon nanotube and the second structural entity is a post-transition metal.

Item A1246. The composite material of any one of items A3-A863 or B2-B15 where the nanotube is a single wall carbon nanotube and the second structural entity is a rare earth element.

Item A1247. The composite material of any one of items A3-A863 or B2-B15 where the nanotube is a single wall carbon nanotube and the second structural entity is a sapphire.

Item A1248. The composite material of any one of items A3-A863 or B2-B15 where the nanotube is a single wall carbon nanotube and the second structural entity is a silicon nitride.

Item A1249. The composite material of any one of items A3-A863 or B2-B15 where the nanotube is a single wall carbon nanotube and the second structural entity is a single crystal fiber.

Item A1250. The composite material of any one of items A3-A863 or B2-B15 where the nanotube is a single wall carbon nanotube and the second structural entity is a sol-gel.

Item A1251. The composite material of any one of items A3-A863 or B2-B15 where the nanotube is a single wall carbon nanotube and the second structural entity is a synthetic diamond.

Item A1252. The composite material of any one of items A3-A863 or B2-B15 where the nanotube is a single wall carbon nanotube and the second structural entity is a transition metal.

Item A1253. The composite material of any one of items A3-A863 or B2-B15 where the nanotube is a single wall carbon nanotube and the second structural entity is a tungsten carbide.

Item A1254. The composite material of any one of items A3-A863 or B2-B15 where the nanotube is a single wall carbon nanotube and the second structural entity is actinides.

Item A1255. The composite material of any one of items A3-A863 or B2-B15 where the nanotube is a single wall carbon nanotube and the second structural entity is activated carbon.

Item A1256. The composite material of any one of items A3-A863 or B2-B15 where the nanotube is a single wall carbon nanotube and the second structural entity is aggregated diamonds.

Item A1257. The composite material of any one of items A3-A863 or B2-B15 where the nanotube is a single wall carbon nanotube and the second structural entity is air entrainers.

Item A1258. The composite material of any one of items A3-A863 or B2-B15 where the nanotube is a single wall carbon nanotube and the second structural entity is alkali-silica reactivity inhibitors.

Item A1259. The composite material of any one of items A3-A863 or B2-B15 where the nanotube is a single wall carbon nanotube and the second structural entity is alloys.

Item A1260. The composite material of any one of items A3-A863 or B2-B15 where the nanotube is a single wall carbon nanotube and the second structural entity is alumina.

Item A1261. The composite material of any one of items A3-A863 or B2-B15 where the nanotube is a single wall carbon nanotube and the second structural entity is alumina trihydrate.

Item A1262. The composite material of any one of items A3-A863 or B2-B15 where the nanotube is a single wall carbon nanotube and the second structural entity is aluminum boride.

Item A1263. The composite material of any one of items A3-A863 or B2-B15 where the nanotube is a single wall carbon nanotube and the second structural entity is aluminum fibers.

Item A1264. The composite material of any one of items A3-A863 or B2-B15 where the nanotube is a single wall carbon nanotube and the second structural entity is aluminum oxide.

Item A1265. The composite material of any one of items A3-A863 or B2-B15 where the nanotube is a single wall carbon nanotube and the second structural entity is aluminum trihydroxide.

Item A1266. The composite material of any one of items A3-A863 or B2-B15 where the nanotube is a single wall carbon nanotube and the second structural entity is amalgams.

Item A1267. The composite material of any one of items A3-A863 or B2-B15 where the nanotube is a single wall carbon nanotube and the second structural entity is amorphous carbon.

Item A1268. The composite material of any one of items A3-A863 or B2-B15 where the nanotube is a single wall carbon nanotube and the second structural entity is actinides.

Item A1269. The composite material of any one of items A3-A863 or B2-B15 where the nanotube is a single wall carbon nanotube and the second structural entity is an amalgam.

Item A1270. The composite material of any one of items A3-A863 or B2-B15 where the nanotube is a single wall carbon nanotube and the second structural entity is an endohedral fullerene.

Item A1271. The composite material of any one of items A3-A863 or B2-B15 where the nanotube is a single wall carbon nanotube and the second structural entity is an insulator.

Item A1272. The composite material of any one of items A3-A863 or B2-B15 where the nanotube is a single wall carbon nanotube and the second structural entity is an intermetallic.

Item A1273. The composite material of any one of items A3-A863 or B2-B15 where the nanotube is a single wall carbon nanotube and the second structural entity is an ionic crystal.

Item A1274. The composite material of any one of items A3-A863 or B2-B15 where the nanotube is a single wall carbon nanotube and the second structural entity is an organic material.

Item A1275. The composite material of any one of items A3-A863 or B2-B15 where the nanotube is a single wall carbon nanotube and the second structural entity is anthracite.

Item A1276. The composite material of any one of items A3-A863 or B2-B15 where the nanotube is a single wall carbon nanotube and the second structural entity is aramid.

Item A1277. The composite material of any one of items A3-A863 or B2-B15 where the nanotube is a single wall carbon nanotube and the second structural entity is asbestos.

Item A1278. The composite material of any one of items A3-A863 or B2-B15 where the nanotube is a single wall carbon nanotube and the second structural entity is barium.

Item A1279. The composite material of any one of items A3-A863 or B2-B15 where the nanotube is a single wall carbon nanotube and the second structural entity is bone.

Item A1280. The composite material of any one of items A3-A863 or B2-B15 where the nanotube is a single wall carbon nanotube and the second structural entity is boron.

Item A1281. The composite material of any one of items A3-A863 or B2-B15 where the nanotube is a single wall carbon nanotube and the second structural entity is boron nitride nanoscroll.

Item A1282. The composite material of any one of items A3-A863 or B2-B15 where the nanotube is a single wall carbon nanotube and the second structural entity is boron nitride oxide.

Item A1283. The composite material of any one of items A3-A863 or B2-B15 where the nanotube is a single wall carbon nanotube and the second structural entity is brass.

Item A1284. The composite material of any one of items A3-A863 or B2-B15 where the nanotube is a single wall carbon nanotube and the second structural entity is brass fibers.

Item A1285. The composite material of any one of items A3-A863 or B2-B15 where the nanotube is a single wall carbon nanotube and the second structural entity is buckminsterfullerene.

Item A1286. The composite material of any one of items A3-A863 or B2-B15 where the nanotube is a single wall carbon nanotube and the second structural entity is bucky paper.

Item A1287. The composite material of any one of items A3-A863 or B2-B15 where the nanotube is a single wall carbon nanotube and the second structural entity is buckyball clusters.

Item A1288. The composite material of any one of items A3-A863 or B2-B15 where the nanotube is a single wall carbon nanotube and the second structural entity is buckypaper.

Item A1289. The composite material of any one of items A3-A863 or B2-B15 where the nanotube is a single wall carbon nanotube and the second structural entity is buckytube.

Item A1290. The composite material of any one of items A3-A863 or B2-B15 where the nanotube is a single wall carbon nanotube and the second structural entity is calcium carbonite.

Item A1291. The composite material of any one of items A3-A863 or B2-B15 where the nanotube is a single wall carbon nanotube and the second structural entity is calcium metasilicate.

Item A1292. The composite material of any one of items A3-A863 or B2-B15 where the nanotube is a single wall carbon nanotube and the second structural entity is calcium sulfate.

Item A1293. The composite material of any one of items A3-A863 or B2-B15 where the nanotube is a single wall carbon nanotube and the second structural entity is calcium sulphate.

Item A1294. The composite material of any one of items A3-A863 or B2-B15 where the nanotube is a single wall carbon nanotube and the second structural entity is carbon black.

Item A1295. The composite material of any one of items A3-A863 or B2-B15 where the nanotube is a single wall carbon nanotube and the second structural entity is carbon fiber.

Item A1296. The composite material of any one of items A3-A863 or B2-B15 where the nanotube is a single wall carbon nanotube and the second structural entity is carbon fibers.

Item A1297. The composite material of any one of items A3-A863 or B2-B15 where the nanotube is a single wall carbon nanotube and the second structural entity is carbon megatubes.

Item A1298. The composite material of any one of items A3-A863 or B2-B15 where the nanotube is a single wall carbon nanotube and the second structural entity is carbon nano-onions.

Item A1299. The composite material of any one of items A3-A863 or B2-B15 where the nanotube is a single wall carbon nanotube and the second structural entity is carbon nanobuds.

Item A1300. The composite material of any one of items A3-A863 or B2-B15 where the nanotube is a single wall carbon nanotube and the second structural entity is carbon nanofiber.

Item A1301. The composite material of any one of items A3-A863 or B2-B15 where the nanotube is a single wall carbon nanotube and the second structural entity is carbon nanofoam.

Item A1302. The composite material of any one of items A3-A863 or B2-B15 where the nanotube is a single wall carbon nanotube and the second structural entity is carbon nanothread.

Item A1303. The composite material of any one of items A3-A863 or B2-B15 where the nanotube is a single wall carbon nanotube and the second structural entity is carbon/diamond nanothread.

Item A1304. The composite material of any one of items A3-A863 or B2-B15 where the nanotube is a single wall carbon nanotube and the second structural entity is cellulose fibers.

Item A1305. The composite material of any one of items A3-A863 or B2-B15 where the nanotube is a single wall carbon nanotube and the second structural entity is cellulose nanofibers (e.g. curran).

Item A1306. The composite material of any one of items A3-A863 or B2-B15 where the nanotube is a single wall carbon nanotube and the second structural entity is cellulose nanowhiskers.

Item A1307. The composite material of any one of items A3-A863 or B2-B15 where the nanotube is a single wall carbon nanotube and the second structural entity is chemical admixtures.

Item A1308. The composite material of any one of items A3-A863 or B2-B15 where the nanotube is a single wall carbon nanotube and the second structural entity is chlorographene.

Item A1309. The composite material of any one of items A3-A863 or B2-B15 where the nanotube is a single wall carbon nanotube and the second structural entity is chromium.

Item A1310. The composite material of any one of items A3-A863 or B2-B15 where the nanotube is a single wall carbon nanotube and the second structural entity is clay.

Item A1311. The composite material of any one of items A3-A863 or B2-B15 where the nanotube is a single wall carbon nanotube and the second structural entity is coal.

Item A1312. The composite material of any one of items A3-A863 or B2-B15 where the nanotube is a single wall carbon nanotube and the second structural entity is coated boron nitride.

Item A1313. The composite material of any one of items A3-A863 or B2-B15 where the nanotube is a single wall carbon nanotube and the second structural entity is coated graphene.

Item A1314. The composite material of any one of items A3-A863 or B2-B15 where the nanotube is a single wall carbon nanotube and the second structural entity is coloring admixtures.

Item A1315. The composite material of any one of items A3-A863 or B2-B15 where the nanotube is a single wall carbon nanotube and the second structural entity is composite materials.

Item A1316. The composite material of any one of items A3-A863 or B2-B15 where the nanotube is a single wall carbon nanotube and the second structural entity is concrete admixtures.

Item A1317. The composite material of any one of items A3-A863 or B2-B15 where the nanotube is a single wall carbon nanotube and the second structural entity is COOH-functionalized graphene.

Item A1318. The composite material of any one of items A3-A863 or B2-B15 where the nanotube is a single wall carbon nanotube and the second structural entity is copper.

Item A1319. The composite material of any one of items A3-A863 or B2-B15 where the nanotube is a single wall carbon nanotube and the second structural entity is corrosion inhibitors.

Item A1320. The composite material of any one of items A3-A863 or B2-B15 where the nanotube is a single wall carbon nanotube and the second structural entity is covalent crystals.

Item A1321. The composite material of any one of items A3-A863 or B2-B15 where the nanotube is a single wall carbon nanotube and the second structural entity is crystal.

Item A1322. The composite material of any one of items A3-A863 or B2-B15 where the nanotube is a single wall carbon nanotube and the second structural entity is crystalline materials.

Item A1323. The composite material of any one of items A3-A863 or B2-B15 where the nanotube is a single wall carbon nanotube and the second structural entity is diamond.

Item A1324. The composite material of any one of items A3-A863 or B2-B15 where the nanotube is a single wall carbon nanotube and the second structural entity is diamond-like carbon.

Item A1325. The composite material of any one of items A3-A863 or B2-B15 where the nanotube is a single wall carbon nanotube and the second structural entity is dispersants.

Item A1326. The composite material of any one of items A3-A863 or B2-B15 where the nanotube is a single wall carbon nanotube and the second structural entity is dodecahedrane.

Item A1327. The composite material of any one of items A3-A863 or B2-B15 where the nanotube is a single wall carbon nanotube and the second structural entity is double-layer boron nitride.

Item A1328. The composite material of any one of items A3-A863 or B2-B15 where the nanotube is a single wall carbon nanotube and the second structural entity is double-layer graphene.

Item A1329. The composite material of any one of items A3-A863 or B2-B15 where the nanotube is a single wall carbon nanotube and the second structural entity is e-glass.

Item A1330. The composite material of any one of items A3-A863 or B2-B15 where the nanotube is a single wall carbon nanotube and the second structural entity is elastomers.

Item A1331. The composite material of any one of items A3-A863 or B2-B15 where the nanotube is a single wall carbon nanotube and the second structural entity is endohedral fullerenes.

Item A1332. The composite material of any one of items A3-A863 or B2-B15 where the nanotube is a single wall carbon nanotube and the second structural entity is exfoliated graphite.

Item A1333. The composite material of any one of items A3-A863 or B2-B15 where the nanotube is a single wall carbon nanotube and the second structural entity is exfoliated silicate.

Item A1334. The composite material of any one of items A3-A863 or B2-B15 where the nanotube is a single wall carbon nanotube and the second structural entity is extruded activated carbon.

Item A1335. The composite material of any one of items A3-A863 or B2-B15 where the nanotube is a single wall carbon nanotube and the second structural entity is fibres.

Item A1336. The composite material of any one of items A3-A863 or B2-B15 where the nanotube is a single wall carbon nanotube and the second structural entity is flourinated boron nitride.

Item A1337. The composite material of any one of items A3-A863 or B2-B15 where the nanotube is a single wall carbon nanotube and the second structural entity is flourinated graphene.

Item A1338. The composite material of any one of items A3-A863 or B2-B15 where the nanotube is a single wall carbon nanotube and the second structural entity is fluorographene.

Item A1339. The composite material of any one of items A3-A863 or B2-B15 where the nanotube is a single wall carbon nanotube and the second structural entity is fly ash.

Item A1340. The composite material of any one of items A3-A863 or B2-B15 where the nanotube is a single wall carbon nanotube and the second structural entity is fullerene rings.

Item A1341. The composite material of any one of items A3-A863 or B2-B15 where the nanotube is a single wall carbon nanotube and the second structural entity is fullerenes.

Item A1342. The composite material of any one of items A3-A863 or B2-B15 where the nanotube is a single wall carbon nanotube and the second structural entity is fullerite.

Item A1343. The composite material of any one of items A3-A863 or B2-B15 where the nanotube is a single wall carbon nanotube and the second structural entity is functionalized boron nitride.

Item A1344. The composite material of any one of items A3-A863 or B2-B15 where the nanotube is a single wall carbon nanotube and the second structural entity is functionalized graphene.

Item A1345. The composite material of any one of items A3-A863 or B2-B15 where the nanotube is a single wall carbon nanotube and the second structural entity is fused silica.

Item A1346. The composite material of any one of items A3-A863 or B2-B15 where the nanotube is a single wall carbon nanotube and the second structural entity is gallium arsenide.

Item A1347. The composite material of any one of items A3-A863 or B2-B15 where the nanotube is a single wall carbon nanotube and the second structural entity is gallium nitride.

Item A1348. The composite material of any one of items A3-A863 or B2-B15 where the nanotube is a single wall carbon nanotube and the second structural entity is gedodesic carbon domes.

Item A1349. The composite material of any one of items A3-A863 or B2-B15 where the nanotube is a single wall carbon nanotube and the second structural entity is germanium.

Item A1350. The composite material of any one of items A3-A863 or B2-B15 where the nanotube is a single wall carbon nanotube and the second structural entity is glass.

Item A1351. The composite material of any one of items A3-A863 or B2-B15 where the nanotube is a single wall carbon nanotube and the second structural entity is glass microsphere.

Item A1352. The composite material of any one of items A3-A863 or B2-B15 where the nanotube is a single wall carbon nanotube and the second structural entity is glass ribbons.

Item A1353. The composite material of any one of items A3-A863 or B2-B15 where the nanotube is a single wall carbon nanotube and the second structural entity is glass spheres.

Item A1354. The composite material of any one of items A3-A863 or B2-B15 where the nanotube is a single wall carbon nanotube and the second structural entity is glasses.

Item A1355. The composite material of any one of items A3-A863 or B2-B15 where the nanotube is a single wall carbon nanotube and the second structural entity is glassy carbon.

Item A1356. The composite material of any one of items A3-A863 or B2-B15 where the nanotube is a single wall carbon nanotube and the second structural entity is glue.

Item A1357. The composite material of any one of items A3-A863 or B2-B15 where the nanotube is a single wall carbon nanotube and the second structural entity is gold.

Item A1358. The composite material of any one of items A3-A863 or B2-B15 where the nanotube is a single wall carbon nanotube and the second structural entity is gold particles.

Item A1359. The composite material of any one of items A3-A863 or B2-B15 where the nanotube is a single wall carbon nanotube and the second structural entity is granular activated carbon.

Item A1360. The composite material of any one of items A3-A863 or B2-B15 where the nanotube is a single wall carbon nanotube and the second structural entity is graphane.

Item A1361. The composite material of any one of items A3-A863 or B2-B15 where the nanotube is a single wall carbon nanotube and the second structural entity is graphdiyne.

Item A1362. The composite material of any one of items A3-A863 or B2-B15 where the nanotube is a single wall carbon nanotube and the second structural entity is graphene.

Item A1363. The composite material of any one of items A3-A863 or B2-B15 where the nanotube is a single wall carbon nanotube and the second structural entity is graphite.

Item A1364. The composite material of any one of items A3-A863 or B2-B15 where the nanotube is a single wall carbon nanotube and the second structural entity is graphone.

Item A1365. The composite material of any one of items A3-A863 or B2-B15 where the nanotube is a single wall carbon nanotube and the second structural entity is hardened steel.

Item A1366. The composite material of any one of items A3-A863 or B2-B15 where the nanotube is a single wall carbon nanotube and the second structural entity is high range water reducers.

Item A1367. The composite material of any one of items A3-A863 or B2-B15 where the nanotube is a single wall carbon nanotube and the second structural entity is hydrous magnesium silicate.

Item A1368. The composite material of any one of items A3-A863 or B2-B15 where the nanotube is a single wall carbon nanotube and the second structural entity is hyperdiamond.

Item A1369. The composite material of any one of items A3-A863 or B2-B15 where the nanotube is a single wall carbon nanotube and the second structural entity is hyperdiamonds.

Item A1370. The composite material of any one of items A3-A863 or B2-B15 where the nanotube is a single wall carbon nanotube and the second structural entity is imperfect boron nitride.

Item A1371. The composite material of any one of items A3-A863 or B2-B15 where the nanotube is a single wall carbon nanotube and the second structural entity is imperfect graphene.

Item A1372. The composite material of any one of items A3-A863 or B2-B15 where the nanotube is a single wall carbon nanotube and the second structural entity is intermetallics.

Item A1373. The composite material of any one of items A3-A863 or B2-B15 where the nanotube is a single wall carbon nanotube and the second structural entity is ionic crystals.

Item A1374. The composite material of any one of items A3-A863 or B2-B15 where the nanotube is a single wall carbon nanotube and the second structural entity is iron.

Item A1375. The composite material of any one of items A3-A863 or B2-B15 where the nanotube is a single wall carbon nanotube and the second structural entity is iron oxides.

Item A1376. The composite material of any one of items A3-A863 or B2-B15 where the nanotube is a single wall carbon nanotube and the second structural entity is kevlar.

Item A1377. The composite material of any one of items A3-A863 or B2-B15 where the nanotube is a single wall carbon nanotube and the second structural entity is lanthanides.

Item A1378. The composite material of any one of items A3-A863 or B2-B15 where the nanotube is a single wall carbon nanotube and the second structural entity is lead zirconium titanate.

Item A1379. The composite material of any one of items A3-A863 or B2-B15 where the nanotube is a single wall carbon nanotube and the second structural entity is lignin.

Item A1380. The composite material of any one of items A3-A863 or B2-B15 where the nanotube is a single wall carbon nanotube and the second structural entity is lignite.

Item A1381. The composite material of any one of items A3-A863 or B2-B15 where the nanotube is a single wall carbon nanotube and the second structural entity is lithium niobate.

Item A1382. The composite material of any one of items A3-A863 or B2-B15 where the nanotube is a single wall carbon nanotube and the second structural entity is lithium niobates.

Item A1383. The composite material of any one of items A3-A863 or B2-B15 where the nanotube is a single wall carbon nanotube and the second structural entity is lonsdaleite.

Item A1384. The composite material of any one of items A3-A863 or B2-B15 where the nanotube is a single wall carbon nanotube and the second structural entity is magnesium dihydroxide.

Item A1385. The composite material of any one of items A3-A863 or B2-B15 where the nanotube is a single wall carbon nanotube and the second structural entity is magnesium oxide.

Item A1386. The composite material of any one of items A3-A863 or B2-B15 where the nanotube is a single wall carbon nanotube and the second structural entity is manganese.

Item A1387. The composite material of any one of items A3-A863 or B2-B15 where the nanotube is a single wall carbon nanotube and the second structural entity is melamine sulfonate superplasticisers.

Item A1388. The composite material of any one of items A3-A863 or B2-B15 where the nanotube is a single wall carbon nanotube and the second structural entity is metal ions.

Item A1389. The composite material of any one of items A3-A863 or B2-B15 where the nanotube is a single wall carbon nanotube and the second structural entity is metal oxide.

Item A1390. The composite material of any one of items A3-A863 or B2-B15 where the nanotube is a single wall carbon nanotube and the second structural entity is metallised ceramic.

Item A1391. The composite material of any one of items A3-A863 or B2-B15 where the nanotube is a single wall carbon nanotube and the second structural entity is metalloids.

Item A1392. The composite material of any one of items A3-A863 or B2-B15 where the nanotube is a single wall carbon nanotube and the second structural entity is metals.

Item A1393. The composite material of any one of items A3-A863 or B2-B15 where the nanotube is a single wall carbon nanotube and the second structural entity is mica.

Item A1394. The composite material of any one of items A3-A863 or B2-B15 where the nanotube is a single wall carbon nanotube and the second structural entity is mineral.

Item A1395. The composite material of any one of items A3-A863 or B2-B15 where the nanotube is a single wall carbon nanotube and the second structural entity is mineral admixtures.

Item A1396. The composite material of any one of items A3-A863 or B2-B15 where the nanotube is a single wall carbon nanotube and the second structural entity is molybdenum.

Item A1397. The composite material of any one of items A3-A863 or B2-B15 where the nanotube is a single wall carbon nanotube and the second structural entity is montmorrilonite nanoclays.

Item A1398. The composite material of any one of items A3-A863 or B2-B15 where the nanotube is a single wall carbon nanotube and the second structural entity is multilayer boron nitride.

Item A1399. The composite material of any one of items A3-A863 or B2-B15 where the nanotube is a single wall carbon nanotube and the second structural entity is multilayer graphene.

Item A1400. The composite material of any one of items A3-A863 or B2-B15 where the nanotube is a single wall carbon nanotube and the second structural entity is nanochain.

Item A1401. The composite material of any one of items A3-A863 or B2-B15 where the nanotube is a single wall carbon nanotube and the second structural entity is nanocrystal.

Item A1402. The composite material of any one of items A3-A863 or B2-B15 where the nanotube is a single wall carbon nanotube and the second structural entity is nanowire.

Item A1403. The composite material of any one of items A3-A863 or B2-B15 where the nanotube is a single wall carbon nanotube and the second structural entity is naphthalene.

Item A1404. The composite material of any one of items A3-A863 or B2-B15 where the nanotube is a single wall carbon nanotube and the second structural entity is Natural pozzolans (such as the volcanic ash used in Roman concrete).

Item A1405. The composite material of any one of items A3-A863 or B2-B15 where the nanotube is a single wall carbon nanotube and the second structural entity is NH2-functionalized graphene.

Item A1406. The composite material of any one of items A3-A863 or B2-B15 where the nanotube is a single wall carbon nanotube and the second structural entity is nickel.

Item A1407. The composite material of any one of items A3-A863 or B2-B15 where the nanotube is a single wall carbon nanotube and the second structural entity is non-covalent crystal.

Item A1408. The composite material of any one of items A3-A863 or B2-B15 where the nanotube is a single wall carbon nanotube and the second structural entity is nylon.

Item A1409. The composite material of any one of items A3-A863 or B2-B15 where the nanotube is a single wall carbon nanotube and the second structural entity is OH-functionalized graphene.

Item A1410. The composite material of any one of items A3-A863 or B2-B15 where the nanotube is a single wall carbon nanotube and the second structural entity is palladium.

Item A1411. The composite material of any one of items A3-A863 or B2-B15 where the nanotube is a single wall carbon nanotube and the second structural entity is pencil lead.

Item A1412. The composite material of any one of items A3-A863 or B2-B15 where the nanotube is a single wall carbon nanotube and the second structural entity is perfect boron nitride.

Item A1413. The composite material of any one of items A3-A863 or B2-B15 where the nanotube is a single wall carbon nanotube and the second structural entity is perfect graphene.

Item A1414. The composite material of any one of items A3-A863 or B2-B15 where the nanotube is a single wall carbon nanotube and the second structural entity is plasticizers.

Item A1415. The composite material of any one of items A3-A863 or B2-B15 where the nanotube is a single wall carbon nanotube and the second structural entity is platinum.

Item A1416. The composite material of any one of items A3-A863 or B2-B15 where the nanotube is a single wall carbon nanotube and the second structural entity is platinum group metals.

Item A1417. The composite material of any one of items A3-A863 or B2-B15 where the nanotube is a single wall carbon nanotube and the second structural entity is post-transition metals.

Item A1418. The composite material of any one of items A3-A863 or B2-B15 where the nanotube is a single wall carbon nanotube and the second structural entity is powdered activated carbon.

Item A1419. The composite material of any one of items A3-A863 or B2-B15 where the nanotube is a single wall carbon nanotube and the second structural entity is pozzolans and other cementitious materials.

Item A1420. The composite material of any one of items A3-A863 or B2-B15 where the nanotube is a single wall carbon nanotube and the second structural entity is prismane.

Item A1421. The composite material of any one of items A3-A863 or B2-B15 where the nanotube is a single wall carbon nanotube and the second structural entity is pristine boron nitride.

Item A1422. The composite material of any one of items A3-A863 or B2-B15 where the nanotube is a single wall carbon nanotube and the second structural entity is pristine graphene.

Item A1423. The composite material of any one of items A3-A863 or B2-B15 where the nanotube is a single wall carbon nanotube and the second structural entity is pyrolytic graphite.

Item A1424. The composite material of any one of items A3-A863 or B2-B15 where the nanotube is a single wall carbon nanotube and the second structural entity is quantum dots.

Item A1425. The composite material of any one of items A3-A863 or B2-B15 where the nanotube is a single wall carbon nanotube and the second structural entity is rare earth elements.

Item A1426. The composite material of any one of items A3-A863 or B2-B15 where the nanotube is a single wall carbon nanotube and the second structural entity is reduced boron nitride oxide.

Item A1427. The composite material of any one of items A3-A863 or B2-B15 where the nanotube is a single wall carbon nanotube and the second structural entity is reduced graphene oxide.

Item A1428. The composite material of any one of items A3-A863 or B2-B15 where the nanotube is a single wall carbon nanotube and the second structural entity is reduced graphyne.

Item A1429. The composite material of any one of items A3-A863 or B2-B15 where the nanotube is a single wall carbon nanotube and the second structural entity is rubber.

Item A1430. The composite material of any one of items A3-A863 or B2-B15 where the nanotube is a single wall carbon nanotube and the second structural entity is s-glass.

Item A1431. The composite material of any one of items A3-A863 or B2-B15 where the nanotube is a single wall carbon nanotube and the second structural entity is sapphire.

Item A1432. The composite material of any one of items A3-A863 or B2-B15 where the nanotube is a single wall carbon nanotube and the second structural entity is set accelerators.

Item A1433. The composite material of any one of items A3-A863 or B2-B15 where the nanotube is a single wall carbon nanotube and the second structural entity is set retarders.

Item A1434. The composite material of any one of items A3-A863 or B2-B15 where the nanotube is a single wall carbon nanotube and the second structural entity is shrinkage control admixtures.

Item A1435. The composite material of any one of items A3-A863 or B2-B15 where the nanotube is a single wall carbon nanotube and the second structural entity is silica.

Item A1436. The composite material of any one of items A3-A863 or B2-B15 where the nanotube is a single wall carbon nanotube and the second structural entity is silica fume.

Item A1437. The composite material of any one of items A3-A863 or B2-B15 where the nanotube is a single wall carbon nanotube and the second structural entity is silica gel.

Item A1438. The composite material of any one of items A3-A863 or B2-B15 where the nanotube is a single wall carbon nanotube and the second structural entity is silicon.

Item A1439. The composite material of any one of items A3-A863 or B2-B15 where the nanotube is a single wall carbon nanotube and the second structural entity is silicon carbide.

Item A1440. The composite material of any one of items A3-A863 or B2-B15 where the nanotube is a single wall carbon nanotube and the second structural entity is silicon dioxide.

Item A1441. The composite material of any one of items A3-A863 or B2-B15 where the nanotube is a single wall carbon nanotube and the second structural entity is silicon nitride.

Item A1442. The composite material of any one of items A3-A863 or B2-B15 where the nanotube is a single wall carbon nanotube and the second structural entity is silicon nitrides (bulk and thin film).

Item A1443. The composite material of any one of items A3-A863 or B2-B15 where the nanotube is a single wall carbon nanotube and the second structural entity is silver.

Item A1444. The composite material of any one of items A3-A863 or B2-B15 where the nanotube is a single wall carbon nanotube and the second structural entity is single-layer boron nitride.

Item A1445. The composite material of any one of items A3-A863 or B2-B15 where the nanotube is a single wall carbon nanotube and the second structural entity is single-layer graphene.

Item A1446. The composite material of any one of items A3-A863 or B2-B15 where the nanotube is a single wall carbon nanotube and the second structural entity is sol-gel.

Item A1447. The composite material of any one of items A3-A863 or B2-B15 where the nanotube is a single wall carbon nanotube and the second structural entity is soot.

Item A1448. The composite material of any one of items A3-A863 or B2-B15 where the nanotube is a single wall carbon nanotube and the second structural entity is steel.

Item A1449. The composite material of any one of items A3-A863 or B2-B15 where the nanotube is a single wall carbon nanotube and the second structural entity is steel fibers.

Item A1450. The composite material of any one of items A3-A863 or B2-B15 where the nanotube is a single wall carbon nanotube and the second structural entity is superplasticizer.

Item A1451. The composite material of any one of items A3-A863 or B2-B15 where the nanotube is a single wall carbon nanotube and the second structural entity is superplasticizers.

Item A1452. The composite material of any one of items A3-A863 or B2-B15 where the nanotube is a single wall carbon nanotube and the second structural entity is talc.

Item A1453. The composite material of any one of items A3-A863 or B2-B15 where the nanotube is a single wall carbon nanotube and the second structural entity is tantalum.

Item A1454. The composite material of any one of items A3-A863 or B2-B15 where the nanotube is a single wall carbon nanotube and the second structural entity is thiol-functionalized graphene.

Item A1455. The composite material of any one of items A3-A863 or B2-B15 where the nanotube is a single wall carbon nanotube and the second structural entity is titanium.

Item A1456. The composite material of any one of items A3-A863 or B2-B15 where the nanotube is a single wall carbon nanotube and the second structural entity is titanium oxide.

Item A1457. The composite material of any one of items A3-A863 or B2-B15 where the nanotube is a single wall carbon nanotube and the second structural entity is tooth cementum.

Item A1458. The composite material of any one of items A3-A863 or B2-B15 where the nanotube is a single wall carbon nanotube and the second structural entity is tooth dentine.

Item A1459. The composite material of any one of items A3-A863 or B2-B15 where the nanotube is a single wall carbon nanotube and the second structural entity is tooth enamel.

Item A1460. The composite material of any one of items A3-A863 or B2-B15 where the nanotube is a single wall carbon nanotube and the second structural entity is transition metals.

Item A1461. The composite material of any one of items A3-A863 or B2-B15 where the nanotube is a single wall carbon nanotube and the second structural entity is triple-layer boron nitride.

Item A1462. The composite material of any one of items A3-A863 or B2-B15 where the nanotube is a single wall carbon nanotube and the second structural entity is triple-layer graphene.

Item A1463. The composite material of any one of items A3-A863 or B2-B15 where the nanotube is a single wall carbon nanotube and the second structural entity is tungsten.

Item A1464. The composite material of any one of items A3-A863 or B2-B15 where the nanotube is a single wall carbon nanotube and the second structural entity is tungsten carbide.

Item A1465. The composite material of any one of items A3-A863 or B2-B15 where the nanotube is a single wall carbon nanotube and the second structural entity is ultrahard fullerite.

Item A1466. The composite material of any one of items A3-A863 or B2-B15 where the nanotube is a single wall carbon nanotube and the second structural entity is water reducers.

Item A1467. The composite material of any one of items A3-A863 or B2-B15 where the nanotube is a single wall carbon nanotube and the second structural entity is wood.

Item A1468. The composite material of any one of items A3-A863 or B2-B15 where the nanotube is a single wall carbon nanotube and the second structural entity is zinc oxide.

Item A1469. The composite material of any one of items A3-A863 or B2-B15 where the nanotube is a single wall carbon nanotube and the second structural entity is zirconia.

Item A1470. The composite material of any one of items A3-A863 or B2-B15 where the nanotube is a multi wall carbon nanotube and the second structural entity is a carbon fibre.

Item A1471. The composite material of any one of items A3-A863 or B2-B15 where the nanotube is a multi wall carbon nanotube and the second structural entity is boron nitride.

Item A1472. The composite material of any one of items A3-A863 or B2-B15 where the nanotube is a multi wall carbon nanotube and the second structural entity is a ceramic.

Item A1473. The composite material of any one of items A3-A863 or B2-B15 where the nanotube is a multi wall carbon nanotube and the second structural entity is graphene.

Item A1474. The composite material of any one of items A3-A863 or B2-B15 where the nanotube is a multi wall carbon nanotube and the second structural entity is a metal.

Item A1475. The composite material of any one of items A3-A863 or B2-B15 where the nanotube is a multi wall carbon nanotube and the second structural entity is a nucleic acid.

Item A1476. The composite material of any one of items A3-A863 or B2-B15 where the nanotube is a multi wall carbon nanotube and the second structural entity is a polypeptide.

Item A1477. The composite material of any one of items A3-A863 or B2-B15 where the nanotube is a multi wall carbon nanotube and the second structural entity is a cathode.

Item A1478. The composite material of any one of items A3-A863 or B2-B15 where the nanotube is a multi wall carbon nanotube and the second structural entity is a metalised dielectric.

Item A1479. The composite material of any one of items A3-A863 or B2-B15 where the nanotube is a multi wall carbon nanotube and the second structural entity is a peptide.

Item A1480. The composite material of any one of items A3-A863 or B2-B15 where the nanotube is a multi wall carbon nanotube and the second structural entity is a protein.

Item A1481. The composite material of any one of items A3-A863 or B2-B15 where the nanotube is a multi wall carbon nanotube and the second structural entity is a semiconductor.

Item A1482. The composite material of any one of items A3-A863 or B2-B15 where the nanotube is a multi wall carbon nanotube and the second structural entity is a sensor.

Item A1483. The composite material of any one of items A3-A863 or B2-B15 where the nanotube is a multi wall carbon nanotube and the second structural entity is aluminium.

Item A1484. The composite material of any one of items A3-A863 or B2-B15 where the nanotube is a multi wall carbon nanotube and the second structural entity is an anode.

Item A1485. The composite material of any one of items A3-A863 or B2-B15 where the nanotube is a multi wall carbon nanotube and the second structural entity is an antibody.

Item A1486. The composite material of any one of items A3-A863 or B2-B15 where the nanotube is a multi wall carbon nanotube and the second structural entity is electrode.

Item A1487. The composite material of any one of items A3-A863 or B2-B15 where the nanotube is a multi wall carbon nanotube and the second structural entity is boron nitride.

Item A1488. The composite material of any one of items A3-A863 or B2-B15 where the nanotube is a multi wall carbon nanotube and the second structural entity is buckyball.

Item A1489. The composite material of any one of items A3-A863 or B2-B15 where the nanotube is a multi wall carbon nanotube and the second structural entity is carbon nanofibres.

Item A1490. The composite material of any one of items A3-A863 or B2-B15 where the nanotube is a multi wall carbon nanotube and the second structural entity is concrete.

Item A1491. The composite material of any one of items A3-A863 or B2-B15 where the nanotube is a multi wall carbon nanotube and the second structural entity is glass fibre.

Item A1492. The composite material of any one of items A3-A863 or B2-B15 where the nanotube is a multi wall carbon nanotube and the second structural entity is graphene oxide.

Item A1493. The composite material of any one of items A3-A863 or B2-B15 where the nanotube is a multi wall carbon nanotube and the second structural entity is graphyne.

Item A1494. The composite material of any one of items A3-A863 or B2-B15 where the nanotube is a multi wall carbon nanotube and the second structural entity is stainless steel.

Item A1495. The composite material of any one of items A3-A863 or B2-B15 where the nanotube is a multi wall carbon nanotube and the second structural entity is a cathode.

Item A1496. The composite material of any one of items A3-A863 or B2-B15 where the nanotube is a multi wall carbon nanotube and the second structural entity is a carbon polymer.

Item A1497. The composite material of any one of items A3-A863 or B2-B15 where the nanotube is a multi wall carbon nanotube and the second structural entity is (Ag) silver.

Item A1498. The composite material of any one of items A3-A863 or B2-B15 where the nanotube is a multi wall carbon nanotube and the second structural entity is (Al) aluminium.

Item A1499. The composite material of any one of items A3-A863 or B2-B15 where the nanotube is a multi wall carbon nanotube and the second structural entity is (Au) gold.

Item A1500. The composite material of any one of items A3-A863 or B2-B15 where the nanotube is a multi wall carbon nanotube and the second structural entity is (Cr) chromium.

Item A1501. The composite material of any one of items A3-A863 or B2-B15 where the nanotube is a multi wall carbon nanotube and the second structural entity is (Cu) copper.

Item A1502. The composite material of any one of items A3-A863 or B2-B15 where the nanotube is a multi wall carbon nanotube and the second structural entity is (Fe) steel and stainless steel.

Item A1503. The composite material of any one of items A3-A863 or B2-B15 where the nanotube is a multi wall carbon nanotube and the second structural entity is (Mn) manganese.

Item A1504. The composite material of any one of items A3-A863 or B2-B15 where the nanotube is a multi wall carbon nanotube and the second structural entity is (Mo) molybdenum.

Item A1505. The composite material of any one of items A3-A863 or B2-B15 where the nanotube is a multi wall carbon nanotube and the second structural entity is (Ni) nickel.

Item A1506. The composite material of any one of items A3-A863 or B2-B15 where the nanotube is a multi wall carbon nanotube and the second structural entity is (Pa) palladium.

Item A1507. The composite material of any one of items A3-A863 or B2-B15 where the nanotube is a multi wall carbon nanotube and the second structural entity is (Pt) platinum.

Item A1508. The composite material of any one of items A3-A863 or B2-B15 where the nanotube is a multi wall carbon nanotube and the second structural entity is (Ta) tantalum.

Item A1509. The composite material of any one of items A3-A863 or B2-B15 where the nanotube is a multi wall carbon nanotube and the second structural entity is (Ti) titanium.

Item A1510. The composite material of any one of items A3-A863 or B2-B15 where the nanotube is a multi wall carbon nanotube and the second structural entity is (Wo) Tungsten.

Item A1511. The composite material of any one of items A3-A863 or B2-B15 where the nanotube is a multi wall carbon nanotube and the second structural entity is a battery.

Item A1512. The composite material of any one of items A3-A863 or B2-B15 where the nanotube is a multi wall carbon nanotube and the second structural entity is a borosilicate.

Item A1513. The composite material of any one of items A3-A863 or B2-B15 where the nanotube is a multi wall carbon nanotube and the second structural entity is a buckyball.

Item A1514. The composite material of any one of items A3-A863 or B2-B15 where the nanotube is a multi wall carbon nanotube and the second structural entity is a buckytube.

Item A1515. The composite material of any one of items A3-A863 or B2-B15 where the nanotube is a multi wall carbon nanotube and the second structural entity is a capacitator.

Item A1516. The composite material of any one of items A3-A863 or B2-B15 where the nanotube is a multi wall carbon nanotube and the second structural entity is a carbon dome.

Item A1517. The composite material of any one of items A3-A863 or B2-B15 where the nanotube is a multi wall carbon nanotube and the second structural entity is a carbon megatube.

Item A1518. The composite material of any one of items A3-A863 or B2-B15 where the nanotube is a multi wall carbon nanotube and the second structural entity is a carbon nanofibre.

Item A1519. The composite material of any one of items A3-A863 or B2-B15 where the nanotube is a multi wall carbon nanotube and the second structural entity is a carbon nanofoam.

Item A1520. The composite material of any one of items A3-A863 or B2-B15 where the nanotube is a multi wall carbon nanotube and the second structural entity is a carbon nanothread.

Item A1521. The composite material of any one of items A3-A863 or B2-B15 where the nanotube is a multi wall carbon nanotube and the second structural entity is a catalyst.

Item A1522. The composite material of any one of items A3-A863 or B2-B15 where the nanotube is a multi wall carbon nanotube and the second structural entity is a ceramic material.

Item A1523. The composite material of any one of items A3-A863 or B2-B15 where the nanotube is a multi wall carbon nanotube and the second structural entity is a composite material.

Item A1524. The composite material of any one of items A3-A863 or B2-B15 where the nanotube is a multi wall carbon nanotube and the second structural entity is a conductor.

Item A1525. The composite material of any one of items A3-A863 or B2-B15 where the nanotube is a multi wall carbon nanotube and the second structural entity is a covalent crystal.

Item A1526. The composite material of any one of items A3-A863 or B2-B15 where the nanotube is a multi wall carbon nanotube and the second structural entity is a crystal.

Item A1527. The composite material of any one of items A3-A863 or B2-B15 where the nanotube is a multi wall carbon nanotube and the second structural entity is a crystalline material.

Item A1528. The composite material of any one of items A3-A863 or B2-B15 where the nanotube is a multi wall carbon nanotube and the second structural entity is a defect-free graphene sheet.

Item A1529. The composite material of any one of items A3-A863 or B2-B15 where the nanotube is a multi wall carbon nanotube and the second structural entity is a dielectric material.

Item A1530. The composite material of any one of items A3-A863 or B2-B15 where the nanotube is a multi wall carbon nanotube and the second structural entity is a diode.

Item A1531. The composite material of any one of items A3-A863 or B2-B15 where the nanotube is a multi wall carbon nanotube and the second structural entity is a dodecahedrane.

Item A1532. The composite material of any one of items A3-A863 or B2-B15 where the nanotube is a multi wall carbon nanotube and the second structural entity is a doped glass.

Item A1533. The composite material of any one of items A3-A863 or B2-B15 where the nanotube is a multi wall carbon nanotube and the second structural entity is a fibre.

Item A1534. The composite material of any one of items A3-A863 or B2-B15 where the nanotube is a multi wall carbon nanotube and the second structural entity is a fullerite.

Item A1535. The composite material of any one of items A3-A863 or B2-B15 where the nanotube is a multi wall carbon nanotube and the second structural entity is a fused silica.

Item A1536. The composite material of any one of items A3-A863 or B2-B15 where the nanotube is a multi wall carbon nanotube and the second structural entity is a glass fibre.

Item A1537. The composite material of any one of items A3-A863 or B2-B15 where the nanotube is a multi wall carbon nanotube and the second structural entity is a glue.

Item A1538. The composite material of any one of items A3-A863 or B2-B15 where the nanotube is a multi wall carbon nanotube and the second structural entity is a green ceramic.

Item A1539. The composite material of any one of items A3-A863 or B2-B15 where the nanotube is a multi wall carbon nanotube and the second structural entity is a lanthanides.

Item A1540. The composite material of any one of items A3-A863 or B2-B15 where the nanotube is a multi wall carbon nanotube and the second structural entity is a machinable ceramic.

Item A1541. The composite material of any one of items A3-A863 or B2-B15 where the nanotube is a multi wall carbon nanotube and the second structural entity is a metal alloy.

Item A1542. The composite material of any one of items A3-A863 or B2-B15 where the nanotube is a multi wall carbon nanotube and the second structural entity is a metallised ceramic.

Item A1543. The composite material of any one of items A3-A863 or B2-B15 where the nanotube is a multi wall carbon nanotube and the second structural entity is a metalloid.

Item A1544. The composite material of any one of items A3-A863 or B2-B15 where the nanotube is a multi wall carbon nanotube and the second structural entity is a mineral.

Item A1545. The composite material of any one of items A3-A863 or B2-B15 where the nanotube is a multi wall carbon nanotube and the second structural entity is a non-covalent crystal.

Item A1546. The composite material of any one of items A3-A863 or B2-B15 where the nanotube is a multi wall carbon nanotube and the second structural entity is a piezoelectric material.

Item A1547. The composite material of any one of items A3-A863 or B2-B15 where the nanotube is a multi wall carbon nanotube and the second structural entity is a platinum group metal.

Item A1548. The composite material of any one of items A3-A863 or B2-B15 where the nanotube is a multi wall carbon nanotube and the second structural entity is a post-transition metal.

Item A1549. The composite material of any one of items A3-A863 or B2-B15 where the nanotube is a multi wall carbon nanotube and the second structural entity is a rare earth element.

Item A1550. The composite material of any one of items A3-A863 or B2-B15 where the nanotube is a multi wall carbon nanotube and the second structural entity is a sapphire.

Item A1551. The composite material of any one of items A3-A863 or B2-B15 where the nanotube is a multi wall carbon nanotube and the second structural entity is a silicon nitride.

Item A1552. The composite material of any one of items A3-A863 or B2-B15 where the nanotube is a multi wall carbon nanotube and the second structural entity is a single crystal fiber.

Item A1553. The composite material of any one of items A3-A863 or B2-B15 where the nanotube is a multi wall carbon nanotube and the second structural entity is a sol-gel.

Item A1554. The composite material of any one of items A3-A863 or B2-B15 where the nanotube is a multi wall carbon nanotube and the second structural entity is a synthetic diamond.

Item A1555. The composite material of any one of items A3-A863 or B2-B15 where the nanotube is a multi wall carbon nanotube and the second structural entity is a transition metal.

Item A1556. The composite material of any one of items A3-A863 or B2-B15 where the nanotube is a multi wall carbon nanotube and the second structural entity is a tungsten carbide.

Item A1557. The composite material of any one of items A3-A863 or B2-B15 where the nanotube is a multi wall carbon nanotube and the second structural entity is actinides.

Item A1558. The composite material of any one of items A3-A863 or B2-B15 where the nanotube is a multi wall carbon nanotube and the second structural entity is activated carbon.

Item A1559. The composite material of any one of items A3-A863 or B2-B15 where the nanotube is a multi wall carbon nanotube and the second structural entity is aggregated diamonds.

Item A1560. The composite material of any one of items A3-A863 or B2-B15 where the nanotube is a multi wall carbon nanotube and the second structural entity is air entrainers.

Item A1561. The composite material of any one of items A3-A863 or B2-B15 where the nanotube is a multi wall carbon nanotube and the second structural entity is alkali-silica reactivity inhibitors.

Item A1562. The composite material of any one of items A3-A863 or B2-B15 where the nanotube is a multi wall carbon nanotube and the second structural entity is alloys.

Item A1563. The composite material of any one of items A3-A863 or B2-B15 where the nanotube is a multi wall carbon nanotube and the second structural entity is alumina.

Item A1564. The composite material of any one of items A3-A863 or B2-B15 where the nanotube is a multi wall carbon nanotube and the second structural entity is alumina trihydrate.

Item A1565. The composite material of any one of items A3-A863 or B2-B15 where the nanotube is a multi wall carbon nanotube and the second structural entity is aluminum boride.

Item A1566. The composite material of any one of items A3-A863 or B2-B15 where the nanotube is a multi wall carbon nanotube and the second structural entity is aluminum fibers.

Item A1567. The composite material of any one of items A3-A863 or B2-B15 where the nanotube is a multi wall carbon nanotube and the second structural entity is aluminum oxide.

Item A1568. The composite material of any one of items A3-A863 or B2-B15 where the nanotube is a multi wall carbon nanotube and the second structural entity is aluminum trihydroxide.

Item A1569. The composite material of any one of items A3-A863 or B2-B15 where the nanotube is a multi wall carbon nanotube and the second structural entity is amalgams.

Item A1570. The composite material of any one of items A3-A863 or B2-B15 where the nanotube is a multi wall carbon nanotube and the second structural entity is amorphous carbon.

Item A1571. The composite material of any one of items A3-A863 or B2-B15 where the nanotube is a multi wall carbon nanotube and the second structural entity is actinides.

Item A1572. The composite material of any one of items A3-A863 or B2-B15 where the nanotube is a multi wall carbon nanotube and the second structural entity is an amalgam.

Item A1573. The composite material of any one of items A3-A863 or B2-B15 where the nanotube is a multi wall carbon nanotube and the second structural entity is an endohedral fullerene.

Item A1574. The composite material of any one of items A3-A863 or B2-B15 where the nanotube is a multi wall carbon nanotube and the second structural entity is an insulator.

Item A1575. The composite material of any one of items A3-A863 or B2-B15 where the nanotube is a multi wall carbon nanotube and the second structural entity is an intermetallic.

Item A1576. The composite material of any one of items A3-A863 or B2-B15 where the nanotube is a multi wall carbon nanotube and the second structural entity is an ionic crystal.

Item A1577. The composite material of any one of items A3-A863 or B2-B15 where the nanotube is a multi wall carbon nanotube and the second structural entity is an organic material.

Item A1578. The composite material of any one of items A3-A863 or B2-B15 where the nanotube is a multi wall carbon nanotube and the second structural entity is anthracite.

Item A1579. The composite material of any one of items A3-A863 or B2-B15 where the nanotube is a multi wall carbon nanotube and the second structural entity is aramid.

Item A1580. The composite material of any one of items A3-A863 or B2-B15 where the nanotube is a multi wall carbon nanotube and the second structural entity is asbestos.

Item A1581. The composite material of any one of items A3-A863 or B2-B15 where the nanotube is a multi wall carbon nanotube and the second structural entity is barium.

Item A1582. The composite material of any one of items A3-A863 or B2-B15 where the nanotube is a multi wall carbon nanotube and the second structural entity is bone.

Item A1583. The composite material of any one of items A3-A863 or B2-B15 where the nanotube is a multi wall carbon nanotube and the second structural entity is boron.

Item A1584. The composite material of any one of items A3-A863 or B2-B15 where the nanotube is a multi wall carbon nanotube and the second structural entity is boron nitride nanoscroll.

Item A1585. The composite material of any one of items A3-A863 or B2-B15 where the nanotube is a multi wall carbon nanotube and the second structural entity is boron nitride oxide.

Item A1586. The composite material of any one of items A3-A863 or B2-B15 where the nanotube is a multi wall carbon nanotube and the second structural entity is brass.

Item A1587. The composite material of any one of items A3-A863 or B2-B15 where the nanotube is a multi wall carbon nanotube and the second structural entity is brass fibers.

Item A1588. The composite material of any one of items A3-A863 or B2-B15 where the nanotube is a multi wall carbon nanotube and the second structural entity is buckminsterfullerene.

Item A1589. The composite material of any one of items A3-A863 or B2-B15 where the nanotube is a multi wall carbon nanotube and the second structural entity is bucky paper.

Item A1590. The composite material of any one of items A3-A863 or B2-B15 where the nanotube is a multi wall carbon nanotube and the second structural entity is buckyball clusters.

Item A1591. The composite material of any one of items A3-A863 or B2-B15 where the nanotube is a multi wall carbon nanotube and the second structural entity is buckypaper.

Item A1592. The composite material of any one of items A3-A863 or B2-B15 where the nanotube is a multi wall carbon nanotube and the second structural entity is buckytube.

Item A1593. The composite material of any one of items A3-A863 or B2-B15 where the nanotube is a multi wall carbon nanotube and the second structural entity is calcium carbonite.

Item A1594. The composite material of any one of items A3-A863 or B2-B15 where the nanotube is a multi wall carbon nanotube and the second structural entity is calcium metasilicate.

Item A1595. The composite material of any one of items A3-A863 or B2-B15 where the nanotube is a multi wall carbon nanotube and the second structural entity is calcium sulfate.

Item A1596. The composite material of any one of items A3-A863 or B2-B15 where the nanotube is a multi wall carbon nanotube and the second structural entity is calcium sulphate.

Item A1597. The composite material of any one of items A3-A863 or B2-B15 where the nanotube is a multi wall carbon nanotube and the second structural entity is carbon black.

Item A1598. The composite material of any one of items A3-A863 or B2-B15 where the nanotube is a multi wall carbon nanotube and the second structural entity is carbon fiber.

Item A1599. The composite material of any one of items A3-A863 or B2-B15 where the nanotube is a multi wall carbon nanotube and the second structural entity is carbon fibers.

Item A1600. The composite material of any one of items A3-A863 or B2-B15 where the nanotube is a multi wall carbon nanotube and the second structural entity is carbon megatubes.

Item A1601. The composite material of any one of items A3-A863 or B2-B15 where the nanotube is a multi wall carbon nanotube and the second structural entity is carbon nano-onions.

Item A1602. The composite material of any one of items A3-A863 or B2-B15 where the nanotube is a multi wall carbon nanotube and the second structural entity is carbon nanobuds.

Item A1603. The composite material of any one of items A3-A863 or B2-B15 where the nanotube is a multi wall carbon nanotube and the second structural entity is carbon nanofiber.

Item A1604. The composite material of any one of items A3-A863 or B2-B15 where the nanotube is a multi wall carbon nanotube and the second structural entity is carbon nanofoam.

Item A1605. The composite material of any one of items A3-A863 or B2-B15 where the nanotube is a multi wall carbon nanotube and the second structural entity is carbon nanothread.

Item A1606. The composite material of any one of items A3-A863 or B2-B15 where the nanotube is a multi wall carbon nanotube and the second structural entity is carbon/diamond nanothread.

Item A1607. The composite material of any one of items A3-A863 or B2-B15 where the nanotube is a multi wall carbon nanotube and the second structural entity is cellulose fibers.

Item A1608. The composite material of any one of items A3-A863 or B2-B15 where the nanotube is a multi wall carbon nanotube and the second structural entity is cellulose nanofibers (e.g. curran).

Item A1609. The composite material of any one of items A3-A863 or B2-B15 where the nanotube is a multi wall carbon nanotube and the second structural entity is cellulose nanowhiskers.

Item A1610. The composite material of any one of items A3-A863 or B2-B15 where the nanotube is a multi wall carbon nanotube and the second structural entity is chemical admixtures.

Item A1611. The composite material of any one of items A3-A863 or B2-B15 where the nanotube is a multi wall carbon nanotube and the second structural entity is chlorographene.

Item A1612. The composite material of any one of items A3-A863 or B2-B15 where the nanotube is a multi wall carbon nanotube and the second structural entity is chromium.

Item A1613. The composite material of any one of items A3-A863 or B2-B15 where the nanotube is a multi wall carbon nanotube and the second structural entity is clay.

Item A1614. The composite material of any one of items A3-A863 or B2-B15 where the nanotube is a multi wall carbon nanotube and the second structural entity is coal.

Item A1615. The composite material of any one of items A3-A863 or B2-B15 where the nanotube is a multi wall carbon nanotube and the second structural entity is coated boron nitride.

Item A1616. The composite material of any one of items A3-A863 or B2-B15 where the nanotube is a multi wall carbon nanotube and the second structural entity is coated graphene.

Item A1617. The composite material of any one of items A3-A863 or B2-B15 where the nanotube is a multi wall carbon nanotube and the second structural entity is coloring admixtures.

Item A1618. The composite material of any one of items A3-A863 or B2-B15 where the nanotube is a multi wall carbon nanotube and the second structural entity is composite materials.

Item A1619. The composite material of any one of items A3-A863 or B2-B15 where the nanotube is a multi wall carbon nanotube and the second structural entity is concrete admixtures.

Item A1620. The composite material of any one of items A3-A863 or B2-B15 where the nanotube is a multi wall carbon nanotube and the second structural entity is COOH-functionalized graphene.

Item A1621. The composite material of any one of items A3-A863 or B2-B15 where the nanotube is a multi wall carbon nanotube and the second structural entity is copper.

Item A1622. The composite material of any one of items A3-A863 or B2-B15 where the nanotube is a multi wall carbon nanotube and the second structural entity is corrosion inhibitors.

Item A1623. The composite material of any one of items A3-A863 or B2-B15 where the nanotube is a multi wall carbon nanotube and the second structural entity is covalent crystals.

Item A1624. The composite material of any one of items A3-A863 or B2-B15 where the nanotube is a multi wall carbon nanotube and the second structural entity is crystal.

Item A1625. The composite material of any one of items A3-A863 or B2-B15 where the nanotube is a multi wall carbon nanotube and the second structural entity is crystalline materials.

Item A1626. The composite material of any one of items A3-A863 or B2-B15 where the nanotube is a multi wall carbon nanotube and the second structural entity is diamond.

Item A1627. The composite material of any one of items A3-A863 or B2-B15 where the nanotube is a multi wall carbon nanotube and the second structural entity is diamond-like carbon.

Item A1628. The composite material of any one of items A3-A863 or B2-B15 where the nanotube is a multi wall carbon nanotube and the second structural entity is dispersants.

Item A1629. The composite material of any one of items A3-A863 or B2-B15 where the nanotube is a multi wall carbon nanotube and the second structural entity is dodecahedrane.

Item A1630. The composite material of any one of items A3-A863 or B2-B15 where the nanotube is a multi wall carbon nanotube and the second structural entity is double-layer boron nitride.

Item A1631. The composite material of any one of items A3-A863 or B2-B15 where the nanotube is a multi wall carbon nanotube and the second structural entity is double-layer graphene.

Item A1632. The composite material of any one of items A3-A863 or B2-B15 where the nanotube is a multi wall carbon nanotube and the second structural entity is e-glass.

Item A1633. The composite material of any one of items A3-A863 or B2-B15 where the nanotube is a multi wall carbon nanotube and the second structural entity is elastomers.

Item A1634. The composite material of any one of items A3-A863 or B2-B15 where the nanotube is a multi wall carbon nanotube and the second structural entity is endohedral fullerenes.

Item A1635. The composite material of any one of items A3-A863 or B2-B15 where the nanotube is a multi wall carbon nanotube and the second structural entity is exfoliated graphite.

Item A1636. The composite material of any one of items A3-A863 or B2-B15 where the nanotube is a multi wall carbon nanotube and the second structural entity is exfoliated silicate.

Item A1637. The composite material of any one of items A3-A863 or B2-B15 where the nanotube is a multi wall carbon nanotube and the second structural entity is extruded activated carbon.

Item A1638. The composite material of any one of items A3-A863 or B2-B15 where the nanotube is a multi wall carbon nanotube and the second structural entity is fibres.

Item A1639. The composite material of any one of items A3-A863 or B2-B15 where the nanotube is a multi wall carbon nanotube and the second structural entity is flourinated boron nitride.

Item A1640. The composite material of any one of items A3-A863 or B2-B15 where the nanotube is a multi wall carbon nanotube and the second structural entity is flourinated graphene.

Item A1641. The composite material of any one of items A3-A863 or B2-B15 where the nanotube is a multi wall carbon nanotube and the second structural entity is fluorographene.

Item A1642. The composite material of any one of items A3-A863 or B2-B15 where the nanotube is a multi wall carbon nanotube and the second structural entity is fly ash.

Item A1643. The composite material of any one of items A3-A863 or B2-B15 where the nanotube is a multi wall carbon nanotube and the second structural entity is fullerene rings.

Item A1644. The composite material of any one of items A3-A863 or B2-B15 where the nanotube is a multi wall carbon nanotube and the second structural entity is fullerenes.

Item A1645. The composite material of any one of items A3-A863 or B2-B15 where the nanotube is a multi wall carbon nanotube and the second structural entity is fullerite.

Item A1646. The composite material of any one of items A3-A863 or B2-B15 where the nanotube is a multi wall carbon nanotube and the second structural entity is functionalized boron nitride.

Item A1647. The composite material of any one of items A3-A863 or B2-B15 where the nanotube is a multi wall carbon nanotube and the second structural entity is functionalized graphene.

Item A1648. The composite material of any one of items A3-A863 or B2-B15 where the nanotube is a multi wall carbon nanotube and the second structural entity is fused silica.

Item A1649. The composite material of any one of items A3-A863 or B2-B15 where the nanotube is a multi wall carbon nanotube and the second structural entity is gallium arsenide.

Item A1650. The composite material of any one of items A3-A863 or B2-B15 where the nanotube is a multi wall carbon nanotube and the second structural entity is gallium nitride.

Item A1651. The composite material of any one of items A3-A863 or B2-B15 where the nanotube is a multi wall carbon nanotube and the second structural entity is gedodesic carbon domes.

Item A1652. The composite material of any one of items A3-A863 or B2-B15 where the nanotube is a multi wall carbon nanotube and the second structural entity is germanium.

Item A1653. The composite material of any one of items A3-A863 or B2-B15 where the nanotube is a multi wall carbon nanotube and the second structural entity is glass.

Item A1654. The composite material of any one of items A3-A863 or B2-B15 where the nanotube is a multi wall carbon nanotube and the second structural entity is glass microsphere.

Item A1655. The composite material of any one of items A3-A863 or B2-B15 where the nanotube is a multi wall carbon nanotube and the second structural entity is glass ribbons.

Item A1656. The composite material of any one of items A3-A863 or B2-B15 where the nanotube is a multi wall carbon nanotube and the second structural entity is glass spheres.

Item A1657. The composite material of any one of items A3-A863 or B2-B15 where the nanotube is a multi wall carbon nanotube and the second structural entity is glasses.

Item A1658. The composite material of any one of items A3-A863 or B2-B15 where the nanotube is a multi wall carbon nanotube and the second structural entity is glassy carbon.

Item A1659. The composite material of any one of items A3-A863 or B2-B15 where the nanotube is a multi wall carbon nanotube and the second structural entity is glue.

Item A1660. The composite material of any one of items A3-A863 or B2-B15 where the nanotube is a multi wall carbon nanotube and the second structural entity is gold.

Item A1661. The composite material of any one of items A3-A863 or B2-B15 where the nanotube is a multi wall carbon nanotube and the second structural entity is gold particles.

Item A1662. The composite material of any one of items A3-A863 or B2-B15 where the nanotube is a multi wall carbon nanotube and the second structural entity is granular activated carbon.

Item A1663. The composite material of any one of items A3-A863 or B2-B15 where the nanotube is a multi wall carbon nanotube and the second structural entity is graphane.

Item A1664. The composite material of any one of items A3-A863 or B2-B15 where the nanotube is a multi wall carbon nanotube and the second structural entity is graphdiyne.

Item A1665. The composite material of any one of items A3-A863 or B2-B15 where the nanotube is a multi wall carbon nanotube and the second structural entity is graphene.

Item A1666. The composite material of any one of items A3-A863 or B2-B15 where the nanotube is a multi wall carbon nanotube and the second structural entity is graphite.

Item A1667. The composite material of any one of items A3-A863 or B2-B15 where the nanotube is a multi wall carbon nanotube and the second structural entity is graphone.

Item A1668. The composite material of any one of items A3-A863 or B2-B15 where the nanotube is a multi wall carbon nanotube and the second structural entity is hardened steel.

Item A1669. The composite material of any one of items A3-A863 or B2-B15 where the nanotube is a multi wall carbon nanotube and the second structural entity is high range water reducers.

Item A1670. The composite material of any one of items A3-A863 or B2-B15 where the nanotube is a multi wall carbon nanotube and the second structural entity is hydrous magnesium silicate.

Item A1671. The composite material of any one of items A3-A863 or B2-B15 where the nanotube is a multi wall carbon nanotube and the second structural entity is hyperdiamond.

Item A1672. The composite material of any one of items A3-A863 or B2-B15 where the nanotube is a multi wall carbon nanotube and the second structural entity is hyperdiamonds.

Item A1673. The composite material of any one of items A3-A863 or B2-B15 where the nanotube is a multi wall carbon nanotube and the second structural entity is imperfect boron nitride.

Item A1674. The composite material of any one of items A3-A863 or B2-B15 where the nanotube is a multi wall carbon nanotube and the second structural entity is imperfect graphene.

Item A1675. The composite material of any one of items A3-A863 or B2-B15 where the nanotube is a multi wall carbon nanotube and the second structural entity is intermetallics.

Item A1676. The composite material of any one of items A3-A863 or B2-B15 where the nanotube is a multi wall carbon nanotube and the second structural entity is ionic crystals.

Item A1677. The composite material of any one of items A3-A863 or B2-B15 where the nanotube is a multi wall carbon nanotube and the second structural entity is iron.

Item A1678. The composite material of any one of items A3-A863 or B2-B15 where the nanotube is a multi wall carbon nanotube and the second structural entity is iron oxides.

Item A1679. The composite material of any one of items A3-A863 or B2-B15 where the nanotube is a multi wall carbon nanotube and the second structural entity is kevlar.

Item A1680. The composite material of any one of items A3-A863 or B2-B15 where the nanotube is a multi wall carbon nanotube and the second structural entity is lanthanides.

Item A1681. The composite material of any one of items A3-A863 or B2-B15 where the nanotube is a multi wall carbon nanotube and the second structural entity is lead zirconium titanate.

Item A1682. The composite material of any one of items A3-A863 or B2-B15 where the nanotube is a multi wall carbon nanotube and the second structural entity is lignin.

Item A1683. The composite material of any one of items A3-A863 or B2-B15 where the nanotube is a multi wall carbon nanotube and the second structural entity is lignite.

Item A1684. The composite material of any one of items A3-A863 or B2-B15 where the nanotube is a multi wall carbon nanotube and the second structural entity is lithium niobate.

Item A1685. The composite material of any one of items A3-A863 or B2-B15 where the nanotube is a multi wall carbon nanotube and the second structural entity is lithium niobates.

Item A1686. The composite material of any one of items A3-A863 or B2-B15 where the nanotube is a multi wall carbon nanotube and the second structural entity is lonsdaleite.

Item A1687. The composite material of any one of items A3-A863 or B2-B15 where the nanotube is a multi wall carbon nanotube and the second structural entity is magnesium dihydroxide.

Item A1688. The composite material of any one of items A3-A863 or B2-B15 where the nanotube is a multi wall carbon nanotube and the second structural entity is magnesium oxide.

Item A1689. The composite material of any one of items A3-A863 or B2-B15 where the nanotube is a multi wall carbon nanotube and the second structural entity is manganese.

Item A1690. The composite material of any one of items A3-A863 or B2-B15 where the nanotube is a multi wall carbon nanotube and the second structural entity is melamine sulfonate superplasticisers.

Item A1691. The composite material of any one of items A3-A863 or B2-B15 where the nanotube is a multi wall carbon nanotube and the second structural entity is metal ions.

Item A1692. The composite material of any one of items A3-A863 or B2-B15 where the nanotube is a multi wall carbon nanotube and the second structural entity is metal oxide.

Item A1693. The composite material of any one of items A3-A863 or B2-B15 where the nanotube is a multi wall carbon nanotube and the second structural entity is metallised ceramic.

Item A1694. The composite material of any one of items A3-A863 or B2-B15 where the nanotube is a multi wall carbon nanotube and the second structural entity is metalloids.

Item A1695. The composite material of any one of items A3-A863 or B2-B15 where the nanotube is a multi wall carbon nanotube and the second structural entity is metals.

Item A1696. The composite material of any one of items A3-A863 or B2-B15 where the nanotube is a multi wall carbon nanotube and the second structural entity is mica.

Item A1697. The composite material of any one of items A3-A863 or B2-B15 where the nanotube is a multi wall carbon nanotube and the second structural entity is mineral.

Item A1698. The composite material of any one of items A3-A863 or B2-B15 where the nanotube is a multi wall carbon nanotube and the second structural entity is mineral admixtures.

Item A1699. The composite material of any one of items A3-A863 or B2-B15 where the nanotube is a multi wall carbon nanotube and the second structural entity is molybdenum.

Item A1700. The composite material of any one of items A3-A863 or B2-B15 where the nanotube is a multi wall carbon nanotube and the second structural entity is montmorrilonite nanoclays.

Item A1701. The composite material of any one of items A3-A863 or B2-B15 where the nanotube is a multi wall carbon nanotube and the second structural entity is multilayer boron nitride.

Item A1702. The composite material of any one of items A3-A863 or B2-B15 where the nanotube is a multi wall carbon nanotube and the second structural entity is multilayer graphene.

Item A1703. The composite material of any one of items A3-A863 or B2-B15 where the nanotube is a multi wall carbon nanotube and the second structural entity is nanochain.

Item A1704. The composite material of any one of items A3-A863 or B2-B15 where the nanotube is a multi wall carbon nanotube and the second structural entity is nanocrystal.

Item A1705. The composite material of any one of items A3-A863 or B2-B15 where the nanotube is a multi wall carbon nanotube and the second structural entity is nanowire.

Item A1706. The composite material of any one of items A3-A863 or B2-B15 where the nanotube is a multi wall carbon nanotube and the second structural entity is naphthalene.

Item A1707. The composite material of any one of items A3-A863 or B2-B15 where the nanotube is a multi wall carbon nanotube and the second structural entity is Natural pozzolans (such as the volcanic ash used in Roman concrete).

Item A1708. The composite material of any one of items A3-A863 or B2-B15 where the nanotube is a multi wall carbon nanotube and the second structural entity is NH2-functionalized graphene.

Item A1709. The composite material of any one of items A3-A863 or B2-B15 where the nanotube is a multi wall carbon nanotube and the second structural entity is nickel.

Item A1710. The composite material of any one of items A3-A863 or B2-B15 where the nanotube is a multi wall carbon nanotube and the second structural entity is non-covalent crystal.

Item A1711. The composite material of any one of items A3-A863 or B2-B15 where the nanotube is a multi wall carbon nanotube and the second structural entity is nylon.

Item A1712. The composite material of any one of items A3-A863 or B2-B15 where the nanotube is a multi wall carbon nanotube and the second structural entity is OH-functionalized graphene.

Item A1713. The composite material of any one of items A3-A863 or B2-B15 where the nanotube is a multi wall carbon nanotube and the second structural entity is palladium.

Item A1714. The composite material of any one of items A3-A863 or B2-B15 where the nanotube is a multi wall carbon nanotube and the second structural entity is pencil lead.

Item A1715. The composite material of any one of items A3-A863 or B2-B15 where the nanotube is a multi wall carbon nanotube and the second structural entity is perfect boron nitride.

Item A1716. The composite material of any one of items A3-A863 or B2-B15 where the nanotube is a multi wall carbon nanotube and the second structural entity is perfect graphene.

Item A1717. The composite material of any one of items A3-A863 or B2-B15 where the nanotube is a multi wall carbon nanotube and the second structural entity is plasticizers.

Item A1718. The composite material of any one of items A3-A863 or B2-B15 where the nanotube is a multi wall carbon nanotube and the second structural entity is platinum.

Item A1719. The composite material of any one of items A3-A863 or B2-B15 where the nanotube is a multi wall carbon nanotube and the second structural entity is platinum group metals.

Item A1720. The composite material of any one of items A3-A863 or B2-B15 where the nanotube is a multi wall carbon nanotube and the second structural entity is post-transition metals.

Item A1721. The composite material of any one of items A3-A863 or B2-B15 where the nanotube is a multi wall carbon nanotube and the second structural entity is powdered activated carbon.

Item A1722. The composite material of any one of items A3-A863 or B2-B15 where the nanotube is a multi wall carbon nanotube and the second structural entity is pozzolans and other cementitious materials.

Item A1723. The composite material of any one of items A3-A863 or B2-B15 where the nanotube is a multi wall carbon nanotube and the second structural entity is prismane.

Item A1724. The composite material of any one of items A3-A863 or B2-B15 where the nanotube is a multi wall carbon nanotube and the second structural entity is pristine boron nitride.

Item A1725. The composite material of any one of items A3-A863 or B2-B15 where the nanotube is a multi wall carbon nanotube and the second structural entity is pristine graphene.

Item A1726. The composite material of any one of items A3-A863 or B2-B15 where the nanotube is a multi wall carbon nanotube and the second structural entity is pyrolytic graphite.

Item A1727. The composite material of any one of items A3-A863 or B2-B15 where the nanotube is a multi wall carbon nanotube and the second structural entity is quantum dots.

Item A1728. The composite material of any one of items A3-A863 or B2-B15 where the nanotube is a multi wall carbon nanotube and the second structural entity is rare earth elements.

Item A1729. The composite material of any one of items A3-A863 or B2-B15 where the nanotube is a multi wall carbon nanotube and the second structural entity is reduced boron nitride oxide.

Item A1730. The composite material of any one of items A3-A863 or B2-B15 where the nanotube is a multi wall carbon nanotube and the second structural entity is reduced graphene oxide.

Item A1731. The composite material of any one of items A3-A863 or B2-B15 where the nanotube is a multi wall carbon nanotube and the second structural entity is reduced graphyne.

Item A1732. The composite material of any one of items A3-A863 or B2-B15 where the nanotube is a multi wall carbon nanotube and the second structural entity is rubber.

Item A1733. The composite material of any one of items A3-A863 or B2-B15 where the nanotube is a multi wall carbon nanotube and the second structural entity is s-glass.

Item A1734. The composite material of any one of items A3-A863 or B2-B15 where the nanotube is a multi wall carbon nanotube and the second structural entity is sapphire.

Item A1735. The composite material of any one of items A3-A863 or B2-B15 where the nanotube is a multi wall carbon nanotube and the second structural entity is set accelerators.

Item A1736. The composite material of any one of items A3-A863 or B2-B15 where the nanotube is a multi wall carbon nanotube and the second structural entity is set retarders.

Item A1737. The composite material of any one of items A3-A863 or B2-B15 where the nanotube is a multi wall carbon nanotube and the second structural entity is shrinkage control admixtures.

Item A1738. The composite material of any one of items A3-A863 or B2-B15 where the nanotube is a multi wall carbon nanotube and the second structural entity is silica.

Item A1739. The composite material of any one of items A3-A863 or B2-B15 where the nanotube is a multi wall carbon nanotube and the second structural entity is silica fume.

Item A1740. The composite material of any one of items A3-A863 or B2-B15 where the nanotube is a multi wall carbon nanotube and the second structural entity is silica gel.

Item A1741. The composite material of any one of items A3-A863 or B2-B15 where the nanotube is a multi wall carbon nanotube and the second structural entity is silicon.

Item A1742. The composite material of any one of items A3-A863 or B2-B15 where the nanotube is a multi wall carbon nanotube and the second structural entity is silicon carbide.

Item A1743. The composite material of any one of items A3-A863 or B2-B15 where the nanotube is a multi wall carbon nanotube and the second structural entity is silicon dioxide.

Item A1744. The composite material of any one of items A3-A863 or B2-B15 where the nanotube is a multi wall carbon nanotube and the second structural entity is silicon nitride.

Item A1745. The composite material of any one of items A3-A863 or B2-B15 where the nanotube is a multi wall carbon nanotube and the second structural entity is silicon nitrides (bulk and thin film).

Item A1746. The composite material of any one of items A3-A863 or B2-B15 where the nanotube is a multi wall carbon nanotube and the second structural entity is silver.

Item A1747. The composite material of any one of items A3-A863 or B2-B15 where the nanotube is a multi wall carbon nanotube and the second structural entity is single-layer boron nitride.

Item A1748. The composite material of any one of items A3-A863 or B2-B15 where the nanotube is a multi wall carbon nanotube and the second structural entity is single-layer graphene.

Item A1749. The composite material of any one of items A3-A863 or B2-B15 where the nanotube is a multi wall carbon nanotube and the second structural entity is sol-gel.

Item A1750. The composite material of any one of items A3-A863 or B2-B15 where the nanotube is a multi wall carbon nanotube and the second structural entity is soot.

Item A1751. The composite material of any one of items A3-A863 or B2-B15 where the nanotube is a multi wall carbon nanotube and the second structural entity is steel.

Item A1752. The composite material of any one of items A3-A863 or B2-B15 where the nanotube is a multi wall carbon nanotube and the second structural entity is steel fibers.

Item A1753. The composite material of any one of items A3-A863 or B2-B15 where the nanotube is a multi wall carbon nanotube and the second structural entity is super-plasticizer.

Item A1754. The composite material of any one of items A3-A863 or B2-B15 where the nanotube is a multi wall carbon nanotube and the second structural entity is super-plasticizers.

Item A1755. The composite material of any one of items A3-A863 or B2-B15 where the nanotube is a multi wall carbon nanotube and the second structural entity is talc.

Item A1756. The composite material of any one of items A3-A863 or B2-B15 where the nanotube is a multi wall carbon nanotube and the second structural entity is tantalum.

Item A1757. The composite material of any one of items A3-A863 or B2-B15 where the nanotube is a multi wall carbon nanotube and the second structural entity is thiol-functionalized graphene.

Item A1758. The composite material of any one of items A3-A863 or B2-B15 where the nanotube is a multi wall carbon nanotube and the second structural entity is titanium.

Item A1759. The composite material of any one of items A3-A863 or B2-B15 where the nanotube is a multi wall carbon nanotube and the second structural entity is titanium oxide.

Item A1760. The composite material of any one of items A3-A863 or B2-B15 where the nanotube is a multi wall carbon nanotube and the second structural entity is tooth cementum.

Item A1761. The composite material of any one of items A3-A863 or B2-B15 where the nanotube is a multi wall carbon nanotube and the second structural entity is tooth dentine.

Item A1762. The composite material of any one of items A3-A863 or B2-B15 where the nanotube is a multi wall carbon nanotube and the second structural entity is tooth enamel.

Item A1763. The composite material of any one of items A3-A863 or B2-B15 where the nanotube is a multi wall carbon nanotube and the second structural entity is transition metals.

Item A1764. The composite material of any one of items A3-A863 or B2-B15 where the nanotube is a multi wall carbon nanotube and the second structural entity is triple-layer boron nitride.

Item A1765. The composite material of any one of items A3-A863 or B2-B15 where the nanotube is a multi wall carbon nanotube and the second structural entity is triple-layer graphene.

Item A1766. The composite material of any one of items A3-A863 or B2-B15 where the nanotube is a multi wall carbon nanotube and the second structural entity is tungsten.

Item A1767. The composite material of any one of items A3-A863 or B2-B15 where the nanotube is a multi wall carbon nanotube and the second structural entity is tungsten carbide.

Item A1768. The composite material of any one of items A3-A863 or B2-B15 where the nanotube is a multi wall carbon nanotube and the second structural entity is ultrahard fullerite.

Item A1769. The composite material of any one of items A3-A863 or B2-B15 where the nanotube is a multi wall carbon nanotube and the second structural entity is water reducers.

Item A1770. The composite material of any one of items A3-A863 or B2-B15 where the nanotube is a multi wall carbon nanotube and the second structural entity is wood.

Item A1771. The composite material of any one of items A3-A863 or B2-B15 where the nanotube is a multi wall carbon nanotube and the second structural entity is zinc oxide.

Item A1772. The composite material of any one of items A3-A863 or B2-B15 where the nanotube is a multi wall carbon nanotube and the second structural entity is zirconia.

Item A1773. The composite material of any one of items A3-A863 or B2-B15 where the nanotube is a metallic carbon nanotube and the second structural entity is a carbon fibre.

Item A1774. The composite material of any one of items A3-A863 or B2-B15 where the nanotube is a metallic carbon nanotube and the second structural entity is boron nitride.

Item A1775. The composite material of any one of items A3-A863 or B2-B15 where the nanotube is a metallic carbon nanotube and the second structural entity is a ceramic.

Item A1776. The composite material of any one of items A3-A863 or B2-B15 where the nanotube is a metallic carbon nanotube and the second structural entity is graphene.

Item A1777. The composite material of any one of items A3-A863 or B2-B15 where the nanotube is a metallic carbon nanotube and the second structural entity is a metal.

Item A1778. The composite material of any one of items A3-A863 or B2-B15 where the nanotube is a metallic carbon nanotube and the second structural entity is a nucleic acid.

Item A1779. The composite material of any one of items A3-A863 or B2-B15 where the nanotube is a metallic carbon nanotube and the second structural entity is a polypeptide.

Item A1780. The composite material of any one of items A3-A863 or B2-B15 where the nanotube is a metallic carbon nanotube and the second structural entity is a cathode.

Item A1781. The composite material of any one of items A3-A863 or B2-B15 where the nanotube is a metallic carbon nanotube and the second structural entity is a metalised dielectric.

Item A1782. The composite material of any one of items A3-A863 or B2-B15 where the nanotube is a metallic carbon nanotube and the second structural entity is a peptide.

Item A1783. The composite material of any one of items A3-A863 or B2-B15 where the nanotube is a metallic carbon nanotube and the second structural entity is a protein.

Item A1784. The composite material of any one of items A3-A863 or B2-B15 where the nanotube is a metallic carbon nanotube and the second structural entity is a semiconductor.

Item A1785. The composite material of any one of items A3-A863 or B2-B15 where the nanotube is a metallic carbon nanotube and the second structural entity is a sensor.

Item A1786. The composite material of any one of items A3-A863 or B2-B15 where the nanotube is a metallic carbon nanotube and the second structural entity is aluminium.

Item A1787. The composite material of any one of items A3-A863 or B2-B15 where the nanotube is a metallic carbon nanotube and the second structural entity is an anode.

Item A1788. The composite material of any one of items A3-A863 or B2-B15 where the nanotube is a metallic carbon nanotube and the second structural entity is an antibody.

Item A1789. The composite material of any one of items A3-A863 or B2-B15 where the nanotube is a metallic carbon nanotube and the second structural entity is electrode.

Item A1790. The composite material of any one of items A3-A863 or B2-B15 where the nanotube is a metallic carbon nanotube and the second structural entity is boron nitride.

Item A1791. The composite material of any one of items A3-A863 or B2-B15 where the nanotube is a metallic carbon nanotube and the second structural entity is buckyball.

Item A1792. The composite material of any one of items A3-A863 or B2-B15 where the nanotube is a metallic carbon nanotube and the second structural entity is carbon nanofibres.

Item A1793. The composite material of any one of items A3-A863 or B2-B15 where the nanotube is a metallic carbon nanotube and the second structural entity is concrete.

Item A1794. The composite material of any one of items A3-A863 or B2-B15 where the nanotube is a metallic carbon nanotube and the second structural entity is glass fibre.

Item A1795. The composite material of any one of items A3-A863 or B2-B15 where the nanotube is a metallic carbon nanotube and the second structural entity is graphene oxide.

Item A1796. The composite material of any one of items A3-A863 or B2-B15 where the nanotube is a metallic carbon nanotube and the second structural entity is graphyne.

Item A1797. The composite material of any one of items A3-A863 or B2-B15 where the nanotube is a metallic carbon nanotube and the second structural entity is stainless steel.

Item A1798. The composite material of any one of items A3-A863 or B2-B15 where the nanotube is a metallic carbon nanotube and the second structural entity is a cathode.

Item A1799. The composite material of any one of items A3-A863 or B2-B15 where the nanotube is a metallic carbon nanotube and the second structural entity is a carbon polymer.

Item A1800. The composite material of any one of items A3-A863 or B2-B15 where the nanotube is a metallic carbon nanotube and the second structural entity is (Ag) silver.

Item A1801. The composite material of any one of items A3-A863 or B2-B15 where the nanotube is a metallic carbon nanotube and the second structural entity is (Al) aluminium.

Item A1802. The composite material of any one of items A3-A863 or B2-B15 where the nanotube is a metallic carbon nanotube and the second structural entity is (Au) gold.

Item A1803. The composite material of any one of items A3-A863 or B2-B15 where the nanotube is a metallic carbon nanotube and the second structural entity is (Cr) chromium.

Item A1804. The composite material of any one of items A3-A863 or B2-B15 where the nanotube is a metallic carbon nanotube and the second structural entity is (Cu) copper.

Item A1805. The composite material of any one of items A3-A863 or B2-B15 where the nanotube is a metallic carbon nanotube and the second structural entity is (Fe) steel and stainless steel.

Item A1806. The composite material of any one of items A3-A863 or B2-B15 where the nanotube is a metallic carbon nanotube and the second structural entity is (Mn) manganese.

Item A1807. The composite material of any one of items A3-A863 or B2-B15 where the nanotube is a metallic carbon nanotube and the second structural entity is (Mo) molybdenum.

Item A1808. The composite material of any one of items A3-A863 or B2-B15 where the nanotube is a metallic carbon nanotube and the second structural entity is (Ni) nickel.

Item A1809. The composite material of any one of items A3-A863 or B2-B15 where the nanotube is a metallic carbon nanotube and the second structural entity is (Pa) palladium.

Item A1810. The composite material of any one of items A3-A863 or B2-B15 where the nanotube is a metallic carbon nanotube and the second structural entity is (Pt) platinum.

Item A1811. The composite material of any one of items A3-A863 or B2-B15 where the nanotube is a metallic carbon nanotube and the second structural entity is (Ta) tantalum.

Item A1812. The composite material of any one of items A3-A863 or B2-B15 where the nanotube is a metallic carbon nanotube and the second structural entity is (Ti) titanium.

Item A1813. The composite material of any one of items A3-A863 or B2-B15 where the nanotube is a metallic carbon nanotube and the second structural entity is (Wo) Tungsten.

Item A1814. The composite material of any one of items A3-A863 or B2-B15 where the nanotube is a metallic carbon nanotube and the second structural entity is a battery.

Item A1815. The composite material of any one of items A3-A863 or B2-B15 where the nanotube is a metallic carbon nanotube and the second structural entity is a borosilicate.

Item A1816. The composite material of any one of items A3-A863 or B2-B15 where the nanotube is a metallic carbon nanotube and the second structural entity is a buckyball.

Item A1817. The composite material of any one of items A3-A863 or B2-B15 where the nanotube is a metallic carbon nanotube and the second structural entity is a buckytube.

Item A1818. The composite material of any one of items A3-A863 or B2-B15 where the nanotube is a metallic carbon nanotube and the second structural entity is a capacitator.

Item A1819. The composite material of any one of items A3-A863 or B2-B15 where the nanotube is a metallic carbon nanotube and the second structural entity is a carbon dome.

Item A1820. The composite material of any one of items A3-A863 or B2-B15 where the nanotube is a metallic carbon nanotube and the second structural entity is a carbon megatube.

Item A1821. The composite material of any one of items A3-A863 or B2-B15 where the nanotube is a metallic carbon nanotube and the second structural entity is a carbon nanofibre.

Item A1822. The composite material of any one of items A3-A863 or B2-B15 where the nanotube is a metallic carbon nanotube and the second structural entity is a carbon nanofoam.

Item A1823. The composite material of any one of items A3-A863 or B2-B15 where the nanotube is a metallic carbon nanotube and the second structural entity is a carbon nanothread.

Item A1824. The composite material of any one of items A3-A863 or B2-B15 where the nanotube is a metallic carbon nanotube and the second structural entity is a catalyst.

Item A1825. The composite material of any one of items A3-A863 or B2-B15 where the nanotube is a metallic carbon nanotube and the second structural entity is a ceramic material.

Item A1826. The composite material of any one of items A3-A863 or B2-B15 where the nanotube is a metallic carbon nanotube and the second structural entity is a composite material.

Item A1827. The composite material of any one of items A3-A863 or B2-B15 where the nanotube is a metallic carbon nanotube and the second structural entity is a conductor.

Item A1828. The composite material of any one of items A3-A863 or B2-B15 where the nanotube is a metallic carbon nanotube and the second structural entity is a covalent crystal.

Item A1829. The composite material of any one of items A3-A863 or B2-B15 where the nanotube is a metallic carbon nanotube and the second structural entity is a crystal.

Item A1830. The composite material of any one of items A3-A863 or B2-B15 where the nanotube is a metallic carbon nanotube and the second structural entity is a crystalline material.

Item A1831. The composite material of any one of items A3-A863 or B2-B15 where the nanotube is a metallic carbon nanotube and the second structural entity is a defect-free graphene sheet.

Item A1832. The composite material of any one of items A3-A863 or B2-B15 where the nanotube is a metallic carbon nanotube and the second structural entity is a dielectric material.

Item A1833. The composite material of any one of items A3-A863 or B2-B15 where the nanotube is a metallic carbon nanotube and the second structural entity is a diode.

Item A1834. The composite material of any one of items A3-A863 or B2-B15 where the nanotube is a metallic carbon nanotube and the second structural entity is a dodecahedrane.

Item A1835. The composite material of any one of items A3-A863 or B2-B15 where the nanotube is a metallic carbon nanotube and the second structural entity is a doped glass.

Item A1836. The composite material of any one of items A3-A863 or B2-B15 where the nanotube is a metallic carbon nanotube and the second structural entity is a fibre.

Item A1837. The composite material of any one of items A3-A863 or B2-B15 where the nanotube is a metallic carbon nanotube and the second structural entity is a fullerite.

Item A1838. The composite material of any one of items A3-A863 or B2-B15 where the nanotube is a metallic carbon nanotube and the second structural entity is a fused silica.

Item A1839. The composite material of any one of items A3-A863 or B2-B15 where the nanotube is a metallic carbon nanotube and the second structural entity is a glass fibre.

Item A1840. The composite material of any one of items A3-A863 or B2-B15 where the nanotube is a metallic carbon nanotube and the second structural entity is a glue.

Item A1841. The composite material of any one of items A3-A863 or B2-B15 where the nanotube is a metallic carbon nanotube and the second structural entity is a green ceramic.

Item A1842. The composite material of any one of items A3-A863 or B2-B15 where the nanotube is a metallic carbon nanotube and the second structural entity is a lanthanides.

Item A1843. The composite material of any one of items A3-A863 or B2-B15 where the nanotube is a metallic carbon nanotube and the second structural entity is a machinable ceramic.

Item A1844. The composite material of any one of items A3-A863 or B2-B15 where the nanotube is a metallic carbon nanotube and the second structural entity is a metal alloy.

Item A1845. The composite material of any one of items A3-A863 or B2-B15 where the nanotube is a metallic carbon nanotube and the second structural entity is a metallised ceramic.

Item A1846. The composite material of any one of items A3-A863 or B2-B15 where the nanotube is a metallic carbon nanotube and the second structural entity is a metalloid.

Item A1847. The composite material of any one of items A3-A863 or B2-B15 where the nanotube is a metallic carbon nanotube and the second structural entity is a mineral.

Item A1848. The composite material of any one of items A3-A863 or B2-B15 where the nanotube is a metallic carbon nanotube and the second structural entity is a non-covalent crystal.

Item A1849. The composite material of any one of items A3-A863 or B2-B15 where the nanotube is a metallic carbon nanotube and the second structural entity is a piezoelectric material.

Item A1850. The composite material of any one of items A3-A863 or B2-B15 where the nanotube is a metallic carbon nanotube and the second structural entity is a platinum group metal.

Item A1851. The composite material of any one of items A3-A863 or B2-B15 where the nanotube is a metallic carbon nanotube and the second structural entity is a post-transition metal.

Item A1852. The composite material of any one of items A3-A863 or B2-B15 where the nanotube is a metallic carbon nanotube and the second structural entity is a rare earth element.

Item A1853. The composite material of any one of items A3-A863 or B2-B15 where the nanotube is a metallic carbon nanotube and the second structural entity is a sapphire.

Item A1854. The composite material of any one of items A3-A863 or B2-B15 where the nanotube is a metallic carbon nanotube and the second structural entity is a silicon nitride.

Item A1855. The composite material of any one of items A3-A863 or B2-B15 where the nanotube is a metallic carbon nanotube and the second structural entity is a single crystal fiber.

Item A1856. The composite material of any one of items A3-A863 or B2-B15 where the nanotube is a metallic carbon nanotube and the second structural entity is a sol-gel.

Item A1857. The composite material of any one of items A3-A863 or B2-B15 where the nanotube is a metallic carbon nanotube and the second structural entity is a synthetic diamond.

Item A1858. The composite material of any one of items A3-A863 or B2-B15 where the nanotube is a metallic carbon nanotube and the second structural entity is a transition metal.

Item A1859. The composite material of any one of items A3-A863 or B2-B15 where the nanotube is a metallic carbon nanotube and the second structural entity is a tungsten carbide.

Item A1860. The composite material of any one of items A3-A863 or B2-B15 where the nanotube is a metallic carbon nanotube and the second structural entity is actinides.

Item A1861. The composite material of any one of items A3-A863 or B2-B15 where the nanotube is a metallic carbon nanotube and the second structural entity is activated carbon.

Item A1862. The composite material of any one of items A3-A863 or B2-B15 where the nanotube is a metallic carbon nanotube and the second structural entity is aggregated diamonds.

Item A1863. The composite material of any one of items A3-A863 or B2-B15 where the nanotube is a metallic carbon nanotube and the second structural entity is air entrainers.

Item A1864. The composite material of any one of items A3-A863 or B2-B15 where the nanotube is a metallic carbon nanotube and the second structural entity is alkali-silica reactivity inhibitors.

Item A1865. The composite material of any one of items A3-A863 or B2-B15 where the nanotube is a metallic carbon nanotube and the second structural entity is alloys.

Item A1866. The composite material of any one of items A3-A863 or B2-B15 where the nanotube is a metallic carbon nanotube and the second structural entity is alumina.

Item A1867. The composite material of any one of items A3-A863 or B2-B15 where the nanotube is a metallic carbon nanotube and the second structural entity is alumina trihydrate.

Item A1868. The composite material of any one of items A3-A863 or B2-B15 where the nanotube is a metallic carbon nanotube and the second structural entity is aluminum boride.

Item A1869. The composite material of any one of items A3-A863 or B2-B15 where the nanotube is a metallic carbon nanotube and the second structural entity is aluminum fibers.

Item A1870. The composite material of any one of items A3-A863 or B2-B15 where the nanotube is a metallic carbon nanotube and the second structural entity is aluminum oxide.

Item A1871. The composite material of any one of items A3-A863 or B2-B15 where the nanotube is a metallic carbon nanotube and the second structural entity is aluminum trihydroxide.

Item A1872. The composite material of any one of items A3-A863 or B2-B15 where the nanotube is a metallic carbon nanotube and the second structural entity is amalgams.

Item A1873. The composite material of any one of items A3-A863 or B2-B15 where the nanotube is a metallic carbon nanotube and the second structural entity is amorphous carbon.

Item A1874. The composite material of any one of items A3-A863 or B2-B15 where the nanotube is a metallic carbon nanotube and the second structural entity is actinides.

Item A1875. The composite material of any one of items A3-A863 or B2-B15 where the nanotube is a metallic carbon nanotube and the second structural entity is an amalgam.

Item A1876. The composite material of any one of items A3-A863 or B2-B15 where the nanotube is a metallic carbon nanotube and the second structural entity is an endohedral fullerene.

Item A1877. The composite material of any one of items A3-A863 or B2-B15 where the nanotube is a metallic carbon nanotube and the second structural entity is an insulator.

Item A1878. The composite material of any one of items A3-A863 or B2-B15 where the nanotube is a metallic carbon nanotube and the second structural entity is an intermetallic.

Item A1879. The composite material of any one of items A3-A863 or B2-B15 where the nanotube is a metallic carbon nanotube and the second structural entity is an ionic crystal.

Item A1880. The composite material of any one of items A3-A863 or B2-B15 where the nanotube is a metallic carbon nanotube and the second structural entity is an organic material.

Item A1881. The composite material of any one of items A3-A863 or B2-B15 where the nanotube is a metallic carbon nanotube and the second structural entity is anthracite.

Item A1882. The composite material of any one of items A3-A863 or B2-B15 where the nanotube is a metallic carbon nanotube and the second structural entity is aramid.

Item A1883. The composite material of any one of items A3-A863 or B2-B15 where the nanotube is a metallic carbon nanotube and the second structural entity is asbestos.

Item A1884. The composite material of any one of items A3-A863 or B2-B15 where the nanotube is a metallic carbon nanotube and the second structural entity is barium.

Item A1885. The composite material of any one of items A3-A863 or B2-B15 where the nanotube is a metallic carbon nanotube and the second structural entity is bone.

Item A1886. The composite material of any one of items A3-A863 or B2-B15 where the nanotube is a metallic carbon nanotube and the second structural entity is boron.

Item A1887. The composite material of any one of items A3-A863 or B2-B15 where the nanotube is a metallic carbon nanotube and the second structural entity is boron nitride nanoscroll.

Item A1888. The composite material of any one of items A3-A863 or B2-B15 where the nanotube is a metallic carbon nanotube and the second structural entity is boron nitride oxide.

Item A1889. The composite material of any one of items A3-A863 or B2-B15 where the nanotube is a metallic carbon nanotube and the second structural entity is brass.

Item A1890. The composite material of any one of items A3-A863 or B2-B15 where the nanotube is a metallic carbon nanotube and the second structural entity is brass fibers.

Item A1891. The composite material of any one of items A3-A863 or B2-B15 where the nanotube is a metallic carbon nanotube and the second structural entity is buckminsterfullerene.

Item A1892. The composite material of any one of items A3-A863 or B2-B15 where the nanotube is a metallic carbon nanotube and the second structural entity is bucky paper.

Item A1893. The composite material of any one of items A3-A863 or B2-B15 where the nanotube is a metallic carbon nanotube and the second structural entity is buckyball clusters.

Item A1894. The composite material of any one of items A3-A863 or B2-B15 where the nanotube is a metallic carbon nanotube and the second structural entity is buckypaper.

Item A1895. The composite material of any one of items A3-A863 or B2-B15 where the nanotube is a metallic carbon nanotube and the second structural entity is buckytube.

Item A1896. The composite material of any one of items A3-A863 or B2-B15 where the nanotube is a metallic carbon nanotube and the second structural entity is calcium carbonite.

Item A1897. The composite material of any one of items A3-A863 or B2-B15 where the nanotube is a metallic carbon nanotube and the second structural entity is calcium metasilicate.

Item A1898. The composite material of any one of items A3-A863 or B2-B15 where the nanotube is a metallic carbon nanotube and the second structural entity is calcium sulfate.

Item A1899. The composite material of any one of items A3-A863 or B2-B15 where the nanotube is a metallic carbon nanotube and the second structural entity is calcium sulphate.

Item A1900. The composite material of any one of items A3-A863 or B2-B15 where the nanotube is a metallic carbon nanotube and the second structural entity is carbon black.

Item A1901. The composite material of any one of items A3-A863 or B2-B15 where the nanotube is a metallic carbon nanotube and the second structural entity is carbon fiber.

Item A1902. The composite material of any one of items A3-A863 or B2-B15 where the nanotube is a metallic carbon nanotube and the second structural entity is carbon fibers.

Item A1903. The composite material of any one of items A3-A863 or B2-B15 where the nanotube is a metallic carbon nanotube and the second structural entity is carbon megatubes.

Item A1904. The composite material of any one of items A3-A863 or B2-B15 where the nanotube is a metallic carbon nanotube and the second structural entity is carbon nanoonions.

Item A1905. The composite material of any one of items A3-A863 or B2-B15 where the nanotube is a metallic carbon nanotube and the second structural entity is carbon nanobuds.

Item A1906. The composite material of any one of items A3-A863 or B2-B15 where the nanotube is a metallic carbon nanotube and the second structural entity is carbon nanofiber.

Item A1907. The composite material of any one of items A3-A863 or B2-B15 where the nanotube is a metallic carbon nanotube and the second structural entity is carbon nanofoam.

Item A1908. The composite material of any one of items A3-A863 or B2-B15 where the nanotube is a metallic carbon nanotube and the second structural entity is carbon nanothread.

Item A1909. The composite material of any one of items A3-A863 or B2-B15 where the nanotube is a metallic carbon nanotube and the second structural entity is carbon/diamond nanothread.

Item A1910. The composite material of any one of items A3-A863 or B2-B15 where the nanotube is a metallic carbon nanotube and the second structural entity is cellulose fibers.

Item A1911. The composite material of any one of items A3-A863 or B2-B15 where the nanotube is a metallic carbon nanotube and the second structural entity is cellulose nanofibers (e.g. curran).

Item A1912. The composite material of any one of items A3-A863 or B2-B15 where the nanotube is a metallic carbon nanotube and the second structural entity is cellulose nanowhiskers.

Item A1913. The composite material of any one of items A3-A863 or B2-B15 where the nanotube is a metallic carbon nanotube and the second structural entity is chemical admixtures.

Item A1914. The composite material of any one of items A3-A863 or B2-B15 where the nanotube is a metallic carbon nanotube and the second structural entity is chlorographene.

Item A1915. The composite material of any one of items A3-A863 or B2-B15 where the nanotube is a metallic carbon nanotube and the second structural entity is chromium.

Item A1916. The composite material of any one of items A3-A863 or B2-B15 where the nanotube is a metallic carbon nanotube and the second structural entity is clay.

Item A1917. The composite material of any one of items A3-A863 or B2-B15 where the nanotube is a metallic carbon nanotube and the second structural entity is coal.

Item A1918. The composite material of any one of items A3-A863 or B2-B15 where the nanotube is a metallic carbon nanotube and the second structural entity is coated boron nitride.

Item A1919. The composite material of any one of items A3-A863 or B2-B15 where the nanotube is a metallic carbon nanotube and the second structural entity is coated graphene.

Item A1920. The composite material of any one of items A3-A863 or B2-B15 where the nanotube is a metallic carbon nanotube and the second structural entity is coloring admixtures.

Item A1921. The composite material of any one of items A3-A863 or B2-B15 where the nanotube is a metallic carbon nanotube and the second structural entity is composite materials.

Item A1922. The composite material of any one of items A3-A863 or B2-B15 where the nanotube is a metallic carbon nanotube and the second structural entity is concrete admixtures.

Item A1923. The composite material of any one of items A3-A863 or B2-B15 where the nanotube is a metallic carbon nanotube and the second structural entity is COOH-functionalized graphene.

Item A1924. The composite material of any one of items A3-A863 or B2-B15 where the nanotube is a metallic carbon nanotube and the second structural entity is copper.

Item A1925. The composite material of any one of items A3-A863 or B2-B15 where the nanotube is a metallic carbon nanotube and the second structural entity is corrosion inhibitors.

Item A1926. The composite material of any one of items A3-A863 or B2-B15 where the nanotube is a metallic carbon nanotube and the second structural entity is covalent crystals.

Item A1927. The composite material of any one of items A3-A863 or B2-B15 where the nanotube is a metallic carbon nanotube and the second structural entity is crystal.

Item A1928. The composite material of any one of items A3-A863 or B2-B15 where the nanotube is a metallic carbon nanotube and the second structural entity is crystalline materials.

Item A1929. The composite material of any one of items A3-A863 or B2-B15 where the nanotube is a metallic carbon nanotube and the second structural entity is diamond.

Item A1930. The composite material of any one of items A3-A863 or B2-B15 where the nanotube is a metallic carbon nanotube and the second structural entity is diamond-like carbon.

Item A1931. The composite material of any one of items A3-A863 or B2-B15 where the nanotube is a metallic carbon nanotube and the second structural entity is dispersants.

Item A1932. The composite material of any one of items A3-A863 or B2-B15 where the nanotube is a metallic carbon nanotube and the second structural entity is dodecahedrane.

Item A1933. The composite material of any one of items A3-A863 or B2-B15 where the nanotube is a metallic carbon nanotube and the second structural entity is double-layer boron nitride.

Item A1934. The composite material of any one of items A3-A863 or B2-B15 where the nanotube is a metallic carbon nanotube and the second structural entity is double-layer graphene.

Item A1935. The composite material of any one of items A3-A863 or B2-B15 where the nanotube is a metallic carbon nanotube and the second structural entity is e-glass.

Item A1936. The composite material of any one of items A3-A863 or B2-B15 where the nanotube is a metallic carbon nanotube and the second structural entity is elastomers.

Item A1937. The composite material of any one of items A3-A863 or B2-B15 where the nanotube is a metallic carbon nanotube and the second structural entity is endohedral fullerenes.

Item A1938. The composite material of any one of items A3-A863 or B2-B15 where the nanotube is a metallic carbon nanotube and the second structural entity is exfoliated graphite.

Item A1939. The composite material of any one of items A3-A863 or B2-B15 where the nanotube is a metallic carbon nanotube and the second structural entity is exfoliated silicate.

Item A1940. The composite material of any one of items A3-A863 or B2-B15 where the nanotube is a metallic carbon nanotube and the second structural entity is extruded activated carbon.

Item A1941. The composite material of any one of items A3-A863 or B2-B15 where the nanotube is a metallic carbon nanotube and the second structural entity is fibres.

Item A1942. The composite material of any one of items A3-A863 or B2-B15 where the nanotube is a metallic carbon nanotube and the second structural entity is flourinated boron nitride.

Item A1943. The composite material of any one of items A3-A863 or B2-B15 where the nanotube is a metallic carbon nanotube and the second structural entity is flourinated graphene.

Item A1944. The composite material of any one of items A3-A863 or B2-B15 where the nanotube is a metallic carbon nanotube and the second structural entity is fluorographene.

Item A1945. The composite material of any one of items A3-A863 or B2-B15 where the nanotube is a metallic carbon nanotube and the second structural entity is fly ash.

Item A1946. The composite material of any one of items A3-A863 or B2-B15 where the nanotube is a metallic carbon nanotube and the second structural entity is fullerene rings.

Item A1947. The composite material of any one of items A3-A863 or B2-B15 where the nanotube is a metallic carbon nanotube and the second structural entity is fullerenes.

Item A1948. The composite material of any one of items A3-A863 or B2-B15 where the nanotube is a metallic carbon nanotube and the second structural entity is fullerite.

Item A1949. The composite material of any one of items A3-A863 or B2-B15 where the nanotube is a metallic carbon nanotube and the second structural entity is functionalized boron nitride.

Item A1950. The composite material of any one of items A3-A863 or B2-B15 where the nanotube is a metallic carbon nanotube and the second structural entity is functionalized graphene.

Item A1951. The composite material of any one of items A3-A863 or B2-B15 where the nanotube is a metallic carbon nanotube and the second structural entity is fused silica.

Item A1952. The composite material of any one of items A3-A863 or B2-B15 where the nanotube is a metallic carbon nanotube and the second structural entity is gallium arsenide.

Item A1953. The composite material of any one of items A3-A863 or B2-B15 where the nanotube is a metallic carbon nanotube and the second structural entity is gallium nitride.

Item A1954. The composite material of any one of items A3-A863 or B2-B15 where the nanotube is a metallic carbon nanotube and the second structural entity is gedodesic carbon domes.

Item A1955. The composite material of any one of items A3-A863 or B2-B15 where the nanotube is a metallic carbon nanotube and the second structural entity is germanium.

Item A1956. The composite material of any one of items A3-A863 or B2-B15 where the nanotube is a metallic carbon nanotube and the second structural entity is glass.

Item A1957. The composite material of any one of items A3-A863 or B2-B15 where the nanotube is a metallic carbon nanotube and the second structural entity is glass microsphere.

Item A1958. The composite material of any one of items A3-A863 or B2-B15 where the nanotube is a metallic carbon nanotube and the second structural entity is glass ribbons.

Item A1959. The composite material of any one of items A3-A863 or B2-B15 where the nanotube is a metallic carbon nanotube and the second structural entity is glass spheres.

Item A1960. The composite material of any one of items A3-A863 or B2-B15 where the nanotube is a metallic carbon nanotube and the second structural entity is glasses.

Item A1961. The composite material of any one of items A3-A863 or B2-B15 where the nanotube is a metallic carbon nanotube and the second structural entity is glassy carbon.

Item A1962. The composite material of any one of items A3-A863 or B2-B15 where the nanotube is a metallic carbon nanotube and the second structural entity is glue.

Item A1963. The composite material of any one of items A3-A863 or B2-B15 where the nanotube is a metallic carbon nanotube and the second structural entity is gold.

Item A1964. The composite material of any one of items A3-A863 or B2-B15 where the nanotube is a metallic carbon nanotube and the second structural entity is gold particles.

Item A1965. The composite material of any one of items A3-A863 or B2-B15 where the nanotube is a metallic carbon nanotube and the second structural entity is granular activated carbon.

Item A1966. The composite material of any one of items A3-A863 or B2-B15 where the nanotube is a metallic carbon nanotube and the second structural entity is graphane.

Item A1967. The composite material of any one of items A3-A863 or B2-B15 where the nanotube is a metallic carbon nanotube and the second structural entity is graphdiyne.

Item A1968. The composite material of any one of items A3-A863 or B2-B15 where the nanotube is a metallic carbon nanotube and the second structural entity is graphene.

Item A1969. The composite material of any one of items A3-A863 or B2-B15 where the nanotube is a metallic carbon nanotube and the second structural entity is graphite.

Item A1970. The composite material of any one of items A3-A863 or B2-B15 where the nanotube is a metallic carbon nanotube and the second structural entity is graphone.

Item A1971. The composite material of any one of items A3-A863 or B2-B15 where the nanotube is a metallic carbon nanotube and the second structural entity is hardened steel.

Item A1972. The composite material of any one of items A3-A863 or B2-B15 where the nanotube is a metallic carbon nanotube and the second structural entity is high range water reducers.

Item A1973. The composite material of any one of items A3-A863 or B2-B15 where the nanotube is a metallic carbon nanotube and the second structural entity is hydrous magnesium silicate.

Item A1974. The composite material of any one of items A3-A863 or B2-B15 where the nanotube is a metallic carbon nanotube and the second structural entity is hyperdiamond.

Item A1975. The composite material of any one of items A3-A863 or B2-B15 where the nanotube is a metallic carbon nanotube and the second structural entity is hyperdiamonds.

Item A1976. The composite material of any one of items A3-A863 or B2-B15 where the nanotube is a metallic carbon nanotube and the second structural entity is imperfect boron nitride.

Item A1977. The composite material of any one of items A3-A863 or B2-B15 where the nanotube is a metallic carbon nanotube and the second structural entity is imperfect graphene.

Item A1978. The composite material of any one of items A3-A863 or B2-B15 where the nanotube is a metallic carbon nanotube and the second structural entity is intermetallics.

Item A1979. The composite material of any one of items A3-A863 or B2-B15 where the nanotube is a metallic carbon nanotube and the second structural entity is ionic crystals.

Item A1980. The composite material of any one of items A3-A863 or B2-B15 where the nanotube is a metallic carbon nanotube and the second structural entity is iron.

Item A1981. The composite material of any one of items A3-A863 or B2-B15 where the nanotube is a metallic carbon nanotube and the second structural entity is iron oxides.

Item A1982. The composite material of any one of items A3-A863 or B2-B15 where the nanotube is a metallic carbon nanotube and the second structural entity is kevlar.

Item A1983. The composite material of any one of items A3-A863 or B2-B15 where the nanotube is a metallic carbon nanotube and the second structural entity is lanthanides.

Item A1984. The composite material of any one of items A3-A863 or B2-B15 where the nanotube is a metallic carbon nanotube and the second structural entity is lead zirconium titanate.

Item A1985. The composite material of any one of items A3-A863 or B2-B15 where the nanotube is a metallic carbon nanotube and the second structural entity is lignin.

Item A1986. The composite material of any one of items A3-A863 or B2-B15 where the nanotube is a metallic carbon nanotube and the second structural entity is lignite.

Item A1987. The composite material of any one of items A3-A863 or B2-B15 where the nanotube is a metallic carbon nanotube and the second structural entity is lithium niobate.

Item A1988. The composite material of any one of items A3-A863 or B2-B15 where the nanotube is a metallic carbon nanotube and the second structural entity is lithium niobates.

Item A1989. The composite material of any one of items A3-A863 or B2-B15 where the nanotube is a metallic carbon nanotube and the second structural entity is lonsdaleite.

Item A1990. The composite material of any one of items A3-A863 or B2-B15 where the nanotube is a metallic carbon nanotube and the second structural entity is magnesium dihydroxide.

Item A1991. The composite material of any one of items A3-A863 or B2-B15 where the nanotube is a metallic carbon nanotube and the second structural entity is magnesium oxide.

Item A1992. The composite material of any one of items A3-A863 or B2-B15 where the nanotube is a metallic carbon nanotube and the second structural entity is manganese.

Item A1993. The composite material of any one of items A3-A863 or B2-B15 where the nanotube is a metallic carbon nanotube and the second structural entity is melamine sulfonate superplasticisers.

Item A1994. The composite material of any one of items A3-A863 or B2-B15 where the nanotube is a metallic carbon nanotube and the second structural entity is metal ions.

Item A1995. The composite material of any one of items A3-A863 or B2-B15 where the nanotube is a metallic carbon nanotube and the second structural entity is metal oxide.

Item A1996. The composite material of any one of items A3-A863 or B2-B15 where the nanotube is a metallic carbon nanotube and the second structural entity is metallised ceramic.

Item A1997. The composite material of any one of items A3-A863 or B2-B15 where the nanotube is a metallic carbon nanotube and the second structural entity is metalloids.

Item A1998. The composite material of any one of items A3-A863 or B2-B15 where the nanotube is a metallic carbon nanotube and the second structural entity is metals.

Item A1999. The composite material of any one of items A3-A863 or B2-B15 where the nanotube is a metallic carbon nanotube and the second structural entity is mica.

Item A2000. The composite material of any one of items A3-A863 or B2-B15 where the nanotube is a metallic carbon nanotube and the second structural entity is mineral.

Item A2001. The composite material of any one of items A3-A863 or B2-B15 where the nanotube is a metallic carbon nanotube and the second structural entity is mineral admixtures.

Item A2002. The composite material of any one of items A3-A863 or B2-B15 where the nanotube is a metallic carbon nanotube and the second structural entity is molybdenum.

Item A2003. The composite material of any one of items A3-A863 or B2-B15 where the nanotube is a metallic carbon nanotube and the second structural entity is montmorrilonite nanoclays.

Item A2004. The composite material of any one of items A3-A863 or B2-B15 where the nanotube is a metallic carbon nanotube and the second structural entity is multi-layer boron nitride.

Item A2005. The composite material of any one of items A3-A863 or B2-B15 where the nanotube is a metallic carbon nanotube and the second structural entity is multi-layer graphene.

Item A2006. The composite material of any one of items A3-A863 or B2-B15 where the nanotube is a metallic carbon nanotube and the second structural entity is nanochain.

Item A2007. The composite material of any one of items A3-A863 or B2-B15 where the nanotube is a metallic carbon nanotube and the second structural entity is nanocrystal.

Item A2008. The composite material of any one of items A3-A863 or B2-B15 where the nanotube is a metallic carbon nanotube and the second structural entity is nanowire.

Item A2009. The composite material of any one of items A3-A863 or B2-B15 where the nanotube is a metallic carbon nanotube and the second structural entity is naphthalene.

Item A2010. The composite material of any one of items A3-A863 or B2-B15 where the nanotube is a metallic carbon nanotube and the second structural entity is Natural pozzolans (such as the volcanic ash used in Roman concrete).

Item A2011. The composite material of any one of items A3-A863 or B2-B15 where the nanotube is a metallic carbon nanotube and the second structural entity is NH2-functionalized graphene.

Item A2012. The composite material of any one of items A3-A863 or B2-B15 where the nanotube is a metallic carbon nanotube and the second structural entity is nickel.

Item A2013. The composite material of any one of items A3-A863 or B2-B15 where the nanotube is a metallic carbon nanotube and the second structural entity is non-covalent crystal.

Item A2014. The composite material of any one of items A3-A863 or B2-B15 where the nanotube is a metallic carbon nanotube and the second structural entity is nylon.

Item A2015. The composite material of any one of items A3-A863 or B2-B15 where the nanotube is a metallic carbon nanotube and the second structural entity is OH-functionalized graphene.

Item A2016. The composite material of any one of items A3-A863 or B2-B15 where the nanotube is a metallic carbon nanotube and the second structural entity is palladium.

Item A2017. The composite material of any one of items A3-A863 or B2-B15 where the nanotube is a metallic carbon nanotube and the second structural entity is pencil lead.

Item A2018. The composite material of any one of items A3-A863 or B2-B15 where the nanotube is a metallic carbon nanotube and the second structural entity is perfect boron nitride.

Item A2019. The composite material of any one of items A3-A863 or B2-B15 where the nanotube is a metallic carbon nanotube and the second structural entity is perfect graphene.

Item A2020. The composite material of any one of items A3-A863 or B2-B15 where the nanotube is a metallic carbon nanotube and the second structural entity is plasticizers.

Item A2021. The composite material of any one of items A3-A863 or B2-B15 where the nanotube is a metallic carbon nanotube and the second structural entity is platinum.

Item A2022. The composite material of any one of items A3-A863 or B2-B15 where the nanotube is a metallic carbon nanotube and the second structural entity is platinum group metals.

Item A2023. The composite material of any one of items A3-A863 or B2-B15 where the nanotube is a metallic carbon nanotube and the second structural entity is post-transition metals.

Item A2024. The composite material of any one of items A3-A863 or B2-B15 where the nanotube is a metallic carbon nanotube and the second structural entity is powdered activated carbon.

Item A2025. The composite material of any one of items A3-A863 or B2-B15 where the nanotube is a metallic carbon nanotube and the second structural entity is pozzolans and other cementitious materials.

Item A2026. The composite material of any one of items A3-A863 or B2-B15 where the nanotube is a metallic carbon nanotube and the second structural entity is prismane.

Item A2027. The composite material of any one of items A3-A863 or B2-B15 where the nanotube is a metallic carbon nanotube and the second structural entity is pristine boron nitride.

Item A2028. The composite material of any one of items A3-A863 or B2-B15 where the nanotube is a metallic carbon nanotube and the second structural entity is pristine graphene.

Item A2029. The composite material of any one of items A3-A863 or B2-B15 where the nanotube is a metallic carbon nanotube and the second structural entity is pyrolytic graphite.

Item A2030. The composite material of any one of items A3-A863 or B2-B15 where the nanotube is a metallic carbon nanotube and the second structural entity is quantum dots.

Item A2031. The composite material of any one of items A3-A863 or B2-B15 where the nanotube is a metallic carbon nanotube and the second structural entity is rare earth elements.

Item A2032. The composite material of any one of items A3-A863 or B2-B15 where the nanotube is a metallic carbon nanotube and the second structural entity is reduced boron nitride oxide.

Item A2033. The composite material of any one of items A3-A863 or B2-B15 where the nanotube is a metallic carbon nanotube and the second structural entity is reduced graphene oxide.

Item A2034. The composite material of any one of items A3-A863 or B2-B15 where the nanotube is a metallic carbon nanotube and the second structural entity is reduced graphyne.

Item A2035. The composite material of any one of items A3-A863 or B2-B15 where the nanotube is a metallic carbon nanotube and the second structural entity is rubber.

Item A2036. The composite material of any one of items A3-A863 or B2-B15 where the nanotube is a metallic carbon nanotube and the second structural entity is s-glass.

Item A2037. The composite material of any one of items A3-A863 or B2-B15 where the nanotube is a metallic carbon nanotube and the second structural entity is sapphire.

Item A2038. The composite material of any one of items A3-A863 or B2-B15 where the nanotube is a metallic carbon nanotube and the second structural entity is set accelerators.

Item A2039. The composite material of any one of items A3-A863 or B2-B15 where the nanotube is a metallic carbon nanotube and the second structural entity is set retarders.

Item A2040. The composite material of any one of items A3-A863 or B2-B15 where the nanotube is a metallic carbon nanotube and the second structural entity is shrinkage control admixtures.

Item A2041. The composite material of any one of items A3-A863 or B2-B15 where the nanotube is a metallic carbon nanotube and the second structural entity is silica.

Item A2042. The composite material of any one of items A3-A863 or B2-B15 where the nanotube is a metallic carbon nanotube and the second structural entity is silica fume.

Item A2043. The composite material of any one of items A3-A863 or B2-B15 where the nanotube is a metallic carbon nanotube and the second structural entity is silica gel.

Item A2044. The composite material of any one of items A3-A863 or B2-B15 where the nanotube is a metallic carbon nanotube and the second structural entity is silicon.

Item A2045. The composite material of any one of items A3-A863 or B2-B15 where the nanotube is a metallic carbon nanotube and the second structural entity is silicon carbide.

Item A2046. The composite material of any one of items A3-A863 or B2-B15 where the nanotube is a metallic carbon nanotube and the second structural entity is silicon dioxide.

Item A2047. The composite material of any one of items A3-A863 or B2-B15 where the nanotube is a metallic carbon nanotube and the second structural entity is silicon nitride.

Item A2048. The composite material of any one of items A3-A863 or B2-B15 where the nanotube is a metallic carbon nanotube and the second structural entity is silicon nitrides (bulk and thin film).

Item A2049. The composite material of any one of items A3-A863 or B2-B15 where the nanotube is a metallic carbon nanotube and the second structural entity is silver.

Item A2050. The composite material of any one of items A3-A863 or B2-B15 where the nanotube is a metallic carbon nanotube and the second structural entity is single-layer boron nitride.

Item A2051. The composite material of any one of items A3-A863 or B2-B15 where the nanotube is a metallic carbon nanotube and the second structural entity is single-layer graphene.

Item A2052. The composite material of any one of items A3-A863 or B2-B15 where the nanotube is a metallic carbon nanotube and the second structural entity is sol-gel.

Item A2053. The composite material of any one of items A3-A863 or B2-B15 where the nanotube is a metallic carbon nanotube and the second structural entity is soot.

Item A2054. The composite material of any one of items A3-A863 or B2-B15 where the nanotube is a metallic carbon nanotube and the second structural entity is steel.

Item A2055. The composite material of any one of items A3-A863 or B2-B15 where the nanotube is a metallic carbon nanotube and the second structural entity is steel fibers.

Item A2056. The composite material of any one of items A3-A863 or B2-B15 where the nanotube is a metallic carbon nanotube and the second structural entity is superplasticizer.

Item A2057. The composite material of any one of items A3-A863 or B2-B15 where the nanotube is a metallic carbon nanotube and the second structural entity is superplasticizers.

Item A2058. The composite material of any one of items A3-A863 or B2-B15 where the nanotube is a metallic carbon nanotube and the second structural entity is talc.

Item A2059. The composite material of any one of items A3-A863 or B2-B15 where the nanotube is a metallic carbon nanotube and the second structural entity is tantalum.

Item A2060. The composite material of any one of items A3-A863 or B2-B15 where the nanotube is a metallic carbon nanotube and the second structural entity is thiol-functionalized graphene.

Item A2061. The composite material of any one of items A3-A863 or B2-B15 where the nanotube is a metallic carbon nanotube and the second structural entity is titanium.

Item A2062. The composite material of any one of items A3-A863 or B2-B15 where the nanotube is a metallic carbon nanotube and the second structural entity is titanium oxide.

Item A2063. The composite material of any one of items A3-A863 or B2-B15 where the nanotube is a metallic carbon nanotube and the second structural entity is tooth cementum.

Item A2064. The composite material of any one of items A3-A863 or B2-B15 where the nanotube is a metallic carbon nanotube and the second structural entity is tooth dentine.

Item A2065. The composite material of any one of items A3-A863 or B2-B15 where the nanotube is a metallic carbon nanotube and the second structural entity is tooth enamel.

Item A2066. The composite material of any one of items A3-A863 or B2-B15 where the nanotube is a metallic carbon nanotube and the second structural entity is transition metals.

Item A2067. The composite material of any one of items A3-A863 or B2-B15 where the nanotube is a metallic carbon nanotube and the second structural entity is triple-layer boron nitride.

Item A2068. The composite material of any one of items A3-A863 or B2-B15 where the nanotube is a metallic carbon nanotube and the second structural entity is triple-layer graphene.

Item A2069. The composite material of any one of items A3-A863 or B2-B15 where the nanotube is a metallic carbon nanotube and the second structural entity is tungsten.

Item A2070. The composite material of any one of items A3-A863 or B2-B15 where the nanotube is a metallic carbon nanotube and the second structural entity is tungsten carbide.

Item A2071. The composite material of any one of items A3-A863 or B2-B15 where the nanotube is a metallic carbon nanotube and the second structural entity is ultrahard fullerite.

Item A2072. The composite material of any one of items A3-A863 or B2-B15 where the nanotube is a metallic carbon nanotube and the second structural entity is water reducers.

Item A2073. The composite material of any one of items A3-A863 or B2-B15 where the nanotube is a metallic carbon nanotube and the second structural entity is wood.

Item A2074. The composite material of any one of items A3-A863 or B2-B15 where the nanotube is a metallic carbon nanotube and the second structural entity is zinc oxide.

Item A2075. The composite material of any one of items A3-A863 or B2-B15 where the nanotube is a metallic carbon nanotube and the second structural entity is zirconia.

Item A2076. The composite material of any one of items A3-A863 or B2-B15 where the nanotube is a semiconductive carbon nanotube and the second structural entity is a carbon fibre.

Item A2077. The composite material of any one of items A3-A863 or B2-B15 where the nanotube is a semiconductive carbon nanotube and the second structural entity is boron nitride.

Item A2078. The composite material of any one of items A3-A863 or B2-B15 where the nanotube is a semiconductive carbon nanotube and the second structural entity is a ceramic.

Item A2079. The composite material of any one of items A3-A863 or B2-B15 where the nanotube is a semiconductive carbon nanotube and the second structural entity is graphene.

Item A2080. The composite material of any one of items A3-A863 or B2-B15 where the nanotube is a semiconductive carbon nanotube and the second structural entity is a metal.

Item A2081. The composite material of any one of items A3-A863 or B2-B15 where the nanotube is a semiconductive carbon nanotube and the second structural entity is a nucleic acid.

Item A2082. The composite material of any one of items A3-A863 or B2-B15 where the nanotube is a semiconductive carbon nanotube and the second structural entity is a polypeptide.

Item A2083. The composite material of any one of items A3-A863 or B2-B15 where the nanotube is a semiconductive carbon nanotube and the second structural entity is a cathode.

Item A2084. The composite material of any one of items A3-A863 or B2-B15 where the nanotube is a semiconductive carbon nanotube and the second structural entity is a metalised dielectric.

Item A2085. The composite material of any one of items A3-A863 or B2-B15 where the nanotube is a semiconductive carbon nanotube and the second structural entity is a peptide.

Item A2086. The composite material of any one of items A3-A863 or B2-B15 where the nanotube is a semiconductive carbon nanotube and the second structural entity is a protein.

Item A2087. The composite material of any one of items A3-A863 or B2-B15 where the nanotube is a semiconductive carbon nanotube and the second structural entity is a semiconductor.

Item A2088. The composite material of any one of items A3-A863 or B2-B15 where the nanotube is a semiconductive carbon nanotube and the second structural entity is a sensor.

Item A2089. The composite material of any one of items A3-A863 or B2-B15 where the nanotube is a semiconductive carbon nanotube and the second structural entity is aluminium.

Item A2090. The composite material of any one of items A3-A863 or B2-B15 where the nanotube is a semiconductive carbon nanotube and the second structural entity is an anode.

Item A2091. The composite material of any one of items A3-A863 or B2-B15 where the nanotube is a semiconductive carbon nanotube and the second structural entity is an antibody.

Item A2092. The composite material of any one of items A3-A863 or B2-B15 where the nanotube is a semiconductive carbon nanotube and the second structural entity is electrode.

Item A2093. The composite material of any one of items A3-A863 or B2-B15 where the nanotube is a semiconductive carbon nanotube and the second structural entity is boron nitride.

Item A2094. The composite material of any one of items A3-A863 or B2-B15 where the nanotube is a semiconductive carbon nanotube and the second structural entity is buckyball.

Item A2095. The composite material of any one of items A3-A863 or B2-B15 where the nanotube is a semiconductive carbon nanotube and the second structural entity is carbon nanofibres.

Item A2096. The composite material of any one of items A3-A863 or B2-B15 where the nanotube is a semiconductive carbon nanotube and the second structural entity is concrete.

Item A2097. The composite material of any one of items A3-A863 or B2-B15 where the nanotube is a semiconductive carbon nanotube and the second structural entity is glass fibre.

Item A2098. The composite material of any one of items A3-A863 or B2-B15 where the nanotube is a semiconductive carbon nanotube and the second structural entity is graphene oxide.

Item A2099. The composite material of any one of items A3-A863 or B2-B15 where the nanotube is a semiconductive carbon nanotube and the second structural entity is graphyne.

Item A2100. The composite material of any one of items A3-A863 or B2-B15 where the nanotube is a semiconductive carbon nanotube and the second structural entity is stainless steel.

Item A2101. The composite material of any one of items A3-A863 or B2-B15 where the nanotube is a semiconductive carbon nanotube and the second structural entity is a cathode.

Item A2102. The composite material of any one of items A3-A863 or B2-B15 where the nanotube is a semiconductive carbon nanotube and the second structural entity is a carbon polymer.

Item A2103. The composite material of any one of items A3-A863 or B2-B15 where the nanotube is a semiconductive carbon nanotube and the second structural entity is (Ag) silver.

Item A2104. The composite material of any one of items A3-A863 or B2-B15 where the nanotube is a semiconductive carbon nanotube and the second structural entity is (Al) aluminium.

Item A2105. The composite material of any one of items A3-A863 or B2-B15 where the nanotube is a semiconductive carbon nanotube and the second structural entity is (Au) gold.

Item A2106. The composite material of any one of items A3-A863 or B2-B15 where the nanotube is a semiconductive carbon nanotube and the second structural entity is (Cr) chromium.

Item A2107. The composite material of any one of items A3-A863 or B2-B15 where the nanotube is a semiconductive carbon nanotube and the second structural entity is (Cu) copper.

Item A2108. The composite material of any one of items A3-A863 or B2-B15 where the nanotube is a semiconductive carbon nanotube and the second structural entity is (Fe) steel and stainless steel.

Item A2109. The composite material of any one of items A3-A863 or B2-B15 where the nanotube is a semiconductive carbon nanotube and the second structural entity is (Mn) manganese.

Item A2110. The composite material of any one of items A3-A863 or B2-B15 where the nanotube is a semiconductive carbon nanotube and the second structural entity is (Mo) molybdenum.

Item A2111. The composite material of any one of items A3-A863 or B2-B15 where the nanotube is a semiconductive carbon nanotube and the second structural entity is (Ni) nickel.

Item A2112. The composite material of any one of items A3-A863 or B2-B15 where the nanotube is a semiconductive carbon nanotube and the second structural entity is (Pa) palladium.

Item A2113. The composite material of any one of items A3-A863 or B2-B15 where the nanotube is a semiconductive carbon nanotube and the second structural entity is (Pt) platinum.

Item A2114. The composite material of any one of items A3-A863 or B2-B15 where the nanotube is a semiconductive carbon nanotube and the second structural entity is (Ta) tantalum.

Item A2115. The composite material of any one of items A3-A863 or B2-B15 where the nanotube is a semiconductive carbon nanotube and the second structural entity is (Ti) titanium.

Item A2116. The composite material of any one of items A3-A863 or B2-B15 where the nanotube is a semiconductive carbon nanotube and the second structural entity is (Wo) Tungsten.

Item A2117. The composite material of any one of items A3-A863 or B2-B15 where the nanotube is a semiconductive carbon nanotube and the second structural entity is a battery.

Item A2118. The composite material of any one of items A3-A863 or B2-B15 where the nanotube is a semiconductive carbon nanotube and the second structural entity is a borosilicate.

Item A2119. The composite material of any one of items A3-A863 or B2-B15 where the nanotube is a semiconductive carbon nanotube and the second structural entity is a buckyball.

Item A2120. The composite material of any one of items A3-A863 or B2-B15 where the nanotube is a semiconductive carbon nanotube and the second structural entity is a buckytube.

Item A2121. The composite material of any one of items A3-A863 or B2-B15 where the nanotube is a semiconductive carbon nanotube and the second structural entity is a capacitator.

Item A2122. The composite material of any one of items A3-A863 or B2-B15 where the nanotube is a semiconductive carbon nanotube and the second structural entity is a carbon dome.

Item A2123. The composite material of any one of items A3-A863 or B2-B15 where the nanotube is a semiconductive carbon nanotube and the second structural entity is a carbon megatube.

Item A2124. The composite material of any one of items A3-A863 or B2-B15 where the nanotube is a semiconductive carbon nanotube and the second structural entity is a carbon nanofibre.

Item A2125. The composite material of any one of items A3-A863 or B2-B15 where the nanotube is a semiconductive carbon nanotube and the second structural entity is a carbon nanofoam.

Item A2126. The composite material of any one of items A3-A863 or B2-B15 where the nanotube is a semiconductive carbon nanotube and the second structural entity is a carbon nanothread.

Item A2127. The composite material of any one of items A3-A863 or B2-B15 where the nanotube is a semiconductive carbon nanotube and the second structural entity is a catalyst.

Item A2128. The composite material of any one of items A3-A863 or B2-B15 where the nanotube is a semiconductive carbon nanotube and the second structural entity is a ceramic material.

Item A2129. The composite material of any one of items A3-A863 or B2-B15 where the nanotube is a semiconductive carbon nanotube and the second structural entity is a composite material.

Item A2130. The composite material of any one of items A3-A863 or B2-B15 where the nanotube is a semiconductive carbon nanotube and the second structural entity is a conductor.

Item A2131. The composite material of any one of items A3-A863 or B2-B15 where the nanotube is a semiconductive carbon nanotube and the second structural entity is a covalent crystal.

Item A2132. The composite material of any one of items A3-A863 or B2-B15 where the nanotube is a semiconductive carbon nanotube and the second structural entity is a crystal.

Item A2133. The composite material of any one of items A3-A863 or B2-B15 where the nanotube is a semiconductive carbon nanotube and the second structural entity is a crystalline material.

Item A2134. The composite material of any one of items A3-A863 or B2-B15 where the nanotube is a semiconductive carbon nanotube and the second structural entity is a defect-free graphene sheet.

Item A2135. The composite material of any one of items A3-A863 or B2-B15 where the nanotube is a semiconductive carbon nanotube and the second structural entity is a dielectric material.

Item A2136. The composite material of any one of items A3-A863 or B2-B15 where the nanotube is a semiconductive carbon nanotube and the second structural entity is a diode.

Item A2137. The composite material of any one of items A3-A863 or B2-B15 where the nanotube is a semiconductive carbon nanotube and the second structural entity is a dodecahedrane.

Item A2138. The composite material of any one of items A3-A863 or B2-B15 where the nanotube is a semiconductive carbon nanotube and the second structural entity is a doped glass.

Item A2139. The composite material of any one of items A3-A863 or B2-B15 where the nanotube is a semiconductive carbon nanotube and the second structural entity is a fibre.

Item A2140. The composite material of any one of items A3-A863 or B2-B15 where the nanotube is a semiconductive carbon nanotube and the second structural entity is a fullerite.

Item A2141. The composite material of any one of items A3-A863 or B2-B15 where the nanotube is a semiconductive carbon nanotube and the second structural entity is a fused silica.

Item A2142. The composite material of any one of items A3-A863 or B2-B15 where the nanotube is a semiconductive carbon nanotube and the second structural entity is a glass fibre.

Item A2143. The composite material of any one of items A3-A863 or B2-B15 where the nanotube is a semiconductive carbon nanotube and the second structural entity is a glue.

Item A2144. The composite material of any one of items A3-A863 or B2-B15 where the nanotube is a semiconductive carbon nanotube and the second structural entity is a green ceramic.

Item A2145. The composite material of any one of items A3-A863 or B2-B15 where the nanotube is a semiconductive carbon nanotube and the second structural entity is a lanthanides.

Item A2146. The composite material of any one of items A3-A863 or B2-B15 where the nanotube is a semiconductive carbon nanotube and the second structural entity is a machinable ceramic.

Item A2147. The composite material of any one of items A3-A863 or B2-B15 where the nanotube is a semiconductive carbon nanotube and the second structural entity is a metal alloy.

Item A2148. The composite material of any one of items A3-A863 or B2-B15 where the nanotube is a semiconductive carbon nanotube and the second structural entity is a metallised ceramic.

Item A2149. The composite material of any one of items A3-A863 or B2-B15 where the nanotube is a semiconductive carbon nanotube and the second structural entity is a metalloid.

Item A2150. The composite material of any one of items A3-A863 or B2-B15 where the nanotube is a semiconductive carbon nanotube and the second structural entity is a mineral.

Item A2151. The composite material of any one of items A3-A863 or B2-B15 where the nanotube is a semiconductive carbon nanotube and the second structural entity is a non-covalent crystal.

Item A2152. The composite material of any one of items A3-A863 or B2-B15 where the nanotube is a semiconductive carbon nanotube and the second structural entity is a piezoelectric material.

Item A2153. The composite material of any one of items A3-A863 or B2-B15 where the nanotube is a semiconductive carbon nanotube and the second structural entity is a platinum group metal.

Item A2154. The composite material of any one of items A3-A863 or B2-B15 where the nanotube is a semiconductive carbon nanotube and the second structural entity is a post-transition metal.

Item A2155. The composite material of any one of items A3-A863 or B2-B15 where the nanotube is a semiconductive carbon nanotube and the second structural entity is a rare earth element.

Item A2156. The composite material of any one of items A3-A863 or B2-B15 where the nanotube is a semiconductive carbon nanotube and the second structural entity is a sapphire.

Item A2157. The composite material of any one of items A3-A863 or B2-B15 where the nanotube is a semiconductive carbon nanotube and the second structural entity is a silicon nitride.

Item A2158. The composite material of any one of items A3-A863 or B2-B15 where the nanotube is a semiconductive carbon nanotube and the second structural entity is a single crystal fiber.

Item A2159. The composite material of any one of items A3-A863 or B2-B15 where the nanotube is a semiconductive carbon nanotube and the second structural entity is a sol-gel.

Item A2160. The composite material of any one of items A3-A863 or B2-B15 where the nanotube is a semiconductive carbon nanotube and the second structural entity is a synthetic diamond.

Item A2161. The composite material of any one of items A3-A863 or B2-B15 where the nanotube is a semiconductive carbon nanotube and the second structural entity is a transition metal.

Item A2162. The composite material of any one of items A3-A863 or B2-B15 where the nanotube is a semiconductive carbon nanotube and the second structural entity is a tungsten carbide.

Item A2163. The composite material of any one of items A3-A863 or B2-B15 where the nanotube is a semiconductive carbon nanotube and the second structural entity is actinides.

Item A2164. The composite material of any one of items A3-A863 or B2-B15 where the nanotube is a semiconductive carbon nanotube and the second structural entity is activated carbon.

Item A2165. The composite material of any one of items A3-A863 or B2-B15 where the nanotube is a semiconductive carbon nanotube and the second structural entity is aggregated diamonds.

Item A2166. The composite material of any one of items A3-A863 or B2-B15 where the nanotube is a semiconductive carbon nanotube and the second structural entity is air entrainers.

Item A2167. The composite material of any one of items A3-A863 or B2-B15 where the nanotube is a semiconductive carbon nanotube and the second structural entity is alkali-silica reactivity inhibitors.

Item A2168. The composite material of any one of items A3-A863 or B2-B15 where the nanotube is a semiconductive carbon nanotube and the second structural entity is alloys.

Item A2169. The composite material of any one of items A3-A863 or B2-B15 where the nanotube is a semiconductive carbon nanotube and the second structural entity is alumina.

Item A2170. The composite material of any one of items A3-A863 or B2-B15 where the nanotube is a semiconductive carbon nanotube and the second structural entity is alumina trihydrate.

Item A2171. The composite material of any one of items A3-A863 or B2-B15 where the nanotube is a semiconductive carbon nanotube and the second structural entity is aluminum boride.

Item A2172. The composite material of any one of items A3-A863 or B2-B15 where the nanotube is a semiconductive carbon nanotube and the second structural entity is aluminum fibers.

Item A2173. The composite material of any one of items A3-A863 or B2-B15 where the nanotube is a semiconductive carbon nanotube and the second structural entity is aluminum oxide.

Item A2174. The composite material of any one of items A3-A863 or B2-B15 where the nanotube is a semiconductive carbon nanotube and the second structural entity is aluminum trihydroxide.

Item A2175. The composite material of any one of items A3-A863 or B2-B15 where the nanotube is a semiconductive carbon nanotube and the second structural entity is amalgams.

Item A2176. The composite material of any one of items A3-A863 or B2-B15 where the nanotube is a semiconductive carbon nanotube and the second structural entity is amorphous carbon.

Item A2177. The composite material of any one of items A3-A863 or B2-B15 where the nanotube is a semiconductive carbon nanotube and the second structural entity is actinides.

Item A2178. The composite material of any one of items A3-A863 or B2-B15 where the nanotube is a semiconductive carbon nanotube and the second structural entity is an amalgam.

Item A2179. The composite material of any one of items A3-A863 or B2-B15 where the nanotube is a semiconductive carbon nanotube and the second structural entity is an endohedral fullerene.

Item A2180. The composite material of any one of items A3-A863 or B2-B15 where the nanotube is a semiconductive carbon nanotube and the second structural entity is an insulator.

Item A2181. The composite material of any one of items A3-A863 or B2-B15 where the nanotube is a semiconductive carbon nanotube and the second structural entity is an intermetallic.

Item A2182. The composite material of any one of items A3-A863 or B2-B15 where the nanotube is a semiconductive carbon nanotube and the second structural entity is an ionic crystal.

Item A2183. The composite material of any one of items A3-A863 or B2-B15 where the nanotube is a semiconductive carbon nanotube and the second structural entity is an organic material.

Item A2184. The composite material of any one of items A3-A863 or B2-B15 where the nanotube is a semiconductive carbon nanotube and the second structural entity is anthracite.

Item A2185. The composite material of any one of items A3-A863 or B2-B15 where the nanotube is a semiconductive carbon nanotube and the second structural entity is aramid.

Item A2186. The composite material of any one of items A3-A863 or B2-B15 where the nanotube is a semiconductive carbon nanotube and the second structural entity is asbestos.

Item A2187. The composite material of any one of items A3-A863 or B2-B15 where the nanotube is a semiconductive carbon nanotube and the second structural entity is barium.

Item A2188. The composite material of any one of items A3-A863 or B2-B15 where the nanotube is a semiconductive carbon nanotube and the second structural entity is bone.

Item A2189. The composite material of any one of items A3-A863 or B2-B15 where the nanotube is a semiconductive carbon nanotube and the second structural entity is boron.

Item A2190. The composite material of any one of items A3-A863 or B2-B15 where the nanotube is a semiconductive carbon nanotube and the second structural entity is boron nitride nanoscroll.

Item A2191. The composite material of any one of items A3-A863 or B2-B15 where the nanotube is a semiconductive carbon nanotube and the second structural entity is boron nitride oxide.

Item A2192. The composite material of any one of items A3-A863 or B2-B15 where the nanotube is a semiconductive carbon nanotube and the second structural entity is brass.

Item A2193. The composite material of any one of items A3-A863 or B2-B15 where the nanotube is a semiconductive carbon nanotube and the second structural entity is brass fibers.

Item A2194. The composite material of any one of items A3-A863 or B2-B15 where the nanotube is a semiconductive carbon nanotube and the second structural entity is buckminsterfullerene.

Item A2195. The composite material of any one of items A3-A863 or B2-B15 where the nanotube is a semiconductive carbon nanotube and the second structural entity is bucky paper.

Item A2196. The composite material of any one of items A3-A863 or B2-B15 where the nanotube is a semiconductive carbon nanotube and the second structural entity is buckyball clusters.

Item A2197. The composite material of any one of items A3-A863 or B2-B15 where the nanotube is a semiconductive carbon nanotube and the second structural entity is buckypaper.

Item A2198. The composite material of any one of items A3-A863 or B2-B15 where the nanotube is a semiconductive carbon nanotube and the second structural entity is buckytube.

Item A2199. The composite material of any one of items A3-A863 or B2-B15 where the nanotube is a semiconductive carbon nanotube and the second structural entity is calcium carbonite.

Item A2200. The composite material of any one of items A3-A863 or B2-B15 where the nanotube is a semiconductive carbon nanotube and the second structural entity is calcium metasilicate.

Item A2201. The composite material of any one of items A3-A863 or B2-B15 where the nanotube is a semiconductive carbon nanotube and the second structural entity is calcium sulfate.

Item A2202. The composite material of any one of items A3-A863 or B2-B15 where the nanotube is a semiconductive carbon nanotube and the second structural entity is calcium sulphate.

Item A2203. The composite material of any one of items A3-A863 or B2-B15 where the nanotube is a semiconductive carbon nanotube and the second structural entity is carbon black.

Item A2204. The composite material of any one of items A3-A863 or B2-B15 where the nanotube is a semiconductive carbon nanotube and the second structural entity is carbon fiber.

Item A2205. The composite material of any one of items A3-A863 or B2-B15 where the nanotube is a semiconductive carbon nanotube and the second structural entity is carbon fibers.

Item A2206. The composite material of any one of items A3-A863 or B2-B15 where the nanotube is a semiconductive carbon nanotube and the second structural entity is carbon megatubes.

Item A2207. The composite material of any one of items A3-A863 or B2-B15 where the nanotube is a semiconductive carbon nanotube and the second structural entity is carbon nano-onions.

Item A2208. The composite material of any one of items A3-A863 or B2-B15 where the nanotube is a semiconductive carbon nanotube and the second structural entity is carbon nanobuds.

Item A2209. The composite material of any one of items A3-A863 or B2-B15 where the nanotube is a semiconductive carbon nanotube and the second structural entity is carbon nanofiber.

Item A2210. The composite material of any one of items A3-A863 or B2-B15 where the nanotube is a semiconductive carbon nanotube and the second structural entity is carbon nanofoam.

Item A2211. The composite material of any one of items A3-A863 or B2-B15 where the nanotube is a semiconductive carbon nanotube and the second structural entity is carbon nanothread.

Item A2212. The composite material of any one of items A3-A863 or B2-B15 where the nanotube is a semiconductive carbon nanotube and the second structural entity is carbon/diamond nanothread.

Item A2213. The composite material of any one of items A3-A863 or B2-B15 where the nanotube is a semiconductive carbon nanotube and the second structural entity is cellulose fibers.

Item A2214. The composite material of any one of items A3-A863 or B2-B15 where the nanotube is a semiconductive carbon nanotube and the second structural entity is cellulose nanofibers (e.g. curran).

Item A2215. The composite material of any one of items A3-A863 or B2-B15 where the nanotube is a semiconductive carbon nanotube and the second structural entity is cellulose nanowhiskers.

Item A2216. The composite material of any one of items A3-A863 or B2-B15 where the nanotube is a semiconductive carbon nanotube and the second structural entity is chemical admixtures.

Item A2217. The composite material of any one of items A3-A863 or B2-B15 where the nanotube is a semiconductive carbon nanotube and the second structural entity is chlorographene.

Item A2218. The composite material of any one of items A3-A863 or B2-B15 where the nanotube is a semiconductive carbon nanotube and the second structural entity is chromium.

Item A2219. The composite material of any one of items A3-A863 or B2-B15 where the nanotube is a semiconductive carbon nanotube and the second structural entity is clay.

Item A2220. The composite material of any one of items A3-A863 or B2-B15 where the nanotube is a semiconductive carbon nanotube and the second structural entity is coal.

Item A2221. The composite material of any one of items A3-A863 or B2-B15 where the nanotube is a semiconductive carbon nanotube and the second structural entity is coated boron nitride.

Item A2222. The composite material of any one of items A3-A863 or B2-B15 where the nanotube is a semiconductive carbon nanotube and the second structural entity is coated graphene.

Item A2223. The composite material of any one of items A3-A863 or B2-B15 where the nanotube is a semiconductive carbon nanotube and the second structural entity is coloring admixtures.

Item A2224. The composite material of any one of items A3-A863 or B2-B15 where the nanotube is a semiconductive carbon nanotube and the second structural entity is composite materials.

Item A2225. The composite material of any one of items A3-A863 or B2-B15 where the nanotube is a semiconductive carbon nanotube and the second structural entity is concrete admixtures.

Item A2226. The composite material of any one of items A3-A863 or B2-B15 where the nanotube is a semiconductive carbon nanotube and the second structural entity is COOH-functionalized graphene.

Item A2227. The composite material of any one of items A3-A863 or B2-B15 where the nanotube is a semiconductive carbon nanotube and the second structural entity is copper.

Item A2228. The composite material of any one of items A3-A863 or B2-B15 where the nanotube is a semiconductive carbon nanotube and the second structural entity is corrosion inhibitors.

Item A2229. The composite material of any one of items A3-A863 or B2-B15 where the nanotube is a semiconductive carbon nanotube and the second structural entity is covalent crystals.

Item A2230. The composite material of any one of items A3-A863 or B2-B15 where the nanotube is a semiconductive carbon nanotube and the second structural entity is crystal.

Item A2231. The composite material of any one of items A3-A863 or B2-B15 where the nanotube is a semiconductive carbon nanotube and the second structural entity is crystalline materials.

Item A2232. The composite material of any one of items A3-A863 or B2-B15 where the nanotube is a semiconductive carbon nanotube and the second structural entity is diamond.

Item A2233. The composite material of any one of items A3-A863 or B2-B15 where the nanotube is a semiconductive carbon nanotube and the second structural entity is diamond-like carbon.

Item A2234. The composite material of any one of items A3-A863 or B2-B15 where the nanotube is a semiconductive carbon nanotube and the second structural entity is dispersants.

Item A2235. The composite material of any one of items A3-A863 or B2-B15 where the nanotube is a semiconductive carbon nanotube and the second structural entity is dodecahedrane.

Item A2236. The composite material of any one of items A3-A863 or B2-B15 where the nanotube is a semiconductive carbon nanotube and the second structural entity is double-layer boron nitride.

Item A2237. The composite material of any one of items A3-A863 or B2-B15 where the nanotube is a semiconductive carbon nanotube and the second structural entity is double-layer graphene.

Item A2238. The composite material of any one of items A3-A863 or B2-B15 where the nanotube is a semiconductive carbon nanotube and the second structural entity is e-glass.

Item A2239. The composite material of any one of items A3-A863 or B2-B15 where the nanotube is a semiconductive carbon nanotube and the second structural entity is elastomers.

Item A2240. The composite material of any one of items A3-A863 or B2-B15 where the nanotube is a semiconductive carbon nanotube and the second structural entity is endohedral fullerenes.

Item A2241. The composite material of any one of items A3-A863 or B2-B15 where the nanotube is a semiconductive carbon nanotube and the second structural entity is exfoliated graphite.

Item A2242. The composite material of any one of items A3-A863 or B2-B15 where the nanotube is a semiconductive carbon nanotube and the second structural entity is exfoliated silicate.

Item A2243. The composite material of any one of items A3-A863 or B2-B15 where the nanotube is a semiconductive carbon nanotube and the second structural entity is extruded activated carbon.

Item A2244. The composite material of any one of items A3-A863 or B2-B15 where the nanotube is a semiconductive carbon nanotube and the second structural entity is fibres.

Item A2245. The composite material of any one of items A3-A863 or B2-B15 where the nanotube is a semiconductive carbon nanotube and the second structural entity is flourinated boron nitride.

Item A2246. The composite material of any one of items A3-A863 or B2-B15 where the nanotube is a semiconductive carbon nanotube and the second structural entity is flourinated graphene.

Item A2247. The composite material of any one of items A3-A863 or B2-B15 where the nanotube is a semiconductive carbon nanotube and the second structural entity is fluorographene.

Item A2248. The composite material of any one of items A3-A863 or B2-B15 where the nanotube is a semiconductive carbon nanotube and the second structural entity is fly ash.

Item A2249. The composite material of any one of items A3-A863 or B2-B15 where the nanotube is a semiconductive carbon nanotube and the second structural entity is fullerene rings.

Item A2250. The composite material of any one of items A3-A863 or B2-B15 where the nanotube is a semiconductive carbon nanotube and the second structural entity is fullerenes.

Item A2251. The composite material of any one of items A3-A863 or B2-B15 where the nanotube is a semiconductive carbon nanotube and the second structural entity is fullerite.

Item A2252. The composite material of any one of items A3-A863 or B2-B15 where the nanotube is a semiconductive carbon nanotube and the second structural entity is functionalized boron nitride.

Item A2253. The composite material of any one of items A3-A863 or B2-B15 where the nanotube is a semiconductive carbon nanotube and the second structural entity is functionalized graphene.

Item A2254. The composite material of any one of items A3-A863 or B2-B15 where the nanotube is a semiconductive carbon nanotube and the second structural entity is fused silica.

Item A2255. The composite material of any one of items A3-A863 or B2-B15 where the nanotube is a semiconductive carbon nanotube and the second structural entity is gallium arsenide.

Item A2256. The composite material of any one of items A3-A863 or B2-B15 where the nanotube is a semiconductive carbon nanotube and the second structural entity is gallium nitride.

Item A2257. The composite material of any one of items A3-A863 or B2-B15 where the nanotube is a semiconductive carbon nanotube and the second structural entity is gedodesic carbon domes.

Item A2258. The composite material of any one of items A3-A863 or B2-B15 where the nanotube is a semiconductive carbon nanotube and the second structural entity is germanium.

Item A2259. The composite material of any one of items A3-A863 or B2-B15 where the nanotube is a semiconductive carbon nanotube and the second structural entity is glass.

Item A2260. The composite material of any one of items A3-A863 or B2-B15 where the nanotube is a semiconductive carbon nanotube and the second structural entity is glass microsphere.

Item A2261. The composite material of any one of items A3-A863 or B2-B15 where the nanotube is a semiconductive carbon nanotube and the second structural entity is glass ribbons.

Item A2262. The composite material of any one of items A3-A863 or B2-B15 where the nanotube is a semiconductive carbon nanotube and the second structural entity is glass spheres.

Item A2263. The composite material of any one of items A3-A863 or B2-B15 where the nanotube is a semiconductive carbon nanotube and the second structural entity is glasses.

Item A2264. The composite material of any one of items A3-A863 or B2-B15 where the nanotube is a semiconductive carbon nanotube and the second structural entity is glassy carbon.

Item A2265. The composite material of any one of items A3-A863 or B2-B15 where the nanotube is a semiconductive carbon nanotube and the second structural entity is glue.

Item A2266. The composite material of any one of items A3-A863 or B2-B15 where the nanotube is a semiconductive carbon nanotube and the second structural entity is gold.

Item A2267. The composite material of any one of items A3-A863 or B2-B15 where the nanotube is a semiconductive carbon nanotube and the second structural entity is gold particles.

Item A2268. The composite material of any one of items A3-A863 or B2-B15 where the nanotube is a semiconductive carbon nanotube and the second structural entity is granular activated carbon.

Item A2269. The composite material of any one of items A3-A863 or B2-B15 where the nanotube is a semiconductive carbon nanotube and the second structural entity is graphane.

Item A2270. The composite material of any one of items A3-A863 or B2-B15 where the nanotube is a semiconductive carbon nanotube and the second structural entity is graphdiyne.

Item A2271. The composite material of any one of items A3-A863 or B2-B15 where the nanotube is a semiconductive carbon nanotube and the second structural entity is graphene.

Item A2272. The composite material of any one of items A3-A863 or B2-B15 where the nanotube is a semiconductive carbon nanotube and the second structural entity is graphite.

Item A2273. The composite material of any one of items A3-A863 or B2-B15 where the nanotube is a semiconductive carbon nanotube and the second structural entity is graphone.

Item A2274. The composite material of any one of items A3-A863 or B2-B15 where the nanotube is a semiconductive carbon nanotube and the second structural entity is hardened steel.

Item A2275. The composite material of any one of items A3-A863 or B2-B15 where the nanotube is a semiconductive carbon nanotube and the second structural entity is high range water reducers.

Item A2276. The composite material of any one of items A3-A863 or B2-B15 where the nanotube is a semiconductive carbon nanotube and the second structural entity is hydrous magnesium silicate.

Item A2277. The composite material of any one of items A3-A863 or B2-B15 where the nanotube is a semiconductive carbon nanotube and the second structural entity is hyperdiamond.

Item A2278. The composite material of any one of items A3-A863 or B2-B15 where the nanotube is a semiconductive carbon nanotube and the second structural entity is hyperdiamonds.

Item A2279. The composite material of any one of items A3-A863 or B2-B15 where the nanotube is a semiconductive carbon nanotube and the second structural entity is imperfect boron nitride.

Item A2280. The composite material of any one of items A3-A863 or B2-B15 where the nanotube is a semiconductive carbon nanotube and the second structural entity is imperfect graphene.

Item A2281. The composite material of any one of items A3-A863 or B2-B15 where the nanotube is a semiconductive carbon nanotube and the second structural entity is intermetallics.

Item A2282. The composite material of any one of items A3-A863 or B2-B15 where the nanotube is a semiconductive carbon nanotube and the second structural entity is ionic crystals.

Item A2283. The composite material of any one of items A3-A863 or B2-B15 where the nanotube is a semiconductive carbon nanotube and the second structural entity is iron.

Item A2284. The composite material of any one of items A3-A863 or B2-B15 where the nanotube is a semiconductive carbon nanotube and the second structural entity is iron oxides.

Item A2285. The composite material of any one of items A3-A863 or B2-B15 where the nanotube is a semiconductive carbon nanotube and the second structural entity is kevlar.

Item A2286. The composite material of any one of items A3-A863 or B2-B15 where the nanotube is a semiconductive carbon nanotube and the second structural entity is lanthanides.

Item A2287. The composite material of any one of items A3-A863 or B2-B15 where the nanotube is a semiconductive carbon nanotube and the second structural entity is lead zirconium titanate.

Item A2288. The composite material of any one of items A3-A863 or B2-B15 where the nanotube is a semiconductive carbon nanotube and the second structural entity is lignin.

Item A2289. The composite material of any one of items A3-A863 or B2-B15 where the nanotube is a semiconductive carbon nanotube and the second structural entity is lignite.

Item A2290. The composite material of any one of items A3-A863 or B2-B15 where the nanotube is a semiconductive carbon nanotube and the second structural entity is lithium niobate.

Item A2291. The composite material of any one of items A3-A863 or B2-B15 where the nanotube is a semiconductive carbon nanotube and the second structural entity is lithium niobates.

Item A2292. The composite material of any one of items A3-A863 or B2-B15 where the nanotube is a semiconductive carbon nanotube and the second structural entity is lonsdaleite.

Item A2293. The composite material of any one of items A3-A863 or B2-B15 where the nanotube is a semiconductive carbon nanotube and the second structural entity is magnesium dihydroxide.

Item A2294. The composite material of any one of items A3-A863 or B2-B15 where the nanotube is a semiconductive carbon nanotube and the second structural entity is magnesium oxide.

Item A2295. The composite material of any one of items A3-A863 or B2-B15 where the nanotube is a semiconductive carbon nanotube and the second structural entity is manganese.

Item A2296. The composite material of any one of items A3-A863 or B2-B15 where the nanotube is a semiconductive carbon nanotube and the second structural entity is melamine sulfonate superplasticisers.

Item A2297. The composite material of any one of items A3-A863 or B2-B15 where the nanotube is a semiconductive carbon nanotube and the second structural entity is metal ions.

Item A2298. The composite material of any one of items A3-A863 or B2-B15 where the nanotube is a semiconductive carbon nanotube and the second structural entity is metal oxide.

Item A2299. The composite material of any one of items A3-A863 or B2-B15 where the nanotube is a semiconductive carbon nanotube and the second structural entity is metallised ceramic.

Item A2300. The composite material of any one of items A3-A863 or B2-B15 where the nanotube is a semiconductive carbon nanotube and the second structural entity is metalloids.

Item A2301. The composite material of any one of items A3-A863 or B2-B15 where the nanotube is a semiconductive carbon nanotube and the second structural entity is metals.

Item A2302. The composite material of any one of items A3-A863 or B2-B15 where the nanotube is a semiconductive carbon nanotube and the second structural entity is mica.

Item A2303. The composite material of any one of items A3-A863 or B2-B15 where the nanotube is a semiconductive carbon nanotube and the second structural entity is mineral.

Item A2304. The composite material of any one of items A3-A863 or B2-B15 where the nanotube is a semiconductive carbon nanotube and the second structural entity is mineral admixtures.

Item A2305. The composite material of any one of items A3-A863 or B2-B15 where the nanotube is a semiconductive carbon nanotube and the second structural entity is molybdenum.

Item A2306. The composite material of any one of items A3-A863 or B2-B15 where the nanotube is a semiconductive carbon nanotube and the second structural entity is montmorrilonite nanoclays.

Item A2307. The composite material of any one of items A3-A863 or B2-B15 where the nanotube is a semiconductive carbon nanotube and the second structural entity is multi-layer boron nitride.

Item A2308. The composite material of any one of items A3-A863 or B2-B15 where the nanotube is a semiconductive carbon nanotube and the second structural entity is multi-layer graphene.

Item A2309. The composite material of any one of items A3-A863 or B2-B15 where the nanotube is a semiconductive carbon nanotube and the second structural entity is nanochain.

Item A2310. The composite material of any one of items A3-A863 or B2-B15 where the nanotube is a semiconductive carbon nanotube and the second structural entity is nanocrystal.

Item A2311. The composite material of any one of items A3-A863 or B2-B15 where the nanotube is a semiconductive carbon nanotube and the second structural entity is nanowire.

Item A2312. The composite material of any one of items A3-A863 or B2-B15 where the nanotube is a semiconductive carbon nanotube and the second structural entity is naphthalene.

Item A2313. The composite material of any one of items A3-A863 or B2-B15 where the nanotube is a semiconductive carbon nanotube and the second structural entity is Natural pozzolans (such as the volcanic ash used in Roman concrete).

Item A2314. The composite material of any one of items A3-A863 or B2-B15 where the nanotube is a semiconductive carbon nanotube and the second structural entity is NH2-functionalized graphene.

Item A2315. The composite material of any one of items A3-A863 or B2-B15 where the nanotube is a semiconductive carbon nanotube and the second structural entity is nickel.

Item A2316. The composite material of any one of items A3-A863 or B2-B15 where the nanotube is a semiconductive carbon nanotube and the second structural entity is non-covalent crystal.

Item A2317. The composite material of any one of items A3-A863 or B2-B15 where the nanotube is a semiconductive carbon nanotube and the second structural entity is nylon.

Item A2318. The composite material of any one of items A3-A863 or B2-B15 where the nanotube is a semiconductive carbon nanotube and the second structural entity is OH-functionalized graphene.

Item A2319. The composite material of any one of items A3-A863 or B2-B15 where the nanotube is a semiconductive carbon nanotube and the second structural entity is palladium.

Item A2320. The composite material of any one of items A3-A863 or B2-B15 where the nanotube is a semiconductive carbon nanotube and the second structural entity is pencil lead.

Item A2321. The composite material of any one of items A3-A863 or B2-B15 where the nanotube is a semiconductive carbon nanotube and the second structural entity is perfect boron nitride.

Item A2322. The composite material of any one of items A3-A863 or B2-B15 where the nanotube is a semiconductive carbon nanotube and the second structural entity is perfect graphene.

Item A2323. The composite material of any one of items A3-A863 or B2-B15 where the nanotube is a semiconductive carbon nanotube and the second structural entity is plasticizers.

Item A2324. The composite material of any one of items A3-A863 or B2-B15 where the nanotube is a semiconductive carbon nanotube and the second structural entity is platinum.

Item A2325. The composite material of any one of items A3-A863 or B2-B15 where the nanotube is a semiconductive carbon nanotube and the second structural entity is platinum group metals.

Item A2326. The composite material of any one of items A3-A863 or B2-B15 where the nanotube is a semiconductive carbon nanotube and the second structural entity is post-transition metals.

Item A2327. The composite material of any one of items A3-A863 or B2-B15 where the nanotube is a semiconductive carbon nanotube and the second structural entity is powdered activated carbon.

Item A2328. The composite material of any one of items A3-A863 or B2-B15 where the nanotube is a semiconductive carbon nanotube and the second structural entity is pozzolans and other cementitious materials.

Item A2329. The composite material of any one of items A3-A863 or B2-B15 where the nanotube is a semiconductive carbon nanotube and the second structural entity is prismane.

Item A2330. The composite material of any one of items A3-A863 or B2-B15 where the nanotube is a semiconductive carbon nanotube and the second structural entity is pristine boron nitride.

Item A2331. The composite material of any one of items A3-A863 or B2-B15 where the nanotube is a semiconductive carbon nanotube and the second structural entity is pristine graphene.

Item A2332. The composite material of any one of items A3-A863 or B2-B15 where the nanotube is a semiconductive carbon nanotube and the second structural entity is pyrolytic graphite.

Item A2333. The composite material of any one of items A3-A863 or B2-B15 where the nanotube is a semiconductive carbon nanotube and the second structural entity is quantum dots.

Item A2334. The composite material of any one of items A3-A863 or B2-B15 where the nanotube is a semiconductive carbon nanotube and the second structural entity is rare earth elements.

Item A2335. The composite material of any one of items A3-A863 or B2-B15 where the nanotube is a semiconductive carbon nanotube and the second structural entity is reduced boron nitride oxide.

Item A2336. The composite material of any one of items A3-A863 or B2-B15 where the nanotube is a semiconductive carbon nanotube and the second structural entity is reduced graphene oxide.

Item A2337. The composite material of any one of items A3-A863 or B2-B15 where the nanotube is a semiconductive carbon nanotube and the second structural entity is reduced graphyne.

Item A2338. The composite material of any one of items A3-A863 or B2-B15 where the nanotube is a semiconductive carbon nanotube and the second structural entity is rubber.

Item A2339. The composite material of any one of items A3-A863 or B2-B15 where the nanotube is a semiconductive carbon nanotube and the second structural entity is s-glass.

Item A2340. The composite material of any one of items A3-A863 or B2-B15 where the nanotube is a semiconductive carbon nanotube and the second structural entity is sapphire.

Item A2341. The composite material of any one of items A3-A863 or B2-B15 where the nanotube is a semiconductive carbon nanotube and the second structural entity is set accelerators.

Item A2342. The composite material of any one of items A3-A863 or B2-B15 where the nanotube is a semiconductive carbon nanotube and the second structural entity is set retarders.

Item A2343. The composite material of any one of items A3-A863 or B2-B15 where the nanotube is a semiconductive carbon nanotube and the second structural entity is shrinkage control admixtures.

Item A2344. The composite material of any one of items A3-A863 or B2-B15 where the nanotube is a semiconductive carbon nanotube and the second structural entity is silica.

Item A2345. The composite material of any one of items A3-A863 or B2-B15 where the nanotube is a semiconductive carbon nanotube and the second structural entity is silica fume.

Item A2346. The composite material of any one of items A3-A863 or B2-B15 where the nanotube is a semiconductive carbon nanotube and the second structural entity is silica gel.

Item A2347. The composite material of any one of items A3-A863 or B2-B15 where the nanotube is a semiconductive carbon nanotube and the second structural entity is silicon.

Item A2348. The composite material of any one of items A3-A863 or B2-B15 where the nanotube is a semiconductive carbon nanotube and the second structural entity is silicon carbide.

Item A2349. The composite material of any one of items A3-A863 or B2-B15 where the nanotube is a semiconductive carbon nanotube and the second structural entity is silicon dioxide.

Item A2350. The composite material of any one of items A3-A863 or B2-B15 where the nanotube is a semiconductive carbon nanotube and the second structural entity is silicon nitride.

Item A2351. The composite material of any one of items A3-A863 or B2-B15 where the nanotube is a semiconductive carbon nanotube and the second structural entity is silicon nitrides (bulk and thin film).

Item A2352. The composite material of any one of items A3-A863 or B2-B15 where the nanotube is a semiconductive carbon nanotube and the second structural entity is silver.

Item A2353. The composite material of any one of items A3-A863 or B2-B15 where the nanotube is a semiconductive carbon nanotube and the second structural entity is single-layer boron nitride.

Item A2354. The composite material of any one of items A3-A863 or B2-B15 where the nanotube is a semiconductive carbon nanotube and the second structural entity is single-layer graphene.

Item A2355. The composite material of any one of items A3-A863 or B2-B15 where the nanotube is a semiconductive carbon nanotube and the second structural entity is sol-gel.

Item A2356. The composite material of any one of items A3-A863 or B2-B15 where the nanotube is a semiconductive carbon nanotube and the second structural entity is soot.

Item A2357. The composite material of any one of items A3-A863 or B2-B15 where the nanotube is a semiconductive carbon nanotube and the second structural entity is steel.

Item A2358. The composite material of any one of items A3-A863 or B2-B15 where the nanotube is a semiconductive carbon nanotube and the second structural entity is steel fibers.

Item A2359. The composite material of any one of items A3-A863 or B2-B15 where the nanotube is a semiconductive carbon nanotube and the second structural entity is superplasticizer.

Item A2360. The composite material of any one of items A3-A863 or B2-B15 where the nanotube is a semiconductive carbon nanotube and the second structural entity is superplasticizers.

Item A2361. The composite material of any one of items A3-A863 or B2-B15 where the nanotube is a semiconductive carbon nanotube and the second structural entity is talc.

Item A2362. The composite material of any one of items A3-A863 or B2-B15 where the nanotube is a semiconductive carbon nanotube and the second structural entity is tantalum.

Item A2363. The composite material of any one of items A3-A863 or B2-B15 where the nanotube is a semiconductive carbon nanotube and the second structural entity is thiol-functionalized graphene.

Item A2364. The composite material of any one of items A3-A863 or B2-B15 where the nanotube is a semiconductive carbon nanotube and the second structural entity is titanium.

Item A2365. The composite material of any one of items A3-A863 or B2-B15 where the nanotube is a semiconductive carbon nanotube and the second structural entity is titanium oxide.

Item A2366. The composite material of any one of items A3-A863 or B2-B15 where the nanotube is a semiconductive carbon nanotube and the second structural entity is tooth cementum.

Item A2367. The composite material of any one of items A3-A863 or B2-B15 where the nanotube is a semiconductive carbon nanotube and the second structural entity is tooth dentine.

Item A2368. The composite material of any one of items A3-A863 or B2-B15 where the nanotube is a semiconductive carbon nanotube and the second structural entity is tooth enamel.

Item A2369. The composite material of any one of items A3-A863 or B2-B15 where the nanotube is a semiconductive carbon nanotube and the second structural entity is transition metals.

Item A2370. The composite material of any one of items A3-A863 or B2-B15 where the nanotube is a semiconductive carbon nanotube and the second structural entity is triple-layer boron nitride.

Item A2371. The composite material of any one of items A3-A863 or B2-B15 where the nanotube is a semiconductive carbon nanotube and the second structural entity is triple-layer graphene.

Item A2372. The composite material of any one of items A3-A863 or B2-B15 where the nanotube is a semiconductive carbon nanotube and the second structural entity is tungsten.

Item A2373. The composite material of any one of items A3-A863 or B2-B15 where the nanotube is a semiconductive carbon nanotube and the second structural entity is tungsten carbide.

Item A2374. The composite material of any one of items A3-A863 or B2-B15 where the nanotube is a semiconductive carbon nanotube and the second structural entity is ultrahard fullerite.

Item A2375. The composite material of any one of items A3-A863 or B2-B15 where the nanotube is a semiconductive carbon nanotube and the second structural entity is water reducers.

Item A2376. The composite material of any one of items A3-A863 or B2-B15 where the nanotube is a semiconductive carbon nanotube and the second structural entity is wood.

Item A2377. The composite material of any one of items A3-A863 or B2-B15 where the nanotube is a semiconductive carbon nanotube and the second structural entity is zinc oxide.

Item A2378. The composite material of any one of items A3-A863 or B2-B15 where the nanotube is a semiconductive carbon nanotube and the second structural entity is zirconia.

Item A2379. The composite material of any one of items A3-A863 or B2-B15 where the nanotube is a aluminium nanotube and the second structural entity is a cathode.

Item A2380. The composite material of any one of items A3-A863 or B2-B15 where the nanotube is a aluminium nanotube and the second structural entity is a metalised dielectric.

Item A2381. The composite material of any one of items A3-A863 or B2-B15 where the nanotube is a aluminium nanotube and the second structural entity is a peptide.

Item A2382. The composite material of any one of items A3-A863 or B2-B15 where the nanotube is a aluminium nanotube and the second structural entity is a protein.

Item A2383. The composite material of any one of items A3-A863 or B2-B15 where the nanotube is a aluminium nanotube and the second structural entity is a semiconductor.

Item A2384. The composite material of any one of items A3-A863 or B2-B15 where the nanotube is a aluminium nanotube and the second structural entity is a sensor.

Item A2385. The composite material of any one of items A3-A863 or B2-B15 where the nanotube is a aluminium nanotube and the second structural entity is aluminium.

Item A2386. The composite material of any one of items A3-A863 or B2-B15 where the nanotube is a aluminium nanotube and the second structural entity is an anode.

Item A2387. The composite material of any one of items A3-A863 or B2-B15 where the nanotube is a aluminium nanotube and the second structural entity is an antibody.

Item A2388. The composite material of any one of items A3-A863 or B2-B15 where the nanotube is a aluminium nanotube and the second structural entity is electrode.

Item A2389. The composite material of any one of items A3-A863 or B2-B15 where the nanotube is a aluminium nanotube and the second structural entity is boron nitride.

Item A2390. The composite material of any one of items A3-A863 or B2-B15 where the nanotube is a aluminium nanotube and the second structural entity is buckyball.

Item A2391. The composite material of any one of items A3-A863 or B2-B15 where the nanotube is a aluminium nanotube and the second structural entity is carbon nanofibres.

Item A2392. The composite material of any one of items A3-A863 or B2-B15 where the nanotube is a aluminium nanotube and the second structural entity is concrete.

Item A2393. The composite material of any one of items A3-A863 or B2-B15 where the nanotube is a aluminium nanotube and the second structural entity is glass fibre.

Item A2394. The composite material of any one of items A3-A863 or B2-B15 where the nanotube is a aluminium nanotube and the second structural entity is graphene oxide.

Item A2395. The composite material of any one of items A3-A863 or B2-B15 where the nanotube is a aluminium nanotube and the second structural entity is graphyne.

Item A2396. The composite material of any one of items A3-A863 or B2-B15 where the nanotube is a aluminium nanotube and the second structural entity is stainless steel.

Item A2397. The composite material of any one of items A3-A863 or B2-B15 where the nanotube is a aluminium nanotube and the second structural entity is an organic material.

Item A2398. The composite material of any one of items A3-A863 or B2-B15 where the nanotube is a aluminium nanotube and the second structural entity is a capacitator.

Item A2399. The composite material of any one of items A3-A863 or B2-B15 where the nanotube is a aluminum nitride nanotube and the second structural entity is a cathode.

Item A2400. The composite material of any one of items A3-A863 or B2-B15 where the nanotube is a aluminum nitride nanotube and the second structural entity is a metalised dielectric.

Item A2401. The composite material of any one of items A3-A863 or B2-B15 where the nanotube is a aluminum nitride nanotube and the second structural entity is a peptide.

Item A2402. The composite material of any one of items A3-A863 or B2-B15 where the nanotube is a aluminum nitride nanotube and the second structural entity is a protein.

Item A2403. The composite material of any one of items A3-A863 or B2-B15 where the nanotube is a aluminum nitride nanotube and the second structural entity is a semiconductor.

Item A2404. The composite material of any one of items A3-A863 or B2-B15 where the nanotube is a aluminum nitride nanotube and the second structural entity is a sensor.

Item A2405. The composite material of any one of items A3-A863 or B2-B15 where the nanotube is a aluminum nitride nanotube and the second structural entity is aluminium.

Item A2406. The composite material of any one of items A3-A863 or B2-B15 where the nanotube is a aluminum nitride nanotube and the second structural entity is an anode.

Item A2407. The composite material of any one of items A3-A863 or B2-B15 where the nanotube is a aluminum nitride nanotube and the second structural entity is an antibody.

Item A2408. The composite material of any one of items A3-A863 or B2-B15 where the nanotube is a aluminum nitride nanotube and the second structural entity is electrode.

Item A2409. The composite material of any one of items A3-A863 or B2-B15 where the nanotube is a aluminum nitride nanotube and the second structural entity is boron nitride.

Item A2410. The composite material of any one of items A3-A863 or B2-B15 where the nanotube is a aluminum nitride nanotube and the second structural entity is buckyball.

Item A2411. The composite material of any one of items A3-A863 or B2-B15 where the nanotube is a aluminum nitride nanotube and the second structural entity is carbon nanofibres.

Item A2412. The composite material of any one of items A3-A863 or B2-B15 where the nanotube is a aluminum nitride nanotube and the second structural entity is concrete.

Item A2413. The composite material of any one of items A3-A863 or B2-B15 where the nanotube is a aluminum nitride nanotube and the second structural entity is glass fibre.

Item A2414. The composite material of any one of items A3-A863 or B2-B15 where the nanotube is a aluminum nitride nanotube and the second structural entity is graphene oxide.

Item A2415. The composite material of any one of items A3-A863 or B2-B15 where the nanotube is a aluminum nitride nanotube and the second structural entity is graphyne.

Item A2416. The composite material of any one of items A3-A863 or B2-B15 where the nanotube is a aluminum nitride nanotube and the second structural entity is stainless steel.

Item A2417. The composite material of any one of items A3-A863 or B2-B15 where the nanotube is a aluminum nitride nanotube and the second structural entity is an organic material.

Item A2418. The composite material of any one of items A3-A863 or B2-B15 where the nanotube is a aluminum nitride nanotube and the second structural entity is a capacitator.

Item A2419. The composite material of any one of items A3-A863 or B2-B15 where the nanotube is a boron carbon nanotube and the second structural entity is a cathode.

Item A2420. The composite material of any one of items A3-A863 or B2-B15 where the nanotube is a boron carbon nanotube and the second structural entity is a metalised dielectric.

Item A2421. The composite material of any one of items A3-A863 or B2-B15 where the nanotube is a boron carbon nanotube and the second structural entity is a peptide.

Item A2422. The composite material of any one of items A3-A863 or B2-B15 where the nanotube is a boron carbon nanotube and the second structural entity is a protein.

Item A2423. The composite material of any one of items A3-A863 or B2-B15 where the nanotube is a boron carbon nanotube and the second structural entity is a semiconductor.

Item A2424. The composite material of any one of items A3-A863 or B2-B15 where the nanotube is a boron carbon nanotube and the second structural entity is a sensor.

Item A2425. The composite material of any one of items A3-A863 or B2-B15 where the nanotube is a boron carbon nanotube and the second structural entity is aluminium.

Item A2426. The composite material of any one of items A3-A863 or B2-B15 where the nanotube is a boron carbon nanotube and the second structural entity is an anode.

Item A2427. The composite material of any one of items A3-A863 or B2-B15 where the nanotube is a boron carbon nanotube and the second structural entity is an antibody.

Item A2428. The composite material of any one of items A3-A863 or B2-B15 where the nanotube is a boron carbon nanotube and the second structural entity is electrode.

Item A2429. The composite material of any one of items A3-A863 or B2-B15 where the nanotube is a boron carbon nanotube and the second structural entity is boron nitride.

Item A2430. The composite material of any one of items A3-A863 or B2-B15 where the nanotube is a boron carbon nanotube and the second structural entity is buckyball.

Item A2431. The composite material of any one of items A3-A863 or B2-B15 where the nanotube is a boron carbon nanotube and the second structural entity is carbon nanofibres.

Item A2432. The composite material of any one of items A3-A863 or B2-B15 where the nanotube is a boron carbon nanotube and the second structural entity is concrete.

Item A2433. The composite material of any one of items A3-A863 or B2-B15 where the nanotube is a boron carbon nanotube and the second structural entity is glass fibre.

Item A2434. The composite material of any one of items A3-A863 or B2-B15 where the nanotube is a boron carbon nanotube and the second structural entity is graphene oxide.

Item A2435. The composite material of any one of items A3-A863 or B2-B15 where the nanotube is a boron carbon nanotube and the second structural entity is graphyne.

Item A2436. The composite material of any one of items A3-A863 or B2-B15 where the nanotube is a boron carbon nanotube and the second structural entity is stainless steel.

Item A2437. The composite material of any one of items A3-A863 or B2-B15 where the nanotube is a boron carbon nanotube and the second structural entity is an organic material.

Item A2438. The composite material of any one of items A3-A863 or B2-B15 where the nanotube is a boron carbon nanotube and the second structural entity is a capacitator.

Item A2439. The composite material of any one of items A3-A863 or B2-B15 where the nanotube is a boron nitride nanotube and the second structural entity is a cathode.

Item A2440. The composite material of any one of items A3-A863 or B2-B15 where the nanotube is a boron nitride nanotube and the second structural entity is a metalised dielectric.

Item A2441. The composite material of any one of items A3-A863 or B2-B15 where the nanotube is a boron nitride nanotube and the second structural entity is a peptide.

Item A2442. The composite material of any one of items A3-A863 or B2-B15 where the nanotube is a boron nitride nanotube and the second structural entity is a protein.

Item A2443. The composite material of any one of items A3-A863 or B2-B15 where the nanotube is a boron nitride nanotube and the second structural entity is a semiconductor.

Item A2444. The composite material of any one of items A3-A863 or B2-B15 where the nanotube is a boron nitride nanotube and the second structural entity is a sensor.

Item A2445. The composite material of any one of items A3-A863 or B2-B15 where the nanotube is a boron nitride nanotube and the second structural entity is aluminium.

Item A2446. The composite material of any one of items A3-A863 or B2-B15 where the nanotube is a boron nitride nanotube and the second structural entity is an anode.

Item A2447. The composite material of any one of items A3-A863 or B2-B15 where the nanotube is a boron nitride nanotube and the second structural entity is an antibody.

Item A2448. The composite material of any one of items A3-A863 or B2-B15 where the nanotube is a boron nitride nanotube and the second structural entity is electrode.

Item A2449. The composite material of any one of items A3-A863 or B2-B15 where the nanotube is a boron nitride nanotube and the second structural entity is boron nitride.

Item A2450. The composite material of any one of items A3-A863 or B2-B15 where the nanotube is a boron nitride nanotube and the second structural entity is buckyball.

Item A2451. The composite material of any one of items A3-A863 or B2-B15 where the nanotube is a boron nitride nanotube and the second structural entity is carbon nanofibres.

Item A2452. The composite material of any one of items A3-A863 or B2-B15 where the nanotube is a boron nitride nanotube and the second structural entity is concrete.

Item A2453. The composite material of any one of items A3-A863 or B2-B15 where the nanotube is a boron nitride nanotube and the second structural entity is glass fibre.

Item A2454. The composite material of any one of items A3-A863 or B2-B15 where the nanotube is a boron nitride nanotube and the second structural entity is graphene oxide.

Item A2455. The composite material of any one of items A3-A863 or B2-B15 where the nanotube is a boron nitride nanotube and the second structural entity is graphyne.

Item A2456. The composite material of any one of items A3-A863 or B2-B15 where the nanotube is a boron nitride nanotube and the second structural entity is stainless steel.

Item A2457. The composite material of any one of items A3-A863 or B2-B15 where the nanotube is a boron nitride nanotube and the second structural entity is an organic material.

Item A2458. The composite material of any one of items A3-A863 or B2-B15 where the nanotube is a boron nitride nanotube and the second structural entity is a capacitator.

Item A2459. The composite material of any one of items A3-A863 or B2-B15 where the nanotube is a gallium nitride nanotube and the second structural entity is a cathode.

Item A2460. The composite material of any one of items A3-A863 or B2-B15 where the nanotube is a gallium nitride nanotube and the second structural entity is a metalised dielectric.

Item A2461. The composite material of any one of items A3-A863 or B2-B15 where the nanotube is a gallium nitride nanotube and the second structural entity is a peptide.

Item A2462. The composite material of any one of items A3-A863 or B2-B15 where the nanotube is a gallium nitride nanotube and the second structural entity is a protein.

Item A2463. The composite material of any one of items A3-A863 or B2-B15 where the nanotube is a gallium nitride nanotube and the second structural entity is a semiconductor.

Item A2464. The composite material of any one of items A3-A863 or B2-B15 where the nanotube is a gallium nitride nanotube and the second structural entity is a sensor.

Item A2465. The composite material of any one of items A3-A863 or B2-B15 where the nanotube is a gallium nitride nanotube and the second structural entity is aluminium.

Item A2466. The composite material of any one of items A3-A863 or B2-B15 where the nanotube is a gallium nitride nanotube and the second structural entity is an anode.

Item A2467. The composite material of any one of items A3-A863 or B2-B15 where the nanotube is a gallium nitride nanotube and the second structural entity is an antibody.

Item A2468. The composite material of any one of items A3-A863 or B2-B15 where the nanotube is a gallium nitride nanotube and the second structural entity is electrode.

Item A2469. The composite material of any one of items A3-A863 or B2-B15 where the nanotube is a gallium nitride nanotube and the second structural entity is boron nitride.

Item A2470. The composite material of any one of items A3-A863 or B2-B15 where the nanotube is a gallium nitride nanotube and the second structural entity is buckyball.

Item A2471. The composite material of any one of items A3-A863 or B2-B15 where the nanotube is a gallium nitride nanotube and the second structural entity is carbon nanofibres.

Item A2472. The composite material of any one of items A3-A863 or B2-B15 where the nanotube is a gallium nitride nanotube and the second structural entity is concrete.

Item A2473. The composite material of any one of items A3-A863 or B2-B15 where the nanotube is a gallium nitride nanotube and the second structural entity is glass fibre.

Item A2474. The composite material of any one of items A3-A863 or B2-B15 where the nanotube is a gallium nitride nanotube and the second structural entity is graphene oxide.

Item A2475. The composite material of any one of items A3-A863 or B2-B15 where the nanotube is a gallium nitride nanotube and the second structural entity is graphyne.

Item A2476. The composite material of any one of items A3-A863 or B2-B15 where the nanotube is a gallium nitride nanotube and the second structural entity is stainless steel.

Item A2477. The composite material of any one of items A3-A863 or B2-B15 where the nanotube is a gallium nitride nanotube and the second structural entity is an organic material.

Item A2478. The composite material of any one of items A3-A863 or B2-B15 where the nanotube is a gallium nitride nanotube and the second structural entity is a capacitator.

Item A2479. The composite material of any one of items A3-A863 or B2-B15 where the nanotube is a gallium phosphide nanotube and the second structural entity is a cathode.

Item A2480. The composite material of any one of items A3-A863 or B2-B15 where the nanotube is a gallium phosphide nanotube and the second structural entity is a metalised dielectric.

Item A2481. The composite material of any one of items A3-A863 or B2-B15 where the nanotube is a gallium phosphide nanotube and the second structural entity is a peptide.

Item A2482. The composite material of any one of items A3-A863 or B2-B15 where the nanotube is a gallium phosphide nanotube and the second structural entity is a protein.

Item A2483. The composite material of any one of items A3-A863 or B2-B15 where the nanotube is a gallium phosphide nanotube and the second structural entity is a semiconductor.

Item A2484. The composite material of any one of items A3-A863 or B2-B15 where the nanotube is a gallium phosphide nanotube and the second structural entity is a sensor.

Item A2485. The composite material of any one of items A3-A863 or B2-B15 where the nanotube is a gallium phosphide nanotube and the second structural entity is aluminium.

Item A2486. The composite material of any one of items A3-A863 or B2-B15 where the nanotube is a gallium phosphide nanotube and the second structural entity is an anode.

Item A2487. The composite material of any one of items A3-A863 or B2-B15 where the nanotube is a gallium phosphide nanotube and the second structural entity is an antibody.

Item A2488. The composite material of any one of items A3-A863 or B2-B15 where the nanotube is a gallium phosphide nanotube and the second structural entity is electrode.

Item A2489. The composite material of any one of items A3-A863 or B2-B15 where the nanotube is a gallium phosphide nanotube and the second structural entity is boron nitride.

Item A2490. The composite material of any one of items A3-A863 or B2-B15 where the nanotube is a gallium phosphide nanotube and the second structural entity is buckyball.

Item A2491. The composite material of any one of items A3-A863 or B2-B15 where the nanotube is a gallium phosphide nanotube and the second structural entity is carbon nanofibres.

Item A2492. The composite material of any one of items A3-A863 or B2-B15 where the nanotube is a gallium phosphide nanotube and the second structural entity is concrete.

Item A2493. The composite material of any one of items A3-A863 or B2-B15 where the nanotube is a gallium phosphide nanotube and the second structural entity is glass fibre.

Item A2494. The composite material of any one of items A3-A863 or B2-B15 where the nanotube is a gallium phosphide nanotube and the second structural entity is graphene oxide.

Item A2495. The composite material of any one of items A3-A863 or B2-B15 where the nanotube is a gallium phosphide nanotube and the second structural entity is graphyne.

Item A2496. The composite material of any one of items A3-A863 or B2-B15 where the nanotube is a gallium phosphide nanotube and the second structural entity is stainless steel.

Item A2497. The composite material of any one of items A3-A863 or B2-B15 where the nanotube is a gallium phosphide nanotube and the second structural entity is an organic material.

Item A2498. The composite material of any one of items A3-A863 or B2-B15 where the nanotube is a gallium phosphide nanotube and the second structural entity is a capacitator.

Item A2499. The composite material of any one of items A3-A863 or B2-B15 where the nanotube is a gold nanotube and the second structural entity is a cathode.

Item A2500. The composite material of any one of items A3-A863 or B2-B15 where the nanotube is a gold nanotube and the second structural entity is a metalised dielectric.

Item A2501. The composite material of any one of items A3-A863 or B2-B15 where the nanotube is a gold nanotube and the second structural entity is a peptide.

Item A2502. The composite material of any one of items A3-A863 or B2-B15 where the nanotube is a gold nanotube and the second structural entity is a protein.

Item A2503. The composite material of any one of items A3-A863 or B2-B15 where the nanotube is a gold nanotube and the second structural entity is a semiconductor.

Item A2504. The composite material of any one of items A3-A863 or B2-B15 where the nanotube is a gold nanotube and the second structural entity is a sensor.

Item A2505. The composite material of any one of items A3-A863 or B2-B15 where the nanotube is a gold nanotube and the second structural entity is aluminium.

Item A2506. The composite material of any one of items A3-A863 or B2-B15 where the nanotube is a gold nanotube and the second structural entity is an anode.

Item A2507. The composite material of any one of items A3-A863 or B2-B15 where the nanotube is a gold nanotube and the second structural entity is an antibody.

Item A2508. The composite material of any one of items A3-A863 or B2-B15 where the nanotube is a gold nanotube and the second structural entity is electrode.

Item A2509. The composite material of any one of items A3-A863 or B2-B15 where the nanotube is a gold nanotube and the second structural entity is boron nitride.

Item A2510. The composite material of any one of items A3-A863 or B2-B15 where the nanotube is a gold nanotube and the second structural entity is buckyball.

Item A2511. The composite material of any one of items A3-A863 or B2-B15 where the nanotube is a gold nanotube and the second structural entity is carbon nanofibres.

Item A2512. The composite material of any one of items A3-A863 or B2-B15 where the nanotube is a gold nanotube and the second structural entity is concrete.

Item A2513. The composite material of any one of items A3-A863 or B2-B15 where the nanotube is a gold nanotube and the second structural entity is glass fibre.

Item A2514. The composite material of any one of items A3-A863 or B2-B15 where the nanotube is a gold nanotube and the second structural entity is graphene oxide.

Item A2515. The composite material of any one of items A3-A863 or B2-B15 where the nanotube is a gold nanotube and the second structural entity is graphyne.

Item A2516. The composite material of any one of items A3-A863 or B2-B15 where the nanotube is a gold nanotube and the second structural entity is stainless steel.

Item A2517. The composite material of any one of items A3-A863 or B2-B15 where the nanotube is a gold nanotube and the second structural entity is an organic material.

Item A2518. The composite material of any one of items A3-A863 or B2-B15 where the nanotube is a gold nanotube and the second structural entity is a capacitator.

Item A2519. The composite material of any one of items A3-A863 or B2-B15 where the nanotube is a multi wall nanotube and the second structural entity is a cathode.

Item A2520. The composite material of any one of items A3-A863 or B2-B15 where the nanotube is a multi wall nanotube and the second structural entity is a metalised dielectric.

Item A2521. The composite material of any one of items A3-A863 or B2-B15 where the nanotube is a multi wall nanotube and the second structural entity is a peptide.

Item A2522. The composite material of any one of items A3-A863 or B2-B15 where the nanotube is a multi wall nanotube and the second structural entity is a protein.

Item A2523. The composite material of any one of items A3-A863 or B2-B15 where the nanotube is a multi wall nanotube and the second structural entity is a semiconductor.

Item A2524. The composite material of any one of items A3-A863 or B2-B15 where the nanotube is a multi wall nanotube and the second structural entity is a sensor.

Item A2525. The composite material of any one of items A3-A863 or B2-B15 where the nanotube is a multi wall nanotube and the second structural entity is aluminium.

Item A2526. The composite material of any one of items A3-A863 or B2-B15 where the nanotube is a multi wall nanotube and the second structural entity is an anode.

Item A2527. The composite material of any one of items A3-A863 or B2-B15 where the nanotube is a multi wall nanotube and the second structural entity is an antibody.

Item A2528. The composite material of any one of items A3-A863 or B2-B15 where the nanotube is a multi wall nanotube and the second structural entity is electrode.

Item A2529. The composite material of any one of items A3-A863 or B2-B15 where the nanotube is a multi wall nanotube and the second structural entity is boron nitride.

Item A2530. The composite material of any one of items A3-A863 or B2-B15 where the nanotube is a multi wall nanotube and the second structural entity is buckyball.

Item A2531. The composite material of any one of items A3-A863 or B2-B15 where the nanotube is a multi wall nanotube and the second structural entity is carbon nanofibres.

Item A2532. The composite material of any one of items A3-A863 or B2-B15 where the nanotube is a multi wall nanotube and the second structural entity is concrete.

Item A2533. The composite material of any one of items A3-A863 or B2-B15 where the nanotube is a multi wall nanotube and the second structural entity is glass fibre.

Item A2534. The composite material of any one of items A3-A863 or B2-B15 where the nanotube is a multi wall nanotube and the second structural entity is graphene oxide.

Item A2535. The composite material of any one of items A3-A863 or B2-B15 where the nanotube is a multi wall nanotube and the second structural entity is graphyne.

Item A2536. The composite material of any one of items A3-A863 or B2-B15 where the nanotube is a multi wall nanotube and the second structural entity is stainless steel.

Item A2537. The composite material of any one of items A3-A863 or B2-B15 where the nanotube is a multi wall nanotube and the second structural entity is an organic material.

Item A2538. The composite material of any one of items A3-A863 or B2-B15 where the nanotube is a multi wall nanotube and the second structural entity is a capacitator.

Item A2539. The composite material of any one of items A3-A863 or B2-B15 where the nanotube is a platinum nanotube and the second structural entity is a cathode.

Item A2540. The composite material of any one of items A3-A863 or B2-B15 where the nanotube is a platinum nanotube and the second structural entity is a metalised dielectric.

Item A2541. The composite material of any one of items A3-A863 or B2-B15 where the nanotube is a platinum nanotube and the second structural entity is a peptide.

Item A2542. The composite material of any one of items A3-A863 or B2-B15 where the nanotube is a platinum nanotube and the second structural entity is a protein.

Item A2543. The composite material of any one of items A3-A863 or B2-B15 where the nanotube is a platinum nanotube and the second structural entity is a semiconductor.

Item A2544. The composite material of any one of items A3-A863 or B2-B15 where the nanotube is a platinum nanotube and the second structural entity is a sensor.

Item A2545. The composite material of any one of items A3-A863 or B2-B15 where the nanotube is a platinum nanotube and the second structural entity is aluminium.

Item A2546. The composite material of any one of items A3-A863 or B2-B15 where the nanotube is a platinum nanotube and the second structural entity is an anode.

Item A2547. The composite material of any one of items A3-A863 or B2-B15 where the nanotube is a platinum nanotube and the second structural entity is an antibody.

Item A2548. The composite material of any one of items A3-A863 or B2-B15 where the nanotube is a platinum nanotube and the second structural entity is electrode.

Item A2549. The composite material of any one of items A3-A863 or B2-B15 where the nanotube is a platinum nanotube and the second structural entity is boron nitride.

Item A2550. The composite material of any one of items A3-A863 or B2-B15 where the nanotube is a platinum nanotube and the second structural entity is buckyball.

Item A2551. The composite material of any one of items A3-A863 or B2-B15 where the nanotube is a platinum nanotube and the second structural entity is carbon nanofibres.

Item A2552. The composite material of any one of items A3-A863 or B2-B15 where the nanotube is a platinum nanotube and the second structural entity is concrete.

Item A2553. The composite material of any one of items A3-A863 or B2-B15 where the nanotube is a platinum nanotube and the second structural entity is glass fibre.

Item A2554. The composite material of any one of items A3-A863 or B2-B15 where the nanotube is a platinum nanotube and the second structural entity is graphene oxide.

Item A2555. The composite material of any one of items A3-A863 or B2-B15 where the nanotube is a platinum nanotube and the second structural entity is graphyne.

Item A2556. The composite material of any one of items A3-A863 or B2-B15 where the nanotube is a platinum nanotube and the second structural entity is stainless steel.

Item A2557. The composite material of any one of items A3-A863 or B2-B15 where the nanotube is a platinum nanotube and the second structural entity is an organic material.

Item A2558. The composite material of any one of items A3-A863 or B2-B15 where the nanotube is a platinum nanotube and the second structural entity is a capacitator.

Item A2559. The composite material of any one of items A3-A863 or B2-B15 where the nanotube is a single wall nanotube and the second structural entity is a cathode.

Item A2560. The composite material of any one of items A3-A863 or B2-B15 where the nanotube is a single wall nanotube and the second structural entity is a metalised dielectric.

Item A2561. The composite material of any one of items A3-A863 or B2-B15 where the nanotube is a single wall nanotube and the second structural entity is a peptide.

Item A2562. The composite material of any one of items A3-A863 or B2-B15 where the nanotube is a single wall nanotube and the second structural entity is a protein.

Item A2563. The composite material of any one of items A3-A863 or B2-B15 where the nanotube is a single wall nanotube and the second structural entity is a semiconductor.

Item A2564. The composite material of any one of items A3-A863 or B2-B15 where the nanotube is a single wall nanotube and the second structural entity is a sensor.

Item A2565. The composite material of any one of items A3-A863 or B2-B15 where the nanotube is a single wall nanotube and the second structural entity is aluminium.

Item A2566. The composite material of any one of items A3-A863 or B2-B15 where the nanotube is a single wall nanotube and the second structural entity is an anode.

Item A2567. The composite material of any one of items A3-A863 or B2-B15 where the nanotube is a single wall nanotube and the second structural entity is an antibody.

Item A2568. The composite material of any one of items A3-A863 or B2-B15 where the nanotube is a single wall nanotube and the second structural entity is electrode.

Item A2569. The composite material of any one of items A3-A863 or B2-B15 where the nanotube is a single wall nanotube and the second structural entity is boron nitride.

Item A2570. The composite material of any one of items A3-A863 or B2-B15 where the nanotube is a single wall nanotube and the second structural entity is buckyball.

Item A2571. The composite material of any one of items A3-A863 or B2-B15 where the nanotube is a single wall nanotube and the second structural entity is carbon nanofibres.

Item A2572. The composite material of any one of items A3-A863 or B2-B15 where the nanotube is a single wall nanotube and the second structural entity is concrete.

Item A2573. The composite material of any one of items A3-A863 or B2-B15 where the nanotube is a single wall nanotube and the second structural entity is glass fibre.

Item A2574. The composite material of any one of items A3-A863 or B2-B15 where the nanotube is a single wall nanotube and the second structural entity is graphene oxide.

Item A2575. The composite material of any one of items A3-A863 or B2-B15 where the nanotube is a single wall nanotube and the second structural entity is graphyne.

Item A2576. The composite material of any one of items A3-A863 or B2-B15 where the nanotube is a single wall nanotube and the second structural entity is stainless steel.

Item A2577. The composite material of any one of items A3-A863 or B2-B15 where the nanotube is a single wall nanotube and the second structural entity is an organic material.

Item A2578. The composite material of any one of items A3-A863 or B2-B15 where the nanotube is a single wall nanotube and the second structural entity is a capacitator.

Item A2579. The composite material of any one of items A3-A863 or B2-B15 where the nanotube is a titanium dioxide nanotube and the second structural entity is a cathode.

Item A2580. The composite material of any one of items A3-A863 or B2-B15 where the nanotube is a titanium dioxide nanotube and the second structural entity is a metalised dielectric.

Item A2581. The composite material of any one of items A3-A863 or B2-B15 where the nanotube is a titanium dioxide nanotube and the second structural entity is a peptide.

Item A2582. The composite material of any one of items A3-A863 or B2-B15 where the nanotube is a titanium dioxide nanotube and the second structural entity is a protein.

Item A2583. The composite material of any one of items A3-A863 or B2-B15 where the nanotube is a titanium dioxide nanotube and the second structural entity is a semiconductor.

Item A2584. The composite material of any one of items A3-A863 or B2-B15 where the nanotube is a titanium dioxide nanotube and the second structural entity is a sensor.

Item A2585. The composite material of any one of items A3-A863 or B2-B15 where the nanotube is a titanium dioxide nanotube and the second structural entity is aluminium.

Item A2586. The composite material of any one of items A3-A863 or B2-B15 where the nanotube is a titanium dioxide nanotube and the second structural entity is an anode.

Item A2587. The composite material of any one of items A3-A863 or B2-B15 where the nanotube is a titanium dioxide nanotube and the second structural entity is an antibody.

Item A2588. The composite material of any one of items A3-A863 or B2-B15 where the nanotube is a titanium dioxide nanotube and the second structural entity is electrode.

Item A2589. The composite material of any one of items A3-A863 or B2-B15 where the nanotube is a titanium dioxide nanotube and the second structural entity is boron nitride.

Item A2590. The composite material of any one of items A3-A863 or B2-B15 where the nanotube is a titanium dioxide nanotube and the second structural entity is buckyball.

Item A2591. The composite material of any one of items A3-A863 or B2-B15 where the nanotube is a titanium dioxide nanotube and the second structural entity is carbon nanofibres.

Item A2592. The composite material of any one of items A3-A863 or B2-B15 where the nanotube is a titanium dioxide nanotube and the second structural entity is concrete.

Item A2593. The composite material of any one of items A3-A863 or B2-B15 where the nanotube is a titanium dioxide nanotube and the second structural entity is glass fibre.

Item A2594. The composite material of any one of items A3-A863 or B2-B15 where the nanotube is a titanium dioxide nanotube and the second structural entity is graphene oxide.

Item A2595. The composite material of any one of items A3-A863 or B2-B15 where the nanotube is a titanium dioxide nanotube and the second structural entity is graphyne.

Item A2596. The composite material of any one of items A3-A863 or B2-B15 where the nanotube is a titanium dioxide nanotube and the second structural entity is stainless steel.

Item A2597. The composite material of any one of items A3-A863 or B2-B15 where the nanotube is a titanium dioxide nanotube and the second structural entity is an organic material.

Item A2598. The composite material of any one of items A3-A863 or B2-B15 where the nanotube is a titanium dioxide nanotube and the second structural entity is a capacitator.

Item A2599. The composite material of any one of items A3-A863 or B2-B15 where the nanotube is a titanium oxide nanotube and the second structural entity is a cathode.

Item A2600. The composite material of any one of items A3-A863 or B2-B15 where the nanotube is a titanium oxide nanotube and the second structural entity is a metalised dielectric.

Item A2601. The composite material of any one of items A3-A863 or B2-B15 where the nanotube is a titanium oxide nanotube and the second structural entity is a peptide.

Item A2602. The composite material of any one of items A3-A863 or B2-B15 where the nanotube is a titanium oxide nanotube and the second structural entity is a protein.

Item A2603. The composite material of any one of items A3-A863 or B2-B15 where the nanotube is a titanium oxide nanotube and the second structural entity is a semiconductor.

Item A2604. The composite material of any one of items A3-A863 or B2-B15 where the nanotube is a titanium oxide nanotube and the second structural entity is a sensor.

Item A2605. The composite material of any one of items A3-A863 or B2-B15 where the nanotube is a titanium oxide nanotube and the second structural entity is aluminium.

Item A2606. The composite material of any one of items A3-A863 or B2-B15 where the nanotube is a titanium oxide nanotube and the second structural entity is an anode.

Item A2607. The composite material of any one of items A3-A863 or B2-B15 where the nanotube is a titanium oxide nanotube and the second structural entity is an antibody.

Item A2608. The composite material of any one of items A3-A863 or B2-B15 where the nanotube is a titanium oxide nanotube and the second structural entity is electrode.

Item A2609. The composite material of any one of items A3-A863 or B2-B15 where the nanotube is a titanium oxide nanotube and the second structural entity is boron nitride.

Item A2610. The composite material of any one of items A3-A863 or B2-B15 where the nanotube is a titanium oxide nanotube and the second structural entity is buckyball.

Item A2611. The composite material of any one of items A3-A863 or B2-B15 where the nanotube is a titanium oxide nanotube and the second structural entity is carbon nanofibres.

Item A2612. The composite material of any one of items A3-A863 or B2-B15 where the nanotube is a titanium oxide nanotube and the second structural entity is concrete.

Item A2613. The composite material of any one of items A3-A863 or B2-B15 where the nanotube is a titanium oxide nanotube and the second structural entity is glass fibre.

Item A2614. The composite material of any one of items A3-A863 or B2-B15 where the nanotube is a titanium oxide nanotube and the second structural entity is graphene oxide.

Item A2615. The composite material of any one of items A3-A863 or B2-B15 where the nanotube is a titanium oxide nanotube and the second structural entity is graphyne.

Item A2616. The composite material of any one of items A3-A863 or B2-B15 where the nanotube is a titanium oxide nanotube and the second structural entity is stainless steel.

Item A2617. The composite material of any one of items A3-A863 or B2-B15 where the nanotube is a titanium oxide nanotube and the second structural entity is an organic material.

Item A2618. The composite material of any one of items A3-A863 or B2-B15 where the nanotube is a titanium oxide nanotube and the second structural entity is a capacitator.

Item A2619. The composite material of any one of items A3-A863 or B2-B15 where the nanotube is a tungsten disulfide nanotube and the second structural entity is a cathode.

Item A2620. The composite material of any one of items A3-A863 or B2-B15 where the nanotube is a tungsten disulfide nanotube and the second structural entity is a metalised dielectric.

Item A2621. The composite material of any one of items A3-A863 or B2-B15 where the nanotube is a tungsten disulfide nanotube and the second structural entity is a peptide.

Item A2622. The composite material of any one of items A3-A863 or B2-B15 where the nanotube is a tungsten disulfide nanotube and the second structural entity is a protein.

Item A2623. The composite material of any one of items A3-A863 or B2-B15 where the nanotube is a tungsten disulfide nanotube and the second structural entity is a semiconductor.

Item A2624. The composite material of any one of items A3-A863 or B2-B15 where the nanotube is a tungsten disulfide nanotube and the second structural entity is a sensor.

Item A2625. The composite material of any one of items A3-A863 or B2-B15 where the nanotube is a tungsten disulfide nanotube and the second structural entity is aluminium.

Item A2626. The composite material of any one of items A3-A863 or B2-B15 where the nanotube is a tungsten disulfide nanotube and the second structural entity is an anode.

Item A2627. The composite material of any one of items A3-A863 or B2-B15 where the nanotube is a tungsten disulfide nanotube and the second structural entity is an antibody.

Item A2628. The composite material of any one of items A3-A863 or B2-B15 where the nanotube is a tungsten disulfide nanotube and the second structural entity is electrode.

Item A2629. The composite material of any one of items A3-A863 or B2-B15 where the nanotube is a tungsten disulfide nanotube and the second structural entity is boron nitride.

Item A2630. The composite material of any one of items A3-A863 or B2-B15 where the nanotube is a tungsten disulfide nanotube and the second structural entity is buckyball.

Item A2631. The composite material of any one of items A3-A863 or B2-B15 where the nanotube is a tungsten disulfide nanotube and the second structural entity is carbon nanofibres.

Item A2632. The composite material of any one of items A3-A863 or B2-B15 where the nanotube is a tungsten disulfide nanotube and the second structural entity is concrete.

Item A2633. The composite material of any one of items A3-A863 or B2-B15 where the nanotube is a tungsten disulfide nanotube and the second structural entity is glass fibre.

Item A2634. The composite material of any one of items A3-A863 or B2-B15 where the nanotube is a tungsten disulfide nanotube and the second structural entity is graphene oxide.

Item A2635. The composite material of any one of items A3-A863 or B2-B15 where the nanotube is a tungsten disulfide nanotube and the second structural entity is graphyne.

Item A2636. The composite material of any one of items A3-A863 or B2-B15 where the nanotube is a tungsten disulfide nanotube and the second structural entity is stainless steel.

Item A2637. The composite material of any one of items A3-A863 or B2-B15 where the nanotube is a tungsten disulfide nanotube and the second structural entity is an organic material.

Item A2638. The composite material of any one of items A3-A863 or B2-B15 where the nanotube is a tungsten disulfide nanotube and the second structural entity is a capacitator.

Item A2639. The composite material of any one of items A3-A863 or B2-B15 where the nanotube is a tungsten sulfide nanotube and the second structural entity is a cathode.

Item A2640. The composite material of any one of items A3-A863 or B2-B15 where the nanotube is a tungsten sulfide nanotube and the second structural entity is a metalised dielectric.

Item A2641. The composite material of any one of items A3-A863 or B2-B15 where the nanotube is a tungsten sulfide nanotube and the second structural entity is a peptide.

Item A2642. The composite material of any one of items A3-A863 or B2-B15 where the nanotube is a tungsten sulfide nanotube and the second structural entity is a protein.

Item A2643. The composite material of any one of items A3-A863 or B2-B15 where the nanotube is a tungsten sulfide nanotube and the second structural entity is a semiconductor.

Item A2644. The composite material of any one of items A3-A863 or B2-B15 where the nanotube is a tungsten sulfide nanotube and the second structural entity is a sensor.

Item A2645. The composite material of any one of items A3-A863 or B2-B15 where the nanotube is a tungsten sulfide nanotube and the second structural entity is aluminium.

Item A2646. The composite material of any one of items A3-A863 or B2-B15 where the nanotube is a tungsten sulfide nanotube and the second structural entity is an anode.

Item A2647. The composite material of any one of items A3-A863 or B2-B15 where the nanotube is a tungsten sulfide nanotube and the second structural entity is an antibody.

Item A2648. The composite material of any one of items A3-A863 or B2-B15 where the nanotube is a tungsten sulfide nanotube and the second structural entity is electrode.

Item A2649. The composite material of any one of items A3-A863 or B2-B15 where the nanotube is a tungsten sulfide nanotube and the second structural entity is boron nitride.

Item A2650. The composite material of any one of items A3-A863 or B2-B15 where the nanotube is a tungsten sulfide nanotube and the second structural entity is buckyball.

Item A2651. The composite material of any one of items A3-A863 or B2-B15 where the nanotube is a tungsten sulfide nanotube and the second structural entity is carbon nanofibres.

Item A2652. The composite material of any one of items A3-A863 or B2-B15 where the nanotube is a tungsten sulfide nanotube and the second structural entity is concrete.

Item A2653. The composite material of any one of items A3-A863 or B2-B15 where the nanotube is a tungsten sulfide nanotube and the second structural entity is glass fibre.

Item A2654. The composite material of any one of items A3-A863 or B2-B15 where the nanotube is a tungsten sulfide nanotube and the second structural entity is graphene oxide.

Item A2655. The composite material of any one of items A3-A863 or B2-B15 where the nanotube is a tungsten sulfide nanotube and the second structural entity is graphyne.

Item A2656. The composite material of any one of items A3-A863 or B2-B15 where the nanotube is a tungsten sulfide nanotube and the second structural entity is stainless steel.

Item A2657. The composite material of any one of items A3-A863 or B2-B15 where the nanotube is a tungsten sulfide nanotube and the second structural entity is an organic material.

Item A2658. The composite material of any one of items A3-A863 or B2-B15 where the nanotube is a tungsten sulfide nanotube and the second structural entity is a capacitator.

Item A2659. The composite material of any one of items A3-A863 or B2-B15 where the nanotube is a zinc ferrite nanotube and the second structural entity is a cathode.

Item A2660. The composite material of any one of items A3-A863 or B2-B15 where the nanotube is a zinc ferrite nanotube and the second structural entity is a metalised dielectric.

Item A2661. The composite material of any one of items A3-A863 or B2-B15 where the nanotube is a zinc ferrite nanotube and the second structural entity is a peptide.

Item A2662. The composite material of any one of items A3-A863 or B2-B15 where the nanotube is a zinc ferrite nanotube and the second structural entity is a protein.

Item A2663. The composite material of any one of items A3-A863 or B2-B15 where the nanotube is a zinc ferrite nanotube and the second structural entity is a semiconductor.

Item A2664. The composite material of any one of items A3-A863 or B2-B15 where the nanotube is a zinc ferrite nanotube and the second structural entity is a sensor.

Item A2665. The composite material of any one of items A3-A863 or B2-B15 where the nanotube is a zinc ferrite nanotube and the second structural entity is aluminium.

Item A2666. The composite material of any one of items A3-A863 or B2-B15 where the nanotube is a zinc ferrite nanotube and the second structural entity is an anode.

Item A2667. The composite material of any one of items A3-A863 or B2-B15 where the nanotube is a zinc ferrite nanotube and the second structural entity is an antibody.

Item A2668. The composite material of any one of items A3-A863 or B2-B15 where the nanotube is a zinc ferrite nanotube and the second structural entity is electrode.

Item A2669. The composite material of any one of items A3-A863 or B2-B15 where the nanotube is a zinc ferrite nanotube and the second structural entity is boron nitride.

Item A2670. The composite material of any one of items A3-A863 or B2-B15 where the nanotube is a zinc ferrite nanotube and the second structural entity is buckyball.

Item A2671. The composite material of any one of items A3-A863 or B2-B15 where the nanotube is a zinc ferrite nanotube and the second structural entity is carbon nanofibres.

Item A2672. The composite material of any one of items A3-A863 or B2-B15 where the nanotube is a zinc ferrite nanotube and the second structural entity is concrete.

Item A2673. The composite material of any one of items A3-A863 or B2-B15 where the nanotube is a zinc ferrite nanotube and the second structural entity is glass fibre.

Item A2674. The composite material of any one of items A3-A863 or B2-B15 where the nanotube is a zinc ferrite nanotube and the second structural entity is graphene oxide.

Item A2675. The composite material of any one of items A3-A863 or B2-B15 where the nanotube is a zinc ferrite nanotube and the second structural entity is graphyne.

Item A2676. The composite material of any one of items A3-A863 or B2-B15 where the nanotube is a zinc ferrite nanotube and the second structural entity is stainless steel.

Item A2677. The composite material of any one of items A3-A863 or B2-B15 where the nanotube is a zinc ferrite nanotube and the second structural entity is an organic material.

Item A2678. The composite material of any one of items A3-A863 or B2-B15 where the nanotube is a zinc ferrite nanotube and the second structural entity is a capacitator.

Item A2679. The composite material of any one of items A3-A863 or B2-B15 where the nanotube is a zinc oxide nanotube and the second structural entity is a cathode.

Item A2680. The composite material of any one of items A3-A863 or B2-B15 where the nanotube is a zinc oxide nanotube and the second structural entity is a metalised dielectric.

Item A2681. The composite material of any one of items A3-A863 or B2-B15 where the nanotube is a zinc oxide nanotube and the second structural entity is a peptide.

Item A2682. The composite material of any one of items A3-A863 or B2-B15 where the nanotube is a zinc oxide nanotube and the second structural entity is a protein.

Item A2683. The composite material of any one of items A3-A863 or B2-B15 where the nanotube is a zinc oxide nanotube and the second structural entity is a semiconductor.

Item A2684. The composite material of any one of items A3-A863 or B2-B15 where the nanotube is a zinc oxide nanotube and the second structural entity is a sensor.

Item A2685. The composite material of any one of items A3-A863 or B2-B15 where the nanotube is a zinc oxide nanotube and the second structural entity is aluminium.

Item A2686. The composite material of any one of items A3-A863 or B2-B15 where the nanotube is a zinc oxide nanotube and the second structural entity is an anode.

Item A2687. The composite material of any one of items A3-A863 or B2-B15 where the nanotube is a zinc oxide nanotube and the second structural entity is an antibody.

Item A2688. The composite material of any one of items A3-A863 or B2-B15 where the nanotube is a zinc oxide nanotube and the second structural entity is electrode.

Item A2689. The composite material of any one of items A3-A863 or B2-B15 where the nanotube is a zinc oxide nanotube and the second structural entity is boron nitride.

Item A2690. The composite material of any one of items A3-A863 or B2-B15 where the nanotube is a zinc oxide nanotube and the second structural entity is buckyball.

Item A2691. The composite material of any one of items A3-A863 or B2-B15 where the nanotube is a zinc oxide nanotube and the second structural entity is carbon nanofibres.

Item A2692. The composite material of any one of items A3-A863 or B2-B15 where the nanotube is a zinc oxide nanotube and the second structural entity is concrete.

Item A2693. The composite material of any one of items A3-A863 or B2-B15 where the nanotube is a zinc oxide nanotube and the second structural entity is glass fibre.

Item A2694. The composite material of any one of items A3-A863 or B2-B15 where the nanotube is a zinc oxide nanotube and the second structural entity is graphene oxide.

Item A2695. The composite material of any one of items A3-A863 or B2-B15 where the nanotube is a zinc oxide nanotube and the second structural entity is graphyne.

Item A2696. The composite material of any one of items A3-A863 or B2-B15 where the nanotube is a zinc oxide nanotube and the second structural entity is stainless steel.

Item A2697. The composite material of any one of items A3-A863 or B2-B15 where the nanotube is a zinc oxide nanotube and the second structural entity is an organic material.

Item A2698. The composite material of any one of items A3-A863 or B2-B15 where the nanotube is a zinc oxide nanotube and the second structural entity is a capacitator.

Item A2699. The composite material of any one of items A3-A863 or B2-B15 where the nanotube is a zirconia dioxide nanotube and the second structural entity is a cathode.

Item A2700. The composite material of any one of items A3-A863 or B2-B15 where the nanotube is a zirconia dioxide nanotube and the second structural entity is a metalised dielectric.

Item A2701. The composite material of any one of items A3-A863 or B2-B15 where the nanotube is a zirconia dioxide nanotube and the second structural entity is a peptide.

Item A2702. The composite material of any one of items A3-A863 or B2-B15 where the nanotube is a zirconia dioxide nanotube and the second structural entity is a protein.

Item A2703. The composite material of any one of items A3-A863 or B2-B15 where the nanotube is a zirconia dioxide nanotube and the second structural entity is a semiconductor.

Item A2704. The composite material of any one of items A3-A863 or B2-B15 where the nanotube is a zirconia dioxide nanotube and the second structural entity is a sensor.

Item A2705. The composite material of any one of items A3-A863 or B2-B15 where the nanotube is a zirconia dioxide nanotube and the second structural entity is aluminium.

Item A2706. The composite material of any one of items A3-A863 or B2-B15 where the nanotube is a zirconia dioxide nanotube and the second structural entity is an anode.

Item A2707. The composite material of any one of items A3-A863 or B2-B15 where the nanotube is a zirconia dioxide nanotube and the second structural entity is an antibody.

Item A2708. The composite material of any one of items A3-A863 or B2-B15 where the nanotube is a zirconia dioxide nanotube and the second structural entity is electrode.

Item A2709. The composite material of any one of items A3-A863 or B2-B15 where the nanotube is a zirconia dioxide nanotube and the second structural entity is boron nitride.

Item A2710. The composite material of any one of items A3-A863 or B2-B15 where the nanotube is a zirconia dioxide nanotube and the second structural entity is buckyball.

Item A2711. The composite material of any one of items A3-A863 or B2-B15 where the nanotube is a zirconia dioxide nanotube and the second structural entity is carbon nanofibres.

Item A2712. The composite material of any one of items A3-A863 or B2-B15 where the nanotube is a zirconia dioxide nanotube and the second structural entity is concrete.

Item A2713. The composite material of any one of items A3-A863 or B2-B15 where the nanotube is a zirconia dioxide nanotube and the second structural entity is glass fibre.

Item A2714. The composite material of any one of items A3-A863 or B2-B15 where the nanotube is a zirconia dioxide nanotube and the second structural entity is graphene oxide.

Item A2715. The composite material of any one of items A3-A863 or B2-B15 where the nanotube is a zirconia dioxide nanotube and the second structural entity is graphyne.

Item A2716. The composite material of any one of items A3-A863 or B2-B15 where the nanotube is a zirconia dioxide nanotube and the second structural entity is stainless steel.

Item A2717. The composite material of any one of items A3-A863 or B2-B15 where the nanotube is a zirconia dioxide nanotube and the second structural entity is an organic material.

Item A2718. The composite material of any one of items A3-A863 or B2-B15 where the nanotube is a zirconia dioxide nanotube and the second structural entity is a capacitator.

Item A2719. The composite material of any one of items A3-A863 or B2-B15 where the nanotube is a carbon nanotube and the second structural entity is carbon fibre.

Item A2720. The composite material of any one of items A3-A863 or B2-B15 where the nanotube is a single wall carbon nanotube and the second structural entity is carbon fibre.

Item A2721. The composite material of any one of items A3-A863 or B2-B15 where the nanotube is a multi wall carbon nanotube and the second structural entity is carbon fibre.

Item A2722. The composite material of any one of items A3-A863 or B2-B15 where the nanotube is a metallic carbon nanotube and the second structural entity is carbon fibre.

Item A2723. The composite material of any one of items A3-A863 or B2-B15 where the nanotube is a semiconductive carbon nanotube and the second structural entity is carbon fibre.

Item A2724. The composite material of any one of items A3-A863 or B2-B15 where the nanotube is a aluminium nanotube and the second structural entity is carbon fibre.

Item A2725. The composite material of any one of items A3-A863 or B2-B15 where the nanotube is a aluminum nitride nanotube (AlNNT) and the second structural entity is carbon fibre.

Item A2726. The composite material of any one of items A3-A863 or B2-B15 where the nanotube is a aluminum phosphide nanotube (AlPNT) and the second structural entity is carbon fibre.

Item A2727. The composite material of any one of items A3-A863 or B2-B15 where the nanotube is a bismuth nanotube and the second structural entity is carbon fibre.

Item A2728. The composite material of any one of items A3-A863 or B2-B15 where the nanotube is a bismuth selenide nanotube and the second structural entity is carbon fibre.

Item A2729. The composite material of any one of items A3-A863 or B2-B15 where the nanotube is a boron carbon nanotubes (BCNNT) and the second structural entity is carbon fibre.

Item A2730. The composite material of any one of items A3-A863 or B2-B15 where the nanotube is a boron nitride nanotube and the second structural entity is carbon fibre.

Item A2731. The composite material of any one of items A3-A863 or B2-B15 where the nanotube is a cadmium selenide nanotube and the second structural entity is carbon fibre.

Item A2732. The composite material of any one of items A3-A863 or B2-B15 where the nanotube is a cobalt selenide nanotube and the second structural entity is carbon fibre.

Item A2733. The composite material of any one of items A3-A863 or B2-B15 where the nanotube is a copper nanotube and the second structural entity is carbon fibre.

Item A2734. The composite material of any one of items A3-A863 or B2-B15 where the nanotube is a DNA nanotube and the second structural entity is carbon fibre.

Item A2735. The composite material of any one of items A3-A863 or B2-B15 where the nanotube is a gallium nitride nanotube (GaNNT) and the second structural entity is carbon fibre.

Item A2736. The composite material of any one of items A3-A863 or B2-B15 where the nanotube is a gallium phosphide nanotube (GaPNT) and the second structural entity is carbon fibre.

Item A2737. The composite material of any one of items A3-A863 or B2-B15 where the nanotube is a gold nanotube and the second structural entity is carbon fibre.

Item A2738. The composite material of any one of items A3-A863 or B2-B15 where the nanotube is a halide nanotube and the second structural entity is carbon fibre.

Item A2739. The composite material of any one of items A3-A863 or B2-B15 where the nanotube is a niobium selenide nanotube and the second structural entity is carbon fibre.

Item A2740. The composite material of any one of items A3-A863 or B2-B15 where the nanotube is a molybdenum disulfide nanotube and the second structural entity is carbon fibre.

Item A2741. The composite material of any one of items A3-A863 or B2-B15 where the nanotube is a nanotube of transition metal oxides and the second structural entity is carbon fibre.

Item A2742. The composite material of any one of items A3-A863 or B2-B15 where the nanotube is a nickel chloride nanotub and the second structural entity is carbon fibre.

Item A2743. The composite material of any one of items A3-A863 or B2-B15 where the nanotube is a platinum nanotube and the second structural entity is carbon fibre.

Item A2744. The composite material of any one of items A3-A863 or B2-B15 where the nanotube is a protein nanotube and the second structural entity is carbon fibre.

Item A2745. The composite material of any one of items A3-A863 or B2-B15 where the nanotube is a RNA nanotube and the second structural entity is carbon fibre.

Item A2746. The composite material of any one of items A3-A863 or B2-B15 where the nanotube is a selenide nanotube and the second structural entity is carbon fibre.

Item A2747. The composite material of any one of items A3-A863 or B2-B15 where the nanotube is a silicon nanotube and the second structural entity is carbon fibre.

Item A2748. The composite material of any one of items A3-A863 or B2-B15 where the nanotube is a silver nanotube and the second structural entity is carbon fibre.

Item A2749. The composite material of any one of items A3-A863 or B2-B15 where the nanotube is a sulphide nanotube and the second structural entity is carbon fibre.

Item A2750. The composite material of any one of items A3-A863 or B2-B15 where the nanotube is a tin disulfide nanotube and the second structural entity is carbon fibre.

Item A2751. The composite material of any one of items A3-A863 or B2-B15 where the nanotube is a titanium dioxide nanotube and the second structural entity is carbon fibre.

Item A2752. The composite material of any one of items A3-A863 or B2-B15 where the nanotube is a titanium oxide nanotube and the second structural entity is carbon fibre.

Item A2753. The composite material of any one of items A3-A863 or B2-B15 where the nanotube is a tungsten disulfide nanotube and the second structural entity is carbon fibre.

Item A2754. The composite material of any one of items A3-A863 or B2-B15 where the nanotube is a tungsten sulfide nanotube and the second structural entity is carbon fibre.

Item A2755. The composite material of any one of items A3-A863 or B2-B15 where the nanotube is a wolfram disulphide nanotube and the second structural entity is carbon fibre.

Item A2756. The composite material of any one of items A3-A863 or B2-B15 where the nanotube is a zinc ferrite nanotube and the second structural entity is carbon fibre.

Item A2757. The composite material of any one of items A3-A863 or B2-B15 where the nanotube is a zinc oxide nanotube and the second structural entity is carbon fibre.

Item A2758. The composite material of any one of items A3-A863 or B2-B15 where the nanotube is a zirconia dioxide nanotube and the second structural entity is carbon fibre.

Item A2759. The composite material of any one of items A3-A863 or B2-B15 where the nanotube is a nanofiber and the second structural entity is carbon fibre.

Item A2760. The composite material of any one of items A3-A863 or B2-B15 where the nanotube is a nanothread and the second structural entity is carbon fibre.

Item A2761. The composite material of any one of items A3-A863 or B2-B15 where the nanotube is a nanorod and the second structural entity is carbon fibre.

Item A2762. The composite material of any one of items A3-A863 or B2-B15 where the nanotube is a nanoball and the second structural entity is carbon fibre.

Item A2763. The composite material of any one of items A3-A863 or B2-B15 where the nanotube is a nanobud and the second structural entity is carbon fibre.

Item A2764. The composite material of any one of items A3-A863 or B2-B15 where the nanotube is a buckyball and the second structural entity is carbon fibre.

Item A2765. The composite material of any one of items A3-A863 or B2-B15 where the nanotube is a multi wall nanotube and the second structural entity is carbon fibre.

Item A2766. The composite material of any one of items A3-A863 or B2-B15 where the nanotube is a single wall nanotube and the second structural entity is carbon fibre.

Item A2767. The composite material of any one of items A3-A863 or B2-B15 where the nanotube has the chirality (n,0) where n=0 to 20. and the second structural entity is carbon fibre.

Item A2768. The composite material of any one of items A3-A863 or B2-B15 where the nanotube has the chirality (n,1) where n=0 to 20. and the second structural entity is carbon fibre.

Item A2769. The composite material of any one of items A3-A863 or B2-B15 where the nanotube has the chirality (n,2) where n=0 to 20. and the second structural entity is carbon fibre.

Item A2770. The composite material of any one of items A3-A863 or B2-B15 where the nanotube has the chirality (n,3) where n=0 to 20. and the second structural entity is carbon fibre.

Item A2771. The composite material of any one of items A3-A863 or B2-B15 where the nanotube has the chirality (n,4) where n=0 to 20. and the second structural entity is carbon fibre.

Item A2772. The composite material of any one of items A3-A863 or B2-B15 where the nanotube has the chirality (n,5) where n=0 to 20. and the second structural entity is carbon fibre.

Item A2773. The composite material of any one of items A3-A863 or B2-B15 where the nanotube has the chirality (n,6) where n=0 to 20. and the second structural entity is carbon fibre.

Item A2774. The composite material of any one of items A3-A863 or B2-B15 where the nanotube has the chirality (n,7) where n=0 to 20. and the second structural entity is carbon fibre.

Item A2775. The composite material of any one of items A3-A863 or B2-B15 where the nanotube has the chirality (n,8) where n=0 to 20. and the second structural entity is carbon fibre.

Item A2776. The composite material of any one of items A3-A863 or B2-B15 where the nanotube has the chirality (n,9) where n=0 to 20. and the second structural entity is carbon fibre.

Item A2777. The composite material of any one of items A3-A863 or B2-B15 where the nanotube has the chirality (n,10) where n=0 to 20. and the second structural entity is carbon fibre.

Item A2778. The composite material of any one of items A3-A863 or B2-B15 where the nanotube has the chirality (n,11) where n=0 to 20. and the second structural entity is carbon fibre.

Item A2779. The composite material of any one of items A3-A863 or B2-B15 where the nanotube has the chirality (n,12) where n=0 to 20. and the second structural entity is carbon fibre.

Item A2780. The composite material of any one of items A3-A863 or B2-B15 where the nanotube has the chirality (n,13) where n=0 to 20. and the second structural entity is carbon fibre.

Item A2781. The composite material of any one of items A3-A863 or B2-B15 where the nanotube has the chirality (n,14) where n=0 to 20. and the second structural entity is carbon fibre.

Item A2782. The composite material of any one of items A3-A863 or B2-B15 where the nanotube has the chirality (n,15) where n=0 to 20. and the second structural entity is carbon fibre.

Item A2783. The composite material of any one of items A3-A863 or B2-B15 where the nanotube has the chirality (n,16) where n=0 to 20. and the second structural entity is carbon fibre.

Item A2784. The composite material of any one of items A3-A863 or B2-B15 where the nanotube has the chirality (n,17) where n=0 to 20. and the second structural entity is carbon fibre.

Item A2785. The composite material of any one of items A3-A863 or B2-B15 where the nanotube has the chirality (n,18) where n=0 to 20. and the second structural entity is carbon fibre.

Item A2786. The composite material of any one of items A3-A863 or B2-B15 where the nanotube has the chirality (n,19) where n=0 to 20. and the second structural entity is carbon fibre.

Item A2787. The composite material of any one of items A3-A863 or B2-B15 where the nanotube has the chirality (n,20) where n=0 to 20. and the second structural entity is carbon fibre.

Item A2788. The composite material of any one of items A3-A863 or B2-B15 where the nanotube has the chirality (0,n) where n=0 to 20. and the second structural entity is carbon fibre.

Item A2789. The composite material of any one of items A3-A863 or B2-B15 where the nanotube has the chirality (1,n) where n=0 to 20. and the second structural entity is carbon fibre.

Item A2790. The composite material of any one of items A3-A863 or B2-B15 where the nanotube has the chirality (2,n) where n=0 to 20. and the second structural entity is carbon fibre.

Item A2791. The composite material of any one of items A3-A863 or B2-B15 where the nanotube has the chirality (3,n) where n=0 to 20. and the second structural entity is carbon fibre.

Item A2792. The composite material of any one of items A3-A863 or B2-B15 where the nanotube has the chirality (4,n) where n=0 to 20. and the second structural entity is carbon fibre.

Item A2793. The composite material of any one of items A3-A863 or B2-B15 where the nanotube has the chirality (5,n) where n=0 to 20. and the second structural entity is carbon fibre.

Item A2794. The composite material of any one of items A3-A863 or B2-B15 where the nanotube has the chirality (6,n) where n=0 to 20. and the second structural entity is carbon fibre.

Item A2795. The composite material of any one of items A3-A863 or B2-B15 where the nanotube has the chirality (7,n) where n=0 to 20. and the second structural entity is carbon fibre.

Item A2796. The composite material of any one of items A3-A863 or B2-B15 where the nanotube has the chirality (8,n) where n=0 to 20. and the second structural entity is carbon fibre.

Item A2797. The composite material of any one of items A3-A863 or B2-B15 where the nanotube has the chirality (9,n) where n=0 to 20. and the second structural entity is carbon fibre.

Item A2798. The composite material of any one of items A3-A863 or B2-B15 where the nanotube has the chirality (10,n) where n=0 to 20. and the second structural entity is carbon fibre.

Item A2799. The composite material of any one of items A3-A863 or B2-B15 where the nanotube has the chirality (11,n) where n=0 to 20. and the second structural entity is carbon fibre.

Item A2800. The composite material of any one of items A3-A863 or B2-B15 where the nanotube has the chirality (12,n) where n=0 to 20. and the second structural entity is carbon fibre.

Item A2801. The composite material of any one of items A3-A863 or B2-B15 where the nanotube has the chirality (13,n) where n=0 to 20. and the second structural entity is carbon fibre.

Item A2802. The composite material of any one of items A3-A863 or B2-B15 where the nanotube has the chirality (14,n) where n=0 to 20. and the second structural entity is carbon fibre.

Item A2803. The composite material of any one of items A3-A863 or B2-B15 where the nanotube has the chirality (15,n) where n=0 to 20. and the second structural entity is carbon fibre.

Item A2804. The composite material of any one of items A3-A863 or B2-B15 where the nanotube has the chirality (16,n) where n=0 to 20. and the second structural entity is carbon fibre.

Item A2805. The composite material of any one of items A3-A863 or B2-B15 where the nanotube has the chirality (17,n) where n=0 to 20. and the second structural entity is carbon fibre.

Item A2806. The composite material of any one of items A3-A863 or B2-B15 where the nanotube has the chirality (18,n) where n=0 to 20. and the second structural entity is carbon fibre.

Item A2807. The composite material of any one of items A3-A863 or B2-B15 where the nanotube has the chirality (19,n) where n=0 to 20. and the second structural entity is carbon fibre.

Item A2808. The composite material of any one of items A3-A863 or B2-B15 where the nanotube has the chirality (20,n) where n=0 to 20. and the second structural entity is carbon fibre.

Item A2809. The composite material of any one of items A3-A863 or B2-B15 where the nanotube has a percentage of sp2 bonds of more than 90%, such as more than 95%, such as more than 96%, such as more than 97%, such as more than 98%, such as more than 99%, such as more than 99%. and the second structural entity is carbon fibre.

Item A2810. The composite material of any one of items A3-A863 or B2-B15 where the nanotube has a percentage of sp2 bonds of less than 100%, such as less than 99%, such as less than 98%, such as less than 97%, such as less than 96%, such as less than 95%. and the second structural entity is carbon fibre.

Item A2811. The composite material of any one of items A3-A863 or B2-B15 where the nanotube has a percentage of sp2 bonds of from 95%-96%, from 96% to 97%, from 97% to 98%, from 98% to 99%, from 99% to 100%. and the second structural entity is carbon fibre.

Item A2812. The composite material of any one of items A3-A863 or B2-B15 where the nanotube has a percentage of carbon atoms of more than 90%, such as more than 95%, such as more than 96%, such as more than 97%, such as more than 98%, such as more than 99%, such as more than 99%. and the second structural entity is carbon fibre.

Item A2813. The composite material of any one of items A3-A863 or B2-B15 where the nanotube has a percentage of carbon atoms of less than 100%, such as less than 99%, such as less than 98%, such as less than 97%, such as less than 96%, such as less than 95%. and the second structural entity is carbon fibre.

Item A2814. The composite material of any one of items A3-A863 or B2-B15 where the nanotube has a percentage of carbon atoms of from 95%-96%, from 96% to 97%, from 97% to 98%, from 98% to 99%, from 99% to 100%. and the second structural entity is carbon fibre.

Item A2815. The composite material of any one of items A3-A863 or B2-B15 where the nanotube has a percentage of functionalization of less than 10%, such as less than 5%, such as less than 4%, such as less than 3%, such as less than 2%, such as less than 1% and the second structural entity is carbon fibre.

Item A2816. The composite material of any one of items A3-A863 or B2-B15 where the nanotube has a percentage of functionalization of more than 0%, such as more than 1%, such as more than 2%, such as more than 3%, such as more than 4%, such as more than 5%, such as more than 10%. and the second structural entity is carbon fibre.

Item A2817. The composite material of any one of items A3-A863 or B2-B15 where the nanotube has a percentage of functionalization of from 0% to 1%, from 1% to 2%, from 2% to 3%, from 3% to 4%, from 4% to 5%, from 5% to 10%. and the second structural entity is carbon fibre.

Item A2818. The composite material of any one of items A3-A863 or B2-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$. and the second structural entity is carbon fibre.

Item A2819. The composite material of any one of items A3-A863 or B2-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10. and the second structural entity is carbon fibre.

Item A2820. The composite material of any one of items A3-A863 or B2-B15 where the nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{-9}$. and the second structural entity is carbon fibre.

Item A2821. The composite material of any one of items A3-A863 or B2-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom, and the second structural entity is carbon fibre.

Item A2822. The composite material of any one of items A3-A863 or B2-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4 and the second structural entity is carbon fibre.

Item A2823. The composite material of any one of items A3-A863 or B2-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400 and the second structural entity is carbon fibre.

Item A2824. The composite material of any one of items A3-A863 or B2-B15 where the nanotube is a carbon nanotube and the second structural entity is boron nitride.

Item A2825. The composite material of any one of items A3-A863 or B2-B15 where the nanotube is a single wall carbon nanotube and the second structural entity is boron nitride.

Item A2826. The composite material of any one of items A3-A863 or B2-B15 where the nanotube is a multi wall carbon nanotube and the second structural entity is boron nitride.

Item A2827. The composite material of any one of items A3-A863 or B2-B15 where the nanotube is a metallic carbon nanotube and the second structural entity is boron nitride.

Item A2828. The composite material of any one of items A3-A863 or B2-B15 where the nanotube is a semiconductive carbon nanotube and the second structural entity is boron nitride.

Item A2829. The composite material of any one of items A3-A863 or B2-B15 where the nanotube is a aluminium nanotube and the second structural entity is boron nitride.

Item A2830. The composite material of any one of items A3-A863 or B2-B15 where the nanotube is a aluminum nitride nanotube (AlNNT) and the second structural entity is boron nitride.

Item A2831. The composite material of any one of items A3-A863 or B2-B15 where the nanotube is a aluminum phosphide nanotube (AlPNT) and the second structural entity is boron nitride.

Item A2832. The composite material of any one of items A3-A863 or B2-B15 where the nanotube is a bismuth nanotube and the second structural entity is boron nitride.

Item A2833. The composite material of any one of items A3-A863 or B2-B15 where the nanotube is a bismuth selenide nanotube and the second structural entity is boron nitride.

Item A2834. The composite material of any one of items A3-A863 or B2-B15 where the nanotube is a boron carbon nanotubes (BCNNT) and the second structural entity is boron nitride.

Item A2835. The composite material of any one of items A3-A863 or B2-B15 where the nanotube is a boron nitride nanotube and the second structural entity is boron nitride.

Item A2836. The composite material of any one of items A3-A863 or B2-B15 where the nanotube is a cadmium selenide nanotube and the second structural entity is boron nitride.

Item A2837. The composite material of any one of items A3-A863 or B2-B15 where the nanotube is a cobalt selenide nanotube and the second structural entity is boron nitride.

Item A2838. The composite material of any one of items A3-A863 or B2-B15 where the nanotube is a copper nanotube and the second structural entity is boron nitride.

Item A2839. The composite material of any one of items A3-A863 or B2-B15 where the nanotube is a DNA nanotube and the second structural entity is boron nitride.

Item A2840. The composite material of any one of items A3-A863 or B2-B15 where the nanotube is a gallium nitride nanotube (GaNNT) and the second structural entity is boron nitride.

Item A2841. The composite material of any one of items A3-A863 or B2-B15 where the nanotube is a gallium phosphide nanotube (GaPNT) and the second structural entity is boron nitride.

Item A2842. The composite material of any one of items A3-A863 or B2-B15 where the nanotube is a gold nanotube and the second structural entity is boron nitride.

Item A2843. The composite material of any one of items A3-A863 or B2-B15 where the nanotube is a halide nanotube and the second structural entity is boron nitride.

Item A2844. The composite material of any one of items A3-A863 or B2-B15 where the nanotube is a niobium selenide nanotube and the second structural entity is boron nitride.

Item A2845. The composite material of any one of items A3-A863 or B2-B15 where the nanotube is a molybdenum disulfide nanotube and the second structural entity is boron nitride.

Item A2846. The composite material of any one of items A3-A863 or B2-B15 where the nanotube is a nanotube of transition metal oxides and the second structural entity is boron nitride.

Item A2847. The composite material of any one of items A3-A863 or B2-B15 where the nanotube is a nickel chloride nanotub and the second structural entity is boron nitride.

Item A2848. The composite material of any one of items A3-A863 or B2-B15 where the nanotube is a platinum nanotube and the second structural entity is boron nitride.

Item A2849. The composite material of any one of items A3-A863 or B2-B15 where the nanotube is a protein nanotube and the second structural entity is boron nitride.

Item A2850. The composite material of any one of items A3-A863 or B2-B15 where the nanotube is a RNA nanotube and the second structural entity is boron nitride.

Item A2851. The composite material of any one of items A3-A863 or B2-B15 where the nanotube is a selenide nanotube and the second structural entity is boron nitride.

Item A2852. The composite material of any one of items A3-A863 or B2-B15 where the nanotube is a silicon nanotube and the second structural entity is boron nitride.

Item A2853. The composite material of any one of items A3-A863 or B2-B15 where the nanotube is a silver nanotube and the second structural entity is boron nitride.

Item A2854. The composite material of any one of items A3-A863 or B2-B15 where the nanotube is a sulphide nanotube and the second structural entity is boron nitride.

Item A2855. The composite material of any one of items A3-A863 or B2-B15 where the nanotube is a tin disulfide nanotube and the second structural entity is boron nitride.

Item A2856. The composite material of any one of items A3-A863 or B2-B15 where the nanotube is a titanium dioxide nanotube and the second structural entity is boron nitride.

Item A2857. The composite material of any one of items A3-A863 or B2-B15 where the nanotube is a titanium oxide nanotube and the second structural entity is boron nitride.

Item A2858. The composite material of any one of items A3-A863 or B2-B15 where the nanotube is a tungsten disulfide nanotube and the second structural entity is boron nitride.

Item A2859. The composite material of any one of items A3-A863 or B2-B15 where the nanotube is a tungsten sulfide nanotube and the second structural entity is boron nitride.

Item A2860. The composite material of any one of items A3-A863 or B2-B15 where the nanotube is a wolfram disulphide nanotube and the second structural entity is boron nitride.

Item A2861. The composite material of any one of items A3-A863 or B2-B15 where the nanotube is a zinc ferrite nanotube and the second structural entity is boron nitride.

Item A2862. The composite material of any one of items A3-A863 or B2-B15 where the nanotube is a zinc oxide nanotube and the second structural entity is boron nitride.

Item A2863. The composite material of any one of items A3-A863 or B2-B15 where the nanotube is a zirconia dioxide nanotube and the second structural entity is boron nitride.

Item A2864. The composite material of any one of items A3-A863 or B2-B15 where the nanotube is a nanofiber and the second structural entity is boron nitride.

Item A2865. The composite material of any one of items A3-A863 or B2-B15 where the nanotube is a nanothread and the second structural entity is boron nitride.

Item A2866. The composite material of any one of items A3-A863 or B2-B15 where the nanotube is a nanorod and the second structural entity is boron nitride.

Item A2867. The composite material of any one of items A3-A863 or B2-B15 where the nanotube is a nanoball and the second structural entity is boron nitride.

Item A2868. The composite material of any one of items A3-A863 or B2-B15 where the nanotube is a nanobud and the second structural entity is boron nitride.

Item A2869. The composite material of any one of items A3-A863 or B2-B15 where the nanotube is a buckyball and the second structural entity is boron nitride.

Item A2870. The composite material of any one of items A3-A863 or B2-B15 where the nanotube is a multi wall nanotube and the second structural entity is boron nitride.

Item A2871. The composite material of any one of items A3-A863 or B2-B15 where the nanotube is a single wall nanotube and the second structural entity is boron nitride.

Item A2872. The composite material of any one of items A3-A863 or B2-B15 where the nanotube has the chirality (n,0) where n=0 to 20. and the second structural entity is boron nitride.

Item A2873. The composite material of any one of items A3-A863 or B2-B15 where the nanotube has the chirality (n,1) where n=0 to 20. and the second structural entity is boron nitride.

Item A2874. The composite material of any one of items A3-A863 or B2-B15 where the nanotube has the chirality (n,2) where n=0 to 20. and the second structural entity is boron nitride.

Item A2875. The composite material of any one of items A3-A863 or B2-B15 where the nanotube has the chirality (n,3) where n=0 to 20. and the second structural entity is boron nitride.

Item A2876. The composite material of any one of items A3-A863 or B2-B15 where the nanotube has the chirality (n,4) where n=0 to 20. and the second structural entity is boron nitride.

Item A2877. The composite material of any one of items A3-A863 or B2-B15 where the nanotube has the chirality (n,5) where n=0 to 20. and the second structural entity is boron nitride.

Item A2878. The composite material of any one of items A3-A863 or B2-B15 where the nanotube has the chirality (n,6) where n=0 to 20. and the second structural entity is boron nitride.

Item A2879. The composite material of any one of items A3-A863 or B2-B15 where the nanotube has the chirality (n,7) where n=0 to 20. and the second structural entity is boron nitride.

Item A2880. The composite material of any one of items A3-A863 or B2-B15 where the nanotube has the chirality (n,8) where n=0 to 20. and the second structural entity is boron nitride.

Item A2881. The composite material of any one of items A3-A863 or B2-B15 where the nanotube has the chirality (n,9) where n=0 to 20. and the second structural entity is boron nitride.

Item A2882. The composite material of any one of items A3-A863 or B2-B15 where the nanotube has the chirality (n,10) where n=0 to 20. and the second structural entity is boron nitride.

Item A2883. The composite material of any one of items A3-A863 or B2-B15 where the nanotube has the chirality (n,11) where n=0 to 20. and the second structural entity is boron nitride.

Item A2884. The composite material of any one of items A3-A863 or B2-B15 where the nanotube has the chirality (n,12) where n=0 to 20. and the second structural entity is boron nitride.

Item A2885. The composite material of any one of items A3-A863 or B2-B15 where the nanotube has the chirality (n,13) where n=0 to 20. and the second structural entity is boron nitride.

Item A2886. The composite material of any one of items A3-A863 or B2-B15 where the nanotube has the chirality (n,14) where n=0 to 20. and the second structural entity is boron nitride.

Item A2887. The composite material of any one of items A3-A863 or B2-B15 where the nanotube has the chirality (n,15) where n=0 to 20. and the second structural entity is boron nitride.

Item A2888. The composite material of any one of items A3-A863 or B2-B15 where the nanotube has the chirality (n,16) where n=0 to 20. and the second structural entity is boron nitride.

Item A2889. The composite material of any one of items A3-A863 or B2-B15 where the nanotube has the chirality (n,17) where n=0 to 20. and the second structural entity is boron nitride.

Item A2890. The composite material of any one of items A3-A863 or B2-B15 where the nanotube has the chirality (n,18) where n=0 to 20. and the second structural entity is boron nitride.

Item A2891. The composite material of any one of items A3-A863 or B2-B15 where the nanotube has the chirality (n,19) where n=0 to 20. and the second structural entity is boron nitride.

Item A2892. The composite material of any one of items A3-A863 or B2-B15 where the nanotube has the chirality (n,20) where n=0 to 20. and the second structural entity is boron nitride.

Item A2893. The composite material of any one of items A3-A863 or B2-B15 where the nanotube has the chirality (0,n) where n=0 to 20. and the second structural entity is boron nitride.

Item A2894. The composite material of any one of items A3-A863 or B2-B15 where the nanotube has the chirality (1,n) where n=0 to 20. and the second structural entity is boron nitride.

Item A2895. The composite material of any one of items A3-A863 or B2-B15 where the nanotube has the chirality (2,n) where n=0 to 20. and the second structural entity is boron nitride.

Item A2896. The composite material of any one of items A3-A863 or B2-B15 where the nanotube has the chirality (3,n) where n=0 to 20. and the second structural entity is boron nitride.

Item A2897. The composite material of any one of items A3-A863 or B2-B15 where the nanotube has the chirality (4,n) where n=0 to 20. and the second structural entity is boron nitride.

Item A2898. The composite material of any one of items A3-A863 or B2-B15 where the nanotube has the chirality (5,n) where n=0 to 20. and the second structural entity is boron nitride.

Item A2899. The composite material of any one of items A3-A863 or B2-B15 where the nanotube has the chirality (6,n) where n=0 to 20. and the second structural entity is boron nitride.

Item A2900. The composite material of any one of items A3-A863 or B2-B15 where the nanotube has the chirality (7,n) where n=0 to 20. and the second structural entity is boron nitride.

Item A2901. The composite material of any one of items A3-A863 or B2-B15 where the nanotube has the chirality (8,n) where n=0 to 20. and the second structural entity is boron nitride.

Item A2902. The composite material of any one of items A3-A863 or B2-B15 where the nanotube has the chirality (9,n) where n=0 to 20. and the second structural entity is boron nitride.

Item A2903. The composite material of any one of items A3-A863 or B2-B15 where the nanotube has the chirality (10,n) where n=0 to 20. and the second structural entity is boron nitride.

Item A2904. The composite material of any one of items A3-A863 or B2-B15 where the nanotube has the chirality (11,n) where n=0 to 20. and the second structural entity is boron nitride.

Item A2905. The composite material of any one of items A3-A863 or B2-B15 where the nanotube has the chirality (12,n) where n=0 to 20. and the second structural entity is boron nitride.

Item A2906. The composite material of any one of items A3-A863 or B2-B15 where the nanotube has the chirality (13,n) where n=0 to 20. and the second structural entity is boron nitride.

Item A2907. The composite material of any one of items A3-A863 or B2-B15 where the nanotube has the chirality (14,n) where n=0 to 20. and the second structural entity is boron nitride.

Item A2908. The composite material of any one of items A3-A863 or B2-B15 where the nanotube has the chirality (15,n) where n=0 to 20. and the second structural entity is boron nitride.

Item A2909. The composite material of any one of items A3-A863 or B2-B15 where the nanotube has the chirality (16,n) where n=0 to 20. and the second structural entity is boron nitride.

Item A2910. The composite material of any one of items A3-A863 or B2-B15 where the nanotube has the chirality (17,n) where n=0 to 20. and the second structural entity is boron nitride.

Item A2911. The composite material of any one of items A3-A863 or B2-B15 where the nanotube has the chirality (18,n) where n=0 to 20. and the second structural entity is boron nitride.

Item A2912. The composite material of any one of items A3-A863 or B2-B15 where the nanotube has the chirality (19,n) where n=0 to 20. and the second structural entity is boron nitride.

Item A2913. The composite material of any one of items A3-A863 or B2-B15 where the nanotube has the chirality (20,n) where n=0 to 20. and the second structural entity is boron nitride.

Item A2914. The composite material of any one of items A3-A863 or B2-B15 where the nanotube has a percentage of sp2 bonds of more than 90%, such as more than 95%, such as more than 96%, such as more than 97%, such as more than 98%, such as more than 99%, such as more than 99%. and the second structural entity is boron nitride.

Item A2915. The composite material of any one of items A3-A863 or B2-B15 where the nanotube has a percentage of sp2 bonds of less than 100%, such as less than 99%, such as less than 98%, such as less than 97%, such as less than 96%, such as less than 95%. and the second structural entity is boron nitride.

Item A2916. The composite material of any one of items A3-A863 or B2-B15 where the nanotube has a percentage of sp2 bonds of from 95%-96%, from 96% to 97%, from 97% to 98%, from 98% to 99%, from 99% to 100%. and the second structural entity is boron nitride.

Item A2917. The composite material of any one of items A3-A863 or B2-B15 where the nanotube has a percentage of carbon atoms of more than 90%, such as more than 95%, such as more than 96%, such as more than 97%, such as more than 98%, such as more than 99%, such as more than 99%. and the second structural entity is boron nitride.

Item A2918. The composite material of any one of items A3-A863 or B2-B15 where the nanotube has a percentage of carbon atoms of less than 100%, such as less than 99%, such as less than 98%, such as less than 97%, such as less than 96%, such as less than 95%. and the second structural entity is boron nitride.

Item A2919. The composite material of any one of items A3-A863 or B2-B15 where the nanotube has a percentage of carbon atoms of from 95%-96%, from 96% to 97%, from 97% to 98%, from 98% to 99%, from 99% to 100%. and the second structural entity is boron nitride.

Item A2920. The composite material of any one of items A3-A863 or B2-B15 where the nanotube has a percentage of functionalization of less than 10%, such as less than 5%, such as less than 4%, such as less than 3%, such as less than 2%, such as less than 1% and the second structural entity is boron nitride.

Item A2921. The composite material of any one of items A3-A863 or B2-B15 where the nanotube has a percentage of functionalization of more than 0%, such as more than 1%, such as more than 2%, such as more than 3%, such as more than 4%, such as more than 5%, such as more than 10%. and the second structural entity is boron nitride.

Item A2922. The composite material of any one of items A3-A863 or B2-B15 where the nanotube has a percentage of functionalization of from 0% to 1%, from 1% to 2%, from 2% to 3%, from 3% to 4%, from 4% to 5%, from 5% to 10%. and the second structural entity is boron nitride.

Item A2923. The composite material of any one of items A3-A863 or B2-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^8$, such as more than $10^{10}$. and the second structural entity is boron nitride.

Item A2924. The composite material of any one of items A3-A863 or B2-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10. and the second structural entity is boron nitride.

Item A2925. The composite material of any one of items A3-A863 or B2-B15 where the nanotube has an aspect ratio of from 10 to $10^2$, from $10^2$ to $10^3$, from $10^3$ to $10^4$, from $10^4$ to $10^5$, from $10^6$ to $10^6$, from $10^6$ to $10^7$, from $10^8$ to $10^8$, from $10^8$ to $10^9$, from $10^9$ to $10^{10}$. and the second structural entity is boron nitride.

Item A2926. The composite material of any one of items A3-A863 or B2-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom, and the second structural entity is boron nitride.

Item A2927. The composite material of any one of items A3-A863 or B2-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4 and the second structural entity is boron nitride.

Item A2928. The composite material of any one of items A3-A863 or B2-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400 and the second structural entity is boron nitride.

Item A2929. The composite material of any one of items A3-A863 or B2-B15 where the nanotube is a carbon nanotube and the second structural entity is a ceramic.

Item A2930. The composite material of any one of items A3-A863 or B2-B15 where the nanotube is a single wall carbon nanotube and the second structural entity is a ceramic.

Item A2931. The composite material of any one of items A3-A863 or B2-B15 where the nanotube is a multi wall carbon nanotube and the second structural entity is a ceramic.

Item A2932. The composite material of any one of items A3-A863 or B2-B15 where the nanotube is a metallic carbon nanotube and the second structural entity is a ceramic.

Item A2933. The composite material of any one of items A3-A863 or B2-B15 where the nanotube is a semiconductive carbon nanotube and the second structural entity is a ceramic.

Item A2934. The composite material of any one of items A3-A863 or B2-B15 where the nanotube is a aluminium nanotube and the second structural entity is a ceramic.

Item A2935. The composite material of any one of items A3-A863 or B2-B15 where the nanotube is a aluminum nitride nanotube (AlNNT) and the second structural entity is a ceramic.

Item A2936. The composite material of any one of items A3-A863 or B2-B15 where the nanotube is a aluminum phosphide nanotube (AlPNT) and the second structural entity is a ceramic.

Item A2937. The composite material of any one of items A3-A863 or B2-B15 where the nanotube is a bismuth nanotube and the second structural entity is a ceramic.

Item A2938. The composite material of any one of items A3-A863 or B2-B15 where the nanotube is a bismuth selenide nanotube and the second structural entity is a ceramic.

Item A2939. The composite material of any one of items A3-A863 or B2-B15 where the nanotube is a boron carbon nanotubes (BCNNT) and the second structural entity is a ceramic.

Item A2940. The composite material of any one of items A3-A863 or B2-B15 where the nanotube is a boron nitride nanotube and the second structural entity is a ceramic.

Item A2941. The composite material of any one of items A3-A863 or B2-B15 where the nanotube is a cadmium selenide nanotube and the second structural entity is a ceramic.

Item A2942. The composite material of any one of items A3-A863 or B2-B15 where the nanotube is a cobalt selenide nanotube and the second structural entity is a ceramic.

Item A2943. The composite material of any one of items A3-A863 or B2-B15 where the nanotube is a copper nanotube and the second structural entity is a ceramic.

Item A2944. The composite material of any one of items A3-A863 or B2-B15 where the nanotube is a DNA nanotube and the second structural entity is a ceramic.

Item A2945. The composite material of any one of items A3-A863 or B2-B15 where the nanotube is a gallium nitride nanotube (GaNNT) and the second structural entity is a ceramic.

Item A2946. The composite material of any one of items A3-A863 or B2-B15 where the nanotube is a gallium phosphide nanotube (GaPNT) and the second structural entity is a ceramic.

Item A2947. The composite material of any one of items A3-A863 or B2-B15 where the nanotube is a gold nanotube and the second structural entity is a ceramic.

Item A2948. The composite material of any one of items A3-A863 or B2-B15 where the nanotube is a halide nanotube and the second structural entity is a ceramic.

Item A2949. The composite material of any one of items A3-A863 or B2-B15 where the nanotube is a niobium selenide nanotube and the second structural entity is a ceramic.

Item A2950. The composite material of any one of items A3-A863 or B2-B15 where the nanotube is a molybdenum disulfide nanotube and the second structural entity is a ceramic.

Item A2951. The composite material of any one of items A3-A863 or B2-B15 where the nanotube is a nanotube of transition metal oxides and the second structural entity is a ceramic.

Item A2952. The composite material of any one of items A3-A863 or B2-B15 where the nanotube is a nickel chloride nanotub and the second structural entity is a ceramic.

Item A2953. The composite material of any one of items A3-A863 or B2-B15 where the nanotube is a platinum nanotube and the second structural entity is a ceramic.

Item A2954. The composite material of any one of items A3-A863 or B2-B15 where the nanotube is a protein nanotube and the second structural entity is a ceramic.

Item A2955. The composite material of any one of items A3-A863 or B2-B15 where the nanotube is a RNA nanotube and the second structural entity is a ceramic.

Item A2956. The composite material of any one of items A3-A863 or B2-B15 where the nanotube is a selenide nanotube and the second structural entity is a ceramic.

Item A2957. The composite material of any one of items A3-A863 or B2-B15 where the nanotube is a silicon nanotube and the second structural entity is a ceramic.

Item A2958. The composite material of any one of items A3-A863 or B2-B15 where the nanotube is a silver nanotube and the second structural entity is a ceramic.

Item A2959. The composite material of any one of items A3-A863 or B2-B15 where the nanotube is a sulphide nanotube and the second structural entity is a ceramic.

Item A2960. The composite material of any one of items A3-A863 or B2-B15 where the nanotube is a tin disulfide nanotube and the second structural entity is a ceramic.

Item A2961. The composite material of any one of items A3-A863 or B2-B15 where the nanotube is a titanium dioxide nanotube and the second structural entity is a ceramic.

Item A2962. The composite material of any one of items A3-A863 or B2-B15 where the nanotube is a titanium oxide nanotube and the second structural entity is a ceramic.

Item A2963. The composite material of any one of items A3-A863 or B2-B15 where the nanotube is a tungsten disulfide nanotube and the second structural entity is a ceramic.

Item A2964. The composite material of any one of items A3-A863 or B2-B15 where the nanotube is a tungsten sulfide nanotube and the second structural entity is a ceramic.

Item A2965. The composite material of any one of items A3-A863 or B2-B15 where the nanotube is a wolfram disulphide nanotube and the second structural entity is a ceramic.

Item A2966. The composite material of any one of items A3-A863 or B2-B15 where the nanotube is a zinc ferrite nanotube and the second structural entity is a ceramic.

Item A2967. The composite material of any one of items A3-A863 or B2-B15 where the nanotube is a zinc oxide nanotube and the second structural entity is a ceramic.

Item A2968. The composite material of any one of items A3-A863 or B2-B15 where the nanotube is a zirconia dioxide nanotube and the second structural entity is a ceramic.

Item A2969. The composite material of any one of items A3-A863 or B2-B15 where the nanotube is a nanofiber and the second structural entity is a ceramic.

Item A2970. The composite material of any one of items A3-A863 or B2-B15 where the nanotube is a nanothread and the second structural entity is a ceramic.

Item A2971. The composite material of any one of items A3-A863 or B2-B15 where the nanotube is a nanorod and the second structural entity is a ceramic.

Item A2972. The composite material of any one of items A3-A863 or B2-B15 where the nanotube is a nanoball and the second structural entity is a ceramic.

Item A2973. The composite material of any one of items A3-A863 or B2-B15 where the nanotube is a nanobud and the second structural entity is a ceramic.

Item A2974. The composite material of any one of items A3-A863 or B2-B15 where the nanotube is a buckyball and the second structural entity is a ceramic.

Item A2975. The composite material of any one of items A3-A863 or B2-B15 where the nanotube is a multi wall nanotube and the second structural entity is a ceramic.

Item A2976. The composite material of any one of items A3-A863 or B2-B15 where the nanotube is a single wall nanotube and the second structural entity is a ceramic.

Item A2977. The composite material of any one of items A3-A863 or B2-B15 where the nanotube has the chirality (n,0) where n=0 to 20. and the second structural entity is a ceramic.

Item A2978. The composite material of any one of items A3-A863 or B2-B15 where the nanotube has the chirality (n,1) where n=0 to 20. and the second structural entity is a ceramic.

Item A2979. The composite material of any one of items A3-A863 or B2-B15 where the nanotube has the chirality (n,2) where n=0 to 20. and the second structural entity is a ceramic.

Item A2980. The composite material of any one of items A3-A863 or B2-B15 where the nanotube has the chirality (n,3) where n=0 to 20. and the second structural entity is a ceramic.

Item A2981. The composite material of any one of items A3-A863 or B2-B15 where the nanotube has the chirality (n,4) where n=0 to 20. and the second structural entity is a ceramic.

Item A2982. The composite material of any one of items A3-A863 or B2-B15 where the nanotube has the chirality (n,5) where n=0 to 20. and the second structural entity is a ceramic.

Item A2983. The composite material of any one of items A3-A863 or B2-B15 where the nanotube has the chirality (n,6) where n=0 to 20. and the second structural entity is a ceramic.

Item A2984. The composite material of any one of items A3-A863 or B2-B15 where the nanotube has the chirality (n,7) where n=0 to 20. and the second structural entity is a ceramic.

Item A2985. The composite material of any one of items A3-A863 or B2-B15 where the nanotube has the chirality (n,8) where n=0 to 20. and the second structural entity is a ceramic.

Item A2986. The composite material of any one of items A3-A863 or B2-B15 where the nanotube has the chirality (n,9) where n=0 to 20. and the second structural entity is a ceramic.

Item A2987. The composite material of any one of items A3-A863 or B2-B15 where the nanotube has the chirality (n,10) where n=0 to 20. and the second structural entity is a ceramic.

Item A2988. The composite material of any one of items A3-A863 or B2-B15 where the nanotube has the chirality (n,11) where n=0 to 20. and the second structural entity is a ceramic.

Item A2989. The composite material of any one of items A3-A863 or B2-B15 where the nanotube has the chirality (n,12) where n=0 to 20. and the second structural entity is a ceramic.

Item A2990. The composite material of any one of items A3-A863 or B2-B15 where the nanotube has the chirality (n,13) where n=0 to 20. and the second structural entity is a ceramic.

Item A2991. The composite material of any one of items A3-A863 or B2-B15 where the nanotube has the chirality (n,14) where n=0 to 20. and the second structural entity is a ceramic.

Item A2992. The composite material of any one of items A3-A863 or B2-B15 where the nanotube has the chirality (n,15) where n=0 to 20. and the second structural entity is a ceramic.

Item A2993. The composite material of any one of items A3-A863 or B2-B15 where the nanotube has the chirality (n,16) where n=0 to 20. and the second structural entity is a ceramic.

Item A2994. The composite material of any one of items A3-A863 or B2-B15 where the nanotube has the chirality (n,17) where n=0 to 20. and the second structural entity is a ceramic.

Item A2995. The composite material of any one of items A3-A863 or B2-B15 where the nanotube has the chirality (n,18) where n=0 to 20. and the second structural entity is a ceramic.

Item A2996. The composite material of any one of items A3-A863 or B2-B15 where the nanotube has the chirality (n,19) where n=0 to 20. and the second structural entity is a ceramic.

Item A2997. The composite material of any one of items A3-A863 or B2-B15 where the nanotube has the chirality (n,20) where n=0 to 20. and the second structural entity is a ceramic.

Item A2998. The composite material of any one of items A3-A863 or B2-B15 where the nanotube has the chirality (0,n) where n=0 to 20. and the second structural entity is a ceramic.

Item A2999. The composite material of any one of items A3-A863 or B2-B15 where the nanotube has the chirality (1,n) where n=0 to 20. and the second structural entity is a ceramic.

Item A3000. The composite material of any one of items A3-A863 or B2-B15 where the nanotube has the chirality (2,n) where n=0 to 20. and the second structural entity is a ceramic.

Item A3001. The composite material of any one of items A3-A863 or B2-B15 where the nanotube has the chirality (3,n) where n=0 to 20. and the second structural entity is a ceramic.

Item A3002. The composite material of any one of items A3-A863 or B2-B15 where the nanotube has the chirality (4,n) where n=0 to 20. and the second structural entity is a ceramic.

Item A3003. The composite material of any one of items A3-A863 or B2-B15 where the nanotube has the chirality (5,n) where n=0 to 20. and the second structural entity is a ceramic.

Item A3004. The composite material of any one of items A3-A863 or B2-B15 where the nanotube has the chirality (6,n) where n=0 to 20. and the second structural entity is a ceramic.

Item A3005. The composite material of any one of items A3-A863 or B2-B15 where the nanotube has the chirality (7,n) where n=0 to 20. and the second structural entity is a ceramic.

Item A3006. The composite material of any one of items A3-A863 or B2-B15 where the nanotube has the chirality (8,n) where n=0 to 20. and the second structural entity is a ceramic.

Item A3007. The composite material of any one of items A3-A863 or B2-B15 where the nanotube has the chirality (9,n) where n=0 to 20. and the second structural entity is a ceramic.

Item A3008. The composite material of any one of items A3-A863 or B2-B15 where the nanotube has the chirality (10,n) where n=0 to 20. and the second structural entity is a ceramic.

Item A3009. The composite material of any one of items A3-A863 or B2-B15 where the nanotube has the chirality (11,n) where n=0 to 20. and the second structural entity is a ceramic.

Item A3010. The composite material of any one of items A3-A863 or B2-B15 where the nanotube has the chirality (12,n) where n=0 to 20. and the second structural entity is a ceramic.

Item A3011. The composite material of any one of items A3-A863 or B2-B15 where the nanotube has the chirality (13,n) where n=0 to 20. and the second structural entity is a ceramic.

Item A3012. The composite material of any one of items A3-A863 or B2-B15 where the nanotube has the chirality (14,n) where n=0 to 20. and the second structural entity is a ceramic.

Item A3013. The composite material of any one of items A3-A863 or B2-B15 where the nanotube has the chirality (15,n) where n=0 to 20. and the second structural entity is a ceramic.

Item A3014. The composite material of any one of items A3-A863 or B2-B15 where the nanotube has the chirality (16,n) where n=0 to 20. and the second structural entity is a ceramic.

Item A3015. The composite material of any one of items A3-A863 or B2-B15 where the nanotube has the chirality (17,n) where n=0 to 20. and the second structural entity is a ceramic.

Item A3016. The composite material of any one of items A3-A863 or B2-B15 where the nanotube has the chirality (18,n) where n=0 to 20. and the second structural entity is a ceramic.

Item A3017. The composite material of any one of items A3-A863 or B2-B15 where the nanotube has the chirality (19,n) where n=0 to 20. and the second structural entity is a ceramic.

Item A3018. The composite material of any one of items A3-A863 or B2-B15 where the nanotube has the chirality (20,n) where n=0 to 20. and the second structural entity is a ceramic.

Item A3019. The composite material of any one of items A3-A863 or B2-B15 where the nanotube has a percentage of sp2 bonds of more than 90%, such as more than 95%, such as more than 96%, such as more than 97%, such as more than 98%, such as more than 99%, such as more than 99%. and the second structural entity is a ceramic.

Item A3020. The composite material of any one of items A3-A863 or B2-B15 where the nanotube has a percentage of sp2 bonds of less than 100%, such as less than 99%, such as less than 98%, such as less than 97%, such as less than 96%, such as less than 95%. and the second structural entity is a ceramic.

Item A3021. The composite material of any one of items A3-A863 or B2-B15 where the nanotube has a percentage of sp2 bonds of from 95%-96%, from 96% to 97%, from 97% to 98%, from 98% to 99%, from 99% to 100%. and the second structural entity is a ceramic.

Item A3022. The composite material of any one of items A3-A863 or B2-B15 where the nanotube has a percentage of carbon atoms of more than 90%, such as more than 95%, such as more than 96%, such as more than 97%, such as more than 98%, such as more than 99%, such as more than 99%. and the second structural entity is a ceramic.

Item A3023. The composite material of any one of items A3-A863 or B2-B15 where the nanotube has a percentage of carbon atoms of less than 100%, such as less than 99%, such as less than 98%, such as less than 97%, such as less than 96%, such as less than 95%. and the second structural entity is a ceramic.

Item A3024. The composite material of any one of items A3-A863 or B2-B15 where the nanotube has a percentage of carbon atoms of from 95%-96%, from 96% to 97%, from 97% to 98%, from 98% to 99%, from 99% to 100%. and the second structural entity is a ceramic.

Item A3025. The composite material of any one of items A3-A863 or B2-B15 where the nanotube has a percentage of functionalization of less than 10%, such as less than 5%, such as less than 4%, such as less than 3%, such as less than 2%, such as less than 1% and the second structural entity is a ceramic.

Item A3026. The composite material of any one of items A3-A863 or B2-B15 where the nanotube has a percentage of functionalization of more than 0%, such as more than 1%, such as more than 2%, such as more than 3%, such as more than 4%, such as more than 5%, such as more than 10%. and the second structural entity is a ceramic.

Item A3027. The composite material of any one of items A3-A863 or B2-B15 where the nanotube has a percentage of functionalization of from 0% to 1%, from 1% to 2%, from 2% to 3%, from 3% to 4%, from 4% to 5%, from 5% to 10%. and the second structural entity is a ceramic.

Item A3028. The composite material of any one of items A3-A863 or B2-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$. and the second structural entity is a ceramic.

Item A3029. The composite material of any one of items A3-A863 or B2-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10. and the second structural entity is a ceramic.

Item A3030. The composite material of any one of items A3-A863 or B2-B15 where the nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$. and the second structural entity is a ceramic.

Item A3031. The composite material of any one of items A3-A863 or B2-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom, and the second structural entity is a ceramic.

Item A3032. The composite material of any one of items A3-A863 or B2-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4 and the second structural entity is a ceramic.

Item A3033. The composite material of any one of items A3-A863 or B2-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400 and the second structural entity is a ceramic.

Item A3034. The composite material of any one of items A3-A863 or B2-B15 where the nanotube is a carbon nanotube and the second structural entity is graphene.

Item A3035. The composite material of any one of items A3-A863 or B2-B15 where the nanotube is a single wall carbon nanotube and the second structural entity is graphene.

Item A3036. The composite material of any one of items A3-A863 or B2-B15 where the nanotube is a multi wall carbon nanotube and the second structural entity is graphene.

Item A3037. The composite material of any one of items A3-A863 or B2-B15 where the nanotube is a metallic carbon nanotube and the second structural entity is graphene.

Item A3038. The composite material of any one of items A3-A863 or B2-B15 where the nanotube is a semiconductive carbon nanotube and the second structural entity is graphene.

Item A3039. The composite material of any one of items A3-A863 or B2-B15 where the nanotube is a aluminium nanotube and the second structural entity is graphene.

Item A3040. The composite material of any one of items A3-A863 or B2-B15 where the nanotube is a aluminum nitride nanotube (AlNNT) and the second structural entity is graphene.

Item A3041. The composite material of any one of items A3-A863 or B2-B15 where the nanotube is a aluminum phosphide nanotube (AlPNT) and the second structural entity is graphene.

Item A3042. The composite material of any one of items A3-A863 or B2-B15 where the nanotube is a bismuth nanotube and the second structural entity is graphene.

Item A3043. The composite material of any one of items A3-A863 or B2-B15 where the nanotube is a bismuth selenide nanotube and the second structural entity is graphene.

Item A3044. The composite material of any one of items A3-A863 or B2-B15 where the nanotube is a boron carbon nanotubes (BCNNT) and the second structural entity is graphene.

Item A3045. The composite material of any one of items A3-A863 or B2-B15 where the nanotube is a boron nitride nanotube and the second structural entity is graphene.

Item A3046. The composite material of any one of items A3-A863 or B2-B15 where the nanotube is a cadmium selenide nanotube and the second structural entity is graphene.

Item A3047. The composite material of any one of items A3-A863 or B2-B15 where the nanotube is a cobalt selenide nanotube and the second structural entity is graphene.

Item A3048. The composite material of any one of items A3-A863 or B2-B15 where the nanotube is a copper nanotube and the second structural entity is graphene.

Item A3049. The composite material of any one of items A3-A863 or B2-B15 where the nanotube is a DNA nanotube and the second structural entity is graphene.

Item A3050. The composite material of any one of items A3-A863 or B2-B15 where the nanotube is a gallium nitride nanotube (GaNNT) and the second structural entity is graphene.

Item A3051. The composite material of any one of items A3-A863 or B2-B15 where the nanotube is a gallium phosphide nanotube (GaPNT) and the second structural entity is graphene.

Item A3052. The composite material of any one of items A3-A863 or B2-B15 where the nanotube is a gold nanotube and the second structural entity is graphene.

Item A3053. The composite material of any one of items A3-A863 or B2-B15 where the nanotube is a halide nanotube and the second structural entity is graphene.

Item A3054. The composite material of any one of items A3-A863 or B2-B15 where the nanotube is a niobium selenide nanotube and the second structural entity is graphene.

Item A3055. The composite material of any one of items A3-A863 or B2-B15 where the nanotube is a molybdenum disulfide nanotube and the second structural entity is graphene.

Item A3056. The composite material of any one of items A3-A863 or B2-B15 where the nanotube is a nanotube of transition metal oxides and the second structural entity is graphene.

Item A3057. The composite material of any one of items A3-A863 or B2-B15 where the nanotube is a nickel chloride nanotub and the second structural entity is graphene.

Item A3058. The composite material of any one of items A3-A863 or B2-B15 where the nanotube is a platinum nanotube and the second structural entity is graphene.

Item A3059. The composite material of any one of items A3-A863 or B2-B15 where the nanotube is a protein nanotube and the second structural entity is graphene.

Item A3060. The composite material of any one of items A3-A863 or B2-B15 where the nanotube is a RNA nanotube and the second structural entity is graphene.

Item A3061. The composite material of any one of items A3-A863 or B2-B15 where the nanotube is a selenide nanotube and the second structural entity is graphene.

Item A3062. The composite material of any one of items A3-A863 or B2-B15 where the nanotube is a silicon nanotube and the second structural entity is graphene.

Item A3063. The composite material of any one of items A3-A863 or B2-B15 where the nanotube is a silver nanotube and the second structural entity is graphene.

Item A3064. The composite material of any one of items A3-A863 or B2-B15 where the nanotube is a sulphide nanotube and the second structural entity is graphene.

Item A3065. The composite material of any one of items A3-A863 or B2-B15 where the nanotube is a tin disulfide nanotube and the second structural entity is graphene.

Item A3066. The composite material of any one of items A3-A863 or B2-B15 where the nanotube is a titanium dioxide nanotube and the second structural entity is graphene.

Item A3067. The composite material of any one of items A3-A863 or B2-B15 where the nanotube is a titanium oxide nanotube and the second structural entity is graphene.

Item A3068. The composite material of any one of items A3-A863 or B2-B15 where the nanotube is a tungsten disulfide nanotube and the second structural entity is graphene.

Item A3069. The composite material of any one of items A3-A863 or B2-B15 where the nanotube is a tungsten sulfide nanotube and the second structural entity is graphene.

Item A3070. The composite material of any one of items A3-A863 or B2-B15 where the nanotube is a wolfram disulphide nanotube and the second structural entity is graphene.

Item A3071. The composite material of any one of items A3-A863 or B2-B15 where the nanotube is a zinc ferrite nanotube and the second structural entity is graphene.

Item A3072. The composite material of any one of items A3-A863 or B2-B15 where the nanotube is a zinc oxide nanotube and the second structural entity is graphene.

Item A3073. The composite material of any one of items A3-A863 or B2-B15 where the nanotube is a zirconia dioxide nanotube and the second structural entity is graphene.

Item A3074. The composite material of any one of items A3-A863 or B2-B15 where the nanotube is a nanofiber and the second structural entity is graphene.

Item A3075. The composite material of any one of items A3-A863 or B2-B15 where the nanotube is a nanothread and the second structural entity is graphene.

Item A3076. The composite material of any one of items A3-A863 or B2-B15 where the nanotube is a nanorod and the second structural entity is graphene.

Item A3077. The composite material of any one of items A3-A863 or B2-B15 where the nanotube is a nanoball and the second structural entity is graphene.

Item A3078. The composite material of any one of items A3-A863 or B2-B15 where the nanotube is a nanobud and the second structural entity is graphene.

Item A3079. The composite material of any one of items A3-A863 or B2-B15 where the nanotube is a buckyball and the second structural entity is graphene.

Item A3080. The composite material of any one of items A3-A863 or B2-B15 where the nanotube is a multi wall nanotube and the second structural entity is graphene.

Item A3081. The composite material of any one of items A3-A863 or B2-B15 where the nanotube is a single wall nanotube and the second structural entity is graphene.

Item A3082. The composite material of any one of items A3-A863 or B2-B15 where the nanotube has the chirality (n,0) where n=0 to 20. and the second structural entity is graphene.

Item A3083. The composite material of any one of items A3-A863 or B2-B15 where the nanotube has the chirality (n,1) where n=0 to 20. and the second structural entity is graphene.

Item A3084. The composite material of any one of items A3-A863 or B2-B15 where the nanotube has the chirality (n,2) where n=0 to 20. and the second structural entity is graphene.

Item A3085. The composite material of any one of items A3-A863 or B2-B15 where the nanotube has the chirality (n,3) where n=0 to 20. and the second structural entity is graphene.

Item A3086. The composite material of any one of items A3-A863 or B2-B15 where the nanotube has the chirality (n,4) where n=0 to 20. and the second structural entity is graphene.

Item A3087. The composite material of any one of items A3-A863 or B2-B15 where the nanotube has the chirality (n,5) where n=0 to 20. and the second structural entity is graphene.

Item A3088. The composite material of any one of items A3-A863 or B2-B15 where the nanotube has the chirality (n,6) where n=0 to 20. and the second structural entity is graphene.

Item A3089. The composite material of any one of items A3-A863 or B2-B15 where the nanotube has the chirality (n,7) where n=0 to 20. and the second structural entity is graphene.

Item A3090. The composite material of any one of items A3-A863 or B2-B15 where the nanotube has the chirality (n,8) where n=0 to 20. and the second structural entity is graphene.

Item A3091. The composite material of any one of items A3-A863 or B2-B15 where the nanotube has the chirality (n,9) where n=0 to 20. and the second structural entity is graphene.

Item A3092. The composite material of any one of items A3-A863 or B2-B15 where the nanotube has the chirality (n,10) where n=0 to 20. and the second structural entity is graphene.

Item A3093. The composite material of any one of items A3-A863 or B2-B15 where the nanotube has the chirality (n,11) where n=0 to 20. and the second structural entity is graphene.

Item A3094. The composite material of any one of items A3-A863 or B2-B15 where the nanotube has the chirality (n,12) where n=0 to 20. and the second structural entity is graphene.

Item A3095. The composite material of any one of items A3-A863 or B2-B15 where the nanotube has the chirality (n,13) where n=0 to 20. and the second structural entity is graphene.

Item A3096. The composite material of any one of items A3-A863 or B2-B15 where the nanotube has the chirality (n,14) where n=0 to 20. and the second structural entity is graphene.

Item A3097. The composite material of any one of items A3-A863 or B2-B15 where the nanotube has the chirality (n,15) where n=0 to 20. and the second structural entity is graphene.

Item A3098. The composite material of any one of items A3-A863 or B2-B15 where the nanotube has the chirality (n,16) where n=0 to 20. and the second structural entity is graphene.

Item A3099. The composite material of any one of items A3-A863 or B2-B15 where the nanotube has the chirality (n,17) where n=0 to 20. and the second structural entity is graphene.

Item A3100. The composite material of any one of items A3-A863 or B2-B15 where the nanotube has the chirality (n,18) where n=0 to 20. and the second structural entity is graphene.

Item A3101. The composite material of any one of items A3-A863 or B2-B15 where the nanotube has the chirality (n,19) where n=0 to 20. and the second structural entity is graphene.

Item A3102. The composite material of any one of items A3-A863 or B2-B15 where the nanotube has the chirality (n,20) where n=0 to 20. and the second structural entity is graphene.

Item A3103. The composite material of any one of items A3-A863 or B2-B15 where the nanotube has the chirality (0,n) where n=0 to 20. and the second structural entity is graphene.

Item A3104. The composite material of any one of items A3-A863 or B2-B15 where the nanotube has the chirality (1,n) where n=0 to 20. and the second structural entity is graphene.

Item A3105. The composite material of any one of items A3-A863 or B2-B15 where the nanotube has the chirality (2,n) where n=0 to 20. and the second structural entity is graphene.

Item A3106. The composite material of any one of items A3-A863 or B2-B15 where the nanotube has the chirality (3,n) where n=0 to 20. and the second structural entity is graphene.

Item A3107. The composite material of any one of items A3-A863 or B2-B15 where the nanotube has the chirality (4,n) where n=0 to 20. and the second structural entity is graphene.

Item A3108. The composite material of any one of items A3-A863 or B2-B15 where the nanotube has the chirality (5,n) where n=0 to 20. and the second structural entity is graphene.

Item A3109. The composite material of any one of items A3-A863 or B2-B15 where the nanotube has the chirality (6,n) where n=0 to 20. and the second structural entity is graphene.

Item A3110. The composite material of any one of items A3-A863 or B2-B15 where the nanotube has the chirality (7,n) where n=0 to 20. and the second structural entity is graphene.

Item A3111. The composite material of any one of items A3-A863 or B2-B15 where the nanotube has the chirality (8,n) where n=0 to 20. and the second structural entity is graphene.

Item A3112. The composite material of any one of items A3-A863 or B2-B15 where the nanotube has the chirality (9,n) where n=0 to 20. and the second structural entity is graphene.

Item A3113. The composite material of any one of items A3-A863 or B2-B15 where the nanotube has the chirality (10,n) where n=0 to 20. and the second structural entity is graphene.

Item A3114. The composite material of any one of items A3-A863 or B2-B15 where the nanotube has the chirality (11,n) where n=0 to 20. and the second structural entity is graphene.

Item A3115. The composite material of any one of items A3-A863 or B2-B15 where the nanotube has the chirality (12,n) where n=0 to 20. and the second structural entity is graphene.

Item A3116. The composite material of any one of items A3-A863 or B2-B15 where the nanotube has the chirality (13,n) where n=0 to 20. and the second structural entity is graphene.

Item A3117. The composite material of any one of items A3-A863 or B2-B15 where the nanotube has the chirality (14,n) where n=0 to 20. and the second structural entity is graphene.

Item A3118. The composite material of any one of items A3-A863 or B2-B15 where the nanotube has the chirality (15,n) where n=0 to 20. and the second structural entity is graphene.

Item A3119. The composite material of any one of items A3-A863 or B2-B15 where the nanotube has the chirality (16,n) where n=0 to 20. and the second structural entity is graphene.

Item A3120. The composite material of any one of items A3-A863 or B2-B15 where the nanotube has the chirality (17,n) where n=0 to 20. and the second structural entity is graphene.

Item A3121. The composite material of any one of items A3-A863 or B2-B15 where the nanotube has the chirality (18,n) where n=0 to 20. and the second structural entity is graphene.

Item A3122. The composite material of any one of items A3-A863 or B2-B15 where the nanotube has the chirality (19,n) where n=0 to 20. and the second structural entity is graphene.

Item A3123. The composite material of any one of items A3-A863 or B2-B15 where the nanotube has the chirality (20,n) where n=0 to 20. and the second structural entity is graphene.

Item A3124. The composite material of any one of items A3-A863 or B2-B15 where the nanotube has a percentage of sp2 bonds of more than 90%, such as more than 95%, such as more than 96%, such as more than 97%, such as more than 98%, such as more than 99%, such as more than 99%. and the second structural entity is graphene.

Item A3125. The composite material of any one of items A3-A863 or B2-B15 where the nanotube has a percentage of sp2 bonds of less than 100%, such as less than 99%, such as less than 98%, such as less than 97%, such as less than 96%, such as less than 95%. and the second structural entity is graphene.

Item A3126. The composite material of any one of items A3-A863 or B2-B15 where the nanotube has a percentage of sp2 bonds of from 95%-96%, from 96% to 97%, from 97% to 98%, from 98% to 99%, from 99% to 100%. and the second structural entity is graphene.

Item A3127. The composite material of any one of items A3-A863 or B2-B15 where the nanotube has a percentage of carbon atoms of more than 90%, such as more than 95%, such as more than 96%, such as more than 97%, such as more than 98%, such as more than 99%, such as more than 99%. and the second structural entity is graphene.

Item A3128. The composite material of any one of items A3-A863 or B2-B15 where the nanotube has a percentage of carbon atoms of less than 100%, such as less than 99%, such as less than 98%, such as less than 97%, such as less than 96%, such as less than 95%. and the second structural entity is graphene.

Item A3129. The composite material of any one of items A3-A863 or B2-B15 where the nanotube has a percentage of carbon atoms of from 95%-96%, from 96% to 97%, from 97% to 98%, from 98% to 99%, from 99% to 100%. and the second structural entity is graphene.

Item A3130. The composite material of any one of items A3-A863 or B2-B15 where the nanotube has a percentage of functionalization of less than 10%, such as less than 5%, such as less than 4%, such as less than 3%, such as less than 2%, such as less than 1% and the second structural entity is graphene.

Item A3131. The composite material of any one of items A3-A863 or B2-B15 where the nanotube has a percentage of functionalization of more than 0%, such as more than 1%, such as more than 2%, such as more than 3%, such as more than 4%, such as more than 5%, such as more than 10%. and the second structural entity is graphene.

Item A3132. The composite material of any one of items A3-A863 or B2-B15 where the nanotube has a percentage of functionalization of from 0% to 1%, from 1% to 2%, from 2% to 3%, from 3% to 4%, from 4% to 5%, from 5% to 10%. and the second structural entity is graphene.

Item A3133. The composite material of any one of items A3-A863 or B2-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$. and the second structural entity is graphene.

Item A3134. The composite material of any one of items A3-A863 or B2-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10. and the second structural entity is graphene.

Item A3135. The composite material of any one of items A3-A863 or B2-B15 where the nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$. and the second structural entity is graphene.

Item A3136. The composite material of any one of items A3-A863 or B2-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom, and the second structural entity is graphene.

Item A3137. The composite material of any one of items A3-A863 or B2-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4 and the second structural entity is graphene.

Item A3138. The composite material of any one of items A3-A863 or B2-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400 and the second structural entity is graphene.

Item A3139. The composite material of any one of items A3-A863 or B2-B15 where the nanotube is a carbon nanotube and the second structural entity is a metal.

Item A3140. The composite material of any one of items A3-A863 or B2-B15 where the nanotube is a single wall carbon nanotube and the second structural entity is a metal.

Item A3141. The composite material of any one of items A3-A863 or B2-B15 where the nanotube is a multi wall carbon nanotube and the second structural entity is a metal.

Item A3142. The composite material of any one of items A3-A863 or B2-B15 where the nanotube is a metallic carbon nanotube and the second structural entity is a metal.

Item A3143. The composite material of any one of items A3-A863 or B2-B15 where the nanotube is a semiconductive carbon nanotube and the second structural entity is a metal.

Item A3144. The composite material of any one of items A3-A863 or B2-B15 where the nanotube is a aluminium nanotube and the second structural entity is a metal.

Item A3145. The composite material of any one of items A3-A863 or B2-B15 where the nanotube is a aluminum nitride nanotube (AlNNT) and the second structural entity is a metal.

Item A3146. The composite material of any one of items A3-A863 or B2-B15 where the nanotube is a aluminum phosphide nanotube (AlPNT) and the second structural entity is a metal.

Item A3147. The composite material of any one of items A3-A863 or B2-B15 where the nanotube is a bismuth nanotube and the second structural entity is a metal.

Item A3148. The composite material of any one of items A3-A863 or B2-B15 where the nanotube is a bismuth selenide nanotube and the second structural entity is a metal.

Item A3149. The composite material of any one of items A3-A863 or B2-B15 where the nanotube is a boron carbon nanotubes (BCNNT) and the second structural entity is a metal.

Item A3150. The composite material of any one of items A3-A863 or B2-B15 where the nanotube is a boron nitride nanotube and the second structural entity is a metal.

Item A3151. The composite material of any one of items A3-A863 or B2-B15 where the nanotube is a cadmium selenide nanotube and the second structural entity is a metal.

Item A3152. The composite material of any one of items A3-A863 or B2-B15 where the nanotube is a cobalt selenide nanotube and the second structural entity is a metal.

Item A3153. The composite material of any one of items A3-A863 or B2-B15 where the nanotube is a copper nanotube and the second structural entity is a metal.

Item A3154. The composite material of any one of items A3-A863 or B2-B15 where the nanotube is a DNA nanotube and the second structural entity is a metal.

Item A3155. The composite material of any one of items A3-A863 or B2-B15 where the nanotube is a gallium nitride nanotube (GaNNT) and the second structural entity is a metal.

Item A3156. The composite material of any one of items A3-A863 or B2-B15 where the nanotube is a gallium phosphide nanotube (GaPNT) and the second structural entity is a metal.

Item A3157. The composite material of any one of items A3-A863 or B2-B15 where the nanotube is a gold nanotube and the second structural entity is a metal.

Item A3158. The composite material of any one of items A3-A863 or B2-B15 where the nanotube is a halide nanotube and the second structural entity is a metal.

Item A3159. The composite material of any one of items A3-A863 or B2-B15 where the nanotube is a niobium selenide nanotube and the second structural entity is a metal.

Item A3160. The composite material of any one of items A3-A863 or B2-B15 where the nanotube is a molybdenum disulfide nanotube and the second structural entity is a metal.

Item A3161. The composite material of any one of items A3-A863 or B2-B15 where the nanotube is a nanotube of transition metal oxides and the second structural entity is a metal.

Item A3162. The composite material of any one of items A3-A863 or B2-B15 where the nanotube is a nickel chloride nanotub and the second structural entity is a metal.

Item A3163. The composite material of any one of items A3-A863 or B2-B15 where the nanotube is a platinum nanotube and the second structural entity is a metal.

Item A3164. The composite material of any one of items A3-A863 or B2-B15 where the nanotube is a protein nanotube and the second structural entity is a metal.

Item A3165. The composite material of any one of items A3-A863 or B2-B15 where the nanotube is a RNA nanotube and the second structural entity is a metal.

Item A3166. The composite material of any one of items A3-A863 or B2-B15 where the nanotube is a selenide nanotube and the second structural entity is a metal.

Item A3167. The composite material of any one of items A3-A863 or B2-B15 where the nanotube is a silicon nanotube and the second structural entity is a metal.

Item A3168. The composite material of any one of items A3-A863 or B2-B15 where the nanotube is a silver nanotube and the second structural entity is a metal.

Item A3169. The composite material of any one of items A3-A863 or B2-B15 where the nanotube is a sulphide nanotube and the second structural entity is a metal.

Item A3170. The composite material of any one of items A3-A863 or B2-B15 where the nanotube is a tin disulfide nanotube and the second structural entity is a metal.

Item A3171. The composite material of any one of items A3-A863 or B2-B15 where the nanotube is a titanium dioxide nanotube and the second structural entity is a metal.

Item A3172. The composite material of any one of items A3-A863 or B2-B15 where the nanotube is a titanium oxide nanotube and the second structural entity is a metal.

Item A3173. The composite material of any one of items A3-A863 or B2-B15 where the nanotube is a tungsten disulfide nanotube and the second structural entity is a metal.

Item A3174. The composite material of any one of items A3-A863 or B2-B15 where the nanotube is a tungsten sulfide nanotube and the second structural entity is a metal.

Item A3175. The composite material of any one of items A3-A863 or B2-B15 where the nanotube is a wolfram disulphide nanotube and the second structural entity is a metal.

Item A3176. The composite material of any one of items A3-A863 or B2-B15 where the nanotube is a zinc ferrite nanotube and the second structural entity is a metal.

Item A3177. The composite material of any one of items A3-A863 or B2-B15 where the nanotube is a zinc oxide nanotube and the second structural entity is a metal.

Item A3178. The composite material of any one of items A3-A863 or B2-B15 where the nanotube is a zirconia dioxide nanotube and the second structural entity is a metal.

Item A3179. The composite material of any one of items A3-A863 or B2-B15 where the nanotube is a nanofiber and the second structural entity is a metal.

Item A3180. The composite material of any one of items A3-A863 or B2-B15 where the nanotube is a nanothread and the second structural entity is a metal.

Item A3181. The composite material of any one of items A3-A863 or B2-B15 where the nanotube is a nanorod and the second structural entity is a metal.

Item A3182. The composite material of any one of items A3-A863 or B2-B15 where the nanotube is a nanoball and the second structural entity is a metal.

Item A3183. The composite material of any one of items A3-A863 or B2-B15 where the nanotube is a nanobud and the second structural entity is a metal.

Item A3184. The composite material of any one of items A3-A863 or B2-B15 where the nanotube is a buckyball and the second structural entity is a metal.

Item A3185. The composite material of any one of items A3-A863 or B2-B15 where the nanotube is a multi wall nanotube and the second structural entity is a metal.

Item A3186. The composite material of any one of items A3-A863 or B2-B15 where the nanotube is a single wall nanotube and the second structural entity is a metal.

Item A3187. The composite material of any one of items A3-A863 or B2-B15 where the nanotube has the chirality (n,0) where n=0 to 20. and the second structural entity is a metal.

Item A3188. The composite material of any one of items A3-A863 or B2-B15 where the nanotube has the chirality (n,1) where n=0 to 20. and the second structural entity is a metal.

Item A3189. The composite material of any one of items A3-A863 or B2-B15 where the nanotube has the chirality (n,2) where n=0 to 20. and the second structural entity is a metal.

Item A3190. The composite material of any one of items A3-A863 or B2-B15 where the nanotube has the chirality (n,3) where n=0 to 20. and the second structural entity is a metal.

Item A3191. The composite material of any one of items A3-A863 or B2-B15 where the nanotube has the chirality (n,4) where n=0 to 20. and the second structural entity is a metal.

Item A3192. The composite material of any one of items A3-A863 or B2-B15 where the nanotube has the chirality (n,5) where n=0 to 20. and the second structural entity is a metal.

Item A3193. The composite material of any one of items A3-A863 or B2-B15 where the nanotube has the chirality (n,6) where n=0 to 20. and the second structural entity is a metal.

Item A3194. The composite material of any one of items A3-A863 or B2-B15 where the nanotube has the chirality (n,7) where n=0 to 20. and the second structural entity is a metal.

Item A3195. The composite material of any one of items A3-A863 or B2-B15 where the nanotube has the chirality (n,8) where n=0 to 20. and the second structural entity is a metal.

Item A3196. The composite material of any one of items A3-A863 or B2-B15 where the nanotube has the chirality (n,9) where n=0 to 20. and the second structural entity is a metal.

Item A3197. The composite material of any one of items A3-A863 or B2-B15 where the nanotube has the chirality (n,10) where n=0 to 20. and the second structural entity is a metal.

Item A3198. The composite material of any one of items A3-A863 or B2-B15 where the nanotube has the chirality (n,11) where n=0 to 20. and the second structural entity is a metal.

Item A3199. The composite material of any one of items A3-A863 or B2-B15 where the nanotube has the chirality (n,12) where n=0 to 20. and the second structural entity is a metal.

Item A3200. The composite material of any one of items A3-A863 or B2-B15 where the nanotube has the chirality (n,13) where n=0 to 20. and the second structural entity is a metal.

Item A3201. The composite material of any one of items A3-A863 or B2-B15 where the nanotube has the chirality (n,14) where n=0 to 20. and the second structural entity is a metal.

Item A3202. The composite material of any one of items A3-A863 or B2-B15 where the nanotube has the chirality (n,15) where n=0 to 20. and the second structural entity is a metal.

Item A3203. The composite material of any one of items A3-A863 or B2-B15 where the nanotube has the chirality (n,16) where n=0 to 20. and the second structural entity is a metal.

Item A3204. The composite material of any one of items A3-A863 or B2-B15 where the nanotube has the chirality (n,17) where n=0 to 20. and the second structural entity is a metal.

Item A3205. The composite material of any one of items A3-A863 or B2-B15 where the nanotube has the chirality (n,18) where n=0 to 20. and the second structural entity is a metal.

Item A3206. The composite material of any one of items A3-A863 or B2-B15 where the nanotube has the chirality (n,19) where n=0 to 20. and the second structural entity is a metal.

Item A3207. The composite material of any one of items A3-A863 or B2-B15 where the nanotube has the chirality (n,20) where n=0 to 20. and the second structural entity is a metal.

Item A3208. The composite material of any one of items A3-A863 or B2-B15 where the nanotube has the chirality (0,n) where n=0 to 20. and the second structural entity is a metal.

Item A3209. The composite material of any one of items A3-A863 or B2-B15 where the nanotube has the chirality (1,n) where n=0 to 20. and the second structural entity is a metal.

Item A3210. The composite material of any one of items A3-A863 or B2-B15 where the nanotube has the chirality (2,n) where n=0 to 20. and the second structural entity is a metal.

Item A3211. The composite material of any one of items A3-A863 or B2-B15 where the nanotube has the chirality (3,n) where n=0 to 20. and the second structural entity is a metal.

Item A3212. The composite material of any one of items A3-A863 or B2-B15 where the nanotube has the chirality (4,n) where n=0 to 20. and the second structural entity is a metal.

Item A3213. The composite material of any one of items A3-A863 or B2-B15 where the nanotube has the chirality (5,n) where n=0 to 20. and the second structural entity is a metal.

Item A3214. The composite material of any one of items A3-A863 or B2-B15 where the nanotube has the chirality (6,n) where n=0 to 20. and the second structural entity is a metal.

Item A3215. The composite material of any one of items A3-A863 or B2-B15 where the nanotube has the chirality (7,n) where n=0 to 20. and the second structural entity is a metal.

Item A3216. The composite material of any one of items A3-A863 or B2-B15 where the nanotube has the chirality (8,n) where n=0 to 20. and the second structural entity is a metal.

Item A3217. The composite material of any one of items A3-A863 or B2-B15 where the nanotube has the chirality (9,n) where n=0 to 20. and the second structural entity is a metal.

Item A3218. The composite material of any one of items A3-A863 or B2-B15 where the nanotube has the chirality (10,n) where n=0 to 20. and the second structural entity is a metal.

Item A3219. The composite material of any one of items A3-A863 or B2-B15 where the nanotube has the chirality (11,n) where n=0 to 20. and the second structural entity is a metal.

Item A3220. The composite material of any one of items A3-A863 or B2-B15 where the nanotube has the chirality (12,n) where n=0 to 20. and the second structural entity is a metal.

Item A3221. The composite material of any one of items A3-A863 or B2-B15 where the nanotube has the chirality (13,n) where n=0 to 20. and the second structural entity is a metal.

Item A3222. The composite material of any one of items A3-A863 or B2-B15 where the nanotube has the chirality (14,n) where n=0 to 20. and the second structural entity is a metal.

Item A3223. The composite material of any one of items A3-A863 or B2-B15 where the nanotube has the chirality (15,n) where n=0 to 20. and the second structural entity is a metal.

Item A3224. The composite material of any one of items A3-A863 or B2-B15 where the nanotube has the chirality (16,n) where n=0 to 20. and the second structural entity is a metal.

Item A3225. The composite material of any one of items A3-A863 or B2-B15 where the nanotube has the chirality (17,n) where n=0 to 20. and the second structural entity is a metal.

Item A3226. The composite material of any one of items A3-A863 or B2-B15 where the nanotube has the chirality (18,n) where n=0 to 20. and the second structural entity is a metal.

Item A3227. The composite material of any one of items A3-A863 or B2-B15 where the nanotube has the chirality (19,n) where n=0 to 20. and the second structural entity is a metal.

Item A3228. The composite material of any one of items A3-A863 or B2-B15 where the nanotube has the chirality (20,n) where n=0 to 20. and the second structural entity is a metal.

Item A3229. The composite material of any one of items A3-A863 or B2-B15 where the nanotube has a percentage of sp2 bonds of more than 90%, such as more than 95%, such as more than 96%, such as more than 97%, such as more than 98%, such as more than 99%, such as more than 99%. and the second structural entity is a metal.

Item A3230. The composite material of any one of items A3-A863 or B2-B15 where the nanotube has a percentage of sp2 bonds of less than 100%, such as less than 99%, such as less than 98%, such as less than 97%, such as less than 96%, such as less than 95%. and the second structural entity is a metal.

Item A3231. The composite material of any one of items A3-A863 or B2-B15 where the nanotube has a percentage of sp2 bonds of from 95%-96%, from 96% to 97%, from 97% to 98%, from 98% to 99%, from 99% to 100%. and the second structural entity is a metal.

Item A3232. The composite material of any one of items A3-A863 or B2-B15 where the nanotube has a percentage of carbon atoms of more than 90%, such as more than 95%, such as more than 96%, such as more than 97%, such as more than 98%, such as more than 99%, such as more than 99%. and the second structural entity is a metal.

Item A3233. The composite material of any one of items A3-A863 or B2-B15 where the nanotube has a percentage of carbon atoms of less than 100%, such as less than 99%, such as less than 98%, such as less than 97%, such as less than 96%, such as less than 95%. and the second structural entity is a metal.

Item A3234. The composite material of any one of items A3-A863 or B2-B15 where the nanotube has a percentage of carbon atoms of from 95%-96%, from 96% to 97%, from 97% to 98%, from 98% to 99%, from 99% to 100%. and the second structural entity is a metal.

Item A3235. The composite material of any one of items A3-A863 or B2-B15 where the nanotube has a percentage of functionalization of less than 10%, such as less than 5%, such as less than 4%, such as less than 3%, such as less than 2%, such as less than 1% and the second structural entity is a metal.

Item A3236. The composite material of any one of items A3-A863 or B2-B15 where the nanotube has a percentage of functionalization of more than 0%, such as more than 1%, such as more than 2%, such as more than 3%, such as more than 4%, such as more than 5%, such as more than 10%. and the second structural entity is a metal.

Item A3237. The composite material of any one of items A3-A863 or B2-B15 where the nanotube has a percentage of functionalization of from 0% to 1%, from 1% to 2%, from 2% to 3%, from 3% to 4%, from 4% to 5%, from 5% to 10%. and the second structural entity is a metal.

Item A3238. The composite material of any one of items A3-A863 or B2-B15 where the nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$. and the second structural entity is a metal.

Item A3239. The composite material of any one of items A3-A863 or B2-B15 where the nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10. and the second structural entity is a metal.

Item A3240. The composite material of any one of items A3-A863 or B2-B15 where the nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$. and the second structural entity is a metal.

Item A3241. The composite material of any one of items A3-A863 or B2-B15 where the nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom, and the second structural entity is a metal.

Item A3242. The composite material of any one of items A3-A863 or B2-B15 where the nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4 and the second structural entity is a metal.

Item A3243. The composite material of any one of items A3-A863 or B2-B15 where the nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400 and the second structural entity is a metal.

The following items relate to nanotubes and second nanotubes.

Item A3244. The composite material of items A20 or B15 where one nanotube is a carbon nanotube and the second nanotube is a carbon nanotube.

Item A3245. The composite material of items A20 or B15 where one nanotube is a carbon nanotube and the second nanotube is a single wall carbon nanotube.

Item A3246. The composite material of items A20 or B15 where one nanotube is a carbon nanotube and the second nanotube is a multi wall carbon nanotube.

Item A3247. The composite material of items A20 or B15 where one nanotube is a carbon nanotube and the second nanotube is a metallic carbon nanotube.

Item A3248. The composite material of items A20 or B15 where one nanotube is a carbon nanotube and the second nanotube is a semiconductive carbon nanotube.

Item A3249. The composite material of items A20 or B15 where one nanotube is a carbon nanotube and the second nanotube is a aluminium nanotube.

Item A3250. The composite material of items A20 or B15 where one nanotube is a carbon nanotube and the second nanotube is a aluminum nitride nanotube (AlNNT).

Item A3251. The composite material of items A20 or B15 where one nanotube is a carbon nanotube and the second nanotube is a aluminum phosphide nanotube (AlPNT).

Item A3252. The composite material of items A20 or B15 where one nanotube is a carbon nanotube and the second nanotube is a bismuth nanotube.

Item A3253. The composite material of items A20 or B15 where one nanotube is a carbon nanotube and the second nanotube is a bismuth selenide nanotube.

Item A3254. The composite material of items A20 or B15 where one nanotube is a carbon nanotube and the second nanotube is a boron carbon nanotubes (BCNNT).

Item A3255. The composite material of items A20 or B15 where one nanotube is a carbon nanotube and the second nanotube is a boron nitride nanotube.

Item A3256. The composite material of items A20 or B15 where one nanotube is a carbon nanotube and the second nanotube is a cadmium selenide nanotube.

Item A3257. The composite material of items A20 or B15 where one nanotube is a carbon nanotube and the second nanotube is a cobalt selenide nanotube.

Item A3258. The composite material of items A20 or B15 where one nanotube is a carbon nanotube and the second nanotube is a copper nanotube.

Item A3259. The composite material of items A20 or B15 where one nanotube is a carbon nanotube and the second nanotube is a DNA nanotube.

Item A3260. The composite material of items A20 or B15 where one nanotube is a carbon nanotube and the second nanotube is a gallium nitride nanotube (GaNNT).

Item A3261. The composite material of items A20 or B15 where one nanotube is a carbon nanotube and the second nanotube is a gallium phosphide nanotube (GaPNT).

Item A3262. The composite material of items A20 or B15 where one nanotube is a carbon nanotube and the second nanotube is a gold nanotube.

Item A3263. The composite material of items A20 or B15 where one nanotube is a carbon nanotube and the second nanotube is a halide nanotube.

Item A3264. The composite material of items A20 or B15 where one nanotube is a carbon nanotube and the second nanotube is a niobium selenide nanotube.

Item A3265. The composite material of items A20 or B15 where one nanotube is a carbon nanotube and the second nanotube is a molybdenum disulfide nanotube.

Item A3266. The composite material of items A20 or B15 where one nanotube is a carbon nanotube and the second nanotube is a nanotube of transition metal oxides.

Item A3267. The composite material of items A20 or B15 where one nanotube is a carbon nanotube and the second nanotube is a nickel chloride nanotube.

Item A3268. The composite material of items A20 or B15 where one nanotube is a carbon nanotube and the second nanotube is a platinum nanotube.

Item A3269. The composite material of items A20 or B15 where one nanotube is a carbon nanotube and the second nanotube is a protein nanotube.

Item A3270. The composite material of items A20 or B15 where one nanotube is a carbon nanotube and the second nanotube is a RNA nanotube.

Item A3271. The composite material of items A20 or B15 where one nanotube is a carbon nanotube and the second nanotube is a selenide nanotube.

Item A3272. The composite material of items A20 or B15 where one nanotube is a carbon nanotube and the second nanotube is a silicon nanotube.

Item A3273. The composite material of items A20 or B15 where one nanotube is a carbon nanotube and the second nanotube is a silver nanotube.

Item A3274. The composite material of items A20 or B15 where one nanotube is a carbon nanotube and the second nanotube is a sulphide nanotube.

Item A3275. The composite material of items A20 or B15 where one nanotube is a carbon nanotube and the second nanotube is a tin disulfide nanotube.

Item A3276. The composite material of items A20 or B15 where one nanotube is a carbon nanotube and the second nanotube is a titanium dioxide nanotube.

Item A3277. The composite material of items A20 or B15 where one nanotube is a carbon nanotube and the second nanotube is a titanium oxide nanotube.

Item A3278. The composite material of items A20 or B15 where one nanotube is a carbon nanotube and the second nanotube is a tungsten disulfide nanotube.

Item A3279. The composite material of items A20 or B15 where one nanotube is a carbon nanotube and the second nanotube is a tungsten sulfide nanotube.

Item A3280. The composite material of items A20 or B15 where one nanotube is a carbon nanotube and the second nanotube is a wolfram disulphide nanotube.

Item A3281. The composite material of items A20 or B15 where one nanotube is a carbon nanotube and the second nanotube is a zinc ferrite nanotube.

Item A3282. The composite material of items A20 or B15 where one nanotube is a carbon nanotube and the second nanotube is a zinc oxide nanotube.

Item A3283. The composite material of items A20 or B15 where one nanotube is a carbon nanotube and the second nanotube is a zirconia dioxide nanotube.

Item A3284. The composite material of items A20 or B15 where one nanotube is a carbon nanotube and the second nanotube is a nanofiber.

Item A3285. The composite material of items A20 or B15 where one nanotube is a carbon nanotube and the second nanotube is a nanothread.

Item A3286. The composite material of items A20 or B15 where one nanotube is a carbon nanotube and the second nanotube is a nanorod.

Item A3287. The composite material of items A20 or B15 where one nanotube is a carbon nanotube and the second nanotube is a nanoball.

Item A3288. The composite material of items A20 or B15 where one nanotube is a carbon nanotube and the second nanotube is a nanobud.

Item A3289. The composite material of items A20 or B15 where one nanotube is a carbon nanotube and the second nanotube is a buckyball.

Item A3290. The composite material of items A20 or B15 where one nanotube is a carbon nanotube and the second nanotube is a multi wall nanotube.

Item A3291. The composite material of items A20 or B15 where one nanotube is a carbon nanotube and the second nanotube is a single wall nanotube.

Item A3292. The composite material of items A20 or B15 where one nanotube is a carbon nanotube and the second nanotube has the chirality (n,0) where n=0 to 20.

Item A3293. The composite material of items A20 or B15 where one nanotube is a carbon nanotube and the second nanotube has the chirality (n,1) where n=0 to 20.

Item A3294. The composite material of items A20 or B15 where one nanotube is a carbon nanotube and the second nanotube has the chirality (n,2) where n=0 to 20.

Item A3295. The composite material of items A20 or B15 where one nanotube is a carbon nanotube and the second nanotube has the chirality (n,3) where n=0 to 20.

Item A3296. The composite material of items A20 or B15 where one nanotube is a carbon nanotube and the second nanotube has the chirality (n,4) where n=0 to 20.

Item A3297. The composite material of items A20 or B15 where one nanotube is a carbon nanotube and the second nanotube has the chirality (n,5) where n=0 to 20.

Item A3298. The composite material of items A20 or B15 where one nanotube is a carbon nanotube and the second nanotube has the chirality (n,6) where n=0 to 20.

Item A3299. The composite material of items A20 or B15 where one nanotube is a carbon nanotube and the second nanotube has the chirality (n,7) where n=0 to 20.

Item A3300. The composite material of items A20 or B15 where one nanotube is a carbon nanotube and the second nanotube has the chirality (n,8) where n=0 to 20.

Item A3301. The composite material of items A20 or B15 where one nanotube is a carbon nanotube and the second nanotube has the chirality (n,9) where n=0 to 20.

Item A3302. The composite material of items A20 or B15 where one nanotube is a carbon nanotube and the second nanotube has the chirality (n,10) where n=0 to 20.

Item A3303. The composite material of items A20 or B15 where one nanotube is a carbon nanotube and the second nanotube has the chirality (n,11) where n=0 to 20.

Item A3304. The composite material of items A20 or B15 where one nanotube is a carbon nanotube and the second nanotube has the chirality (n,12) where n=0 to 20.

Item A3305. The composite material of items A20 or B15 where one nanotube is a carbon nanotube and the second nanotube has the chirality (n,13) where n=0 to 20.

Item A3306. The composite material of items A20 or B15 where one nanotube is a carbon nanotube and the second nanotube has the chirality (n,14) where n=0 to 20.

Item A3307. The composite material of items A20 or B15 where one nanotube is a carbon nanotube and the second nanotube has the chirality (n,15) where n=0 to 20.

Item A3308. The composite material of items A20 or B15 where one nanotube is a carbon nanotube and the second nanotube has the chirality (n,16) where n=0 to 20.

Item A3309. The composite material of items A20 or B15 where one nanotube is a carbon nanotube and the second nanotube has the chirality (n,17) where n=0 to 20.

Item A3310. The composite material of items A20 or B15 where one nanotube is a carbon nanotube and the second nanotube has the chirality (n,18) where n=0 to 20.

Item A3311. The composite material of items A20 or B15 where one nanotube is a carbon nanotube and the second nanotube has the chirality (n,19) where n=0 to 20.

Item A3312. The composite material of items A20 or B15 where one nanotube is a carbon nanotube and the second nanotube has the chirality (n,20) where n=0 to 20.

Item A3313. The composite material of items A20 or B15 where one nanotube is a carbon nanotube and the second nanotube has the chirality (0,n) where n=0 to 20.

Item A3314. The composite material of items A20 or B15 where one nanotube is a carbon nanotube and the second nanotube has the chirality (1,n) where n=0 to 20.

Item A3315. The composite material of items A20 or B15 where one nanotube is a carbon nanotube and the second nanotube has the chirality (2,n) where n=0 to 20.

Item A3316. The composite material of items A20 or B15 where one nanotube is a carbon nanotube and the second nanotube has the chirality (3,n) where n=0 to 20.

Item A3317. The composite material of items A20 or B15 where one nanotube is a carbon nanotube and the second nanotube has the chirality (4,n) where n=0 to 20.

Item A3318. The composite material of items A20 or B15 where one nanotube is a carbon nanotube and the second nanotube has the chirality (5,n) where n=0 to 20.

Item A3319. The composite material of items A20 or B15 where one nanotube is a carbon nanotube and the second nanotube has the chirality (6,n) where n=0 to 20.

Item A3320. The composite material of items A20 or B15 where one nanotube is a carbon nanotube and the second nanotube has the chirality (7,n) where n=0 to 20.

Item A3321. The composite material of items A20 or B15 where one nanotube is a carbon nanotube and the second nanotube has the chirality (8,n) where n=0 to 20.

Item A3322. The composite material of items A20 or B15 where one nanotube is a carbon nanotube and the second nanotube has the chirality (9,n) where n=0 to 20.

Item A3323. The composite material of items A20 or B15 where one nanotube is a carbon nanotube and the second nanotube has the chirality (10,n) where n=0 to 20.

Item A3324. The composite material of items A20 or B15 where one nanotube is a carbon nanotube and the second nanotube has the chirality (11,n) where n=0 to 20.

Item A3325. The composite material of items A20 or B15 where one nanotube is a carbon nanotube and the second nanotube has the chirality (12,n) where n=0 to 20.

Item A3326. The composite material of items A20 or B15 where one nanotube is a carbon nanotube and the second nanotube has the chirality (13,n) where n=0 to 20.

Item A3327. The composite material of items A20 or B15 where one nanotube is a carbon nanotube and the second nanotube has the chirality (14,n) where n=0 to 20.

Item A3328. The composite material of items A20 or B15 where one nanotube is a carbon nanotube and the second nanotube has the chirality (15,n) where n=0 to 20.

Item A3329. The composite material of items A20 or B15 where one nanotube is a carbon nanotube and the second nanotube has the chirality (16,n) where n=0 to 20.

Item A3330. The composite material of items A20 or B15 where one nanotube is a carbon nanotube and the second nanotube has the chirality (17,n) where n=0 to 20.

Item A3331. The composite material of items A20 or B15 where one nanotube is a carbon nanotube and the second nanotube has the chirality (18,n) where n=0 to 20.

Item A3332. The composite material of items A20 or B15 where one nanotube is a carbon nanotube and the second nanotube has the chirality (19,n) where n=0 to 20.

Item A3333. The composite material of items A20 or B15 where one nanotube is a carbon nanotube and the second nanotube has the chirality (20,n) where n=0 to 20.

Item A3334. The composite material of items A20 or B15 where one nanotube is a carbon nanotube and the second nanotube has a percentage of sp2 bonds of more than 90%, such as more than 95%, such as more than 96%, such as more than 97%, such as more than 98%, such as more than 99%, such as more than 99%.

Item A3335. The composite material of items A20 or B15 where one nanotube is a carbon nanotube and the second nanotube has a percentage of sp2 bonds of less than 100%, such as less than 99%, such as less than 98%, such as less than 97%, such as less than 96%, such as less than 95%.

Item A3336. The composite material of items A20 or B15 where one nanotube is a carbon nanotube and the second nanotube has a percentage of sp2 bonds of from 95%-96%, from 96% to 97%, from 97% to 98%, from 98% to 99%, from 99% to 100%.

Item A3337. The composite material of items A20 or B15 where one nanotube is a carbon nanotube and the second nanotube has a percentage of carbon atoms of more than 90%, such as more than 95%, such as more than 96%, such as more than 97%, such as more than 98%, such as more than 99%, such as more than 99%.

Item A3338. The composite material of items A20 or B15 where one nanotube is a carbon nanotube and the second nanotube has a percentage of carbon atoms of less than 100%, such as less than 99%, such as less than 98%, such as less than 97%, such as less than 96%, such as less than 95%.

Item A3339. The composite material of items A20 or B15 where one nanotube is a carbon nanotube and the second nanotube has a percentage of carbon atoms of from 95%-96%, from 96% to 97%, from 97% to 98%, from 98% to 99%, from 99% to 100%.

Item A3340. The composite material of items A20 or B15 where one nanotube is a carbon nanotube and the second nanotube has a percentage of functionalization of less than 10%, such as less than 5%, such as less than 4%, such as less than 3%, such as less than 2%, such as less than 1%.

Item A3341. The composite material of items A20 or B15 where one nanotube is a carbon nanotube and the second nanotube has a percentage of functionalization of more than 0%, such as more than 1%, such as more than 2%, such as more than 3%, such as more than 4%, such as more than 5%, such as more than 10%.

Item A3342. The composite material of items A20 or B15 where one nanotube is a carbon nanotube and the second nanotube has a percentage of functionalization of from 0% to 1%, from 1% to 2%, from 2% to 3%, from 3% to 4%, from 4% to 5%, from 5% to 10%.

Item A3343. The composite material of items A20 or B15 where one nanotube is a carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^8$, such as more than $10^{10}$.

Item A3344. The composite material of items A20 or B15 where one nanotube is a carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3345. The composite material of items A20 or B15 where one nanotube is a carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3346. The composite material of items A20 or B15 where one nanotube is a carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3347. The composite material of items A20 or B15 where one nanotube is a carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3348. The composite material of items A20 or B15 where one nanotube is a carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3349. The composite material of items A20 or B15 where one nanotube is a single wall carbon nanotube and the second nanotube is a carbon nanotube.

Item A3350. The composite material of items A20 or B15 where one nanotube is a single wall carbon nanotube and the second nanotube is a single wall carbon nanotube.

Item A3351. The composite material of items A20 or B15 where one nanotube is a single wall carbon nanotube and the second nanotube is a multi wall carbon nanotube.

Item A3352. The composite material of items A20 or B15 where one nanotube is a single wall carbon nanotube and the second nanotube is a metallic carbon nanotube.

Item A3353. The composite material of items A20 or B15 where one nanotube is a single wall carbon nanotube and the second nanotube is a semiconductive carbon nanotube.

Item A3354. The composite material of items A20 or B15 where one nanotube is a single wall carbon nanotube and the second nanotube is a aluminium nanotube.

Item A3355. The composite material of items A20 or B15 where one nanotube is a single wall carbon nanotube and the second nanotube is a aluminum nitride nanotube (AlNNT).

Item A3356. The composite material of items A20 or B15 where one nanotube is a single wall carbon nanotube and the second nanotube is a aluminum phosphide nanotube (AlPNT).

Item A3357. The composite material of items A20 or B15 where one nanotube is a single wall carbon nanotube and the second nanotube is a bismuth nanotube.

Item A3358. The composite material of items A20 or B15 where one nanotube is a single wall carbon nanotube and the second nanotube is a bismuth selenide nanotube.

Item A3359. The composite material of items A20 or B15 where one nanotube is a single wall carbon nanotube and the second nanotube is a boron carbon nanotubes (BCNNT).

Item A3360. The composite material of items A20 or B15 where one nanotube is a single wall carbon nanotube and the second nanotube is a boron nitride nanotube.

Item A3361. The composite material of items A20 or B15 where one nanotube is a single wall carbon nanotube and the second nanotube is a cadmium selenide nanotube.

Item A3362. The composite material of items A20 or B15 where one nanotube is a single wall carbon nanotube and the second nanotube is a cobalt selenide nanotube.

Item A3363. The composite material of items A20 or B15 where one nanotube is a single wall carbon nanotube and the second nanotube is a copper nanotube.

Item A3364. The composite material of items A20 or B15 where one nanotube is a single wall carbon nanotube and the second nanotube is a DNA nanotube.

Item A3365. The composite material of items A20 or B15 where one nanotube is a single wall carbon nanotube and the second nanotube is a gallium nitride nanotube (GaNNT).

Item A3366. The composite material of items A20 or B15 where one nanotube is a single wall carbon nanotube and the second nanotube is a gallium phosphide nanotube (GaPNT).

Item A3367. The composite material of items A20 or B15 where one nanotube is a single wall carbon nanotube and the second nanotube is a gold nanotube.

Item A3368. The composite material of items A20 or B15 where one nanotube is a single wall carbon nanotube and the second nanotube is a halide nanotube.

Item A3369. The composite material of items A20 or B15 where one nanotube is a single wall carbon nanotube and the second nanotube is a niobium selenide nanotube.

Item A3370. The composite material of items A20 or B15 where one nanotube is a single wall carbon nanotube and the second nanotube is a molybdenum disulfide nanotube.

Item A3371. The composite material of items A20 or B15 where one nanotube is a single wall carbon nanotube and the second nanotube is a nanotube of transition metal oxides.

Item A3372. The composite material of items A20 or B15 where one nanotube is a single wall carbon nanotube and the second nanotube is a nickel chloride nanotube.

Item A3373. The composite material of items A20 or B15 where one nanotube is a single wall carbon nanotube and the second nanotube is a platinum nanotube.

Item A3374. The composite material of items A20 or B15 where one nanotube is a single wall carbon nanotube and the second nanotube is a protein nanotube.

Item A3375. The composite material of items A20 or B15 where one nanotube is a single wall carbon nanotube and the second nanotube is a RNA nanotube.

Item A3376. The composite material of items A20 or B15 where one nanotube is a single wall carbon nanotube and the second nanotube is a selenide nanotube.

Item A3377. The composite material of items A20 or B15 where one nanotube is a single wall carbon nanotube and the second nanotube is a silicon nanotube.

Item A3378. The composite material of items A20 or B15 where one nanotube is a single wall carbon nanotube and the second nanotube is a silver nanotube.

Item A3379. The composite material of items A20 or B15 where one nanotube is a single wall carbon nanotube and the second nanotube is a sulphide nanotube.

Item A3380. The composite material of items A20 or B15 where one nanotube is a single wall carbon nanotube and the second nanotube is a tin disulfide nanotube.

Item A3381. The composite material of items A20 or B15 where one nanotube is a single wall carbon nanotube and the second nanotube is a titanium dioxide nanotube.

Item A3382. The composite material of items A20 or B15 where one nanotube is a single wall carbon nanotube and the second nanotube is a titanium oxide nanotube.

Item A3383. The composite material of items A20 or B15 where one nanotube is a single wall carbon nanotube and the second nanotube is a tungsten disulfide nanotube.

Item A3384. The composite material of items A20 or B15 where one nanotube is a single wall carbon nanotube and the second nanotube is a tungsten sulfide nanotube.

Item A3385. The composite material of items A20 or B15 where one nanotube is a single wall carbon nanotube and the second nanotube is a wolfram disulphide nanotube.

Item A3386. The composite material of items A20 or B15 where one nanotube is a single wall carbon nanotube and the second nanotube is a zinc ferrite nanotube.

Item A3387. The composite material of items A20 or B15 where one nanotube is a single wall carbon nanotube and the second nanotube is a zinc oxide nanotube.

Item A3388. The composite material of items A20 or B15 where one nanotube is a single wall carbon nanotube and the second nanotube is a zirconia dioxide nanotube.

Item A3389. The composite material of items A20 or B15 where one nanotube is a single wall carbon nanotube and the second nanotube is a nanofiber.

Item A3390. The composite material of items A20 or B15 where one nanotube is a single wall carbon nanotube and the second nanotube is a nanothread.

Item A3391. The composite material of items A20 or B15 where one nanotube is a single wall carbon nanotube and the second nanotube is a nanorod.

Item A3392. The composite material of items A20 or B15 where one nanotube is a single wall carbon nanotube and the second nanotube is a nanoball.

Item A3393. The composite material of items A20 or B15 where one nanotube is a single wall carbon nanotube and the second nanotube is a nanobud.

Item A3394. The composite material of items A20 or B15 where one nanotube is a single wall carbon nanotube and the second nanotube is a buckyball.

Item A3395. The composite material of items A20 or B15 where one nanotube is a single wall carbon nanotube and the second nanotube is a multi wall nanotube.

Item A3396. The composite material of items A20 or B15 where one nanotube is a single wall carbon nanotube and the second nanotube is a single wall nanotube.

Item A3397. The composite material of items A20 or B15 where one nanotube is a single wall carbon nanotube and the second nanotube has the chirality (n,0) where n=0 to 20.

Item A3398. The composite material of items A20 or B15 where one nanotube is a single wall carbon nanotube and the second nanotube has the chirality (n,1) where n=0 to 20.

Item A3399. The composite material of items A20 or B15 where one nanotube is a single wall carbon nanotube and the second nanotube has the chirality (n,2) where n=0 to 20.

Item A3400. The composite material of items A20 or B15 where one nanotube is a single wall carbon nanotube and the second nanotube has the chirality (n,3) where n=0 to 20.

Item A3401. The composite material of items A20 or B15 where one nanotube is a single wall carbon nanotube and the second nanotube has the chirality (n,4) where n=0 to 20.

Item A3402. The composite material of items A20 or B15 where one nanotube is a single wall carbon nanotube and the second nanotube has the chirality (n,5) where n=0 to 20.

Item A3403. The composite material of items A20 or B15 where one nanotube is a single wall carbon nanotube and the second nanotube has the chirality (n,6) where n=0 to 20.

Item A3404. The composite material of items A20 or B15 where one nanotube is a single wall carbon nanotube and the second nanotube has the chirality (n,7) where n=0 to 20.

Item A3405. The composite material of items A20 or B15 where one nanotube is a single wall carbon nanotube and the second nanotube has the chirality (n,8) where n=0 to 20.

Item A3406. The composite material of items A20 or B15 where one nanotube is a single wall carbon nanotube and the second nanotube has the chirality (n,9) where n=0 to 20.

Item A3407. The composite material of items A20 or B15 where one nanotube is a single wall carbon nanotube and the second nanotube has the chirality (n,10) where n=0 to 20.

Item A3408. The composite material of items A20 or B15 where one nanotube is a single wall carbon nanotube and the second nanotube has the chirality (n,11) where n=0 to 20.

Item A3409. The composite material of items A20 or B15 where one nanotube is a single wall carbon nanotube and the second nanotube has the chirality (n,12) where n=0 to 20.

Item A3410. The composite material of items A20 or B15 where one nanotube is a single wall carbon nanotube and the second nanotube has the chirality (n,13) where n=0 to 20.

Item A3411. The composite material of items A20 or B15 where one nanotube is a single wall carbon nanotube and the second nanotube has the chirality (n,14) where n=0 to 20.

Item A3412. The composite material of items A20 or B15 where one nanotube is a single wall carbon nanotube and the second nanotube has the chirality (n,15) where n=0 to 20.

Item A3413. The composite material of items A20 or B15 where one nanotube is a single wall carbon nanotube and the second nanotube has the chirality (n,16) where n=0 to 20.

Item A3414. The composite material of items A20 or B15 where one nanotube is a single wall carbon nanotube and the second nanotube has the chirality (n,17) where n=0 to 20.

Item A3415. The composite material of items A20 or B15 where one nanotube is a single wall carbon nanotube and the second nanotube has the chirality (n,18) where n=0 to 20.

Item A3416. The composite material of items A20 or B15 where one nanotube is a single wall carbon nanotube and the second nanotube has the chirality (n,19) where n=0 to 20.

Item A3417. The composite material of items A20 or B15 where one nanotube is a single wall carbon nanotube and the second nanotube has the chirality (n,20) where n=0 to 20.

Item A3418. The composite material of items A20 or B15 where one nanotube is a single wall carbon nanotube and the second nanotube has the chirality (0,n) where n=0 to 20.

Item A3419. The composite material of items A20 or B15 where one nanotube is a single wall carbon nanotube and the second nanotube has the chirality (1,n) where n=0 to 20.

Item A3420. The composite material of items A20 or B15 where one nanotube is a single wall carbon nanotube and the second nanotube has the chirality (2,n) where n=0 to 20.

Item A3421. The composite material of items A20 or B15 where one nanotube is a single wall carbon nanotube and the second nanotube has the chirality (3,n) where n=0 to 20.

Item A3422. The composite material of items A20 or B15 where one nanotube is a single wall carbon nanotube and the second nanotube has the chirality (4,n) where n=0 to 20.

Item A3423. The composite material of items A20 or B15 where one nanotube is a single wall carbon nanotube and the second nanotube has the chirality (5,n) where n=0 to 20.

Item A3424. The composite material of items A20 or B15 where one nanotube is a single wall carbon nanotube and the second nanotube has the chirality (6,n) where n=0 to 20.

Item A3425. The composite material of items A20 or B15 where one nanotube is a single wall carbon nanotube and the second nanotube has the chirality (7,n) where n=0 to 20.

Item A3426. The composite material of items A20 or B15 where one nanotube is a single wall carbon nanotube and the second nanotube has the chirality (8,n) where n=0 to 20.

Item A3427. The composite material of items A20 or B15 where one nanotube is a single wall carbon nanotube and the second nanotube has the chirality (9,n) where n=0 to 20.

Item A3428. The composite material of items A20 or B15 where one nanotube is a single wall carbon nanotube and the second nanotube has the chirality (10,n) where n=0 to 20.

Item A3429. The composite material of items A20 or B15 where one nanotube is a single wall carbon nanotube and the second nanotube has the chirality (11,n) where n=0 to 20.

Item A3430. The composite material of items A20 or B15 where one nanotube is a single wall carbon nanotube and the second nanotube has the chirality (12,n) where n=0 to 20.

Item A3431. The composite material of items A20 or B15 where one nanotube is a single wall carbon nanotube and the second nanotube has the chirality (13,n) where n=0 to 20.

Item A3432. The composite material of items A20 or B15 where one nanotube is a single wall carbon nanotube and the second nanotube has the chirality (14,n) where n=0 to 20.

Item A3433. The composite material of items A20 or B15 where one nanotube is a single wall carbon nanotube and the second nanotube has the chirality (15,n) where n=0 to 20.

Item A3434. The composite material of items A20 or B15 where one nanotube is a single wall carbon nanotube and the second nanotube has the chirality (16,n) where n=0 to 20.

Item A3435. The composite material of items A20 or B15 where one nanotube is a single wall carbon nanotube and the second nanotube has the chirality (17,n) where n=0 to 20.

Item A3436. The composite material of items A20 or B15 where one nanotube is a single wall carbon nanotube and the second nanotube has the chirality (18,n) where n=0 to 20.

Item A3437. The composite material of items A20 or B15 where one nanotube is a single wall carbon nanotube and the second nanotube has the chirality (19,n) where n=0 to 20.

Item A3438. The composite material of items A20 or B15 where one nanotube is a single wall carbon nanotube and the second nanotube has the chirality (20,n) where n=0 to 20.

Item A3439. The composite material of items A20 or B15 where one nanotube is a single wall carbon nanotube and the second nanotube has a percentage of sp2 bonds of more than 90%, such as more than 95%, such as more than 96%, such as more than 97%, such as more than 98%, such as more than 99%, such as more than 99%.

Item A3440. The composite material of items A20 or B15 where one nanotube is a single wall carbon nanotube and the second nanotube has a percentage of sp2 bonds of less than 100%, such as less than 99%, such as less than 98%, such as less than 97%, such as less than 96%, such as less than 95%.

Item A3441. The composite material of items A20 or B15 where one nanotube is a single wall carbon nanotube and the second nanotube has a percentage of sp2 bonds of from 95%-96%, from 96% to 97%, from 97% to 98%, from 98% to 99%, from 99% to 100%.

Item A3442. The composite material of items A20 or B15 where one nanotube is a single wall carbon nanotube and the second nanotube has a percentage of carbon atoms of more than 90%, such as more than 95%, such as more than 96%, such as more than 97%, such as more than 98%, such as more than 99%, such as more than 99%.

Item A3443. The composite material of items A20 or B15 where one nanotube is a single wall carbon nanotube and the second nanotube has a percentage of carbon atoms of less than 100%, such as less than 99%, such as less than 98%, such as less than 97%, such as less than 96%, such as less than 95%.

Item A3444. The composite material of items A20 or B15 where one nanotube is a single wall carbon nanotube and the second nanotube has a percentage of carbon atoms of from 95%-96%, from 96% to 97%, from 97% to 98%, from 98% to 99%, from 99% to 100%.

Item A3445. The composite material of items A20 or B15 where one nanotube is a single wall carbon nanotube and the second nanotube has a percentage of functionalization of less than 10%, such as less than 5%, such as less than 4%, such as less than 3%, such as less than 2%, such as less than 1%.

Item A3446. The composite material of items A20 or B15 where one nanotube is a single wall carbon nanotube and the second nanotube has a percentage of functionalization of more than 0%, such as more than 1%, such as more than 2%, such as more than 3%, such as more than 4%, such as more than 5%, such as more than 10%.

Item A3447. The composite material of items A20 or B15 where one nanotube is a single wall carbon nanotube and the second nanotube has a percentage of functionalization of from 0% to 1%, from 1% to 2%, from 2% to 3%, from 3% to 4%, from 4% to 5%, from 5% to 10%.

Item A3448. The composite material of items A20 or B15 where one nanotube is a single wall carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3449. The composite material of items A20 or B15 where one nanotube is a single wall carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3450. The composite material of items A20 or B15 where one nanotube is a single wall carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3451. The composite material of items A20 or B15 where one nanotube is a single wall carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3452. The composite material of items A20 or B15 where one nanotube is a single wall carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3453. The composite material of items A20 or B15 where one nanotube is a single wall carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3454. The composite material of items A20 or B15 where one nanotube is a multi wall carbon nanotube and the second nanotube is a carbon nanotube.

Item A3455. The composite material of items A20 or B15 where one nanotube is a multi wall carbon nanotube and the second nanotube is a single wall carbon nanotube.

Item A3456. The composite material of items A20 or B15 where one nanotube is a multi wall carbon nanotube and the second nanotube is a multi wall carbon nanotube.

Item A3457. The composite material of items A20 or B15 where one nanotube is a multi wall carbon nanotube and the second nanotube is a metallic carbon nanotube.

Item A3458. The composite material of items A20 or B15 where one nanotube is a multi wall carbon nanotube and the second nanotube is a semiconductive carbon nanotube.

Item A3459. The composite material of items A20 or B15 where one nanotube is a multi wall carbon nanotube and the second nanotube is a aluminium nanotube.

Item A3460. The composite material of items A20 or B15 where one nanotube is a multi wall carbon nanotube and the second nanotube is a aluminum nitride nanotube (AlNNT).

Item A3461. The composite material of items A20 or B15 where one nanotube is a multi wall carbon nanotube and the second nanotube is a aluminum phosphide nanotube (AlPNT).

Item A3462. The composite material of items A20 or B15 where one nanotube is a multi wall carbon nanotube and the second nanotube is a bismuth nanotube.

Item A3463. The composite material of items A20 or B15 where one nanotube is a multi wall carbon nanotube and the second nanotube is a bismuth selenide nanotube.

Item A3464. The composite material of items A20 or B15 where one nanotube is a multi wall carbon nanotube and the second nanotube is a boron carbon nanotubes (BCNNT).

Item A3465. The composite material of items A20 or B15 where one nanotube is a multi wall carbon nanotube and the second nanotube is a boron nitride nanotube.

Item A3466. The composite material of items A20 or B15 where one nanotube is a multi wall carbon nanotube and the second nanotube is a cadmium selenide nanotube.

Item A3467. The composite material of items A20 or B15 where one nanotube is a multi wall carbon nanotube and the second nanotube is a cobalt selenide nanotube.

Item A3468. The composite material of items A20 or B15 where one nanotube is a multi wall carbon nanotube and the second nanotube is a copper nanotube.

Item A3469. The composite material of items A20 or B15 where one nanotube is a multi wall carbon nanotube and the second nanotube is a DNA nanotube.

Item A3470. The composite material of items A20 or B15 where one nanotube is a multi wall carbon nanotube and the second nanotube is a gallium nitride nanotube (GaNNT).

Item A3471. The composite material of items A20 or B15 where one nanotube is a multi wall carbon nanotube and the second nanotube is a gallium phosphide nanotube (GaPNT).

Item A3472. The composite material of items A20 or B15 where one nanotube is a multi wall carbon nanotube and the second nanotube is a gold nanotube.

Item A3473. The composite material of items A20 or B15 where one nanotube is a multi wall carbon nanotube and the second nanotube is a halide nanotube.

Item A3474. The composite material of items A20 or B15 where one nanotube is a multi wall carbon nanotube and the second nanotube is a niobium selenide nanotube.

Item A3475. The composite material of items A20 or B15 where one nanotube is a multi wall carbon nanotube and the second nanotube is a molybdenum disulfide nanotube.

Item A3476. The composite material of items A20 or B15 where one nanotube is a multi wall carbon nanotube and the second nanotube is a nanotube of transition metal oxides.

Item A3477. The composite material of items A20 or B15 where one nanotube is a multi wall carbon nanotube and the second nanotube is a nickel chloride nanotube.

Item A3478. The composite material of items A20 or B15 where one nanotube is a multi wall carbon nanotube and the second nanotube is a platinum nanotube.

Item A3479. The composite material of items A20 or B15 where one nanotube is a multi wall carbon nanotube and the second nanotube is a protein nanotube.

Item A3480. The composite material of items A20 or B15 where one nanotube is a multi wall carbon nanotube and the second nanotube is a RNA nanotube.

Item A3481. The composite material of items A20 or B15 where one nanotube is a multi wall carbon nanotube and the second nanotube is a selenide nanotube.

Item A3482. The composite material of items A20 or B15 where one nanotube is a multi wall carbon nanotube and the second nanotube is a silicon nanotube.

Item A3483. The composite material of items A20 or B15 where one nanotube is a multi wall carbon nanotube and the second nanotube is a silver nanotube.

Item A3484. The composite material of items A20 or B15 where one nanotube is a multi wall carbon nanotube and the second nanotube is a sulphide nanotube.

Item A3485. The composite material of items A20 or B15 where one nanotube is a multi wall carbon nanotube and the second nanotube is a tin disulfide nanotube.

Item A3486. The composite material of items A20 or B15 where one nanotube is a multi wall carbon nanotube and the second nanotube is a titanium dioxide nanotube.

Item A3487. The composite material of items A20 or B15 where one nanotube is a multi wall carbon nanotube and the second nanotube is a titanium oxide nanotube.

Item A3488. The composite material of items A20 or B15 where one nanotube is a multi wall carbon nanotube and the second nanotube is a tungsten disulfide nanotube.

Item A3489. The composite material of items A20 or B15 where one nanotube is a multi wall carbon nanotube and the second nanotube is a tungsten sulfide nanotube.

Item A3490. The composite material of items A20 or B15 where one nanotube is a multi wall carbon nanotube and the second nanotube is a wolfram disulphide nanotube.

Item A3491. The composite material of items A20 or B15 where one nanotube is a multi wall carbon nanotube and the second nanotube is a zinc ferrite nanotube.

Item A3492. The composite material of items A20 or B15 where one nanotube is a multi wall carbon nanotube and the second nanotube is a zinc oxide nanotube.

Item A3493. The composite material of items A20 or B15 where one nanotube is a multi wall carbon nanotube and the second nanotube is a zirconia dioxide nanotube.

Item A3494. The composite material of items A20 or B15 where one nanotube is a multi wall carbon nanotube and the second nanotube is a nanofiber.

Item A3495. The composite material of items A20 or B15 where one nanotube is a multi wall carbon nanotube and the second nanotube is a nanothread.

Item A3496. The composite material of items A20 or B15 where one nanotube is a multi wall carbon nanotube and the second nanotube is a nanorod.

Item A3497. The composite material of items A20 or B15 where one nanotube is a multi wall carbon nanotube and the second nanotube is a nanoball.

Item A3498. The composite material of items A20 or B15 where one nanotube is a multi wall carbon nanotube and the second nanotube is a nanobud.

Item A3499. The composite material of items A20 or B15 where one nanotube is a multi wall carbon nanotube and the second nanotube is a buckyball.

Item A3500. The composite material of items A20 or B15 where one nanotube is a multi wall carbon nanotube and the second nanotube is a multi wall nanotube.

Item A3501. The composite material of items A20 or B15 where one nanotube is a multi wall carbon nanotube and the second nanotube is a single wall nanotube.

Item A3502. The composite material of items A20 or B15 where one nanotube is a multi wall carbon nanotube and the second nanotube has the chirality (n,0) where n=0 to 20.

Item A3503. The composite material of items A20 or B15 where one nanotube is a multi wall carbon nanotube and the second nanotube has the chirality (n,1) where n=0 to 20.

Item A3504. The composite material of items A20 or B15 where one nanotube is a multi wall carbon nanotube and the second nanotube has the chirality (n,2) where n=0 to 20.

Item A3505. The composite material of items A20 or B15 where one nanotube is a multi wall carbon nanotube and the second nanotube has the chirality (n,3) where n=0 to 20.

Item A3506. The composite material of items A20 or B15 where one nanotube is a multi wall carbon nanotube and the second nanotube has the chirality (n,4) where n=0 to 20.

Item A3507. The composite material of items A20 or B15 where one nanotube is a multi wall carbon nanotube and the second nanotube has the chirality (n,5) where n=0 to 20.

Item A3508. The composite material of items A20 or B15 where one nanotube is a multi wall carbon nanotube and the second nanotube has the chirality (n,6) where n=0 to 20.

Item A3509. The composite material of items A20 or B15 where one nanotube is a multi wall carbon nanotube and the second nanotube has the chirality (n,7) where n=0 to 20.

Item A3510. The composite material of items A20 or B15 where one nanotube is a multi wall carbon nanotube and the second nanotube has the chirality (n,8) where n=0 to 20.

Item A3511. The composite material of items A20 or B15 where one nanotube is a multi wall carbon nanotube and the second nanotube has the chirality (n,9) where n=0 to 20.

Item A3512. The composite material of items A20 or B15 where one nanotube is a multi wall carbon nanotube and the second nanotube has the chirality (n,10) where n=0 to 20.

Item A3513. The composite material of items A20 or B15 where one nanotube is a multi wall carbon nanotube and the second nanotube has the chirality (n,11) where n=0 to 20.

Item A3514. The composite material of items A20 or B15 where one nanotube is a multi wall carbon nanotube and the second nanotube has the chirality (n,12) where n=0 to 20.

Item A3515. The composite material of items A20 or B15 where one nanotube is a multi wall carbon nanotube and the second nanotube has the chirality (n,13) where n=0 to 20.

Item A3516. The composite material of items A20 or B15 where one nanotube is a multi wall carbon nanotube and the second nanotube has the chirality (n,14) where n=0 to 20.

Item A3517. The composite material of items A20 or B15 where one nanotube is a multi wall carbon nanotube and the second nanotube has the chirality (n,15) where n=0 to 20.

Item A3518. The composite material of items A20 or B15 where one nanotube is a multi wall carbon nanotube and the second nanotube has the chirality (n,16) where n=0 to 20.

Item A3519. The composite material of items A20 or B15 where one nanotube is a multi wall carbon nanotube and the second nanotube has the chirality (n,17) where n=0 to 20.

Item A3520. The composite material of items A20 or B15 where one nanotube is a multi wall carbon nanotube and the second nanotube has the chirality (n,18) where n=0 to 20.

Item A3521. The composite material of items A20 or B15 where one nanotube is a multi wall carbon nanotube and the second nanotube has the chirality (n,19) where n=0 to 20.

Item A3522. The composite material of items A20 or B15 where one nanotube is a multi wall carbon nanotube and the second nanotube has the chirality (n,20) where n=0 to 20.

Item A3523. The composite material of items A20 or B15 where one nanotube is a multi wall carbon nanotube and the second nanotube has the chirality (0,n) where n=0 to 20.

Item A3524. The composite material of items A20 or B15 where one nanotube is a multi wall carbon nanotube and the second nanotube has the chirality (1,n) where n=0 to 20.

Item A3525. The composite material of items A20 or B15 where one nanotube is a multi wall carbon nanotube and the second nanotube has the chirality (2,n) where n=0 to 20.

Item A3526. The composite material of items A20 or B15 where one nanotube is a multi wall carbon nanotube and the second nanotube has the chirality (3,n) where n=0 to 20.

Item A3527. The composite material of items A20 or B15 where one nanotube is a multi wall carbon nanotube and the second nanotube has the chirality (4,n) where n=0 to 20.

Item A3528. The composite material of items A20 or B15 where one nanotube is a multi wall carbon nanotube and the second nanotube has the chirality (5,n) where n=0 to 20.

Item A3529. The composite material of items A20 or B15 where one nanotube is a multi wall carbon nanotube and the second nanotube has the chirality (6,n) where n=0 to 20.

Item A3530. The composite material of items A20 or B15 where one nanotube is a multi wall carbon nanotube and the second nanotube has the chirality (7,n) where n=0 to 20.

Item A3531. The composite material of items A20 or B15 where one nanotube is a multi wall carbon nanotube and the second nanotube has the chirality (8,n) where n=0 to 20.

Item A3532. The composite material of items A20 or B15 where one nanotube is a multi wall carbon nanotube and the second nanotube has the chirality (9,n) where n=0 to 20.

Item A3533. The composite material of items A20 or B15 where one nanotube is a multi wall carbon nanotube and the second nanotube has the chirality (10,n) where n=0 to 20.

Item A3534. The composite material of items A20 or B15 where one nanotube is a multi wall carbon nanotube and the second nanotube has the chirality (11,n) where n=0 to 20.

Item A3535. The composite material of items A20 or B15 where one nanotube is a multi wall carbon nanotube and the second nanotube has the chirality (12,n) where n=0 to 20.

Item A3536. The composite material of items A20 or B15 where one nanotube is a multi wall carbon nanotube and the second nanotube has the chirality (13,n) where n=0 to 20.

Item A3537. The composite material of items A20 or B15 where one nanotube is a multi wall carbon nanotube and the second nanotube has the chirality (14,n) where n=0 to 20.

Item A3538. The composite material of items A20 or B15 where one nanotube is a multi wall carbon nanotube and the second nanotube has the chirality (15,n) where n=0 to 20.

Item A3539. The composite material of items A20 or B15 where one nanotube is a multi wall carbon nanotube and the second nanotube has the chirality (16,n) where n=0 to 20.

Item A3540. The composite material of items A20 or B15 where one nanotube is a multi wall carbon nanotube and the second nanotube has the chirality (17,n) where n=0 to 20.

Item A3541. The composite material of items A20 or B15 where one nanotube is a multi wall carbon nanotube and the second nanotube has the chirality (18,n) where n=0 to 20.

Item A3542. The composite material of items A20 or B15 where one nanotube is a multi wall carbon nanotube and the second nanotube has the chirality (19,n) where n=0 to 20.

Item A3543. The composite material of items A20 or B15 where one nanotube is a multi wall carbon nanotube and the second nanotube has the chirality (20,n) where n=0 to 20.

Item A3544. The composite material of items A20 or B15 where one nanotube is a multi wall carbon nanotube and the second nanotube has a percentage of sp2 bonds of more than 90%, such as more than 95%, such as more than 96%, such as more than 97%, such as more than 98%, such as more than 99%, such as more than 99%.

Item A3545. The composite material of items A20 or B15 where one nanotube is a multi wall carbon nanotube and the second nanotube has a percentage of sp2 bonds of less than 100%, such as less than 99%, such as less than 98%, such as less than 97%, such as less than 96%, such as less than 95%.

Item A3546. The composite material of items A20 or B15 where one nanotube is a multi wall carbon nanotube and the second nanotube has a percentage of sp2 bonds of from 95%-96%, from 96% to 97%, from 97% to 98%, from 98% to 99%, from 99% to 100%.

Item A3547. The composite material of items A20 or B15 where one nanotube is a multi wall carbon nanotube and the second nanotube has a percentage of carbon atoms of more than 90%, such as more than 95%, such as more than 96%, such as more than 97%, such as more than 98%, such as more than 99%, such as more than 99%.

Item A3548. The composite material of items A20 or B15 where one nanotube is a multi wall carbon nanotube and the second nanotube has a percentage of carbon atoms of less than 100%, such as less than 99%, such as less than 98%, such as less than 97%, such as less than 96%, such as less than 95%.

Item A3549. The composite material of items A20 or B15 where one nanotube is a multi wall carbon nanotube and the second nanotube has a percentage of carbon atoms of from 95%-96%, from 96% to 97%, from 97% to 98%, from 98% to 99%, from 99% to 100%.

Item A3550. The composite material of items A20 or B15 where one nanotube is a multi wall carbon nanotube and the second nanotube has a percentage of functionalization of less than 10%, such as less than 5%, such as less than 4%, such as less than 3%, such as less than 2%, such as less than 1%.

Item A3551. The composite material of items A20 or B15 where one nanotube is a multi wall carbon nanotube and the second nanotube has a percentage of functionalization of more than 0%, such as more than 1%, such as more than 2%, such as more than 3%, such as more than 4%, such as more than 5%, such as more than 10%.

Item A3552. The composite material of items A20 or B15 where one nanotube is a multi wall carbon nanotube and the second nanotube has a percentage of functionalization of from 0% to 1%, from 1% to 2%, from 2% to 3%, from 3% to 4%, from 4% to 5%, from 5% to 10%.

Item A3553. The composite material of items A20 or B15 where one nanotube is a multi wall carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3554. The composite material of items A20 or B15 where one nanotube is a multi wall carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3555. The composite material of items A20 or B15 where one nanotube is a multi wall carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3556. The composite material of items A20 or B15 where one nanotube is a multi wall carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3557. The composite material of items A20 or B15 where one nanotube is a multi wall carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3558. The composite material of items A20 or B15 where one nanotube is a multi wall carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3559. The composite material of items A20 or B15 where one nanotube is a metallic carbon nanotube and the second nanotube is a carbon nanotube.

Item A3560. The composite material of items A20 or B15 where one nanotube is a metallic carbon nanotube and the second nanotube is a single wall carbon nanotube.

Item A3561. The composite material of items A20 or B15 where one nanotube is a metallic carbon nanotube and the second nanotube is a multi wall carbon nanotube.

Item A3562. The composite material of items A20 or B15 where one nanotube is a metallic carbon nanotube and the second nanotube is a metallic carbon nanotube.

Item A3563. The composite material of items A20 or B15 where one nanotube is a metallic carbon nanotube and the second nanotube is a semiconductive carbon nanotube.

Item A3564. The composite material of items A20 or B15 where one nanotube is a metallic carbon nanotube and the second nanotube is a aluminium nanotube.

Item A3565. The composite material of items A20 or B15 where one nanotube is a metallic carbon nanotube and the second nanotube is a aluminum nitride nanotube (AlNNT).

Item A3566. The composite material of items A20 or B15 where one nanotube is a metallic carbon nanotube and the second nanotube is a aluminum phosphide nanotube (AlPNT).

Item A3567. The composite material of items A20 or B15 where one nanotube is a metallic carbon nanotube and the second nanotube is a bismuth nanotube.

Item A3568. The composite material of items A20 or B15 where one nanotube is a metallic carbon nanotube and the second nanotube is a bismuth selenide nanotube.

Item A3569. The composite material of items A20 or B15 where one nanotube is a metallic carbon nanotube and the second nanotube is a boron carbon nanotubes (BCNNT).

Item A3570. The composite material of items A20 or B15 where one nanotube is a metallic carbon nanotube and the second nanotube is a boron nitride nanotube.

Item A3571. The composite material of items A20 or B15 where one nanotube is a metallic carbon nanotube and the second nanotube is a cadmium selenide nanotube.

Item A3572. The composite material of items A20 or B15 where one nanotube is a metallic carbon nanotube and the second nanotube is a cobalt selenide nanotube.

Item A3573. The composite material of items A20 or B15 where one nanotube is a metallic carbon nanotube and the second nanotube is a copper nanotube.

Item A3574. The composite material of items A20 or B15 where one nanotube is a metallic carbon nanotube and the second nanotube is a DNA nanotube.

Item A3575. The composite material of items A20 or B15 where one nanotube is a metallic carbon nanotube and the second nanotube is a gallium nitride nanotube (GaNNT).

Item A3576. The composite material of items A20 or B15 where one nanotube is a metallic carbon nanotube and the second nanotube is a gallium phosphide nanotube (GaPNT).

Item A3577. The composite material of items A20 or B15 where one nanotube is a metallic carbon nanotube and the second nanotube is a gold nanotube.

Item A3578. The composite material of items A20 or B15 where one nanotube is a metallic carbon nanotube and the second nanotube is a halide nanotube.

Item A3579. The composite material of items A20 or B15 where one nanotube is a metallic carbon nanotube and the second nanotube is a niobium selenide nanotube.

Item A3580. The composite material of items A20 or B15 where one nanotube is a metallic carbon nanotube and the second nanotube is a molybdenum disulfide nanotube.

Item A3581. The composite material of items A20 or B15 where one nanotube is a metallic carbon nanotube and the second nanotube is a nanotube of transition metal oxides.

Item A3582. The composite material of items A20 or B15 where one nanotube is a metallic carbon nanotube and the second nanotube is a nickel chloride nanotube.

Item A3583. The composite material of items A20 or B15 where one nanotube is a metallic carbon nanotube and the second nanotube is a platinum nanotube.

Item A3584. The composite material of items A20 or B15 where one nanotube is a metallic carbon nanotube and the second nanotube is a protein nanotube.

Item A3585. The composite material of items A20 or B15 where one nanotube is a metallic carbon nanotube and the second nanotube is a RNA nanotube.

Item A3586. The composite material of items A20 or B15 where one nanotube is a metallic carbon nanotube and the second nanotube is a selenide nanotube.

Item A3587. The composite material of items A20 or B15 where one nanotube is a metallic carbon nanotube and the second nanotube is a silicon nanotube.

Item A3588. The composite material of items A20 or B15 where one nanotube is a metallic carbon nanotube and the second nanotube is a silver nanotube.

Item A3589. The composite material of items A20 or B15 where one nanotube is a metallic carbon nanotube and the second nanotube is a sulphide nanotube.

Item A3590. The composite material of items A20 or B15 where one nanotube is a metallic carbon nanotube and the second nanotube is a tin disulfide nanotube.

Item A3591. The composite material of items A20 or B15 where one nanotube is a metallic carbon nanotube and the second nanotube is a titanium dioxide nanotube.

Item A3592. The composite material of items A20 or B15 where one nanotube is a metallic carbon nanotube and the second nanotube is a titanium oxide nanotube.

Item A3593. The composite material of items A20 or B15 where one nanotube is a metallic carbon nanotube and the second nanotube is a tungsten disulfide nanotube.

Item A3594. The composite material of items A20 or B15 where one nanotube is a metallic carbon nanotube and the second nanotube is a tungsten sulfide nanotube.

Item A3595. The composite material of items A20 or B15 where one nanotube is a metallic carbon nanotube and the second nanotube is a wolfram disulphide nanotube.

Item A3596. The composite material of items A20 or B15 where one nanotube is a metallic carbon nanotube and the second nanotube is a zinc ferrite nanotube.

Item A3597. The composite material of items A20 or B15 where one nanotube is a metallic carbon nanotube and the second nanotube is a zinc oxide nanotube.

Item A3598. The composite material of items A20 or B15 where one nanotube is a metallic carbon nanotube and the second nanotube is a zirconia dioxide nanotube.

Item A3599. The composite material of items A20 or B15 where one nanotube is a metallic carbon nanotube and the second nanotube is a nanofiber.

Item A3600. The composite material of items A20 or B15 where one nanotube is a metallic carbon nanotube and the second nanotube is a nanothread.

Item A3601. The composite material of items A20 or B15 where one nanotube is a metallic carbon nanotube and the second nanotube is a nanorod.

Item A3602. The composite material of items A20 or B15 where one nanotube is a metallic carbon nanotube and the second nanotube is a nanoball.

Item A3603. The composite material of items A20 or B15 where one nanotube is a metallic carbon nanotube and the second nanotube is a nanobud.

Item A3604. The composite material of items A20 or B15 where one nanotube is a metallic carbon nanotube and the second nanotube is a buckyball.

Item A3605. The composite material of items A20 or B15 where one nanotube is a metallic carbon nanotube and the second nanotube is a multi wall nanotube.

Item A3606. The composite material of items A20 or B15 where one nanotube is a metallic carbon nanotube and the second nanotube is a single wall nanotube.

Item A3607. The composite material of items A20 or B15 where one nanotube is a metallic carbon nanotube and the second nanotube has the chirality (n,0) where n=0 to 20.

Item A3608. The composite material of items A20 or B15 where one nanotube is a metallic carbon nanotube and the second nanotube has the chirality (n,1) where n=0 to 20.

Item A3609. The composite material of items A20 or B15 where one nanotube is a metallic carbon nanotube and the second nanotube has the chirality (n,2) where n=0 to 20.

Item A3610. The composite material of items A20 or B15 where one nanotube is a metallic carbon nanotube and the second nanotube has the chirality (n,3) where n=0 to 20.

Item A3611. The composite material of items A20 or B15 where one nanotube is a metallic carbon nanotube and the second nanotube has the chirality (n,4) where n=0 to 20.

Item A3612. The composite material of items A20 or B15 where one nanotube is a metallic carbon nanotube and the second nanotube has the chirality (n,5) where n=0 to 20.

Item A3613. The composite material of items A20 or B15 where one nanotube is a metallic carbon nanotube and the second nanotube has the chirality (n,6) where n=0 to 20.

Item A3614. The composite material of items A20 or B15 where one nanotube is a metallic carbon nanotube and the second nanotube has the chirality (n,7) where n=0 to 20.

Item A3615. The composite material of items A20 or B15 where one nanotube is a metallic carbon nanotube and the second nanotube has the chirality (n,8) where n=0 to 20.

Item A3616. The composite material of items A20 or B15 where one nanotube is a metallic carbon nanotube and the second nanotube has the chirality (n,9) where n=0 to 20.

Item A3617. The composite material of items A20 or B15 where one nanotube is a metallic carbon nanotube and the second nanotube has the chirality (n,10) where n=0 to 20.

Item A3618. The composite material of items A20 or B15 where one nanotube is a metallic carbon nanotube and the second nanotube has the chirality (n,11) where n=0 to 20.

Item A3619. The composite material of items A20 or B15 where one nanotube is a metallic carbon nanotube and the second nanotube has the chirality (n,12) where n=0 to 20.

Item A3620. The composite material of items A20 or B15 where one nanotube is a metallic carbon nanotube and the second nanotube has the chirality (n,13) where n=0 to 20.

Item A3621. The composite material of items A20 or B15 where one nanotube is a metallic carbon nanotube and the second nanotube has the chirality (n,14) where n=0 to 20.

Item A3622. The composite material of items A20 or B15 where one nanotube is a metallic carbon nanotube and the second nanotube has the chirality (n,15) where n=0 to 20.

Item A3623. The composite material of items A20 or B15 where one nanotube is a metallic carbon nanotube and the second nanotube has the chirality (n,16) where n=0 to 20.

Item A3624. The composite material of items A20 or B15 where one nanotube is a metallic carbon nanotube and the second nanotube has the chirality (n,17) where n=0 to 20.

Item A3625. The composite material of items A20 or B15 where one nanotube is a metallic carbon nanotube and the second nanotube has the chirality (n,18) where n=0 to 20.

Item A3626. The composite material of items A20 or B15 where one nanotube is a metallic carbon nanotube and the second nanotube has the chirality (n,19) where n=0 to 20.

Item A3627. The composite material of items A20 or B15 where one nanotube is a metallic carbon nanotube and the second nanotube has the chirality (n,20) where n=0 to 20.

Item A3628. The composite material of items A20 or B15 where one nanotube is a metallic carbon nanotube and the second nanotube has the chirality (0,n) where n=0 to 20.

Item A3629. The composite material of items A20 or B15 where one nanotube is a metallic carbon nanotube and the second nanotube has the chirality (1,n) where n=0 to 20.

Item A3630. The composite material of items A20 or B15 where one nanotube is a metallic carbon nanotube and the second nanotube has the chirality (2,n) where n=0 to 20.

Item A3631. The composite material of items A20 or B15 where one nanotube is a metallic carbon nanotube and the second nanotube has the chirality (3,n) where n=0 to 20.

Item A3632. The composite material of items A20 or B15 where one nanotube is a metallic carbon nanotube and the second nanotube has the chirality (4,n) where n=0 to 20.

Item A3633. The composite material of items A20 or B15 where one nanotube is a metallic carbon nanotube and the second nanotube has the chirality (5,n) where n=0 to 20.

Item A3634. The composite material of items A20 or B15 where one nanotube is a metallic carbon nanotube and the second nanotube has the chirality (6,n) where n=0 to 20.

Item A3635. The composite material of items A20 or B15 where one nanotube is a metallic carbon nanotube and the second nanotube has the chirality (7,n) where n=0 to 20.

Item A3636. The composite material of items A20 or B15 where one nanotube is a metallic carbon nanotube and the second nanotube has the chirality (8,n) where n=0 to 20.

Item A3637. The composite material of items A20 or B15 where one nanotube is a metallic carbon nanotube and the second nanotube has the chirality (9,n) where n=0 to 20.

Item A3638. The composite material of items A20 or B15 where one nanotube is a metallic carbon nanotube and the second nanotube has the chirality (10,n) where n=0 to 20.

Item A3639. The composite material of items A20 or B15 where one nanotube is a metallic carbon nanotube and the second nanotube has the chirality (11,n) where n=0 to 20.

Item A3640. The composite material of items A20 or B15 where one nanotube is a metallic carbon nanotube and the second nanotube has the chirality (12,n) where n=0 to 20.

Item A3641. The composite material of items A20 or B15 where one nanotube is a metallic carbon nanotube and the second nanotube has the chirality (13,n) where n=0 to 20.

Item A3642. The composite material of items A20 or B15 where one nanotube is a metallic carbon nanotube and the second nanotube has the chirality (14,n) where n=0 to 20.

Item A3643. The composite material of items A20 or B15 where one nanotube is a metallic carbon nanotube and the second nanotube has the chirality (15,n) where n=0 to 20.

Item A3644. The composite material of items A20 or B15 where one nanotube is a metallic carbon nanotube and the second nanotube has the chirality (16,n) where n=0 to 20.

Item A3645. The composite material of items A20 or B15 where one nanotube is a metallic carbon nanotube and the second nanotube has the chirality (17,n) where n=0 to 20.

Item A3646. The composite material of items A20 or B15 where one nanotube is a metallic carbon nanotube and the second nanotube has the chirality (18,n) where n=0 to 20.

Item A3647. The composite material of items A20 or B15 where one nanotube is a metallic carbon nanotube and the second nanotube has the chirality (19,n) where n=0 to 20.

Item A3648. The composite material of items A20 or B15 where one nanotube is a metallic carbon nanotube and the second nanotube has the chirality (20,n) where n=0 to 20.

Item A3649. The composite material of items A20 or B15 where one nanotube is a metallic carbon nanotube and the second nanotube has a percentage of sp2 bonds of more than 90%, such as more than 95%, such as more than 96%, such as more than 97%, such as more than 98%, such as more than 99%, such as more than 99%.

Item A3650. The composite material of items A20 or B15 where one nanotube is a metallic carbon nanotube and the second nanotube has a percentage of sp2 bonds of less than 100%, such as less than 99%, such as less than 98%, such as less than 97%, such as less than 96%, such as less than 95%.

Item A3651. The composite material of items A20 or B15 where one nanotube is a metallic carbon nanotube and the second nanotube has a percentage of sp2 bonds of from 95%-96%, from 96% to 97%, from 97% to 98%, from 98% to 99%, from 99% to 100%.

Item A3652. The composite material of items A20 or B15 where one nanotube is a metallic carbon nanotube and the second nanotube has a percentage of carbon atoms of more than 90%, such as more than 95%, such as more than 96%, such as more than 97%, such as more than 98%, such as more than 99%, such as more than 99%.

Item A3653. The composite material of items A20 or B15 where one nanotube is a metallic carbon nanotube and the second nanotube has a percentage of carbon atoms of less than 100%, such as less than 99%, such as less than 98%, such as less than 97%, such as less than 96%, such as less than 95%.

Item A3654. The composite material of items A20 or B15 where one nanotube is a metallic carbon nanotube and the second nanotube has a percentage of carbon atoms of from 95%-96%, from 96% to 97%, from 97% to 98%, from 98% to 99%, from 99% to 100%.

Item A3655. The composite material of items A20 or B15 where one nanotube is a metallic carbon nanotube and the second nanotube has a percentage of functionalization of less than 10%, such as less than 5%, such as less than 4%, such as less than 3%, such as less than 2%, such as less than 1%.

Item A3656. The composite material of items A20 or B15 where one nanotube is a metallic carbon nanotube and the second nanotube has a percentage of functionalization of more than 0%, such as more than 1%, such as more than 2%, such as more than 3%, such as more than 4%, such as more than 5%, such as more than 10%.

Item A3657. The composite material of items A20 or B15 where one nanotube is a metallic carbon nanotube and the second nanotube has a percentage of functionalization of from 0% to 1%, from 1% to 2%, from 2% to 3%, from 3% to 4%, from 4% to 5%, from 5% to 10%.

Item A3658. The composite material of items A20 or B15 where one nanotube is a metallic carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3659. The composite material of items A20 or B15 where one nanotube is a metallic carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3660. The composite material of items A20 or B15 where one nanotube is a metallic carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3661. The composite material of items A20 or B15 where one nanotube is a metallic carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3662. The composite material of items A20 or B15 where one nanotube is a metallic carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3663. The composite material of items A20 or B15 where one nanotube is a metallic carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3664. The composite material of items A20 or B15 where one nanotube is a semiconductive carbon nanotube and the second nanotube is a carbon nanotube.

Item A3665. The composite material of items A20 or B15 where one nanotube is a semiconductive carbon nanotube and the second nanotube is a single wall carbon nanotube.

Item A3666. The composite material of items A20 or B15 where one nanotube is a semiconductive carbon nanotube and the second nanotube is a multi wall carbon nanotube.

Item A3667. The composite material of items A20 or B15 where one nanotube is a semiconductive carbon nanotube and the second nanotube is a metallic carbon nanotube.

Item A3668. The composite material of items A20 or B15 where one nanotube is a semiconductive carbon nanotube and the second nanotube is a semiconductive carbon nanotube.

Item A3669. The composite material of items A20 or B15 where one nanotube is a semiconductive carbon nanotube and the second nanotube is a aluminium nanotube.

Item A3670. The composite material of items A20 or B15 where one nanotube is a semiconductive carbon nanotube and the second nanotube is a aluminum nitride nanotube (AlNNT).

Item A3671. The composite material of items A20 or B15 where one nanotube is a semiconductive carbon nanotube and the second nanotube is a aluminum phosphide nanotube (AlPNT).

Item A3672. The composite material of items A20 or B15 where one nanotube is a semiconductive carbon nanotube and the second nanotube is a bismuth nanotube.

Item A3673. The composite material of items A20 or B15 where one nanotube is a semiconductive carbon nanotube and the second nanotube is a bismuth selenide nanotube.

Item A3674. The composite material of items A20 or B15 where one nanotube is a semiconductive carbon nanotube and the second nanotube is a boron carbon nanotubes (BCNNT).

Item A3675. The composite material of items A20 or B15 where one nanotube is a semiconductive carbon nanotube and the second nanotube is a boron nitride nanotube.

Item A3676. The composite material of items A20 or B15 where one nanotube is a semiconductive carbon nanotube and the second nanotube is a cadmium selenide nanotube.

Item A3677. The composite material of items A20 or B15 where one nanotube is a semiconductive carbon nanotube and the second nanotube is a cobalt selenide nanotube.

Item A3678. The composite material of items A20 or B15 where one nanotube is a semiconductive carbon nanotube and the second nanotube is a copper nanotube.

Item A3679. The composite material of items A20 or B15 where one nanotube is a semiconductive carbon nanotube and the second nanotube is a DNA nanotube.

Item A3680. The composite material of items A20 or B15 where one nanotube is a semiconductive carbon nanotube and the second nanotube is a gallium nitride nanotube (GaNNT).

Item A3681. The composite material of items A20 or B15 where one nanotube is a semiconductive carbon nanotube and the second nanotube is a gallium phosphide nanotube (GaPNT).

Item A3682. The composite material of items A20 or B15 where one nanotube is a semiconductive carbon nanotube and the second nanotube is a gold nanotube.

Item A3683. The composite material of items A20 or B15 where one nanotube is a semiconductive carbon nanotube and the second nanotube is a halide nanotube.

Item A3684. The composite material of items A20 or B15 where one nanotube is a semiconductive carbon nanotube and the second nanotube is a niobium selenide nanotube.

Item A3685. The composite material of items A20 or B15 where one nanotube is a semiconductive carbon nanotube and the second nanotube is a molybdenum disulfide nanotube.

Item A3686. The composite material of items A20 or B15 where one nanotube is a semiconductive carbon nanotube and the second nanotube is a nanotube of transition metal oxides.

Item A3687. The composite material of items A20 or B15 where one nanotube is a semiconductive carbon nanotube and the second nanotube is a nickel chloride nanotube.

Item A3688. The composite material of items A20 or B15 where one nanotube is a semiconductive carbon nanotube and the second nanotube is a platinum nanotube.

Item A3689. The composite material of items A20 or B15 where one nanotube is a semiconductive carbon nanotube and the second nanotube is a protein nanotube.

Item A3690. The composite material of items A20 or B15 where one nanotube is a semiconductive carbon nanotube and the second nanotube is a RNA nanotube.

Item A3691. The composite material of items A20 or B15 where one nanotube is a semiconductive carbon nanotube and the second nanotube is a selenide nanotube.

Item A3692. The composite material of items A20 or B15 where one nanotube is a semiconductive carbon nanotube and the second nanotube is a silicon nanotube.

Item A3693. The composite material of items A20 or B15 where one nanotube is a semiconductive carbon nanotube and the second nanotube is a silver nanotube.

Item A3694. The composite material of items A20 or B15 where one nanotube is a semiconductive carbon nanotube and the second nanotube is a sulphide nanotube.

Item A3695. The composite material of items A20 or B15 where one nanotube is a semiconductive carbon nanotube and the second nanotube is a tin disulfide nanotube.

Item A3696. The composite material of items A20 or B15 where one nanotube is a semiconductive carbon nanotube and the second nanotube is a titanium dioxide nanotube.

Item A3697. The composite material of items A20 or B15 where one nanotube is a semiconductive carbon nanotube and the second nanotube is a titanium oxide nanotube.

Item A3698. The composite material of items A20 or B15 where one nanotube is a semiconductive carbon nanotube and the second nanotube is a tungsten disulfide nanotube.

Item A3699. The composite material of items A20 or B15 where one nanotube is a semiconductive carbon nanotube and the second nanotube is a tungsten sulfide nanotube.

Item A3700. The composite material of items A20 or B15 where one nanotube is a semiconductive carbon nanotube and the second nanotube is a wolfram disulphide nanotube.

Item A3701. The composite material of items A20 or B15 where one nanotube is a semiconductive carbon nanotube and the second nanotube is a zinc ferrite nanotube.

Item A3702. The composite material of items A20 or B15 where one nanotube is a semiconductive carbon nanotube and the second nanotube is a zinc oxide nanotube.

Item A3703. The composite material of items A20 or B15 where one nanotube is a semiconductive carbon nanotube and the second nanotube is a zirconia dioxide nanotube.

Item A3704. The composite material of items A20 or B15 where one nanotube is a semiconductive carbon nanotube and the second nanotube is a nanofiber.

Item A3705. The composite material of items A20 or B15 where one nanotube is a semiconductive carbon nanotube and the second nanotube is a nanothread.

Item A3706. The composite material of items A20 or B15 where one nanotube is a semiconductive carbon nanotube and the second nanotube is a nanorod.

Item A3707. The composite material of items A20 or B15 where one nanotube is a semiconductive carbon nanotube and the second nanotube is a nanoball.

Item A3708. The composite material of items A20 or B15 where one nanotube is a semiconductive carbon nanotube and the second nanotube is a nanobud.

Item A3709. The composite material of items A20 or B15 where one nanotube is a semiconductive carbon nanotube and the second nanotube is a buckyball.

Item A3710. The composite material of items A20 or B15 where one nanotube is a semiconductive carbon nanotube and the second nanotube is a multi wall nanotube.

Item A3711. The composite material of items A20 or B15 where one nanotube is a semiconductive carbon nanotube and the second nanotube is a single wall nanotube.

Item A3712. The composite material of items A20 or B15 where one nanotube is a semiconductive carbon nanotube and the second nanotube has the chirality (n,0) where n=0 to 20.

Item A3713. The composite material of items A20 or B15 where one nanotube is a semiconductive carbon nanotube and the second nanotube has the chirality (n,1) where n=0 to 20.

Item A3714. The composite material of items A20 or B15 where one nanotube is a semiconductive carbon nanotube and the second nanotube has the chirality (n,2) where n=0 to 20.

Item A3715. The composite material of items A20 or B15 where one nanotube is a semiconductive carbon nanotube and the second nanotube has the chirality (n,3) where n=0 to 20.

Item A3716. The composite material of items A20 or B15 where one nanotube is a semiconductive carbon nanotube and the second nanotube has the chirality (n,4) where n=0 to 20.

Item A3717. The composite material of items A20 or B15 where one nanotube is a semiconductive carbon nanotube and the second nanotube has the chirality (n,5) where n=0 to 20.

Item A3718. The composite material of items A20 or B15 where one nanotube is a semiconductive carbon nanotube and the second nanotube has the chirality (n,6) where n=0 to 20.

Item A3719. The composite material of items A20 or B15 where one nanotube is a semiconductive carbon nanotube and the second nanotube has the chirality (n,7) where n=0 to 20.

Item A3720. The composite material of items A20 or B15 where one nanotube is a semiconductive carbon nanotube and the second nanotube has the chirality (n,8) where n=0 to 20.

Item A3721. The composite material of items A20 or B15 where one nanotube is a semiconductive carbon nanotube and the second nanotube has the chirality (n,9) where n=0 to 20.

Item A3722. The composite material of items A20 or B15 where one nanotube is a semiconductive carbon nanotube and the second nanotube has the chirality (n,10) where n=0 to 20.

Item A3723. The composite material of items A20 or B15 where one nanotube is a semiconductive carbon nanotube and the second nanotube has the chirality (n,11) where n=0 to 20.

Item A3724. The composite material of items A20 or B15 where one nanotube is a semiconductive carbon nanotube and the second nanotube has the chirality (n,12) where n=0 to 20.

Item A3725. The composite material of items A20 or B15 where one nanotube is a semiconductive carbon nanotube and the second nanotube has the chirality (n,13) where n=0 to 20.

Item A3726. The composite material of items A20 or B15 where one nanotube is a semiconductive carbon nanotube and the second nanotube has the chirality (n,14) where n=0 to 20.

Item A3727. The composite material of items A20 or B15 where one nanotube is a semiconductive carbon nanotube and the second nanotube has the chirality (n,15) where n=0 to 20.

Item A3728. The composite material of items A20 or B15 where one nanotube is a semiconductive carbon nanotube and the second nanotube has the chirality (n,16) where n=0 to 20.

Item A3729. The composite material of items A20 or B15 where one nanotube is a semiconductive carbon nanotube and the second nanotube has the chirality (n,17) where n=0 to 20.

Item A3730. The composite material of items A20 or B15 where one nanotube is a semiconductive carbon nanotube and the second nanotube has the chirality (n,18) where n=0 to 20.

Item A3731. The composite material of items A20 or B15 where one nanotube is a semiconductive carbon nanotube and the second nanotube has the chirality (n,19) where n=0 to 20.

Item A3732. The composite material of items A20 or B15 where one nanotube is a semiconductive carbon nanotube and the second nanotube has the chirality (n,20) where n=0 to 20.

Item A3733. The composite material of items A20 or B15 where one nanotube is a semiconductive carbon nanotube and the second nanotube has the chirality (0,n) where n=0 to 20.

Item A3734. The composite material of items A20 or B15 where one nanotube is a semiconductive carbon nanotube and the second nanotube has the chirality (1,n) where n=0 to 20.

Item A3735. The composite material of items A20 or B15 where one nanotube is a semiconductive carbon nanotube and the second nanotube has the chirality (2,n) where n=0 to 20.

Item A3736. The composite material of items A20 or B15 where one nanotube is a semiconductive carbon nanotube and the second nanotube has the chirality (3,n) where n=0 to 20.

Item A3737. The composite material of items A20 or B15 where one nanotube is a semiconductive carbon nanotube and the second nanotube has the chirality (4,n) where n=0 to 20.

Item A3738. The composite material of items A20 or B15 where one nanotube is a semiconductive carbon nanotube and the second nanotube has the chirality (5,n) where n=0 to 20.

Item A3739. The composite material of items A20 or B15 where one nanotube is a semiconductive carbon nanotube and the second nanotube has the chirality (6,n) where n=0 to 20.

Item A3740. The composite material of items A20 or B15 where one nanotube is a semiconductive carbon nanotube and the second nanotube has the chirality (7,n) where n=0 to 20.

Item A3741. The composite material of items A20 or B15 where one nanotube is a semiconductive carbon nanotube and the second nanotube has the chirality (8,n) where n=0 to 20.

Item A3742. The composite material of items A20 or B15 where one nanotube is a semiconductive carbon nanotube and the second nanotube has the chirality (9,n) where n=0 to 20.

Item A3743. The composite material of items A20 or B15 where one nanotube is a semiconductive carbon nanotube and the second nanotube has the chirality (10,n) where n=0 to 20.

Item A3744. The composite material of items A20 or B15 where one nanotube is a semiconductive carbon nanotube and the second nanotube has the chirality (11,n) where n=0 to 20.

Item A3745. The composite material of items A20 or B15 where one nanotube is a semiconductive carbon nanotube and the second nanotube has the chirality (12,n) where n=0 to 20.

Item A3746. The composite material of items A20 or B15 where one nanotube is a semiconductive carbon nanotube and the second nanotube has the chirality (13,n) where n=0 to 20.

Item A3747. The composite material of items A20 or B15 where one nanotube is a semiconductive carbon nanotube and the second nanotube has the chirality (14,n) where n=0 to 20.

Item A3748. The composite material of items A20 or B15 where one nanotube is a semiconductive carbon nanotube and the second nanotube has the chirality (15,n) where n=0 to 20.

Item A3749. The composite material of items A20 or B15 where one nanotube is a semiconductive carbon nanotube and the second nanotube has the chirality (16,n) where n=0 to 20.

Item A3750. The composite material of items A20 or B15 where one nanotube is a semiconductive carbon nanotube and the second nanotube has the chirality (17,n) where n=0 to 20.

Item A3751. The composite material of items A20 or B15 where one nanotube is a semiconductive carbon nanotube and the second nanotube has the chirality (18,n) where n=0 to 20.

Item A3752. The composite material of items A20 or B15 where one nanotube is a semiconductive carbon nanotube and the second nanotube has the chirality (19,n) where n=0 to 20.

Item A3753. The composite material of items A20 or B15 where one nanotube is a semiconductive carbon nanotube and the second nanotube has the chirality (20,n) where n=0 to 20.

Item A3754. The composite material of items A20 or B15 where one nanotube is a semiconductive carbon nanotube and the second nanotube has a percentage of sp2 bonds of more than 90%, such as more than 95%, such as more than 96%, such as more than 97%, such as more than 98%, such as more than 99%, such as more than 99%.

Item A3755. The composite material of items A20 or B15 where one nanotube is a semiconductive carbon nanotube and the second nanotube has a percentage of sp2 bonds of less than 100%, such as less than 99%, such as less than 98%, such as less than 97%, such as less than 96%, such as less than 95%.

Item A3756. The composite material of items A20 or B15 where one nanotube is a semiconductive carbon nanotube and the second nanotube has a percentage of sp2 bonds of from 95%-96%, from 96% to 97%, from 97% to 98%, from 98% to 99%, from 99% to 100%.

Item A3757. The composite material of items A20 or B15 where one nanotube is a semiconductive carbon nanotube and the second nanotube has a percentage of carbon atoms of more than 90%, such as more than 95%, such as more than 96%, such as more than 97%, such as more than 98%, such as more than 99%, such as more than 99%.

Item A3758. The composite material of items A20 or B15 where one nanotube is a semiconductive carbon nanotube and the second nanotube has a percentage of carbon atoms of less than 100%, such as less than 99%, such as less than 98%, such as less than 97%, such as less than 96%, such as less than 95%.

Item A3759. The composite material of items A20 or B15 where one nanotube is a semiconductive carbon nanotube and the second nanotube has a percentage of carbon atoms of from 95%-96%, from 96% to 97%, from 97% to 98%, from 98% to 99%, from 99% to 100%.

Item A3760. The composite material of items A20 or B15 where one nanotube is a semiconductive carbon nanotube and the second nanotube has a percentage of functionalization of less than 10%, such as less than 5%, such as less than 4%, such as less than 3%, such as less than 2%, such as less than 1%.

Item A3761. The composite material of items A20 or B15 where one nanotube is a semiconductive carbon nanotube and the second nanotube has a percentage of functionalization of more than 0%, such as more than 1%, such as more than 2%, such as more than 3%, such as more than 4%, such as more than 5%, such as more than 10%.

Item A3762. The composite material of items A20 or B15 where one nanotube is a semiconductive carbon nanotube and the second nanotube has a percentage of functionalization of from 0% to 1%, from 1% to 2%, from 2% to 3%, from 3% to 4%, from 4% to 5%, from 5% to 10%.

Item A3763. The composite material of items A20 or B15 where one nanotube is a semiconductive carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3764. The composite material of items A20 or B15 where one nanotube is a semiconductive carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3765. The composite material of items A20 or B15 where one nanotube is a semiconductive carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3766. The composite material of items A20 or B15 where one nanotube is a semiconductive carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3767. The composite material of items A20 or B15 where one nanotube is a semiconductive carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3768. The composite material of items A20 or B15 where one nanotube is a semiconductive carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3769. The composite material of items A20 or B15 where one nanotube is a boron carbon nanotube and the second nanotube is a carbon nanotube.

Item A3770. The composite material of items A20 or B15 where one nanotube is a boron carbon nanotube and the second nanotube is a single wall carbon nanotube.

Item A3771. The composite material of items A20 or B15 where one nanotube is a boron carbon nanotube and the second nanotube is a multi wall carbon nanotube.

Item A3772. The composite material of items A20 or B15 where one nanotube is a boron carbon nanotube and the second nanotube is a metallic carbon nanotube.

Item A3773. The composite material of items A20 or B15 where one nanotube is a boron carbon nanotube and the second nanotube is a semiconductive carbon nanotube.

Item A3774. The composite material of items A20 or B15 where one nanotube is a boron carbon nanotube and the second nanotube is a aluminium nanotube.

Item A3775. The composite material of items A20 or B15 where one nanotube is a boron carbon nanotube and the second nanotube is a aluminum nitride nanotube (AlNNT).

Item A3776. The composite material of items A20 or B15 where one nanotube is a boron carbon nanotube and the second nanotube is a aluminum phosphide nanotube (AlPNT).

Item A3777. The composite material of items A20 or B15 where one nanotube is a boron carbon nanotube and the second nanotube is a bismuth nanotube.

Item A3778. The composite material of items A20 or B15 where one nanotube is a boron carbon nanotube and the second nanotube is a bismuth selenide nanotube.

Item A3779. The composite material of items A20 or B15 where one nanotube is a boron carbon nanotube and the second nanotube is a boron carbon nanotubes (BCNNT).

Item A3780. The composite material of items A20 or B15 where one nanotube is a boron carbon nanotube and the second nanotube is a boron nitride nanotube.

Item A3781. The composite material of items A20 or B15 where one nanotube is a boron carbon nanotube and the second nanotube is a cadmium selenide nanotube.

Item A3782. The composite material of items A20 or B15 where one nanotube is a boron carbon nanotube and the second nanotube is a cobalt selenide nanotube.

Item A3783. The composite material of items A20 or B15 where one nanotube is a boron carbon nanotube and the second nanotube is a copper nanotube.

Item A3784. The composite material of items A20 or B15 where one nanotube is a boron carbon nanotube and the second nanotube is a DNA nanotube.

Item A3785. The composite material of items A20 or B15 where one nanotube is a boron carbon nanotube and the second nanotube is a gallium nitride nanotube (GaNNT).

Item A3786. The composite material of items A20 or B15 where one nanotube is a boron carbon nanotube and the second nanotube is a gallium phosphide nanotube (GaPNT).

Item A3787. The composite material of items A20 or B15 where one nanotube is a boron carbon nanotube and the second nanotube is a gold nanotube.

Item A3788. The composite material of items A20 or B15 where one nanotube is a boron carbon nanotube and the second nanotube is a halide nanotube.

Item A3789. The composite material of items A20 or B15 where one nanotube is a boron carbon nanotube and the second nanotube is a niobium selenide nanotube.

Item A3790. The composite material of items A20 or B15 where one nanotube is a boron carbon nanotube and the second nanotube is a molybdenum disulfide nanotube.

Item A3791. The composite material of items A20 or B15 where one nanotube is a boron carbon nanotube and the second nanotube is a nanotube of transition metal oxides.

Item A3792. The composite material of items A20 or B15 where one nanotube is a boron carbon nanotube and the second nanotube is a nickel chloride nanotube.

Item A3793. The composite material of items A20 or B15 where one nanotube is a boron carbon nanotube and the second nanotube is a platinum nanotube.

Item A3794. The composite material of items A20 or B15 where one nanotube is a boron carbon nanotube and the second nanotube is a protein nanotube.

Item A3795. The composite material of items A20 or B15 where one nanotube is a boron carbon nanotube and the second nanotube is a RNA nanotube.

Item A3796. The composite material of items A20 or B15 where one nanotube is a boron carbon nanotube and the second nanotube is a selenide nanotube.

Item A3797. The composite material of items A20 or B15 where one nanotube is a boron carbon nanotube and the second nanotube is a silicon nanotube.

Item A3798. The composite material of items A20 or B15 where one nanotube is a boron carbon nanotube and the second nanotube is a silver nanotube.

Item A3799. The composite material of items A20 or B15 where one nanotube is a boron carbon nanotube and the second nanotube is a sulphide nanotube.

Item A3800. The composite material of items A20 or B15 where one nanotube is a boron carbon nanotube and the second nanotube is a tin disulfide nanotube.

Item A3801. The composite material of items A20 or B15 where one nanotube is a boron carbon nanotube and the second nanotube is a titanium dioxide nanotube.

Item A3802. The composite material of items A20 or B15 where one nanotube is a boron carbon nanotube and the second nanotube is a titanium oxide nanotube.

Item A3803. The composite material of items A20 or B15 where one nanotube is a boron carbon nanotube and the second nanotube is a tungsten disulfide nanotube.

Item A3804. The composite material of items A20 or B15 where one nanotube is a boron carbon nanotube and the second nanotube is a tungsten sulfide nanotube.

Item A3805. The composite material of items A20 or B15 where one nanotube is a boron carbon nanotube and the second nanotube is a wolfram disulphide nanotube.

Item A3806. The composite material of items A20 or B15 where one nanotube is a boron carbon nanotube and the second nanotube is a zinc ferrite nanotube.

Item A3807. The composite material of items A20 or B15 where one nanotube is a boron carbon nanotube and the second nanotube is a zinc oxide nanotube.

Item A3808. The composite material of items A20 or B15 where one nanotube is a boron carbon nanotube and the second nanotube is a zirconia dioxide nanotube.

Item A3809. The composite material of items A20 or B15 where one nanotube is a boron carbon nanotube and the second nanotube is a nanofiber.

Item A3810. The composite material of items A20 or B15 where one nanotube is a boron carbon nanotube and the second nanotube is a nanothread.

Item A3811. The composite material of items A20 or B15 where one nanotube is a boron carbon nanotube and the second nanotube is a nanorod.

Item A3812. The composite material of items A20 or B15 where one nanotube is a boron carbon nanotube and the second nanotube is a nanoball.

Item A3813. The composite material of items A20 or B15 where one nanotube is a boron carbon nanotube and the second nanotube is a nanobud.

Item A3814. The composite material of items A20 or B15 where one nanotube is a boron carbon nanotube and the second nanotube is a buckyball.

Item A3815. The composite material of items A20 or B15 where one nanotube is a boron carbon nanotube and the second nanotube is a multi wall nanotube.

Item A3816. The composite material of items A20 or B15 where one nanotube is a boron carbon nanotube and the second nanotube is a single wall nanotube.

Item A3817. The composite material of items A20 or B15 where one nanotube is a boron carbon nanotube and the second nanotube has the chirality (n,0) where n=0 to 20.

Item A3818. The composite material of items A20 or B15 where one nanotube is a boron carbon nanotube and the second nanotube has the chirality (n,1) where n=0 to 20.

Item A3819. The composite material of items A20 or B15 where one nanotube is a boron carbon nanotube and the second nanotube has the chirality (n,2) where n=0 to 20.

Item A3820. The composite material of items A20 or B15 where one nanotube is a boron carbon nanotube and the second nanotube has the chirality (n,3) where n=0 to 20.

Item A3821. The composite material of items A20 or B15 where one nanotube is a boron carbon nanotube and the second nanotube has the chirality (n,4) where n=0 to 20.

Item A3822. The composite material of items A20 or B15 where one nanotube is a boron carbon nanotube and the second nanotube has the chirality (n,5) where n=0 to 20.

Item A3823. The composite material of items A20 or B15 where one nanotube is a boron carbon nanotube and the second nanotube has the chirality (n,6) where n=0 to 20.

Item A3824. The composite material of items A20 or B15 where one nanotube is a boron carbon nanotube and the second nanotube has the chirality (n,7) where n=0 to 20.

Item A3825. The composite material of items A20 or B15 where one nanotube is a boron carbon nanotube and the second nanotube has the chirality (n,8) where n=0 to 20.

Item A3826. The composite material of items A20 or B15 where one nanotube is a boron carbon nanotube and the second nanotube has the chirality (n,9) where n=0 to 20.

Item A3827. The composite material of items A20 or B15 where one nanotube is a boron carbon nanotube and the second nanotube has the chirality (n,10) where n=0 to 20.

Item A3828. The composite material of items A20 or B15 where one nanotube is a boron carbon nanotube and the second nanotube has the chirality (n,11) where n=0 to 20.

Item A3829. The composite material of items A20 or B15 where one nanotube is a boron carbon nanotube and the second nanotube has the chirality (n,12) where n=0 to 20.

Item A3830. The composite material of items A20 or B15 where one nanotube is a boron carbon nanotube and the second nanotube has the chirality (n,13) where n=0 to 20.

Item A3831. The composite material of items A20 or B15 where one nanotube is a boron carbon nanotube and the second nanotube has the chirality (n,14) where n=0 to 20.

Item A3832. The composite material of items A20 or B15 where one nanotube is a boron carbon nanotube and the second nanotube has the chirality (n,15) where n=0 to 20.

Item A3833. The composite material of items A20 or B15 where one nanotube is a boron carbon nanotube and the second nanotube has the chirality (n,16) where n=0 to 20.

Item A3834. The composite material of items A20 or B15 where one nanotube is a boron carbon nanotube and the second nanotube has the chirality (n,17) where n=0 to 20.

Item A3835. The composite material of items A20 or B15 where one nanotube is a boron carbon nanotube and the second nanotube has the chirality (n,18) where n=0 to 20.

Item A3836. The composite material of items A20 or B15 where one nanotube is a boron carbon nanotube and the second nanotube has the chirality (n,19) where n=0 to 20.

Item A3837. The composite material of items A20 or B15 where one nanotube is a boron carbon nanotube and the second nanotube has the chirality (n,20) where n=0 to 20.

Item A3838. The composite material of items A20 or B15 where one nanotube is a boron carbon nanotube and the second nanotube has the chirality (0,n) where n=0 to 20.

Item A3839. The composite material of items A20 or B15 where one nanotube is a boron carbon nanotube and the second nanotube has the chirality (1,n) where n=0 to 20.

Item A3840. The composite material of items A20 or B15 where one nanotube is a boron carbon nanotube and the second nanotube has the chirality (2,n) where n=0 to 20.

Item A3841. The composite material of items A20 or B15 where one nanotube is a boron carbon nanotube and the second nanotube has the chirality (3,n) where n=0 to 20.

Item A3842. The composite material of items A20 or B15 where one nanotube is a boron carbon nanotube and the second nanotube has the chirality (4,n) where n=0 to 20.

Item A3843. The composite material of items A20 or B15 where one nanotube is a boron carbon nanotube and the second nanotube has the chirality (5,n) where n=0 to 20.

Item A3844. The composite material of items A20 or B15 where one nanotube is a boron carbon nanotube and the second nanotube has the chirality (6,n) where n=0 to 20.

Item A3845. The composite material of items A20 or B15 where one nanotube is a boron carbon nanotube and the second nanotube has the chirality (7,n) where n=0 to 20.

Item A3846. The composite material of items A20 or B15 where one nanotube is a boron carbon nanotube and the second nanotube has the chirality (8,n) where n=0 to 20.

Item A3847. The composite material of items A20 or B15 where one nanotube is a boron carbon nanotube and the second nanotube has the chirality (9,n) where n=0 to 20.

Item A3848. The composite material of items A20 or B15 where one nanotube is a boron carbon nanotube and the second nanotube has the chirality (10,n) where n=0 to 20.

Item A3849. The composite material of items A20 or B15 where one nanotube is a boron carbon nanotube and the second nanotube has the chirality (11,n) where n=0 to 20.

Item A3850. The composite material of items A20 or B15 where one nanotube is a boron carbon nanotube and the second nanotube has the chirality (12,n) where n=0 to 20.

Item A3851. The composite material of items A20 or B15 where one nanotube is a boron carbon nanotube and the second nanotube has the chirality (13,n) where n=0 to 20.

Item A3852. The composite material of items A20 or B15 where one nanotube is a boron carbon nanotube and the second nanotube has the chirality (14,n) where n=0 to 20.

Item A3853. The composite material of items A20 or B15 where one nanotube is a boron carbon nanotube and the second nanotube has the chirality (15,n) where n=0 to 20.

Item A3854. The composite material of items A20 or B15 where one nanotube is a boron carbon nanotube and the second nanotube has the chirality (16,n) where n=0 to 20.

Item A3855. The composite material of items A20 or B15 where one nanotube is a boron carbon nanotube and the second nanotube has the chirality (17,n) where n=0 to 20.

Item A3856. The composite material of items A20 or B15 where one nanotube is a boron carbon nanotube and the second nanotube has the chirality (18,n) where n=0 to 20.

Item A3857. The composite material of items A20 or B15 where one nanotube is a boron carbon nanotube and the second nanotube has the chirality (19,n) where n=0 to 20.

Item A3858. The composite material of items A20 or B15 where one nanotube is a boron carbon nanotube and the second nanotube has the chirality (20,n) where n=0 to 20.

Item A3859. The composite material of items A20 or B15 where one nanotube is a boron carbon nanotube and the second nanotube has a percentage of sp2 bonds of more than 90%, such as more than 95%, such as more than 96%, such as more than 97%, such as more than 98%, such as more than 99%, such as more than 99%.

Item A3860. The composite material of items A20 or B15 where one nanotube is a boron carbon nanotube and the second nanotube has a percentage of sp2 bonds of less than 100%, such as less than 99%, such as less than 98%, such as less than 97%, such as less than 96%, such as less than 95%.

Item A3861. The composite material of items A20 or B15 where one nanotube is a boron carbon nanotube and the second nanotube has a percentage of sp2 bonds of from 95%-96%, from 96% to 97%, from 97% to 98%, from 98% to 99%, from 99% to 100%.

Item A3862. The composite material of items A20 or B15 where one nanotube is a boron carbon nanotube and the second nanotube has a percentage of carbon atoms of more than 90%, such as more than 95%, such as more than 96%, such as more than 97%, such as more than 98%, such as more than 99%, such as more than 99%.

Item A3863. The composite material of items A20 or B15 where one nanotube is a boron carbon nanotube and the second nanotube has a percentage of carbon atoms of less than 100%, such as less than 99%, such as less than 98%, such as less than 97%, such as less than 96%, such as less than 95%.

Item A3864. The composite material of items A20 or B15 where one nanotube is a boron carbon nanotube and the second nanotube has a percentage of carbon atoms of from 95%-96%, from 96% to 97%, from 97% to 98%, from 98% to 99%, from 99% to 100%.

Item A3865. The composite material of items A20 or B15 where one nanotube is a boron carbon nanotube and the second nanotube has a percentage of functionalization of less than 10%, such as less than 5%, such as less than 4%, such as less than 3%, such as less than 2%, such as less than 1%.

Item A3866. The composite material of items A20 or B15 where one nanotube is a boron carbon nanotube and the second nanotube has a percentage of functionalization of more than 0%, such as more than 1%, such as more than 2%, such as more than 3%, such as more than 4%, such as more than 5%, such as more than 10%.

Item A3867. The composite material of items A20 or B15 where one nanotube is a boron carbon nanotube and the second nanotube has a percentage of functionalization of from 0% to 1%, from 1% to 2%, from 2% to 3%, from 3% to 4%, from 4% to 5%, from 5% to 10%.

Item A3868. The composite material of items A20 or B15 where one nanotube is a boron carbon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3869. The composite material of items A20 or B15 where one nanotube is a boron carbon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3870. The composite material of items A20 or B15 where one nanotube is a boron carbon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3871. The composite material of items A20 or B15 where one nanotube is a boron carbon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3872. The composite material of items A20 or B15 where one nanotube is a boron carbon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3873. The composite material of items A20 or B15 where one nanotube is a boron carbon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3874. The composite material of items A20 or B15 where one nanotube is a boron nitride nanotube and the second nanotube is a carbon nanotube.

Item A3875. The composite material of items A20 or B15 where one nanotube is a boron nitride nanotube and the second nanotube is a single wall carbon nanotube.

Item A3876. The composite material of items A20 or B15 where one nanotube is a boron nitride nanotube and the second nanotube is a multi wall carbon nanotube.

Item A3877. The composite material of items A20 or B15 where one nanotube is a boron nitride nanotube and the second nanotube is a metallic carbon nanotube.

Item A3878. The composite material of items A20 or B15 where one nanotube is a boron nitride nanotube and the second nanotube is a semiconductive carbon nanotube.

Item A3879. The composite material of items A20 or B15 where one nanotube is a boron nitride nanotube and the second nanotube is a aluminium nanotube.

Item A3880. The composite material of items A20 or B15 where one nanotube is a boron nitride nanotube and the second nanotube is a aluminum nitride nanotube (AlNNT).

Item A3881. The composite material of items A20 or B15 where one nanotube is a boron nitride nanotube and the second nanotube is a aluminum phosphide nanotube (AlPNT).

Item A3882. The composite material of items A20 or B15 where one nanotube is a boron nitride nanotube and the second nanotube is a bismuth nanotube.

Item A3883. The composite material of items A20 or B15 where one nanotube is a boron nitride nanotube and the second nanotube is a bismuth selenide nanotube.

Item A3884. The composite material of items A20 or B15 where one nanotube is a boron nitride nanotube and the second nanotube is a boron carbon nanotubes (BCNNT).

Item A3885. The composite material of items A20 or B15 where one nanotube is a boron nitride nanotube and the second nanotube is a boron nitride nanotube.

Item A3886. The composite material of items A20 or B15 where one nanotube is a boron nitride nanotube and the second nanotube is a cadmium selenide nanotube.

Item A3887. The composite material of items A20 or B15 where one nanotube is a boron nitride nanotube and the second nanotube is a cobalt selenide nanotube.

Item A3888. The composite material of items A20 or B15 where one nanotube is a boron nitride nanotube and the second nanotube is a copper nanotube.

Item A3889. The composite material of items A20 or B15 where one nanotube is a boron nitride nanotube and the second nanotube is a DNA nanotube.

Item A3890. The composite material of items A20 or B15 where one nanotube is a boron nitride nanotube and the second nanotube is a gallium nitride nanotube (GaNNT).

Item A3891. The composite material of items A20 or B15 where one nanotube is a boron nitride nanotube and the second nanotube is a gallium phosphide nanotube (GaPNT).

Item A3892. The composite material of items A20 or B15 where one nanotube is a boron nitride nanotube and the second nanotube is a gold nanotube.

Item A3893. The composite material of items A20 or B15 where one nanotube is a boron nitride nanotube and the second nanotube is a halide nanotube.

Item A3894. The composite material of items A20 or B15 where one nanotube is a boron nitride nanotube and the second nanotube is a niobium selenide nanotube.

Item A3895. The composite material of items A20 or B15 where one nanotube is a boron nitride nanotube and the second nanotube is a molybdenum disulfide nanotube.

Item A3896. The composite material of items A20 or B15 where one nanotube is a boron nitride nanotube and the second nanotube is a nanotube of transition metal oxides.

Item A3897. The composite material of items A20 or B15 where one nanotube is a boron nitride nanotube and the second nanotube is a nickel chloride nanotube.

Item A3898. The composite material of items A20 or B15 where one nanotube is a boron nitride nanotube and the second nanotube is a platinum nanotube.

Item A3899. The composite material of items A20 or B15 where one nanotube is a boron nitride nanotube and the second nanotube is a protein nanotube.

Item A3900. The composite material of items A20 or B15 where one nanotube is a boron nitride nanotube and the second nanotube is a RNA nanotube.

Item A3901. The composite material of items A20 or B15 where one nanotube is a boron nitride nanotube and the second nanotube is a selenide nanotube.

Item A3902. The composite material of items A20 or B15 where one nanotube is a boron nitride nanotube and the second nanotube is a silicon nanotube.

Item A3903. The composite material of items A20 or B15 where one nanotube is a boron nitride nanotube and the second nanotube is a silver nanotube.

Item A3904. The composite material of items A20 or B15 where one nanotube is a boron nitride nanotube and the second nanotube is a sulphide nanotube.

Item A3905. The composite material of items A20 or B15 where one nanotube is a boron nitride nanotube and the second nanotube is a tin disulfide nanotube.

Item A3906. The composite material of items A20 or B15 where one nanotube is a boron nitride nanotube and the second nanotube is a titanium dioxide nanotube.

Item A3907. The composite material of items A20 or B15 where one nanotube is a boron nitride nanotube and the second nanotube is a titanium oxide nanotube.

Item A3908. The composite material of items A20 or B15 where one nanotube is a boron nitride nanotube and the second nanotube is a tungsten disulfide nanotube.

Item A3909. The composite material of items A20 or B15 where one nanotube is a boron nitride nanotube and the second nanotube is a tungsten sulfide nanotube.

Item A3910. The composite material of items A20 or B15 where one nanotube is a boron nitride nanotube and the second nanotube is a wolfram disulphide nanotube.

Item A3911. The composite material of items A20 or B15 where one nanotube is a boron nitride nanotube and the second nanotube is a zinc ferrite nanotube.

Item A3912. The composite material of items A20 or B15 where one nanotube is a boron nitride nanotube and the second nanotube is a zinc oxide nanotube.

Item A3913. The composite material of items A20 or B15 where one nanotube is a boron nitride nanotube and the second nanotube is a zirconia dioxide nanotube.

Item A3914. The composite material of items A20 or B15 where one nanotube is a boron nitride nanotube and the second nanotube is a nanofiber.

Item A3915. The composite material of items A20 or B15 where one nanotube is a boron nitride nanotube and the second nanotube is a nanothread.

Item A3916. The composite material of items A20 or B15 where one nanotube is a boron nitride nanotube and the second nanotube is a nanorod.

Item A3917. The composite material of items A20 or B15 where one nanotube is a boron nitride nanotube and the second nanotube is a nanoball.

Item A3918. The composite material of items A20 or B15 where one nanotube is a boron nitride nanotube and the second nanotube is a nanobud.

Item A3919. The composite material of items A20 or B15 where one nanotube is a boron nitride nanotube and the second nanotube is a buckyball.

Item A3920. The composite material of items A20 or B15 where one nanotube is a boron nitride nanotube and the second nanotube is a multi wall nanotube.

Item A3921. The composite material of items A20 or B15 where one nanotube is a boron nitride nanotube and the second nanotube is a single wall nanotube.

Item A3922. The composite material of items A20 or B15 where one nanotube is a boron nitride nanotube and the second nanotube has the chirality (n,0) where n=0 to 20.

Item A3923. The composite material of items A20 or B15 where one nanotube is a boron nitride nanotube and the second nanotube has the chirality (n,1) where n=0 to 20.

Item A3924. The composite material of items A20 or B15 where one nanotube is a boron nitride nanotube and the second nanotube has the chirality (n,2) where n=0 to 20.

Item A3925. The composite material of items A20 or B15 where one nanotube is a boron nitride nanotube and the second nanotube has the chirality (n,3) where n=0 to 20.

Item A3926. The composite material of items A20 or B15 where one nanotube is a boron nitride nanotube and the second nanotube has the chirality (n,4) where n=0 to 20.

Item A3927. The composite material of items A20 or B15 where one nanotube is a boron nitride nanotube and the second nanotube has the chirality (n,5) where n=0 to 20.

Item A3928. The composite material of items A20 or B15 where one nanotube is a boron nitride nanotube and the second nanotube has the chirality (n,6) where n=0 to 20.

Item A3929. The composite material of items A20 or B15 where one nanotube is a boron nitride nanotube and the second nanotube has the chirality (n,7) where n=0 to 20.

Item A3930. The composite material of items A20 or B15 where one nanotube is a boron nitride nanotube and the second nanotube has the chirality (n,8) where n=0 to 20.

Item A3931. The composite material of items A20 or B15 where one nanotube is a boron nitride nanotube and the second nanotube has the chirality (n,9) where n=0 to 20.

Item A3932. The composite material of items A20 or B15 where one nanotube is a boron nitride nanotube and the second nanotube has the chirality (n,10) where n=0 to 20.

Item A3933. The composite material of items A20 or B15 where one nanotube is a boron nitride nanotube and the second nanotube has the chirality (n,11) where n=0 to 20.

Item A3934. The composite material of items A20 or B15 where one nanotube is a boron nitride nanotube and the second nanotube has the chirality (n,12) where n=0 to 20.

Item A3935. The composite material of items A20 or B15 where one nanotube is a boron nitride nanotube and the second nanotube has the chirality (n,13) where n=0 to 20.

Item A3936. The composite material of items A20 or B15 where one nanotube is a boron nitride nanotube and the second nanotube has the chirality (n,14) where n=0 to 20.

Item A3937. The composite material of items A20 or B15 where one nanotube is a boron nitride nanotube and the second nanotube has the chirality (n,15) where n=0 to 20.

Item A3938. The composite material of items A20 or B15 where one nanotube is a boron nitride nanotube and the second nanotube has the chirality (n,16) where n=0 to 20.

Item A3939. The composite material of items A20 or B15 where one nanotube is a boron nitride nanotube and the second nanotube has the chirality (n,17) where n=0 to 20.

Item A3940. The composite material of items A20 or B15 where one nanotube is a boron nitride nanotube and the second nanotube has the chirality (n,18) where n=0 to 20.

Item A3941. The composite material of items A20 or B15 where one nanotube is a boron nitride nanotube and the second nanotube has the chirality (n,19) where n=0 to 20.

Item A3942. The composite material of items A20 or B15 where one nanotube is a boron nitride nanotube and the second nanotube has the chirality (n,20) where n=0 to 20.

Item A3943. The composite material of items A20 or B15 where one nanotube is a boron nitride nanotube and the second nanotube has the chirality (0,n) where n=0 to 20.

Item A3944. The composite material of items A20 or B15 where one nanotube is a boron nitride nanotube and the second nanotube has the chirality (1,n) where n=0 to 20.

Item A3945. The composite material of items A20 or B15 where one nanotube is a boron nitride nanotube and the second nanotube has the chirality (2,n) where n=0 to 20.

Item A3946. The composite material of items A20 or B15 where one nanotube is a boron nitride nanotube and the second nanotube has the chirality (3,n) where n=0 to 20.

Item A3947. The composite material of items A20 or B15 where one nanotube is a boron nitride nanotube and the second nanotube has the chirality (4,n) where n=0 to 20.

Item A3948. The composite material of items A20 or B15 where one nanotube is a boron nitride nanotube and the second nanotube has the chirality (5,n) where n=0 to 20.

Item A3949. The composite material of items A20 or B15 where one nanotube is a boron nitride nanotube and the second nanotube has the chirality (6,n) where n=0 to 20.

Item A3950. The composite material of items A20 or B15 where one nanotube is a boron nitride nanotube and the second nanotube has the chirality (7,n) where n=0 to 20.

Item A3951. The composite material of items A20 or B15 where one nanotube is a boron nitride nanotube and the second nanotube has the chirality (8,n) where n=0 to 20.

Item A3952. The composite material of items A20 or B15 where one nanotube is a boron nitride nanotube and the second nanotube has the chirality (9,n) where n=0 to 20.

Item A3953. The composite material of items A20 or B15 where one nanotube is a boron nitride nanotube and the second nanotube has the chirality (10,n) where n=0 to 20.

Item A3954. The composite material of items A20 or B15 where one nanotube is a boron nitride nanotube and the second nanotube has the chirality (11,n) where n=0 to 20.

Item A3955. The composite material of items A20 or B15 where one nanotube is a boron nitride nanotube and the second nanotube has the chirality (12,n) where n=0 to 20.

Item A3956. The composite material of items A20 or B15 where one nanotube is a boron nitride nanotube and the second nanotube has the chirality (13,n) where n=0 to 20.

Item A3957. The composite material of items A20 or B15 where one nanotube is a boron nitride nanotube and the second nanotube has the chirality (14,n) where n=0 to 20.

Item A3958. The composite material of items A20 or B15 where one nanotube is a boron nitride nanotube and the second nanotube has the chirality (15,n) where n=0 to 20.

Item A3959. The composite material of items A20 or B15 where one nanotube is a boron nitride nanotube and the second nanotube has the chirality (16,n) where n=0 to 20.

Item A3960. The composite material of items A20 or B15 where one nanotube is a boron nitride nanotube and the second nanotube has the chirality (17,n) where n=0 to 20.

Item A3961. The composite material of items A20 or B15 where one nanotube is a boron nitride nanotube and the second nanotube has the chirality (18,n) where n=0 to 20.

Item A3962. The composite material of items A20 or B15 where one nanotube is a boron nitride nanotube and the second nanotube has the chirality (19,n) where n=0 to 20.

Item A3963. The composite material of items A20 or B15 where one nanotube is a boron nitride nanotube and the second nanotube has the chirality (20,n) where n=0 to 20.

Item A3964. The composite material of items A20 or B15 where one nanotube is a boron nitride nanotube and the second nanotube has a percentage of sp2 bonds of more than 90%, such as more than 95%, such as more than 96%, such as more than 97%, such as more than 98%, such as more than 99%, such as more than 99%.

Item A3965. The composite material of items A20 or B15 where one nanotube is a boron nitride nanotube and the second nanotube has a percentage of sp2 bonds of less than 100%, such as less than 99%, such as less than 98%, such as less than 97%, such as less than 96%, such as less than 95%.

Item A3966. The composite material of items A20 or B15 where one nanotube is a boron nitride nanotube and the second nanotube has a percentage of sp2 bonds of from 95%-96%, from 96% to 97%, from 97% to 98%, from 98% to 99%, from 99% to 100%.

Item A3967. The composite material of items A20 or B15 where one nanotube is a boron nitride nanotube and the second nanotube has a percentage of carbon atoms of more than 90%, such as more than 95%, such as more than 96%, such as more than 97%, such as more than 98%, such as more than 99%, such as more than 99%.

Item A3968. The composite material of items A20 or B15 where one nanotube is a boron nitride nanotube and the second nanotube has a percentage of carbon atoms of less than 100%, such as less than 99%, such as less than 98%, such as less than 97%, such as less than 96%, such as less than 95%.

Item A3969. The composite material of items A20 or B15 where one nanotube is a boron nitride nanotube and the second nanotube has a percentage of carbon atoms of from 95%-96%, from 96% to 97%, from 97% to 98%, from 98% to 99%, from 99% to 100%.

Item A3970. The composite material of items A20 or B15 where one nanotube is a boron nitride nanotube and the second nanotube has a percentage of functionalization of less than 10%, such as less than 5%, such as less than 4%, such as less than 3%, such as less than 2%, such as less than 1%.

Item A3971. The composite material of items A20 or B15 where one nanotube is a boron nitride nanotube and the second nanotube has a percentage of functionalization of more than 0%, such as more than 1%, such as more than 2%, such as more than 3%, such as more than 4%, such as more than 5%, such as more than 10%.

Item A3972. The composite material of items A20 or B15 where one nanotube is a boron nitride nanotube and the second nanotube has a percentage of functionalization of from 0% to 1%, from 1% to 2%, from 2% to 3%, from 3% to 4%, from 4% to 5%, from 5% to 10%.

Item A3973. The composite material of items A20 or B15 where one nanotube is a boron nitride nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A3974. The composite material of items A20 or B15 where one nanotube is a boron nitride nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A3975. The composite material of items A20 or B15 where one nanotube is a boron nitride nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A3976. The composite material of items A20 or B15 where one nanotube is a boron nitride nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A3977. The composite material of items A20 or B15 where one nanotube is a boron nitride nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A3978. The composite material of items A20 or B15 where one nanotube is a boron nitride nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A3979. The composite material of items A20 or B15 where one nanotube is a copper nanotube and the second nanotube is a carbon nanotube.

Item A3980. The composite material of items A20 or B15 where one nanotube is a copper nanotube and the second nanotube is a single wall carbon nanotube.

Item A3981. The composite material of items A20 or B15 where one nanotube is a copper nanotube and the second nanotube is a multi wall carbon nanotube.

Item A3982. The composite material of items A20 or B15 where one nanotube is a copper nanotube and the second nanotube is a metallic carbon nanotube.

Item A3983. The composite material of items A20 or B15 where one nanotube is a copper nanotube and the second nanotube is a semiconductive carbon nanotube.

Item A3984. The composite material of items A20 or B15 where one nanotube is a copper nanotube and the second nanotube is a aluminium nanotube.

Item A3985. The composite material of items A20 or B15 where one nanotube is a copper nanotube and the second nanotube is a aluminum nitride nanotube (AlNNT).

Item A3986. The composite material of items A20 or B15 where one nanotube is a copper nanotube and the second nanotube is a aluminum phosphide nanotube (AlPNT).

Item A3987. The composite material of items A20 or B15 where one nanotube is a copper nanotube and the second nanotube is a bismuth nanotube.

Item A3988. The composite material of items A20 or B15 where one nanotube is a copper nanotube and the second nanotube is a bismuth selenide nanotube.

Item A3989. The composite material of items A20 or B15 where one nanotube is a copper nanotube and the second nanotube is a boron carbon nanotubes (BCNNT).

Item A3990. The composite material of items A20 or B15 where one nanotube is a copper nanotube and the second nanotube is a boron nitride nanotube.

Item A3991. The composite material of items A20 or B15 where one nanotube is a copper nanotube and the second nanotube is a cadmium selenide nanotube.

Item A3992. The composite material of items A20 or B15 where one nanotube is a copper nanotube and the second nanotube is a cobalt selenide nanotube.

Item A3993. The composite material of items A20 or B15 where one nanotube is a copper nanotube and the second nanotube is a copper nanotube.

Item A3994. The composite material of items A20 or B15 where one nanotube is a copper nanotube and the second nanotube is a DNA nanotube.

Item A3995. The composite material of items A20 or B15 where one nanotube is a copper nanotube and the second nanotube is a gallium nitride nanotube (GaNNT).

Item A3996. The composite material of items A20 or B15 where one nanotube is a copper nanotube and the second nanotube is a gallium phosphide nanotube (GaPNT).

Item A3997. The composite material of items A20 or B15 where one nanotube is a copper nanotube and the second nanotube is a gold nanotube.

Item A3998. The composite material of items A20 or B15 where one nanotube is a copper nanotube and the second nanotube is a halide nanotube.

Item A3999. The composite material of items A20 or B15 where one nanotube is a copper nanotube and the second nanotube is a niobium selenide nanotube.

Item A4000. The composite material of items A20 or B15 where one nanotube is a copper nanotube and the second nanotube is a molybdenum disulfide nanotube.

Item A4001. The composite material of items A20 or B15 where one nanotube is a copper nanotube and the second nanotube is a nanotube of transition metal oxides.

Item A4002. The composite material of items A20 or B15 where one nanotube is a copper nanotube and the second nanotube is a nickel chloride nanotube.

Item A4003. The composite material of items A20 or B15 where one nanotube is a copper nanotube and the second nanotube is a platinum nanotube.

Item A4004. The composite material of items A20 or B15 where one nanotube is a copper nanotube and the second nanotube is a protein nanotube.

Item A4005. The composite material of items A20 or B15 where one nanotube is a copper nanotube and the second nanotube is a RNA nanotube.

Item A4006. The composite material of items A20 or B15 where one nanotube is a copper nanotube and the second nanotube is a selenide nanotube.

Item A4007. The composite material of items A20 or B15 where one nanotube is a copper nanotube and the second nanotube is a silicon nanotube.

Item A4008. The composite material of items A20 or B15 where one nanotube is a copper nanotube and the second nanotube is a silver nanotube.

Item A4009. The composite material of items A20 or B15 where one nanotube is a copper nanotube and the second nanotube is a sulphide nanotube.

Item A4010. The composite material of items A20 or B15 where one nanotube is a copper nanotube and the second nanotube is a tin disulfide nanotube.

Item A4011. The composite material of items A20 or B15 where one nanotube is a copper nanotube and the second nanotube is a titanium dioxide nanotube.

Item A4012. The composite material of items A20 or B15 where one nanotube is a copper nanotube and the second nanotube is a titanium oxide nanotube.

Item A4013. The composite material of items A20 or B15 where one nanotube is a copper nanotube and the second nanotube is a tungsten disulfide nanotube.

Item A4014. The composite material of items A20 or B15 where one nanotube is a copper nanotube and the second nanotube is a tungsten sulfide nanotube.

Item A4015. The composite material of items A20 or B15 where one nanotube is a copper nanotube and the second nanotube is a wolfram disulphide nanotube.

Item A4016. The composite material of items A20 or B15 where one nanotube is a copper nanotube and the second nanotube is a zinc ferrite nanotube.

Item A4017. The composite material of items A20 or B15 where one nanotube is a copper nanotube and the second nanotube is a zinc oxide nanotube.

Item A4018. The composite material of items A20 or B15 where one nanotube is a copper nanotube and the second nanotube is a zirconia dioxide nanotube.

Item A4019. The composite material of items A20 or B15 where one nanotube is a copper nanotube and the second nanotube is a nanofiber.

Item A4020. The composite material of items A20 or B15 where one nanotube is a copper nanotube and the second nanotube is a nanothread.

Item A4021. The composite material of items A20 or B15 where one nanotube is a copper nanotube and the second nanotube is a nanorod.

Item A4022. The composite material of items A20 or B15 where one nanotube is a copper nanotube and the second nanotube is a nanoball.

Item A4023. The composite material of items A20 or B15 where one nanotube is a copper nanotube and the second nanotube is a nanobud.

Item A4024. The composite material of items A20 or B15 where one nanotube is a copper nanotube and the second nanotube is a buckyball.

Item A4025. The composite material of items A20 or B15 where one nanotube is a copper nanotube and the second nanotube is a multi wall nanotube.

Item A4026. The composite material of items A20 or B15 where one nanotube is a copper nanotube and the second nanotube is a single wall nanotube.

Item A4027. The composite material of items A20 or B15 where one nanotube is a copper nanotube and the second nanotube has the chirality (n,0) where n=0 to 20.

Item A4028. The composite material of items A20 or B15 where one nanotube is a copper nanotube and the second nanotube has the chirality (n,1) where n=0 to 20.

Item A4029. The composite material of items A20 or B15 where one nanotube is a copper nanotube and the second nanotube has the chirality (n,2) where n=0 to 20.

Item A4030. The composite material of items A20 or B15 where one nanotube is a copper nanotube and the second nanotube has the chirality (n,3) where n=0 to 20.

Item A4031. The composite material of items A20 or B15 where one nanotube is a copper nanotube and the second nanotube has the chirality (n,4) where n=0 to 20.

Item A4032. The composite material of items A20 or B15 where one nanotube is a copper nanotube and the second nanotube has the chirality (n,5) where n=0 to 20.

Item A4033. The composite material of items A20 or B15 where one nanotube is a copper nanotube and the second nanotube has the chirality (n,6) where n=0 to 20.

Item A4034. The composite material of items A20 or B15 where one nanotube is a copper nanotube and the second nanotube has the chirality (n,7) where n=0 to 20.

Item A4035. The composite material of items A20 or B15 where one nanotube is a copper nanotube and the second nanotube has the chirality (n,8) where n=0 to 20.

Item A4036. The composite material of items A20 or B15 where one nanotube is a copper nanotube and the second nanotube has the chirality (n,9) where n=0 to 20.

Item A4037. The composite material of items A20 or B15 where one nanotube is a copper nanotube and the second nanotube has the chirality (n,10) where n=0 to 20.

Item A4038. The composite material of items A20 or B15 where one nanotube is a copper nanotube and the second nanotube has the chirality (n,11) where n=0 to 20.

Item A4039. The composite material of items A20 or B15 where one nanotube is a copper nanotube and the second nanotube has the chirality (n,12) where n=0 to 20.

Item A4040. The composite material of items A20 or B15 where one nanotube is a copper nanotube and the second nanotube has the chirality (n,13) where n=0 to 20.

Item A4041. The composite material of items A20 or B15 where one nanotube is a copper nanotube and the second nanotube has the chirality (n,14) where n=0 to 20.

Item A4042. The composite material of items A20 or B15 where one nanotube is a copper nanotube and the second nanotube has the chirality (n,15) where n=0 to 20.

Item A4043. The composite material of items A20 or B15 where one nanotube is a copper nanotube and the second nanotube has the chirality (n,16) where n=0 to 20.

Item A4044. The composite material of items A20 or B15 where one nanotube is a copper nanotube and the second nanotube has the chirality (n,17) where n=0 to 20.

Item A4045. The composite material of items A20 or B15 where one nanotube is a copper nanotube and the second nanotube has the chirality (n,18) where n=0 to 20.

Item A4046. The composite material of items A20 or B15 where one nanotube is a copper nanotube and the second nanotube has the chirality (n,19) where n=0 to 20.

Item A4047. The composite material of items A20 or B15 where one nanotube is a copper nanotube and the second nanotube has the chirality (n,20) where n=0 to 20.

Item A4048. The composite material of items A20 or B15 where one nanotube is a copper nanotube and the second nanotube has the chirality (0,n) where n=0 to 20.

Item A4049. The composite material of items A20 or B15 where one nanotube is a copper nanotube and the second nanotube has the chirality (1,n) where n=0 to 20.

Item A4050. The composite material of items A20 or B15 where one nanotube is a copper nanotube and the second nanotube has the chirality (2,n) where n=0 to 20.

Item A4051. The composite material of items A20 or B15 where one nanotube is a copper nanotube and the second nanotube has the chirality (3,n) where n=0 to 20.

Item A4052. The composite material of items A20 or B15 where one nanotube is a copper nanotube and the second nanotube has the chirality (4,n) where n=0 to 20.

Item A4053. The composite material of items A20 or B15 where one nanotube is a copper nanotube and the second nanotube has the chirality (5,n) where n=0 to 20.

Item A4054. The composite material of items A20 or B15 where one nanotube is a copper nanotube and the second nanotube has the chirality (6,n) where n=0 to 20.

Item A4055. The composite material of items A20 or B15 where one nanotube is a copper nanotube and the second nanotube has the chirality (7,n) where n=0 to 20.

Item A4056. The composite material of items A20 or B15 where one nanotube is a copper nanotube and the second nanotube has the chirality (8,n) where n=0 to 20.

Item A4057. The composite material of items A20 or B15 where one nanotube is a copper nanotube and the second nanotube has the chirality (9,n) where n=0 to 20.

Item A4058. The composite material of items A20 or B15 where one nanotube is a copper nanotube and the second nanotube has the chirality (10,n) where n=0 to 20.

Item A4059. The composite material of items A20 or B15 where one nanotube is a copper nanotube and the second nanotube has the chirality (11,n) where n=0 to 20.

Item A4060. The composite material of items A20 or B15 where one nanotube is a copper nanotube and the second nanotube has the chirality (12,n) where n=0 to 20.

Item A4061. The composite material of items A20 or B15 where one nanotube is a copper nanotube and the second nanotube has the chirality (13,n) where n=0 to 20.

Item A4062. The composite material of items A20 or B15 where one nanotube is a copper nanotube and the second nanotube has the chirality (14,n) where n=0 to 20.

Item A4063. The composite material of items A20 or B15 where one nanotube is a copper nanotube and the second nanotube has the chirality (15,n) where n=0 to 20.

Item A4064. The composite material of items A20 or B15 where one nanotube is a copper nanotube and the second nanotube has the chirality (16,n) where n=0 to 20.

Item A4065. The composite material of items A20 or B15 where one nanotube is a copper nanotube and the second nanotube has the chirality (17,n) where n=0 to 20.

Item A4066. The composite material of items A20 or B15 where one nanotube is a copper nanotube and the second nanotube has the chirality (18,n) where n=0 to 20.

Item A4067. The composite material of items A20 or B15 where one nanotube is a copper nanotube and the second nanotube has the chirality (19,n) where n=0 to 20.

Item A4068. The composite material of items A20 or B15 where one nanotube is a copper nanotube and the second nanotube has the chirality (20,n) where n=0 to 20.

Item A4069. The composite material of items A20 or B15 where one nanotube is a copper nanotube and the second nanotube has a percentage of sp2 bonds of more than 90%, such as more than 95%, such as more than 96%, such as more than 97%, such as more than 98%, such as more than 99%, such as more than 99%.

Item A4070. The composite material of items A20 or B15 where one nanotube is a copper nanotube and the second nanotube has a percentage of sp2 bonds of less than 100%, such as less than 99%, such as less than 98%, such as less than 97%, such as less than 96%, such as less than 95%.

Item A4071. The composite material of items A20 or B15 where one nanotube is a copper nanotube and the second nanotube has a percentage of sp2 bonds of from 95%-96%, from 96% to 97%, from 97% to 98%, from 98% to 99%, from 99% to 100%.

Item A4072. The composite material of items A20 or B15 where one nanotube is a copper nanotube and the second nanotube has a percentage of carbon atoms of more than 90%, such as more than 95%, such as more than 96%, such as more than 97%, such as more than 98%, such as more than 99%, such as more than 99%.

Item A4073. The composite material of items A20 or B15 where one nanotube is a copper nanotube and the second nanotube has a percentage of carbon atoms of less than 100%, such as less than 99%, such as less than 98%, such as less than 97%, such as less than 96%, such as less than 95%.

Item A4074. The composite material of items A20 or B15 where one nanotube is a copper nanotube and the second nanotube has a percentage of carbon atoms of from 95%-96%, from 96% to 97%, from 97% to 98%, from 98% to 99%, from 99% to 100%.

Item A4075. The composite material of items A20 or B15 where one nanotube is a copper nanotube and the second nanotube has a percentage of functionalization of less than 10%, such as less than 5%, such as less than 4%, such as less than 3%, such as less than 2%, such as less than 1%.

Item A4076. The composite material of items A20 or B15 where one nanotube is a copper nanotube and the second nanotube has a percentage of functionalization of more than 0%, such as more than 1%, such as more than 2%, such as more than 3%, such as more than 4%, such as more than 5%, such as more than 10%.

Item A4077. The composite material of items A20 or B15 where one nanotube is a copper nanotube and the second nanotube has a percentage of functionalization of from 0% to 1%, from 1% to 2%, from 2% to 3%, from 3% to 4%, from 4% to 5%, from 5% to 10%.

Item A4078. The composite material of items A20 or B15 where one nanotube is a copper nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4079. The composite material of items A20 or B15 where one nanotube is a copper nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4080. The composite material of items A20 or B15 where one nanotube is a copper nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4081. The composite material of items A20 or B15 where one nanotube is a copper nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4082. The composite material of items A20 or B15 where one nanotube is a copper nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4083. The composite material of items A20 or B15 where one nanotube is a copper nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4084. The composite material of items A20 or B15 where one nanotube is a DNA nanotube and the second nanotube is a carbon nanotube.

Item A4085. The composite material of items A20 or B15 where one nanotube is a DNA nanotube and the second nanotube is a single wall carbon nanotube.

Item A4086. The composite material of items A20 or B15 where one nanotube is a DNA nanotube and the second nanotube is a multi wall carbon nanotube.

Item A4087. The composite material of items A20 or B15 where one nanotube is a DNA nanotube and the second nanotube is a metallic carbon nanotube.

Item A4088. The composite material of items A20 or B15 where one nanotube is a DNA nanotube and the second nanotube is a semiconductive carbon nanotube.

Item A4089. The composite material of items A20 or B15 where one nanotube is a DNA nanotube and the second nanotube is a aluminium nanotube.

Item A4090. The composite material of items A20 or B15 where one nanotube is a DNA nanotube and the second nanotube is a aluminum nitride nanotube (AlNNT).

Item A4091. The composite material of items A20 or B15 where one nanotube is a DNA nanotube and the second nanotube is a aluminum phosphide nanotube (AlPNT).

Item A4092. The composite material of items A20 or B15 where one nanotube is a DNA nanotube and the second nanotube is a bismuth nanotube.

Item A4093. The composite material of items A20 or B15 where one nanotube is a DNA nanotube and the second nanotube is a bismuth selenide nanotube.

Item A4094. The composite material of items A20 or B15 where one nanotube is a DNA nanotube and the second nanotube is a boron carbon nanotubes (BCNNT).

Item A4095. The composite material of items A20 or B15 where one nanotube is a DNA nanotube and the second nanotube is a boron nitride nanotube.

Item A4096. The composite material of items A20 or B15 where one nanotube is a DNA nanotube and the second nanotube is a cadmium selenide nanotube.

Item A4097. The composite material of items A20 or B15 where one nanotube is a DNA nanotube and the second nanotube is a cobalt selenide nanotube.

Item A4098. The composite material of items A20 or B15 where one nanotube is a DNA nanotube and the second nanotube is a copper nanotube.

Item A4099. The composite material of items A20 or B15 where one nanotube is a DNA nanotube and the second nanotube is a DNA nanotube.

Item A4100. The composite material of items A20 or B15 where one nanotube is a DNA nanotube and the second nanotube is a gallium nitride nanotube (GaNNT).

Item A4101. The composite material of items A20 or B15 where one nanotube is a DNA nanotube and the second nanotube is a gallium phosphide nanotube (GaPNT).

Item A4102. The composite material of items A20 or B15 where one nanotube is a DNA nanotube and the second nanotube is a gold nanotube.

Item A4103. The composite material of items A20 or B15 where one nanotube is a DNA nanotube and the second nanotube is a halide nanotube.

Item A4104. The composite material of items A20 or B15 where one nanotube is a DNA nanotube and the second nanotube is a niobium selenide nanotube.

Item A4105. The composite material of items A20 or B15 where one nanotube is a DNA nanotube and the second nanotube is a molybdenum disulfide nanotube.

Item A4106. The composite material of items A20 or B15 where one nanotube is a DNA nanotube and the second nanotube is a nanotube of transition metal oxides.

Item A4107. The composite material of items A20 or B15 where one nanotube is a DNA nanotube and the second nanotube is a nickel chloride nanotube.

Item A4108. The composite material of items A20 or B15 where one nanotube is a DNA nanotube and the second nanotube is a platinum nanotube.

Item A4109. The composite material of items A20 or B15 where one nanotube is a DNA nanotube and the second nanotube is a protein nanotube.

Item A4110. The composite material of items A20 or B15 where one nanotube is a DNA nanotube and the second nanotube is a RNA nanotube.

Item A4111. The composite material of items A20 or B15 where one nanotube is a DNA nanotube and the second nanotube is a selenide nanotube.

Item A4112. The composite material of items A20 or B15 where one nanotube is a DNA nanotube and the second nanotube is a silicon nanotube.

Item A4113. The composite material of items A20 or B15 where one nanotube is a DNA nanotube and the second nanotube is a silver nanotube.

Item A4114. The composite material of items A20 or B15 where one nanotube is a DNA nanotube and the second nanotube is a sulphide nanotube.

Item A4115. The composite material of items A20 or B15 where one nanotube is a DNA nanotube and the second nanotube is a tin disulfide nanotube.

Item A4116. The composite material of items A20 or B15 where one nanotube is a DNA nanotube and the second nanotube is a titanium dioxide nanotube.

Item A4117. The composite material of items A20 or B15 where one nanotube is a DNA nanotube and the second nanotube is a titanium oxide nanotube.

Item A4118. The composite material of items A20 or B15 where one nanotube is a DNA nanotube and the second nanotube is a tungsten disulfide nanotube.

Item A4119. The composite material of items A20 or B15 where one nanotube is a DNA nanotube and the second nanotube is a tungsten sulfide nanotube.

Item A4120. The composite material of items A20 or B15 where one nanotube is a DNA nanotube and the second nanotube is a wolfram disulphide nanotube.

Item A4121. The composite material of items A20 or B15 where one nanotube is a DNA nanotube and the second nanotube is a zinc ferrite nanotube.

Item A4122. The composite material of items A20 or B15 where one nanotube is a DNA nanotube and the second nanotube is a zinc oxide nanotube.

Item A4123. The composite material of items A20 or B15 where one nanotube is a DNA nanotube and the second nanotube is a zirconia dioxide nanotube.

Item A4124. The composite material of items A20 or B15 where one nanotube is a DNA nanotube and the second nanotube is a nanofiber.

Item A4125. The composite material of items A20 or B15 where one nanotube is a DNA nanotube and the second nanotube is a nanothread.

Item A4126. The composite material of items A20 or B15 where one nanotube is a DNA nanotube and the second nanotube is a nanorod.

Item A4127. The composite material of items A20 or B15 where one nanotube is a DNA nanotube and the second nanotube is a nanoball.

Item A4128. The composite material of items A20 or B15 where one nanotube is a DNA nanotube and the second nanotube is a nanobud.

Item A4129. The composite material of items A20 or B15 where one nanotube is a DNA nanotube and the second nanotube is a buckyball.

Item A4130. The composite material of items A20 or B15 where one nanotube is a DNA nanotube and the second nanotube is a multi wall nanotube.

Item A4131. The composite material of items A20 or B15 where one nanotube is a DNA nanotube and the second nanotube is a single wall nanotube.

Item A4132. The composite material of items A20 or B15 where one nanotube is a DNA nanotube and the second nanotube has the chirality (n,0) where n=0 to 20.

Item A4133. The composite material of items A20 or B15 where one nanotube is a DNA nanotube and the second nanotube has the chirality (n,1) where n=0 to 20.

Item A4134. The composite material of items A20 or B15 where one nanotube is a DNA nanotube and the second nanotube has the chirality (n,2) where n=0 to 20.

Item A4135. The composite material of items A20 or B15 where one nanotube is a DNA nanotube and the second nanotube has the chirality (n,3) where n=0 to 20.

Item A4136. The composite material of items A20 or B15 where one nanotube is a DNA nanotube and the second nanotube has the chirality (n,4) where n=0 to 20.

Item A4137. The composite material of items A20 or B15 where one nanotube is a DNA nanotube and the second nanotube has the chirality (n,5) where n=0 to 20.

Item A4138. The composite material of items A20 or B15 where one nanotube is a DNA nanotube and the second nanotube has the chirality (n,6) where n=0 to 20.

Item A4139. The composite material of items A20 or B15 where one nanotube is a DNA nanotube and the second nanotube has the chirality (n,7) where n=0 to 20.

Item A4140. The composite material of items A20 or B15 where one nanotube is a DNA nanotube and the second nanotube has the chirality (n,8) where n=0 to 20.

Item A4141. The composite material of items A20 or B15 where one nanotube is a DNA nanotube and the second nanotube has the chirality (n,9) where n=0 to 20.

Item A4142. The composite material of items A20 or B15 where one nanotube is a DNA nanotube and the second nanotube has the chirality (n,10) where n=0 to 20.

Item A4143. The composite material of items A20 or B15 where one nanotube is a DNA nanotube and the second nanotube has the chirality (n,11) where n=0 to 20.

Item A4144. The composite material of items A20 or B15 where one nanotube is a DNA nanotube and the second nanotube has the chirality (n,12) where n=0 to 20.

Item A4145. The composite material of items A20 or B15 where one nanotube is a DNA nanotube and the second nanotube has the chirality (n,13) where n=0 to 20.

Item A4146. The composite material of items A20 or B15 where one nanotube is a DNA nanotube and the second nanotube has the chirality (n,14) where n=0 to 20.

Item A4147. The composite material of items A20 or B15 where one nanotube is a DNA nanotube and the second nanotube has the chirality (n,15) where n=0 to 20.

Item A4148. The composite material of items A20 or B15 where one nanotube is a DNA nanotube and the second nanotube has the chirality (n,16) where n=0 to 20.

Item A4149. The composite material of items A20 or B15 where one nanotube is a DNA nanotube and the second nanotube has the chirality (n,17) where n=0 to 20.

Item A4150. The composite material of items A20 or B15 where one nanotube is a DNA nanotube and the second nanotube has the chirality (n,18) where n=0 to 20.

Item A4151. The composite material of items A20 or B15 where one nanotube is a DNA nanotube and the second nanotube has the chirality (n,19) where n=0 to 20.

Item A4152. The composite material of items A20 or B15 where one nanotube is a DNA nanotube and the second nanotube has the chirality (n,20) where n=0 to 20.

Item A4153. The composite material of items A20 or B15 where one nanotube is a DNA nanotube and the second nanotube has the chirality (0,n) where n=0 to 20.

Item A4154. The composite material of items A20 or B15 where one nanotube is a DNA nanotube and the second nanotube has the chirality (1,n) where n=0 to 20.

Item A4155. The composite material of items A20 or B15 where one nanotube is a DNA nanotube and the second nanotube has the chirality (2,n) where n=0 to 20.

Item A4156. The composite material of items A20 or B15 where one nanotube is a DNA nanotube and the second nanotube has the chirality (3,n) where n=0 to 20.

Item A4157. The composite material of items A20 or B15 where one nanotube is a DNA nanotube and the second nanotube has the chirality (4,n) where n=0 to 20.

Item A4158. The composite material of items A20 or B15 where one nanotube is a DNA nanotube and the second nanotube has the chirality (5,n) where n=0 to 20.

Item A4159. The composite material of items A20 or B15 where one nanotube is a DNA nanotube and the second nanotube has the chirality (6,n) where n=0 to 20.

Item A4160. The composite material of items A20 or B15 where one nanotube is a DNA nanotube and the second nanotube has the chirality (7,n) where n=0 to 20.

Item A4161. The composite material of items A20 or B15 where one nanotube is a DNA nanotube and the second nanotube has the chirality (8,n) where n=0 to 20.

Item A4162. The composite material of items A20 or B15 where one nanotube is a DNA nanotube and the second nanotube has the chirality (9,n) where n=0 to 20.

Item A4163. The composite material of items A20 or B15 where one nanotube is a DNA nanotube and the second nanotube has the chirality (10,n) where n=0 to 20.

Item A4164. The composite material of items A20 or B15 where one nanotube is a DNA nanotube and the second nanotube has the chirality (11,n) where n=0 to 20.

Item A4165. The composite material of items A20 or B15 where one nanotube is a DNA nanotube and the second nanotube has the chirality (12,n) where n=0 to 20.

Item A4166. The composite material of items A20 or B15 where one nanotube is a DNA nanotube and the second nanotube has the chirality (13,n) where n=0 to 20.

Item A4167. The composite material of items A20 or B15 where one nanotube is a DNA nanotube and the second nanotube has the chirality (14,n) where n=0 to 20.

Item A4168. The composite material of items A20 or B15 where one nanotube is a DNA nanotube and the second nanotube has the chirality (15,n) where n=0 to 20.

Item A4169. The composite material of items A20 or B15 where one nanotube is a DNA nanotube and the second nanotube has the chirality (16,n) where n=0 to 20.

Item A4170. The composite material of items A20 or B15 where one nanotube is a DNA nanotube and the second nanotube has the chirality (17,n) where n=0 to 20.

Item A4171. The composite material of items A20 or B15 where one nanotube is a DNA nanotube and the second nanotube has the chirality (18,n) where n=0 to 20.

Item A4172. The composite material of items A20 or B15 where one nanotube is a DNA nanotube and the second nanotube has the chirality (19,n) where n=0 to 20.

Item A4173. The composite material of items A20 or B15 where one nanotube is a DNA nanotube and the second nanotube has the chirality (20,n) where n=0 to 20.

Item A4174. The composite material of items A20 or B15 where one nanotube is a DNA nanotube and the second nanotube has a percentage of sp2 bonds of more than 90%, such as more than 95%, such as more than 96%, such as more than 97%, such as more than 98%, such as more than 99%, such as more than 99%.

Item A4175. The composite material of items A20 or B15 where one nanotube is a DNA nanotube and the second nanotube has a percentage of sp2 bonds of less than 100%, such as less than 99%, such as less than 98%, such as less than 97%, such as less than 96%, such as less than 95%.

Item A4176. The composite material of items A20 or B15 where one nanotube is a DNA nanotube and the second nanotube has a percentage of sp2 bonds of from 95%-96%, from 96% to 97%, from 97% to 98%, from 98% to 99%, from 99% to 100%.

Item A4177. The composite material of items A20 or B15 where one nanotube is a DNA nanotube and the second nanotube has a percentage of carbon atoms of more than 90%, such as more than 95%, such as more than 96%, such as more than 97%, such as more than 98%, such as more than 99%, such as more than 99%.

Item A4178. The composite material of items A20 or B15 where one nanotube is a DNA nanotube and the second nanotube has a percentage of carbon atoms of less than 100%, such as less than 99%, such as less than 98%, such as less than 97%, such as less than 96%, such as less than 95%.

Item A4179. The composite material of items A20 or B15 where one nanotube is a DNA nanotube and the second nanotube has a percentage of carbon atoms of from 95%-96%, from 96% to 97%, from 97% to 98%, from 98% to 99%, from 99% to 100%.

Item A4180. The composite material of items A20 or B15 where one nanotube is a DNA nanotube and the second nanotube has a percentage of functionalization of less than 10%, such as less than 5%, such as less than 4%, such as less than 3%, such as less than 2%, such as less than 1%.

Item A4181. The composite material of items A20 or B15 where one nanotube is a DNA nanotube and the second nanotube has a percentage of functionalization of more than 0%, such as more than 1%, such as more than 2%, such as more than 3%, such as more than 4%, such as more than 5%, such as more than 10%.

Item A4182. The composite material of items A20 or B15 where one nanotube is a DNA nanotube and the second nanotube has a percentage of functionalization of from 0% to 1%, from 1% to 2%, from 2% to 3%, from 3% to 4%, from 4% to 5%, from 5% to 10%.

Item A4183. The composite material of items A20 or B15 where one nanotube is a DNA nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4184. The composite material of items A20 or B15 where one nanotube is a DNA nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4185. The composite material of items A20 or B15 where one nanotube is a DNA nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4186. The composite material of items A20 or B15 where one nanotube is a DNA nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4187. The composite material of items A20 or B15 where one nanotube is a DNA nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4188. The composite material of items A20 or B15 where one nanotube is a DNA nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4189. The composite material of items A20 or B15 where one nanotube is a gold nanotube and the second nanotube is a carbon nanotube.

Item A4190. The composite material of items A20 or B15 where one nanotube is a gold nanotube and the second nanotube is a single wall carbon nanotube.

Item A4191. The composite material of items A20 or B15 where one nanotube is a gold nanotube and the second nanotube is a multi wall carbon nanotube.

Item A4192. The composite material of items A20 or B15 where one nanotube is a gold nanotube and the second nanotube is a metallic carbon nanotube.

Item A4193. The composite material of items A20 or B15 where one nanotube is a gold nanotube and the second nanotube is a semiconductive carbon nanotube.

Item A4194. The composite material of items A20 or B15 where one nanotube is a gold nanotube and the second nanotube is a aluminium nanotube.

Item A4195. The composite material of items A20 or B15 where one nanotube is a gold nanotube and the second nanotube is a aluminum nitride nanotube (AlNNT).

Item A4196. The composite material of items A20 or B15 where one nanotube is a gold nanotube and the second nanotube is a aluminum phosphide nanotube (AlPNT).

Item A4197. The composite material of items A20 or B15 where one nanotube is a gold nanotube and the second nanotube is a bismuth nanotube.

Item A4198. The composite material of items A20 or B15 where one nanotube is a gold nanotube and the second nanotube is a bismuth selenide nanotube.

Item A4199. The composite material of items A20 or B15 where one nanotube is a gold nanotube and the second nanotube is a boron carbon nanotubes (BCNNT).

Item A4200. The composite material of items A20 or B15 where one nanotube is a gold nanotube and the second nanotube is a boron nitride nanotube.

Item A4201. The composite material of items A20 or B15 where one nanotube is a gold nanotube and the second nanotube is a cadmium selenide nanotube.

Item A4202. The composite material of items A20 or B15 where one nanotube is a gold nanotube and the second nanotube is a cobalt selenide nanotube.

Item A4203. The composite material of items A20 or B15 where one nanotube is a gold nanotube and the second nanotube is a copper nanotube.

Item A4204. The composite material of items A20 or B15 where one nanotube is a gold nanotube and the second nanotube is a DNA nanotube.

Item A4205. The composite material of items A20 or B15 where one nanotube is a gold nanotube and the second nanotube is a gallium nitride nanotube (GaNNT).

Item A4206. The composite material of items A20 or B15 where one nanotube is a gold nanotube and the second nanotube is a gallium phosphide nanotube (GaPNT).

Item A4207. The composite material of items A20 or B15 where one nanotube is a gold nanotube and the second nanotube is a gold nanotube.

Item A4208. The composite material of items A20 or B15 where one nanotube is a gold nanotube and the second nanotube is a halide nanotube.

Item A4209. The composite material of items A20 or B15 where one nanotube is a gold nanotube and the second nanotube is a niobium selenide nanotube.

Item A4210. The composite material of items A20 or B15 where one nanotube is a gold nanotube and the second nanotube is a molybdenum disulfide nanotube.

Item A4211. The composite material of items A20 or B15 where one nanotube is a gold nanotube and the second nanotube is a nanotube of transition metal oxides.

Item A4212. The composite material of items A20 or B15 where one nanotube is a gold nanotube and the second nanotube is a nickel chloride nanotube.

Item A4213. The composite material of items A20 or B15 where one nanotube is a gold nanotube and the second nanotube is a platinum nanotube.

Item A4214. The composite material of items A20 or B15 where one nanotube is a gold nanotube and the second nanotube is a protein nanotube.

Item A4215. The composite material of items A20 or B15 where one nanotube is a gold nanotube and the second nanotube is a RNA nanotube.

Item A4216. The composite material of items A20 or B15 where one nanotube is a gold nanotube and the second nanotube is a selenide nanotube.

Item A4217. The composite material of items A20 or B15 where one nanotube is a gold nanotube and the second nanotube is a silicon nanotube.

Item A4218. The composite material of items A20 or B15 where one nanotube is a gold nanotube and the second nanotube is a silver nanotube.

Item A4219. The composite material of items A20 or B15 where one nanotube is a gold nanotube and the second nanotube is a sulphide nanotube.

Item A4220. The composite material of items A20 or B15 where one nanotube is a gold nanotube and the second nanotube is a tin disulfide nanotube.

Item A4221. The composite material of items A20 or B15 where one nanotube is a gold nanotube and the second nanotube is a titanium dioxide nanotube.

Item A4222. The composite material of items A20 or B15 where one nanotube is a gold nanotube and the second nanotube is a titanium oxide nanotube.

Item A4223. The composite material of items A20 or B15 where one nanotube is a gold nanotube and the second nanotube is a tungsten disulfide nanotube.

Item A4224. The composite material of items A20 or B15 where one nanotube is a gold nanotube and the second nanotube is a tungsten sulfide nanotube.

Item A4225. The composite material of items A20 or B15 where one nanotube is a gold nanotube and the second nanotube is a wolfram disulphide nanotube.

Item A4226. The composite material of items A20 or B15 where one nanotube is a gold nanotube and the second nanotube is a zinc ferrite nanotube.

Item A4227. The composite material of items A20 or B15 where one nanotube is a gold nanotube and the second nanotube is a zinc oxide nanotube.

Item A4228. The composite material of items A20 or B15 where one nanotube is a gold nanotube and the second nanotube is a zirconia dioxide nanotube.

Item A4229. The composite material of items A20 or B15 where one nanotube is a gold nanotube and the second nanotube is a nanofiber.

Item A4230. The composite material of items A20 or B15 where one nanotube is a gold nanotube and the second nanotube is a nanothread.

Item A4231. The composite material of items A20 or B15 where one nanotube is a gold nanotube and the second nanotube is a nanorod.

Item A4232. The composite material of items A20 or B15 where one nanotube is a gold nanotube and the second nanotube is a nanoball.

Item A4233. The composite material of items A20 or B15 where one nanotube is a gold nanotube and the second nanotube is a nanobud.

Item A4234. The composite material of items A20 or B15 where one nanotube is a gold nanotube and the second nanotube is a buckyball.

Item A4235. The composite material of items A20 or B15 where one nanotube is a gold nanotube and the second nanotube is a multi wall nanotube.

Item A4236. The composite material of items A20 or B15 where one nanotube is a gold nanotube and the second nanotube is a single wall nanotube.

Item A4237. The composite material of items A20 or B15 where one nanotube is a gold nanotube and the second nanotube has the chirality (n,0) where n=0 to 20.

Item A4238. The composite material of items A20 or B15 where one nanotube is a gold nanotube and the second nanotube has the chirality (n,1) where n=0 to 20.

Item A4239. The composite material of items A20 or B15 where one nanotube is a gold nanotube and the second nanotube has the chirality (n,2) where n=0 to 20.

Item A4240. The composite material of items A20 or B15 where one nanotube is a gold nanotube and the second nanotube has the chirality (n,3) where n=0 to 20.

Item A4241. The composite material of items A20 or B15 where one nanotube is a gold nanotube and the second nanotube has the chirality (n,4) where n=0 to 20.

Item A4242. The composite material of items A20 or B15 where one nanotube is a gold nanotube and the second nanotube has the chirality (n,5) where n=0 to 20.

Item A4243. The composite material of items A20 or B15 where one nanotube is a gold nanotube and the second nanotube has the chirality (n,6) where n=0 to 20.

Item A4244. The composite material of items A20 or B15 where one nanotube is a gold nanotube and the second nanotube has the chirality (n,7) where n=0 to 20.

Item A4245. The composite material of items A20 or B15 where one nanotube is a gold nanotube and the second nanotube has the chirality (n,8) where n=0 to 20.

Item A4246. The composite material of items A20 or B15 where one nanotube is a gold nanotube and the second nanotube has the chirality (n,9) where n=0 to 20.

Item A4247. The composite material of items A20 or B15 where one nanotube is a gold nanotube and the second nanotube has the chirality (n,10) where n=0 to 20.

Item A4248. The composite material of items A20 or B15 where one nanotube is a gold nanotube and the second nanotube has the chirality (n,11) where n=0 to 20.

Item A4249. The composite material of items A20 or B15 where one nanotube is a gold nanotube and the second nanotube has the chirality (n,12) where n=0 to 20.

Item A4250. The composite material of items A20 or B15 where one nanotube is a gold nanotube and the second nanotube has the chirality (n,13) where n=0 to 20.

Item A4251. The composite material of items A20 or B15 where one nanotube is a gold nanotube and the second nanotube has the chirality (n,14) where n=0 to 20.

Item A4252. The composite material of items A20 or B15 where one nanotube is a gold nanotube and the second nanotube has the chirality (n,15) where n=0 to 20.

Item A4253. The composite material of items A20 or B15 where one nanotube is a gold nanotube and the second nanotube has the chirality (n,16) where n=0 to 20.

Item A4254. The composite material of items A20 or B15 where one nanotube is a gold nanotube and the second nanotube has the chirality (n,17) where n=0 to 20.

Item A4255. The composite material of items A20 or B15 where one nanotube is a gold nanotube and the second nanotube has the chirality (n,18) where n=0 to 20.

Item A4256. The composite material of items A20 or B15 where one nanotube is a gold nanotube and the second nanotube has the chirality (n,19) where n=0 to 20.

Item A4257. The composite material of items A20 or B15 where one nanotube is a gold nanotube and the second nanotube has the chirality (n,20) where n=0 to 20.

Item A4258. The composite material of items A20 or B15 where one nanotube is a gold nanotube and the second nanotube has the chirality (0,n) where n=0 to 20.

Item A4259. The composite material of items A20 or B15 where one nanotube is a gold nanotube and the second nanotube has the chirality (1,n) where n=0 to 20.

Item A4260. The composite material of items A20 or B15 where one nanotube is a gold nanotube and the second nanotube has the chirality (2,n) where n=0 to 20.

Item A4261. The composite material of items A20 or B15 where one nanotube is a gold nanotube and the second nanotube has the chirality (3,n) where n=0 to 20.

Item A4262. The composite material of items A20 or B15 where one nanotube is a gold nanotube and the second nanotube has the chirality (4,n) where n=0 to 20.

Item A4263. The composite material of items A20 or B15 where one nanotube is a gold nanotube and the second nanotube has the chirality (5,n) where n=0 to 20.

Item A4264. The composite material of items A20 or B15 where one nanotube is a gold nanotube and the second nanotube has the chirality (6,n) where n=0 to 20.

Item A4265. The composite material of items A20 or B15 where one nanotube is a gold nanotube and the second nanotube has the chirality (7,n) where n=0 to 20.

Item A4266. The composite material of items A20 or B15 where one nanotube is a gold nanotube and the second nanotube has the chirality (8,n) where n=0 to 20.

Item A4267. The composite material of items A20 or B15 where one nanotube is a gold nanotube and the second nanotube has the chirality (9,n) where n=0 to 20.

Item A4268. The composite material of items A20 or B15 where one nanotube is a gold nanotube and the second nanotube has the chirality (10,n) where n=0 to 20.

Item A4269. The composite material of items A20 or B15 where one nanotube is a gold nanotube and the second nanotube has the chirality (11,n) where n=0 to 20.

Item A4270. The composite material of items A20 or B15 where one nanotube is a gold nanotube and the second nanotube has the chirality (12,n) where n=0 to 20.

Item A4271. The composite material of items A20 or B15 where one nanotube is a gold nanotube and the second nanotube has the chirality (13,n) where n=0 to 20.

Item A4272. The composite material of items A20 or B15 where one nanotube is a gold nanotube and the second nanotube has the chirality (14,n) where n=0 to 20.

Item A4273. The composite material of items A20 or B15 where one nanotube is a gold nanotube and the second nanotube has the chirality (15,n) where n=0 to 20.

Item A4274. The composite material of items A20 or B15 where one nanotube is a gold nanotube and the second nanotube has the chirality (16,n) where n=0 to 20.

Item A4275. The composite material of items A20 or B15 where one nanotube is a gold nanotube and the second nanotube has the chirality (17,n) where n=0 to 20.

Item A4276. The composite material of items A20 or B15 where one nanotube is a gold nanotube and the second nanotube has the chirality (18,n) where n=0 to 20.

Item A4277. The composite material of items A20 or B15 where one nanotube is a gold nanotube and the second nanotube has the chirality (19,n) where n=0 to 20.

Item A4278. The composite material of items A20 or B15 where one nanotube is a gold nanotube and the second nanotube has the chirality (20,n) where n=0 to 20.

Item A4279. The composite material of items A20 or B15 where one nanotube is a gold nanotube and the second nanotube has a percentage of sp2 bonds of more than 90%, such as more than 95%, such as more than 96%, such as more than 97%, such as more than 98%, such as more than 99%, such as more than 99%.

Item A4280. The composite material of items A20 or B15 where one nanotube is a gold nanotube and the second nanotube has a percentage of sp2 bonds of less than 100%, such as less than 99%, such as less than 98%, such as less than 97%, such as less than 96%, such as less than 95%.

Item A4281. The composite material of items A20 or B15 where one nanotube is a gold nanotube and the second nanotube has a percentage of sp2 bonds of from 95%-96%, from 96% to 97%, from 97% to 98%, from 98% to 99%, from 99% to 100%.

Item A4282. The composite material of items A20 or B15 where one nanotube is a gold nanotube and the second nanotube has a percentage of carbon atoms of more than 90%, such as more than 95%, such as more than 96%, such as more than 97%, such as more than 98%, such as more than 99%, such as more than 99%.

Item A4283. The composite material of items A20 or B15 where one nanotube is a gold nanotube and the second nanotube has a percentage of carbon atoms of less than 100%, such as less than 99%, such as less than 98%, such as less than 97%, such as less than 96%, such as less than 95%.

Item A4284. The composite material of items A20 or B15 where one nanotube is a gold nanotube and the second nanotube has a percentage of carbon atoms of from 95%-96%, from 96% to 97%, from 97% to 98%, from 98% to 99%, from 99% to 100%.

Item A4285. The composite material of items A20 or B15 where one nanotube is a gold nanotube and the second nanotube has a percentage of functionalization of less than 10%, such as less than 5%, such as less than 4%, such as less than 3%, such as less than 2%, such as less than 1%.

Item A4286. The composite material of items A20 or B15 where one nanotube is a gold nanotube and the second nanotube has a percentage of functionalization of more than 0%, such as more than 1%, such as more than 2%, such as more than 3%, such as more than 4%, such as more than 5%, such as more than 10%.

Item A4287. The composite material of items A20 or B15 where one nanotube is a gold nanotube and the second nanotube has a percentage of functionalization of from 0% to 1%, from 1% to 2%, from 2% to 3%, from 3% to 4%, from 4% to 5%, from 5% to 10%.

Item A4288. The composite material of items A20 or B15 where one nanotube is a gold nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4289. The composite material of items A20 or B15 where one nanotube is a gold nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4290. The composite material of items A20 or B15 where one nanotube is a gold nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4291. The composite material of items A20 or B15 where one nanotube is a gold nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4292. The composite material of items A20 or B15 where one nanotube is a gold nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4293. The composite material of items A20 or B15 where one nanotube is a gold nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4294. The composite material of items A20 or B15 where one nanotube is a platinum nanotube and the second nanotube is a carbon nanotube.

Item A4295. The composite material of items A20 or B15 where one nanotube is a platinum nanotube and the second nanotube is a single wall carbon nanotube.

Item A4296. The composite material of items A20 or B15 where one nanotube is a platinum nanotube and the second nanotube is a multi wall carbon nanotube.

Item A4297. The composite material of items A20 or B15 where one nanotube is a platinum nanotube and the second nanotube is a metallic carbon nanotube.

Item A4298. The composite material of items A20 or B15 where one nanotube is a platinum nanotube and the second nanotube is a semiconductive carbon nanotube.

Item A4299. The composite material of items A20 or B15 where one nanotube is a platinum nanotube and the second nanotube is a aluminium nanotube.

Item A4300. The composite material of items A20 or B15 where one nanotube is a platinum nanotube and the second nanotube is a aluminum nitride nanotube (AlNNT).

Item A4301. The composite material of items A20 or B15 where one nanotube is a platinum nanotube and the second nanotube is a aluminum phosphide nanotube (AlPNT).

Item A4302. The composite material of items A20 or B15 where one nanotube is a platinum nanotube and the second nanotube is a bismuth nanotube.

Item A4303. The composite material of items A20 or B15 where one nanotube is a platinum nanotube and the second nanotube is a bismuth selenide nanotube.

Item A4304. The composite material of items A20 or B15 where one nanotube is a platinum nanotube and the second nanotube is a boron carbon nanotubes (BCNNT).

Item A4305. The composite material of items A20 or B15 where one nanotube is a platinum nanotube and the second nanotube is a boron nitride nanotube.

Item A4306. The composite material of items A20 or B15 where one nanotube is a platinum nanotube and the second nanotube is a cadmium selenide nanotube.

Item A4307. The composite material of items A20 or B15 where one nanotube is a platinum nanotube and the second nanotube is a cobalt selenide nanotube.

Item A4308. The composite material of items A20 or B15 where one nanotube is a platinum nanotube and the second nanotube is a copper nanotube.

Item A4309. The composite material of items A20 or B15 where one nanotube is a platinum nanotube and the second nanotube is a DNA nanotube.

Item A4310. The composite material of items A20 or B15 where one nanotube is a platinum nanotube and the second nanotube is a gallium nitride nanotube (GaNNT).

Item A4311. The composite material of items A20 or B15 where one nanotube is a platinum nanotube and the second nanotube is a gallium phosphide nanotube (GaPNT).

Item A4312. The composite material of items A20 or B15 where one nanotube is a platinum nanotube and the second nanotube is a gold nanotube.

Item A4313. The composite material of items A20 or B15 where one nanotube is a platinum nanotube and the second nanotube is a halide nanotube.

Item A4314. The composite material of items A20 or B15 where one nanotube is a platinum nanotube and the second nanotube is a niobium selenide nanotube.

Item A4315. The composite material of items A20 or B15 where one nanotube is a platinum nanotube and the second nanotube is a molybdenum disulfide nanotube.

Item A4316. The composite material of items A20 or B15 where one nanotube is a platinum nanotube and the second nanotube is a nanotube of transition metal oxides.

Item A4317. The composite material of items A20 or B15 where one nanotube is a platinum nanotube and the second nanotube is a nickel chloride nanotube.

Item A4318. The composite material of items A20 or B15 where one nanotube is a platinum nanotube and the second nanotube is a platinum nanotube.

Item A4319. The composite material of items A20 or B15 where one nanotube is a platinum nanotube and the second nanotube is a protein nanotube.

Item A4320. The composite material of items A20 or B15 where one nanotube is a platinum nanotube and the second nanotube is a RNA nanotube.

Item A4321. The composite material of items A20 or B15 where one nanotube is a platinum nanotube and the second nanotube is a selenide nanotube.

Item A4322. The composite material of items A20 or B15 where one nanotube is a platinum nanotube and the second nanotube is a silicon nanotube.

Item A4323. The composite material of items A20 or B15 where one nanotube is a platinum nanotube and the second nanotube is a silver nanotube.

Item A4324. The composite material of items A20 or B15 where one nanotube is a platinum nanotube and the second nanotube is a sulphide nanotube.

Item A4325. The composite material of items A20 or B15 where one nanotube is a platinum nanotube and the second nanotube is a tin disulfide nanotube.

Item A4326. The composite material of items A20 or B15 where one nanotube is a platinum nanotube and the second nanotube is a titanium dioxide nanotube.

Item A4327. The composite material of items A20 or B15 where one nanotube is a platinum nanotube and the second nanotube is a titanium oxide nanotube.

Item A4328. The composite material of items A20 or B15 where one nanotube is a platinum nanotube and the second nanotube is a tungsten disulfide nanotube.

Item A4329. The composite material of items A20 or B15 where one nanotube is a platinum nanotube and the second nanotube is a tungsten sulfide nanotube.

Item A4330. The composite material of items A20 or B15 where one nanotube is a platinum nanotube and the second nanotube is a wolfram disulphide nanotube.

Item A4331. The composite material of items A20 or B15 where one nanotube is a platinum nanotube and the second nanotube is a zinc ferrite nanotube.

Item A4332. The composite material of items A20 or B15 where one nanotube is a platinum nanotube and the second nanotube is a zinc oxide nanotube.

Item A4333. The composite material of items A20 or B15 where one nanotube is a platinum nanotube and the second nanotube is a zirconia dioxide nanotube.

Item A4334. The composite material of items A20 or B15 where one nanotube is a platinum nanotube and the second nanotube is a nanofiber.

Item A4335. The composite material of items A20 or B15 where one nanotube is a platinum nanotube and the second nanotube is a nanothread.

Item A4336. The composite material of items A20 or B15 where one nanotube is a platinum nanotube and the second nanotube is a nanorod.

Item A4337. The composite material of items A20 or B15 where one nanotube is a platinum nanotube and the second nanotube is a nanoball.

Item A4338. The composite material of items A20 or B15 where one nanotube is a platinum nanotube and the second nanotube is a nanobud.

Item A4339. The composite material of items A20 or B15 where one nanotube is a platinum nanotube and the second nanotube is a buckyball.

Item A4340. The composite material of items A20 or B15 where one nanotube is a platinum nanotube and the second nanotube is a multi wall nanotube.

Item A4341. The composite material of items A20 or B15 where one nanotube is a platinum nanotube and the second nanotube is a single wall nanotube.

Item A4342. The composite material of items A20 or B15 where one nanotube is a platinum nanotube and the second nanotube has the chirality (n,0) where n=0 to 20.

Item A4343. The composite material of items A20 or B15 where one nanotube is a platinum nanotube and the second nanotube has the chirality (n,1) where n=0 to 20.

Item A4344. The composite material of items A20 or B15 where one nanotube is a platinum nanotube and the second nanotube has the chirality (n,2) where n=0 to 20.

Item A4345. The composite material of items A20 or B15 where one nanotube is a platinum nanotube and the second nanotube has the chirality (n,3) where n=0 to 20.

Item A4346. The composite material of items A20 or B15 where one nanotube is a platinum nanotube and the second nanotube has the chirality (n,4) where n=0 to 20.

Item A4347. The composite material of items A20 or B15 where one nanotube is a platinum nanotube and the second nanotube has the chirality (n,5) where n=0 to 20.

Item A4348. The composite material of items A20 or B15 where one nanotube is a platinum nanotube and the second nanotube has the chirality (n,6) where n=0 to 20.

Item A4349. The composite material of items A20 or B15 where one nanotube is a platinum nanotube and the second nanotube has the chirality (n,7) where n=0 to 20.

Item A4350. The composite material of items A20 or B15 where one nanotube is a platinum nanotube and the second nanotube has the chirality (n,8) where n=0 to 20.

Item A4351. The composite material of items A20 or B15 where one nanotube is a platinum nanotube and the second nanotube has the chirality (n,9) where n=0 to 20.

Item A4352. The composite material of items A20 or B15 where one nanotube is a platinum nanotube and the second nanotube has the chirality (n,10) where n=0 to 20.

Item A4353. The composite material of items A20 or B15 where one nanotube is a platinum nanotube and the second nanotube has the chirality (n,11) where n=0 to 20.

Item A4354. The composite material of items A20 or B15 where one nanotube is a platinum nanotube and the second nanotube has the chirality (n,12) where n=0 to 20.

Item A4355. The composite material of items A20 or B15 where one nanotube is a platinum nanotube and the second nanotube has the chirality (n,13) where n=0 to 20.

Item A4356. The composite material of items A20 or B15 where one nanotube is a platinum nanotube and the second nanotube has the chirality (n,14) where n=0 to 20.

Item A4357. The composite material of items A20 or B15 where one nanotube is a platinum nanotube and the second nanotube has the chirality (n,15) where n=0 to 20.

Item A4358. The composite material of items A20 or B15 where one nanotube is a platinum nanotube and the second nanotube has the chirality (n,16) where n=0 to 20.

Item A4359. The composite material of items A20 or B15 where one nanotube is a platinum nanotube and the second nanotube has the chirality (n,17) where n=0 to 20.

Item A4360. The composite material of items A20 or B15 where one nanotube is a platinum nanotube and the second nanotube has the chirality (n,18) where n=0 to 20.

Item A4361. The composite material of items A20 or B15 where one nanotube is a platinum nanotube and the second nanotube has the chirality (n,19) where n=0 to 20.

Item A4362. The composite material of items A20 or B15 where one nanotube is a platinum nanotube and the second nanotube has the chirality (n,20) where n=0 to 20.

Item A4363. The composite material of items A20 or B15 where one nanotube is a platinum nanotube and the second nanotube has the chirality (0,n) where n=0 to 20.

Item A4364. The composite material of items A20 or B15 where one nanotube is a platinum nanotube and the second nanotube has the chirality (1,n) where n=0 to 20.

Item A4365. The composite material of items A20 or B15 where one nanotube is a platinum nanotube and the second nanotube has the chirality (2,n) where n=0 to 20.

Item A4366. The composite material of items A20 or B15 where one nanotube is a platinum nanotube and the second nanotube has the chirality (3,n) where n=0 to 20.

Item A4367. The composite material of items A20 or B15 where one nanotube is a platinum nanotube and the second nanotube has the chirality (4,n) where n=0 to 20.

Item A4368. The composite material of items A20 or B15 where one nanotube is a platinum nanotube and the second nanotube has the chirality (5,n) where n=0 to 20.

Item A4369. The composite material of items A20 or B15 where one nanotube is a platinum nanotube and the second nanotube has the chirality (6,n) where n=0 to 20.

Item A4370. The composite material of items A20 or B15 where one nanotube is a platinum nanotube and the second nanotube has the chirality (7,n) where n=0 to 20.

Item A4371. The composite material of items A20 or B15 where one nanotube is a platinum nanotube and the second nanotube has the chirality (8,n) where n=0 to 20.

Item A4372. The composite material of items A20 or B15 where one nanotube is a platinum nanotube and the second nanotube has the chirality (9,n) where n=0 to 20.

Item A4373. The composite material of items A20 or B15 where one nanotube is a platinum nanotube and the second nanotube has the chirality (10,n) where n=0 to 20.

Item A4374. The composite material of items A20 or B15 where one nanotube is a platinum nanotube and the second nanotube has the chirality (11,n) where n=0 to 20.

Item A4375. The composite material of items A20 or B15 where one nanotube is a platinum nanotube and the second nanotube has the chirality (12,n) where n=0 to 20.

Item A4376. The composite material of items A20 or B15 where one nanotube is a platinum nanotube and the second nanotube has the chirality (13,n) where n=0 to 20.

Item A4377. The composite material of items A20 or B15 where one nanotube is a platinum nanotube and the second nanotube has the chirality (14,n) where n=0 to 20.

Item A4378. The composite material of items A20 or B15 where one nanotube is a platinum nanotube and the second nanotube has the chirality (15,n) where n=0 to 20.

Item A4379. The composite material of items A20 or B15 where one nanotube is a platinum nanotube and the second nanotube has the chirality (16,n) where n=0 to 20.

Item A4380. The composite material of items A20 or B15 where one nanotube is a platinum nanotube and the second nanotube has the chirality (17,n) where n=0 to 20.

Item A4381. The composite material of items A20 or B15 where one nanotube is a platinum nanotube and the second nanotube has the chirality (18,n) where n=0 to 20.

Item A4382. The composite material of items A20 or B15 where one nanotube is a platinum nanotube and the second nanotube has the chirality (19,n) where n=0 to 20.

Item A4383. The composite material of items A20 or B15 where one nanotube is a platinum nanotube and the second nanotube has the chirality (20,n) where n=0 to 20.

Item A4384. The composite material of items A20 or B15 where one nanotube is a platinum nanotube and the second nanotube has a percentage of sp2 bonds of more than 90%, such as more than 95%, such as more than 96%, such as more than 97%, such as more than 98%, such as more than 99%, such as more than 99%.

Item A4385. The composite material of items A20 or B15 where one nanotube is a platinum nanotube and the second nanotube has a percentage of sp2 bonds of less than 100%, such as less than 99%, such as less than 98%, such as less than 97%, such as less than 96%, such as less than 95%.

Item A4386. The composite material of items A20 or B15 where one nanotube is a platinum nanotube and the second nanotube has a percentage of sp2 bonds of from 95%-96%, from 96% to 97%, from 97% to 98%, from 98% to 99%, from 99% to 100%.

Item A4387. The composite material of items A20 or B15 where one nanotube is a platinum nanotube and the second nanotube has a percentage of carbon atoms of more than 90%, such as more than 95%, such as more than 96%, such as more than 97%, such as more than 98%, such as more than 99%, such as more than 99%.

Item A4388. The composite material of items A20 or B15 where one nanotube is a platinum nanotube and the second nanotube has a percentage of carbon atoms of less than 100%, such as less than 99%, such as less than 98%, such as less than 97%, such as less than 96%, such as less than 95%.

Item A4389. The composite material of items A20 or B15 where one nanotube is a platinum nanotube and the second nanotube has a percentage of carbon atoms of from 95%-96%, from 96% to 97%, from 97% to 98%, from 98% to 99%, from 99% to 100%.

Item A4390. The composite material of items A20 or B15 where one nanotube is a platinum nanotube and the second nanotube has a percentage of functionalization of less than 10%, such as less than 5%, such as less than 4%, such as less than 3%, such as less than 2%, such as less than 1%.

Item A4391. The composite material of items A20 or B15 where one nanotube is a platinum nanotube and the second nanotube has a percentage of functionalization of more than 0%, such as more than 1%, such as more than 2%, such as more than 3%, such as more than 4%, such as more than 5%, such as more than 10%.

Item A4392. The composite material of items A20 or B15 where one nanotube is a platinum nanotube and the second nanotube has a percentage of functionalization of from 0% to 1%, from 1% to 2%, from 2% to 3%, from 3% to 4%, from 4% to 5%, from 5% to 10%.

Item A4393. The composite material of items A20 or B15 where one nanotube is a platinum nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4394. The composite material of items A20 or B15 where one nanotube is a platinum nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4395. The composite material of items A20 or B15 where one nanotube is a platinum nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4396. The composite material of items A20 or B15 where one nanotube is a platinum nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4397. The composite material of items A20 or B15 where one nanotube is a platinum nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4398. The composite material of items A20 or B15 where one nanotube is a platinum nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4399. The composite material of items A20 or B15 where one nanotube is a protein nanotube and the second nanotube is a carbon nanotube.

Item A4400. The composite material of items A20 or B15 where one nanotube is a protein nanotube and the second nanotube is a single wall carbon nanotube.

Item A4401. The composite material of items A20 or B15 where one nanotube is a protein nanotube and the second nanotube is a multi wall carbon nanotube.

Item A4402. The composite material of items A20 or B15 where one nanotube is a protein nanotube and the second nanotube is a metallic carbon nanotube.

Item A4403. The composite material of items A20 or B15 where one nanotube is a protein nanotube and the second nanotube is a semiconductive carbon nanotube.

Item A4404. The composite material of items A20 or B15 where one nanotube is a protein nanotube and the second nanotube is a aluminium nanotube.

Item A4405. The composite material of items A20 or B15 where one nanotube is a protein nanotube and the second nanotube is a aluminum nitride nanotube (AlNNT).

Item A4406. The composite material of items A20 or B15 where one nanotube is a protein nanotube and the second nanotube is a aluminum phosphide nanotube (AlPNT).

Item A4407. The composite material of items A20 or B15 where one nanotube is a protein nanotube and the second nanotube is a bismuth nanotube.

Item A4408. The composite material of items A20 or B15 where one nanotube is a protein nanotube and the second nanotube is a bismuth selenide nanotube.

Item A4409. The composite material of items A20 or B15 where one nanotube is a protein nanotube and the second nanotube is a boron carbon nanotubes (BCNNT).

Item A4410. The composite material of items A20 or B15 where one nanotube is a protein nanotube and the second nanotube is a boron nitride nanotube.

Item A4411. The composite material of items A20 or B15 where one nanotube is a protein nanotube and the second nanotube is a cadmium selenide nanotube.

Item A4412. The composite material of items A20 or B15 where one nanotube is a protein nanotube and the second nanotube is a cobalt selenide nanotube.

Item A4413. The composite material of items A20 or B15 where one nanotube is a protein nanotube and the second nanotube is a copper nanotube.

Item A4414. The composite material of items A20 or B15 where one nanotube is a protein nanotube and the second nanotube is a DNA nanotube.

Item A4415. The composite material of items A20 or B15 where one nanotube is a protein nanotube and the second nanotube is a gallium nitride nanotube (GaNNT).

Item A4416. The composite material of items A20 or B15 where one nanotube is a protein nanotube and the second nanotube is a gallium phosphide nanotube (GaPNT).

Item A4417. The composite material of items A20 or B15 where one nanotube is a protein nanotube and the second nanotube is a gold nanotube.

Item A4418. The composite material of items A20 or B15 where one nanotube is a protein nanotube and the second nanotube is a halide nanotube.

Item A4419. The composite material of items A20 or B15 where one nanotube is a protein nanotube and the second nanotube is a niobium selenide nanotube.

Item A4420. The composite material of items A20 or B15 where one nanotube is a protein nanotube and the second nanotube is a molybdenum disulfide nanotube.

Item A4421. The composite material of items A20 or B15 where one nanotube is a protein nanotube and the second nanotube is a nanotube of transition metal oxides.

Item A4422. The composite material of items A20 or B15 where one nanotube is a protein nanotube and the second nanotube is a nickel chloride nanotube.

Item A4423. The composite material of items A20 or B15 where one nanotube is a protein nanotube and the second nanotube is a platinum nanotube.

Item A4424. The composite material of items A20 or B15 where one nanotube is a protein nanotube and the second nanotube is a protein nanotube.

Item A4425. The composite material of items A20 or B15 where one nanotube is a protein nanotube and the second nanotube is a RNA nanotube.

Item A4426. The composite material of items A20 or B15 where one nanotube is a protein nanotube and the second nanotube is a selenide nanotube.

Item A4427. The composite material of items A20 or B15 where one nanotube is a protein nanotube and the second nanotube is a silicon nanotube.

Item A4428. The composite material of items A20 or B15 where one nanotube is a protein nanotube and the second nanotube is a silver nanotube.

Item A4429. The composite material of items A20 or B15 where one nanotube is a protein nanotube and the second nanotube is a sulphide nanotube.

Item A4430. The composite material of items A20 or B15 where one nanotube is a protein nanotube and the second nanotube is a tin disulfide nanotube.

Item A4431. The composite material of items A20 or B15 where one nanotube is a protein nanotube and the second nanotube is a titanium dioxide nanotube.

Item A4432. The composite material of items A20 or B15 where one nanotube is a protein nanotube and the second nanotube is a titanium oxide nanotube.

Item A4433. The composite material of items A20 or B15 where one nanotube is a protein nanotube and the second nanotube is a tungsten disulfide nanotube.

Item A4434. The composite material of items A20 or B15 where one nanotube is a protein nanotube and the second nanotube is a tungsten sulfide nanotube.

Item A4435. The composite material of items A20 or B15 where one nanotube is a protein nanotube and the second nanotube is a wolfram disulphide nanotube.

Item A4436. The composite material of items A20 or B15 where one nanotube is a protein nanotube and the second nanotube is a zinc ferrite nanotube.

Item A4437. The composite material of items A20 or B15 where one nanotube is a protein nanotube and the second nanotube is a zinc oxide nanotube.

Item A4438. The composite material of items A20 or B15 where one nanotube is a protein nanotube and the second nanotube is a zirconia dioxide nanotube.

Item A4439. The composite material of items A20 or B15 where one nanotube is a protein nanotube and the second nanotube is a nanofiber.

Item A4440. The composite material of items A20 or B15 where one nanotube is a protein nanotube and the second nanotube is a nanothread.

Item A4441. The composite material of items A20 or B15 where one nanotube is a protein nanotube and the second nanotube is a nanorod.

Item A4442. The composite material of items A20 or B15 where one nanotube is a protein nanotube and the second nanotube is a nanoball.

Item A4443. The composite material of items A20 or B15 where one nanotube is a protein nanotube and the second nanotube is a nanobud.

Item A4444. The composite material of items A20 or B15 where one nanotube is a protein nanotube and the second nanotube is a buckyball.

Item A4445. The composite material of items A20 or B15 where one nanotube is a protein nanotube and the second nanotube is a multi wall nanotube.

Item A4446. The composite material of items A20 or B15 where one nanotube is a protein nanotube and the second nanotube is a single wall nanotube.

Item A4447. The composite material of items A20 or B15 where one nanotube is a protein nanotube and the second nanotube has the chirality (n,0) where n=0 to 20.

Item A4448. The composite material of items A20 or B15 where one nanotube is a protein nanotube and the second nanotube has the chirality (n,1) where n=0 to 20.

Item A4449. The composite material of items A20 or B15 where one nanotube is a protein nanotube and the second nanotube has the chirality (n,2) where n=0 to 20.

Item A4450. The composite material of items A20 or B15 where one nanotube is a protein nanotube and the second nanotube has the chirality (n,3) where n=0 to 20.

Item A4451. The composite material of items A20 or B15 where one nanotube is a protein nanotube and the second nanotube has the chirality (n,4) where n=0 to 20.

Item A4452. The composite material of items A20 or B15 where one nanotube is a protein nanotube and the second nanotube has the chirality (n,5) where n=0 to 20.

Item A4453. The composite material of items A20 or B15 where one nanotube is a protein nanotube and the second nanotube has the chirality (n,6) where n=0 to 20.

Item A4454. The composite material of items A20 or B15 where one nanotube is a protein nanotube and the second nanotube has the chirality (n,7) where n=0 to 20.

Item A4455. The composite material of items A20 or B15 where one nanotube is a protein nanotube and the second nanotube has the chirality (n,8) where n=0 to 20.

Item A4456. The composite material of items A20 or B15 where one nanotube is a protein nanotube and the second nanotube has the chirality (n,9) where n=0 to 20.

Item A4457. The composite material of items A20 or B15 where one nanotube is a protein nanotube and the second nanotube has the chirality (n,10) where n=0 to 20.

Item A4458. The composite material of items A20 or B15 where one nanotube is a protein nanotube and the second nanotube has the chirality (n,11) where n=0 to 20.

Item A4459. The composite material of items A20 or B15 where one nanotube is a protein nanotube and the second nanotube has the chirality (n,12) where n=0 to 20.

Item A4460. The composite material of items A20 or B15 where one nanotube is a protein nanotube and the second nanotube has the chirality (n,13) where n=0 to 20.

Item A4461. The composite material of items A20 or B15 where one nanotube is a protein nanotube and the second nanotube has the chirality (n,14) where n=0 to 20.

Item A4462. The composite material of items A20 or B15 where one nanotube is a protein nanotube and the second nanotube has the chirality (n,15) where n=0 to 20.

Item A4463. The composite material of items A20 or B15 where one nanotube is a protein nanotube and the second nanotube has the chirality (n,16) where n=0 to 20.

Item A4464. The composite material of items A20 or B15 where one nanotube is a protein nanotube and the second nanotube has the chirality (n,17) where n=0 to 20.

Item A4465. The composite material of items A20 or B15 where one nanotube is a protein nanotube and the second nanotube has the chirality (n,18) where n=0 to 20.

Item A4466. The composite material of items A20 or B15 where one nanotube is a protein nanotube and the second nanotube has the chirality (n,19) where n=0 to 20.

Item A4467. The composite material of items A20 or B15 where one nanotube is a protein nanotube and the second nanotube has the chirality (n,20) where n=0 to 20.

Item A4468. The composite material of items A20 or B15 where one nanotube is a protein nanotube and the second nanotube has the chirality (0,n) where n=0 to 20.

Item A4469. The composite material of items A20 or B15 where one nanotube is a protein nanotube and the second nanotube has the chirality (1,n) where n=0 to 20.

Item A4470. The composite material of items A20 or B15 where one nanotube is a protein nanotube and the second nanotube has the chirality (2,n) where n=0 to 20.

Item A4471. The composite material of items A20 or B15 where one nanotube is a protein nanotube and the second nanotube has the chirality (3,n) where n=0 to 20.

Item A4472. The composite material of items A20 or B15 where one nanotube is a protein nanotube and the second nanotube has the chirality (4,n) where n=0 to 20.

Item A4473. The composite material of items A20 or B15 where one nanotube is a protein nanotube and the second nanotube has the chirality (5,n) where n=0 to 20.

Item A4474. The composite material of items A20 or B15 where one nanotube is a protein nanotube and the second nanotube has the chirality (6,n) where n=0 to 20.

Item A4475. The composite material of items A20 or B15 where one nanotube is a protein nanotube and the second nanotube has the chirality (7,n) where n=0 to 20.

Item A4476. The composite material of items A20 or B15 where one nanotube is a protein nanotube and the second nanotube has the chirality (8,n) where n=0 to 20.

Item A4477. The composite material of items A20 or B15 where one nanotube is a protein nanotube and the second nanotube has the chirality (9,n) where n=0 to 20.

Item A4478. The composite material of items A20 or B15 where one nanotube is a protein nanotube and the second nanotube has the chirality (10,n) where n=0 to 20.

Item A4479. The composite material of items A20 or B15 where one nanotube is a protein nanotube and the second nanotube has the chirality (11,n) where n=0 to 20.

Item A4480. The composite material of items A20 or B15 where one nanotube is a protein nanotube and the second nanotube has the chirality (12,n) where n=0 to 20.

Item A4481. The composite material of items A20 or B15 where one nanotube is a protein nanotube and the second nanotube has the chirality (13,n) where n=0 to 20.

Item A4482. The composite material of items A20 or B15 where one nanotube is a protein nanotube and the second nanotube has the chirality (14,n) where n=0 to 20.

Item A4483. The composite material of items A20 or B15 where one nanotube is a protein nanotube and the second nanotube has the chirality (15,n) where n=0 to 20.

Item A4484. The composite material of items A20 or B15 where one nanotube is a protein nanotube and the second nanotube has the chirality (16,n) where n=0 to 20.

Item A4485. The composite material of items A20 or B15 where one nanotube is a protein nanotube and the second nanotube has the chirality (17,n) where n=0 to 20.

Item A4486. The composite material of items A20 or B15 where one nanotube is a protein nanotube and the second nanotube has the chirality (18,n) where n=0 to 20.

Item A4487. The composite material of items A20 or B15 where one nanotube is a protein nanotube and the second nanotube has the chirality (19,n) where n=0 to 20.

Item A4488. The composite material of items A20 or B15 where one nanotube is a protein nanotube and the second nanotube has the chirality (20,n) where n=0 to 20.

Item A4489. The composite material of items A20 or B15 where one nanotube is a protein nanotube and the second nanotube has a percentage of sp2 bonds of more than 90%, such as more than 95%, such as more than 96%, such as more than 97%, such as more than 98%, such as more than 99%, such as more than 99%.

Item A4490. The composite material of items A20 or B15 where one nanotube is a protein nanotube and the second nanotube has a percentage of sp2 bonds of less than 100%, such as less than 99%, such as less than 98%, such as less than 97%, such as less than 96%, such as less than 95%.

Item A4491. The composite material of items A20 or B15 where one nanotube is a protein nanotube and the second nanotube has a percentage of sp2 bonds of from 95%-96%, from 96% to 97%, from 97% to 98%, from 98% to 99%, from 99% to 100%.

Item A4492. The composite material of items A20 or B15 where one nanotube is a protein nanotube and the second nanotube has a percentage of carbon atoms of more than 90%, such as more than 95%, such as more than 96%, such as more than 97%, such as more than 98%, such as more than 99%, such as more than 99%.

Item A4493. The composite material of items A20 or B15 where one nanotube is a protein nanotube and the second nanotube has a percentage of carbon atoms of less than 100%, such as less than 99%, such as less than 98%, such as less than 97%, such as less than 96%, such as less than 95%.

Item A4494. The composite material of items A20 or B15 where one nanotube is a protein nanotube and the second nanotube has a percentage of carbon atoms of from 95%-96%, from 96% to 97%, from 97% to 98%, from 98% to 99%, from 99% to 100%.

Item A4495. The composite material of items A20 or B15 where one nanotube is a protein nanotube and the second nanotube has a percentage of functionalization of less than 10%, such as less than 5%, such as less than 4%, such as less than 3%, such as less than 2%, such as less than 1%.

Item A4496. The composite material of items A20 or B15 where one nanotube is a protein nanotube and the second nanotube has a percentage of functionalization of more than 0%, such as more than 1%, such as more than 2%, such as more than 3%, such as more than 4%, such as more than 5%, such as more than 10%.

Item A4497. The composite material of items A20 or B15 where one nanotube is a protein nanotube and the second nanotube has a percentage of functionalization of from 0% to 1%, from 1% to 2%, from 2% to 3%, from 3% to 4%, from 4% to 5%, from 5% to 10%.

Item A4498. The composite material of items A20 or B15 where one nanotube is a protein nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4499. The composite material of items A20 or B15 where one nanotube is a protein nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4500. The composite material of items A20 or B15 where one nanotube is a protein nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4501. The composite material of items A20 or B15 where one nanotube is a protein nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4502. The composite material of items A20 or B15 where one nanotube is a protein nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4503. The composite material of items A20 or B15 where one nanotube is a protein nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4504. The composite material of items A20 or B15 where one nanotube is a RNA nanotube and the second nanotube is a carbon nanotube.

Item A4505. The composite material of items A20 or B15 where one nanotube is a RNA nanotube and the second nanotube is a single wall carbon nanotube.

Item A4506. The composite material of items A20 or B15 where one nanotube is a RNA nanotube and the second nanotube is a multi wall carbon nanotube.

Item A4507. The composite material of items A20 or B15 where one nanotube is a RNA nanotube and the second nanotube is a metallic carbon nanotube.

Item A4508. The composite material of items A20 or B15 where one nanotube is a RNA nanotube and the second nanotube is a semiconductive carbon nanotube.

Item A4509. The composite material of items A20 or B15 where one nanotube is a RNA nanotube and the second nanotube is a aluminium nanotube.

Item A4510. The composite material of items A20 or B15 where one nanotube is a RNA nanotube and the second nanotube is a aluminum nitride nanotube (AlNNT).

Item A4511. The composite material of items A20 or B15 where one nanotube is a RNA nanotube and the second nanotube is a aluminum phosphide nanotube (AlPNT).

Item A4512. The composite material of items A20 or B15 where one nanotube is a RNA nanotube and the second nanotube is a bismuth nanotube.

Item A4513. The composite material of items A20 or B15 where one nanotube is a RNA nanotube and the second nanotube is a bismuth selenide nanotube.

Item A4514. The composite material of items A20 or B15 where one nanotube is a RNA nanotube and the second nanotube is a boron carbon nanotubes (BCNNT).

Item A4515. The composite material of items A20 or B15 where one nanotube is a RNA nanotube and the second nanotube is a boron nitride nanotube.

Item A4516. The composite material of items A20 or B15 where one nanotube is a RNA nanotube and the second nanotube is a cadmium selenide nanotube.

Item A4517. The composite material of items A20 or B15 where one nanotube is a RNA nanotube and the second nanotube is a cobalt selenide nanotube.

Item A4518. The composite material of items A20 or B15 where one nanotube is a RNA nanotube and the second nanotube is a copper nanotube.

Item A4519. The composite material of items A20 or B15 where one nanotube is a RNA nanotube and the second nanotube is a DNA nanotube.

Item A4520. The composite material of items A20 or B15 where one nanotube is a RNA nanotube and the second nanotube is a gallium nitride nanotube (GaNNT).

Item A4521. The composite material of items A20 or B15 where one nanotube is a RNA nanotube and the second nanotube is a gallium phosphide nanotube (GaPNT).

Item A4522. The composite material of items A20 or B15 where one nanotube is a RNA nanotube and the second nanotube is a gold nanotube.

Item A4523. The composite material of items A20 or B15 where one nanotube is a RNA nanotube and the second nanotube is a halide nanotube.

Item A4524. The composite material of items A20 or B15 where one nanotube is a RNA nanotube and the second nanotube is a niobium selenide nanotube.

Item A4525. The composite material of items A20 or B15 where one nanotube is a RNA nanotube and the second nanotube is a molybdenum disulfide nanotube.

Item A4526. The composite material of items A20 or B15 where one nanotube is a RNA nanotube and the second nanotube is a nanotube of transition metal oxides.

Item A4527. The composite material of items A20 or B15 where one nanotube is a RNA nanotube and the second nanotube is a nickel chloride nanotube.

Item A4528. The composite material of items A20 or B15 where one nanotube is a RNA nanotube and the second nanotube is a platinum nanotube.

Item A4529. The composite material of items A20 or B15 where one nanotube is a RNA nanotube and the second nanotube is a protein nanotube.

Item A4530. The composite material of items A20 or B15 where one nanotube is a RNA nanotube and the second nanotube is a RNA nanotube.

Item A4531. The composite material of items A20 or B15 where one nanotube is a RNA nanotube and the second nanotube is a selenide nanotube.

Item A4532. The composite material of items A20 or B15 where one nanotube is a RNA nanotube and the second nanotube is a silicon nanotube.

Item A4533. The composite material of items A20 or B15 where one nanotube is a RNA nanotube and the second nanotube is a silver nanotube.

Item A4534. The composite material of items A20 or B15 where one nanotube is a RNA nanotube and the second nanotube is a sulphide nanotube.

Item A4535. The composite material of items A20 or B15 where one nanotube is a RNA nanotube and the second nanotube is a tin disulfide nanotube.

Item A4536. The composite material of items A20 or B15 where one nanotube is a RNA nanotube and the second nanotube is a titanium dioxide nanotube.

Item A4537. The composite material of items A20 or B15 where one nanotube is a RNA nanotube and the second nanotube is a titanium oxide nanotube.

Item A4538. The composite material of items A20 or B15 where one nanotube is a RNA nanotube and the second nanotube is a tungsten disulfide nanotube.

Item A4539. The composite material of items A20 or B15 where one nanotube is a RNA nanotube and the second nanotube is a tungsten sulfide nanotube.

Item A4540. The composite material of items A20 or B15 where one nanotube is a RNA nanotube and the second nanotube is a wolfram disulphide nanotube.

Item A4541. The composite material of items A20 or B15 where one nanotube is a RNA nanotube and the second nanotube is a zinc ferrite nanotube.

Item A4542. The composite material of items A20 or B15 where one nanotube is a RNA nanotube and the second nanotube is a zinc oxide nanotube.

Item A4543. The composite material of items A20 or B15 where one nanotube is a RNA nanotube and the second nanotube is a zirconia dioxide nanotube.

Item A4544. The composite material of items A20 or B15 where one nanotube is a RNA nanotube and the second nanotube is a nanofiber.

Item A4545. The composite material of items A20 or B15 where one nanotube is a RNA nanotube and the second nanotube is a nanothread.

Item A4546. The composite material of items A20 or B15 where one nanotube is a RNA nanotube and the second nanotube is a nanorod.

Item A4547. The composite material of items A20 or B15 where one nanotube is a RNA nanotube and the second nanotube is a nanoball.

Item A4548. The composite material of items A20 or B15 where one nanotube is a RNA nanotube and the second nanotube is a nanobud.

Item A4549. The composite material of items A20 or B15 where one nanotube is a RNA nanotube and the second nanotube is a buckyball.

Item A4550. The composite material of items A20 or B15 where one nanotube is a RNA nanotube and the second nanotube is a multi wall nanotube.

Item A4551. The composite material of items A20 or B15 where one nanotube is a RNA nanotube and the second nanotube is a single wall nanotube.

Item A4552. The composite material of items A20 or B15 where one nanotube is a RNA nanotube and the second nanotube has the chirality (n,0) where n=0 to 20.

Item A4553. The composite material of items A20 or B15 where one nanotube is a RNA nanotube and the second nanotube has the chirality (n,1) where n=0 to 20.

Item A4554. The composite material of items A20 or B15 where one nanotube is a RNA nanotube and the second nanotube has the chirality (n,2) where n=0 to 20.

Item A4555. The composite material of items A20 or B15 where one nanotube is a RNA nanotube and the second nanotube has the chirality (n,3) where n=0 to 20.

Item A4556. The composite material of items A20 or B15 where one nanotube is a RNA nanotube and the second nanotube has the chirality (n,4) where n=0 to 20.

Item A4557. The composite material of items A20 or B15 where one nanotube is a RNA nanotube and the second nanotube has the chirality (n,5) where n=0 to 20.

Item A4558. The composite material of items A20 or B15 where one nanotube is a RNA nanotube and the second nanotube has the chirality (n,6) where n=0 to 20.

Item A4559. The composite material of items A20 or B15 where one nanotube is a RNA nanotube and the second nanotube has the chirality (n,7) where n=0 to 20.

Item A4560. The composite material of items A20 or B15 where one nanotube is a RNA nanotube and the second nanotube has the chirality (n,8) where n=0 to 20.

Item A4561. The composite material of items A20 or B15 where one nanotube is a RNA nanotube and the second nanotube has the chirality (n,9) where n=0 to 20.

Item A4562. The composite material of items A20 or B15 where one nanotube is a RNA nanotube and the second nanotube has the chirality (n,10) where n=0 to 20.

Item A4563. The composite material of items A20 or B15 where one nanotube is a RNA nanotube and the second nanotube has the chirality (n,11) where n=0 to 20.

Item A4564. The composite material of items A20 or B15 where one nanotube is a RNA nanotube and the second nanotube has the chirality (n,12) where n=0 to 20.

Item A4565. The composite material of items A20 or B15 where one nanotube is a RNA nanotube and the second nanotube has the chirality (n,13) where n=0 to 20.

Item A4566. The composite material of items A20 or B15 where one nanotube is a RNA nanotube and the second nanotube has the chirality (n,14) where n=0 to 20.

Item A4567. The composite material of items A20 or B15 where one nanotube is a RNA nanotube and the second nanotube has the chirality (n,15) where n=0 to 20.

Item A4568. The composite material of items A20 or B15 where one nanotube is a RNA nanotube and the second nanotube has the chirality (n,16) where n=0 to 20.

Item A4569. The composite material of items A20 or B15 where one nanotube is a RNA nanotube and the second nanotube has the chirality (n,17) where n=0 to 20.

Item A4570. The composite material of items A20 or B15 where one nanotube is a RNA nanotube and the second nanotube has the chirality (n,18) where n=0 to 20.

Item A4571. The composite material of items A20 or B15 where one nanotube is a RNA nanotube and the second nanotube has the chirality (n,19) where n=0 to 20.

Item A4572. The composite material of items A20 or B15 where one nanotube is a RNA nanotube and the second nanotube has the chirality (n,20) where n=0 to 20.

Item A4573. The composite material of items A20 or B15 where one nanotube is a RNA nanotube and the second nanotube has the chirality (0,n) where n=0 to 20.

Item A4574. The composite material of items A20 or B15 where one nanotube is a RNA nanotube and the second nanotube has the chirality (1,n) where n=0 to 20.

Item A4575. The composite material of items A20 or B15 where one nanotube is a RNA nanotube and the second nanotube has the chirality (2,n) where n=0 to 20.

Item A4576. The composite material of items A20 or B15 where one nanotube is a RNA nanotube and the second nanotube has the chirality (3,n) where n=0 to 20.

Item A4577. The composite material of items A20 or B15 where one nanotube is a RNA nanotube and the second nanotube has the chirality (4,n) where n=0 to 20.

Item A4578. The composite material of items A20 or B15 where one nanotube is a RNA nanotube and the second nanotube has the chirality (5,n) where n=0 to 20.

Item A4579. The composite material of items A20 or B15 where one nanotube is a RNA nanotube and the second nanotube has the chirality (6,n) where n=0 to 20.

Item A4580. The composite material of items A20 or B15 where one nanotube is a RNA nanotube and the second nanotube has the chirality (7,n) where n=0 to 20.

Item A4581. The composite material of items A20 or B15 where one nanotube is a RNA nanotube and the second nanotube has the chirality (8,n) where n=0 to 20.

Item A4582. The composite material of items A20 or B15 where one nanotube is a RNA nanotube and the second nanotube has the chirality (9,n) where n=0 to 20.

Item A4583. The composite material of items A20 or B15 where one nanotube is a RNA nanotube and the second nanotube has the chirality (10,n) where n=0 to 20.

Item A4584. The composite material of items A20 or B15 where one nanotube is a RNA nanotube and the second nanotube has the chirality (11,n) where n=0 to 20.

Item A4585. The composite material of items A20 or B15 where one nanotube is a RNA nanotube and the second nanotube has the chirality (12,n) where n=0 to 20.

Item A4586. The composite material of items A20 or B15 where one nanotube is a RNA nanotube and the second nanotube has the chirality (13,n) where n=0 to 20.

Item A4587. The composite material of items A20 or B15 where one nanotube is a RNA nanotube and the second nanotube has the chirality (14,n) where n=0 to 20.

Item A4588. The composite material of items A20 or B15 where one nanotube is a RNA nanotube and the second nanotube has the chirality (15,n) where n=0 to 20.

Item A4589. The composite material of items A20 or B15 where one nanotube is a RNA nanotube and the second nanotube has the chirality (16,n) where n=0 to 20.

Item A4590. The composite material of items A20 or B15 where one nanotube is a RNA nanotube and the second nanotube has the chirality (17,n) where n=0 to 20.

Item A4591. The composite material of items A20 or B15 where one nanotube is a RNA nanotube and the second nanotube has the chirality (18,n) where n=0 to 20.

Item A4592. The composite material of items A20 or B15 where one nanotube is a RNA nanotube and the second nanotube has the chirality (19,n) where n=0 to 20.

Item A4593. The composite material of items A20 or B15 where one nanotube is a RNA nanotube and the second nanotube has the chirality (20,n) where n=0 to 20.

Item A4594. The composite material of items A20 or B15 where one nanotube is a RNA nanotube and the second nanotube has a percentage of sp2 bonds of more than 90%, such as more than 95%, such as more than 96%, such as more than 97%, such as more than 98%, such as more than 99%, such as more than 99%.

Item A4595. The composite material of items A20 or B15 where one nanotube is a RNA nanotube and the second nanotube has a percentage of sp2 bonds of less than 100%, such as less than 99%, such as less than 98%, such as less than 97%, such as less than 96%, such as less than 95%.

Item A4596. The composite material of items A20 or B15 where one nanotube is a RNA nanotube and the second nanotube has a percentage of sp2 bonds of from 95%-96%, from 96% to 97%, from 97% to 98%, from 98% to 99%, from 99% to 100%.

Item A4597. The composite material of items A20 or B15 where one nanotube is a RNA nanotube and the second nanotube has a percentage of carbon atoms of more than 90%, such as more than 95%, such as more than 96%, such as more than 97%, such as more than 98%, such as more than 99%, such as more than 99%.

Item A4598. The composite material of items A20 or B15 where one nanotube is a RNA nanotube and the second nanotube has a percentage of carbon atoms of less than 100%, such as less than 99%, such as less than 98%, such as less than 97%, such as less than 96%, such as less than 95%.

Item A4599. The composite material of items A20 or B15 where one nanotube is a RNA nanotube and the second nanotube has a percentage of carbon atoms of from 95%-96%, from 96% to 97%, from 97% to 98%, from 98% to 99%, from 99% to 100%.

Item A4600. The composite material of items A20 or B15 where one nanotube is a RNA nanotube and the second nanotube has a percentage of functionalization of less than 10%, such as less than 5%, such as less than 4%, such as less than 3%, such as less than 2%, such as less than 1%.

Item A4601. The composite material of items A20 or B15 where one nanotube is a RNA nanotube and the second nanotube has a percentage of functionalization of more than 0%, such as more than 1%, such as more than 2%, such as more than 3%, such as more than 4%, such as more than 5%, such as more than 10%.

Item A4602. The composite material of items A20 or B15 where one nanotube is a RNA nanotube and the second nanotube has a percentage of functionalization of from 0% to 1%, from 1% to 2%, from 2% to 3%, from 3% to 4%, from 4% to 5%, from 5% to 10%.

Item A4603. The composite material of items A20 or B15 where one nanotube is a RNA nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4604. The composite material of items A20 or B15 where one nanotube is a RNA nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4605. The composite material of items A20 or B15 where one nanotube is a RNA nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4606. The composite material of items A20 or B15 where one nanotube is a RNA nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4607. The composite material of items A20 or B15 where one nanotube is a RNA nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4608. The composite material of items A20 or B15 where one nanotube is a RNA nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4609. The composite material of items A20 or B15 where one nanotube is a silicon nanotube and the second nanotube is a carbon nanotube.

Item A4610. The composite material of items A20 or B15 where one nanotube is a silicon nanotube and the second nanotube is a single wall carbon nanotube.

Item A4611. The composite material of items A20 or B15 where one nanotube is a silicon nanotube and the second nanotube is a multi wall carbon nanotube.

Item A4612. The composite material of items A20 or B15 where one nanotube is a silicon nanotube and the second nanotube is a metallic carbon nanotube.

Item A4613. The composite material of items A20 or B15 where one nanotube is a silicon nanotube and the second nanotube is a semiconductive carbon nanotube.

Item A4614. The composite material of items A20 or B15 where one nanotube is a silicon nanotube and the second nanotube is a aluminium nanotube.

Item A4615. The composite material of items A20 or B15 where one nanotube is a silicon nanotube and the second nanotube is a aluminum nitride nanotube (AlNNT).

Item A4616. The composite material of items A20 or B15 where one nanotube is a silicon nanotube and the second nanotube is a aluminum phosphide nanotube (AlPNT).

Item A4617. The composite material of items A20 or B15 where one nanotube is a silicon nanotube and the second nanotube is a bismuth nanotube.

Item A4618. The composite material of items A20 or B15 where one nanotube is a silicon nanotube and the second nanotube is a bismuth selenide nanotube.

Item A4619. The composite material of items A20 or B15 where one nanotube is a silicon nanotube and the second nanotube is a boron carbon nanotubes (BCNNT).

Item A4620. The composite material of items A20 or B15 where one nanotube is a silicon nanotube and the second nanotube is a boron nitride nanotube.

Item A4621. The composite material of items A20 or B15 where one nanotube is a silicon nanotube and the second nanotube is a cadmium selenide nanotube.

Item A4622. The composite material of items A20 or B15 where one nanotube is a silicon nanotube and the second nanotube is a cobalt selenide nanotube.

Item A4623. The composite material of items A20 or B15 where one nanotube is a silicon nanotube and the second nanotube is a copper nanotube.

Item A4624. The composite material of items A20 or B15 where one nanotube is a silicon nanotube and the second nanotube is a DNA nanotube.

Item A4625. The composite material of items A20 or B15 where one nanotube is a silicon nanotube and the second nanotube is a gallium nitride nanotube (GaNNT).

Item A4626. The composite material of items A20 or B15 where one nanotube is a silicon nanotube and the second nanotube is a gallium phosphide nanotube (GaPNT).

Item A4627. The composite material of items A20 or B15 where one nanotube is a silicon nanotube and the second nanotube is a gold nanotube.

Item A4628. The composite material of items A20 or B15 where one nanotube is a silicon nanotube and the second nanotube is a halide nanotube.

Item A4629. The composite material of items A20 or B15 where one nanotube is a silicon nanotube and the second nanotube is a niobium selenide nanotube.

Item A4630. The composite material of items A20 or B15 where one nanotube is a silicon nanotube and the second nanotube is a molybdenum disulfide nanotube.

Item A4631. The composite material of items A20 or B15 where one nanotube is a silicon nanotube and the second nanotube is a nanotube of transition metal oxides.

Item A4632. The composite material of items A20 or B15 where one nanotube is a silicon nanotube and the second nanotube is a nickel chloride nanotube.

Item A4633. The composite material of items A20 or B15 where one nanotube is a silicon nanotube and the second nanotube is a platinum nanotube.

Item A4634. The composite material of items A20 or B15 where one nanotube is a silicon nanotube and the second nanotube is a protein nanotube.

Item A4635. The composite material of items A20 or B15 where one nanotube is a silicon nanotube and the second nanotube is a RNA nanotube.

Item A4636. The composite material of items A20 or B15 where one nanotube is a silicon nanotube and the second nanotube is a selenide nanotube.

Item A4637. The composite material of items A20 or B15 where one nanotube is a silicon nanotube and the second nanotube is a silicon nanotube.

Item A4638. The composite material of items A20 or B15 where one nanotube is a silicon nanotube and the second nanotube is a silver nanotube.

Item A4639. The composite material of items A20 or B15 where one nanotube is a silicon nanotube and the second nanotube is a sulphide nanotube.

Item A4640. The composite material of items A20 or B15 where one nanotube is a silicon nanotube and the second nanotube is a tin disulfide nanotube.

Item A4641. The composite material of items A20 or B15 where one nanotube is a silicon nanotube and the second nanotube is a titanium dioxide nanotube.

Item A4642. The composite material of items A20 or B15 where one nanotube is a silicon nanotube and the second nanotube is a titanium oxide nanotube.

Item A4643. The composite material of items A20 or B15 where one nanotube is a silicon nanotube and the second nanotube is a tungsten disulfide nanotube.

Item A4644. The composite material of items A20 or B15 where one nanotube is a silicon nanotube and the second nanotube is a tungsten sulfide nanotube.

Item A4645. The composite material of items A20 or B15 where one nanotube is a silicon nanotube and the second nanotube is a wolfram disulphide nanotube.

Item A4646. The composite material of items A20 or B15 where one nanotube is a silicon nanotube and the second nanotube is a zinc ferrite nanotube.

Item A4647. The composite material of items A20 or B15 where one nanotube is a silicon nanotube and the second nanotube is a zinc oxide nanotube.

Item A4648. The composite material of items A20 or B15 where one nanotube is a silicon nanotube and the second nanotube is a zirconia dioxide nanotube.

Item A4649. The composite material of items A20 or B15 where one nanotube is a silicon nanotube and the second nanotube is a nanofiber.

Item A4650. The composite material of items A20 or B15 where one nanotube is a silicon nanotube and the second nanotube is a nanothread.

Item A4651. The composite material of items A20 or B15 where one nanotube is a silicon nanotube and the second nanotube is a nanorod.

Item A4652. The composite material of items A20 or B15 where one nanotube is a silicon nanotube and the second nanotube is a nanoball.

Item A4653. The composite material of items A20 or B15 where one nanotube is a silicon nanotube and the second nanotube is a nanobud.

Item A4654. The composite material of items A20 or B15 where one nanotube is a silicon nanotube and the second nanotube is a buckyball.

Item A4655. The composite material of items A20 or B15 where one nanotube is a silicon nanotube and the second nanotube is a multi wall nanotube.

Item A4656. The composite material of items A20 or B15 where one nanotube is a silicon nanotube and the second nanotube is a single wall nanotube.

Item A4657. The composite material of items A20 or B15 where one nanotube is a silicon nanotube and the second nanotube has the chirality (n,0) where n=0 to 20.

Item A4658. The composite material of items A20 or B15 where one nanotube is a silicon nanotube and the second nanotube has the chirality (n,1) where n=0 to 20.

Item A4659. The composite material of items A20 or B15 where one nanotube is a silicon nanotube and the second nanotube has the chirality (n,2) where n=0 to 20.

Item A4660. The composite material of items A20 or B15 where one nanotube is a silicon nanotube and the second nanotube has the chirality (n,3) where n=0 to 20.

Item A4661. The composite material of items A20 or B15 where one nanotube is a silicon nanotube and the second nanotube has the chirality (n,4) where n=0 to 20.

Item A4662. The composite material of items A20 or B15 where one nanotube is a silicon nanotube and the second nanotube has the chirality (n,5) where n=0 to 20.

Item A4663. The composite material of items A20 or B15 where one nanotube is a silicon nanotube and the second nanotube has the chirality (n,6) where n=0 to 20.

Item A4664. The composite material of items A20 or B15 where one nanotube is a silicon nanotube and the second nanotube has the chirality (n,7) where n=0 to 20.

Item A4665. The composite material of items A20 or B15 where one nanotube is a silicon nanotube and the second nanotube has the chirality (n,8) where n=0 to 20.

Item A4666. The composite material of items A20 or B15 where one nanotube is a silicon nanotube and the second nanotube has the chirality (n,9) where n=0 to 20.

Item A4667. The composite material of items A20 or B15 where one nanotube is a silicon nanotube and the second nanotube has the chirality (n,10) where n=0 to 20.

Item A4668. The composite material of items A20 or B15 where one nanotube is a silicon nanotube and the second nanotube has the chirality (n,11) where n=0 to 20.

Item A4669. The composite material of items A20 or B15 where one nanotube is a silicon nanotube and the second nanotube has the chirality (n,12) where n=0 to 20.

Item A4670. The composite material of items A20 or B15 where one nanotube is a silicon nanotube and the second nanotube has the chirality (n,13) where n=0 to 20.

Item A4671. The composite material of items A20 or B15 where one nanotube is a silicon nanotube and the second nanotube has the chirality (n,14) where n=0 to 20.

Item A4672. The composite material of items A20 or B15 where one nanotube is a silicon nanotube and the second nanotube has the chirality (n,15) where n=0 to 20.

Item A4673. The composite material of items A20 or B15 where one nanotube is a silicon nanotube and the second nanotube has the chirality (n,16) where n=0 to 20.

Item A4674. The composite material of items A20 or B15 where one nanotube is a silicon nanotube and the second nanotube has the chirality (n,17) where n=0 to 20.

Item A4675. The composite material of items A20 or B15 where one nanotube is a silicon nanotube and the second nanotube has the chirality (n,18) where n=0 to 20.

Item A4676. The composite material of items A20 or B15 where one nanotube is a silicon nanotube and the second nanotube has the chirality (n,19) where n=0 to 20.

Item A4677. The composite material of items A20 or B15 where one nanotube is a silicon nanotube and the second nanotube has the chirality (n,20) where n=0 to 20.

Item A4678. The composite material of items A20 or B15 where one nanotube is a silicon nanotube and the second nanotube has the chirality (0,n) where n=0 to 20.

Item A4679. The composite material of items A20 or B15 where one nanotube is a silicon nanotube and the second nanotube has the chirality (1,n) where n=0 to 20.

Item A4680. The composite material of items A20 or B15 where one nanotube is a silicon nanotube and the second nanotube has the chirality (2,n) where n=0 to 20.

Item A4681. The composite material of items A20 or B15 where one nanotube is a silicon nanotube and the second nanotube has the chirality (3,n) where n=0 to 20.

Item A4682. The composite material of items A20 or B15 where one nanotube is a silicon nanotube and the second nanotube has the chirality (4,n) where n=0 to 20.

Item A4683. The composite material of items A20 or B15 where one nanotube is a silicon nanotube and the second nanotube has the chirality (5,n) where n=0 to 20.

Item A4684. The composite material of items A20 or B15 where one nanotube is a silicon nanotube and the second nanotube has the chirality (6,n) where n=0 to 20.

Item A4685. The composite material of items A20 or B15 where one nanotube is a silicon nanotube and the second nanotube has the chirality (7,n) where n=0 to 20.

Item A4686. The composite material of items A20 or B15 where one nanotube is a silicon nanotube and the second nanotube has the chirality (8,n) where n=0 to 20.

Item A4687. The composite material of items A20 or B15 where one nanotube is a silicon nanotube and the second nanotube has the chirality (9,n) where n=0 to 20.

Item A4688. The composite material of items A20 or B15 where one nanotube is a silicon nanotube and the second nanotube has the chirality (10,n) where n=0 to 20.

Item A4689. The composite material of items A20 or B15 where one nanotube is a silicon nanotube and the second nanotube has the chirality (11,n) where n=0 to 20.

Item A4690. The composite material of items A20 or B15 where one nanotube is a silicon nanotube and the second nanotube has the chirality (12,n) where n=0 to 20.

Item A4691. The composite material of items A20 or B15 where one nanotube is a silicon nanotube and the second nanotube has the chirality (13,n) where n=0 to 20.

Item A4692. The composite material of items A20 or B15 where one nanotube is a silicon nanotube and the second nanotube has the chirality (14,n) where n=0 to 20.

Item A4693. The composite material of items A20 or B15 where one nanotube is a silicon nanotube and the second nanotube has the chirality (15,n) where n=0 to 20.

Item A4694. The composite material of items A20 or B15 where one nanotube is a silicon nanotube and the second nanotube has the chirality (16,n) where n=0 to 20.

Item A4695. The composite material of items A20 or B15 where one nanotube is a silicon nanotube and the second nanotube has the chirality (17,n) where n=0 to 20.

Item A4696. The composite material of items A20 or B15 where one nanotube is a silicon nanotube and the second nanotube has the chirality (18,n) where n=0 to 20.

Item A4697. The composite material of items A20 or B15 where one nanotube is a silicon nanotube and the second nanotube has the chirality (19,n) where n=0 to 20.

Item A4698. The composite material of items A20 or B15 where one nanotube is a silicon nanotube and the second nanotube has the chirality (20,n) where n=0 to 20.

Item A4699. The composite material of items A20 or B15 where one nanotube is a silicon nanotube and the second nanotube has a percentage of sp2 bonds of more than 90%, such as more than 95%, such as more than 96%, such as more than 97%, such as more than 98%, such as more than 99%, such as more than 99%.

Item A4700. The composite material of items A20 or B15 where one nanotube is a silicon nanotube and the second nanotube has a percentage of sp2 bonds of less than 100%, such as less than 99%, such as less than 98%, such as less than 97%, such as less than 96%, such as less than 95%.

Item A4701. The composite material of items A20 or B15 where one nanotube is a silicon nanotube and the second nanotube has a percentage of sp2 bonds of from 95%-96%, from 96% to 97%, from 97% to 98%, from 98% to 99%, from 99% to 100%.

Item A4702. The composite material of items A20 or B15 where one nanotube is a silicon nanotube and the second nanotube has a percentage of carbon atoms of more than 90%, such as more than 95%, such as more than 96%, such as more than 97%, such as more than 98%, such as more than 99%, such as more than 99%.

Item A4703. The composite material of items A20 or B15 where one nanotube is a silicon nanotube and the second nanotube has a percentage of carbon atoms of less than 100%, such as less than 99%, such as less than 98%, such as less than 97%, such as less than 96%, such as less than 95%.

Item A4704. The composite material of items A20 or B15 where one nanotube is a silicon nanotube and the second nanotube has a percentage of carbon atoms of from 95%-96%, from 96% to 97%, from 97% to 98%, from 98% to 99%, from 99% to 100%.

Item A4705. The composite material of items A20 or B15 where one nanotube is a silicon nanotube and the second nanotube has a percentage of functionalization of less than 10%, such as less than 5%, such as less than 4%, such as less than 3%, such as less than 2%, such as less than 1%.

Item A4706. The composite material of items A20 or B15 where one nanotube is a silicon nanotube and the second nanotube has a percentage of functionalization of more than 0%, such as more than 1%, such as more than 2%, such as more than 3%, such as more than 4%, such as more than 5%, such as more than 10%.

Item A4707. The composite material of items A20 or B15 where one nanotube is a silicon nanotube and the second nanotube has a percentage of functionalization of from 0% to 1%, from 1% to 2%, from 2% to 3%, from 3% to 4%, from 4% to 5%, from 5% to 10%.

Item A4708. The composite material of items A20 or B15 where one nanotube is a silicon nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4709. The composite material of items A20 or B15 where one nanotube is a silicon nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4710. The composite material of items A20 or B15 where one nanotube is a silicon nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4711. The composite material of items A20 or B15 where one nanotube is a silicon nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4712. The composite material of items A20 or B15 where one nanotube is a silicon nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4713. The composite material of items A20 or B15 where one nanotube is a silicon nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4714. The composite material of items A20 or B15 where one nanotube is a silver nanotube and the second nanotube is a carbon nanotube.

Item A4715. The composite material of items A20 or B15 where one nanotube is a silver nanotube and the second nanotube is a single wall carbon nanotube.

Item A4716. The composite material of items A20 or B15 where one nanotube is a silver nanotube and the second nanotube is a multi wall carbon nanotube.

Item A4717. The composite material of items A20 or B15 where one nanotube is a silver nanotube and the second nanotube is a metallic carbon nanotube.

Item A4718. The composite material of items A20 or B15 where one nanotube is a silver nanotube and the second nanotube is a semiconductive carbon nanotube.

Item A4719. The composite material of items A20 or B15 where one nanotube is a silver nanotube and the second nanotube is a aluminium nanotube.

Item A4720. The composite material of items A20 or B15 where one nanotube is a silver nanotube and the second nanotube is a aluminum nitride nanotube (AlNNT).

Item A4721. The composite material of items A20 or B15 where one nanotube is a silver nanotube and the second nanotube is a aluminum phosphide nanotube (AlPNT).

Item A4722. The composite material of items A20 or B15 where one nanotube is a silver nanotube and the second nanotube is a bismuth nanotube.

Item A4723. The composite material of items A20 or B15 where one nanotube is a silver nanotube and the second nanotube is a bismuth selenide nanotube.

Item A4724. The composite material of items A20 or B15 where one nanotube is a silver nanotube and the second nanotube is a boron carbon nanotubes (BCNNT).

Item A4725. The composite material of items A20 or B15 where one nanotube is a silver nanotube and the second nanotube is a boron nitride nanotube.

Item A4726. The composite material of items A20 or B15 where one nanotube is a silver nanotube and the second nanotube is a cadmium selenide nanotube.

Item A4727. The composite material of items A20 or B15 where one nanotube is a silver nanotube and the second nanotube is a cobalt selenide nanotube.

Item A4728. The composite material of items A20 or B15 where one nanotube is a silver nanotube and the second nanotube is a copper nanotube.

Item A4729. The composite material of items A20 or B15 where one nanotube is a silver nanotube and the second nanotube is a DNA nanotube.

Item A4730. The composite material of items A20 or B15 where one nanotube is a silver nanotube and the second nanotube is a gallium nitride nanotube (GaNNT).

Item A4731. The composite material of items A20 or B15 where one nanotube is a silver nanotube and the second nanotube is a gallium phosphide nanotube (GaPNT).

Item A4732. The composite material of items A20 or B15 where one nanotube is a silver nanotube and the second nanotube is a gold nanotube.

Item A4733. The composite material of items A20 or B15 where one nanotube is a silver nanotube and the second nanotube is a halide nanotube.

Item A4734. The composite material of items A20 or B15 where one nanotube is a silver nanotube and the second nanotube is a niobium selenide nanotube.

Item A4735. The composite material of items A20 or B15 where one nanotube is a silver nanotube and the second nanotube is a molybdenum disulfide nanotube.

Item A4736. The composite material of items A20 or B15 where one nanotube is a silver nanotube and the second nanotube is a nanotube of transition metal oxides.

Item A4737. The composite material of items A20 or B15 where one nanotube is a silver nanotube and the second nanotube is a nickel chloride nanotube.

Item A4738. The composite material of items A20 or B15 where one nanotube is a silver nanotube and the second nanotube is a platinum nanotube.

Item A4739. The composite material of items A20 or B15 where one nanotube is a silver nanotube and the second nanotube is a protein nanotube.

Item A4740. The composite material of items A20 or B15 where one nanotube is a silver nanotube and the second nanotube is a RNA nanotube.

Item A4741. The composite material of items A20 or B15 where one nanotube is a silver nanotube and the second nanotube is a selenide nanotube.

Item A4742. The composite material of items A20 or B15 where one nanotube is a silver nanotube and the second nanotube is a silicon nanotube.

Item A4743. The composite material of items A20 or B15 where one nanotube is a silver nanotube and the second nanotube is a silver nanotube.

Item A4744. The composite material of items A20 or B15 where one nanotube is a silver nanotube and the second nanotube is a sulphide nanotube.

Item A4745. The composite material of items A20 or B15 where one nanotube is a silver nanotube and the second nanotube is a tin disulfide nanotube.

Item A4746. The composite material of items A20 or B15 where one nanotube is a silver nanotube and the second nanotube is a titanium dioxide nanotube.

Item A4747. The composite material of items A20 or B15 where one nanotube is a silver nanotube and the second nanotube is a titanium oxide nanotube.

Item A4748. The composite material of items A20 or B15 where one nanotube is a silver nanotube and the second nanotube is a tungsten disulfide nanotube.

Item A4749. The composite material of items A20 or B15 where one nanotube is a silver nanotube and the second nanotube is a tungsten sulfide nanotube.

Item A4750. The composite material of items A20 or B15 where one nanotube is a silver nanotube and the second nanotube is a wolfram disulphide nanotube.

Item A4751. The composite material of items A20 or B15 where one nanotube is a silver nanotube and the second nanotube is a zinc ferrite nanotube.

Item A4752. The composite material of items A20 or B15 where one nanotube is a silver nanotube and the second nanotube is a zinc oxide nanotube.

Item A4753. The composite material of items A20 or B15 where one nanotube is a silver nanotube and the second nanotube is a zirconia dioxide nanotube.

Item A4754. The composite material of items A20 or B15 where one nanotube is a silver nanotube and the second nanotube is a nanofiber.

Item A4755. The composite material of items A20 or B15 where one nanotube is a silver nanotube and the second nanotube is a nanothread.

Item A4756. The composite material of items A20 or B15 where one nanotube is a silver nanotube and the second nanotube is a nanorod.

Item A4757. The composite material of items A20 or B15 where one nanotube is a silver nanotube and the second nanotube is a nanoball.

Item A4758. The composite material of items A20 or B15 where one nanotube is a silver nanotube and the second nanotube is a nanobud.

Item A4759. The composite material of items A20 or B15 where one nanotube is a silver nanotube and the second nanotube is a buckyball.

Item A4760. The composite material of items A20 or B15 where one nanotube is a silver nanotube and the second nanotube is a multi wall nanotube.

Item A4761. The composite material of items A20 or B15 where one nanotube is a silver nanotube and the second nanotube is a single wall nanotube.

Item A4762. The composite material of items A20 or B15 where one nanotube is a silver nanotube and the second nanotube has the chirality (n,0) where n=0 to 20.

Item A4763. The composite material of items A20 or B15 where one nanotube is a silver nanotube and the second nanotube has the chirality (n,1) where n=0 to 20.

Item A4764. The composite material of items A20 or B15 where one nanotube is a silver nanotube and the second nanotube has the chirality (n,2) where n=0 to 20.

Item A4765. The composite material of items A20 or B15 where one nanotube is a silver nanotube and the second nanotube has the chirality (n,3) where n=0 to 20.

Item A4766. The composite material of items A20 or B15 where one nanotube is a silver nanotube and the second nanotube has the chirality (n,4) where n=0 to 20.

Item A4767. The composite material of items A20 or B15 where one nanotube is a silver nanotube and the second nanotube has the chirality (n,5) where n=0 to 20.

Item A4768. The composite material of items A20 or B15 where one nanotube is a silver nanotube and the second nanotube has the chirality (n,6) where n=0 to 20.

Item A4769. The composite material of items A20 or B15 where one nanotube is a silver nanotube and the second nanotube has the chirality (n,7) where n=0 to 20.

Item A4770. The composite material of items A20 or B15 where one nanotube is a silver nanotube and the second nanotube has the chirality (n,8) where n=0 to 20.

Item A4771. The composite material of items A20 or B15 where one nanotube is a silver nanotube and the second nanotube has the chirality (n,9) where n=0 to 20.

Item A4772. The composite material of items A20 or B15 where one nanotube is a silver nanotube and the second nanotube has the chirality (n,10) where n=0 to 20.

Item A4773. The composite material of items A20 or B15 where one nanotube is a silver nanotube and the second nanotube has the chirality (n,11) where n=0 to 20.

Item A4774. The composite material of items A20 or B15 where one nanotube is a silver nanotube and the second nanotube has the chirality (n,12) where n=0 to 20.

Item A4775. The composite material of items A20 or B15 where one nanotube is a silver nanotube and the second nanotube has the chirality (n,13) where n=0 to 20.

Item A4776. The composite material of items A20 or B15 where one nanotube is a silver nanotube and the second nanotube has the chirality (n,14) where n=0 to 20.

Item A4777. The composite material of items A20 or B15 where one nanotube is a silver nanotube and the second nanotube has the chirality (n,15) where n=0 to 20.

Item A4778. The composite material of items A20 or B15 where one nanotube is a silver nanotube and the second nanotube has the chirality (n,16) where n=0 to 20.

Item A4779. The composite material of items A20 or B15 where one nanotube is a silver nanotube and the second nanotube has the chirality (n,17) where n=0 to 20.

Item A4780. The composite material of items A20 or B15 where one nanotube is a silver nanotube and the second nanotube has the chirality (n,18) where n=0 to 20.

Item A4781. The composite material of items A20 or B15 where one nanotube is a silver nanotube and the second nanotube has the chirality (n,19) where n=0 to 20.

Item A4782. The composite material of items A20 or B15 where one nanotube is a silver nanotube and the second nanotube has the chirality (n,20) where n=0 to 20.

Item A4783. The composite material of items A20 or B15 where one nanotube is a silver nanotube and the second nanotube has the chirality (0,n) where n=0 to 20.

Item A4784. The composite material of items A20 or B15 where one nanotube is a silver nanotube and the second nanotube has the chirality (1,n) where n=0 to 20.

Item A4785. The composite material of items A20 or B15 where one nanotube is a silver nanotube and the second nanotube has the chirality (2,n) where n=0 to 20.

Item A4786. The composite material of items A20 or B15 where one nanotube is a silver nanotube and the second nanotube has the chirality (3,n) where n=0 to 20.

Item A4787. The composite material of items A20 or B15 where one nanotube is a silver nanotube and the second nanotube has the chirality (4,n) where n=0 to 20.

Item A4788. The composite material of items A20 or B15 where one nanotube is a silver nanotube and the second nanotube has the chirality (5,n) where n=0 to 20.

Item A4789. The composite material of items A20 or B15 where one nanotube is a silver nanotube and the second nanotube has the chirality (6,n) where n=0 to 20.

Item A4790. The composite material of items A20 or B15 where one nanotube is a silver nanotube and the second nanotube has the chirality (7,n) where n=0 to 20.

Item A4791. The composite material of items A20 or B15 where one nanotube is a silver nanotube and the second nanotube has the chirality (8,n) where n=0 to 20.

Item A4792. The composite material of items A20 or B15 where one nanotube is a silver nanotube and the second nanotube has the chirality (9,n) where n=0 to 20.

Item A4793. The composite material of items A20 or B15 where one nanotube is a silver nanotube and the second nanotube has the chirality (10,n) where n=0 to 20.

Item A4794. The composite material of items A20 or B15 where one nanotube is a silver nanotube and the second nanotube has the chirality (11,n) where n=0 to 20.

Item A4795. The composite material of items A20 or B15 where one nanotube is a silver nanotube and the second nanotube has the chirality (12,n) where n=0 to 20.

Item A4796. The composite material of items A20 or B15 where one nanotube is a silver nanotube and the second nanotube has the chirality (13,n) where n=0 to 20.

Item A4797. The composite material of items A20 or B15 where one nanotube is a silver nanotube and the second nanotube has the chirality (14,n) where n=0 to 20.

Item A4798. The composite material of items A20 or B15 where one nanotube is a silver nanotube and the second nanotube has the chirality (15,n) where n=0 to 20.

Item A4799. The composite material of items A20 or B15 where one nanotube is a silver nanotube and the second nanotube has the chirality (16,n) where n=0 to 20.

Item A4800. The composite material of items A20 or B15 where one nanotube is a silver nanotube and the second nanotube has the chirality (17,n) where n=0 to 20.

Item A4801. The composite material of items A20 or B15 where one nanotube is a silver nanotube and the second nanotube has the chirality (18,n) where n=0 to 20.

Item A4802. The composite material of items A20 or B15 where one nanotube is a silver nanotube and the second nanotube has the chirality (19,n) where n=0 to 20.

Item A4803. The composite material of items A20 or B15 where one nanotube is a silver nanotube and the second nanotube has the chirality (20,n) where n=0 to 20.

Item A4804. The composite material of items A20 or B15 where one nanotube is a silver nanotube and the second nanotube has a percentage of sp2 bonds of more than 90%, such as more than 95%, such as more than 96%, such as more than 97%, such as more than 98%, such as more than 99%, such as more than 99%.

Item A4805. The composite material of items A20 or B15 where one nanotube is a silver nanotube and the second nanotube has a percentage of sp2 bonds of less than 100%, such as less than 99%, such as less than 98%, such as less than 97%, such as less than 96%, such as less than 95%.

Item A4806. The composite material of items A20 or B15 where one nanotube is a silver nanotube and the second nanotube has a percentage of sp2 bonds of from 95%-96%, from 96% to 97%, from 97% to 98%, from 98% to 99%, from 99% to 100%.

Item A4807. The composite material of items A20 or B15 where one nanotube is a silver nanotube and the second nanotube has a percentage of carbon atoms of more than 90%, such as more than 95%, such as more than 96%, such as more than 97%, such as more than 98%, such as more than 99%, such as more than 99%.

Item A4808. The composite material of items A20 or B15 where one nanotube is a silver nanotube and the second nanotube has a percentage of carbon atoms of less than 100%, such as less than 99%, such as less than 98%, such as less than 97%, such as less than 96%, such as less than 95%.

Item A4809. The composite material of items A20 or B15 where one nanotube is a silver nanotube and the second nanotube has a percentage of carbon atoms of from 95%-96%, from 96% to 97%, from 97% to 98%, from 98% to 99%, from 99% to 100%.

Item A4810. The composite material of items A20 or B15 where one nanotube is a silver nanotube and the second nanotube has a percentage of functionalization of less than 10%, such as less than 5%, such as less than 4%, such as less than 3%, such as less than 2%, such as less than 1%.

Item A4811. The composite material of items A20 or B15 where one nanotube is a silver nanotube and the second nanotube has a percentage of functionalization of more than 0%, such as more than 1%, such as more than 2%, such as more than 3%, such as more than 4%, such as more than 5%, such as more than 10%.

Item A4812. The composite material of items A20 or B15 where one nanotube is a silver nanotube and the second nanotube has a percentage of functionalization of from 0% to 1%, from 1% to 2%, from 2% to 3%, from 3% to 4%, from 4% to 5%, from 5% to 10%.

Item A4813. The composite material of items A20 or B15 where one nanotube is a silver nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4814. The composite material of items A20 or B15 where one nanotube is a silver nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4815. The composite material of items A20 or B15 where one nanotube is a silver nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A4816. The composite material of items A20 or B15 where one nanotube is a silver nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4817. The composite material of items A20 or B15 where one nanotube is a silver nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4818. The composite material of items A20 or B15 where one nanotube is a silver nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4819. The composite material of items A20 or B15 where one nanotube is a titanium oxide nanotube and the second nanotube is a carbon nanotube.

Item A4820. The composite material of items A20 or B15 where one nanotube is a titanium oxide nanotube and the second nanotube is a single wall carbon nanotube.

Item A4821. The composite material of items A20 or B15 where one nanotube is a titanium oxide nanotube and the second nanotube is a multi wall carbon nanotube.

Item A4822. The composite material of items A20 or B15 where one nanotube is a titanium oxide nanotube and the second nanotube is a metallic carbon nanotube.

Item A4823. The composite material of items A20 or B15 where one nanotube is a titanium oxide nanotube and the second nanotube is a semiconductive carbon nanotube.

Item A4824. The composite material of items A20 or B15 where one nanotube is a titanium oxide nanotube and the second nanotube is a aluminium nanotube.

Item A4825. The composite material of items A20 or B15 where one nanotube is a titanium oxide nanotube and the second nanotube is a aluminum nitride nanotube (AlNNT).

Item A4826. The composite material of items A20 or B15 where one nanotube is a titanium oxide nanotube and the second nanotube is a aluminum phosphide nanotube (AlPNT).

Item A4827. The composite material of items A20 or B15 where one nanotube is a titanium oxide nanotube and the second nanotube is a bismuth nanotube.

Item A4828. The composite material of items A20 or B15 where one nanotube is a titanium oxide nanotube and the second nanotube is a bismuth selenide nanotube.

Item A4829. The composite material of items A20 or B15 where one nanotube is a titanium oxide nanotube and the second nanotube is a boron carbon nanotubes (BCNNT).

Item A4830. The composite material of items A20 or B15 where one nanotube is a titanium oxide nanotube and the second nanotube is a boron nitride nanotube.

Item A4831. The composite material of items A20 or B15 where one nanotube is a titanium oxide nanotube and the second nanotube is a cadmium selenide nanotube.

Item A4832. The composite material of items A20 or B15 where one nanotube is a titanium oxide nanotube and the second nanotube is a cobalt selenide nanotube.

Item A4833. The composite material of items A20 or B15 where one nanotube is a titanium oxide nanotube and the second nanotube is a copper nanotube.

Item A4834. The composite material of items A20 or B15 where one nanotube is a titanium oxide nanotube and the second nanotube is a DNA nanotube.

Item A4835. The composite material of items A20 or B15 where one nanotube is a titanium oxide nanotube and the second nanotube is a gallium nitride nanotube (GaNNT).

Item A4836. The composite material of items A20 or B15 where one nanotube is a titanium oxide nanotube and the second nanotube is a gallium phosphide nanotube (GaPNT).

Item A4837. The composite material of items A20 or B15 where one nanotube is a titanium oxide nanotube and the second nanotube is a gold nanotube.

Item A4838. The composite material of items A20 or B15 where one nanotube is a titanium oxide nanotube and the second nanotube is a halide nanotube.

Item A4839. The composite material of items A20 or B15 where one nanotube is a titanium oxide nanotube and the second nanotube is a niobium selenide nanotube.

Item A4840. The composite material of items A20 or B15 where one nanotube is a titanium oxide nanotube and the second nanotube is a molybdenum disulfide nanotube.

Item A4841. The composite material of items A20 or B15 where one nanotube is a titanium oxide nanotube and the second nanotube is a nanotube of transition metal oxides.

Item A4842. The composite material of items A20 or B15 where one nanotube is a titanium oxide nanotube and the second nanotube is a nickel chloride nanotube.

Item A4843. The composite material of items A20 or B15 where one nanotube is a titanium oxide nanotube and the second nanotube is a platinum nanotube.

Item A4844. The composite material of items A20 or B15 where one nanotube is a titanium oxide nanotube and the second nanotube is a protein nanotube.

Item A4845. The composite material of items A20 or B15 where one nanotube is a titanium oxide nanotube and the second nanotube is a RNA nanotube.

Item A4846. The composite material of items A20 or B15 where one nanotube is a titanium oxide nanotube and the second nanotube is a selenide nanotube.

Item A4847. The composite material of items A20 or B15 where one nanotube is a titanium oxide nanotube and the second nanotube is a silicon nanotube.

Item A4848. The composite material of items A20 or B15 where one nanotube is a titanium oxide nanotube and the second nanotube is a silver nanotube.

Item A4849. The composite material of items A20 or B15 where one nanotube is a titanium oxide nanotube and the second nanotube is a sulphide nanotube.

Item A4850. The composite material of items A20 or B15 where one nanotube is a titanium oxide nanotube and the second nanotube is a tin disulfide nanotube.

Item A4851. The composite material of items A20 or B15 where one nanotube is a titanium oxide nanotube and the second nanotube is a titanium dioxide nanotube.

Item A4852. The composite material of items A20 or B15 where one nanotube is a titanium oxide nanotube and the second nanotube is a titanium oxide nanotube.

Item A4853. The composite material of items A20 or B15 where one nanotube is a titanium oxide nanotube and the second nanotube is a tungsten disulfide nanotube.

Item A4854. The composite material of items A20 or B15 where one nanotube is a titanium oxide nanotube and the second nanotube is a tungsten sulfide nanotube.

Item A4855. The composite material of items A20 or B15 where one nanotube is a titanium oxide nanotube and the second nanotube is a wolfram disulphide nanotube.

Item A4856. The composite material of items A20 or B15 where one nanotube is a titanium oxide nanotube and the second nanotube is a zinc ferrite nanotube.

Item A4857. The composite material of items A20 or B15 where one nanotube is a titanium oxide nanotube and the second nanotube is a zinc oxide nanotube.

Item A4858. The composite material of items A20 or B15 where one nanotube is a titanium oxide nanotube and the second nanotube is a zirconia dioxide nanotube.

Item A4859. The composite material of items A20 or B15 where one nanotube is a titanium oxide nanotube and the second nanotube is a nanofiber.

Item A4860. The composite material of items A20 or B15 where one nanotube is a titanium oxide nanotube and the second nanotube is a nanothread.

Item A4861. The composite material of items A20 or B15 where one nanotube is a titanium oxide nanotube and the second nanotube is a nanorod.

Item A4862. The composite material of items A20 or B15 where one nanotube is a titanium oxide nanotube and the second nanotube is a nanoball.

Item A4863. The composite material of items A20 or B15 where one nanotube is a titanium oxide nanotube and the second nanotube is a nanobud.

Item A4864. The composite material of items A20 or B15 where one nanotube is a titanium oxide nanotube and the second nanotube is a buckyball.

Item A4865. The composite material of items A20 or B15 where one nanotube is a titanium oxide nanotube and the second nanotube is a multi wall nanotube.

Item A4866. The composite material of items A20 or B15 where one nanotube is a titanium oxide nanotube and the second nanotube is a single wall nanotube.

Item A4867. The composite material of items A20 or B15 where one nanotube is a titanium oxide nanotube and the second nanotube has the chirality (n,0) where n=0 to 20.

Item A4868. The composite material of items A20 or B15 where one nanotube is a titanium oxide nanotube and the second nanotube has the chirality (n,1) where n=0 to 20.

Item A4869. The composite material of items A20 or B15 where one nanotube is a titanium oxide nanotube and the second nanotube has the chirality (n,2) where n=0 to 20.

Item A4870. The composite material of items A20 or B15 where one nanotube is a titanium oxide nanotube and the second nanotube has the chirality (n,3) where n=0 to 20.

Item A4871. The composite material of items A20 or B15 where one nanotube is a titanium oxide nanotube and the second nanotube has the chirality (n,4) where n=0 to 20.

Item A4872. The composite material of items A20 or B15 where one nanotube is a titanium oxide nanotube and the second nanotube has the chirality (n,5) where n=0 to 20.

Item A4873. The composite material of items A20 or B15 where one nanotube is a titanium oxide nanotube and the second nanotube has the chirality (n,6) where n=0 to 20.

Item A4874. The composite material of items A20 or B15 where one nanotube is a titanium oxide nanotube and the second nanotube has the chirality (n,7) where n=0 to 20.

Item A4875. The composite material of items A20 or B15 where one nanotube is a titanium oxide nanotube and the second nanotube has the chirality (n,8) where n=0 to 20.

Item A4876. The composite material of items A20 or B15 where one nanotube is a titanium oxide nanotube and the second nanotube has the chirality (n,9) where n=0 to 20.

Item A4877. The composite material of items A20 or B15 where one nanotube is a titanium oxide nanotube and the second nanotube has the chirality (n,10) where n=0 to 20.

Item A4878. The composite material of items A20 or B15 where one nanotube is a titanium oxide nanotube and the second nanotube has the chirality (n,11) where n=0 to 20.

Item A4879. The composite material of items A20 or B15 where one nanotube is a titanium oxide nanotube and the second nanotube has the chirality (n,12) where n=0 to 20.

Item A4880. The composite material of items A20 or B15 where one nanotube is a titanium oxide nanotube and the second nanotube has the chirality (n,13) where n=0 to 20.

Item A4881. The composite material of items A20 or B15 where one nanotube is a titanium oxide nanotube and the second nanotube has the chirality (n,14) where n=0 to 20.

Item A4882. The composite material of items A20 or B15 where one nanotube is a titanium oxide nanotube and the second nanotube has the chirality (n,15) where n=0 to 20.

Item A4883. The composite material of items A20 or B15 where one nanotube is a titanium oxide nanotube and the second nanotube has the chirality (n,16) where n=0 to 20.

Item A4884. The composite material of items A20 or B15 where one nanotube is a titanium oxide nanotube and the second nanotube has the chirality (n,17) where n=0 to 20.

Item A4885. The composite material of items A20 or B15 where one nanotube is a titanium oxide nanotube and the second nanotube has the chirality (n,18) where n=0 to 20.

Item A4886. The composite material of items A20 or B15 where one nanotube is a titanium oxide nanotube and the second nanotube has the chirality (n,19) where n=0 to 20.

Item A4887. The composite material of items A20 or B15 where one nanotube is a titanium oxide nanotube and the second nanotube has the chirality (n,20) where n=0 to 20.

Item A4888. The composite material of items A20 or B15 where one nanotube is a titanium oxide nanotube and the second nanotube has the chirality (0,n) where n=0 to 20.

Item A4889. The composite material of items A20 or B15 where one nanotube is a titanium oxide nanotube and the second nanotube has the chirality (1,n) where n=0 to 20.

Item A4890. The composite material of items A20 or B15 where one nanotube is a titanium oxide nanotube and the second nanotube has the chirality (2,n) where n=0 to 20.

Item A4891. The composite material of items A20 or B15 where one nanotube is a titanium oxide nanotube and the second nanotube has the chirality (3,n) where n=0 to 20.

Item A4892. The composite material of items A20 or B15 where one nanotube is a titanium oxide nanotube and the second nanotube has the chirality (4,n) where n=0 to 20.

Item A4893. The composite material of items A20 or B15 where one nanotube is a titanium oxide nanotube and the second nanotube has the chirality (5,n) where n=0 to 20.

Item A4894. The composite material of items A20 or B15 where one nanotube is a titanium oxide nanotube and the second nanotube has the chirality (6,n) where n=0 to 20.

Item A4895. The composite material of items A20 or B15 where one nanotube is a titanium oxide nanotube and the second nanotube has the chirality (7,n) where n=0 to 20.

Item A4896. The composite material of items A20 or B15 where one nanotube is a titanium oxide nanotube and the second nanotube has the chirality (8,n) where n=0 to 20.

Item A4897. The composite material of items A20 or B15 where one nanotube is a titanium oxide nanotube and the second nanotube has the chirality (9,n) where n=0 to 20.

Item A4898. The composite material of items A20 or B15 where one nanotube is a titanium oxide nanotube and the second nanotube has the chirality (10,n) where n=0 to 20.

Item A4899. The composite material of items A20 or B15 where one nanotube is a titanium oxide nanotube and the second nanotube has the chirality (11,n) where n=0 to 20.

Item A4900. The composite material of items A20 or B15 where one nanotube is a titanium oxide nanotube and the second nanotube has the chirality (12,n) where n=0 to 20.

Item A4901. The composite material of items A20 or B15 where one nanotube is a titanium oxide nanotube and the second nanotube has the chirality (13,n) where n=0 to 20.

Item A4902. The composite material of items A20 or B15 where one nanotube is a titanium oxide nanotube and the second nanotube has the chirality (14,n) where n=0 to 20.

Item A4903. The composite material of items A20 or B15 where one nanotube is a titanium oxide nanotube and the second nanotube has the chirality (15,n) where n=0 to 20.

Item A4904. The composite material of items A20 or B15 where one nanotube is a titanium oxide nanotube and the second nanotube has the chirality (16,n) where n=0 to 20.

Item A4905. The composite material of items A20 or B15 where one nanotube is a titanium oxide nanotube and the second nanotube has the chirality (17,n) where n=0 to 20.

Item A4906. The composite material of items A20 or B15 where one nanotube is a titanium oxide nanotube and the second nanotube has the chirality (18,n) where n=0 to 20.

Item A4907. The composite material of items A20 or B15 where one nanotube is a titanium oxide nanotube and the second nanotube has the chirality (19,n) where n=0 to 20.

Item A4908. The composite material of items A20 or B15 where one nanotube is a titanium oxide nanotube and the second nanotube has the chirality (20,n) where n=0 to 20.

Item A4909. The composite material of items A20 or B15 where one nanotube is a titanium oxide nanotube and the second nanotube has a percentage of sp2 bonds of more than 90%, such as more than 95%, such as more than 96%, such as more than 97%, such as more than 98%, such as more than 99%, such as more than 99%.

Item A4910. The composite material of items A20 or B15 where one nanotube is a titanium oxide nanotube and the second nanotube has a percentage of sp2 bonds of less than 100%, such as less than 99%, such as less than 98%, such as less than 97%, such as less than 96%, such as less than 95%.

Item A4911. The composite material of items A20 or B15 where one nanotube is a titanium oxide nanotube and the second nanotube has a percentage of sp2 bonds of from 95%-96%, from 96% to 97%, from 97% to 98%, from 98% to 99%, from 99% to 100%.

Item A4912. The composite material of items A20 or B15 where one nanotube is a titanium oxide nanotube and the second nanotube has a percentage of carbon atoms of more than 90%, such as more than 95%, such as more than 96%, such as more than 97%, such as more than 98%, such as more than 99%, such as more than 99%.

Item A4913. The composite material of items A20 or B15 where one nanotube is a titanium oxide nanotube and the second nanotube has a percentage of carbon atoms of less than 100%, such as less than 99%, such as less than 98%, such as less than 97%, such as less than 96%, such as less than 95%.

Item A4914. The composite material of items A20 or B15 where one nanotube is a titanium oxide nanotube and the second nanotube has a percentage of carbon atoms of from 95%-96%, from 96% to 97%, from 97% to 98%, from 98% to 99%, from 99% to 100%.

Item A4915. The composite material of items A20 or B15 where one nanotube is a titanium oxide nanotube and the second nanotube has a percentage of functionalization of less than 10%, such as less than 5%, such as less than 4%, such as less than 3%, such as less than 2%, such as less than 1%.

Item A4916. The composite material of items A20 or B15 where one nanotube is a titanium oxide nanotube and the second nanotube has a percentage of functionalization of more than 0%, such as more than 1%, such as more than 2%, such as more than 3%, such as more than 4%, such as more than 5%, such as more than 10%.

Item A4917. The composite material of items A20 or B15 where one nanotube is a titanium oxide nanotube and the second nanotube has a percentage of functionalization of from 0% to 1%, from 1% to 2%, from 2% to 3%, from 3% to 4%, from 4% to 5%, from 5% to 10%.

Item A4918. The composite material of items A20 or B15 where one nanotube is a titanium oxide nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A4919. The composite material of items A20 or B15 where one nanotube is a titanium oxide nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A4920. The composite material of items A20 or B15 where one nanotube is a titanium oxide nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$ from $10^7$ to $10^8$, from $10^8$ to $10^9$, from $10^9$ to $10^{10}$.

Item A4921. The composite material of items A20 or B15 where one nanotube is a titanium oxide nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A4922. The composite material of items A20 or B15 where one nanotube is a titanium oxide nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A4923. The composite material of items A20 or B15 where one nanotube is a titanium oxide nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A4924. The composite material of items A20 or B15 where one nanotube is a titanium oxide nanotube and the second nanotube is a carbon nanotube.

Item A4925. The composite material of items A20 or B15 where one nanotube is a titanium oxide nanotube and the second nanotube is a single wall carbon nanotube.

Item A4926. The composite material of items A20 or B15 where one nanotube is a titanium oxide nanotube and the second nanotube is a multi wall carbon nanotube.

Item A4927. The composite material of items A20 or B15 where one nanotube is a titanium oxide nanotube and the second nanotube is a metallic carbon nanotube.

Item A4928. The composite material of items A20 or B15 where one nanotube is a titanium oxide nanotube and the second nanotube is a semiconductive carbon nanotube.

Item A4929. The composite material of items A20 or B15 where one nanotube is a multi wall nanotube and the second nanotube is a aluminium nanotube.

Item A4930. The composite material of items A20 or B15 where one nanotube is a multi wall nanotube and the second nanotube is a aluminum nitride nanotube (AlNNT).

Item A4931. The composite material of items A20 or B15 where one nanotube is a multi wall nanotube and the second nanotube is a aluminum phosphide nanotube (AlPNT).

Item A4932. The composite material of items A20 or B15 where one nanotube is a multi wall nanotube and the second nanotube is a bismuth nanotube.

Item A4933. The composite material of items A20 or B15 where one nanotube is a multi wall nanotube and the second nanotube is a bismuth selenide nanotube.

Item A4934. The composite material of items A20 or B15 where one nanotube is a multi wall nanotube and the second nanotube is a boron carbon nanotubes (BCNNT).

Item A4935. The composite material of items A20 or B15 where one nanotube is a multi wall nanotube and the second nanotube is a boron nitride nanotube.

Item A4936. The composite material of items A20 or B15 where one nanotube is a multi wall nanotube and the second nanotube is a cadmium selenide nanotube.

Item A4937. The composite material of items A20 or B15 where one nanotube is a multi wall nanotube and the second nanotube is a cobalt selenide nanotube.

Item A4938. The composite material of items A20 or B15 where one nanotube is a multi wall nanotube and the second nanotube is a copper nanotube.

Item A4939. The composite material of items A20 or B15 where one nanotube is a multi wall nanotube and the second nanotube is a DNA nanotube.

Item A4940. The composite material of items A20 or B15 where one nanotube is a multi wall nanotube and the second nanotube is a gallium nitride nanotube (GaNNT).

Item A4941. The composite material of items A20 or B15 where one nanotube is a multi wall nanotube and the second nanotube is a gallium phosphide nanotube (GaPNT).

Item A4942. The composite material of items A20 or B15 where one nanotube is a multi wall nanotube and the second nanotube is a gold nanotube.

Item A4943. The composite material of items A20 or B15 where one nanotube is a multi wall nanotube and the second nanotube is a halide nanotube.

Item A4944. The composite material of items A20 or B15 where one nanotube is a multi wall nanotube and the second nanotube is a niobium selenide nanotube.

Item A4945. The composite material of items A20 or B15 where one nanotube is a multi wall nanotube and the second nanotube is a molybdenum disulfide nanotube.

Item A4946. The composite material of items A20 or B15 where one nanotube is a multi wall nanotube and the second nanotube is a nanotube of transition metal oxides.

Item A4947. The composite material of items A20 or B15 where one nanotube is a multi wall nanotube and the second nanotube is a nickel chloride nanotube.

Item A4948. The composite material of items A20 or B15 where one nanotube is a multi wall nanotube and the second nanotube is a platinum nanotube.

Item A4949. The composite material of items A20 or B15 where one nanotube is a multi wall nanotube and the second nanotube is a protein nanotube.

Item A4950. The composite material of items A20 or B15 where one nanotube is a multi wall nanotube and the second nanotube is a RNA nanotube.

Item A4951. The composite material of items A20 or B15 where one nanotube is a multi wall nanotube and the second nanotube is a selenide nanotube.

Item A4952. The composite material of items A20 or B15 where one nanotube is a multi wall nanotube and the second nanotube is a silicon nanotube.

Item A4953. The composite material of items A20 or B15 where one nanotube is a multi wall nanotube and the second nanotube is a silver nanotube.

Item A4954. The composite material of items A20 or B15 where one nanotube is a multi wall nanotube and the second nanotube is a sulphide nanotube.

Item A4955. The composite material of items A20 or B15 where one nanotube is a multi wall nanotube and the second nanotube is a tin disulfide nanotube.

Item A4956. The composite material of items A20 or B15 where one nanotube is a multi wall nanotube and the second nanotube is a titanium dioxide nanotube.

Item A4957. The composite material of items A20 or B15 where one nanotube is a multi wall nanotube and the second nanotube is a titanium oxide nanotube.

Item A4958. The composite material of items A20 or B15 where one nanotube is a multi wall nanotube and the second nanotube is a tungsten disulfide nanotube.

Item A4959. The composite material of items A20 or B15 where one nanotube is a multi wall nanotube and the second nanotube is a tungsten sulfide nanotube.

Item A4960. The composite material of items A20 or B15 where one nanotube is a multi wall nanotube and the second nanotube is a wolfram disulphide nanotube.

Item A4961. The composite material of items A20 or B15 where one nanotube is a multi wall nanotube and the second nanotube is a zinc ferrite nanotube.

Item A4962. The composite material of items A20 or B15 where one nanotube is a multi wall nanotube and the second nanotube is a zinc oxide nanotube.

Item A4963. The composite material of items A20 or B15 where one nanotube is a multi wall nanotube and the second nanotube is a zirconia dioxide nanotube.

Item A4964. The composite material of items A20 or B15 where one nanotube is a multi wall nanotube and the second nanotube is a nanofiber.

Item A4965. The composite material of items A20 or B15 where one nanotube is a multi wall nanotube and the second nanotube is a nanothread.

Item A4966. The composite material of items A20 or B15 where one nanotube is a multi wall nanotube and the second nanotube is a nanorod.

Item A4967. The composite material of items A20 or B15 where one nanotube is a multi wall nanotube and the second nanotube is a nanoball.

Item A4968. The composite material of items A20 or B15 where one nanotube is a multi wall nanotube and the second nanotube is a nanobud.

Item A4969. The composite material of items A20 or B15 where one nanotube is a multi wall nanotube and the second nanotube is a buckyball.

Item A4970. The composite material of items A20 or B15 where one nanotube is a multi wall nanotube and the second nanotube is a multi wall nanotube.

Item A4971. The composite material of items A20 or B15 where one nanotube is a multi wall nanotube and the second nanotube is a single wall nanotube.

Item A4972. The composite material of items A20 or B15 where one nanotube is a multi wall nanotube and the second nanotube has the chirality (n,0) where n=0 to 20.

Item A4973. The composite material of items A20 or B15 where one nanotube is a multi wall nanotube and the second nanotube has the chirality (n,1) where n=0 to 20.

Item A4974. The composite material of items A20 or B15 where one nanotube is a multi wall nanotube and the second nanotube has the chirality (n,2) where n=0 to 20.

Item A4975. The composite material of items A20 or B15 where one nanotube is a multi wall nanotube and the second nanotube has the chirality (n,3) where n=0 to 20.

Item A4976. The composite material of items A20 or B15 where one nanotube is a multi wall nanotube and the second nanotube has the chirality (n,4) where n=0 to 20.

Item A4977. The composite material of items A20 or B15 where one nanotube is a multi wall nanotube and the second nanotube has the chirality (n,5) where n=0 to 20.

Item A4978. The composite material of items A20 or B15 where one nanotube is a multi wall nanotube and the second nanotube has the chirality (n,6) where n=0 to 20.

Item A4979. The composite material of items A20 or B15 where one nanotube is a multi wall nanotube and the second nanotube has the chirality (n,7) where n=0 to 20.

Item A4980. The composite material of items A20 or B15 where one nanotube is a multi wall nanotube and the second nanotube has the chirality (n,8) where n=0 to 20.

Item A4981. The composite material of items A20 or B15 where one nanotube is a multi wall nanotube and the second nanotube has the chirality (n,9) where n=0 to 20.

Item A4982. The composite material of items A20 or B15 where one nanotube is a multi wall nanotube and the second nanotube has the chirality (n,10) where n=0 to 20.

Item A4983. The composite material of items A20 or B15 where one nanotube is a multi wall nanotube and the second nanotube has the chirality (n,11) where n=0 to 20.

Item A4984. The composite material of items A20 or B15 where one nanotube is a multi wall nanotube and the second nanotube has the chirality (n,12) where n=0 to 20.

Item A4985. The composite material of items A20 or B15 where one nanotube is a multi wall nanotube and the second nanotube has the chirality (n,13) where n=0 to 20.

Item A4986. The composite material of items A20 or B15 where one nanotube is a multi wall nanotube and the second nanotube has the chirality (n,14) where n=0 to 20.

Item A4987. The composite material of items A20 or B15 where one nanotube is a multi wall nanotube and the second nanotube has the chirality (n,15) where n=0 to 20.

Item A4988. The composite material of items A20 or B15 where one nanotube is a multi wall nanotube and the second nanotube has the chirality (n,16) where n=0 to 20.

Item A4989. The composite material of items A20 or B15 where one nanotube is a multi wall nanotube and the second nanotube has the chirality (n,17) where n=0 to 20.

Item A4990. The composite material of items A20 or B15 where one nanotube is a multi wall nanotube and the second nanotube has the chirality (n,18) where n=0 to 20.

Item A4991. The composite material of items A20 or B15 where one nanotube is a multi wall nanotube and the second nanotube has the chirality (n,19) where n=0 to 20.

Item A4992. The composite material of items A20 or B15 where one nanotube is a multi wall nanotube and the second nanotube has the chirality (n,20) where n=0 to 20.

Item A4993. The composite material of items A20 or B15 where one nanotube is a multi wall nanotube and the second nanotube has the chirality (0,n) where n=0 to 20.

Item A4994. The composite material of items A20 or B15 where one nanotube is a multi wall nanotube and the second nanotube has the chirality (1,n) where n=0 to 20.

Item A4995. The composite material of items A20 or B15 where one nanotube is a multi wall nanotube and the second nanotube has the chirality (2,n) where n=0 to 20.

Item A4996. The composite material of items A20 or B15 where one nanotube is a multi wall nanotube and the second nanotube has the chirality (3,n) where n=0 to 20.

Item A4997. The composite material of items A20 or B15 where one nanotube is a multi wall nanotube and the second nanotube has the chirality (4,n) where n=0 to 20.

Item A4998. The composite material of items A20 or B15 where one nanotube is a multi wall nanotube and the second nanotube has the chirality (5,n) where n=0 to 20.

Item A4999. The composite material of items A20 or B15 where one nanotube is a multi wall nanotube and the second nanotube has the chirality (6,n) where n=0 to 20.

Item A5000. The composite material of items A20 or B15 where one nanotube is a multi wall nanotube and the second nanotube has the chirality (7,n) where n=0 to 20.

Item A5001. The composite material of items A20 or B15 where one nanotube is a multi wall nanotube and the second nanotube has the chirality (8,n) where n=0 to 20.

Item A5002. The composite material of items A20 or B15 where one nanotube is a multi wall nanotube and the second nanotube has the chirality (9,n) where n=0 to 20.

Item A5003. The composite material of items A20 or B15 where one nanotube is a multi wall nanotube and the second nanotube has the chirality (10,n) where n=0 to 20.

Item A5004. The composite material of items A20 or B15 where one nanotube is a multi wall nanotube and the second nanotube has the chirality (11,n) where n=0 to 20.

Item A5005. The composite material of items A20 or B15 where one nanotube is a multi wall nanotube and the second nanotube has the chirality (12,n) where n=0 to 20.

Item A5006. The composite material of items A20 or B15 where one nanotube is a multi wall nanotube and the second nanotube has the chirality (13,n) where n=0 to 20.

Item A5007. The composite material of items A20 or B15 where one nanotube is a multi wall nanotube and the second nanotube has the chirality (14,n) where n=0 to 20.

Item A5008. The composite material of items A20 or B15 where one nanotube is a multi wall nanotube and the second nanotube has the chirality (15,n) where n=0 to 20.

Item A5009. The composite material of items A20 or B15 where one nanotube is a multi wall nanotube and the second nanotube has the chirality (16,n) where n=0 to 20.

Item A5010. The composite material of items A20 or B15 where one nanotube is a multi wall nanotube and the second nanotube has the chirality (17,n) where n=0 to 20.

Item A5011. The composite material of items A20 or B15 where one nanotube is a multi wall nanotube and the second nanotube has the chirality (18,n) where n=0 to 20.

Item A5012. The composite material of items A20 or B15 where one nanotube is a multi wall nanotube and the second nanotube has the chirality (19,n) where n=0 to 20.

Item A5013. The composite material of items A20 or B15 where one nanotube is a multi wall nanotube and the second nanotube has the chirality (20,n) where n=0 to 20.

Item A5014. The composite material of items A20 or B15 where one nanotube is a multi wall nanotube and the second nanotube has a percentage of sp2 bonds of more than 90%, such as more than 95%, such as more than 96%, such as more than 97%, such as more than 98%, such as more than 99%, such as more than 99%.

Item A5015. The composite material of items A20 or B15 where one nanotube is a multi wall nanotube and the second nanotube has a percentage of sp2 bonds of less than 100%, such as less than 99%, such as less than 98%, such as less than 97%, such as less than 96%, such as less than 95%.

Item A5016. The composite material of items A20 or B15 where one nanotube is a multi wall nanotube and the second nanotube has a percentage of sp2 bonds of from 95%-96%, from 96% to 97%, from 97% to 98%, from 98% to 99%, from 99% to 100%.

Item A5017. The composite material of items A20 or B15 where one nanotube is a multi wall nanotube and the second nanotube has a percentage of carbon atoms of more than 90%, such as more than 95%, such as more than 96%, such as more than 97%, such as more than 98%, such as more than 99%, such as more than 99%.

Item A5018. The composite material of items A20 or B15 where one nanotube is a multi wall nanotube and the second nanotube has a percentage of carbon atoms of less than 100%, such as less than 99%, such as less than 98%, such as less than 97%, such as less than 96%, such as less than 95%.

Item A5019. The composite material of items A20 or B15 where one nanotube is a multi wall nanotube and the second nanotube has a percentage of carbon atoms of from 95%-96%, from 96% to 97%, from 97% to 98%, from 98% to 99%, from 99% to 100%.

Item A5020. The composite material of items A20 or B15 where one nanotube is a multi wall nanotube and the second nanotube has a percentage of functionalization of less than 10%, such as less than 5%, such as less than 4%, such as less than 3%, such as less than 2%, such as less than 1%.

Item A5021. The composite material of items A20 or B15 where one nanotube is a multi wall nanotube and the second nanotube has a percentage of functionalization of more than 0%, such as more than 1%, such as more than 2%, such as more than 3%, such as more than 4%, such as more than 5%, such as more than 10%.

Item A5022. The composite material of items A20 or B15 where one nanotube is a multi wall nanotube and the second nanotube has a percentage of functionalization of from 0% to 1%, from 1% to 2%, from 2% to 3%, from 3% to 4%, from 4% to 5%, from 5% to 10%.

Item A5023. The composite material of items A20 or B15 where one nanotube is a multi wall nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A5024. The composite material of items A20 or B15 where one nanotube is a multi wall nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A5025. The composite material of items A20 or B15 where one nanotube is a multi wall nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A5026. The composite material of items A20 or B15 where one nanotube is a multi wall nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A5027. The composite material of items A20 or B15 where one nanotube is a multi wall nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A5028. The composite material of items A20 or B15 where one nanotube is a multi wall nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

Item A5029. The composite material of items A20 or B15 where one nanotube is a single wall nanotube and the second nanotube is a carbon nanotube.

Item A5030. The composite material of items A20 or B15 where one nanotube is a single wall nanotube and the second nanotube is a single wall carbon nanotube.

Item A5031. The composite material of items A20 or B15 where one nanotube is a single wall nanotube and the second nanotube is a multi wall carbon nanotube.

Item A5032. The composite material of items A20 or B15 where one nanotube is a single wall nanotube and the second nanotube is a metallic carbon nanotube.

Item A5033. The composite material of items A20 or B15 where one nanotube is a single wall nanotube and the second nanotube is a semiconductive carbon nanotube.

Item A5034. The composite material of items A20 or B15 where one nanotube is a single wall nanotube and the second nanotube is a aluminium nanotube.

Item A5035. The composite material of items A20 or B15 where one nanotube is a single wall nanotube and the second nanotube is a aluminum nitride nanotube (AlNNT).

Item A5036. The composite material of items A20 or B15 where one nanotube is a single wall nanotube and the second nanotube is a aluminum phosphide nanotube (AlPNT).

Item A5037. The composite material of items A20 or B15 where one nanotube is a single wall nanotube and the second nanotube is a bismuth nanotube.

Item A5038. The composite material of items A20 or B15 where one nanotube is a single wall nanotube and the second nanotube is a bismuth selenide nanotube.

Item A5039. The composite material of items A20 or B15 where one nanotube is a single wall nanotube and the second nanotube is a boron carbon nanotubes (BCNNT).

Item A5040. The composite material of items A20 or B15 where one nanotube is a single wall nanotube and the second nanotube is a boron nitride nanotube.

Item A5041. The composite material of items A20 or B15 where one nanotube is a single wall nanotube and the second nanotube is a cadmium selenide nanotube.

Item A5042. The composite material of items A20 or B15 where one nanotube is a single wall nanotube and the second nanotube is a cobalt selenide nanotube.

Item A5043. The composite material of items A20 or B15 where one nanotube is a single wall nanotube and the second nanotube is a copper nanotube.

Item A5044. The composite material of items A20 or B15 where one nanotube is a single wall nanotube and the second nanotube is a DNA nanotube.

Item A5045. The composite material of items A20 or B15 where one nanotube is a single wall nanotube and the second nanotube is a gallium nitride nanotube (GaNNT).

Item A5046. The composite material of items A20 or B15 where one nanotube is a single wall nanotube and the second nanotube is a gallium phosphide nanotube (GaPNT).

Item A5047. The composite material of items A20 or B15 where one nanotube is a single wall nanotube and the second nanotube is a gold nanotube.

Item A5048. The composite material of items A20 or B15 where one nanotube is a single wall nanotube and the second nanotube is a halide nanotube.

Item A5049. The composite material of items A20 or B15 where one nanotube is a single wall nanotube and the second nanotube is a niobium selenide nanotube.

Item A5050. The composite material of items A20 or B15 where one nanotube is a single wall nanotube and the second nanotube is a molybdenum disulfide nanotube.

Item A5051. The composite material of items A20 or B15 where one nanotube is a single wall nanotube and the second nanotube is a nanotube of transition metal oxides.

Item A5052. The composite material of items A20 or B15 where one nanotube is a single wall nanotube and the second nanotube is a nickel chloride nanotube.

Item A5053. The composite material of items A20 or B15 where one nanotube is a single wall nanotube and the second nanotube is a platinum nanotube.

Item A5054. The composite material of items A20 or B15 where one nanotube is a single wall nanotube and the second nanotube is a protein nanotube.

Item A5055. The composite material of items A20 or B15 where one nanotube is a single wall nanotube and the second nanotube is a RNA nanotube.

Item A5056. The composite material of items A20 or B15 where one nanotube is a single wall nanotube and the second nanotube is a selenide nanotube.

Item A5057. The composite material of items A20 or B15 where one nanotube is a single wall nanotube and the second nanotube is a silicon nanotube.

Item A5058. The composite material of items A20 or B15 where one nanotube is a single wall nanotube and the second nanotube is a silver nanotube.

Item A5059. The composite material of items A20 or B15 where one nanotube is a single wall nanotube and the second nanotube is a sulphide nanotube.

Item A5060. The composite material of items A20 or B15 where one nanotube is a single wall nanotube and the second nanotube is a tin disulfide nanotube.

Item A5061. The composite material of items A20 or B15 where one nanotube is a single wall nanotube and the second nanotube is a titanium dioxide nanotube.

Item A5062. The composite material of items A20 or B15 where one nanotube is a single wall nanotube and the second nanotube is a titanium oxide nanotube.

Item A5063. The composite material of items A20 or B15 where one nanotube is a single wall nanotube and the second nanotube is a tungsten disulfide nanotube.

Item A5064. The composite material of items A20 or B15 where one nanotube is a single wall nanotube and the second nanotube is a tungsten sulfide nanotube.

Item A5065. The composite material of items A20 or B15 where one nanotube is a single wall nanotube and the second nanotube is a wolfram disulphide nanotube.

Item A5066. The composite material of items A20 or B15 where one nanotube is a single wall nanotube and the second nanotube is a zinc ferrite nanotube.

Item A5067. The composite material of items A20 or B15 where one nanotube is a single wall nanotube and the second nanotube is a zinc oxide nanotube.

Item A5068. The composite material of items A20 or B15 where one nanotube is a single wall nanotube and the second nanotube is a zirconia dioxide nanotube.

Item A5069. The composite material of items A20 or B15 where one nanotube is a single wall nanotube and the second nanotube is a nanofiber.

Item A5070. The composite material of items A20 or B15 where one nanotube is a single wall nanotube and the second nanotube is a nanothread.

Item A5071. The composite material of items A20 or B15 where one nanotube is a single wall nanotube and the second nanotube is a nanorod.

Item A5072. The composite material of items A20 or B15 where one nanotube is a single wall nanotube and the second nanotube is a nanoball.

Item A5073. The composite material of items A20 or B15 where one nanotube is a single wall nanotube and the second nanotube is a nanobud.

Item A5074. The composite material of items A20 or B15 where one nanotube is a single wall nanotube and the second nanotube is a buckyball.

Item A5075. The composite material of items A20 or B15 where one nanotube is a single wall nanotube and the second nanotube is a multi wall nanotube.

Item A5076. The composite material of items A20 or B15 where one nanotube is a single wall nanotube and the second nanotube is a single wall nanotube.

Item A5077. The composite material of items A20 or B15 where one nanotube is a single wall nanotube and the second nanotube has the chirality (n,0) where n=0 to 20.

Item A5078. The composite material of items A20 or B15 where one nanotube is a single wall nanotube and the second nanotube has the chirality (n,1) where n=0 to 20.

Item A5079. The composite material of items A20 or B15 where one nanotube is a single wall nanotube and the second nanotube has the chirality (n,2) where n=0 to 20.

Item A5080. The composite material of items A20 or B15 where one nanotube is a single wall nanotube and the second nanotube has the chirality (n,3) where n=0 to 20.

Item A5081. The composite material of items A20 or B15 where one nanotube is a single wall nanotube and the second nanotube has the chirality (n,4) where n=0 to 20.

Item A5082. The composite material of items A20 or B15 where one nanotube is a single wall nanotube and the second nanotube has the chirality (n,5) where n=0 to 20.

Item A5083. The composite material of items A20 or B15 where one nanotube is a single wall nanotube and the second nanotube has the chirality (n,6) where n=0 to 20.

Item A5084. The composite material of items A20 or B15 where one nanotube is a single wall nanotube and the second nanotube has the chirality (n,7) where n=0 to 20.

Item A5085. The composite material of items A20 or B15 where one nanotube is a single wall nanotube and the second nanotube has the chirality (n,8) where n=0 to 20.

Item A5086. The composite material of items A20 or B15 where one nanotube is a single wall nanotube and the second nanotube has the chirality (n,9) where n=0 to 20.

Item A5087. The composite material of items A20 or B15 where one nanotube is a single wall nanotube and the second nanotube has the chirality (n,10) where n=0 to 20.

Item A5088. The composite material of items A20 or B15 where one nanotube is a single wall nanotube and the second nanotube has the chirality (n,11) where n=0 to 20.

Item A5089. The composite material of items A20 or B15 where one nanotube is a single wall nanotube and the second nanotube has the chirality (n,12) where n=0 to 20.

Item A5090. The composite material of items A20 or B15 where one nanotube is a single wall nanotube and the second nanotube has the chirality (n,13) where n=0 to 20.

Item A5091. The composite material of items A20 or B15 where one nanotube is a single wall nanotube and the second nanotube has the chirality (n,14) where n=0 to 20.

Item A5092. The composite material of items A20 or B15 where one nanotube is a single wall nanotube and the second nanotube has the chirality (n,15) where n=0 to 20.

Item A5093. The composite material of items A20 or B15 where one nanotube is a single wall nanotube and the second nanotube has the chirality (n,16) where n=0 to 20.

Item A5094. The composite material of items A20 or B15 where one nanotube is a single wall nanotube and the second nanotube has the chirality (n,17) where n=0 to 20.

Item A5095. The composite material of items A20 or B15 where one nanotube is a single wall nanotube and the second nanotube has the chirality (n,18) where n=0 to 20.

Item A5096. The composite material of items A20 or B15 where one nanotube is a single wall nanotube and the second nanotube has the chirality (n,19) where n=0 to 20.

Item A5097. The composite material of items A20 or B15 where one nanotube is a single wall nanotube and the second nanotube has the chirality (n,20) where n=0 to 20.

Item A5098. The composite material of items A20 or B15 where one nanotube is a single wall nanotube and the second nanotube has the chirality (0,n) where n=0 to 20.

Item A5099. The composite material of items A20 or B15 where one nanotube is a single wall nanotube and the second nanotube has the chirality (1,n) where n=0 to 20.

Item A5100. The composite material of items A20 or B15 where one nanotube is a single wall nanotube and the second nanotube has the chirality (2,n) where n=0 to 20.

Item A5101. The composite material of items A20 or B15 where one nanotube is a single wall nanotube and the second nanotube has the chirality (3,n) where n=0 to 20.

Item A5102. The composite material of items A20 or B15 where one nanotube is a single wall nanotube and the second nanotube has the chirality (4,n) where n=0 to 20.

Item A5103. The composite material of items A20 or B15 where one nanotube is a single wall nanotube and the second nanotube has the chirality (5,n) where n=0 to 20.

Item A5104. The composite material of items A20 or B15 where one nanotube is a single wall nanotube and the second nanotube has the chirality (6,n) where n=0 to 20.

Item A5105. The composite material of items A20 or B15 where one nanotube is a single wall nanotube and the second nanotube has the chirality (7,n) where n=0 to 20.

Item A5106. The composite material of items A20 or B15 where one nanotube is a single wall nanotube and the second nanotube has the chirality (8,n) where n=0 to 20.

Item A5107. The composite material of items A20 or B15 where one nanotube is a single wall nanotube and the second nanotube has the chirality (9,n) where n=0 to 20.

Item A5108. The composite material of items A20 or B15 where one nanotube is a single wall nanotube and the second nanotube has the chirality (10,n) where n=0 to 20.

Item A5109. The composite material of items A20 or B15 where one nanotube is a single wall nanotube and the second nanotube has the chirality (11,n) where n=0 to 20.

Item A5110. The composite material of items A20 or B15 where one nanotube is a single wall nanotube and the second nanotube has the chirality (12,n) where n=0 to 20.

Item A5111. The composite material of items A20 or B15 where one nanotube is a single wall nanotube and the second nanotube has the chirality (13,n) where n=0 to 20.

Item A5112. The composite material of items A20 or B15 where one nanotube is a single wall nanotube and the second nanotube has the chirality (14,n) where n=0 to 20.

Item A5113. The composite material of items A20 or B15 where one nanotube is a single wall nanotube and the second nanotube has the chirality (15,n) where n=0 to 20.

Item A5114. The composite material of items A20 or B15 where one nanotube is a single wall nanotube and the second nanotube has the chirality (16,n) where n=0 to 20.

Item A5115. The composite material of items A20 or B15 where one nanotube is a single wall nanotube and the second nanotube has the chirality (17,n) where n=0 to 20.

Item A5116. The composite material of items A20 or B15 where one nanotube is a single wall nanotube and the second nanotube has the chirality (18,n) where n=0 to 20.

Item A5117. The composite material of items A20 or B15 where one nanotube is a single wall nanotube and the second nanotube has the chirality (19,n) where n=0 to 20.

Item A5118. The composite material of items A20 or B15 where one nanotube is a single wall nanotube and the second nanotube has the chirality (20,n) where n=0 to 20.

Item A5119. The composite material of items A20 or B15 where one nanotube is a single wall nanotube and the second nanotube has a percentage of sp2 bonds of more than 90%, such as more than 95%, such as more than 96%, such as more than 97%, such as more than 98%, such as more than 99%, such as more than 99%.

Item A5120. The composite material of items A20 or B15 where one nanotube is a single wall nanotube and the second nanotube has a percentage of sp2 bonds of less than 100%, such as less than 99%, such as less than 98%, such as less than 97%, such as less than 96%, such as less than 95%.

Item A5121. The composite material of items A20 or B15 where one nanotube is a single wall nanotube and the second nanotube has a percentage of sp2 bonds of from 95%-96%, from 96% to 97%, from 97% to 98%, from 98% to 99%, from 99% to 100%.

Item A5122. The composite material of items A20 or B15 where one nanotube is a single wall nanotube and the second nanotube has a percentage of carbon atoms of more than 90%, such as more than 95%, such as more than 96%, such as more than 97%, such as more than 98%, such as more than 99%, such as more than 99%.

Item A5123. The composite material of items A20 or B15 where one nanotube is a single wall nanotube and the second nanotube has a percentage of carbon atoms of less than 100%, such as less than 99%, such as less than 98%, such as less than 97%, such as less than 96%, such as less than 95%.

Item A5124. The composite material of items A20 or B15 where one nanotube is a single wall nanotube and the second nanotube has a percentage of carbon atoms of from 95%-96%, from 96% to 97%, from 97% to 98%, from 98% to 99%, from 99% to 100%.

Item A5125. The composite material of items A20 or B15 where one nanotube is a single wall nanotube and the second nanotube has a percentage of functionalization of less than 10%, such as less than 5%, such as less than 4%, such as less than 3%, such as less than 2%, such as less than 1%.

Item A5126. The composite material of items A20 or B15 where one nanotube is a single wall nanotube and the second nanotube has a percentage of functionalization of more than 0%, such as more than 1%, such as more than 2%, such as more than 3%, such as more than 4%, such as more than 5%, such as more than 10%.

Item A5127. The composite material of items A20 or B15 where one nanotube is a single wall nanotube and the second nanotube has a percentage of functionalization of from 0% to 1%, from 1% to 2%, from 2% to 3%, from 3% to 4%, from 4% to 5%, from 5% to 10%.

Item A5128. The composite material of items A20 or B15 where one nanotube is a single wall nanotube and the second nanotube has an aspect ratio of more than 1, such as more than 10, such as more than $10^2$, more $10^3$, such as more than $10^4$, such as more than $10^5$, such as more than $10^6$, such as more than $10^7$, such as more than $10^9$, such as more than $10^{10}$.

Item A5129. The composite material of items A20 or B15 where one nanotube is a single wall nanotube and the second nanotube has an aspect ratio of less than $10^{10}$ such as less than $10^9$, such as less than $10^8$, such as less than $10^7$, such as less than $10^6$, such as less than $10^5$, such as less than $10^4$, such as less than $10^3$, such as less than $10^2$, such as less than 10.

Item A5130. The composite material of items A20 or B15 where one nanotube is a single wall nanotube and the second nanotube has an aspect ratio of from 10 to $10^2$, from $10^2$ to $10^3$, from $10^3$ to $10^4$, from $10^4$ to $10^5$, from $10^5$ to $10^6$, from $10^6$ to $10^7$, from $10^7$ to $10^8$, from $10^8$ to $10^9$, from $10^9$ to $10^{10}$.

Item A5131. The composite material of items A20 or B15 where one nanotube is a single wall nanotube and the second nanotube has a diameter in Ångstrom of more than 3, such as more than 4, such as more than 5, such as more than 6, such as more than 7, such as more than 8, such as more than 9, such as more than 10, such as more than 11, such as more than 12, such as more than 13, such as more than 14, such as more than 15, such as more than 16, such as more than 17, such as more than 18, such as more than 19, such as more than 20, such as more than 25, such as more than 30, such as more than 35, such as more than 40, such as more than 45, such as more than 50, such as more than 60, such as more than 70, such as more than 80, such as more than 90, such as more than 100, such as more than 200, such as more than 300, such as more than 400 Ångstrom.

Item A5132. The composite material of items A20 or B15 where one nanotube is a single wall nanotube and the second nanotube has a diameter in Ångstrom of less than 400, such as less than 300, such as less than 200, such as less than 100, such as less than 90, such as less than 80, such as less than 70, such as less than 60, such as less than 50, such as less than 45, such as less than 40, such as less than 35, such as less than 30, such as less than 25, such as less than 20, such as less than 19, such as less than 18, such as less than 17, such as less than 16, such as less than 15, such as less than 14, such as less than 13, such as less than 12, such as less than 11, such as less than 10, such as less than 9, such as less than 8, such as less than 7, such as less than 6, such as less than 5, such as less than 4.

Item A5133. The composite material of items A20 or B15 where one nanotube is a single wall nanotube and the second nanotube has a diameter in Ångstrom of from 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20, 20 to 25, 25 to 30, 30 to 35, 35 to 40, 40 to 45, 45 to 50, 50 to 60, 60 to 70, 70 to 80, 80 to 90, 90 to 100, 100 to 200, 200 to 300, 300 to 400.

The following items relate to composite material characteristics.

Item A5134. The composite material of any one of items A4-A5133 or B3-B15 where the composite material has a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5135. The composite material of any one of items A4-A5133 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-4}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$.

Item A5136. The composite material of any one of items A4-A5133 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5137. The composite material of any one of items A4-A5133 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5138. The composite material of any one of items A4-A5133 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5139. The composite material of any one of items A4-A5133 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5140. The composite material of any one of items A4-A5133 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5141. The composite material of any one of items A4-A5133 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5142. The composite material of any one of items A4-A5133 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5143. The composite material of any one of items A4-A5133 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5144. The composite material of any one of items A4-A5133 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5145. The composite material of any one of items A4-A5133 or B3-B15 where the composite material has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5146. The composite material of any one of items A4-A5133 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5147. The composite material of any one of items A4-A5133 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5148. The composite material of any one of items A4-A5133 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5149. The composite material of any one of items A4-A5133 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5150. The composite material of any one of items A4-A5133 or B3-B15 where the composite material has a dispersion index as measured in Casini et al. 2015 (DOI: 10.1364/OE.23.018181) of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a dispersion index of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a dispersion index of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%

Item A5151. The composite material of any one of items A4-A5133 or B3-B15 where the composite material has a percentage of molybdenum atoms of 0% or more than 0%, such as more than 0.001%, such as more than 0.01%, such as more than 0.1%, such as more than 1%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, such as less than 1%, such as less than 0.1%, such as less than 0.01%, such as less than 0.001%, a percentage of molybdenum atoms of 0% to 0.001%, 0.001% to 0.01%, 0.01% to 0.1%, 0.1% to 1%, 1% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5152. The composite material of any one of items A4-A5133 or B3-B15 where the composite material has a percentage of cobalt atoms of 0% or more than 0%, such as more than 0.001%, such as more than 0.01%, such as more than 0.1%, such as more than 1%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, such as less than 1%, such as less than 0.1%, such as less than 0.01%, such as less than 0.001%, a percentage of cobalt atoms of 0% to 0.001%, 0.001% to 0.01%, 0.01% to 0.1%, 0.1% to 1%, 1% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5153. The composite material of any one of items A4-A5133 or B3-B15 where the composite material has a hardness in Pascal of more than 10, such as more than $10^2$, such as more than $10^3$, such as more than $10^4$, such as more than $10^5$, such as more than $10^6$, such as more than $10^7$, such as more than $10^8$, such as more than $10^9$, such as more than $10^{10}$, such as more than $10^{11}$, such as more than $10^{12}$, or less than $10^{12}$, such as less than $10^{11}$, such as less than $10^{10}$, such as less than $10^9$, such as less than $10^8$, such as less than $10^7$, such as less than $10^6$, such as less than $10^6$, such as less than $10^4$, such as less than $10^3$, such as less than $10^2$, such as less than 10, or from 10 to $10^2$, or from $10^2$ to $10^3$, or from $10^3$ to $10^4$, or from $10^4$ to $10^6$, or from $10^6$ to $10^6$, or from $10^6$ to $10^7$, or from $10^7$ to $10^8$, or from $10^8$ to $10^9$, or from $10^9$ to $10^{10}$, or from $10^{10}$ to $10^{11}$, or from $10^{11}$ to $10^{12}$.

Item A5154. The composite material of any one of items A4-A5133 or B3-B15 where the composite material has a percentage of water of 0% or more than 0%, such as more than 0.001%, such as more than 0.01%, such as more than 0.1%, such as more than 1%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, such as less than 1%, such as less than 0.1%, such as less than 0.01%, such as less than 0.001%, or from 0% to 0.001%, 0.001% to 0.01%, 0.01% to 0.1%, 0.1% to 1%, 1% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5155. The composite material of any one of items A4-A5133 or B3-B15 where the composite material has a Young's modulus in percent of the theoretical maximum of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a dispersion index of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%

Item A5156. The composite material of any one of items A4-A5133 or B3-B15 where the composite material has A Tensile strength in percent of the theoretical maximum of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a dispersion index of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%

Item A5157. The composite material of any one of items A4-A5133 or B3-B15 where the composite material has a number of nanotubes per mm2 is more than 10, such of more than $10^2$, such as more than $10^3$, such as more than $10^4$, such as more than $10^5$, such as more than $10^6$, such as more than $10^7$, such as more than $10^8$, such as more than $10^9$, such as more than $10^{10}$, such as more than $10^{11}$, such as more than $10^{12}$, or less than $10^{12}$, such as less than $10^{11}$, such as less than $10^{10}$, such as less than $10^9$, such as less than $10^8$, such as less than $10^7$, such as less than $10^6$, such as less than $10^5$, such as less than $10^4$, such as less than $10^3$, such as less than $10^2$, such as less than 10, or from 10 to $10^2$, or from $10^2$ to $10^3$, or from $10^3$ to $10^4$, or from $10^4$ to $10^5$, or from $10^5$ to $10^6$, or from $10^6$ to $10^7$, or from $10^7$ to $10^8$, or from $10^8$ to $10^9$, or from $10^9$ to $10^{10}$, or from $10^{10}$ to $10^{11}$, or from $10^{11}$ to $10^{12}$.

Item A5158. The composite material of any one of items A4-A5133 or B3-B15 where the composite material a wherein the number of nanotubes per mm3 is more than 10, such as more than $10^2$, such as more than $10^3$, such as more than $10^4$, such as more than $10^5$, such as more than $10^6$, such as more than $10^7$, such as more than $10^8$, such as more than $10^9$, such as more than $10^{10}$, such as more than $10^{11}$, such as more than $10^{12}$, such as more than $10^{13}$, such as more than $10^{14}$, such as more than $10^{15}$, such as more than $10^{16}$, such as more than $10^{17}$, such as more than $10^{18}$, such as more than $10^{10}$, such as more than $10^{20}$, such as more than $10^{21}$, such as more than $10^{22}$, such as more than $10^{23}$, such as more than $10^{24}$, such as more than $10^{25}$, such as more than $10^{26}$, such as more than $10^{27}$, such as more than $10^{28}$, such as more than $10^{29}$, such as more than $10^{30}$, such as more than $10^{31}$, such as more than $10^{32}$, such as more than $10^{33}$, such as more than $10^{34}$, such as more than $10^{35}$, or less than $10^{35}$, such as less than $10^{34}$, such as less than $10^{33}$, such as less than $10^{32}$, such as less than $10^{31}$, such as less than $10^{30}$, such as less than $10^{29}$, such as less than $10^{28}$, such as less than $10^{27}$, such as less than $10^{26}$, such as less than $10^{25}$, such as less than $10^{24}$, such as less than $10^{23}$, such as less than $10^{22}$, such as less than $10^{21}$, such as less than $10^{20}$, such as less than $10^{10}$, such as less than $10^{18}$, such as less than $10^{17}$, such as less than $10^{16}$, such as less than $10^{15}$, such as less than $10^{14}$, such as less than $10^{13}$, such as less than $10^{12}$, such as less than $10^{11}$, such as less than $10^{10}$, such as less than $10^9$, such as less than $10^8$, such as less than $10^7$, such as less than $10^6$, such as less than $10^5$, such as less than $10^4$, such as less than $10^3$, such as less than $10^2$, such as less than 10, or from 10 to $10^2$, or from $10^2$ to $10^3$, or from $10^3$ to $10^4$, or from $10^4$ to $10^5$, or from $10^5$ to $10^6$, or from $10^6$ to $10^7$, or from $10^7$ to $10^8$, or from $10^8$ to $10^9$, or from $10^9$ to $10^{10}$, or from $10^{10}$ to $10^{11}$, or from $10^{11}$ to $10^{12}$, or from $10^{12}$ to $10^{13}$, or from $10^{13}$ to $10^{14}$, or from $10^{14}$ to $10^{15}$, or from $10^{15}$ to $10^{16}$, or from $10^{16}$ to $10^{17}$, or from $10^{17}$ to $10^{18}$, or from $10^{18}$ to $10^{10}$, or from $10^{10}$ to $10^{20}$, or from $10^{20}$ to $10^{21}$, or from $10^{21}$ to $10^{22}$, or from $10^{22}$ to $10^{23}$, or from $10^{23}$ to $10^{24}$, or from $10^{24}$ to $10^{25}$, or from $10^{25}$ to $10^{26}$, or from $10^{26}$ to $10^{27}$, or from $10^{27}$ to $10^{28}$, or from $10^{28}$ to $10^{29}$, or from $10^{29}$ to $10^{30}$ or from $10^{30}$ to $10^{31}$, or from $10^{31}$ to $10^{32}$, or from $10^{32}$ to $10^{33}$, or from $10^{33}$ to $10^{34}$, or from $10^{34}$ to $10^{35}$.

The following items relate to composite material characteristics in combination with other characteristics.

Item A5159. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-4}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^5$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$.

Item A5160. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5161. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5162. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5163. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5164. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5165. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5166. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5167. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5168. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5169. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5170. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5171. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5172. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5173. The composite material of any one of items A4-A5158 or B3-B15 where the composite material a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5174. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-4}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5175. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-4}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5176. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-4}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5177. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5178. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{--}$to $10^{-17}$ or $10^{-17}$ to $10^{-16}$, or $10^{-16}$ to $10^{-15}$, or $10^{-15}$ to $10^{-14}$, or $10^{-14}$ to $10^{-13}$ or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5179. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5180. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5181. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5182. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5183. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5184. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to 108.

Item A5185. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5186. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$ such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5187. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-9}$, or $10^{-6}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5188. The composite material of any one of items A4-A5158 or B3-B15 where the composite material an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5189. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5190. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^6$, such as less than $10^4$, such as less than $10^3$, such as less than $10^2$, such as less than $10^1$, such as less than 10°, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$.

Item A5191. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5192. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5193. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5194. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5195. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5196. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5197. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5198. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5199. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5200. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850°

C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5201. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5202. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5203. The composite material of any one of items A4-A5158 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5204. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5205. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$.

Item A5206. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5207. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5208. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5209. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5210. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5211. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5212. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5213. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5214. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5215. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5216. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5217. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5218. The composite material of any one of items A4-A5158 or B3-B15 where the composite material has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5219. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5220. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$.

Item A5221. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5222. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5223. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5224. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5225. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5226. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5227. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5228. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5229. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5230. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5231. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5232. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5233. The composite material of any one of items A4-A5158 or B3-B15 where the composite material has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5234. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5235. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$.

Item A5236. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5237. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5238. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5239. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5240. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5241. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5242. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5243. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5244. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5245. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5246. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5247. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5248. The composite material of any one of items A4-A5158 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5249. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5250. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-4}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$.

Item A5251. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5252. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5253. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5254. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5255. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5256. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5257. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5258. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5259. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5260. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5261. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5262. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5263. The composite material of any one of items A4-A5158 or B3-B15 where the composite material has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5264. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5265. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{18}$, or $10^{-18}$ to $10^{-17}$, or $10^{-17}$ to $10^{-16}$, or $10^{-16}$ to $10^{-15}$, or $10^{-15}$ to $10^{-14}$, or $10^{14}$ to $10^{13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{o}$.

Item A5266. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5267. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5268. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5269. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5270. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5271. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5272. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5273. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5274. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5275. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5276. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5277. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5278. The composite material of any one of items A4-A5158 or B3-B15 where the composite material has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5279. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5280. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$.

Item A5281. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5282. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5283. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5284. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5285. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5286. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5287. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5288. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5289. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$ or $10^3$ to $10^4$ or $10^4$ to $10^5$ or $10^5$ to $10^6$, or $10^6$ to $10^7$, or $10^7$ to 108.

Item A5290. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5291. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5292. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5293. The composite material of any one of items A4-A5158 or B3-B15 where the composite material has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5294. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5295. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$.

Item A5296. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5297. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5298. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5299. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5300. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5301. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5302. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5303. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5304. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$ or $10^3$ to $10^4$ or $10^4$ to $10^5$ or $10^5$ to $10^6$, or $10^6$ to $10^7$, or $10^7$ to 108.

Item A5305. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5306. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5307. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5308. The composite material of any one of items A4-A5158 or B3-B15 where the composite material has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5309. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5310. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-6}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$.

Item A5311. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5312. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5313. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5314. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5315. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5316. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5317. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5318. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5319. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$ or $10^3$ to $10^4$ or $10^4$ to $10^5$ or $10^5$ to $10^6$, or $10^6$ to $10^7$, or $10^7$ to 108.

Item A5320. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5321. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5322. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5323. The composite material of any one of items A4-A5158 or B3-B15 where the composite material has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5324. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5325. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-17}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$.

Item A5326. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5327. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5328. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5329. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5330. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5331. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5332. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5333. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5334. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5335. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5336. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5337. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5338. The composite material of any one of items A4-A5158 or B3-B15 where the composite material has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5339. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5340. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$.

Item A5341. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5342. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5343. The composite material of any one of items A4-A5158 or B3-B15 where the composite material has a decomposition temperature of more than 0° C., such as more than 50° C., such as more than 100° C., such as more than 150° C., such as more than 200° C., such as more than 250°

C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5344. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5345. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5346. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5347. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5348. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5349. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5350. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5351. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5352. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5353. The composite material of any one of items A4-A5158 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5354. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5355. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-9}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$.

Item A5356. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5357. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5358. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5359. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5360. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5361. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5362. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5363. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900°

C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5364. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5365. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$ or $10^3$ to $10^4$ or $10^4$ to $10^5$ or $10^5$ to $10^6$, or $10^6$ to $10^7$, or $10^7$ to 108.

Item A5366. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5367. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45

TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

Item A5368. The composite material of any one of items A4-A5158 or B3-B15 where the composite material has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5369. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5370. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-9}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$.

Item A5371. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5372. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5373. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa;

2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5374. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5375. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5376. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16

TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5377. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5378. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5379. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-

0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5380. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5381. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5382. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5383. The composite material of any one of items A4-A5158 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.

Item A5384. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5385. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$.

Item A5386. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000.

Item A5387. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5388. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5389. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5390. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of nitrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of nitrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5391. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of metal atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or from 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5392. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5393. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a percentage of chlorine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of chlorine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5394. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5395. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5396. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.

Item A5397. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a glass transition temperature of more than −100° C., such as more than −50° C., such as more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., or less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 0° C., such as less than −50° C., such as less than −100° C., or from −100° C. to −50° C., or from −50° C. to 0° C., or from 0° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C.

Item A5398. The composite material of any one of items A4-A5158 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA.

The following items relate to composite material characteristics in combination with other characteristics in combination with other characteristics.

Item A5399. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-29}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5400. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-19}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5401. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5402. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5403. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5404. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5405. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{\circ}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$, or $10^{-18}$ to $10^{-16}$, or $10^{-18}$ to $10^{-15}$, or $10^{-18}$ to $10^{44}$, or $10^{-14}$ to $10^{-13}$, or $10^{-13}$ to $10^{-12}$, or $10^{-12}$ to $10^{-11}$, or $10^{-18}$ to $10^{-19}$, or $10^{-19}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5406. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5407. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5408. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5409. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5410. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5411. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5412. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5413. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5414. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5415. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5416. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5417. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5418. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5419. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5420. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-9}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5421. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5422. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5423. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5424. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5425. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$ or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$ or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5426. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5427. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5428. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5429. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has an electrical dipole moment as measured in debyes of 0 or more than 0, such as more than 1, such as more than 2, such as more than 3, such as more than 4, such as more than 5, such as more than 6, such as more than 7, such as more than 8, such as more than 9, such as more than 10, or less than 10, such as less than 9, such as less than 8, such as less than 7, such as less than 6, such as less than 5, such as less than 4, such as less than 3, such as less than 2, such as less than 1, such as from 0 to 1, or from 1 to 2, or from 2 to 3, or from 3 to 4, or from 4 to 5, or from 5 to 6, or from 6 to 7, or from 7 to 8, or from 8 to 9, or from 9 to 10.

Item A5430. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-29}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{o}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5431. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5432. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^6$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$, or $10^8$ to $10^9$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5433. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^6$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$, or $10^8$ to $10^9$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5434. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-19}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5435. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-15}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5436. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than 10°, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5437. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5438. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C.

to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5439. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5440. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5441. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5442. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5443. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5444. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5445. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5446. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5447. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5448. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5449. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5450. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5451. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5452. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5453. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5454. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5455. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5456. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$ or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5457. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5458. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5459. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5460. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of carbon atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage of carbon atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5461. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{\circ}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{41}$, or $10^{41}$ to $10^{40}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^6$, or $10^6$ to $10^7$, or $10^7$ to $10^8$, or $10^8$ to $10^9$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5462. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^6$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$ or $10^4$ to $10^5$ or $10^5$ to $10^6$, or $10^6$ to $10^7$ or $10^7$ to $10^8$, or $10^8$ to $10^9$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5463. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$, or $10^8$ to $10^9$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5464. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5465. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5466. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$ or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$ or $10^4$ to $10^5$ or $10^5$ to $10^6$, or $10^6$ to $10^7$ or $10^7$ to $10^8$, or $10^8$ to $10^9$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5467. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^6$, such as less than $10^4$, such as less than $10^3$, such as less than $10^2$, such as less than $10^1$, such as less than $10^o$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$, or $10^8$ to $10^9$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5468. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5469. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5470. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5471. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5472. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5473. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5474. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5475. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa;

0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5476. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5477. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-19}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$ or $10^{-29}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-18}$ to $10^{-19}$, or $10^{-19}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5478. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C.

to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5479. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5480. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5481. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5482. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-9}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5483. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5484. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5485. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5486. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5487. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5488. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5489. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5490. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5491. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of hydrogen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of hydrogen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5492. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-29}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than 10°, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5493. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5494. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5495. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-19}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{44}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5496. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5497. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5498. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{o}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5499. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5500. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5501. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5502. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5503. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5504. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5505. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5506. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5507. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5508. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C.

to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-29}$, such as more than $10^{-19}$, such as more than $10^{-18}$, such as more than $10^{-17}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-29}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5509. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5510. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5511. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5512. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L;

5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5513. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5514. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5515. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5516. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16

TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5517. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5518. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5519. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5520. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5521. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5522. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of flourine atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of flourine atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5523. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{44}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than 10°, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{41}$, or $10^{41}$ to $10^{40}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5524. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5525. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-19}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-17}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5526. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-16}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5527. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-16}$, or $10^{-15}$ to $10^{-14}$, or $10^{-14}$ to $10^{48}$, or $10^{48}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5528. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-29}$, or $10^{-29}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5529. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{\circ}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5530. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5531. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5532. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5533. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5534. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5535. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5536. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5537. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5538. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5539. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-18}$, or $10^{-18}$ to $10^{48}$, or $10^{48}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{8}$, or $10^{8}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5540. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5541. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5542. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650°

C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5543. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5544. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5545. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5546. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5547. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5548. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5549. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5550. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5551. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5552. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5553. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and a percentage crystallinity of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a percentage crystallinity of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a percentage crystallinity of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5554. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-17}$, such as more than $10^{-16}$, such as more than $10^{-16}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{6}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-16}$, such as less than $10^{-16}$, such as less than $10^{-17}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to $10^{8}$, or $10^{8}$ to $10^{9}$—and an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than 10°, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-18}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to 108.

Item A5555. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5556. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-17}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5557. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5558. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-18}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5559. The composite material of any one of items A4-A5398 or B3-B15 where the composite material has an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-13}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-13}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to 108.

Item A5560. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{o}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$ or $10^{3}$ to $10^{4}$ or $10^{4}$ to $10^{5}$ or $10^{5}$ to $10^{6}$, or $10^{6}$ to $10^{7}$, or $10^{7}$ to 108.

Item A5561. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5562. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^{\prime}$, or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5563. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$ or $10^3$ to $10^4$ or $10^4$ to $10^5$ or $10^5$ to $10^6$, or $10^6$ to $10^7$, or $10^7$ to 108.

Item A5564. The composite material of any one of items A4-A5398 or B3-B15 where the composite material has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5565. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^6$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$, or $10^8$ to $10^9$—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5566. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5567. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5568. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5569. The composite material of any one of items A4-A5398 or B3-B15 where the composite material has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5570. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C.

to 3400° C., or from 3400° C. to 3600° C., or from 3600° C. to 3800° C., or from 3800° C. to 4000° C.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{6}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$, or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to $10^{8}$, or $10^{8}$ to $10^{9}$—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to 108.

Item A5571. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^{2}$, such as more than $10^{3}$, such as more than $10^{4}$, such as more than $10^{6}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to 10', or 1010 to $10^{2}$, or $10^{2}$ to $10^{3}$, or $10^{3}$ to $10^{4}$, or $10^{4}$ to $10^{6}$, or $10^{6}$ to $10^{6}$, or $10^{6}$ to $10^{7}$, or $10^{7}$ to 108.

Item A5572. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5573. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01

TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5574. The composite material of any one of items A4-A5398 or B3-B15 where the composite material has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5575. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^{2}$, such as more than $10^{3}$, such as more than $10^{4}$, such as more than $10^{5}$, such as more than $10^{6}$, such as more than $10^{7}$, such as more than $10^{8}$, less than $10^{8}$, such as less than $10^{7}$, such as less than $10^{6}$, such as less than $10^{5}$, such as less than $10^{4}$, such as less than $10^{3}$, such as less than $10^{2}$, such as less than $10^{1}$, such as less than $10^{0}$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$ such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$, or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^{2}$, or $10^{2}$ to $10^{3}$, or $10^{3}$ to $10^{4}$ or $10^{4}$ to $10^{5}$ or $10^{5}$ to $10^{6}$, or $10^{6}$ to $10^{7}$ or $10^{7}$ to $10^{8}$, or $10^{8}$ to $10^{9}$—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$ or $10^{3}$ to $10^{4}$ or $10^{4}$ to $10^{5}$ or $10^{5}$ to $10^{6}$, or $10^{6}$ to $10^{7}$, or $10^{7}$ to 108.

Item A5576. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^{1}$, or $10^{1}$ to $10^{2}$, or $10^{2}$ to $10^{3}$, or $10^{3}$ to $10^{4}$, or $10^{4}$ to $10^{5}$, or $10^{5}$ to $10^{6}$, or $10^{6}$ to $10^{7}$, or $10^{7}$ to 108.

Item A5577. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^{2}$, such as more than $10^{3}$, such as more than $10^{4}$, such as more than $10^{5}$, such as more than $10^{6}$, such as more than $10^{7}$, of less than $10^{8}$, such as less than $10^{7}$, such as less than $10^{6}$, such as less than $10^{5}$, such as less than $10^{4}$, such as less than $10^{3}$, such as less than $10^{2}$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5578. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5579. The composite material of any one of items A4-A5398 or B3-B15 where the composite material has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5580. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and an electrical conductivity measured in siemens per meter of more than $10^{-23}$, such as more than $10^{-22}$, such as more than $10^{-21}$, such as more than $10^{-20}$, such as more than $10^{-19}$, such as more than $10^{-18}$, such as more than $10^{-13}$, such as more than $10^{-16}$, such as more than $10^{-15}$, such as more than $10^{-14}$, such as more than $10^{-13}$, such as more than $10^{-12}$, such as more than $10^{-11}$, such as more than $10^{-10}$, such as more than $10^{-9}$, such as more than $10^{-8}$, such as more than $10^{-7}$, such as more than $10^{-6}$, such as more than $10^{-5}$, such as more than $10^{-9}$, such as more than $10^{-3}$, such as more than $10^{-2}$, such as more than $10^{-1}$, such as more than 1, such as more than 10, such as more than $10^2$, such as more than $10^3$, such as more than $10^4$, such as more than $10^5$, such as more than $10^6$, such as more than $10^7$, such as more than $10^8$, less than $10^8$, such as less than $10^7$, such as less than $10^6$, such as less than $10^5$, such as less than $10^4$, such as less than $10^3$, such as less than $10^2$, such as less than $10^1$, such as less than $10^0$, such as less than $10^{-1}$, such as less than $10^{-2}$, such as less than $10^{-3}$, such as less than $10^{-9}$, such as less than $10^{-5}$, such as less than $10^{-6}$, such as less than $10^{-7}$, such as less than $10^{-8}$, such as less than $10^{-9}$, such as less than $10^{-10}$, such as less than $10^{-11}$, such as less than $10^{-12}$, such as less than $10^{-13}$, such as less than $10^{-14}$, such as less than $10^{-15}$, such as less than $10^{-16}$, such as less than $10^{-13}$, such as less than $10^{-18}$, such as less than $10^{-19}$, such as less than $10^{-20}$, such as less than $10^{-21}$, such as less than $10^{-22}$, such as less than $10^{-23}$, an electrical conductivity measured in siemens per meter of $10^{-23}$ to $10^{-22}$, or $10^{-22}$ to $10^{-21}$, or $10^{-21}$ to $10^{-20}$, or $10^{-20}$ to $10^{-19}$, or $10^{-19}$ to $10^{-18}$, or $10^{-18}$ to $10^{-17}$ or $10^{-17}$ to $10^{-16}$, or $10^{-16}$ to $10^{-15}$, or $10^{-15}$ to $10^{-14}$, or $10^{-14}$ to $10^{-13}$, or $10^{-13}$ to $10^{-12}$, or $10^{-12}$ to $10^{-11}$, or $10^{-11}$ to $10^{-10}$ or $10^{-10}$ to $10^{-9}$, or $10^{-9}$ to $10^{-8}$, or $10^{-8}$ to $10^{-7}$, or $10^{-7}$ to $10^{-6}$, or $10^{-6}$ to $10^{-5}$, or $10^{-5}$ to $10^{-4}$, or $10^{-4}$ to $10^{-3}$, or $10^{-3}$ to $10^{-2}$, or $10^{-2}$ to 0.1, or 0.1 to 1, or 1 to 10, or 10 to $10^2$, or $10^2$ to $10^3$, or $10^3$ to $10^4$, or $10^4$ to $10^5$, or $10^5$ to $10^6$, or $10^6$ to $10^7$, or $10^7$ to $10^8$, or $10^8$ to $10^9$—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^5$, or $10^5$ to $10^6$, or $10^6$ to $10^7$, or $10^7$ to 108.

Item A5581. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a thermal conductivity measured in watts per meter-kelvin of more than $10^{-3}$, such as more than $10^{-2}$, such as more than 0.1, such as more than 1, such as more than 10, such as more than 100, such as more than 1000, such as more than 10000, such as more than 100000, less than 100000, such as less than 10000, such as less than 1000, such as less than 100, such as less than 10, such as less than 1, such as less than 0.1, such as less than 0.01, such as less than 0.001, 0.001 to 0.01, 0.01-0.1, 0.1-1, 1-10, 10-100, 100-1000, 1000-10000, 10000-100000—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5582. The composite material of any one of items A4-A5398 or B3-B15 where the composite material has a specific density lower than 0.01 kg/L, or a specific density in one of the following ranges: 0.01-0.1 kg/L; 0.1-0.4 kg/L;

0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a percentage of oxygen atoms of 0% or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95%, such as 100%, or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, or a percentage of oxygen atoms of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5583. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a decomposition temperature of more than 0° C., such as more than 50° C., such as more than 100° C., such as more than 150° C., such as more than 200° C., such as more than 250° C., such as more than 300° C., such as more than 350° C., such as more than 400° C., such as more than 450° C., such as more than 500° C., such as more than 550° C., such as more than 600° C., such as more than 650° C., such as more than 700° C., such as more than 750° C., such as more than 800° C., such as more than 850° C., such as more than 900° C., such as more than 950° C., such as more than 1000° C., such as more than 1200° C., such as more than 1400° C., such as more than 1600° C., such as more than 1800° C., such as more than 2000° C., such as more than 2200° C., such as more than 2400° C., such as more than 2600° C., such as more than 2800° C., such as more than 3000° C., such as more than 3200° C., such as more than 3400° C., such as more than 3600° C., such as more than 3800° C., such as more than 4000° C., or less than 4000° C., such as less than 3800° C., such as less than 3600° C., such as less than 3400° C., such as less than 3200° C., such as less than 3000° C., such as less than 2800° C., such as less than 2600° C., such as less than 2400° C., such as less than 2200° C., such as less than 2000° C., such as less than 1800° C., such as less than 1600° C., such as less than 1400° C., such as less than 1200° C., such as less than 1000° C., such as less than 950° C., such as less than 900° C., such as less than 850° C., such as less than 800° C., such as less than 750° C., such as less than 700° C., such as less than 650° C., such as less than 600° C., such as less than 550° C., such as less than 500° C., such as less than 450° C., such as less than 400° C., such as less than 350° C., such as less than 300° C., such as less than 250° C., such as less than 200° C., such as less than 150° C., such as less than 100° C., such as less than 50° C., such as less than 10° C., such as from 1° C. to 10° C., or from 10° C. to 50° C., or from 50° C. to 100° C., or from 100° C. to 150° C., or from 150° C. to 200° C., or from 200° C. to 250° C., or from 250° C. to 300° C., or from 300° C. to 350° C., or from 350° C. to 400° C., or from 400° C. to 450° C., or from 450° C. to 500° C., or from 500° C. to 550° C., or from 550° C. to 600° C., or from 600° C. to 650° C., or from 650° C. to 700° C., or from 700° C. to 750° C., or from 750° C. to 800° C., or from 800° C. to 850° C., or from 850° C. to 900° C., or from 900° C. to 950° C., or from 950° C. to 1000° C., or from 1000° C. to 1200° C., or from 1200° C. to 1400° C., or from 1400° C. to 1600° C., or from 1600° C. to 1800° C., or from 1800° C. to 2000° C., or from 2000° C. to 2200° C., or from 2200° C. to 2400° C., or from 2400° C. to 2600° C., or from 2600° C. to 2800° C., or from 2800° C. to 3000° C., or from 3000° C. to 3200° C., or from 3200° C. to 3400° C., or from 3400° C. to 3600° C., or from 3600° C. to 3800° C., or from 3800° C. to 4000° C.—and has a dielectricity constant (relative permittivity) of 1 or more than 1, such as more than 10, such as more than $10^2$, such as more than $10^3$, such as more than $10^4$, such as more than $10^5$, such as more than $10^6$, such as more than $10^7$, of less than $10^8$, such as less than $10^7$, such as less than $10^6$, such as less than $10^5$, such as less than $10^4$, such as less than $10^3$, such as less than $10^2$, such as less than 10, or such as from 1 to 10', or 1010 to $10^2$, or $10^2$ to $10^3$, or $10^3$ to $10^4$, or $10^4$ to $10^6$, or $10^6$ to $10^6$, or $10^6$ to $10^7$, or $10^7$ to 108.

Item A5584. The composite material of any one of items A4-A5398 or B3-B15 where the composite material has a specific density lower than 0.01 kg/L, or a specific density in one of the following ranges: 0.01-0.1 kg/L; 0.1-0.4 kg/L; 0.4-0.6 kg/L; 0.6-0.8 kg/L; 0.8-1 kg/L; 1-1.2 kg/L; 1.2-1.4 kg/L; 1.4-1.6 kg/L; 1.6-1.8 kg/L; 1.8-2 kg/L; 2-2.5 kg/L; 2.5-3 kg/L; 3-3.5 kg/L; 3.5-4 kg/L; 4-4.5 kg/L; 4.5-5 kg/L; 5-5.5 kg/L; 5.5-6 kg/L; 6-6.5 kg/L; 6.5-7 kg/L; 7-7.5 kg/L; 7.5-8 kg/L; 8-8.5 kg/L; 8.5-9 kg/L; 9-9.5 kg/L; 9.5-10 kg/L; 10-11 kg/L; 11-12 kg/L; 12-13 kg/L; 13-14 kg/L; 14-16 kg/L; 16-20 kg/L; 20-30 kg/L; or above 30 kg/L, or greater than 0.01 kg/L, such as greater than 0.05 kg/L, such as greater than 0.2 kg/L, such as greater than 0.4 kg/L, such as greater than 0.6 kg/L, such as greater than 0.8 kg/L, such as greater than 1 kg/L, such as greater than 1.2 kg/L, such as greater than 1.5 kg/L, such as greater than 2 kg/L, such as greater than 4 kg/L, such as greater than 6 kg/L, such as greater than 8 kg/L, such as greater than 10 kg/L, such as greater than 12 kg/L, such as greater than 14 kg/L, such as greater than 16 kg/L, such as greater than 20 kg/L, such as greater than 30 kg/L, or less than 30 kg/L, such as less than 20 kg/L, such as less than 16 kg/L, such as less than 14 kg/L, such as less than 12 kg/L, such as less than 10 kg/L, such as less than 8 kg/L, such as less than 6 kg/L, such as less than 4 kg/L, such as less than 2 kg/L, such as less than 1.5 kg/L, such as less than 1.2 kg/L, such as less than 1 kg/L, such as less than 0.8 kg/L, such as less than 0.6 kg/L, such as less than 0.4 kg/L, such as less than 0.2 kg/L, such as less than 0.05 kg/L, such as less than 0.01 kg/L.—and has a Young's modulus greater than 0.001 TPa, such as greater than 0.01 TPa, such as greater than 0.1 TPa, such as greater than 0.15 TPa, such as greater than 0.2 TPa, such as greater than 0.5 TPa, such as greater than 1 TPa, such as greater than 2 TPa, such as greater than 4 TPa, such as greater than 6 TPa, such as greater than 8 TPa, such as greater than 10 TPa, or less than 10 TPa, such as less than 8 TPa, such as less than 6 TPa, such as less than 4 TPa, such as less than 2 TPa, such as less than 1 TPa, such as less than 0.5 TPa, such as less than 0.2 TPa, such as less than 0.15 TPa, such as less than 0.1 TPa, such as less than 0.01 TPa, such as less than 0.01 TPa. or a Young's Modulus in the following ranges: 0.001-0.01 TPa; 0.01-0.03 TPa; 0.03-0.05 TPa; 0.05-0.07 TPa; 0.07-0.09 TPa; 0.09-0.1TPa; 0.1-0.11 TPa; 0.11-0.12 TPa; 0.12-0.13 TPa; 0.13-0.14 TPa; 0.14-0.15 TPa; 0.15-0.16 TPa; 0.16-0.17 TPa; 0.17-0.18 TPa; 0.18-0.19 TPa; 0.19-0.20 TPa; 0.20-0.22 TPa 0.22-0.25 TPa; 0.25-0.30 TPa; 0.30-0.35 TPa; 0.35-0.40 TPa; 0.40-0.45 TPa; 0.45-0.50 TPa; 0.50-0.60 TPa; 0.60-0.80 TPa; 0.80-1.0 TPa; 1-2 TPa; 2-3 TPa; 3-4 TPa; 4-5 TPa; 5-7 TPa; 7-10 TPa; or above 10 TPA—and has a dielectricity constant (relative permittivity) of 1 or more than 1, such as more than 10, such as more than $10^2$, such as more than $10^3$, such as more than $10^4$, such as more than $10^6$, such as more than $10^6$, such as more than $10^7$, of less than $10^8$, such as less than $10^7$, such as less than $10^6$, such as less than $10^6$, such as less than $10^4$, such as less than $10^3$, such as less than $10^2$, such as less than 10, or such as from 1 to $10^1$, or $10^1$ to $10^2$, or $10^2$ to $10^3$, or $10^3$ to $10^4$, or $10^4$ to $10^6$, or $10^6$ to $10^6$, or $10^6$ to $10^7$, or $10^7$ to $10^8$.

Item A5585. The composite material of any one of items A4-A5398 or B3-B15 where the speed of sound in meters per second through the material is more than 0, such as more than 1, such as more than 10, such as more than 100, such as more than 200, such as more than 300, such as more than 400, such as more than 500, such as more than 600, such as more than 700, such as more than 800, such as more than 900, such as more than 1000, such as more than 1200, such as more than 1400, such as more than 1600, such as more than 1800, such as more than 2000, such as more than 2500, such as more than 3000, such as more than 3500, such as more than 4000, such as more than 4500, such as more than 5000, such as more than 6000, such as more than 7000, such as more than 8000, such as more than 9000, such as more than 10000, such as more than 30000, such as more than 50000, such as more than 100000, or less than 100000, such as less than 50000, such as less than 30000, such as less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1800, such as less than 1600, such as less than 1400, such as less than 1200, such as less than 1000, such as less than 900, such as less than 800, such as less than 700, such as less than 600, such as less than 500, such as less than 400, such as less than 300, such as less than 200, such as less than 100, such as less than 10, such as less than 1, or from 0 to 1, such as from 1 to 10, such as from 10 to 100, such as from 100 to 200, such as from 200 to 300, such as from 300 to 400, such as from 400 to 500, such as from 500 to 600, such as from 600 to 700, such as from 700 to 800, such as from 800 to 900, such as from 900 to 1000, such as from 1000 to 1200, such as from 1200 to 1400, such as from 1400 to 1600, such as from 1600 to 1800, such as from 1800 to 2000, such as from 2000 to 2500, such as from 2500 to 3000, such as from 3000 to 3500, such as from 3500 to 4000, such as from 4000 to 4500, such as from 4500 to 5000, such as from 5000 to 6000, such as from 6000 to 7000, such as from 7000 to 8000, such as from 8000 to 9000, such as from 9000 to 10000, such as from 10000 to 30000, such as from 30000 to 50000, such as from 50000 to 100000.

Item A5586. The composite material of any one of items A4-A5398 or B3-B15 where a 2 millimeter thick film or slice of the material absorbs a fraction of UV light, measured at 320 nanometer wavelength, of 0%, or more than 0%, such as more than 5%, such as more than 10%, such as more than 15%, such as more than 20%, such as more than 25%, such as more than 30%, such as more than 35%, such as more than 40%, such as more than 45%, such as more than 50%, such as more than 55%, such as more than 60%, such as more than 65%, such as more than 70%, such as more than 75%, such as more than 80%, such as more than 85%, such as more than 90%, such as more than 95, a dispersion index of 100% or less than 100%, such as less than 95%, such as less than 90%, such as less than 85%, such as less than 80%, such as less than 75%, such as less than 70%, such as less than 65%, such as less than 60%, such as less than 55%, such as less than 50%, such as less than 45%, such as less than 40%, such as less than 35%, such as less than 30%, such as less than 25%, such as less than 20%, such as less than 15%, such as less than 10%, such as less than 5%, a dispersion index of 0% to 5%, or 5% to 10%, or 10% to 15%, or 15% to 20%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 70% to 75%, or 75% to 80%, or 80% to 85%, or 85% to 90%, or 90% to 95%, or 95% to 100%.

Item A5587. The composite material of any one of items A4-A5398 or B3-B15 where a 10 millimeter thick specimen of the material has a sound absorption coefficient at 2000 Hz of of more than 0.0, such as more than 0.1, such as more than 0.2, such as more than 0.3, such as more than 0.4, such as more than 0.5, such as more than 0.6, such as more than 0.7, such as more than 0.8, such as more than 0.9, such as more than 1.0, or of less than 1.0, such as less than 0.9, such as less than 0.8, such as less than 0.7, such as less than 0.6, such as less than 0.5, such as less than 0.4, such as less than 0.3, such as less than 0.2, such as less than 0.1, such as less than 0.0, or from 0.0 to 0.1, from 0.1 to 0.2, from 0.2 to 0.3, from 0.3 to 0.4, from 0.4 to 0.5, from 0.5 to 0.6, from 0.6 to 0.7, from 0.7 to 0.8, from 0.8 to 0.9, from 0.9 to 1.0

Item A5588. The composite material of any one of items A4-A5398 or B3-B15 where the composite material has a torsional shear strength in MPa of more than 0, such as more than 1, such as more than 10, such as more than 100, such as more than 200, such as more than 300, such as more than 400, such as more than 500, such as more than 600, such as more than 700, such as more than 800, such as more than 900, such as more than 1000, such as more than 1200, such as more than 1400, such as more than 1600, such as more than 1800, such as more than 2000, such as more than 2500, such as more than 3000, such as more than 3500, such as more than 4000, such as more than 4500, such as more than 5000, such as more than 6000, such as more than 7000, such as more than 8000, such as more than 9000, such as more than 10000, such as more than 30000, such as more than 50000, such as more than 100000, or less than 100000, such as less than 50000, such as less than 30000, such as less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1800, such as less than 1600, such as less than 1400, such as less than 1200, such as less than 1000, such as less than 900, such as less than 800, such as less than 700, such as less than 600, such as less than 500, such as less than 400, such as less than 300, such as less than 200, such as less than 100, such as less than 10, such as less than 1, or from 0 to 1, such as from 1 to 10, such as from 10 to 100, such as from 100 to 200, such as from 200 to 300, such as from 300 to 400, such as from 400 to 500, such as from 500 to 600, such as from 600 to 700, such as from 700 to 800, such as from 800 to 900, such as from 900 to 1000, such as from 1000 to 1200, such as from 1200 to 1400, such as from 1400 to 1600, such as from 1600 to 1800, such as from 1800 to 2000, such as from 2000 to 2500, such as from 2500 to 3000, such as from 3000 to 3500, such as from 3500 to 4000, such as from 4000 to 4500, such as from 4500 to 5000, such as from 5000 to 6000, such as from 6000 to 7000, such as from 7000 to 8000, such as from 8000 to 9000, such as from 9000 to 10000, such as from 10000 to 30000, such as from 30000 to 50000, such as from 50000 to 100000 MPa.

Item A5589. The composite material of any one of items A4-A5398 or B3-B15 where the composite material has a ratio of Young's modulus to specific density in TPa L/Kg of of more than 0.00001, such as more than 0.0001, such as more than 0.001, such as more than 0.01, such as more than 0.1, such as more than 1, such as more than 10, such as more than 100, such as more than 1000, or less than 1000, such as less than 100, such as less than 10, such as less than 1, such as less than 0.1, such as less than 0.01, such as less than 0.001, such as less than 0.0001, such as less than 0.00001, or from 0.00001 to 0.0001, such as from 0.0001 to 0.001, such as from 0.001 to 0.01, such as from 0.01 to 0.1, such as from 0.1 to 1, such as from 1 to 10, such as from 10 to 100, such as from 100 to 1000 TPa L/Kg.

Item A5590. The composite material of any one of items A4-A5398 or B3-B15 where the composite material has a tensile strength greater than 0.01 GPa, such as greater than 0.05 GPa, such as greater than 0.1 GPa, such as greater than 0.5 GPa, such as greater than 1 GPa, such as greater than 2 GPa, such as greater than 3 GPa, such as greater than 5 GPa, such as greater than 10 GPa, such as greater than 20 GPa, such as greater than 30 GPa, such as greater than 40 GPa, such as greater than 60 GPa, such as greater than 80 GPa, such as greater than 100 GPa, such as greater than 200 GPa, or less than 200 GPa, such as less than 100 GPa, such as less than 80 GPa, such as less than 60 GPa, such as less than 40 GPa, such as less than 30 GPa, such as less than 20 GPa, such as less than 10 GPa, such as less than 5 GPa, such as less than 3 GPa, such as less than 2 GPa, such as less than 1 GPa, such as less than 0.5 GPa, such as less than 0.1 GPa, such as less than 0.05 GPa, such as less than 0.01 GPa, or 0.01-0.03 GPa; 0.03-0.05 GPa; 0.05-0.07 GPa; 0.07-0.09 GPa; 0.09-0.1 GPa; 0.1-0.11 GPa; 0.11-0.12 GPa; 0.12-0.13 GPa; 0.13-0.14 GPa; 0.14-0.15 GPa; 0.15-0.16 GPa; 0.16-0.17 GPa; 0.17-0.18 GPa; 0.18-0.19 GPa; 0.19-0.20 GPa; 0.20-0.22 GPa; 0.22-0.25 GPa; 0.25-0.30 GPa; 0.30-0.35 GPa; 0.35-0.40 GPa; 0.40-0.45 GPa; 0.45-0.50 GPa; 0.50-0.60 GPa; 0.60-0.80 GPa; 0.80-1.0 GPa; 1-2 GPa (e.g. stainless steel); 2-3 GPa; 3-4 GPa; 4-5 GPa; 5-7 GPa; 7-10 GPa; 10-15 GPa; 15-20 GPa; 20-25 GPa; 25-30 GPa; 30-35 GPa; 35-40 GPa; 40-45 GPa; 45-50 GPa (e.g. single-walled carbon nanotubes); 50-55 GPa; 55-60 GPa; 60-65 GPa; 65-70 GPa; 70-75 GPa; 75-80 GPa; 80-85 GPa; 85-90 GPa; 90-100 GPa; 100-200 GPa, or above 200 GPa.

Item A5591. The composite material of any one of items A4-A5398 or B3-B15 where the composite material has a tensile strength divided by specific density of in the range 0.0003-20,000 GPa L/Kg, in the range 0.0003-20,000 GPa L/Kg, more preferably 0.01-20,000 GPa L/Kg, more preferably 0.1-20,000 GPa L/Kg, more preferably 1-20,000 GPa L/Kg, more preferably 10-20,000 GPa L/Kg, more preferably 100-20,000 GPa L/Kg, more preferably 1,000-20,000 GPa L/Kg, more preferably 5,000-20,000 GPa L/Kg, and more preferably 10,000-20,000 GPa L/Kg, or higher, or less than 20,000 GPa L/kg, such as less than 10,000 GPa L/kg, such as less than 5,000 GPa L/kg, such as less than 1,000 GPa L/kg, such as less than 100 GPa L/kg, such as less than 10 GPa L/kg, such as less than 1 GPa L/kg, such as less than 0.1 GPa L/kg, such as less than 0.0003 GPa L/kg, or greater than 0.0003 GPa L/kg, such as greater than 0.1 GPa L/kg, such as greater than 1 GPa L/kg, such as greater than 10 GPa L/kg, such as greater than 100 GPa L/kg, such as greater than 1,000 GPa L/kg, such as greater than 5,000 GPa L/kg, such as greater than 10,000 GPa L/kg, such as greater than 20,000 GPA L/kg.

Item A5592. The composite material of any one of items A4-A5398 or B3-B15 where the composite material has a fracture toughness of greater than 0.01 MPa·m½, such as greater than 0.1 MPa·m½, such as greater than 1 MPa·m½, such as greater than 2 MPa·m½, such as greater than 5 MPa·m½, such as greater than 10 MPa·m½, such as greater than 15 MPa·m½, such as greater than 20 MPa·m½, such as greater than 25 MPa·m½, such as greater than 30 MPa·m½, such as greater than 40 MPa·m½, such as greater than 50

MPa·m½, such as greater than 75 MPa·m½, such as greater than 100 MPa·m½, or less than 100 MPa·m½, such as less than 75 MPa·m½, such as less than 50 MPa·m½, such as less than 40 MPa·m½, such as less than 30 MPa·m½, such as less than 25 MPa·m½, such as less than 20 MPa·m½, such as less than 15 MPa·m½, such as less than 10 MPa·m½, such as less than 5 MPa·m½, such as less than 2 MPa·m½, such as less than 1 MPa·m½, such as less than 0.1 MPa·m½, such as less than 0.01 MPa·m½, or from 0.01-0.1 MPa·m½, 0.1-1 MPa·m½, 1-2 MPa·m½, 2-5 MPa·m½, 5-10 MPa·m½, 10-15 MPa·m½, 15-20 MPa·m½, 20-25 MPa·m½, 25-30 MPa·m½, 30-40 MPa·m½, 40-50 MPa·m½, 50-75 MPa·m½, 75-100 MPa·m½, or above 100 MPa·m½.

Item A5593. The composite material of any one of items A4-A5398 or B3-B15 where the composite material has a bulk modulus greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa, or less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa, or from 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Item A5594. The composite material of any one of items A4-A5398 or B3-B15 where the composite material has shear modulus greater than 0.001 GPa, such as greater than 0.01 GPa, such as greater than 0.1 GPa, such as greater than 1 GPa, such as greater than 10 GPa, such as greater than 50 GPa, such as greater than 100 GPa, such as greater than 200 GPa, such as greater than 300 GPa, such as greater than 400 GPa, such as greater than 500 GPa, such as greater than 600 GPa, such as greater than 700 GPa, such as greater than 800 GPa, such as greater than 900 GPa, such as greater than 1,000 GPa, or less than 1,000 GPa, such as less than 900 GPa, such as less than 800 GPa, such as less than 700 GPa, such as less than 600 GPa, such as less than 500 GPa, such as less than 400 GPa, such as less than 300 GPa, such as less than 200 GPa, such as less than 100 GPa, such as less than 50 GPa, such as less than 10 GPa, such as less than 1 GPa, such as less than 0.1 GPa, such as less than 0.01 GPa, such as less than 0.001 GPa, or from 0.001-0.01 GPa, 0.01-0.1 GPa, 0.1-1 GPa, 1-10 GPa, 10-100 GPa, 100-200 GPa, 200-300 GPa, 300-400 GPa, 400-500 GPa, 500-600 GPa, 600-700 GPa, 700-800 GPa, 800-900 GPa, 900-1,000 GPa, or above 1,000 GPa.

Item A5595. The composite material of any one of items A4-A5398 or B3-B15 where the composite material has an elongation at break greater than 0.1%, such as greater than 1%, such as greater than 5%, such as greater than 10%, such as greater than 20%, such as greater than 30%, such as greater than 40%, such as greater than 50%, such as greater than 60%, such as greater than 70%, such as greater than 80%, such as greater than 90%, such as greater than 100%, such as greater than 150%, such as greater than 200%, such as greater than 300%, such as greater than 400%, such as greater than 500%, such as greater than 800%, such as greater than 1,500%, or less than 1,500%, such as less than 800%, such as less than 500%, such as less than 400%, such as less than 300%, such as less than 200%, such as less than 150%, such as less than 100%, such as less than 90%, such as less than 80%, such as less than 70%, such as less than 60%, such as less than 50%, such as less than 40%, such as less than 30%, such as less than 20%, such as less than 10%, such as less than 5%, such as less than 1%, such as less than 0.1%, or from 0.1-1%, 1-5%, 5-10%, 10-20%, 20-30%, 30-40%, 40-50%, 50-60%, 60-70%, 70-80%, 80-90%, 90-100%, 100-150%, 150-200%, 200-300%, 300-400%, 400-500%, 500-800%, 800-1,500%, or have elongation at break above 1,500%.

Item A5596. The composite material of any one of items A4-A5398 or B3-B15 where the composite material has an arc resistance as measured in seconds of more than 0, such as more than 10, such as more than 100, such as more than 1000, such as more than 10000, such as more than 100000, such as more than 1000000. In other cases, a material with a low arc resistance is desired, such as an arc resistance as measured in seconds of less than 10000000, such as less than 1000000, such as less than 100000, such as less than 10000, such as less than 1000, such as less than 100, such as less than 10, such as less than 1, such as 0-1, 1-10, 10-100, 100-1000, 1000-10000, 10000-100000, 100000-1000000, 1000000-10000000.

Item A5597. The composite material of any one of items A4-A5398 or B3-B15 where the composite material has an impact resistance Izod value reported in J/m2 higher than 1, such as higher than 10, such as higher than 100, such as higher than 1000, such as higher than 10000, such as higher than 100000, or lower than, 1000000, such as lower than 100000, such as lower than 10000, such as lower than 1000, such as lower than 100, such as lower than 10, such as lower than 1, or from 0-1, 1-10, 10-100, 100-1000, 1000-10000, 10000-100000, 100000-1000000.

Item A5598. The composite material of any one of items A4-A5398 or B3-B15 where the composite material a hardness as measured by the Knoop method of more than 0, such as more than 1, such as more than 5, such as more than 10, such as more than 100, such as more than 1000, or less than 10000, such as less than 100, such as less than 10, such as less than 5, such as less than 1, or from 0-1, 1-5, 5-10, 10-100, 100-1000, 1000-10000.

Item A5598. The composite material of any one of items A4-A5398 or B3-B15 where the composite material has a flexural strength in MPa of more than 0, such as more than 1, such as more than 10, such as more than 100, such as more than 200, such as more than 300, such as more than 400, such as more than 500, such as more than 600, such as more than 700, such as more than 800, such as more than 900, such as more than 1000, such as more than 1200, such as more than 1400, such as more than 1600, such as more than 1800, such as more than 2000, such as more than 2500, such as more than 3000, such as more than 3500, such as more than 4000, such as more than 4500, such as more than 5000, such as more than 6000, such as more than 7000, such as more than 8000, such as more than 9000, such as more than 10000, such as more than 30000, such as more than 50000, such as more than 100000, or less than 100000, such as less than 50000, such as less than 30000, such as less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1800, such as less than 1600, such as less than 1400, such as less than 1200, such as less than 1000, such as less than 900, such as less than 800, such as less than 700, such as less than 600, such as less than 500, such as less than 400, such as less than 300, such as less than 200, such as less than 100, such as less than 10, such as less than 1, or from 0 to 1, such as from 1 to 10, such as from 10 to 100, such as from 100 to 200, such as from 200 to 300, such as from 300 to 400, such as from 400 to 500, such as from 500 to 600, such as from 600 to 700, such as from 700 to 800, such as from 800 to 900, such as from 900 to 1000, such as from 1000 to 1200, such as from 1200 to 1400, such as from 1400 to 1600, such as from 1600 to 1800, such as from 1800 to 2000, such as from 2000 to 2500, such as from 2500 to 3000, such as from 3000 to 3500, such as from 3500 to 4000, such as from 4000 to 4500, such as from 4500 to 5000, such as from 5000 to 6000, such as from 6000 to 7000, such as from 7000 to 8000, such as from 8000 to 9000, such as from 9000 to 10000, such as from 10000 to 30000, such as from 30000 to 50000, such as from 50000 to 100000 MPa.

Item A5599. The composite material of any one of items A4-A5398 or B3-B15 where the composite material has a flexural modulus in GPa of more than 0, such as more than 1, such as more than 10, such as more than 100, such as more than 200, such as more than 300, such as more than 400, such as more than 500, such as more than 600, such as more than 700, such as more than 800, such as more than 900, such as more than 1000, such as more than 1200, such as more than 1400, such as more than 1600, such as more than 1800, such as more than 2000, such as more than 2500, such as more than 3000, such as more than 3500, such as more than 4000, such as more than 4500, such as more than 5000, such as more than 6000, such as more than 7000, such as more than 8000, such as more than 9000, such as more than 10000, such as more than 30000, such as more than 50000, such as more than 100000, or less than 100000, such as less than 50000, such as less than 30000, such as less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1800, such as less than 1600, such as less than 1400, such as less than 1200, such as less than 1000, such as less than 900, such as less than 800, such as less than 700, such as less than 600, such as less than 500, such as less than 400, such as less than 300, such as less than 200, such as less than 100, such as less than 10, such as less than 1, or from 0 to 1, such as from 1 to 10, such as from 10 to 100, such as from 100 to 200, such as from 200 to 300, such as from 300 to 400, such as from 400 to 500, such as from 500 to 600, such as from 600 to 700, such as from 700 to 800, such as from 800 to 900, such as from 900 to 1000, such as from 1000 to 1200, such as from 1200 to 1400, such as from 1400 to 1600, such as from 1600 to 1800, such as from 1800 to 2000, such as from 2000 to 2500, such as from 2500 to 3000, such as from 3000 to 3500, such as from 3500 to 4000, such as from 4000 to 4500, such as from 4500 to 5000, such as from 5000 to 6000, such as from 6000 to 7000, such as from 7000 to 8000, such as from 8000 to 9000, such as from 9000 to 10000, such as from 10000 to 30000, such as from 30000 to 50000, such as from 50000 to 100000 GPa.

Item A5599. The composite material of any one of items A4-A5398 or B3-B15 where the composite material has a specific heat capacity at 25° C. in J/g ° C. of more than 0, such as more than 0.1, such as more than 0.2, such as more than 0.3, such as more than 0.4, such as more than 0.5, such as more than 0.6, such as more than 0.7, such as more than 0.8, such as more than 0.9, such as more than 1, such as more than 2, such as more than 3, such as more than 4, such as more than 5, such as more than 10, such as more than 15, such as more than 20, such as more than 30, such as more than 40, such as more than 50, such as more than 100, or less than 100, such as less than 50, such as less than 40, such as less than 30, such as less than 20, such as less than 15, such as less than 10, such as less than 5, such as less than 4, such as less than 3, such as less than 2, such as less than 1, such as less than 0.9, such as less than 0.8, such as less than 0.7, such as less than 0.6, such as less than 0.5, such as less than 0.4, such as less than 0.3, such as less than 0.2, such as less than 0.1, or from 0.0 to 0.1, from 0.1 to 0.2, from 0.2 to 0.3, from 0.3 to 0.4, from 0.4 to 0.5, from 0.5 to 0.6, from 0.6 to 0.7, from 0.7 to 0.8, from 0.8 to 0.9, from 0.9 to 1, from 1 to 2, from 2 to 3, from 3 to 4, from 4 to 5, from 5 to 10, from 10 to 15, from 15 to 20, from 20 to 30, from 30 to 40, from 40 to 50, from 50 to 100.

The following items relate to applications of composite materials.

Item 5600. The composite material of any one of items A4-A5599 or B3-B15 where the composite material, where the composite material is used in an application selected from the list consisting of wind turbines, wind turbine blades, sensor, sports equipment, racket, rockets, car parts, airplane parts, ship parts, bicycles, motorbikes, tractors, scooters, toys, furniture, space elevators, space equipment, satellites, containers, pressurized containers, helmets, clothing, wallets, knifes, weapons, guns, cannons, robots, cranes, trucks, conveyor belts, car hoods, car spoiler, car rear diffuser, computers, phones, electronic equipment, watches, musical instruments, guitars, drums, drum sticks, keyboards, computer controllers, computer mouse, gaming console, helicopters, engineering materials, construction materials, metal parts, ceramic parts, tyres, paints, inks, printing, 3D printing, spacecraft, sound speakers, microphones, cameras, handbags, suitcases, radio-controlled vehicles, interior design, robotic arms, houses, bridges, roofs, medical instruments, batteries, fuel cells, chargers, winglets, wings, turbines, engines, propellers, stabilizers, masts, fishing rods, bows, arrows, spears, rudders, elevators, flaps, gears, housings, fuselages, energy storage, microphones, spearguns, tent poles, boats, canoes, kayaks, catamarans, monohulls, dishwashers, washing machines, refrigerators, freezers, bonnet, bumper, unexposed bumper, decklid, fascia rear and support, fender, rocker, roof rack, spoiler, front spoiler, rear spoiler, rims, hubcap, tyres, trunk, boot, hatch, trunk, valance, door control module, door seal, door water-shield, hinge, door latch, door lock and power door locks, fuel tank, windshield, window seal, antennas, satellite dish, speaker, tuner, subwoofer, DVD players, video player, cameras[edit], backup camera, dashcam, alternator, battery, battery box, gauges and meters, ammeter, clinometer, dynamometer, fuel gauge, manometer, hydrometer, odometer, speedometer, tachometer, temperature gauge, tire pressure gauge, vacuum gauge, voltmeter, water temperature meter, oil pressure gauge, ignition electronic system, sparking cable, distributor, distributor cap, chassis, arm rest, bench seat, seat belt, seat bracket, power-train, braking system, crankshaft, fan, radiator, gloves, balls, sticks, eyeglasses.

In preferred embodiments, the composite material comprises one or more of the following combinations;

a carbon nanotube and a covalently closed ring; a carbon nanotube and a covalently closed ring comprising a pyrene; a carbon nanotube and a covalently closed ring comprising a n-extended tetrathiafulvalene; a carbon nanotube and a covalently closed ring comprising an aromatic system; a carbon nanotube and a covalently closed ring comprising a C1-C10 alkane; a carbon nanotube and a covalently closed ring consisting of carbon; a carbon nanotube and a covalently closed ring consisting of carbon and oxygen; a carbon nanotube and a covalently closed ring consisting of carbon and nitrogen; a carbon nanotube and a covalently closed ring consisting of carbon and oxygen and nitrogen; a carbon nanotube and a covalently closed ring consisting of 3 to 20 atoms; a carbon nanotube and a covalently closed ring consisting of 21 to 50 atoms; a carbon nanotube and a covalently closed ring consisting of 51 to 100 atoms; a carbon nanotube and a covalently closed ring consisting of 101 to 200 atoms; a multi wall nanotube and a covalently closed ring; a multi wall nanotube and a covalently closed ring comprising a pyrene; a multi wall nanotube and a covalently closed ring comprising a n-extended tetrathiafulvalene; a multi wall nanotube and a covalently closed ring comprising an aromatic system; a multi wall nanotube and a covalently closed ring comprising a C1-C10 alkane; a multi wall nanotube and a covalently closed ring consisting of carbon; a multi wall nanotube and a covalently closed ring consisting of carbon and oxygen; a multi wall nanotube and a covalently closed ring consisting of carbon and nitrogen; a multi wall nanotube and a covalently closed ring consisting of carbon and oxygen and nitrogen; a multi wall nanotube and a covalently closed ring consisting of 3 to 20 atoms; a multi wall nanotube and a covalently closed ring consisting of 21 to 50 atoms; a multi wall nanotube and a covalently closed ring consisting of 51 to 100 atoms; a multi wall nanotube and a covalently closed ring consisting of 101 to 200 atoms; single wall nanotube and a covalently closed ring; single wall nanotube and a covalently closed ring comprising a pyrene; single wall nanotube and a covalently closed ring comprising a n-extended tetrathiafulvalene; single wall nanotube and a covalently closed ring comprising an aromatic system; single wall nanotube and a covalently closed ring comprising a C1-C10 alkane; single wall nanotube and a covalently closed ring consisting of carbon; single wall nanotube and a covalently closed ring consisting of carbon and oxygen; single wall nanotube and a covalently closed ring consisting of carbon and nitrogen; single wall nanotube and a covalently closed ring consisting of carbon and oxygen and nitrogen; single wall nanotube and a covalently closed ring consisting of 3 to 20 atoms; single wall nanotube and a covalently closed ring consisting of 21 to 50 atoms; single wall nanotube and a covalently closed ring consisting of 51 to 100 atoms; single wall nanotube and a covalently closed ring consisting of 101 to 200 atoms.

In preferred embodiments, the composite material comprises one or more of the following;

a covalently closed ring formed around a carbon nanotube; a covalently closed ring comprising a pyrene formed around a carbon nanotube; a covalently closed ring comprising a n-extended tetrathiafulvalene formed around a carbon nanotube; a covalently closed ring comprising an aromatic system formed around a carbon nanotube; a covalently closed ring comprising a C1-C10 alkane formed around a carbon nanotube; a covalently closed ring consisting of carbon formed around a carbon nanotube; a covalently closed ring consisting of carbon and oxygen formed around a carbon nanotube; a covalently closed ring consisting of carbon and nitrogen formed around a carbon nanotube; a covalently closed ring consisting of carbon and oxygen and nitrogen formed around a carbon nanotube; a covalently closed ring consisting of 3 to 20 atoms formed around a carbon nanotube; a covalently closed ring consisting of 21 to 50 atoms formed around a carbon nanotube; a covalently closed ring consisting of 51 to 100 atoms formed around a carbon nanotube; a covalently closed ring consisting of 101 to 200 atoms formed around a carbon nanotube; a covalently closed ring formed around a multi wall nanotube; a covalently closed ring comprising a pyrene formed around a multi wall nanotube; a covalently closed ring comprising a n-extended tetrathiafulvalene formed around a multi wall nanotube; a covalently closed ring comprising an aromatic system formed around a multi wall nanotube; a covalently closed ring comprising a C1-C10 alkane formed around a multi wall nanotube; a covalently closed ring consisting of carbon formed around a multi wall nanotube; a covalently closed ring consisting of carbon and oxygen formed around a multi wall nanotube; a covalently closed ring consisting of carbon and nitrogen formed around a multi wall nanotube; a covalently closed ring consisting of carbon and oxygen and nitrogen formed around a multi wall nanotube; a covalently closed ring consisting of 3 to 20 atoms formed around a multi wall nanotube; a covalently closed ring consisting of 21 to 50 atoms formed around a multi wall nanotube; a covalently closed ring consisting of 51 to 100 atoms formed around a multi wall nanotube; a covalently closed ring consisting of 101 to 200 atoms formed around a multi wall nanotube; a covalently closed ring formed around single wall nanotube; a covalently closed ring comprising a pyrene formed around single wall nanotube; a covalently closed ring comprising a n-extended tetrathiafulvalene formed around single wall nanotube; a covalently closed ring comprising an aromatic system formed around single wall nanotube; a covalently closed ring comprising a C1-C10 alkane formed around single wall nanotube; a covalently closed ring consisting of carbon formed around single wall nanotube; a covalently closed ring consisting of carbon and oxygen formed around single wall nanotube; a covalently closed ring consisting of carbon and nitrogen formed around single wall nanotube; a covalently closed ring consisting of carbon and oxygen and nitrogen formed around single wall nanotube; a covalently closed ring consisting of 3 to 20 atoms formed around single wall nanotube; a covalently closed ring consisting of 21 to 50 atoms formed around single wall nanotube; a covalently closed ring consisting of 51 to 100 atoms formed around single wall nanotube; a covalently closed ring consisting of 101 to 200 atoms formed around single wall nanotube.

In preferred embodiments, the composite material comprises one or more of the following combinations; epoxy and a covalently closed ring; epoxy and a covalently closed ring comprising a pyrene; epoxy and a covalently closed ring comprising a n-extended tetrathiafulvalene; epoxy and a covalently closed ring comprising an aromatic system; epoxy and a covalently closed ring comprising a C1-C10 alkane; epoxy and a covalently closed ring consisting of carbon; epoxy and a covalently closed ring consisting of carbon and oxygen; epoxy and a covalently closed ring consisting of carbon and nitrogen; epoxy and a covalently closed ring consisting of carbon and oxygen and nitrogen; epoxy and a covalently closed ring consisting of 3 to 20 atoms; epoxy and a covalently closed ring consisting of 21 to 50 atoms; epoxy and a covalently closed ring consisting of 51 to 100 atoms; epoxy and a covalently closed ring consisting of 101 to 200 atoms; polycarbonate and a covalently closed ring; polycarbonate and a covalently closed ring comprising a pyrene; polycarbonate and a covalently closed ring comprising a n-extended tetrathiafulvalene; polycarbonate and a covalently closed ring comprising an aromatic system; polycarbonate and a covalently closed ring comprising a C1-C10 alkane; polycarbonate and a covalently closed ring consisting of carbon; polycarbonate and a covalently closed ring consisting of carbon and oxygen; polycarbonate and a covalently closed ring consisting of carbon and nitrogen; polycarbonate and a covalently closed ring consisting of carbon and oxygen and nitrogen; polycarbonate and a covalently closed ring consisting of 3 to 20 atoms; polycarbonate and a covalently closed ring consisting of 21 to 50 atoms; polycarbonate and a covalently closed ring consisting of 51 to 100 atoms; polycarbonate and a covalently closed ring consisting of 101 to 200 atoms; polyethylene and a covalently closed ring; polyethylene and a covalently closed ring comprising a pyrene; polyethylene and a covalently closed ring comprising a π-extended tetrathiafulvalene; polyethylene and a covalently closed ring comprising an aromatic system; polyethylene and a covalently closed ring comprising a C1-C10 alkane; polyethylene and a covalently closed ring consisting of carbon; polyethylene and a covalently closed ring consisting of carbon and oxygen; polyethylene and a covalently closed ring consisting of carbon and nitrogen; polyethylene and a covalently closed ring consisting of carbon and oxygen and nitrogen; polyethylene and a covalently closed ring consisting of 3 to 20 atoms; polyethylene and a covalently closed ring consisting of 21 to 50 atoms; polyethylene and a covalently closed ring consisting of 51 to 100 atoms; polyethylene and a covalently closed ring consisting of 101 to 200 atoms.

In preferred embodiments, the composite material comprises one or more of the following;

epoxy linked to a covalently closed ring; epoxy linked to a covalently closed ring comprising a pyrene; epoxy linked to a covalently closed ring comprising a n-extended tetrathiafulvalene; epoxy linked to a covalently closed ring comprising an aromatic system; epoxy linked to a covalently closed ring comprising a C1-C10 alkane; epoxy linked to a covalently closed ring consisting of carbon; epoxy linked to a covalently closed ring consisting of carbon and oxygen; epoxy linked to a covalently closed ring consisting of carbon and nitrogen; epoxy linked to a covalently closed ring consisting of carbon and oxygen and nitrogen; epoxy linked to a covalently closed ring consisting of 3 to 20 atoms; epoxy linked to a covalently closed ring consisting of 21 to 50 atoms; epoxy linked to a covalently closed ring consisting of 51 to 100 atoms; epoxy linked to a covalently closed ring consisting of 101 to 200 atoms; polycarbonate linked to a covalently closed ring; polycarbonate linked to a covalently closed ring comprising a pyrene; polycarbonate linked to a covalently closed ring comprising a n-extended tetrathiafulvalene; polycarbonate linked to a covalently closed ring comprising an aromatic system; polycarbonate linked to a covalently closed ring comprising a C1-C10 alkane; polycarbonate linked to a covalently closed ring consisting of carbon; polycarbonate linked to a covalently closed ring consisting of carbon and oxygen; polycarbonate linked to a covalently closed ring consisting of carbon and nitrogen; polycarbonate linked to a covalently closed ring consisting of carbon and oxygen and nitrogen; polycarbonate linked to a covalently closed ring consisting of 3 to 20 atoms; polycarbonate linked to a covalently closed ring consisting of 21 to 50 atoms; polycarbonate linked to a covalently closed ring consisting of 51 to 100 atoms; polycarbonate linked to a covalently closed ring consisting of 101 to 200 atoms; polyethylene linked to a covalently closed ring; polyethylene linked to a covalently closed ring comprising a pyrene; polyethylene linked to a covalently closed ring comprising a n-extended tetrathiafulvalene; polyethylene linked to a covalently closed ring comprising an aromatic system; polyethylene linked to a covalently closed ring comprising a C1-C10 alkane; polyethylene linked to a covalently closed ring consisting of carbon; polyethylene linked to a covalently closed ring consisting of carbon and oxygen; polyethylene linked to a covalently closed ring consisting of carbon and nitrogen; polyethylene linked to a covalently closed ring consisting of carbon and oxygen and nitrogen; polyethylene linked to a covalently closed ring consisting of 3 to 20 atoms; polyethylene linked to a covalently closed ring consisting of 21 to 50 atoms; polyethylene linked to a covalently closed ring consisting of 51 to 100 atoms; polyethylene linked to a covalently closed ring consisting of 101 to 200 atoms.

In preferred embodiments, the composite material comprises one or more of the following combinations;

a carbon nanotube and epoxy and a covalently closed ring; a carbon nanotube and epoxy and a covalently closed ring comprising a pyrene; a carbon nanotube and epoxy and a covalently closed ring comprising a n-extended tetrathiafulvalene; a carbon nanotube and epoxy and a covalently closed ring comprising an aromatic system; a carbon nanotube and epoxy and a covalently closed ring comprising a C1-C10 alkane; a carbon nanotube and epoxy and a covalently closed ring consisting of carbon; a carbon nanotube and epoxy and a covalently closed ring consisting of carbon and oxygen; a carbon nanotube and epoxy and a covalently closed ring consisting of carbon and nitrogen; a carbon nanotube and epoxy and a covalently closed ring consisting of carbon and oxygen and nitrogen; a carbon nanotube and epoxy and a covalently closed ring consisting of 3 to 20 atoms; a carbon nanotube and epoxy and a covalently closed ring consisting of 21 to 50 atoms; a carbon nanotube and epoxy and a covalently closed ring consisting of 51 to 100 atoms; a carbon nanotube and epoxy and a covalently closed ring consisting of 101 to 200 atoms; a multi wall nanotube and polycarbonate and a covalently closed ring; a multi wall nanotube and polycarbonate and a covalently closed ring comprising a pyrene; a multi wall nanotube and polycarbonate and a covalently closed ring comprising a n-extended tetrathiafulvalene; a multi wall nanotube and polycarbonate and a covalently closed ring comprising an aromatic system; a multi wall nanotube and polycarbonate and a covalently closed ring comprising a C1-C10 alkane; a multi wall nanotube and polycarbonate and a covalently closed ring consisting of carbon; a multi wall nanotube and polycarbonate and a covalently closed ring consisting of carbon and oxygen; a multi wall nanotube and polycarbonate and a covalently closed ring consisting of carbon and nitrogen; a multi wall nanotube and polycarbonate and a covalently closed ring consisting of carbon and oxygen and nitrogen; a multi wall nanotube and polycarbonate and a covalently closed ring consisting of 3 to 20 atoms; a multi wall nanotube and polycarbonate and a covalently closed ring consisting of 21 to 50 atoms; a multi wall nanotube and polycarbonate and a covalently closed ring consisting of 51 to 100 atoms; a multi wall nanotube and polycarbonate and a covalently closed ring consisting of 101 to 200 atoms; single wall nanotube and polyethylene and a covalently closed ring; single wall nanotube and polyethylene and a covalently closed ring comprising a pyrene; single wall nanotube and polyethylene and a covalently closed ring comprising a n-extended tetrathiafulvalene; single wall nanotube and polyethylene and a covalently closed ring comprising an aromatic system; single wall nanotube and polyethylene and a covalently closed ring comprising a C1-C10 alkane; single wall nanotube and polyethylene and a covalently closed ring consisting of carbon; single wall nanotube and polyethylene and a covalently closed ring consisting of carbon and oxygen; single wall nanotube and polyethylene and a covalently closed ring consisting of carbon and nitrogen; single wall nanotube and polyethylene and a covalently closed ring consisting of carbon and oxygen and nitrogen; single wall nanotube and polyethylene and a covalently closed ring consisting of 3 to 20 atoms; single wall nanotube and polyethylene and a covalently closed ring consisting of 21 to 50 atoms; single wall nanotube and polyethylene and a covalently closed ring consisting of 51 to 100 atoms; single wall nanotube and polyethylene and a covalently closed ring consisting of 101 to 200 atoms.

In preferred embodiments, the composite material comprises one or more of the following combinations;

a carbon nanotube and epoxy linked to a covalently closed ring; a carbon nanotube and epoxy linked to a covalently closed ring comprising a pyrene; a carbon nanotube and epoxy linked to a covalently closed ring comprising a n-extended tetrathiafulvalene; a carbon nanotube and epoxy linked to a covalently closed ring comprising an aromatic system; a carbon nanotube and epoxy linked to a covalently closed ring comprising a C1-C10 alkane; a carbon nanotube and epoxy linked to a covalently closed ring consisting of carbon; a carbon nanotube and epoxy linked to a covalently closed ring consisting of carbon and oxygen; a carbon nanotube and epoxy linked to a covalently closed ring consisting of carbon and nitrogen; a carbon nanotube and epoxy linked to a covalently closed ring consisting of carbon and oxygen and nitrogen; a carbon nanotube and epoxy linked to a covalently closed ring consisting of 3 to 20 atoms; a carbon nanotube and epoxy linked to a covalently closed ring consisting of 21 to 50 atoms; a carbon nanotube and epoxy linked to a covalently closed ring consisting of 51 to 100 atoms; a carbon nanotube and epoxy linked to a covalently closed ring consisting of 101 to 200 atoms; a multi wall nanotube and polycarbonate linked to a covalently closed ring; a multi wall nanotube and polycarbonate linked to a covalently closed ring comprising a pyrene; a multi wall nanotube and polycarbonate linked to a covalently closed ring comprising a n-extended tetrathiafulvalene; a multi wall nanotube and polycarbonate linked to a covalently closed ring comprising an aromatic system; a multi wall nanotube and polycarbonate linked to a covalently closed ring comprising a C1-C10 alkane; a multi wall nanotube and polycarbonate linked to a covalently closed ring consisting of carbon; a multi wall nanotube and polycarbonate linked to a covalently closed ring consisting of carbon and oxygen; a multi wall nanotube and polycarbonate linked to a covalently closed ring consisting of carbon and nitrogen; a multi wall nanotube and polycarbonate linked to a covalently closed ring consisting of carbon and oxygen and nitrogen; a multi wall nanotube and polycarbonate linked to a covalently closed ring consisting of 3 to 20 atoms; a multi wall nanotube and polycarbonate linked to a covalently closed ring consisting of 21 to 50 atoms; a multi wall nanotube and polycarbonate linked to a covalently closed ring consisting of 51 to 100 atoms; a multi wall nanotube and polycarbonate linked to a covalently closed ring consisting of 101 to 200 atoms; single wall nanotube and polyethylene linked to a covalently closed ring; single wall nanotube and polyethylene linked to a covalently closed ring comprising a pyrene; single wall nanotube and polyethylene linked to a covalently closed ring comprising a n-extended tetrathiafulvalene; single wall nanotube and polyethylene linked to a covalently closed ring comprising an aromatic system; single wall nanotube and polyethylene linked to a covalently closed ring comprising a C1-C10 alkane; single wall nanotube and polyethylene linked to a covalently closed ring consisting of carbon; single wall nanotube and polyethylene linked to a covalently closed ring consisting of carbon and oxygen; single wall nanotube and polyethylene linked to a covalently closed ring consisting of carbon and nitrogen; single wall nanotube and polyethylene linked to a covalently closed ring consisting of carbon and oxygen and nitrogen; single wall nanotube and polyethylene linked to a covalently closed ring consisting of 3 to 20 atoms; single wall nanotube and polyethylene linked to a covalently closed ring consisting of 21 to 50 atoms; single wall nanotube and polyethylene linked to a covalently closed ring consisting of 51 to 100 atoms; single wall nanotube and polyethylene linked to a covalently closed ring consisting of 101 to 200 atoms.

In preferred embodiments, the composite material comprises one or more of the following combinations; epoxy and a covalently closed ring formed around a carbon nanotube; epoxy and a covalently closed ring comprising a pyrene formed around a carbon nanotube; epoxy and a covalently closed ring comprising a n-extended tetrathiafulvalene formed around a carbon nanotube; epoxy and a covalently closed ring comprising an aromatic system formed around a carbon nanotube; epoxy and a covalently closed ring comprising a C1-C10 alkane formed around a carbon nanotube; epoxy and a covalently closed ring consisting of carbon formed around a carbon nanotube; epoxy and a covalently closed ring consisting of carbon and oxygen formed around a carbon nanotube; epoxy and a covalently closed ring consisting of carbon and nitrogen formed around a carbon nanotube; epoxy and a covalently closed ring consisting of carbon and oxygen and nitrogen formed around a carbon nanotube; epoxy and a covalently closed ring consisting of 3 to 20 atoms formed around a carbon nanotube; epoxy and a covalently closed ring consisting of 21 to 50 atoms formed around a carbon nanotube; epoxy and a covalently closed ring consisting of 51 to 100 atoms formed around a carbon nanotube; epoxy and a covalently closed ring consisting of 101 to 200 atoms formed around a carbon nanotube; polycarbonate and a covalently closed ring formed around a multi wall nanotube; polycarbonate and a covalently closed ring comprising a pyrene formed around a multi wall nanotube; polycarbonate and a covalently closed ring comprising a n-extended tetrathiafulvalene formed around a multi wall nanotube; polycarbonate and a covalently closed ring comprising an aromatic system formed around a multi wall nanotube; polycarbonate and a covalently closed ring comprising a C1-C10 alkane formed around a multi wall nanotube; polycarbonate and a covalently closed ring consisting of carbon formed around a multi wall nanotube; polycarbonate and a covalently closed ring consisting of carbon and oxygen formed around a multi wall nanotube; polycarbonate and a covalently closed ring consisting of carbon and nitrogen formed around a multi wall nanotube; polycarbonate and a covalently closed ring consisting of carbon and oxygen and nitrogen formed around a multi wall nanotube; polycarbonate and a covalently closed ring consisting of 3 to 20 atoms formed around a multi wall nanotube; polycarbonate and a covalently closed ring consisting of 21 to 50 atoms formed around a multi wall nanotube; polycarbonate and a covalently closed ring consisting of 51 to 100 atoms formed around a multi wall nanotube; polycarbonate and a covalently closed ring consisting of 101 to 200 atoms formed around a multi wall nanotube; polyethylene and a covalently closed ring formed around single wall nanotube; polyethylene and a covalently closed ring comprising a pyrene formed around single wall nanotube; polyethylene and a covalently closed ring comprising a n-extended tetrathiafulvalene formed around single wall nanotube; polyethylene and a covalently closed ring comprising an aromatic system formed around single wall nanotube; polyethylene and a covalently closed ring comprising a C1-C10 alkane formed around single wall nanotube; polyethylene and a covalently closed ring consisting of carbon formed around single wall nanotube; polyethylene and a covalently closed ring consisting of carbon and oxygen formed around single wall nanotube; polyethylene and a covalently closed ring consisting of carbon and nitrogen formed around single wall nanotube; polyethylene and a covalently closed ring consisting of carbon and oxygen and nitrogen formed around single wall nanotube; polyethylene and a covalently closed ring consisting of 3 to 20 atoms formed around single wall nanotube; polyethylene and a covalently closed ring consisting of 21 to 50 atoms formed around single wall nanotube; polyethylene and a covalently closed ring consisting of 51 to 100 atoms formed around single wall nanotube; polyethylene and a covalently closed ring consisting of 101 to 200 atoms formed around single wall nanotube.

In preferred embodiments, the composite material comprises one or more of the following combinations; epoxy linked to a covalently closed ring formed around a carbon nanotube; epoxy linked to a covalently closed ring comprising a pyrene formed around a carbon nanotube; epoxy linked to a covalently closed ring comprising a n-extended tetrathiafulvalene formed around a carbon nanotube; epoxy linked to a covalently closed ring comprising an aromatic system formed around a carbon nanotube; epoxy linked to a covalently closed ring comprising a C1-C10 alkane formed around a carbon nanotube; epoxy linked to a covalently closed ring consisting of carbon formed around a carbon nanotube; epoxy linked to a covalently closed ring consisting of carbon and oxygen formed around a carbon nanotube; epoxy linked to a covalently closed ring consisting of carbon and nitrogen formed around a carbon nanotube; epoxy linked to a covalently closed ring consisting of carbon and oxygen and nitrogen formed around a carbon nanotube; epoxy linked to a covalently closed ring consisting of 3 to 20 atoms formed around a carbon nanotube; epoxy linked to a covalently closed ring consisting of 21 to 50 atoms formed around a carbon nanotube; epoxy linked to a covalently closed ring consisting of 51 to 100 atoms formed around a carbon nanotube; epoxy linked to a covalently closed ring consisting of 101 to 200 atoms formed around a carbon nanotube; polycarbonate linked to a covalently closed ring formed around a multi wall nanotube; polycarbonate linked to a covalently closed ring comprising a pyrene formed around a multi wall nanotube; polycarbonate linked to a covalently closed ring comprising a n-extended tetrathiafulvalene formed around a multi wall nanotube; polycarbonate linked to a covalently closed ring comprising an aromatic system formed around a multi wall nanotube; polycarbonate linked to a covalently closed ring comprising a C1-C10 alkane formed around a multi wall nanotube; polycarbonate linked to a covalently closed ring consisting of carbon formed around a multi wall nanotube; polycarbonate linked to a covalently closed ring consisting of carbon and oxygen formed around a multi wall nanotube; polycarbonate linked to a covalently closed ring consisting of carbon and nitrogen formed around a multi wall nanotube; polycarbonate linked to a covalently closed ring consisting of carbon and oxygen and nitrogen formed around a multi wall nanotube; polycarbonate linked to a covalently closed ring consisting of 3 to 20 atoms formed around a multi wall nanotube; polycarbonate linked to a covalently closed ring consisting of 21 to 50 atoms formed around a multi wall nanotube; polycarbonate linked to a covalently closed ring consisting of 51 to 100 atoms formed around a multi wall nanotube; polycarbonate linked to a covalently closed ring consisting of 101 to 200 atoms formed around a multi wall nanotube; polyethylene linked to a covalently closed ring formed around single wall nanotube; polyethylene linked to a covalently closed ring comprising a pyrene formed around single wall nanotube; polyethylene linked to a covalently closed ring comprising a n-extended tetrathiafulvalene formed around single wall nanotube; polyethylene linked to a covalently closed ring comprising an aromatic system formed around single wall nanotube; polyethylene linked to a covalently closed ring comprising a C1-C10 alkane formed around single wall nanotube; polyethylene linked to a covalently closed ring consisting of carbon formed around single wall nanotube; polyethylene linked to a covalently closed ring consisting of carbon and oxygen formed around single wall nanotube; polyethylene linked to a covalently closed ring consisting of carbon and nitrogen formed around single wall nanotube; polyethylene linked to a covalently closed ring consisting of carbon and oxygen and nitrogen formed around single wall nanotube; polyethylene linked to a covalently closed ring consisting of 3 to 20 atoms formed around single wall nanotube; polyethylene linked to a covalently closed ring consisting of 21 to 50 atoms formed around single wall nanotube; polyethylene linked to a covalently closed ring consisting of 51 to 100 atoms formed around single wall nanotube; polyethylene linked to a covalently closed ring consisting of 101 to 200 atoms formed around single wall nanotube.

Definitions

Additive shall be defined as a first substance added to a second substance to improve, strengthen, or in other ways alter the characteristics of said second substance. Used interchangeably with filler.

Aspect ratio shall mean the largest dimension (eg. length) of a molecule or a piece of material, divided by the smallest dimension (eg. width) of said molecule or piece of material.

Carbon nanotube is used interchangeably with CNT, and shall be defined as a fullerene having a cylindrical or toroidal configuration.

Chemical entity shall mean a structure comprising one atom, or two or more atoms held together by covalent bonds Closed ring shall mean a continuous string of atoms held together by covalent bonds, forming a closed circle, not at any point interrupted by a non-covalent bond. Only those atoms forming the actual ring need to be covalently linked; atoms and molecular entities attached to the atoms making up the continuous string of atoms of the circle, but not being part of the continuous string itself, do not need to be covalently linked to each other or to the atoms of the ring. The ring encircles a space large enough for a molecule with one dimension of at least 2 Å to pass through or reside.

In one aspect, "closed ring" describes a compound of formula ML-1 comprising a ring forming an unbroken circular chain of n atoms (X) around a hole where a molecule with a smallest diameter of more than 2 Ångstrom can reside in or pass through, and wherein said ring corresponds to an unbroken circular chain of atoms which has the lowest total molecular weight of any such possible unbroken circular chain of atoms in the compound, and wherein n=8 to 10000.

(ML-1)

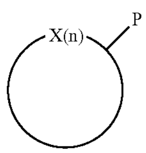

In another aspect, "closed ring" describes a compound of formula ML-2 comprising a ring forming an unbroken circular chain of n atoms (X) around a nanotube, wherein there is no covalent bonds between said compound and said nanotube, and wherein said ring corresponds to an unbroken circular chain of atoms which has the lowest total molecular weight of any such possible unbroken circular chain of atoms around a nanotube in the compound, and wherein n=8 to 10000.

(ML-2)

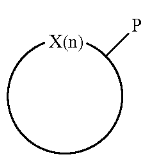

The number of atoms (n) of ML-1 and ML-2 is preferably more than 10, such as more than 20, such as more than 30, such as more than 40, such as more than 50, such as more than 60, such as more than 70, such as more than 80, such as more than 90, such as more than 100, such as more than 200, such as more than 300, such as more than 400, such as more than 500, such as more than 600, such as more than 700, such as more than 800, such as more than 900, such as more than 1000, such as more than 1500, such as more than 2000, such as more than 2500, such as more than 3000, such as more than 3500, such as more than 4000, such as more than 4500, such as more than 5000, such as more than 6000, such as more than 7000, such as more than 8000, such as more than 9000, or less than 10000, such as less than 9000, such as less than 8000, such as less than 7000, such as less than 6000, such as less than 5000, such as less than 4500, such as less than 4000, such as less than 3500, such as less than 3000, such as less than 2500, such as less than 2000, such as less than 1500, such as less than 1000, such as less than 900, such as less than 800, such as less than 700, such as less than 600, such as less than 500, such as less than 400, such as less than 300, such as less than 200, such as less than 100, such as less than 90, such as less than 80, such as less than 70, such as less than 60, Rich as less than 50, such as less than 40, such as less than 30, such as less than 20, or 10 to 20, 20 to 30, 30 to 40, 40 to 50, 50 to 60, 60 to 70, 70 to 80, 80 to 90, 90 to 100, 100 to 200, 200 to 300, 300 to 400, 400 to 500, 500 to 600, 600 to 700, 700 to 800, 800 to 900, 900 to 1000, 1000 to 1500, 1500 to 2000, 2000 to 2500, 2500 to 3000, 3000 to 3500, 3500 to 4000, 4000 to 4500, 4500 to 5000, 5000 to 6000, 6000 to 7000, 7000 to 8000, 8000 to 9000, or 9000 to 10000.

In the following molecules an unbroken circular chain of atoms (in bold) can be traced but these atoms do not form an unbroken circular chain of n atoms (X) around a hole where a molecule with a smallest diameter of more than 2 Ångstrom can reside in or pass through, and thus it is not a compound of formula ML-1.;

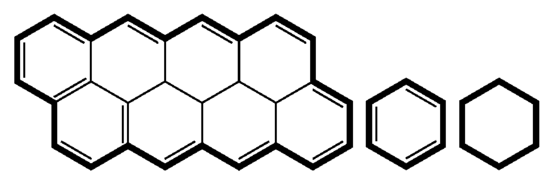

In the following molecules an unbroken circular chain of atoms (in bold) can be traced and these atoms form an unbroken circular chain of n atoms (X) around a hole where a molecule with a smallest diameter of more than 2 Ångstrom can reside in or pass through, and thus is a compound of formula ML-1;

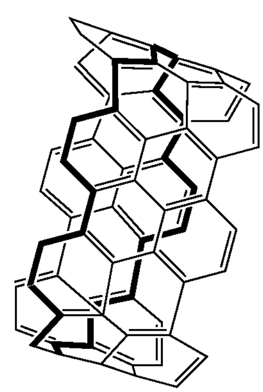

Side View

-continued

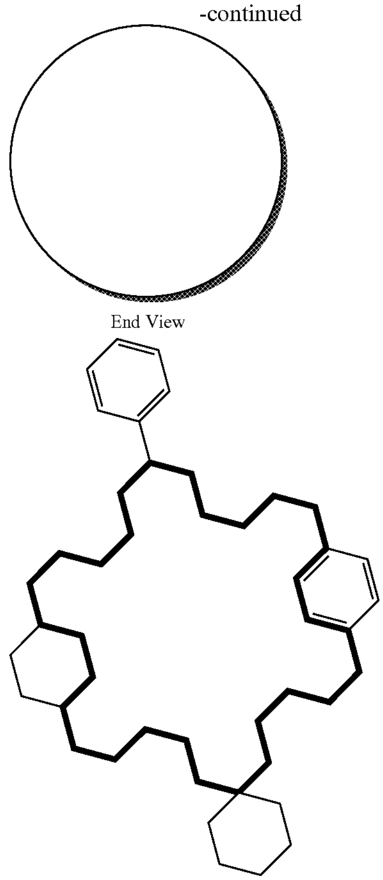

CNT is used interchangeably with Carbon Nanotube.

Composite material. A combination of two or more materials such as a polymer combined with an additive; a metal with an additive, or a ceramic with an additive. Typically, the material in excess is called the matrix, whereas the material present in small amount is called the additive or filler. Example composites are polystyrene combined with a small amount of carbon fibers, and metal combined with a small amount of carbon nanotube.

Composite material unit is used interchangeably with CMU. A CMU comprises two structural entities held together by a linker, a mechanical ligand and a Ligand2. A CMU can be a constituent of a composite material.

Covalently closed ring shall be used interchangeably with closed ring.

Covalent mechanical bond shall be used interchangeably with mechanical bond.

Covalent ring closure shall mean the final step of the process of forming a covalently closed ring.

Element shall exclusively refer to an element of the periodic table of the elements.

Filler is used interchangeably with Additive.

Inorganic structural entities or materials shall mean any material or entity except those comprising carbon and at least one other element. Inorganic SEs thus include CNT, graphene, other fullerenes, and carbon fibers.

Ligand2 shall mean an entity capable of forming a covalent bond, a non-covalent bond, or a mechanical bond to a material, where said entity is a molecule composed of atoms.

Linker Unit is used interchangeably with LU. A linker unit comprises one or more MLs, capable of forming a mechanical bond to a structural entity, one or more Ligand2s, capable of binding covalently or non-covalently to a structural entity, and one or more linkers that link the MLs and Ligand2s together.

Material shall mean anything made of matter. The material may be in a solid state (such as ice) or for all practical purposes solid (e.g. such as glass).

Matrix material shall be defined as the most abundant component of a composite material.

Mechanical Bond shall mean a bond between a Mechanical Ligand (ML) and a structural entity (SE) where at least one intramolecular covalent bond in the SE or in the ML must be broken in order to bring the structural entity and the mechanical ligand apart.

However, for a complex of an SE and an ML where the SE and/or ML has an aspect ratio of more than 100 (one hundred), a Mechanical Bond shall mean a bond between said ML and said SE where at least one intramolecular covalent bond in the SE or in the ML must be broken in order to bring the SE and the ML apart in a direction other than the direction of the largest dimension of said SE and/or said ML that has an aspect ratio of more than 100. For the avoidance of doubt, an intramolecular covalent bond shall mean a covalent bond between atoms within a given molecule (i.e. within the SE or within the ML).

The following are examples of such mechanical bonds between MLs and SEs that keep the SE and the ML interlocked as a consequence of their topology:

i) The ML is a closed ring such as a peptide, wrapped around a nanotube that has an aspect ratio larger than 100. The ends of the peptide have been covalently linked so that the peptide forms a continuous string of covalently linked atoms around the nanotube. The nanotube is a cylindrical structure with an aspect ratio of more than 100, which means that its length (along the cylindrical axis) is more than 100 times larger than its diameter (the diameter of the cylindrical structure). Theoretically, the ML (the closed ring peptide) and the SE (the nanotube) could be brought apart by moving the ML up or down the length of the nanotube (i.e. in the direction of the largest dimension of the nanotube), without breaking an intramolecular covalent bond of the closed ring peptide (the ML) or of the nanotube (the SE). However, it is impossible to bring the closed ring peptide and the nanotube apart in a direction other than the direction of the largest dimension of the nanotube (which has an aspect ratio of more than 100) without breaking an intramolecular covalent bond in the closed ring peptide or the nanotube, and therefore the closed ring peptide and the nanotube per definition forms a mechanical bond between them.

ii) Another example of a mechanical bond is a chemical entity (SE), engulfed by a hollow ball (ML). If the ML and SE cannot be brought apart without breaking an intramolecular covalent bond in either the ML or the SE, then the SE and ML forms a mechanical bond between them.

iii) Another example of a mechanical bond is a linear entity, e.g. a polymer, inserted through a short nanotube and modified at both ends such that the polymer and the nanotube cannot be brought apart without breaking at least one intramolecular covalent bond in either the SE or the ML.

iv) An example similar to the example above is a linear entity, e.g. a polymer (ML) with an aspect ratio of more than 100, inserted through a nanotube (SE) with an aspect ratio of more than 100. In theory, the polymer and the nanotube could be brought apart by sliding one down the length of the other (i.e. bringing the polymer and the nanotube apart in the direction of the largest dimension of the nanotube, i.e. along the axis of the cylindric structure of the nanotube) (or by bringing the polymer and nanotube apart in the direction of the largest dimension of the polymer) (in this special case these two directions are the same). However, it is impossible to bring the polymer and the nanotube apart in a direction other than the direction of the largest dimension of the nanotube without breaking an intramolecular covalent bond in the polymer or breaking an intramolecular covalent bond in the nanotube, and it is impossible to bring the polymer and the nanotube apart in a direction other than the direction of the largest dimension of the polymer without breaking an intramolecular covalent bond in the polymer or breaking an intramolecular covalent bond in the nanotube, and therefore the polymer and the nanotube per definition form a mechanical bond between them.

v) Another example of a mechanical bond is two closed ring structures (e.g. two polymers where the terminals have been covalently closed so that both polymers form closed ring structures), where one of the closed rings have been formed around the continuous string of covalently linked atoms of the other closed ring, such as shown in e.g. (FIG. 1, E). The two closed rings cannot be brought apart without breaking an intramolecular covalent bond in one of the closed ring structures, and therefore per definition the two closed ring structures form a mechanical bond between them.

Mechanical Ligand and ML is used interchangeably and shall mean a chemical entity that is capable of forming a mechanical bond with a structural entity, or is forming a mechanical bond with a structural entity. An example mechanical ligand is a closed ring of atoms wrapped around a structural entity.

Mechanically bound shall mean held together by a mechanical bond.

Multi walled nanotube and MWNT are used interchangeably and shall be defined as a coaxial assembly of nanotubes similar to a coaxial cable, or as a molecular sheet, e.g. of graphene, rolled into the shape of a scroll. Examples include multi wall carbon nanotubes, which is used interchangeably with MWCNT.

Nanotube shall be defined as a hollow cylindrical or toroidal molecule, which is shorter than 1,000 nanometers in at least one dimension.

Natural as used herein, refers to entities, which are found abundantly in nature, such as in biological systems. For example, a natural peptide is composed of the twenty natural amino acids; Isoleucine, Alanine, Leucine, Asparagine, Lysine, Aspartic Acid, Methionine, Cysteine, Phenylalanine, Glutamic Acid, Threonine, Glutamine, Tryptophan, Glycine, Valine, Proline, Serine, Tyrosine, Arginine, Histidine. Similarly, a natural oligonucleotide is composed of the four natural nucleotides cytidine, adenosine, guanosine, and thymidine.

Non-covalent mechanical bond shall mean a bond between a chemical entity and a structural entity (SE) that keeps the SE and said chemical entity associated as a consequence of their topology. A non-covalent mechanical bond is not a type of mechanical bond, since a non-covalent mechanical bond can be broken by breaking a non-covalent bond, as opposed to a mechanical bond which can only be broken by breaking a covalent bond.

Non-covalently closed ring shall mean a continuos string of atoms held together by chemical bonds, forming a closed circle, where at least one of said chemical bonds is a non-covalent bond.

Non-covalent ring closure shall shall mean the final step of the process of forming a non-covalently closed ring, where said final step involves the formation of a non-covalent bond.

Non-natural as used herein refers to entities, which are not found abundantly in nature, such as in biological systems. For example, a non-natural peptide is a peptide, which comprises an entity not found in the list of natural amino acids. Similarly, a non-natural oligonucleotide is an oligonucleotide, which comprises an entity that is not found in the list of the four natural nucleosides.

One atom layer molecule shall be defined as a molecule, which has exactly one atom thickness in one dimension, e.g. graphene.

One layer molecule shall be defined as a molecule, which cannot be separated into two layers without breaking a chemical bond.

Organic materials or structural entities shall mean materials or entities, which contain carbon and at least one other element.

Polymer shall mean a long, repeating chain, such as a branched chain, of atoms, comprising repeated identical or similar units, formed through the linkage of many monomers. Thus, a polymer is a molecule of high relative molecular mass, the structure of which essentially comprises the multiple repetition of units derived, actually or conceptually, from molecules of low relative molecular mass. The monomers can be identical, or they can have one or more substituted chemical groups. Some polymers are made of more than one kind of monomer. Example polymers are polyvinylchloride, polystyrene, DNA, protein and polypeptide.

Precursor-ML shall mean a chemical entity that can be turned into a mechanical ligand (ML) by formation of a covalent bond between two different parts of said precursor-ML.

Single wall nanotube is used interchangeably with SWNT and shall mean a cylindrical nanostructure or a molecular tube with at least one dimension less than 1,000 nanometers. Examples include single wall carbon nanotubes, which is used interchangeable with SWNT.

Structural Entity (SE). A structural entity shall mean a chemical or physical entity. A structural entity may be an atom (e.g. an ion), a molecule (e.g. a nylon polymer or a CNT), or part of a surface/material (e.g. metal). Furthermore, a molecular SE may either be small (largest dimension less than 10 nm), or large (largest dimension more than 10 nm). The two latter categories of SEs shall be referred to as Small Molecular SEs and Large Molecular SEs. A structural entity can be part of a composite material unit (CMU), and said composite material unit may be part of a composite material. A structural entity may be used to anchor the CMU in place in the larger structure of a composite material, or alternatively, may be used to modify the characteristics of a composite material, e.g. by modifying the strength, flexibility, or appearance of the composite material.

Surface shall mean a material layer constituting a boundary, such as the one or few outermost atomic layer(s) of a material.

Weight percent. This shall mean the mass of the substance in question (e.g. of the nanotubes in a composite material) divided by the mass of all of the substances (e.g. of the mass of the composite material wherein the nanotube is), and the following terms shall all denote the weight percent: wt %, w/w %, w/w, w %.

EXAMPLES

Example 1.1

Ring-closing of a linear molecule around a single-walled carbon nanotube, to form a cyclic molecule that is a mechanical ligand, i.e. resulting in formation of an SE1-ML complex.

In this example, an SE1-ML complex is formed, by first binding a precursor-ML to the SE1, and then reacting the two ends of the precursor-ML to form a closed ring around the SE1. SE1 is a single-wall carbon nanotube (SWNT), the precursor-ML is a linear molecule, and the mechanical ligand (ML) is a closed ring structure comprising either π-extended tetrathiafulvalene (exTTF), pyrene or naphthalene diimide (NDI) motifs.

Figure 7:
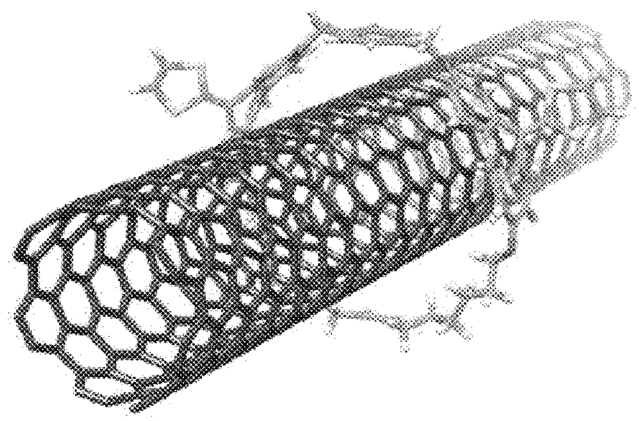
FIG. 7 shows Compound 11, formed around a carbon nanotube (view from side)
Figure 8:
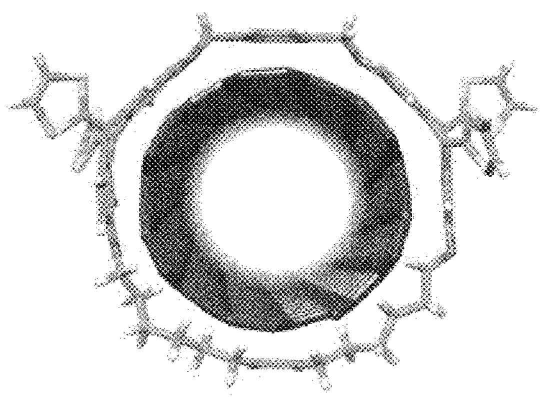
FIG. 8 shows Compound 11, formed around a carbon nanotube (view from end)

This example is from de Juan et al. (Angew. Chem. 2014, 53 (21), 5394-5400, DOI: 10.1002/anie.201402258). Briefly, 20 mg single-walled carbon nanotubes ((7,6)-enriched SWNTs purchased from Sigma-Aldrich, (0.7-1.1 nm in diameter, 90% purity after purification)) were dispersed in 20 ml tetrachloroethane (TCE) by sonication and mixed with 10 mg of Compound 10 (a linear molecule), shown in (FIG. 5) (where n=6), as well as Grubbs second-generation catalyst at room temperature, and incubated for 72 hours. The addition of Grubbs second-generation catalyst afforded ring-closing metathesis (RCM) to occur, which resulted in the formation of Compound 11 (a cyclic molecule) shown in (FIG. 6) (where n=6). The suspension was filtered through a 0.2 μm pore-size polytetrafluoroethylene (PTFE) membrane and washed profusely with dichloromethane (DCM). The solid was removed from the filter, sonicated for 10 minutes in 20 ml DCM and filtered through a 0.2 μm PTFE membrane. This washing procedure was repeated three times. Using thermogravimetric analysis, microscopy, spectroscopy and bulk methods, it was confirmed that the solid retained by the filter after the vigorous washing procedure consisted of single-walled carbon nanotubes (SWNT) with cyclic molecules closed around them as depicted in (FIGS. 7 and 8). Thus, the cyclic molecule, Compound 11, had formed around the SWNTs.

Compound 10, shown in (FIG. 5) was synthesized as described by Canevet et al. (J. Am. Chem. Soc. 2011, 133, 3184-3190, dx.doi.org/10.1021/ja111072j). This linear molecule was called exTTF, as the molecule contained two π-extended tetrathiafulvalene (9,10-di(1,3-dithiol-2-ylidene)-9,10-dihydroanthracene) units.

Similarly, a pyrene-based molecule, Compound 12 (FIG. 9A) was synthesized by López-Moreno and Perez (Chem. Commun., 2015, 51, 5421-5424, DOI: 10.1039/c4cc08970g) and was used to make Compound 13 (FIG. 9A), a closed ring molecule around an SWNT, in a process similar to the process described above.

Similarly, a naphthalene diimide-based molecule, Compound 30 (FIG. 9A) was synthesized by Leret et al. (Chem. Sci., 2017, 8, 1927-1935, DOI: 10.1039/c6sc03894h) and was used to make Compound 31 (FIG. 9B), a closed ring molecule around an SWNT, in a process similar to the process described above.

Figure 6:
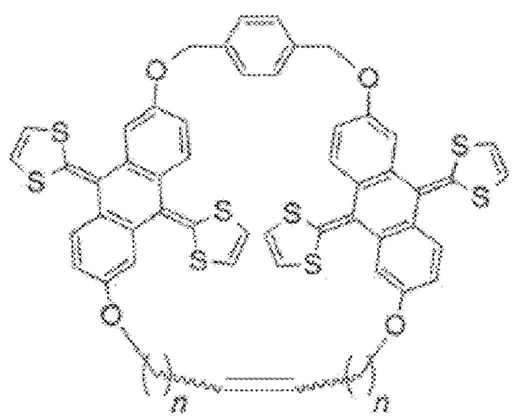
FIG. 6 shows the structure of a ML, Compound 11
Figure 9:
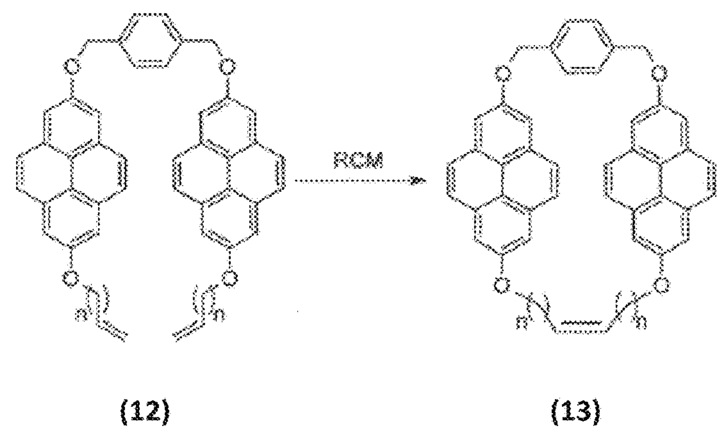
FIG. 9A and FIG. 9B shows the structure of a precursor-ML, Compound 12, and the structure of the mechanical ligand (ML), Compound 13, formed upon ring closure of the precursor-ML around the carbon nanotube
Figure 9:
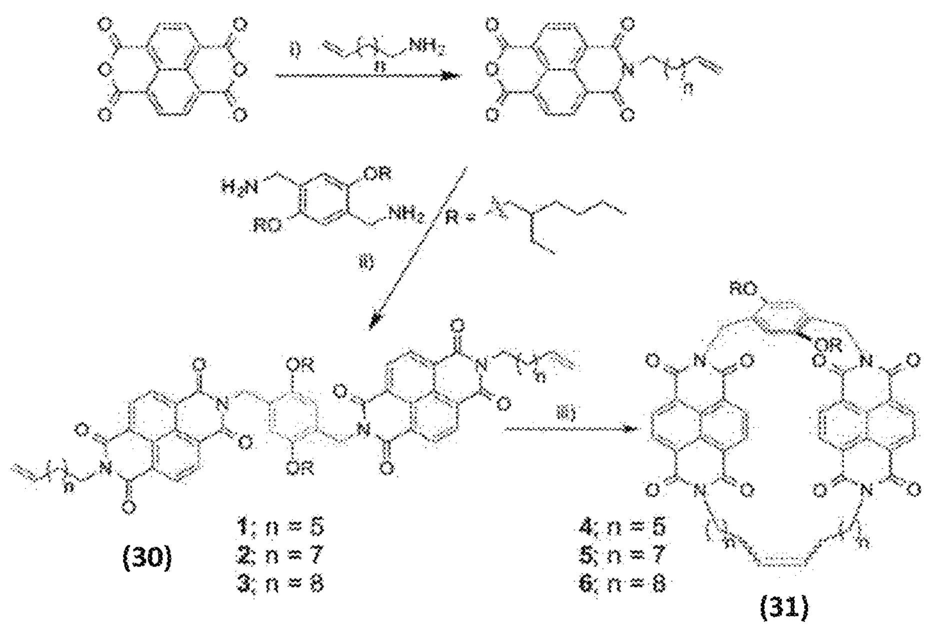

In the examples above, compounds 10, 11, 12, 13, 30, and 31 have n=6 (see FIGS. 6 and 9). The ring closing of the linear precursor molecules may also be done for molecules where n=5, 7, 8, 9 and higher.

Example 1.2

Formation of an SE-ML-Linker Complex.

This example is a modification to Example 1.1. SE1 is a carbon nanotube, ML is a cyclic structure comprising a tetrathiafulvalene motif, wrapped around the carbon nanotube, and the Linker is a 10-carbon linker.

20 mg single-walled carbon nanotubes, e.g. (7,6)-enriched SWNTs purchased from Sigma-Aldrich (0.7-1.1 nm in diameter, 90% purity after purification), are dispersed in 20 ml tetrachloroethane (TCE) by sonication and mixed with 10 mg of Compound B shown in (FIGS. 10 and 11), and Grubbs second-generation catalyst, and incubated at room temperature for 72 hours. The addition of Grubbs second-generation catalyst affords ring-closing metathesis (RCM) to occur, resulting in formation of Compound C, analogous to the ring closing described in Example 1.1. The resulting cyclic molecule, Compound C, is shown in (FIG. 11). The suspension is filtered through a 0.2 μm pore-size polytetrafluoroethylene (PTFE) membrane and washed profusely with dichloromethane (DCM). The solid is removed from the filter, sonicated for 10 minutes in 20 ml DCM and filtered through a 0.2 μm PTFE membrane. This washing procedure is repeated three times. After the vigorous washing procedure, the solid retained on the filter membrane consists of single-walled carbon nanotubes (SWNTs) with cyclic molecules closed around them. Thus, a mechanical ligand (Compound C, a closed ring structure) is formed around the SWNTs. Compound C contains an ester linker unit (—$(CH_2)_{10}CO_2Me$), in addition to the closed ring structure, see (FIG. 11). The ester linker unit can be changed to an acid linker unit (—$(CH_2)_{10}COOH$) by acid hydrolysis, resulting in Compound D (FIG. 11).

Figure 13:
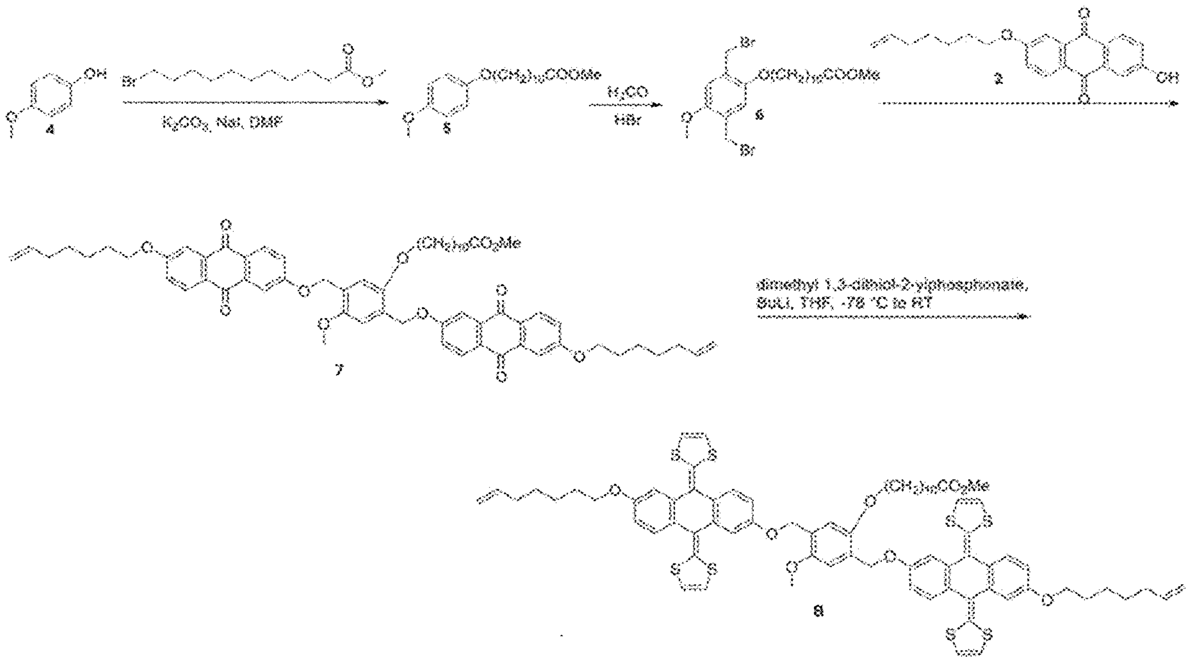
FIG. 13 shows the synthesis (Scheme 1) of Compound B

Compound (B) was synthesized as depicted in (FIG. 13, Scheme 1; analytical data and the final product is shown in FIGS. 53-61). Starting from commercially available 4-methoxyphenol (compound 4), compound 5 was produced after alkylation with commercially available methyl 11-bromo undecanoate. Compound 5 was reacted with formaldehyde and hydrogen bromide (HBr) to yield compound 6. Compound (B) was obtained by alkylation of compound 2 followed by Wittig-Horner reaction as described for the synthesis of the Compound 10 in Example 1.1. Compound (B) was obtained in 92% purity. See analytical data in FIGS. 53 to 61.

Similarly, an SE-ML-Linker complex can be formed using either a pyrene-based cyclic structure as the ML (analogous to Example 1.1) or an NDI-based cyclic structure as the ML (analogous to Example 1.1) in a process similar to the one described above.

Example 1.3

Formation of an SE1-ML-Linker-Ligand2 Complex

This example is a modification to Example 1.2. SE1 is a SWNT, ML is a closed ring molecule comprising two tetrathiafulvalene motifs (exTTF), the linker comprises a C-10 linker, and Ligand2 is an amino group, available for reaction with e.g. a carboxylic acid.

20 mg single-walled carbon nanotubes, e.g. (7,6)-enriched SWNTs purchased from Sigma-Aldrich (0.7-1.1 nm in diameter, 90% purity after purification) are dispersed in 20 ml tetrachloroethane (TCE) by sonication and mixed with 10 mg of Compound B (FIGS. 10 and 11), and a Grubbs second-generation catalyst, and incubated at room temperature for 72 hours. The addition of Grubbs second-generation catalyst affords ring-closing metathesis (RCM) to occur, resulting in formation of Compound C, as described in Example 1.2. The suspension is filtered through a 0.2 μm pore-size polytetrafluoroethylene (PTFE) membrane and washed profusely with dichloromethane (DCM). The solid is removed from the filter, sonicated for 10 minutes in 20 ml DCM and filtered through a 0.2 μm PTFE membrane. This washing procedure is repeated three times. After the vigorous washing procedure, the solid retained on the filter membrane consists of single-walled carbon nanotubes (SWNT) with cyclic molecules closed around them. Thus, mechanical ligands are formed around the SWNTs. Moreover, the mechanical ligand (the closed ring) is covalently attached to an ester linker unit (—$(CH_2)_{10}CO_2Me$). The ester linker unit is then changed to an acid linker unit (—$(CH_2)_{10}COOH$) by acid hydrolysis, to form Compound D (FIG. 11). Finally, the acid linker unit is converted into an amine linker unit, by first activating the acid (e.g. by addition of EDC (1-Ethyl-3-(3-dimethylaminopropyl)carbodiimide) in e.g. TEA to form Compound E, or by addition of DCC (N,N'-dicyclohexylcarbodiimide) in e.g. toluene to form Compound F, or by addition of DIC (N,N'-diisopropylcarbodiimide) in e.g. isopropanol to form Compound G), and then adding hexamethylenediamine, to form Compound H.

The resulting SE1-ML-Linker-Ligand2 complex comprises SE1 (SWNT), ML (the closed ring wrapped around the SWNT, thereby forming a mechanical bond between SE1 and Linker), Linker (comprising the 10-carbon moiety), and Ligand2 (the terminal amino group, ready for reaction with e.g. a carboxylic acid).

The process described above for modification of the linker attached to the ML also provides a means to control the dispersion of a structural entity (SE) in various solvents. Thus, prior, during, or after the formation of an SE-ML complex, the linker attached to the ML can be modified, in order to change the dispersion of the SE in any relevant solvent or material. Here follows three examples of modifying the dispersion of SWNT in three different types of solvent, by modification of the linker that is attached to the ML, and that therefore is mechanically bound to the SWNT.

In the following examples, the linker attached to ML is modified after the formation of the carbon nanotube-ML complex. Thus, first the SWNT-Compound D complex is formed, as described in Example 1.2. Then, depending on the choice of solvent, Compound D is modified as follows:

To improve the dispersion of SWNT in an amine solvent (such as an amine solvent used as a curing agent in the preparation of epoxies), the carboxylic acid of Compound D is activated with EDC, DCC or DIC and reacted with a diamine (such as hexamethylenediamine, leading to Compound H) (Figure T7) or a triamine (such as spermidine). Thus, the functionalized SWNTs will display one free amino group (upon reaction with hexamethylenediamine) or two free amino groups (upon reaction with spermidine) per ML. This will change the degree of dispersion of SWNT in the amine solvent.

To improve the dispersion of SWNTs in solvents such as water, methanol, ethanol, acetonitrile, benzene, and dichloromethane, the carboxylic acid of Compound D is activated with EDC, DCC or DIC and reacted with the alcohol group of polyethylene glycol (PEG), thereby attaching one PEG molecule per ML. This will change the degree of dispersion of SWNT in these solvents.

To improve the dispersion of SWNTs in a hydrophobic solvent (such as heptane) the carboxylic acid of Compound D is activated with EDC, DCC or DIC and reacted with a hydrophobic moiety such as pentadecylamine. This will change the degree of dispersion of SWNT in such hydrophobic solvents.

Similarly, an SE1-ML-Linker-Ligand2 complex can be formed using either a pyrene-based cyclic structure as the ML or an NDI based cyclic structure as the ML in a process similar to the one described above.

Example 2.1

Formation of Polystyrene-Carbon Nanotube Composites, where an ML is Mechanically Bound to the Carbon Nanotube.

This example serves as a starting point for the generation of composite material units, as will be described in Example 2.2.

This example is from Lopez-Moreno (ACS Nano 2016, 10, 8012-8018, DOI: 10.1021/acsnano.6b04028). Briefly, three different types of single-walled carbon nanotubes were used. (6,5)-enriched nanotubes (pristine) were purchased from Sigma-Aldrich (0.7-0.9 nm in diameter, length ≥700 nm, mostly semiconducting, 95% purity), plasma-purified SWNTs (pp-SWNTs) (pristine) were purchased from Cheap Tubes, Inc. (0.8-1.6 nm in diameter, length 3-30 μm, mostly metallic, 99% purity), and COOH-functionalized SWNTs (o-SWNTs) were purchased from Cheap Tubes, Inc. (0.8-1.6 nm in diameter, length 0.5-2.0 μm, mostly metallic, 99% purity). Compounds 11 and 13 were synthesized as described in Example 1.1.

SWNTs were used without functionalization (i.e. pristine SWNTs), were bought as COOH-functionalized SWNTs (o-SWNTs), and/or were functionalized by formation of the cyclic molecules Compound 11 or Compound 13 around the carbon nanotubes, as described in Example 1.1. The binding of mechanical ligands (Compound 11 or 13) to SWNT is thought to increase the dispersion of the SWNT, which is expected to increase the quality (e.g. strength) of the composite material.

Composites were prepared by separate sonication of each of the nine different types of SWNTs and SWNT-complexes (i.e. (6,5)-SWNT; pp-SWNT; o-SWNT; (6,5)-SWNT functionalized with Compound 11; pp-SWNT functionalized with Compound 11; o-SWNT functionalized with Compound 11; (6,5)-SWNT functionalized with Compound 13; pp-SWNT functionalized with Compound 13; or o-SWNT functionalized with Compound 13) in dimethylformamide (DMF) at 20° C. for 12 hours and the suspensions were centrifuged at 13,150 g for 15 minutes to obtain stable suspensions. Polystyrene (molecular weight average 350,000) was added to 30% (w/w) and the suspensions were stirred for 12 hours. The prepared suspensions were added to a syringe and pumped at one ml per hour through a commercially available Spraybase electrospinning system with a voltage of 14 kV and constant temperature and humidity. All samples were electrospun over a ten (10) cm diameter round collector and randomly aligned fibers were obtained. SWNT loadings with respect to polystyrene was 0.01% (w/w) in all SWNT-containing samples.

Mechanical properties (tensile strength and Young's modulus) of the obtained fiber samples were determined using a dynamic mechanical analyzer (DMA Q800, TA Instruments). Each fiber sample (n=3 specimens) was cut in 1 cm×4 cm rectangular shapes with thicknesses between 0.15 and 0.18 mm Stress-strain curves were recorded at a rate of 1 N per minute (up to 18 N). Improvements in mechanical properties were dependent on SWNT type ((6, 5)-SWNTs, pp-SWNTs, or o-SWNTs) and mechanical ligand type, i.e. comprising an exTTF motif (Compound 11) or comprising a pyrene motif (Compound 13), as shown in Table 1. Best results were obtained when using o-SWNTs in combination with Compound 11, i.e. the exTTF type mechanical ligand, where a 290% increase in Young's modulus and a 240% increase in tensile strength was observed.

TABLE 1

| Sample | Polymer | SWNT | ML | Young's modulus (MPa) | Change in Young's modulus | Tensile strength (MPa) | Change in tensile strength |
|---|---|---|---|---|---|---|---|
| 1 | Polystyrene | None | None | 15 ± 1 | — | 1.09 ± 0.03 | — |
| 2 | Polystyrene | (6, 5)-SWNT | None | 18 ± 1 | +20% | 1.26 ± 0.06 | +16% |
| 3 | Polystyrene | (6, 5)-SWNT | Compound 13 | 32 ± 6 | +110% | 2.0 ± 0.3 | +80% |
| 4 | Polystyrene | (6, 5)-SWNT | Compound 11 | 21 ± 7 | +40% | 1.18 ± 0.08 | +8% |
| 5 | Polystyrene | pp-SWNT | None | 16 ± 3 | +7% | 0.6 ± 0.2 | −40% |
| 6 | Polystyrene | pp-SWNT | Compound 13 | 34 ± 5 | +130% | 3.0 ± 0.7 | +170% |
| 7 | Polystyrene | pp-SWNT | Compound 11 | 50 ± 12 | +230% | 2.25 ± 0.05 | +106% |
| 8 | Polystyrene | o-SWNT | None | 23 ± 2 | +50% | 1.18 ± 0.02 | +8% |
| 9 | Polystyrene | o-SWNT | Compound 13 | 35 ± 6 | +130% | 2.6 ± 0.3 | +140% |
| 10 | Polystyrene | o-SWNT | Compound 11 | 59 ± 7 | +290% | 3.7 ± 0.2 | +240% |

Example 2.2

Formation of a Polystyrene-Carbon Nanotube Composite Material, Comprising Multiple Composite Material Units (CMUs).

This example is adapted from Example 2.1. Many of the synthetic steps described in this example are identical or very similar to the synthetic steps of Example 2.1.

SE1 is a carbon nanotube, Compound D (see FIG. 11) comprises the mechanical ligand (a closed ring, including a tetrathiafulvalene motif), the Linker comprises a 10-carbon moiety, Ligand2 is an amide bond, and SE2 is polystyrene.

Like Example 2.1, the binding of mechanical ligands to SWNTs is expected to increase the dispersion of the SWNTs, thereby improving characteristics such as strength of the resulting composite material. However, in this Example 2.2, the mechanical ligands are covalently attached to polystyrene through the Linker and Ligand2 (the amide bond). Since the mechanical ligand is mechanically bound to the carbon nanotube, this covalent bond between the mechanical ligand and the polystyrene has the effect of anchoring the carbon nanotube in the composite material. Better anchoring of the additive (carbon nanotube) in a composite material will further improve such characteristics as strength of the composite material.

Two different types of single-walled carbon nanotubes are used. (6,5)-enriched nanotubes are purchased from Sigma-Aldrich (0.7-0.9 nm in diameter, length ≥700 nm, mostly semiconducting, 95% purity), and plasma-purified SWNTs (pp-SWNTs) are purchased from Cheap Tubes, Inc. (0.8-1.6 nm in diameter, length 3-30 μm, mostly metallic, 99% purity).

SWNTs are functionalized by formation of Compound D around the SWNTs, exactly as described for the formation of Compound 11 around SWNTs in Example 1.2. Thus, functionalized SWNT is mechanically bound to one or more copies of Compound D, and Compound D carries a carboxylic acid. Therefore, functionalized SWNTs carry carboxylic groups.

Composites are prepared by sonication of functionalized SWNT (see paragraph immediately above, describing the functionalization of SWNT with Compound D) in dimethylformamide (DMF) at 20° C. for 12 hours and the suspensions are then centrifuged at 13,150 g for 15 minutes to obtain stable suspensions Amine-terminated polystyrene (Compound 20, FIG. 12) purchased from Sigma-Aldrich (molecular weight average 11,000) is added to 3% (w/w) and EDC, DCC or DIC is added in order to activate the carboxylic acid of the functionalized SWNTs, to form an amide bond between the carboxylic acid and the amine of the amine-terminated polystyrene, thereby covalently linking the mechanical ligand (Compound D) and the polystyrene. Polystyrene (molecular weight average 350,000) is then added to 27% (w/w) and the suspensions are stirred for 12 hours. The prepared suspensions are added to a syringe and pumped at one ml per hour through a commercially available Spraybase electrospinning system with a voltage of 14 kV and constant temperature and humidity. All samples are electrospun over a ten (10) cm diameter round collector and randomly aligned fibers are obtained. SWNT loadings with respect to polystyrene is 0.01% (w/w) in all SWNT-containing samples.

Strength and other characteristics of the composite material fibers obtained immediately above can be measured in many different ways. For example, mechanical properties (tensile strength and Young's modulus) of the obtained fiber samples can be determined using a dynamic mechanical analyzer (DMA Q800, TA Instruments). Each fiber sample (n=3 specimens) is cut in 1 cm×4 cm rectangular shapes. Stress-strain curves are recorded at a rate of 1 N per minute (up to 18 N). Many other types of strength, as well as many characteristics other than strength, can be measured.

If desired, other SWNT loadings can be applied. For example, using the same procedures as described above, SWNT loadings with respect to polystyrene can be lower (e.g. 0.001%), or higher (e.g. 0.1%, 1%, 5%, 20%, 40%), or any other loading.

If desired, other loadings of Compound 20 (FIG. 12) can be applied. For example, Compound 20 loadings can be lower (e.g. 0.1%, 0.5%, or 1%), or higher (e.g. 5%, 10%, 20%, or 40%), or any other loading.

If desired, other loadings of polystyrene (as opposed to amine-terminated polystyrene) can be applied. For example, polystyrene loadings can be lower (e.g. 1%, 5%, 10%, or 20%), or higher (e.g. 40%, 50%, or 60%), or any other loading.

If desired, a pyrene-based, or an NDI-based ML can be used in a similar process instead of the exTTF-based ML described in the process above.

In conclusion, Example 2.2 describes the generation of a polystyrene-SWNT composite material comprising multiple Composite Material Units (CMUs). The anchoring of the additive (carbon nanotube) in the matrix, by way of covalent attachment of the mechanical ligand to the polystyrene, improves characteristics such as strength of the composite material.

Example 2.3

Formation of a Polystyrene-Carbon Nanotube Composite Material, Comprising Multiple Composite Material Units.

This example is similar to Example 2.2.

SE1 is a carbon nanotube, Compound D comprises the mechanical ligand (a closed ring, including a tetrathiafulvalene motif), the Linker comprises a 10-carbon moiety, Ligand2 is an amide bond, and SE2 is poly(styrene/4-aminoethyl styrene).

Like Example 2.1, the binding of mechanical ligands to SWNTs is expected to increase the dispersion of the SWNTs, thereby improving characteristics such as strength of the resulting composite material. However, in this Example 2.3, the mechanical ligands are covalently attached to poly(styrene/4-aminoethyl styrene) through the Linker and Ligand2 (the amide bond). Since the mechanical ligand is mechanically bound to the carbon nanotube, this covalent bond between the mechanical ligand and the poly(styrene/4-aminoethyl styrene) has the effect of anchoring the carbon nanotube in the composite material. Better anchoring of the additive (carbon nanotube) in a composite material will further increase such characteristics as strength of the composite material.

Two different types of single-walled carbon nanotubes are used. (6,5)-enriched nanotubes are purchased from Sigma-Aldrich (0.7-0.9 nm in diameter, length ≥700 nm, mostly semiconducting, 95% purity), and plasma-purified SWNTs (pp-SWNTs) are purchased from Cheap Tubes, Inc. (0.8-1.6 nm in diameter, length 3-30 μm, mostly metallic, 99% purity). SWNTs are functionalized by formation of Compound D around the SWNTs, exactly as described for the formation of Compound 11 around SWNTs in Example 1.2. Thus, functionalized SWNT is mechanically bound to one or more copies of Compound D, and Compound D carries a carboxylic acid. Therefore, functionalized SWNTs carry carboxylic groups.

A poly(styrene/4-aminoethyl styrene) polymer is prepared using standard procedures for polystyrene synthesis, by mixing 9 parts styrene with 1 part 4-aminoethyl styrene, and using benzoyl peroxide as the free radical initiator to polymerize the monomers. Styrene and 4-aminoethyl styrene monomers are shown in (FIG. 14). The resulting poly(styrene/4-aminoethyl styrene) will thus carry multiple amino groups along the length of the polymer. Alternatively, poly(styrene/4-amino styrene) can be prepared according to the procedure described in Tetrahedron Letters, vol 43, Issue 52, December 2002, pp. 9717-9719.

Composites are prepared by sonication of SWNTs functionalized with Compound D (FIG. 11) in dimethylformamide (DMF) at 20° C. for 12 hours and the suspensions are then centrifuged at 13,150 g for 15 minutes to obtain stable suspensions. The poly(styrene/4-aminoethyl styrene) is then added to 30% (w/w), and EDC, DCC or DIC is added in order to activate the carboxylic acid of the functionalized SWNTs, to form an amide bond between the carboxylic acid and the amine of poly(styrene/4-aminoethyl styrene), thereby covalently linking the mechanical ligand (Compound D) and the poly(styrene/4-aminoethyl styrene). The suspensions are then stirred for 12 hours. The prepared suspensions are added to a syringe and pumped at one ml per hour through a commercially available Spraybase electrospinning system with a voltage of 14 kV and constant temperature and humidity. All samples are electrospun over a ten (10) cm diameter round collector and randomly aligned fibers are obtained. SWNT loadings with respect to poly(styrene/4-aminoethyl styrene) is 0.01% (w/w) in all SWNT-containing samples.

If desired, other SWNT loadings can be applied. For example, SWNT loadings with respect to poly(styrene/4-aminoethyl styrene) can be lower (e.g. 0.001%), or higher (e.g. 0.1%, 1%, 5%, 20%, 40%), or any other loading.

If desired, the relative amounts of styrene and 4-aminoethyl styrene during the preparation of poly(styrene/4-aminoethyl styrene) can be varied in the above. Thus, ratios of the two reagents can vary from 1:1000 to 1000:1.

If desired, a pyrene-based, or an NDI-based ML can be used in a similar process instead of the exTTF based ML described in the process above.

In conclusion, Example 2.3 describes the generation of a poly(styrene/4-aminoethyl styrene)-SWNT composite material comprising multiple Composite Material Units (CMUs). The anchoring of the additive (carbon nanotube) in the matrix, by way of covalent attachment of the mechanical ligand to the poly(styrene/4-aminoethyl styrene), improves characteristics such as strength of the composite material.

Example 2.4

Making an Epoxy-Based Composite Material Unit Using a Mechanical Ligand that is Covalently Attached to the Epoxy Resin.

This example is adapted from example 2.1.

SE1 is a carbon nanotube, Compound D (FIG. 11) comprises the mechanical ligand (a closed ring, including a tetrathiafulvalene motif), the Linker comprises a 10-carbon moiety, Ligand2 is an amide bond, and SE2 is an epoxy polymer.

Two different types of single-walled carbon nanotubes are used. (6,5)-enriched nanotubes are purchased from Sigma-Aldrich (0.7-0.9 nm in diameter, length ≥700 nm, mostly semiconducting, 95% purity), and plasma-purified SWNTs (pp-SWNTs) are purchased from Cheap Tubes, Inc. (0.8-1.6 nm in diameter, length 3-30 μm, mostly metallic, 99% purity). SWNTs are functionalized by formation of Compound D around the SWNTs, exactly as described for the formation of Compound 11 around SWNTs in Example 1.2. Once Compound D has formed around the SWNTs, the terminal COOH moiety of compound D is reacted with hexamethylenediamine, to form Compound H (FIG. 11), as described in Example 1.3. Thus, functionalized SWNT is mechanically bound to one or more copies of Compound H, and Compound H carries an amino group. Therefore, functionalized SWNTs carry amino groups.

If desired, other amines can be reacted with the terminal COOH moiety of compound D, e.g. spermidine; 2,2'-dimethyl-4,4'methylenebis (cyclohexylamine); 3-aminomethyl-3,5,5-trimethylcyclohexylamine; or any other amine, diamine, triamine, or tetraamine that is desired.

Composites are prepared by sonication of functionalized SWNTs (carrying amino groups, as described above) in Aradur 5052 (amine hardener) at 20° C. for 12 hours and the suspensions are then centrifuged at 13,150 g for 15 minutes to obtain stable suspensions. One volume Araldite LY5052 (epoxy resin) is then added and the suspensions are stirred for 2 hours. The prepared suspensions are added to a mold sprayed with Dow Corning 20 mold release and cured for 24 hours at 60° C. SWNT loadings with respect to total weight of cured epoxy specimen is 0.01% (w/w), 0.1% (w/w), or 1% (w/w).

The hardening process and the degree of crosslinking between the epoxy resin and the amino groups on the functionalized SWNTs can be modified by using different ratios of Aradur 5052 and Araldite LY5052, e.g. ratios of 1:2; 1.5:2; 1.75:2; 2:1; 2:1.5; 2:1.75; or any other ratio, as desired. Alternatively, the functionalized SWNTs may be added to Araldite LY5052 prior to the addition of Aradur 5052, to allow for a more efficient reaction between the amino groups of the functionalized SWNT and the epoxy groups of the epoxy resin. Alternatively, 10% of the Aradur 5052 (amine hardener) is added at first, then all of the Araldite LY5052 (epoxy resin) is added, and then finally (eg. after 5 or 15 minutes) the remaining 90% Aradur 5052 is added.

If desired, other SWNT loadings can be applied. For example, SWNT loadings with respect to total weight of cured epoxy specimen can be lower (e.g. 0.001%), or higher (e.g. 0.1%, 1%, 5%, 20%, 40%), or any other loading.

If desired, a pyrene-based, or an NDI-based ML can be used in a similar process instead of the exTTF-based ML described in the process above.

In conclusion, Example 2.4 describes the generation of an epoxy polymer-SWNT composite material comprising multiple Composite Material Units (CMUs). The anchoring of the additive (carbon nanotube) in the matrix, by way of covalent attachment of the mechanical ligand to the epoxy polymer, improves characteristics such as strength of the composite material.

Example 3. Design, Synthesis, and Ring-Closing of Mechanical Ligands Around Nanotubes In this example, the design and synthesis of precursor-MLs (i.e. precursor mechanical ligands) that can ring-close around nanotubes is described. Ring-closing reactions are also described.

The precursor-MLs of this example comprise 1, 2, 3, or 4 nanotube-binding motifs. The nanotube-binding motifs NB1, NB2, NB3, and NB4 are connected via linkers L2, L3, and L4. Furthermore, the precursor-ML comprises two reactive groups, R1 and R2, connected to the rest of the precursor-ML through linkers L1 and L5. Covalent bond formation between R1 and R2 leads to cyclization of the intervening chemical structure; this cyclic structure may form a ring around a nanotube, in which case a mechanical bond will have been formed. Finally, the precursor-ML comprises a reactive group Rx-matrix, capable of covalently linking to the matrix of a composite material. The Rx-matrix can be linked to the rest of the precursor-ML at any position in the precursor-ML.

The precursor-MLs of this example thus have the following general structure (R1-L1-NB1-L2-NB2-L3-NB3-L4-NB4-L5-R2)-R3

R1, R2, and R3 are reactive groups which may be chosen from Group 6: Reactive groups and covalent bonds formed upon reaction; or from Group 7: Covalent bond-forming chemical reactions. R1 and R2 are identical in some of the precursor-MLs of this example, and different from each other in other precursor-MLs. There may be more than one R3 per precursor-ML, and they may be different or be of the same structure.

The linkers L1, L2, L3, L4, and L5 may similarly be different or the same, and may be chosen from the list of Group 9: Linkers.

The nanotube-binding motifs NB1, NB2, NB3 and NB4 may be chosen from Group 4: Chemical motifs and the SEs they bind, or from Group 5: Chemical motifs and the SEs they bind, or from Group 10: CNT-binding moieties. In a given precursor-ML, the nanotube-binding motifs can be the same or different.

See FIGS. 15 to 30 for synthesis and use of specific chemical structures of precursor-MLs and MLs, used in this example.

Figure 15:
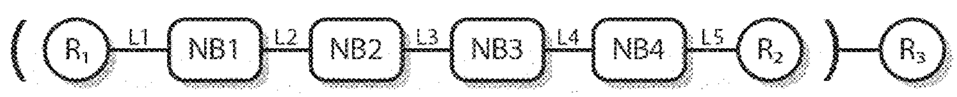
Figure 16:
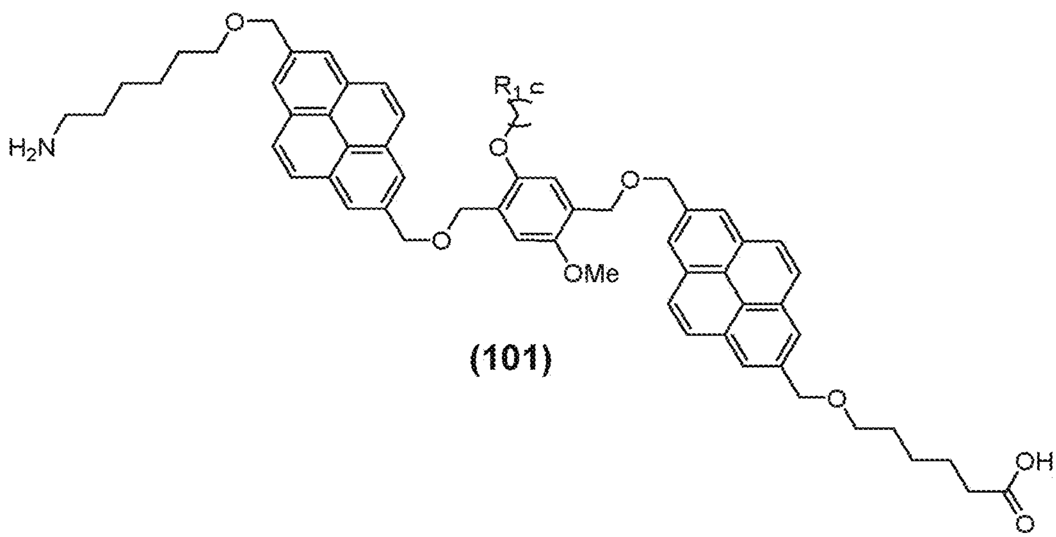
Figure 17:
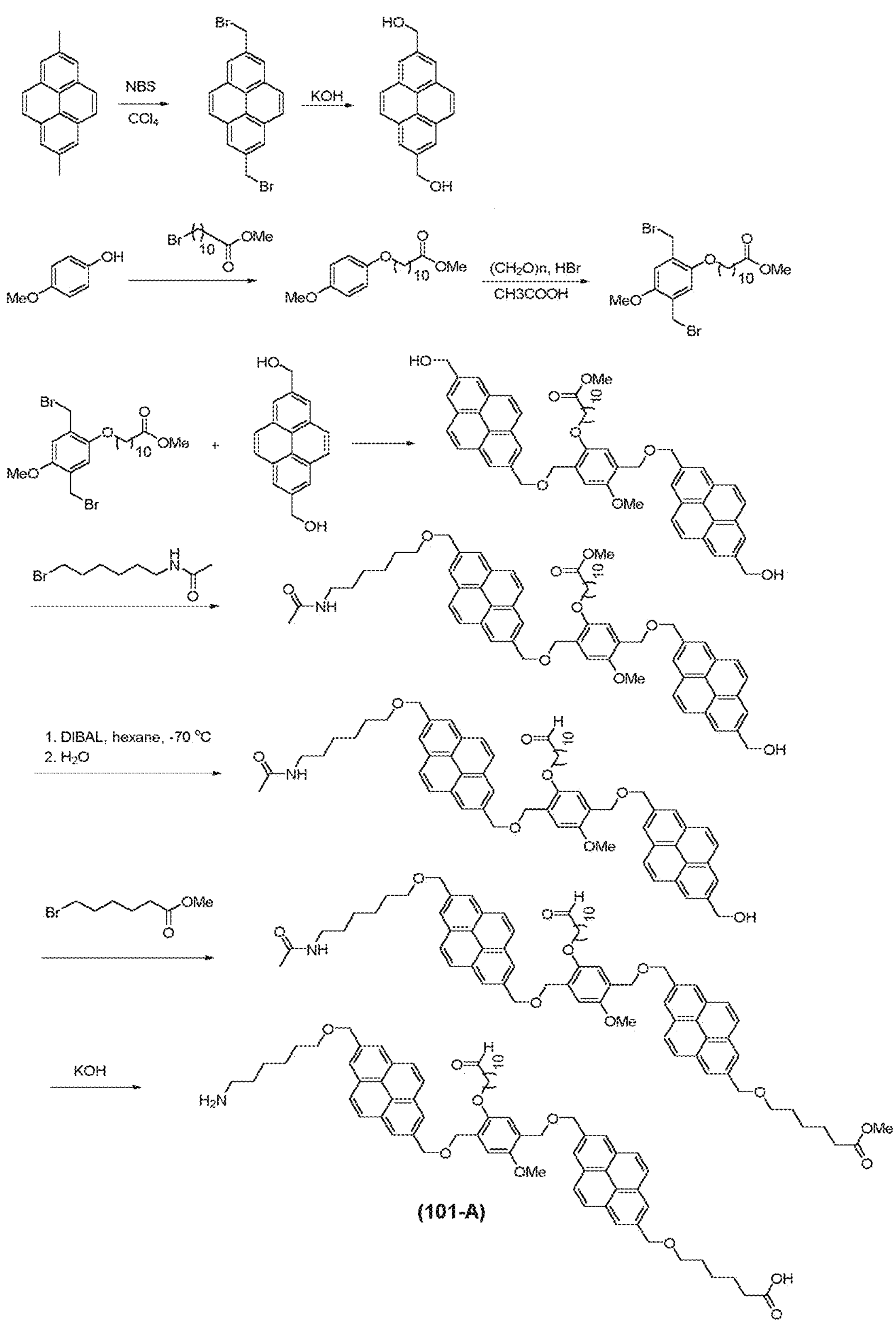

The precursor-MLs of FIG. 15 are prepared.

The precursor-MLs are prepared by standard organic chemistry.

Compound D (FIG. 11) is a cyclic derivative of Compound B, the synthesis of which was described in Example 1.2. Formation of the ring structure (the ML, formed around the nanotube), mediated by the reaction of the two terminal double bonds, and the conversion of the methyl ester to a carboxylic acid, is described in Example 1.3. The powder resulting from this synthesis, i.e. the powder comprising CNT complexed with Compound D, is called "CNT/Compound D complexes".

Compound (101-A), where $R_1$ is as an aldehyde functionality, is prepared by various $S_N2$ reactions. Starting from 2,7-dimethyl-pyrene, NBS bromination under standard conditions results in 2,7-dimethyl-dibromo-pyrene, which can further by hydrolyzed into the corresponding alcohol. A dibromo-linker molecule di-α-bromo-methyl-benzene substituted with a methoxy group and alkoxy group terminated with an ester, is reacted with the pyrene. The resulting di-pyrene is further reacted with N-(6-bromohexyl)acetamide, where after a selective reduction with DIBAL reduces the ester group to an aldehyde, which is then the functional group to be used for coupling with a matrix support. The alcohol functionality of the dipyrene structure is reacted with methyl 6-bromohexanoate and finally the molecule is hydrolyzed to set free the carboxylic acid and the amine functionalities. See FIG. 17.

Formation of the ring structure (the ML, formed around the nanotube), mediated by the reaction of the amine and the carboxylic acid and is done as follows. Compound (101-A), is added to a suspension of CNT in TCE. A catalytic amount of base is added and water formed in the condensation reaction to form the amide is removed using a Dean-Stark trap. The organic phase is the isolated, further dried with $MgSO_4$ and the solvent is removed leaving CNT decorated with the cyclic dipyrene moieties. Alternatively, the precursor for (101-A) is used to form a ring structure: KOH is added and water is removed using a Dean-Stark trap. In both cases, the final product is washed thoroughly on a PTFE filter, as described in Example 1.1. The final product, on solid form, comprising CNT bound by mechanical ligand (i.e. the cyclic form of Compound (101-A)), is called "CNT/(cyc101-A) complexes".

Figure 18:
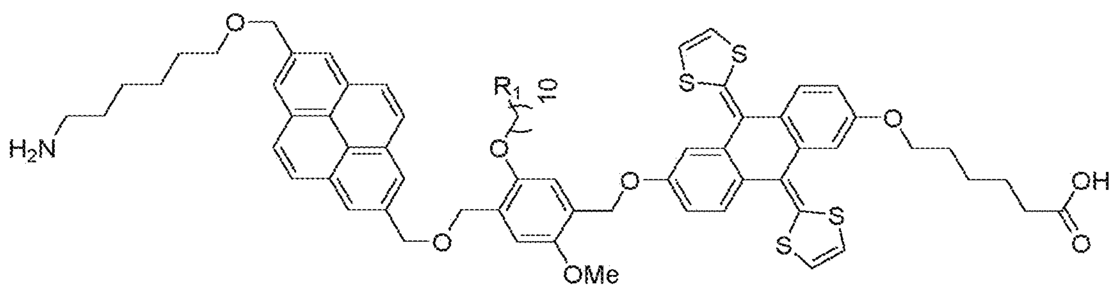
Figure 19:
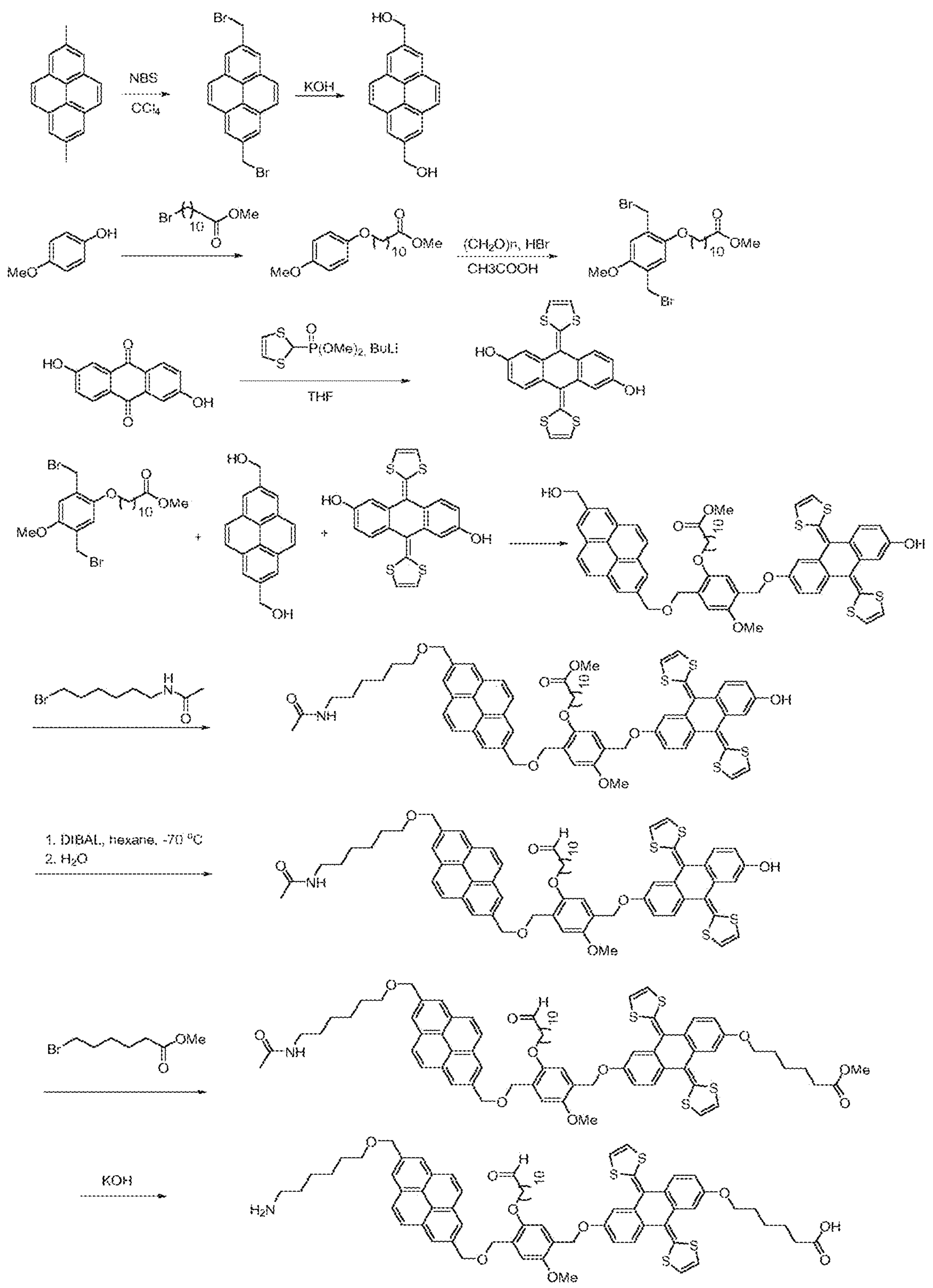
Figure 20:
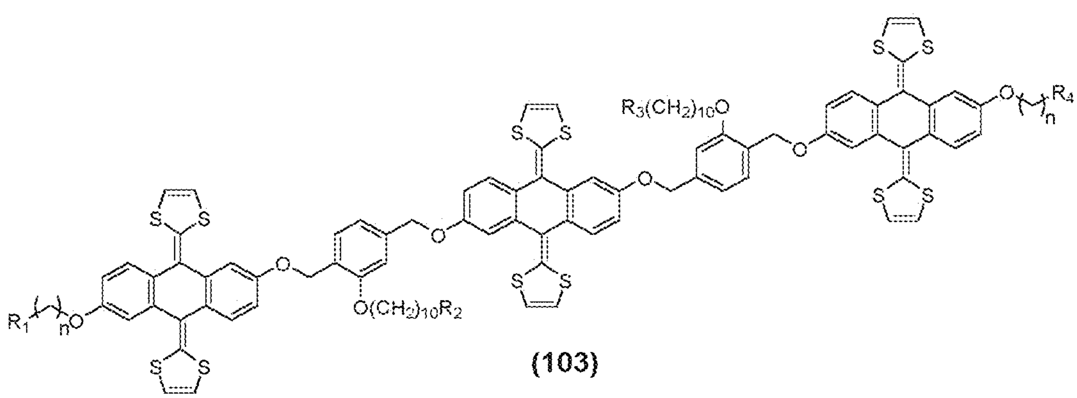

Compound (102-A) is prepared by first preparing a α,α'-dihydroxy-2,7-dimethyl-pyrene starting from 2,7-dimethyl-pyrene, which is first brominated using NBS in carbontetrachloromethane. The resulting α,α'-dibromo-2,7-dimethyl-pyrene is then hydrolyzed to the give the α,α'-dihydroxy-2,7-dimethyl-pyrene. The second building block for synthesizing (102-A) is prepared by reacting 4-methoxyphenol with methyl 11-bromoundecanoate and subsequently bromo-methylate using HBr and paraformaldehyde in acetic acid. The last building block is prepared from 2,6-dihydroxy-anthraquinone, which is reacted in a Horner-Wadsworth-Emmons reaction with dimethyl (1,3-dithiol-2-yl) phosphonate using butyl lithium as the base. The three building blocks described above are then asymmetrically coupled in a $S_N2$ substitution reaction as depicted in FIGS. 18 and 19, which is further reacted with the bromo-amide. Selective reduction with DIBAL at low temperatures transforms the methyl ester to and aldehyde and the free hydroxyl group is then reacted with methyl 6-bromohexanoate. The resulting molecule, Compound (102-A) can then be further reacted, or cyclized by the addition of CNT and ring-closing, as described in the procedure for preparing (101-A). The final ring-closed product, comprising the cyclic form of (102-A) mechanically bound to CNT, is called "CNT/(cyc102-A) complexes".

Figure 21:
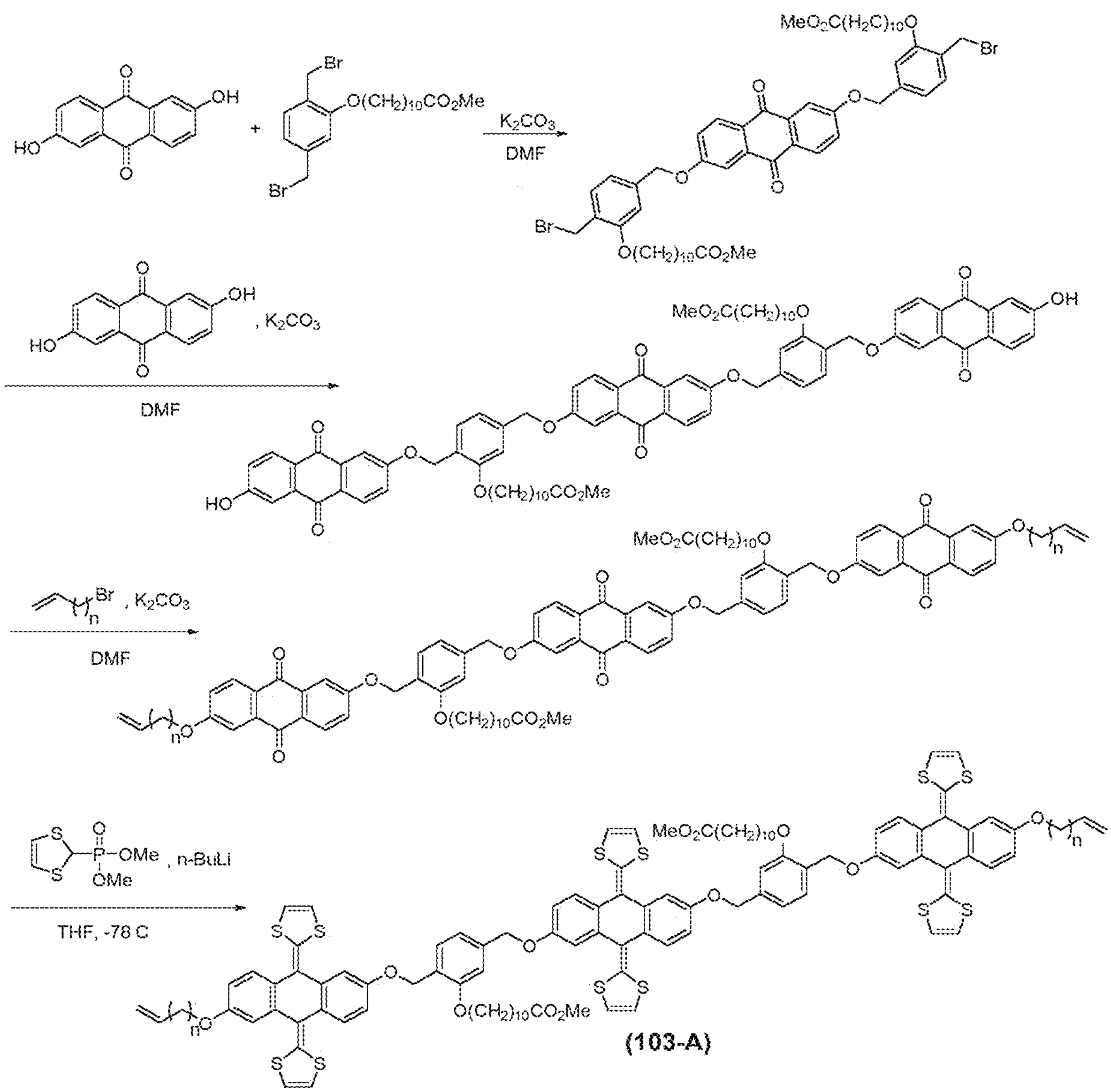
Figure 22:
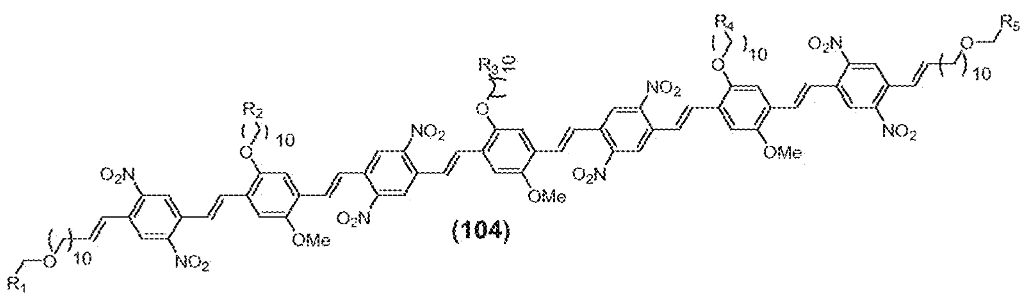

Compound (103-A) is prepared from 1,6-dihydroxy-anthraquinone and an α,α'-dibromo-benzene derivative in a $S_N2$ reaction, see FIGS. 21. The isolated molecule is reacted with yet another two 1,6-dihydroxy-anthraquinone molecules resulting in a molecule with two free hydroxyl groups, that are reacted with 11-bromo-1-undecene, also in a $S_N2$ reaction. The isolated molecule is finally reacted with dimethyl (1,3-dithiol-2-yl)phosphonate using BuLi at low temperatures leaving the targeted molecule, Compound (103-A), ready to be cyclized around a carbon nanotube. See FIG. 21.

Compound (103-A) which carries two terminal double bonds, can be cyclized around e.g. CNT, by dispersion in $CCl_4$, and addition of Grubb's 2nd generation catalyst in catalytic amount, to obtain a cyclized structure around the CNT. The procedure followed is as described in (Angew. Chem. 2014, 53 (21), 5394-5400, DOI: 10.1002/anie.201402258) and in Example 1.2. The final product, comprising the cyclic form of (103-A) mechanically bound to CNT, is called "CNT/(cyc103-A) complexes)".

Figure 23:
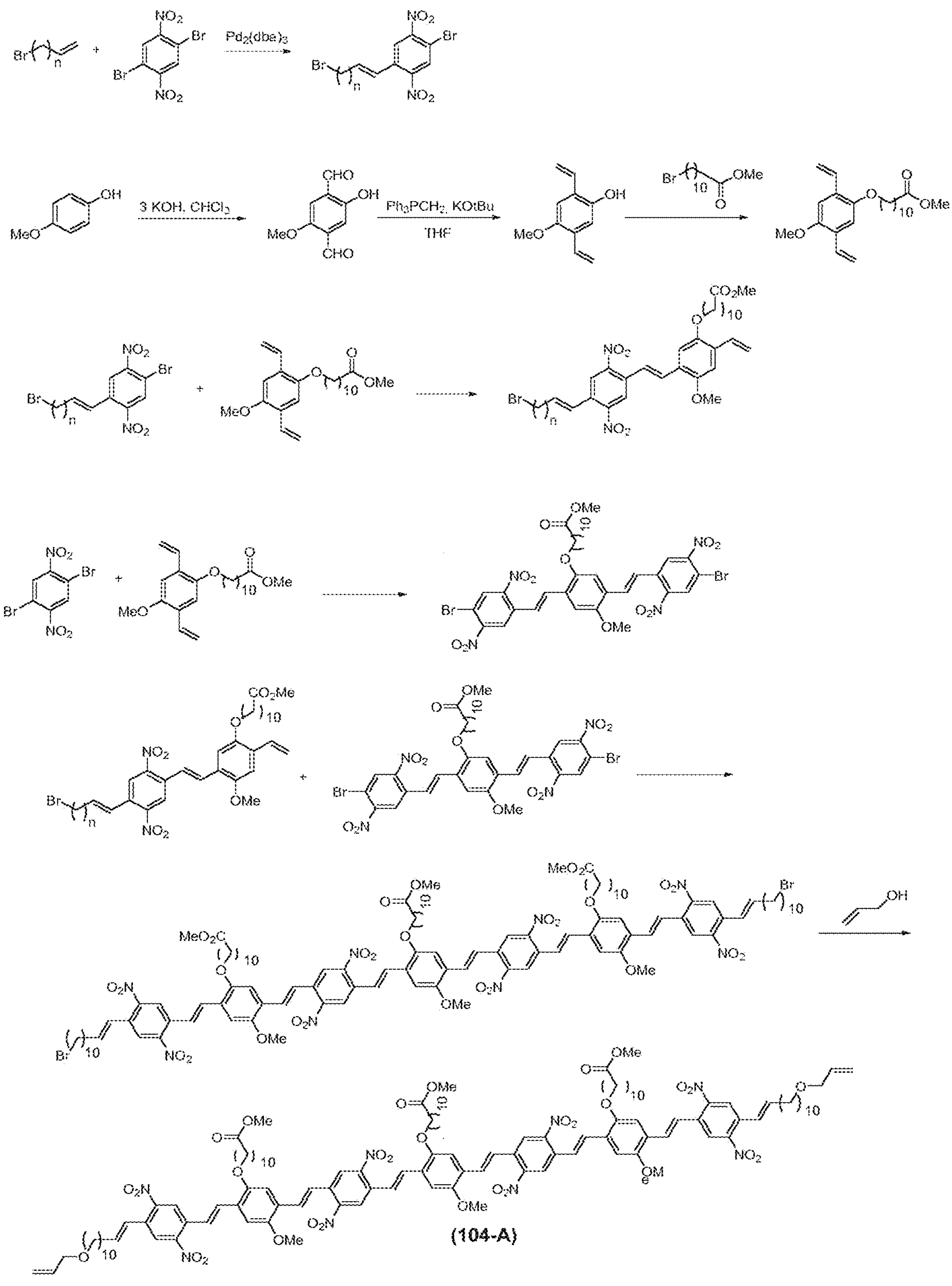
Figure 24:
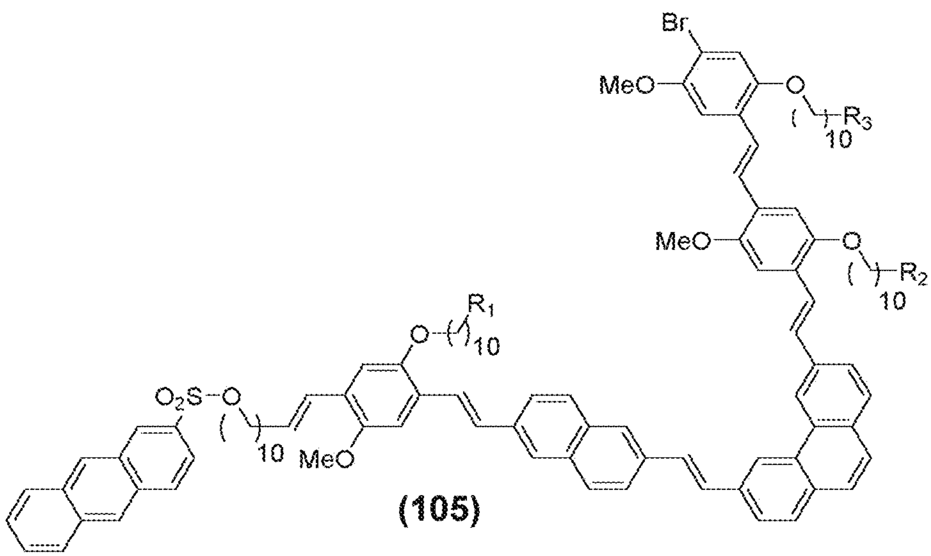

Compound (104-A) is prepared from buildings block prepared as outlined in FIG. 23: As an example 11-bromo-1-undecene is reacted with 2,5-dibromo-1,4-dinitro-benzene (prepared as described in Org. Lett. 2001, 3, 993-995) in a Heck reaction using $Pd_2(dba)_3$ as the catalyst. The ratio is the two reactants is chosen so the mono-coupled product is favored. The other crucial building block is prepared by reacting 4-methoxy-phenol in a Riemer-Tiemann formylation reaction to 2-hydroxy-4-formyl-5-methoxy-benzaldehyde, which is converted into a dialkene in a Wittig reaction with $Ph_2PCH_2$. Finally, the remaining free hydroxyl group is reacted with methyl 11-bromoundecanoate. The two building blocks described above are then reacted in a Heck reaction, where the stoichiometry is optimized such as to achieve a mono coupling, to give an intermediate building block. A second intermediate building block is obtained by reacting 2,5-dibromo-1,4-dinitro-benzene with the dialkene building block, also with stoichiometry optimized to favor mono coupling. The two intermediate building blocks are then reacted with a stoichiometry such that 2 alkenes are reacted with one dibromo compound. The resulting compound is then further reacted with allyl-alcohol in a $S_N2$ such that the allyl-alcohol displaces the bromines resulting in an allyl-ether.

Compound (104-B) is prepared from (104-A) by conversion of the three methyl esters to carboxylic acids. Compound (104-B) thus comprises three carboxylic acids.

Cyclization of (104-A) and (104-B) around a CNT is done by ring-closing metathesis with Grubb's $2^{nd}$ generation catalyst, as described in (Angew. Chem. 2014, 53 (21), 5394-5400, DOI: 10.1002/anie.201402258) and in Example 1.2. The resulting products are called "CNT/(cyc104-A) complexes" and "CNT/(cyc104-B) complexes", respectively.

Figure 25:
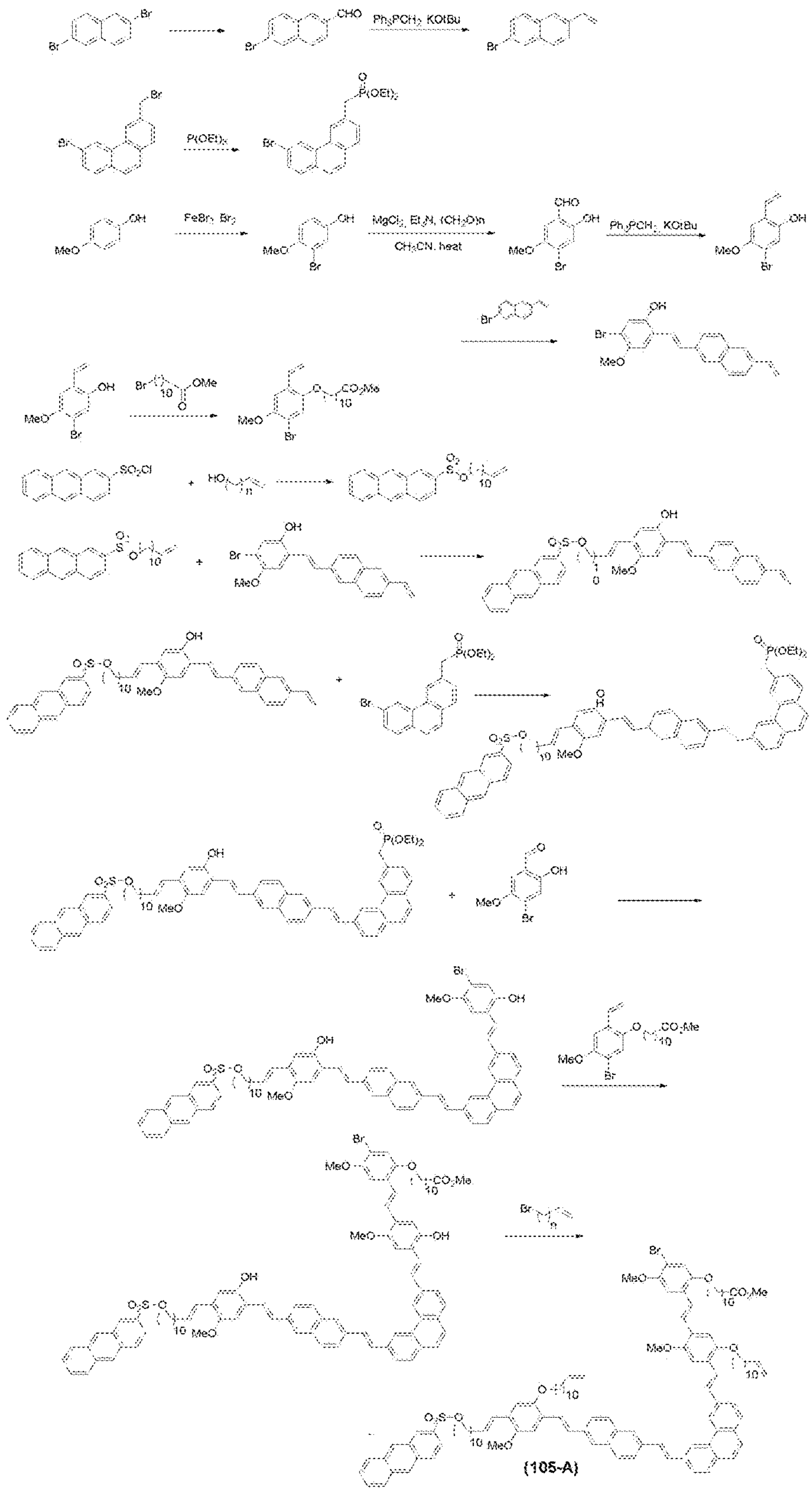
Figure 26:
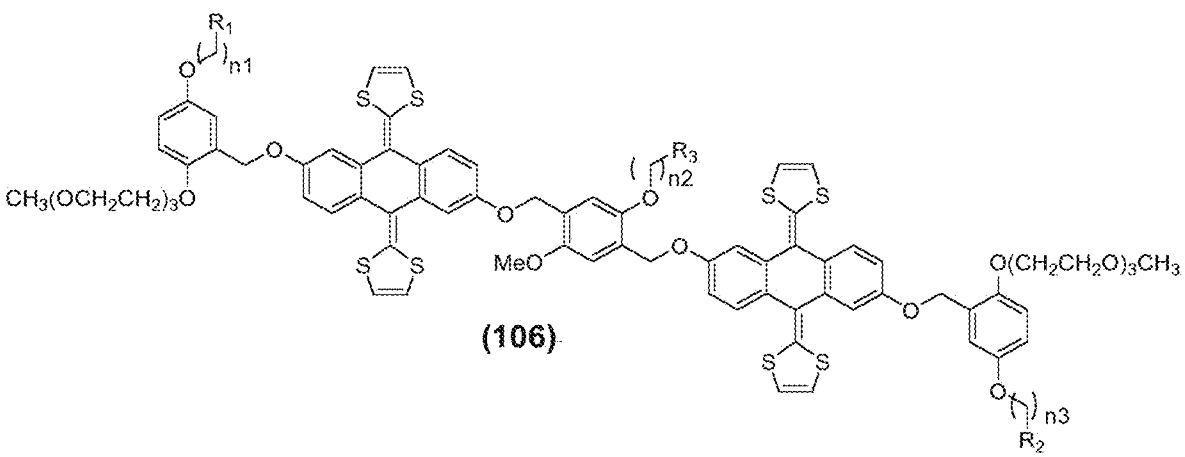

Compound (105-A) is prepared by reacting a series of building blocks, as depicted in FIG. 25: 2,6-dibromo-napthalene is converted into 2-formyl-6-bromo-naphthalene with tBuLi and DMF at low temperatures. Subsequently the aldehyde is transformed into an alkene in a Wittig reaction with $Ph_2PCH_2$ and $KO^tBu$. A second building block is prepared by converting 3-bromo-6-(bromomethyl)-phenanthrene into the corresponding phosphonate ester with $P(OEt)_3$. A third building block is prepared by reacting 4-methoxy-phenol in a Friedel-Crafts reaction using $FeBr_3$ and $Br_2$. The resulting bromo compound is the converted into an aldehyde with $MgCl_2$, $Et_3N$ and para formaldehyde in acetonitrile, where the formed aldehyde was further converted into an alkene with $Ph_2PCH_2$ and $KO^tBu$. A Heck reaction with the formed alkene and the bromo-napthalene results in the alkene-substituted styryl-napthalene. A fourth building block is prepared by reacting the previously described 3-bromo-4-methoxy-5-ethylene-phenol with methyl 11-bromoundecanoate in a Heck reaction using $Pd_2(dba)_3$ as the catalyst. A fifth and final building block is prepared by reacting anthracene-2-sulfonyl chloride with for example undec-10-en-1-ol. See FIG. 25.

The building blocks are then reacted according to the following: A Heck reaction using $Pd_2(dba)_3$ is used to couple the sulfenic acid ester with the bromo-styryl-naphtalene, which is again coupled with the phosphonate ester using a Heck reaction yet again with $Pd_2(dba)_3$ as the catalyst. The resulting phosphonate ester is converted in a Horner-Wadsworth-Emmons reaction with the 3-bromo-4-methoxy-5-formyl-phenol, prepared as described above, using $KO^tBu$ as the base. The resulting compound is then reacted in a Heck reaction ($Pd_2(dba)_3$ as the catalyst) and finally the formed compound is converted with for example 11-bromo-1-undecene. See FIG. 25.

Cyclization of (105-A) around a CNT is done by ring-closing metathesis with Grubb's $2^{nd}$ generation catalyst, as described in (Angew. Chem. 2014, 53 (21), 5394-5400, DOI: 10.1002/anie.201402258) and in Example 1.2. The final product is called "CNT/(cyc105-A) complexes"

Figure 27:
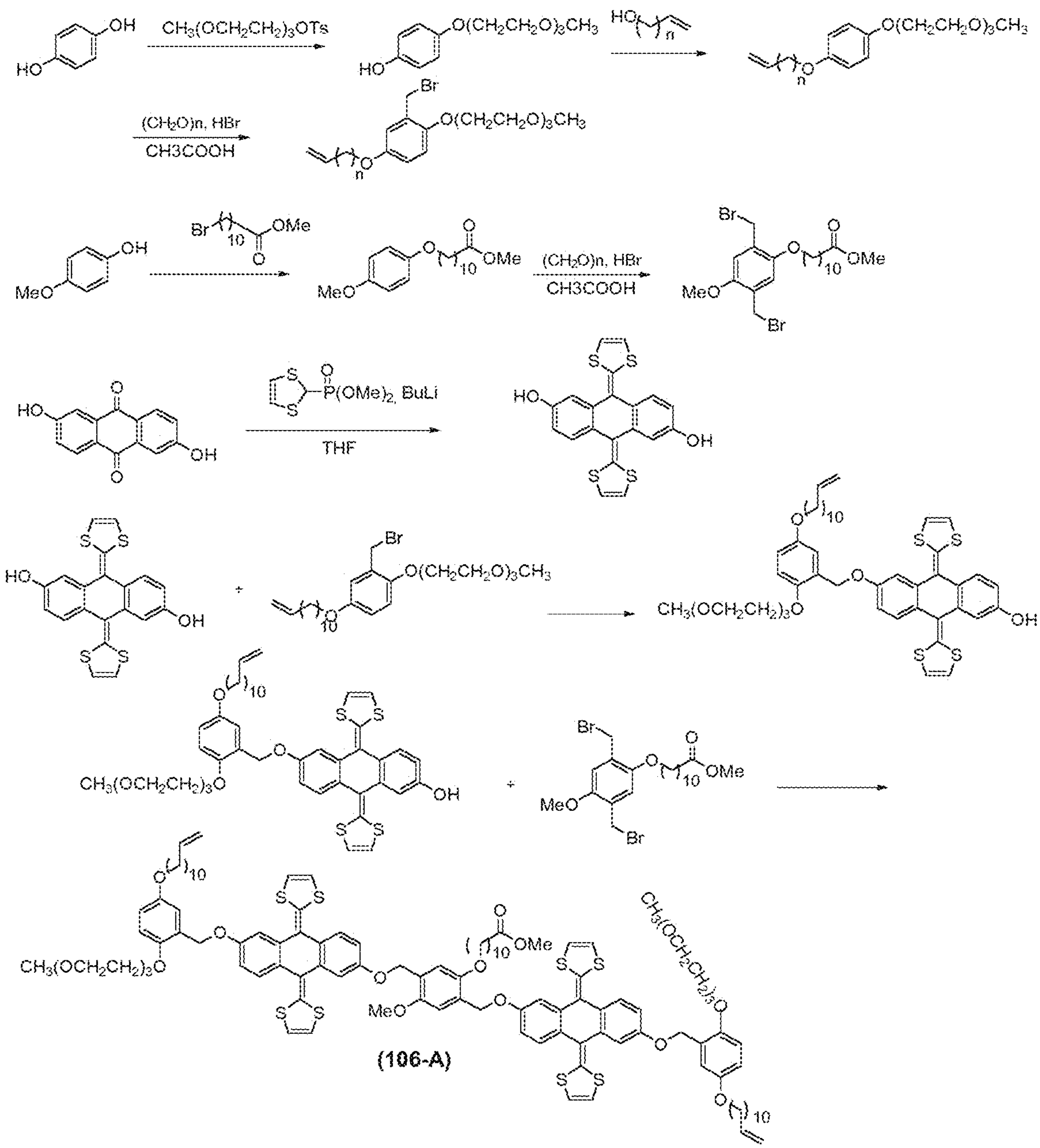

Compound (106-A) is prepared from a series of building blocks, see FIG. 27. The first is prepared from 1,4-dihydroxy-benzene, where one of the hydroxyl groups are reacted with 2-(2-(2-methoxyethoxy)ethoxy)ethyl 4-methylbenzenesulfonate in a first step and in a second step the remaining hydroxyl-group is converted into an ether with for example undec-10-en-1-ol. The resulting compound is then bromomethylated, with para formaldehyde and HBr in acetic acid. A second building block is prepared from 1-methoxy-phenol by reacting methyl 11-bromoundecanoate and subsequently bromo-methylate with para formaldehyde and HBr in acetic acid. The third building block is prepared from 2,6-dihydroxy-anthraquinone and dimethyl (1,3-dithiol-2-yl)phosphonate in a Horner-Wadsworth-Emmons reaction using $KO^tBu$ as the base. The resulting compound is then coupled with the bromo-methyl substituted triethyleneglycol benzene. After workup and purification this compound is then again coupled with the dibromo-methyl-benzene described above yielding a compound that can be cyclized around a CNT using ring-closing metathesis.

Cyclization of (106-A) around a CNT is done by ring-closing metathesis with Grubb's $2^{nd}$ generation catalyst, as described in (Angew. Chem. 2014, 53 (21), 5394-5400, DOI: 10.1002/anie.201402258) and in Example 1.2. The final product is called "CNT/(cyc106-A complexes".

Compound (107-A) is prepared by bromination of 2,7-dimethyl-pyrene and subsequent hydrolysis to give the mono-alcohol and retaining one of the bromo-methyl functionalities. This molecule is then coupled to itself to give a dipyrene structure. A second building block is prepared by reacting 4-methoxy-phenol with 11-bromo-undecene and the resulting compound is further bromomethylated. The two building blocks are then coupled in a stoichiometry to favor the reaction of 2 pyrene oligomers with one benzene moiety thus resulting in a compound with a total of 4 pyrene units. This compound is then reacted first with alkene-ol, then a hydroxyl-functionalized alkane ester and finally the ester is hydrolyzed leaving a free acid. See FIG. 28.

Cyclization of (107-A) around a CNT is done by ring-closing metathesis with Grubb's $2^{nd}$ generation catalyst, as described in (Angew. Chem. 2014, 53 (21), 5394-5400, DOI: 10.1002/anie.201402258) and in Example 1.2. The final product is called "CNT/(cyc107-A complexes".

Compound (108) is the peptide

CGSKGSIFRLSWGTYFSGSKGSC (See FIG. 29). It is synthesized by standard peptide synthesis. The CNT-binding motif is underlined. The peptide comprises two lysines and two cysteines.

Mixing of CNT and (108) in aqueous buffer pH 10 and sonication leads to covalent ring-closing of the peptide around the CNT, by way of disulfide formation between the two cysteines of the peptide. The peptide mechanical ligand thus carries two amino groups.

The two peptides, compound (109) and compound (110), (see FIG. 29), are synthesized by standard peptide synthesis, using D—as well as natural amino acids. Compounds (109) and (110) are turned into their cyclic derivatives by incubation with CNT in e.g. phosphate-buffer pH 10, and sonication for 2 hours, which results in disulfide formation between the peptide's terminal thiols. Compounds (109) and (110) was previously shown to bind and cyclize around a CNT, by formation of a disulfide bond between the terminal thiols.

Figure 30:
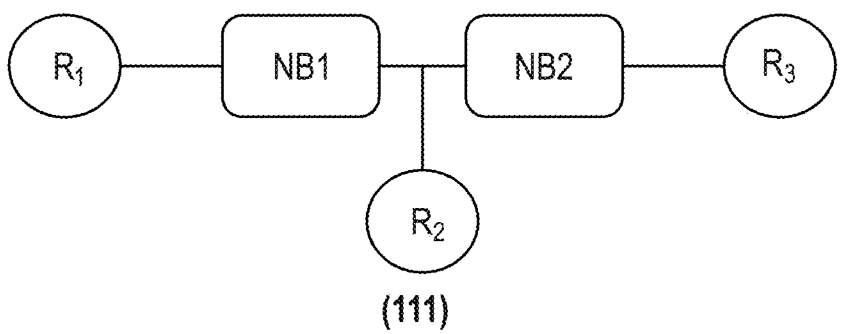
Figure 30:
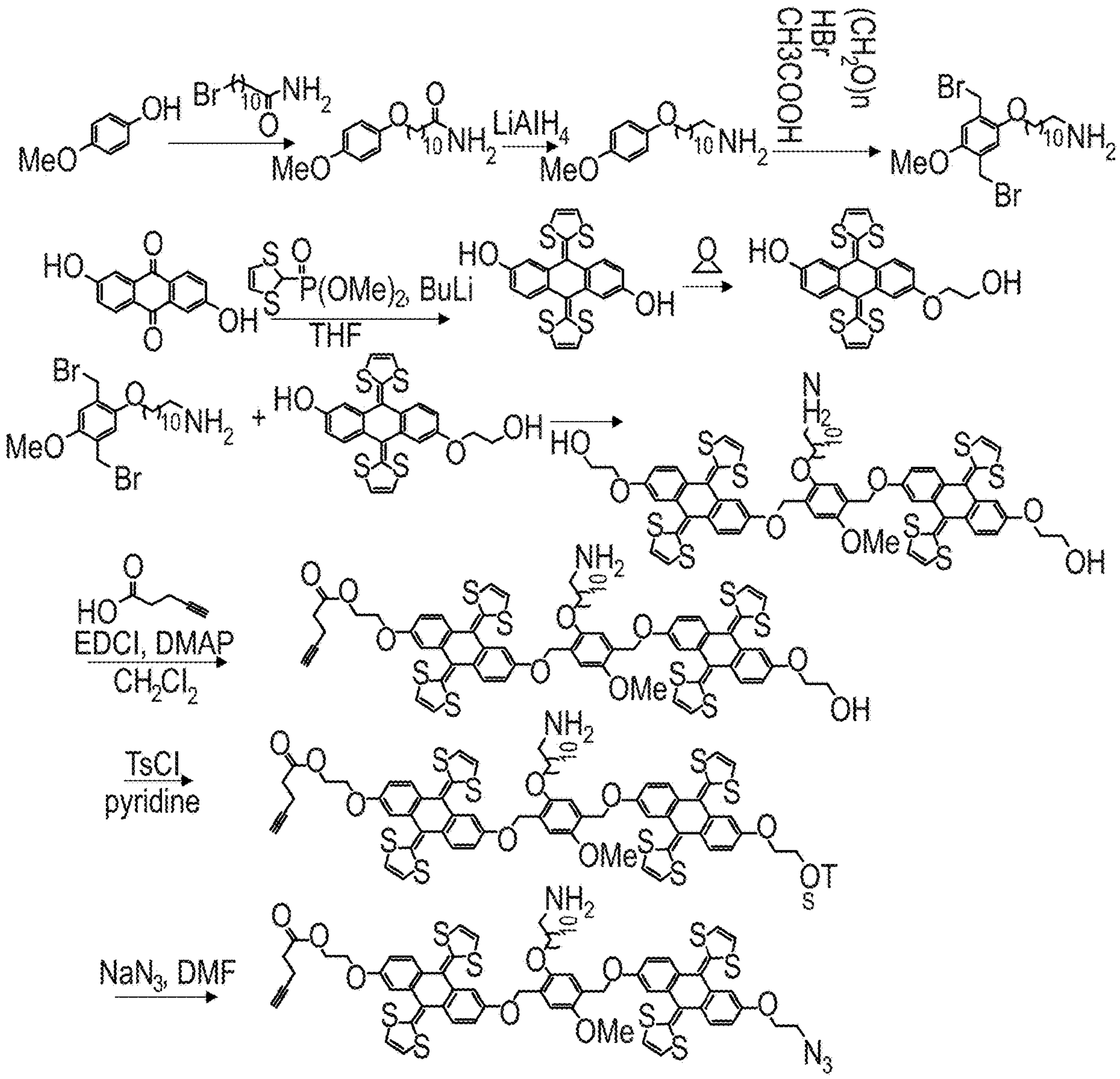

Compound (111-A) is prepared by taking 4-methoxy-phenol and reacting with a bromine functionalized amide and reducing the amide to an amine. Subsequent bromomethylation gives the first building block. The first step of synthesizing the second building block is carried out as described above and then reacted with oxiran functionalizing only one of the free alcohols. These two building blocks are then coupled in a standard $S_N2$ type reaction, where two anthraquinone moieties are coupled with one benzene moiety. This molecule is then further functionalized by reaction of one of the free alcohols with a 4-pentynoic acid and the other free alcohol is first converted with TsCl and then with $NaN_3$ to give the azide. The synthesis and structure of compound (111-A) is shown in FIG. 30.

Cyclization is done by e.g. addition of CNT and using standard conditions for 1,3-cycloaddition reactions, between an azide and an alkyne. Following cyclization the product is filtrated on a PTFE membrane, washed and dried. The final dried product is called "CNT/(cyc111-A) complexes".

Example 4. Formation of Nylon

This example is from "The Nylon Rope Trick, Demonstration of condensation polymerization", by Paul W. Morgan and Stephanie L. Kwolek, Journal of Chemical Education, Volume 36, Number 4, April 1959, pp 182-184. The article describes the in situ polymerization of nylon at room temperature from simple precursor molecules. The description is merely thought as an introduction for how to prepare a polymer (in this case nylon). Examples 5-8 are modifications to this Example that enable various aspects of the present invention.

An organic phase consisting of 2 mL (0.0093 moles) sebacoyl chloride in 100 mL carbon tetrachloride is placed in a 200 mL tall-form beaker. Over this is carefully poured a solution of 4.4 g (0.038 moles) hexamethylenediamine in 50 mL water. A polymeric film forms at once at the interface. When the film is pushed aside, new, smooth film forms at once at the fresh interface. The walls of the glass are freed of strings of polymer, the mass is grasped at the center with tweezers and raised as a rope of continuously forming polymer film. The film always forms a tent having draping and shifting folds with the apex at the air-liquid interface.

The simplest isolation method is to wash the polymer thoroughly with water and to dry it in air. The washing is greatly hastened if 50% aqueous alcohol is used for an initial wash.

If desired, fibers may be prepared from the formed material by melting it carefully in a test tube over a hot plate, and then pulling fibers from the melt by means of a glass rod brought into contact with the melt and withdrawn slowly.

If desired, films may be prepared from the formed material by preparing a 10 to 20% solution of the formed material in formic acid under stirring at room temperature. A flexible, hazy film will form when the solution is spread on a glass plate and allowed to dry overnight.

The in situ polymerization reaction to form nylons may be performed using alternative reactants. Other aliphatic diacid chlorides may be used; there is a tendency for the films to be less tough when shorter chain intermediates are used. Terephthaloyl chloride forms a tough film with piperazine and a fair film with hexamethylenediamine when chloroform is used as the solvent for the organic phase.

Other polyamides and other classes of condensation polymers can be made to form continuously as film.

Preferred solvents are those with low miscibility in water and which will not react even to a low degree with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants used must be slightly adjusted when using these alternative solvents.

Example 5. Formation of CNT-Reinforced Nylon Using a Mechanical Ligand

This is an example of the formation of a composite material where the matrix consists of nylon and the additive is a single-walled carbon nanotube, where ligand2 binds covalently to nylon (SE2) through an amide bond, and where the precursor ML is turned into the ML by way of a 1,3 dipolar cycloaddition (click chemistry), to forma mechanical bond to the structural entity SE1 which is a carbon nanotube. The example also shows how MLs generally can be used to improve the dispersion of CNT. This is an example of in situ polymerization.

This example is adapted from example 4.

Step 1. Single-walled carbon nanotubes (SWNT) (obtained from e.g. NanoIntegris, Inc. Canada (purified HiPco)) are suspended in an appropriate solvent (e.g. DMF, dichloroethane) by sonication, at a concentration of CNT of 10% weight/volume.

Step 2. Compound (111-A), described in Example 3, comprises two exTTF motifs, an amine, an azide and a triple bond. The amine is capable of reacting with an acid chloride; the amine moiety thus enables the formation of a covalent linkage to the polymer (see below).

Step 3. Compound (111-A) is dissolved at an appropriate concentration (e.g. 10 mM), in an appropriate solvent (e.g. DMF, TCE). Optionally, DMSO may be added at low concentration to better dissolve the reagent.

Step 4. The suspended CNT solution from above is added to a concentration of CNT of 1%, optionally the suspension is sonicated, and ring-closing around CNT by a 1,3 dipolar cycloaddition of the precursor-ML is effectuated as described in Example 3 (see FIG. 31). The resulting product is called "1% CNT/ML solution".

Step 5. Three reactions are now set up:

1. An organic phase consisting of 2 mL (0.0093 moles) sebacoyl chloride in 100 mL carbon tetrachloride is placed in a 200 mL tall-form beaker. 1 mL of the 1% CNT-ML solution from above is added under stirring.
2. An organic phase consisting of 2 mL (0.0093 moles) sebacoyl chloride in 90 mL carbon tetrachloride is placed in a 200 mL tall-form beaker. 10 mL of the 1% CNT-ML solution from above is added under stilling.
3. An organic phase consisting of 2 mL (0.0093 moles) sebacoyl chloride in 10 mL carbon tetrachloride is placed in a 200 mL tall-form beaker. 90 mL of the 1% CNT-ML solution from above is added under stilling.

The sebacoyl chloride will react with the amino group attached to the CNT via the ML, to form an amide bond. See FIG. 31.

Step 6. A solution of 4.4 g (0.038 moles) hexamethylenediamine in 50 mL water is then carefully poured over each of the three organic phases in the three beakers. A polymeric film forms at once at the interface, as the nylon polymers are formed. When the film is pushed aside, new, smooth film forms at once at the fresh interface. The walls of the glass are freed of strings of polymer, the mass is grasped at the center with tweezers and raised as a rope of continuously forming polymer film. Some of the growing nylon polymers will grow out from the amino group attached to the ML, which is attached to the CNT.

Step 7. The polymer is washed thoroughly with water and dried in air. The washing is greatly hastened if 50% aqueous alcohol is used for an initial wash.

Variations to the production method described in this example.

The linker comprising a pyridyldisulfide and an amino group, separated by 2-10 carbon atoms, can be replaced with a linker where the pyridyldisulfide and the amino group is separated by a short nylon polymer of e.g. 1000-5000 Dalton. This will decrease the likelihood of one sebacoyl acid monomer reacting with amino groups of two adjacent MLs on the CNT, and thereby bridging two neighboring MLs, rather than attaching a ML to the polymer.

A carboxylic acid can be attached to the pyridyldisulfide linker instead of the amino group. Once ring-closing around the CNT is effectuated, the carboxylic acid can be turned into an activated form, e.g. an acid chloride. The ML will then not react with the growing polymer until after the addition of the amine monomers (Step 6).

The attachment of the pyridyldisulfide linker to the ML can be done prior to or after ring-closing around the CNT, and can be done prior to or after addition of the diamine and/or diacid.

CNT may be used at a final concentration in the composite material as described above, or at any concentration that is practically possible, e.g. 0,001%, 0.01%, 0.1%, 1%, 3%, 5%, 10%, 20%, 50%, 80%, 90%, 95%.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs will have different features than the corresponding nylon fibers without the CNT additive, such as different strength and conductivity.

If desired, films may be prepared from the formed material by preparing a 10 to 20% solution of the formed material in formic acid under stirring at room temperature. The nylon film comprising the CNTs will have other characteristics than the corresponding nylon film without the CNT additive, such as different impact strength or different conductivity.

The in situ polymerization reaction to form nylons may be performed using alternative reactants. Other aliphatic diacid chlorides may be used, such as the acid chlorides of adipic acid, and dodecanedioic acid. Also, aromatic diacid chlorides may be used, such as terephthalic acid or isophthalic acid. Likewise, aromatic as well as aliphatic diamines can be used.

Other reinforced polyamides e.g. the condensation product of terephthalic acid or isophthalic acid with for example bis(para-aminocyclohexyl)methane or trimethylhexamethylenediamine, and other classes of reinforced condensation polymers, e.g. polyesters including poly(ethylene terephthalate) can be made using this approach.

Preferred solvents are those with low miscibility in water and which will not significantly react with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants can be adjusted when using these alternative solvents in order to improve the process.

If desired, alternative additives such as other nanotubes, fullerenes (e.g. graphene) or metals (e.g. gold) or any other additive may be added instead of the SWNT used above, along with appropriate mechanical ligands capable of forming a mechanical bond to the additive in question.

If desired, additional additives such as other nanotubes, fullerenes, graphene), metals (e.g. steel) or any other additive may be added.

Example 6. Formation of CNT-Reinforced Nylon where Both ML and Ligand2 are Mechanical Ligands that Attach to the CNTs This is an example of the formation of a composite material where the matrix consists of nylon and the additive is single-walled carbon nanotube, where both ML and Ligand2 are mechanical ligands, and where the attachment of the mechanical ligands to the CNTs helps disperse these, as well as results in a network of CNT that at least partly immobilizes the CNTs in the composite material. This is an example of in situ polymerization.

This example is adapted from examples 3 and 4.

Step 1. Single-walled carbon nanotubes (obtained e.g. from NanoIntegris, Inc. Canada (purified HiPco)) are dispersed in aqueous buffer pH 7 by sonication, at a concentration of SWNT of 0.003% weight/volume.

Step 2. Compound (109), i.e. the linear peptide RC5 (synthesis as described in Example 3, see also FIG. 29) is added to the CNT solution above, to a final concentration of 10 mM. The cyclization of the linear peptide around the CNT is then effectuated as described in Example 3, to yield a solution containing SWNTs, mechanically bound to a number of RC5 peptides in their cyclic form. Optionally, repeated cycles of 10 sec sonication and 10 min incubation at room temperature are performed, in order to increase dispersion of the CNTs. The resulting solution is called the "CNT-RC5 solution".

Step 3. Three flasks A, B and C, each containing 0.0093 moles sebacoyl chloride in 100 mL carbon tetrachloride, is set up under stirring.

Step 4. Three flasks each with following contents are set up:

Flask a: To 0.038 moles hexamethylenediamine in 49 mL water is added 1 mL of the CNT-RC5 solution above, under stirring.

Flask b: To 0.038 moles hexamethylenediamine in 40 mL water is added 10 mL of the CNT-RC5 solution above, under stirring.

Flask c: To 0.038 moles hexamethylenediamine in 10 mL water is added 40 mL of the CNT-RC5 solution above, under stirring.

Step 5: The contents of flasks a, b, and c are then carefully poured over each of the three organic phases of flasks A, B, and C, respectively, while stirring is continued. A polymeric film forms at the interface. When the film is pushed aside, new, smooth film forms at the fresh interface. The walls of the glass are freed of strings of polymer, the mass is grasped at the center with tweezers and raised as a rope of continuously forming polymer film.

In this step the nylon polymers form, upon reaction of multiple sebacoyl acid monomers with multiple hexamethylenediamine monomers. Simultaneously, one of the lysines of the RC5 peptide (which is mechanically bound to CNT) may react with a sebacoyl acid monomer, initiating polymer formation, and in this way become covalently linked to a nylon polymer. The three reactions (A with a, B with b, and C with c) have different amounts of CNT, and therefore, the effect of the CNT network on the characteristics of the composite material will be different for the three reactions and their resulting CNT-nylon composite material.

A simple isolation method is to wash the polymer thoroughly with water and to dry it in air. The washing is greatly hastened if 50% aqueous alcohol is used for an initial wash.

The binding and cyclization of the peptide RC5 around the CNT has two effects. First, it helps disperse the CNT. Second, it forms a mechanical bond to CNT. This mechanical bond allows for the attachment of the CNT (via the mechanical bond) to the polymer of the matrix, in this case the nylon.

The peptide RC7 (described in Example 3; see also FIG. 29) can be used instead of RC5. RC7 is a larger peptide, and allows mechanical binding of CNTs with larger diameters, including MWNT.

If desired, fibers may be prepared from the formed material by melting it carefully in a test tube over a hot plate, and then pulling fibers from the melt by means of a glass rod brought into contact with the melt and withdrawn slowly. The nylon fibers comprising the CNTs, where the CNTs are held together by mechanical bonds, will have characteristics different from the corresponding nylon fibers without the CNT additive.

If desired, films may be prepared from the formed material by preparing a 10 to 20% solution of the formed material in formic acid under stirring at room temperature. The nylon film comprising the CNTs, held together by mechanical bonds, will have characteristics different from the corresponding nylon film without the CNT additive.

The formation of nylons may be performed using alternative reactants. Other aliphatic diacid chlorides may be used, such as the acid chlorides of adipic acid and dodecanedioic acid. Also, aromatic diacid chlorides may be used, such as terephthalic acid or isophthalic acid.

Other reinforced polyamides e.g. the condensation product of terephthalic acid or isophthalic acid with for example bis(para-aminocyclohexyl)methane or trimethylhexamethylenediamine, and other classes of reinforced condensation polymers e.g. polyesters including poly(ethylene terephthalate) can be made using this approach.

Preferred solvents are those with low miscibility in water and which will not react significantly with the acid halide. Alternative solvents are thus tetrachloroethylene, trichloroethylene, and 1,1,1-trichloroethane. Useful nonhalogenated solvents are benzene, toluene, xylene, hexane, and cyclohexane. The amount of reactants can be adjusted when using these alternative solvents in order to improve the process.

If desired, alternative additives such as other nanotubes, fullerenes (e.g. graphene) or metals (e.g. gold) or any other additive may be added instead of the SWNT used above, along with appropriate mechanical ligands capable of forming a mechanical bond to the additive in question.

If desired, additional additives such as other nanotubes, fullerenes, graphene, metals (e.g. steel), or any other additive may be added.

Example 8. Formation of Carbon Nanotube Reinforced Nylon 6,10, Using Covalent Linkage of the Carbon Nanotubes to the Polymer Matrix This example serves as an introduction to Example 9. It does not involve a mechanical bond.

In this example SE1 is a single-walled carbon nanotube (SWNT), SE2 is a nylon polymer molecule, Ligand2 is an amide bond, and the polymerization reaction is a polycondensation. The experiments are described in the paper "Tuning the Mechanical Properties of SWNT/Nylon 6,10 Composites with Flexible Spacers at the Interface", Moniruzzaman, M., Chattopadhyay, J., Billups, W. E., Winey, K. I., NanoLetters, 2007, 7(5), 1178-1185.

Functionalization of the SWNT Sidewalls with Alkyl Carboxylic Acid Groups:

The nanotubes were first functionalized with either —$(CH_2)_4$—COOH or —$(CH_2)_9$—COOH by reacting with bromo-carboxylic acid in liquid ammonia in the presence of lithium metal. The carboxylic acid groups were then converted into acid chloride groups by reacting with thionyl chloride. For convenience, the acid chloride functionalized nanotubes carrying the C4 and C9 alkyl group are called C4-SWNT and C9-SWNT, respectively, whereas the unfunctionalized nanotubes are designated SWNT.

SWNT were synthesized by the high-pressure carbon monoxide method (HiPco). In order to functionalize the sidewall of SWNT with carboxylic acid groups, 100 mg of SWNT (8.3 mmol of carbon) were taken into a dry 1,000 mL three neck round-bottom flask fitted with a dry ice condenser under an atmosphere of argon Ammonia (600 mL) was then condensed into the flask followed by the addition of lithium metal (Aldrich, 600 mg, 8.5 mmol). The suitable bromocarboxylic acid (5-bromovaleric acid; 1.3 equiv. and 10-bromodecanoic acid; 3 equiv., Aldrich) was then added and the mixture was stirred at −33° C. for 12 hrs with slow evaporation of ammonia. The flask was then cooled in an ice bath, and the reaction mixture was quenched by the slow addition of ethanol (15 mL) followed by water (20 mL). The reaction mixture was acidified with 10% HCl, and the nanotubes were extracted into hexane and washed several times with water. The hexane layer was then filtered through a 0.2 μm PTFE membrane and washed successively with ethanol and chloroform. The functionalized SWNT were dried overnight in vacuo at 80° C. To convert the carboxylic acid groups into acid chloride groups, 200 mg of carboxylated SWNT and 30 mL freshly distilled benzene were taken into a 100 mL round-bottom flask fitted with a reflux condenser and a magnetic stir bar. To this mixture were added successively 20 mL of $SOCl_2$ (99.5%, Acros) and 2 mL of DMF. The suspension was stirred at 65° C. for 24 hrs. The solid was then separated by filtration in a 0.2 μm PTFE membrane filter paper and washed thoroughly with anhydrous tetrahydrofuran (THF). Finally, the solid was vacuum-dried at room temperature for 4 hrs. It was estimated that there is one alkyl acid chloride group for every 35 and 32 carbon atoms of the nanotube for C4-SWNT and C9-SWNT, respectively.

Synthesis of Nylon 6,10 and SWNT/Nylon 6,10 Composites:

The organic phase of the interfacial polycondensation reaction contained the diacid chloride (sebacoyl chloride (9.5%, Acros)) and the suspended nanotubes. The aqueous phase contained the diamine (1,6-hexamethylene diamine (Fluka)) and a base sodium hydroxide to neutralize the byproduct of this reaction, hydrochloric acid. Dichlorobenzene was used as the organic phase as it is immiscible with water and is able to disperse the SWNT.

For the polymerization of neat nylon 6,10, 1.4 g (0.011 mol) of hexamethylene diamine and 0.88 g (0.022 mol) of sodium hydroxide was dissolved in 110 mL water and was placed in a blender. A total of 2.63 g (2.36 mL, 0.011 mol) of sebacoyl chloride was dissolved in 190 mL of dichlorobenzene. The blender was turned on highest speed, and the sebacoyl chloride solution was quickly added to the diamine solution. The reaction was very fast and typically ran for just 3 min. The reaction was terminated by adding a 3% aqueous hydrochloric acid solution to the blender, and the stirring was continued for 1 min more. The polymer was filtered through a 10 μm PTFE membrane (Millipore Mitex), washed repeatedly with water and acetone, and dried at 100° C. under vacuum for 24 hrs.

For the preparation of the nanotube/nylon 6,10 composites, different wt % nanotubes were first dispersed in dichlorobenzene with the aid of bath ultrasonication for 24 hrs, and then sebacoyl chloride was added to the suspension. The reaction was then carried out using the same procedure and reagent ratios, as described for the nylon 6,10 synthesis. Composites with 0.05, 0.1, 0.5, and 1 wt % of the nanotubes were prepared. For the C4-SWNT and C9-SWNT, the loading of the nanotubes represents the wt % of the tubes with the functional groups.

Preparation of Fibers:

Fibers of the composites were fabricated by melt extrusion at 240° C. using a DACA SpinLine with a spinneret diameter of 500 μm.

Example 9A. Formation of Carbon Nanotube Reinforced Nylon 6,10, Using CNTs that have been Functionalized by Attachment of MLs that Carry Carboxylic Acid Reactive Groups In this example SE1 is a single-walled carbon nanotube (SWNT), SE2 is a nylon polymer molecule, the mechanical ligand carries a carboxylic acid, Ligand2 is an amide bond, and the polymerization reaction is a polycondensation.

This example is adapted from Example 8.

Functionalization of the SWNT with Carboxylic Acid Groups Using a Mechanical Ligand that Carries a Carboxylic Acid Reactive Group:

SWNT are synthesized by the high-pressure carbon monoxide method (HiPco). Different wt % nanotubes are then dispersed in dichlorobenzene with the aid of bath ultrasonication for 24 hrs, and each of these nanotube solutions (with different wt % of nanotube) is then split in four and added to four flasks containing compound (104-B) at a final concentration corresponding to a 100-fold molar excess, 1,000-fold molar excess, 10,000-fold molar excess, or 100,000-fold molar excess, respectively, of (104-B) to the SWNT. At this point we thus have a number of flasks containing different wt % of nanotubes and different concentrations of precursor-MLs, in dichlorobenzene.

Likewise, reactions comprising a negative control compound that does not carry a carboxylic acid reactive group, are set up under otherwise identical conditions and concentrations as described immediately above. The negative control compound provides a means of assessing the relative effects of anchoring the SWNT in the polymer matrix, versus not anchoring the SWNT in the polymer matrix.

Ring-closing of the precursor-MLs, i.e. compound (104-B) and the negative control compound is now effectuated using Grubb's catalyst, as described in Example 3. After ring-closing we thus have a set of solutions comprising SWNTs mechanically bound to the cyclized derivative of compound (104-B) (i.e. a set of solutions of SWNT functionalized with COOH), and a set of solutions comprising SWNTs mechanically bound by the cyclized derivative of the negative control compound, which does not carry any COOH.

The solutions from immediately above are then filtered through a 0.2 μm PTFE membrane and washed successively with ethanol and chloroform. The SWNT-ML complexes are dried overnight in vacuo at 80° C. 200 mg of dried SWNT-ML complex and 30 mL freshly distilled benzene are taken into a 100 mL round-bottom flask fitted with a reflux condenser and a magnetic stir bar. To this mixture is added successively 20 mL of $SOCl_2$ (99.5%, Acros) and 2 mL of DMF. The suspension is stirred at 65° C. for 24 hrs. This converts the carboxylic acid groups into acid chloride groups. The solid is then separated by filtration in a 0.2 μm PTFE membrane filter paper and washed thoroughly with anhydrous tetrahydrofuran (THF). Finally, the solid is vacuum-dried at room temperature for 4 hrs. The final, dried product consisting of SWNTs, mechanically bound by a ligand that is covalently linked to the carboxylic acid chloride moiety, as well as the final, dried product consisting of SWNTs, mechanically bound by a ligand that does not carry a carboxylic acid chloride moiety, are both called "functionalized SWNT".

Overview of the Synthesis of SWNT/Nylon 6,10 Composites:

The organic phase of the interfacial polycondensation reaction contains the diacid chloride (sebacoyl chloride) and the suspended, functionalized SWNT. The aqueous phase contains the diamine (1,6-hexamethylene diamine (Fluka)) and a base sodium hydroxide to neutralize the byproduct of the reaction, hydrochloric acid. Dichlorobenzene is used as the organic phase as it is immiscible with water.

Preparation of the nanotube/nylon 6,10 composites: To each of the functionalized SWNT solids from above is now added sebacoyl chloride. The reaction is then carried out using the same procedure and reagents as described for the nylon 6,10 synthesis in Example 8.

Composites with 0.05, 0.1, 0.5, and 1 wt % of the nanotubes are produced.

By varying the relative and absolute concentrations of the acid chloride, the amine and the functionalized SWNT, a different degree of anchoring of the SWNT and different characteristics of the composites can be obtained.

If a higher number of attachment points for the polymer is desired, but a higher number of mechanical ligands attached to each SWNT is not desired, one may use mechanical ligands that each carry 2, 3, 4, 5, 6 or more COOH reactive groups per ML, as opposed to the ML of this example that only carries one COOH.

Preparation of Fibers:

Fibers of the composites are fabricated by melt extrusion at 240° C. using a DACA SpinLine with a spinneret diameter of 500 μm. The fibers will have different strength and flexibility than the neat nylon fibers or SWNT-reinforced nylon fiber described in Example 8. Moreover, the fibers containing SWNT bound by the compound (104-B)-derived ML (that carries three COOH reactive groups) will be well anchored in the composite (because the COOH groups have reacted with amines of the growing polymer during composite formation), whereas fibers containing the negative control ML (that does not carry COOH reactive groups) will not be as well anchored in the composite. As a consequence, the fibers comprising the (104-B)-derivative will have improved characteristics as compared to fibers comprising the negative control compound.

In this example, the precursor-ML (compound (104-B)) comprises four dinitrobenzene moieties. These dinitrobenzene moieties are responsible for the initial binding of the precursor-ML to the nanotube, prior to the ring-closing of the ML around the nanotube. In the design of the precursor-ML, one or more of the four dinitrobenzene moieties of the precursor-ML can be exchanged with any of the following alternative CNT-binding moieties, comprised within Group 10 below.

Group 10: CNT-Binding Moieties.

Riboflavin; Porphyrine; Pyrenyl; SDBS; Benzene; Naphthalene; Biphenyl; Phenanthrene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, or the polypeptide PQAQDVELPQELQDQHREVEV. With appropriate adjustment of the total length of the precursor-ML (and hence the circumference of the ring-closed ML), eg. by decreasing or increasing the number of carbon atoms at the ends of the precursor-ML, these alternative precursor-MLs may be used in the production of alternative SWNT/Nylon 6,10 composites, using the same protocol as described above in this example. Adjustment of the total length of the precursor-ML or the total circumference of the resulting ML, may allow the use of other types of CNTs (eg. MWNTs) or other types of nanotubes such as boron nitride nanotubes in the preparation of nylon composites with improved characteristics.

Example 9B. Formation of Carbon Nanotube-Reinforced Nylon 6,10, Other Types of Nylon, Other Types of Polyamides and Other Types of Polycondensation Polymers In this example SE1 is a single-walled carbon nanotube (SWNT), SE2 is a polycondensation polymer molecule, the mechanical ligand comprises two tetrathiafulvalene (exTTF) motifs, the ring-closing reaction is a Grubb's catalyst-mediated reaction between two double bonds, Ligand2 is an amide bond, and the polymerization reaction is a polycondensation.

This example is adapted from Example 9A.

Step 1: Functionalization of the SWNT with Carboxylic Acid Groups Using a Mechanical Ligand that Carries a Carboxylic Acid Reactive Group:

Compound (B) (see FIG. 11) carries a methyl ester. The methyl ester is converted to a carboxylic acid using standard procedures; this compound is called (B—COOH).

SWNT are synthesized by the high-pressure carbon monoxide method (HiPco). Different wt % nanotubes are then dispersed in dichlorobenzene with the aid of bath ultrasonication for 24 hrs, and each of these nanotube solutions (with different wt % of nanotube) is then added to four flasks containing compound (B—COOH). The four different flasks contain compound (B—COOH) at a final concentration corresponding to a 100-fold molar excess, 1,000-fold molar excess, 10,000-fold molar excess, or 100,000-fold molar excess, respectively, of (B—COOH) to the SWNT. At this point we thus have a number of flasks containing different wt % of nanotubes and different concentrations of the precursor-ML, in dichlorobenzene.

Likewise, reactions comprising a negative control compound, not carrying a carboxylic acid reactive group, are set up under otherwise identical conditions and concentrations as described immediately above. The negative control compound provides a means of assessing the relative effects of anchoring the SWNT in the polymer matrix, versus not anchoring the SWNT in the polymer matrix.

Ring-closing of the precursor-MLs (compound (B—COOH) and the negative control compound is now effectuated using ring-closing metathesis with Grubb's 2$^{nd}$ generation catalyst, as described in (Angew. Chem. 2014, 53 (21), 5394-5400, DOI: 10.1002/anie.201402258) and in Example 1.2. After ring-closing we thus have a set of solutions comprising SWNTs mechanically bound to the cyclized derivative of compound (B—COOH), i.e. a set of solutions of SWNT functionalized with COOH We also have a set of solutions comprising SWNTs mechanically bound by the cyclized derivative of the negative control compound, which does not carry any COOH.

The solutions from immediately above are then filtered through a 0.2 μm PTFE membrane and washed successively with ethanol and chloroform. The SWNT-ML complexes are dried overnight in vacuo at 80° C. 200 mg of dried SWNT-ML complex and 30 mL freshly distilled benzene are taken into a 100 mL round-bottom flask fitted with a reflux condenser and a magnetic stir bar. To this mixture is added successively 20 mL of $SOCl_2$ (99.5%, Acros) and 2 mL of DMF. The suspension is stirred at 65° C. for 24 hrs. This converts the carboxylic acid groups into acid chloride groups. The solid is then separated by filtration in a 0.2 μm PTFE membrane filter paper and washed thoroughly with anhydrous tetrahydrofuran (THF). Finally, the solid is vacuum-dried at room temperature for 4 hrs. The final, dried product consisting of SWNTs, mechanically bound by a ligand that is covalently linked to the carboxylic acid chloride moiety, is called "SWNT/(cycB—COOH) complexes".

The dried product consisting of SWNTs, mechanically bound by a ligand that does not carry a carboxylic acid chloride moiety, is called "SWNT/negative control complexes".

Overview of the Synthesis of SWNT/Nylon 6,10 Composites:

The organic phase of the interfacial polycondensation reaction contains the diacid chloride (sebacoyl chloride) and the suspended, functionalized SWNT. The aqueous phase contains the diamine (1,6-hexamethylene diamine (Fluka)) and a base sodium hydroxide to neutralize the byproduct of the reaction, hydrochloric acid. Dichlorobenzene is used as the organic phase as it is immiscible with water.

Step 2: Preparation of the nanotube/nylon 6,10 composites: To each of the SWNT/(cycB—COOH) complexes solids and the SWNT/negative control complexes solids from above is now added sebacoyl chloride. The reaction is then carried out using the same procedure and reagents as described for the nylon 6,10 synthesis above (see Example 8).

Composites with 0.05, 0.1, 0.5, and 1 wt % of the nanotubes are produced.

By varying the relative and absolute concentrations of the acid chloride, the amine and the SWNT/(cycB—COOH)— and SWNT/negative control complexes, different degrees of anchoring of the SWNT and different characteristics of the composites can be obtained.

If a higher number of attachment points for the polymer is desired, but a higher number of mechanical ligands attached to each SWNT is not desired, one may use mechanical ligands that each carry 2, 3, 4, 5, 6 or more COOH reactive groups per ML, as opposed to the ML of this example that only carries one COOH.

Preparation of Fibers:

Fibers of the composites are fabricated by melt extrusion at 240° C. using a DACA SpinLine with a spinneret diameter of 500 μm. The fibers will have different strength and flexibility than the neat nylon fibers or SWNT-reinforced nylon fiber described in Example 8. Moreover, the fibers containing SWNT bound by the (B—COOH)-derived ML (that carry a COOH reactive group) will be well anchored in the composite (because a COOH group has reacted with an amine of the growing polymer during composite formation), whereas fibers containing the negative control ML (that does not carry a COOH) will not be as well anchored in the composite. As a consequence, the fibers comprising the (B—COOH)-derivative will have improved characteristics as compared to fibers comprising the negative control compound.

In this example, the precursor-ML, compound (B—COOH) comprises two exTTF moieties. These exTTF moieties are responsible for the initial binding of the precursor-ML to the nanotube, prior to the ring-closing of the ML around the nanotube. In the design of the precursor-ML, one or both of the exTTF moieties of the precursor-ML can be exchanged with any of the following alternative CNT-binding moieties: Riboflavin; Porphyrine; Pyrenyl; SDBS; Benzene; Naphthalene; Biphenyl; Phenanthrene; Anthracene; Pyrene; Triphenylene; P-terphenyl; Tetraphene; Pyrenecarboxylic acid; SDSA; DTAB; Tween-60; Tween-80; Monostearate; Monooleate; PSPEO; PVP; the polypeptide SKTSGRDQSKRVPRYWNVHRD, the polypeptide SKTSRESSAVQMGKARFLCTH, the polypeptide KTQATSRGTRGMRTSGGFPVG, the polypeptide KTQATSVPRKAARRWEQVDSV, the polypeptide KTQATSESGSAGRQMFVADMG, or the polypeptide PQAQDVELPQELQDQHREVEV. With appropriate adjustment of the total length of the precursor-ML (and hence the circumference of the ring-closed ML), eg. by decreasing or increasing the number of carbon atoms at the ends of the precursor-ML, these alternative precursor-MLs may be used in the production of alternative SWNT/Nylon 6,10 composites, using the same protocol as described above in this example. Adjustment of the total length of the precursor-ML or the total circumference of the resulting ML, may allow the use of other types of CNTs (eg. SWNTs of larger or smaller radii or chirality, or MWNTs) or other types of nanotubes such as boron nitride nanotubes, zinc oxide nanotubes, tungsten disulfide nanotubes, molybdenum disulfide nanotubes, tin disulfide nanotubes, gold nanotubes, titanium nanotubes, zirconia dioxide nanotubes, copper nanotubes, or bismuth nanotubes in the preparation of nylon composites with improved characteristics.

The resulting material is thus a SWNT/nylon composite comprising 0.05, 0.1, 0.5, and 1 wt % SWNT Other carbon nanotube/nylon composites may be made. Below is shown a few examples of different reactants (acid chlorides and amines) leading to different nylon polymers.

| | Putrescine | HMD | Nonadedi-amine | Decanedi-amine | Dodecane-diamine |
|---|---|---|---|---|---|
| Adipic acid | Nylon 4/6 | Nylon 6/6 | Nylon 9/6 | Nylon 10/6 | Nylon 12/6 |
| Sebacic acid | Nylon 4/10 | Nylon 6/10 | Nylon 9/10 | Nylon 10/10 | Nylon 12/10 |
| Dode-cane-dioic acid | Nylon 4/12 | Nylon 6/12 | Nylon 9/12 | Nylon 10/12 | Nylon 12/12 |

Likewise, alternative additives may be used in the preparation of nylon composites, such as multi-walled carbon nanotubes, other nanotubes, graphene, and other fullerenes.

Other polyamides such as the condensation product of terephthalic acid or isophthalic acid with for example bis (para-aminocyclohexyl)methane or trimethylhexamethylenediamine, and other classes of condensation polymers such as polyesters including poly(ethylene terephthalate) can be made using the general approach described in this example.

Preparation of Fibers:

Fibers of the composites are fabricated by melt extrusion at 240° C. using a DACA SpinLine with a spinneret diameter of 500 μm. The fibers will have different strength and flexibility than the neat nylon fibers and the SWNT-reinforced nylon fiber described in Example 8. Other characteristics such as conductivity will be different as well.

Thus, by appropriate choice of additive (e.g. carbon nanotube), polymer (e.g. 6,10 nylon), binding moiety of precursor-ML (e.g. anthracene), linker length (e.g. 10 atoms between and the ring structure and the acid chloride), and reaction conditions, the optimal compromise between flexibility, strength, conductivity, material processing and other important characteristics of the composite may be reached.

Example 9, D. The Making of a Molecular Shock Absorber, Useful in the Design of Composite Materials that Must Withstand Sudden Impacts In this example SE1 is a single-walled carbon nanotube (SWNT), SE2 is a polycondensation polymer molecule, the mechanical ligand comprises two pyrenes, and the linker connecting the mechanical ligand with the polymer also comprises two pyrenes. The two pyrenes of the linker function as a shock absorper during impact on the composite material.

This example is adapted from Example 9B. All the steps, reactants used and conditions applied in Example 9B are the same for this Example 9D, except that in Step 1 the compound (107-A) (see FIG. 28) is used instead of compound (B—COOH). Thus, in this example 9D, steps 1-2 are performed as described in Example 9B, except that compound (107-A) is used instead of compound (B—COOH). The final, dried product of step 2, consisting of complexes of SWNT and the cyclized form of (107-A), is called "SWNT/(107-A) complexes".

Figure 32:
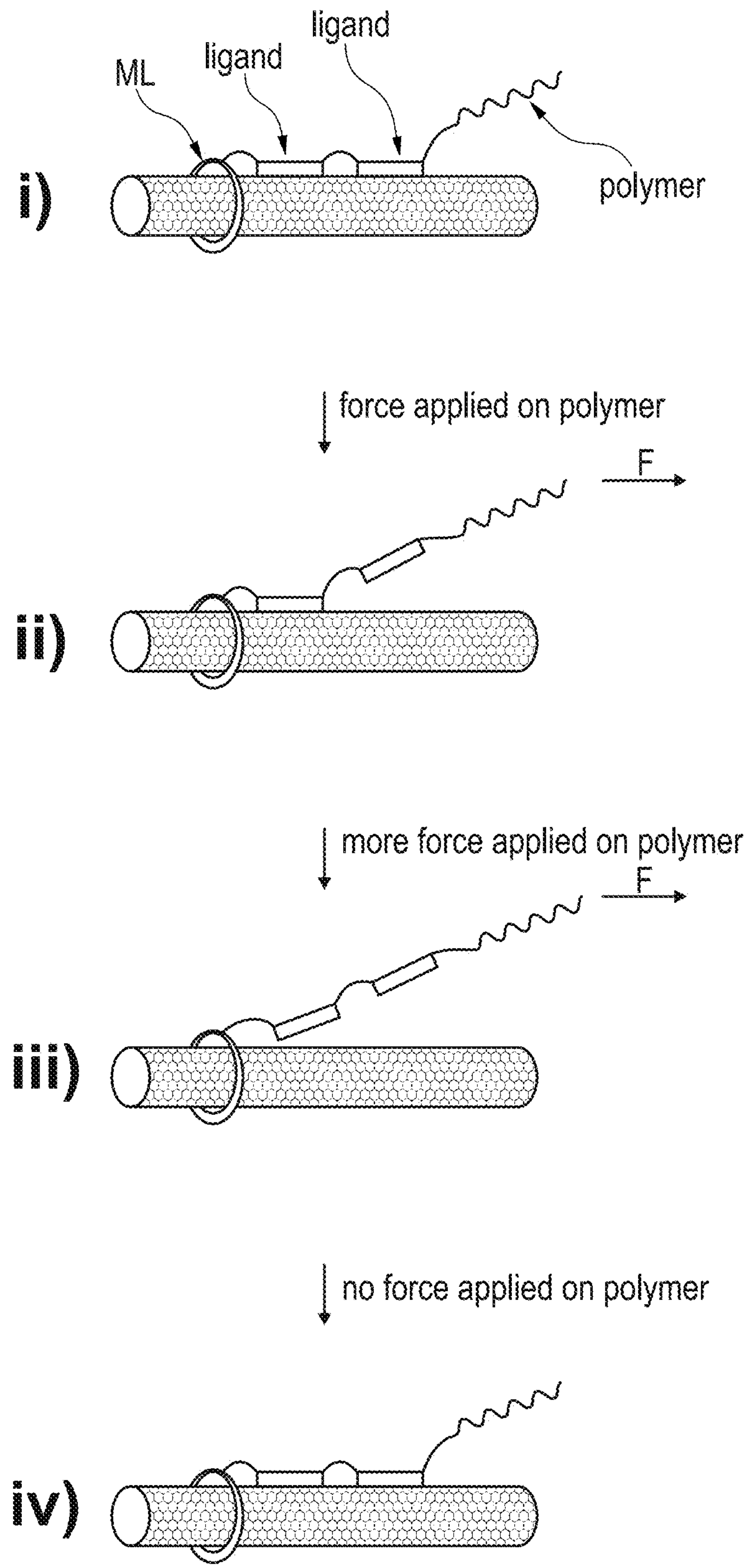
FIG. 32 shows the principle of a molecular shock absorber, where the molecular shock absorber comprises a mechanical ligand and two non-covalent ligands.

The resulting composite material units (CMUs) are shown schematically in FIG. 32. The mechanical ligand forms a ring around the SWNT; the linker connecting the ML and the polymer comprises two pyrenes capable of binding relatively strongly to the SWNT; and the polymer may be part of the matrix of a composite material.

In (i) there is no force being applied to the composite material, and the two pyrenes of the linker are bound to the SWNT. However, when force is being applied to the polymer (in this case pulling the polymer away from the SWNT), as depicted in (ii) and (iii), first one pyrene is pulled off the SWNT and then the other pyrene is pulled off as well. This will tend to absorb part of the energy that is being put into pulling away the polymer, and therefore functions as a kind of shock absorber, decreasing the likelihood of the SWNT and polymer being pulled irreversibly apart, as would be the case if e.g. the linker or the mechanical bond was torn apart, i.e. a covalent bond of the linker or ML was broken.

In (iv) there is no force being applied, and the pyrenes rebind the SWNT, to reestablish the situation of (i).

The principle and effect of the shock absorper is analogous to the use of heavy anchor chains used in boats. When the waves are small the anchor chain near the anchor will lay on the bottom. If a large wave lifts the boat, the heavy anchor chain will be lifted up from the bottom, but because of its weight, the movement of the boat will be dampened.

Except for the use of the compound (107-A) in step 1, all alternative reagents and reaction conditions, as well as all alternative routes and downstream processing methods of Example 9B apply to this Example 9D as well.

Example 10. Melt Processing or Solution Mixing to Form Carbon Nanotube Reinforced Polymer In this example, SE1 is a carbon nanotube, and SE2 is a polymer amenable to melt processing or solution mixing.

This example is adapted from Example 9B.

Step 1: Functionalization of the CNT with Carboxylic Acid Groups Using a Mechanical Ligand that Carries an Activated Carboxylic Acid:

CNT are obtained from several different manufacturers. Different wt % nanotubes are then dispersed in dichlorobenzene or another appropriate solvent, with the aid of bath ultrasonication for 24 hours, and each of these nanotube solutions (with different wt % of nanotube) is then added to four flasks containing compound (105-A) (see FIG. 25 ), which comprises a methyl ester and two double bonds. The four different flasks contain compound (105-A) at a final concentration corresponding to a 100-fold molar excess, 1,000-fold molar excess, 10,000-fold molar excess, or 100,000-fold molar excess of (105-A) to the CNT. At this point we thus have several flasks containing different wt % of nanotubes and different concentrations of precursor-MLs, in dichlorobenzene.

Likewise, reactions comprising a negative control compound, not carrying a methyl ester, are set up under otherwise identical conditions and concentrations as described immediately above. The negative control compound provides a means of assessing the relative effects of anchoring the CNT in the polymer matrix via a covalent bond between the ML and the polymer, versus not anchoring the CNT in the polymer matrix via a covalent bond.

Ring-closing of the precursor-MLs (compound (105-A) and the negative control compound) is now effectuated using Grubb's catalyst, as described for this compound, in Example 3. After ring-closing we thus have a set of solids comprising CNTs mechanically bound to the cyclized derivative of compound (105-A) (i.e. a set of solids of CNT functionalized with COOH), and a set of solids comprising CNTs mechanically bound the cyclized derivative of the negative control compound, which does not carry any COOH.

The CNT/ML complexes from immediately above are dissolved in an appropriate solvent and acid hydrolysed, in order to convert the methyl ester to carboxylic acid, then filtered through a 0.2 μm PTFE membrane and washed successively with ethanol and chloroform. The complexes are dried overnight in vacuo at 80° C. 200 mg of dried CNT-ML complex and 30 mL freshly distilled benzene are taken into a 100 mL round-bottom flask fitted with a reflux condenser and a magnetic stir bar. To this mixture is added successively 20 ml-of $SOCl_2$ (99.5%, Acros) and 2 mL of DMF. The suspension is stirred at 65° C. for 24 hrs. This converts the carboxylic acid groups into acid chloride groups. The solid is then separated by filtration in a 0.2 μm PTFE membrane filter paper and washed thoroughly with anhydrous tetrahydrofuran (THF). Finally, the solid is vacuum-dried at room temperature for 4 hrs. The final, dried product consisting of CNTs, mechanically bound by a ligand that is covalently linked to the carboxylic acid chloride moiety, as well as the final, dried product consisting of CNTs, mechanically bound by a ligand that does not carry a carboxylic acid chloride moiety, are called "CNT/(cyc105-A-00C1) complexes" and "CNT/(cycNegativeControl-COCl) complexes", respectively".

Melt Processing to Form Carbon Nanotube Reinforced Polymers:

A preformed nylon polymer, applicable to melt processing, is now melted under appropriate conditions, split into a number of containers, and to each container is added an appropriate amount of either the "CNT/(cyc105-A-COCOl) complexes" or the "CNT/(cycNegativeControl-COCl) complexes".

The melted CNT/polymer composite is kept at a temperature where the polymer stays melted for 24 hours, to allow the carboxylic acid chloride groups to form a covalent bond with the nylon polymer. The melted composite is then cooled, to form the carbon nanotube reinforced nylon.

Solution Mixing to Form Carbon Nanotube Reinforced Polymers:

A preformed polymer, applicable to solution mixing, is added appropriate solvent under appropriate conditions, and added an appropriate amount of either "CNT/(cyc105-A-COCl) complexes" or the "CNT/(cycNegativeControl-COCl) complexes". The solution comprising the dissolved CNT/polymer komposite is kept at 65° C. for 24 hours, to allow the carboxylic acid chloride groups to form a covalent bond with the nylon polymer. The organic solvent is then removed, to form the carbon nanotube reinforced polymer.

Variations to the production method described in this example include:

i) Any kind of polymer may be used, as long as it is amenable to melt processing or solution mixing, and as long as it carries a functional group capable of reacting with the carboxylic acid chloride of the linker attached to the ML;

ii) If the polymer being used carries a functional moiety (reactive group) that cannot react with the carboxylic acid chloride, the linker unit attached to the ML may be designed in a way so that it carries a reactive group capable of reacting with the functional moiety (reactive group) of the polymer Example 12. A Strong but Flexible Ink for Various Surfaces In this example, a strong yet flexible epoxyacrylate-based resin material that can be used in the formulation of inks with good adhesion to plastic is prepared, by including a number of different types of CMUs. SE2 can be any of CNT, graphene, epoxyacrylate polymer, or a polymer of a plastic surface. The Linker Units (LUs) of this example comprise Ligand2s that are capable of binding either covalently or non-covalently to a structural entity. This is an example of an in situ polymerization, where the final processing of product involves curing by e-beam.

Preparation of Linker Units (LUs) and Other Compounds for the Preparation of the Ink.

Compound (201) (see FIG. 33) comprises the peptide HTAQSTA, a polystyrene-binding ligand. The polystyrene-binding ligand binds polystyrene with a dissociation constant of approximately 10 pM, and thus binds polystyrene with relatively high affinity. Compound (201) also contains a chemical moiety capable of forming a covalent bond with an epoxyacrylate polymer. The synthesis of compound (201) is shown in FIG. 33. The synthesis involves the following steps: The peptide sequence is reacted with a suitable ω-hydroxy acid ester (in FIG. 33, 12-hydroxydodecanoic acid is used) to form the corresponding ester.

The methyl ester is reacted to form the free carboxylic acid, which is the starting material shown in FIG. 33.

This compound is carefully reduced with for example diborane to form an alcohol, which can then be oxidized to the aldehyde. The aldehyde is then converted into an amine by reducing the aldehyde with $NaCNBH_3$.

Compound (202) comprises a precursor-ML for CNT, attached via a linker to an epoxy group. The epoxy group is a chemical moiety capable of forming a covalent bond with an epoxyacrylate polymer. The synthesis of compound (202) is shown in FIG. 34. First, the methyl ester of compound B is converted to a carboxylic acid using LICl, and then converted to an acid chloride with $SOCl_2$. For preparing the epoxide, the acid-chloride is converted by reacting with a suitable ω-hydroxy-carboxylic acid that has been converted to an alkene (for example by first protecting the alcohol functionality of the ω-hydroxy-carboxylic acid, then reducing selectively with for example diborane to form an alcohol, which can then be oxidized to the aldehyde followed by an HWE reaction to convert the aldehyde to an alkene and finally removing the alcohol protecting group), which subsequently can be converted to an epoxide with for example m-chloro-perbenzoic acid.

Compound (203) comprises pyrene, a graphene-binding ligand. Compound (203) also contains a chemical moiety capable of forming a covalent bond with an epoxyacrylate polymer. The synthesis of compound (203) is shown in FIG. 35. The synthesis involves the following steps: Pyrene-2-carboxylic acid is reacted with the ester of a suitable w-hydroxy-carboxylic acid. After reaction to form the free carboxylic acid, and reducing selectively the acid to an alcohol, and thereafter oxidizing selectively to the corresponding aldehyde, a reduction with for example $NaCNBH_3$ results in the amine as shown in FIG. 35.

Compound (204) comprises the peptide HTAQSTA (a polystyrene-binding ligand), and pyrene (a graphene-binding ligand), connected by a linker. The synthesis of compound (204) is shown in FIG. 36. The synthesis involves the following steps: Pyrene is reacted with a suitable ω-bromo-acid chloride in a Friedel-Crafts reaction. The resulting ketone is then reduced with $LiAlH_4$ and $AlCl_3$ thus removing the carbonyl group. The bromide is then hydrolyzed to the alcohol which can be coupled to the peptide.

Compound (205) comprises the peptide HTAQSTA (a polystyrene-binding ligand), and a precursor-ML capable of forming a mechanical bond to CNT, connected by a linker. The synthesis of compound (205) is shown in FIG. 37. The synthesis involves the following steps: The methyl ester of compound (B) is reacted with LiCl to selectively cleave the methyl ester leaving the free acid. A reduction with for example borane leaves the alcohol, which can be coupled to the peptide.

Compound (206) comprises a precursor-ML with two exTTF motifs and pyrene (a graphene-binding ligand), connected by a linker. The synthesis of compound (206) is shown in FIG. 38. The synthesis involves the following steps: The methyl ester of compound (B) is first turned into a free acid by alkaline hydrolysis, and then converted to an acid chloride using $SOCl_2$. Then the pyrene motif, carrying an OH-group on a linker, is added, to form compound (206).

Polymerization Reaction to Form an Epoxy-Acrylate Based Resin.

An amine functions as the initiator for starting a polymerization reaction with an epoxide of the commercially available Ebecryl 3605. This reaction is exemplified in FIG. 39, where the amine is carried by compound (202). The result in this case is a polymer attached to the pyrene. This polymerization reaction or those described below in this example, can either be done neat as Ebecryl 3605 is a high viscous liquid or in a solvent such as THF. The formed polymer can be mixed with epoxy acrylates such as hexa-functional polyester acrylates (e.g. Ebecryl LEO 10801) and other polymers or additives to form a resin that can further be used in the formulation of for example electron- or photoinitiator-cured inks.

Formation of a Pre-Polymer Resin System as a Component in an Ink or Paint Formulation Component I Comprises:

- CNT, corresponding to 1 w % of final paint
- Graphene, corresponding to 3 w % of final paint
- Compound (202) at a 1,000-fold molar excess to CNT
- Compounds (204), (205), and (206), each at a 1,000-fold molar excess to CNT
- Grubbs catalyst at an appropriate concentration, e.g. 10 mM
- Appropriate solvent, such as tetrachloroethane Component II Comprises:

- Epoxy acrylates containing both an acrylate functionality and an un-opened epoxide, such as Ebecryl 3605, in a final concentration of 1,000 to 100,000-fold molar excess of the CNT in final composite material Component III Comprises:

- Compound (201) and (203), each at a 1,000-fold molar excess to CNT in the final composite material.
- A primary amine such as CH3CH2CH2NH2, or any other amine that may function as initiator of the polymerization reaction, at an appropriate concentration, e.g 10 mM.

Protocol for formation of the strong yet flexible epoxy-acrylate-based ink with good adhesion to plastic:

First, ring closure around CNT of compounds (202), (205), and (206) is effectuated in Component I, by sonication for 15 minutes, followed by incubation at room temperature for 72 hours. 5-minute pulses of sonication are performed every 10 hour during the incubation. Finally, the suspension is filtered through a 0.2 μm pore-size polytetrafluoroethylene (PTFE) membrane and washed profusely with dichloromethane (DCM). The solid is removed from the filter, sonicated for 10 minutes in 20 mL DCM and filtered through a 0.2 μm PTFE membrane. Optionally, the filtration process may be repeated one or more times.

The resulting solid is then mixed thoroughly with Component II, and then added to Component III at room temperature or slightly elevated temperature such as 40 or 6° C. This will start the polymerization reaction.

The pre-polymer resin system comprises many different polymeric entities as the amines will initiate the polymerization reaction by opening an epoxide. The polymerization will then propagate as the ring-opening of an epoxide results in a free alcohol functionality that can then attack another epoxide. This reaction can be stimulated by heat or by a Lewis acid.

The ink may be formulated such that it contains the prepolymer described above in addition to various monomers, pigments, additives (flow agents, silicones) and possibly waxes. The monomers are mainly acrylates but additional resins or multifunctional oligomers may also be added in order to increase the cross-linking density (for example dendritic acrylates) and adjust properties such as viscosity, adhesion and solvent resistance.

Final Processing of the Product: Curing of the Paint

The curing process is performed using an e-beam process, where a film prepared from the ink is subjected to an electron beam. The electron beam will generate a radical on the acrylate functionalities, which can attack another acrylate thus propagating the polymerization producing a cured film of the ink formulation.

A number of different CMUs are present in the final ink. One may consider the polymer either part of the linker or a structural entity in itself, and therefore the CMUs will have "short" as well as "long" linkers connecting the structural entities, as follows:

| | SE1 | Linker | Ligand2 | SE2 |
|---|---|---|---|---|
| CMU1 | CNT | "short" | covalent | epoxyacrylate |
| CMU2 | CNT | "long" | ML | CNT |
| CMU3 | CNT | "long" | covalent | epoxyacrylate |
| CMU4 | CNT | "long" | noncovalent | graphene |
| CMU5 | CNT | "long" | noncovalent | plastic surface |

The linkers of CMU2, CMU3 and CMU4 and CMU5 comprise a stretch of epoxyacrylate polymer, formed during the polymerization process, and may thus comprise from two to several hundreds or thousands of polymer precursors, and are therefore typically a lot longer than the linker of CMU1. The average length of such linkers (consisting of a polymer) can thus be controlled by the absolute concentration of, and the ratios between, the polymer precursors.

Figure 40:
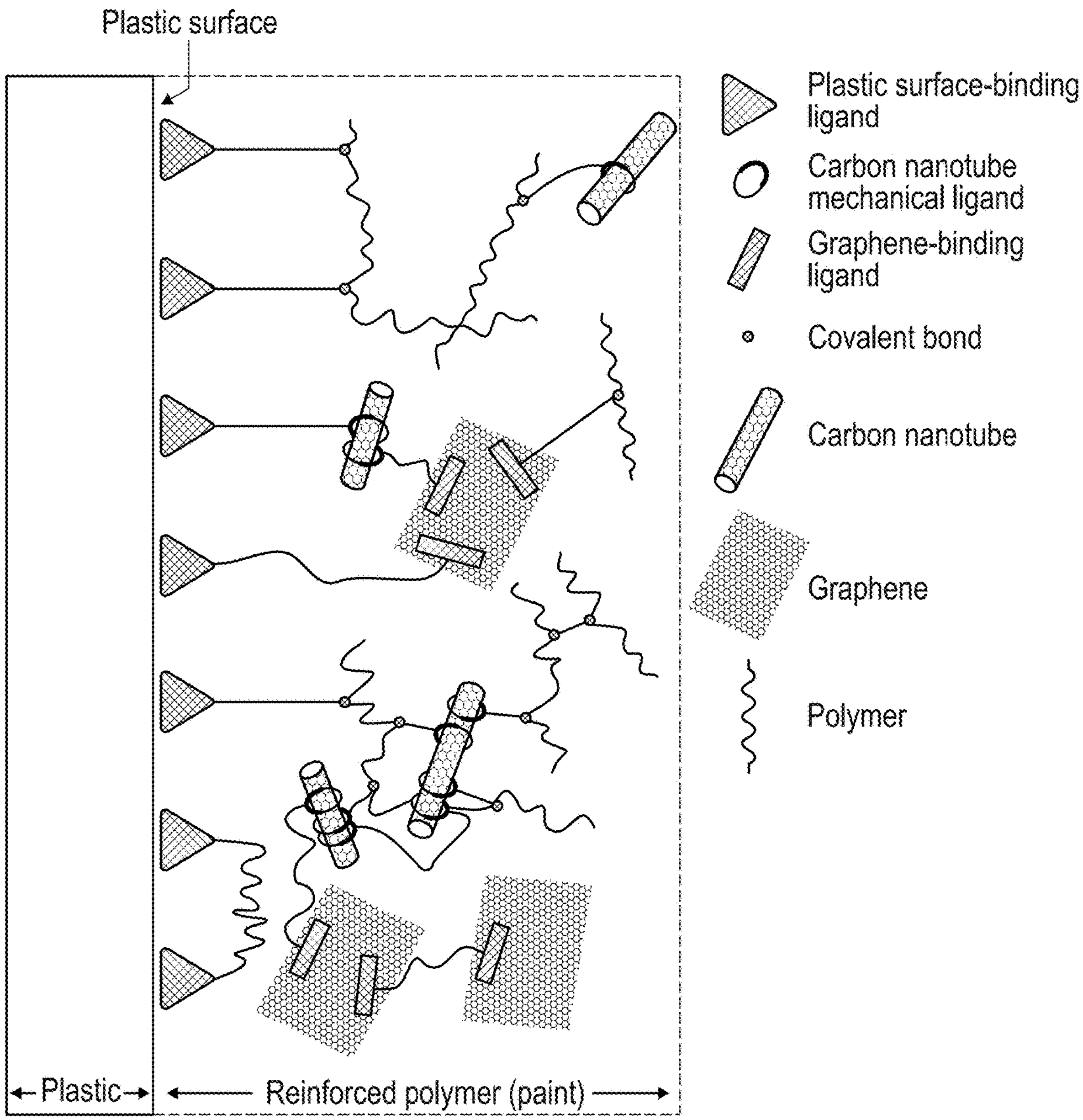

FIG. 40 shows a schematic of the final structure of the ink, including the different CMUs of the paint.

Modifications to the Procedure and to the Characteristics of the Paint Ink.

By varying the absolute amount of the components used (e.g. polymer precursors, additives, linkers), as well as the ratios between them, the characteristics may also be changed. Typically, a stronger material is obtained when a higher percentage of a high-strength additive is used (e.g. carbon fiber, CNT, graphene). Likewise, a better adherence of the paint is achieved by including a larger amount of surface-binding ligand. However, this is only true for concentrations of additive or ligand that does not negatively interfere with the integrity of the composite material.

In a preferred embodiment, the additives are conducting. As an example, some of the CNTs have a rather high conductivity. Using a paint that is conducting can be an advantage, as it may decrease corrosion, and may have improved characteristics for certain types of spray-painting.

Example 13. The Use of Nucleating Agents, Attached to the Additive, as a Means of Improving Crystallinity and Other Characteristics of a Composite Material Polymers and polymer composites show varying degrees of crystallinity ranging from polymers that have no regions of crystallinity such as poly(methyl 2-methylpropenoate) to polymers that have a high degree of crystallinity such as high-density polyethylene. Examples of polymer crystallinities are given in the table below.

| Polymer | Degree of crystallinity |
|---|---|
| Nylon (PA66 and PA6) | 35-45% |
| Polyoxymethylene (POM) | 70-80% |
| Polyethylene terephthalate (PET) | 30-40% |
| Polybutylene terephthalate (PBT) | 40-50% |
| Polytetrafluoroethylene (PTFE) | 60-80% |
| isotactic polypropylene | 70-80% |
| atactic polypropylene | ~0% |
| High-density polyethylene | 70-80% |
| Low-density polyethylene | 45-55% |

When making a composite material with an enhanced characteristic, e.g. tensile strength or Young's modulus, by using fullerenes as an additive, a common problem, especially for some fullerenes, is the formation of a large non-crystalline interphase around the fullerene, which makes the composite material less strong, or even weaker than the composite material without the fullerene.

By using the present invention, a CMU comprising one or more nucleating agents can be generated. As an example, if the CMU comprises a CNT, the nucleating agent may then induce a crystalline phase around the CNT, thus minimizing or eliminating the non-crystalline interphase potentially improving the strength of the composite material.

The nucleating agent may be covalently or non-covalently linked to a ML that is mechanically bound to a fullerene, e.g. to CNT, thus forming a CMU with nucleating potential. This may decrease the size of the interphase, as shown schematically in FIG. 41A and FIG. 41B. FIG. 41A shows a large interphase around the fullerene in the absence of a nucleating agent, and FIG. 41B shows a small interphase around the fullerene in the presence of a nucleating agent that is brought into the proximity of the fullerene by a mechanical ligand forming a ring around the fullerene. Thus, crystallinity will move closer to the nanotube, and in this way decrease the extent of the interphase.

In the following, it is described how the interphase around CNTs in several different composites can be controlled and minimized In a first step, a nucleating agent is linked to a ML. In this example the nucleating agent is $CH_3(OCH_2CH_2)_3$. Synthesis of compound (106-A), i.e. the precursor-ML carrying the nucleating agent, is described in Example 3. Ring-closure of compound (106-A) around the CNT molecules is described in Example 3. Following ring-closure the CNT/ML complexes are separated by filtration in a 0.2 μm PTFE membrane filter paper and washed thoroughly with anhydrous tetrahydrofuran (THF). Finally, the solid is vacuum-dried at room temperature for 4 hrs, to yield "Nucleating agent-functionalized CNT".

13.1. Preparation of CNT-Nylon Composites Using Nucleating Agents to Minimize the Interphase, but not Covalently Linking the ML of the CNT/ML Complexes to the Nylon Polymer.

Three reactions are set up:

Reaction 1: An organic phase consisting of 2 mL (0.0093 moles) sebacoyl chloride in 100 mL carbon tetrachloride is placed in a 200 mL tall-form beaker. Nucleating agent-functionalized CNT from above is added to a final concentration in the composite material of 0,1%, under stirring.

Reaction 2: An organic phase consisting of 2 mL (0.0093 moles) sebacoyl chloride in 100 mL carbon tetrachloride is placed in a 200 mL tall-form beaker. Nucleating agent-functionalized CNT from above is added to a final concentration in the composite material of 1%, under stirring. Reaction 3: An organic phase consisting of 2 mL (0.0093 moles) sebacoyl chloride in 100 mL carbon tetrachloride is placed in a 200 mL tall-form beaker. Nucleating agent-functionalized CNT from above is added to a final concentration in the composite material of 30%, under stirring.

Next, a solution of 4.4 g (0.038 moles) hexamethylenediamine in 50 mL water is then carefully poured over each of the three organic phases in the three beakers. A polymeric film forms at once at the interface, as the nylon polymers are formed. When the film is pushed aside, new, smooth film forms at once at the fresh interface. The walls of the glass are freed of strings of polymer, the mass is grasped at the center with tweezers and raised as a rope of continuously forming polymer film.

The resulting CNT-nylon composite material is washed thoroughly with water and dried in air. The washing is greatly hastened if 50% aqueous alcohol is used for an initial wash.

The final product, the nylon-CNT composite material, will have improved characteristics resulting from the nucleating agent, linked to and therefore held in the vicinity of the CNT additive, thereby decreasing the extent of the interphase around the CNT.

13.2. Preparation of CNT-PE Composites Using Nucleating Agents to Minimize the Interphase, but not Covalently Linking the ML of the CNT/ML Complexes to the Polymer.

The ML bound to CNT in the nucleating agent-functionalized CNT (above, this Example) contains a double bond; this double bond may optionally be reduced, e.g. by hydrogenation (using the conditions described below), prior to the reactions that follow here. The nucleating agent-functionalized CNT, in an amount corresponding to 60% in the final composite material, is now added to a 50 mM solution of octene in toluene, under stirring. Grubbs' $2^{nd}$ Generation catalyst is added at an appropriate concentration, e.g. 100 mM. Polymerization is allowed to proceed until insignificant new polymer is generated and is then terminated by quenching the reaction mixture with methanol precipitating the polymer material, which is then isolated by filtration and dried.

Finally, the double bonds of the polymer are reduced by e.g. hydrogenation. This may be done by dispersing the isolated unsaturated polymer in a suitable solvent such as xylene, tetrahydrofurane, toluene or halogenated solvents. Then, hydrogenation can be done with hydrogen gas in a pressurized reactor and employing a suitable catalyst such as Pd/C. Alternatively, hydrogenation is carried out using tosyl hydrazine and trimethylamine.

The final product, the PE-CNT composite material, will have improved characteristics resulting from the nucleating agent, linked to and therefore held in the vicinity of the CNT additive, thereby decreasing the extent of the interphase around the CNT.

13.3. Preparation of CNT-Epoxy Composites Using Nucleating Agents to Minimize the Interphase, but not Covalently Linking the ML of the CNT/ML Complexes to the Epoxy Polymer.

This example is adapted from Example 2.4.

Five epoxy-CNT composites are prepared by adding the nucleating agent-functionalized CNT (from above, this example) at five different CNT loadings with respect to total weight of cured epoxy specimen (0.01% (w/w), 0.1% (w/w), 1% (w/w), 10% (w/w), and 70% (w/w), respectively) to Aradur 5052 (amine hardener), and incubating at 20° C. for 12 hours. The five suspensions are then centrifuged at 13000 g for 15 minutes. One volume Araldite LY5052 (epoxy resin) is then added to each suspension and the suspensions are stirred for 2 hours. The prepared suspension is added to a mold sprayed with Dow Corning 20 mold release and cured for 24 hours at 60° C.

The hardening process can be modified by using different ratios of Aradur 5052 and Araldite LY5052, e.g. ratios of 1:2; 1.5:2; 1.75:2; 2:1; 2:1.5; 2:1.75; or any other ratio, as desired.

If desired, a pyrene-based, or an NDI-based ML can be used in a similar process instead of the exTTF-based ML described in the process above.

In conclusion, described is the generation of an epoxy polymer-CNT composite material wherein nucleating agents are mechanically bound to the CNT, thereby decreasing the extent of the interphase around the CNT.

13.4. Preparation of CNT-Nylon Composites Using Nucleating Agents to Minimize the Interphase, in which the ML of the CNT/ML Complex is Covalently Linked to the Nylon Polymer.

The nucleating agent-functionalized CNT from above (this Example) carry a methyl ester on the ML that is wrapped around the CNT. This methyl ester is now converted to a carboxylic acid chloride, as follows. The solid nucleating agent-functionalized CNT is dissolved in 10 mL tetrachloride. Then LiCL is added to convert the methyl ester to carboxylic acid, and $SOCL_2$ is added in order to convert the carboxylic acid to a carboxylic acid chloride. The resulting product is called "Nucleating agent-functionalized CNT, carrying acid chloride".

Three reactions are set up:

Reaction 1: An organic phase consisting of 2 mL (0.0093 moles) sebacoyl chloride in 100 mL carbon tetrachloride is placed in a 200 mL tall-form beaker. Nucleating agent-functionalized CNT, carrying acid chloride from above (this Example) is added to a final concentration in the composite material of 0,1%, under stirring.

Reaction 2: An organic phase consisting of 2 mL (0.0093 moles) sebacoyl chloride in 100 mL carbon tetrachloride is placed in a 200 mL tall-form beaker. Nucleating agent-functionalized CNT, carrying acid chloride from above (this Example) is added to a final concentration in the composite material of 1%, under stirring.

Reaction 3: An organic phase consisting of 2 mL (0.0093 moles) sebacoyl chloride in 100 mL carbon tetrachloride is placed in a 200 mL tall-form beaker. Nucleating agent-functionalized CNT, carrying acid chloride from above (this Example) is added to a final concentration in the composite material of 30%, under stirring.

Next, a solution of 4.4 g (0.038 moles) hexamethylenediamine in 50 mL water is then carefully poured over each of the three organic phases in the three beakers. A polymeric film forms at once at the interface, as the nylon polymers are formed. The carboxylic acid chloride moieties carried on the ML that is wrapped around the CNT, will react with the hexamethylenediamine, and hence, the ML will become covalently linked to the nylon polymer. As a result, the CNT becomes mechanically bound to the polymer by way of the ML. When the film is pushed aside, new, smooth film forms at once at the fresh interface. The walls of the glass are freed of strings of polymer, the mass is grasped at the center with tweezers and raised as a rope of continuously forming polymer film.

The resulting CNT-nylon composite material is washed thoroughly with water and dried in air. The washing is greatly hastened if 50% aqueous alcohol is used for an initial wash.

The final product, the nylon-CNT composite material, will have improved characteristics resulting from the nucleating agent, linked to and therefore held in the vicinity of the CNT additive, thereby decreasing the extent of the interphase around the CNT. Also, the CNTs are well anchored to the nylon polymer, by way of the mechanical ligand that is ring-closed around the CNT and covalently bound to the nylon polymer.

13.5. Preparation of CNT-PE Composites Using Nucleating Agents to Minimize the Interphase, in which the ML of the CNT/ML Complexes is Covalently Linked to the PE Polymer.

The nucleating agent-functionalized CNT (above, this example) consists of CNTs, mechanically bound to a mechanical ligand that is covalently attached to a nucleating agent, $CH_3(OCH_2CH2)_3$, and a methyl ester (see FIG. 42). The ML also contains a double bond; this double bond may optionally be reduced prior to the reactions that follow below.

The nucleating agent-functionalized CNT is now dissolved in toluene and the methyl ester is converted into a carboxylic acid chloride by standard means, and then reacted with (Z)-cyclooct-4-en-1-ylmethanol, to form an ester carrying the octene moiety (see FIG. 42). Thus, the resulting product is a CNT, mechanically bound to the nucleating agent and octene. This product is called "Nucleating agent-functionalized CNT, carrying octene".

The Nucleating agent-functionalized CNT, carrying octene (in which CNT is mechanically bound to the nucleating agent and octene), is now added to a 50 mM solution of octene in toluene, under stirring, in an amount so that the CNT concentration will be 10 wt % in the final composite. Grubbs' $2^{nd}$ Generation catalyst is added to an appropriate concentration. This will lead to polymerization and formation of the PE polymer. The octene that is mechanically bound to the CNT, will react with the growing PE polymer, and in this way covalently link the ML to the PE polymer.

Polymerization is allowed to proceed until insignificant new polymer is generated and is then terminated by quenching the reaction mixture with methanol precipitating the polymer material, which is then isolated by filtration and dried.

Finally, the double bonds of the polymer are reduced by e.g. hydrogenation. This may be done by dispersing the isolated unsaturated polymer in a suitable solvent such as xylene, tetrahydrofurane, toluene or halogenated solvents. Then, hydrogenation can be done with hydrogen gas in a pressurized reactor and employing a suitable catalyst such as Pd/C. Alternatively, hydrogenation is carried out using tosyl hydrazine and trimethylamine.

The final product, the PE-CNT composite material, will have improved characteristics resulting from the nucleating agent, linked to and therefore held in the vicinity of the CNT additive, thereby decreasing the extent of the interphase around the CNT. Also, the CNTs are well anchored to the PE polymer, by way of the mechanical ligand that is ring-closed around the CNT and covalently bound to the PE polymer.

13.6. Preparation of CNT-Epoxy Composites Using Nucleating Agents to Minimize the Interphase, in which the ML of the CNT/ML Complexes is Covalently Linked to the Epoxy Polymer.

This example is adapted from Example 2.4.

The nucleating agent-functionalized CNT (above, this example) consists of CNT, mechanically bound to a mechanical ligand that is covalently attached to a nucleating agent, $CH_3(OCH_2CH2)_3$, and a methyl ester (see FIG. 43). The ML also contains a double bond; this double bond may optionally be reduced prior to the reactions that follow below.

The nucleating agent-functionalized CNT is now dissolved in an appropriate solvent such as toluene, and the methyl ester is converted into a carboxylic acid chloride by standard means, and then reacted with ethylenediamine. The resulting product is CNT, mechanically bound to the nucleating agent and an amine. This product is called "Nucleating agent-functionalized CNT, carrying amine".

Then, five epoxy-CNT composites are prepared by adding the nucleating agent-functionalized CNT carrying the amine (from immediately above) at five different CNT loadings with respect to total weight of cured epoxy specimen (0.01% (w/w), 0.1% (w/w), 1% (w/w), 10% (w/w), and 70% (w/w), respectively) to Aradur 5052 (amine hardener), and incubating at 20° C. for 12 hours. The five suspensions are then centrifuged at 13000 g for 15 minutes. One volume Araldite LY5052 (epoxy resin) is then added to each of the five suspensions and the suspensions are stirred for 2 hours. Each of the prepared suspensions is added to a mold sprayed with Dow Corning 20 mold release and cured for 24 hours at 60° C.

The hardening process can be modified by using different ratios of Aradur 5052 and Araldite LY5052, e.g. ratios of 1:2; 1.5:2; 1.75:2; 2:1; 2:1.5; 2:1.75; or any other ratio, as desired.

If desired, a pyrene-based, or an NDI-based ML can be used in a similar process instead of the exTTF-based ML described in the process above.

The final product, the epoxy-CNT composite material, will have improved characteristics resulting from the nucleating agent, linked to and therefore held in the vicinity of the CNT additive, thereby decreasing the extent of the interphase around the CNT. Also, the CNTs are well anchored to the epoxy matrix, by way of the mechanical ligand that is ring-closed around the CNT and covalently bound to the epoxy polymer.

If desired, other amines than ethylenediamine can be reacted with the terminal COOMe moiety, displayed by the CNT/ML complex, e.g. spermidine; 2,2'-dimethyl-4,4'methylenebis (cyclohexylamine); 3-aminomethyl-3,5,5-trimethylcyclohexylamine; or any other amine, diamine, triamine, or tetraamine that is desired.

The hardening process and the degree of crosslinking between the epoxy resin and the amino groups on the functionalized CNTs can be modified by using different ratios of Aradur 5052 and Araldite LY5052, e.g. ratios of 1:2; 1.5:2; 1.75:2; 2:1; 2:1.5; 2:1.75; or any other ratio, as desired. Alternatively, the functionalized CNTs may be added to Araldite LY5052 prior to the addition of Aradur 5052, to allow for a more efficient reaction between the amino group of the functionalized CNT and the epoxy groups of the epoxy resin. Alternatively, 10% of the Aradur 5052 (amine hardener) is added at first, then all of the Araldite LY5052 (epoxy resin) is added, and then finally (eg. after 5 or 15 minutes) the remaining 90% Aradur 5052 is added.

If desired, a pyrene-based, or an NDI-based ML can be used in a similar process instead of the exTTF-based ML described in the process above.

Thus, in a preferred embodiment of the invention a nucleating agent is attached to one or more of the structural entities of the CMU. The attachment of the nucleating agent to the structural entity may be covalent or non-covalent, and may be via a mechanical bond to the structural entity. Nucleating agents suitable for the present invention includes, but are not limited to: aromatic carboxylic acid salts; sodium benzoate; talc; pigment colorants; phosphate ester salts; calcium carbonate; glass; chalk; clay; kaolin; silicates; pigments; cadmium red; cobalt yellow; chromium oxide; titanium dioxide; magnesium oxide; carbonates; sulfates; carbon black; salts of carboxylic acids; benzophenone; polymers; organic liquids; polyamide-66; molybdenum disulfide; iron sulfide; titanium dioxide; sodium phenylphosphinate; potassium stearate; organic pigments; sodium benzoate; kaolin; triphenodithiazine; pimelic acid with calcium stearate; calcium stearate; pimelic acid; quinacridone permanent red dye; N,N-dicyclohexylnaphthalene-2,6-dicarboxamide; 1,2,3,4-bis-dibenzylidene sorbitol (DBS); 1,2,3,4-bis-(p-methoxybenzylidene sorbitol) (DOS); 1,2,3,4-bis-(3,4-dimethylbenzylidene sorbitol) (MBDS); 1,3:2,4-di(3,4-dimethylbenzylidene) sorbitol (DMDBS); metal salts of substituted aromatic heterocyclic phosphate; sodium 2,2'-methylene-bis-(4,6-di-t-butylphenylene)phosphate (NA-11); salts of 2,2'-methylene-bis-(4,6-di-t-butylphenylene) phosphate; lithium 2,2'-methylene-bis-(4,6-di-t-butylphenylene)phosphate; potassium 2,2'-methylene-bis-(4,6-di-t-butylphenylene)phosphate; linear trans quinacridone (LTQ); γ-modification of LTO; calcium carboxylates, calcium salts of suberic acid (Ca-sub), calcium salts of pimelic acid (Ca-pim); N,N'-dicyclohexyl-2,6-naphtalene dicarboxamide (NJS); bicyclo[2.2.1]heptane dicarboxylate salt (HPN-68); Hyperform HPN-20E; ionomers; metal oxides; metal hybrids; organic compounds; residual catalysts; polymers; fibers; hydroxyl group-containing triglyceride oils; organic acid metal salts.

Example 14. Reinforced Concrete

This is an example of a ceramics composite material, reinforced with graphene and CNT. Structural entities used here, in the formation of reinforced concrete, are silicate, naphthalene, CNT and graphene. In situ polymerization of the structural entity is exemplified.

In this example, an alternative solution to the conventional, cumbersome treatment of CNT and graphene prior to adding them to the concrete mixture is provided.

Example 14A

Formation of CMUs consisting of either SWNT and MWNT, a mechanical ligand, a covalent Ligand2, and a structural entity SE2 in the form of silicate.

A mixture of SWNT and MWNT, acquired from a collection of production facilities, are added to five different flasks comprising toluene, in an amount corresponding to 1 w/w % of the final composite material. The precursor-ML, compound (103-A), is now added to the five flasks in different amounts, corresponding to approximately 0,1%, 1%, 10%, 30%, and 50%, respectively, of the mass of the carbon nanotubes in the flask. The flasks are sonicated for 24 hrs.

Ring-closing of the precursor-ML, compound (103-A), is now effectuated using Grubbs catalyst, as described in Example 3. After ring-closing the carboxylic acid methyl ester is converted to a carboxylic acid. We thus now have a set of solutions comprising CNTs mechanically bound to the cyclized derivative of compound (103-A) where the ester has been converted to a carboxylic acid, i.e. five solutions of SWNT and MWNT functionalized with COOH.

The five solutions are then filtered through a 0.2 μm PTFE membrane and washed successively with ethanol and chloroform. The CNT-ML complexes are dried overnight in vacuo at 80° C. The dry solids are called "functionalized SWNT/MWNT".

Each of the functionalized SWNT/MWNT obtained above are now added to a mixture of cement, sand, water and various admixtures as desired, such as superplasticizers (e.g. Mapai, Dynamon SP1), retarders and accelerators, and pozzolans such as fly ash, slag cement, silica fume, and metakaolin. The carboxylic acid of the CNT/ML complex will react with the silicate to form a covalent ester bond, thus forming a CMU consisting of a CNT (SWNT or MWNT), a mechanical ligand, a covalent bond (the ester) and the calcium silicate hydrate. In other words, a CNT-reinforced concrete has been generated. See FIG. 44.

Example 14, B

In this example, a graphene-reinforced concrete is formed.

First, the graphene-binding ligand 10-((3,5-dinitrobenzoyl)oxy)decanoic acid, Compound (221), which carries a carboxylic acid, is synthesized:

Commercially available 3,5-dinitro-benzoic acid can be reacted with a suitable w-hydro-carboxylic acid methyl ester, such as w-hydro-decanoic acid in the present example, by using catalytic amounts of acid such as p-toluenesulfonic acid using a Dean-Stark setup. Removal of water pushes the equilibrium towards the ester of 3,5-dinitrobenzoic acid and the w-hydro-carboxylic acid methyl ester. By setting the methyl ester free as an acid using for example LiCl, the target molecule (221) is generated. See FIG. 45.

In an appropriate solvent, such as chloroform, acetonitrile, or NMP, prepare 5 mixtures of graphene and Compound (221), at a molar ratio of graphene:(221) of 1:10, 1:100, 1:1,000, 1:10,000, and 1:100,000, respectively, and using a concentration of (221) of between 0.01 and 10 mM. The mixtures are sonicated at high power for an appropriate period of time, e.g. for one day at room temperature, to allow the dispersion of the graphene. Then the solvent is removed by either simple evaporation, or e.g filtration to remove unbound ligands and solvent, followed by evaporation of residual solvent. The resulting powder of graphene/(221) complex is then used in the following composite generation process. The five dry solids are called "Functionalized graphene".

The Functionalized graphene is now added to a mixture of cement, sand, water and various admixtures as desired, such as superplasticizers (e.g. Mapai, Dynamon SP1), retarders and accelerators, and pozzolans such as fly ash, slag cement, silica fume, and metakaolin. The carboxylic acid of compound (221) will react with the silicate to form a covalent ester bond, thereby linking the graphene with calcium silicate hydrate. In other words, a graphene-reinforced concrete has been generated. See FIG. 45.

Example 14, C

To a mixture of cement, sand, water and various admixtures as desired, such as superplasticizers (e.g. Mapai, Dynamon SP1), retarders and accelerators, and pozzolans such as fly ash, slag cement, silica fume, and metakaolin, add functionalized graphene (from above, this Example), functionalized SWNT/MWNT (from above, this Example). This will form a graphene/CNT-reinforced concrete.

Example 14, D

In this example, a CNT-reinforced concrete is formed. The SE2 is a naphthalene polymer, and Ligand2 is a covalent bond. The naphthalene polymer is formed prior to ring closure of the mechanical ligand.

First, the Compound (222), is synthesized:

2,6-dimethyl-naphthalene is used as the starting material and is reacted with a suitable co-hydromethyl-carboxylic acid chloride in a Friedel-Crafts acylation reaction. See FIG. 46. The resulting product is then reduced under Clemmensen or Wolff-Kishner conditions to remove the ketone group. Hydrolysis of the ester to the alcohol followed by conversion to the bromide with $POBr_3$ leads to a primary bromide that can be converted to a phosphonate ester with the Michaelis-Arbuzov reaction using triethyl-phosphite. The resulting naphthalene molecule is then reacted with compound (101-A) in a Horner-Wadsworth-Emmons reaction. Bromination with N-bromo-succinimide under radical conditions followed by another Michaelis-Arbuzov reaction results in a di-phosphonate ester. This molecule is polymerized with for example 2,6-formyl-naphthalene in a Horner-Wadsworth-Emmons reaction to give the desired polymer, Compound (222). This Compound comprises two pyrenes, capable of binding to CNT, and an amine and a carboxylic acid, capable of reacting to close the ring around e.g. a CNT, and a naphthalene polymer, capable of wrapping around cement particles thereby immobilizing the compound on the cement particle.

In order to form a mechanical bond between compound (222) and CNT, 10 mM Compound (222) is now incubated with CNT in an appropriate solvent, such as chloroform, acetonitrile, or NMP, in 7 different flasks, at a molar CNT:(222) ratio of 1:10, 1:100, 1:1,000, 1:10,000, 1:100,000, 1:1,000,000, and 1:10,000,000, respectively.

The mixtures are sonicated at high power for an appropriate period of time, e.g. for one day at room temperature, to allow the dispersion of the CNT. Ring-closing of compound (222) is now effectuated as described in Example 3 for the compound (101-A). After ring-closing we thus have a set of solutions comprising CNTs mechanically bound to the cyclized derivative of compound (222). The solvent is now evaporated; the solid product that results is called "CNT/(222) complexes".

Then the CNT/(222) complexes are resuspended in water.

The suspension obtained above is added to a mixture of cement, sand, water and various admixtures such as superplasticizers (e.g. Mapai, Dynamon SP1), retarders and accelerators, and pozzolans such as fly ash, slag cement, silica fume, and metakaolin. The CNTs are added to final concentration in the concrete of 0,1 w/w %. Thus, a CNT-reinforced concrete has been formed.

Example 14, E

Here, a CMU comprising two or more CNTs are generated. A polylysine functions as the linker unit.

10 mM Compound (101-A) is incubated with CNT in an appropriate solvent, such as chloroform, acetonitrile, or NMP, in 7 different flasks, at a molar CNT:(101-A) ratio of 1:10, 1:100, 1:1,000, 1:10,000, 1:100,000, 1:1,000,000, and 1:10,000,000, respectively.

The mixtures are sonicated at high power for an appropriate period of time, e.g. for one day at room temperature, to allow the dispersion of the CNT. Ring-closing of compound (101-A) around CNT is now effectuated, as described for this compound in Example 3. After ring-closing and evaporation of the solvent, we thus have a set of solids comprising CNTs mechanically bound to the cyclized derivative of compound (101-A), i.e. we have a set of solutions with CHO-functionalized CNTs. These are called "CNT/cyc101-A) complexes, carrying CHO".

The complexes are then resuspended in aqueous buffer with pH 9, and added to to a mixture of cement, sand, water and various admixtures such as superplasticizers (e.g. Mapai, Dynamon SP1), retarders and accelerators, and pozzolans such as fly ash, slag cement, silica fume, and metakaolin. The CNT/cyc101-A complexes, carrying CHO are added to final concentration in the concrete of 0,1 w/w %.

Polysine is now added, at a concentration so that the amino groups on the polylysine is in about 10 fold molar excess to the aldehydes of the CNT/cyc101-A) complexes, carrying CHO. The amines of the polylysines will react with the aldehydes, thereby covalently linking the polylysine to one or more (101-A)-moieties, which again are mechanically bound to CNT. Thus, a network of interconnected CNTs have now been formed within the matrix of the concrete.

Thus, a CNT-reinforced concrete has been formed.

Example 15. Reinforced Metal, Ceramics and Plastic

In this example, formation of the SE-ligand structure is used to drive efficient dispersion of the structural entity in the resulting composite. Matrices employed include metals, ceramics, plastics, and composites. The SEs examplified in this example include carbon nanotubes (single or multi-walled), but is applicable and beneficial to any fullerene or any nanotube or any other structural entity that is difficult to disperse and/or distribute evenly during the process of composite generation or processing. Also, non-covalent Ligand2s are enabled in this example.

Further, in the resulting composite, the mechanical ligands bind to structural entities, thereby making the surface of the structural entity (or more exactly, the surface of SE-ML complexes) more irregular than the corresponding SE without mechanical ligands bound. As a result, the SE will be anchored more efficiently in the matrix, even under conditions where Ligand2 is not attached to another structural entity.

First, a collection of SE/ML complexes are generated in solid form, by a two-step process.

Step 1: Each of the SE/ML complexes comprising either nanotubes or graphene or nanorods, and whose preparation is described in Examples 1-39, as described above and below, are collected. This collection thus includes the following SE/ML complexes, whose preparation was described in Examples 1-39:

"CNT/Compound D Complexes"
"CNT/(cyc101-A) complexes"
"CNT/(cyc102-A) complexes"
"CNT/(cyc103-A) complexes)"
"CNT/(cyc104-A) complexes" and "CNT/(cyc104-B) complexes"
"CNT/(cyc105-A) complexes"
"CNT/(cyc106-A complexes"
"CNT/(cyc107-A complexes"
"CNT/(cyc111-A) complexes"
"1% CNT/ML solution"
"CNT-RC5 solution"
"functionalized SWNT"
"SWNT/(cycB—COOH) complexes"
"SWNT/negative control complexes"
"SWNT/(107-A) complexes"
"CNT/(cyc105-A-COCl) complexes"
"CNT/(cycNegativeControl-COCl) complexes"
"CNT/(cyc105-A-COCl) complexes"
"CNT/(cycNegativeControl-COCl) complexes"
"CNT/(cyc105-A-COCl) complexes"
"CNT/(cycNegativeControl-COCl) complexes"
"Nucleating agent-functionalized CNT"
"Nucleating agent-functionalized CNT, carrying acid chloride"
"Nucleating agent-functionalized CNT, carrying octene".
"Nucleating agent-functionalized CNT, carrying amine"
"functionalized SWNT/MWNT"
"CNT/(222) complexes"
"CNT/cyc101-A) complexes, carrying CHO"
"SE/ML collection"
"Functionalized BNNT, carrying COOH"
"Functionalized CNT, carrying COOH"
"Functionalized CNT and BNNT, carrying COCl"
"Functionalized CNT and BNNT, carrying COCl"
"Functionalized BNNT"
"Functionalized CdS nanorods"
"Functionalized, light-cleavable CNT/ML complexes"
"Short linker, $NH_2$-modified CNT veils"
"Long linker, $NH_2$-modified CNT veils"
"COOH-modified CNT veils"
"$NH_2$-functionalized CNT"
"COCl-functionalized CNT"
"CNT/(cyc271) complexes"
"CNT/(cyc108) complexes"
"CSA-treated CNT/ML complexes"
"CNT/(cyc109) complexes"
"CNT/(cycl10) complexes"

Step 2: The SE/ML complexes prepared separately as described above, are now mixed, to form "SE/ML collection".

As described above, the dispersion and anchoring of the structural entities in the composite material is improved by the mechanical ligands (anchoring is improved because the bound ligands make the surface of the SE/ML more irregular than the corresponding SE without mechanical ligands bound, and/or Ligand2 attaches the structural entity SE1 to the structural entity SE2. However, most of the mechanical ligands of the SE/ML complexes listed above carry one or more reactive groups such as COOH, $NH_2$, CHO, a double bond, or other reactive groups. These reactive groups covalently attached to the MLs may react with reactive groups of the constituents of the ceramic materials, e.g. during the heat treatment step of product processing. For example, i) silicate, carbonate and borate (common constituents of ceramics) may react with an amino group carried by the ML during the production of the ceramic material, and thereby forming a covalent bond between the ML and other constituents of the ceramic material; ii) oxides, carbides, nitrides, silicides, borides, phosphides, tellurides, selenides, quartz, feldspar, clay (e.g. kaolin, ball clay), silica, sand, flint, aluminosilicates, carbonates, borates, and zircon may react with other constituents of the ceramic material. Thus, in addition to the anchoring benefits of the ML, obtained by making the surface of the SE1/ML more irregular than that of SE1 alone, Ligand2 may also be a covalent bond, resulting in even better anchoring of the first structural entity in the composite material.

Process 1A: Preparation of a Metal Matrix Composite.

Tin (or aluminium, magnesium, titanium, cobalt, cobalt-nickel alloy, or any other desired metal or metal alloy), is mixed with the "SE/ML collection obtained in Step 2 above, to a concentration in the final composite material of 0.03% of each of the SE/ML complexes, under conditions that ensure efficient dispersion of the SE/ML complexes into the metal matrix, to ensure regular distribution of the SE/ML complexes in the metal matrix composite. The tin (or any other metal or metal alloy) is here added by thermal spraying (plasma spraying and cold spraying), but can also be added e.g. by classical approaches like, mechanical alloying and hot pressing, sintering e.g. spark plasma sintering, simple melting and solidification (casting, metal infiltration, melt spinning, laser deposition), electrochemical deposition (electro deposition, electroless deposition), or by more recent techniques such as molecular level mixing, sputtering techniques, sandwich processing, torsion/friction welding, vapor deposition, mixing as paste, and nano-scale dispersion. Downstream processing including e.g. heating or other processing is now performed, if desired.

The final result is a metal composite, where some structural entities are bound by a mechanical ligand, enabling their efficient anchoring in the composite material, as described above Process 1B: Alternative Route for Producing a Metal Matrix Composite.

To the SE/ML collection obtained in Step 2, is added a soluble salt of the desired metal or metals. In this example, copper is used, but any other metal or metal alloy can be used. The soluble salt $Cu(CH_3COO)_2$ is thoroughly mixed with the SE/ML collection from above, and water is added while stirring. Then the solvent is evaporated, and after drying and calcination (e.g. at 300° C. in air) and reduction (e.g. reduction with hydrogen at 250° C. for 3 hours under pressure), an SE-ligand-metal composite powder is obtained. This metal composite powder can then be further processed by standard procedures.

The final result is a metal composite, where the structural entity is bound by a mechanical ligand, enabling efficient anchoring of the structural entity in the composite material.

Process 2: Preparation of Reinforced Ceramics.

The desired ceramics material, e.g. a technical ceramics or structural material, or any ceramics material like cement/concrete as well as technical ceramics, may be formed in situ by addition to the SE/ML collection above of relevant precursors such as aluminum, beryllium, cerium or zirconium, which upon oxidation gives the oxides aluminas, beryllias, cerias, zirconias. Alternatively, the desired ceramics material may be prepared by addition of precursors for structural materials such as oxides or nonoxides (e.g. carbides, borides, nitrides and silicides), to the SE/ML complexes obtained above. Alternatively, pre-made ceramics is added to the SE/ML collection by an appropriate process such as thermal spraying or sintering. It is important to ensure efficient mixing of SE/ML collection powder and the ceramics material under this process, to ensure regular distribution of the SE/ML complexes in the ceramics composite.

The ceramics composite material is produced as follows:

Step A: Mixing of raw material and beneficiation.

Grinded particles of silica, silicate, sand and aluminosilicates are thoroughly mixed. Other types of raw materials such as quartz, flint, or powders prepared by chemical synthesis, may be added as well.

Step B: Beneficiation.

In order to obtain a more homogenous sample of small particles, the mixture of step A is thoroughly crushed by fine grinding, and optionally the sample is taken through a process of purification, calcining (to liberate undesirable gases), liquid dispersion and/or granulation. The final product of this step is a mixture of particles with sizes in the micrometer range.

Step C: Mixing with reinforcement structures.

To the finely grinded sample from step B is now added the SE/ML collection from above, corresponding to a concentration in the final composite of 0.2% of each of the SE/ML complexes of the SE/ML collection, and thorough mixing of the resulting powder is performed. Alcohol (or alternatively, water) is now added to produce a slurry. Deflocculants, surfactants, and antifoaming agents are added as desired. The binders hydraulic lime and cement are added. Other binders (e.g. gypsum, air-cement, magnesia, hydrated lime, roman cement, Portland cement, silicon fluoride cement, and quartz cement, bitumen), as well as plasticizers may also be added at this step.

Step D: Forming.

The slurry from step C is now consolidated and molded, to produce a product of the intended shape and size. Consolidation and molding is accomplished by slip casting, in which a porous mold is used. Capillary suction draws the liquid from the mold, thereby consolidating the cast ceramic. Alternatively, slurry forming can be accomplished by gel casting or tape casting.

Step E: Drying.

The ceramic shape is now dried by convection. Optionally, microwave or infrared radiation is used in order to enhance drying.

Step F: Presinter Thermal Processing.

Optionally, the ceramic shape is heat-treated at a temperature well below firing temperatures (see next step), in order to completely dry the ceramic shape and in order to decompose e.g. organic additives or impurities.

Step G: Glazing.

Optionally, a glaze coating is applied. The glaze may contain e.g. quartz, feldspars, carbonates, borates, and zircon. The glaze can be applied by spraying or dipping.

Step H: Firing.

Finally, the ceramic shape is thermally consolidated by applying high temperature, optionally at high pressure. Here, a temperature of 60% of the melting point of the material at ambient pressure is used. The firing is done for 1 hour; the firing time may be increased or decreased as desired.

Step I: Final Processing.

Optionally, the ceramic is further processed by abrasive grinding, chemical polishing, laser machining, glazing or any another process that improves strength or other characteristics such as resistance to abrasion or corrosion.

The final result is a ceramics composite material where structural entities are bound by mechanical ligands, thereby enabling anchoring of the structural entity in the composite material.

Process 3: Preparation of Plastic-Fullerene Composite Material.

Polyacrylate (or another polymer or polymer composite, e.g. polyethylene, polyamide, polyurethane, polystyrene), is formed in situ, by addition of relevant precursors. Here, the relevant precursors for polyacrylate formation are methacrylate, methyl acrylate, ethyl acrylate, 2-ethylhexyl-acrylate, hydroxyethyl methacrylate, butyl acrylate, butyl methacrylate, or 2,2-Bis[(acryloyloxy)methyl]butyl acrylate. Thus, one or more of these are added to the SE/ML collection obtained above, under conditions allowing formation of polyacrylate in the presence of the SE/ML complexes. Alternatively, pre-made polymers or premade composites are added to the SE/ML collection, e.g. in melted form or dissolved in an appropriate solvent (e.g. polyacrylate, polystyrene, or carbonfiber-reinforced polyethylene dissolved in 2-propanol, acetone, tetrahydrofurane, ethyl acetate, N,N-dimethylformamide, methanol, ethanol, trimethylamine or dichloromethane), and allowed to cool down or the solvent allowed to evaporate, to form the final composite. It is important to ensure efficient mixing of the SE/ML complexes of the SE/ML collection and the polymer or composite material under this process, to ensure regular distribution of the SE/ML complexes in the plastic composite.

The final result is a plastic composite, where a reinforcing structural entity is bound by a mechanical ligand, enabling its anchoring in the composite material.

Example 16. A Scaffolded Network of Cross-Linked Nanotubes, in Reinforced Metal-, Ceramics-, and Polymer Composites In this example, a network structure of two different additives, CNT and BNNT (boron nitride nanotube) is first generated, and used as is (i.e. as a composite material consisting of the structural entities CNT and BNT, with no other "matrix", or alternatively, is filled up with a matrix of polymer, polymer composite, metal or ceramics. Thus, this example describes the making of four types of composite material: i) a composite material consisting of cross-linked BNNT and CNT, ii) a reinforced polymer composite, iii) a reinforced metal composite, and iv) a reinforced ceramics composite, respectively.

Additives employed in this example include carbon nanotubes (single or multiwalled) and boron nitride nanotubes (BNNT), but is applicable to any additive that can be bound by a mechanical ligand. Also, any number of different additive may be used, and any number of different linker units may be used.

Step 1. Formation of BNNT/ML Complexes, Carrying COCl, and Formation of CNT/ML Complexes, Carrying COCl.

The peptide

CESSHWSAWWIRSNQSSSC is a BNNT-binding ligand. It is synthesized by standard peptide synthetic methods. 10 mM of the peptide

CESSHWSAWWIRSNQSSSC is mixed with 10 mg/L BNNT in methanol with 20% DMSO, and incubated at room temperature for 10 hours, with 5 minute pulses of sonication every hour. As a result, the peptide will bind to BNNT and form a covalent ring around the BNNT, leading to formation of a disulfide bond between the two cysteines. Thus, through the binding of the peptide mechanical ligand, the BNNTs have now become functionalized with carboxylic acids.

The BNNT/peptide complexes are now filtrated in a 0.2 μm PTFE membrane filter paper and washed thoroughly with methanol, and then dried. The resulting powder is called "Functionalized BNNT, carrying COOH".

Compound (103-A) and CNT is dispersed in $CCl_4$, Grubb's 2nd generation catalyst is added in catalytic amount, and a cyclized structure around the CNT is obtained, as described in Example 3 for this compound. Then the methyl ester is converted to carboxylic acid. Thus, through the binding of the mechanical ligand, the CNTs have now become functionalized with carboxylic acids.

The CNT/(103-A) complexes are now filtrated in a 0.2 μm PTFE membrane filter paper and washed thoroughly with chloroform, and then dried. The resulting powder is called "Functionalized CNT, carrying COOH".

Functionalized CNT, carrying COOH and Functionalized BNNT, carrying COOH are now dissolved in water, to a final concentration of each of 10 mg/L, and the carboxylic acids displayed by the nanotubes are then converted to carboxylic acid chlorides by addition of $SOCl_2$ and incubation at room temperature for 15 min. Thus, the CNTs and BNNTs now display carboxylic acid chlorides. The product is called "Functionalized CNT and BNNT, carrying COCl".

The suspension is split into three flasks.

Poly-L-lysine (MW=70.000-150.000; Sigma-Aldrich cat. No. P4707) is now added to the three flasks, to a concentration of 0.1 mM, 1 mM, and 10 mM, respectively, and the suspension of each flask is immediately poured into a mold. The carboxylic acid chlorides will react with lysines of the poly-L-lysine. As a result, an extensive network of interconnected CNTs and BNNTs will form.

The water is now evaporated off, leaving the network of interconnected CNTs and BNNTs in the mold. The CNT-BNNT network is washed several times with chloroform while in the mold, and then dried.

The dry scaffold material, in the shape of the mold, can now be released from the mold and used as-is, or alternatively, composite materials with matrices of metal, ceramics or plastic polymers can now be generated, as described below.

Step 2.

Preparation of CNT/BNNT Metal Matrix Composite Material.

The desired metal (e.g. tin, or any other metal or metal alloy), is added to the dry scaffold material obtained in Step 1, while still in the mold, using plasma spraying or cold spraying, or any other technique that ensure efficient deposition of the metal in the network structure, e.g. by classical approaches like mechanical alloying or hot pressing, sintering e.g. spark plasma sintering, simple melting or solidification (casting, metal infiltration, melt spinning, laser deposition), electrochemical deposition (electro deposition, electroless deposition), or by more recent techniques such as molecular level mixing, sputtering techniques, sandwich processing, torsion/friction welding, vapor deposition, mixing as paste, or nano-scale dispersion. Finally, the CNT/BNNT-reinforced metal composite of the desired shape is released from the mold.

Alternative Route for Producing a Reinforced Metal Composite.

To the dry scaffold material obtained in Step 1, while it is still in the mold, is added a soluble salt of the desired metal or metals. In this example, copper is used, but any other metal or metal alloy can be used. The soluble salt $Cu(CH_3COO)_2$ is dissolved in water and added to the mold with the dry scaffold of interconnected CNTs and BNNTs. Then the solvent is evaporated, and after drying and calcination (e.g. at 300° C. in air) and reduction (e.g. reduction with hydrogen at 250° C. for 3 hours under pressure), a CNT/BNNT-reinforced metal composite material is obtained.

Preparation of a CNT/BNNT-Reinforced Ceramics Composite Material.

The desired ceramics material, e.g. a technical ceramics or structural material (e.g. alumina, ceria, zirconia, carbide, boride, silicide, silicon carbide, or any other ceramic material including structural materials like cement/concrete as well as technical ceramics), is formed in situ, by addition of relevant precursors to the dry scaffold material obtained in Step 1 above, such as by adding aluminum, beryllium, cerium or zirconium, which upon oxidation gives the oxides aluminas, beryllias, cerias, zirconias, or oxides materials mentioned above or nonoxides such as carbides, borides, nitrides and silicides in an appropriate solvent, and allowing the reagents to react and form the ceramics matrix. Alternatively, the ceramics matrix is deposited by an appropriate process such as thermal spraying or sintering, or by electrochemical deposition (electro deposition, electroless deposition), but the ceramics can also be deposited by more recent techniques such as molecular level mixing, sputtering techniques, sandwich processing, torsion/friction welding, vapor deposition, mixing as paste, and nano-scale dispersion. Formation of the ceramics matrix within the scaffold structure can include one or more or all of the ceramics processing steps A-I, described in Example 15.

The final result is a CNT/BNNT ceramics composite.

The scaffold structure of interconnected CNTs and BNNTs will effectuate a strong anchoring of the ceramic to the CNTs and BNNTs. In addition, certain common constituents in ceramics, e.g. silicate, aluminiumsilicate, and carbonate, may react with the amines of the polylysine (of the scaffold structure), and hence, lead to covalent linking of the ceramics matrix to the MLs bound to CNT or BNNT.

Process 3: Preparation of Plastic-Fullerene Composite Material.

The desired polymer, e.g. polyethylene, polyamide, polyurethane, polystyrene, polyacrylate, or any other polymer, is formed in situ, by addition of relevant precursors, such as (for polyurethane) toluene diisocyanate and ethylene glycol, to the dry scaffold material obtained in Step 1 above. Alternatively, the matrix is added to the dry scaffold as pre-made polymers or premade composites, e.g. in melted form or dissolved in an appropriate solvent (e.g. carbonfiber-reinforced polyethylene dissolved in tetrachlorethylene or dichlorobenzene). The final result is a plastic composite comprising the structural entities BNNT and CNT.

Example 17. Synthesis and Processing of Nanotube/Nanorod/Polyethylene (PE) Composites with Attractive Characteristics This example involves production and processing of nanotube/nanorod/PE composites, where SE1 is a boron nitride nanotube or a CdS nanorod, and SE2 is a PE polymer. In situ polymerization as well as downstream processing of the composite is exemplified.

Boron nitride nanotubes (BNNT) have unique physio-chemical properties such as high hydrophobicity, heat and electrical insulation, and resistance to oxidation. BNNTs are therefore attractive additives in composite materials. CdS nanorods also have attracted attention regarding the potential for forming highly ordered molecular assemblies. It therefore would be interesting to produce composite materials using either of those alone or in combination.

The synthesis of compounds (251) and (252), capable of binding to and ring-formation around the boron nitride nanotube and the CdS nanorod, respectively, is depicted in FIG. 47.

Synthesis of Compound (251):

The peptide

CESSHWSAWWIRSNQSSSC is synthesized by standard peptide synthetic methods. The peptide is shown in FIG. 47, where also the thiols of the two cysteines, as well as the carboxylic acid moiety of the glutamic acid, is indicated. Conversion of the glutamic acid side chain into a carboxylic acid chloride is effectuated by addition of $SOCl_2$, and then ester formation is effectuated by addition of (Z)-cyclooct-4-en-1-ylmethanol, to produce the compound (251).

Synthesis of Compound (252).

Polylysine (1 eq.) with a molecular weight higher than 30.000 Dal (e.g. Poly-L-lysine with molecular weight 70.000-150.000 Dal, Sigma-Aldrich cat. No. P4707) is mixed with octanoic acid chloride (100 eq.) and 2-(cyclooct-4-en-1-yloxy)acetic acid chloride (10 eq.), under appropriate conditions for reaction between some of the amines of polylysine and the acid chlorides (e.g. aqueous buffer pH 7). This leads to a mixture of compounds (252), each of which comprises several alkane moieties and octene moieties, but may carry these at different positions in the molecule (see FIG. 48).

The alkane moieties have affinity for the CdS nanorod; the octene moiety serves as a Ligand2 for covalent linkage to the PE polymer (see below).

Overview of the Preparation of Nanotube/Nanorod-PE Composites.

First complexes of boron nitride nanotube/ML or CdS nanorod/ML are prepared. Then, these are mixed with monomers for polyethylene (PE) production. Then the polymerization process is undertaken under which the MLs bound to either boron nitride nanotubes or CdS nanorods become covalently attached to the PE polymer, by reaction of the octene moiety of the ML with the growing PE polymer. Then the double bonds of the polymer are reduced (e.g by hydrogenation). Finally, downstream processing of the material is performed.

Formation of Octene-Functionalized Boron Nitride Nanotubes and Octene-Functionalized CdS Nanorods.

The central portion of the peptide comprised within compound (251) comprises the sequence HWSAWWIRSNQS, which can bind to boron nitride nanotubes. Incubation of compound (251) with boron nitride nanotubes therefore leads to binding of the compound to the nanotube. Some of the compounds will bind in a way so that the cysteines at either end of (251) will be juxtaposed. The two thiols may then react to form a disulfide bridge, resulting in a covalently closed molecule wrapped around the boron nitride nanotube (see FIG. 47). The oxidation of the thiols to form the disulfide bond is stimulated by sonication.

Once ring-closure has been effectuated, the boron nitride nanotube/ML complexes are purified, by filtrating and washing the complexes by filtration in a 0.2 μm PTFE membrane filter paper and washing thoroughly with anhydrous tetrahydrofuran (THF). Finally, the solid is vacuum-dried at room temperature for 4 hrs. The final, dried product consisting of BNNTs, mechanically bound by a ligand is called "Functionalized BNNT".

The ML, bound to BNNT, carries an octene moiety which can react with the growing polymer to form a covalent bond to the PE polymer (see below).

Formation of CdS Nanorod/ML Complexes.

If (252) is incubated with CdS nanorods, the alkane moieties of the compound bind to the nanorod. If the carboxylic acid of (252) is now converted to acid chloride, the acid chloride may react with one of the amines of the same molecule. If the molecule has wrapped around the CdS nanorod the acylation may lead to ring-closure around the CdS nanorod, i.e. the molecule has formed a mechanical bond to the nanorod (see FIG. 48).

Once ring-closure has been effectuated, the CdS nanorod/ML complexes are purified, by filtrating and washing on a 0.2 μm PTFE membrane filter paper and washing thoroughly with anhydrous tetrahydrofuran (THF). Finally, the solid is vacuum-dried at room temperature for 4 hrs. The final, dried product consisting of CdS nanorods, mechanically bound by a ligand is called "Functionalized CdS nanorods".

The ML, bound to the nanorod, carries several octene moieties which can react with the growing polymer to form covalent bonds to the PE polymer (see below).

Production of PE composites comprising BNNT and/or CdS nanorods:

Polymerization is performed using Grubbs' $2^{nd}$ Generation catalyst, at a temperature between 20 and 140° C. (e.g. 40° C.) under oxygen-free conditions, i.e. solvents have undergone freeze-pump-thaw cycles and the reaction is run under an argon atmosphere. The Functionalized BBNTs and/or Functionalized CdS nanorods from above are dispersed in an appropriate solvent, such as toluene, xylene, tetrahydrofurane, dichloromethane or other inert halogenated solvents (dispersion optionally mediated by sonication), to make three solutions: i) Functionalized BBNT alone, ii) Functionalized CdS nanorods alone, or iii) Functionalized BNNTs and Functionalized CdS nanorods together. The concentration of the BNNT or CdS nanorods are adjusted so that the final concentration of each additive in the final composite is 0.3 w %.

Octene at an appropriate concentration, e.g. 50 mM is added to each of the three solutions above, together with Grubbs' $2^{nd}$ Generation catalyst. Polymerization is allowed to proceed until insignificant new polymer is generated and is then terminated by quenching the reaction mixture with methanol precipitating the polymer material, which is then isolated by filtration and dried.

Finally, the double bonds are reduced by e.g. hydrogenation. This may be done by dispersing the isolated unsaturated polymer composite in a suitable solvent such as xylene, tetrahydrofurane, toluene or halogenated solvents. Then, hydrogenation can be done with hydrogen gas in a pressurized reactor and employing a suitable catalyst such as Pd/C. Alternatively, hydrogenation can be carried out using tosyl hydrazine and trimethylamine.

Processing of the Nanotube and/or Nanorod/PE Composites:

The composites produced above in this example may have been formed in a cast mold, and if desired the solvent can simply be evaporated off the composite. Alternatively, further means of processing may include any of the following:

i) Dissolve in solvent. The formed composite may be dissolved in appropriate solvent and recast in a mold. The solvent is allowed to evaporate at room temperature and under ambient pressure thus leaving the composite material having taken the desired shape in the form.
ii) Melt by heating. Melt by heating in for example an extrusion, co-extrusion, fiber-spinning, molding, ram-molding, injection molding or sintering process.
iii) Melt by heating and physical impact such as for example ram-molding.

Variations to the described protocol for formation of PE composites:

- Alternative catalysts that may be used to produce PE polymers include Grubbs' first Ruthenium, dichloro (phenylmethylene)bis(tricyclohexylphosphine)), second Ruthenium, [1,3-bis-(2,4,6-trimethylphenyl)-2-imidazolidinylidene]dichloro (phenylmethylene) (tricyclohexylphosphine)) or third generation catalyst or the Hoveyda-Grubbs catalyst (Ruthenium, [1,3-bis (2,4,6-trimethylphenyl)-2-imidazolidinylidene]dichloro[ [2-(1-methylethoxy)phenyl]methylene], [1,3-Bis(2-methylphenyl)-2-imidazolidinylidene]dichloro (2-isopropoxyphenylmethylene)ruthenium(II), 1,3-Bis (2,4,6-trimethylphenyl)-2-imidazolidinylidene] dichloro[3-(2-pyridinyl-κN)propylidene-KC] ruthenium(II), [1,3-Bis(2-methylphenyl)-2-imidazolidinylidene]dichloro(benzylidene) (tricyclohexylphosphine)ruthenium(II), Dichloro(3-methyl-2-butenylidene)bis(tricyclohexylphosphine)ruthenium(II), [1,3-Bis(2,4,6-trimethylphenyl)-2-imidazolidinylidene]dichloro(3-methyl-2-butenylidene) (tricyclohexylphosphine)ruthenium(II), [1,3-Bis(2,4,6-trimethylphenyl)-2-imidazolidinylidene]dichloro(benzylidene)bis(3-bromopyridine)ruthenium(II)).
- Alternative PE precursors may be used in any of the polymerization reactions described in this example, e.g. cyclooctadiene, cyclooctatriene and cyclooctatetraene.
- The production of polyethylene may lead to low density, medium density or high density polyethylene, depending on the polymerization conditions. Furthermore, by including additional precursors for the polymerization reaction such as octyl-cyclooctene or other alkyl substituted cyclooctenes as the precursors, branching of the PE may be obtained similar to branching in polyethylenes obtained from Ziegler-Natta type polymerizations.
- The precursor-ML used to functionalize BNNT may, in addition or alternatively to the HWSAWWIRSNQS peptide sequence, comprise other BNNT-binding motifs such as pyrene, aspartate, arginine, R-mannose, and/or glycol chitosan. The total maximum circumference of the mechanical ligand may be adjusted to allow for BNNTs with smaller or larger diameters.
- Depending on the diameters of the CdS nanorods used, polylysines of lower or higher molecular weight may be used as scaffolds for the preparation of the appropriate precursor-MLs.
- Alternative or additional nanotubes may be used, including $WS_2$—, SnS2/Tin(II) sulfide-, $TiO_2$—, zirconia dioxide ($ZrO_2$)—, and zinc oxide (ZnO)-nanotubes. Likewise, nanotubes and nanowires such as transition metal/chalcogen/halogenides (TMCH), described by the formula $TM_6C_yH_z$, where TM is transition metal (molybdenum, tungsten, tantalum, niobium), C is chalcogen (sulfur, selenium, tellurium), and H is halogen (iodine), may also be used.
- Additional additives such as graphene may be included.

Example 18: A Light-Cleavable Composite Material

Here the SE1 is a CNT, the mechanical ligand comprises a bond that is cleavable by laser light, and the SE2 is a polymer that is not itself significantly sensitive to the laser light used (eg. nylon).

The mechanical ligand, the compound (cyc261) (see FIG. 49) used in this Example, is a macrocycle comprising two pyrenes (for binding to CNT), connected via a photolabile protection group (PPG). The macrocycle in its non-cyclized form (the precursor ML, compound (261)) comprises double bonds at both ends of the molecule. A C8 carbon linker is covalently attached to the macrocycle; the other end of the C8 linker carries a carboxylic acid chloride (see FIG. 49, where the light-induced cleavage point is indicated).

Synthesis of (261): The mechanical ligand with its C8 linker is produced by standard organic synthesis.

Ring-closure of (261) around CNT: CNT (50 mg/L) and 50 mM (261) is mixed in tetrachloroethane, and sonicated. Grubb's second-generation catalyst is added and ring-closure effectuated, and the product washed and dried, using conditions as described in Example 1.2. The final solid product is called "Functionalized, light-cleavable CNT/ML complexes".

The Functionalized, light-cleavable CNT/ML complexes from immediately above are used in the preparation of a CNT/nylon composite material, employing monomers for nylon formation (diamines and dicarboxylic acid chlorides, e.g. hexamethylene diamine and sebacoyl chloride), e.g. in a two-phase system as described in Example 8. The resulting CNT/nylon composite material comprises mechanical ligands connecting the CNT and the nylon polymers, through Ligand2 (an amide bond at the end of the C8 arm attached to the mechanical ligand, the macrocycle (cyc261).

If the composite material is used to hold together two items that are otherwise being pulled apart, then shining appropriate laser light on the composite material will lead to cleavage of the PPG, thereby opening the macrocycle, which will weaken the composite, possibly resulting in irreversible breakage of the composite.

Alternatives:

- The light sensitive motif can also be comprised within the linker connecting the mechanical ligand and Ligand2.
- If a metallic CNT was used, and if an appropriate amount of CNT was used (e.g. the metallic CNTs in the composite was at the percolation threshold), then when the composite was put under tension, the light could cause an irreversible break in a circuit, as a breakage of the CNT-polymer connection would cause the composite material to expand if under tension, resulting in poorer conductivity.
- Other polymers can be used. This may require that other reactive groups (other than acid chlorides) are used for the attachment of the macrocycle to the polymer.

If a PPG is used that is sensitive to the fluorescence emitted from CNT when irradiated, it could be the CNT's fluorescence, and not the laser light itself, that cleaves the PPG.

Example 19: A Bullet-Resistant Vest, Formed by the Efficient Coupling of CNT Foils, Using a Bidentate CNT Mechanical Ligand Linker Unit This example describes how CNT "foils" (or "veils") (eg. macroscopic sheets of CNT) are being glued together by covalently linking CNTs of separate foils. Here, SE1 and SE2 are both a CNT; the mechanical ligand comprises two exTTF motifs; ligand2 can be considered a mechanical ligand, but may also be considered an amide bond, depending on perspective.

First, two kinds of bidentate mechanical ligands are produced. One type carries COCl reactive groups, the other type carries NH2 reactive groups:

Synthesis of compound (271), comprising four exTTF moieties and four double bonds (capable of forming two closed rings around e.g. CNT), and an amino group: Compound (106-A) is acid hydrolysed to convert the methyl ester into a carboxylic ester, and then further converted into the corresponding carboxylic acid chloride. Then a triamine (e.g. bis(hexamethylene)triamine) is added, leading to acylation, to produce a molecule with two precursor-MLs and an amino group (see FIG. 50A).

Synthesis of compound (272), comprising four exTTF moieties and four double bonds (capable of forming two closed rings around e.g. CNT), and a large number of amino groups: Compound (106-A) is acid hydrolysed to convert the methyl ester into a carboxylic ester, and then further converted into the corresponding carboxylic acid chloride. Then polylysine is added, leading to acylation, to produce a molecule with two precursor-MLs and a large number of amino groups (see FIG. 50A).

Synthesis of compound (273), comprising four exTTF moieties and four double bonds (capable of forming two closed rings around e.g. CNT), and a carboxylic acid: Compound (271) is mixed with a molecule that comprises a carboxylic acid chloride moiety and a protected carboxylic acid (i.e. a carboxylic acid with a protection group, where the removal of the protection group leads to formation of a carboxylic acid). Following reaction of the amine of compound (271) with the acid chloride, and deprotection of the protected carboxylic acid, the target molecule, compound (273) is obtained. See FIG. 50B).

Schematic drawings of the three precursor-MLs, compounds (271), (272) and (273) are shown in FIG. 50C.

Formation of a multi-layer material of CNT veils where the layers of veils are glued together:

Coating of CNT veils with amino groups on short linkers: Individual CNT veils are incubated with compound (271) in tetrachloroethane, and Grubb's second generation catalyst is added. Ring-closure of (271) around CNTs of the CNT veil is then effectuated, as described in Example 1.2, except that no sonication is performed, and no filtration is performed. Solvent is evaporated and the amine-modified veils are dried. The resulting amine-modified veils are called "Short linker, $NH_2$-modified CNT veils". See FIG. 50 D.

Coating of CNT veils with amino groups on long linkers: Individual CNT veils are incubated with compound (272) in tetrachloroethane, and Grubb's second generation catalyst is added. Ring-closure of (272) around CNTs of the CNT veil is then effectuated, as described in Example 1.2, except that no sonication is performed, and no filtration is performed. Solvent is evaporated and the amine-modified veils are dried. The resulting amine-modified veils are called "Long linker, $NH_2$-modified CNT veils". See FIG. 50D.

Coating of CNT veils with carboxylic acid groups: Individual CNT veils are incubated with compound (273) in tetrachloroethane, and Grubb's second generation catalyst is added. Ring-closure of (273) around CNTs of the CNT veil is then effectuated, as described in Example 1.2, except that no sonication is performed, and no filtration is performed. Solvent is evaporated and the carboxylic acid-modified veils are dried. The resulting COOH-modified veils are called "COOH-modified CNT veils". See FIG. 50E.

Linking (gluing) together layers of CNT veils by acylation: The Short linker, $NH_2$-modified CNT veils and the COOH-modified CNT veils are now placed alternately on top of each other in a mold in DMF, i.e. the sequence of veils reading from the bottom up is $NH_2$-modified, COOH-modified, $NH_2$ modified, COOH-modified, etc. $SOCl_2$ is now added, to convert the carboxylic acids into acid chlorides. Then pressure is added on top of the layers of veils, to squeeze the veils together, and the veils are then incubated for 5 hours at room temperature. The acid chlorides and the amines will react, thereby linking together the veils. See FIG. 50F. Optionally, monomers for polymer formation (e.g. diamines and dicarboxylic acids for nylon polymer formation) can be added at the beginning of incubation or after a specified time, e.g. 2 hours after incubation started. This will lead to nylon polymer formation, filling up the mold, as well as bridging neighboring veils, by formation of polymers that react with the amines and/or acid chlorides of the veils, thereby further gluing together neighboring veils.

The same procedure is used with the Long linker, $NH_2$-modified CNT veils: The Long linker, $NH_2$-modified CNT veils and the COOH-modified CNT veils are now placed alternately on top of each other in a mold in DMF, i.e. the sequence of veils reading from the bottom up is $NH_2$-modified veils, COOH-modified veils, $NH_2$ modified veils, COOH-modified veils, etc. Then $SOCl_2$ is added, to convert the carboxylic acids into acid chlorides. Then pressure is added on top of the layers of veils, to squeeze the veils together, and the veils are then incubated for 5 hours at room temperature. The acid chlorides and the amines will react, thereby linking together the veils. See FIG. 50F.

Optionally, monomers for polymer formation (e.g. diamines and dicarboxylic acids for nylon polymer formation) can be added at the beginning of incubation or after a specified time, e.g. 2 hours after incubation started. This will lead to nylon polymer formation, filling up the mold, as well as bridging neighboring veils, by formation of polymers that react with the amines and/or acid chlorides of the veils, thereby further gluing together neighboring veils.

The multilayer CNT veil material produced (in the absence of nylon polymerization), or the multilayer veil produced with nylon polymerization, will produce materials that may be used in e.g. bullet-proof vests. The inter-veil linkage serve to avoid sliding of separate layers of veils, which will increase the impact strength of the multilayer CNT veils material, thereby offering protection against e.g. bullets. The vest may also be used as irradiation shields, or the material may be used in airplanes, to provide strength and/or make use as irradiation shields.

Alternatives:

In the synthesis of compound (271) any triamines can be used, e.g. N1-(2-aminoethyl)ethane-1,2-diamine, as well as tetraamines such as N,N'-bis(3-aminopropyl)) heptane-1,7-diamine, or any polyamine. It will often be preferable to use amines where the resulting compound carries the free amine on a long arm.

Likewise, in the synthesis of compound (271) it will sometimes be preferable to use a starting molecule with the same capability to form a ring around CNT as (B), but with a longer arm carrying the carboxylic acid methyl ester.

To make the glue between separate foils even stronger, one may add dispersed CNT (e.g. CNT that has been dispersed by ultrasonication, and then functionalized by the cyclization of compound (B), (271), (272), and/or (273) to the solution surrounding the stacked veils. This also includes the case where nylon monomers (or other polymer precursors) have been added to the solution surrounding the CNT veils.

Alternatively, one may use amines and epoxy as monomers(to form epoxy polymer) and CNT with mechanically-bound carboxylic acid groups.

As another alternative, one may add amine-terminated polystyrene (Compound 20, FIG. 12) purchased from Sigma-Aldrich (molecular weight average 11.000 Dal) to the COOH-modified CNT veils, together with $SOCl_2$, to decorate the veils with polystyrene polymers. Then to a mold comprising appropriate solvent, e.g. DMF, first add polystyrene (molecular weight average 350.000 Dal) to 20 w %, then place a number of polystyrene-decorated veils on top of each other, and apply pressure on top of the stack of veils. Then evaporate the solvent. The result is a strong CNT-polystyrene material, where the polystyrene serves as a matrix that glues together the veils. If desired, dispersed, individual CNTs, decorated with amine terminated polystyrene in the same way as the veils were decorated above, can be added to the solution, thereby increasing the strength of the glue that holds the veils together.

By appropriate design of the mechanical ligands, any type of individual, dispersed as nanotubes, nanorod, nanothreads, or any other molecule with a high aspect ratio, and any other veil of nanotubes, nanothreads or nanorods, may be used in the above set up.

Example 20. A Macroscopic Nanosensor

In this example, a macroscopic, 3-dimensional network of CNTs, held together by mechanical ligands covalently linked to other mechanical ligands, span the interior of a container. The amount of CNT is close to the percolation threshold, and the conductivity of the network is sensitive to the binding of other molecules to the CNTs. A voltage is applied between the electrodes at either end of the container. Through mechanical ligands, the CNTs are attached to antibodies. These antibodies bind specifically to the analyte whose concentration will be determined using this apparatus.

In this example, SE1 and SE2 are both CNTs; and ligand2 is a mechanical ligand. To the CNTs are further attached antibodies, by way of mechanical ligands that are covalently linked to antibodies.

Preparation of NH2-functionalized CNTs: SWNTs are mixed with a large molar excess of compound (271) in tetrachloroethane. Grubbs second generation catalyst is added, and ring-closing of (271) around the CNT is effectuated, and the CNT/(cyc271)-complexes (cyclized derivative of (271) ring-closed around CNT) are filtrated, washed and dried, as described in Example 1.2. See FIG. 51A. The resulting dried solid is called the "$NH_2$-functionalized CNT".

Preparation of COCl-functionalized CNTs: SWNTs are mixed with a large molar excess of compound (273) in tetrachloroethane. Grubbs second generation catalyst is added, and ring-closing of (273) around the CNT is effectuated, to yield CNT/(cyc273)-complexes (cyclized derivative of (273) ring-closed around CNT). Then SOCl2 is added to convert the carboxylic acid into acid chloride. Finally, the product is filtrated, washed and dried, as described in Example 1.2. See FIG. 51B. The resulting dried solid is called the "COCl-functionalized CNT".

Formation of CNT network: Equimolar amounts of $NH_2$-functionalized CNT and COCl-functionalized CNT are mixed and added to an appropriate solvent (e.g. DMF), at three different concentrations of total CNT (0.2 w %, 1 w %, 5 w %, respectively), and the three solutions are poured into three plastic containers, respectively. These containers (with dimensions of e.g. 2 cm×2 cm×2 cm) have an electrode at either end of the container.

The containers with solution are allowed to incubate for 15 minutes, during which amines displayed by a CNT will react with acid chlorides displayed by another CNT. As a result, a network of CNTs, held together by covalent bonds between mechanical ligands bound to CNTs, will form. Then the solvent is removed, the apparatus is dried, and a phosphate-buffer pH 7, comprising antibodies, specific for the analyte in question (see below), is added. The amines on the surface of the antibodies will react with acid chlorides that did not react with amines displayed by a CNT, to form an amide bond between the mechanical ligand attached to a CNT and the antibody. Thus, antibodies are now immobilized on the surface of the CNTs.

Finally, excess unreacted COCl moieties are quenched by addition of a high concentration of an amine (NHR), which will convert the acid chlorides to amides. The container is now emptied and washed thoroughly in phosphate buffer pH 7, and finally filled up with this buffer.

Figure 51A:
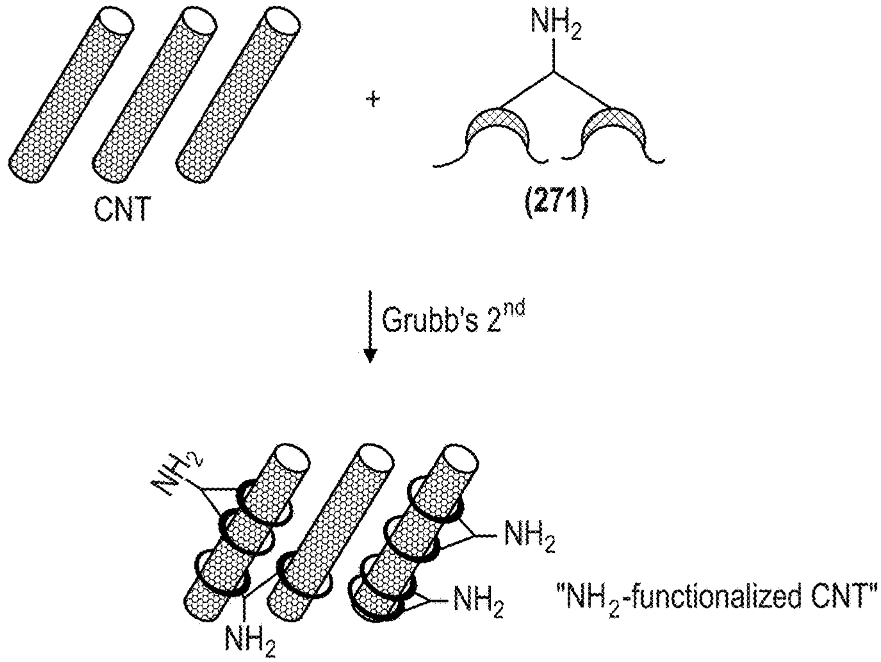
Figure 51B:
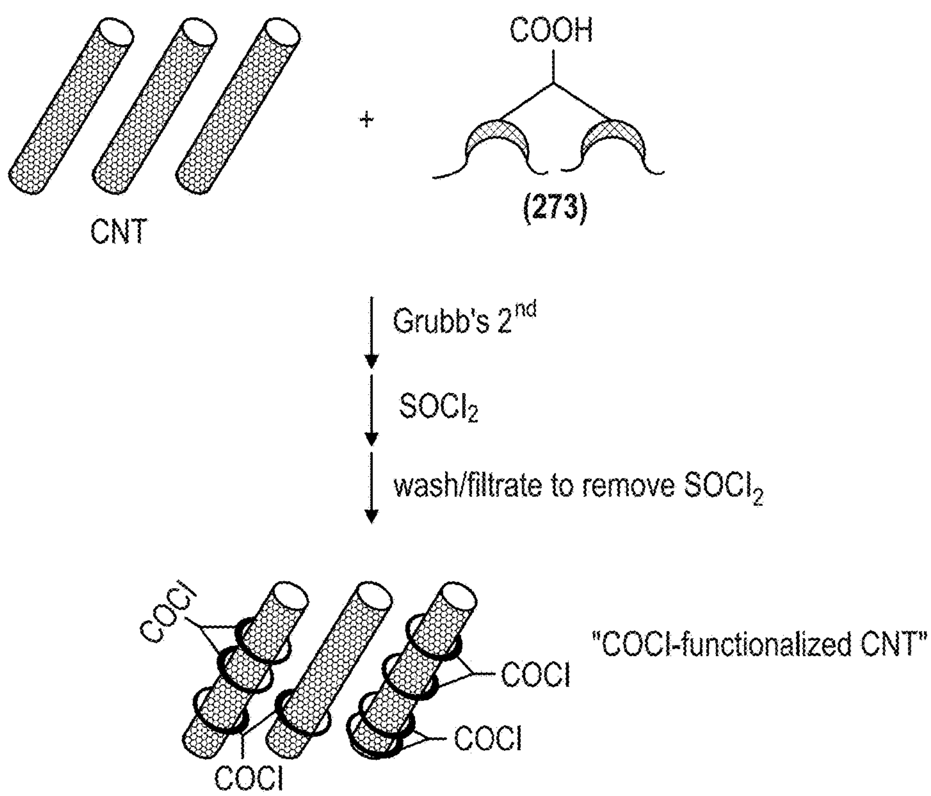
Figure 51C:
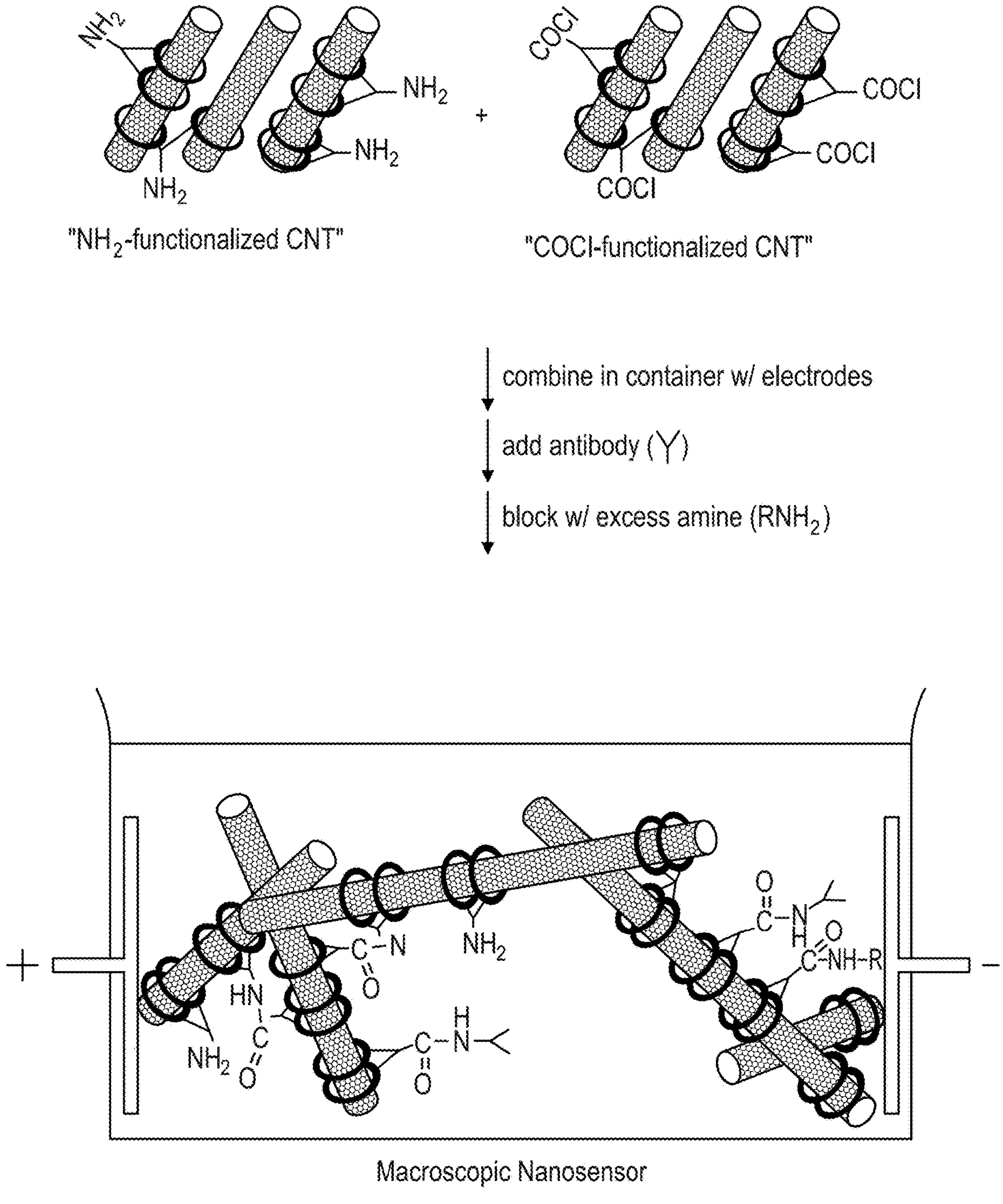
Figure 51D:
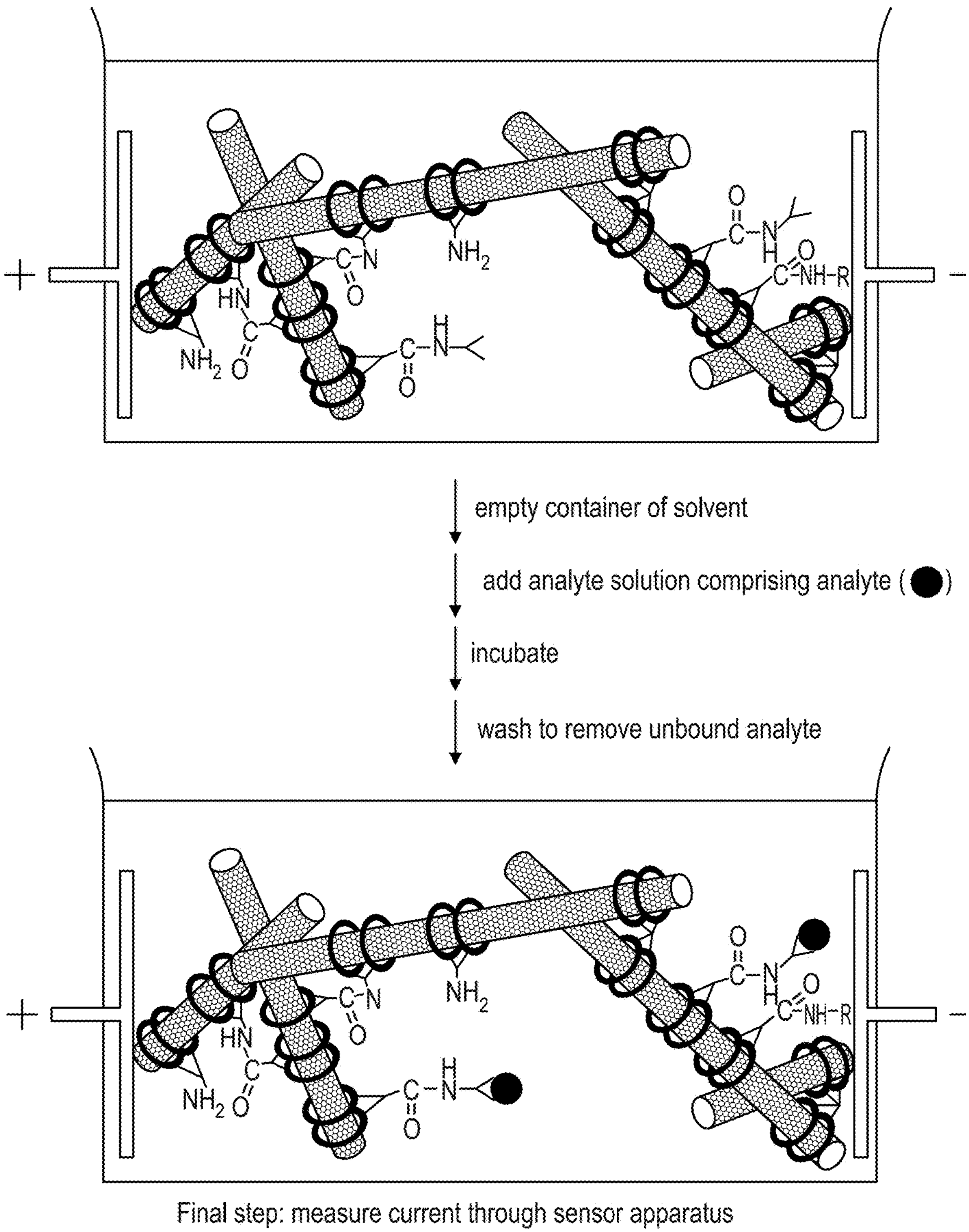

A macroscopic nanosensor has now been made—see FIG. 51C.

The macroscopic nanosensor apparatus can now be used to detect and measure the concentration of analytes that bind to the immobilized antibody, in the following way:

First, a voltage is being applied to the two electrodes of the container, and the conductivity (or resistance) of the apparatus with phosphate-buffer pH 7 is measured.

Then the container is emptied and the analyte solution (comprising an unknown amount of Analyte) is poured into the container, and incubation is continued for 30 minutes. The container is now emptied for analyte solution, and washed, in order to remove unbound Analyte. The same phosphate-buffer pH 7 as was used above, is now added.

Finally, the conductivity (or resistance) of the apparatus is measured.

When additional mass is bound to the exterior of a CNT this will lead to a change in the CNT molecule's conductivity. Consequently, binding of Analyte (e.g. a growth hormone protein) to the antibody (and hence, association of the Analyte with the antibody/CNT complex) affects the conductivity of the CNT. Therefore, binding of many Analytes to antibody/CNT complexes affects the conductivity across the container. By comparison with a standard curve (measured conductivities or resistances at different concentrations of the Analyte), the concentration of Analyte can be determined from the conductivity or resistance that was measured when the analyte solution was examined above.

In the above example, three different macroscopic nanosensors were made, comprising three different concentrations of total CNT (0.2 w %, 1 w %, 5 w %, respectively. These apparatuses will have different sensitivities and different capacities of Analyte binding. Further tuning of the sensitivity and/or upper limit can be done by e.g. optimizing the CNT concentration used to make the apparatus.

Example 21: Carbon Nanotube Reinforced Silk, for Production of a Knife-Proof Grandma Sweater This example shows how reinforced silk may be prepared, using the present invention.

Silk comprises two different kind of proteins, called sericin and fibroin. A sericin protein comprises multiple repeats of an approximately 38 amino acids sequence. Most of the 38 amino acids of the repeat are polar residues. The fibroin protein comprises multiple repeats of an approximately 6 amino acids sequence.

In this Example, CNT is bound by a mechanical ligand, which in turn is covalently attached to the sericin protein, by way of an amide bond. This CNT-modified sericin is then mixed with non-modified sericin, and fibroin. Self-assembly leads to formation of a silk that is reinforced with CNT. This CNT-reinforced silk will have properties that stem from both the silk and the CNT—e.g. be of high strength and be conductive.

Production: First, a mechanical ligand is attached to the CNTs. Two different precursor-MLs are used in this example, namely compound (271) (see FIG. 50A) and compound (108), see FIG. 29.

(A). To form a mechanical bond using (271), an appropriate amount of CNT is mixed with an appropriate amount of (271) in DMF, and the suspension is sonicated. Then Grubb's second-generation catalyst is added, leading to ring closure of (271) around the CNT. Finally, the CNT/(271) complexes are washed, filtrated and dried. This mechanical ligand comprises 1 amino group. The dried solid is called "CNT/(cyc271) complexes".

(B). To form a mechanical bond using compound (108) which is a peptide, an appropriate amount of CNT is mixed with (108) in aqueous buffer pH 10 and sonicated, leading to covalent ring-closing of the peptide around the CNT, by way of disulfide formation between the two cysteines of the peptide, as described in Example 3. The water is then evaporated, and the product dried. This mechanical ligand carries two amino groups. The dried solid is called "CNT/(cyc108) complexes".

Optionally, one or more of the following may be done, before or after the sonication, in order to increase the efficiency of ring closure: i) aerial oxidation, ii) addition of $I_2$, Tl (III) Trifluoroacetate, iii) addition of charcoal, iv) addition of DMSO, optionally together with either acid or base.

To Sericin (e.g. obtained by cloning and expression and purification, as described in The Journal of Biological Chemistry, 2003, vol. 278, pp. 46117-46123) is added EDC and NHS, under conditions appropriate for activation of the carboxylic acids of sericin's aspartic amino acid residues. This activated Sericin is now mixed with the CNT/(cyc271) complexes obtained in (A) above (comprising CNT, mechanically bound to a cyclic derivative of (271), under conditions allowing formation of amide bonds between the activated carboxylic acids and the amino groups of the cyclized (271). See FIG. 52A. The result is a covalent link between Sericin and the cyclized (271), complexed to CNT through a mechanical bond. The solvent is changed to an aqueous buffer, e.g. 100 mM $NaH_2PO_4$, 10 mM Tris base, 8 M urea, pH 5.9. Finally, unmodified Sericin peptide and fibroin peptide is added in excess, and the mixture dialyzed against distilled water or a weak phosphate buffer, pH 8. This will lead to self-assembly of silk, comprising fibroin, sericin and CNT. Thus, a CNT-reinforced silk has been produced. See FIG. 52B.

CNT-reinforced silk may also be generated by using the CNT/(cyc108) complexes from (B) above: To Sericin (e.g. obtained by cloning and expression and purification, as described in The Journal of Biological Chemistry, 2003, vol. 278, pp. 46117-46123) is added EDC and NHS, under conditions appropriate for activation of the carboxylic acids of sericin's aspartic amino acid residues. This activated Sericin is now mixed with the CNT/(cyc108) complexes obtained in (B) above (comprising CNT, mechanically bound to a cyclic derivative of (108), under conditions allowing formation of amide bonds between the activated carboxylic acids and the amino groups of the cyclized (108). The result is a covalent link between Sericin and the cyclized (108), complexed to CNT through a mechanical bond. The solvent is changed to an aqueous buffer, e.g. 100 mM $NaH_2PO_4$, 10 mM Tris base, 8 M urea, pH 5.9. Finally, unmodified Sericin peptide and fibroin peptide is added in excess, and the mixture dialyzed against distilled water or a weak phosphate buffer, pH 8. This will lead to self-assembly of silk, comprising fibroin, sericin and CNT. Thus, a CNT-reinforced silk has been produced.

Variations to the protocol:

- The relative and absolute amounts of sericin, fibroin and sericin complexed to CNT may be optimized, in order to obtain higher yields in the silk assembly process.
- By varying the concentration of EDC and NHS, and varying the pH, under the activation of the aspartic acid residues of the sericin peptide, fewer or more carboxylic acids will be activated. When the number of activated carboxylic acids of sericin is increased, this will allow a higher number of CNTs to be attached to the sericin peptide. But it may also complicate the self-assembly process if the modified sericin carries too many CNTs, or if too many aspartic acids have been activated by EDC/NHS. Thus, a compromise should be sought.

Compound (108) is a 23 amino acid peptide, carrying charged, as well as hydrophobic amino acid residues. Therefore, when the peptide is cyclized around the CNT, the side chains of the peptide may serve as solubilizers that help disperse the CNT in aqueous buffer. It may also improve the compatibility of the CNT with the silk microenvironment.

Example 22. Efficient Dispersion of CNT and Transfer of CNTs from Chlorosulfonic Acid to Organic Solvent Efficient dispersion of CNT is difficult to achieve. This example describes how chlorosulfonic acid and mechanical ligands of this invention can be used in combination to achieve efficient dispersion of CNT and other nanotubes in common organic solvents. Two approaches are described.

Approach 1:

Step 1. Optionally, CNTs are purified as described by (Tsentalovich et al. 2017: ACS Appl. Mater. Interfaces 2017, 9, 36189-36198. DOI:10.1021/acsami.7b10968AC): CNTs are stir bar mixed in 30% $H_2O_2$ at a ratio of 2 mL of $H_2O_2$ per 1 mg of CNTs. The CNTs are then recovered by vacuum filtration, followed by 24 hours of stir bar mixing the CNTs in 12 N HCl at a ratio of 1 mL of HCl per 1 mg of CNTs.

Then, the CNTs are neutralized with deionized water, frozen in liquid nitrogen, and dried overnight in a freeze-dryer. The purified CNTs are then mixed with 1 volume chlorosulfonic acid in 5 different flasks, at concentrations of 0.2%, 0.5%, 2%, 5% and 10%, respectively, incubated for 24 hours and filtered with a large pore filter, to remove solid particles.

Step 2. The contents of the 5 flasks are now individually filtrated on a 0.2 μm polytetrafluoroethylene (PTFE) membrane and the molecules retained by the membrane is quickly washed with dichloromethane (or another appropriate solvent, such as the solvents described in (Bergin et al. 2009: ACS Nano 2009, 3 (8), 2340-2350. DOI: 10.1021/nn900493u) or (Cheng et al. 2010: J. Phys. Chem. C 2010, 114, 4857-4863. DOI: 10.1021/jp911202d)) comprising 20 mM precursor-ML (e.g. compound (101A), (102A), (104A), (105A)). Then molecules retained on the membrane is suspended in 1 volume 20 mM of the chosen precursor-ML in dichloromethane (or another appropriate solvent, such as the solvents described in (Bergin et al. 2009: ACS Nano 2009, 3 (8), 2340-2350. DOI: 10.1021/nn900493u) or (Cheng et al. 2010: J. Phys. Chem. C 2010, 114, 4857-4863. DOI: 10.1021/jp911202d)). Grubb's second-generation catalyst is added, and the solution incubated at room temperature for 15 minutes. Then the process of filtration, resuspension in solvent comprising 20 mM precursor-ML, and addition of Grubb's second-generation catalyst is repeated 4 times with 15 minutes' interval, and finally the solution is incubated with Grubb's second-generation catalyst for 70 hours at room temperature.

Step 3. The 5 solutions comprising CNT/ML complexes are then individually filtrated on PTFE membrane, and the molecules retained on the membrane are washed with chloroform and dried. The resulting 5 powders are called "CSA-treated CNT/ML complexes".

In step 2, a base may be added to the solvent in order to neutralize the protons that are being released from the CNTs, in order that the precursor-ML may bind the CNT better and so that Grubb's second generation catalyst can catalyze ring-closing more efficiently.

Approach 2.

This example describes a method for dissolving CNTs in a superacid, then purifying them to obtain a higher quality of CNT material, transferring the dissolved and purified CNTs to a solvent different from a superacid and removing said superacid.

DESCRIPTION

First, CNTs such as SWNTs, DWNTs, or MWNT are purified as described by (Tsentalovich et al. 2017: ACS Appl. Mater. Interfaces 2017, 9, 36189-36198. DOI: 10.1021/acsami.7b10968AC).

and then dissolved in a superacid. Preferably, the superacid is chlorosulfonic acid. Preferably, the CNTs are SWNTs. Even more preferred, the CNTs are of a high-quality meaning few of the CNTs dissolved have defects and the CNTs with defects only have few defects, i.e. the preferred CNTs have a so-called high crystallinity. Even more preferred, the CNTs have a high aspect ratio such as 1:100; 1:1,000; 1:10,000; 1:100,000; 1:1,000,000; or higher.

Briefly, as a non-limiting example, CNTs are stir bar mixed in 30% $H_2O_2$ at a ratio of 2 mL of $H_2O_2$ per 1 mg of CNTs. The CNTs are then recovered by vacuum filtration, followed by 24 hours of stir bar mixing the CNTs in 12 N HCl at a ratio of 1 mL of HCl per 1 mg of CNTs. Then, the CNTs are neutralized with deionized water, frozen in liquid nitrogen, and dried overnight in a freeze-dryer. The purified CNTs are then mixed with chlorosulfonic acid at concentrations between 0.2% and 10% and filtered to remove any solid particles.

CNTs have now been purified and dissolved in a superacid.

Second, purified CNTs dissolved in superacid are mixed with a solvent different from a superacid. Preferably, said solvent belongs to the group of solvents with a high capacity for suspension and/or solvation of CNTs, such as, but not limited to, the solvents described in (Bergin et al. 2009: ACS Nano 2009, 3 (8), 2340-2350. DOI: 10.1021/nn900493u) or (Cheng et al. 2010: J. Phys. Chem. C 2010, 114, 4857-4863. DOI: 10.1021/jp911202d). Preferably, said solvent also belongs to the group of solvents that do not undergo a chemical reaction with a superacid when mixed with said superacid. In one preferred embodiment, said superacid is chlorosulfunic acid. In another preferred embodiment, said solvent is a chlorinated solvent, such as, but not limited to, chloroform, dichlorobenzene, or dichloroethane. In another preferred embodiment, said solvent has a high solubility in said superacid. In another preferred embodiment, said solvent has a low solubility in said superacid.

The superacid is then removed from the superacid/solvent CNT-solution. Removing the superacid can be done by any method preferred by a person skilled in the art, such as, but not limited to, heating, cooling, dialysis, sublimation, and condensation, or a combination thereof. After removal of the superacid, the CNTs are now dissolved in the solvent.

Briefly, as a non-limiting example, a solution of CNTs in chlorosulfonic acid (CSA) is mixed with dichlorobenzene (DCB) in a 1:1 mass ratio using stir bar mixing for 12 hours. The resulting DCB-CSA-CNT solution is heated above the boiling point of CSA to remove the CSA. After heating, a DCB-CNT solution remains.

The CNTs dissolved in superacid have now been mixed with a solvent and the superacid has been removed resulting in the CNTs being dissolved in the solvent.

Third (optionally), said CNT-solvent solution can be mixed with a second solvent. Preferably, said second solvent belongs to the group of solvents with a high capacity for suspension and/or solvation of CNTs, such as, but not limited to, the solvents described in (Bergin et al. 2009: ACS Nano 2009, 3 (8), 2340-2350. DOI: 10.1021/nn900493u) or (Cheng et al. 2010: J. Phys. Chem. C 2010, 114, 4857-4863. DOI: 10.1021/jp911202d). Preferably, said second solvent also belongs to the group of solvents that do not undergo a chemical reaction with said first solvent when mixed with said first solvent. In one preferred embodiment, said second solvent has a high solubility in said first solvent. In another preferred embodiment, said second solvent has a low solubility in said first solvent. After mixing of said first and second solvent, the first solvent is removed by any method preferred by a person skilled in the art, such as, but not limited to, heating, cooling, dialysis, sublimation, or condensation, or a combination thereof.

The CNTs have now been dissolved in a second solvent and the first solvent has been removed resulting in the CNTs being dissolved in the second solvent.

This example describes how to purify and dissolve CNTs in a superacid, mixing said superacid-CNT solution with a solvent, and removing said superacid from the superacid-solvent/CNT solution to obtain a solvent-CNT solution. In said solvent-CNT solution, CNTs are solvated individually.

Example 23. Using a Ring-Closed Peptide Comprising Multiple Lysines for the Formation of a CNT-Epoxy Composite The two peptides, compound (109) and compound (110), (see FIG. 29), are synthesized by standard peptide synthesis, using D-as well as natural amino acids. Compounds (109) and (110) are precursor MLs, that are turned into MLs by incubation with CNT and sonication, by disulfide formation between the terminal thiols, as described in Example 3.

The design, synthesis and ring-closing of the two compounds are described in Ortiz-Acevedo et al., J. Am. Chem. Soc. 2005, 127, 9512-9517.

Preparation of CNT/(cyc109) complexes: 10 w % SWNT and 10 mM compound (109) are mixed in 10 mM phosphate buffer pH 10, 10% DMSO and sonicated for 2 hours, resulting in ring-closing of (109) around the CNT. The CNT/ML complexes are filtrated on PTFE membrane, and washed in the same phosphate-buffer, then freeze-dried overnight. The resulting dried complexes are called "CNT/(cyc109) complexes".

Preparation of CNT/(cycl10) complexes: 10 w % SWNT and 10 mM compound (110) are mixed in 10 mM phosphate buffer pH 10, 10% DMSO and sonicated for 2 hours, resulting in ring-closing of (110) around the CNT. The CNT/ML complexes are filtrated on PTFE membrane, and washed in the same phosphate-buffer, then freeze-dried overnight. The resulting dried complexes are called "CNT/(cycl10) complexes".

Preparation of a CNT-reinforced epoxy polymer composite material: CNT/(cyc109) complexes and CNT/(cycl10) complexes (at a concentration corresponding to 3% in the final composite material), carrying 4 lysines and 6 lysines on each ML, respectively, is now mixed with epoxy and amine monomers under standard conditions for formation of epoxy polymer. The amines covalently coupled to the MLs ((cyc109) and (cyc110)) will, just like the amine monomers, react with epoxy and become incorporated into the growing epoxy polymer. As a result, the MLs bound to CNT become covalently coupled to the polymer, thereby efficiently anchoring the CNT in the polymer matrix. Thus, a CNT-reinforced epoxy polymer has been formed.

- Compounds (109) and (110) carry a number of different functionalities, including COOH, NH2, SH and the tyrosine side chain. Thus, these compounds can be used with CNT and other types of polymers, and in cases where the polymer carries functionalities that can react with COOH, NH2, SH or the tyrosine side chain, these functionalities carried by (109) or (110) can be used to link the ML covalently to the polymer, thereby efficiently anchoring the CNT in the matrix.

Example 24. Preparation of a Linear Array of Gold Particles Along a Nanotube

It is of interest to make nanostructures or arrays of supramolecular structures. The concept of this invention, the SE/ML complex, lends itself to this type of nano-structuring.

Thus, by linking a metal, nanocluster, chromofore, enzyme, or other type of supramolecular structure to any of the CNT binding mechanical ligands prepared in any of the examples of this invention, one may prepare linear structures of these supramolecular structures along the length of a CNT.

Variations:

- By appropriate design of the MLs, one may use other nanotubes, nanorods, nanothreads, or any other type of molecule with a high aspect ratio in these nano-structuring processes.
- By including a linker entity between each of the MLs (i.e. preparing multidentate MLs) one may ensure that the inter-ring distances are regular along the nanotube
- The Linker entity and precursor-MLs can be reacted prior to ring closing
- The linker entity can be added after ring-closing and formation of the ML Example 25. CNT Based Materials for Molecular Electronics SE1 is a CNT and SE2 is an amorphous polymer and transparent polymer such as a cycloolefin polymer. The corresponding CMU then becomes a material can be processed using plastic processing techniques into a transparent electrode material with high impact strength for use in molecular electronic (e.g. solar cells).

Production: SE1 is a CNT, which is bound with a mechanical ligand as described by Perez et al. The linker unit can be e.g. norbornene, which is functionalized with two allyl groups. The CMU can be polymerized with for example cyclo-octene using Grubb's catalyst and subsequently hydrogenated to a saturated polymer. In another example the linker unit is a substituted styrene, which can be polymerized using anionic polymerization techniques for incorporating the CMU into a polystyrene backbone. The polymers with CMU's incorporated can be processed using standard extrusion and film blowing techniques to transparent electrode materials.

Other polymer backbones can be used, with slightly altered transmission properties of the final film in particular at lower wavelengths.

Example 26: CNT Based Materials with Excellent Heat Conductivity

SE1 is a CNT and SE2 is polymer. The corresponding CMU can be mixed with a polymer matrix or used as a pristine material resulting in a material that can be processed using plastic processing techniques into a highly heat conductive material suitable for heat sink applications.

Similar production technique as described above, however a wider range of polymer backbones can be used. One example includes CMU polymerized into nylon materials or polyester materials, which can be used in the textile industry and specifically in sportswear. In sportswear, the idea is to have a better heat transfer from the body thus being able to keep the body comparatively cooler than when using "normal" textiles under high work conditions.

In electronics applications the heat conductive polymer can simply be poured onto the components generating heat and thereby resulting in an easily processable heat sink. The polymer should preferably be non-conductive.

A wide variety of polymer systems can be used.

Example 27. CNT-Based Cables for High Voltage Applications

SE1 is a CNT and SE2 is polymer. The corresponding CMU can be mixed with a polymer matrix or used as a pristine material for extruding wires. The resulting wires are conductive and can be used for high voltage applications. The wires have superior strength when compared to standard copper wires and have a considerably lower density.

Similar production technique as described above. The resulting polymer matrix is co-extruded into a wire with an insulating outer layer (e.g. polyethylene) to form a high strength cable. The cable might have super conducting properties but most importantly, it is light weight when compared to normal copper cables. Light weight high voltage cables provide engineering advantages, since the resulting drums of cables are much easier to handle.

Several layers of conductive polymer can be co-extruded, thereby resulting in a multilayered conductor.

Example 28. Self-Assembling Circuits

The use of single-walled CNTs to prepare electronic circuits. The CNTs, both metallic and semiconducting would self-assemble in random orientations and with random contacts on an integrated circuit and then probed to identify the circuit potentials.

Start with an array of contacts, including circular arrays, on a chip. In this example, gold contact pads will be used to tether the CNTs. A CNT-binding peptide would be fused to a gold-binding peptide and attached to the gold pads in the array. The treated chip would be flooded with dispersed CNTs and excess CNTs washed away. The CNTs attached to gold contact pads would be locked in place via a mechanical linker fused to a conducting oligomer bearing thiols at the opposite end. After ring closure the circuit would be interrogated electronically to search for desired properties.

As an alternative, spray gold microdroplet on a chip, in an ordered array. Synthesize a precursor-ML that has a thiol group covalently linked to the ML. Prepare CNT/ML complexes, and add these complexes to the chip with the gold array. The thiol will react with the gold and in this way immobilize the CNTs at the positions of the gold microdroplets. Thus, an ordered array of CNTs has been formed.

Example 30

Mechanical ligands may be used to produce prepregs, i.e. pre-impregnated fiber reinforcements or cloths used to manufacture composites. In this example, the pre-preg comprises carbon nanotubes (bound by mechanical ligands linked to epoxy.

Prepregs comprise a reinforcement fiber pre-impregnated with a thermoplastic or thermoset resin matrix in a certain ratio. Generally, the resin matrix in prepregs is partially cured for ease of handling and is stored in a cool place to prevent complete polymerization. This B-stage prepreg can then be heated in an autoclave or oven during manufacture of composite materials to achieve full polymerization. The reinforcement in a prepreg can be unidirectional fibers or a fabric. Prepregs are produced using two main processes, the hot melt process and solvent dip process. Both fabric and unidirectional prepregs can be produced using the hot melt process which has two stages; (1) an epoxy resin is provided. The resin comprises carbon nanotubes linked to epoxy as described. The resin is allowed to interact with a reinforcement fiber, e.g. carbon fibre, (2) on application of pressure and heat, the resin is impregnated into the fibre resulting in the final prepreg. Fabric prepregs can also be produced using the solvent dip process, which involves two steps; (1) the epoxy resin described above is dissolved in a solvent bath and the reinforcing fabric is dipped in the resin solution, (2) using a drying oven, the solvent is then evaporated off the prepreg.

An example of using prepregs with MLs comprises the following steps; (1) Prepreg layers are placed in a mold which has been waxed and coated with PVA. As an alternative a water-based mold release may be used, (2) after placing the layers in the mold, the prepreg is compressed to allow bonding, to remove any trapped air between the layers and to squeeze out any excess resin, (3) the needed compression can be accomplished using a press but unless the part is perfectly flat, a press is not an option. Consequently, the part is generally vacuum bagged, (4) after the layup is complete, the vacuum bag is built and sealed, (5) then the assembled prepregs are cured by high temperature, (6) all curing cycles begin with a temperature ramp up and end with a ramp down. The difference is the target temperature and the amount of time required for a complete cure. Generally, a ramp up rate of no more than 5° F. per minute is used until the target temperature is attained. The target temperature is maintained throughout the cure cycle and then ramped down at a rate of less than 5° F. per minute to at least 150° F. before removing from the oven, (7) the part is then cooled to room temperature, the vacuum bagging materials are removed and the part is released from the mold.

In one example, the prepreg has no MLs and performs as the Arovex® SC Prepreg System which is a an 82° C. to 177° C. curing carbon nanotube strengthened epoxy (Zyvex Technologies). The table below shows mechanical characteristics of the SC resin tested with Grafil TR30 3K 2 X2 Twill 200 FAW carbon fiber as reinforcement fiber with a resin content of 40%, 12 plies, and cured at 121° C. and 80 psi for one hour.

| Test | Test Method | Warp Value |
|---|---|---|
| Flexural Strength | ASTM D 790 | 1067 (Mpa) |
| Flexural Modulus | ASTM D 790 | 59 (Gpa) |
| Compressive Strength | ASTM D 3410 | 714 (Mpa) |
| Tensile Strength | ASTM D 3039 | 984 (Mpa) |
| Tensile Modulus | ASTM D 3039 | 78 (Gpa) |
| Short Beam Shear Strength | ASTM D 2344 | 76 (Mpa) |
| Izod Impact | ASTM D 256-06 | 643 (J/m) |
| Glass Transition Temperature | ASTM D 7028-07 | 132 (° C.) |
| Glc Strain Energy Release | ASTM D 5528-07 | 946 (J/m$^2$) |

In another example (example 30B), mechanical ligands in the form of compound 101-A are formed around the carbon nanotubes in the Arovex® SC Prepreg resin and performs better with Grafil TR30 3K 2 X2 Twill 200 FAW carbon fiber than detailed in the table above. In another example (example 30C), mechanical ligands in the form of compound 101-A are formed around the carbon nanotubes in the Arovex® SC Prepreg resin and the mechanical ligands are linked to the epoxy in the resin. This resin performs better than the resin in example 30B. In other examples, boron nitride nanotubes are used instead of carbon nanotubes. In yet other examples, the reinforcement fiber is E-Glass or S-Glass.

Example 31

An adhesive comprising carbon nanotubes (SE1) linked to epoxy via mechanical ligands is produced. The mechanical ligands are formed around the nanotubes by covalently cyclizing 101A. The following method is used to produce two adhesive parts which are mixed when the adhesive is used; (1) formation of adhesive part A, the resin, is done by mixing bisphenol-A-(epichlorhydrin) epoxy (about 60% of final volume) linked to SE1s (17-18% of final volume) is mixed with 4-bis(2,3 epoxypropoxy)butane/butanediol-diglycidyl ether (5-10% of final volume) and Gamma-Glycidoxypropyltrimethoxysilane (1-3% of final volume), (2) Formation of adhesive part B, the hardener, is done by mixing butadiene-acrylonitrile polymer (13-19% of final volume), polyoxypropylenediamine (16-18% of final volume), 1-(2-Aminoethyl)piperazine (8-14% of final volume), Phenol, 4-nonyl-, branched (7-11% of final volume), Glyceryl poly(oxy propylene)triamine (8-10% of final volume), and piperazine (0.4-1.4% of final volume). To use the adhesive, A and part B are stirred well before mixing in a 1:1 ratio. Once applied and cured, the adhesive has the following benefits; excellent flexibility, very high T-peel strengths, very high tensile shear strengths, non-drop, non-sag on vertical surfaces. It is structural adhesive for carbon fiber and other bonding or filling applications and materials such as metals and plastics.

TABLE 31A

Shear Strength Characteristics of CNT-containing adhesive with FPL Etched 2024-T3 Aluminum, 5 Mil.

| Cure cycle | Test Temp (° F.) | Shear Strength (psi) (a) | Shear Strength (psi) (b) |
|---|---|---|---|
| 12 hours at room temperature plus 2 hours at 176° F. | −11 | 4300 | 3200 |
| 12 hours at room temperature plus 2 hours at 176° F. | 160 | 3150 | 1850 |
| 12 hours at room temperature plus 2 hours at 176° F. | 200 | 2600 | 1200 |
| 1 day at room temperature | 72 | 1500 | 1250 |
| 3 days at room temperature | 72 | 3550 | 2700 |
| 7 days at room temperature | 72 | 4000 | 2700 |

(a) Shear Strength Characteristics of CNT-containing adhesive with cold rolled steel, 10 Mil bond-line
(b) Shear Strength Characteristics of CNT-containing adhesive with Arovex carbon fiber epoxy laminate

TABLE 31B

Shear Strength Characteristics of CNT-containing adhesive with Arovex carbon fiber epoxy laminate

| 7 day at room temp cure | Test Temp (° F.) | Shear Strength (psi) |
|---|---|---|
| Arovex - Arovex (abraded) | 75 | 3440 |
| Arovex - Arovex (abraded) | 140 | 1750 |
| Arovex - Arovex (abraded) + 7 days water soak | 75 | 3700 |
| Arovex - Aluminum (abraded) | 75 | 3500 |
| Arovex - Aluminum (abraded) | 140 | 2210 |

Example 31B

To form a film adhesive, an adhesive may be supported by a carrier such as a polymer carrier such as a knitted polymer carrier where the polymer is nylon. Such carrier-supported adhesives pairs well with prepregs such as high performance prepregs. Cured adhesive characteristics are designated by exceptionally high shear and peel strengths on a variety of substrates. As an example, an adhesive is provided comprising carbon nanotubes and mechanical ligands in the form of compound 102 A which are covalently cyclized around the carbon nanotubes and linked to the resin. This resin may be used for e.g. solid panel and honeycomb constructions. The film adhesive may be designed to meet the specifications of MMM-A132B Type I Class 2.

Other carriers than nylon may also be used, such as polypropylene, epoxy, polyolefin, polyphenylene sulfide, acrylonitrile butadiene styrene polymer, unsaturated polyester resin, high density polyethylene, linear low density polyethylene, low density polyethylene, polyamide, polycarbonate, polyethylene, polyethylene terephtalate, polymer, polypropylene, polystyrene.

Example 31C

A resin infusion system is a low-cost alternative to traditional prepreg. Resin Film Infusion (RFI) is a variant of VARTM (Vacuum Assisted Resin Transfer Molding) or RTM (Resin Transfer Molding). Flexible resin films enable quality composite components to be manufactured using a very cost-effective process. Normal curing takes place at 177° C. (350° F.). A resin film comprising carbon nanotubes linked to the resin via mechanical ligands as described in example 31B may be used for Resin Film Infusion Processing using the following method; (1) The lay-up sequence is determined. For most applications it is suitable to take the total fiber areal weight of the stack and divide by the resin areal weight of the film and then multiply by 0.9. As an example, to make a 12 ply 3K plain weave carbon fabric panel (3K) at 195 g/m2 FAW and with a resin film of 300 g/m2. 7 resin films are needed: ((12×195)/(300))×0.9=7.02. The sequence in this example will be as follows: RFI/3K/3K/RFI/3K/3K/RFI/3K/3K/RFI/3K/3K/RFI/3K/3K/RFI/3K/3K/RFI, (2) a suitable mold release is applied onto the tool, e.g. Frekote 55 NC, (3) the poly film is removed from the RFI and placed onto the tool and then the paper release backing is removed, (4) The first fabric ply is applied. The fabric plies should be slightly oversized in order to have good contact with the breather. Fabric plies must have good contact with the breather in order to obtain the resin flow required for the process, (5) the next ply in the sequence is then applied and the process is repeated until the sequence is complete. The last ply should be an RFI film. If the resin film is not large enough for the area of the fabric ply, multiple films may be used with an overlap, (6) once the full sequence of plies is completed, the assembly is ready for bagging. First, a peel ply is applied over the lay-up followed by release coated tool plate (optional) and then another peel ply. If a tool plate is not used, a PTFE coated layer of fiberglass is used, (7) the breather ply (or plies) is now applied followed by the vacuum port, tacky tape, and vacuum bag, (8) the assembly is then checked for vacuum integrity and placed in oven or autoclave for curing, (9) after curing, the bag is removed and the part is trimmed.

Example 32

As an example, suspensions of comprising carbon nanotubes and mechanical ligands are provided. The mechanical ligands in the form of compound 102 A are covalently cyclized around the carbon nanotubes. The suspensions are formed using an appropriate solvent as exemplified below. The carbon nanotube content of the suspensions may range from 0 to 10%, from 10% to 20%, from 30% to 40%, from 40% to 50%, from 50% to 60%, from 60% to 70%, from 70% to 80%, from 80% to 90%, from 90% to 100%. Suspensions may be formed by mixing nanotubes with a suitable solvent such as a solvent chosen from; NMP, EG, Glycerol, IPA, MEK.

A NMP suspension is formed by mixing mixing carbon nanotubes to which mechanical ligands are bound with N-Methyl-2-pyrrolidone (NMP). The suspension is useful for Li-ion batteries (cathode); as solvent for paints, coatings, lacquers; as solvent for polyvinyl acetates, PVC, polystyrene, polyamide, urethane, i.e. almost all resins; a solvent for polyamide, epoxy, polyurethane coatings; a solvent for urethane dispersions and coalescent for acrylic and styrene acrylic latexes An ethylene suspension is formed by mixing carbon nanotubes to which mechanical ligands are bound with ethylene glycol (EG). Useful characteristics of the suspension include high boiling point, hygroscopicity, non-corrosiveness, freeze point depression, lubricating, plasticising. The suspension is useful in polyester fibers; polyethylene terephthalate (PET) plastics; coolants in automobile anti-freeze; and resins. The excellent humectant (hygroscopicity) properties of EG products also make them ideal for use in fibers treatment, paper, adhesives, printing inks, leather and cellophane. The suspension is useful as ingredient of electrolytic condensers; solvent in the paint and plastics industries, printing inks, stamp pad inks, and inks for ballpoint pens; softening agent for cellophane; polyester fibers; polyethylene terephthalate (PET) plastics (fibers, films, etc.); unsaturated polyester resins; adhesives; emulsifiers; lubricants; plasticizers; polyurethane foams; silicone compounds; thermoplastics.

A glycerol suspension is formed by mixing carbon nanotubes to which mechanical ligands are bound glycerol (glycerin). The suspension may be used for production of alkyd resins and polyurethanes for use in paints, inks and coatings, as raw material for the manufacture of many different types of chemical intermediate, including solvents, plasticizers and surfactants; additive for manufacturing cement with enhanced performance (enhanced concrete strength, and grinding and handling aid for cement) replacing petrochemical amines and glycols. The suspension may be used in alkyd resins (surface coatings, printing inks, acrylics); glues, adhesives and pastes; plasticizers and lubricants for plastics and resins; urethane polymers; urethane coatings; glycerol-based cement; rubber lubricants; electrolytic capacitors; polyols for manufacture of foamed polyethylene and polypropylene plastics and films. The water-binding tendency of glycerin may be exploited in the preparation of anti-static and anti-fogging additives.

An IPA suspension is formed by mixing carbon nanotubes to which mechanical ligands are bound with isopropanol (isopropyl alcohol, IPA). The suspension may be used for antifreeze, lotions, car care products, paints, thinners for wood furnishings, inks, as an inert solvent to reduce the flammability of coatings during storage and transportation, in inks, e.g. as an additive and thinner of water-based paints, a solvent for foil coatings, in paints and lacquers as a solvent for nitrocellulose, acetyl-cellulose, ethyl cellulose, in Production of high density polyethylene, and polypropylene, as solvent for natural, butyl and EPDM rubbers, polystyrene, in conductive Epoxy, in conductive inks, as coating and a dye solvent in synthetic polymers (phenolic varnishes & NC lacquers, cements, primers), in oil and lubricants additive to increase anticorrosion and anti-freeze performance, as solvent for many ester oils, alkaloids, some synthetic resins, creosote.

A methyl ethyl ketone suspension is formed by mixing carbon nanotubes to which mechanical ligands are bound with Methyl ethyl ketone (MEK). The suspension can be used for extraction, dilution, purification, cleaning, degreasing, varnish and sticking. The MEK solution has many favourable properties, e.g. a fast evaporating rate, strong solvency, low viscosity, miscibility with large number of hydrocarbons without any effect on its characteristics, and a favourable volume/mass ratio due to its low density. The suspension may be used as coating solvent for automotive, electrical goods and furniture industries; solvent for the polymerisation processing of polystyrene, ABS and SBR, perchlorvinyl compounds; Polyacrylic paints and adhesives diluent; NBR-based adhesives; sealing paste based on chlorsiloxane rubber mixture; Low-temperature bonding agents; an azeotropic separation solvent for printing inks; additives to chlorsiloxane rubbers and NBR, thermoplastic heat sealing; production of paraffin wax; curing agent for polyester resins Example 33

A suspension is formed by mixing carbon nanotubes to which mechanical ligands are bound with water for manufacturing latex gloves and latex products with anti-static properties, retaining mechanical properties and minimally impacting the host matrix. Producing latex with the water/nanotube solution makes it possible to attain permanent and humidity-independent conductivity that is fully compliant with demanding applications, including the new European standard EN16350:2014 (EN 1149) for anti-static properties in safety wear.

FIG. 62 shows physical properties of natural latex with 0.03 wt. % carbon nanotubes (Tuball, OCSiAl). The latex is CL60, medium modulus, pre-vulcanized latex. The nanotube dispersion is stabilized with carboxymethyl cellulose as surfactant. As an example, natural latex with 0.03 wt. % carbon nanotubes to which mechanical ligands are bound provides better performance than shown in FIG. 62.

Example 34

For lithium ion battery high-energy Si/C anodes comprising carbon nanotubes and mechanical ligands may be used. The mechanical ligands are formed around the nanotubes by covalently cyclizing 101-A compounds. The nanotubes bound by mechanical ligands are added to SVC anodes during the slurry manufacturing stage by mixing in. They then covers and electrically connects the anode particles during the charge-discharge process of lithium ion batteries. Other suitable anode materials may be chosen from: graphite, hard carbons, lithium titanium oxide, Si, Sn, Ge, or Li2O.

FIG. 63 shows the relative capacity of batteries with carbon nanotubes (Tuball, OCSiAl) added to anodes.

As an example, the same batteries but with carbon nanotubes bound by mechanical ligands formed by covalently cyclizing compound 102A provides better performance than shown in FIG. 63.

For lithium ion battery high-energy cathodes, carbon nanotubes bound by mechanical ligands are added to the cathode material during production. The mechanical ligands are formed by cyclizing compound 103A. As an example, the cathode is LiTiS2. The carbon nanotubes offer the required conductivity, adhesion, safety, rate and cycle performance in cathodes starting from just 0.06% loading. The typical effective concentration of industrially used MWCNTs or conductive carbon black is 10-50 times higher. The ultra-low loading level of SWCNTs allows lithium ion battery manufacturers to maximise the energy density of the cathodes by using a higher amount of active material: up to 99% in modern high-energy NCM and other cathode materials. Other cathode materials may also be used, such as LiCoO2, LiNiO2, LiMnO2, LiNi0.33Mn0.33Co0.33O2, LiNi0.8CoO.15Al0.05O2, Li2MnO3, LiMn2O4, LiCo2O4, LiFePO4, LiMnPO4, LiCoPO4, LiFeSO4F, or LiVPO4F. Carbon nanotubes bound by mechanical ligands may be used to increase the energy density, durability and capacity in lithium-ion, lead-acid, alkaline, lithium-manganese dioxide and lithium-fluorocarbon batteries, as well as in supercapacitors and fuel cells.

Example 35

As an example, concentrates of carbon nanotubes bound by mechanical ligands are provided. The mechanical ligands are formed around the nanotubes by covalently cyclizing 102A. The concentrates comprise from 0-100% of carbon nanotubes bound by mechanical ligands, such as from 0 to 10%, from 10% to 20%, from 30% to 40%, from 40% to 50%, from 50% to 60%, from 60% to 70%, from 70% to 80%, from 80% to 90%, from 90% to 100%. Concentrates comprising carbon nanotubes and mechanical ligands have several advantages, they; (1) enable ultralow dosage starting with 0.1%, (2) allow production of conductive parts that retains bright color, (3) maintain and even increase mechanical strength, increase in fracture toughness of up to 25%, (4) ensure permanent and uniform electrical conductivity without "hotspots", without significant increase of viscosity and density of the host material. As examples, the following concentrates (matrix'es) of carbon nanotubes bound by mechanical ligands may be provided.

Matrix 201; a matrix in which the concentrate carrier is fatty acid glycidyl ester.

Matrix 301; a matrix in which the concentrate carrier is a surfactant based on ethoxylated alcohol which provides superior electrical conductivity to epoxy solvent-free resins used for epoxy-based floors, epoxy compounds, carbon fiber reinforced composites, glass fiber reinforced pipes, epoxy adhesives and other epoxy based applications where electrical conductivity is required.

Matrix 202; a matrix in which the concentrate carrier is fatty carboxylic acid esters derivatives which provides electrical conductivity to PVC and solvent-free phenolic systems. Matrix 202 is used for the most demanding applications in the automotive, petrochemical, oil and gas, healthcare, pharmaceutical and electronics industries. PVC systems: floors, leatherette, wires, cables, extruded hoses and other plastisol based applications where electrical conductivity is required. Phenolic systems: compounds, coatings, adhesives, fiberglass, wood and honeycomb composites and other phenolic based applications where electrical conductivity is required.

Matrix 203, a matrix in which the concentrate carrier is a blend of fatty acid glycidyl ester and ammonium salt of polyolefins based derivatives which provides electrical conductivity to solvent-based epoxy and solvent-based polyurethane and may be used for the most demanding applications in the automotive, petrochemical, oil and gas, healthcare, pharmaceutical and electronics industries. Epoxy systems: floors, compounds, carbon fiber reinforced composites, glass fiber reinforced pipes, adhesives, conductive primers and other epoxy based applications where electrical conductivity is required. It can also be used in polyurethane systems: floors, compounds, coatings, adhesives and other polyurethane based applications where electrical conductivity is required.

As an example, 15 wt. % of mica powder as a conductive additive was replaced with 0.2 wt. % of carbon nanotubes bound by mechanical ligands in Matrix 203.

As an example of conductive solvent-based epoxy primers for electronic device coatings, 6 wt. % of conductive carbon black as a conductive additive may be replaced with 0.5 wt. % of carbon nanotubes bound by mechanical ligands in Matrix 203. Benefits of Matrix 203 include a stable level of resistivity of $10^4$-$10^6$ Ω/sq without surface degradation, a clean manufacturing process without carbon black powder and dust, possibility of different colors, dosage starting at 0.01%, production of conductive parts that retain colours, maintaining or increasing mechanical strength, increasing fracture toughness of up to 25%, permanent and uniform electrical conductivity without "hot spots", all without significant increase of viscosity or density of the host material.

Concentrate for Epoxy and Polyurethane Resins

Matrix 203 may be used as an additive for anti-static or dissipative applications. Loading level can be as low as 0.1-4.0 wt % and depends on the required performance, resin characteristics, processing conditions and presence of other ingredients. An example of a percolation curve with Matrix 203 is shown in FIG. 64.

Matrix 204; a matrix in which the concentrate carrier is a blend of triethylene glycol dimethacrylate and ammonium salt of polyolefins based derivatives which provides superior electrical conductivity to polyester (solvent-free and solvent-based), vinyl ester (solvent-free and solvent-based), melamine (solvent-free and solvent-based) and solvent-based acrylic systems while retaining mechanical properties and minimally impacting the host matrix. It may be used for anti-static SMC/BMC composites; conductive gelcoats; anti-static fuel tanks and pipes; electrostatic discharge materials applied by coil coating; and other applications where electrical conductivity is required.

Many accidents that involve storage tanks are caused by static charges. To address this risk, anti-static fillers in the resin, typically carbon black or conductive mica, or carbon veils in the tank's inner wall, combined with stainless steel grounding wires, may be used to dissipate static charge. However, the use of such fillers is problematic as high filler ratios may be necessary, which makes fiberglass wetout more difficult and slows resin cure rate. Also, for best effect, the carbon filler must be evenly dispersed throughout the part to ensure that there are no electrical discontinuities. Cracking of the finished laminate surface also could cause an electrical discontinuity. Carbon nanotubes bound by mechanical ligands can provide electrostatic discharge (ESD) protection by dissipating electrostatic charge inside and outside a storage tank, e.g. replacing conductive carbon black at a loading of 15% with just 0.5% of a pre-dispersed concentrate comprising carbon nanotubes bound by mechanical ligands. Permanent and stable volume resistivity of less than $10^6$ Ω·cm (ohm-centimeters) can be achieved, independent of humidity and without the "hot spots" possible with poorly dispersed fillers. Moreover, the absence of carbon black allows an expanded color range of products. As one example, 30% conductive mica in an epoxy system for lining storage tanks containing highly flammable substances can be replaced with just 0.3% of Matrix 204 concentrate with carbon nanotubes bound by mechanical ligands. The result is a stable level of volume resistivity of between $10^6$ and $10^7$ Ω·cm.

Concentrates for Elastomers

Matrix 601; a matrix in which the carrier is polydimethylsiloxane oil which can be used for silicone compounds, such as liquid silicone rubber, and room temperature vulcanized rubber (RTV).

Matrix 602; a matrix in which carrier is vinyl-terminated polydimethylsiloxane, which can be used for liquid silicone rubber and high consistency rubber.

Matrix 605; a matrix in which carrier is silicone gum, which can be used for high consistency rubber FIG. 65 shows volume resistivity of RTV silicone with Tuball (OCSiAl) in polydimethylsiloxane oil as carrier in comparison with conductive carbon black. As an example, Matrix 602 with carbon nanotubes to which mechanical ligands are bound provides better performance than shown in FIG. 65.

FIG. 66 shows physical properties of RTV silicone with Tuball in polydimethylsiloxane oil as carrier in comparison with conductive carbon black. As an example, Matrix 602 with carbon nanotubes to which mechanical ligands are bound provides better performance than shown in FIG. 66.

Matrix 603; a matrix in which carrier Tetrakis(dimethylamino)ethylen (TDAE), used as low aromatic oil-plasticizer to enhance the physical and mechanical properties of rubbers and contribute to electrical conductivity. Matrix 603 comprising carbon nanotubes to which mechanical ligands are bound expands rubber compound performance, providing manufacturers with freedom to access new high-performance options. Matrix 603 enables high performance NR, BR and SBR rubber compounds for tires and rubber goods with loadings starting from 1%. Mechanical and conductivity improvements at low loadings allow for the next leap in performance since silica and key applications include tires, conveyor belts, seals, hoses, v-belts.

Matrix 605; a matrix in which silicone and siloxane is used as carrier. This matrix may be used for silicone applications. FIG. 67 shows properties of tyre compounds with Tuball carbon nanotubes (OCSiAl). As an example, Matrix 603 comprising carbon nanotubes to which mechanical ligands are bound provides better performance than shown in FIG. 67.

Example 36

A suspension comprising carbon nanotubes and mechanical ligands may be used for paints and coatings to provide electrical conductivity at extremely low loadings, retaining mechanical properties and enabling colour. Such suspensions may be used for: electrostatic discharge (ESD)-control floorings, automotive conductive primers, electrostatic discharge-control packaging. Benefits: May be used in standard technology of paints production, efficient ESD protection, permanent conductivity independent of humidity, ultra-low loading required, suitable for coloured and transparent systems, preserve or even increase mechanical properties

Example 37

A suspension comprising carbon nanotubes and mechanical ligands may be used for transparent conductive films to provide electrical conductivity with a high level of light transmittance and surface resistivity for flexible coatings. Water suspensions containing 0.2% of carbon nanotubes bound by mechanical ligands may be created to facilitate the application of single wall carbon nanotubes using flexography, screen printing or rotogravure printing. This ensures the required electrical conductivity and maintains the transparency of materials. A suspension of 0.01% carbon nanotubes bound by mechanical ligands in water is useful for spray coating and printing, such as ink-jet printing, such as ink-jet printing of electrical circuits.

Example 38. Ensuring that the Closed Ring (Mechanical Ligand) of a Nanotube Composite has Characteristics that are Similar to that of the Matrix In this example the nanotube-binding moieties are cleaved off during ring-closing of the precursor-ML. As a result, the closed ring that remains in the final composite does not contain the nanotube-binding moieties, which may be an advantage in cases where the nature of the nanotube-binding moiety makes it incompatible or suboptimal together with the matrix.

A. In FIG. 68A, A the principle is shown: The precursor-ML in this case only has one nanotube-binding moiety (NB), which is attached to the remainder of the precursor-ML through the moiety (x). The NB will bind to the nanotube, and so may the other end of the precursor-ML, carrying the moiety (y). In the figure, the two ends of the precursor-ML are in close proximity and the precursor-ML has wrapped around the nanotube. (x) and (y) carries reactive groups; upon reaction between reactive groups of (x) and (y), cyclization of the precursor-ML may occur, thereby forming a covalently closed ring (the ML). For many types of reactions such as e.g. substitution reactions (e.g acylations), this will lead to the NB being cleaved off the end of the precursor-ML. Thus, when washed, the NB will be removed, and left on the nanotube is now only the remainder of the precursor-ML, without the NB, as shown at the bottom of FIG. 68A.
B. FIG. 68B shows a variation of the principle applied in (A) above. Here, there are two NB which is likely to increase the likelihood of (x) and (y) being in proximity of each other, and therefore is likely to increase the efficiency of the reaction between (x) and (y). Again, reaction between (x) and (y) cleaves off the NB, and the final product after reaction and washing is the same as depicted in FIG. 68A.
C. FIG. 68C shows the synthesis of compounds (281-A) and (281-B). Briefly, a pyrene carrying a hydroxy group is modified using the same type of reactions as was used for the synthesis of compound (107-A), to introduce a double bond. Then this product is reacted with a diene carrying an amino group using Grubb's $2^{nd}$ generation catalyst. The reaction can be tuned by appropriate control of reagent concentrations (and purification of products) to yield compounds (281-A) and (281-B), both of which are precursor-MLs, and both of which carry amino groups that can later function as a Ligand2, i.e. to covalently attach the ML to SE2.
D. This is a specific variation of the general principle described in A above. When compound (281-A) is mixed with CNT, the pyrene (NB moiety) will bind to CNT, and in those circumstances where the other end of compound (281-A) gets in close proximity, and in those cases where the precursor-ML has wrapped around the CNT, will the two double bonds react, thereby forming a new double bond and cleaving off the pyrene. The resulting product is a covalently closed ring around the CNT, not carrying any pyrenes but carrying many amino groups that may be used to covalently link the ring structure to a structural entity SE2 (e.g. to a polymer such as polypropylene), or may be used to attach solubilization entities. If desired, the double bonds may be hydrogenated to yield a single bond.
E. This is a specific variation of the general principle described in (B) above. When compound (281-B) is mixed with CNT, the pyrenes (NB moieties) will bind to CNT, and in those circumstances where the other end of compound (281-B) gets in close proximity, and in those cases where the precursor-ML has wrapped around the CNT, will the two double bonds react, thereby forming a new double bond and cleaving off the pyrenes. The resulting product is a covalently closed ring around the CNT, not carrying any pyrenes but carrying several amino groups that may be used to covalently link the ring structure to a structural entity SE2 (e.g. to a polymer such as polypropylene), or may be used to attach solubilization entities. If desired, the double bonds may be hydrogenated to yield a single bond.
F. FIG. 68F shows the synthesis of compound (282). The same types of reactions as was employed in (C) above is used here. The compound (282) is a precursor-ML and comprises a polyamide string connecting two pyrenes through double bonds, and the polyamide string carries amino groups (protected with a protection group, PG). If compound (282) is mixed with CNT, the precursor-ML may be turned into a closed ring, analogously to the reaction described in (E) above. Thus, a polyamide-ring will have been formed around the CNT, and the ring does not carry any pyrenes (nanotube-binding moieties). Such a polyamide-based ML is particularly useful when combined with a SE that has similar characteristics, e.g. nylon or another polyamide. If a nylon-CNT composite is desired, the protection groups of the two amines of (282) can be removed, and the SE2 (nylon) can be covalently linked to the ML by way of these amino groups, during or following nylon formation.

G. FIG. 68G shows how acylation may be used to close the ring around the nanotube, using either a precursor-ML with one nanotube-binding moiety (upper part of FIG. 68G) or two nanotube-binding moieties (lower part of FIG. 68G). In either case, after ring closure and wash, the NB has been removed, and the ring is now closed around the nanotube, through an acylation reaction involving either one amino group and one ester (upper part of figure) or two amino groups and two esters (lower part of figure). The reactivity of the amine with the ester can be tuned by appropriate design of the ester, or to some extent, through appropriate choice of the atoms next to the amine.

In Examples 1-38 it is to be understood that the following terms should be interpreted as follows:

"n" (and n1, n2, n3, etc) attached to a chemical structure shall mean that this atom or moiety is repeated n times. N shall be 1, 2, 3, 4, 5, 6, 7, 8, 9, 10 or higher.

"R" (and R1, R2, R3, etc) shall mean a chemical moiety, often comprising a reactive group, and can be chosen from the list in Group 4: Chemical Motifs and the SEs they bind, or from Group 5: Chemical Motifs and the SEs they bind, or from Group 6: Reactive groups and covalent bonds formed upon reaction, or from Group 8: Covalent Bonds.

NB is a nanotube-binding moiety and can be chosen from the list of Group 10: CNT-binding moieties

FIGURES AND FIGURE LEGENDS

FIG. 1A to FIG. 1F. Mechanical Ligands (MLs) and the complexes $SE_o$-$ML_p$ formed between structural entities (SEs) and Mechanical Ligands (MLs). Shown are $SE_o$-$ML_p$ complexes. In the first row a side view is presented, in the second row an end-view is presented, and in the third row the configuration (number of SEs and MLs of the complex) is presented. (A) A closed ring mechanical ligand is mechanically bound to the structural entity, which is a nanotube. (B) Two mechanical ligands (closed rings) are connected, and the two connected MLs bind to the same SE, which is a nanotube. (C) A closed ring mechanical ligand wraps around three nanotubes. (D) A closed ring mechanical ligand wraps around a graphene molecule. (E) Two closed rings are mechanically bound to each other; one ring is a ML and the other closed ring is a structural entity. (F) A long polymer (ML) is inserted into a nanotube (SE) with a high aspect ratio. The high aspect ratio of the nanotube in practice can be considered a mechanical bond between the ML and the SE, although in theory the two can be dissociated without breaking a covalent bond.

FIG. 2A to FIG. 2E. Composite Material Units (CMUs). (A) A structural entity SE1 is mechanically bound to a mechanical ligand which is a closed ring structure. The mechanical ligand is attached to Ligand2 through a linker. Ligand2 binds to a structural entity, SE2. (B) The SE1 is here a CNT. The CNT is mechanically bound to a mechanical ligand which is a ring structure. The mechanical ligand is attached to Ligand2 through a linker. Ligand2 is non-covalently bound to SE2 which is a graphene molecule. (C) The SE1 is here a CNT. The CNT is mechanically bound to a mechanical ligand which is a ring structure. The mechanical ligand is attached to Ligand2 through a linker. Ligand2 is covalently bound to SE2 which is a graphene molecule. (D) SE1 is a nanotube. The nanotube is bound to three mechanical ligands (MLs), all of which are ring structures. The three MLs are each attached to a Ligand2 through a linker. The three Ligand2s are covalently bound to the same SE2 which is a polymer. (D) SE1 is a nanotube. The nanotube is bound by a mechanical ligand which is a closed ring structure. The mechanical ligand is linked to Ligand2 through a linker. Ligand2 is covalently bound to SE2, which is part of a surface.

FIG. 3A to 3E. Mechanical Ligands (MLs) generated during or upon association of the ML with a structural entity (SE). (A) A peptide with terminal cysteines (ie. comprising thiol groups) binds to a nanotube. One bound to the nanotube, the two thiols are oxidized to form a disulfide bond, thereby closing the ring. The resulting closed ring structure is now mechanically bound to the nanotube. (B) A polymer with terminal reactive groups X is inerted into a short nanotube. Once inserted, bulky groups carrying a reactive Y groups are added. Upon formation of a covalent bond between the X and Y group at both ends of the polymer, a mechanical bond has been formed, since the bulky groups locks the polymer in place because of geometrical constraints (ie. the bulky group are too large to be inserted into the nanotube). (C) A precursor-ML, in the form of a molecular cross, with reactive groups a, b, x, and y, where a can react with b to form a covalent ab bond, and x can react with y to form a covalent xy bond, binds non-covalently to a graphene. Once bound, and if a and b, and x and y, respectively, are in proximity, these may react to form two closed circles around the graphene. If properly designed this will lead to formation of a mechanical bond, holding the ML and the graphene together. (D) An excess of precursor-MLs are mixed with graphene. Upon binding of a number of precursor-MLs to graphene, reactive groups x that are in close proximity to reactive groups y may react; once a number of precursor-MLs have been linked in this way, one or more closed ring structures may have formed, thus mechanically binding the ML and graphene together. (E) An excess of precursor-MLs are mixed with a bundle of nanotubes. Upon binding of a number of precursor-MLs to the nanotubes of the nanotube bundle, reactive groups x that are in close proximity to reactive groups y may react; once a number of precursor-MLs have been linked in this way, a closed ring structures may have formed, thus mechanically binding the ML and nanotube bundle together.

Figure 4:
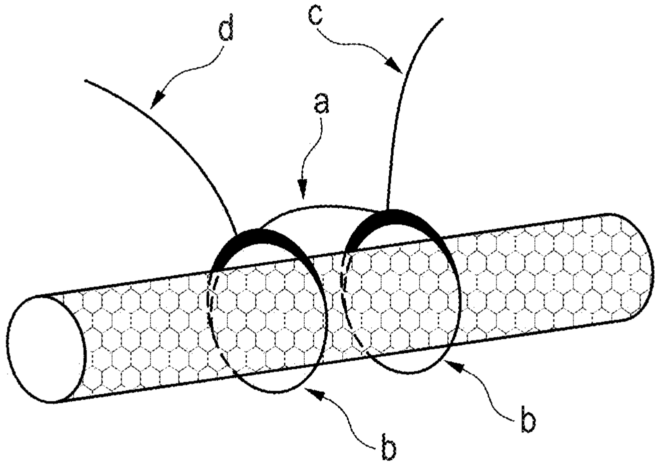
FIG. 4 shows the generic structure of a mechanical ligand that is a closed ring around the structural entity (SE)

FIG. 4 Generic structure of a mechanical ligand that is a closed ring structure. (a) denotes the linker between two mechanical ligands; (b) denotes a mechanical ligand that is a ring structure bound to a, in this example bound to a cylindrical structure such as a nanotube; (c) and (d) denotes linker attached to the mechanical ligand. (c) and (d) may serve as a link to another mechanical ligand or Ligand2. Said mechanical ligand or Ligand2 may then be linked to another structural entity or the same entity.

Figure 5:
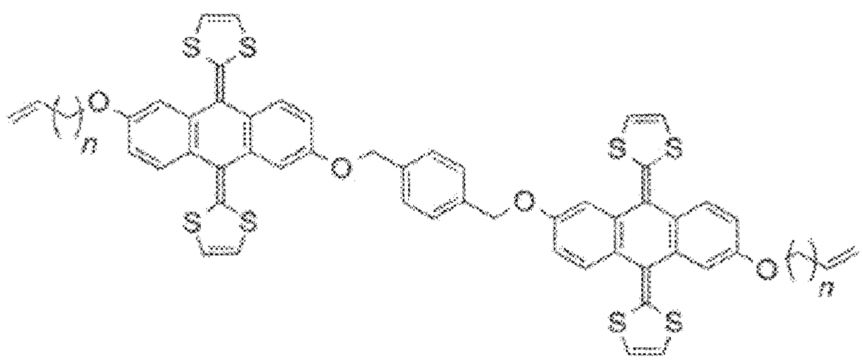
FIG. 5 shows the structure of a precursor-ML, Compound 10

FIG. 5. Structure of Compound 10 (n=6).

FIG. 6. Structure of Compound 11 (n=6).

FIG. 7. Structural model of the Compound 11-CNT complex.

FIG. 8. Structural model of the Compound 11-CNT complex.

FIG. 9A and FIG. 9B. Structures of precursor-MLs and MLs formed upon ring closing of precursor-MLs. (A) Structure of a precursor-ML, Compound 12, and the structure of the mechanical ligand (ML), Compound 13, formed upon ring-closing metathesis (RCM) of Compound 12 around the carbon nanotube, where n=6. (B) Structure of a precursor-ML, Compound 30, and the structure of the mechanical ligand (ML), Compound 31, formed upon ring closing of Compound 30.

Figure 10:
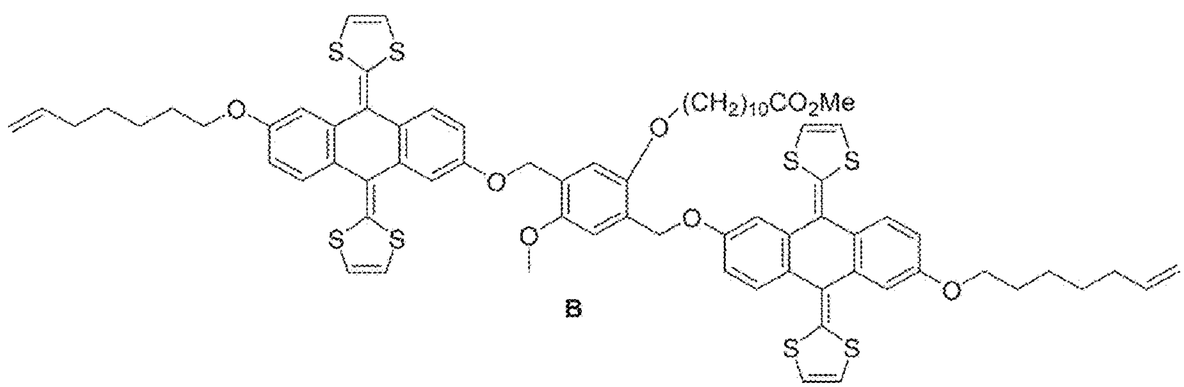
FIG. 10 shows the structure of a precursor-ML with a Linker moiety attached (Compound B)

FIG. 10. Structure of compound B (n=6).

FIG. 11. Structures of Compounds B, C, D, E, F, G and H.

Figure 12:
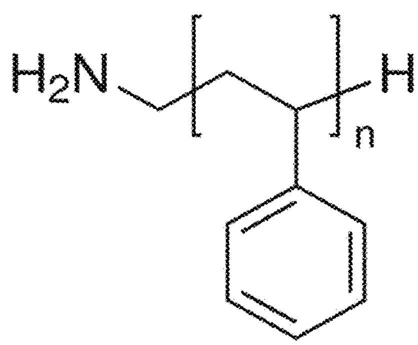
FIG. 12 shows the structure of amine-terminated polystyrene (Compound 20)

FIG. 12. Structure of amine-terminated polystyrene (Compound 20)

FIG. 13. Synthesis (Scheme 1) of Compound B

FIG. 14. Structures of 4-aminoethyl styrene and styrene

FIG. 15 The general structure of a precursor-ML is shown. R1, R2 and R3 are reactive groups that can be chosen from the list of Group 6: Reactive groups and covalent bonds formed upon reaction, and from Group 7: Covalent bond-forming chemical reactions. NB1-NB4 are nanotube binding chemical moieties which may be chosen from Group 4: Chemical motifs and the SEs they bind, and from Group 5: Chemical motifs and the SEs they bind and from Group 10: CNT-binding moieties. FIGS. 16, 18, 20, 22, 24, 26 and 28 to 30 The structure of precursor-MLs (compounds 101, 102, 103, 104, 105, 106, 107, 108, 109, 110, 111) are shown. R1-R5 are reactive groups that can be chosen from the list of Group 6: Reactive groups and covalent bonds formed upon reaction, and from Group 7: Covalent bond-forming chemical reactions. NB1-NB4 are nanotube binding chemical moieties which may be chosen from Group 4: Chemical motifs and the SEs they bind, and from Group 5: Chemical motifs and the SEs they bind and from Group 10: CNT-binding moieties.

FIGS. 17, 19, 21, 23, 25, and 27 to 30 The specific structure of precursor-MLs (compounds 101-A, 102-A, 103-A, 104-A, 105-A, 106-A, 107-A, 111-A), as well as the synthesis of these, are shown.

Figure 31:
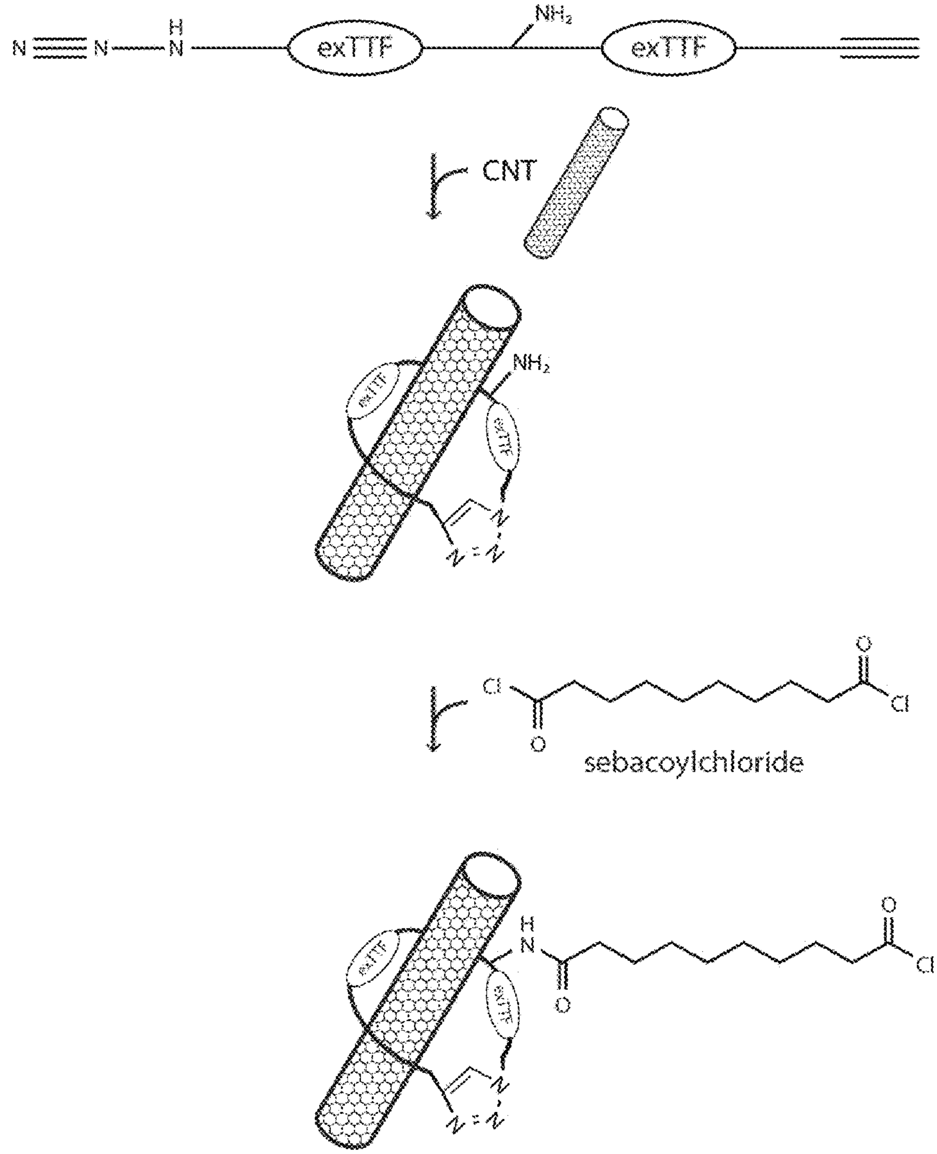
FIG. 31 shows the cyclization of compound (111-A) to form a mechanical ligand around a CNT.

FIG. 31 shows the cyclization of compound (111-A) to form a mechanical ligand around a CNT. The cyclization reaction involves azide and alkyne reactive groups. The CNT-binding chemical motif is here an exTTF motif. The reactive group that mediates the coupling of the ML-linker to SE2 is an acid chloride.

FIG. 32 shows the principle of a molecular shock absorber. The ML is covalently coupled to a linker that comprises two non-covalent ligands; the other end of the linker is coupled to a polymer. When force is applied on polymer, this will lead to first the dissociation of one non-covalent ligand, and then the other non-covalent ligand. Only then will the ML be exposed to the pulling force. The dissociation of the two ligands absorbs energy, and therefore leads to a smaller force being applied directly on the ML.

FIG. 33 CNT- and graphene-reinforced ink is described. FIGS. 34-39 The schemes for the synthesis of compounds (201, 202, 203, 204, 205, 206, 207) is shown. FIG. 40 The molecular structure of the ink is indicated, including mechanical ligands and non-covalent ligands, and the two additives, CNT and graphene. The result is an ink with superior characteristics.

FIGS. 41 to 43 The use of nucleating agents, attached to the ML in order to promote a higher degree of crystallinity in the composite, especially in the vicinity of the nanotube. FIG. 41A When no nucleating agent is being held in the vicinity of the nanotube, the interphase around the nanotube is wide. FIG. 41B When a nucleating agent is attached to the nanotube via an ML, the size of the non-crystalline interphase is decreased. FIG. 42 The use of a ML, mechanically bound to nanotube and carrying a nucleating agent and an octene reactive group, is shown. FIG. 43 The use of a ML, mechanically bound to nanotube and carrying a nucleating agent and an amine reactive group, is shown.

FIG. 44 It is shown how a nanotube/ML complex, carrying a carboxylic acid reactive group on the ML, may react with silicate, to re-inforce cement. FIG. 45 The synthetic scheme for making compound (221). D. The synthetic scheme for making compound (222).

FIG. 47 The 19mer peptide shown carries a cysteine at either end of the peptide, a glutamic acid, and an internal sequence (underlined) that is capable of binding boron nitride nanotubes (BNNT). The synthesis of compound (251) is shown; this precursor-ML carries an octene reactive group. When BNNT and compound (251) are mixed, the closed ring structure of (251) forms around the BNNT. FIG. 48 The synthesis of compound (252) is shown. When compound (252) and CdS nanorods are mixed, the (252)-precursor-ML is turned into an ML.

FIG. 49 shows the structure of compound (261) which is a light-cleavable precursor-ML.

FIG. 50A to FIG. 50F shows the synthesis of compounds (271, 272, 273), which are all precursor-MLs capable of forming two mechanical ligands with a nanotube, but which vary in the type of reactive group they are carrying for reaction with eg. SE2. It is also shown how these precursor-MLs can be used to efficiently glue together several layers of CNT veil.

FIG. 51A to FIG. 51D shows how compounds (271) and (273) can be used to make a macroscopic nanosensor.

FIG. 52A to FIG. 52B shows how mechanical ligands can be used to produce carbon nanotube-reinforced silk.

FIG. 53 to FIG. 61 provides analytical data on the synthesis of compound (B), which is used as a precursor molecule in several of the synthetic schemes used in the present invention.

FIG. 62. Physical properties of natural latex with 0.03 wt. % carbon nanotubes (Tuball, OCSiAl). The latex is CL60, medium modulus, pre-vulcanized latex. The nanotube dispersion is stabilized with carboxymethyl cellulose as surfactant.

FIG. 63. Relative capacity of batteries with carbon nanotubes (Tuball, OCSiAl) added to anodes.

FIG. 64. An example of a percolation curve with Matrix 203; a matrix in which the concentrate carrier is a blend of fatty acid glycidyl ester and ammonium salt of polyolefins-based derivatives.

FIG. 65. Volume resistivity of RTV silicone with Tuball (OCSiAl) in polydimethylsiloxane oil as carrier in comparison with conductive carbon black.

FIG. 66. Physical properties of RTV silicone with Tuball in polydimethylsiloxane oil as carrier in comparison with conductive carbon black.

FIG. 67. Properties of tyre compounds with Tuball carbon nanotubes (OCSiAl)

FIG. 68A to FIG. 68G. Appropriate design of precursor-ML enables nanotube-based CMUs and nanotube composite materials that do not comprise nanotube binding moieties. A. The precursor-ML in this case only has one nanotube-binding moiety (NB), which is attached to the remainder of the precursor-ML through the moiety (x). The NB will bind to the nanotube, and so may the other end of the precursor- ML, carrying the moiety (y). The two ends of the precursor-ML are in close proximity and the precursor-ML has wrapped around the nanotube. (x) and (y) carries reactive groups; upon reaction between reactive groups of (x) and (y), cyclization of the precursor-ML may occur, thereby forming a covalently closed ring (the ML). For many types of reactions such as e.g. substitution reactions (e.g acylations), this will lead to the NB being cleaved off the end of the precursor-ML. B. This is a variation of the principle applied in (A). Here, there are two NBs which is likely to increase the likelihood of (x) and (y) being in proximity of each other, and therefore is likely to increase the efficiency of the reaction between (x) and (y). The reaction between (x) and (y) cleaves off the NB, and the final product after reaction and washing does not comprise the nanotube-binding domain. C. Synthesis of compounds (281-A) and (281-B). D. A specific variation of the general principle described in A. Compound (281-A) is mixed with CNT. The pyrene (NB moiety) will bind to CNT, and the two double bonds may react, thereby forming a new double bond and cleaving off the pyrene. E. This is a specific variation of the general principle described in B above. When compound (281-B) is mixed with CNT, the pyrenes (NB moieties) will bind to CNT, and in those circumstances where the other end of compound (281-B) gets in close proximity, and in those cases where the precursor-ML has wrapped around the CNT, will the two double bonds react, thereby forming a new double bond and cleaving off the pyrenes. F. Synthesis of compound (282). G. Acylation may be used to close the ring around the nanotube, using either a precursor-ML with one nanotube-binding moiety (upper part of FIG. 68G) or two nanotube-binding moieties (lower part of FIG. 68G).

The invention claimed is:

1. A composite material unit (CMU) of the structure (SE1-ML-LinkerL-Ligand2-SE2), wherein ML is a Mechanical Ligand, a chemical entity that forms a mechanical bond with the structural entity SE1, where ML is not a nanotube, LinkerL is a chemical bond or entity that covalently links ML and Ligand2, Ligand2 is a chemical entity that is covalently linked to the structural entity SE2, or forms a mechanical bond with the structural entity SE2, and SE1 and SE2 are structural entities where SE1 is a carbon nanotube and ML is a covalently closed ring around said carbon nanotube, and where the structural entity SE2 is a polymer or the structural entity SE2 is a carbon nanotube, wherein at least 2 SE2s are linked to the same SE1 or wherein at least 2 SE1s are linked to the same SE2.

2. The composite material unit (CMU) of claim 1, where the structural entity SE2 is selected from the group consisting of epoxy, polybenzimidazole, polyethylene, polycarbonate, polyethylene terephtalate, polypropylene, polyester, polystyrene, polyolefin, polyvinylchloride, vinyl ester, polyamide, polyetherketoneketone, poly (methyl methacrylate), poly (methyl methacrylate), polyamide imide, polyaryletheretherketone, polyether imide, polyimide, polyoxymethylene, polyphenylene sulfide, polytetrafluoroethylene, nylon, and acrylonitrile butadiene styrene.

3. The composite material unit (CMU) of claim 1, where the structural entity SE2 is bound by a mechanical ligand.

4. The composite material unit (CMU) of claim 1, where the ML comprises a pyrene motif, a nitrobenzene motif, a phenanthrene motif, a naphthalene motif, and/or a tetrathiafulvalene motif.

5. The composite material unit (CMU) of claim 1, where the ML comprises a chemical moiety of more than 50 Dal, that is identical to a part of the structural entity SE2.

6. The composite material unit (CMU) of claim 1, where the structural entity SE1 is a single-walled carbon nanotube (SWNT) or a multi-walled (MWNT) carbon nanotube.

7. The composite material unit (CMU) of claim 1, wherein the ML has a molecular weight (MW) of 100-200 Dal, where said molecular weight is the combined molecular weight of the atoms constituting the shortest string of covalently linked atoms that form a ring around the structural entity SE1.

8. The composite material unit (CMU) of claim 1, wherein at least 5 SE2s, are linked to the same SE1.

9. The composite material unit (CMU) of claim 1, wherein the structural entity SE1 is bound by more than 1 mechanical ligand.

10. A composite material comprising at least $10^8$ composite material units (CMUs) per cubic millimeter, said composite material units (CMUs) being as are defined in claim 1.

11. The composite material of claim 10 that wherein the composite material has an electrical conductivity of at least $10^3$ s/m.

12. The composite material of claim 10 wherein the composite material has a torsional strength of at least 1 MPa.

13. The composite material of claim 10 wherein the composite material has a Young's Modulus of at least 0.01 GPa.

14. The composite material of claim 10 wherein silica, silicate, sand, aluminosilicates, quartz, or flint is present at a concentration of at least 0.01 wt % in the composite material.

15. The composite of claim 10, wherein the composite material is a ceramics matrix composite or a metal matrix composite material.

16. A carbon-nanotube (CNT) reinforced polymer comprising one or more composite material units (CMUs) defined in claim 1.

17. The composite material unit (CMU) of claim 1, wherein the carbon nanotube (SE1) has an aspect ratio of at least 100.

* * * * *

SEQUENCE LISTING

```
<160> NUMBER OF SEQ ID NOS: 51

<210> SEQ ID NO 1
<211> LENGTH: 7
<212> TYPE: PRT
<213> ORGANISM: Artificial
<220> FEATURE:
<223> OTHER INFORMATION: Synthetic peptide sequence

<400> SEQUENCE: 1

Gln Leu Met His Asp Tyr Arg
1               5


<210> SEQ ID NO 2
<211> LENGTH: 9
<212> TYPE: PRT
<213> ORGANISM: Artificial
<220> FEATURE:
<223> OTHER INFORMATION: Synthetic peptide sequence

<400> SEQUENCE: 2

Cys Pro Thr Ser Thr Gly Gln Ala Cys
1               5


<210> SEQ ID NO 3
<211> LENGTH: 9
<212> TYPE: PRT
<213> ORGANISM: Artificial
<220> FEATURE:
<223> OTHER INFORMATION: Synthetic peptide sequence

<400> SEQUENCE: 3

Cys Thr Leu His Val Ser Ser Tyr Cys
1               5


<210> SEQ ID NO 4
<211> LENGTH: 12
<212> TYPE: PRT
<213> ORGANISM: Artificial
<220> FEATURE:
<223> OTHER INFORMATION: Synthetic peptide sequence

<400> SEQUENCE: 4

Arg Leu Asn Pro Pro Ser Gln Met Asp Pro Pro Phe
1               5                   10


<210> SEQ ID NO 5
<211> LENGTH: 12
<212> TYPE: PRT
```

<213> ORGANISM: Artificial
<220> FEATURE:
<223> OTHER INFORMATION: Synthetic peptide sequence

<400> SEQUENCE: 5

Gln Thr Trp Pro Pro Pro Leu Trp Phe Ser Thr Ser
1 5 10

<210> SEQ ID NO 6
<211> LENGTH: 12
<212> TYPE: PRT
<213> ORGANISM: Artificial
<220> FEATURE:
<223> OTHER INFORMATION: Synthetic peptide sequence

<400> SEQUENCE: 6

His Thr Asp Trp Arg Leu Gly Thr Trp His His Ser
1 5 10

<210> SEQ ID NO 7
<211> LENGTH: 12
<212> TYPE: PRT
<213> ORGANISM: Artificial
<220> FEATURE:
<223> OTHER INFORMATION: Synthetic peptide sequence

<400> SEQUENCE: 7

Glu Leu Trp Ser Ile Asp Thr Ser Ala His Arg Lys
1 5 10

<210> SEQ ID NO 8
<211> LENGTH: 11
<212> TYPE: PRT
<213> ORGANISM: Artificial
<220> FEATURE:
<223> OTHER INFORMATION: Synthetic peptide sequence

<400> SEQUENCE: 8

Ile Phe Arg Leu Ser Trp Gly Thr Tyr Phe Ser
1 5 10

<210> SEQ ID NO 9
<211> LENGTH: 12
<212> TYPE: PRT
<213> ORGANISM: Artificial
<220> FEATURE:
<223> OTHER INFORMATION: Synthetic peptide sequence

<400> SEQUENCE: 9

His Trp Lys His Pro Trp Gly Ala Trp Asp Thr Leu
1 5 10

<210> SEQ ID NO 10
<211> LENGTH: 4
<212> TYPE: PRT
<213> ORGANISM: Artificial
<220> FEATURE:
<223> OTHER INFORMATION: Synthetic peptide sequence

<400> SEQUENCE: 10

Glu Leu Trp Arg
1

<210> SEQ ID NO 11
<211> LENGTH: 7
<212> TYPE: PRT
<213> ORGANISM: Artificial

<220> FEATURE:
<223> OTHER INFORMATION: Synthetic peptide sequence

<400> SEQUENCE: 11

Glu Leu Trp Arg Pro Thr Arg
1               5

<210> SEQ ID NO 12
<211> LENGTH: 7
<212> TYPE: PRT
<213> ORGANISM: Artificial
<220> FEATURE:
<223> OTHER INFORMATION: Synthetic peptide sequence

<400> SEQUENCE: 12

Lys Pro Arg Ser Val Ser Gly
1               5

<210> SEQ ID NO 13
<211> LENGTH: 9
<212> TYPE: PRT
<213> ORGANISM: Artificial
<220> FEATURE:
<223> OTHER INFORMATION: Synthetic peptide sequence

<400> SEQUENCE: 13

Thr Gly Thr Gly Phe Gly Thr Cys Thr
1               5

<210> SEQ ID NO 14
<211> LENGTH: 9
<212> TYPE: PRT
<213> ORGANISM: Artificial
<220> FEATURE:
<223> OTHER INFORMATION: Synthetic peptide sequence

<400> SEQUENCE: 14

Thr Gly Thr Gly Val Gly Thr Cys Thr
1               5

<210> SEQ ID NO 15
<211> LENGTH: 9
<212> TYPE: PRT
<213> ORGANISM: Artificial
<220> FEATURE:
<223> OTHER INFORMATION: Synthetic peptide sequence

<400> SEQUENCE: 15

Thr Gly Thr Gly Trp Gly Thr Cys Thr
1               5

<210> SEQ ID NO 16
<211> LENGTH: 9
<212> TYPE: PRT
<213> ORGANISM: Artificial
<220> FEATURE:
<223> OTHER INFORMATION: Synthetic peptide sequence

<400> SEQUENCE: 16

Thr Gly Thr Gly Thr Gly Thr Cys Thr
1               5

<210> SEQ ID NO 17
<211> LENGTH: 9
<212> TYPE: PRT
<213> ORGANISM: Artificial
<220> FEATURE:

<223> OTHER INFORMATION: Synthetic peptide sequence

<400> SEQUENCE: 17

Thr Gly Thr Gly Gly Gly Thr Cys Thr
1 5

<210> SEQ ID NO 18
<211> LENGTH: 9
<212> TYPE: PRT
<213> ORGANISM: Artificial
<220> FEATURE:
<223> OTHER INFORMATION: Synthetic peptide sequence

<400> SEQUENCE: 18

Thr Gly Thr Gly Asn Gly Thr Cys Thr
1 5

<210> SEQ ID NO 19
<211> LENGTH: 9
<212> TYPE: PRT
<213> ORGANISM: Artificial
<220> FEATURE:
<223> OTHER INFORMATION: Synthetic peptide sequence

<400> SEQUENCE: 19

Thr Gly Thr Gly Lys Gly Thr Cys Thr
1 5

<210> SEQ ID NO 20
<211> LENGTH: 9
<212> TYPE: PRT
<213> ORGANISM: Artificial
<220> FEATURE:
<223> OTHER INFORMATION: Synthetic peptide sequence

<400> SEQUENCE: 20

Thr Gly Thr Gly Asp Gly Thr Cys Thr
1 5

<210> SEQ ID NO 21
<211> LENGTH: 14
<212> TYPE: PRT
<213> ORGANISM: Artificial
<220> FEATURE:
<223> OTHER INFORMATION: Synthetic peptide sequence

<400> SEQUENCE: 21

Met His Gly Lys Thr Gln Ala Thr Ser Gly Thr Ile Gln Ser
1 5 10

<210> SEQ ID NO 22
<211> LENGTH: 42
<212> TYPE: PRT
<213> ORGANISM: Artificial
<220> FEATURE:
<223> OTHER INFORMATION: Synthetic peptide sequence

<400> SEQUENCE: 22

Asp Ala Glu Phe Arg His Asp Ser Gly Tyr Glu Val His His Gln Lys
1 5 10 15

Leu Val Phe Phe Ala Glu Asp Val Gly Ser Asn Lys Gly Ala Ile Ile
20 25 30

Gly Leu Met Val Gly Gly Val Val Ile Ala
35 40

<210> SEQ ID NO 23
<211> LENGTH: 40
<212> TYPE: PRT
<213> ORGANISM: Artificial
<220> FEATURE:
<223> OTHER INFORMATION: Synthetic peptide sequence

<400> SEQUENCE: 23

```
Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40
```

<210> SEQ ID NO 24
<211> LENGTH: 9
<212> TYPE: PRT
<213> ORGANISM: Artificial
<220> FEATURE:
<223> OTHER INFORMATION: Synthetic peptide sequence

<400> SEQUENCE: 24

```
Cys His Lys Lys Pro Ser Lys Ser Cys
1               5
```

<210> SEQ ID NO 25
<211> LENGTH: 12
<212> TYPE: PRT
<213> ORGANISM: Artificial
<220> FEATURE:
<223> OTHER INFORMATION: Synthetic peptide sequence

<400> SEQUENCE: 25

```
Arg Lys Leu Pro Asp Ala Pro Gly Met His Thr Trp
1               5                   10
```

<210> SEQ ID NO 26
<211> LENGTH: 19
<212> TYPE: PRT
<213> ORGANISM: Artificial
<220> FEATURE:
<223> OTHER INFORMATION: Synthetic peptide sequence

<400> SEQUENCE: 26

```
Ser Cys Ser Asp Cys Leu Lys Ser Val Asp Phe Ile Pro Ser Ser Leu
1               5                   10                  15

Ala Ser Ser
```

<210> SEQ ID NO 27
<211> LENGTH: 7
<212> TYPE: PRT
<213> ORGANISM: Artificial
<220> FEATURE:
<223> OTHER INFORMATION: Synthetic peptide sequence

<400> SEQUENCE: 27

```
Tyr Leu Thr Met Pro Thr Pro
1               5
```

<210> SEQ ID NO 28
<211> LENGTH: 7
<212> TYPE: PRT
<213> ORGANISM: Artificial
<220> FEATURE:
<223> OTHER INFORMATION: Synthetic peptide sequence

<400> SEQUENCE: 28

Phe Ser Trp Glu Ala Phe Ala
1               5

<210> SEQ ID NO 29
<211> LENGTH: 7
<212> TYPE: PRT
<213> ORGANISM: Artificial
<220> FEATURE:
<223> OTHER INFORMATION: Synthetic peptide sequence

<400> SEQUENCE: 29

His Leu Glu Ser Thr Pro Gly
1               5

<210> SEQ ID NO 30
<211> LENGTH: 7
<212> TYPE: PRT
<213> ORGANISM: Artificial
<220> FEATURE:
<223> OTHER INFORMATION: Synthetic peptide sequence

<400> SEQUENCE: 30

Gly Glu Thr Arg Ala Pro Leu
1               5

<210> SEQ ID NO 31
<211> LENGTH: 7
<212> TYPE: PRT
<213> ORGANISM: Artificial
<220> FEATURE:
<223> OTHER INFORMATION: Synthetic peptide sequence

<400> SEQUENCE: 31

Arg His Glu Pro Pro Leu Ala
1               5

<210> SEQ ID NO 32
<211> LENGTH: 7
<212> TYPE: PRT
<213> ORGANISM: Artificial
<220> FEATURE:
<223> OTHER INFORMATION: Synthetic peptide sequence

<400> SEQUENCE: 32

Phe Pro Gly Arg Pro Ser Pro
1               5

<210> SEQ ID NO 33
<211> LENGTH: 7
<212> TYPE: PRT
<213> ORGANISM: Artificial
<220> FEATURE:
<223> OTHER INFORMATION: Synthetic peptide sequence

<400> SEQUENCE: 33

His Lys Pro Asp Ala Asn Arg
1               5

<210> SEQ ID NO 34
<211> LENGTH: 7
<212> TYPE: PRT
<213> ORGANISM: Artificial
<220> FEATURE:
<223> OTHER INFORMATION: Synthetic peptide sequence

<400> SEQUENCE: 34

Phe Pro Gly His Ser Gly Pro
1 5

<210> SEQ ID NO 35
<211> LENGTH: 7
<212> TYPE: PRT
<213> ORGANISM: Artificial
<220> FEATURE:
<223> OTHER INFORMATION: Synthetic peptide sequence

<400> SEQUENCE: 35

Thr His Leu Pro Trp Gln Thr
1 5

<210> SEQ ID NO 36
<211> LENGTH: 7
<212> TYPE: PRT
<213> ORGANISM: Artificial
<220> FEATURE:
<223> OTHER INFORMATION: Synthetic peptide sequence

<400> SEQUENCE: 36

Gly Glu Thr Gln Cys Ala Ala
1 5

<210> SEQ ID NO 37
<211> LENGTH: 7
<212> TYPE: PRT
<213> ORGANISM: Artificial
<220> FEATURE:
<223> OTHER INFORMATION: Synthetic peptide sequence

<400> SEQUENCE: 37

His Thr Ala Gln Ser Thr Ala
1 5

<210> SEQ ID NO 38
<211> LENGTH: 21
<212> TYPE: PRT
<213> ORGANISM: Artificial
<220> FEATURE:
<223> OTHER INFORMATION: Synthetic peptide sequence

<400> SEQUENCE: 38

Val Lys Thr Gln Ala Thr Ser Arg Glu Glu Pro Pro Arg Leu Pro Ser
1 5 10 15

Lys His Arg Pro Gly
20

<210> SEQ ID NO 39
<211> LENGTH: 21
<212> TYPE: PRT
<213> ORGANISM: Artificial
<220> FEATURE:
<223> OTHER INFORMATION: Synthetic peptide sequence

<400> SEQUENCE: 39

Pro Gln Ala Gln Asp Val Glu Leu Pro Gln Glu Leu Gln Asp Gln His
1 5 10 15

Arg Glu Val Glu Val
20

<210> SEQ ID NO 40
<211> LENGTH: 105

<212> TYPE: PRT
<213> ORGANISM: Artificial
<220> FEATURE:
<223> OTHER INFORMATION: Synthetic peptide sequence

<400> SEQUENCE: 40

```
Pro Gln Ala Gln Asp Val Glu Leu Pro Gln Glu Leu Gln Asp Gln His
1               5                   10                  15

Arg Glu Val Glu Val Pro Gln Ala Gln Asp Val Glu Leu Pro Gln Glu
            20                  25                  30

Leu Gln Asp Gln His Arg Glu Val Glu Val Pro Gln Ala Gln Asp Val
        35                  40                  45

Glu Leu Pro Gln Glu Leu Gln Asp Gln His Arg Glu Val Glu Val Pro
    50                  55                  60

Gln Ala Gln Asp Val Glu Leu Pro Gln Glu Leu Gln Asp Gln His Arg
65                  70                  75                  80

Glu Val Glu Val Pro Gln Ala Gln Asp Val Glu Leu Pro Gln Glu Leu
                85                  90                  95

Gln Asp Gln His Arg Glu Val Glu Val
            100                 105
```

<210> SEQ ID NO 41
<211> LENGTH: 16
<212> TYPE: PRT
<213> ORGANISM: Artificial
<220> FEATURE:
<223> OTHER INFORMATION: Synthetic peptide sequence

<400> SEQUENCE: 41

```
Ser Val Ser Val Gly Met Lys Pro Ser Pro Arg Pro Gly Gly Gly Lys
1               5                   10                  15
```

<210> SEQ ID NO 42
<211> LENGTH: 12
<212> TYPE: PRT
<213> ORGANISM: Artificial
<220> FEATURE:
<223> OTHER INFORMATION: Synthetic peptide sequence

<400> SEQUENCE: 42

```
Thr His Arg Thr Ser Thr Leu Asp Tyr Phe Val Ile
1               5                   10
```

<210> SEQ ID NO 43
<211> LENGTH: 21
<212> TYPE: PRT
<213> ORGANISM: Artificial
<220> FEATURE:
<223> OTHER INFORMATION: Synthetic peptide sequence

<400> SEQUENCE: 43

```
Lys Thr Gln Ala Thr Ser Glu Ser Gly Ser Ala Gly Arg Gln Met Phe
1               5                   10                  15

Val Ala Asp Met Gly
            20
```

<210> SEQ ID NO 44
<211> LENGTH: 21
<212> TYPE: PRT
<213> ORGANISM: Artificial
<220> FEATURE:
<223> OTHER INFORMATION: Synthetic peptide sequence

<400> SEQUENCE: 44

```
Lys Thr Gln Ala Thr Ser Arg Gly Thr Arg Gly Met Arg Thr Ser Gly
1               5                   10                  15

Gly Phe Pro Val Gly
            20


<210> SEQ ID NO 45
<211> LENGTH: 21
<212> TYPE: PRT
<213> ORGANISM: Artificial
<220> FEATURE:
<223> OTHER INFORMATION: Synthetic peptide sequence

<400> SEQUENCE: 45

Lys Thr Gln Ala Thr Ser Val Pro Arg Lys Ala Ala Arg Arg Trp Glu
1               5                   10                  15

Gln Val Asp Ser Val
            20


<210> SEQ ID NO 46
<211> LENGTH: 21
<212> TYPE: PRT
<213> ORGANISM: Artificial
<220> FEATURE:
<223> OTHER INFORMATION: Synthetic peptide sequence

<400> SEQUENCE: 46

Ser Lys Thr Ser Gly Arg Asp Gln Ser Lys Arg Val Pro Arg Tyr Trp
1               5                   10                  15

Asn Val His Arg Asp
            20


<210> SEQ ID NO 47
<211> LENGTH: 20
<212> TYPE: PRT
<213> ORGANISM: Artificial
<220> FEATURE:
<223> OTHER INFORMATION: Synthetic peptide sequence

<400> SEQUENCE: 47

Ser Lys Thr Ser Arg Glu Ser Ser Ala Val Gln Met Gly Lys Ala Arg
1               5                   10                  15

Phe Leu Cys Thr
            20


<210> SEQ ID NO 48
<211> LENGTH: 23
<212> TYPE: PRT
<213> ORGANISM: Artificial
<220> FEATURE:
<223> OTHER INFORMATION: Synthetic peptide sequence

<400> SEQUENCE: 48

Cys Gly Ser Lys Gly Ser Ile Phe Arg Leu Ser Trp Gly Thr Tyr Phe
1               5                   10                  15

Ser Gly Ser Lys Gly Ser Cys
            20


<210> SEQ ID NO 49
<211> LENGTH: 21
<212> TYPE: PRT
<213> ORGANISM: Artificial
<220> FEATURE:
<223> OTHER INFORMATION: Synthetic peptide sequence
```

-continued

```
<400> SEQUENCE: 49

Ser Lys Thr Ser Arg Glu Ser Ser Ala Val Gln Met Gly Lys Ala Arg
1               5                   10                  15

Phe Leu Cys Thr His
            20


<210> SEQ ID NO 50
<211> LENGTH: 19
<212> TYPE: PRT
<213> ORGANISM: Artificial
<220> FEATURE:
<223> OTHER INFORMATION: Synthetic peptide sequence

<400> SEQUENCE: 50

Cys Glu Ser Ser His Trp Ser Ala Trp Trp Ile Arg Ser Asn Gln Ser
1               5                   10                  15

Ser Ser Cys


<210> SEQ ID NO 51
<211> LENGTH: 12
<212> TYPE: PRT
<213> ORGANISM: Artificial
<220> FEATURE:
<223> OTHER INFORMATION: Synthetic peptide sequence

<400> SEQUENCE: 51

His Trp Ser Ala Trp Trp Ile Arg Ser Asn Gln Ser
1               5                   10
```